US012399501B2

(12) United States Patent
Ebrahimi Afrouzi et al.

(10) Patent No.: US 12,399,501 B2
(45) Date of Patent: Aug. 26, 2025

(54) METHOD OF LIGHTWEIGHT SIMULTANEOUS LOCALIZATION AND MAPPING PERFORMED ON A REAL-TIME COMPUTING AND BATTERY OPERATED WHEELED DEVICE

(71) Applicants: Ali Ebrahimi Afrouzi, San Diego, NV (US); Lukas Fath, York (CA); Andrew Fitzgerald, Burlington (CA); Amin Ebrahimi Afrouzi, Encinitas, CA (US); Brian Highfill, Castro Valley, CA (US); Masih Ebrahimi Afrouzi, North Las Vegas, NV (US); Nema Link, San Diego, CA (US)

(72) Inventors: Ali Ebrahimi Afrouzi, San Diego, NV (US); Lukas Fath, York (CA); Andrew Fitzgerald, Burlington (CA); Amin Ebrahimi Afrouzi, Encinitas, CA (US); Brian Highfill, Castro Valley, CA (US); Masih Ebrahimi Afrouzi, North Las Vegas, NV (US); Nema Link, San Diego, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 17/494,251

(22) Filed: Oct. 5, 2021

(65) Prior Publication Data

US 2022/0187841 A1 Jun. 16, 2022

Related U.S. Application Data

(60) Provisional application No. 63/148,307, filed on Feb. 11, 2021, provisional application No. 63/124,004, filed on Dec. 10, 2020.

(51) Int. Cl.
*G05D 1/00* (2024.01)
*G01C 21/12* (2006.01)

(52) U.S. Cl.
CPC .......... *G05D 1/0242* (2013.01); *G01C 21/12* (2013.01); *G05D 1/0238* (2013.01); *G05D 1/0272* (2013.01); *G05D 1/0274* (2013.01)

(58) Field of Classification Search
CPC .. G05D 1/0242; G05D 1/0238; G05D 1/0272; G05D 1/0274; G05D 2201/0207; G01C 21/12
See application file for complete search history.

(56) References Cited

U.S. PATENT DOCUMENTS 8,855,914 B1 * 10/2014 Alexander .......... A47L 11/4011 15/49.1
9,329,598 B2 5/2016 Pack
(Continued)

FOREIGN PATENT DOCUMENTS

GB 2584839 A * 12/2020 .......... G01C 21/383

*Primary Examiner* — Ian Jen
*Assistant Examiner* — Renee LaRose

(57) ABSTRACT

Some aspects include a method for operating a wheeled device, including: capturing, by a primary sensor coupled to the wheeled device, primary sensor data indicative of a plurality of radial distances to objects; transforming, by a processor of the wheeled device, the plurality of radial distances from a perspective of the primary sensor to a perspective of the wheeled device; generating, by the processor, a partial map of visible areas in real-time at a first position of the wheeled device based on the primary sensor data and some secondary sensor data, wherein: the partial map is a bird's eye view; and the processor iteratively completes a full map of the environment based on new sensor data captured by sensors as the wheeled device performs work within the environment and new areas become visible to the sensors; and executing, by the wheeled device, a movement path to a second position.

75 Claims, 374 Drawing Sheets

(56) References Cited

U.S. PATENT DOCUMENTS 9,400,501 B2 7/2016 Schnittman
10,222,805 B2 3/2019 Munich
10,571,926 B1 * 2/2020 Zhang .................. G05D 1/0219
10,759,051 B2 9/2020 Tan
10,852,139 B2 12/2020 Xiong
11,034,028 B2 6/2021 Hu
11,256,261 B1 * 2/2022 Bai ...................... G05D 1/0246
2006/0085095 A1 * 4/2006 Reindle ................. A47L 9/2842 700/258
2007/0267998 A1 * 11/2007 Cohen .................. G05D 1/0225 320/109
2009/0319073 A1 * 12/2009 Zhang .............. G05B 19/41865 700/112
2013/0226344 A1 * 8/2013 Wong ..................... B25J 9/1694 901/1
2015/0205299 A1 * 7/2015 Schnittman .......... G05D 1/0227 901/1
2016/0147230 A1 * 5/2016 Munich ................ G01C 21/206 701/28
2016/0165795 A1 * 6/2016 Balutis .................... G01S 19/13 701/25
2017/0215668 A1 * 8/2017 Lubbers ................ A47L 9/0686
2018/0078107 A1 * 3/2018 Gagnon .................... A47L 9/20
2018/0228335 A1 * 8/2018 Miller ....................... A47L 5/14
2018/0239355 A1 * 8/2018 Lee ........................ G08G 1/166
2018/0253108 A1 9/2018 Heinla
2019/0212752 A1 * 7/2019 Fong ...................... G06V 10/82
2019/0332114 A1 * 10/2019 Moroniti .............. G05D 1/0214
2019/0332115 A1 10/2019 Lim
2019/0365176 A1 * 12/2019 Kim ........................ A47L 9/009
2020/0050208 A1 * 2/2020 Frick .................... G06V 10/757
2020/0069140 A1 * 3/2020 Orzechowski ....... G05D 1/0022
2020/0100639 A1 * 4/2020 Ullmann .............. B25J 11/0085
2020/0160559 A1 * 5/2020 Urtasun ................. G06V 20/58
2020/0205629 A1 * 7/2020 Hong ................... G05D 1/0212
2020/0306983 A1 10/2020 Noh
2021/0007202 A1 * 1/2021 Guo ........................ G06F 3/165
2021/0012111 A1 * 1/2021 Choi .................... G05D 1/0246
2021/0063577 A1 3/2021 Liu
2021/0064043 A1 * 3/2021 Kulkarni .............. G05D 1/0227
2021/0190513 A1 6/2021 Zhao
2021/0199442 A1 * 7/2021 Xie ...................... G06V 20/588
2021/0201153 A1 * 7/2021 Chae ...................... G06N 3/048
2021/0373564 A1 * 12/2021 Eickenberg ............. A47L 11/20
2021/0405638 A1 * 12/2021 Boyraz .................. G06V 20/64

* cited by examiner

FIG. 1

Incredible boot-up speed

| Solution | Time to boot (seconds) | Time to start work |
|---|---|---|
| Robot using real time navigational stack | 2.0 | 3.0 |
| Robot 1 using traditional technologies | 7.7 | 15.9 |
| Robot 2 using traditional technologies | 26.5 | 32.75 |
| Robot 3 using traditional technologies | 17.7 | 18.5 |
| Robot 4 using traditional technologies | 14 | 23.8 |
| Robot 5 using traditional technologies | 12.5 | 19.9 |

Code compatibility with different operating systems

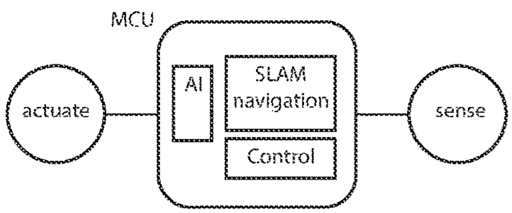
FIG. 8
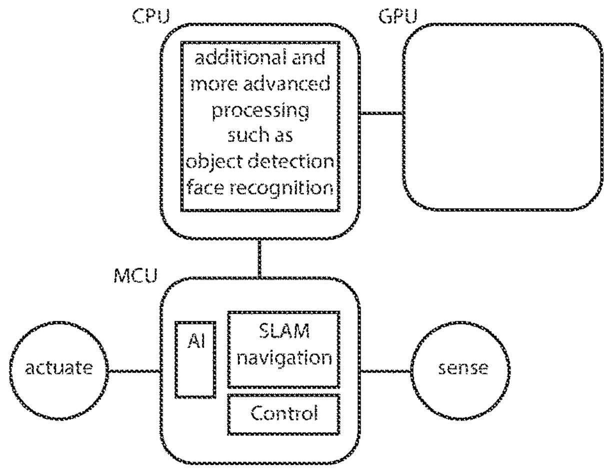
FIG. 9
FIG. 10
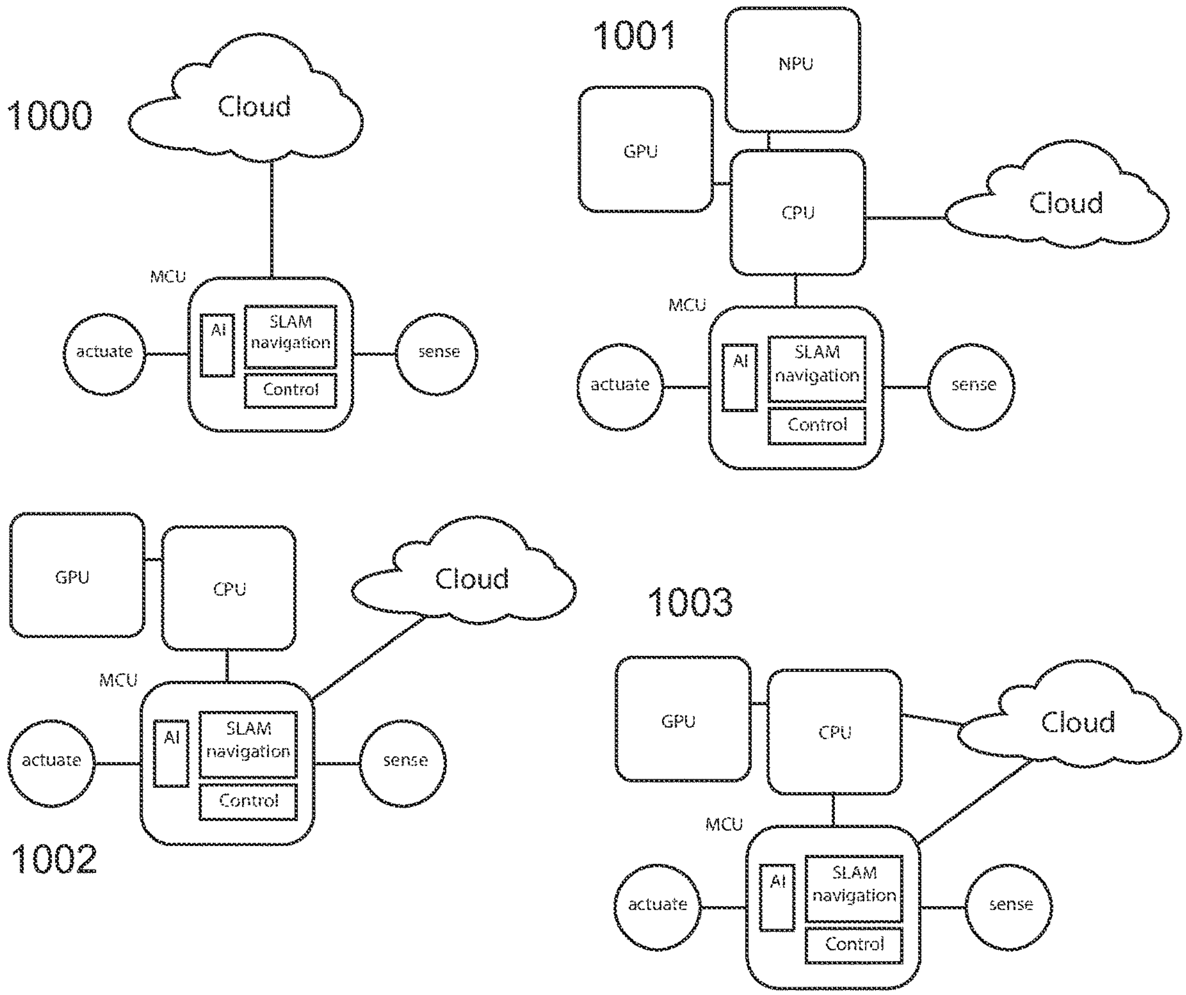

FIG. 15
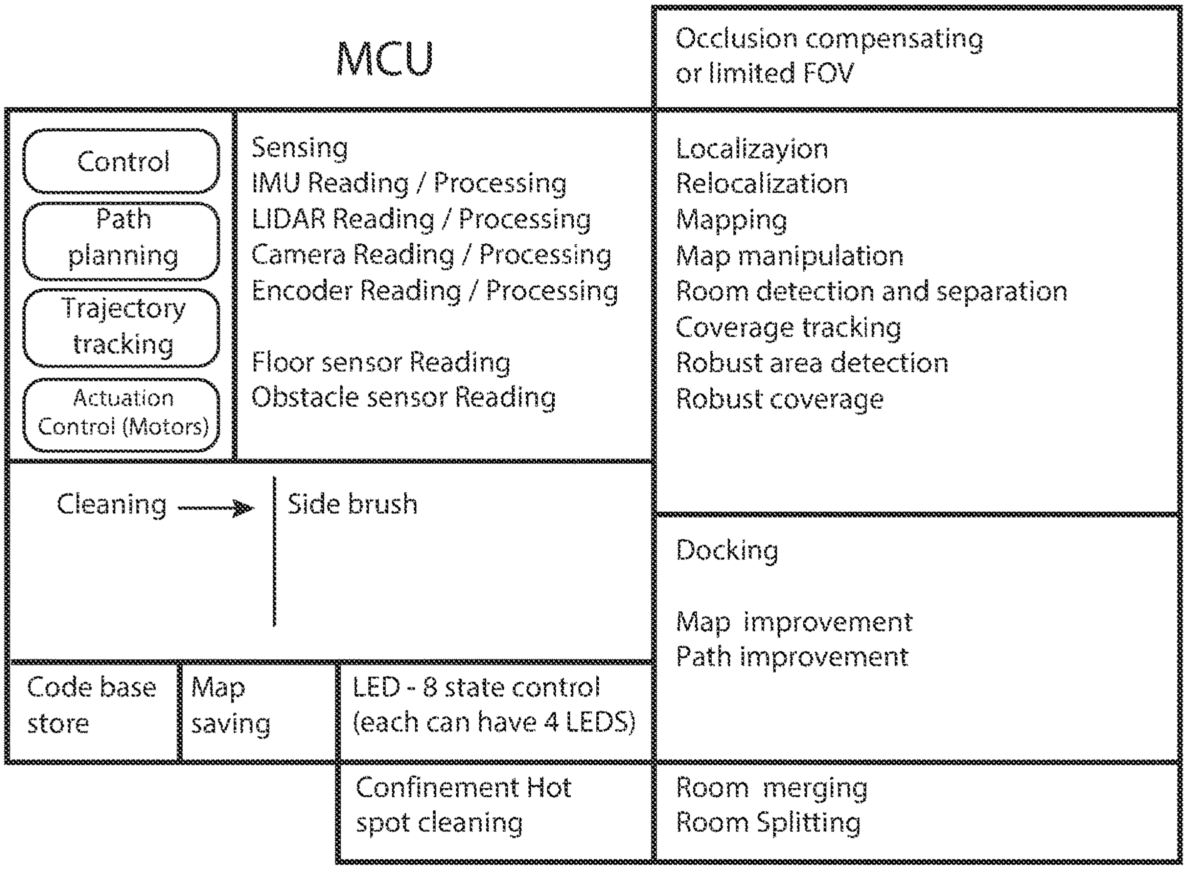
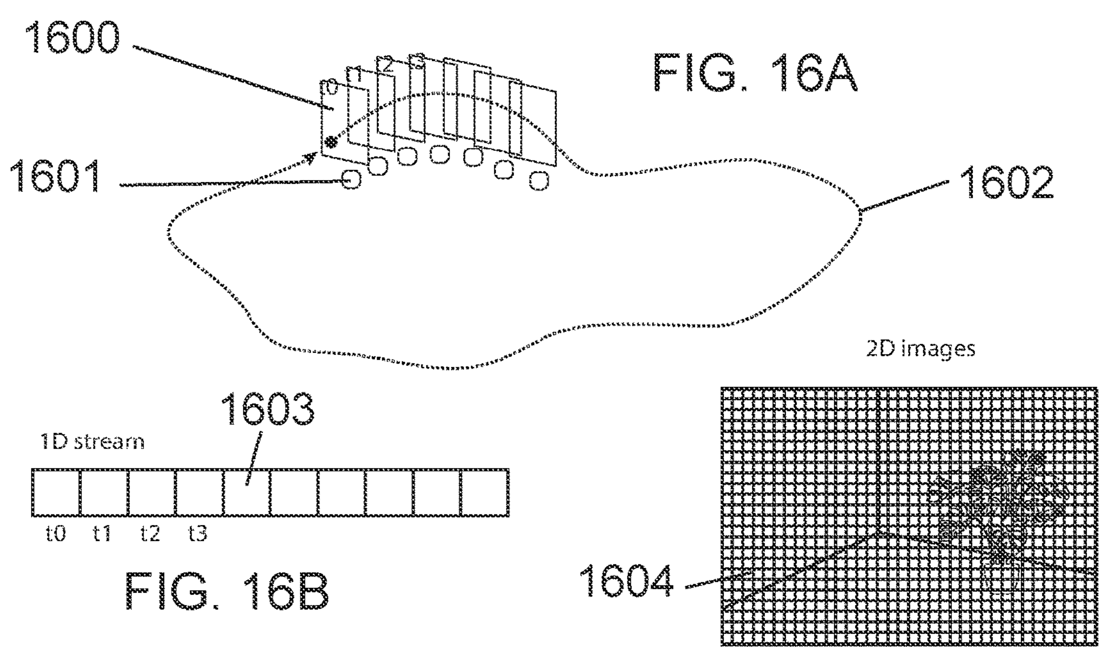
FIG. 16A
FIG. 16B

| Serial number | Owner name | First name | Model | Type | Date of purchase | Usage |
|---|---|---|---|---|---|---|
| 45671 | Robert | ABD | BK2 | 210 | 25/2/2025 | 21000.00 |
| | Ali | | BLM3 | 211 | 1/6/2024 | 19750.00 |
| | | | TL51 | 212 | 18/7/2024 | 45450.00 |

Department

| Department ID | Department Name |
|---|---|
| 210 | Vacuum |
| 211 | Steam |
| 212 | Scrub |

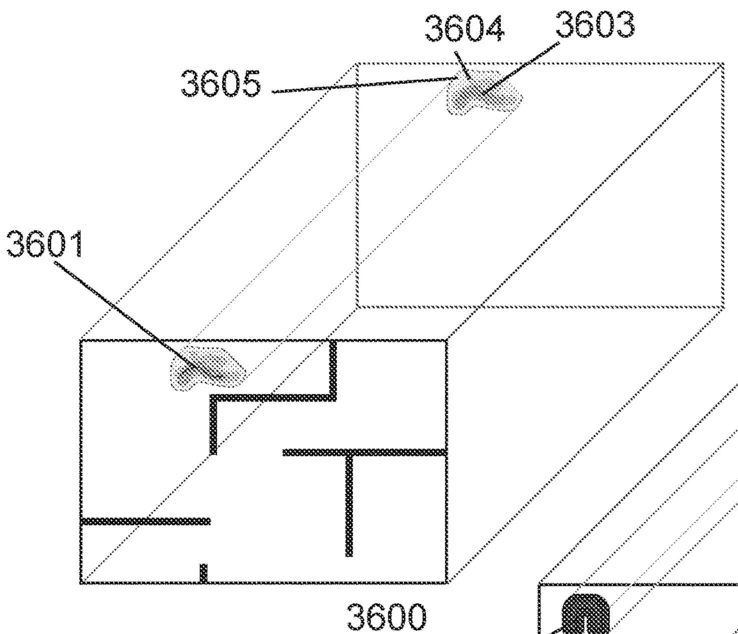
FIG. 36
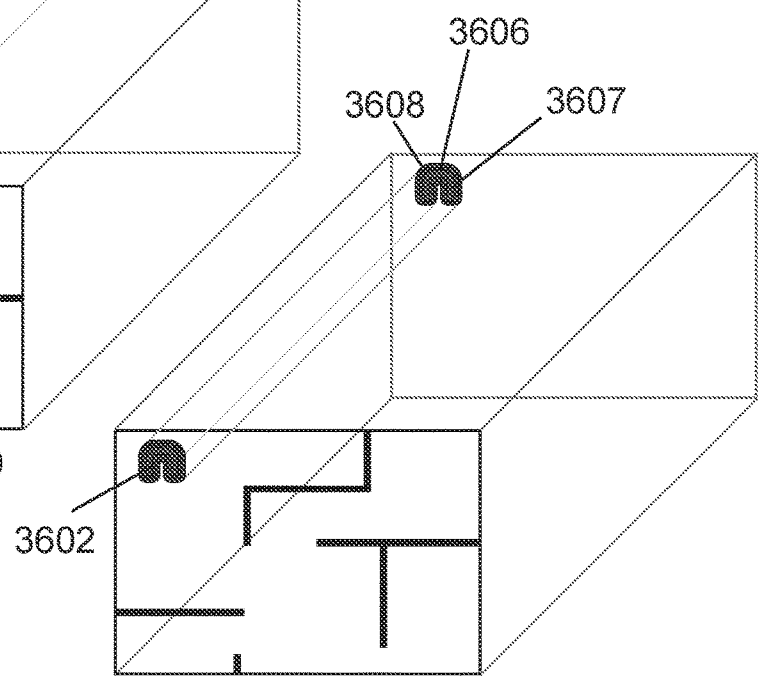
FIG. 37
FIG. 38
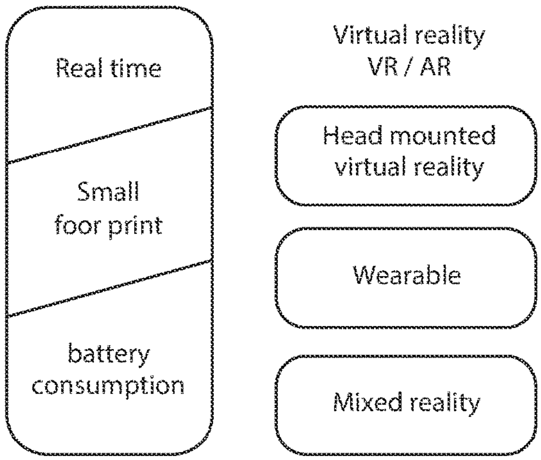

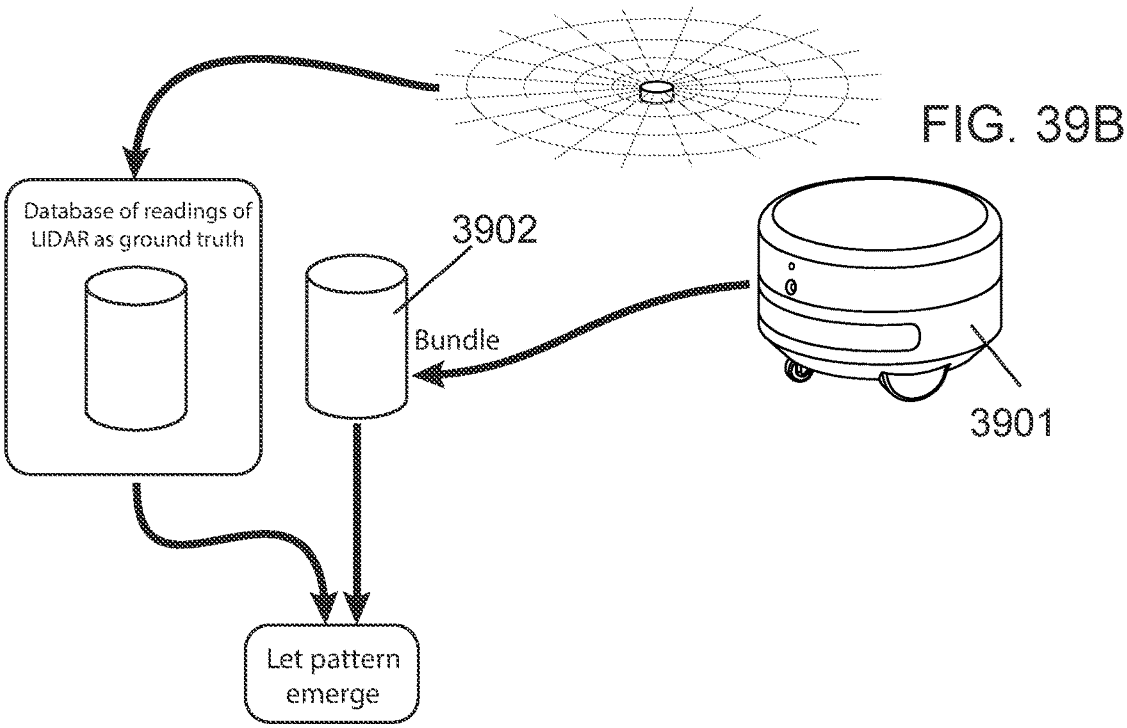
FIG. 39B
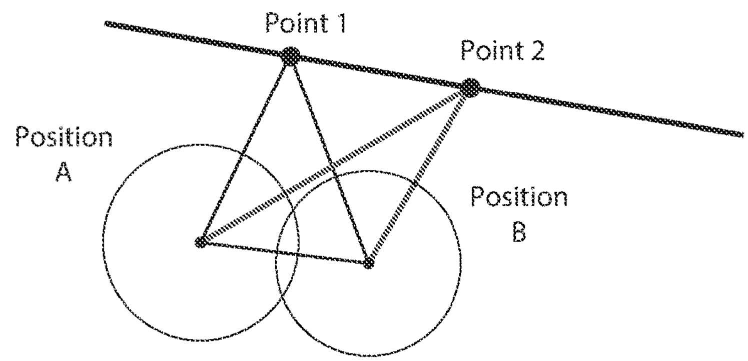
FIG. 40
FIG. 41
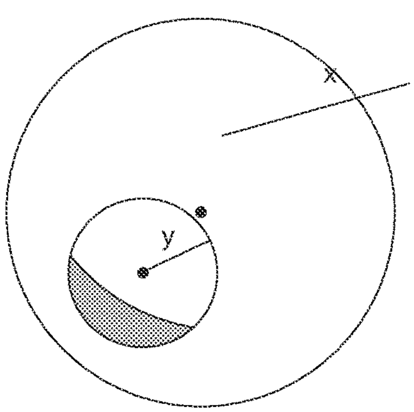
FIG. 42
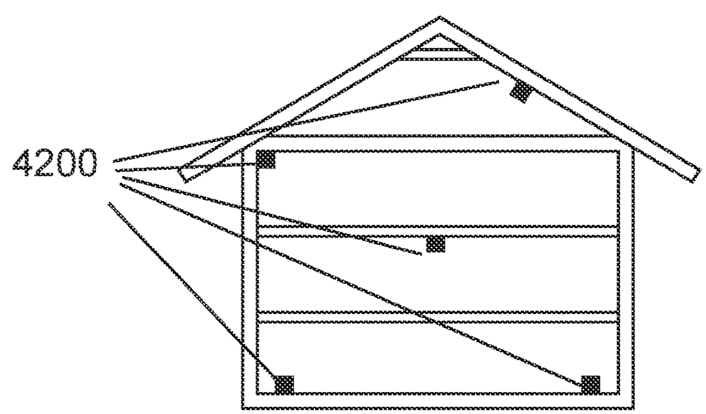

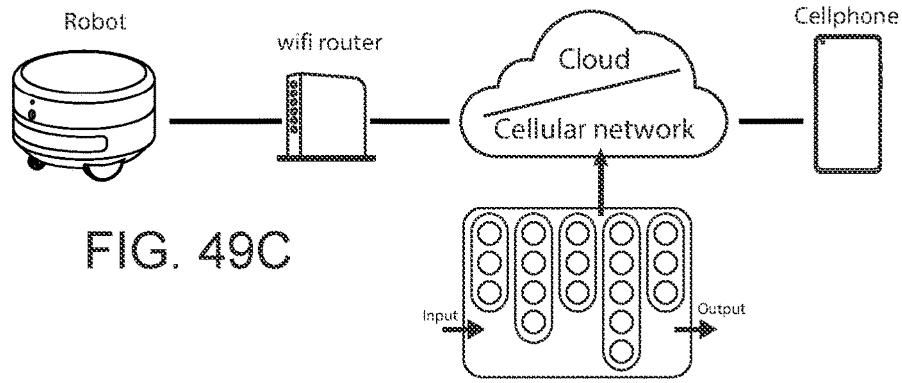
FIG. 49C
FIG. 49D
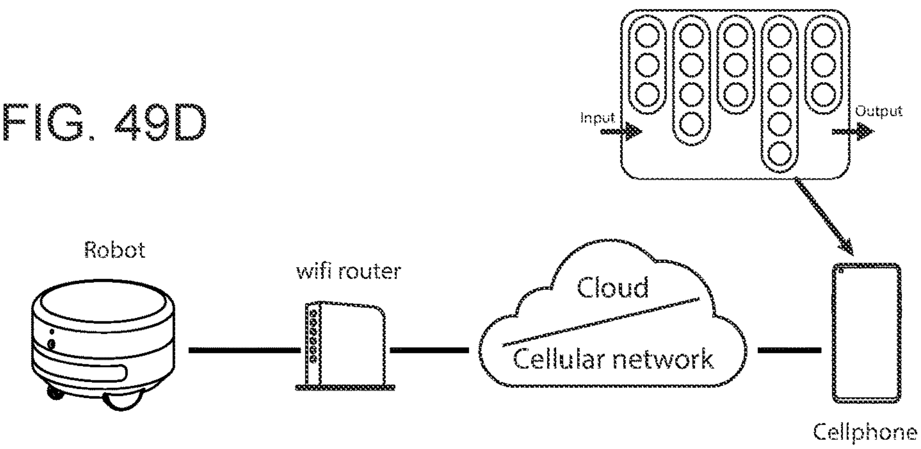
FIG. 49E
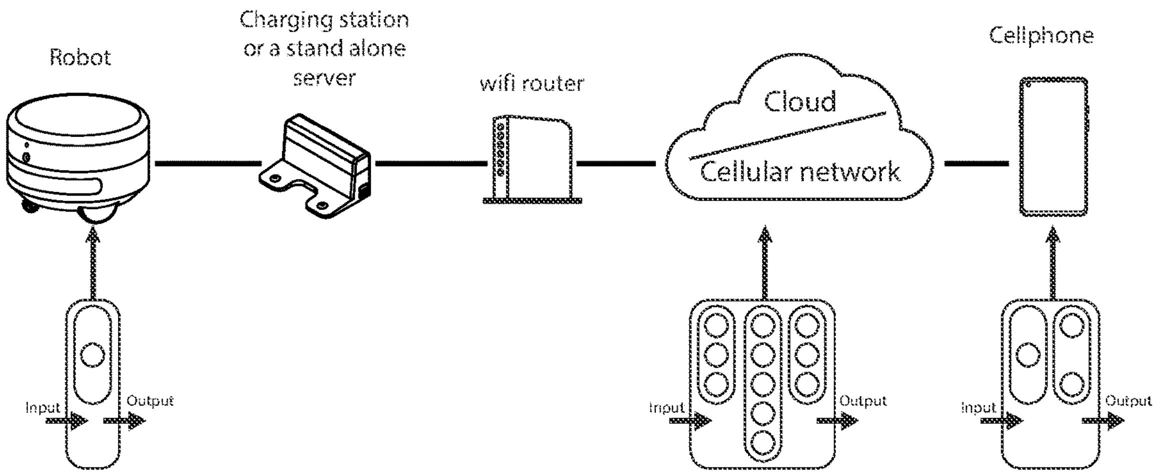

FIG. 61

Expedited Map Completion and Display

| Time and coverage required to generate a complete map in a complex environment | Real Time SLAM Navigational Stack | Traditional SLAM |
|---|---|---|
| Time to map entire area (less is better) | 11.2 minutes | > 60 minutes |
| Area travelled in order to build complete map (less is better) | 12% | >100% |

On average: area was mapped in 11.5 minutes with 12% coverage in this extremely complex/large space (Standard IEC room mapped in only 2.2 minutes )

Object identification based on depth data

FIG. 88A
FIG. 88B
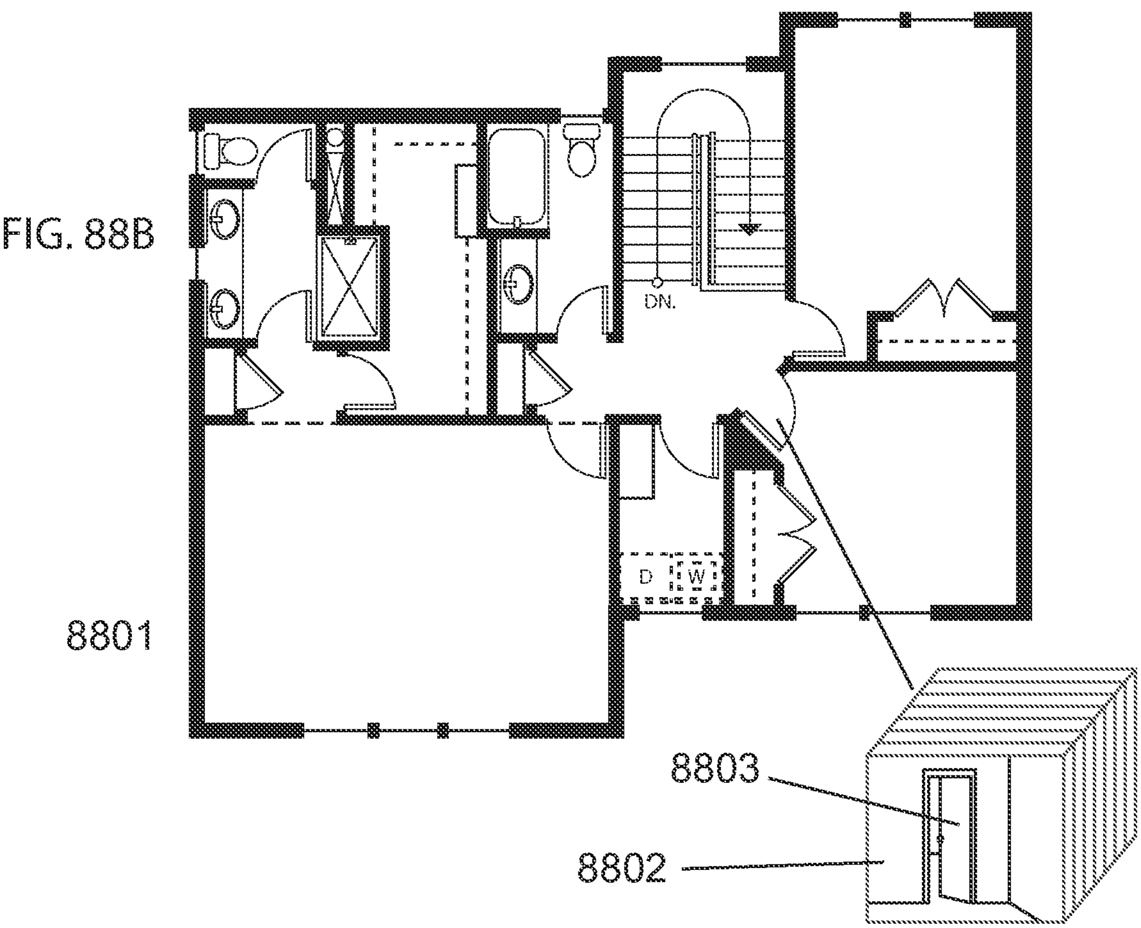

3d model with no texture texture loaded on the model

9601

FIG. 108
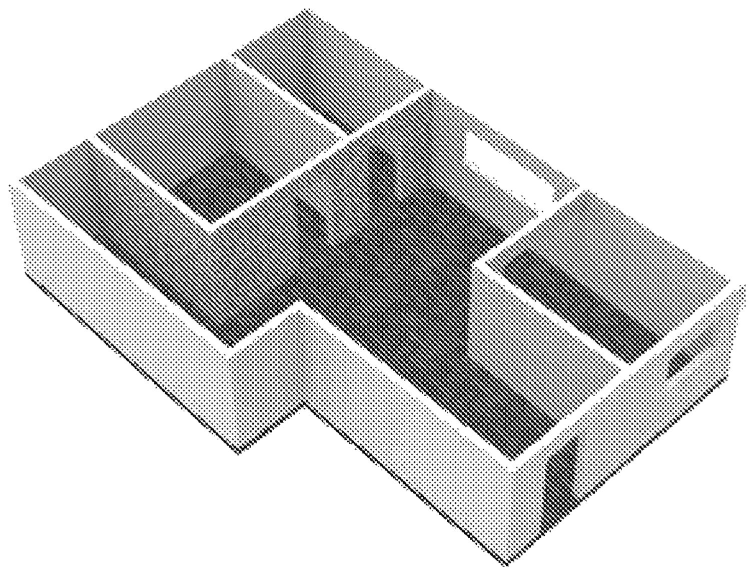
FIG. 109
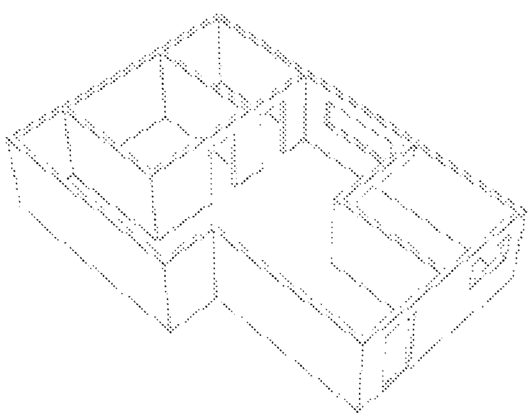
outline using 2D screen units
more coherent lines
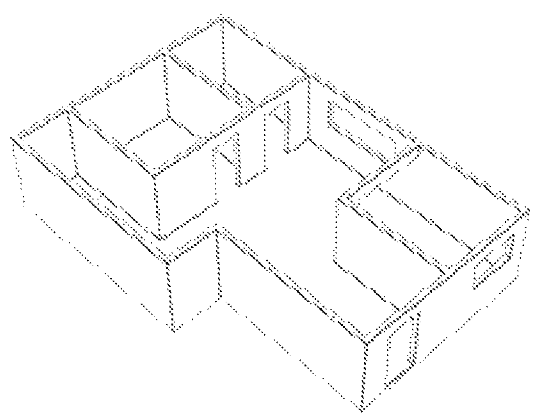
outline using 3D environment units
various line thicknesses FIG. 117A
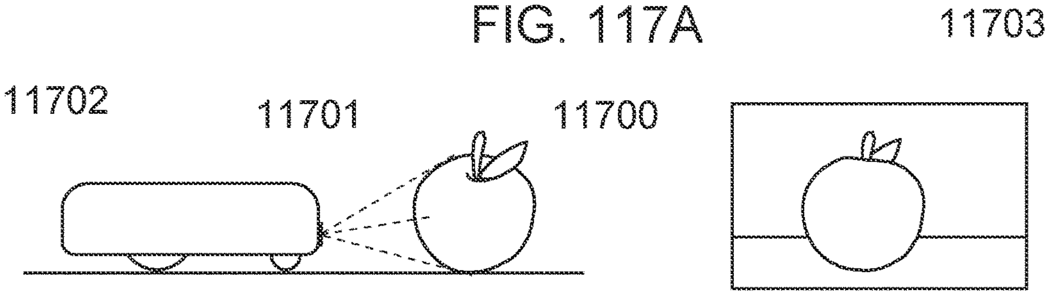
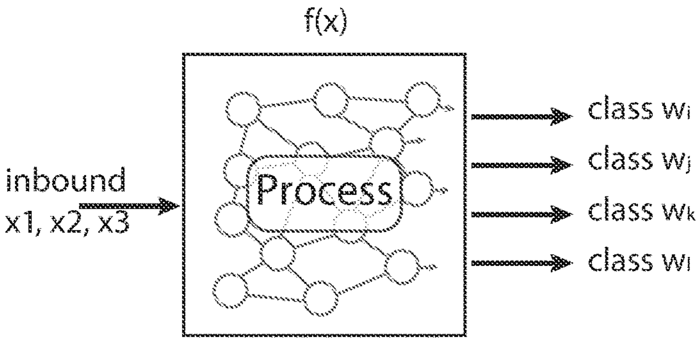
FIG. 117B
FIG. 117C
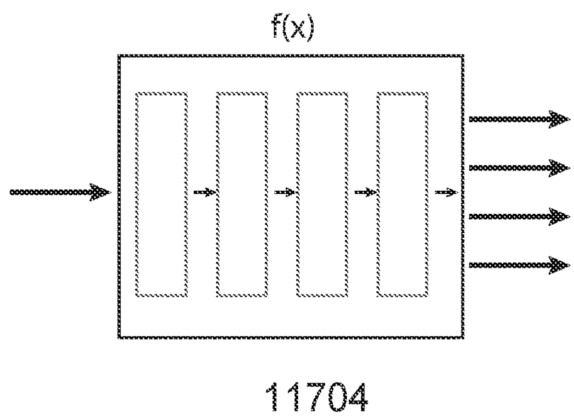
FIG. 118
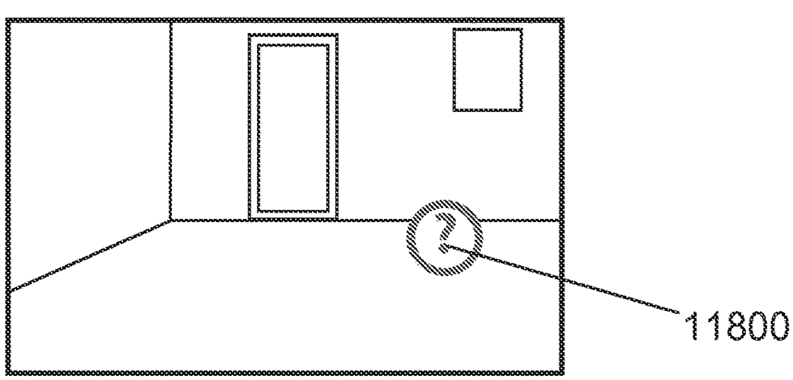

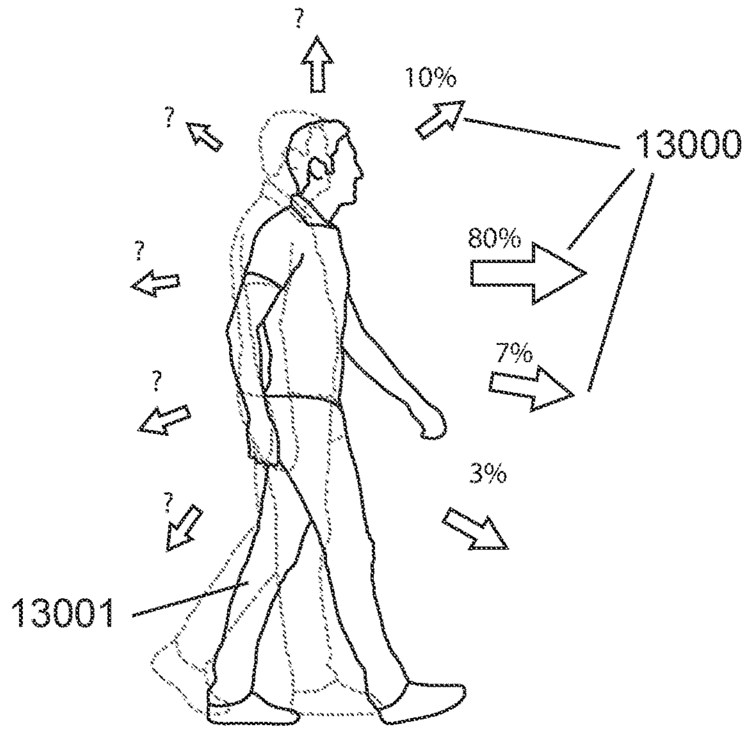
FIG. 130
FIG. 131
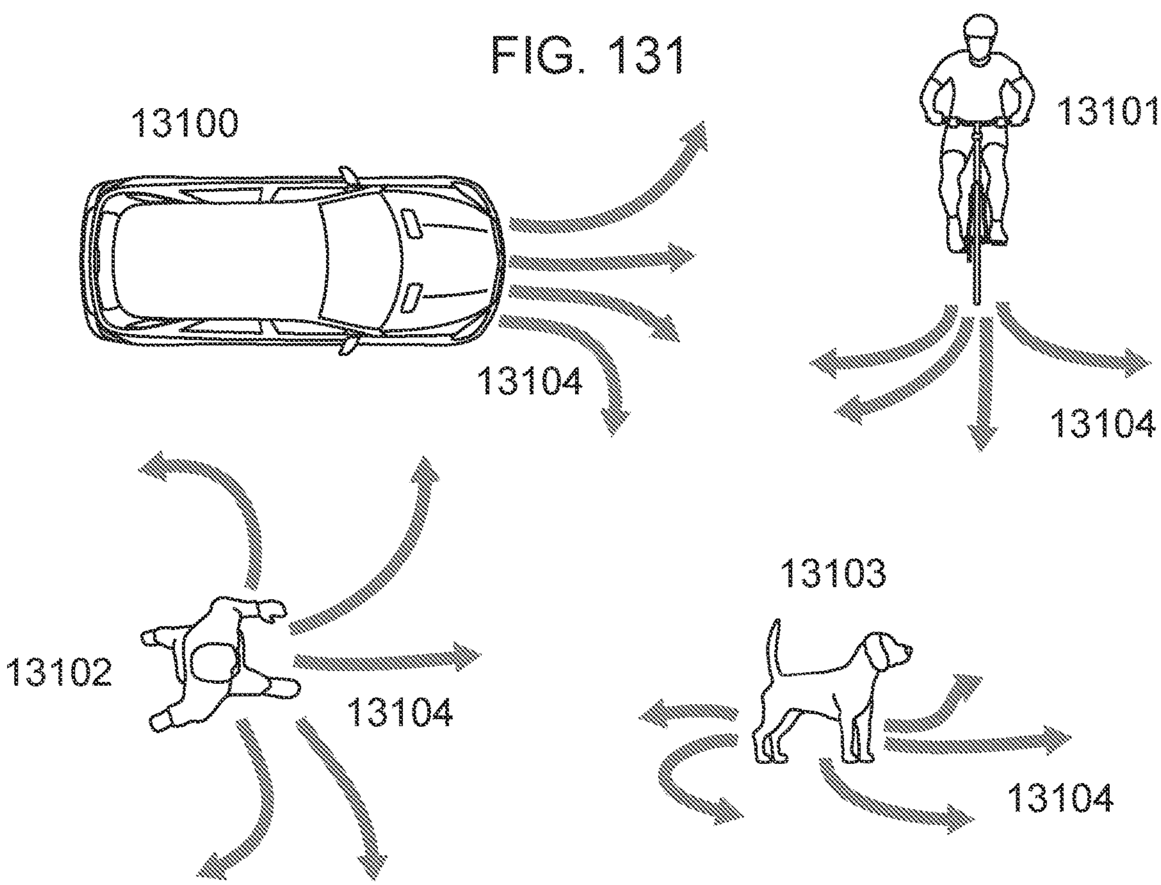

FIG. 133B
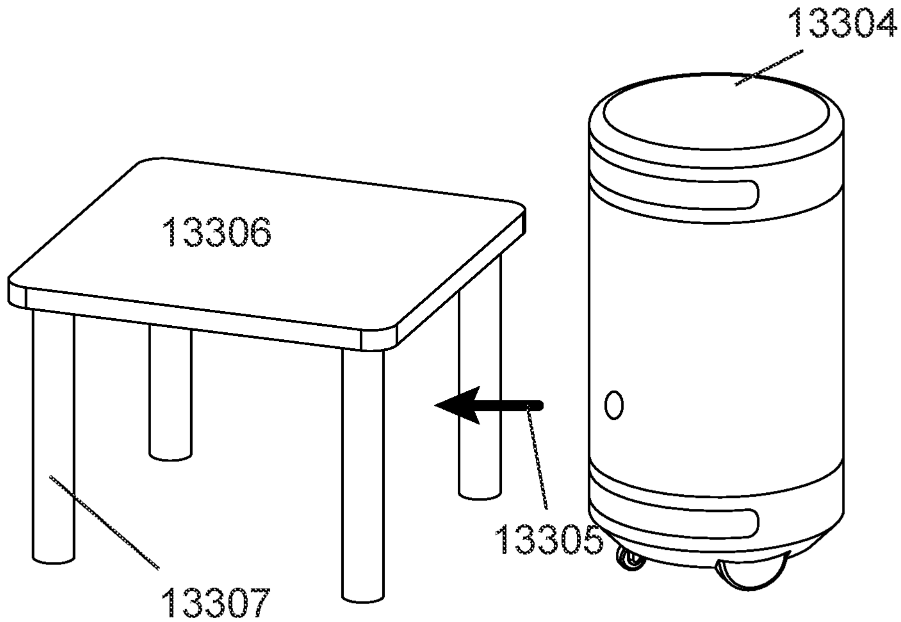
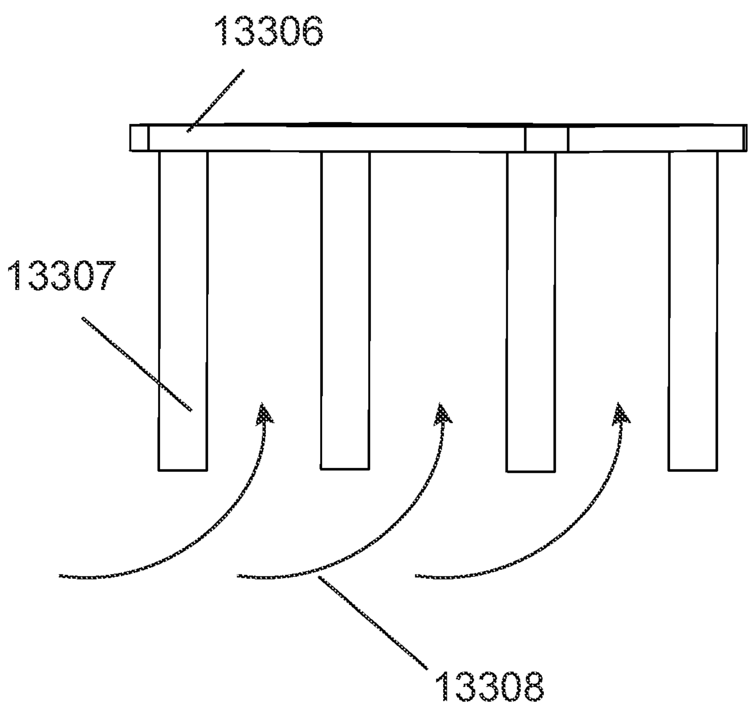

FIG. 135
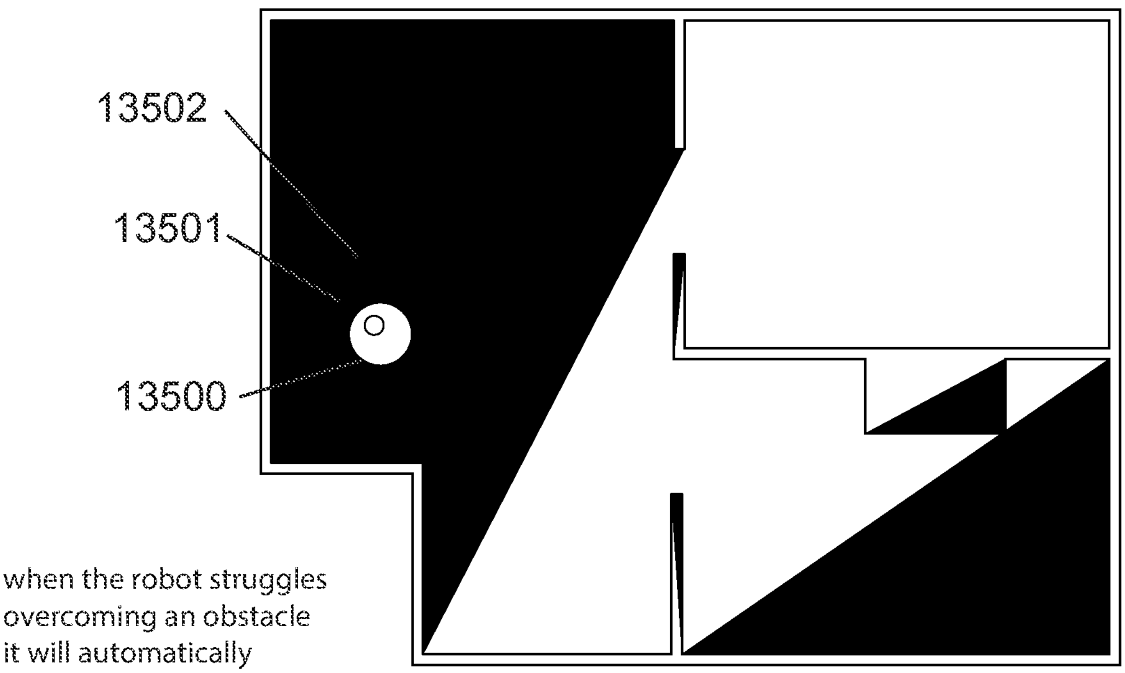
when the robot struggles
overcoming an obstacle
it will automatically
inflates the obstacle area in
the map to avoid it next time. This inflation will be proportional to the time of struggle
If the struggle continues it will inflate it again for the next time
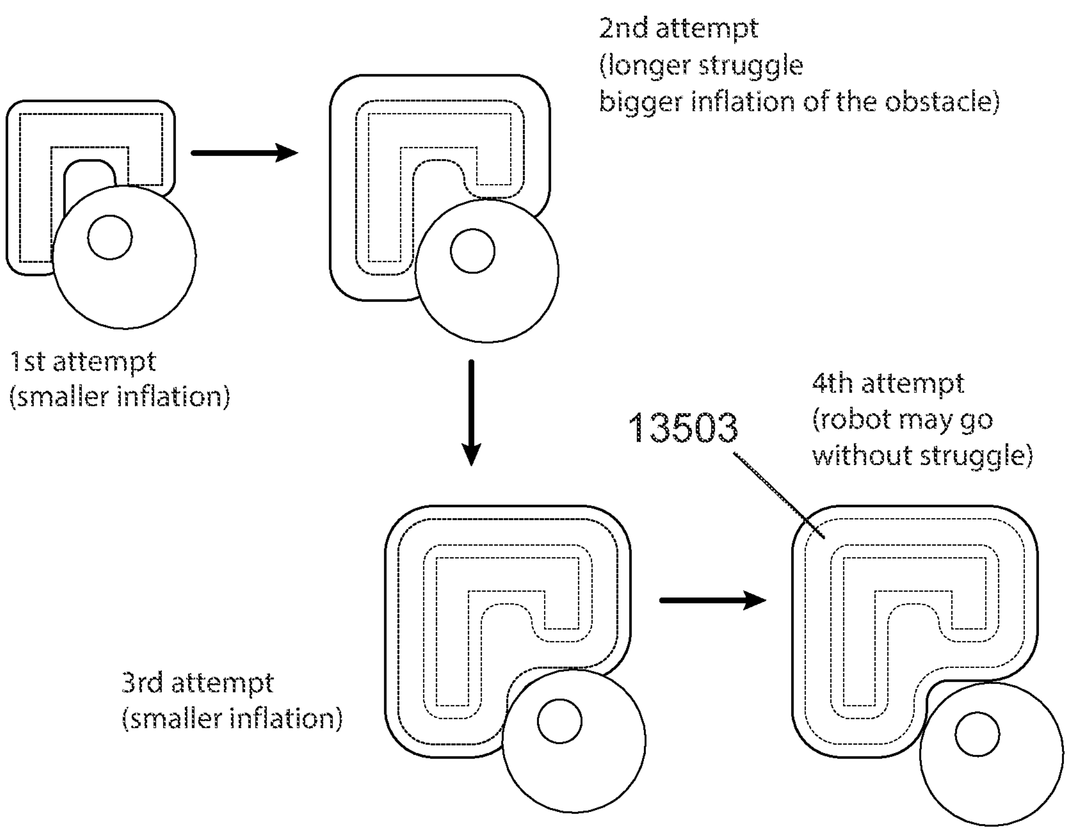

FIG. 155
15500
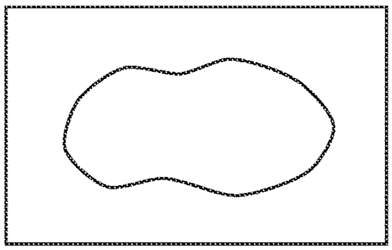
15502
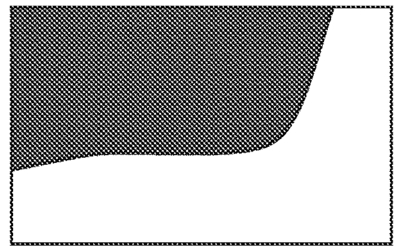
15501
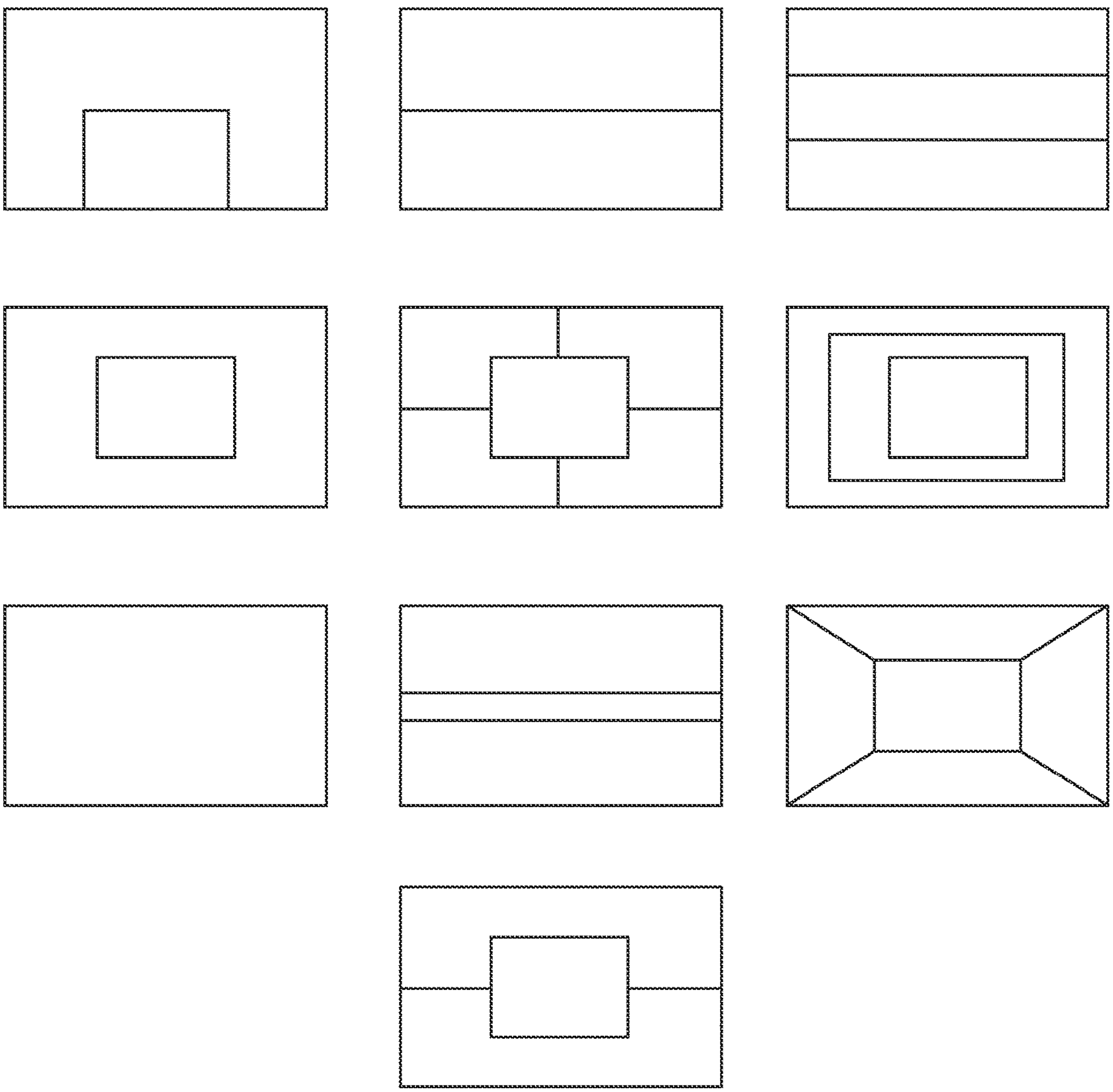

What camera sees is a part of this world

Camera may or may not see many angles, may or may not see all heights
What camera sees depends on geographical configuration FIG. 160A
FIG. 160B
FIG. 160C
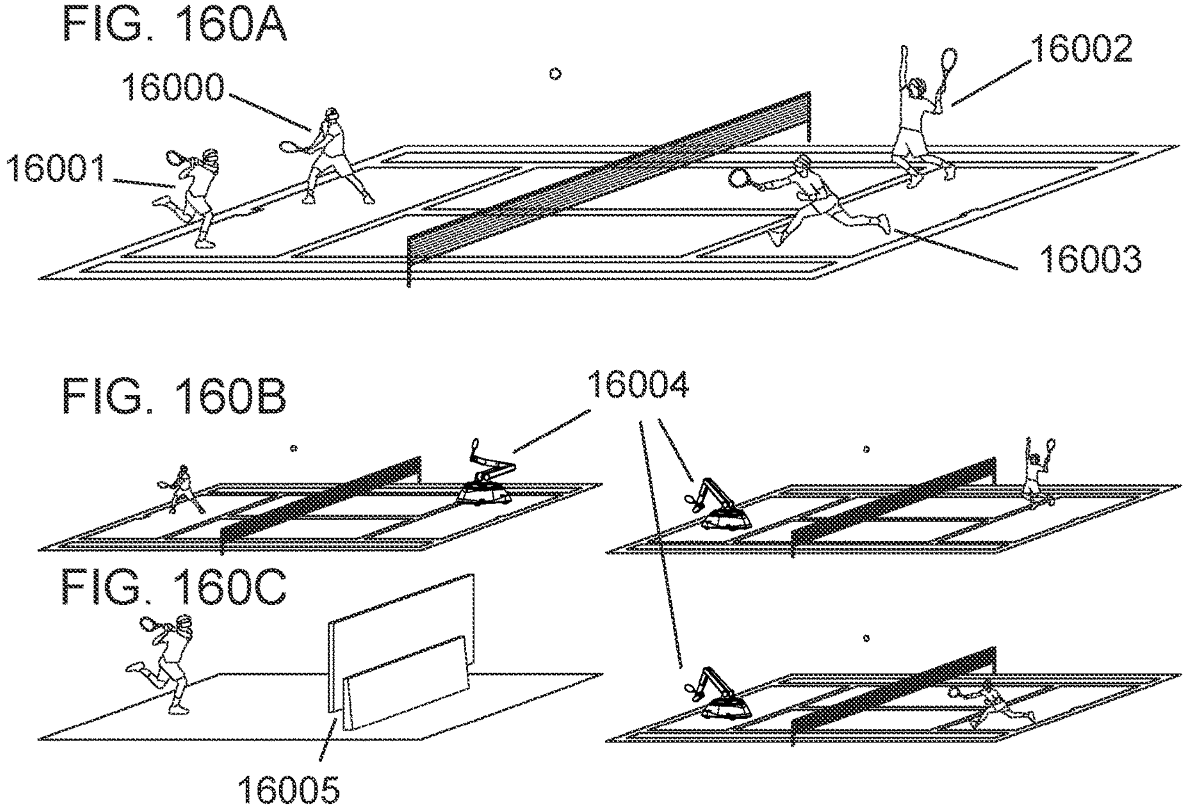
FIG. 161
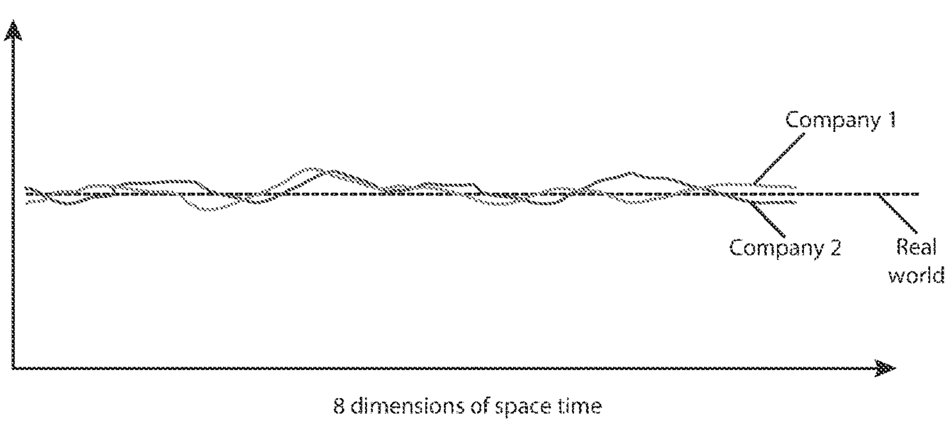

FIG. 171A
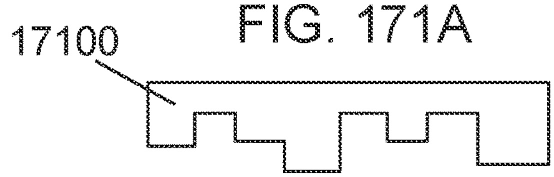
FIG. 171B
FIG. 171C
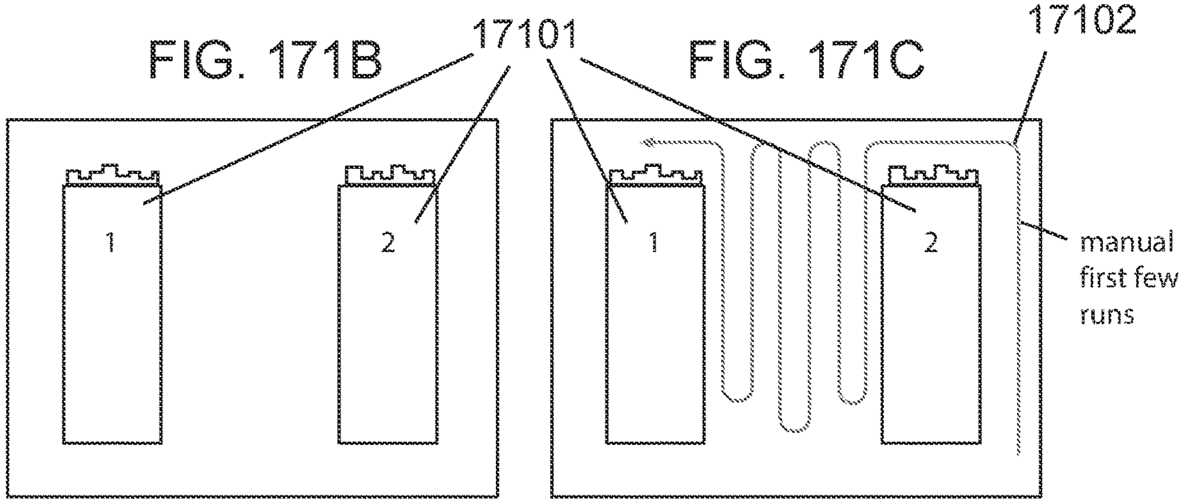
FIG. 172A
FIG. 172B
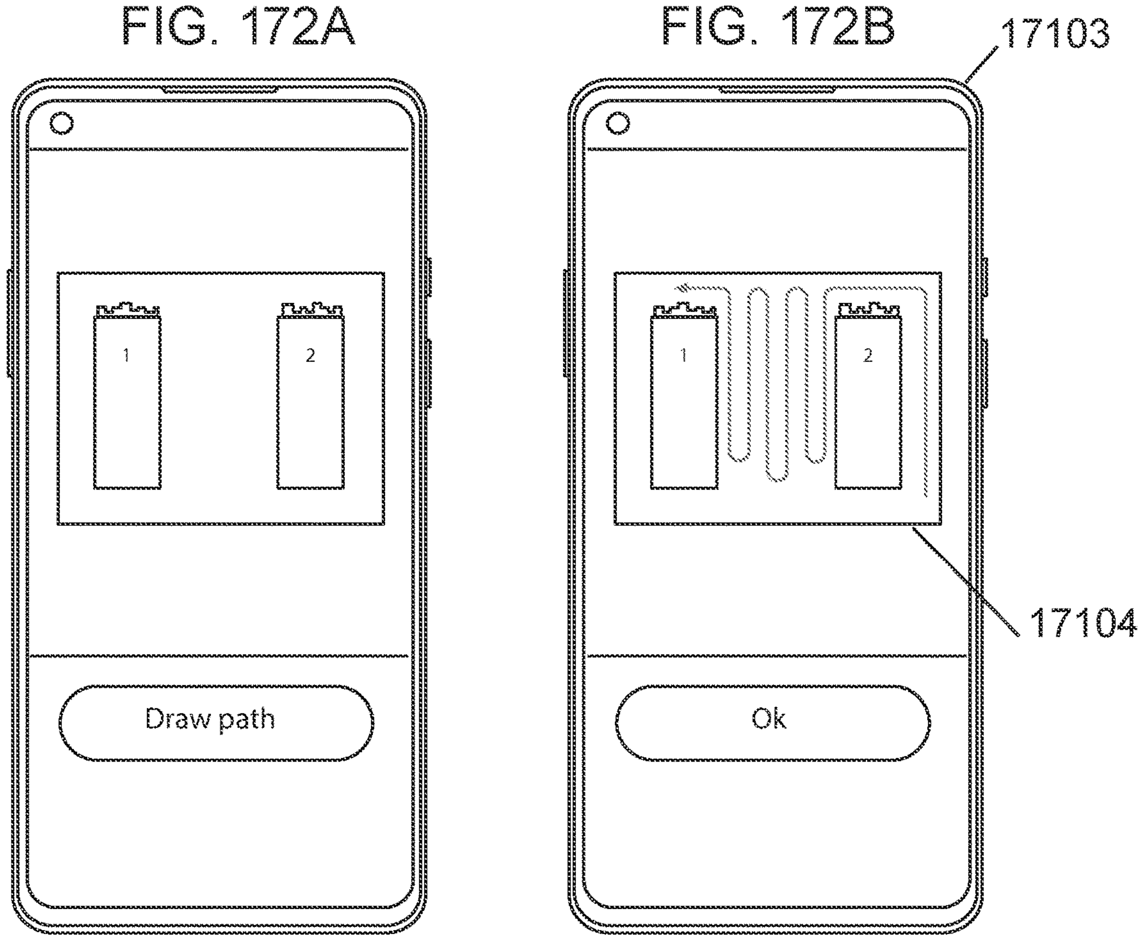

Object (person) identification based on moving volume (different signature patterns for different objects, people, animals)

FIG. 185B
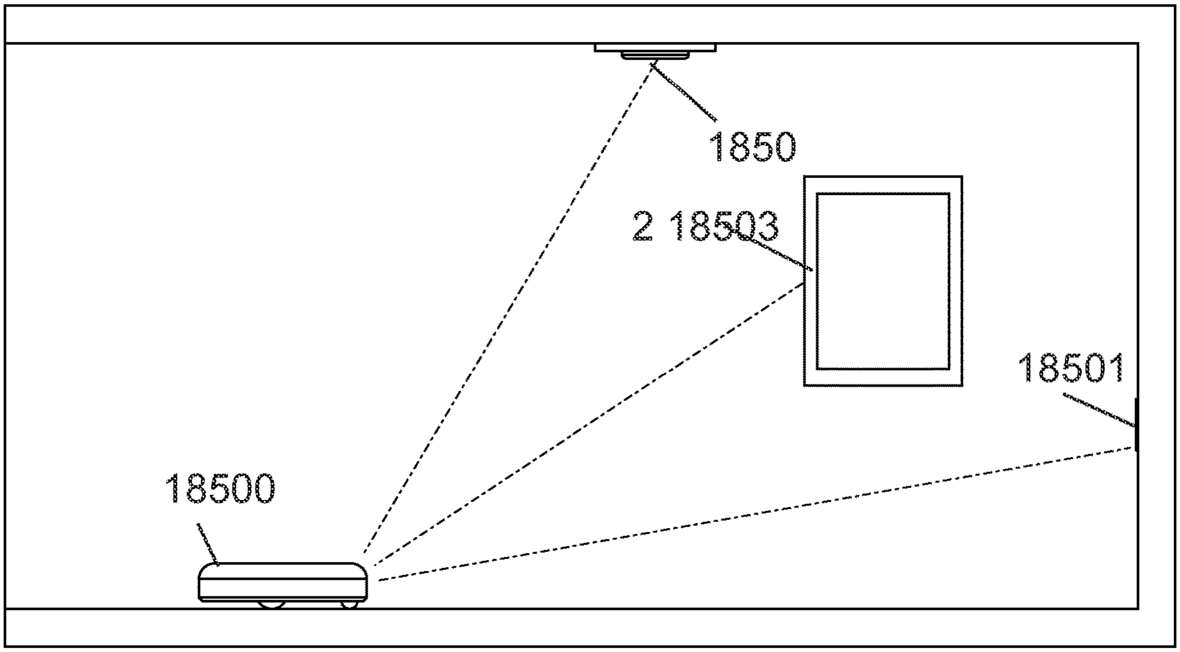
FIG. 186A
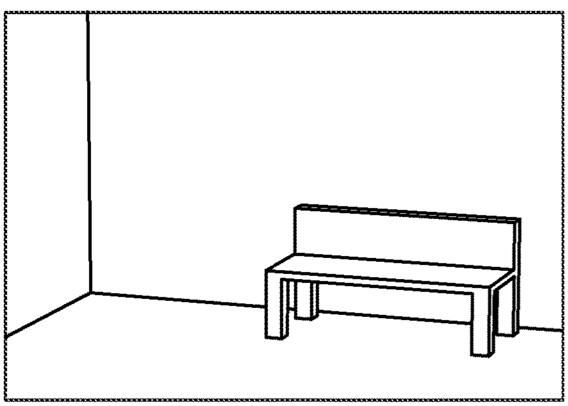
FIG. 186B
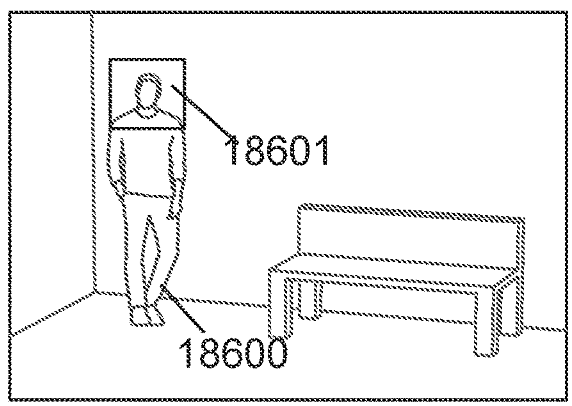
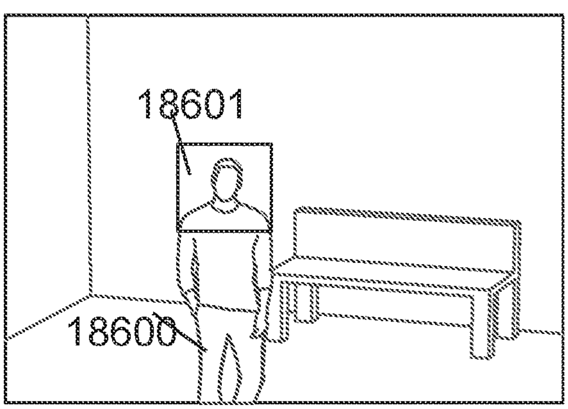
FIG. 186C
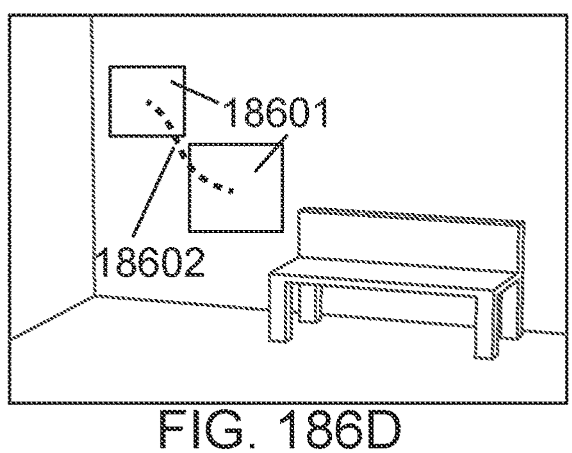
FIG. 186D FIG. 187A
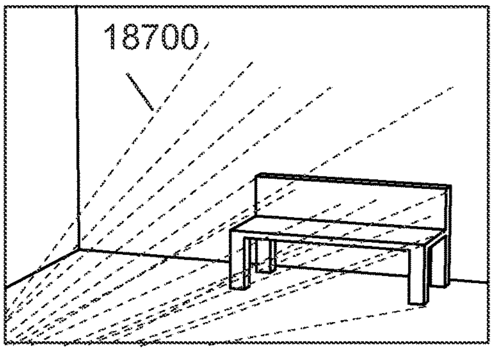
FIG. 187C
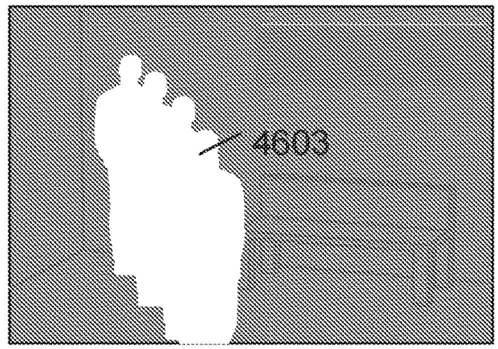
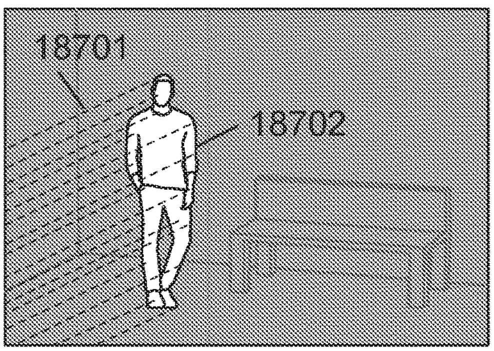
FIG. 187B
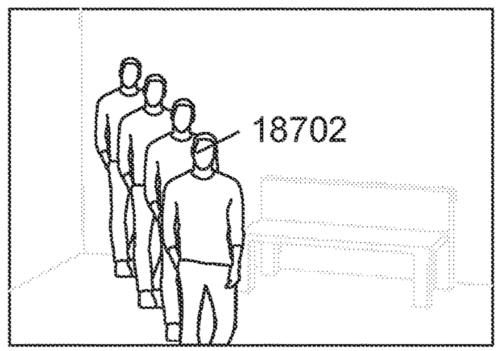
FIG. 187D
FIG. 188A
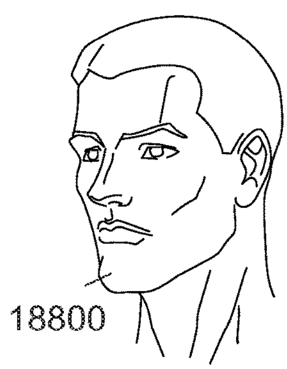
FIG. 188B
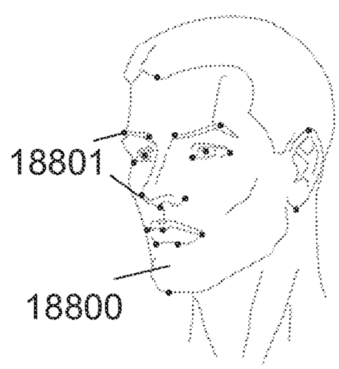
recognizing face by its features
FIG. 188C
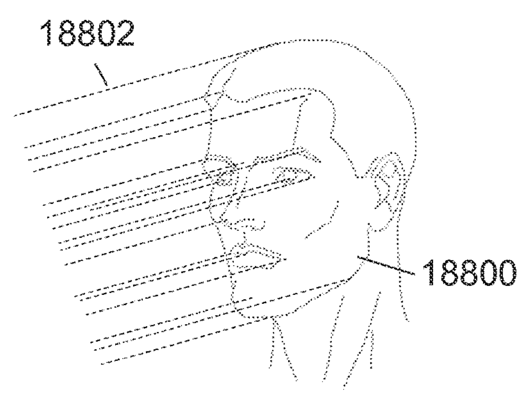
recognizing face distances (depth data)

Config 1.
Camera 1 and 2 parallel to the ground
Structured light aligned to camera 1 & parallel to the ground Config 2.
Camera 1 and 2 parallel to the ground Structured
light above camera 1 & tilted downward FIG. 195C
Config 3.
Camera 1 and 2 parallel to the ground
Structured light in the middle & parallel to the ground
Camera 1
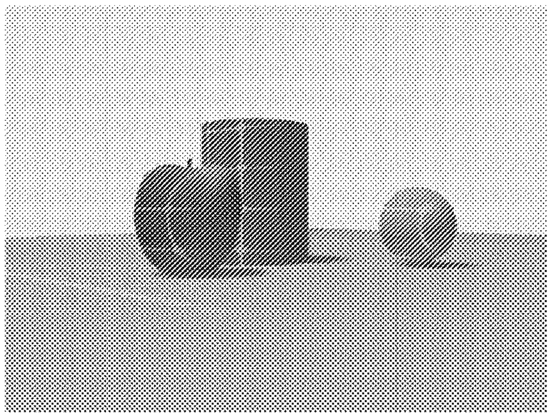
Camera 2
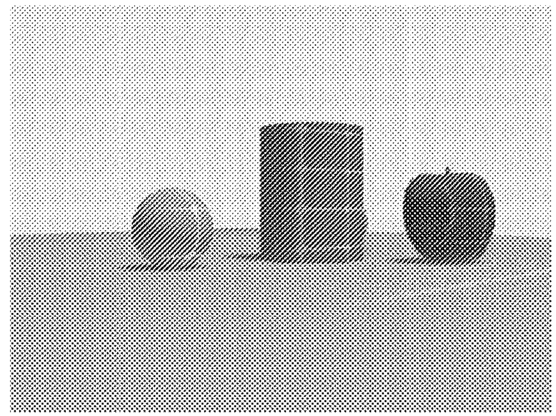
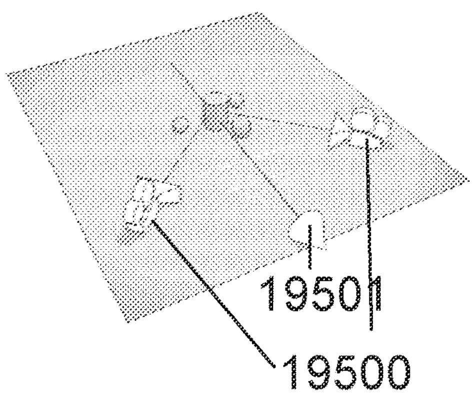

FIG. 195D
Config 4.
Camera 1 and 2 parallel to the ground
Structured light in the middle & tilted downward
Camera 1
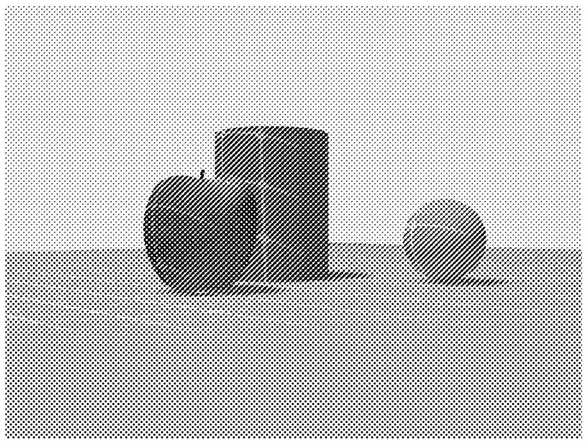
Camera 2
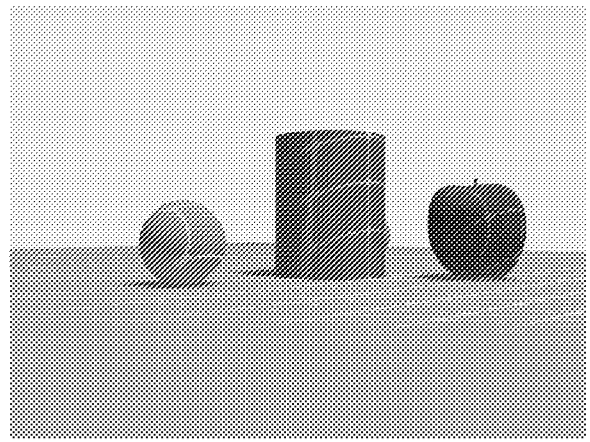
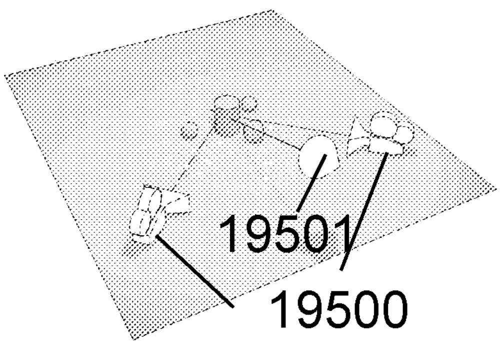

Config 6.
Camera 1 and 2 parallel to the ground
Structured light the right side of camera 1 & tilted downward Config 7.
Camera 1 and 2 looking downward
Structured light is bellow camera one and parallel to the ground Config 8.
Camera 1 and 2 looking downward
Structured light is aligned to camera one and tilted downward FIG.195I
(In all 3d and top views camera 1 is on the right and camera 2 in on the left)
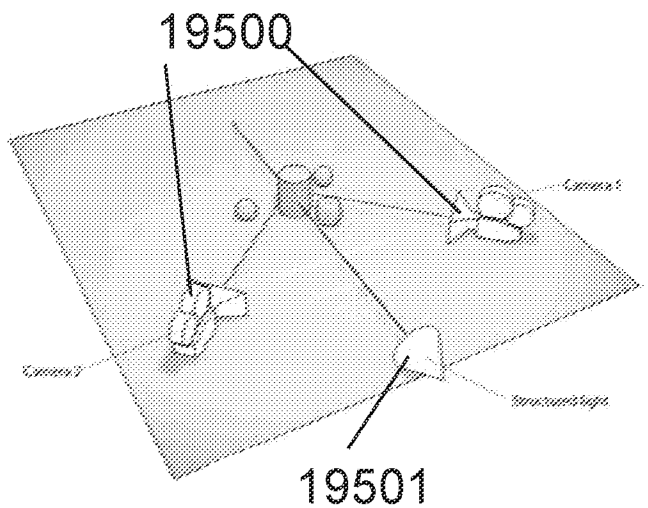
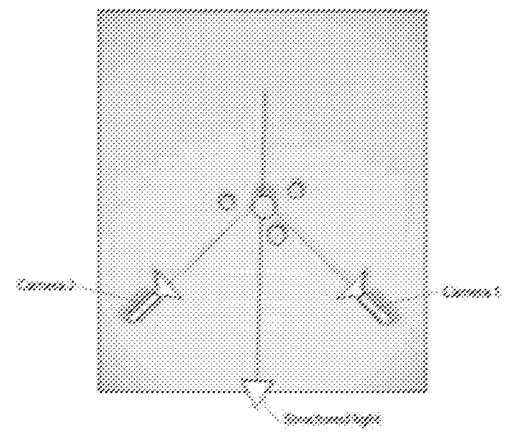

FIG. 196A
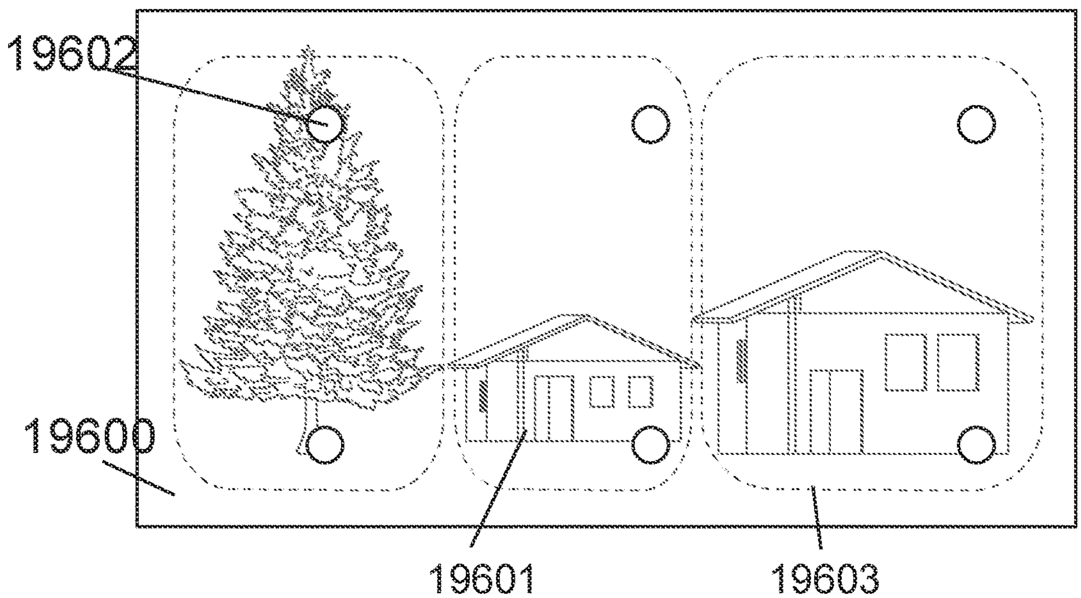
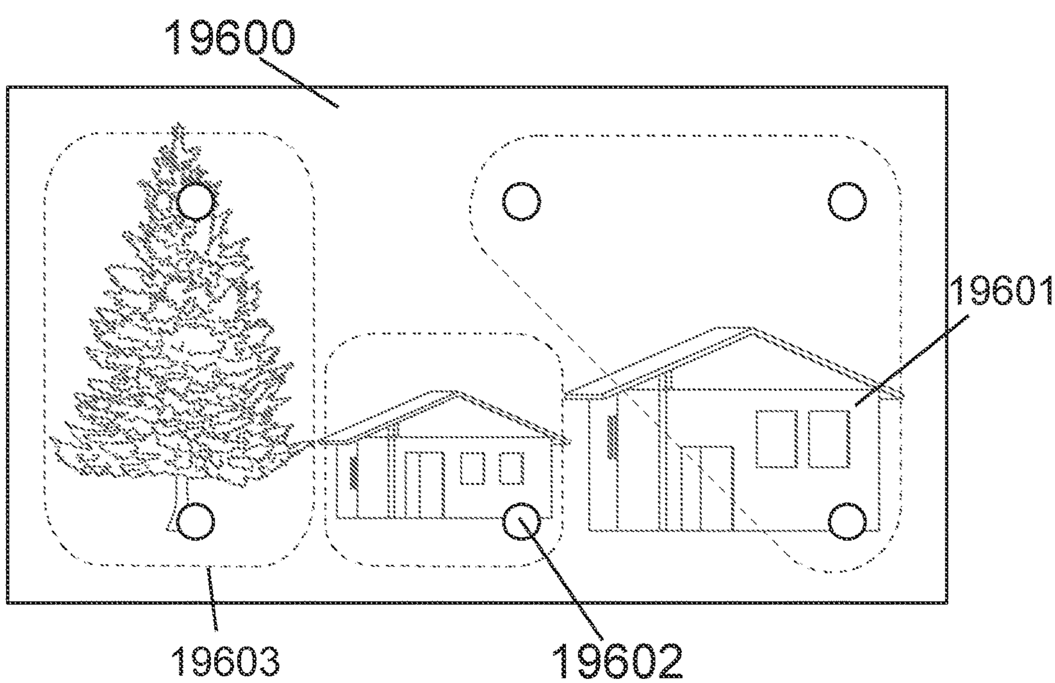

FIG. 197A
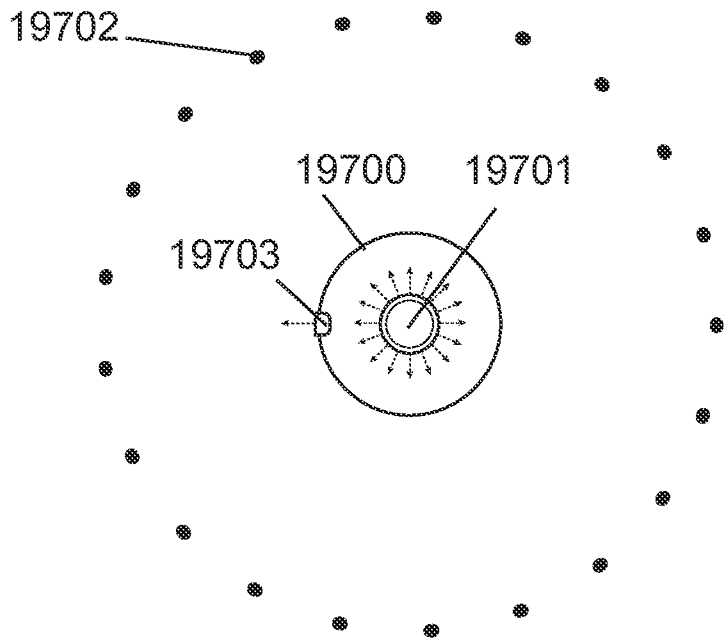
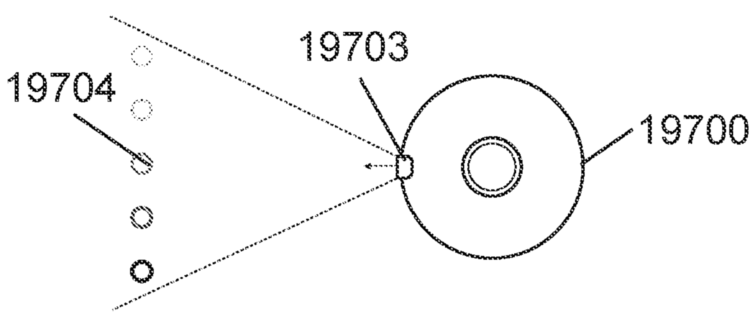
FIG. 197B
FIG. 197C
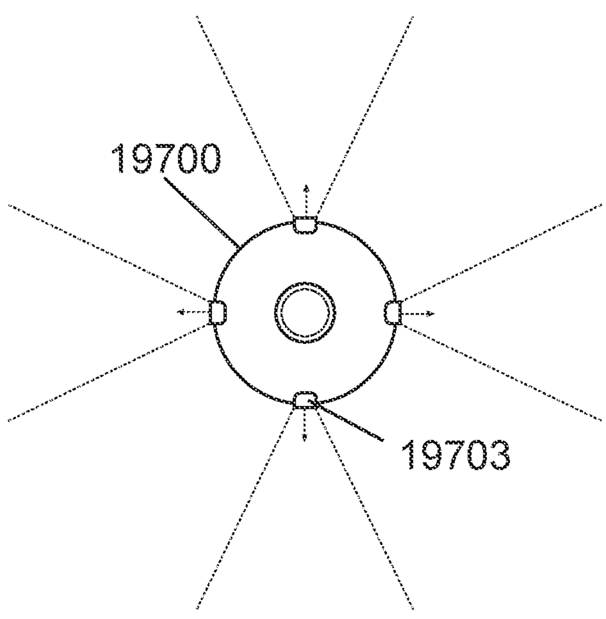

FIG. 214B
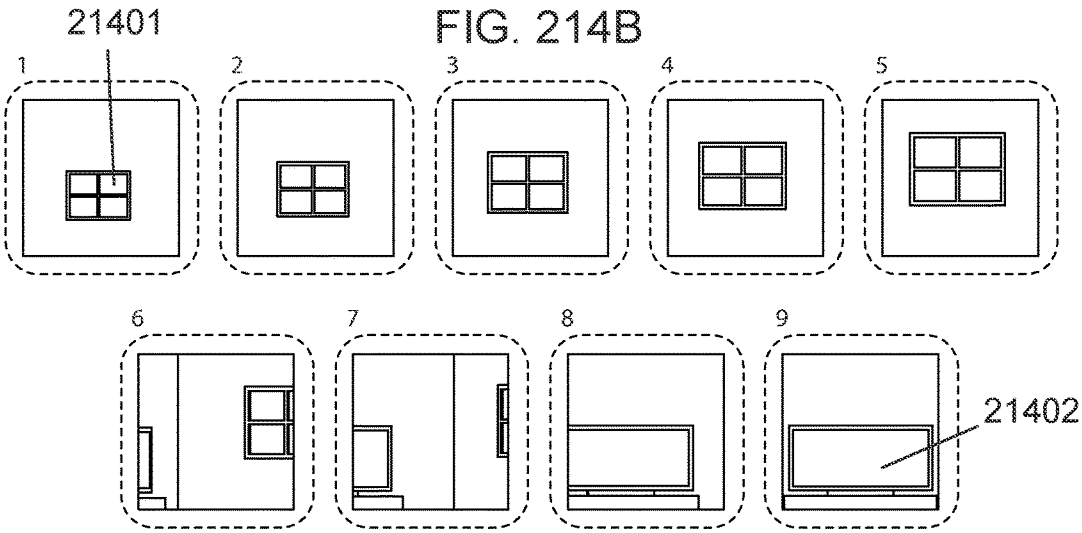
FIG. 214C
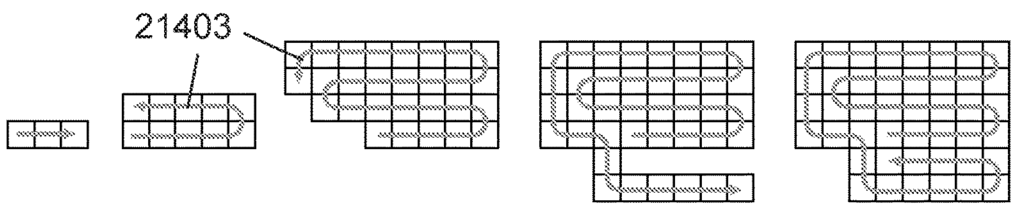
FIG. 215A
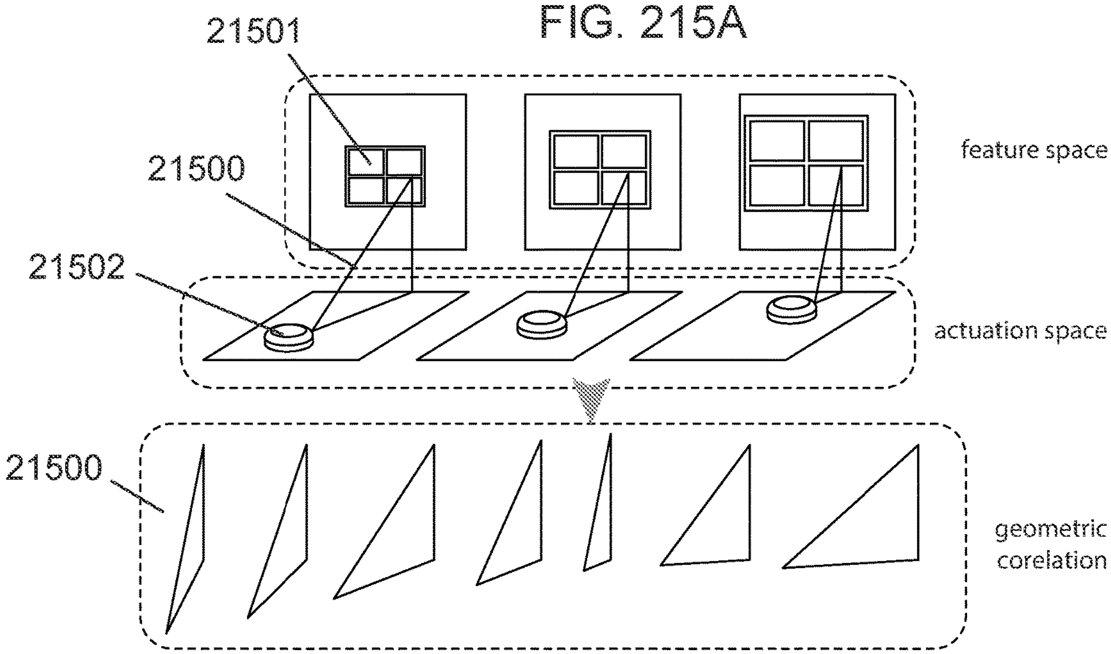
FIG. 215B

Functionality B: Point to point and multipoints navigation

Functionality C: Patrolling

Area mapped by robot in details
with less than 15% of coverage.
*note the chairs and table legs,
angled obstacles, hallways and doors Second pass: Wall following and covering edges.

Not only does the robot avoid map-fences, but "wall-follows" their perimeter

FIG. 248B
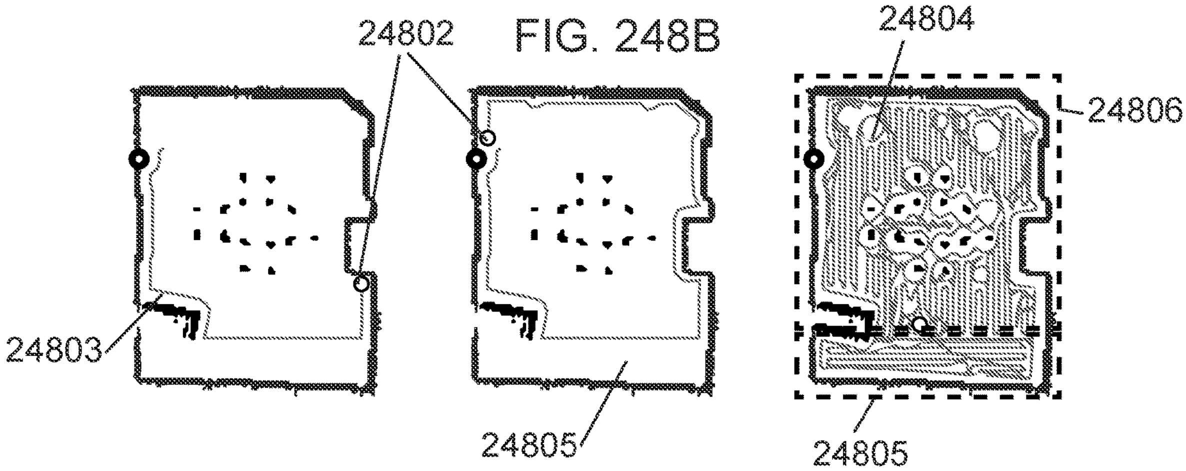
Regular SLAM traces the perimeter before starting to cover the area.
For example in the above run, robot misses a part of the room due to its rigid wall following and area size needed at the beginning.
This will result in a cleaning that is split into two areas shown in the 3rd image above
In comparison our method (below, right) will cover the whole area in one take.
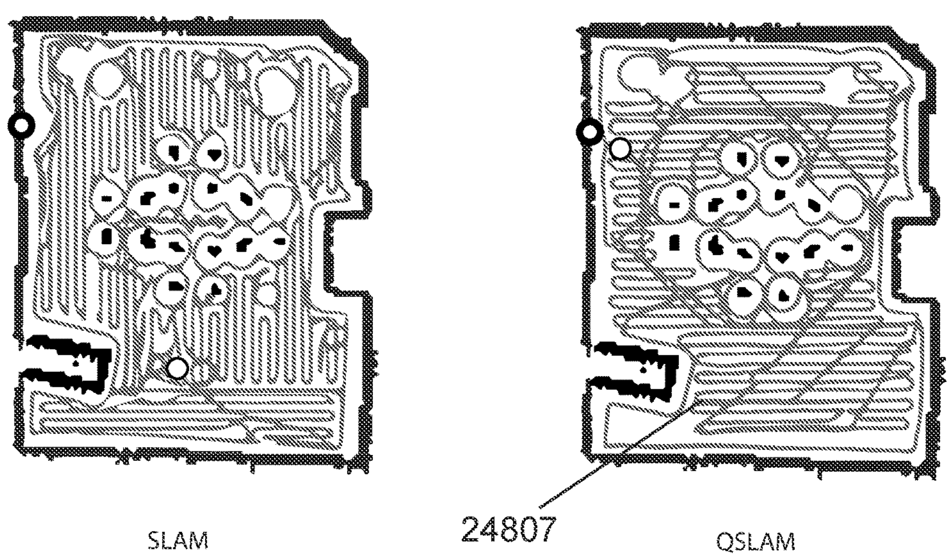

FIG. 248C
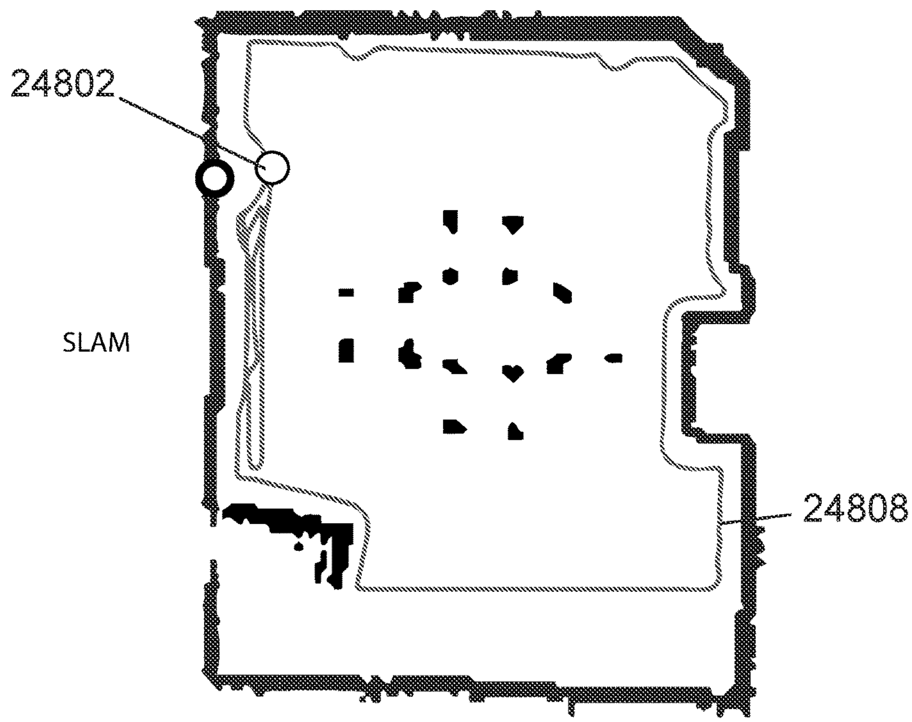
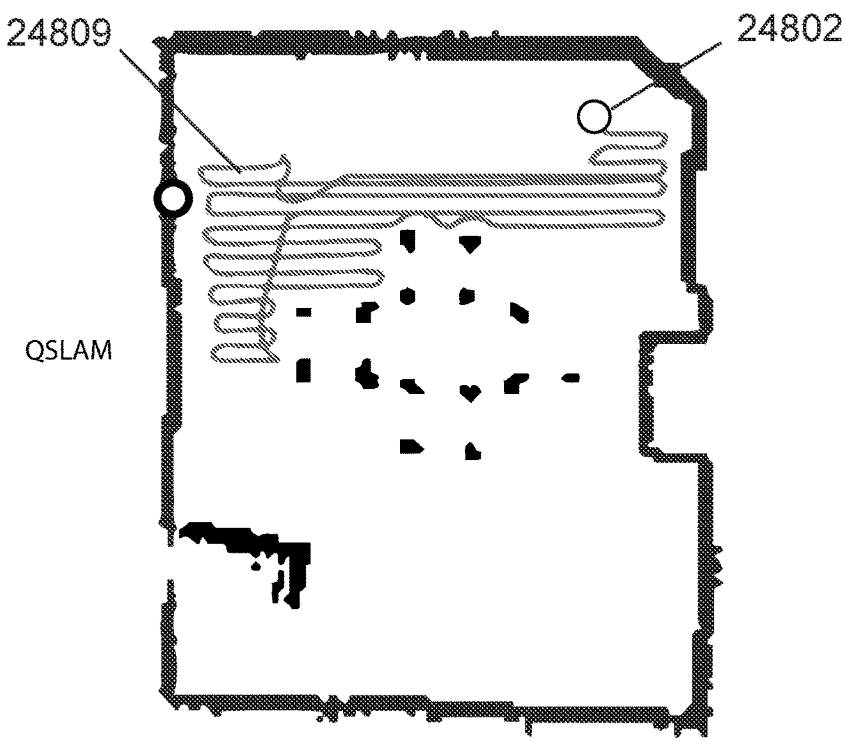
Also this wall following results in late start.
By 3.5 minutes, the current invention can complete a good portion of the room.

Here are the comparison of the two method in 6 runs
which shows QSLAM finishes the job in less amount of time FIG. 248E
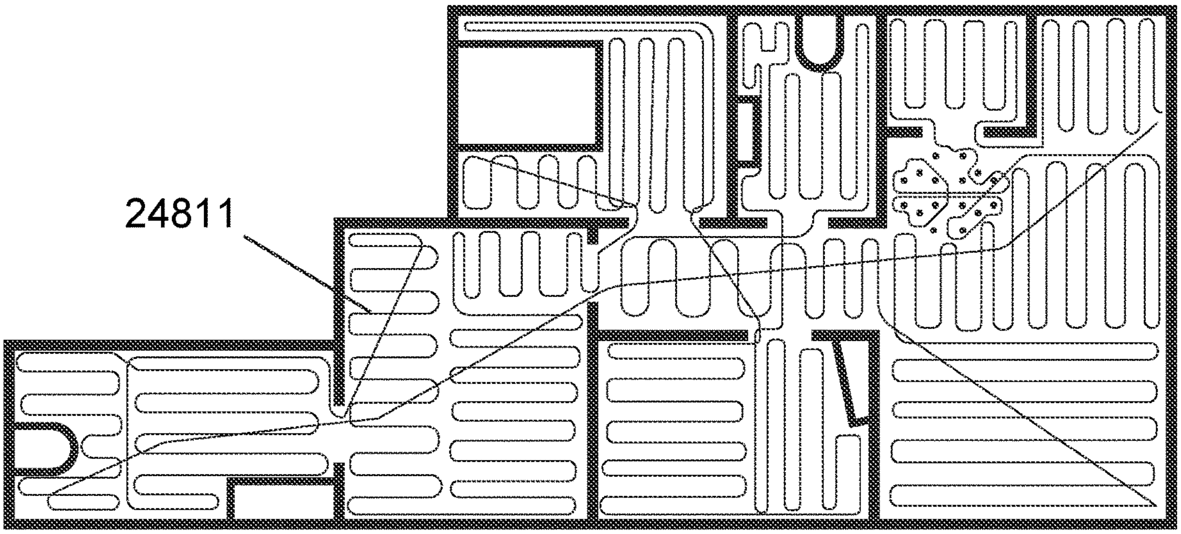
SLAM
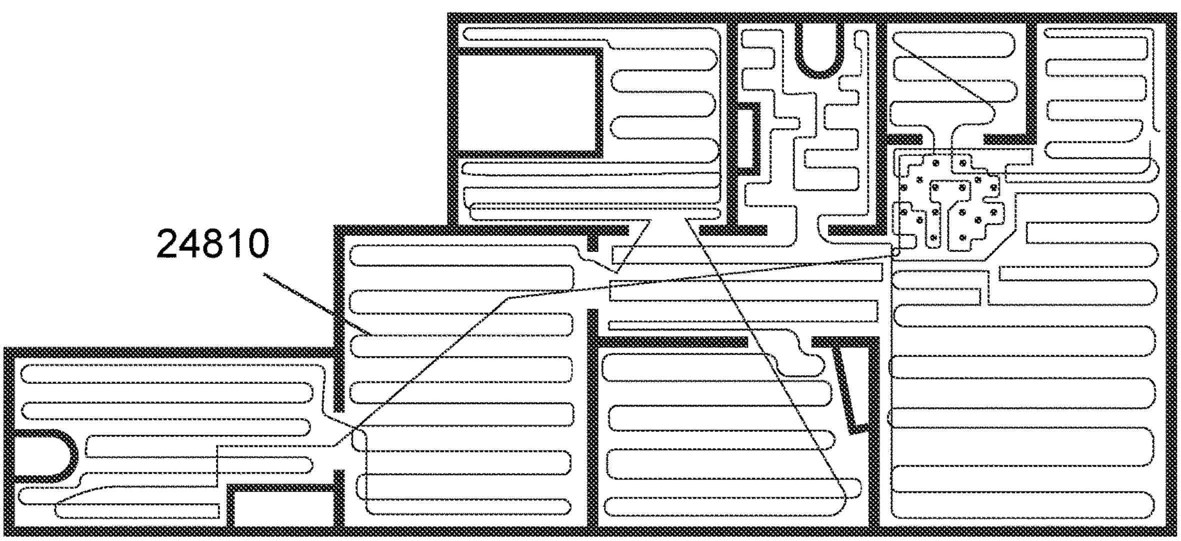
QSLAM
Since our method doesn't rely on rigid area determination,
it can clean each room correctly before going to the next room.

As the robot maps the environment, it recognizes different rooms and separate them by colors it cleans each room entirely before going to the next room Robot may have different perfoming strategies based on each zone
For example a robot vacuum may clean differently in each room

25000

Robot may load different cleaning strategies depending on the room /zone / floor type etc:

1. Mopping for kitchen
2. Steam cleaning for toilet
3. UV for baby room

UV mode goes really really really really slow
basically it has to spend 30 minutes in each square feet 4. Robust coverage under chairs and tables
5. Regular cleaning for the rest of the house.

Robot may sense the presece of people in the room and adjust its performance accordingly. for example it may reduce its noise level or presence around people or rescedule its cleaning time when it sees a crowd FIG. 252E
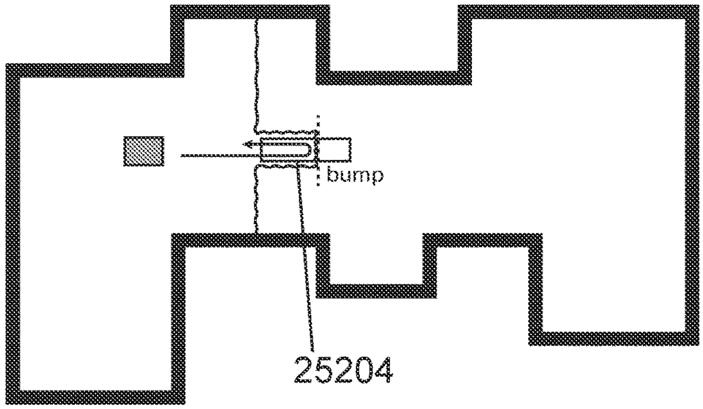
FIG. 252F
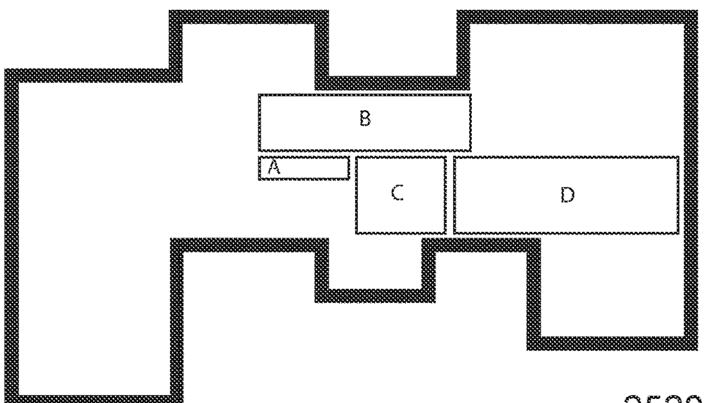
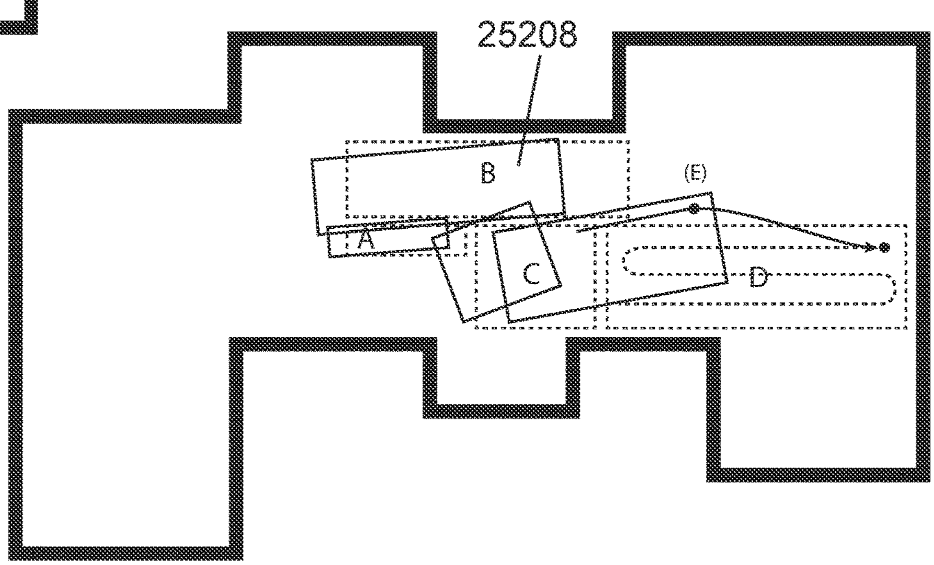
FIG. 252G FIG. 254A
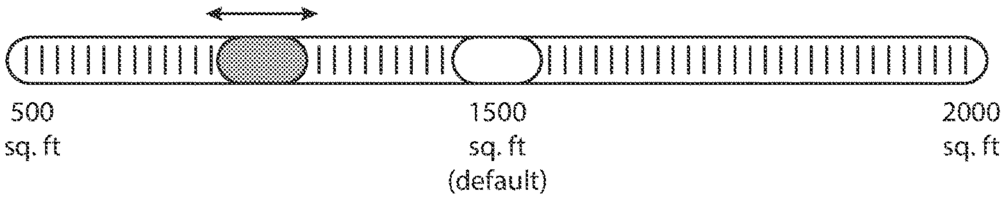
FIG. 254B
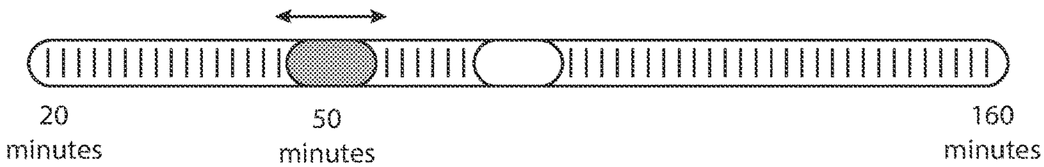
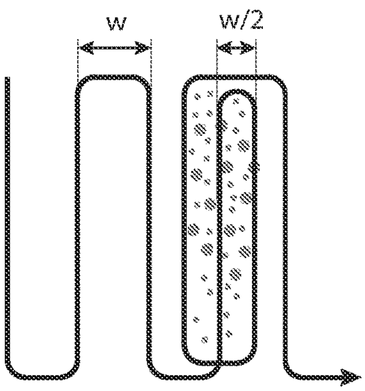
FIG. 255A
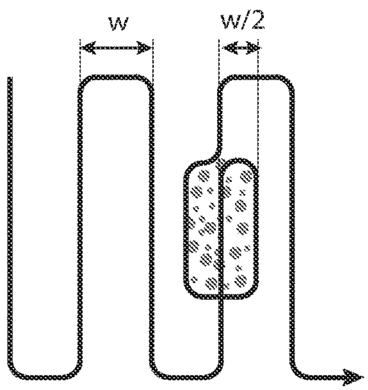
FIG. 255B
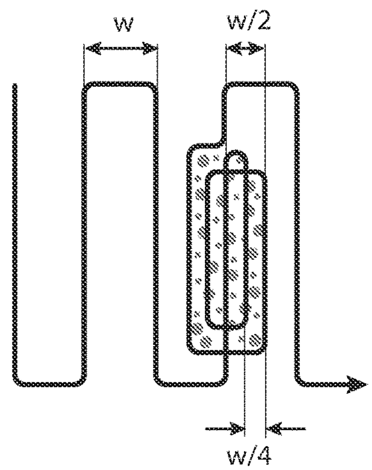
FIG. 255C
FIG. 256
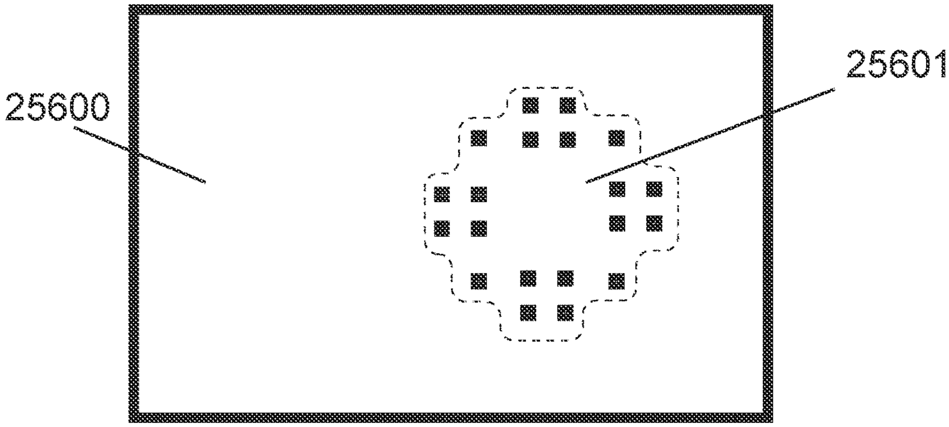

In robot with LIDAR (especially 2D LIDARS), LIDAR component usually will be places on top of the robot which is above the bumper. There will be cover to protect the LIDAR. However, this raised height will cause a vertical blind spot especially on sudden impacts.

In this design we reimagined the LIDAR cover as a secondary bumper to protect the LIDAR FIG. 267C
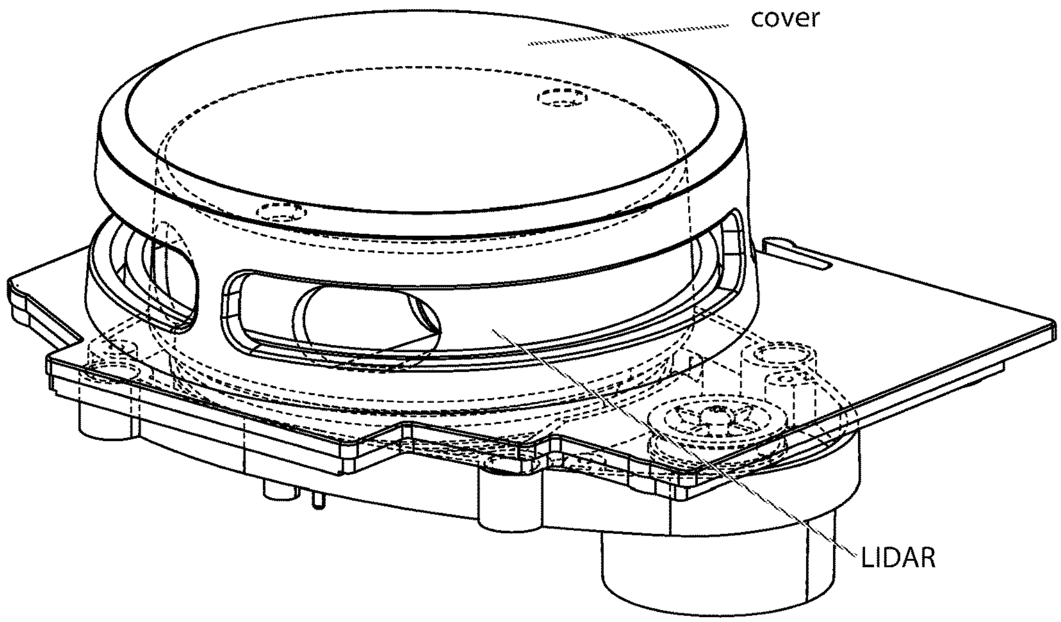
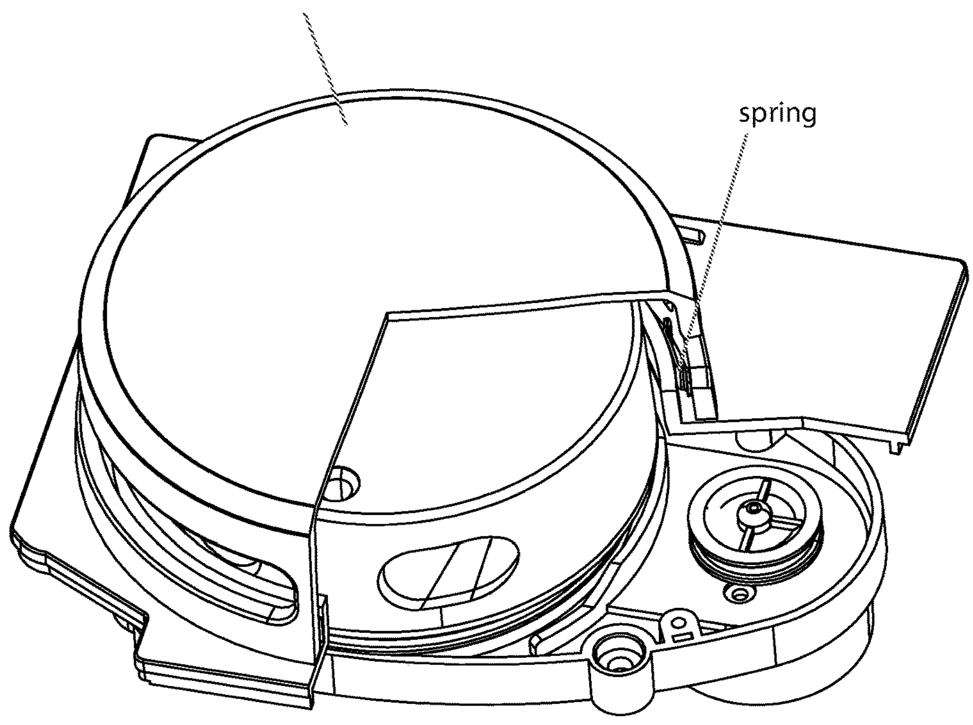
Here LIDAR is consisted of two separat parts with flat springs between them to cover (top) part can move slightly if any force applied to it.

FIG. 267D
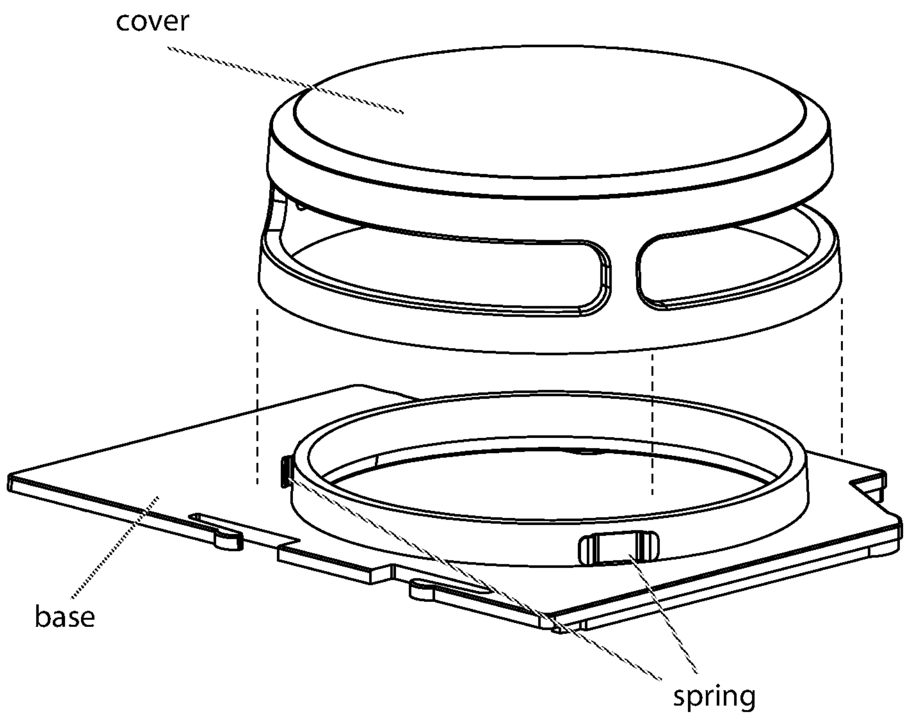
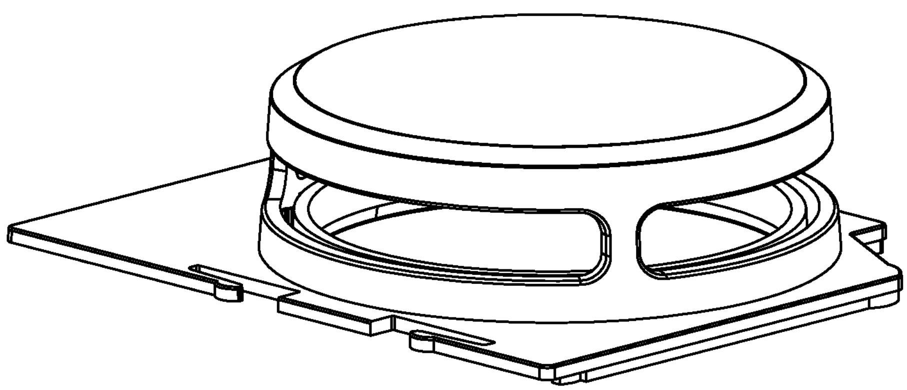

FIG. 267E
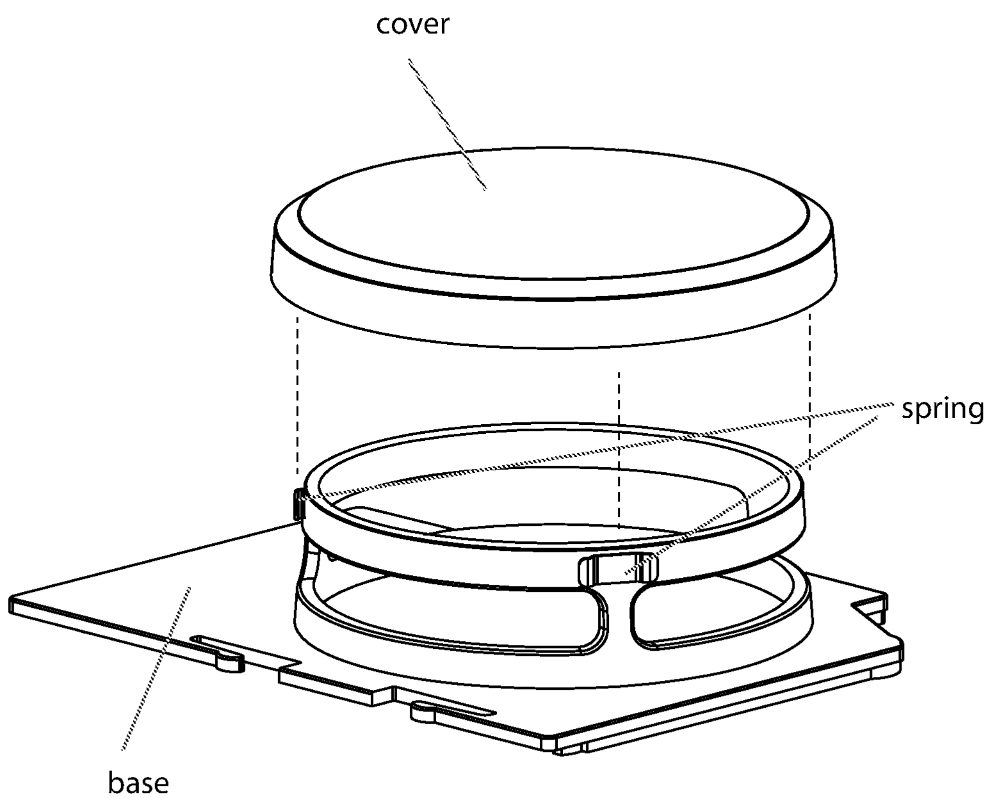
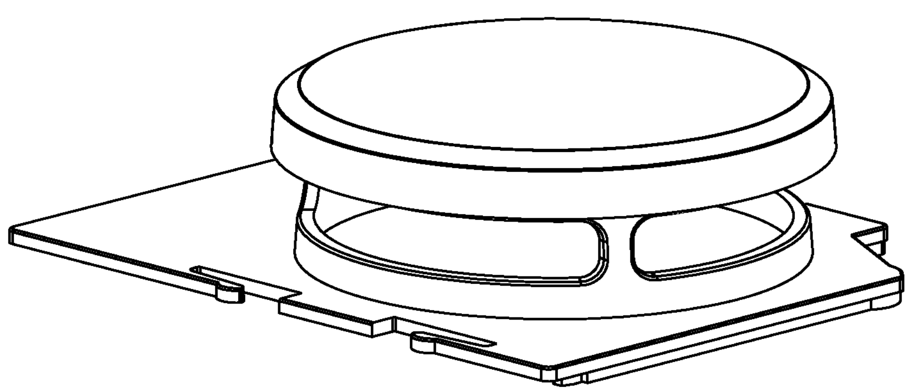

Columns in front of the LIDAR have to be opaque, however there is a freedom on material change on the top part of the cover. Therefore the top part itself can be devided into two parts FIG. 267G
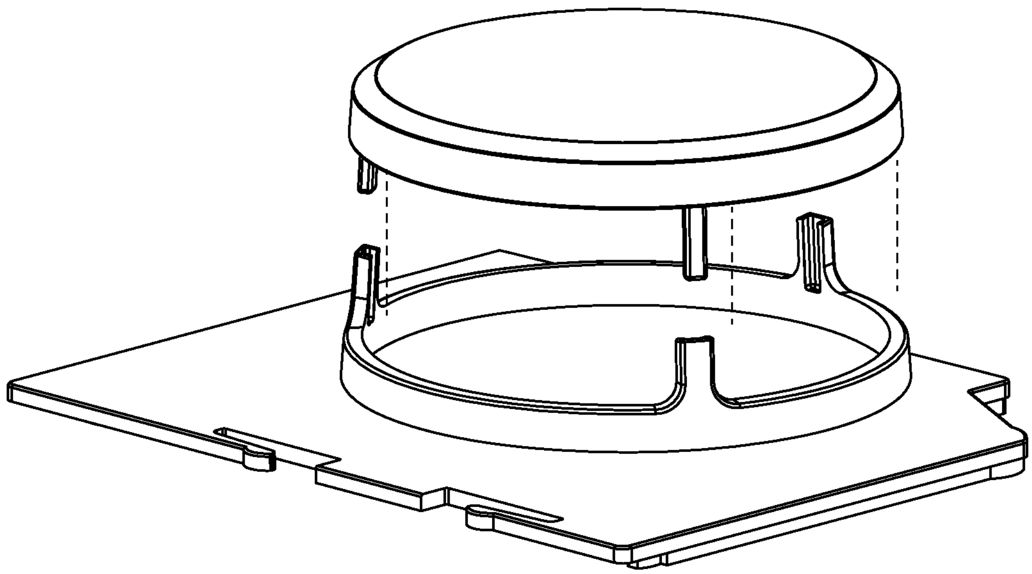
This concept can be applied to both regular LIDAR cover and LIDAR cover as a bumper
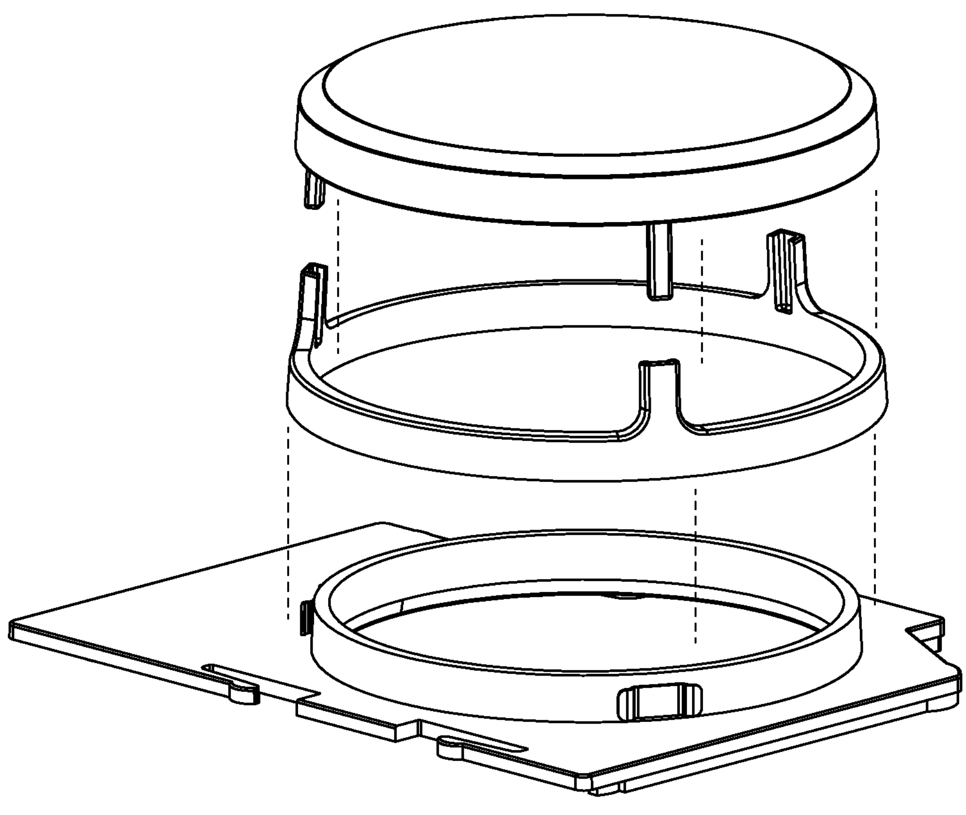

Alternatively we can cover up the columns with sleeves made of opaque material

Another idea is to place the LIDAR - inside - in front of the robot (behind the bumper
and use an opening as wide as the bumper In this method LIDAR field of view will be reduced (it would be something between 180 to 270 degrees depending of the placement and shape of the robot).. which works fine with QSLAM FIG. 280A
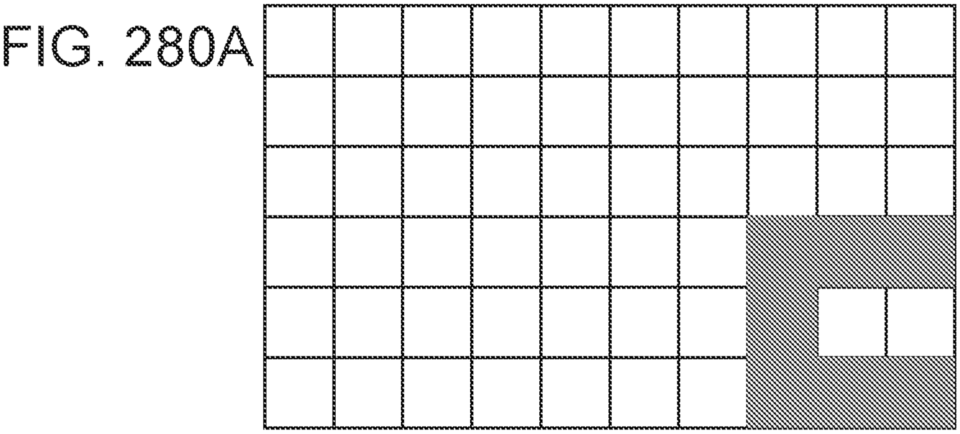
FIG. 280B
```
P2
10 6
255
0  0  0  0  0  0  0  0  0  0
0  0  0  0  0  0  0  0  0  0
0  0  0  0  0  0  0  0  0  0
0  0  0  0  0  0  0  99  99 99
0  0  0  0  0  0  0  99  0  0
0  0  0  0  0  0  0  99 99 99

# XYZ
```
FIG. 280C
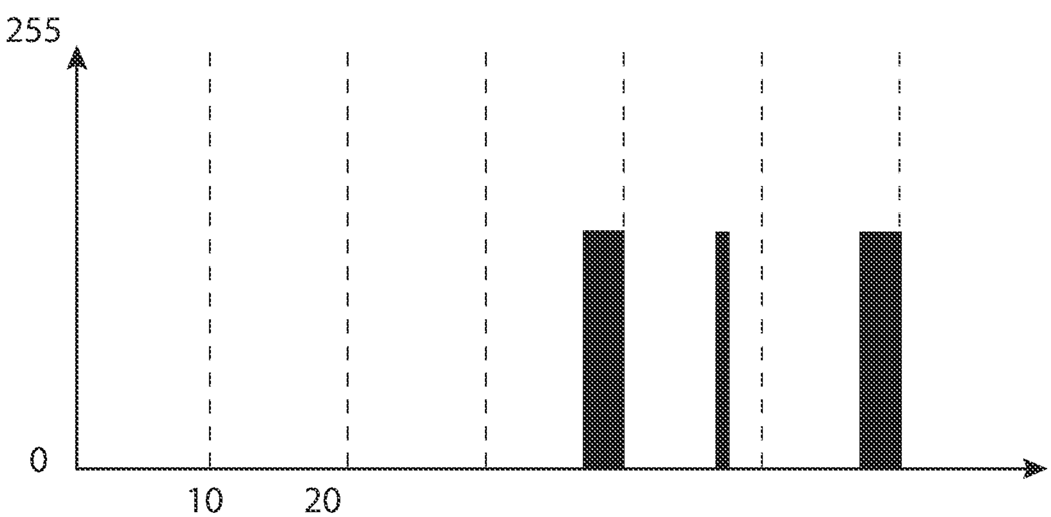

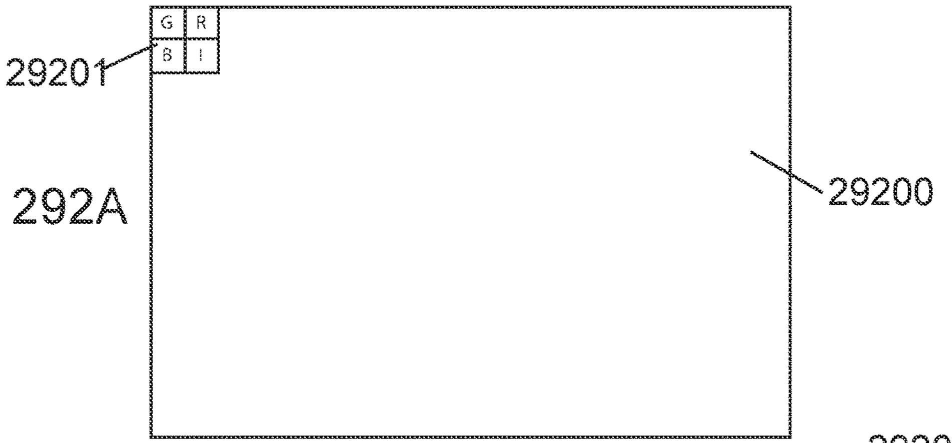
FIG. 292A
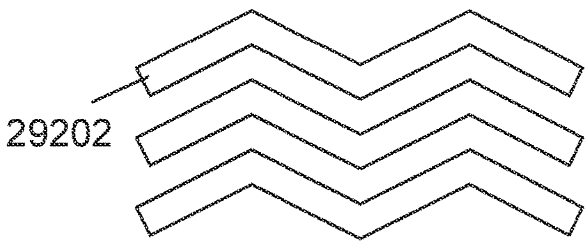
FIG. 292B
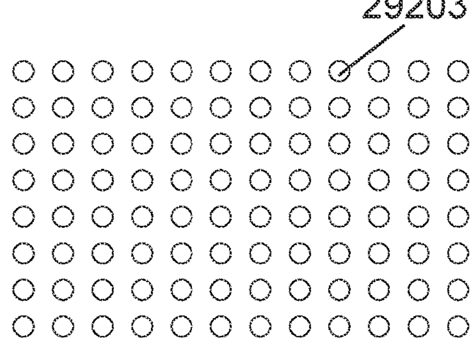
FIG. 292C
FIG. 292D
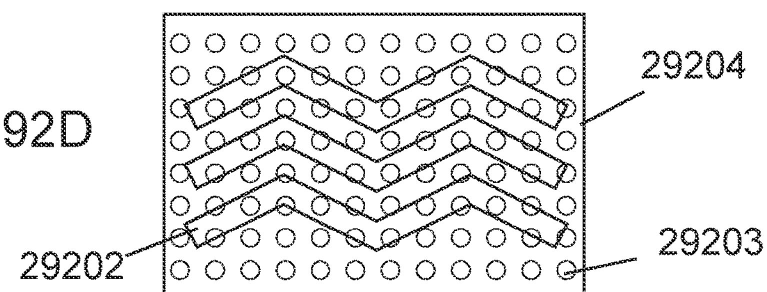
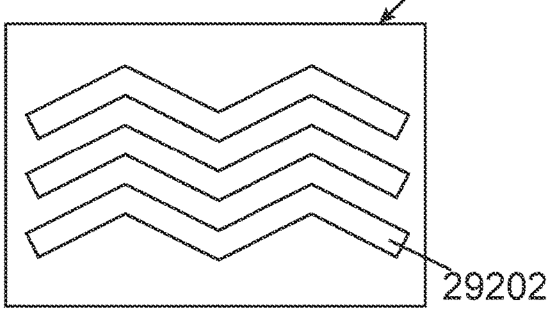
FIG. 292E
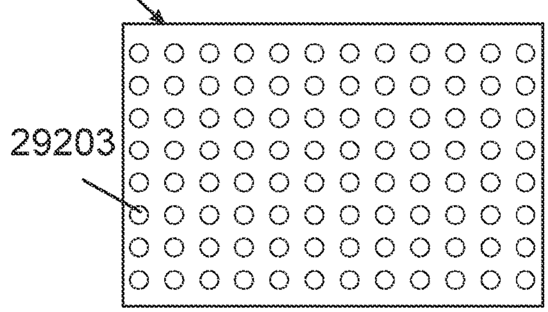
FIG. 292F FIG. 293A
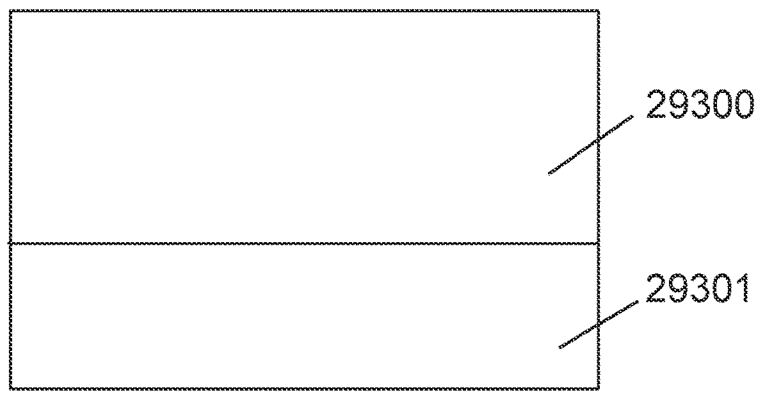
FIG. 293B
FIG. 293C
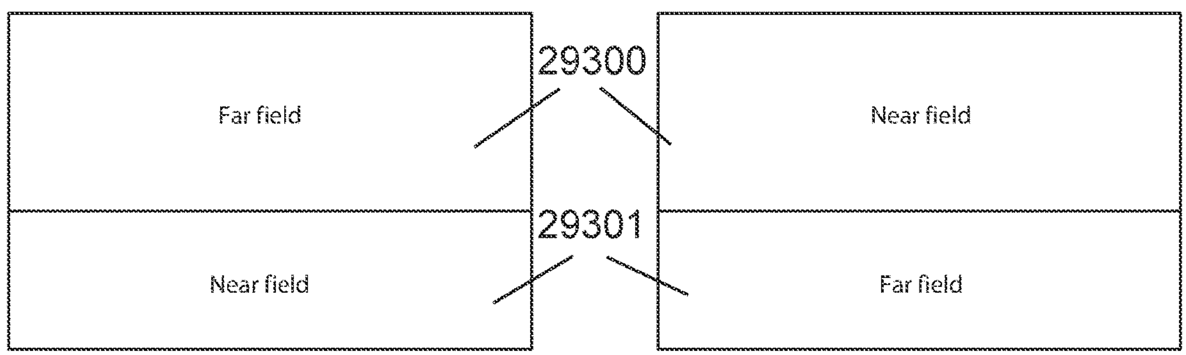
FIG. 294A
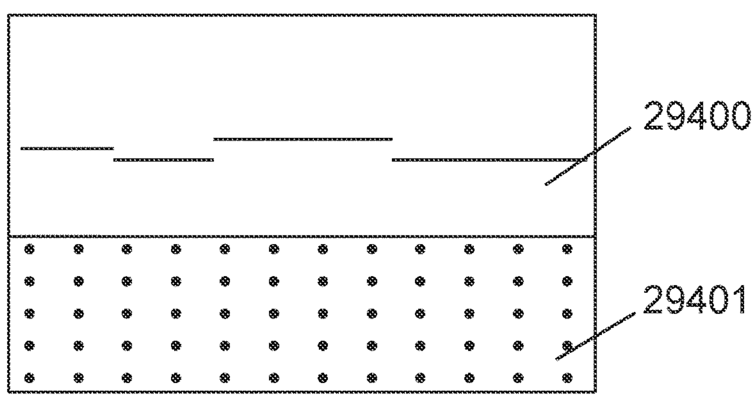

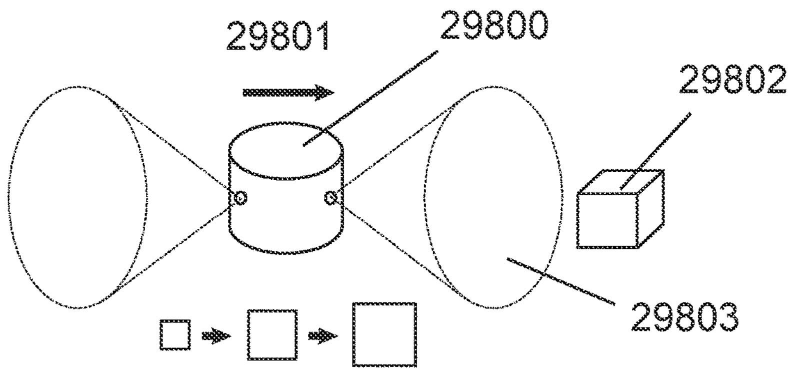
FIG. 298A
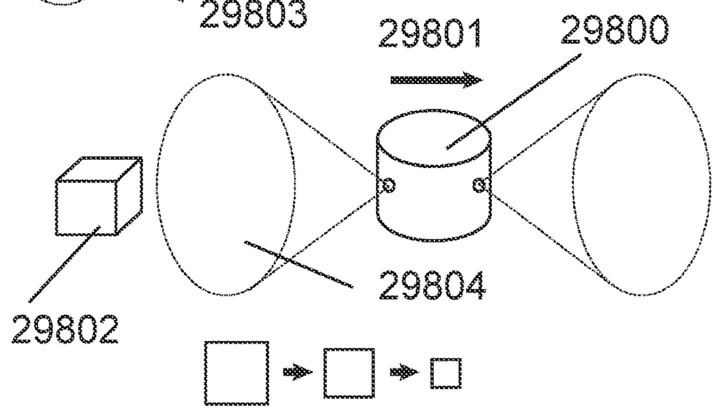
FIG. 298B
FIG. 299A
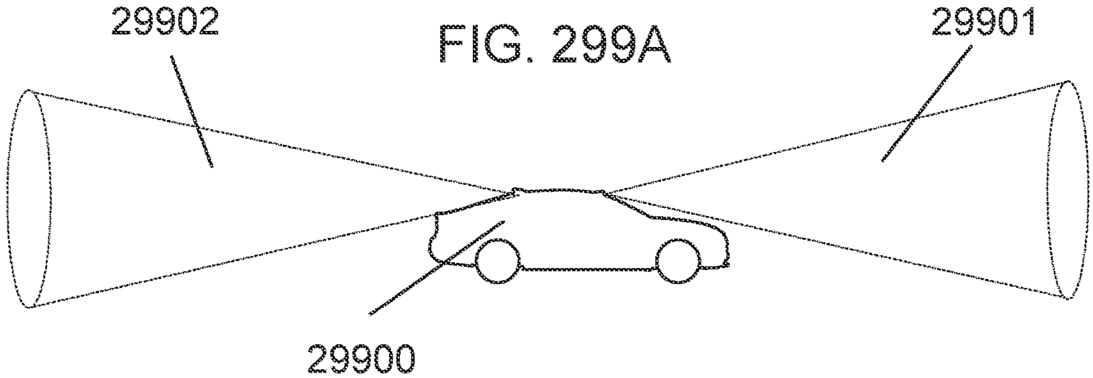
FIG. 299B
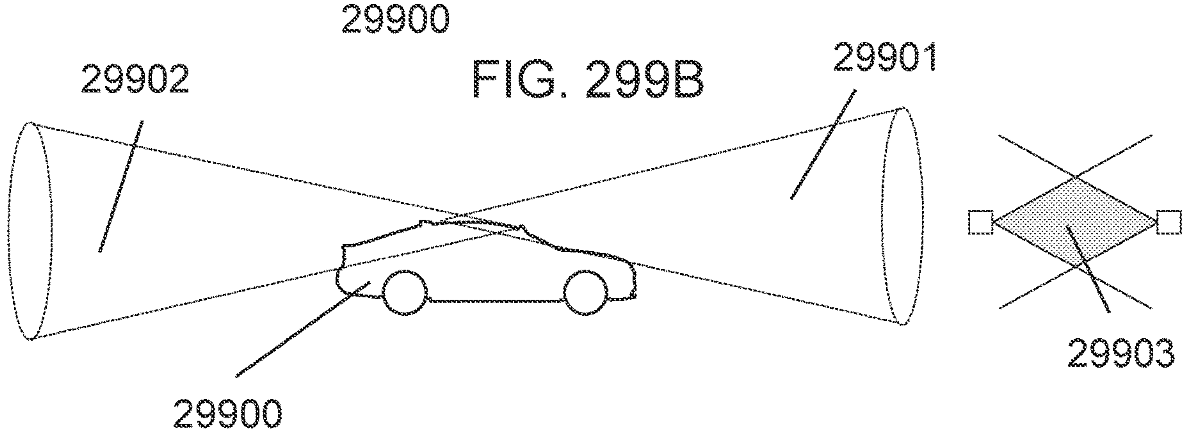

FIG. 307
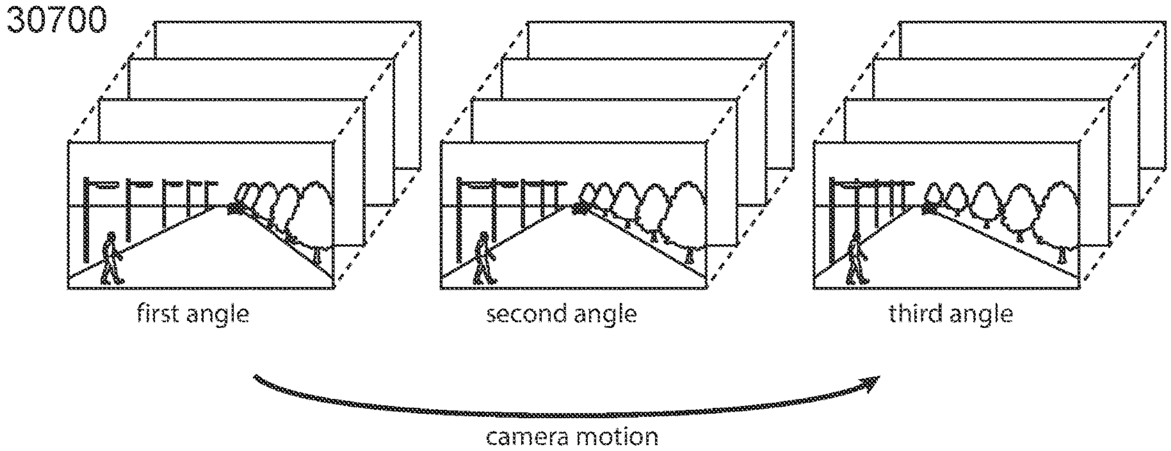
FIG. 308
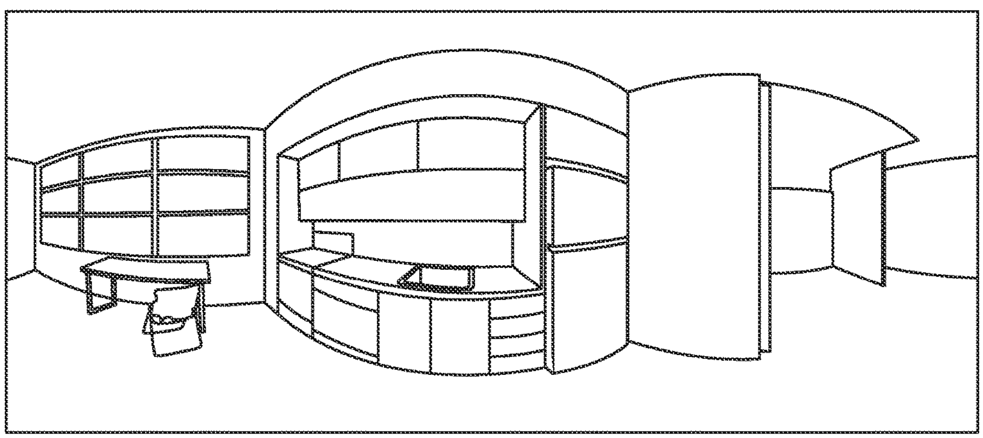
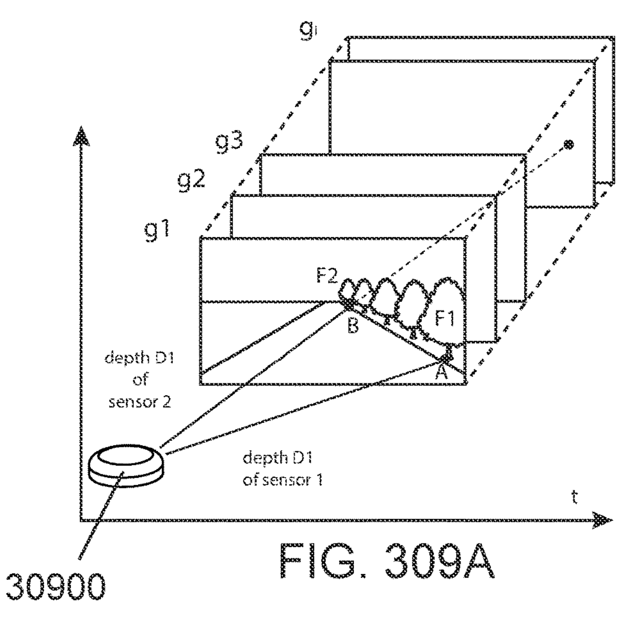
FIG. 309A
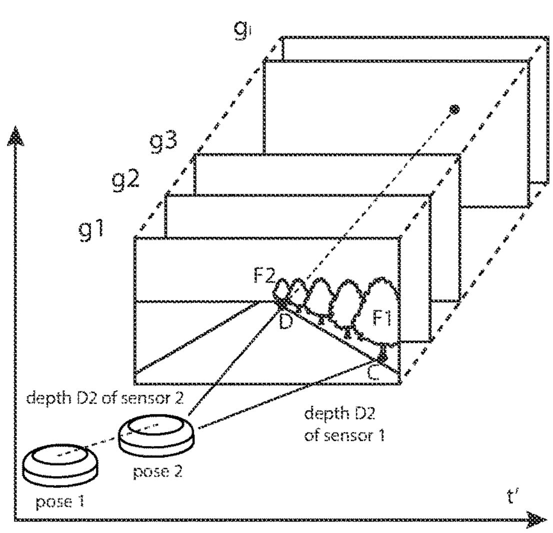
FIG. 309B FIG. 310A
| | | |
|---|---|---|
| g1 | %90 | 1 to 3 m |
| g2 | %9 | 3 to 5 m |
| g3 | % 0.08 | 5 to 7 m |
| g4 | % 0.15 | 7 to 9 m |
| g5 | % 0.05 | 9 to 11 m |
FIG. 310B
| | | |
|---|---|---|
| | | |
| | | |
| | | |
| g4 | % 9 | 7 to 9 m |
| g5 | % 90 | 9 to 11 m |
FIG. 311
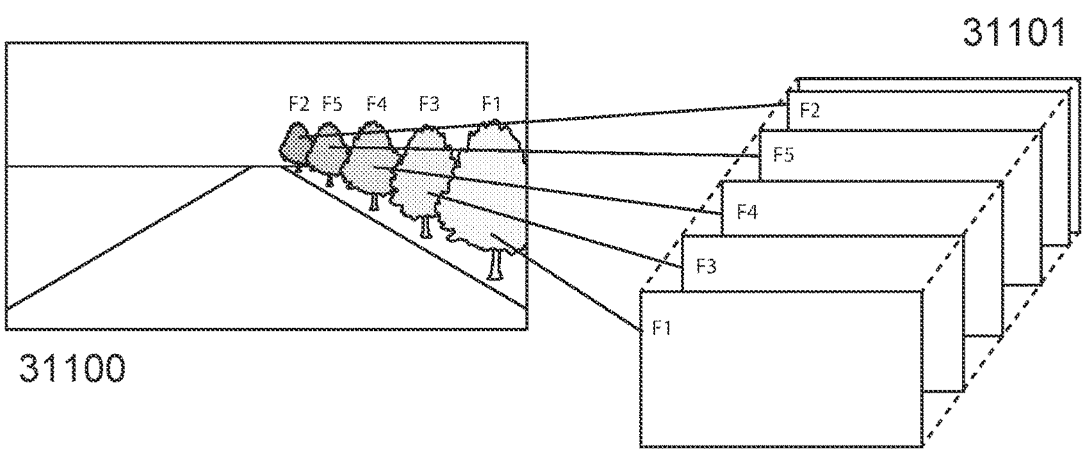
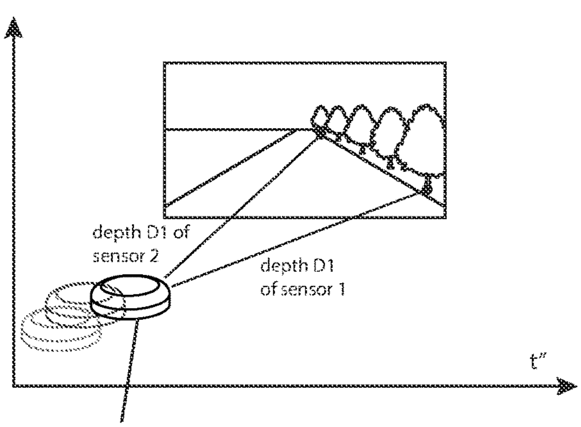
FIG. 312A
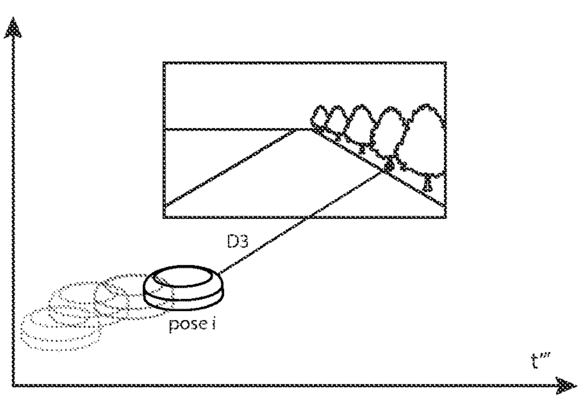
FIG. 312B FIG. 319A
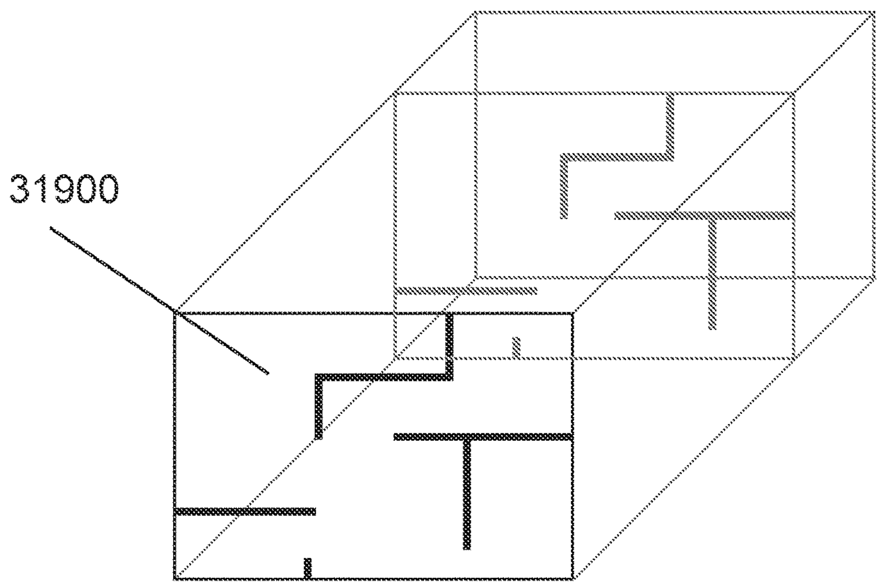
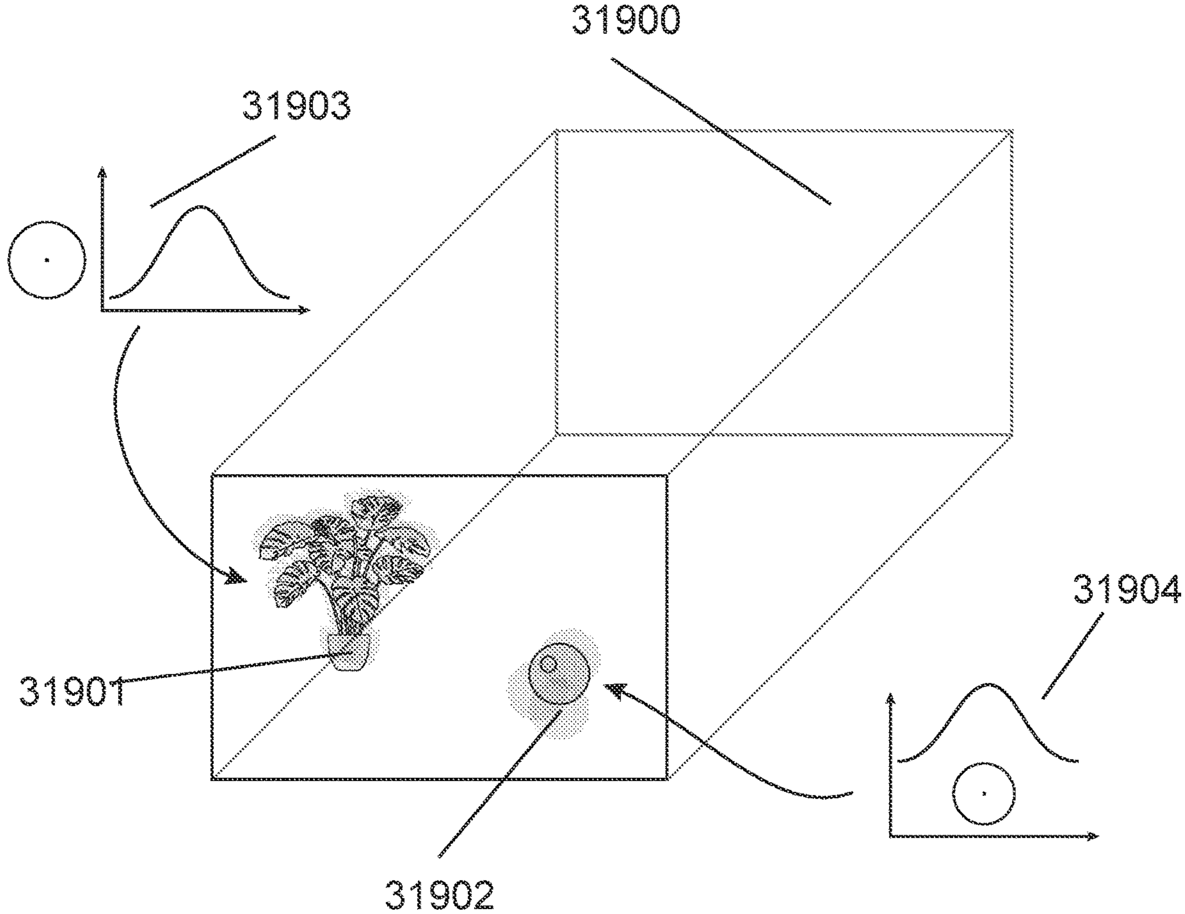

FIG. 319B
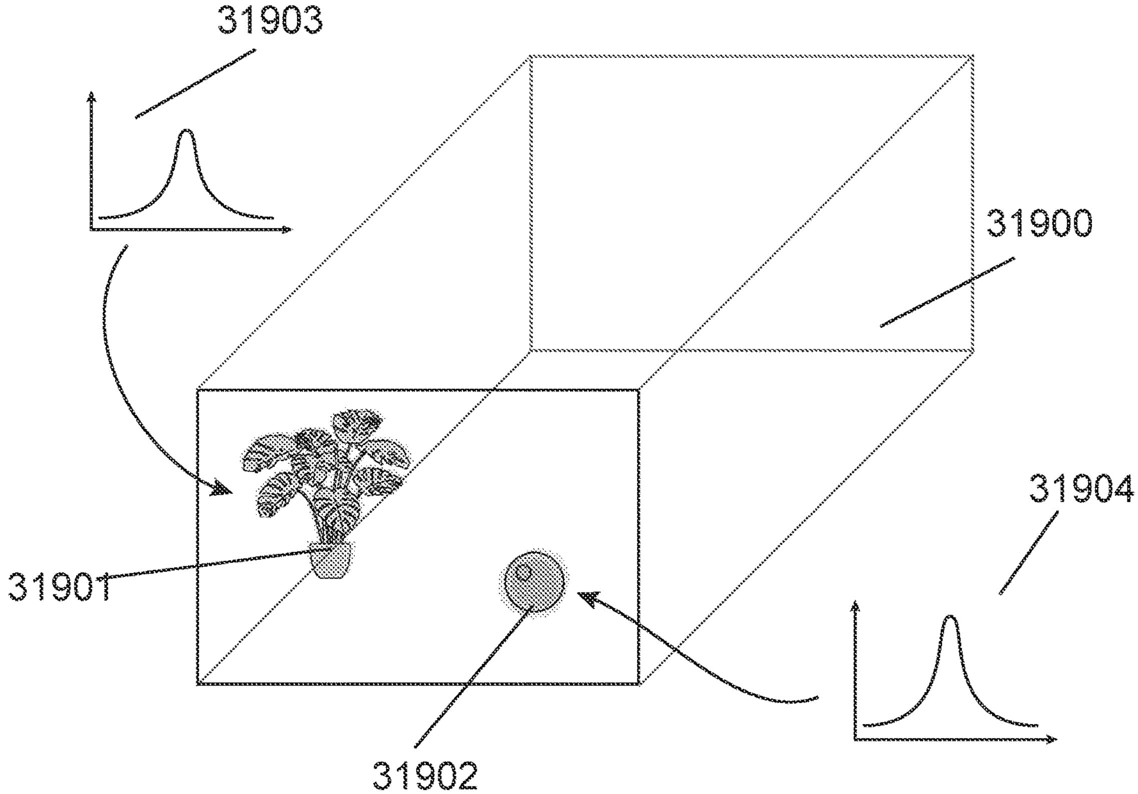
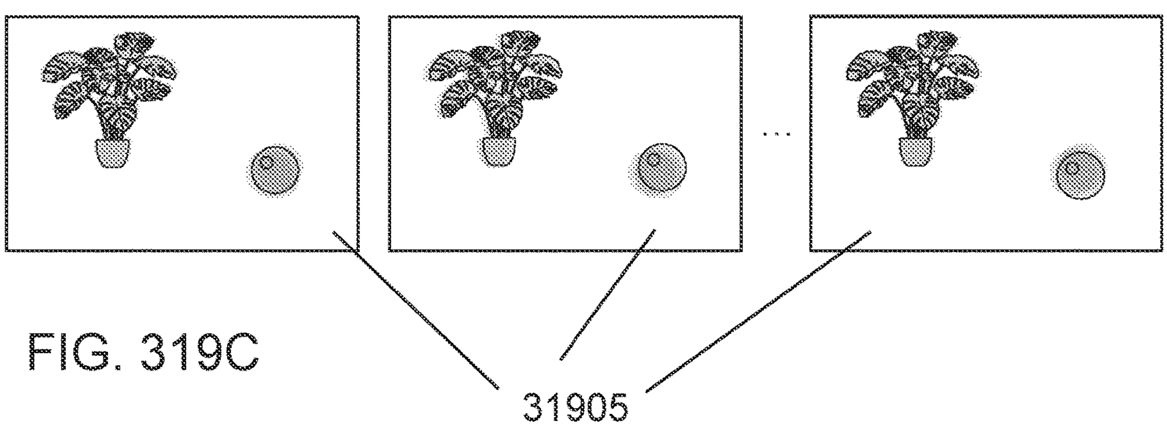
FIG. 319C

FIG. 326
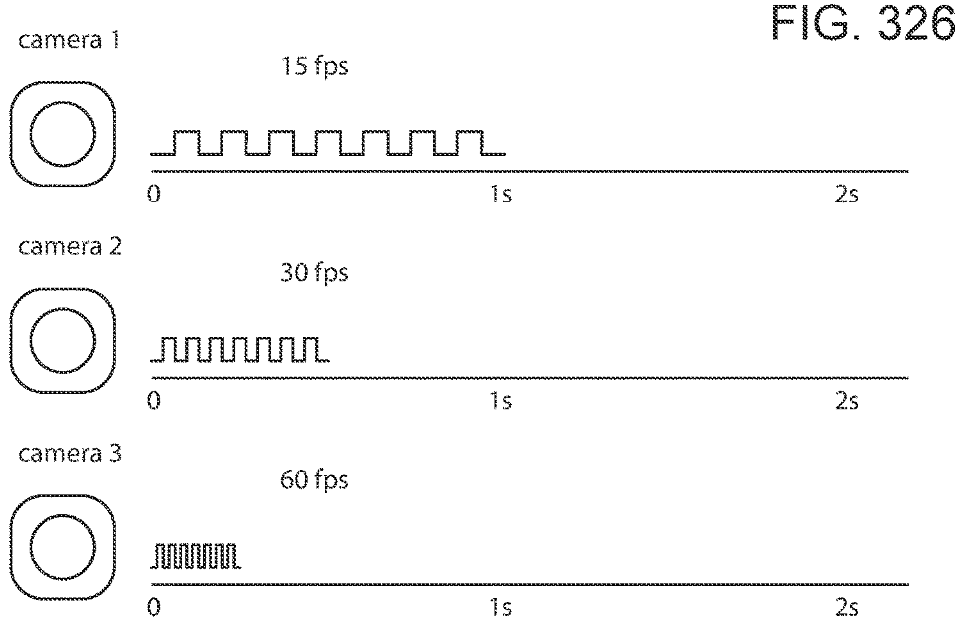
FIG. 328
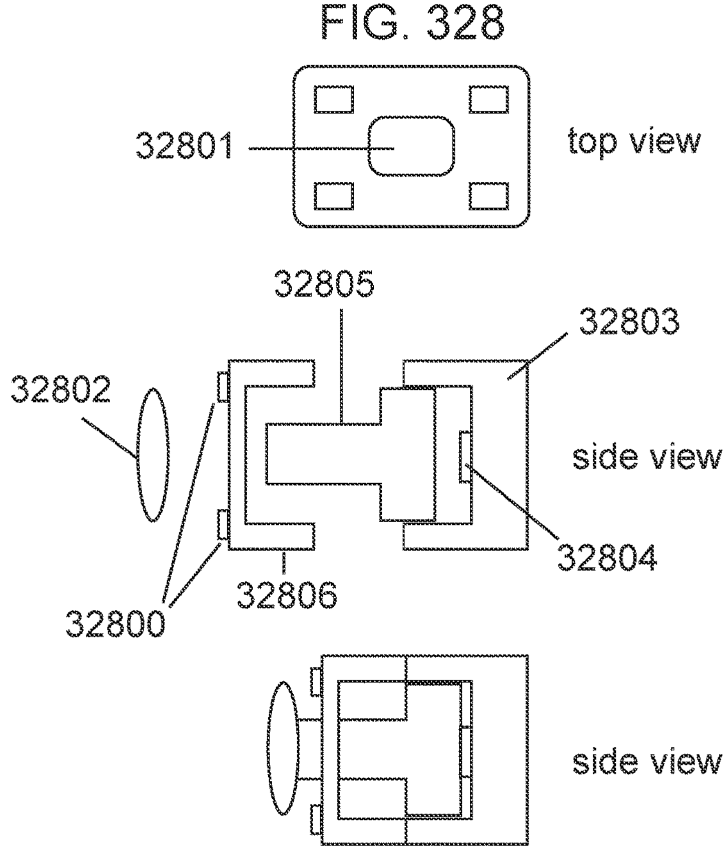
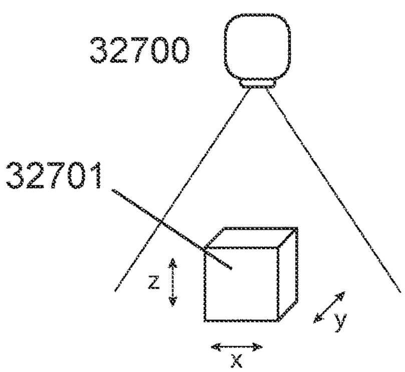
FIG. 327

| | measured | inferred | conÿdence | score of conÿdence |
|---|---|---|---|---|
| P1 | 100 | | High | 98% |
| P2 | 95 | | High | 98% |
| P3 | 80 | | High | 98% |
| P4 | 85 | | High | 98% |
| Region 1 | | 80 to 85 | | 65% |
| Region 2 | | 85 to 95 | | 55% |
| Region 3 | | 95 to 100 | | 60% |
| Region 4 | | 95 to 100 | | 55% |

FIG. 334

| | measured | inferred | score of conÿdence |
|---|---|---|---|
| P1 | 98 | | 94% |
| P2 | 93 | | 94% |
| P3 | 78 | | 94% |
| P4 | 83 | | 94% |
| P1 | 93 (because of TV) | | 98% |
| P2 | ... | | 98% |
| P3 | ... | | 98% |
| P4 | ... | | 98% |
| Region 1 | | 78 to 83 | We have now 3 points reading 2 from previous time stamps & 1 from the current time stamp so we can say more about this region |
| Region 2 | | 83 to 93 | We have now 1 reading in this area |
| Region 3 | | 93 to 98 | We have now 2 readings from previos time stamp which are still "good" conÿdence & 1 new reading with "excellent" conÿdence |
| Region 4 | | 93 to 98 | We have now 1 good reading |

FIG. 335

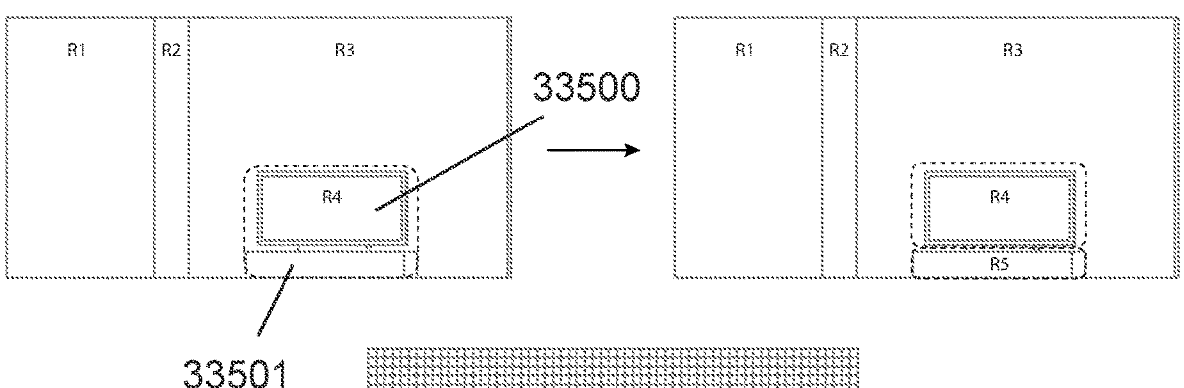

FIG. 336

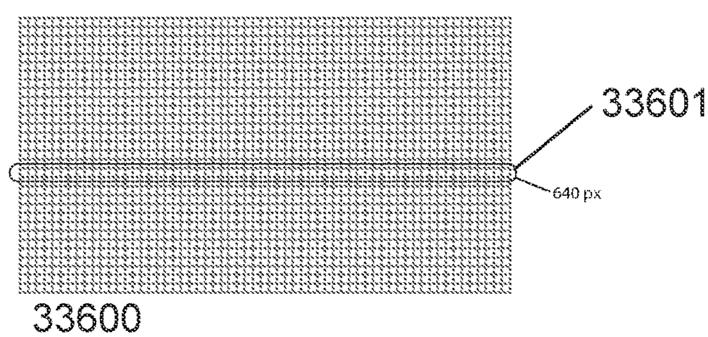

FIG. 346A
FIG. 346B
FIG. 346C
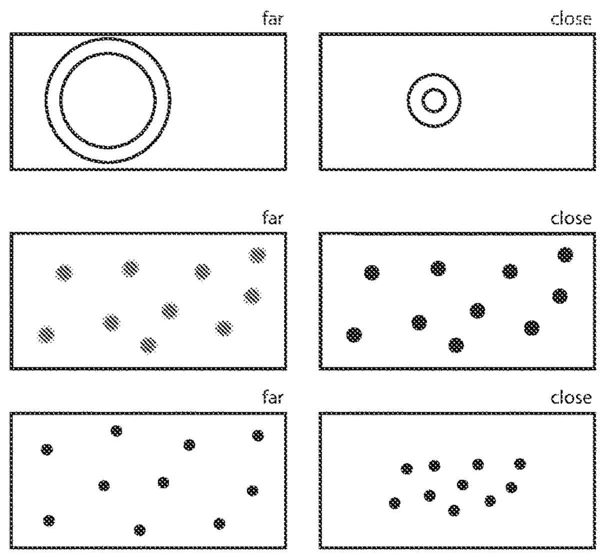
FIG. 347
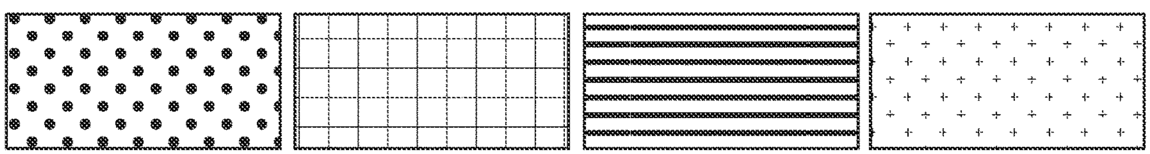
FIG. 348
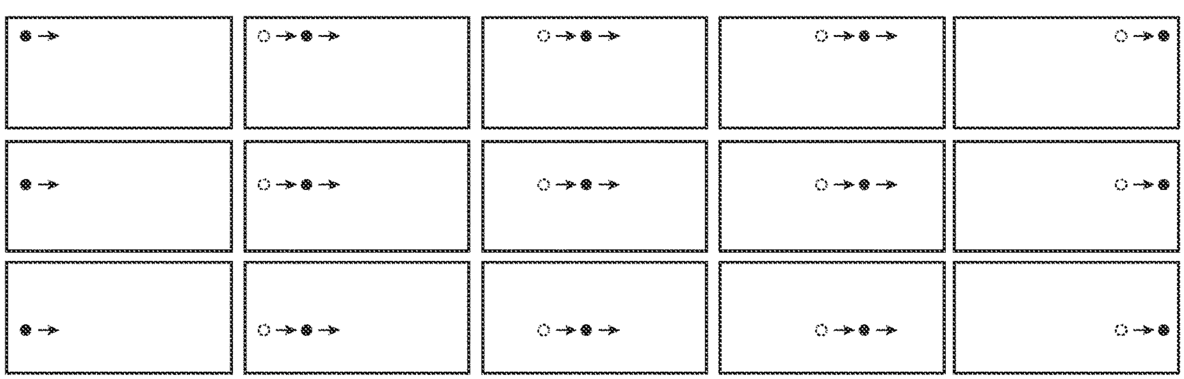

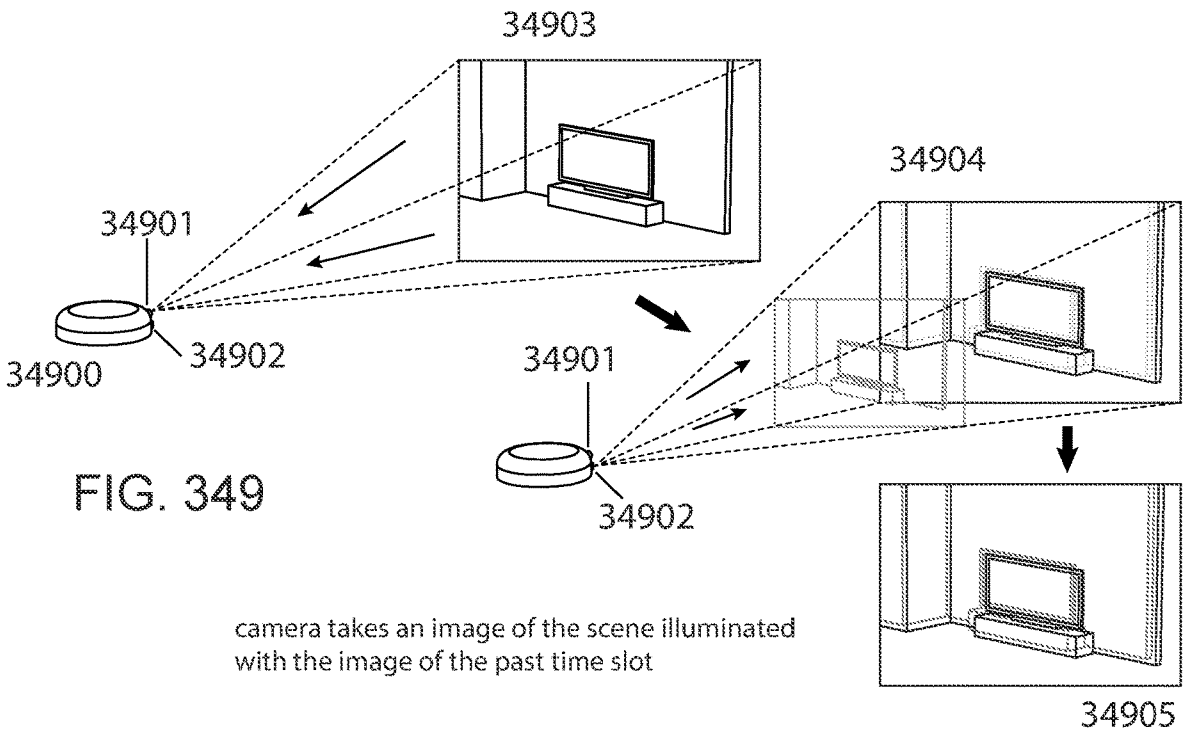
FIG. 349
FIG. 350
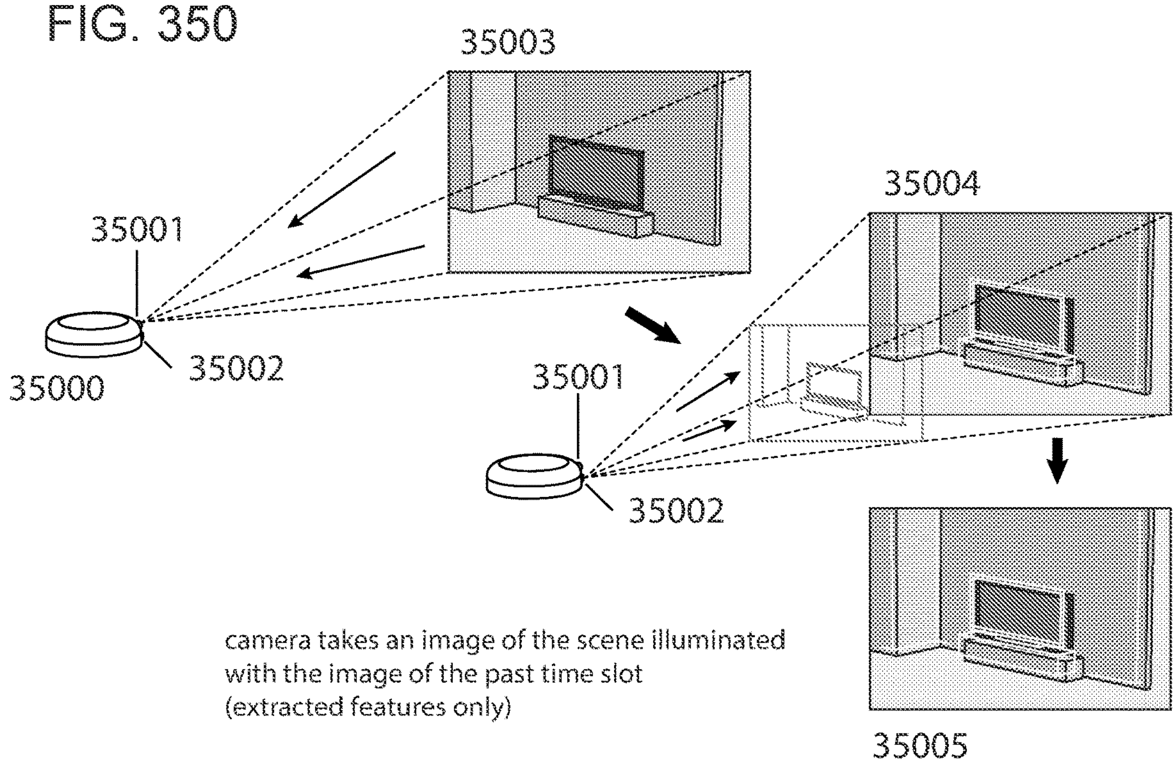

FIG. 357A
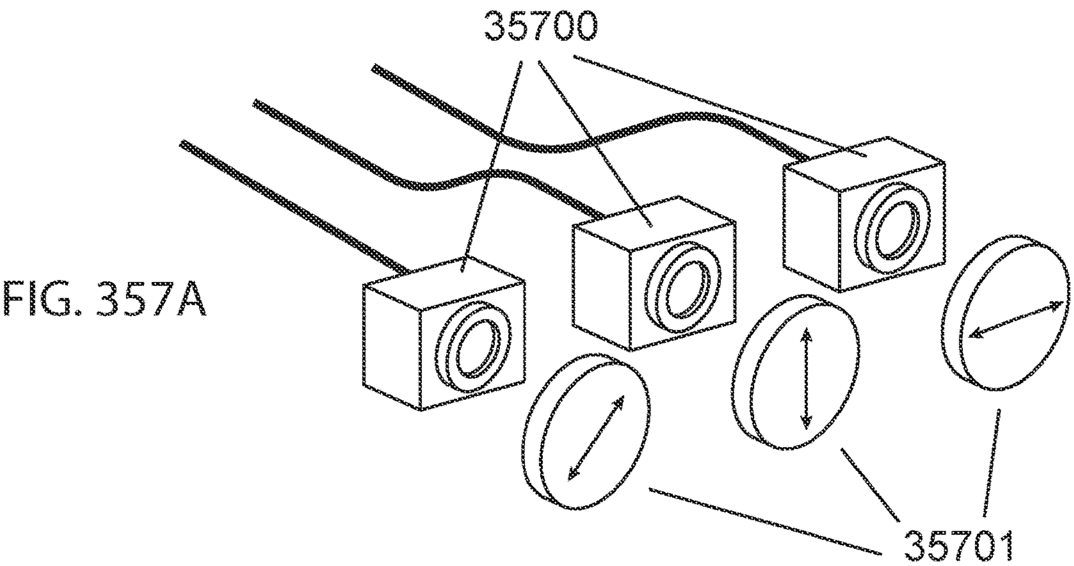
FIG. 357B
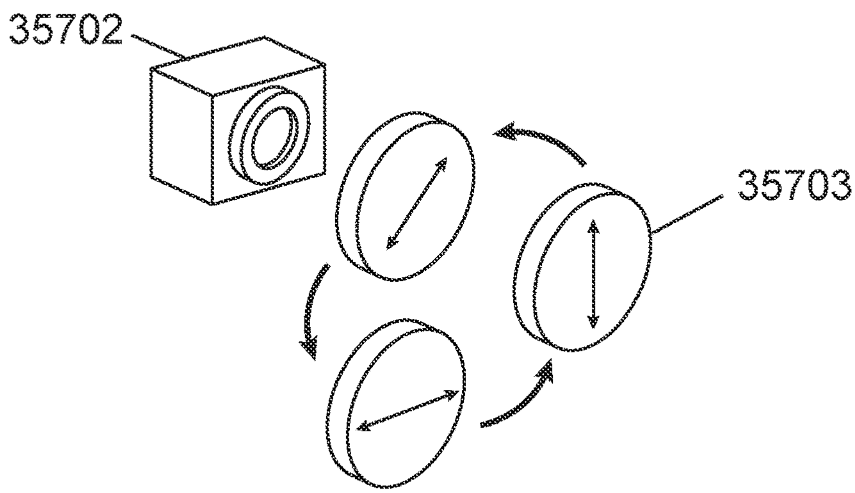
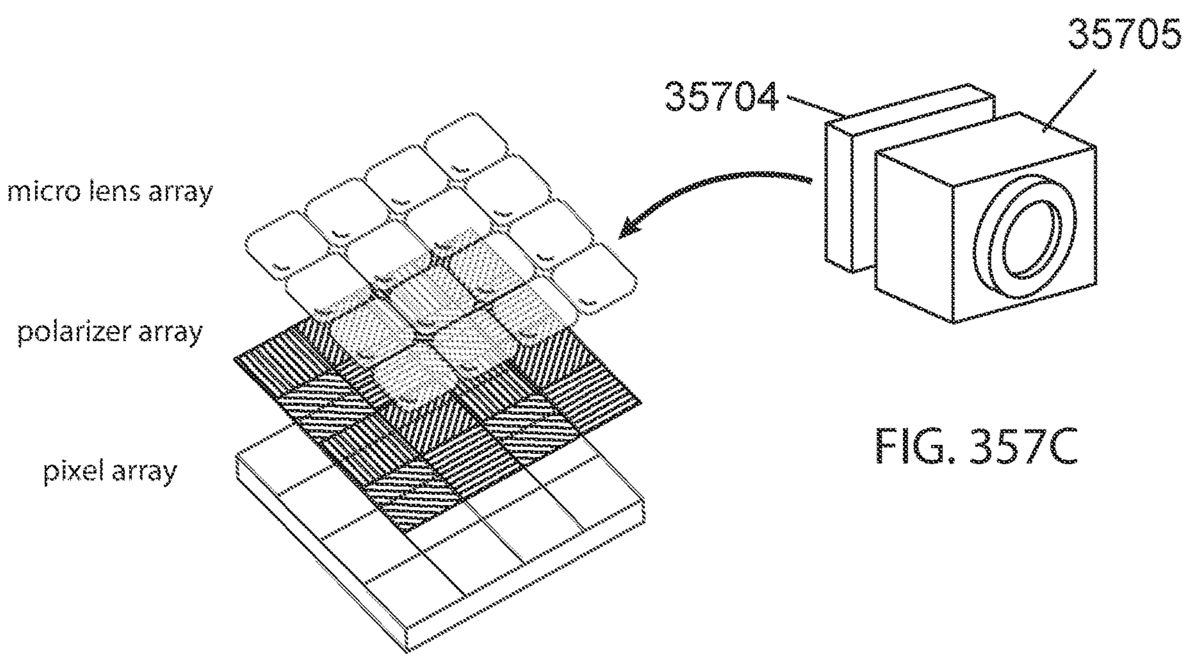
FIG. 357C

```
P2
10 6
255
0  0  0  0  0  0  0  0  0  0
0  0  0  0  0  0  0  0  0  0
0  0  0  0  0  0  0  0  0  0
0  0  0  0  0  0  0  99 99 99
0  0  0  0  0  0  0  99 0  0
0  0  0  0  0  0  0  99 99 99

# XYZ
```

```
P2
10 6
1
0  0  0  0  0  0  0  0  0  0
0  0  0  0  0  0  0  0  0  0
0  0  0  0  0  0  0  0  0  0
0  0  0  0  0  0  0  1  1  1
0  0  0  0  0  0  0  1  0  0
0  0  0  0  0  0  0  1  1  1

# XYZ
```

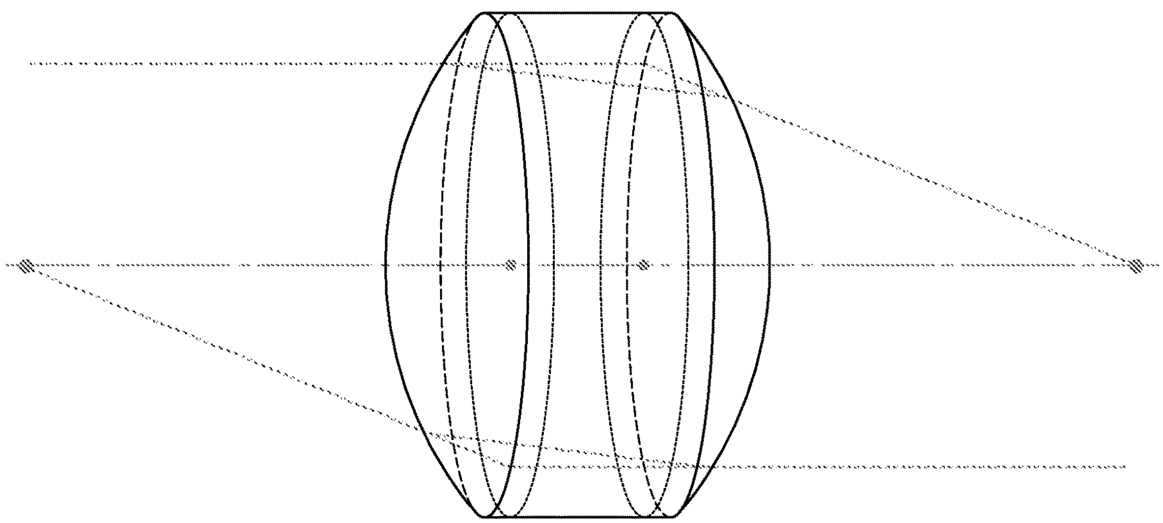
FIG. 367
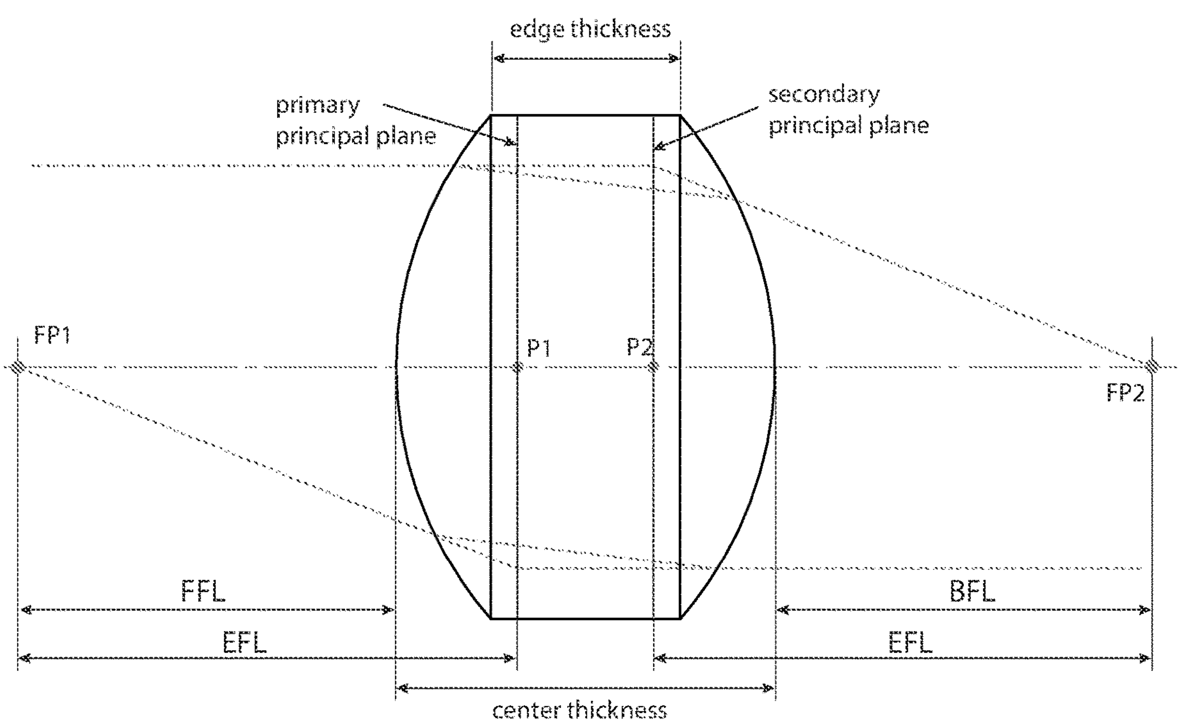

Gaussian distrubution

Enhanced wing shape
(more constant power distribution)

FIG. 421B
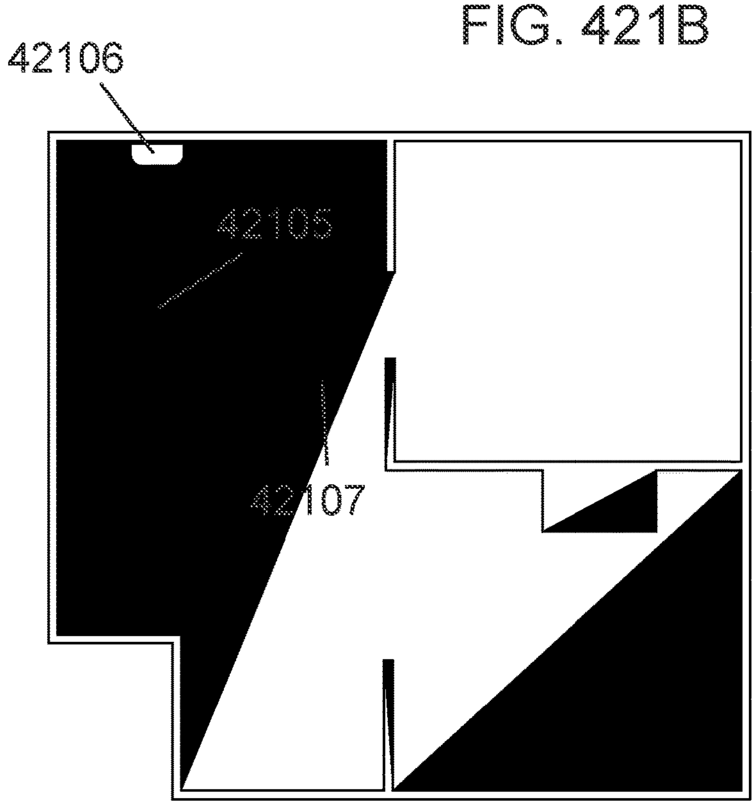
In the app charging station 'zone' may be drawn by colored or dotted lines indicating the IR beams emmiting from the station User may guide the robot to this zone for it to find the station
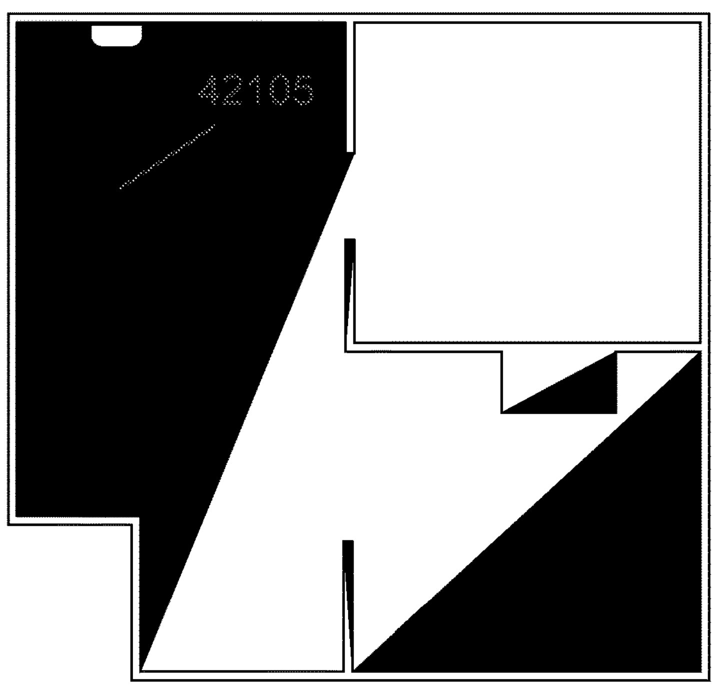

FIG. 422
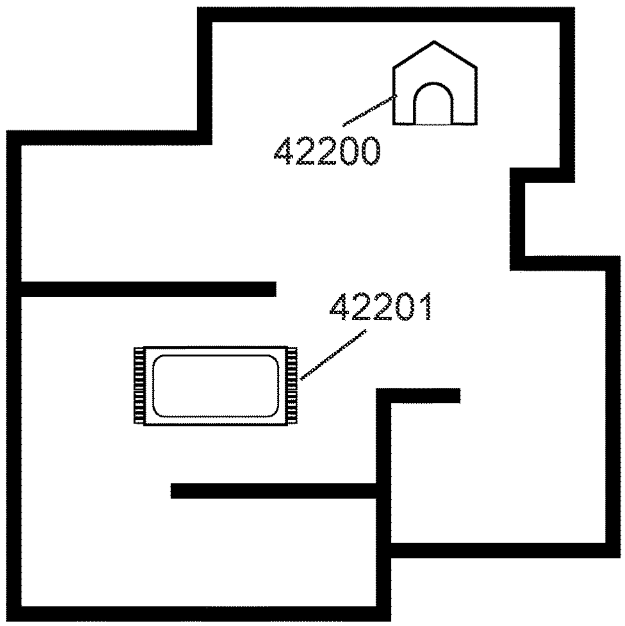
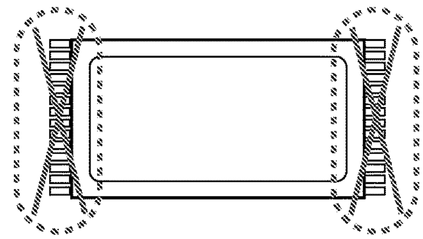
FIG. 423A
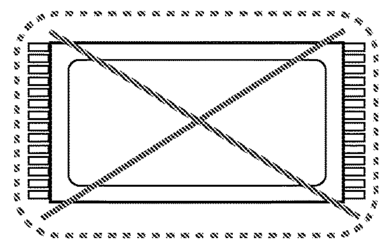
FIG. 423B
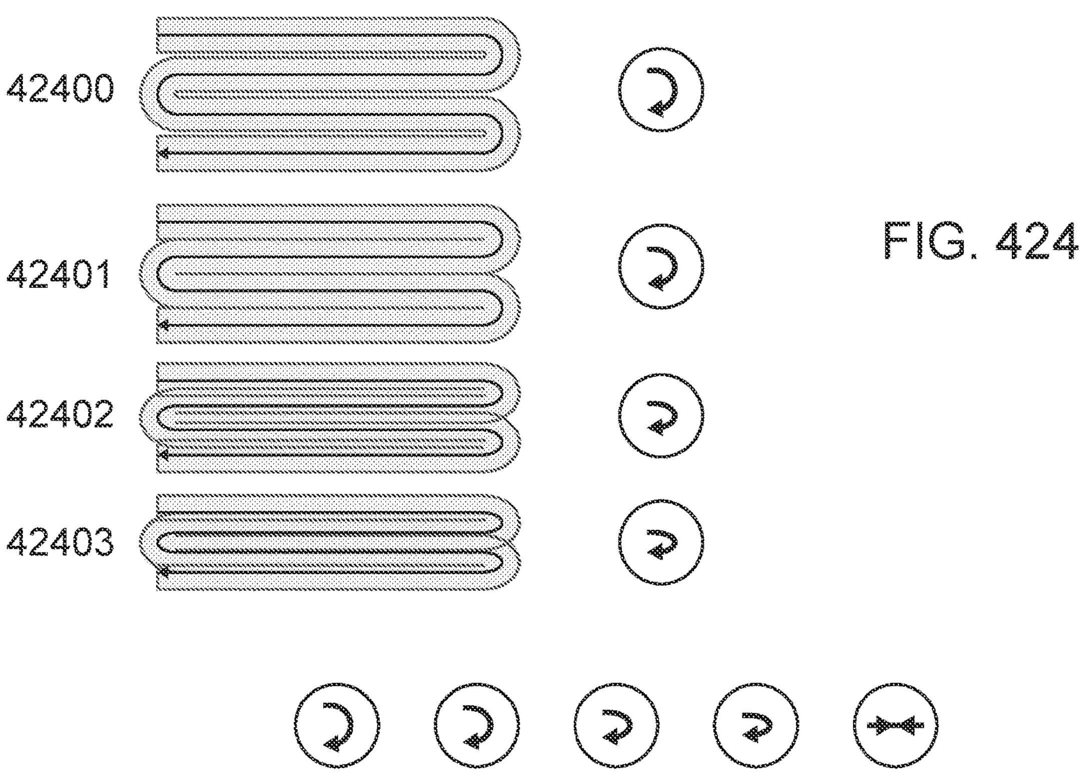
FIG. 424

METHOD OF LIGHTWEIGHT SIMULTANEOUS LOCALIZATION AND MAPPING PERFORMED ON A REAL-TIME COMPUTING AND BATTERY OPERATED WHEELED DEVICE

CROSS-REFERENCE TO RELATED PATENTS

This application claims the benefit of Provisional Patent Application No. 63/124,004, filed Dec. 10, 2020 and 63/148,307, filed Feb. 11, 2021, each of which is hereby incorporated by reference.

In this patent, certain U.S. patents, U.S. patent applications, or other materials (e.g., articles) have been incorporated by reference. Specifically, U.S. patent application Ser. Nos. 14/673,633, 15/676,888, 16/558,047, 16/179,855, 16/850,269, 16/129,757, 16/239,410, 17/004,918, 16/230,805, 16/411,771, 16/578,549, 16/163,541, 16/851,614, 15/071,069, 17/179,002, 15/377,674, 16/883,327, 15/706,523, 16/241,436, 17/219,429, 16/418,988, 15/981,643, 16/747,334, 16/584,950, 16/185,000, 15/286,911, 16/241,934, 15/447,122, 16/393,921, 16/932,495, 17/242,020, 14/885,064, 16/186,499, 15/986,670, 16/568,367, 16/163,530, 15/257,798, 16/525,137, 15/614,284, 17/240,211, 16/402,122, 15/963,710, 15/930,808, 16/353,006, 15/917,096, 15/976,853, 17/109,868, 14/941,385, 16/279,699, 17/155,611, 16/041,498, 16/353,019, 15/272,752, 15/949,708, 16/277,991, 16/667,461, 15/410,624, 16/504,012, 17/127,849, 16/399,368, 17/237,905, 15/924,174, 16/212,463, 16/212,468, 17/072,252, 16/179,861, 15/224,442, 15/674,310, 17/071,424, 16/048,185, 16/048,179, 16/594,923, 17/142,909, 16/920,328, 16/163,562, 16/597,945, 16/724,328, 16/534,898, 14/997,801, 16/726,471, 16/427,317, 14/970,791, 16/375,968, 16/058,026, 17/160,859, 15/406,890, 16/796,719, 15/442,992, 16/832,180, 16/570,242, 16/995,500, 16/995,480, 17/196,732, 16/109,617, 16/163,508, 16/542,287, 17/159,970, 16/219,647, 17/021,175, 16/041,286, 16/422,234, 15/683,255, 16/880,644, 16/245,998, 15/449,531, 16/446,574, 17/316,018, 15/048,827, 16/130,880, 16/127,038, 16/297,508, 16/275,115, 16/171,890, 16/244,833, 16/051,328, 15/449,660, 16/667,206, 16/243,524, 15/432,722, 16/238,314, 16/247,630, 17/142,879, 14/820,505, 16/221,425, 16/937,085, 15/017,901, 16/509,099, 16/389,797, 14/673,656, 15/676,902, 14/850,219, 15/177,259, 16/749,011, 16/719,254, 15/792,169, 15/673,176, 14/817,952, 15/619,449, 16/198,393, 16/599,169, 15/243,783, 15/954,335, 17/316,006, 15/954,410, 16/832,221, 15/425,130, 15/955,344, 15/955,480, and 16/554,040 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to autonomous robots and more particularly to light weight and real time SLAM methods and techniques for autonomous robots.

BACKGROUND

Robotic devices are increasingly used within commercial and consumer environments. Some examples include robotic lawn mowers, robotic surface cleaners, autonomous vehicles, robotic delivery devices, robotic shopping carts, etc. Since changes in the environment, such as the movement of dynamic obstacles (e.g., humans walking around), occurs in real time, a robotic device must interact (e.g., executing actions or making movements) in real time as well for the interaction to be meaningful. For example, a robotic device may change its path in real time upon encountering an obstacle in its way or may say a name of a user, take an order from the user, offer help to the user, wave to the user, etc. in real time upon observing the user within its vicinity. Robotic devices in the prior art may use Robot Operating System (ROS) or Linux to run higher level applications such as Simultaneous Localization and Mapping (SLAM), path planning, decision making, vision processing, door and room detection, object recognition, and other artificial intelligence (AI) software, resulting in high computational cost, slow response, slow boot up, and high battery power consumption. This may be acceptable for low volume productions, experiments, and unlimited cost cases. However, some of these deficiencies may not be ideal for mass production and some may not be appreciated by consumers. For instance, a slow boot up of a robot may be inconvenient for a user as they are required to wait for the robot to boot up before the robot begins working. Also, when a reset of the robot is required, a long boot up time may lead to a poor perception of the robot by the user. Robotic devices using ROS or Linux also do not provide any real time guarantees. Prior art may solve this problem by planning a decision, a path, etc. on a Central Processing Unit (CPU) and passing the high level plan to a real time controller for execution in real time. To compensate for the lack of real time decision making, more processing power is used. However, such methods may require high computational cost and may have slow response, particularly when the CPU becomes busy. For example, a Linux, Windows, or MAC computer temporarily freezes and displays an hourglass icon until the CPU is no longer busy. While this may not be an issue for personal computers (PCs), for autonomous robots attempting to navigate around obstacles in real time the delay may not be tolerable. In other applications, such as drones and airplanes, real time capability is even more important during SLAM. In some instances, robotic devices in the prior art may also use Raspberry Pi, beagle bone, etc. as a cost-effective platform, however, these devices are in essence a full PC despite some parts remaining unused or pruned. It is important robotic devices to use real time platforms as their functionalities are not equivalent to PCs.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method for operating a battery operated wheeled device actuated with electric motors, including: capturing, by a primary sensor coupled to the wheeled device, primary sensor data indicative of a plurality of radial distances from the primary sensor to objects within a maximum range of the primary sensor as the robot performs work within an environment; transforming, by a processor of the wheeled device, the plurality of radial distances from a perspective of the primary sensor to a perspective of the wheeled device based on a physical position of the primary sensor relative to a body of the wheeled device; generating, by the processor, a partial map of visible areas of the environment in real-time at a first position of the wheeled device based on the primary sensor data and at least some secondary sensor data, wherein: the partial map is a bird's eye view of the environment; and the processor iteratively completes a full map of the environment based on new sensor data captured by sensors as the wheeled device performs work within the environment and new areas become visible to the sensors; and executing, by the wheeled device, a movement path to a second position.

Some embodiments provide a robot implementing the methods described above.

BRIEF DESCRIPTIONS OF THE DRAWINGS

Steps shown in the figures may be modified, may include additional and/or omit steps in an actual implementation, and may be performed in a different order than shown in the figures. Further, the figures illustrated and described may be according to only some embodiments.

FIG. 1 compares boot up time of a robot using real time navigational stack with other technologies in the art.

FIG. 2 illustrates that real time navigational stack may be used with different types of operating systems.

FIG. 3 provides a visualization of multitasking in real time on an ARM Cortex M7 MCU, model SAM70 from Atmel.

FIG. 4 provides a visualization of an example of a Lightweight Real Time SLAM Navigational Stack algorithm.

FIG. 8 illustrates light weight QSLAM at MCU level.

FIG. 9 illustrates the use of CPU in QSLAM.

FIG. 10 illustrates the addition of cloud based processing to different QSLAM architectures.

FIG. 15 illustrates an example of tasks executed by the MCU of the robot.

FIG. 16A illustrates images bundled with secondary data along robot's trajectory.

FIG. 16B illustrates an example of 1D stream comprising a 2D stream of images.

Figures 19, 20:
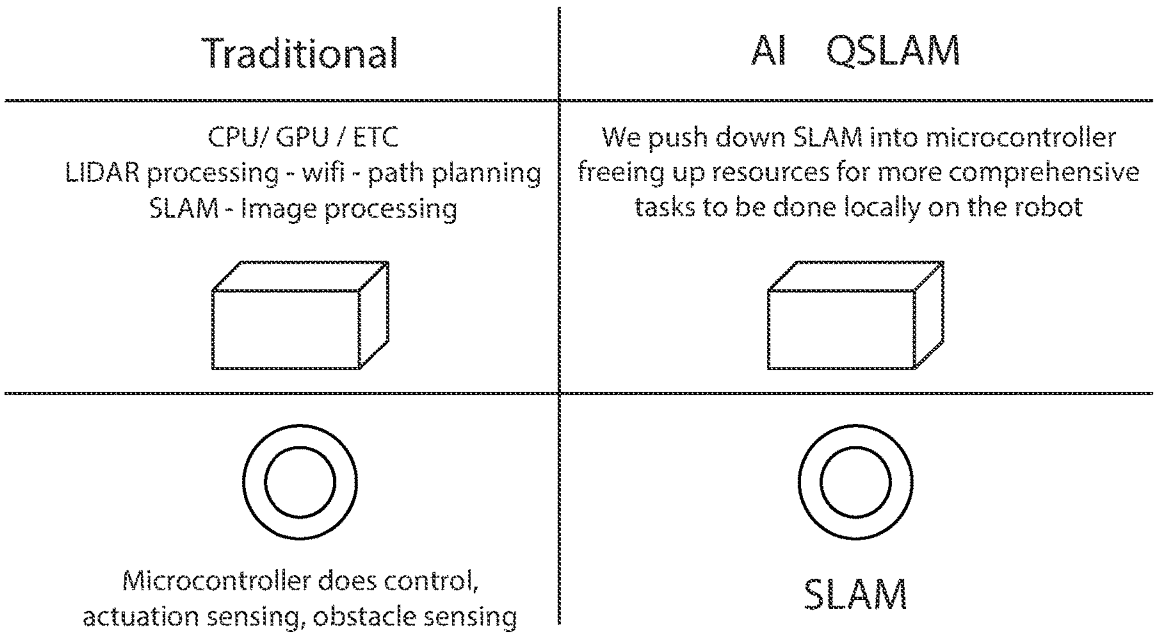

FIG. 19 compares processing at different levels between traditional and QSLAM.

FIG. 20 illustrates an example of stored information relating to a fleet of robots.

Figure 21:
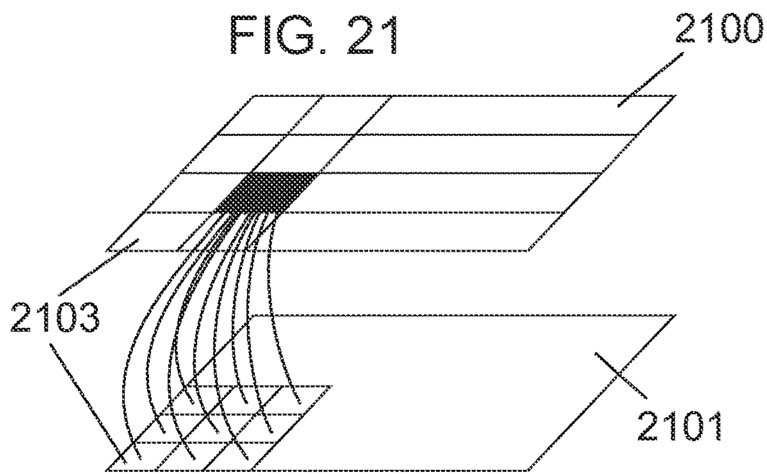

FIG. 21 illustrates an example of two layers of a CNN.

Figure 22A:
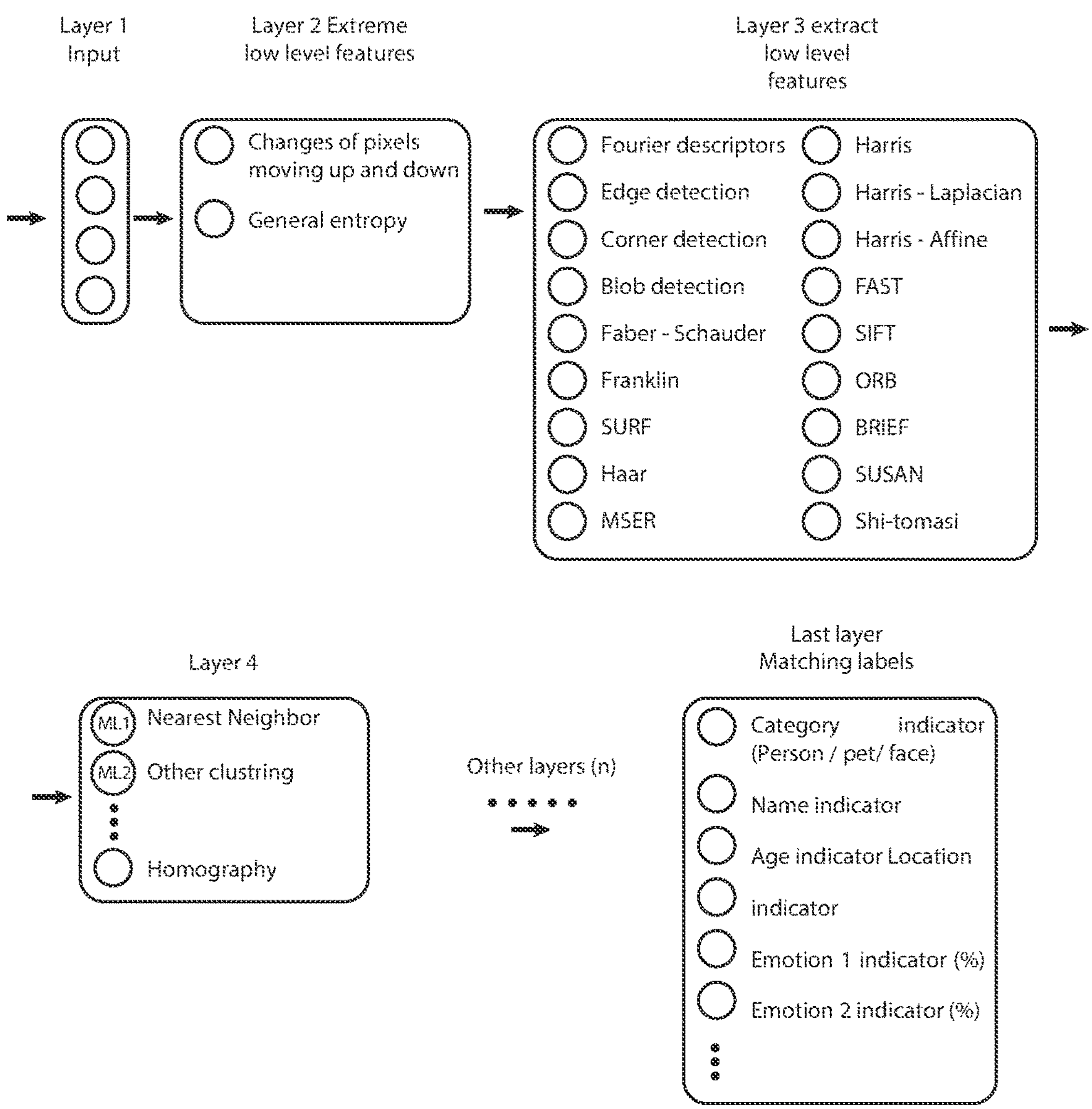

FIG. 22A illustrates an example of a neural network.

Figure 22B:
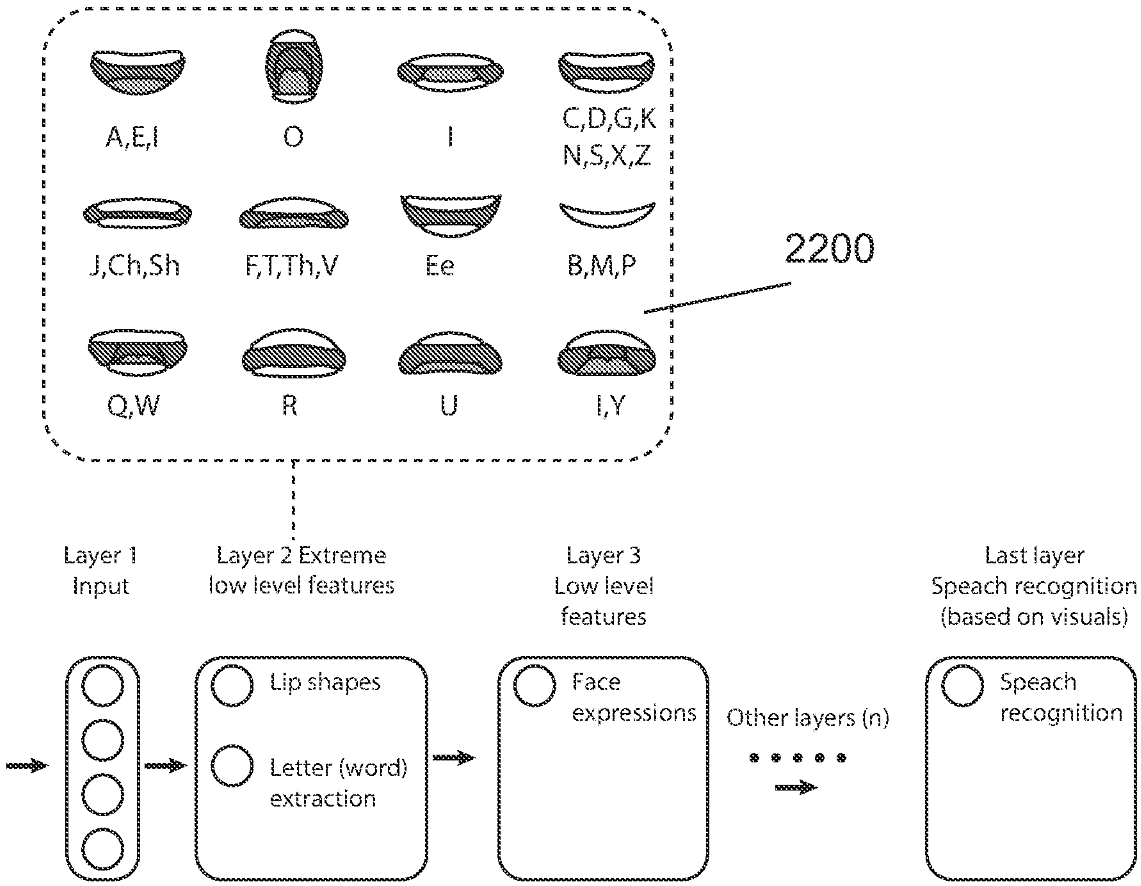

FIG. 22B illustrates an example of a neural network used for speech recognition.

Figure 23:
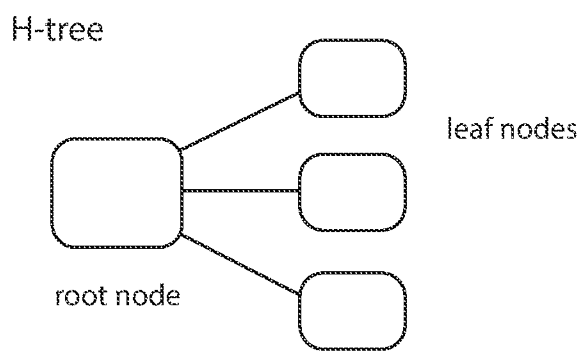

FIG. 23 illustrates an example of an H-tree.

Figure 24:
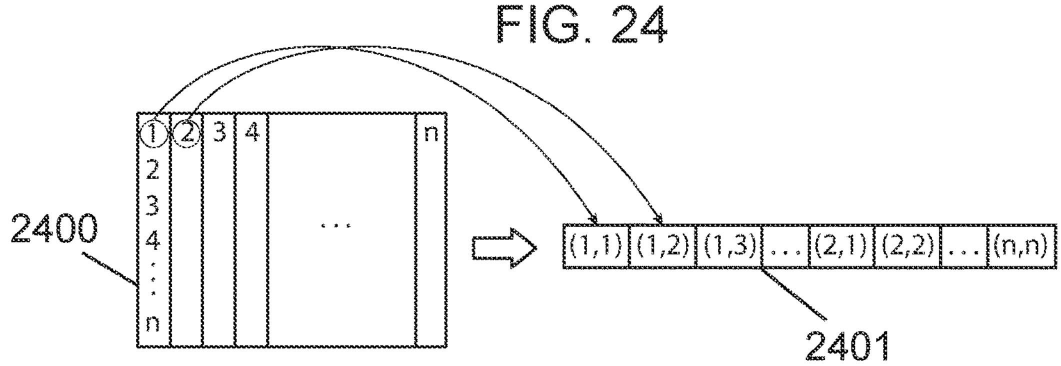

FIG. 24 illustrates an example of flattening a two dimensional image array into an image vector.

Figure 25:
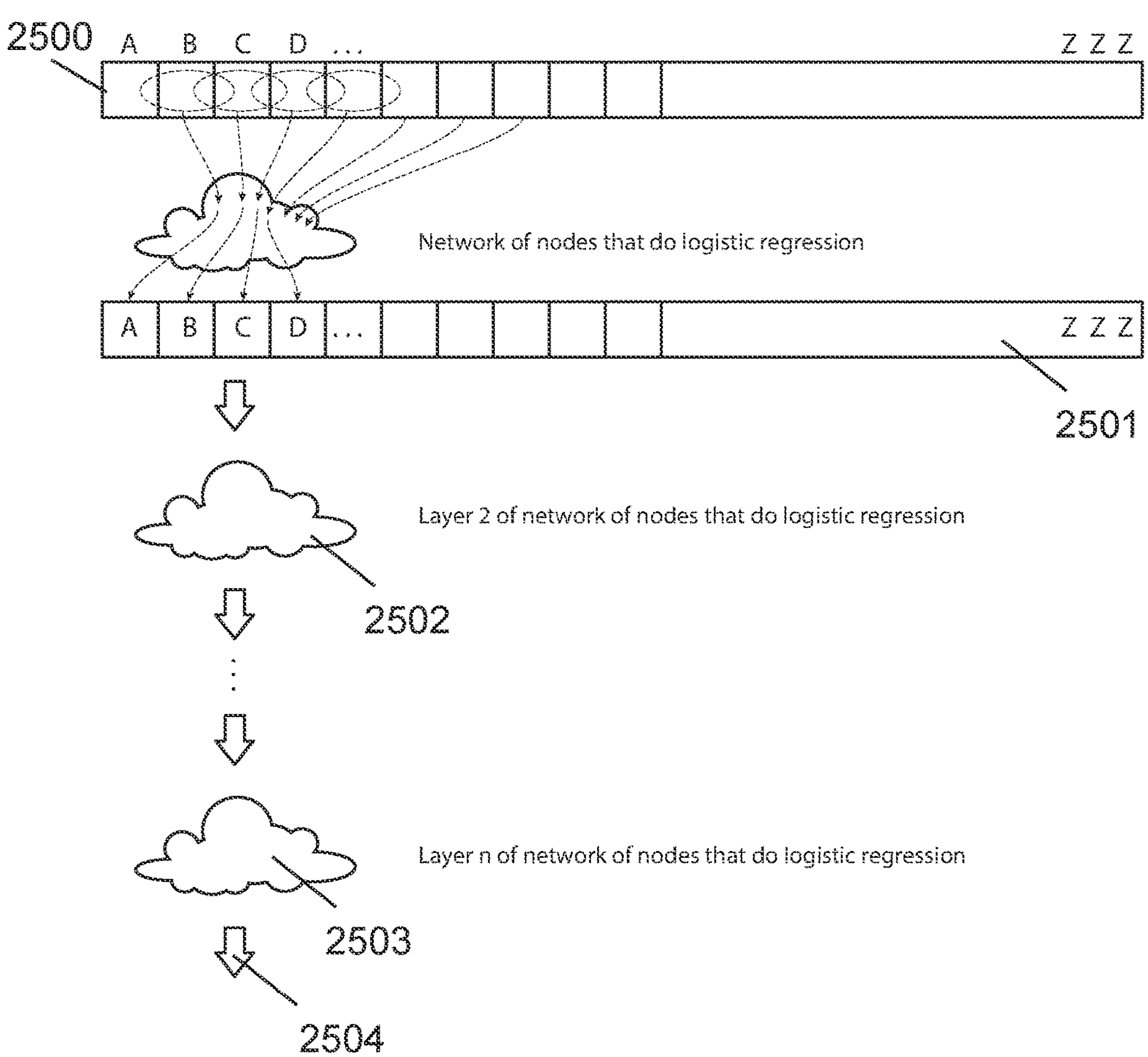

FIG. 25 illustrates the values of elements of vector array provided as inputs into the next layers of the network.

Figure 26:
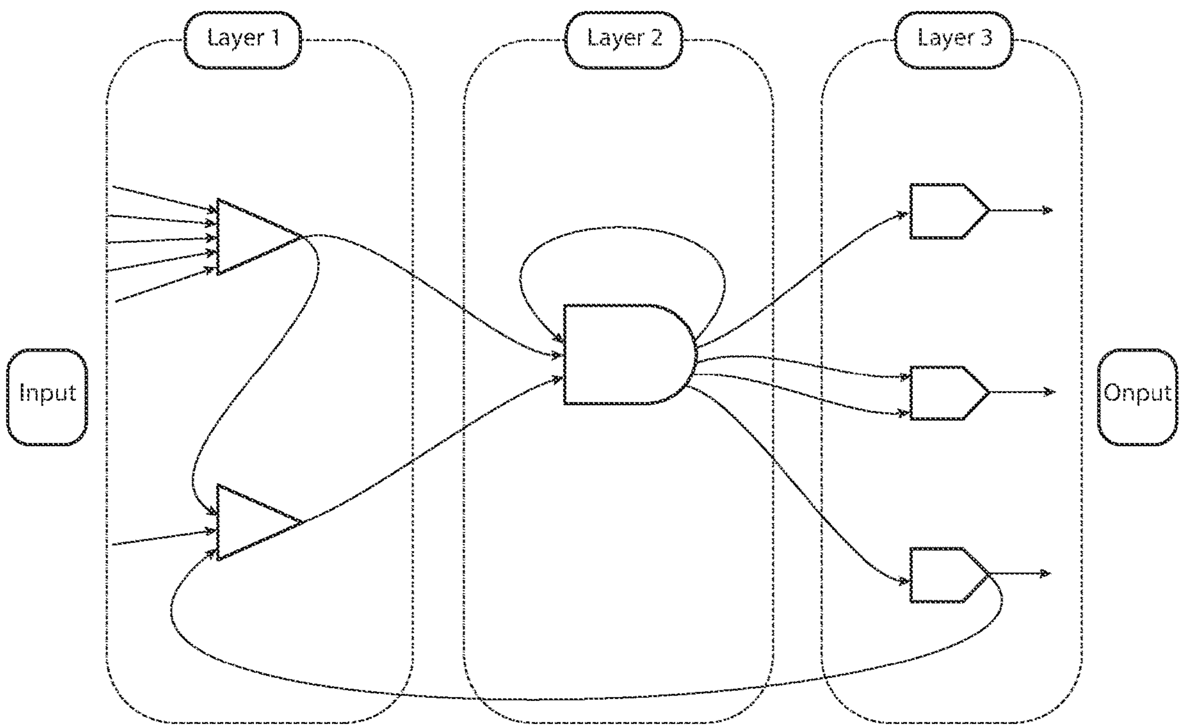

FIG. 26 illustrates a three layer network.

Figure 27A:
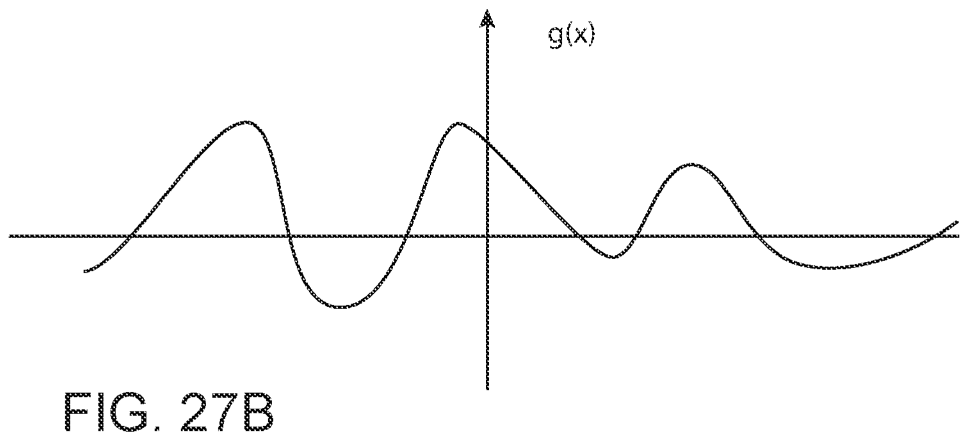

FIG. 27A illustrates an example of a continuous complex function.

Figure 27B:
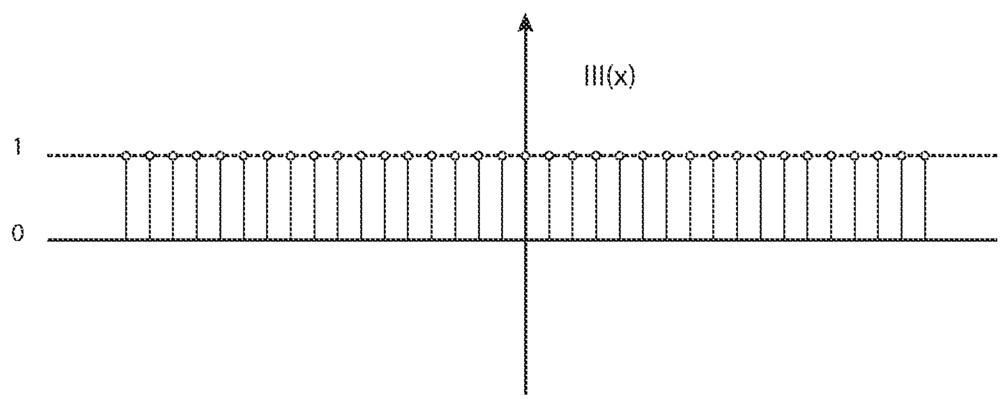

FIG. 27B illustrates the comb function.

Figure 27C:
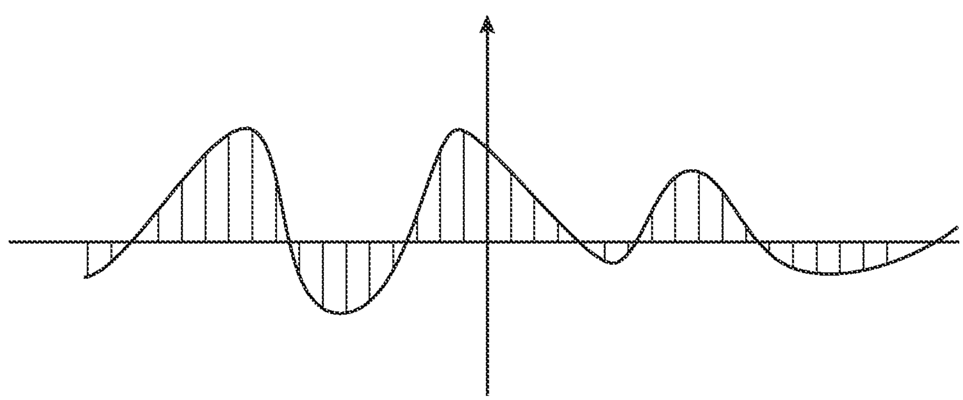

FIG. 27C illustrates the result of multiplying the continuous complex function with the comb function.

Figure 28:
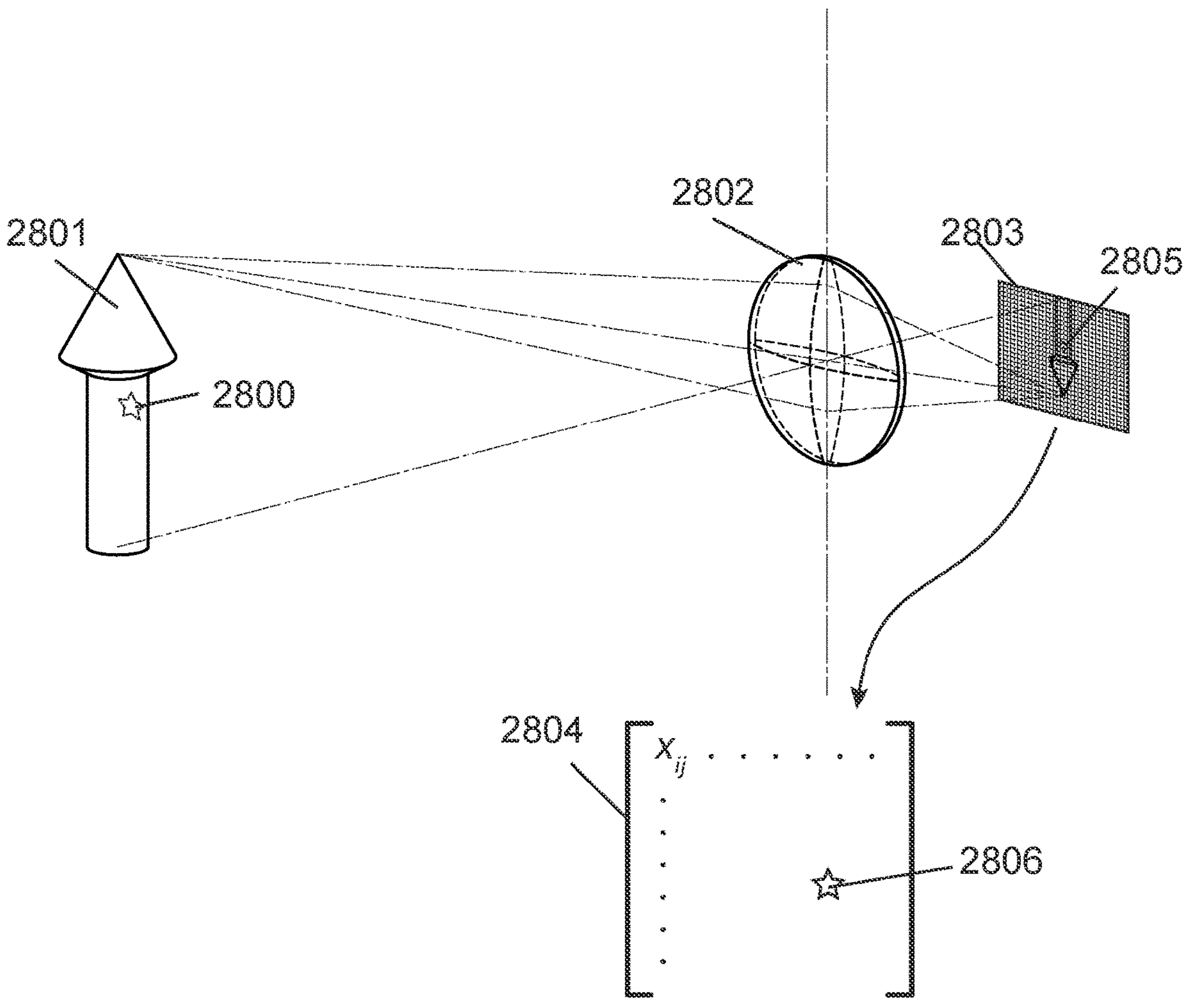

FIG. 28 illustrates the process forming image from an object using a convex lens.

Figure 29A:
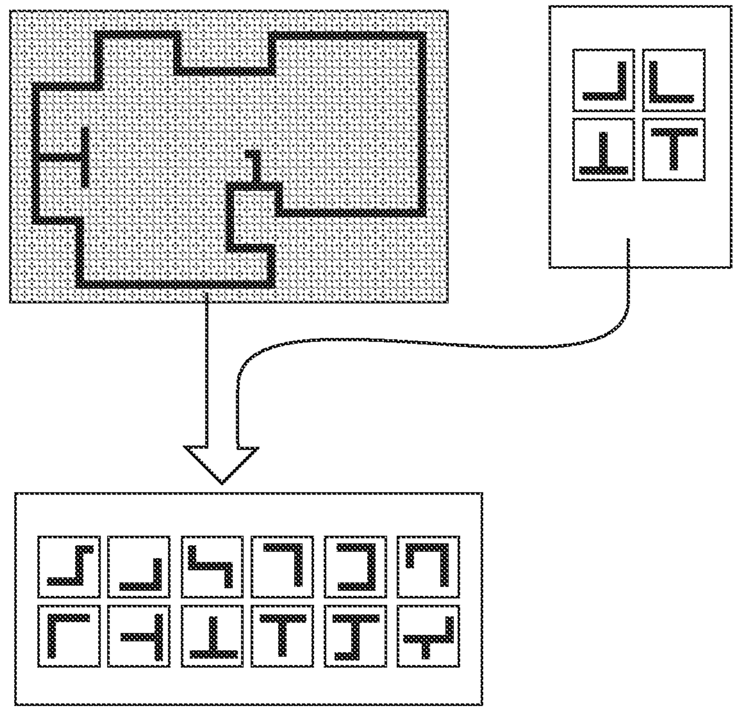

FIG. 29A illustrates an output comprising a subset of an input map.

Figure 29B:
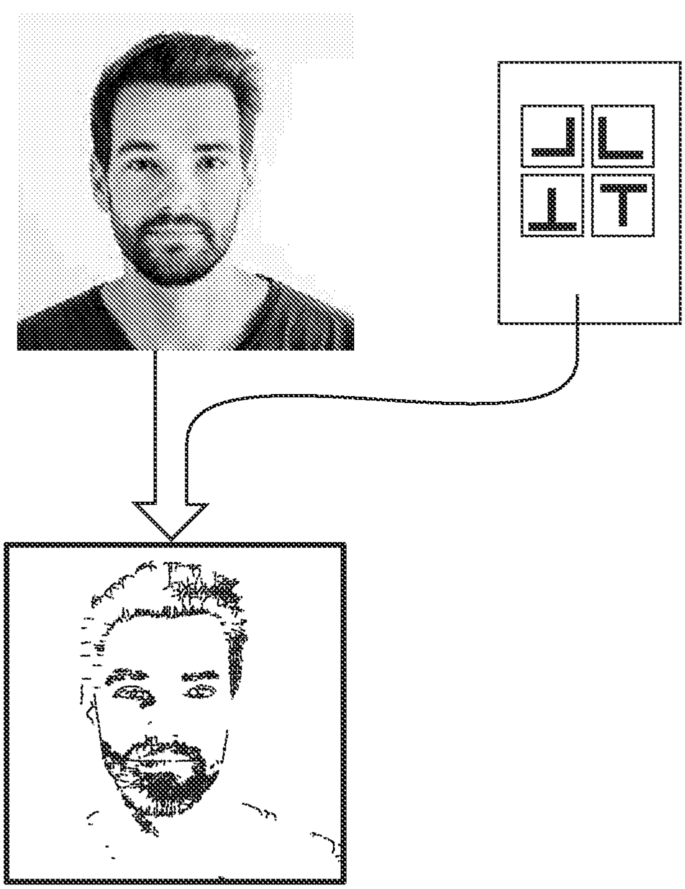

FIG. 29B illustrates an output comprising a subset of an input image.

Figure 30A:
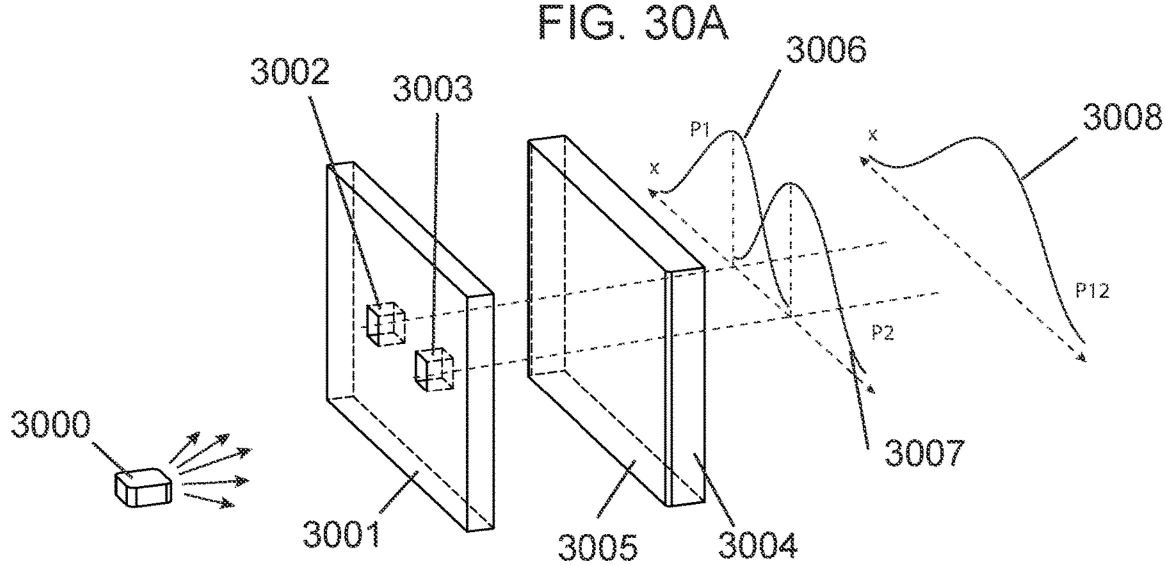
Figure 30B:
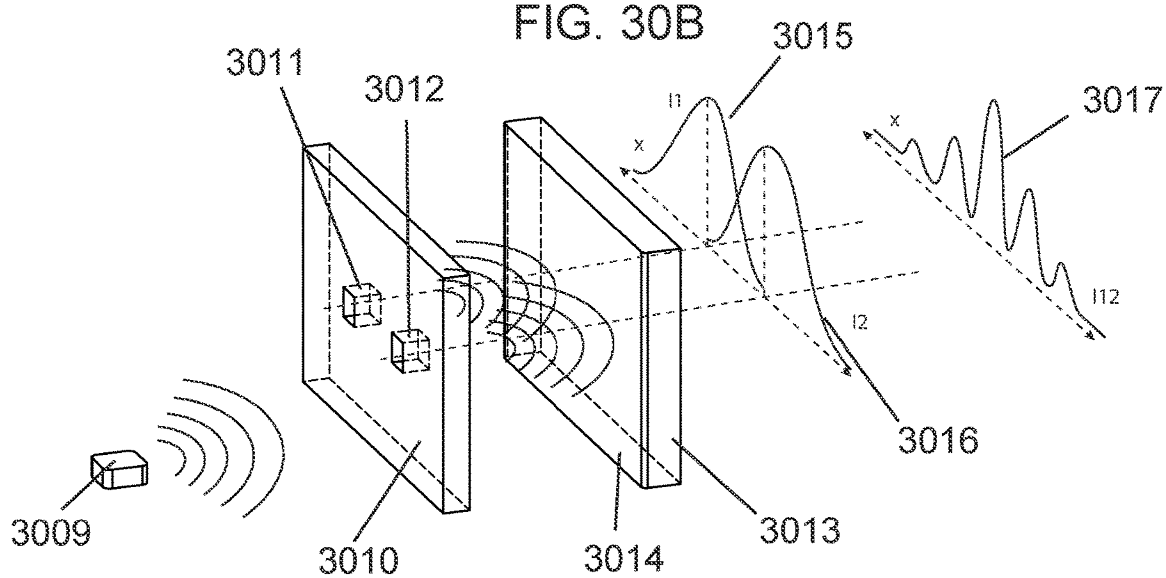

FIG. 30A-30B illustrates a double slit experiment.

Figure 31A:
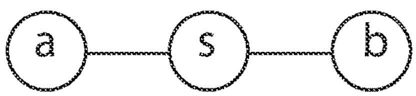
Figure 31B:
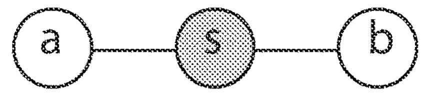
Figure 31C:
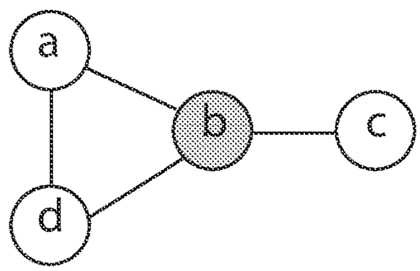

FIGS. 31A-31C illustrate dependency and independency between variables.

Figure 32:
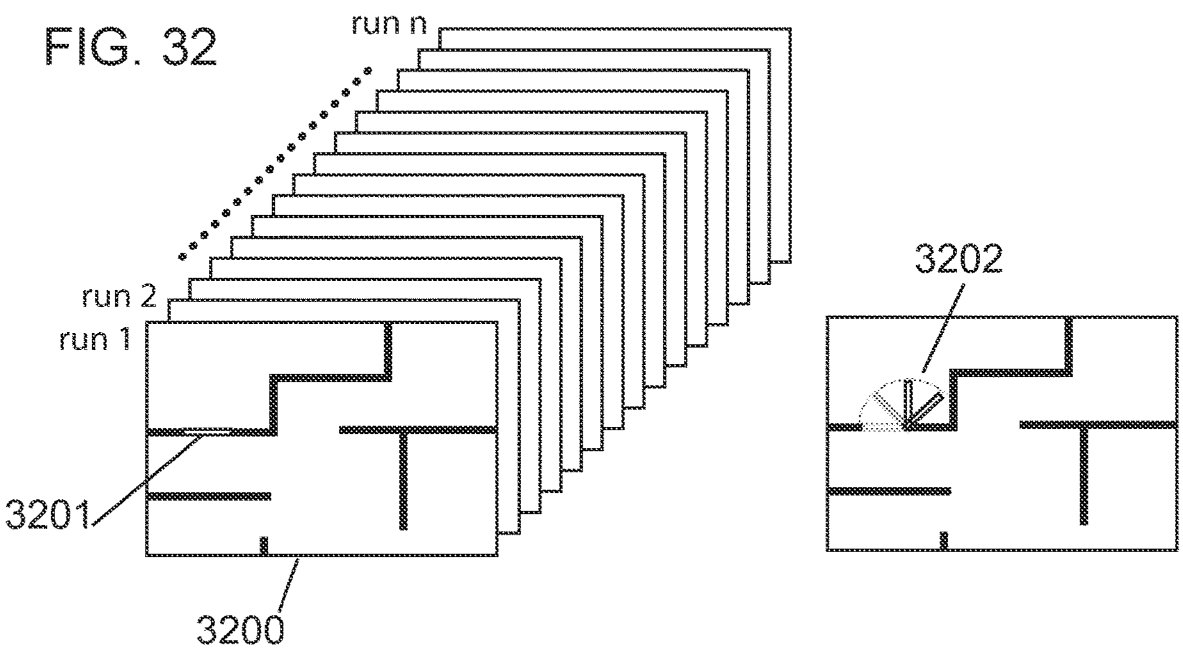

FIG. 32 illustrates a multi-dimensional rectangular prism comprising map data.

Figure 33:
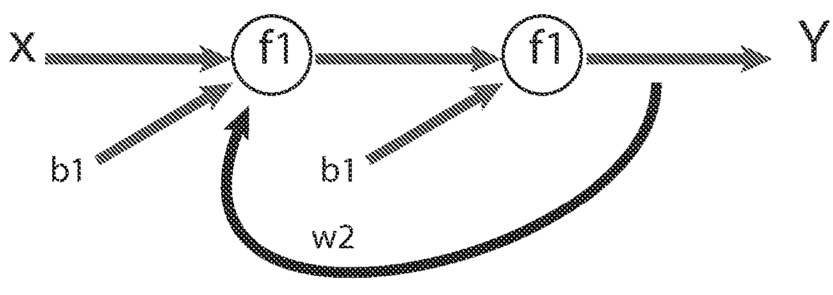

FIG. 33 illustrates an example of a Jordan Network.

FIGS. 34-37 illustrate an example of a multi-dimensional rectangular prism.

FIG. 38 illustrates benefits of a trained neural network and AR/VR components.

Figure 39A:
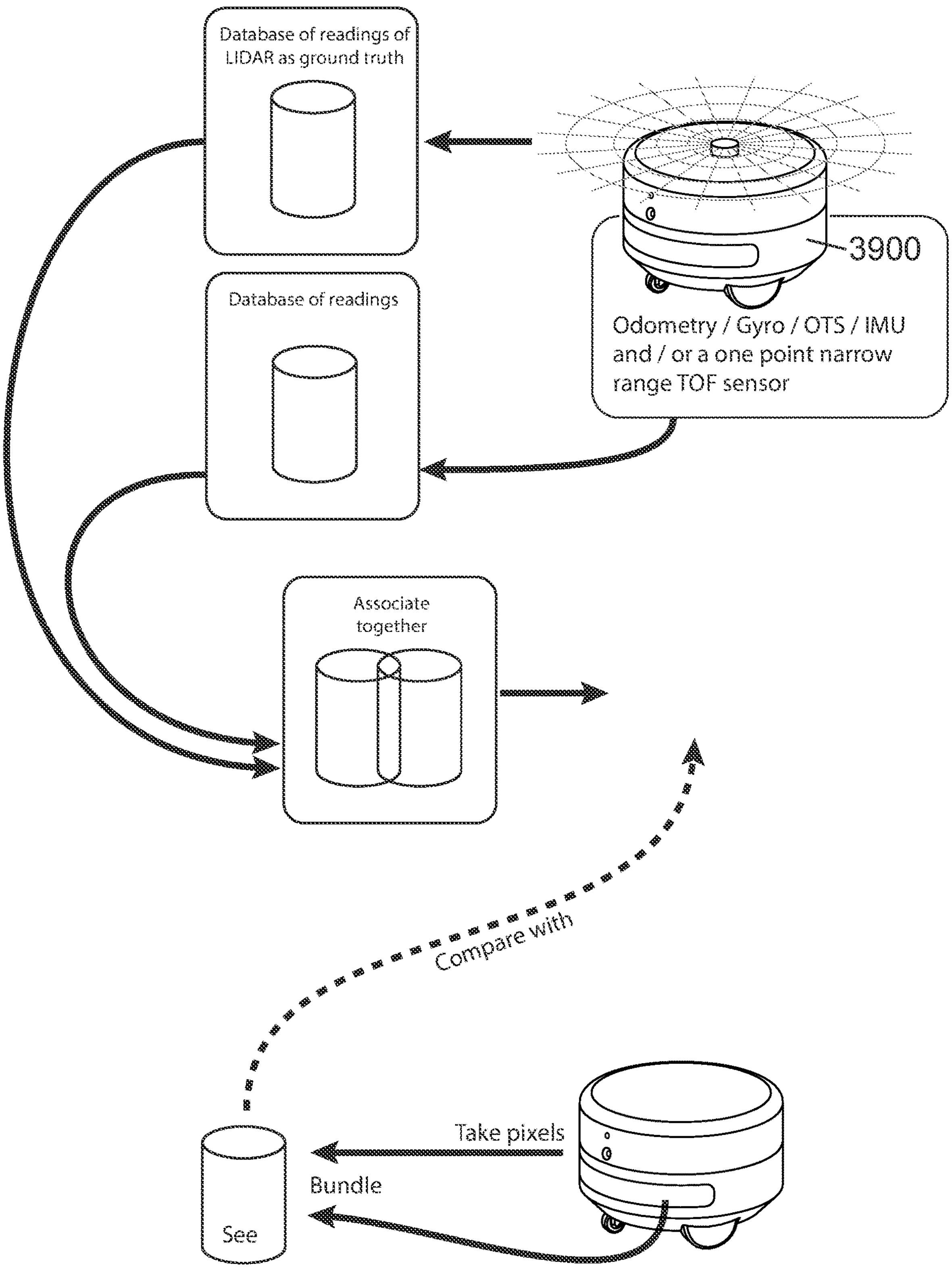

FIGS. 39A-39B illustrate the process of data bundling from various sensors inputs.

FIG. 40 illustrates an example of deep bundling.

FIG. 41 illustrates the process of localization based on its distance from two known points.

FIG. 42 illustrates wireless/Wi-Fi repeaters/routers at various levels within a home.

Figure 43A:
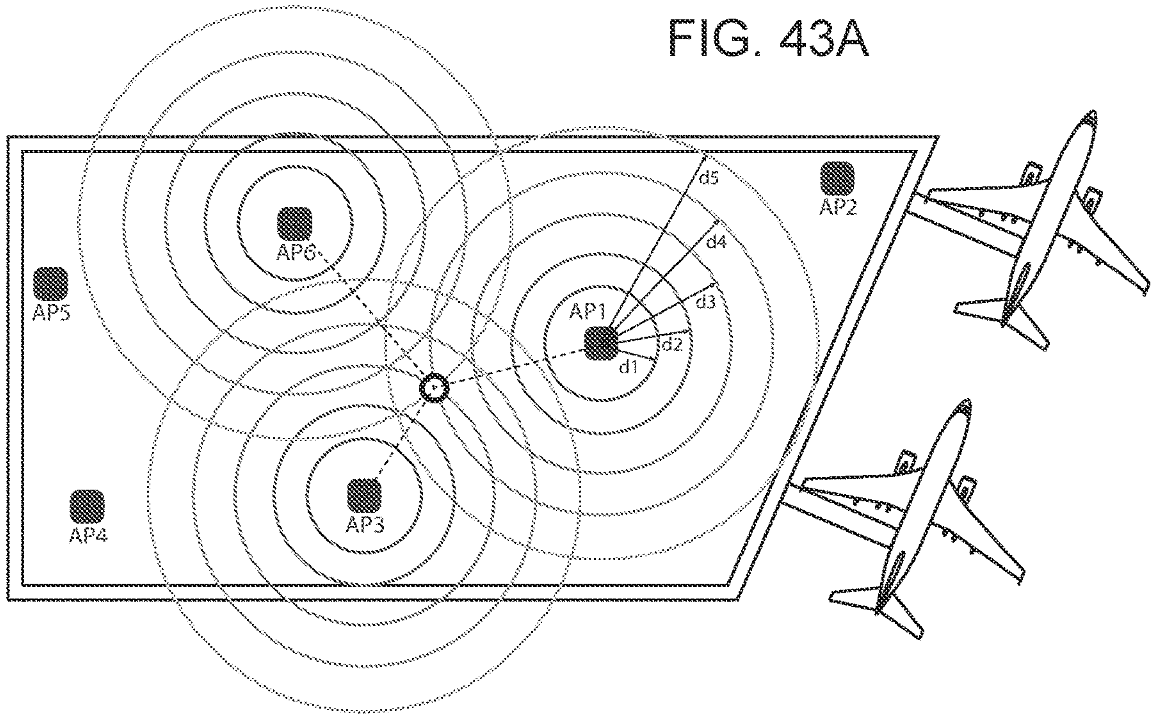

FIG. 43A illustrates an example of an airport with six access points.

Figure 43B:
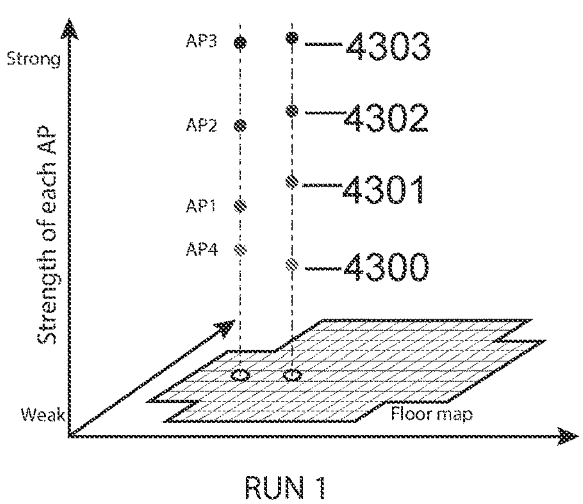
Figure 43C:
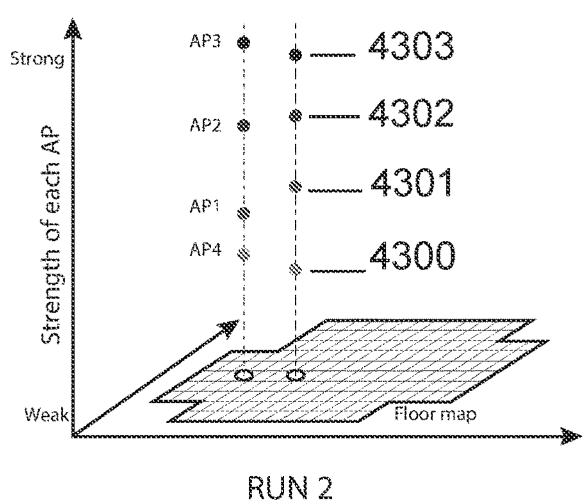

FIGS. 43B-43C illustrate signal strength of each access point in 2 different runs.

Figure 43D:
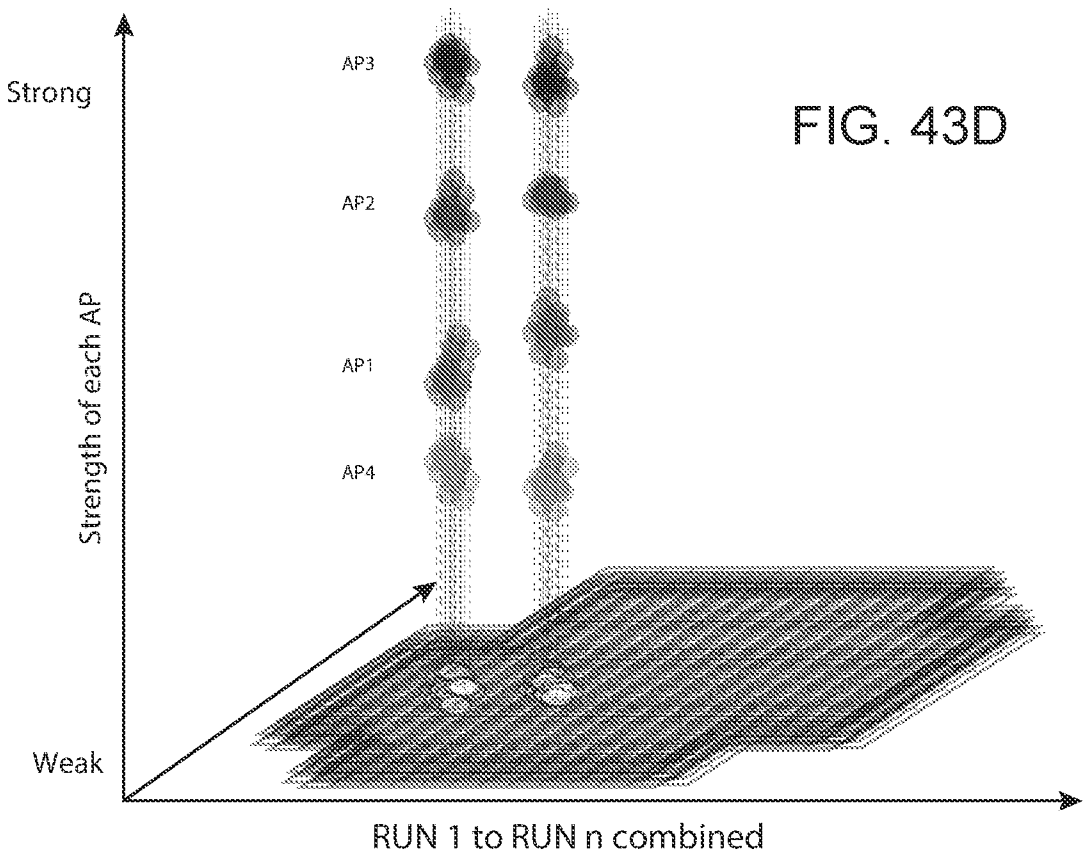

FIG. 43D illustrates run 1 to run n combined.

Figure 44:
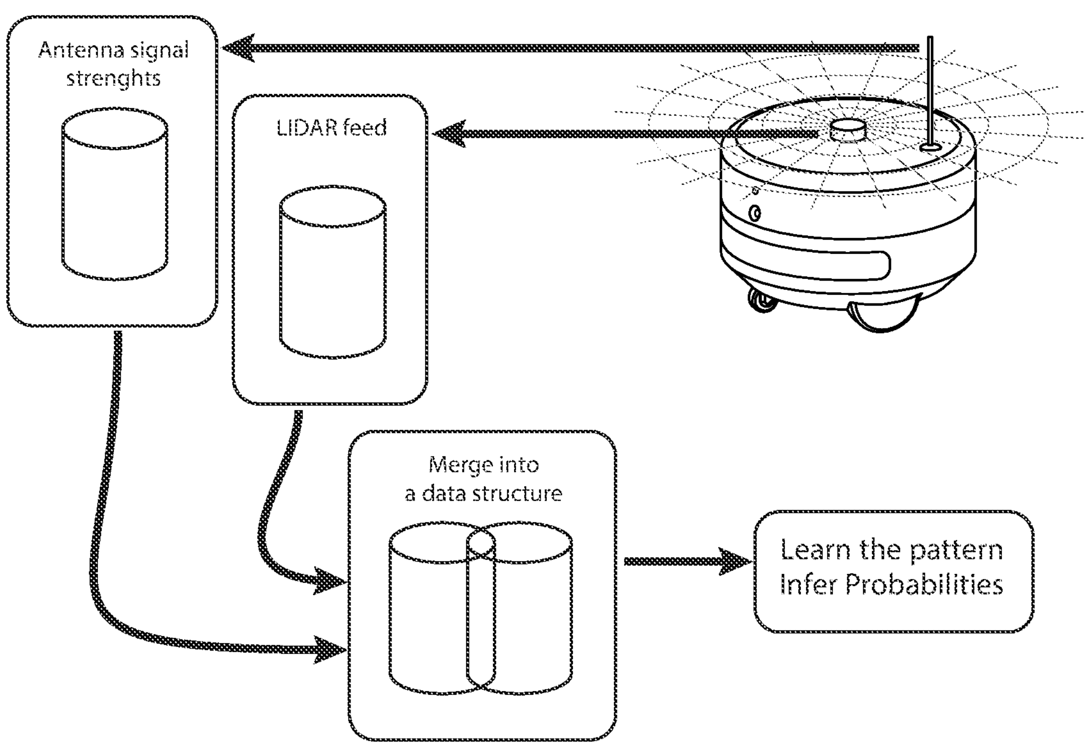

FIG. 44 illustrates the process of bundling between signal strength and LIDAR feed.

Figure 45:
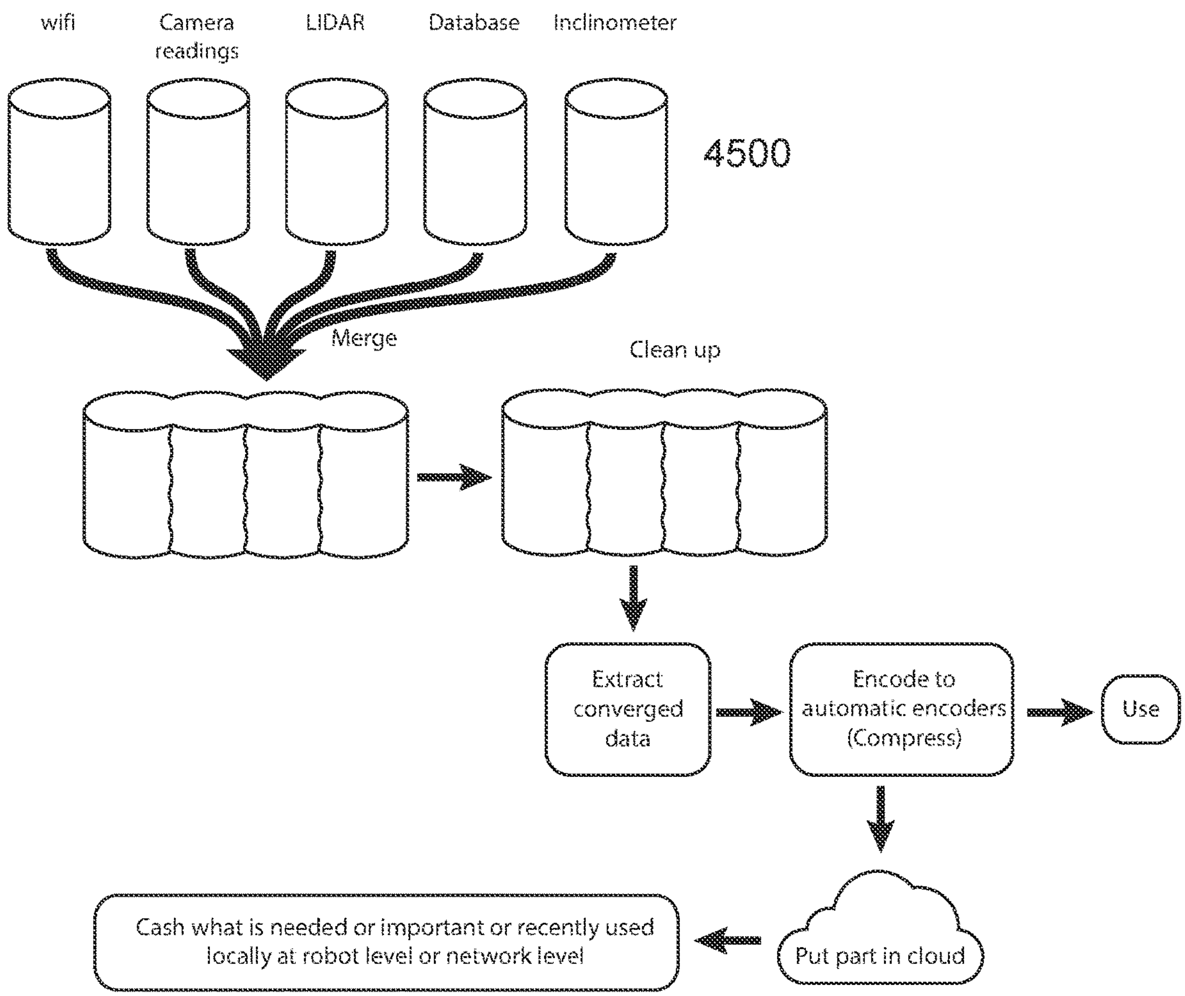

FIG. 45 illustrates an example of merging of various types of data into a data structure.

Figure 46:
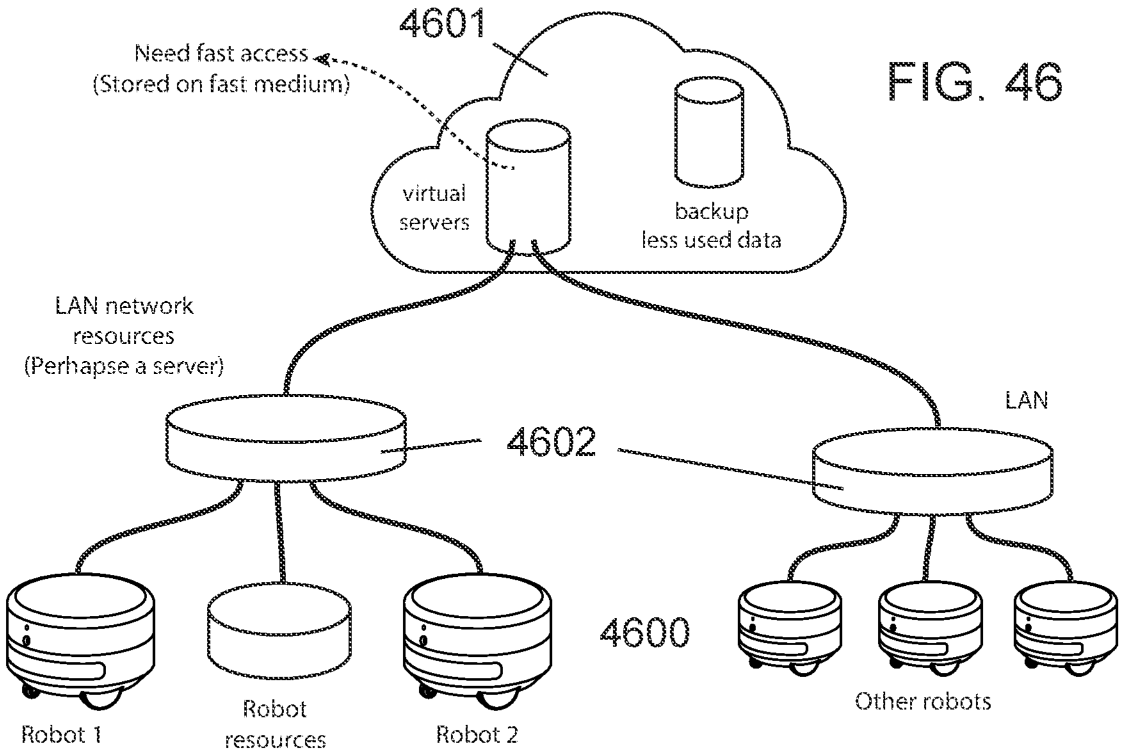

FIG. 46 illustrates an example of various levels of offloading from the local robot level to the cloud level via LAN level.

Figure 47:
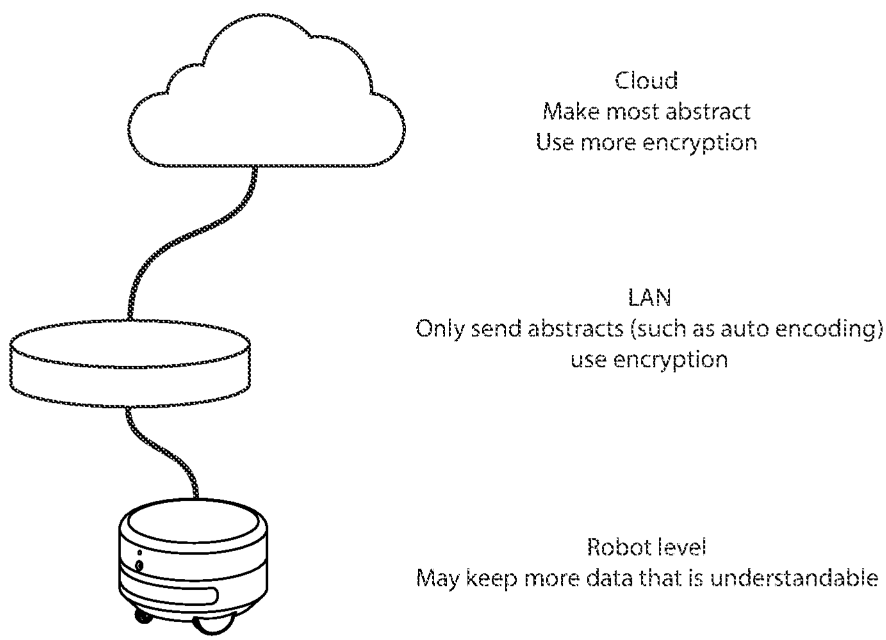

FIG. 47 illustrates different levels of security at the local robot, LAN, and cloud levels.

Figure 48:
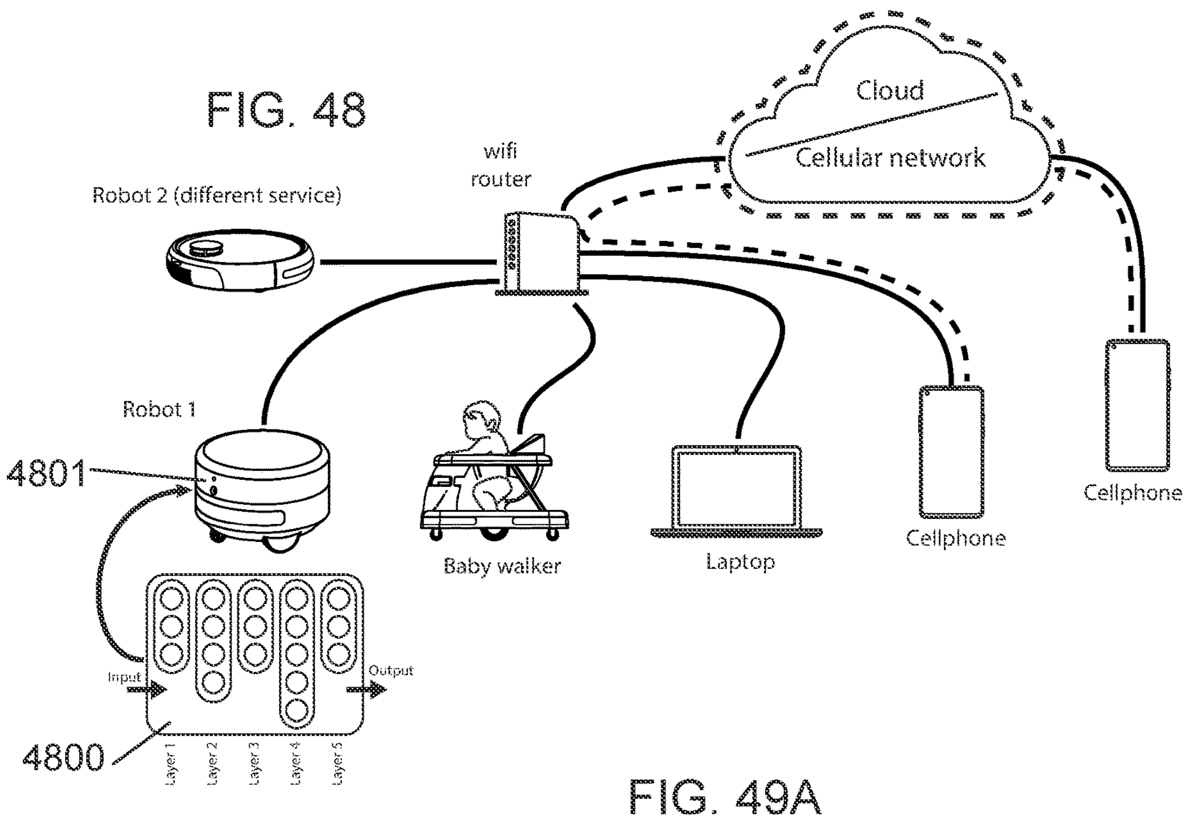

FIG. 48 illustrates an example of where the neural net is stored within a memory of the robot.

FIGS. 49A-49D illustrate schematics wherein a neural network is stored in various levels of a home.

Figure 49A:
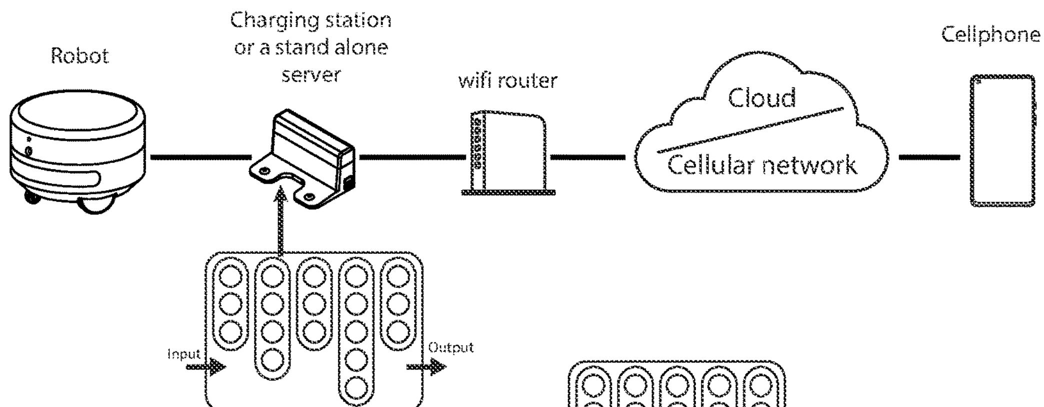
Figure 49B:
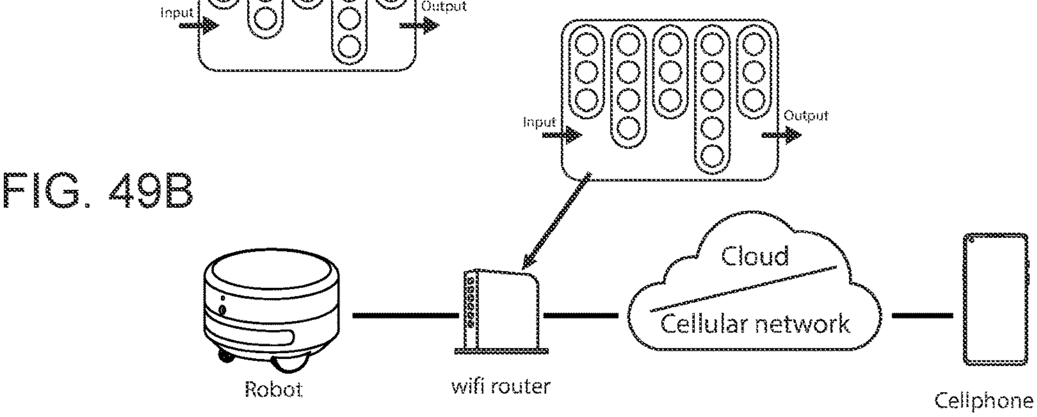
Figure 49F:
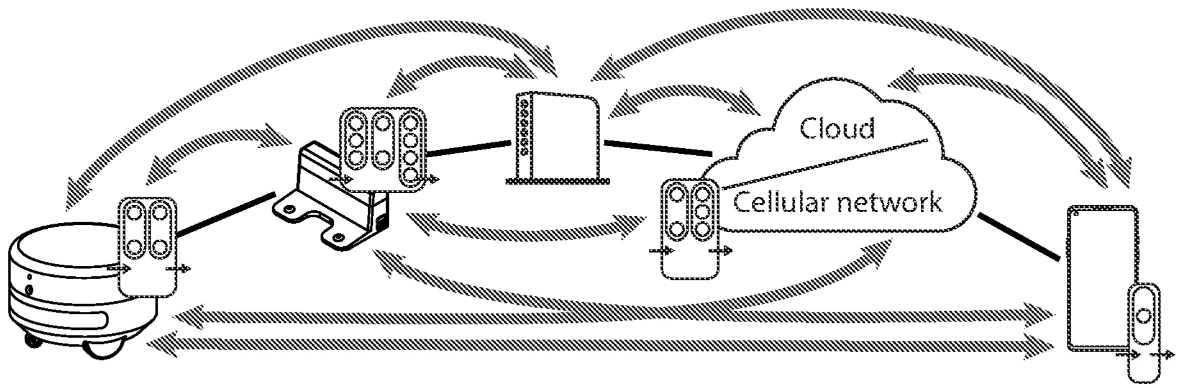

FIGS. 49E-49F illustrate the concept of placing neural networks on any machine and in any architecture network.

Figure 50:
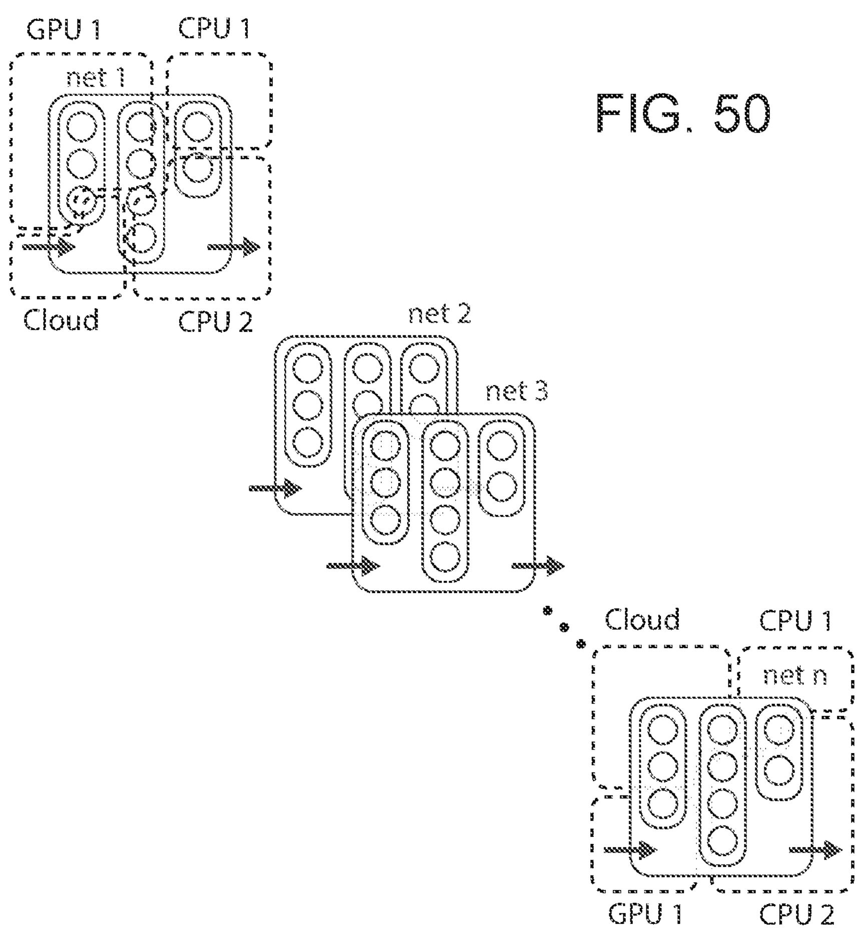

FIG. 50 illustrate different portions of a neural network, divided between different processors and the cloud.

Figure 51A:
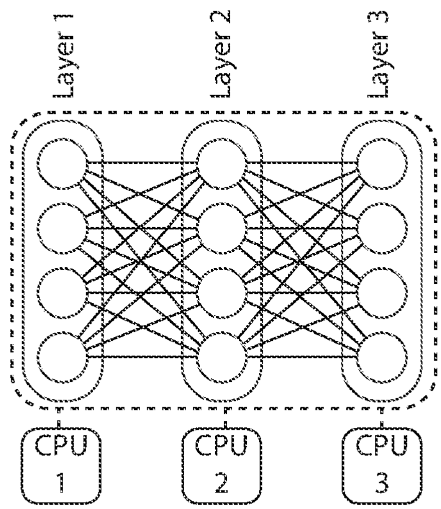
Figure 51B:
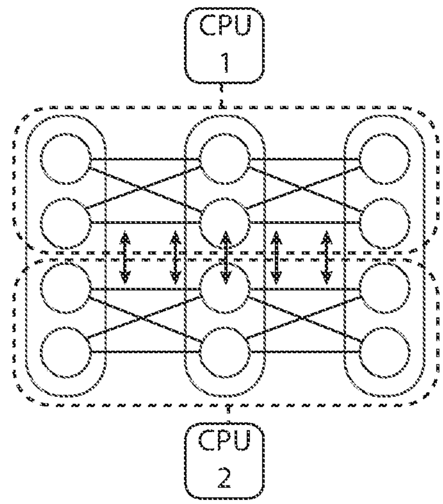
Figure 51C:
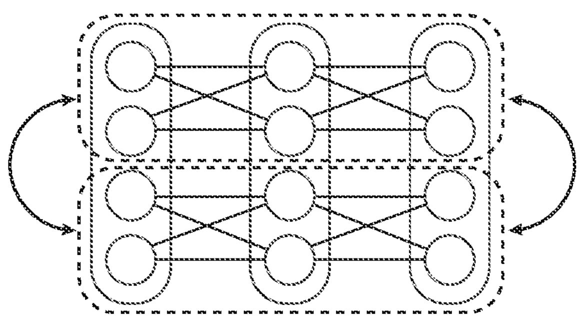

FIGS. 51A-51C illustrate the process of dividing a neural network between processors.

Figure 52:
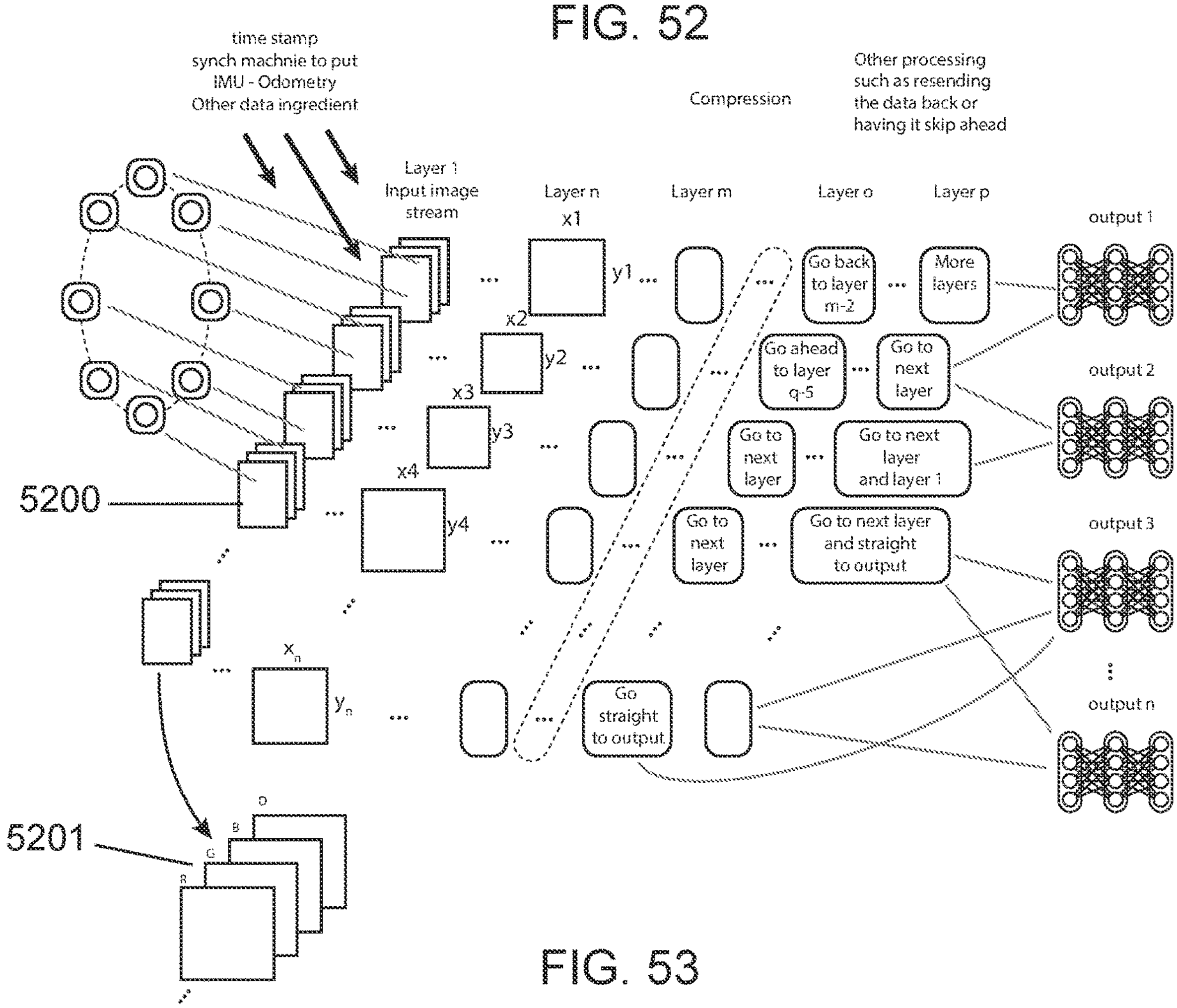

FIG. 52 illustrates an example of a neural network.

Figure 53:
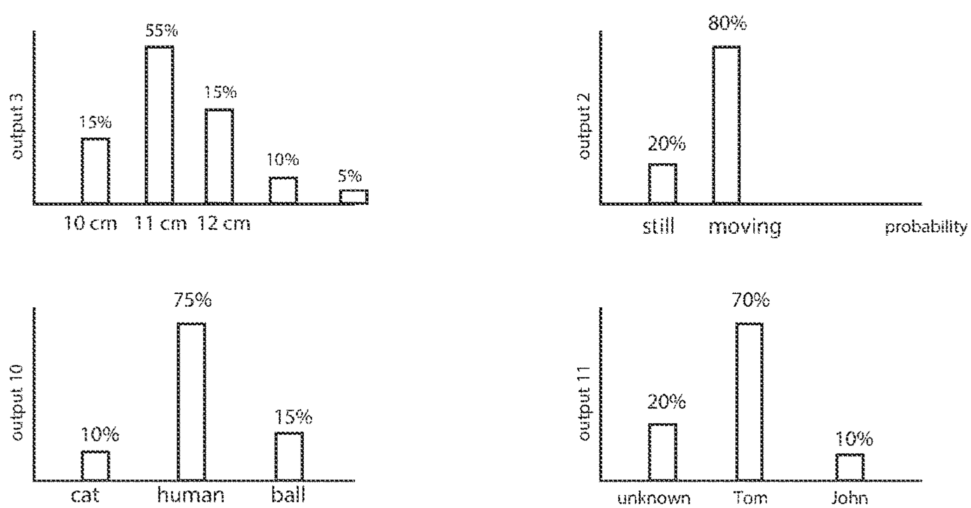

FIG. 53 illustrates examples of different probability outputs of the neural network.

Figure 54:
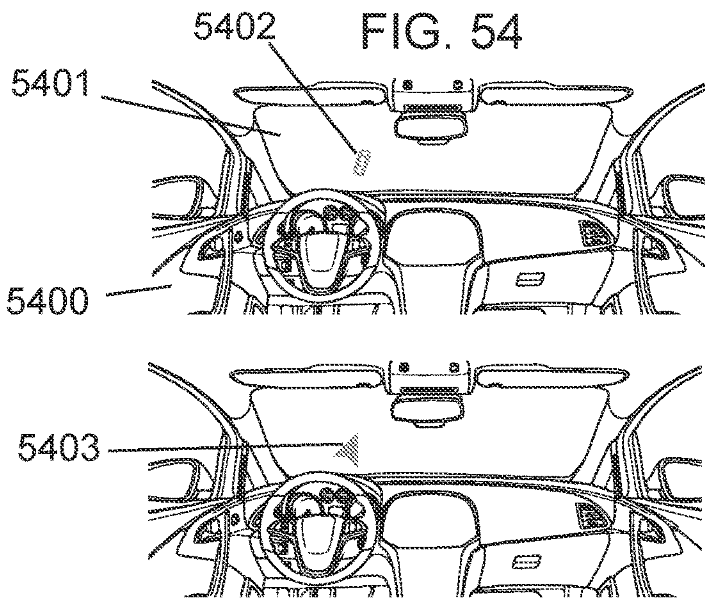

FIG. 54 illustrates a pose of a vehicle shown on its windshield.

Figure 55:
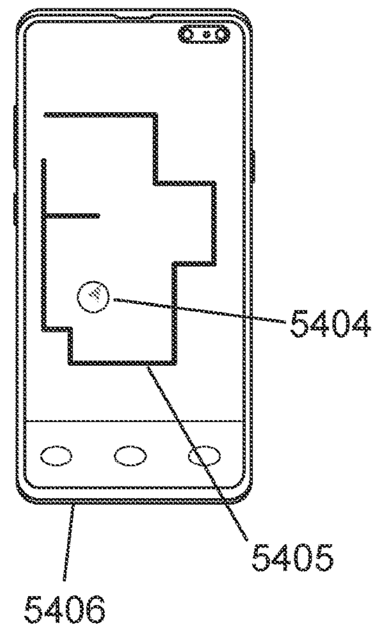

FIG. 55 illustrates the pose of the robot within a map displayed on a screen of a communication device.

Figure 56:
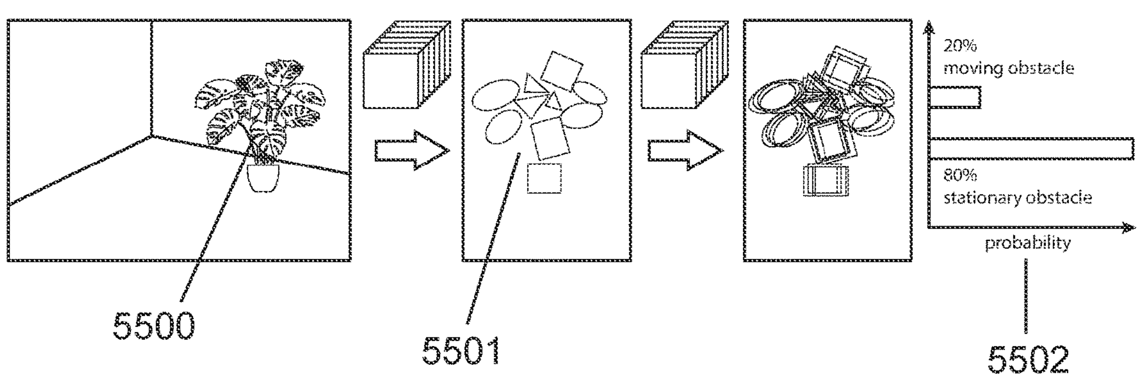

FIG. 56 illustrates information at various layers of a network.

Figure 57:
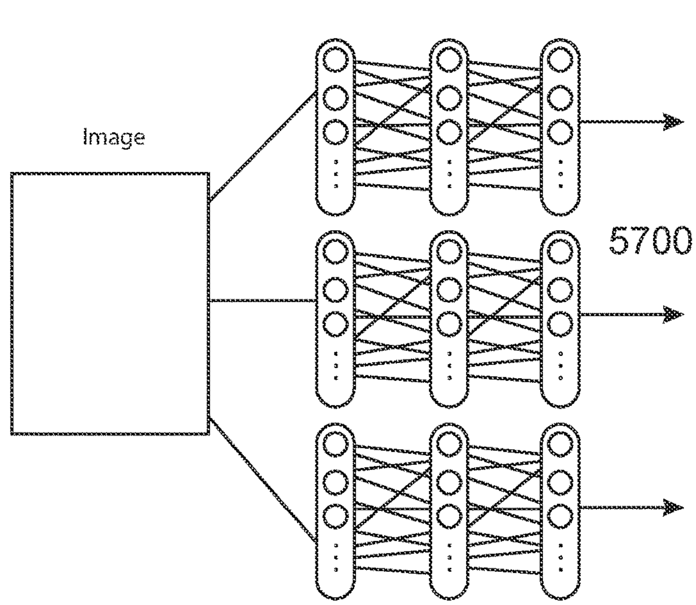

FIG. 57 illustrates the use of multiple neural networks trained and structured to extract different high level concepts.

Figure 58A:
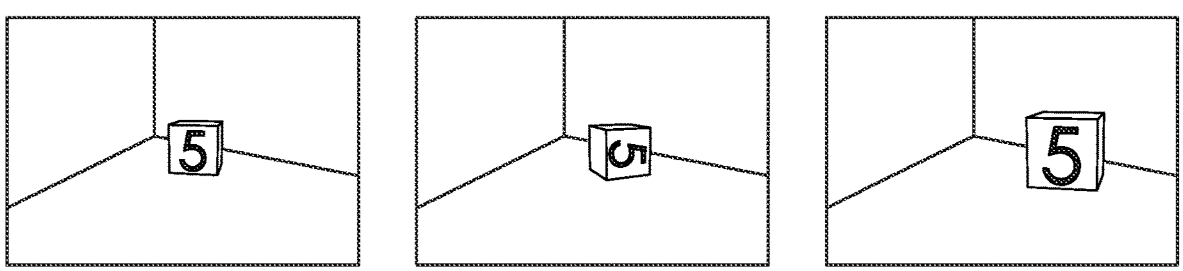

FIG. 58A illustrates a case in which invariance is required to distinguish the feature within an image.

Figure 58B:
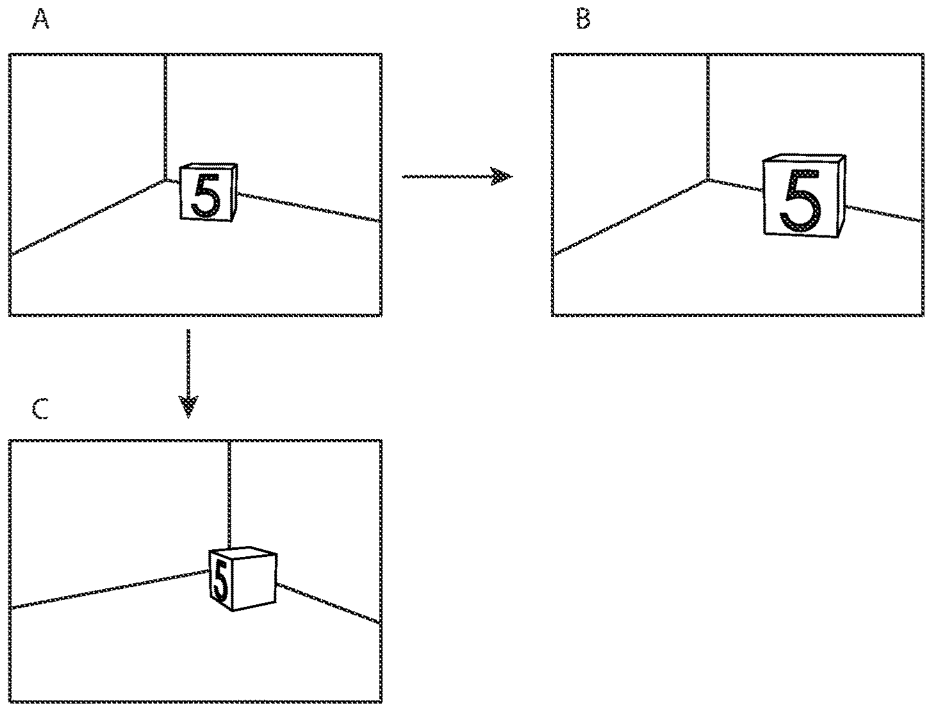

FIG. 58B illustrates a case in which invariance may be harmful.

Figure 59A:
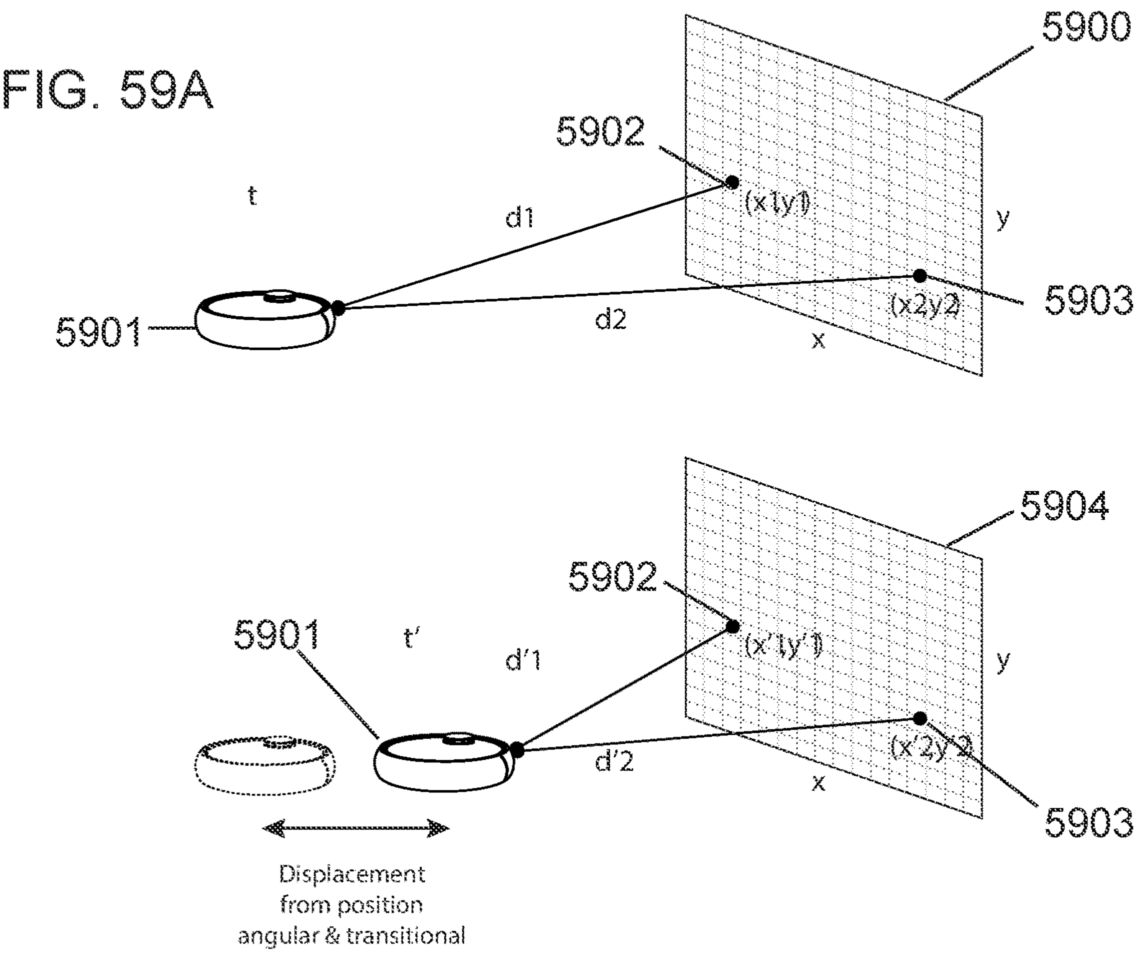

FIG. 59A illustrates sparse depth measurements.

Figure 59B:
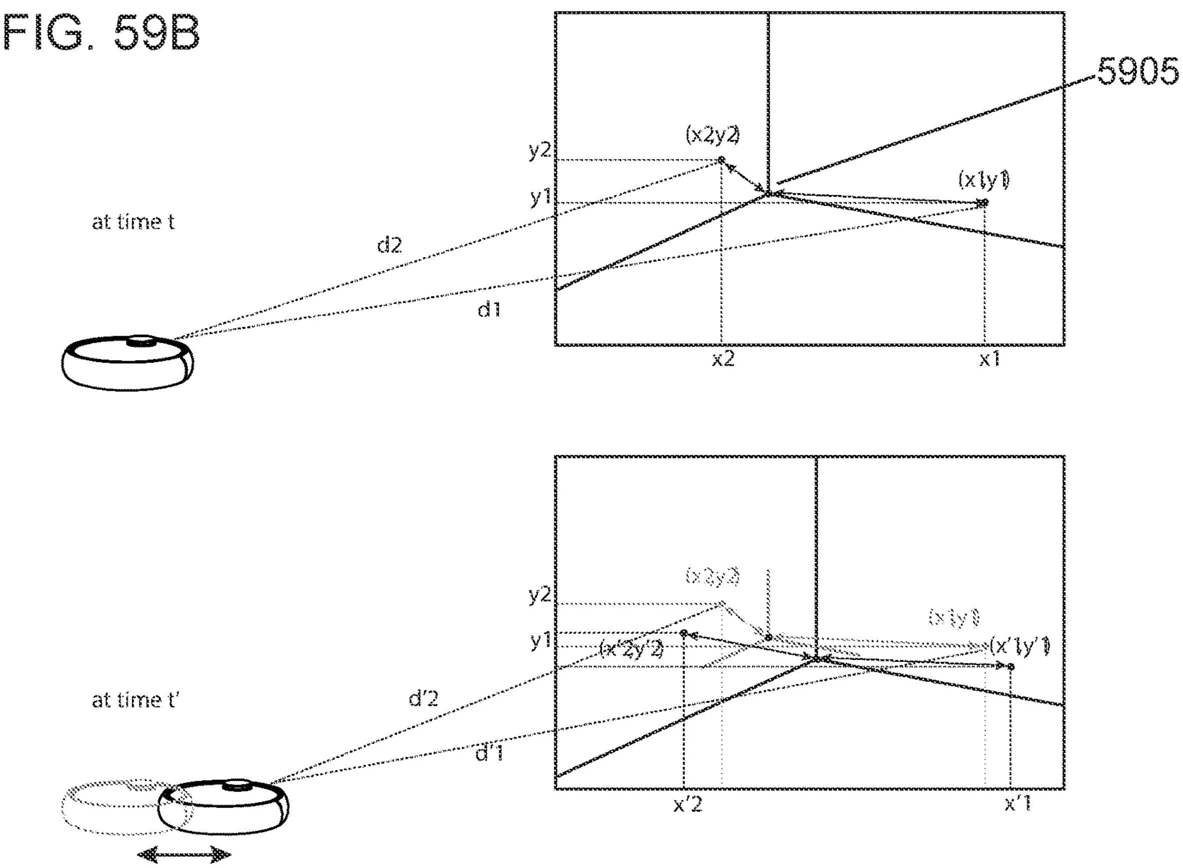

FIG. 59B illustrates extrapolation of depth measurements.

Figure 60:
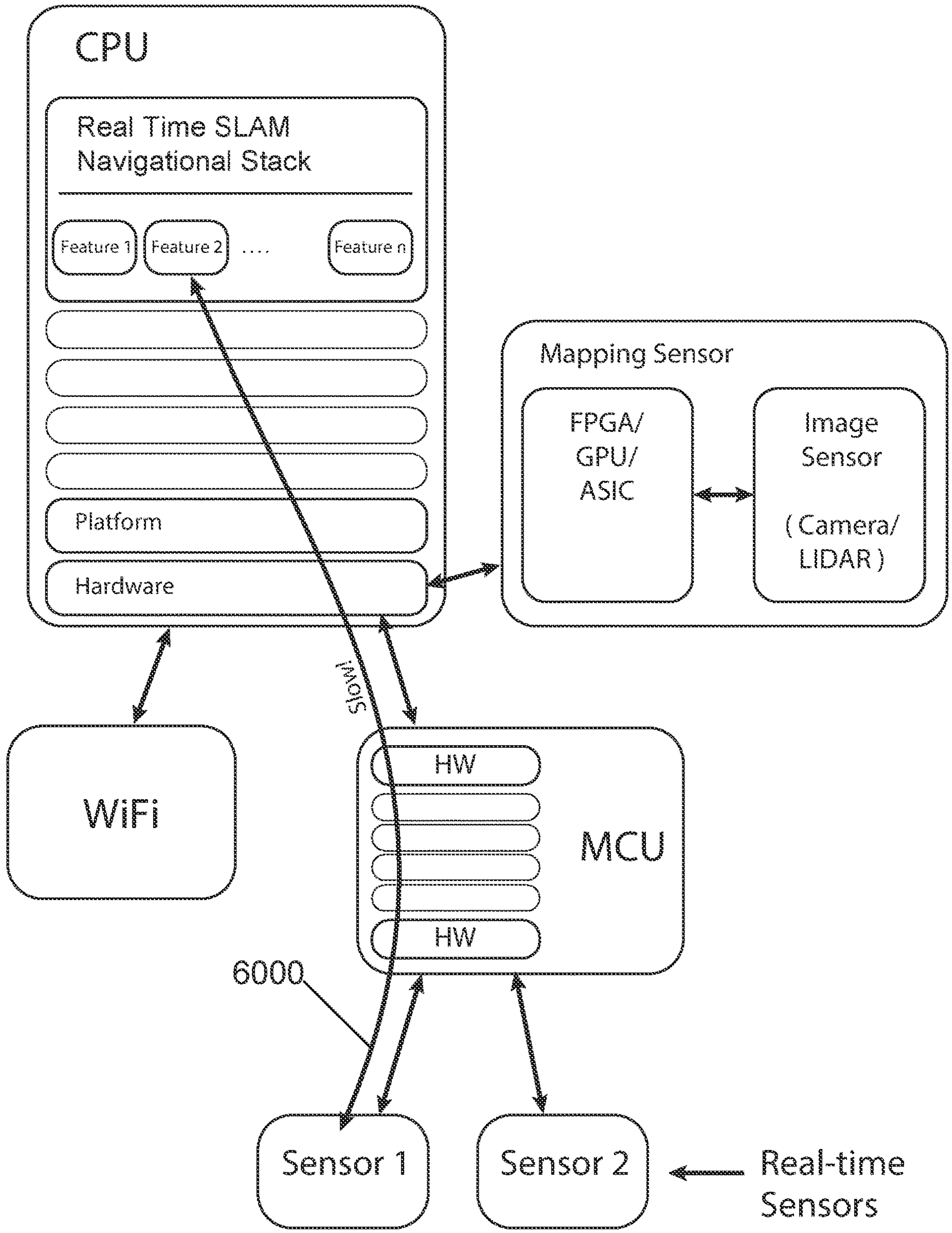

FIG. 60 illustrates slow data flow from sensors to CPU due to many levels of abstraction.

FIG. 61 illustrates a table comparing time to map an entire area.

Figure 62:
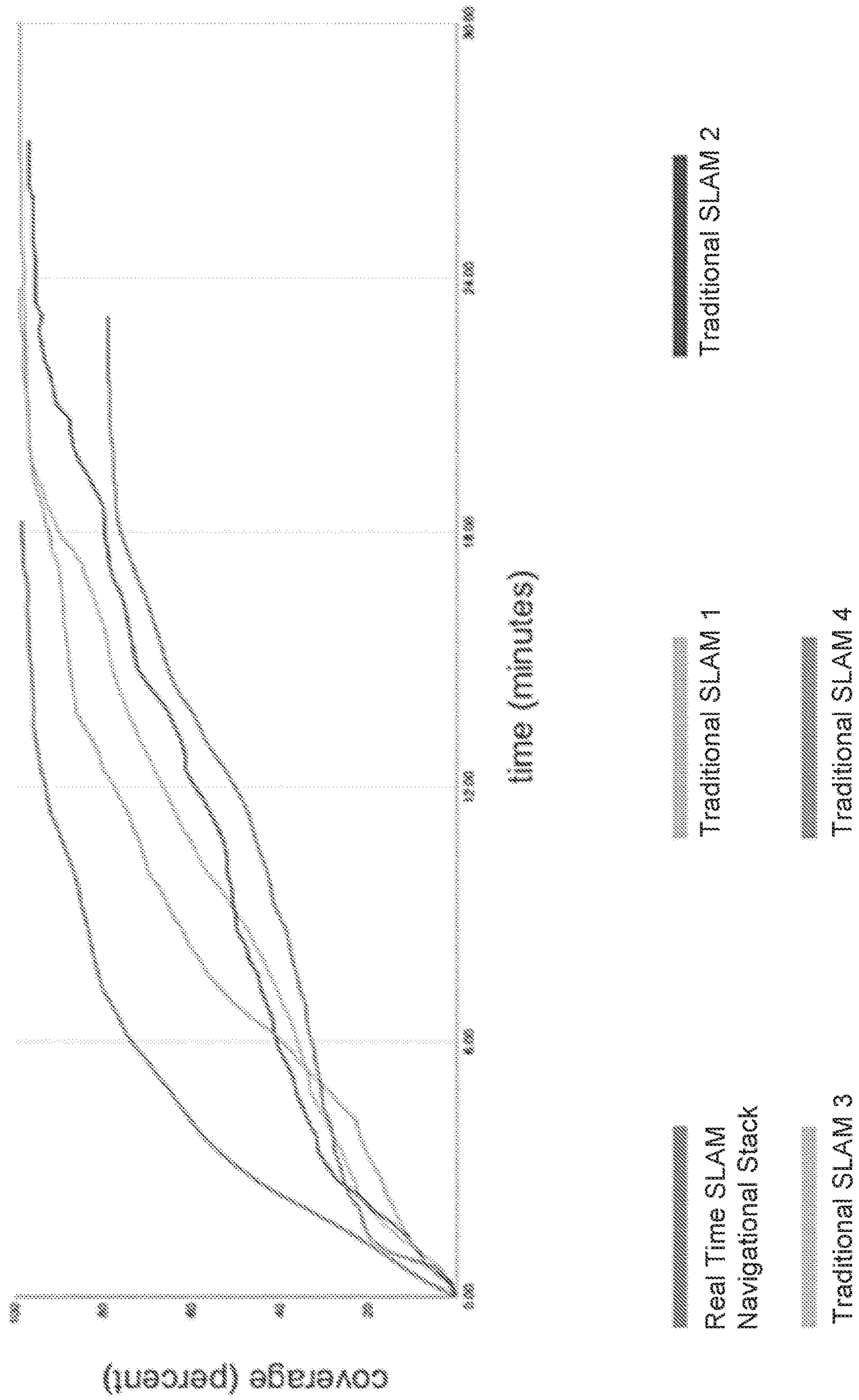

FIG. 62 illustrates room coverage percentage over time for a robot using Light Weight Real Time SLAM Navigational Stack and four robots using traditional SLAM methods.

Figure 63A:
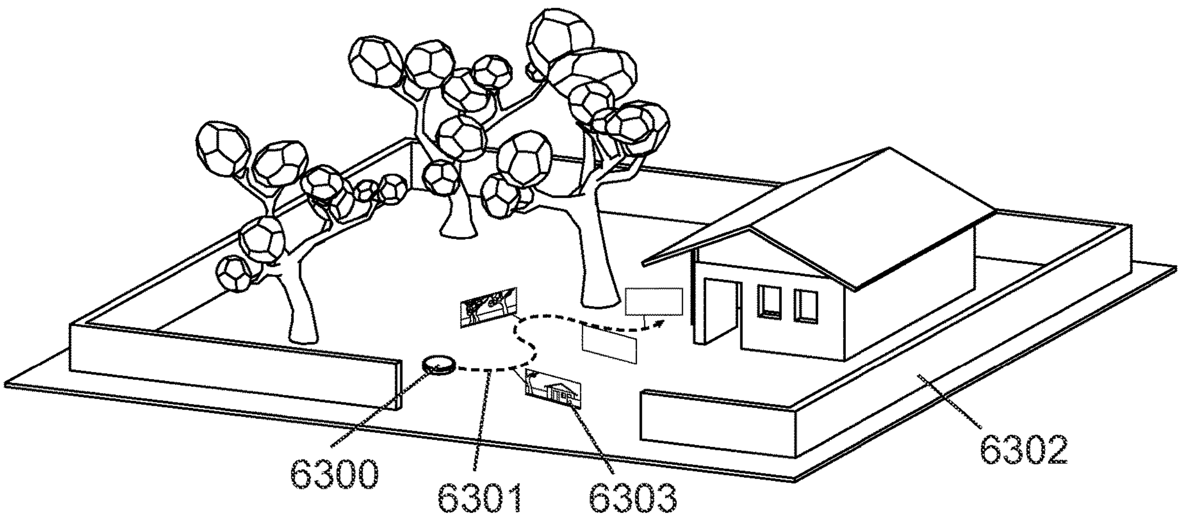
Figure 63B:
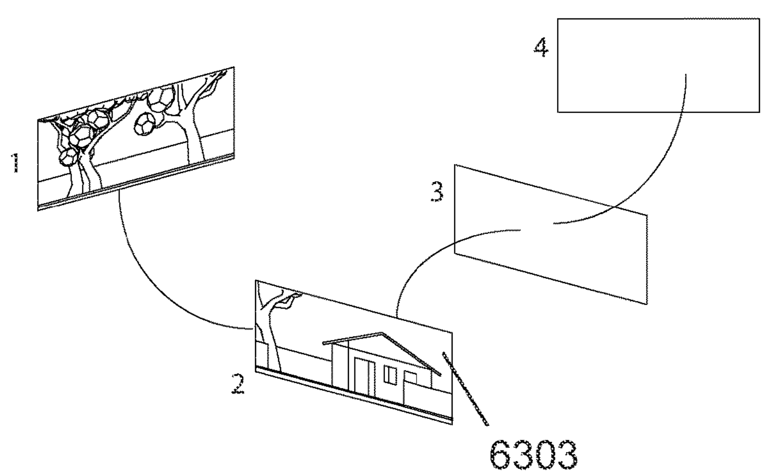

FIG. 63A-63B illustrate a robot capturing images along its trajectory.

Figure 64:
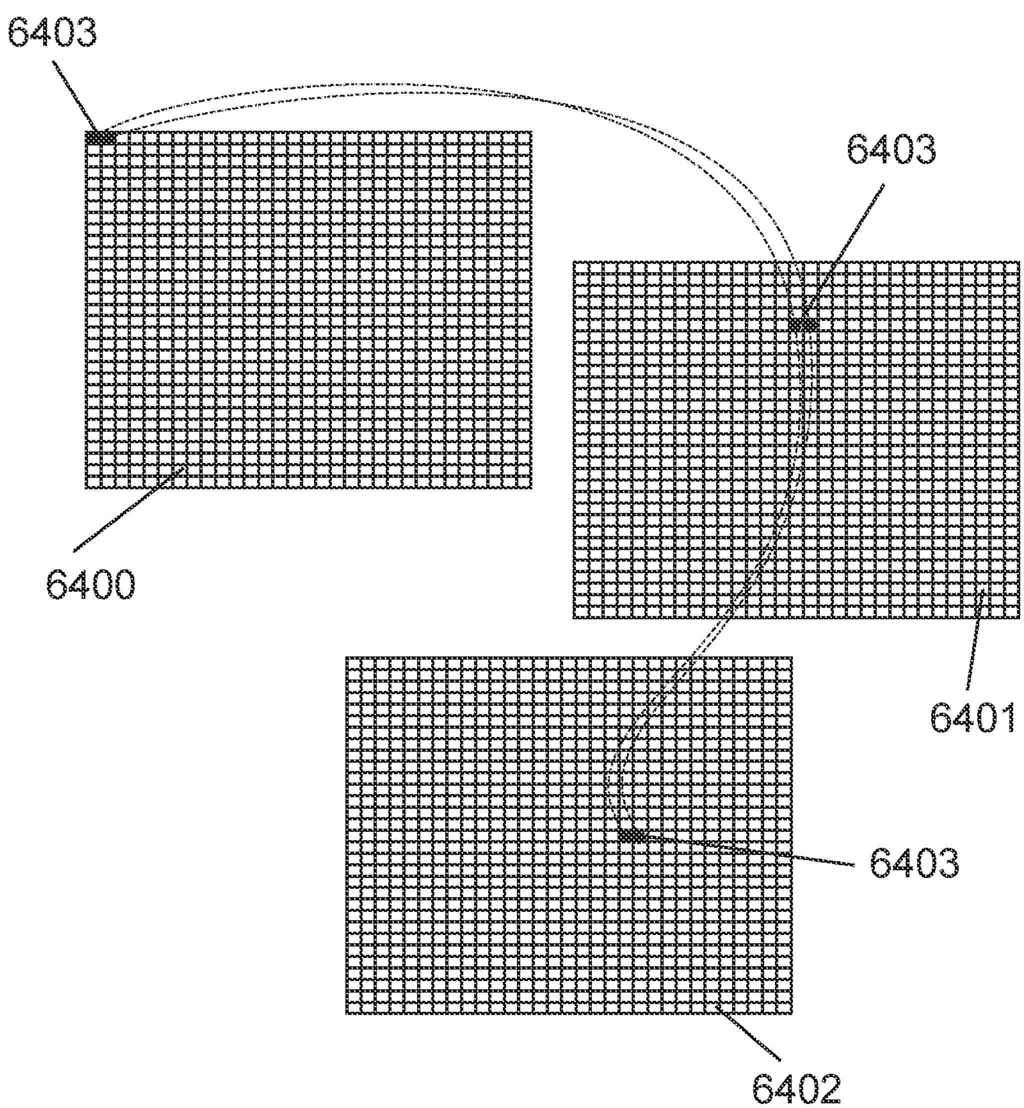

FIG. 64 illustrates three images captured during navigation of the robot and the position of the same pixels in each image.

Figure 65:
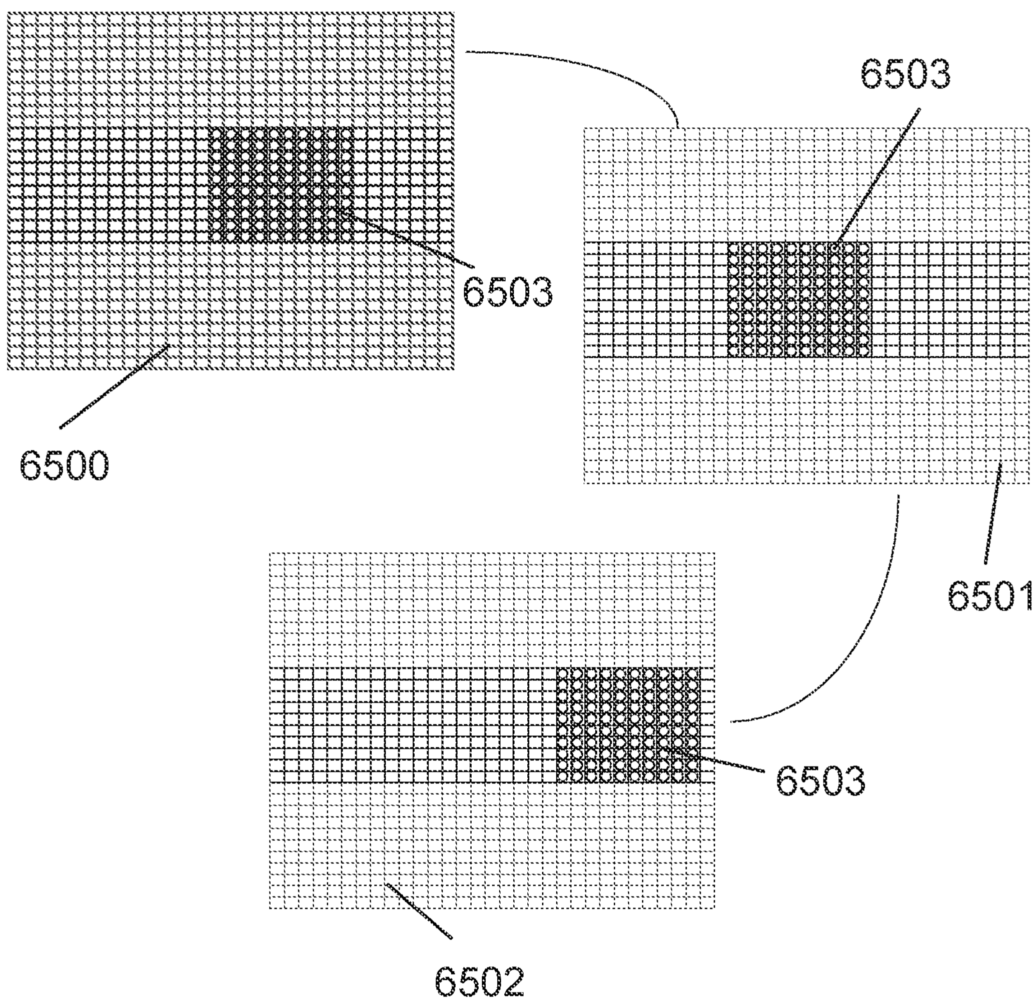

FIG. 65 illustrates three images captured during navigation of the robot and the same distances to objects in each image.

Figure 66A:
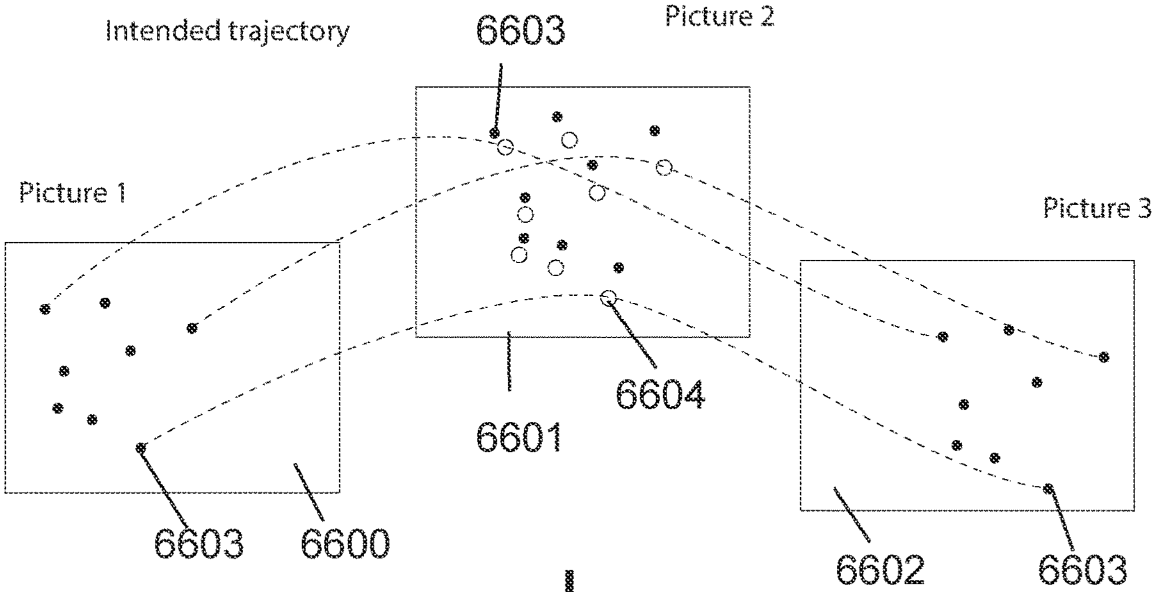
Figure 66B:
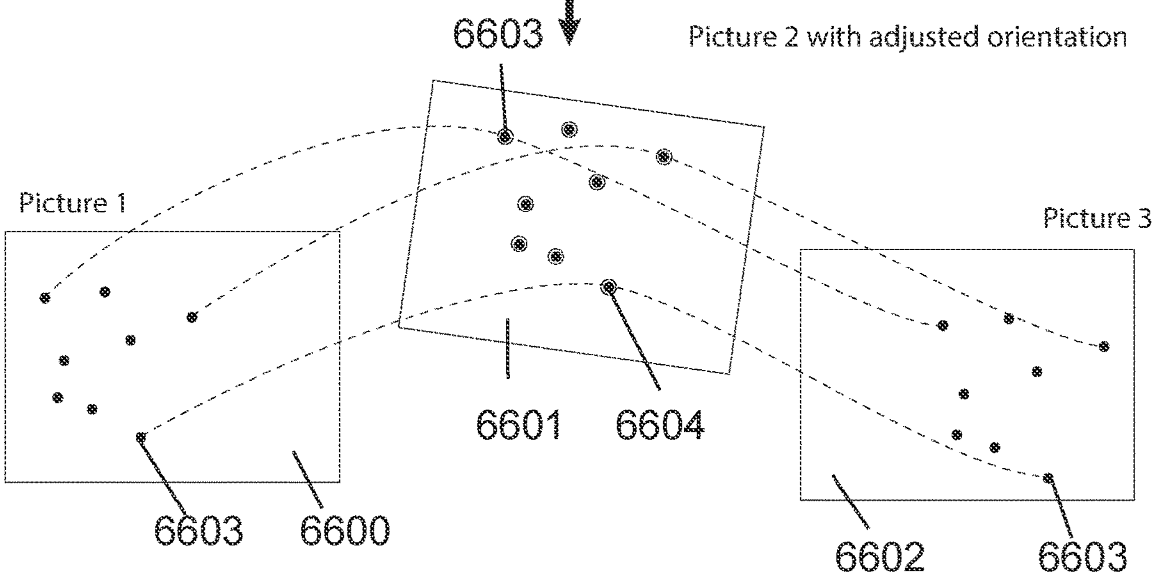

FIGS. 66A-66B illustrate orientation adjustment of an image in a stream of images based on the features in the image.

Figure 67:
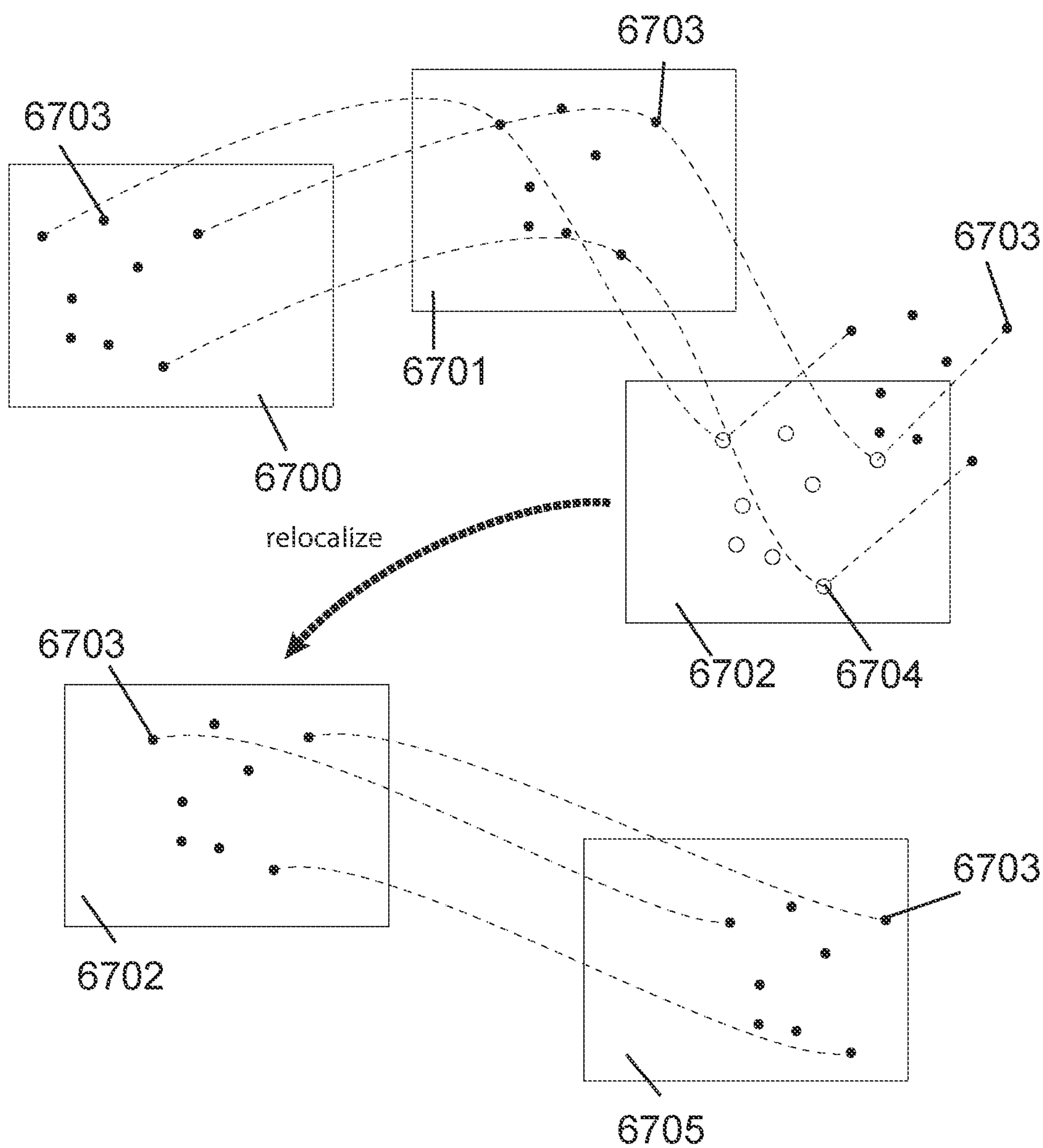

FIG. 67 illustrates the process of relocalization based on the features location in captured images.

Figure 68:
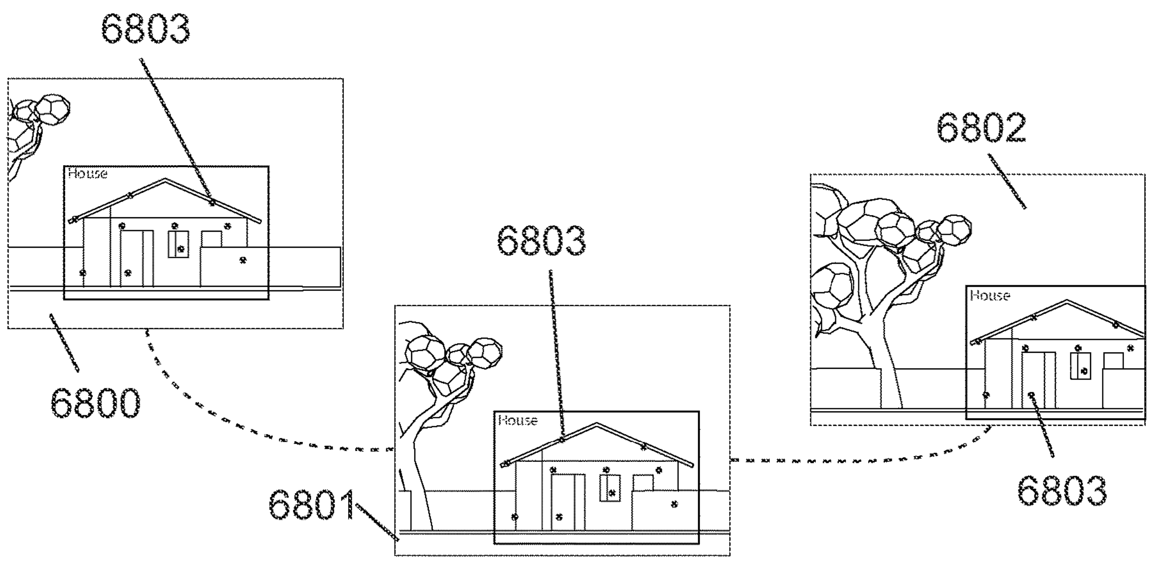

FIG. 68 illustrates the process of object identification based on depth data.

Figure 69A:
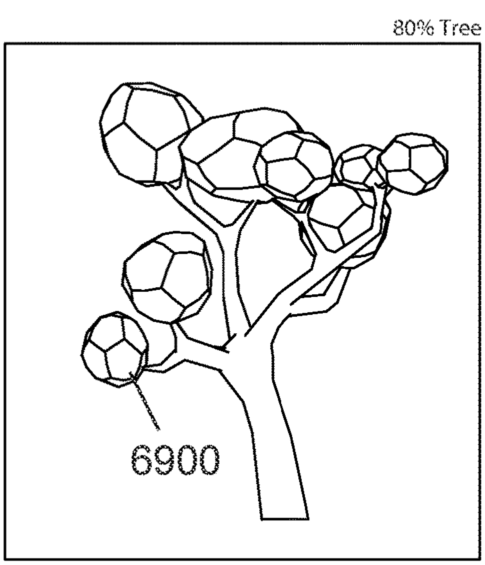
Figure 69B:
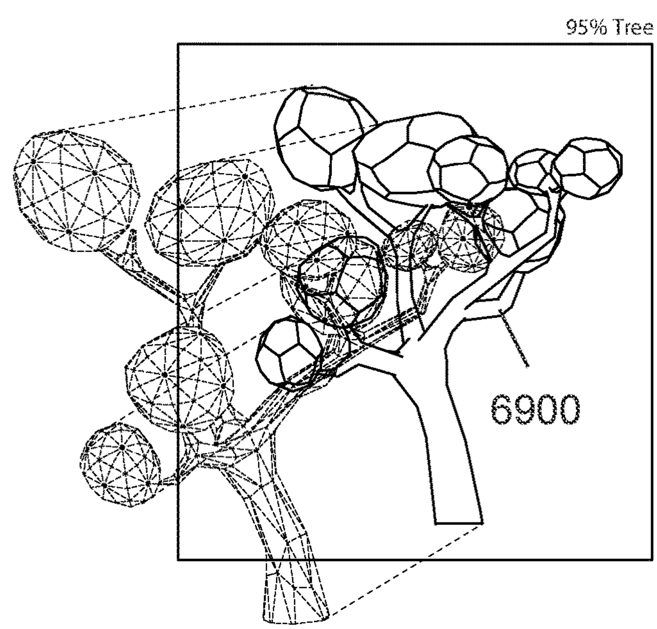

FIGS. 69A-69B illustrate feature identification based on 2D image features and depth data.

Figure 70A:
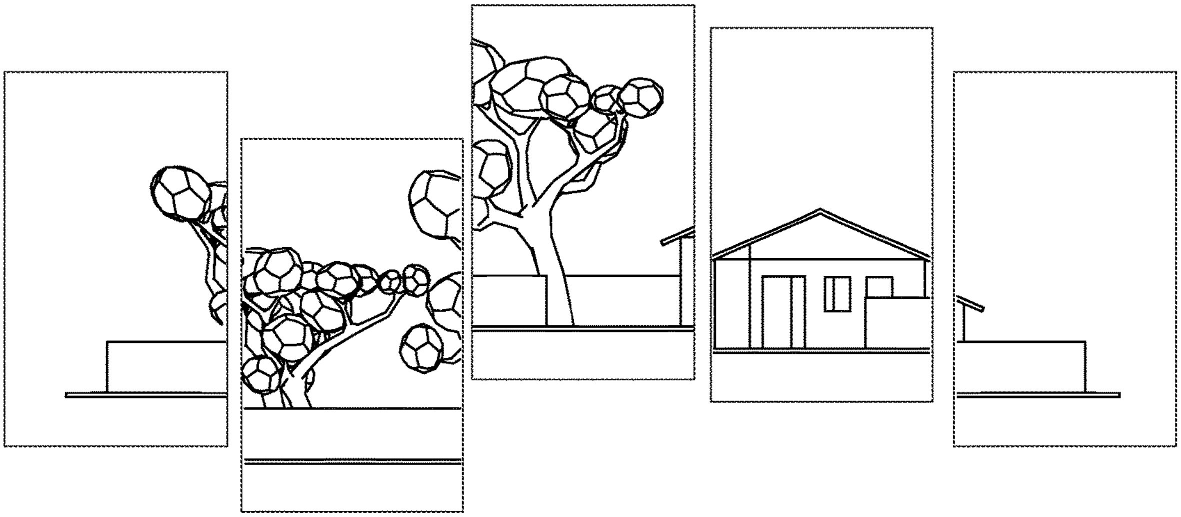
Figure 70B:
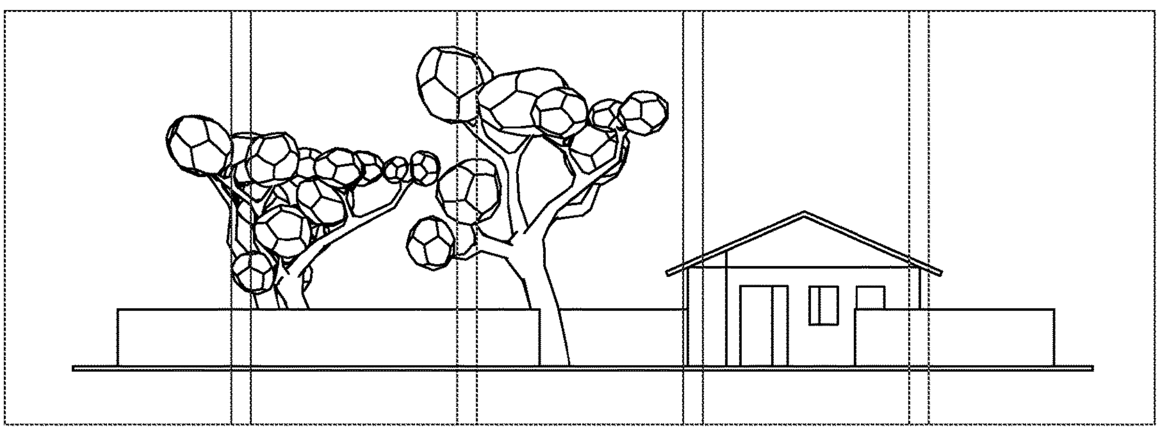
Figure 70C:
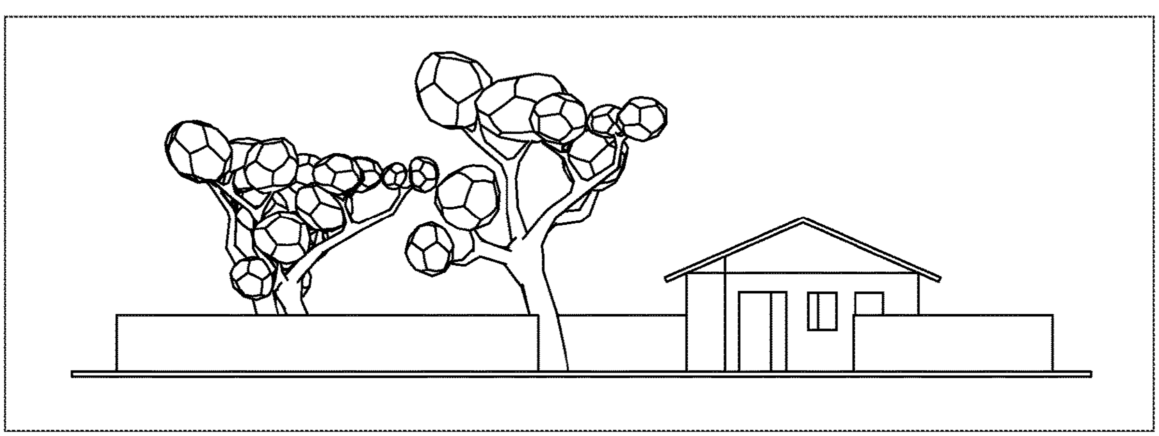

FIGS. 70A-70C illustrate the process of aligning and stitching images captured along robot's navigation.

Figure 71:
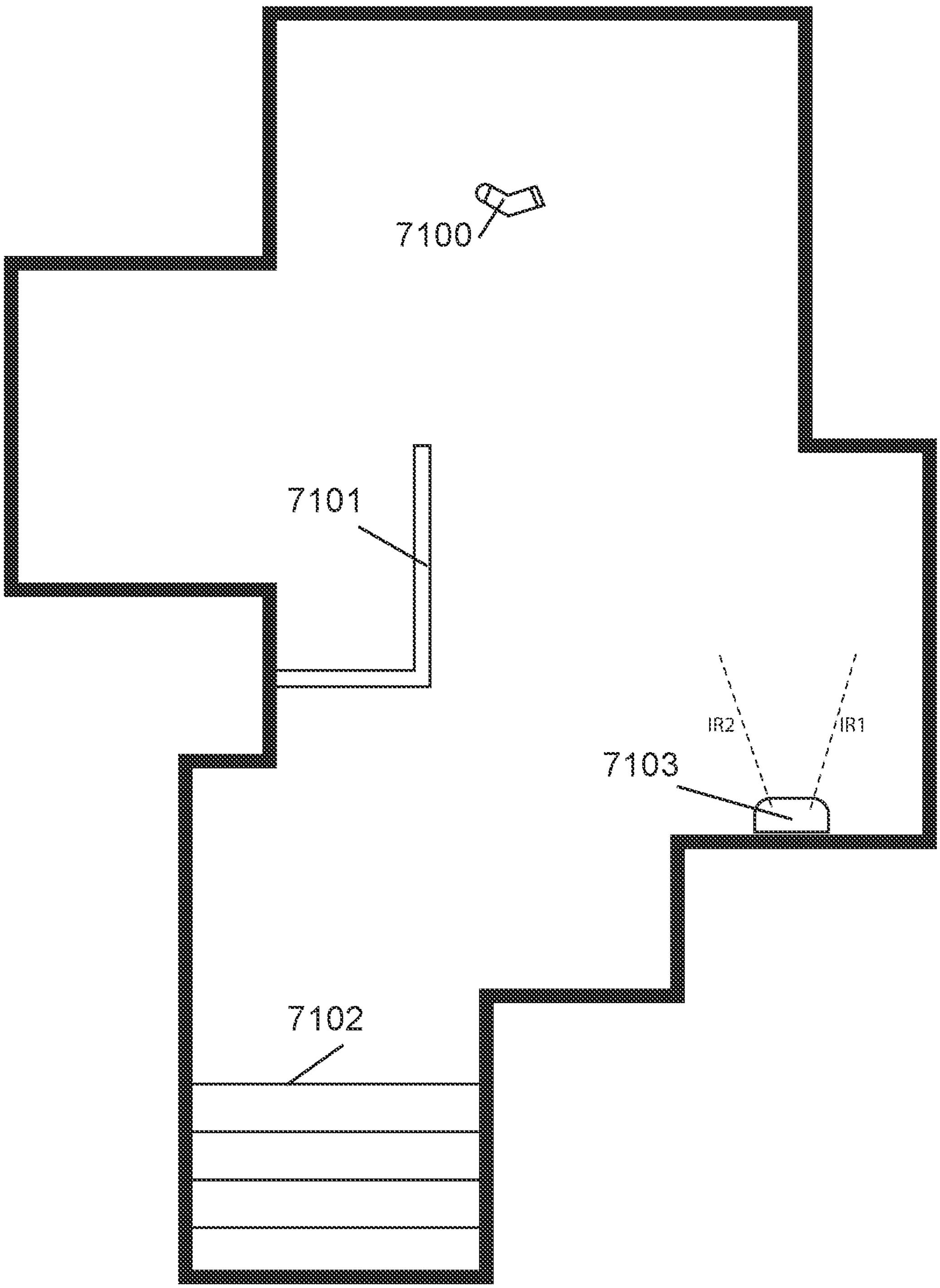

FIG. 71 illustrates four different types of information that may be added to the map.

Figure 72:
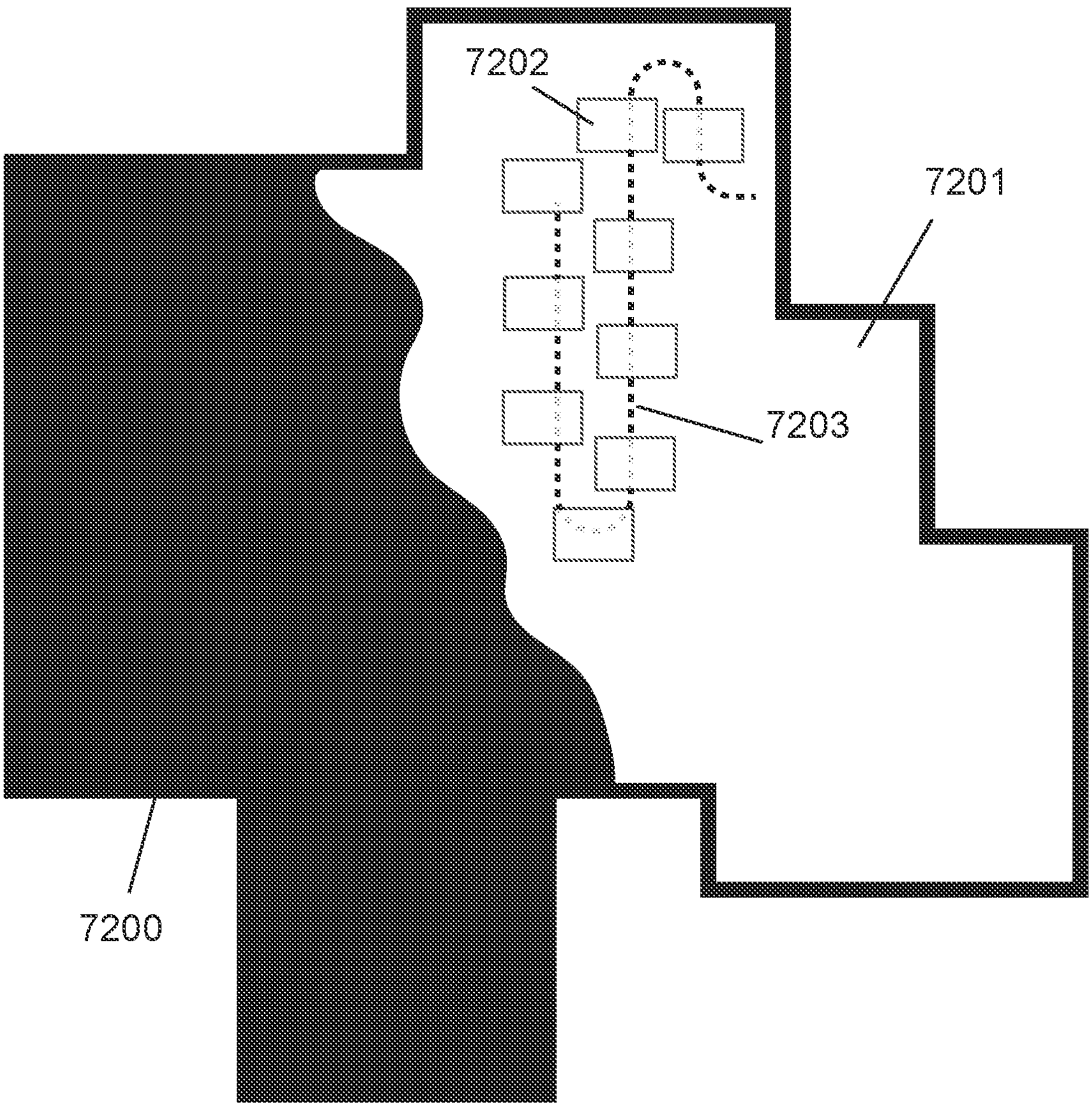

FIG. 72 illustrates an example of a map including undiscovered area and mapped area.

Figure 73A:
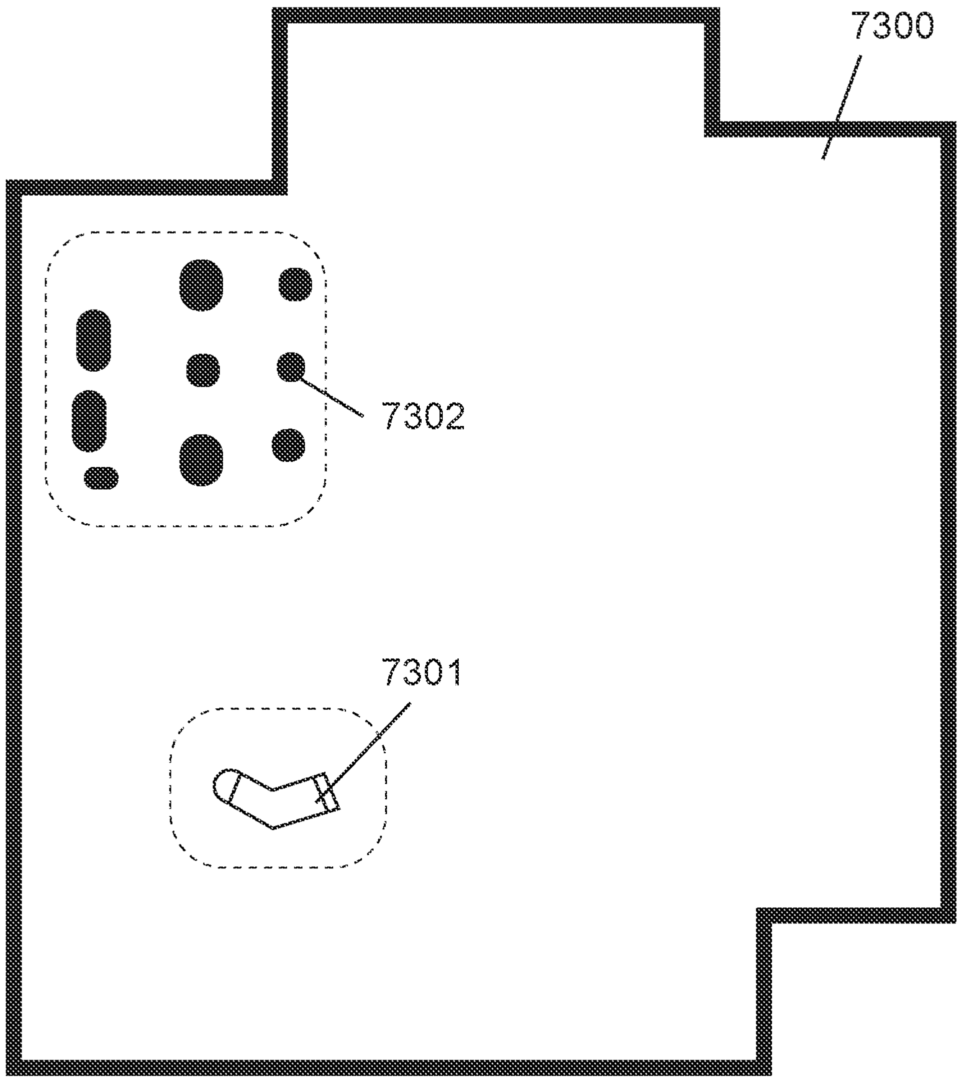

FIG. 73A illustrates an example of a map of an environment including the location of object and high obstacle density area.

Figure 73B:
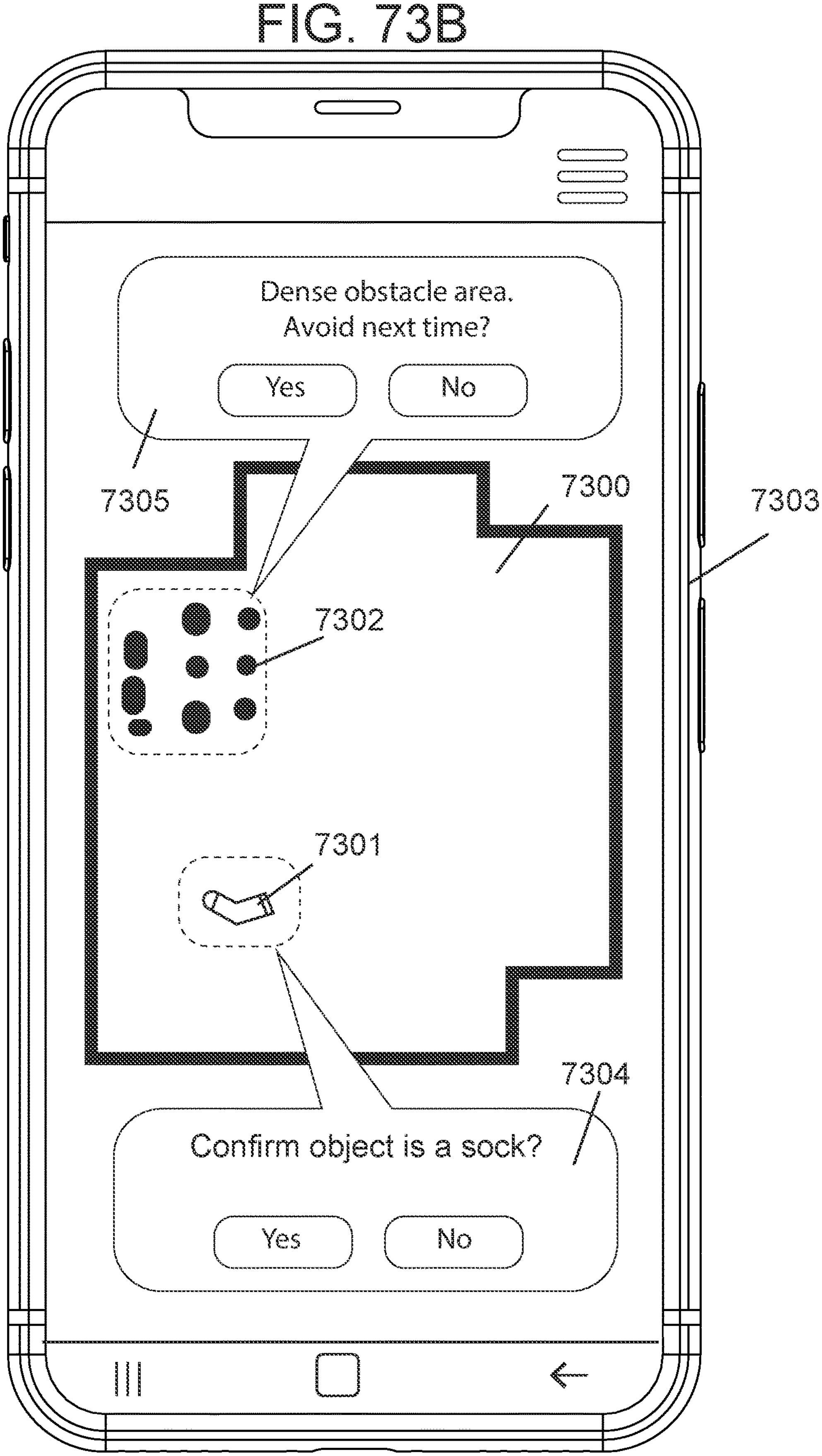

FIG. 73B illustrates the map viewed using an application of a communication device.

Figure 74A:
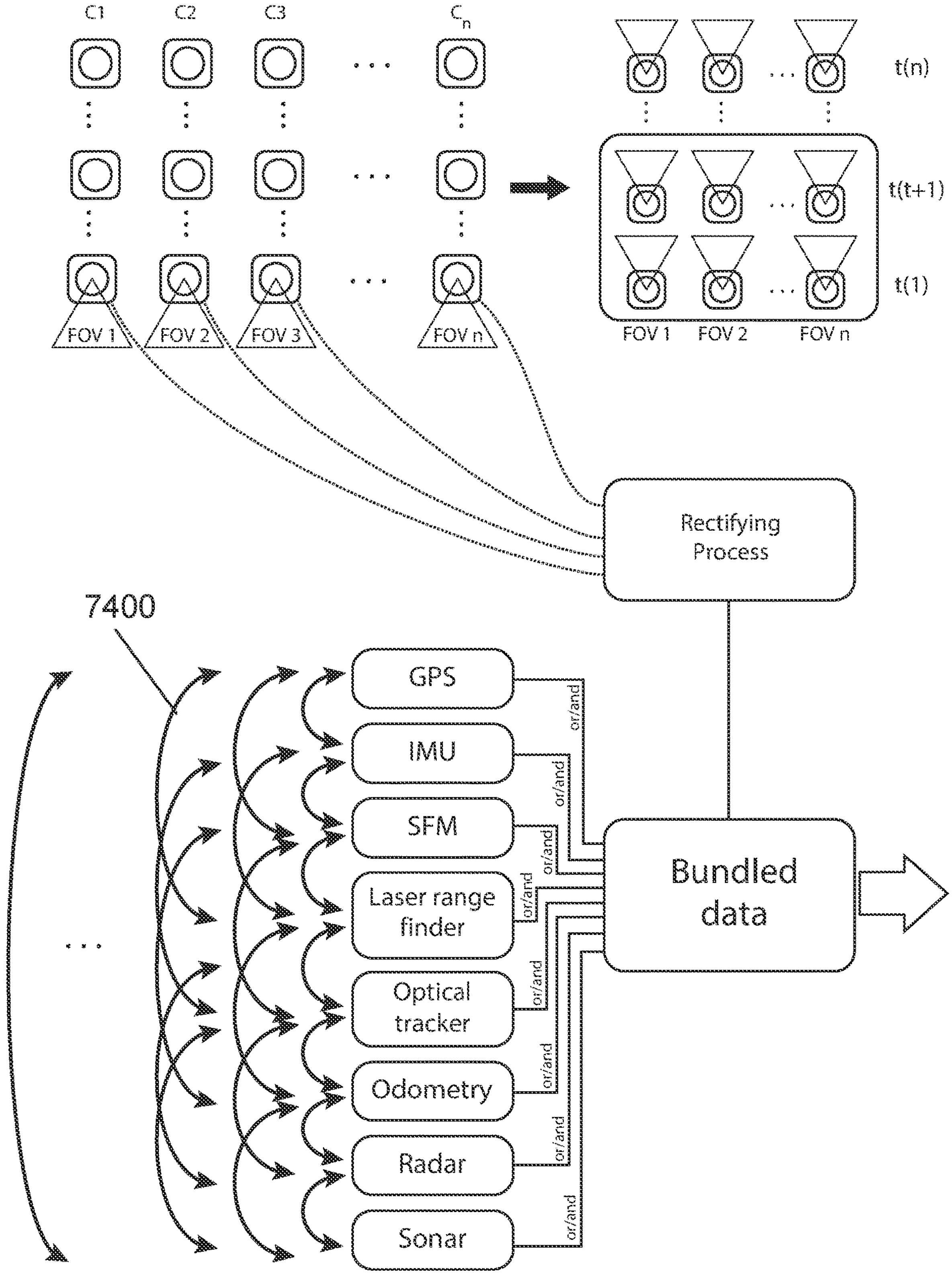

FIG. 74A illustrates several camera outputs being bundled with other sensors data.

Figure 74B:
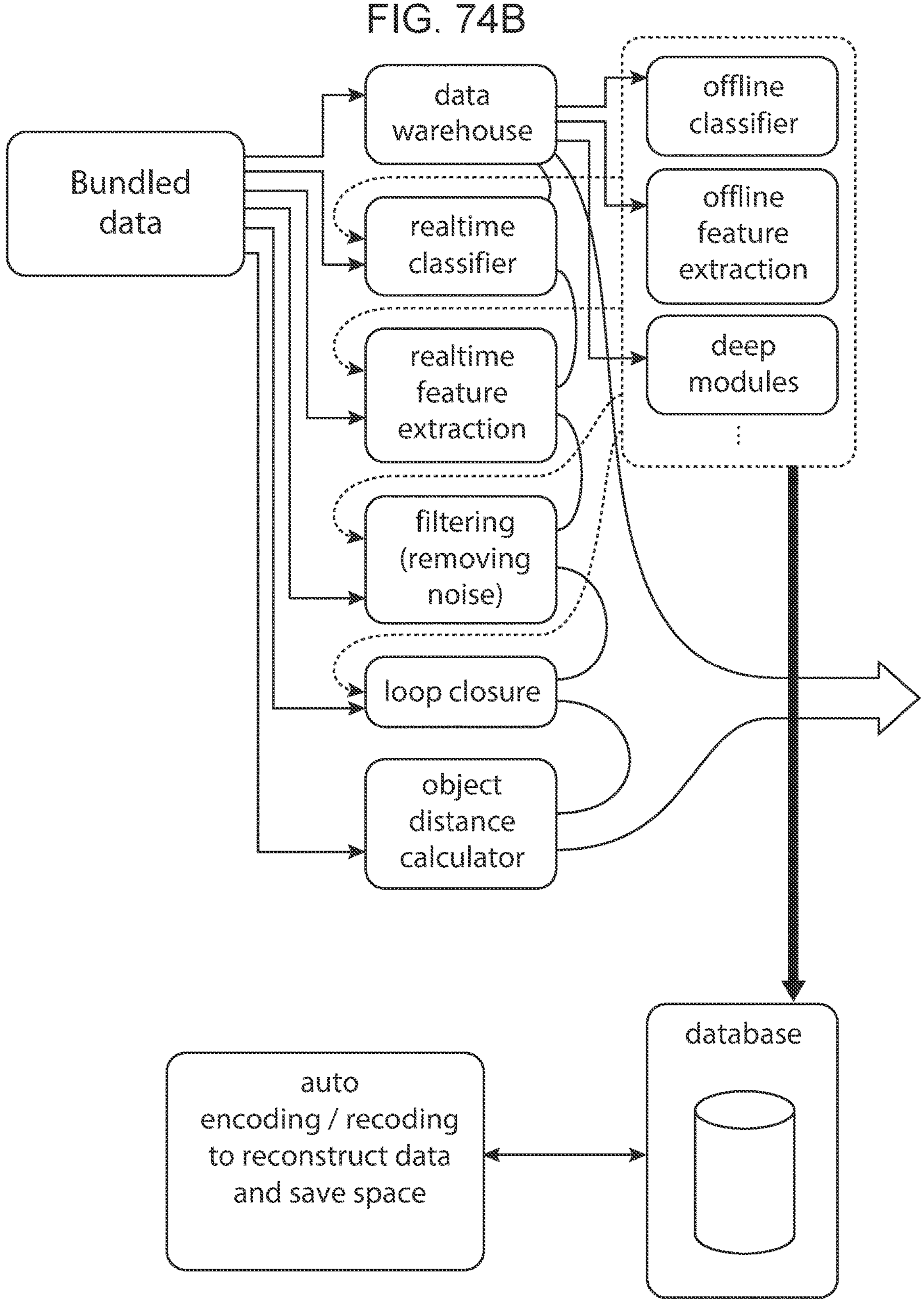
Figure 74C:
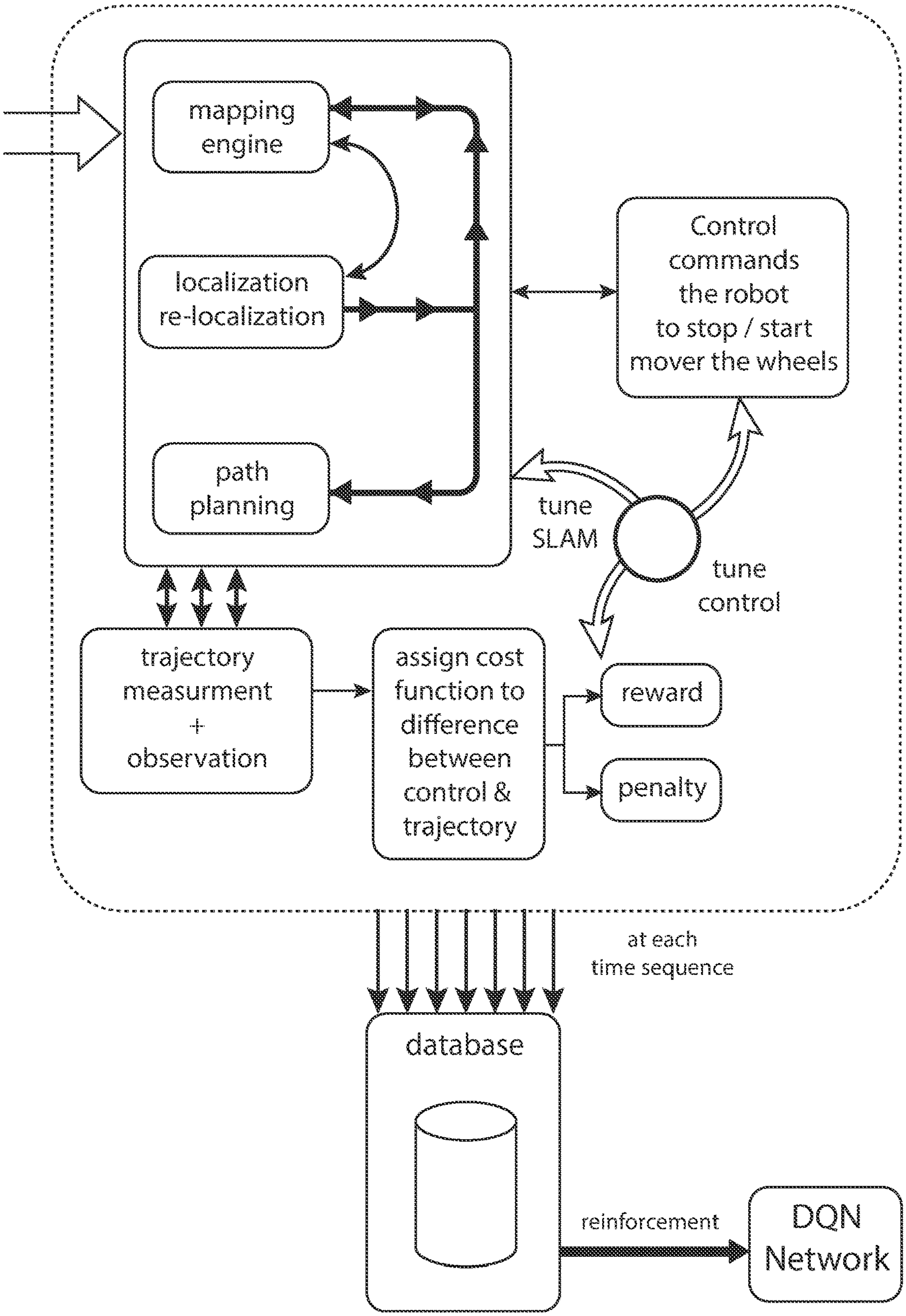

FIGS. 74B-74C illustrate the flow of bundled data within the robotic device system.

Figure 75:
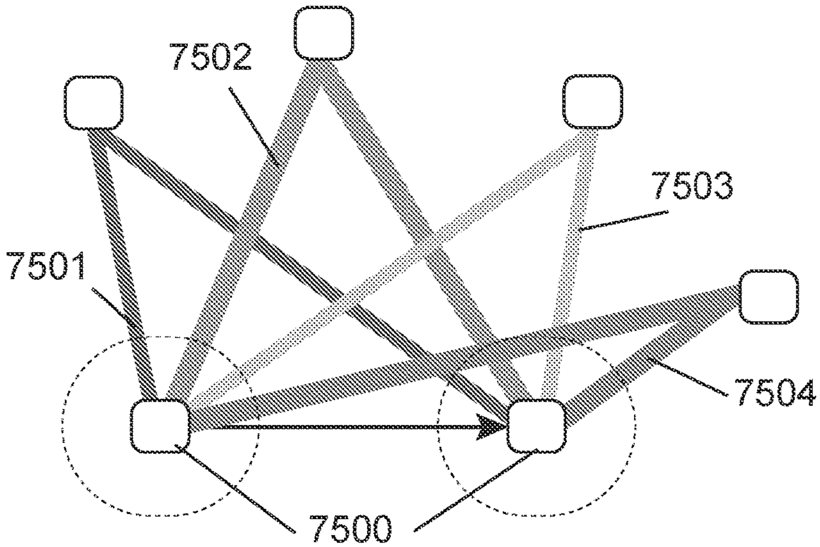

FIG. 75 illustrates imaginary rays connecting centers of cameras and corresponding with bundles.

Figure 76A:
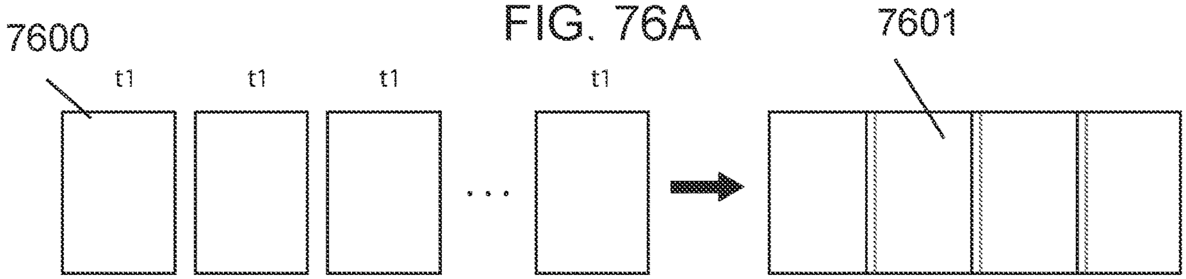

FIG. 76A illustrates stitching data captured at different time slots.

Figure 76B:
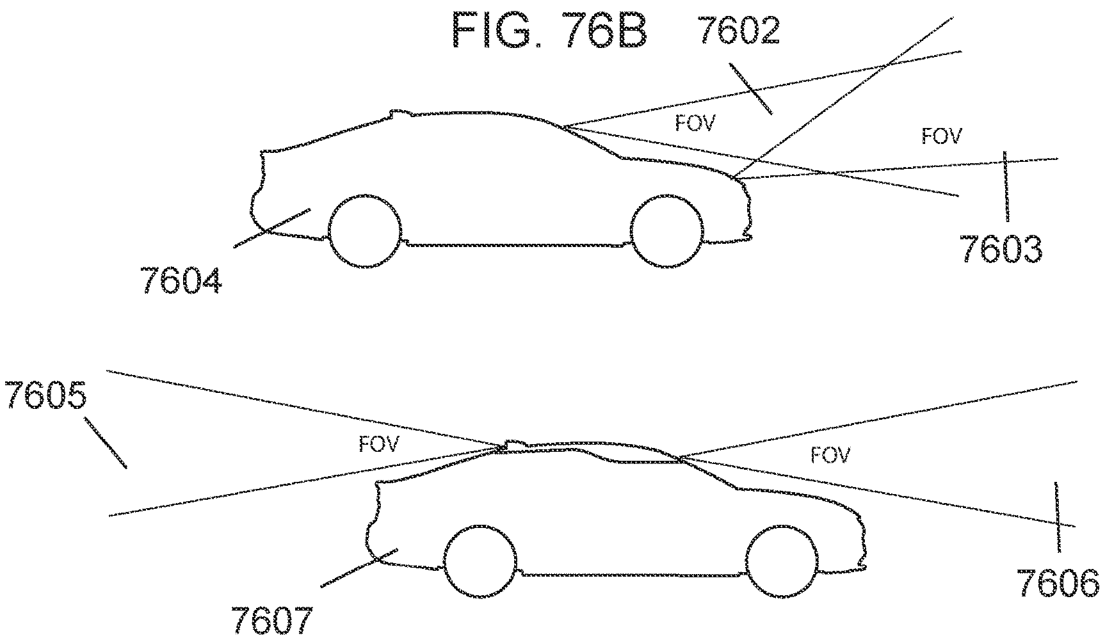

FIG. 76B illustrates example of overlapping and non-overlapping sensor fields of view.

Figure 76C:
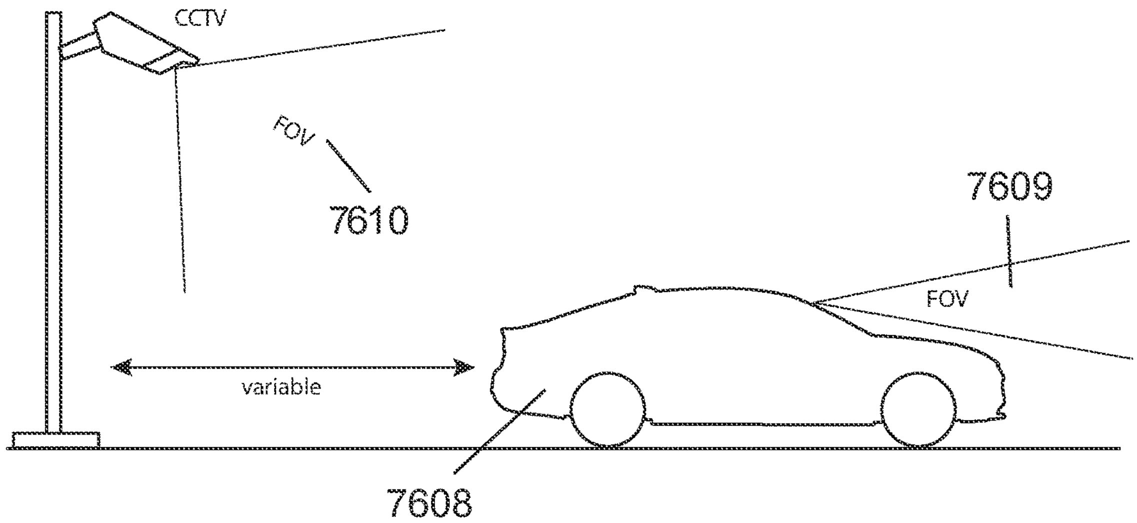

FIG. 76C illustrates one stationary camera and one camera on the moving device.

Figure 76D:
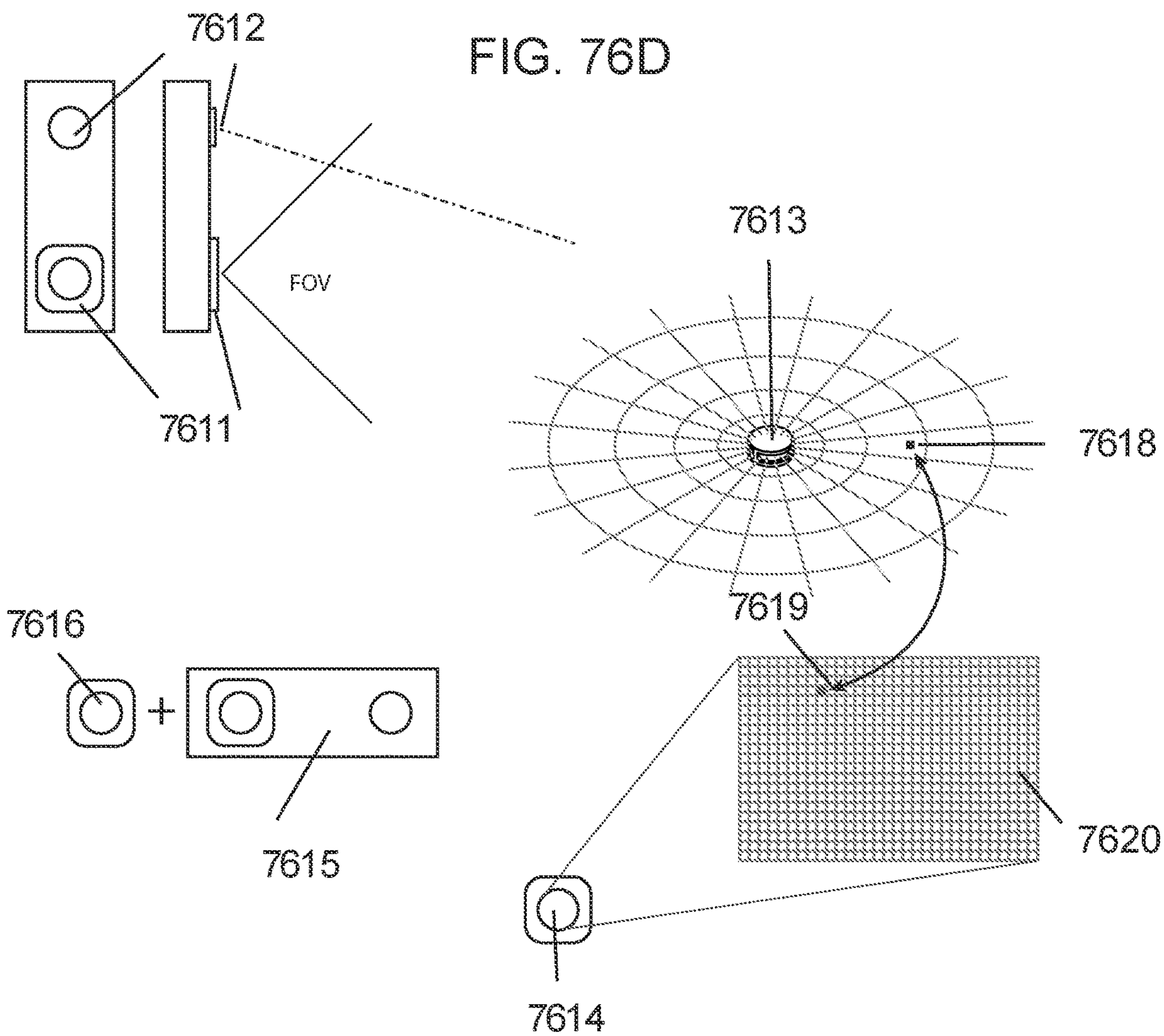

FIG. 76D illustrates a single device including a camera and a laser.

Figure 76E:
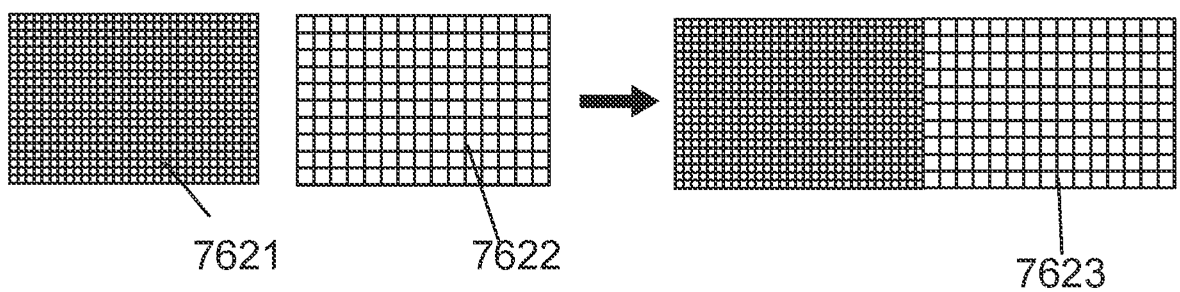

FIG. 76E illustrates data with high resolution and data with low resolution and their combination.

Figure 76F:
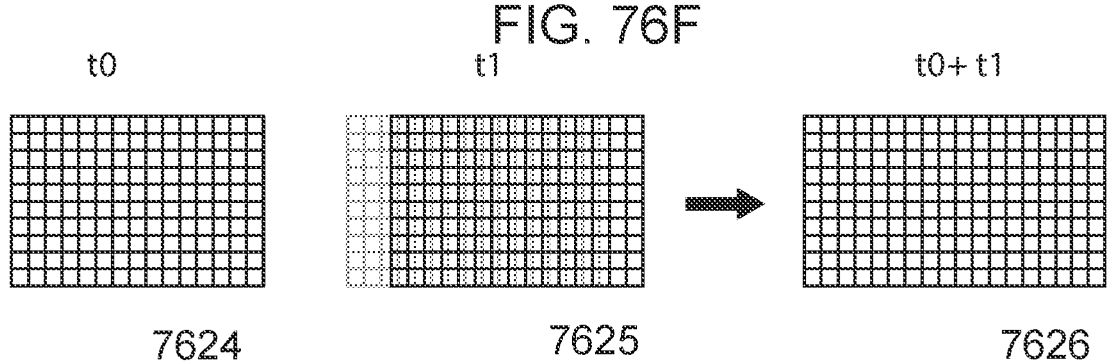

FIG. 76F illustrates data captured in 2 time slots and their combination.

Figure 77A:
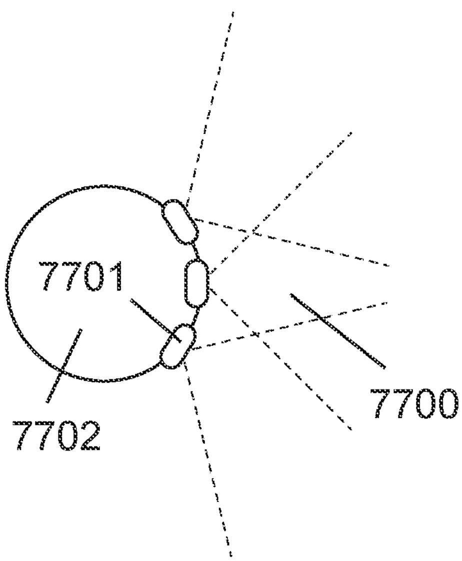
Figure 77B:
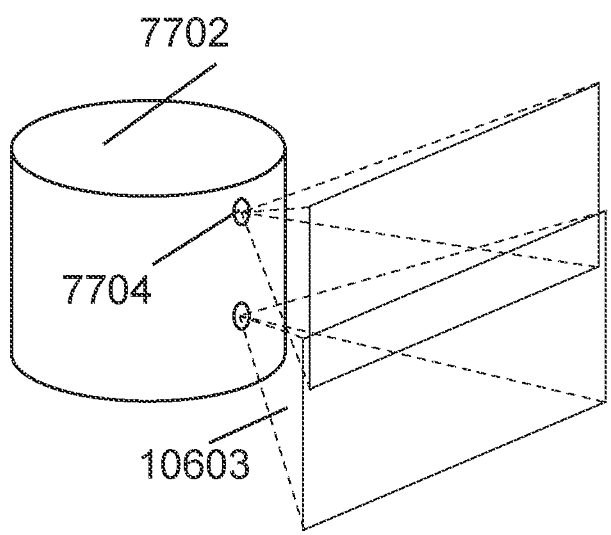
Figure 77C:
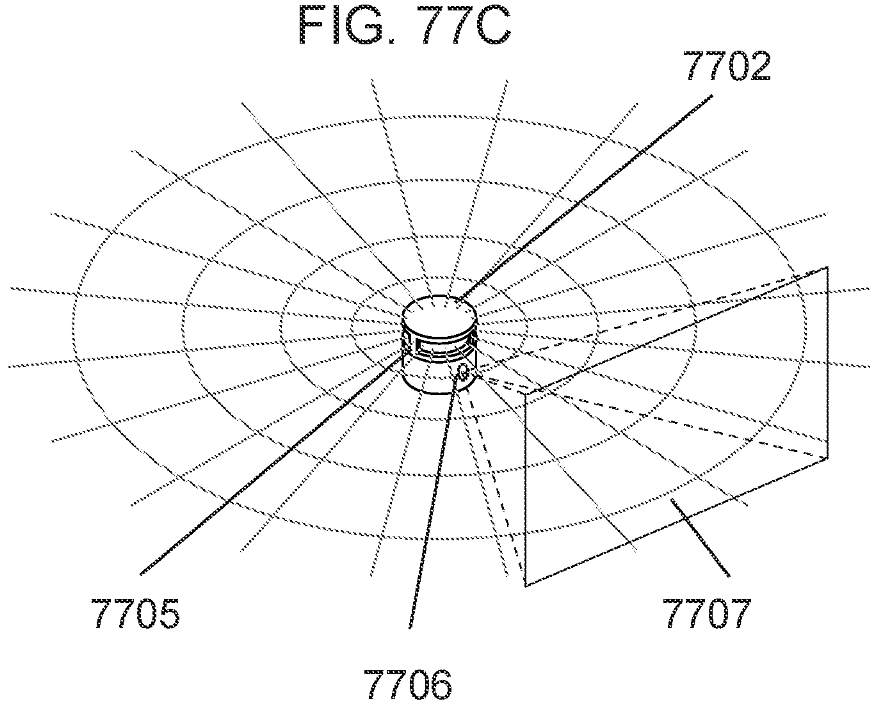

FIGS. 77A-77C illustrate examples of cameras, sensors and LIDAR with overlapping field of views.

Figure 78A:
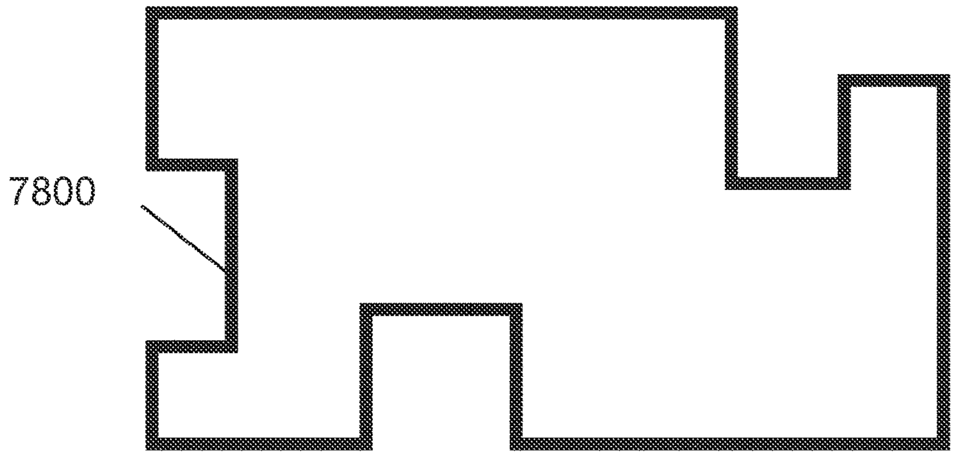
Figure 78B:
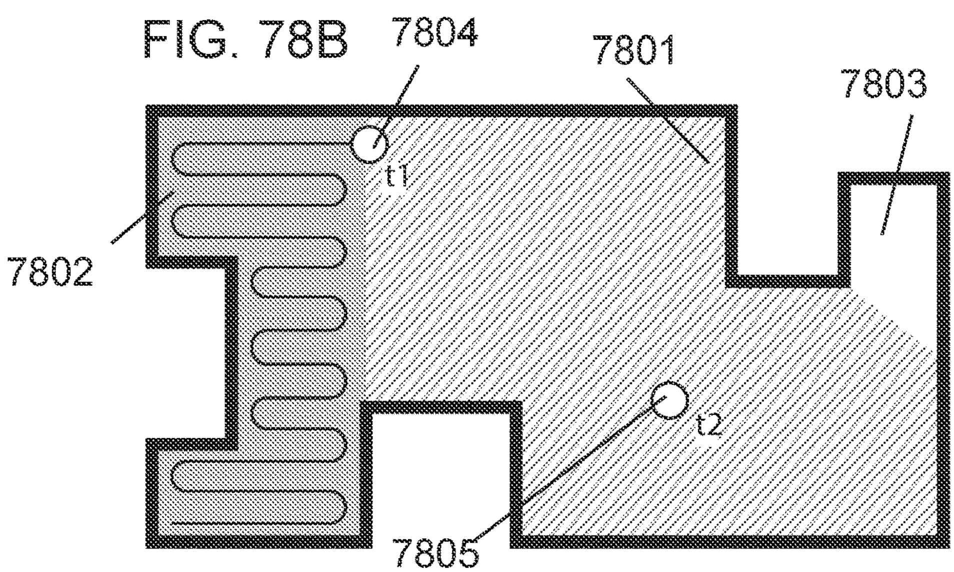
Figure 78C:
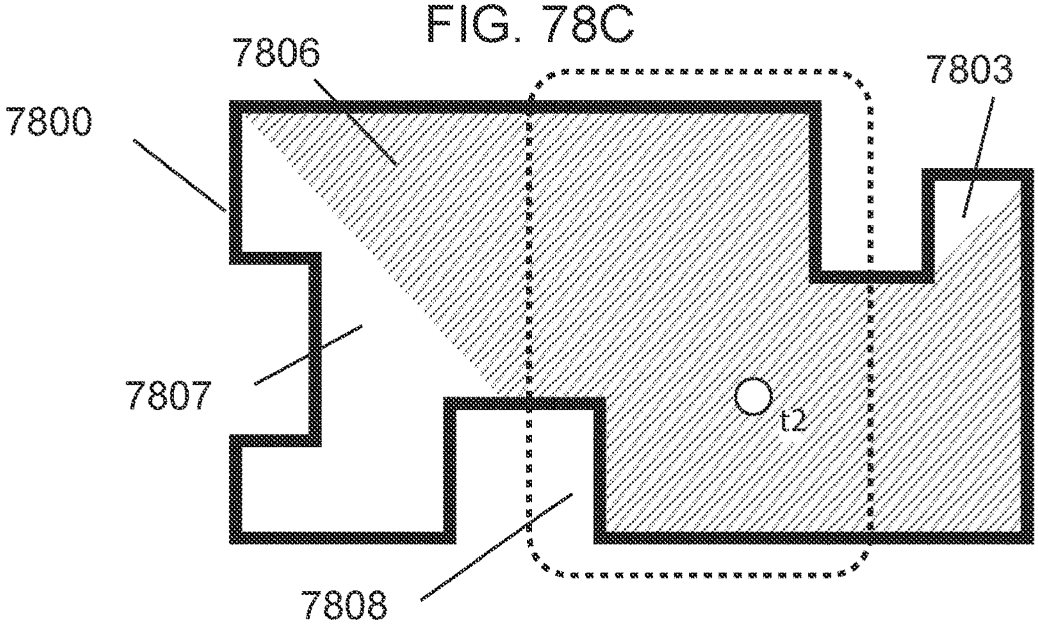

FIGS. 78A-78C illustrates a workspace, including mapped, covered and undiscovered areas.

Figure 79:
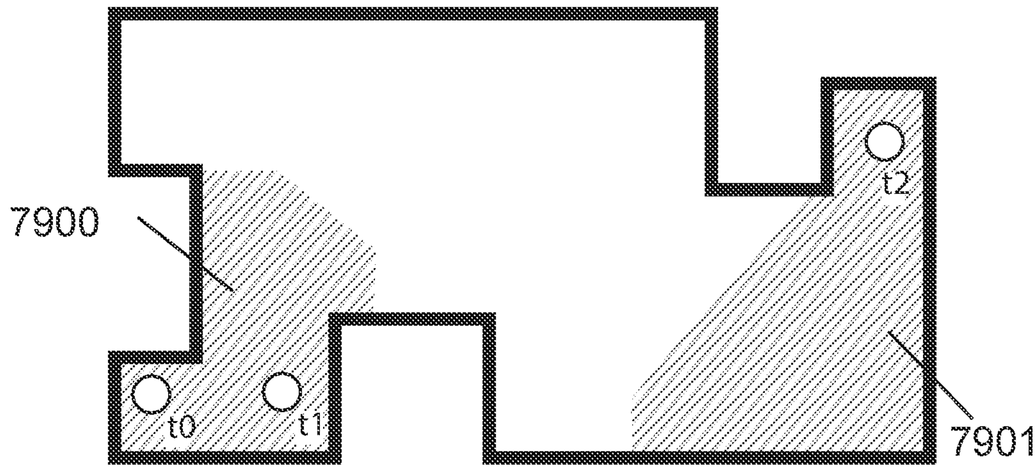

FIG. 79 illustrates a position of the robot at two different time points.

Figure 80:
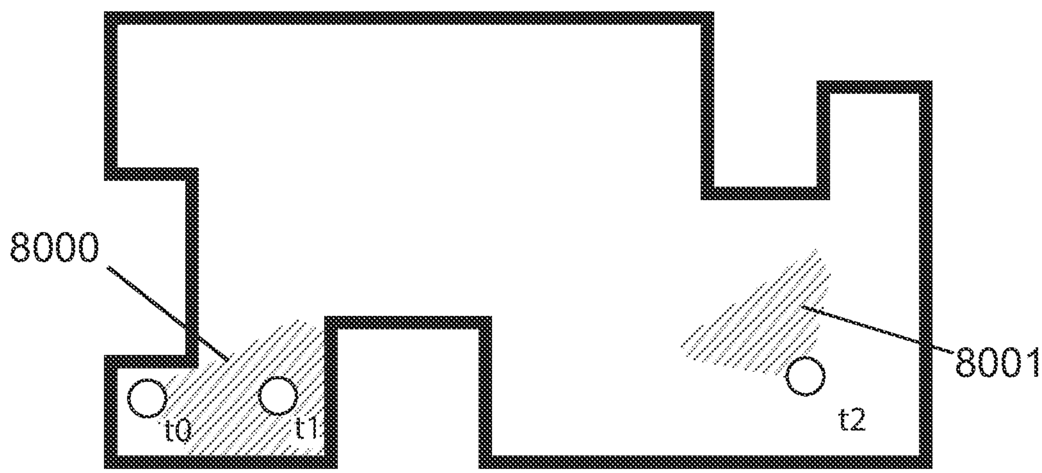

FIG. 80 illustrates an example of areas observed by a processor of the robot with a covered camera of the robot at different time points.

Figure 81:
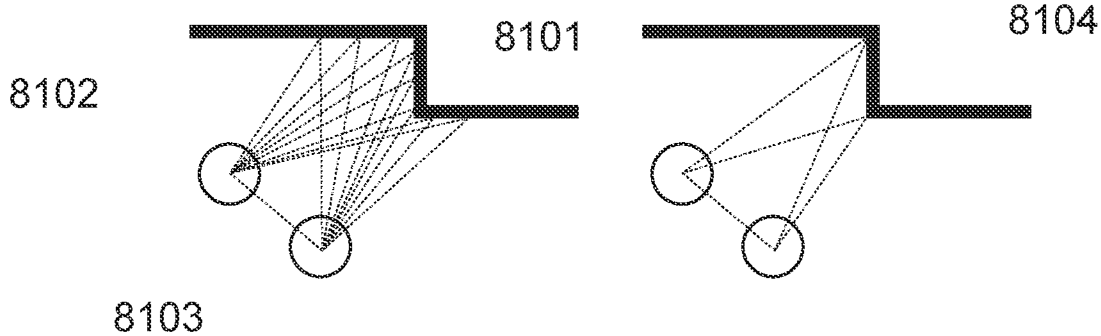

FIG. 81 illustrates an example of sparsification.

Figure 82:
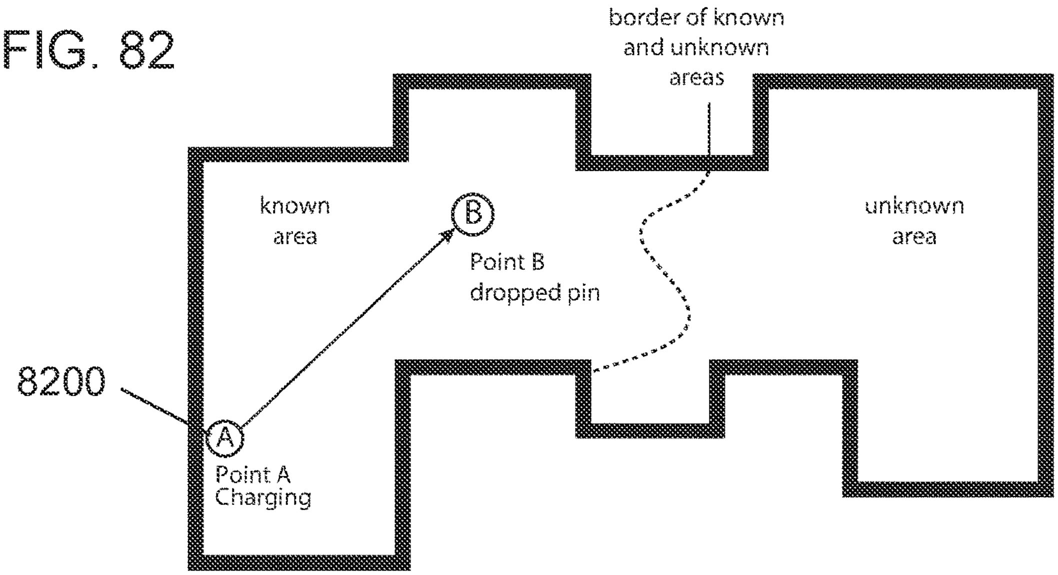

FIG. 82 illustrates a robot tasked to navigate from point A to point B without the processor knowing the entire map.

Figure 83:
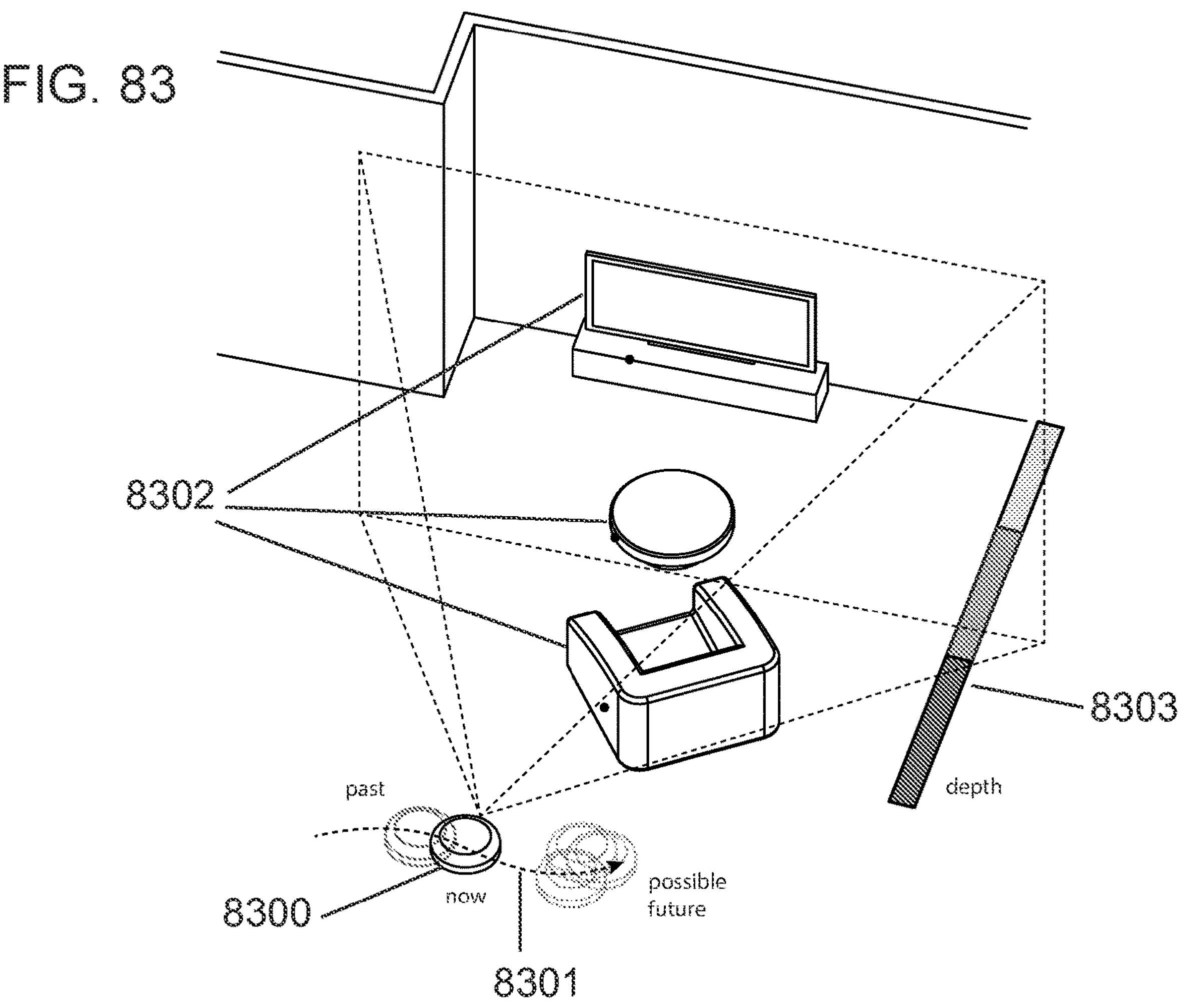

FIG. 83 illustrates a robot and its trajectory within an environment.

Figure 84:
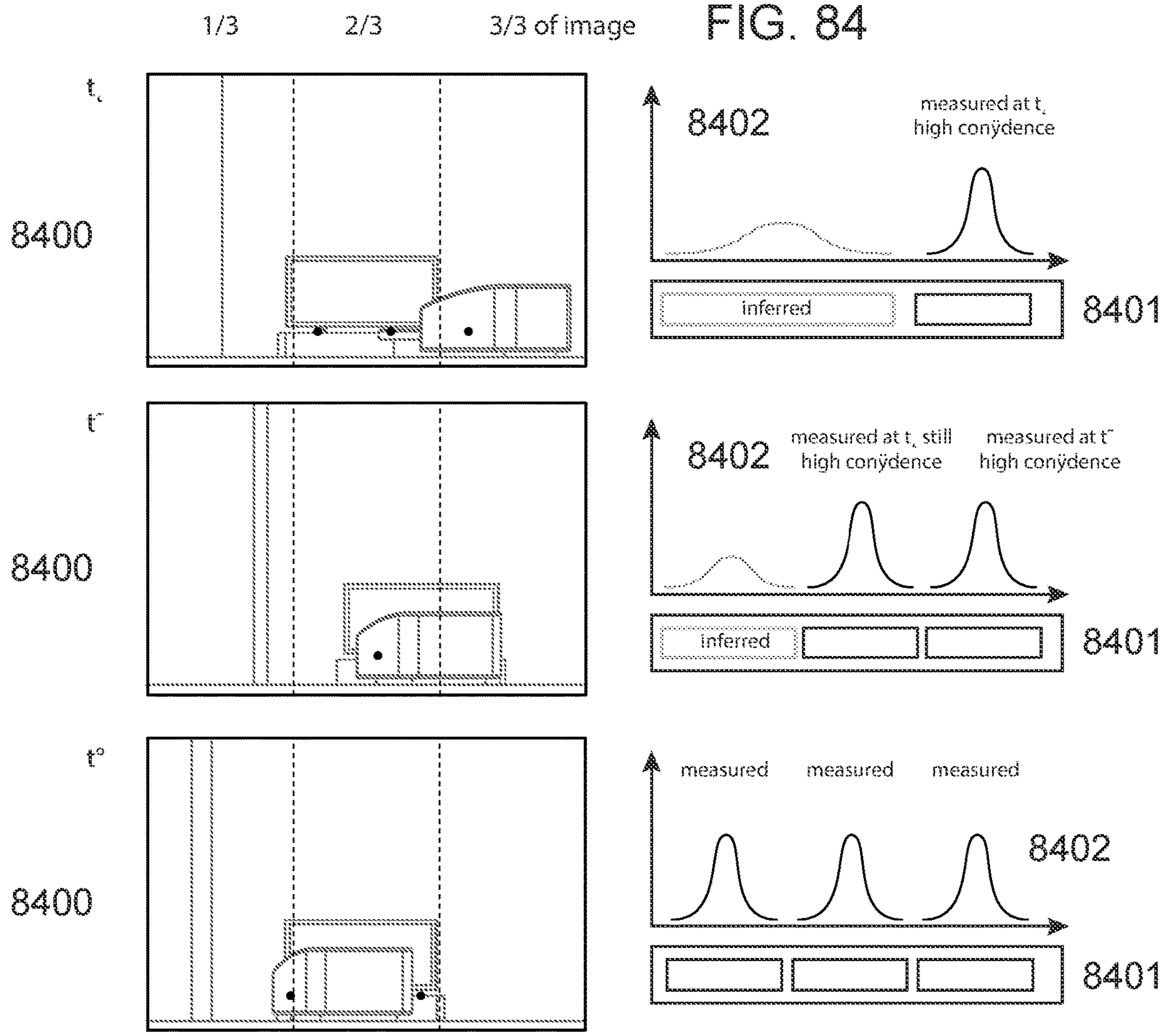

FIG. 84 illustrates POVs of the robot at different time stamps.

Figure 85:
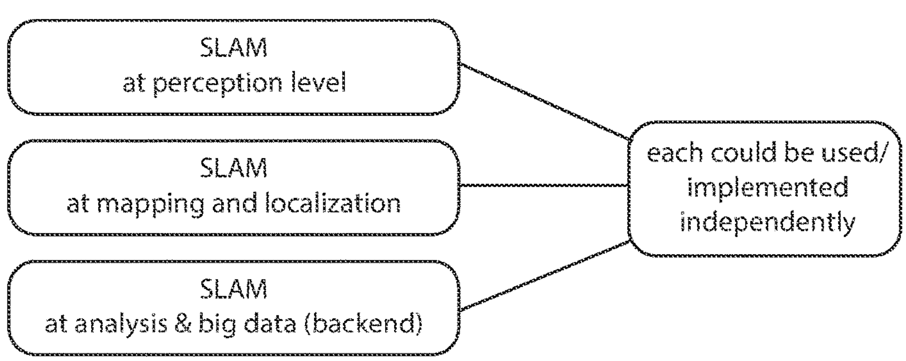

FIG. 85 illustrates SLAM used and implemented at different levels, combined with each other or independently.

Figure 86:
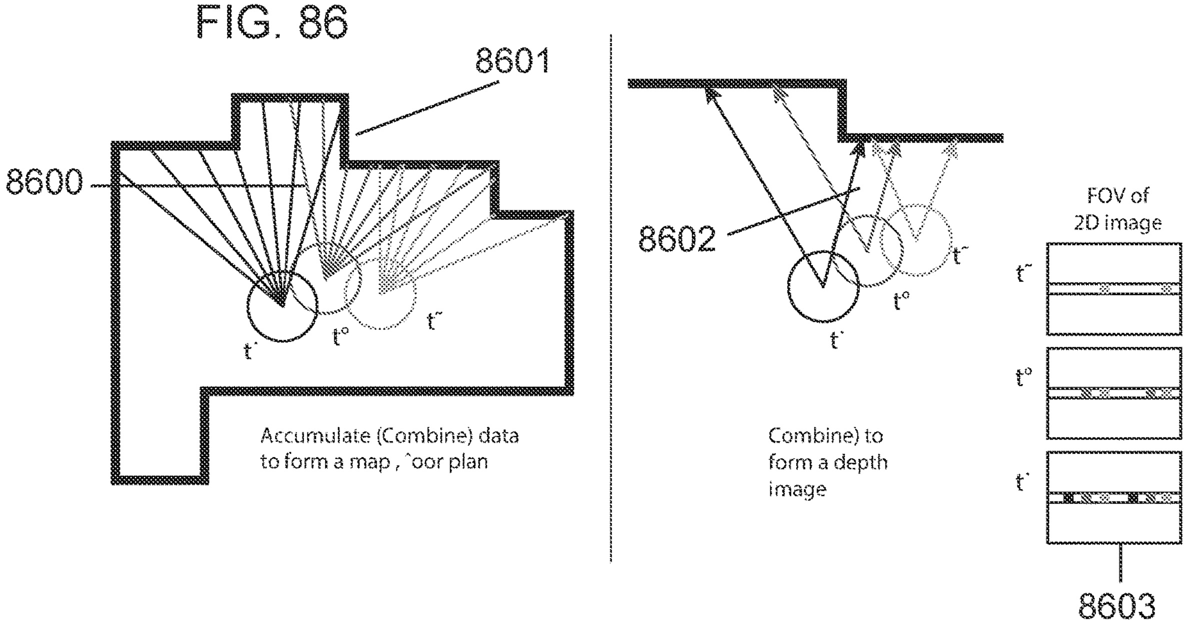

FIG. 86 illustrates accumulated readings used to form a map and accumulated readings used to form depth images.

Figure 87A:
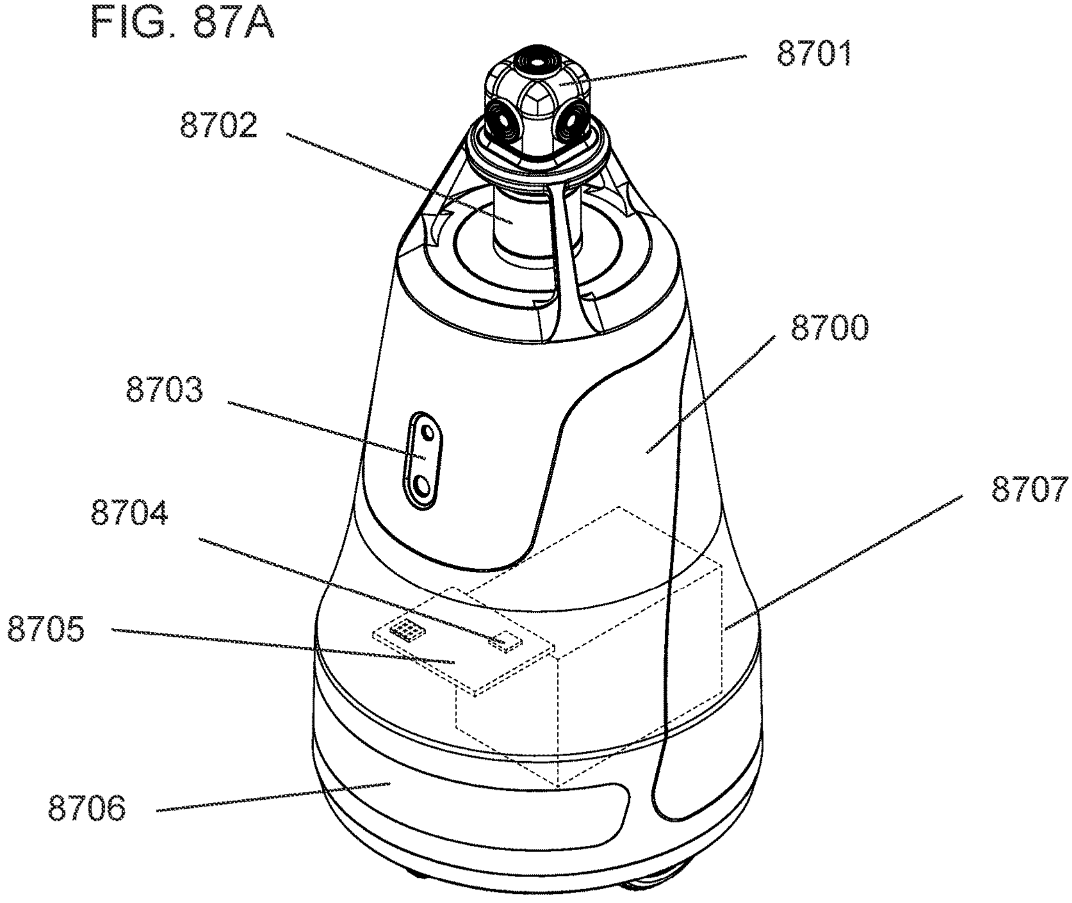
Figure 87B:
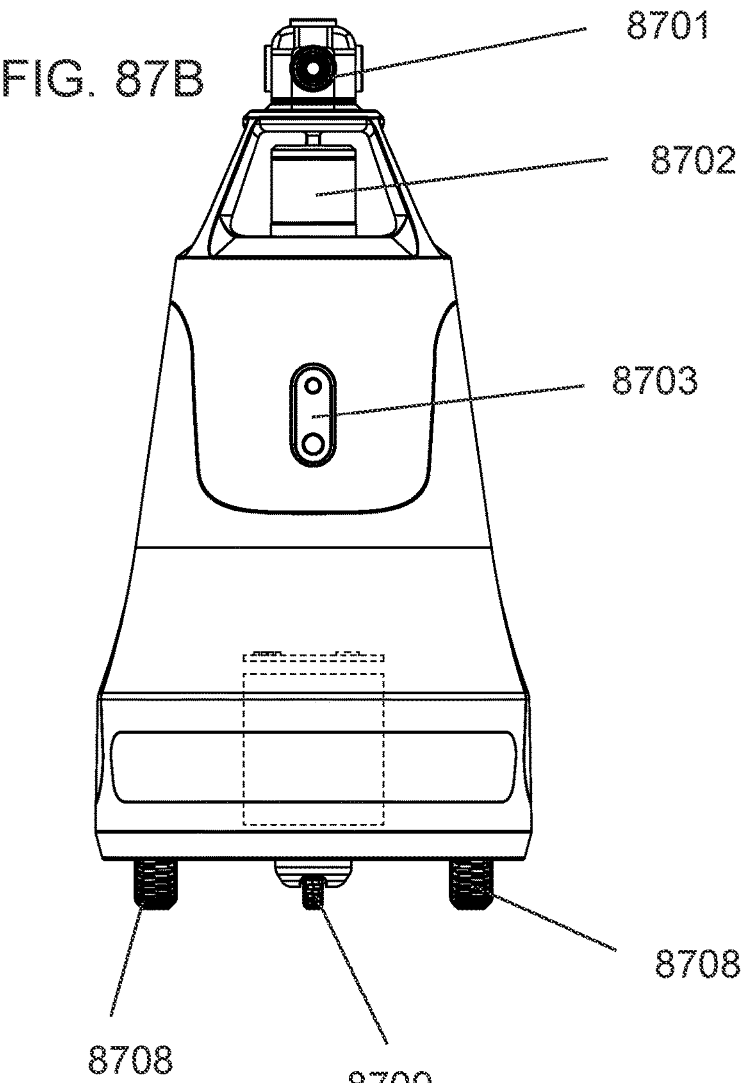
Figure 87C:
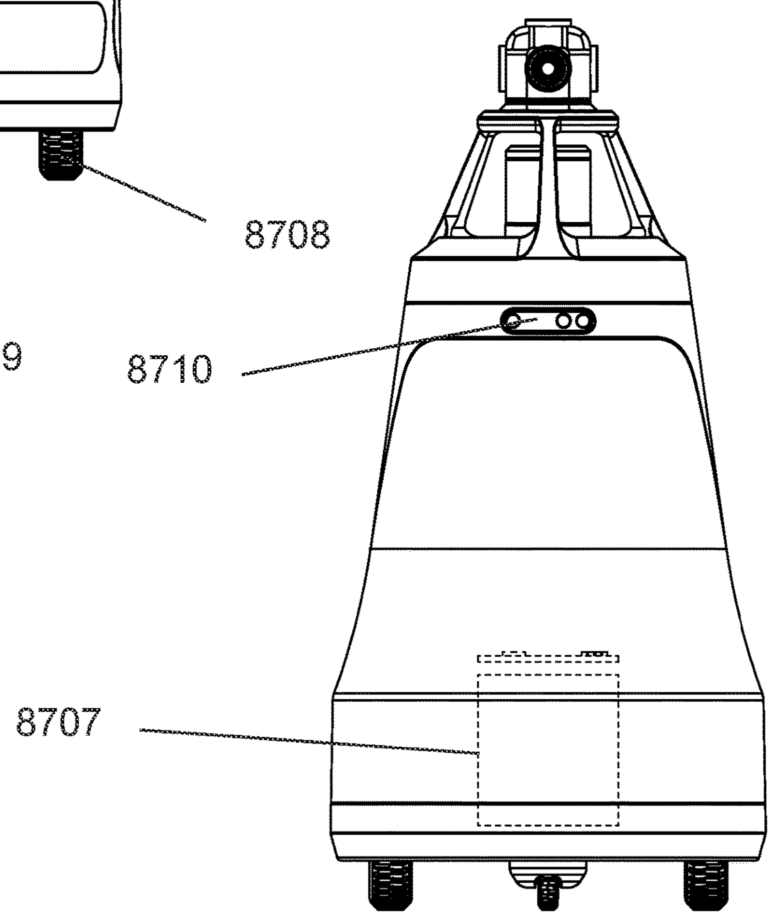

FIGS. 87A-87C illustrate an interior mapping robot.

FIG. 88A illustrates a map generated using SLAM.

FIG. 88B illustrates an architectural plan.

Figure 88C:
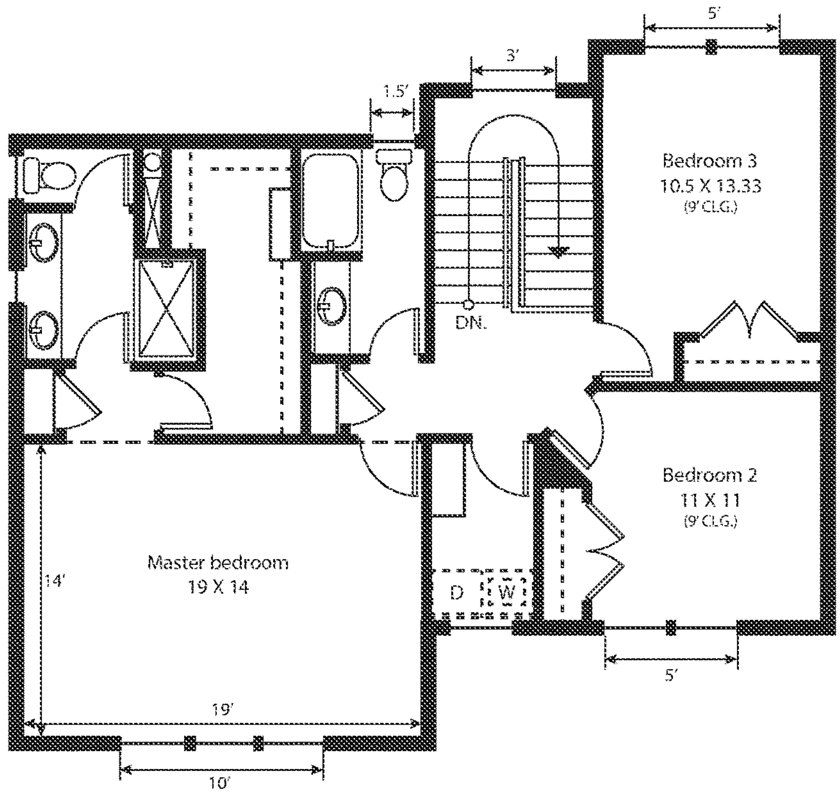

FIG. 88C illustrates additional data can be added to the map by a user or the processor.

Figure 89:
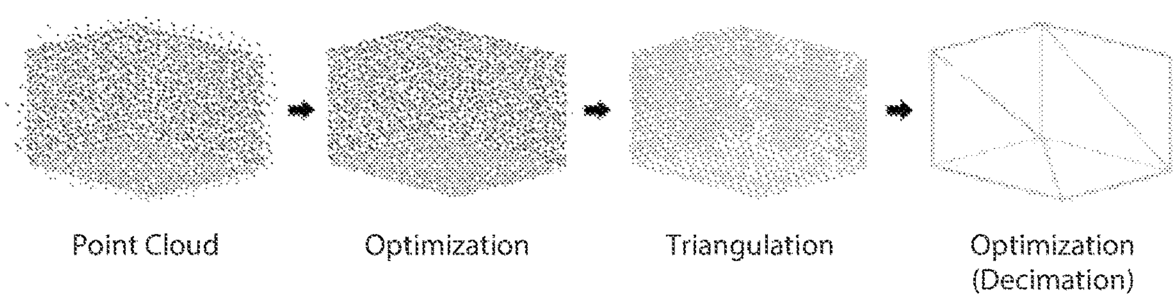

FIG. 89 illustrates the process of point cloud optimization to generate a 3D mesh.

Figure 90:
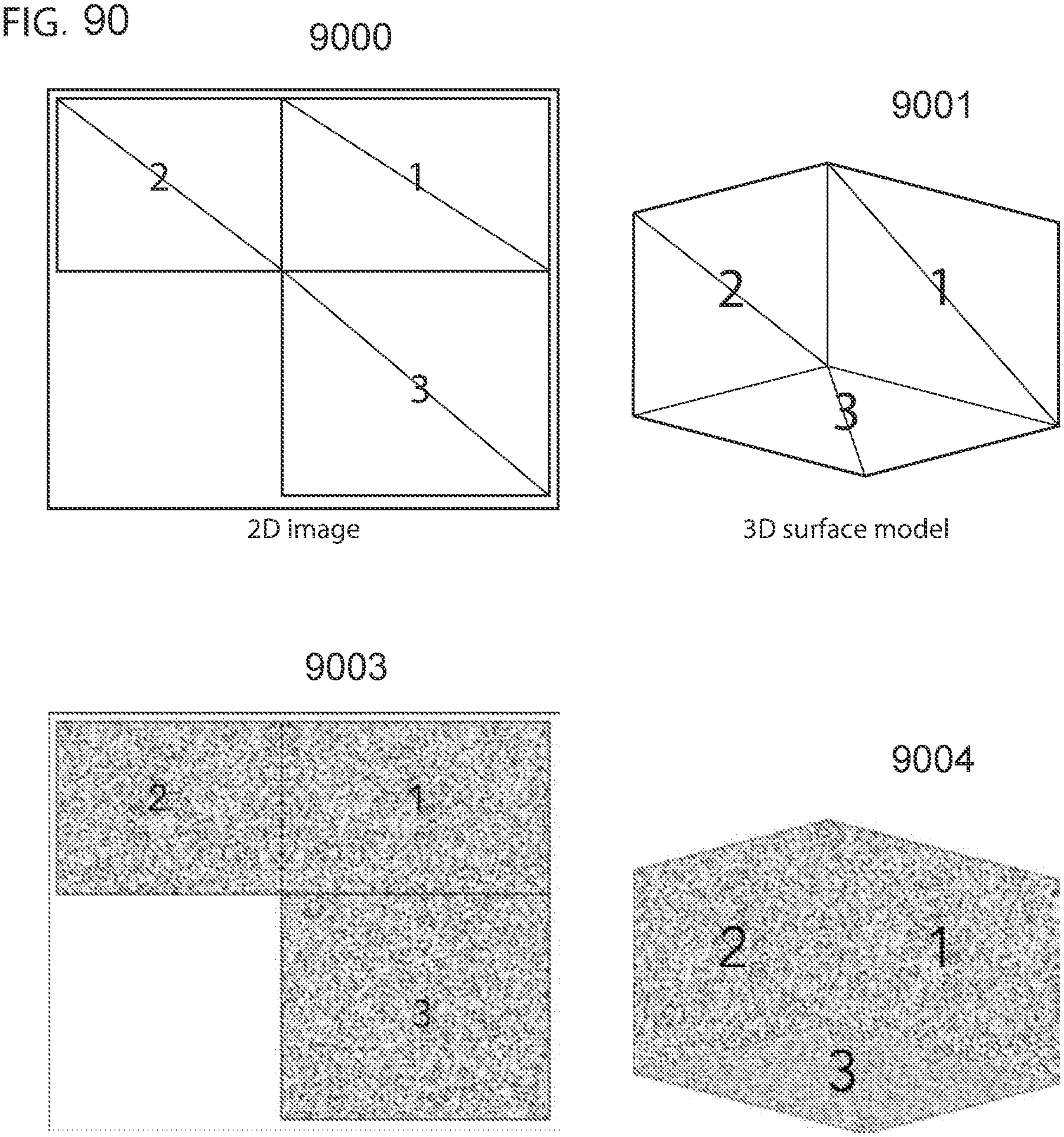

FIG. 90 illustrates the relation between 2D textured map and 3D surface model.

Figure 91:
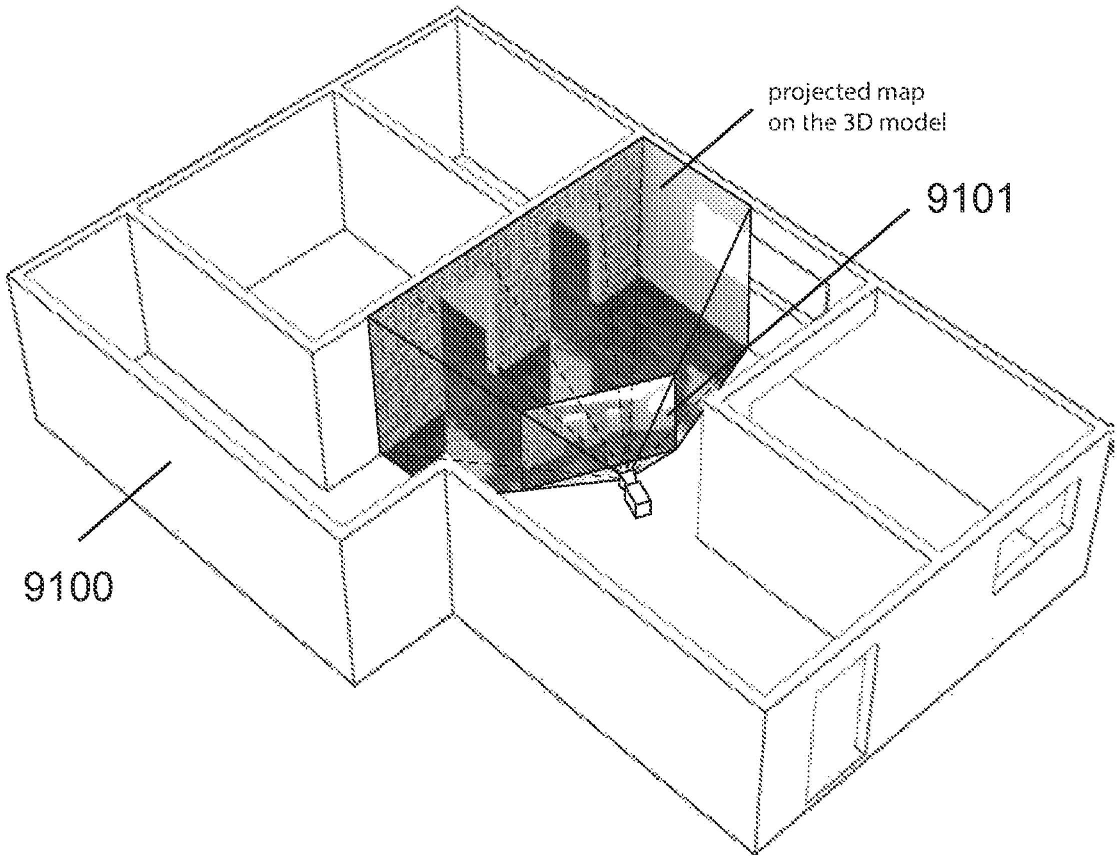

FIG. 91 illustrates a 3D model and an image captured in the environment projected onto the 3D model.

Figure 92:
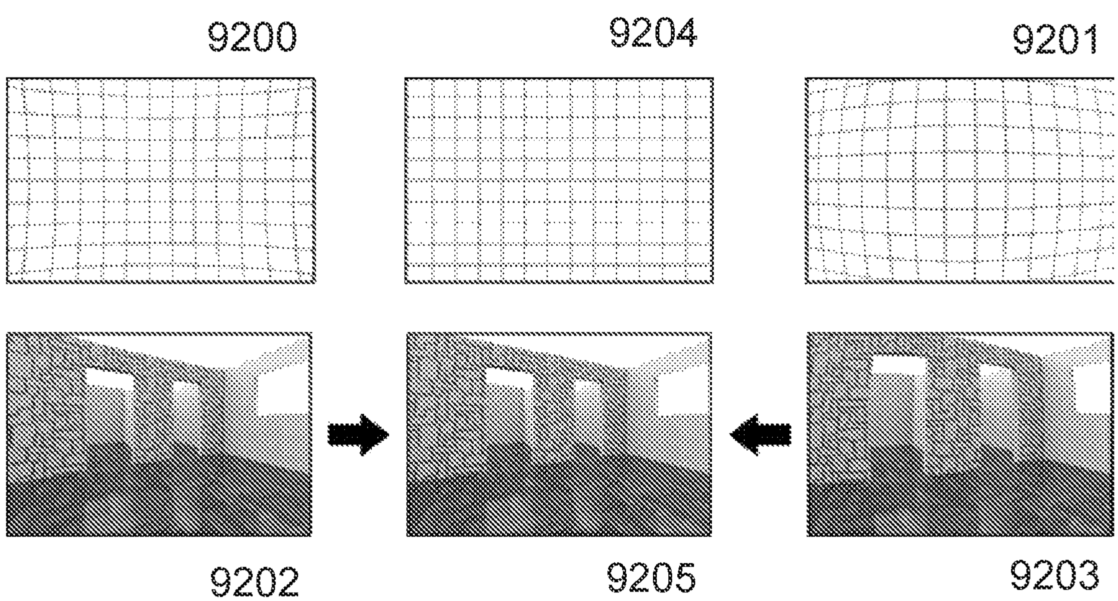

FIG. 92 illustrates pixel distortion in captured images being corrected.

Figure 93:
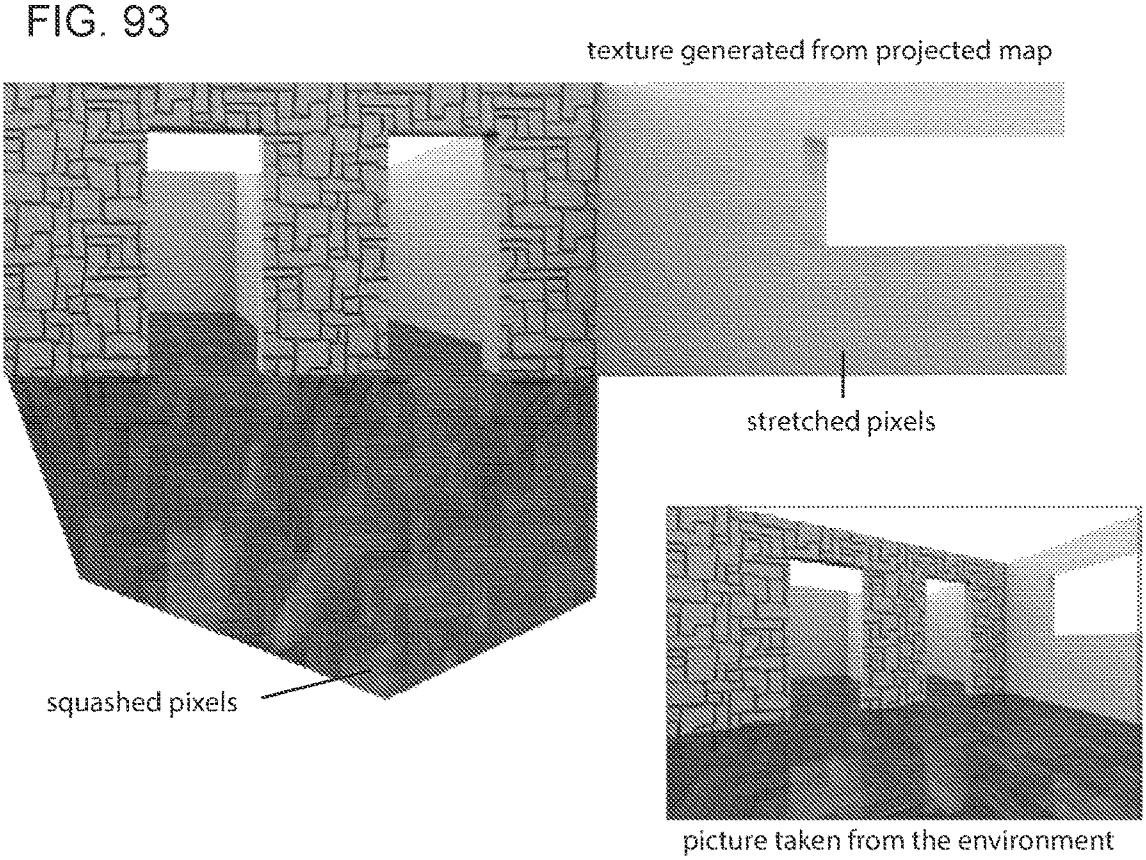

FIG. 93 illustrates an example of an image of the environment, and portions of the image that were squashed and stretched.

Figure 94:
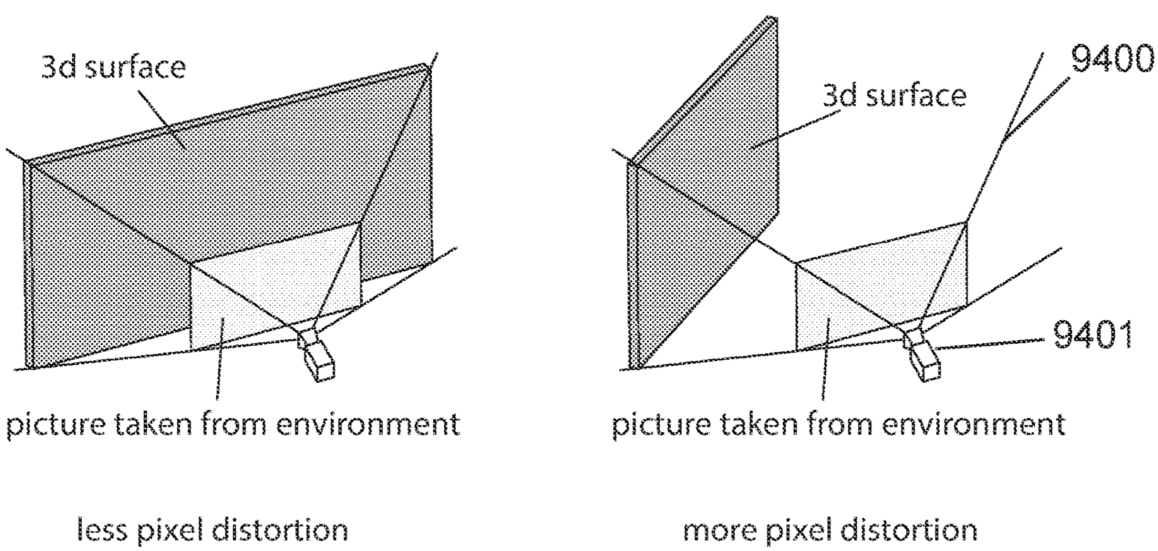

FIG. 94 illustrates a dependency of pixel distortion of an image on an angle of a camera relative to the 3D surface captured in the image.

Figure 95:
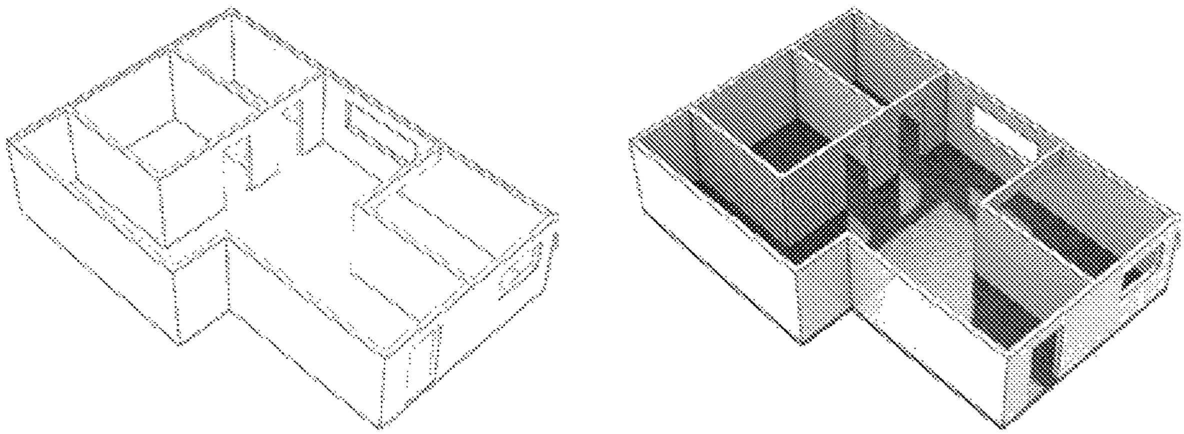

FIG. 95 illustrates an example of a 3D model with no texture and the 3D model with texture loaded onto the model.

Figure 96:
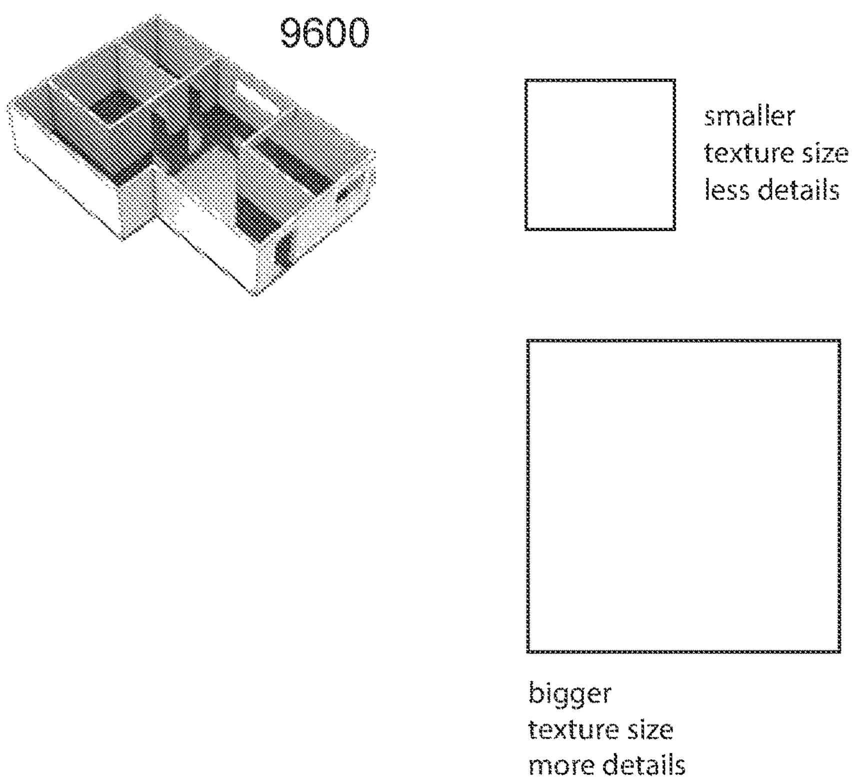

FIG. 96 illustrates textures level of detail changing based on the model's distance from the camera.

Figure 97:
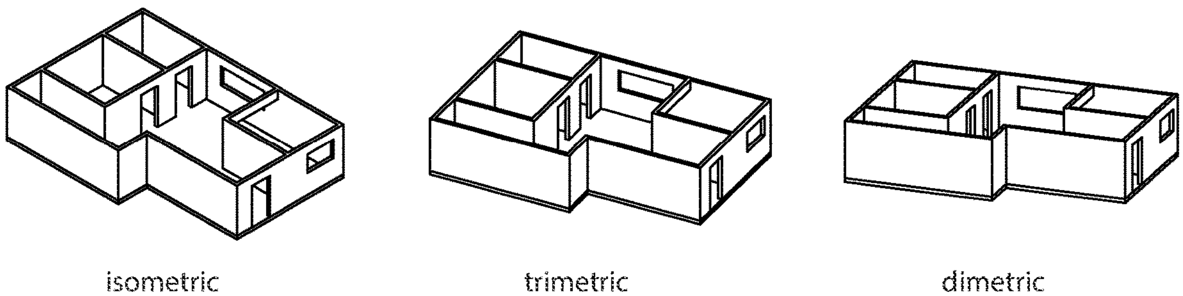

FIG. 97 illustrates example of orthographic projections.

Figure 98:
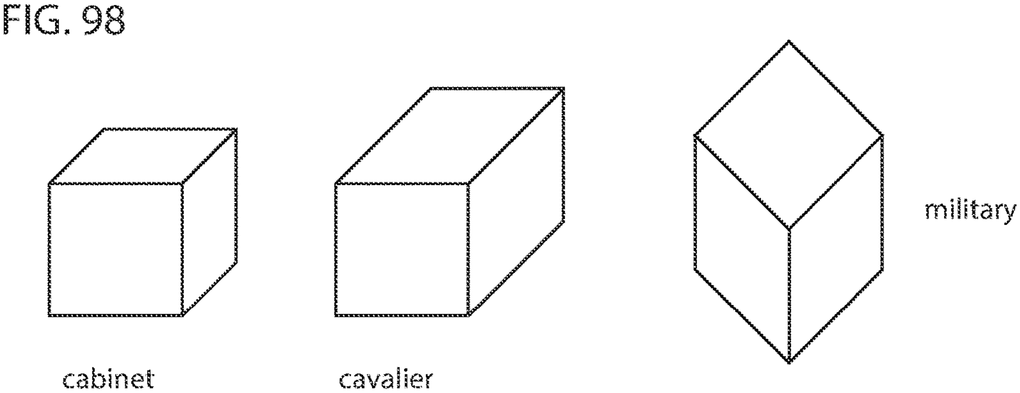

FIG. 98 illustrates examples of oblique projections.

Figure 99:
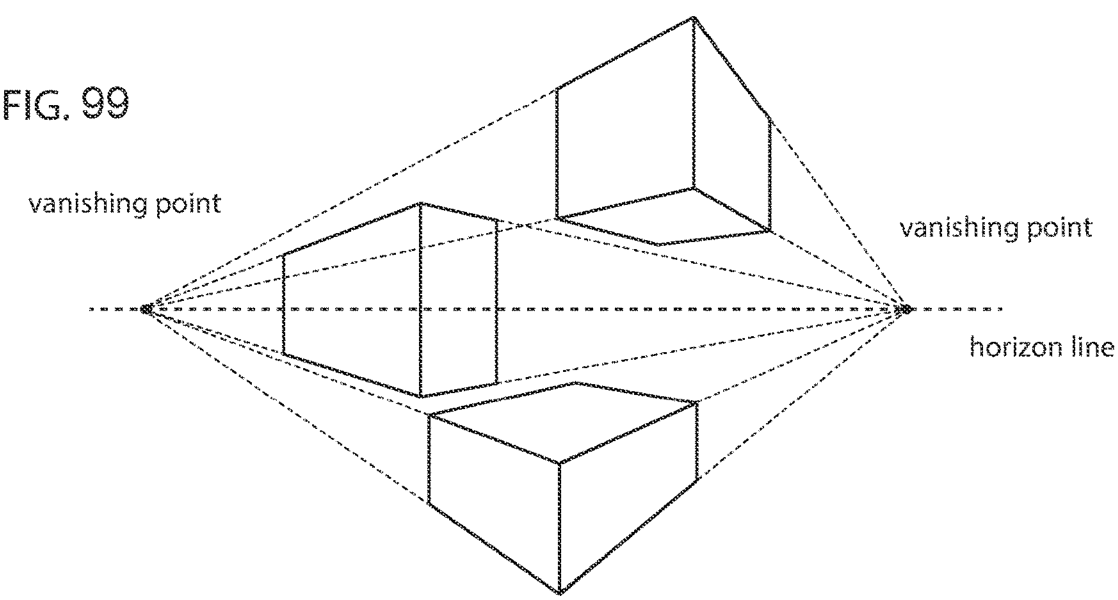

FIG. 99 illustrates an example of vanishing points on a horizon line.

Figure 100A:
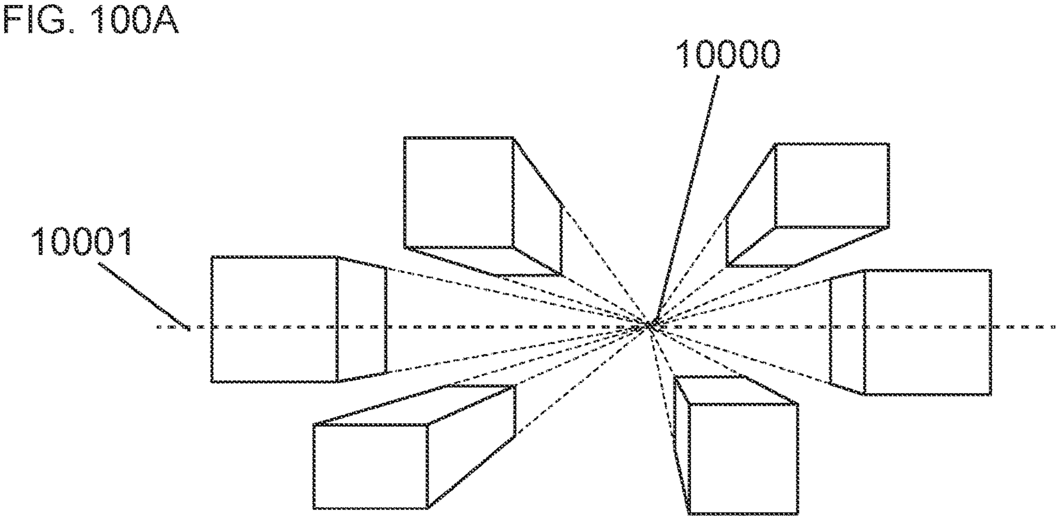
Figure 100B:
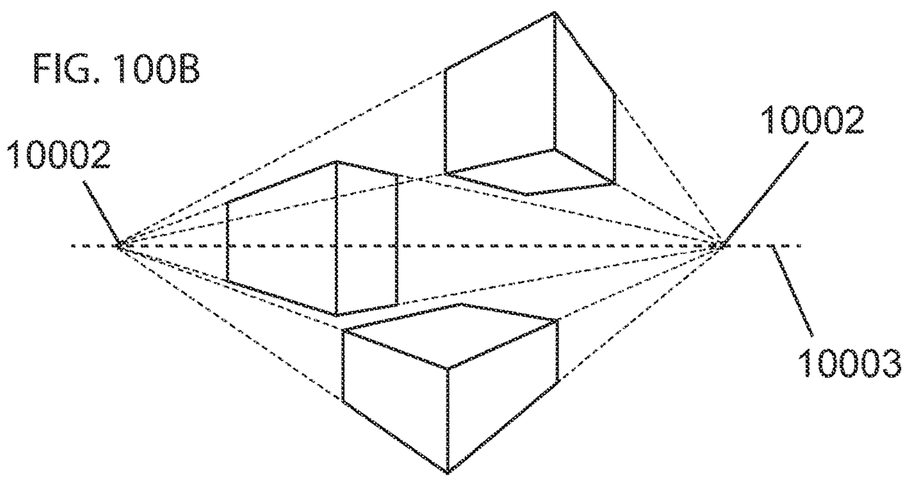

FIGS. 100A-100B illustrate one point and two points perspective.

Figure 101:
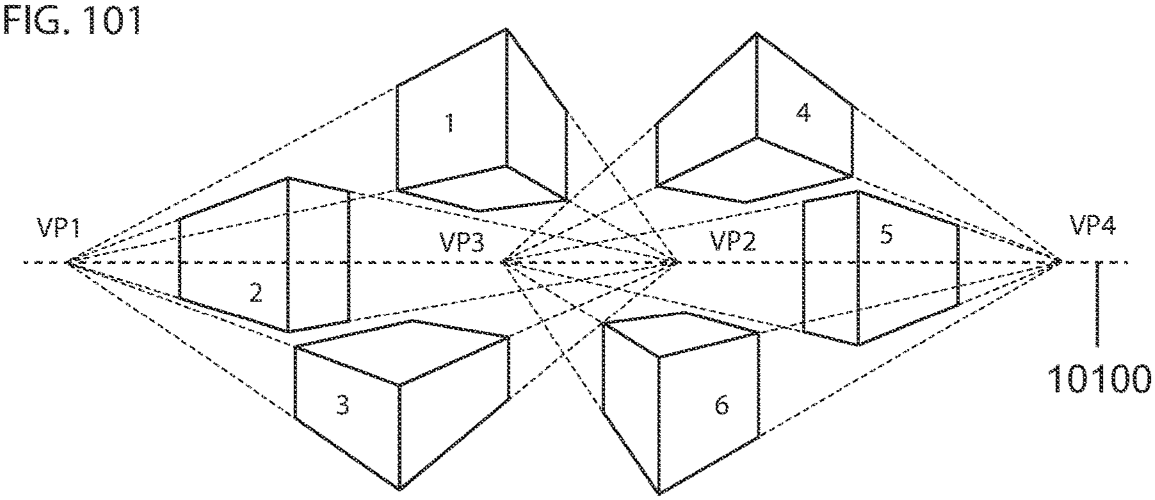

FIG. 101 illustrates multiple vanishing points in a two points perspective.

Figure 102:
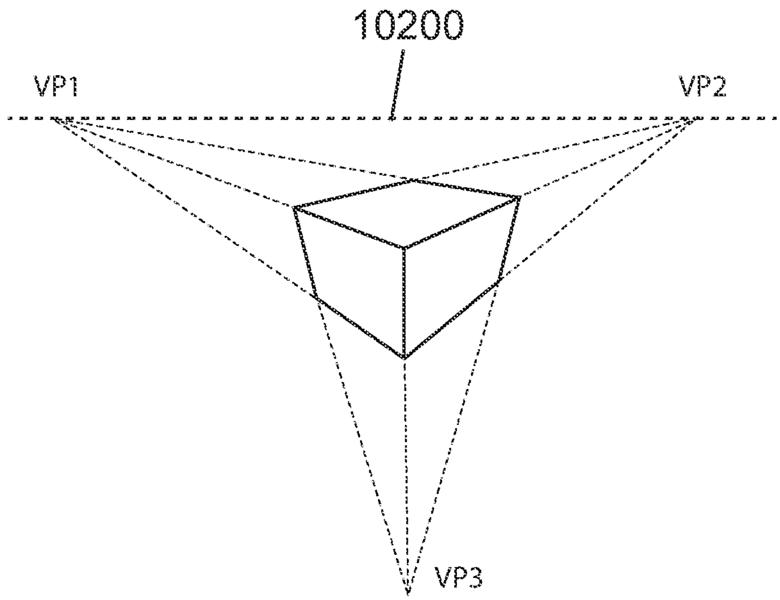

FIG. 102 illustrates an example of a three points perspective.

Figure 103:
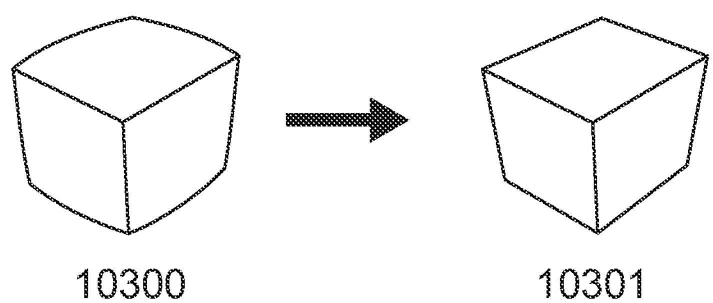

FIG. 103 illustrates an example of lens distortion being corrected.

Figure 104:
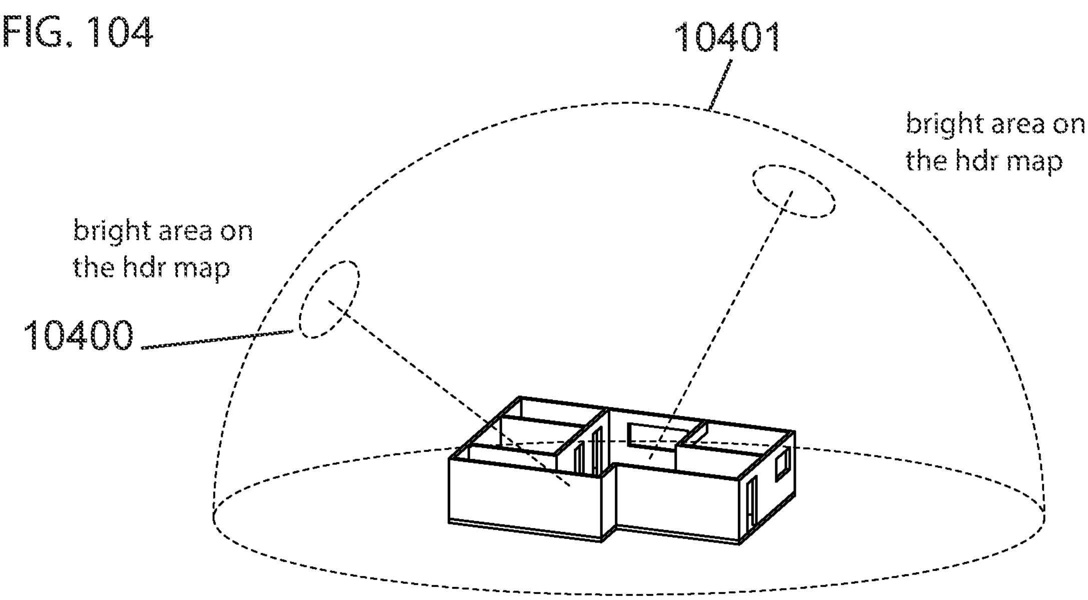

FIG. 104 illustrates the process of image based lighting.

Figure 105:
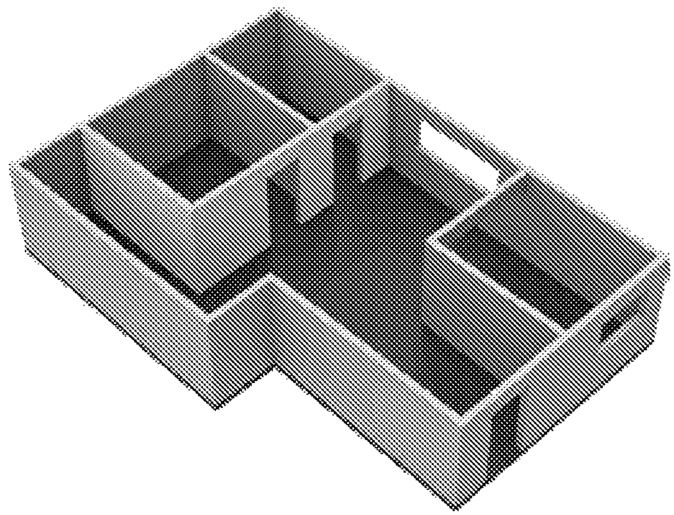

FIG. 105 illustrates an example of 3D models with solid shading and no texture.

Figure 106:
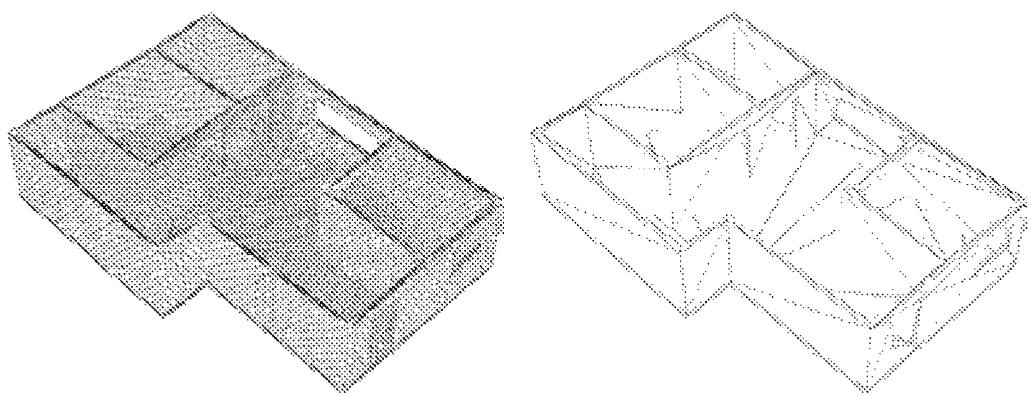

FIG. 106 illustrates examples of maps represented by wire frames.

Figure 107:
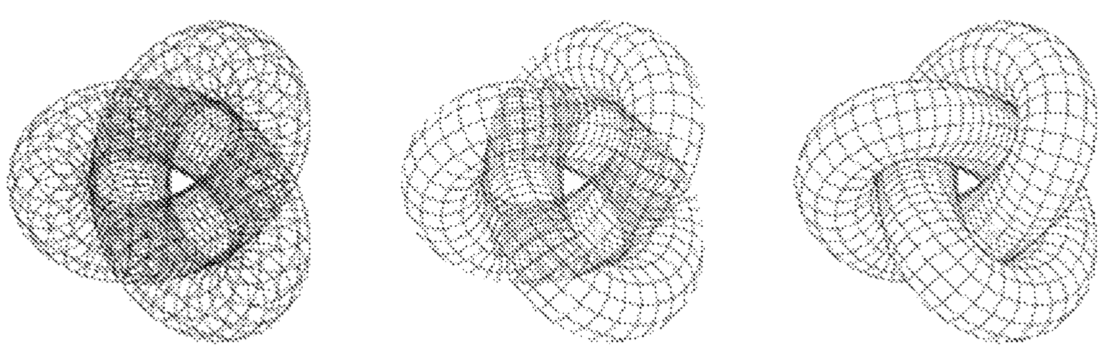

FIG. 107 illustrates a wire frame example with backface cooling and solid shading.

FIG. 108 illustrates an example of a map modeled using flat shading.

FIG. 109 illustrates examples of a map modeled as flat with outlines using 2D screen units and 3D environment units.

Figure 110:
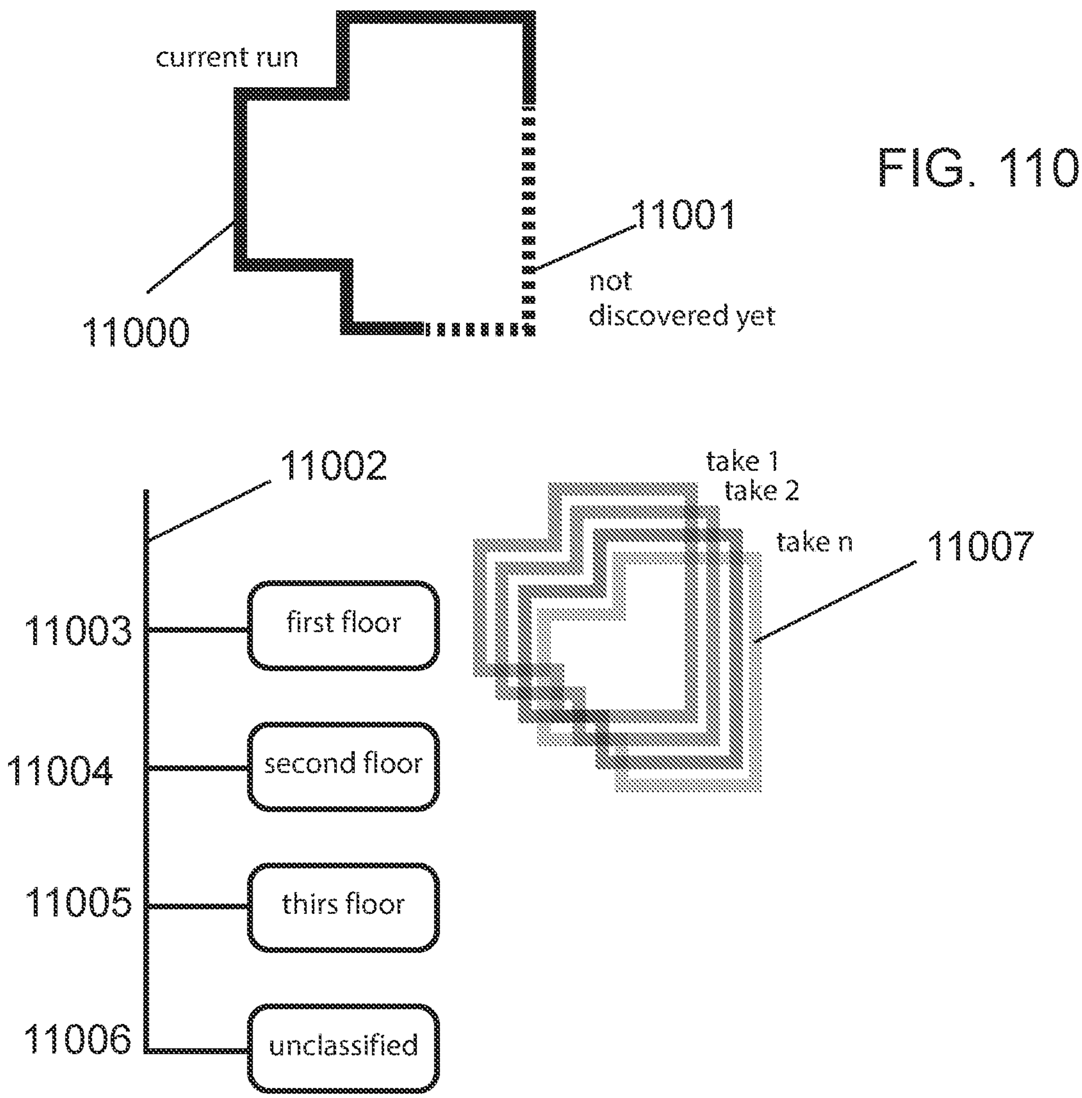

FIG. 110 illustrates a map generated by the processor during a current work session.

Figure 111:
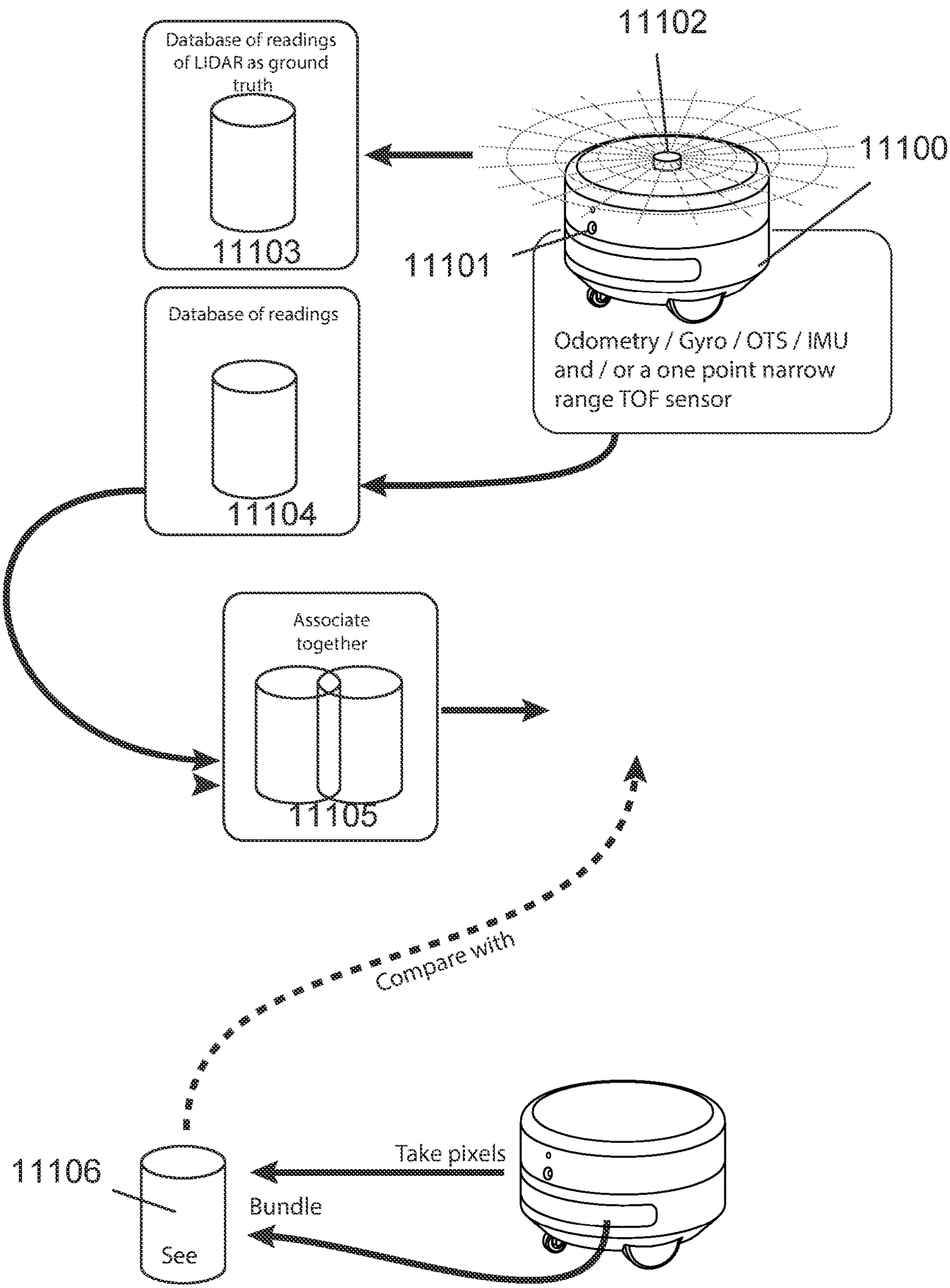

FIG. 111 illustrates the process of data bundling.

FIGS. 112A-112D illustrate the process of object recognition from an image.

Figure 113A:
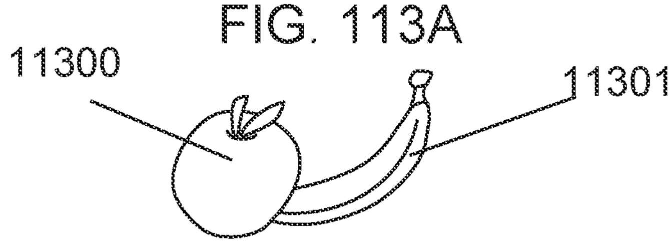
Figure 113B:
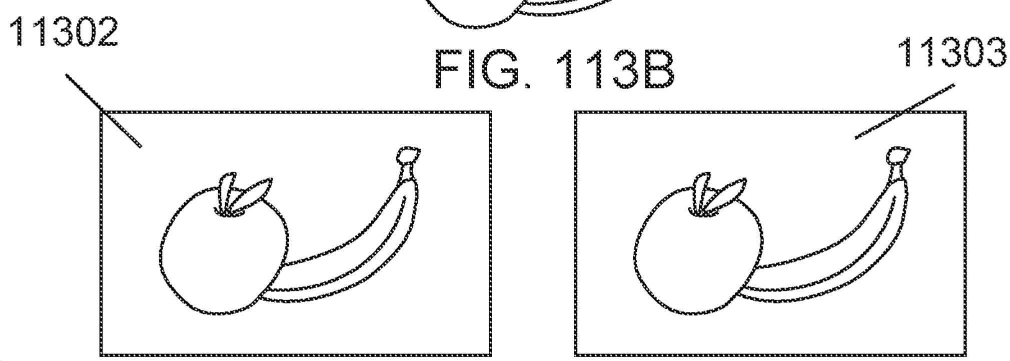

FIGS. 113A-113B illustrate the process of object recognition in case of objects overlapping each other.

Figure 114:
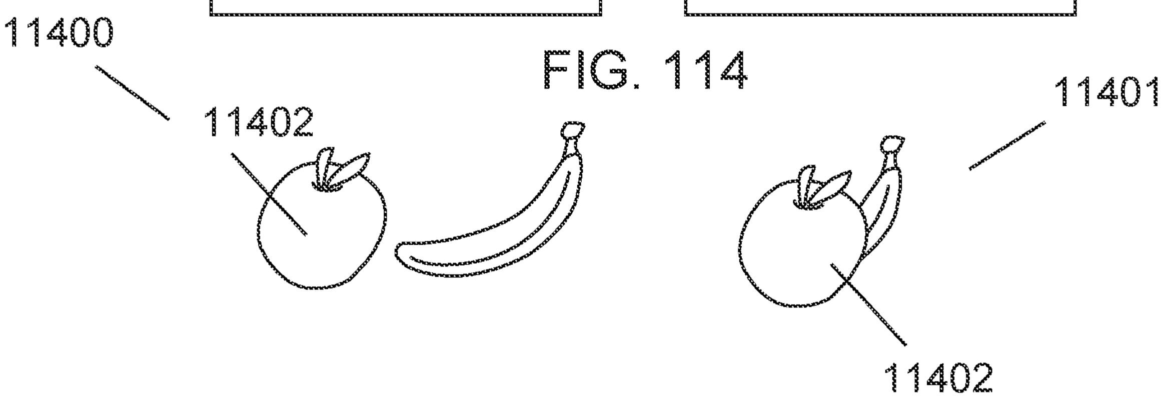

FIG. 114 illustrates the processor observing a feature in 2 different situations.

Figure 115:
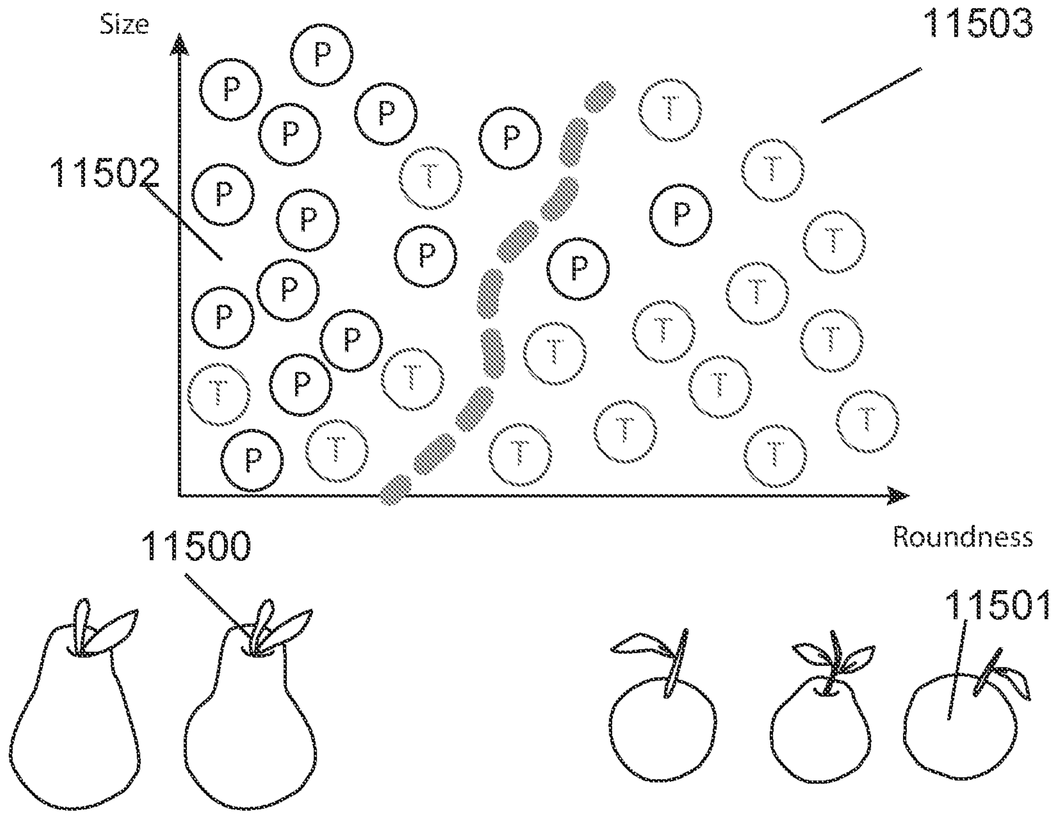

FIG. 115 illustrates a generalization of pears and tangerines based on size and roundness.

Figure 116:
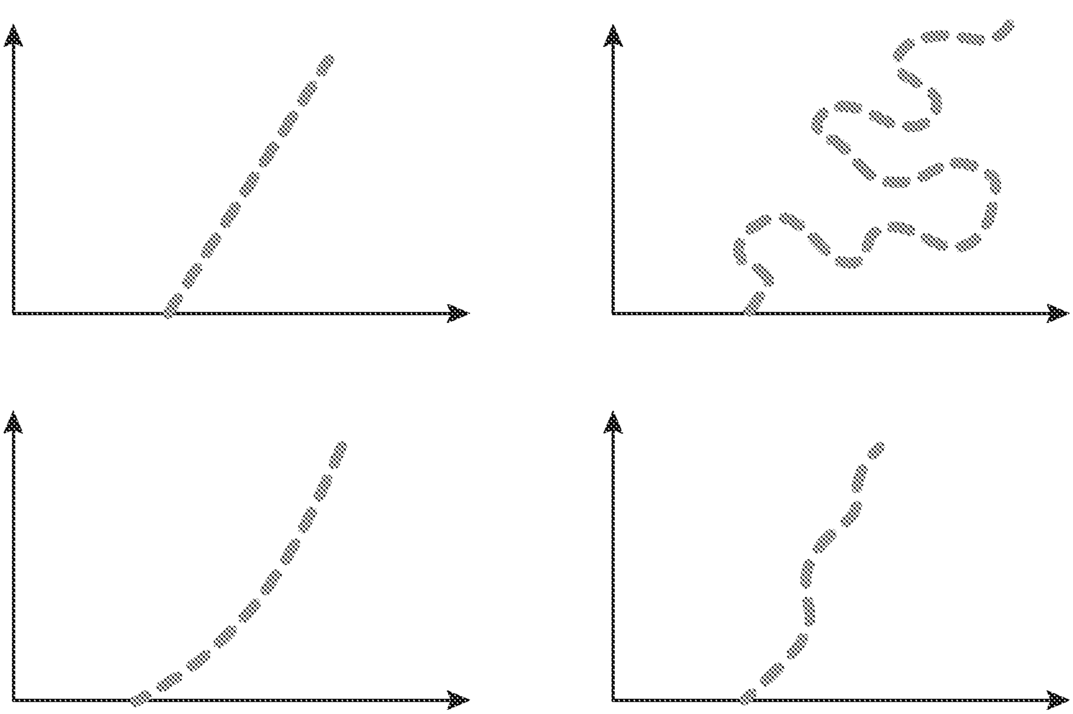

FIG. 116 illustrates various examples of different generalizations.

FIGS. 117A-117C illustrate object classification of an apple.

FIG. 118 illustrates an example of a region of an image in which an object is positioned marked with a question mark.

Figure 119:
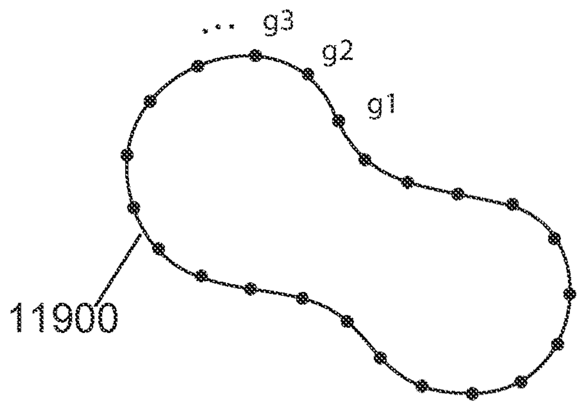

FIG. 119 illustrates a contour and a series of arbitrary points.

Figure 120:
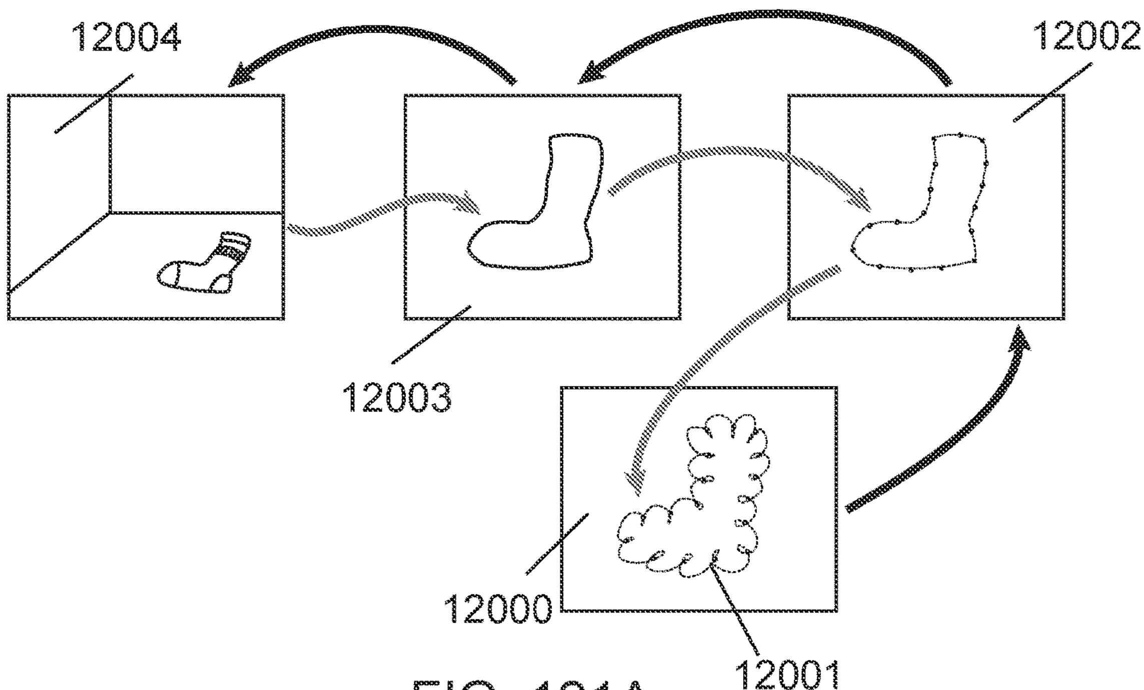

FIG. 120 illustrates an example of reconstruction of a contour of a sock on a floor.

Figure 121A:
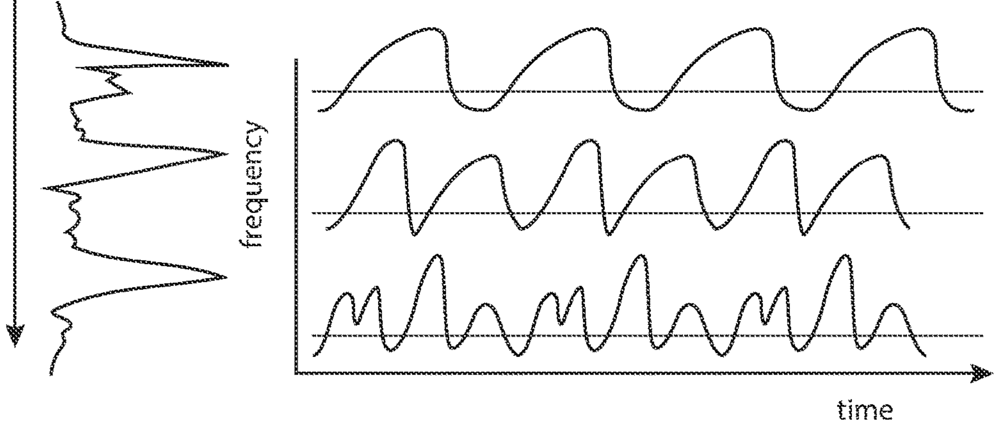

FIG. 121A illustrates an example of different signals collected for reconstruction.

Figure 121B:
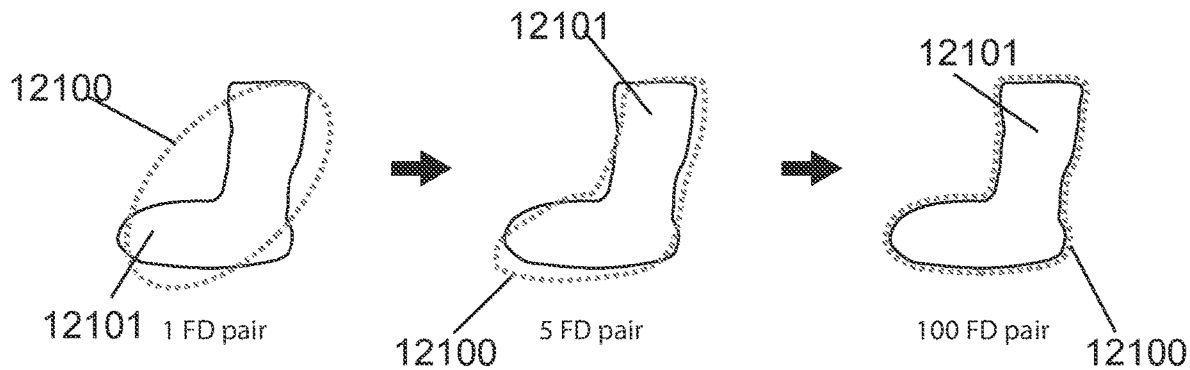

FIG. 121B illustrates an example of a partial reconstruction of a sock.

Figure 122:
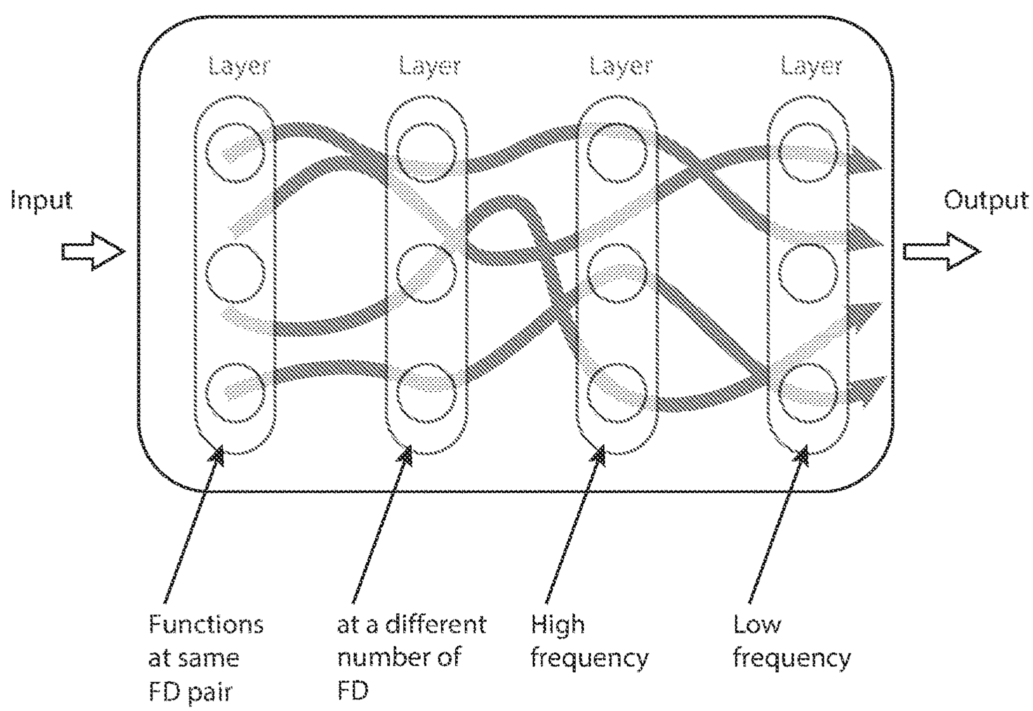

FIG. 122 illustrates an example of a CNN including various layers.

Figure 123:
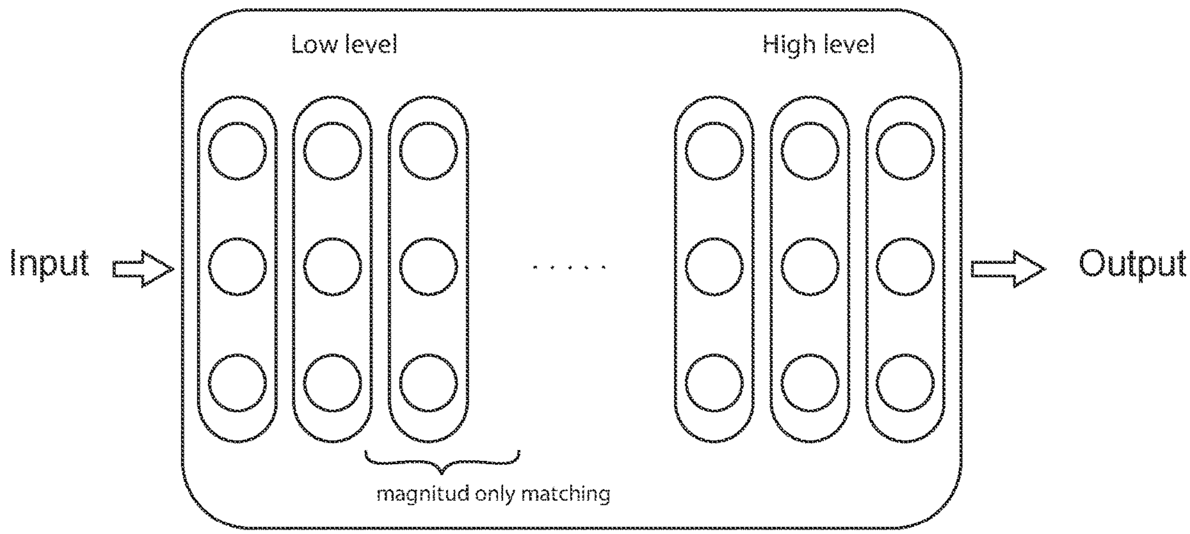

FIG. 123 illustrates an example of a CNN with lower level layers, higher level layers, input, and output.

Figure 124:
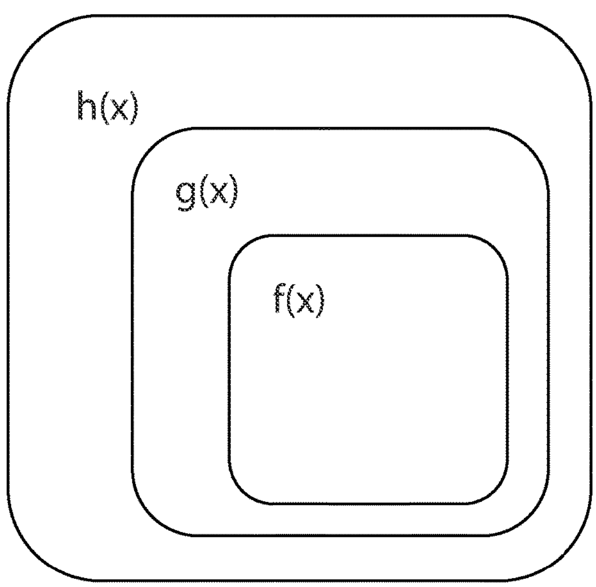

FIG. 124 illustrates an example of chain of functions.

Figure 125:
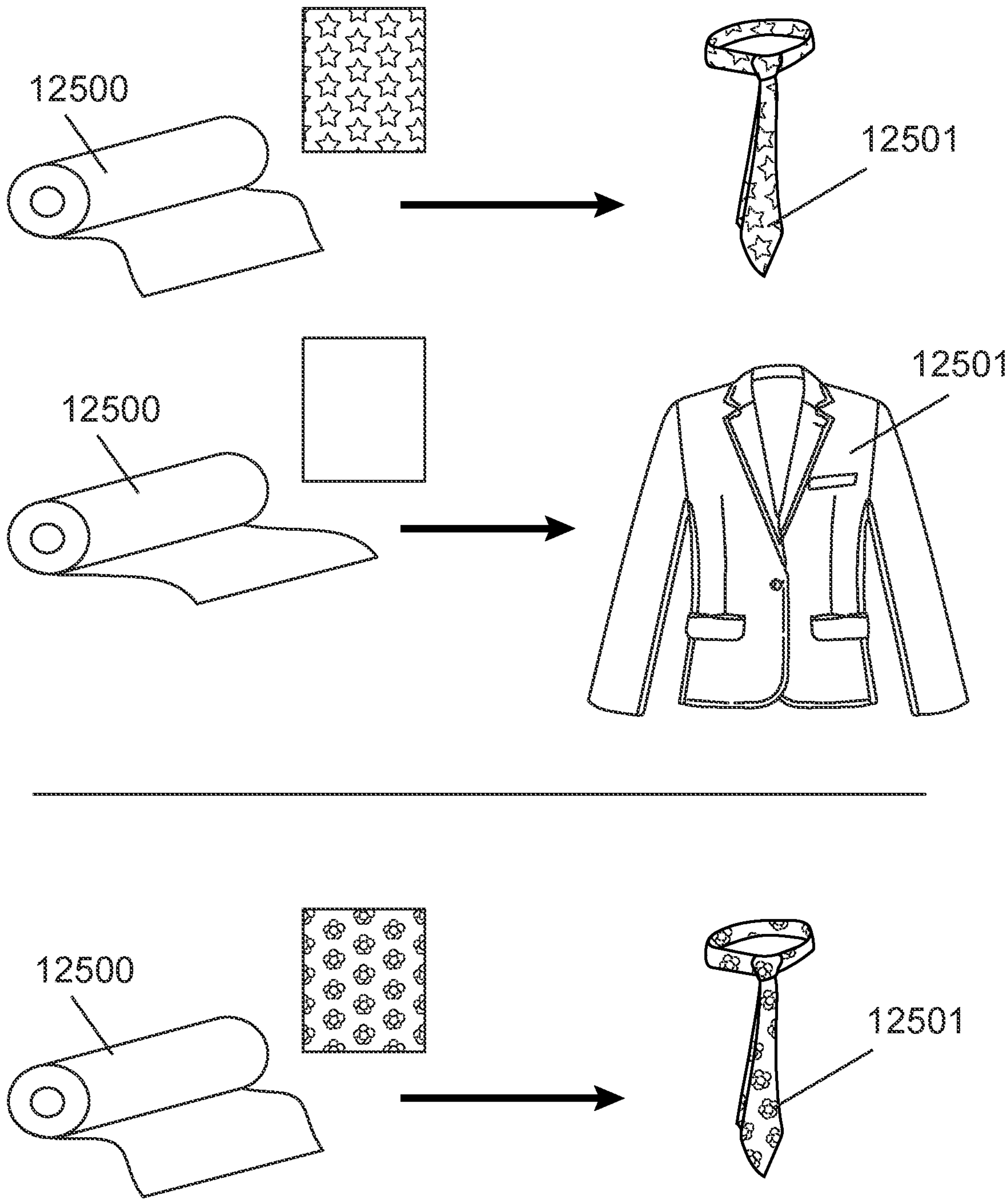

FIG. 125 illustrates a system producing different type of output based on the input.

Figure 126:
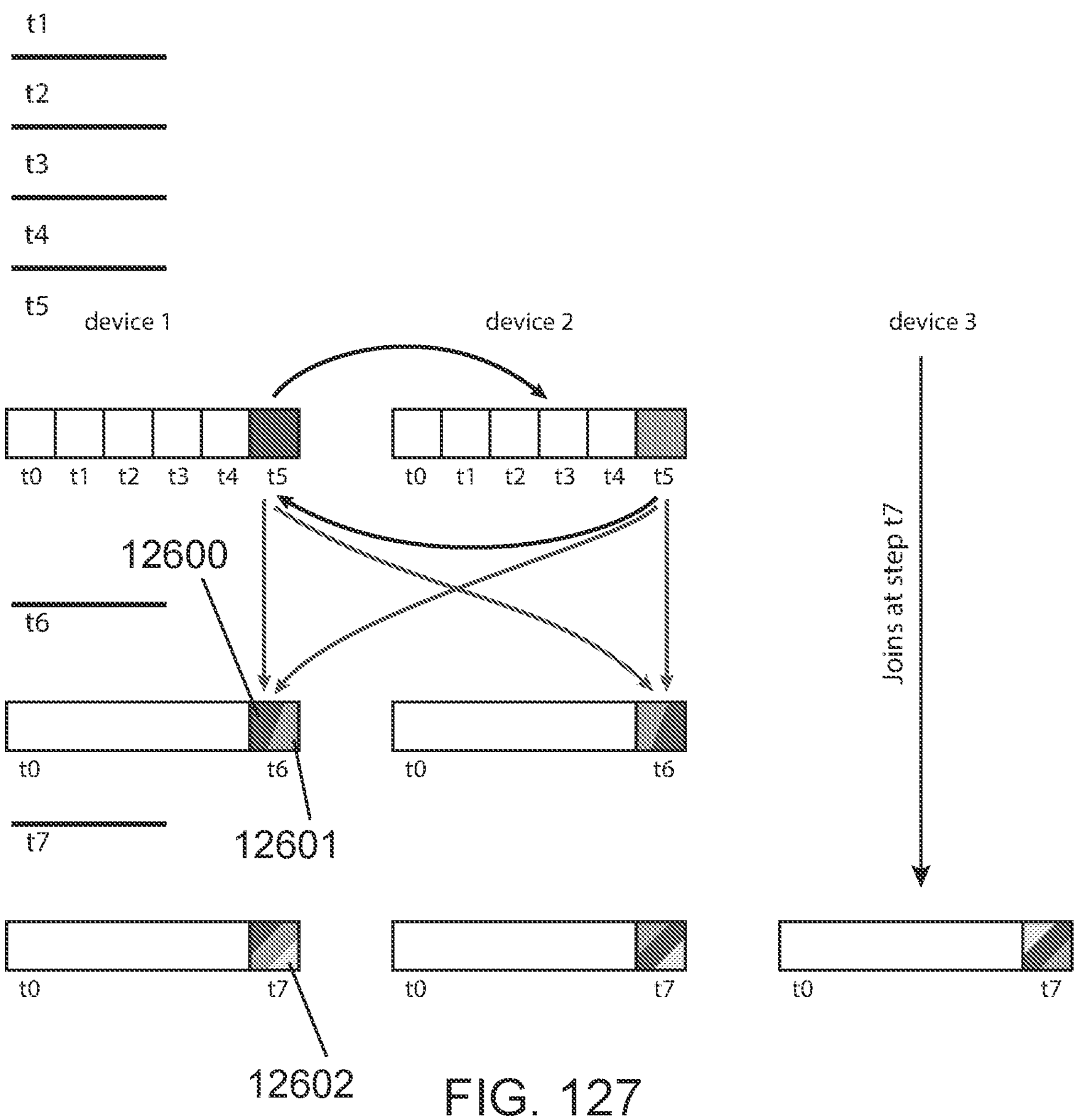

FIG. 126 illustrates two devices that start collaborating and sharing information.

Figure 127:
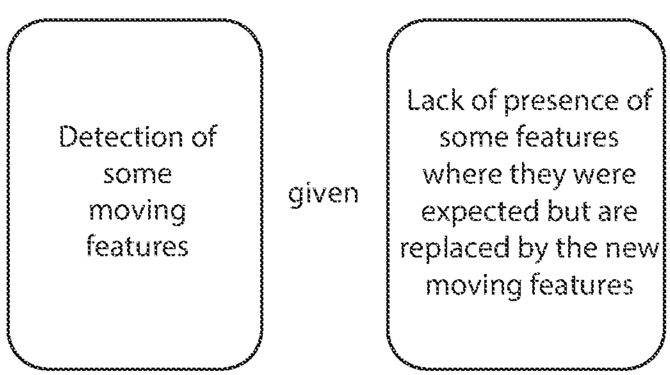

FIG. 127 illustrates the Bayesian relation.

Figure 128:
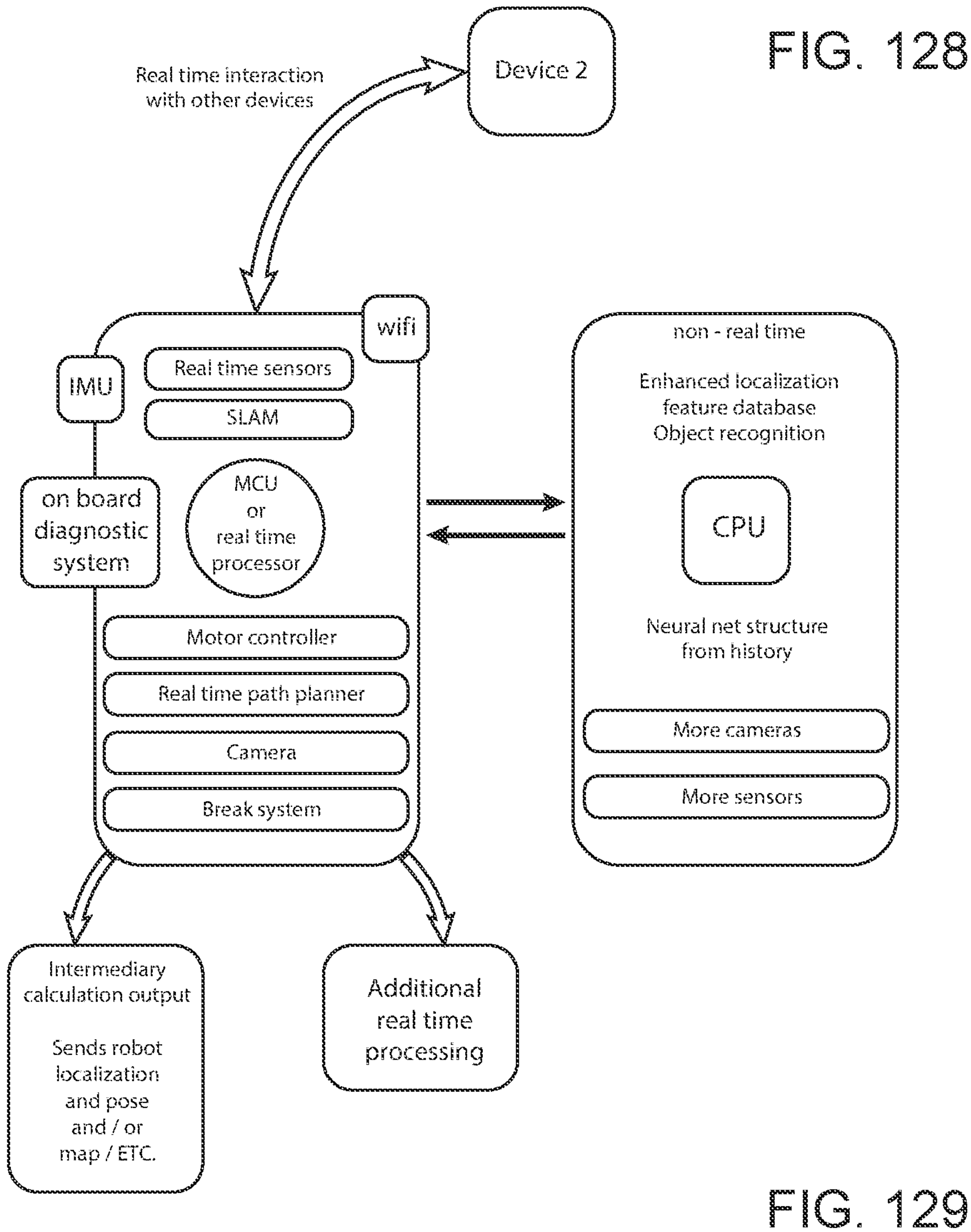

FIG. 128 illustrates components and both real-time and non real-time operations of a system of a robot.

Figure 129:
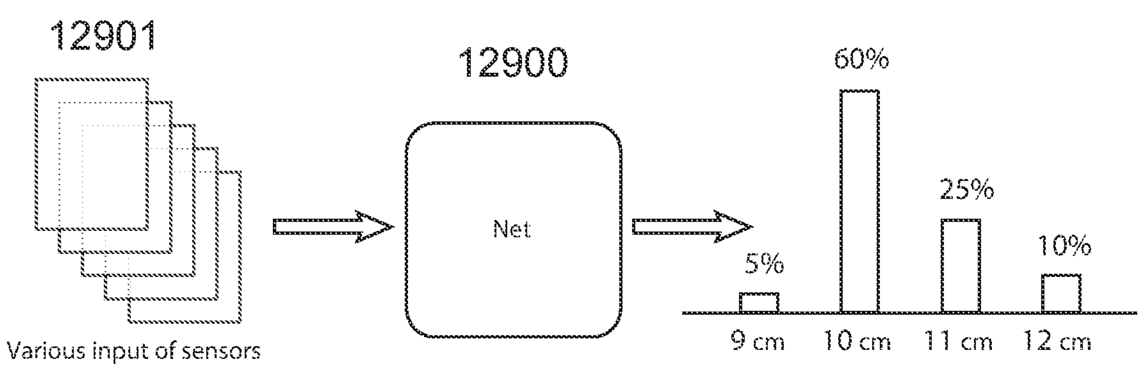

FIG. 129 illustrates a neural net, various inputs and probability output of distances.

FIG. 130 illustrates different possible directions of a human.

FIG. 131 illustrates different possible directions for different moving features based on their type.

Figure 132A:
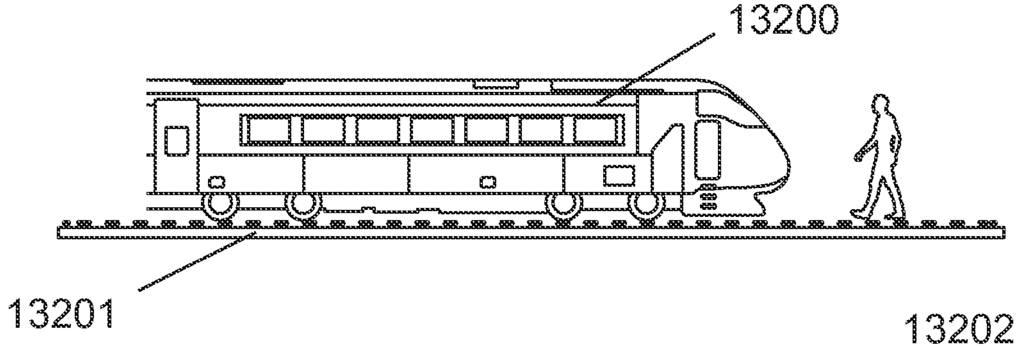

FIG. 132A illustrates robot train following along rails and a person.

Figure 132B:
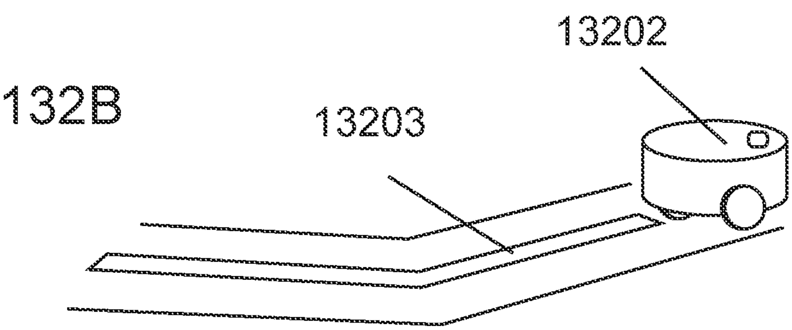

FIG. 132B illustrates a robot executing a path by following markings on the floor.

Figure 133A:
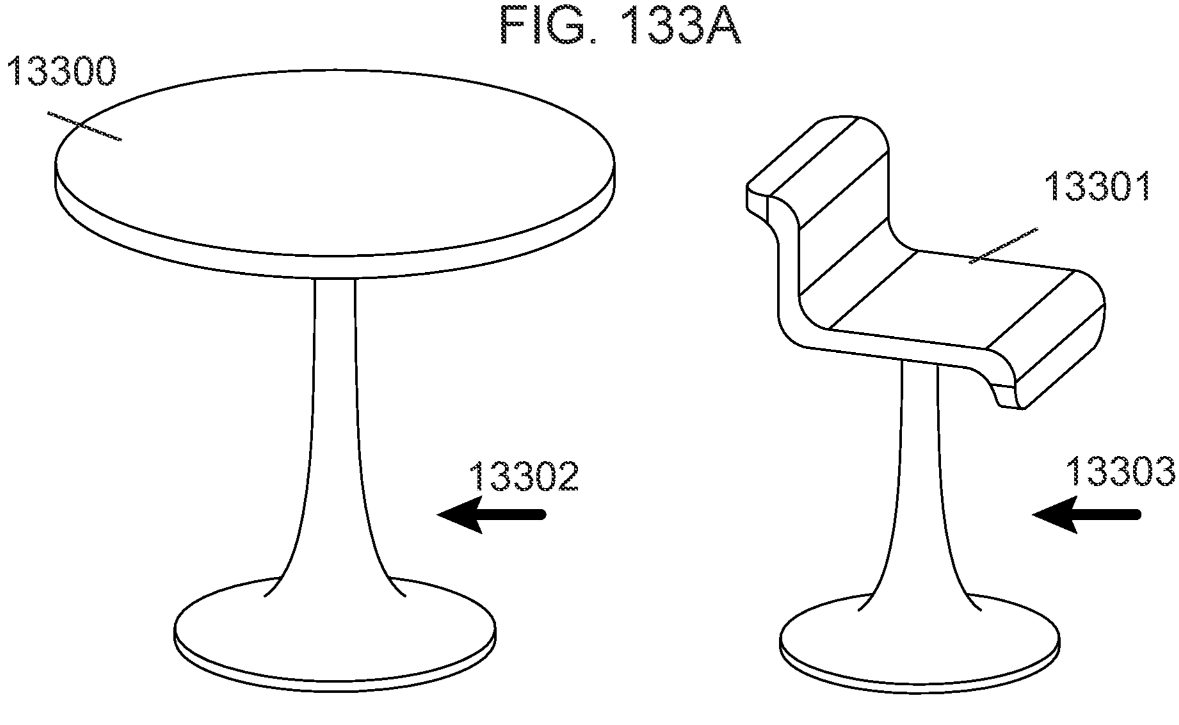

FIG. 133A illustrates a table and a stool.

FIG. 133B illustrates a robot and a table shorter than the robot's height.

Figure 133C:
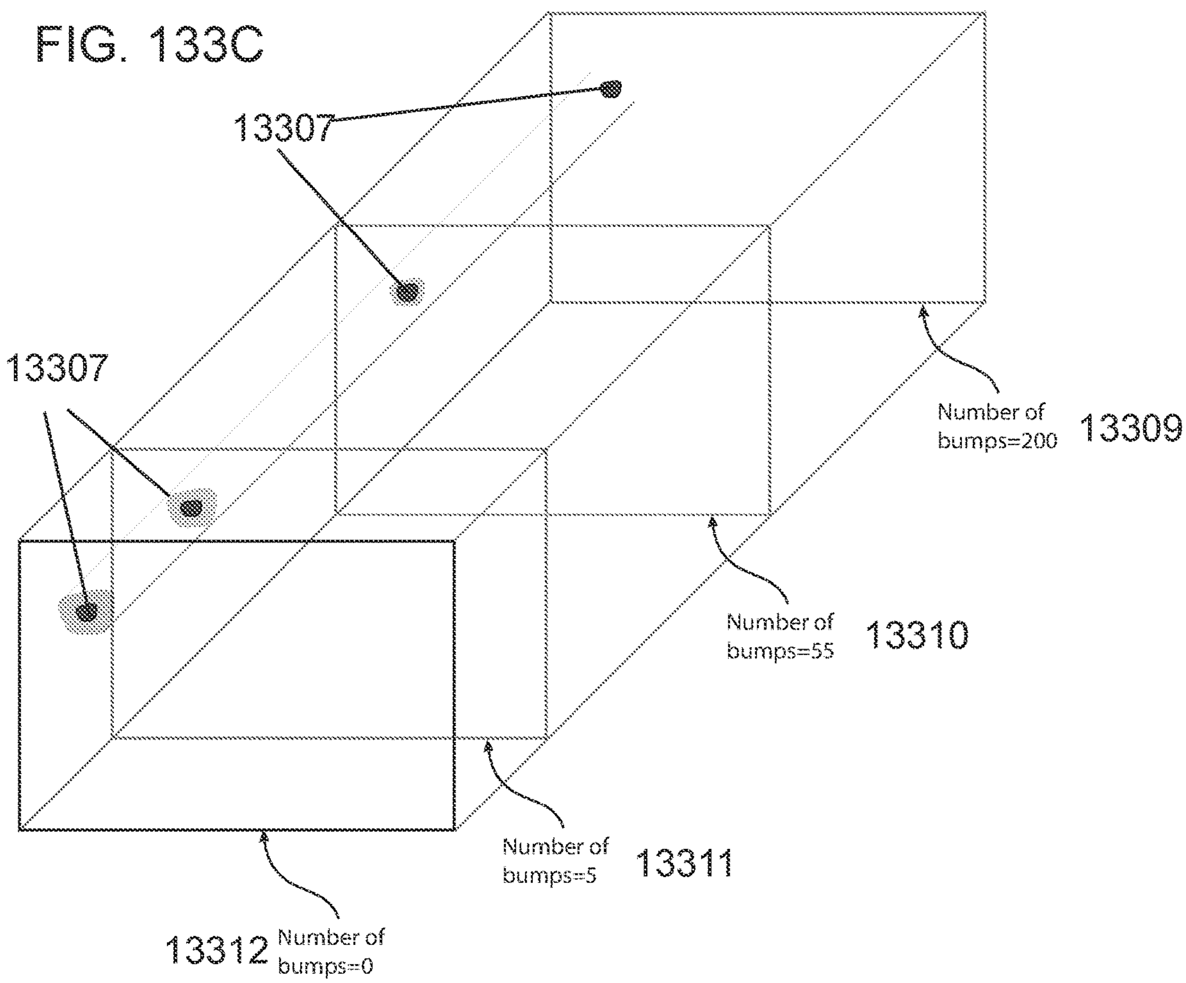

FIG. 133C illustrates three-dimensional data indicative of a location and size of a leg of table at different time points.

Figure 134A:
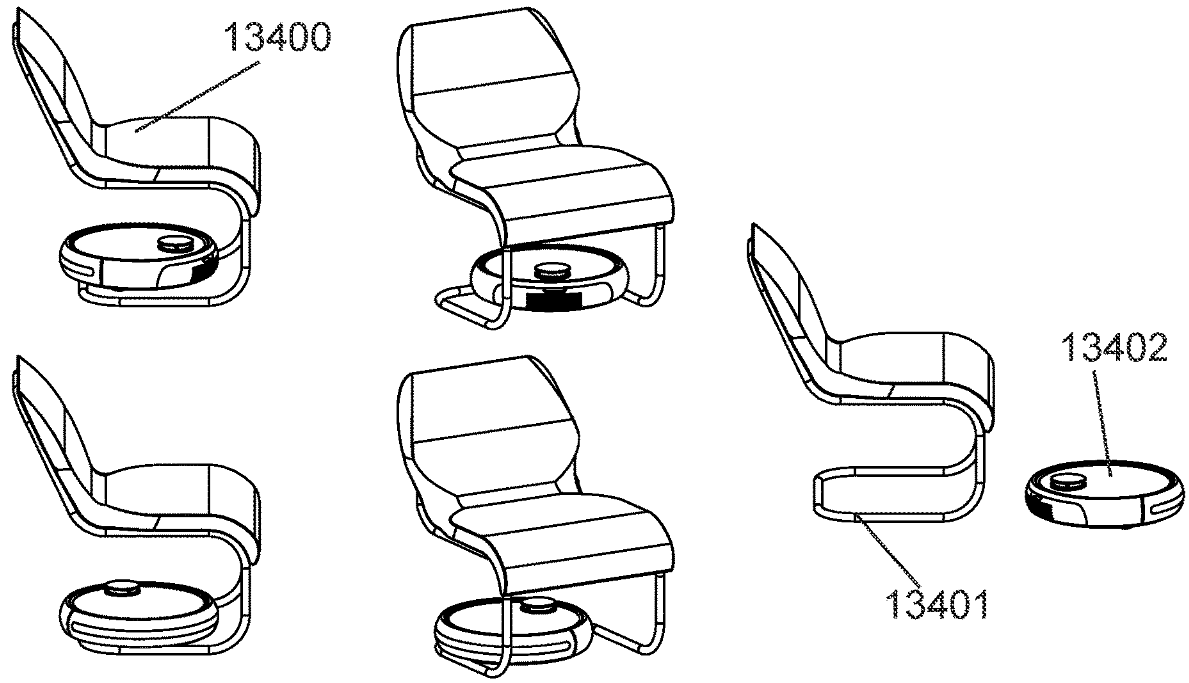

FIG. 134A illustrates a chair with a U-shaped base and a robot.

Figure 134B:
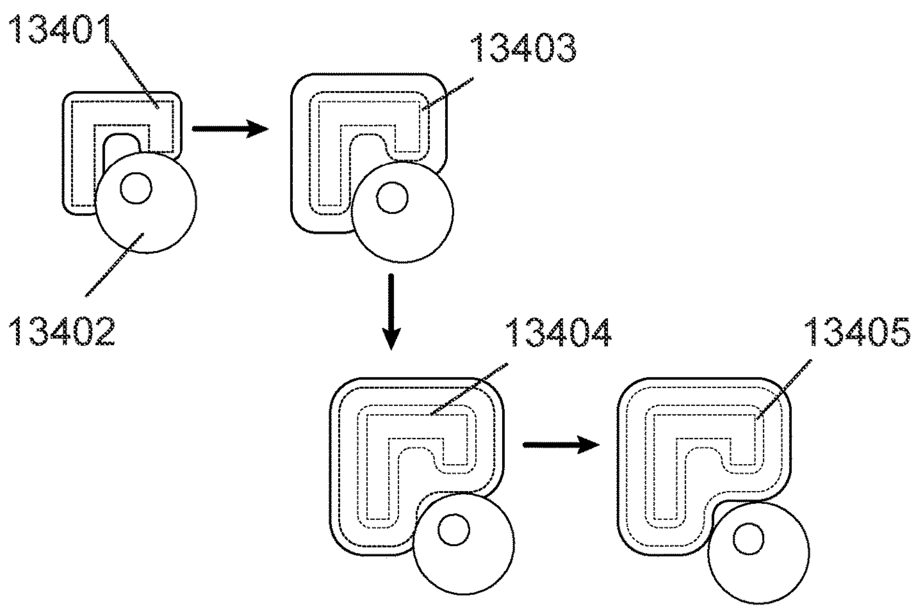

FIG. 134B illustrates the U-shaped base with an inflated size.

Figure 134C:
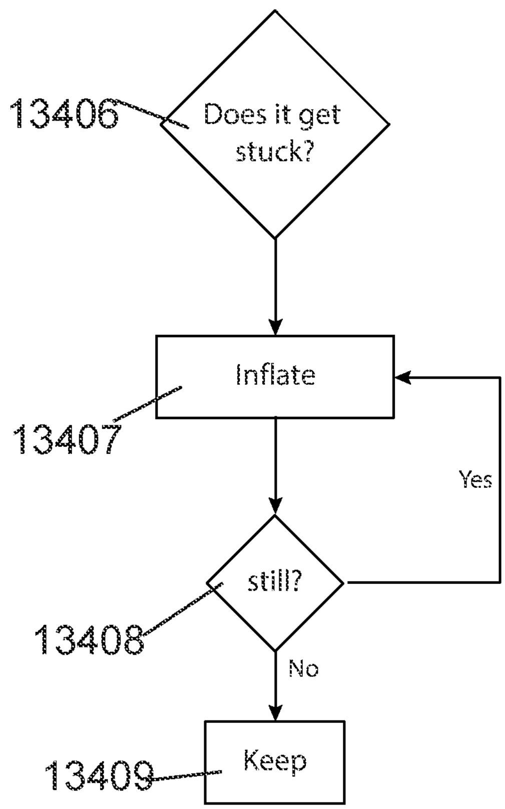
Figure 134D:
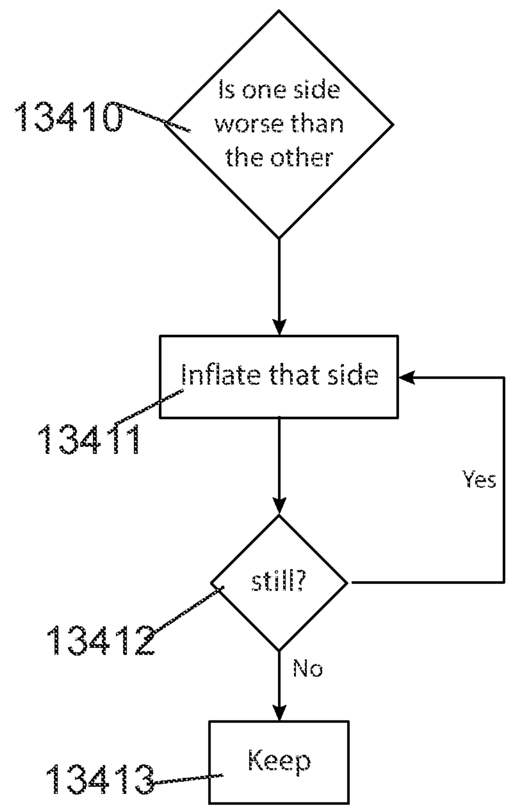

FIGS. 134C-134D illustrates flowcharts describing a process for preventing the robot from becoming entangled with an object.

FIG. 135 illustrates a robot struggling in overcoming an obstacle.

Figure 136:
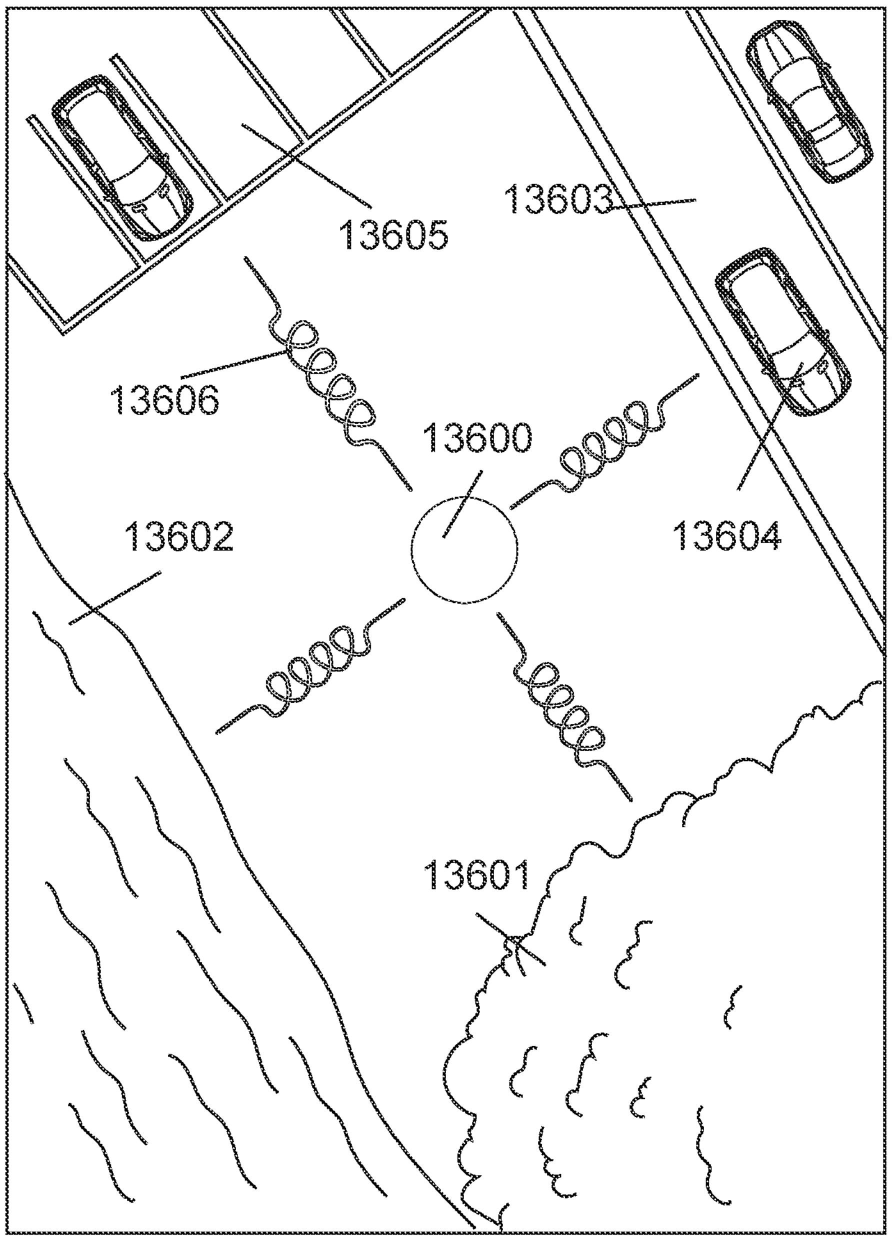

FIG. 136 illustrates the robot, the grassy area, the ocean, the street with cars, and the parking area.

Figure 137:
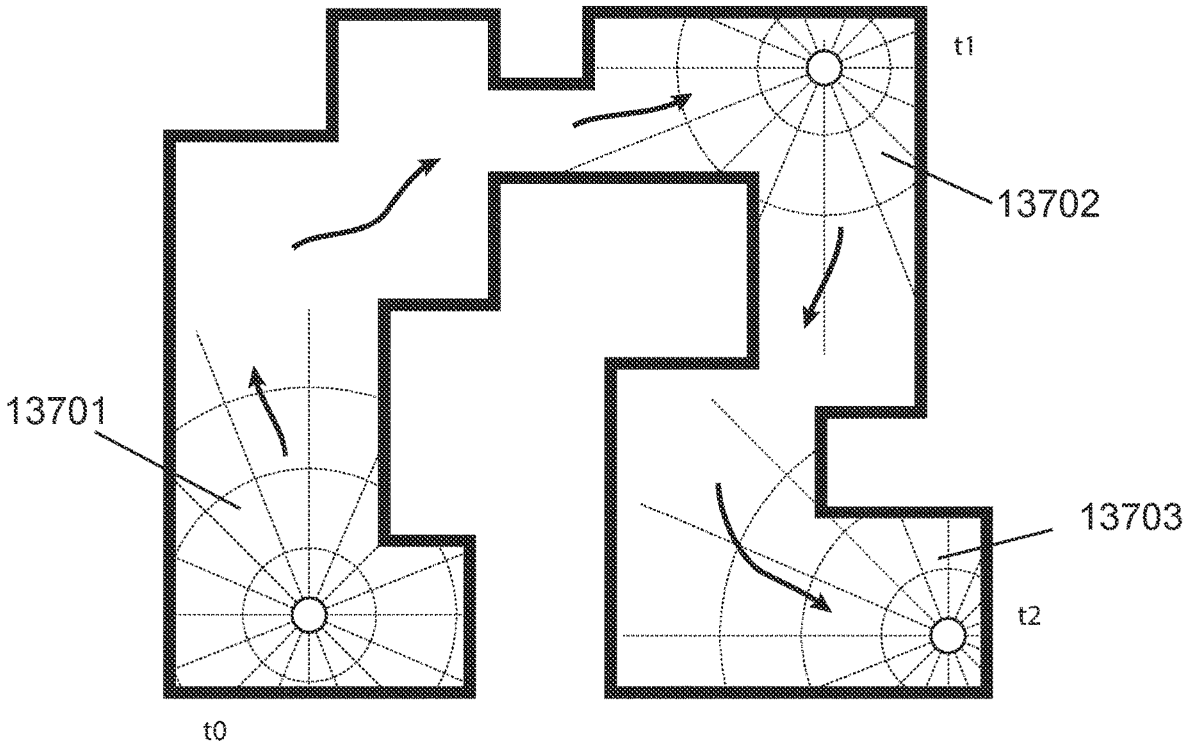

FIG. 137 illustrates observations of a camera of a robot at different times and locations.

Figure 138:
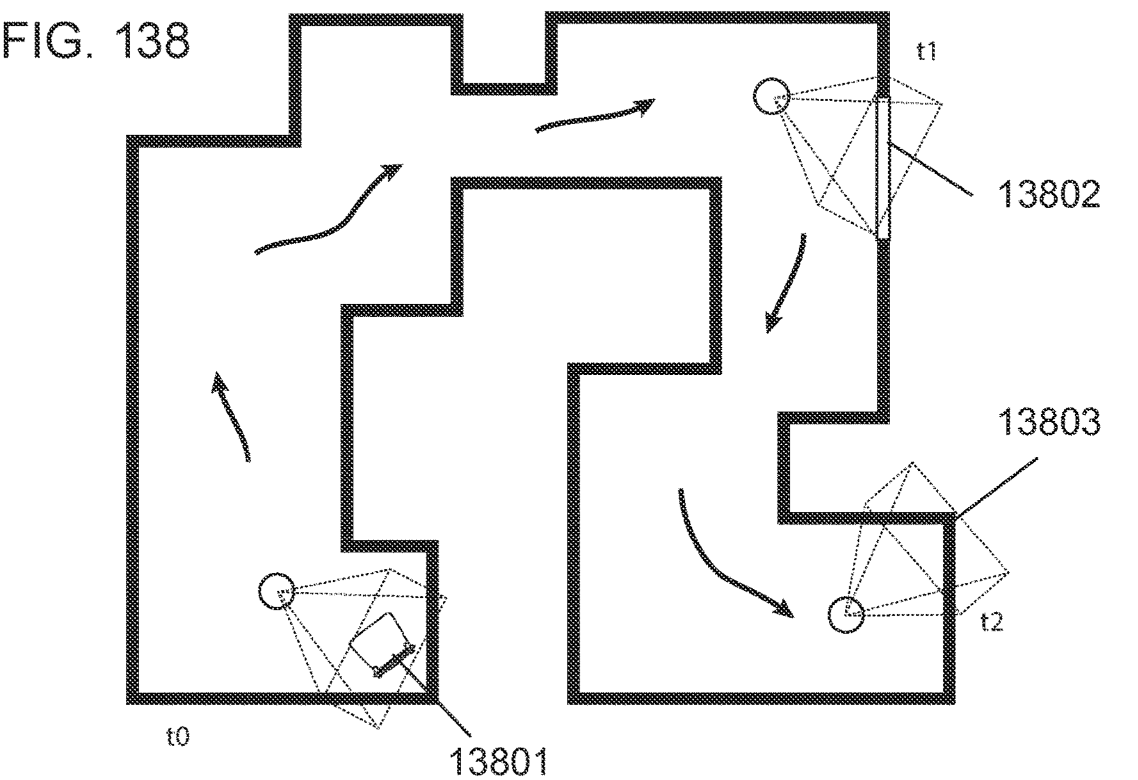

FIG. 138 illustrates observations of a camera of a robot at different times and locations.

Figure 139:
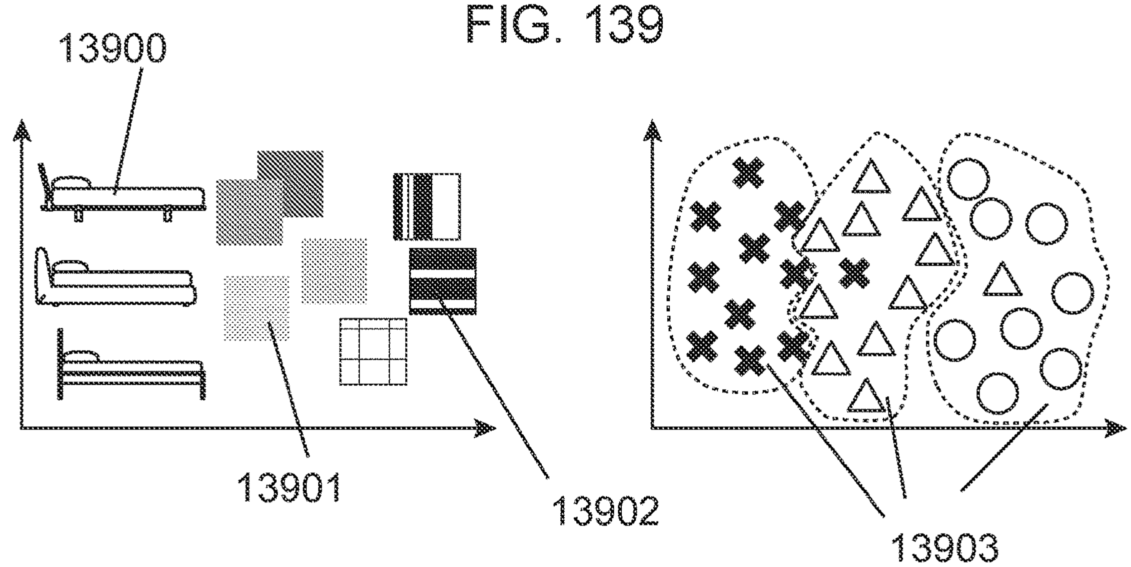

FIG. 139 illustrates an example of different commonalities observed for an area.

Figure 140:
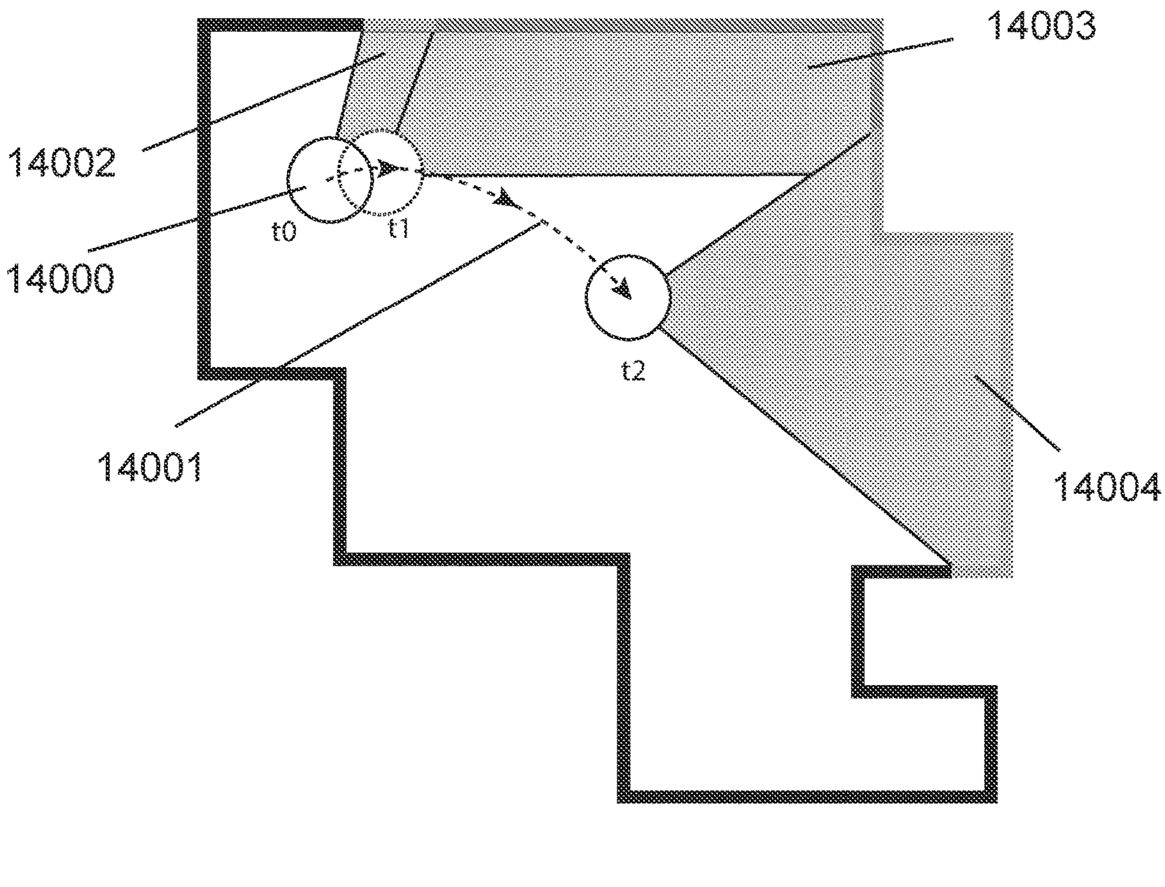

FIG. 140 illustrates the robot and its trajectory.

Figure 141:
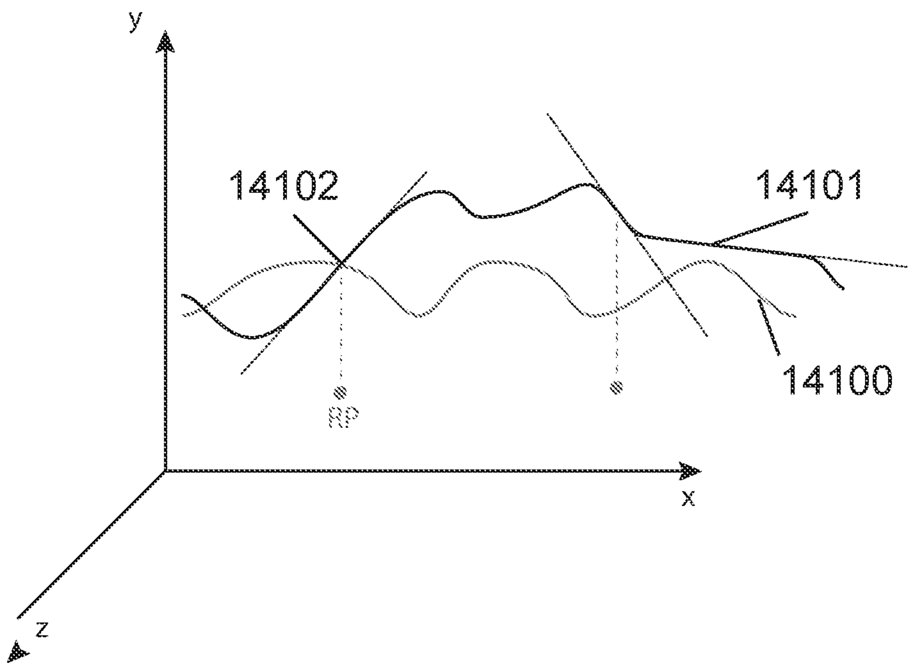

FIG. 141 illustrates confidence in the map/localization

Figure 142A:
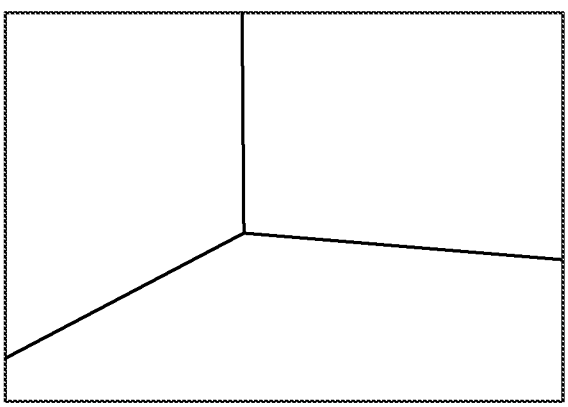

FIG. 142A illustrates an area of an environment.

Figure 142B:
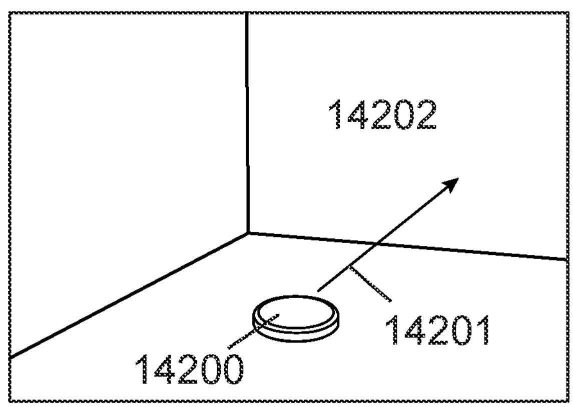

FIG. 142B illustrates the robot taking a single depth measurement to a wall.

Figure 142C:
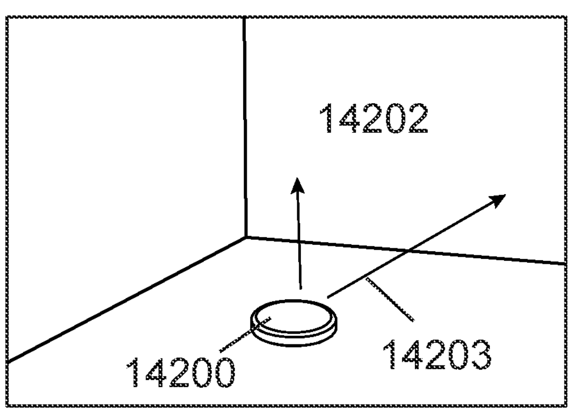

FIG. 142C illustrates the robot taking two depth measurements to the wall.

Figure 143A:
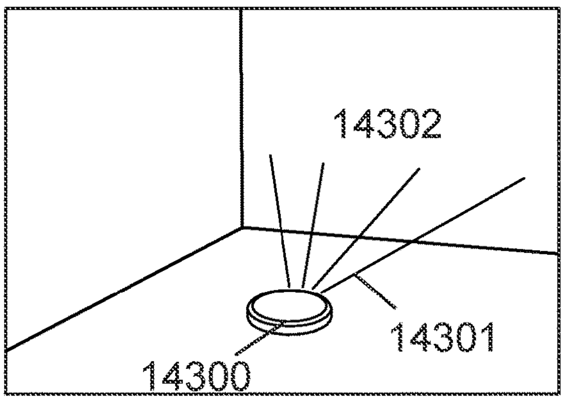
Figure 143B:
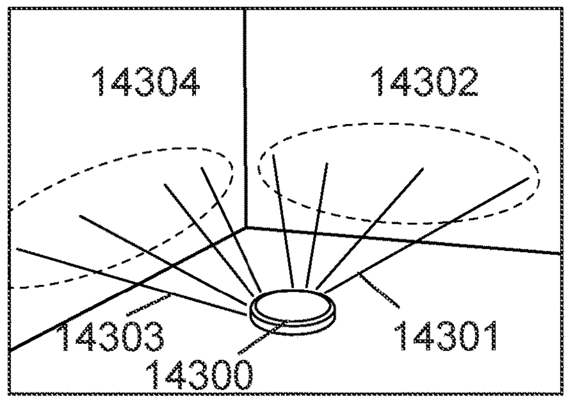
Figure 143C:
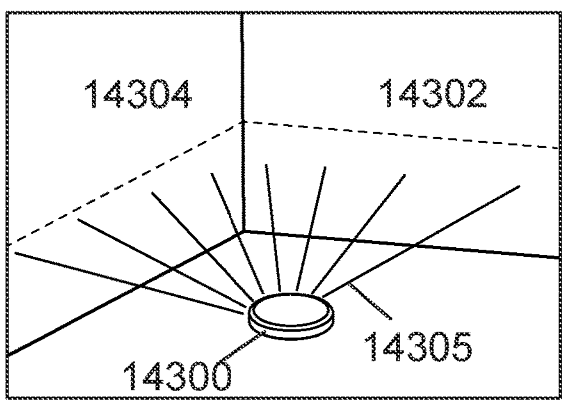

FIGS. 143A-143C illustrate a robot taking depth measurements to walls.

Figure 144:
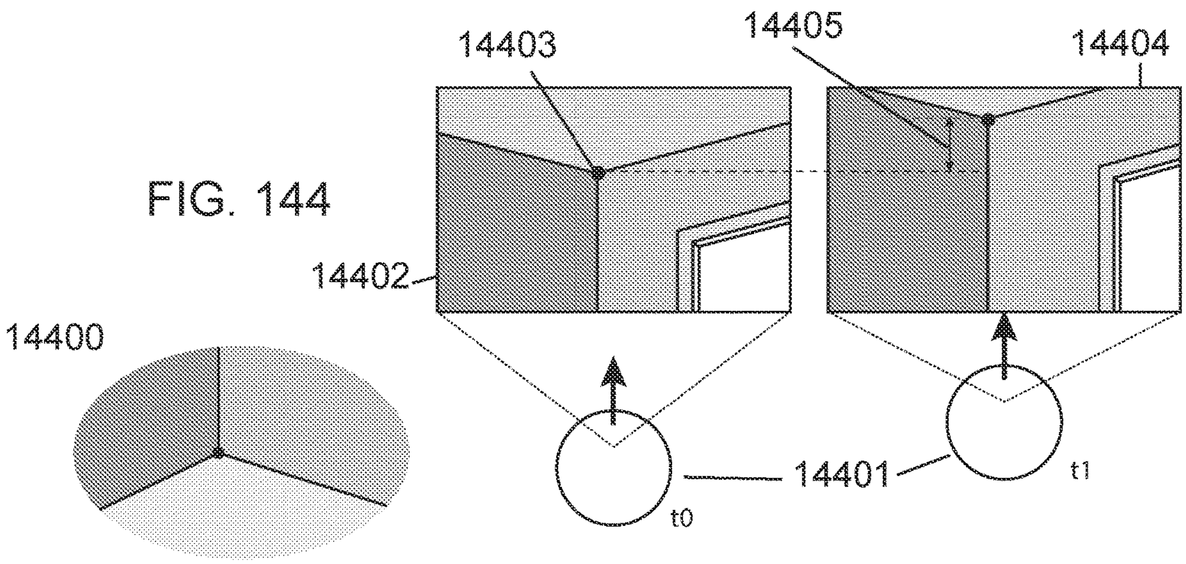

FIG. 144 illustrates an example of a corner that may be detected by a processor of a robot.

Figure 145:
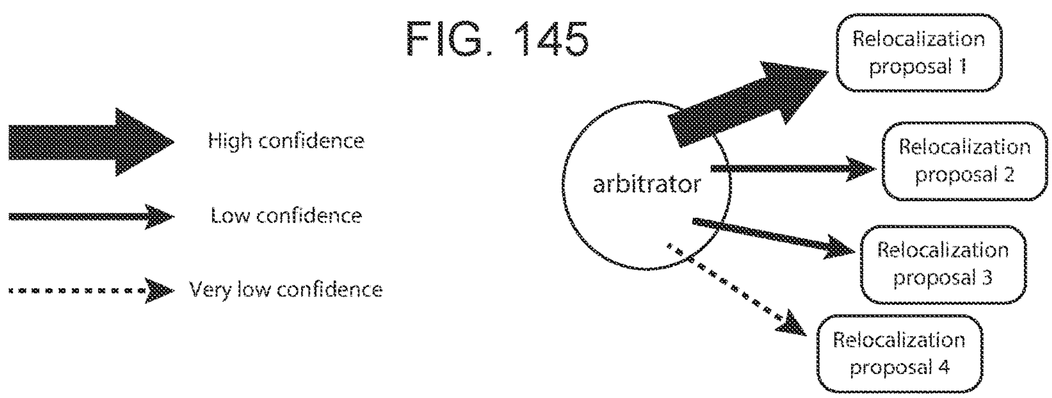

FIG. 145 illustrates an arbitrator proposing four different localization scenarios.

Figure 146A:
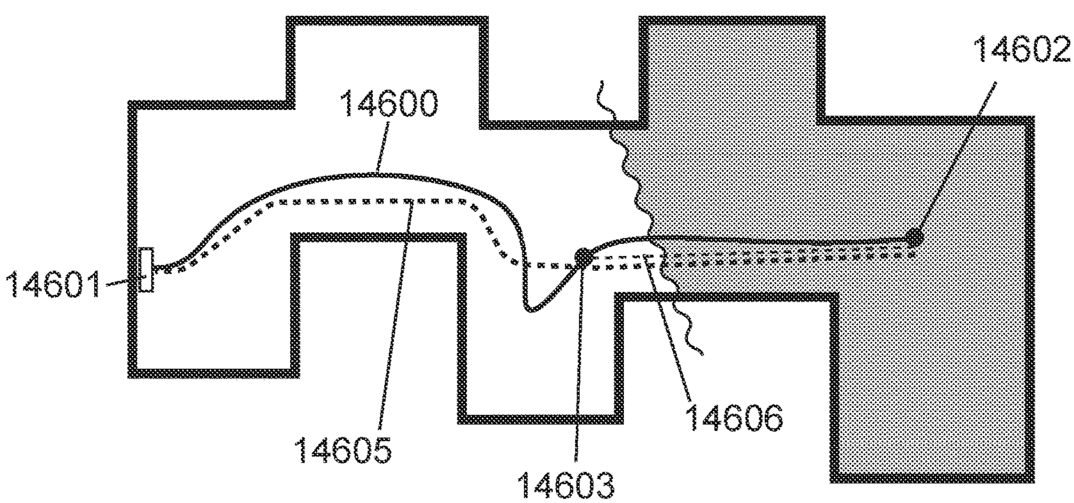

FIG. 146A illustrates the last known rendezvous point for the robot.

Figure 146B:
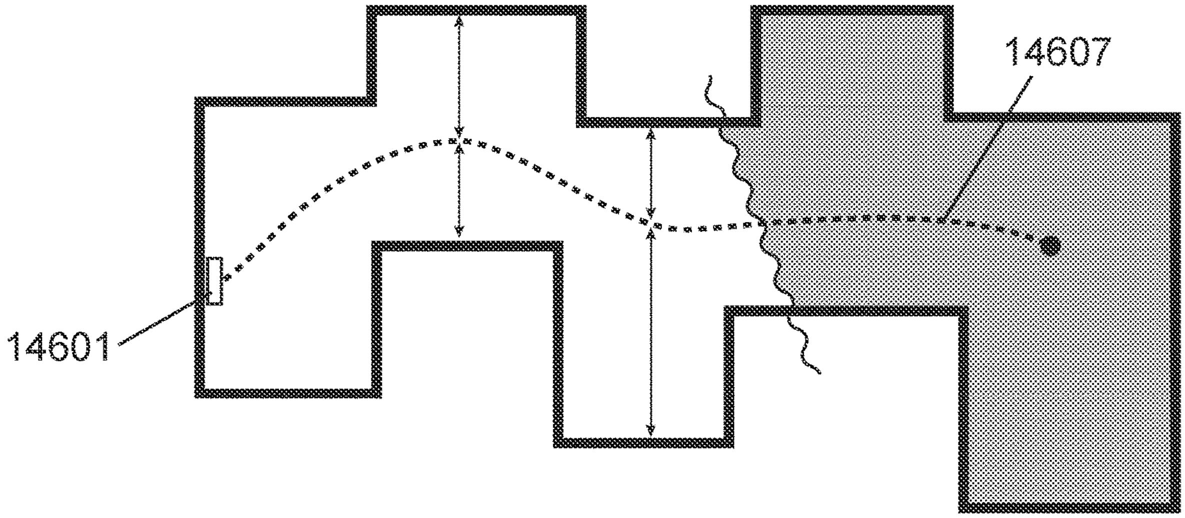

FIG. 146B illustrates a safe bread crumb path that the robot follows back to the charging station.

Figure 146C:
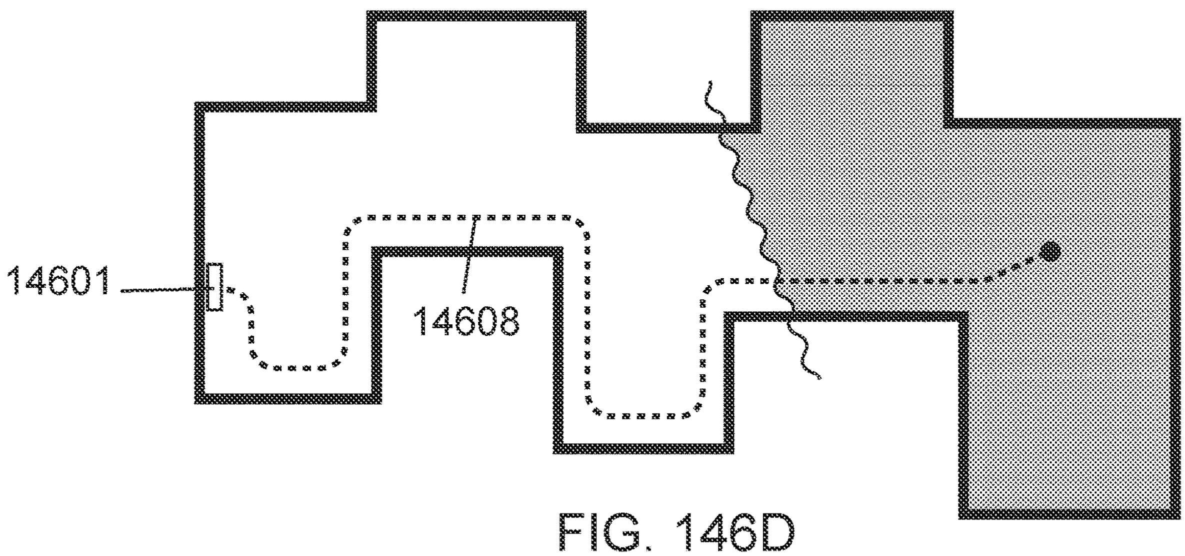

FIG. 146C illustrates a coastal path that the robot may follow to return to the charging station.

Figure 146D:
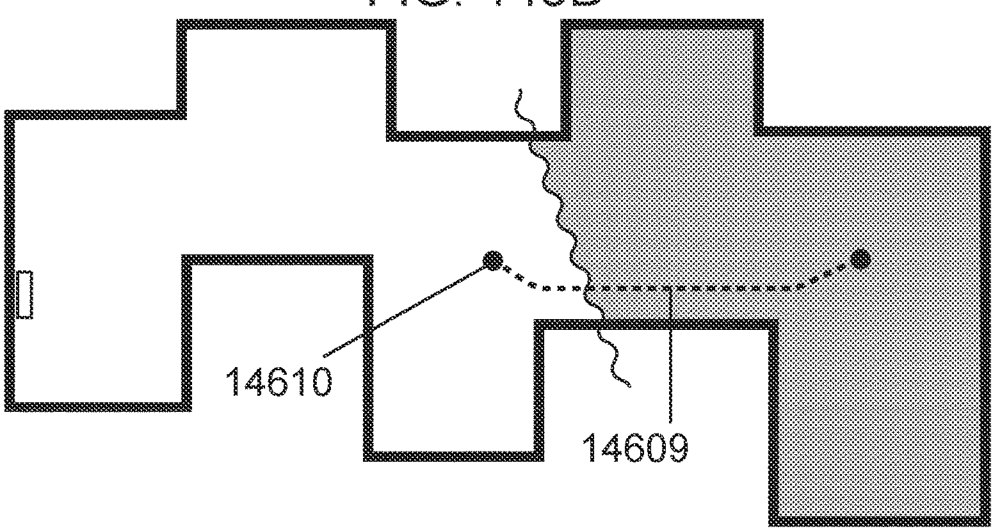

FIG. 146D illustrates a coastal path that the robot may follow to last known point.

Figure 147:
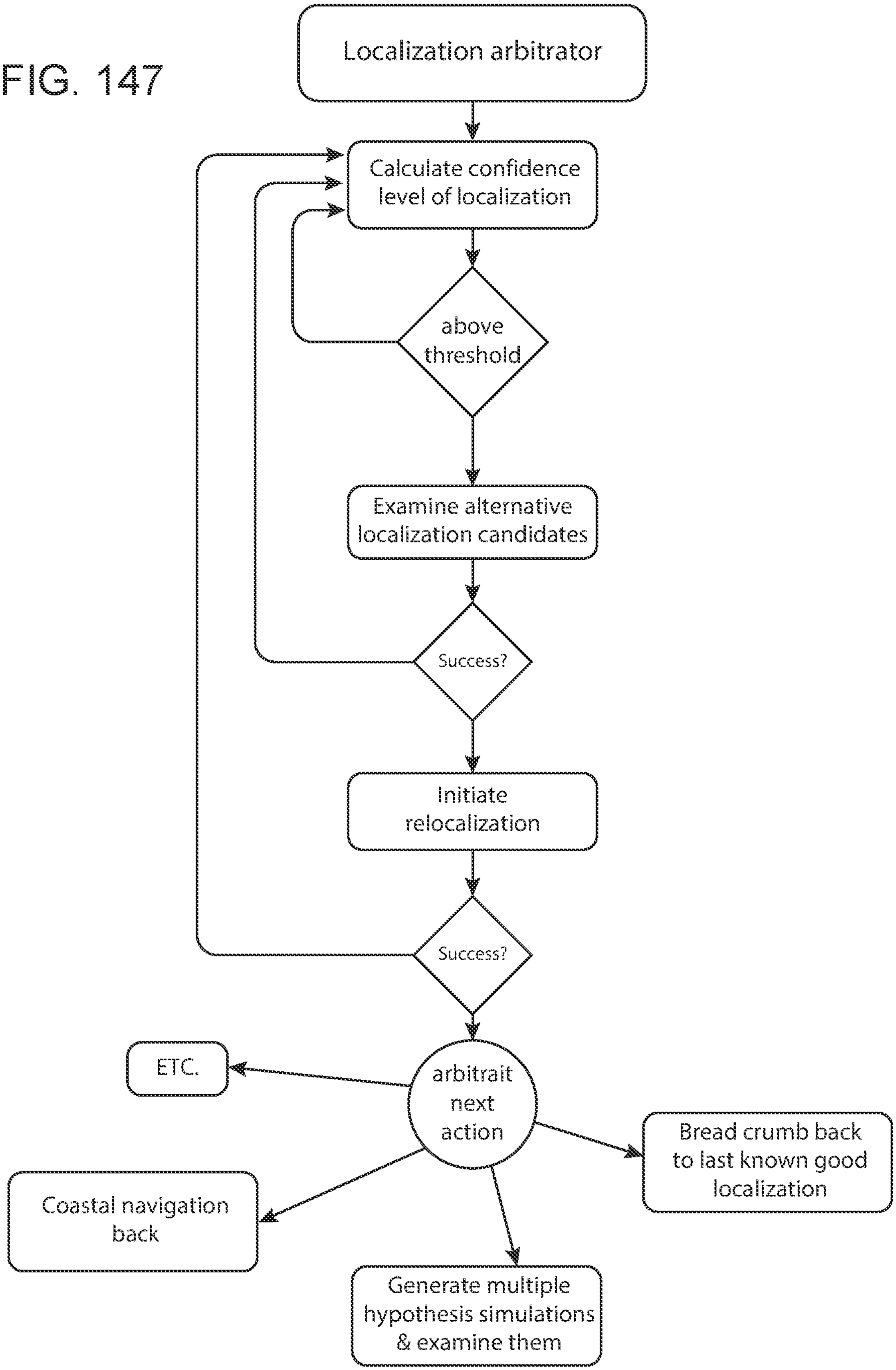

FIG. 147 illustrates an example of a flowchart illustrating methods implemented in a localization arbitrator algorithm.

FIGS. 148A-148F illustrate an example of structured light projecting in the environment.

Figure 149:
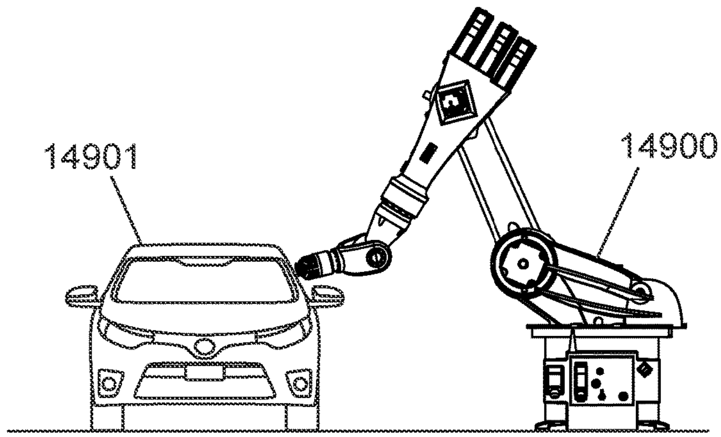

FIG. 149 illustrates a factory robot and a car.

Figure 150:
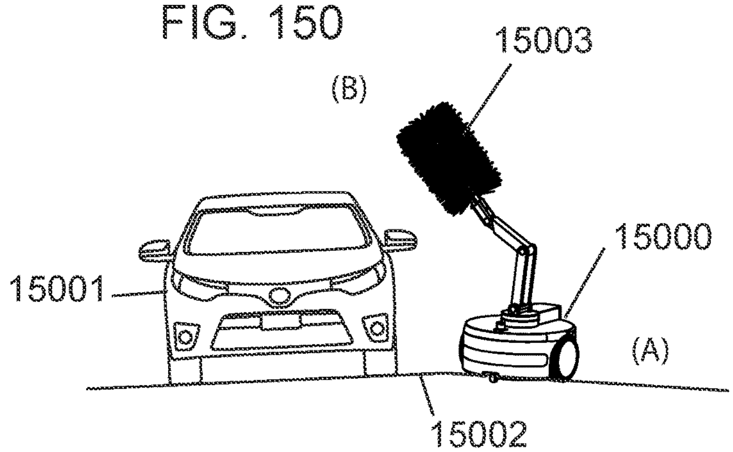

FIG. 150 illustrates a car washing robot and a car positioned on a slope ground.

Figure 151:
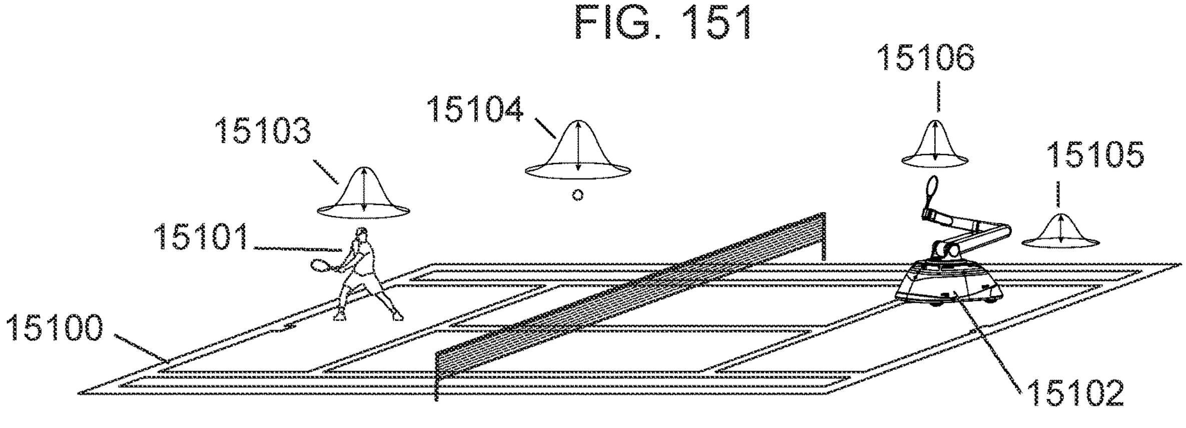

FIG. 151 illustrates a tennis court, a robot and a human player.

Figure 152:
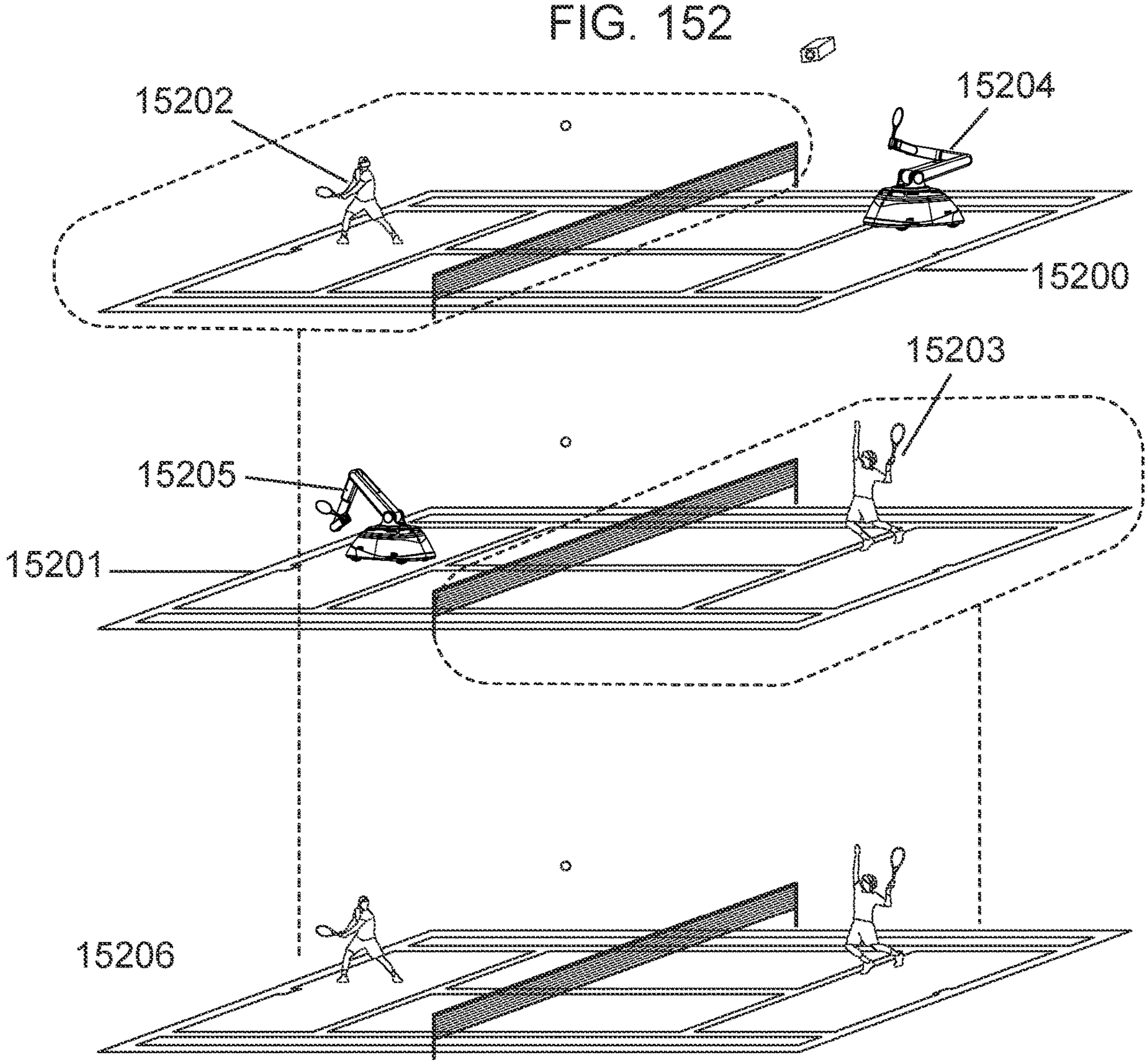

FIG. 152 illustrates two remote tennis courts and their combined broadcasting image.

Figure 153:
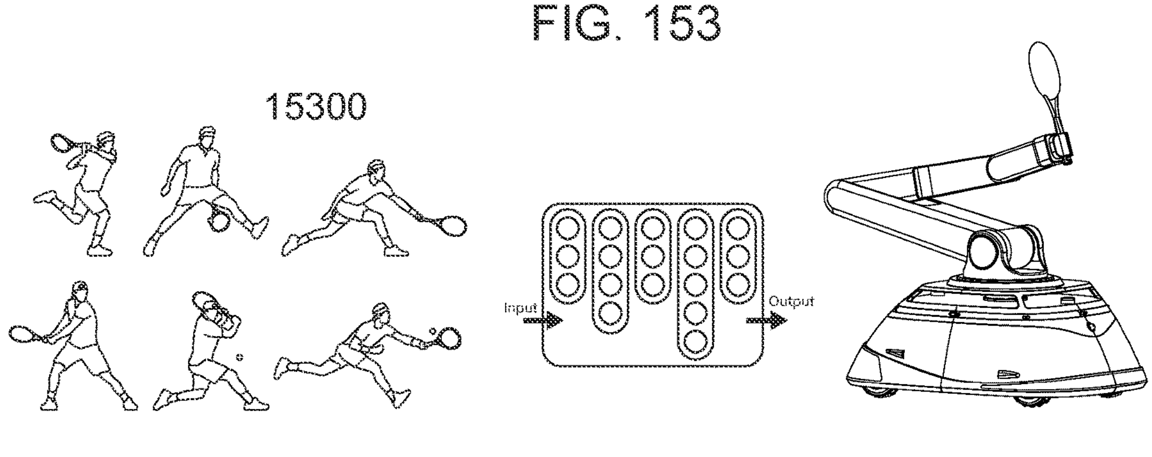

FIG. 153 illustrates movements of a player can be taught to the robot via neural network.

Figure 154A:
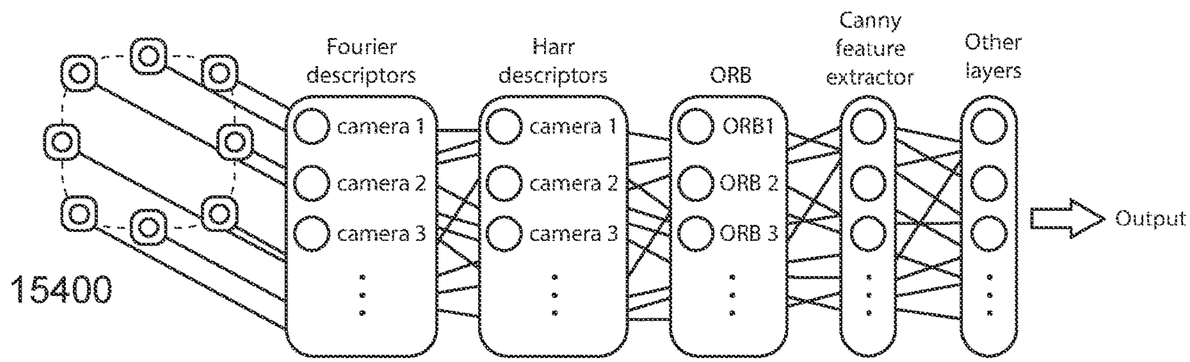

FIG. 154A illustrates a neural net with multiple camera inputs.

Figure 154B:
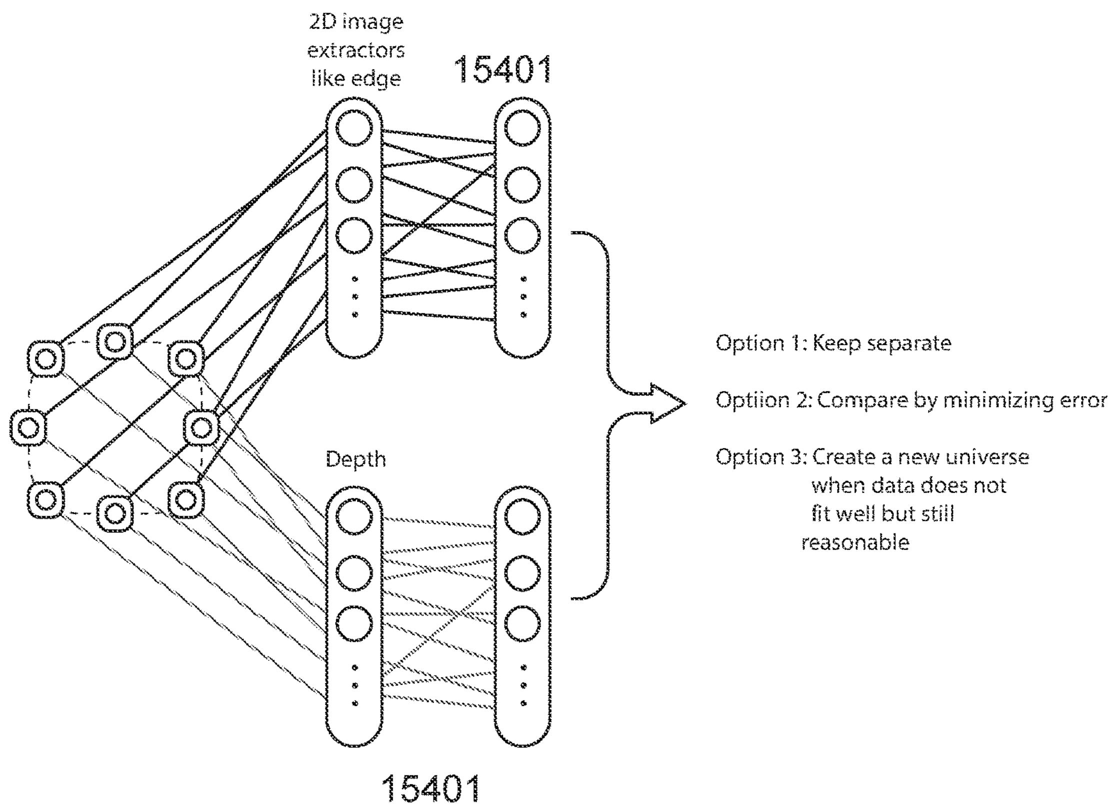

FIG. 154B illustrates two separate neural nets with the same camera inputs.

FIG. 155 illustrates various types of image segmentations.

Figure 156:
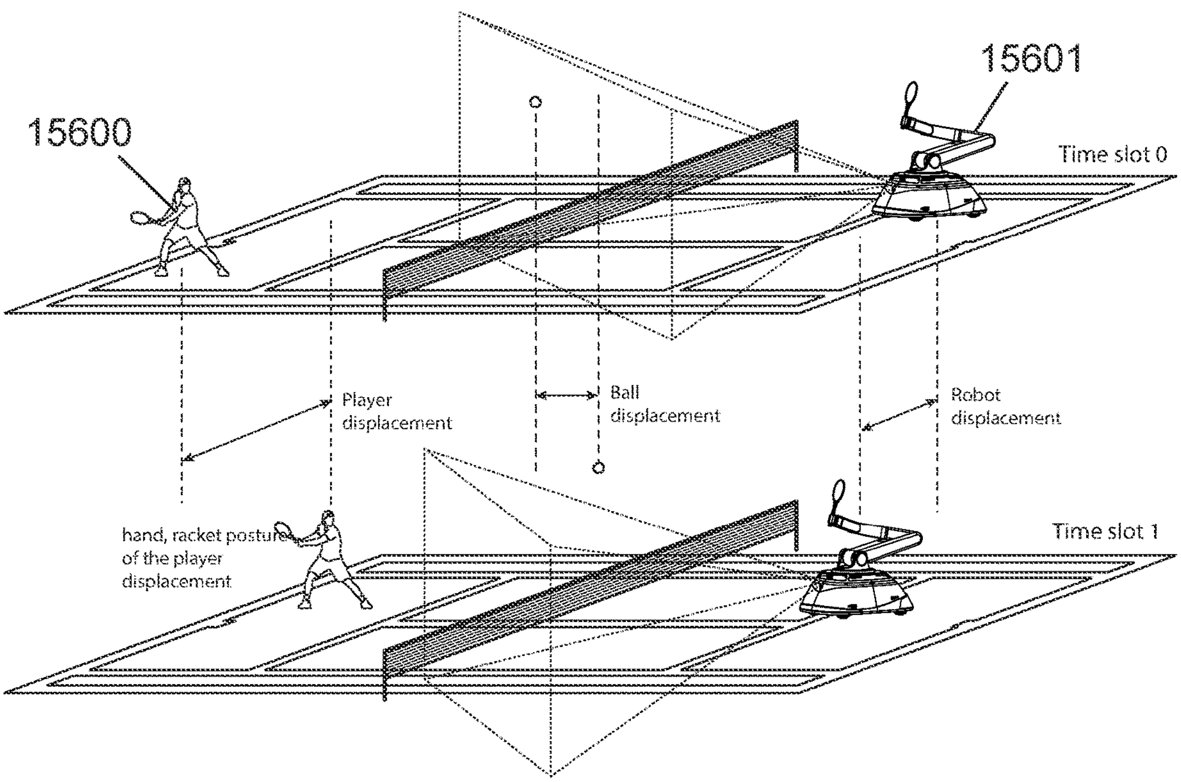

FIG. 156 illustrates a tennis court at two different time slots.

Figure 157:
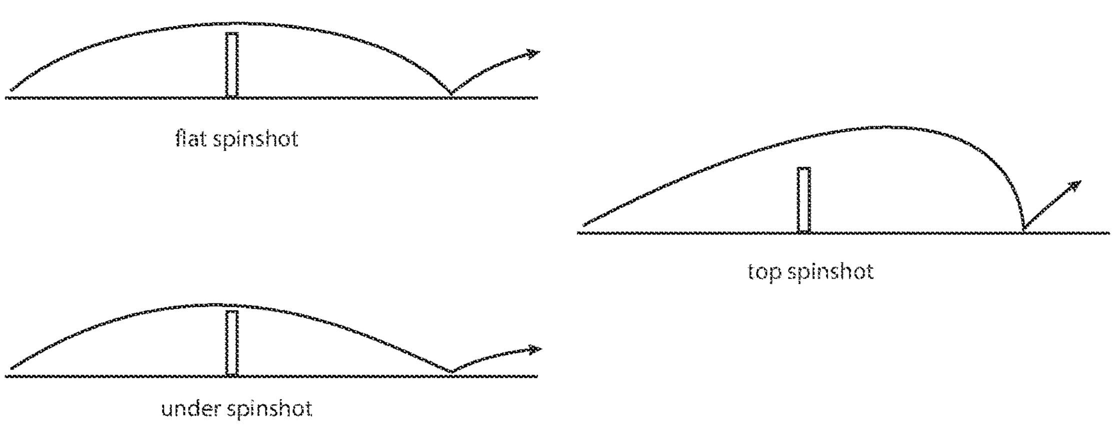

FIG. 157 illustrates examples of different tennis ball shots.

Figure 158:
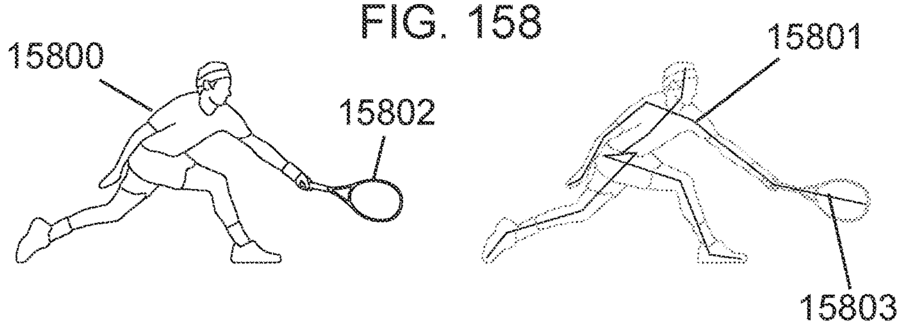

FIG. 158 illustrates a human depicted as a stick figure representation.

Figure 159A:
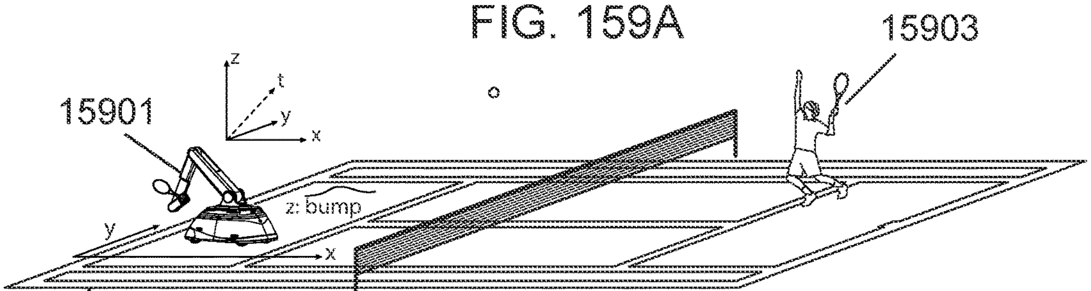
Figure 159B:
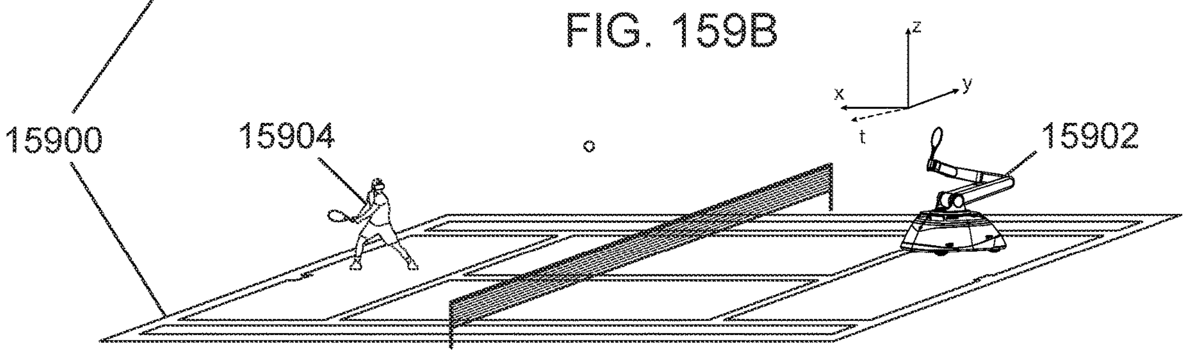

FIGS. 159A-159B illustrate two tennis courts in two different time zones with proxy robots facilitating a remote tennis game against human players.

FIG. 160A-160C illustrate a virtually displayed double match between four players.

FIG. 161 illustrates a graph comparing the deviation of the 3D versions of the world generated by two car companies and the actual real world.

Figure 162A:
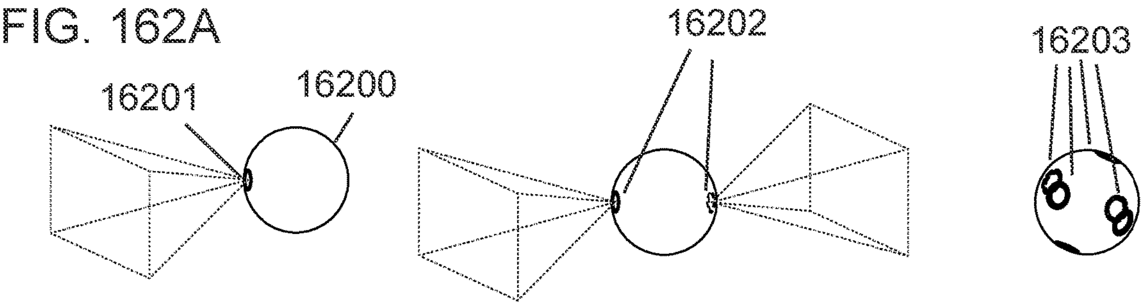
Figure 162B:
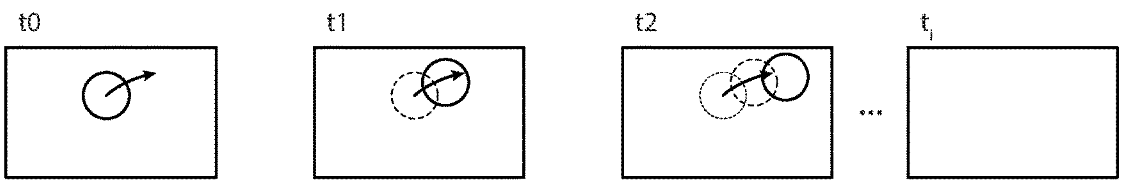

FIG. 162A illustrates examples of a ball with one camera, two cameras and multiple cameras FIG. 162B illustrates IMU data over time.

Figure 162C:
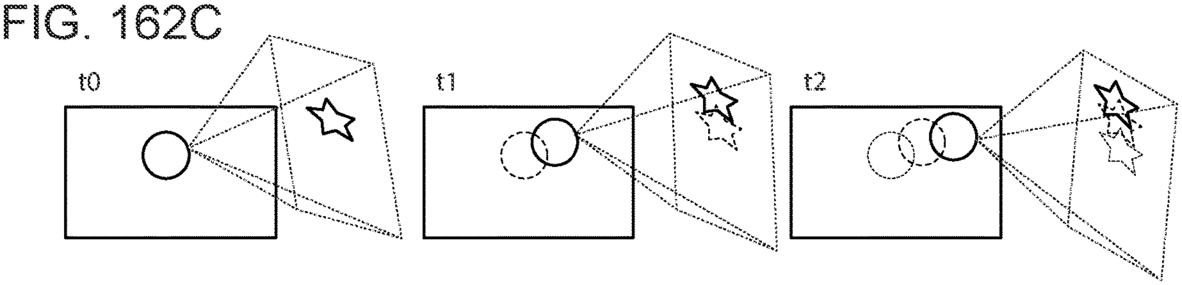

FIG. 162C illustrates data captured by a camera of the ball over time.

Figure 162D:
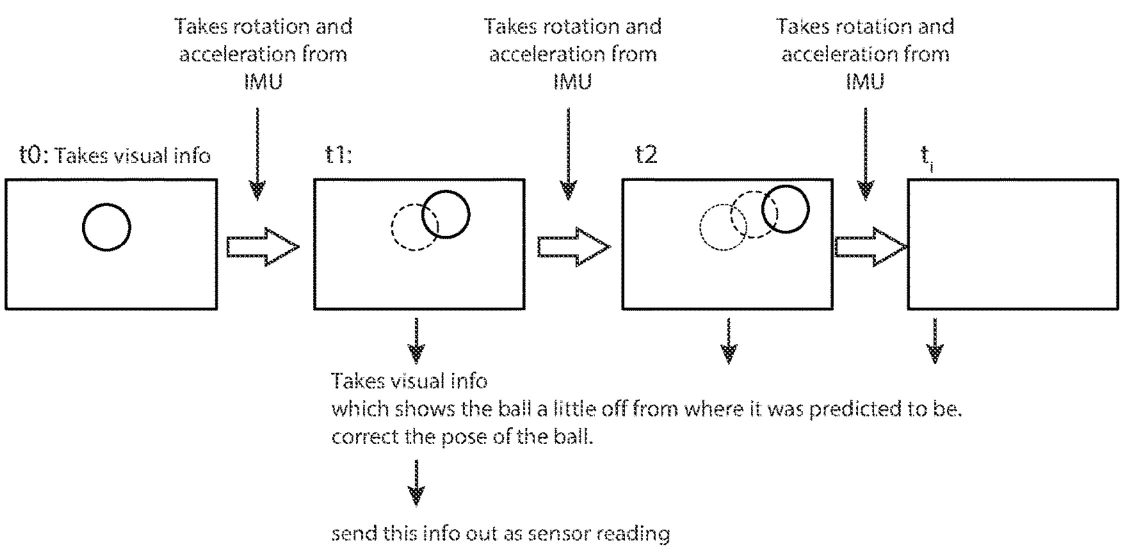

FIG. 162D illustrates the combination of camera and IMU data to generate localization data.

Figure 163:
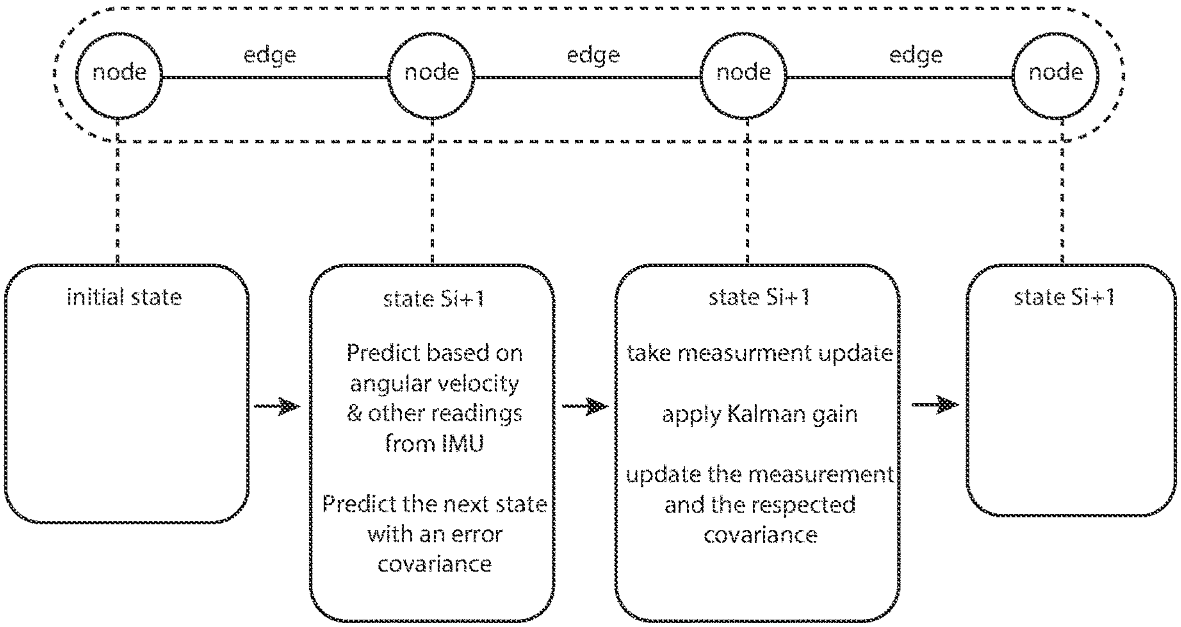

FIG. 163 illustrates an example of a process of a Kalman filter.

Figure 164:
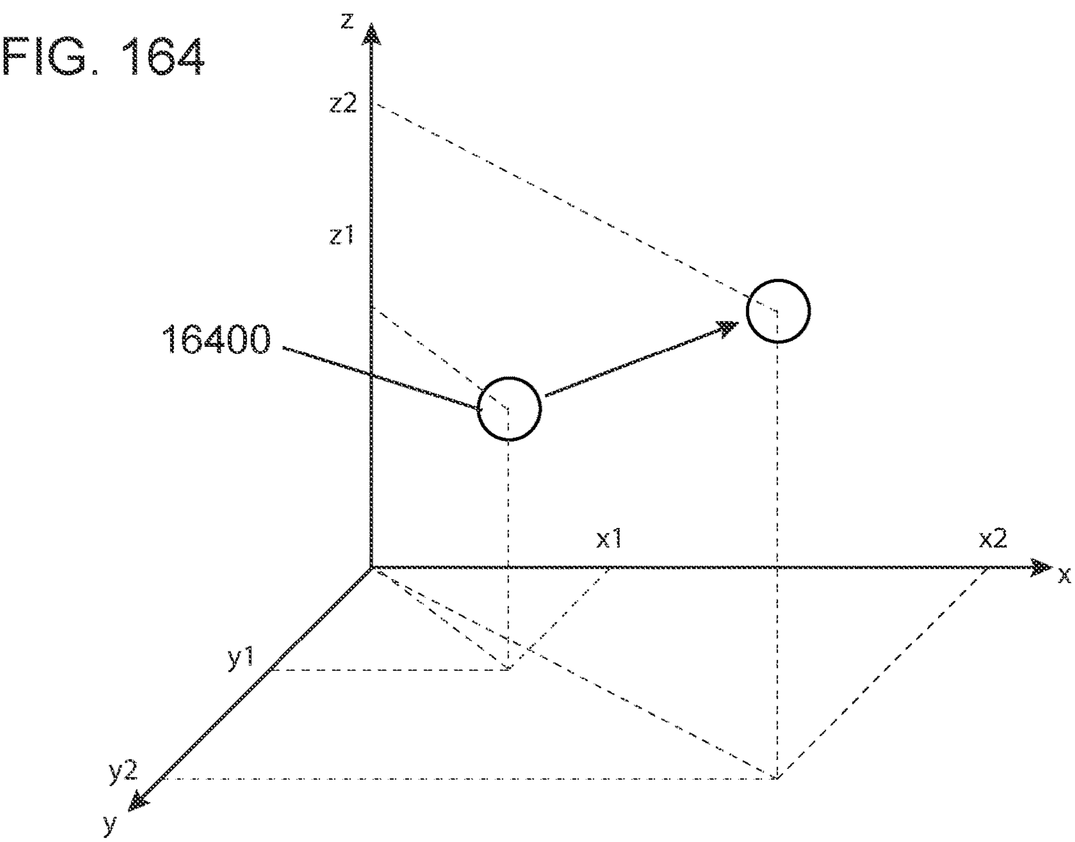

FIG. 164 illustrate a displacement of a ball.

Figure 165:
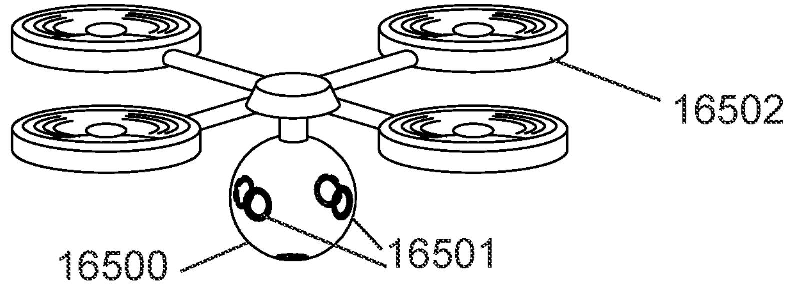

FIG. 165 illustrates a ball configured to operate as a SLAM sensor.

Figure 166:
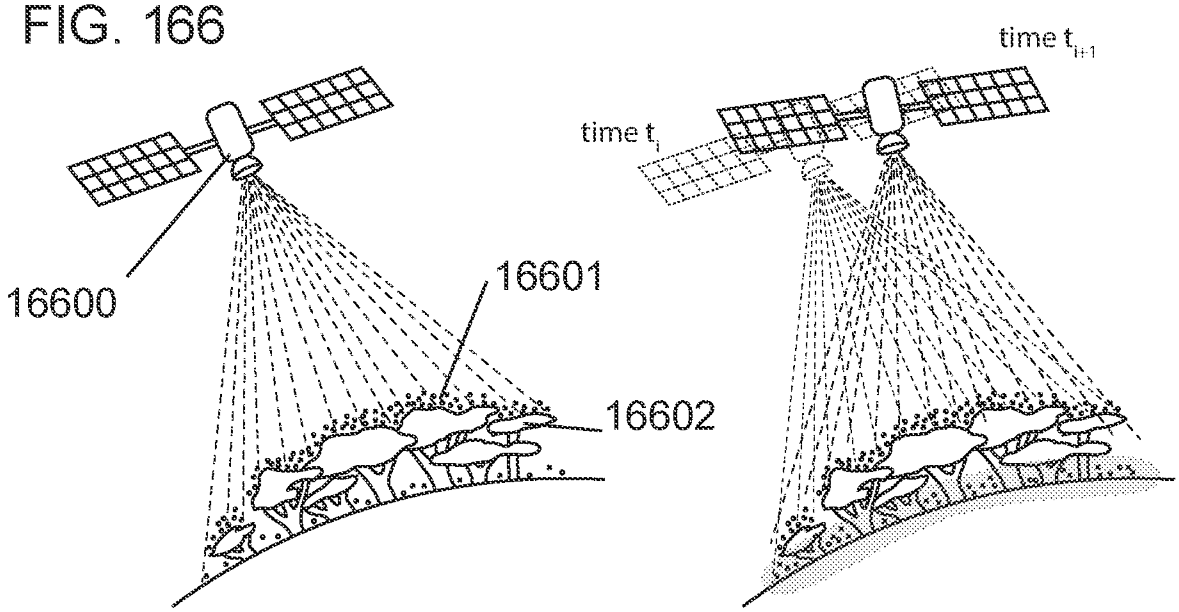

FIG. 166 illustrates a satellite generating a point cloud above a jungle area.

Figure 167A:
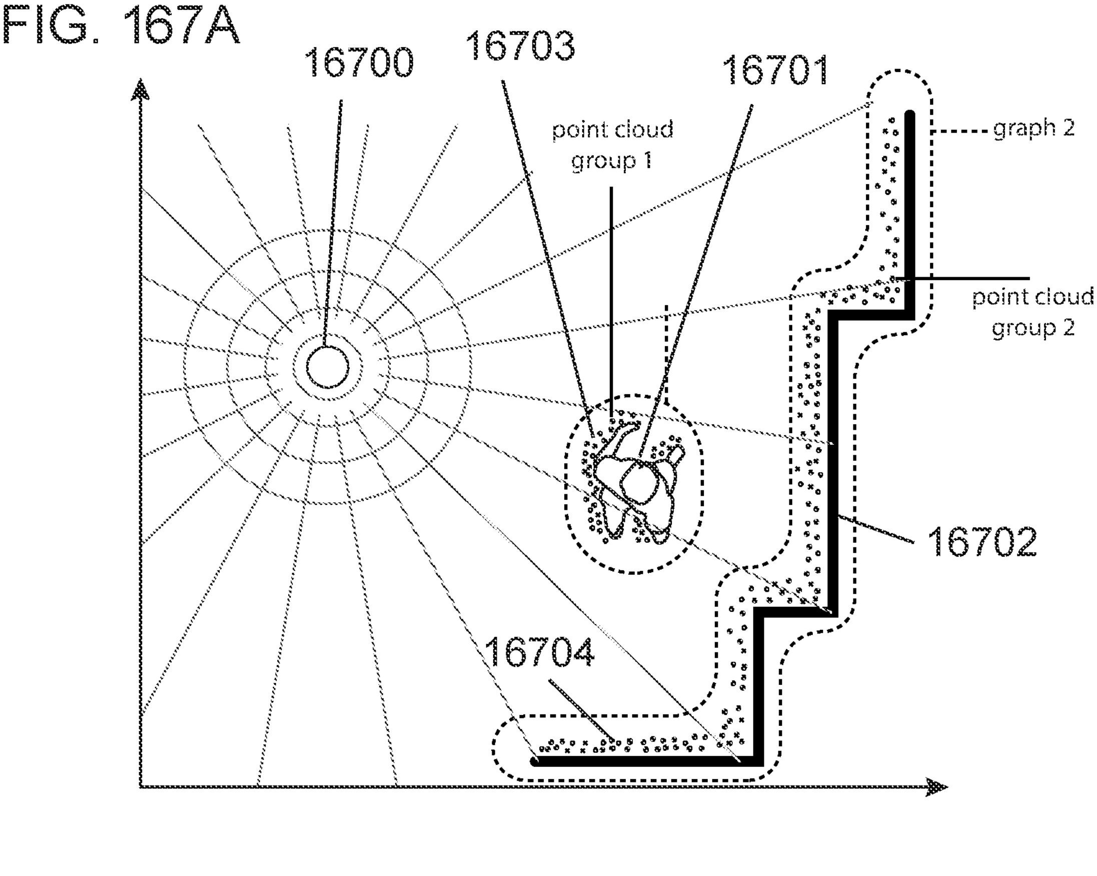
Figure 167B:
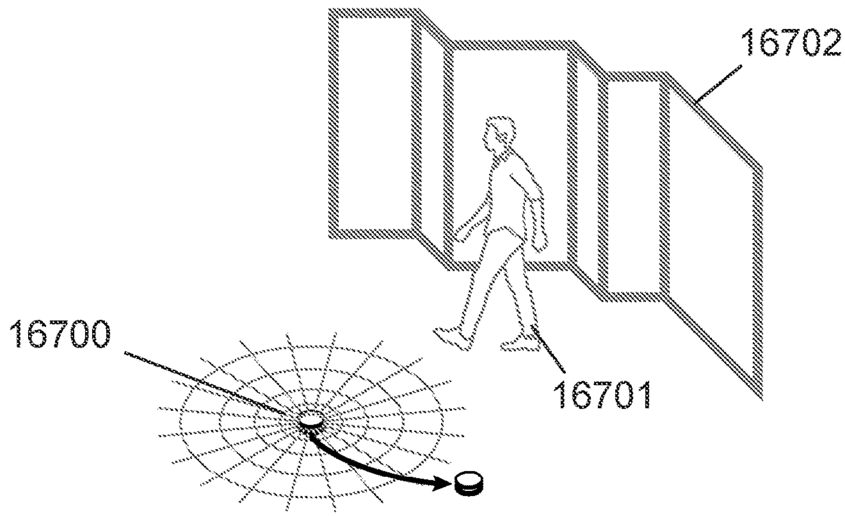
Figure 167C:
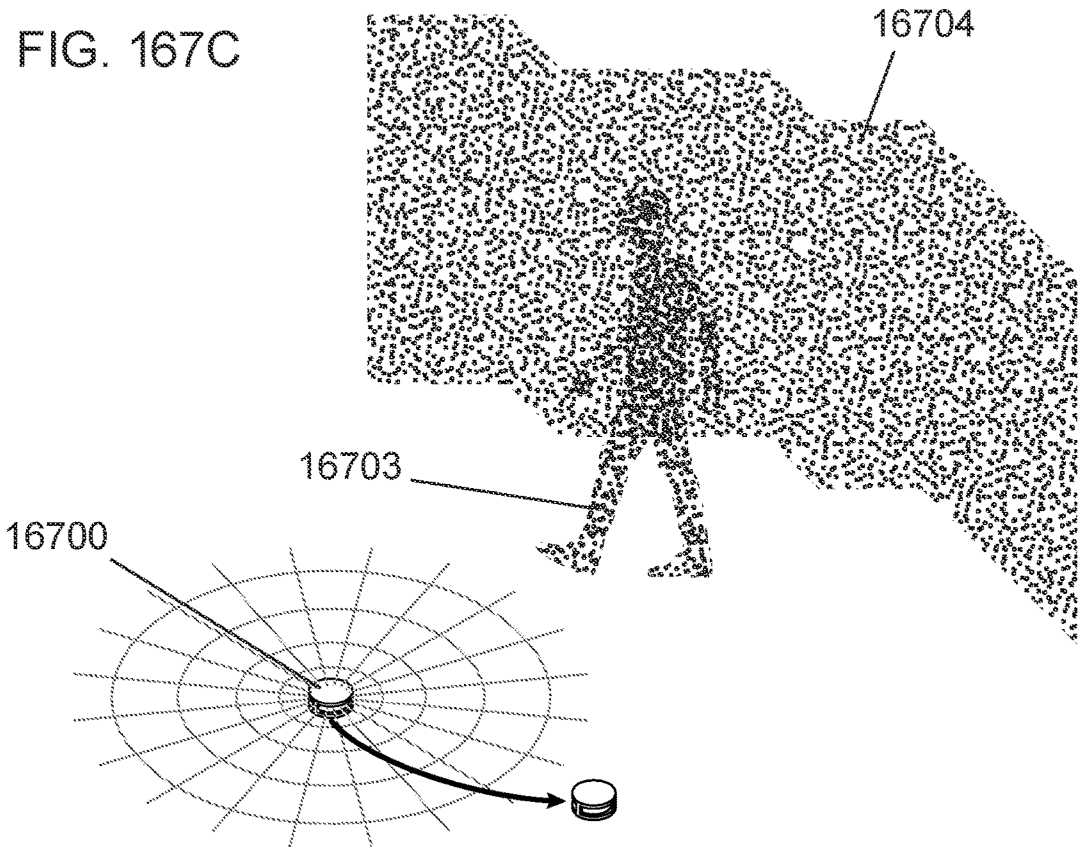

FIGS. 167A-167C illustrate a robot with LIDAR, a moving person and a wall.

Figure 168:
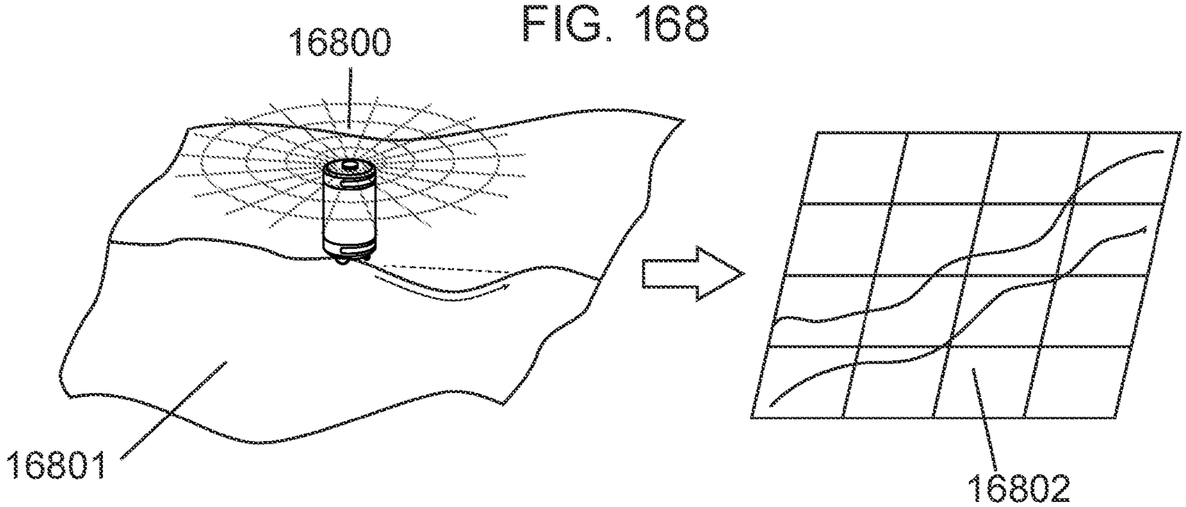

FIG. 168 illustrates how using LIDAR readings to correct odometer information on an uneven plane may result in a distorted map.

Figure 169:
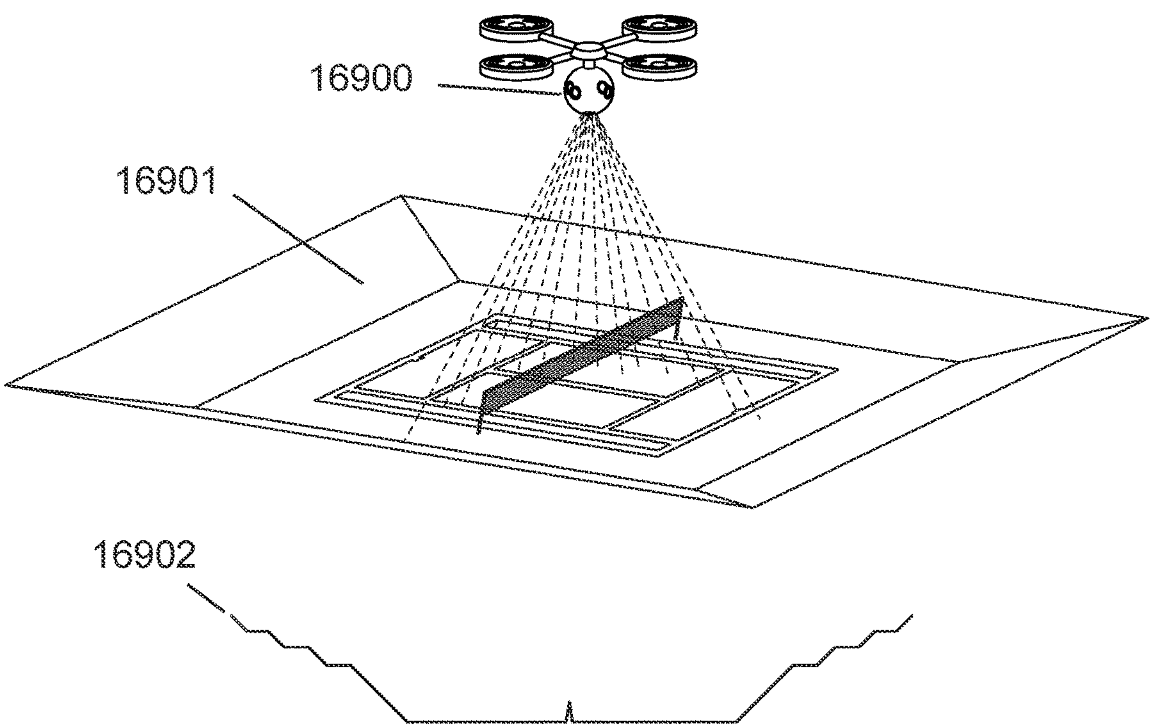

FIG. 169 illustrates a drone with LIDAR surveying an environment.

Figure 170A:
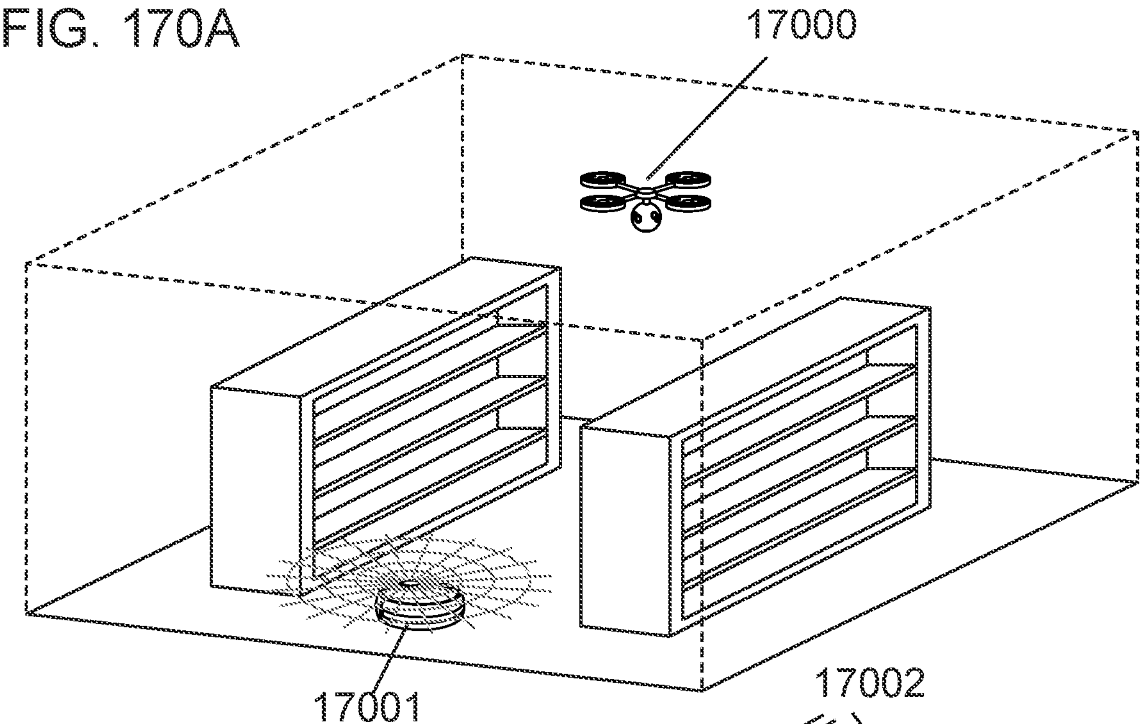

FIG. 170A illustrates using a mapping robot/drone with higher resolution capabilities in the training phase.

170B illustrates using spatial equipment to help the robot localize itself within the map.

FIG. 171A illustrates an example of an object with a particular indentation pattern.

FIGS. 171B-171C illustrate the use of objects with indentation as landmarks for the robot.

FIGS. 172A-172B illustrate the training phase of the robot using an application on a communication device.

Figure 173:
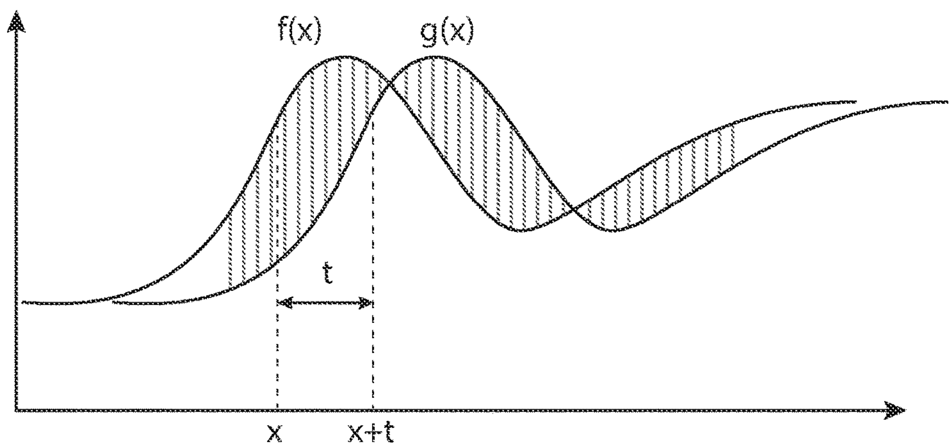

FIG. 173 illustrates an example of determining disparity of two functions.

Figure 174A:
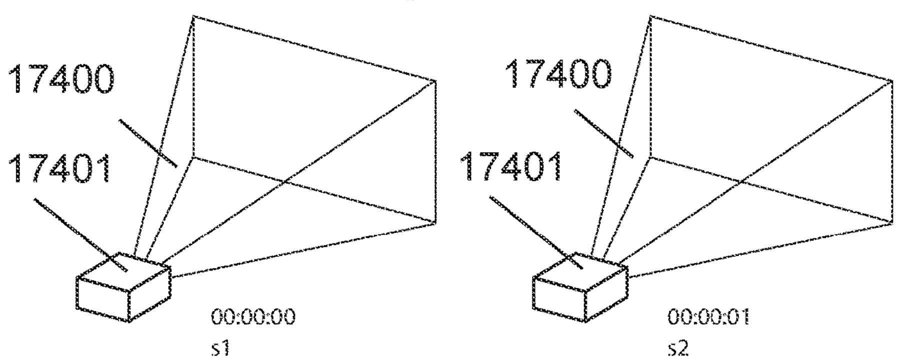
Figure 174B:
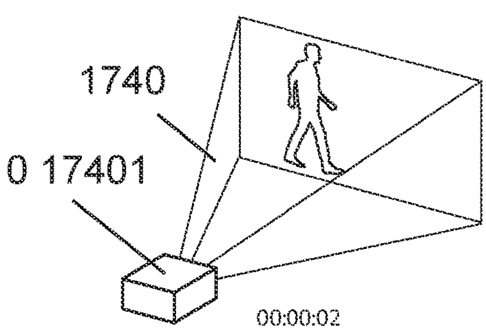
Figure 174C:
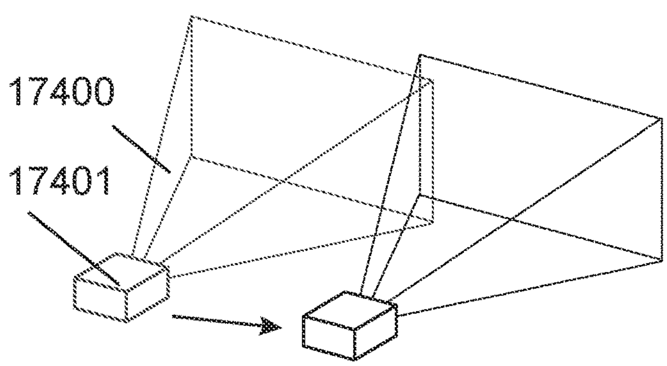

FIGS. 174A-174C illustrate examples of states of the robot transitions.

Figure 175:
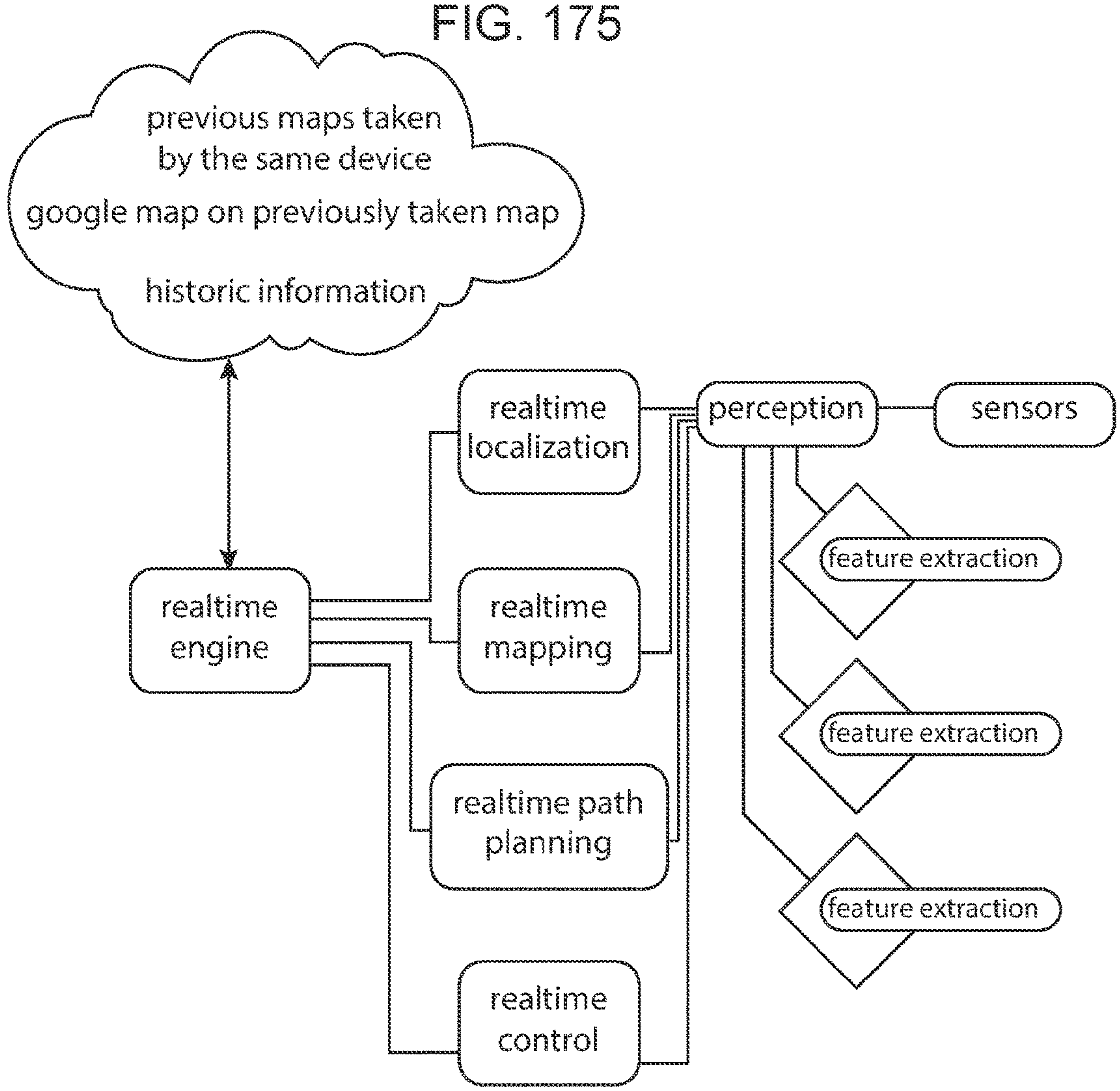

FIG. 175 illustrates an example of at least a portion of a real-time system of the robot.

Figure 176:
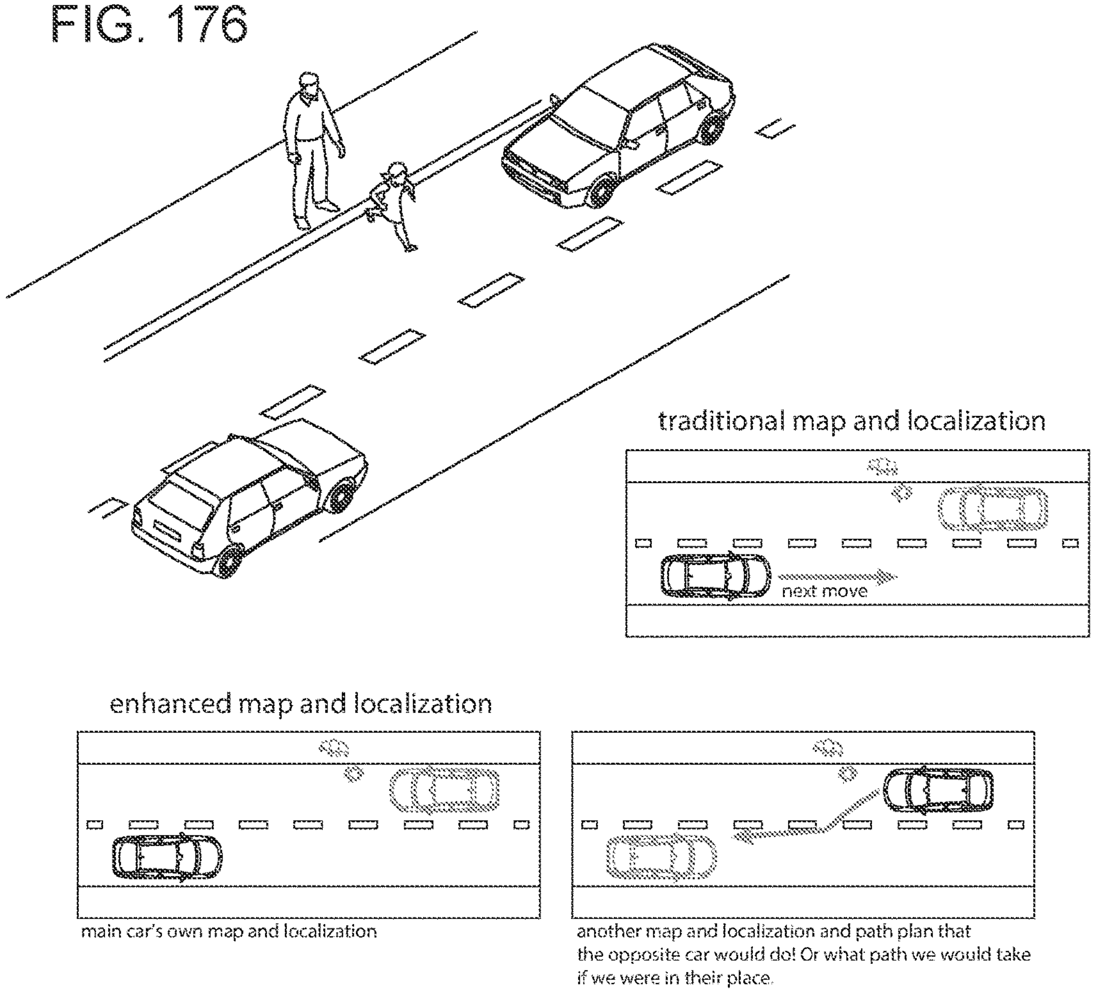

FIG. 176 compares traditional localization and mapping against the enhance method of mapping and localization.

Figure 177:
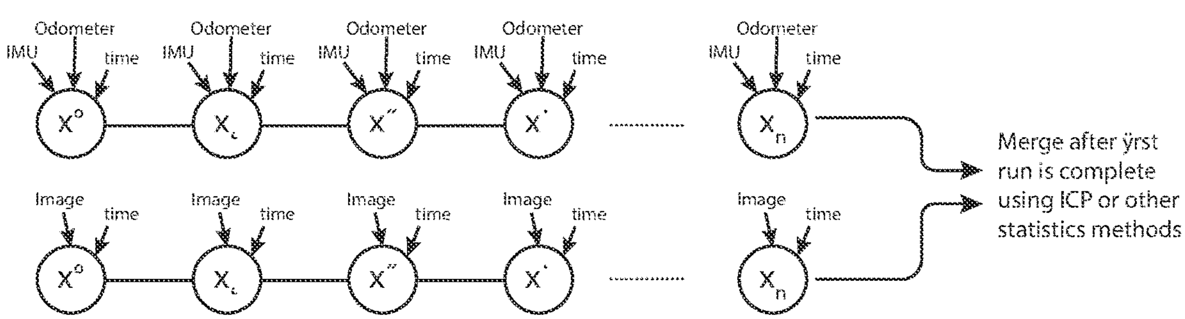

FIG. 177 illustrates the use of iterative methods in optimizing collected information incrementally.

Figure 178:
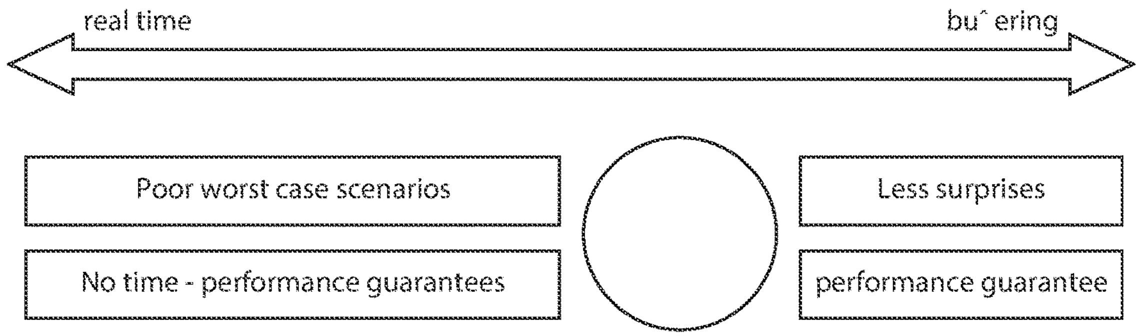

FIG. 178 illustrates changes with movement from real time to buffering.

Figure 179A:
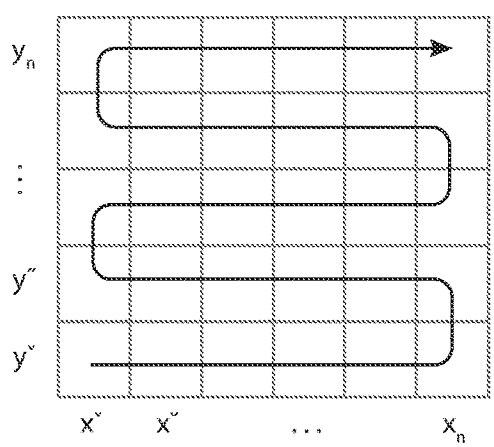

FIG. 179A illustrates a grid map with possible states for the robot.

Figure 179B:
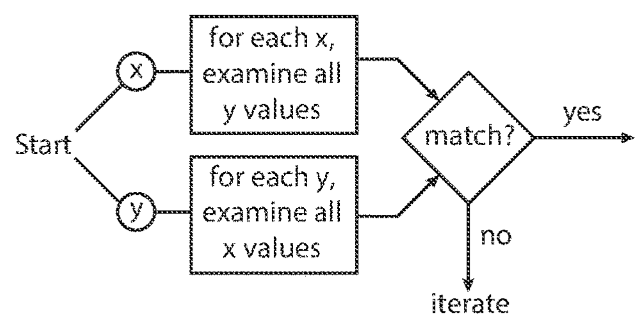

FIG. 179B illustrates a process for determining a state of the robot.

Figure 180:
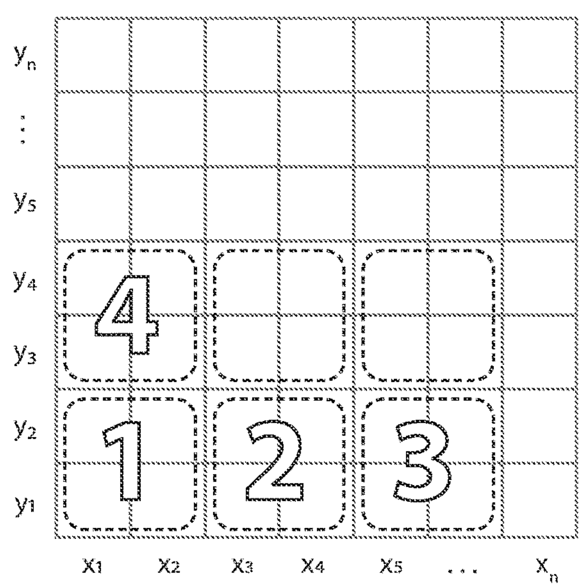

FIG. 180 illustrates a grid map with groups of states.

Figure 181A:
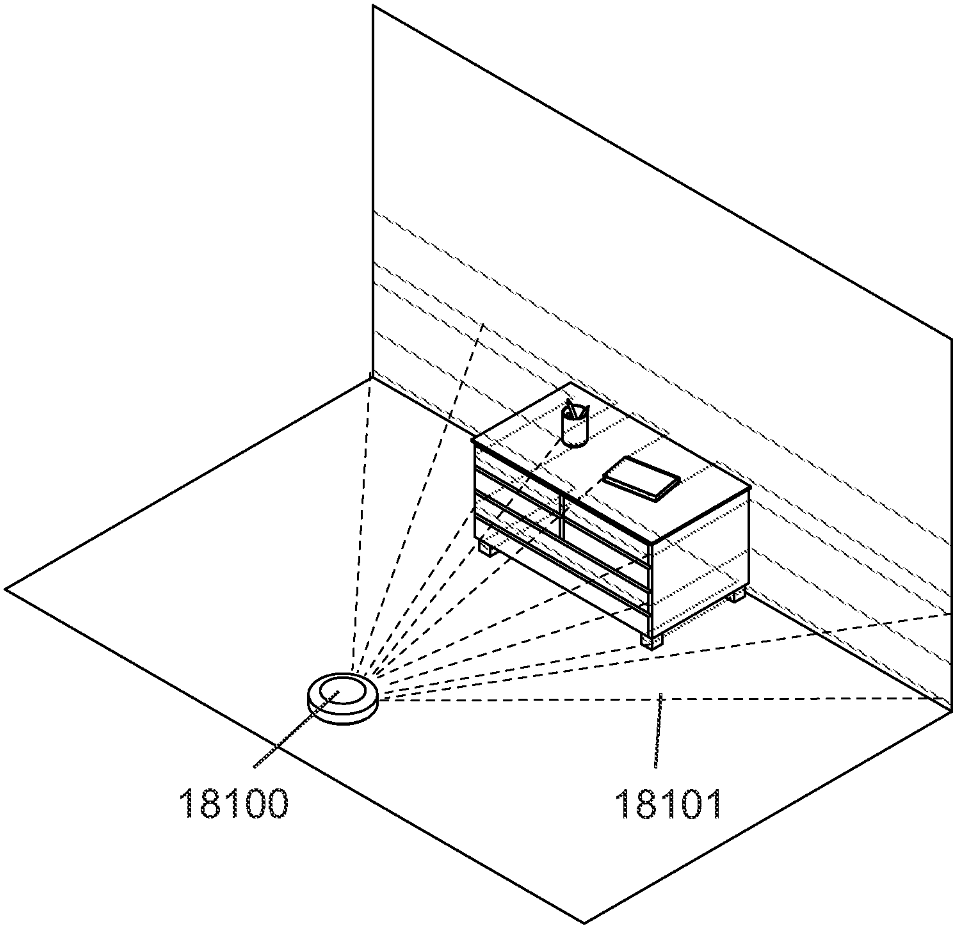

FIG. 181A illustrates a robot taking sensor readings using a sensor such as a two-and-a-half dimensional LIDAR.

Figure 181B:
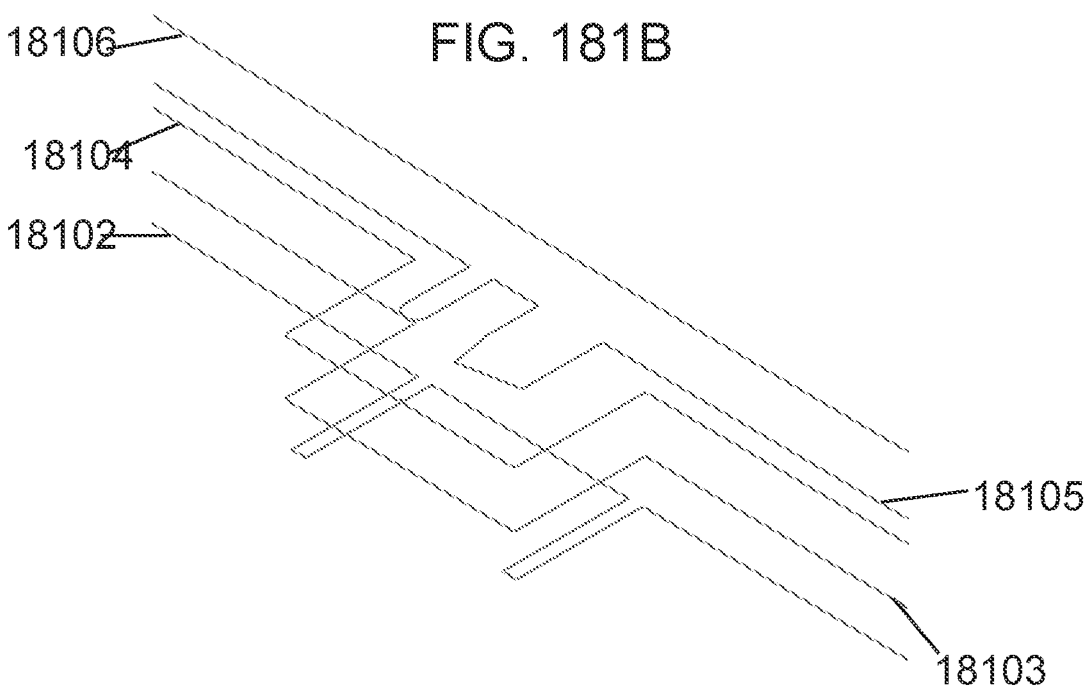

FIG. 181B illustrates 2.5D sensor observation layers.

Figure 182A:
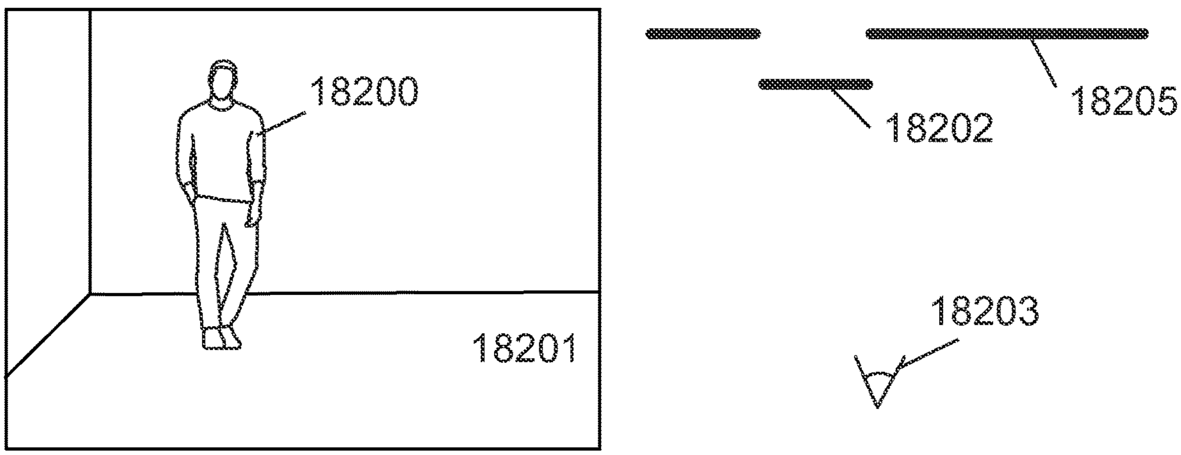
Figure 182B:
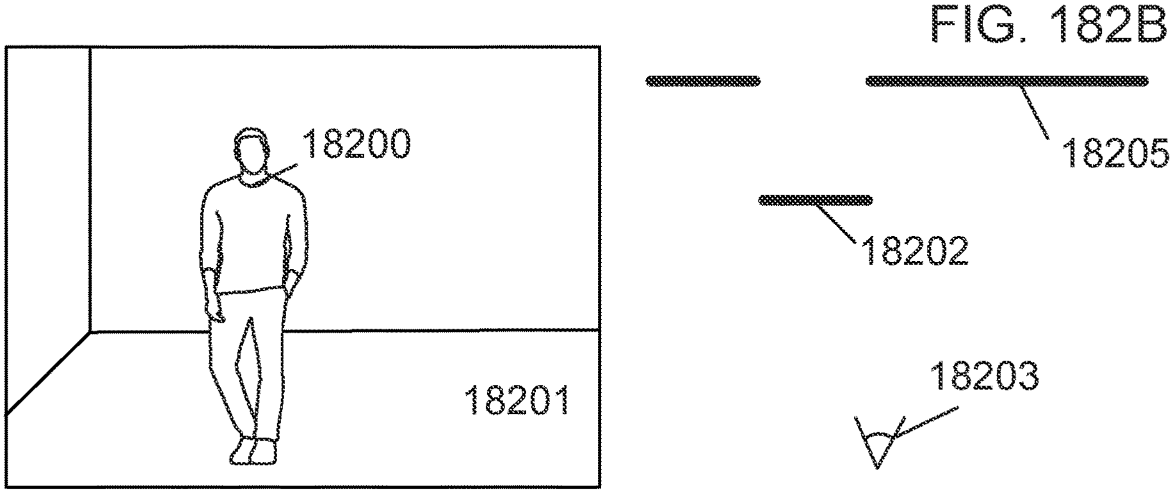
Figure 182C:
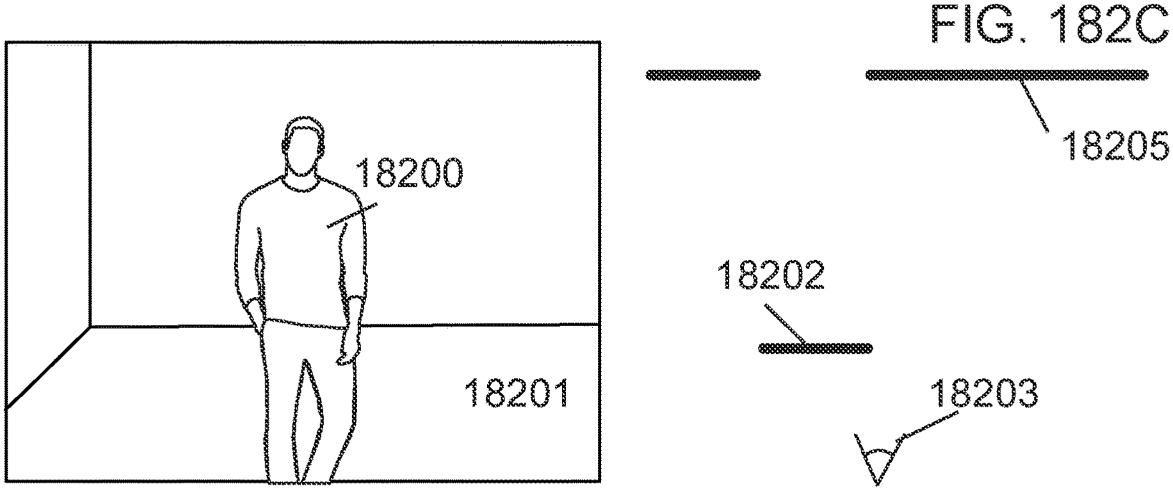

FIGS. 182A-182C illustrate a person moving within an environment and corresponding depth readings appearing as a line.

Figure 183A:
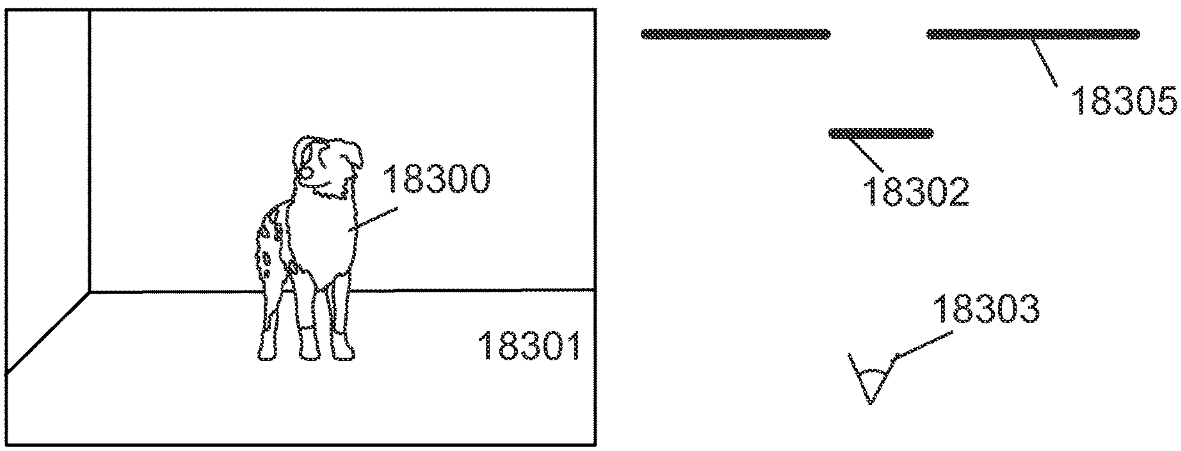
Figure 183B:
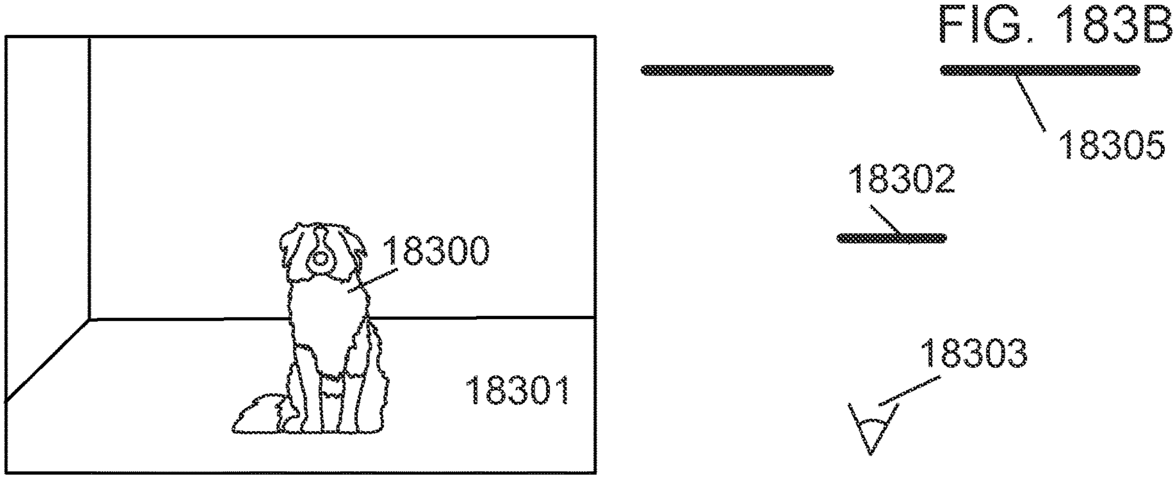
Figure 183C:
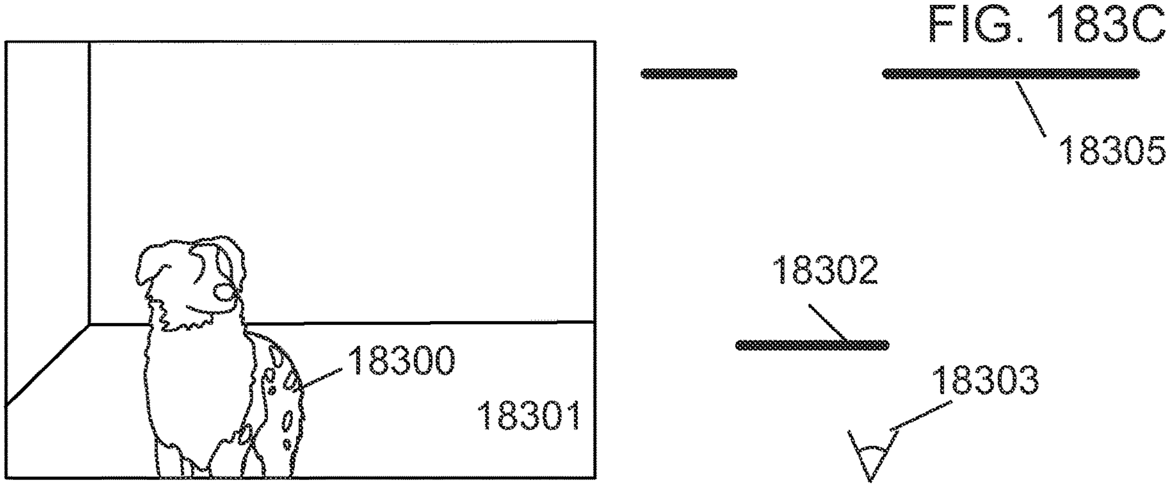

FIGS. 183A-183C illustrate a pet moving within an environment and corresponding depth readings appearing as a line.

Figure 184A:
Figure 184B:

FIGS. 184A-184B illustrate the robot approaching two different objects.

Figure 185A:
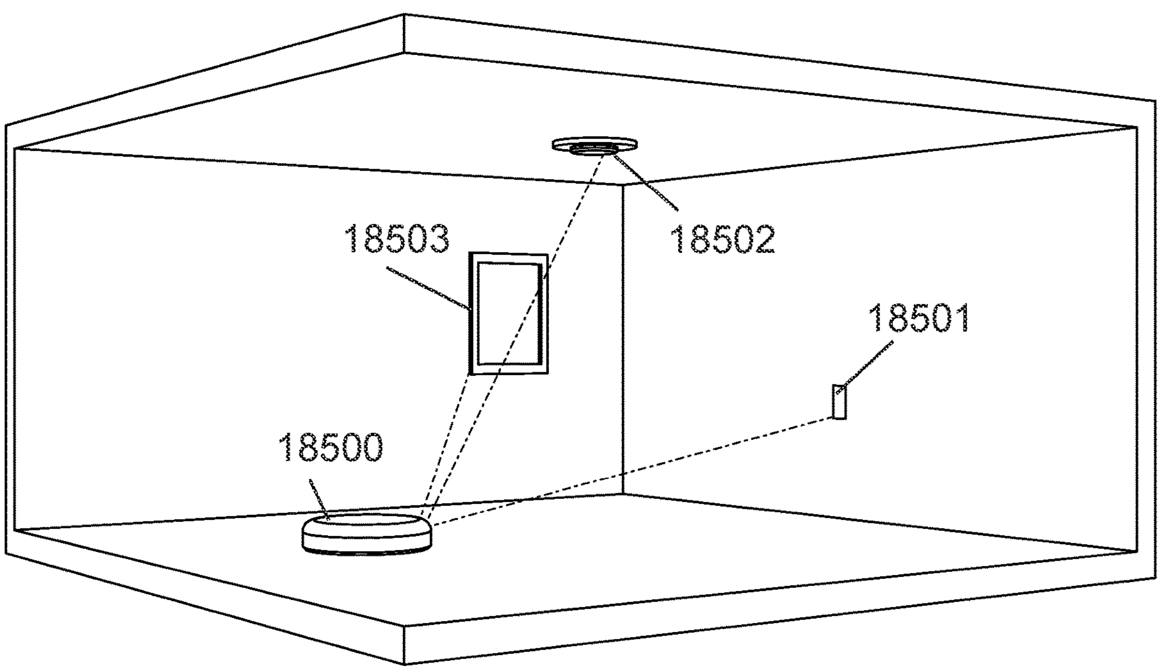

FIG. 185A illustrates the processor of the robot identifying objects.

FIG. 185B illustrates the object information from FIG. 185A shrunken into a two dimensional representation.

FIG. 186A illustrates an image of an environment.

FIG. 186B illustrates an image of a person within the environment.

FIG. 186C illustrates another image of the person within the environment at a later time.

FIG. 186D illustrates the movement of the object.

FIG. 187A illustrates depth measurements to a static background of an environment.

FIG. 187B illustrates depth measurements to an object.

FIG. 187C illustrates a volume captured in several images corresponding with movement of the object.

FIG. 187D illustrates the amount of movement determined by processor.

FIGS. 188A-188E illustrates methods of face detection based on feature recognition and depth measurement.

Figure 189A:
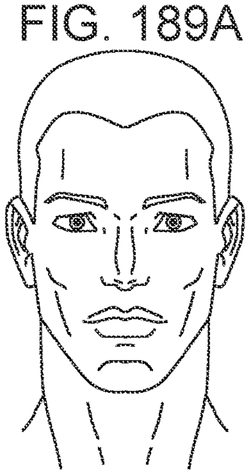

FIG. 189A illustrates a front view of a face of a user.

Figure 189B:
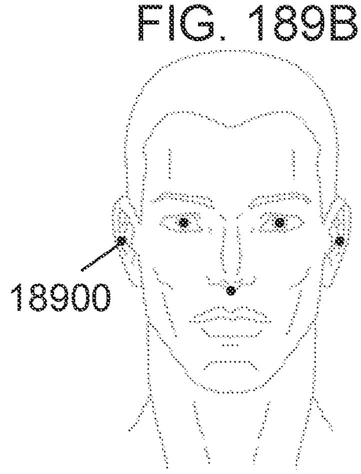

FIG. 189B illustrates features identified by the processor.

Figure 189C:
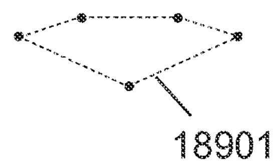

FIG. 189C illustrates the geometrical relation of the features.

Figure 189E:
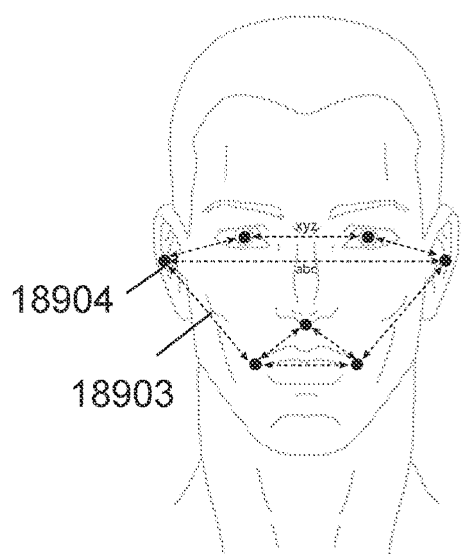
Figure 189D:
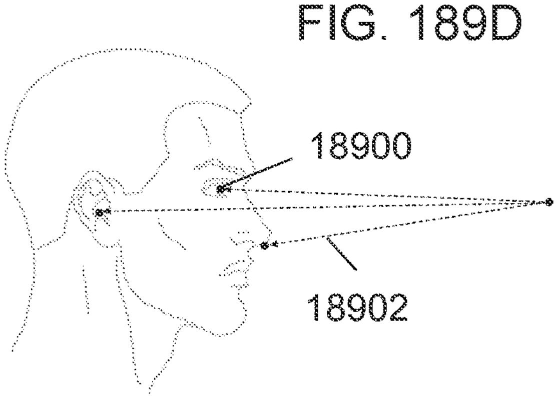

FIG. 189D illustrates depth measurement to the features.

FIG. 189E illustrates geometrical relation of the depth measurements of the features.

FIGS. 190A-190F illustrate the patterns of structured light projected on a wall and a person's face.

Figure 191A:
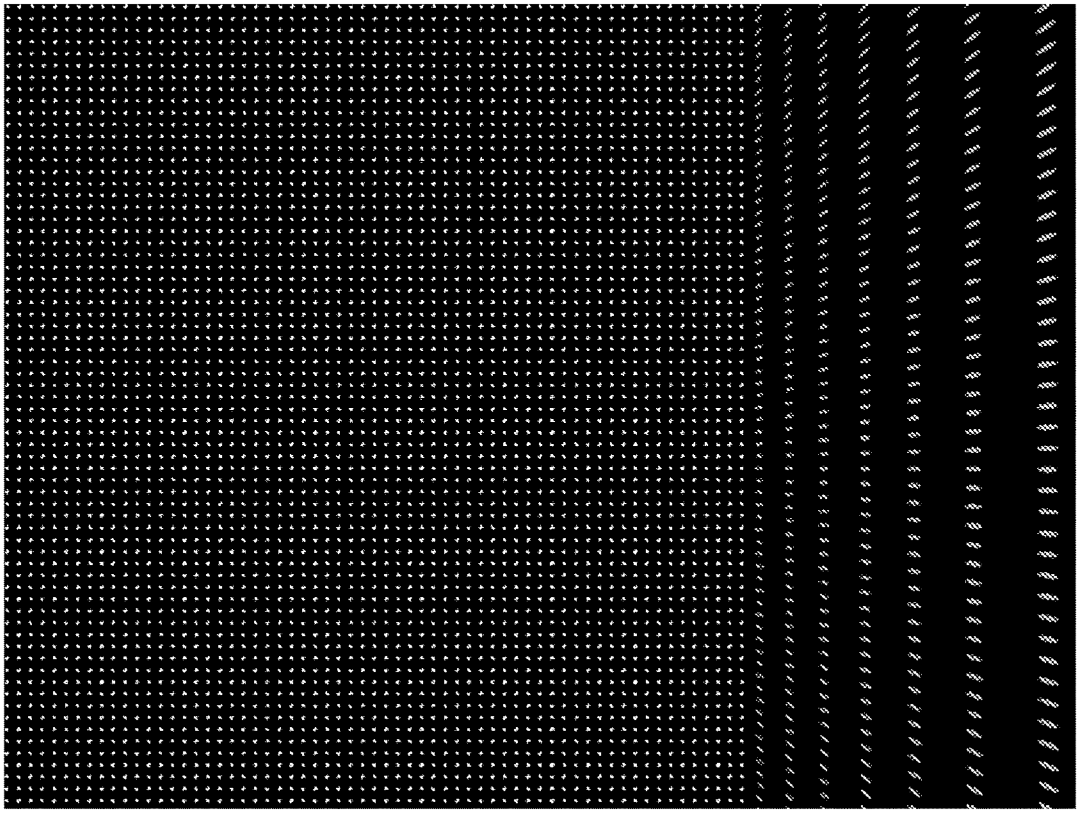
Figure 191B:
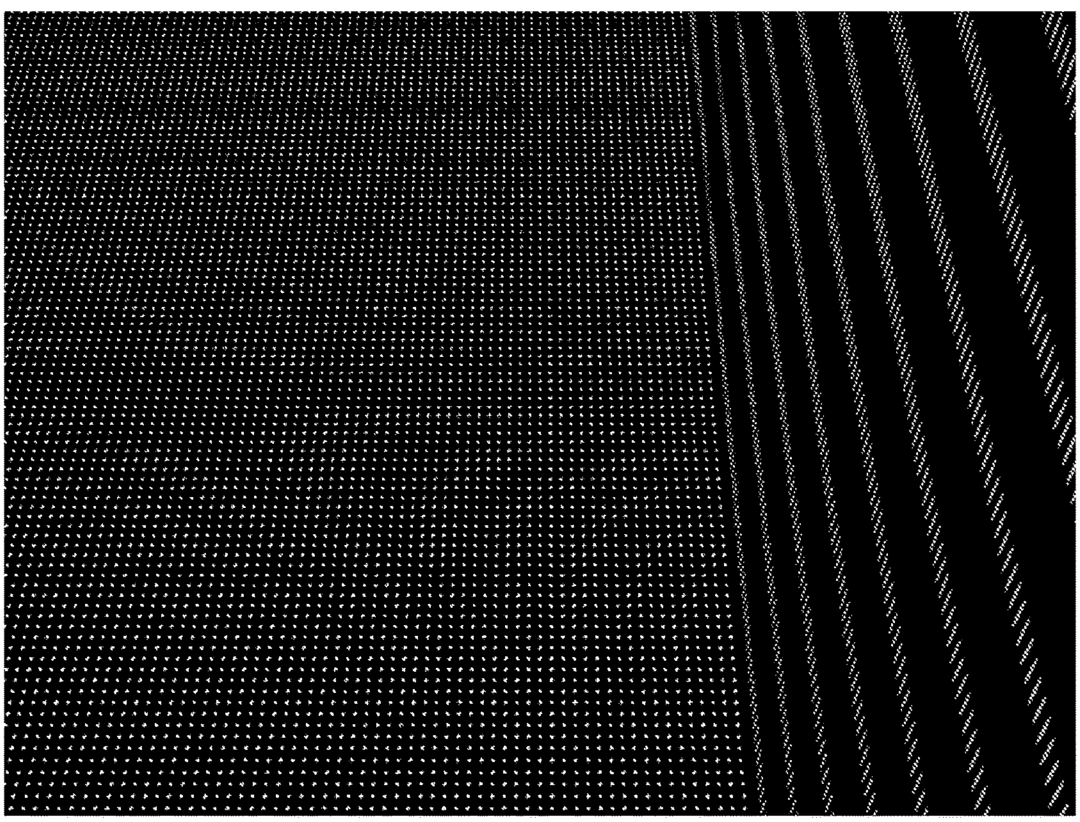

FIGS. 191A-191B illustrate the patterns of structured light projected onto a wall corner.

Figure 192:
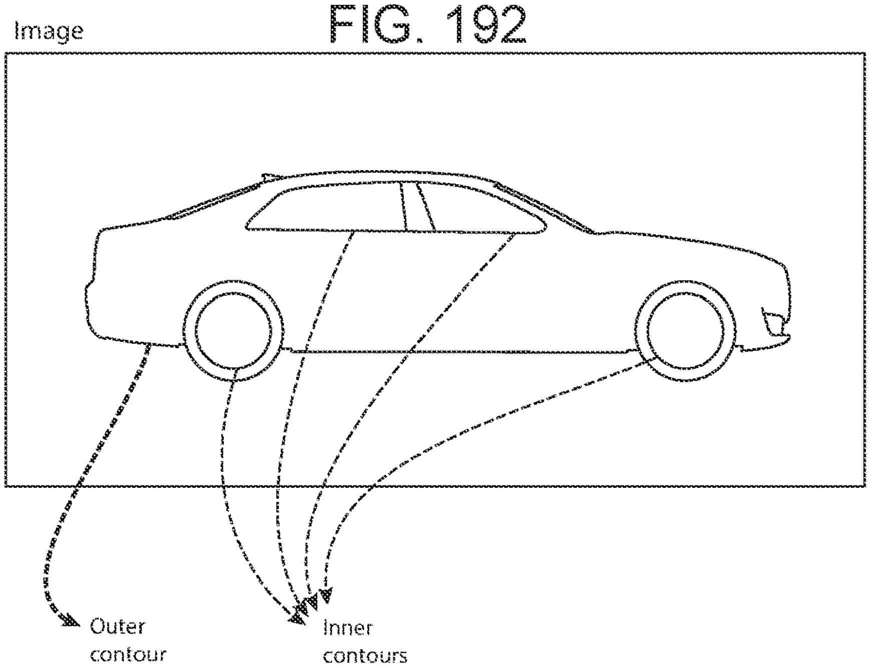

FIG. 192 illustrates an image of a vehicle including an outer contour and multiple inner contours.

Figure 193A:
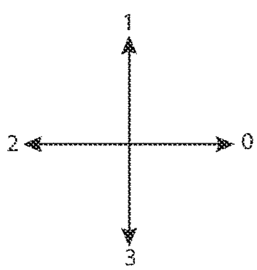
Figure 193B:
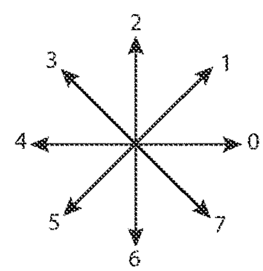

FIGS. 193A-193B illustrate an example of a 4-chain code and 8-chain code, respectively.

Figure 193C:
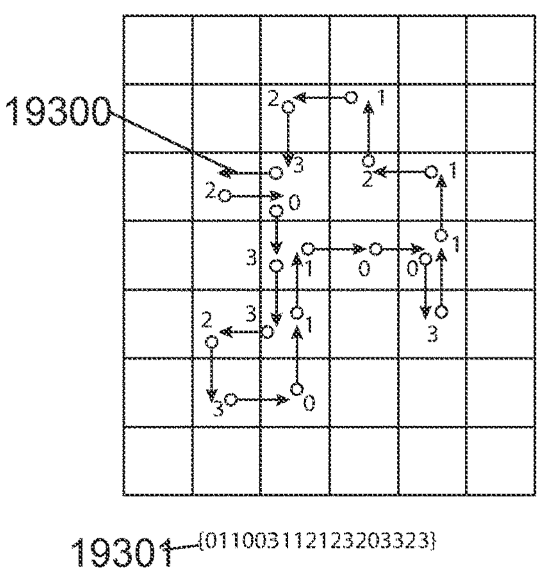

FIG. 193C illustrates an example of a contour path using the 4-chain code in an array.

Figure 193D:
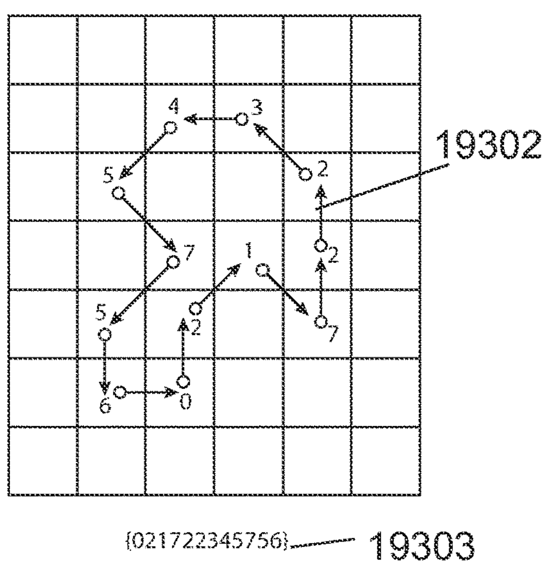

FIG. 193D illustrates an example of a contour path using the 8-chain code in an array.

Figure 193E:
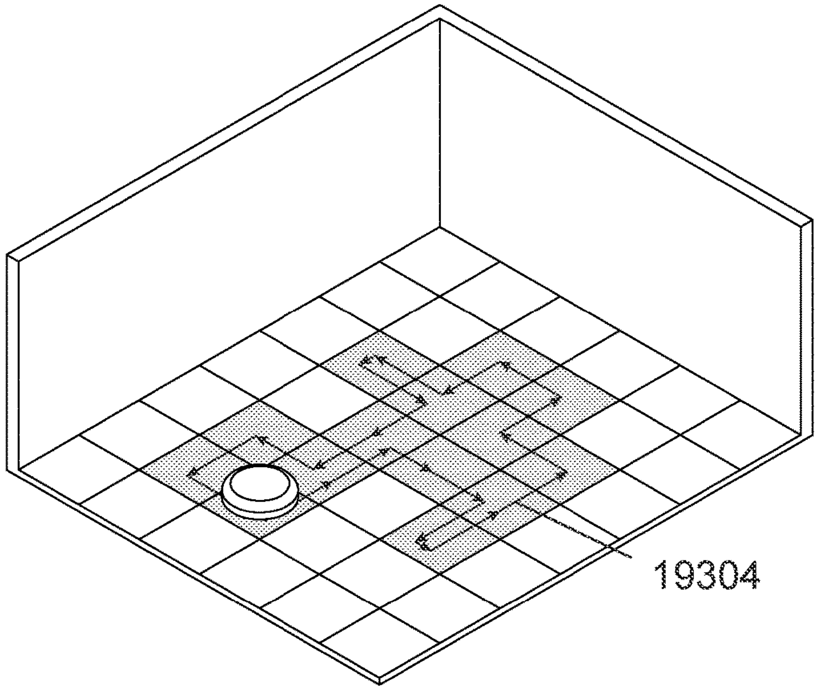
Figure 193F:
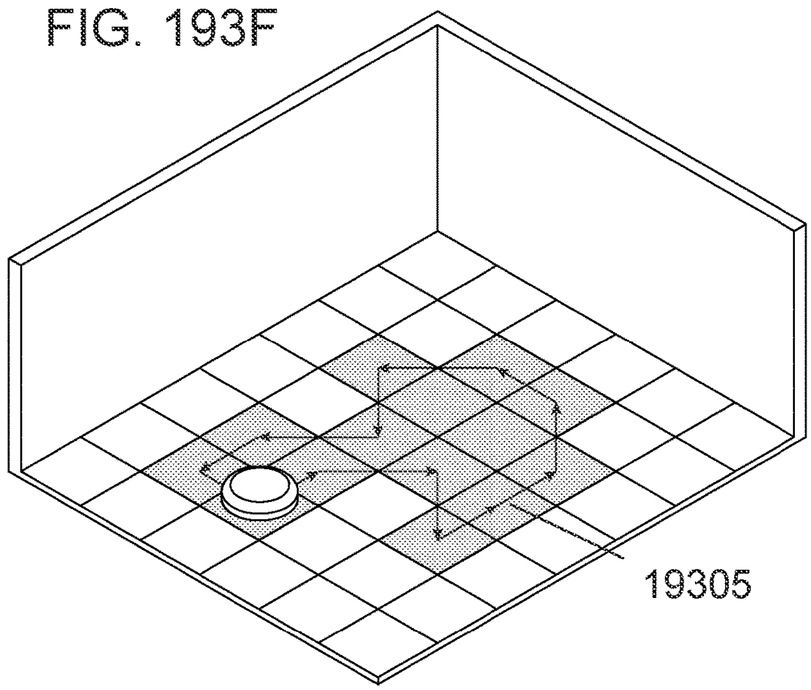
Figure 194A:

FIGS. 193E-193F illustrate 4-chain and 8-chain contour paths of the robot in three dimensions FIG. 194A illustrates a representation of a living room.

Figure 194B:
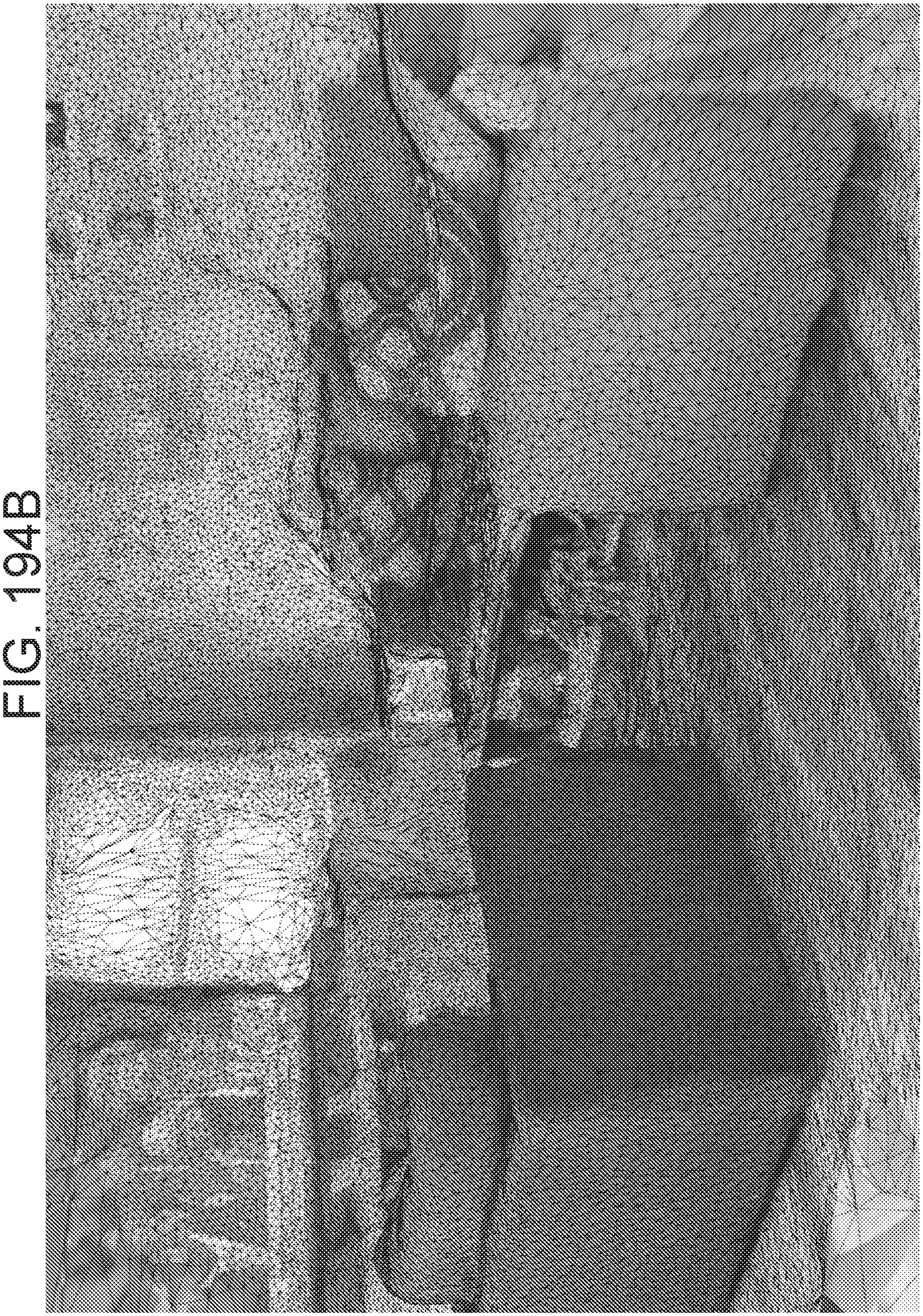
Figure 194C:
Figure 194D:
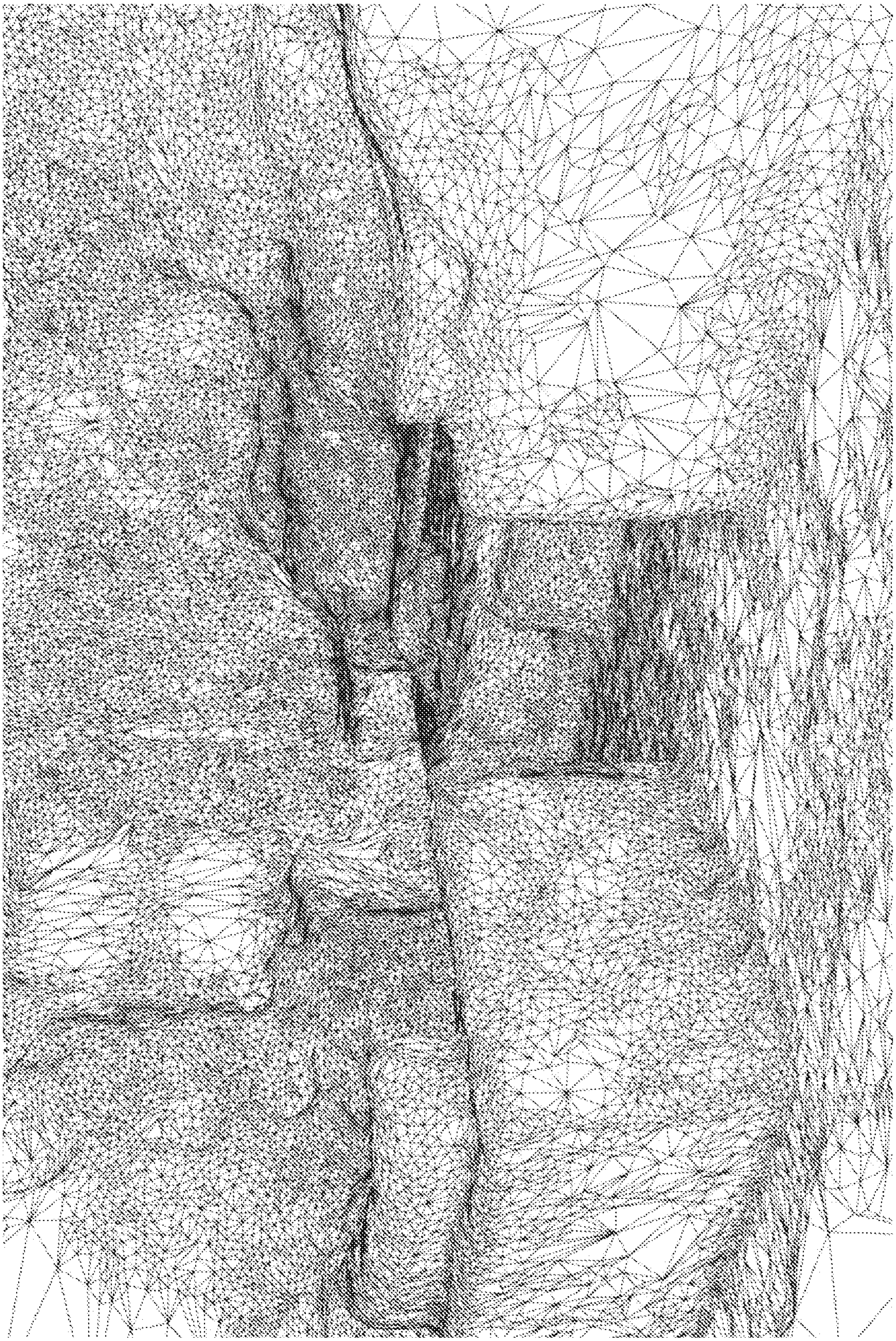
Figure 194E:
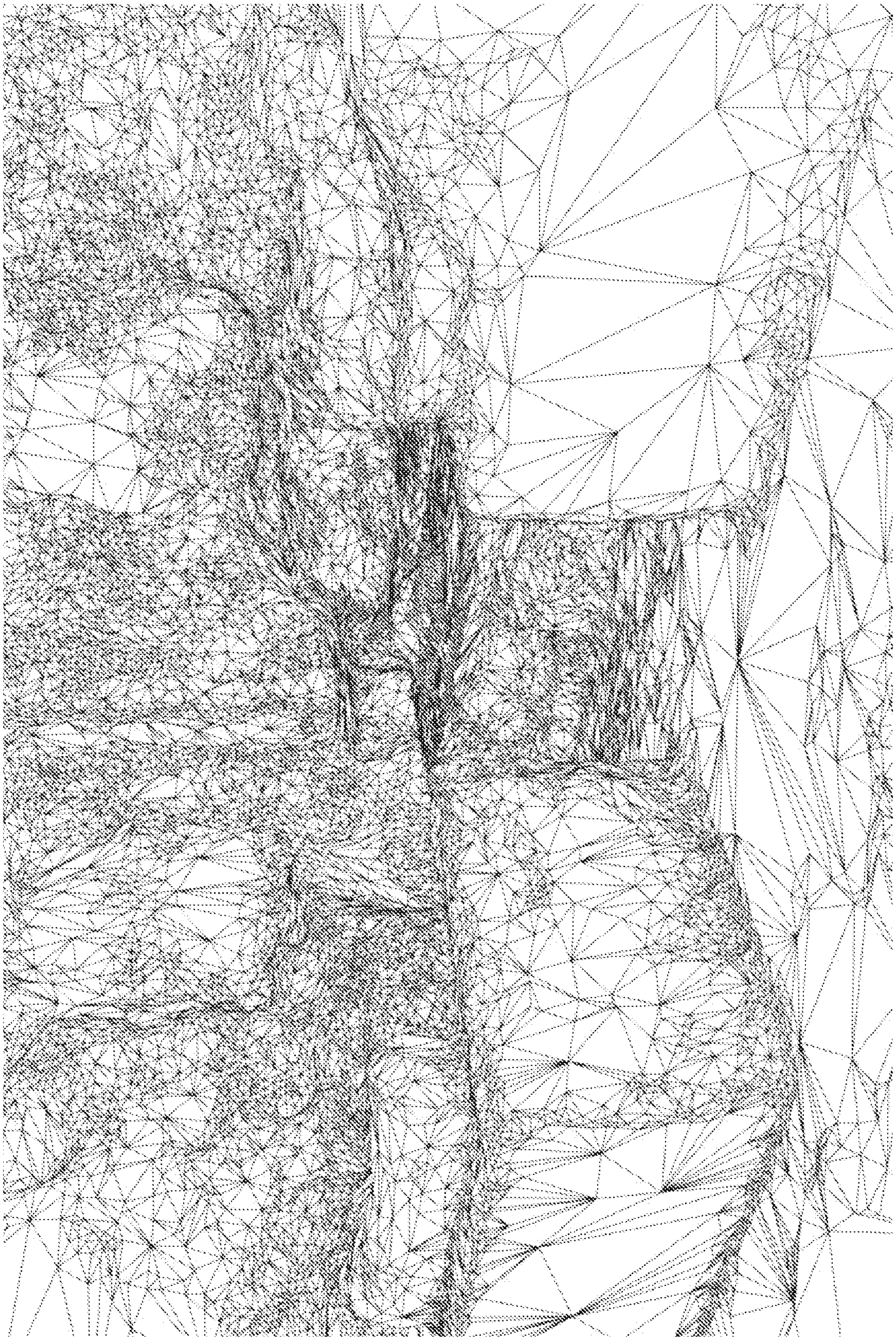
Figure 194F:
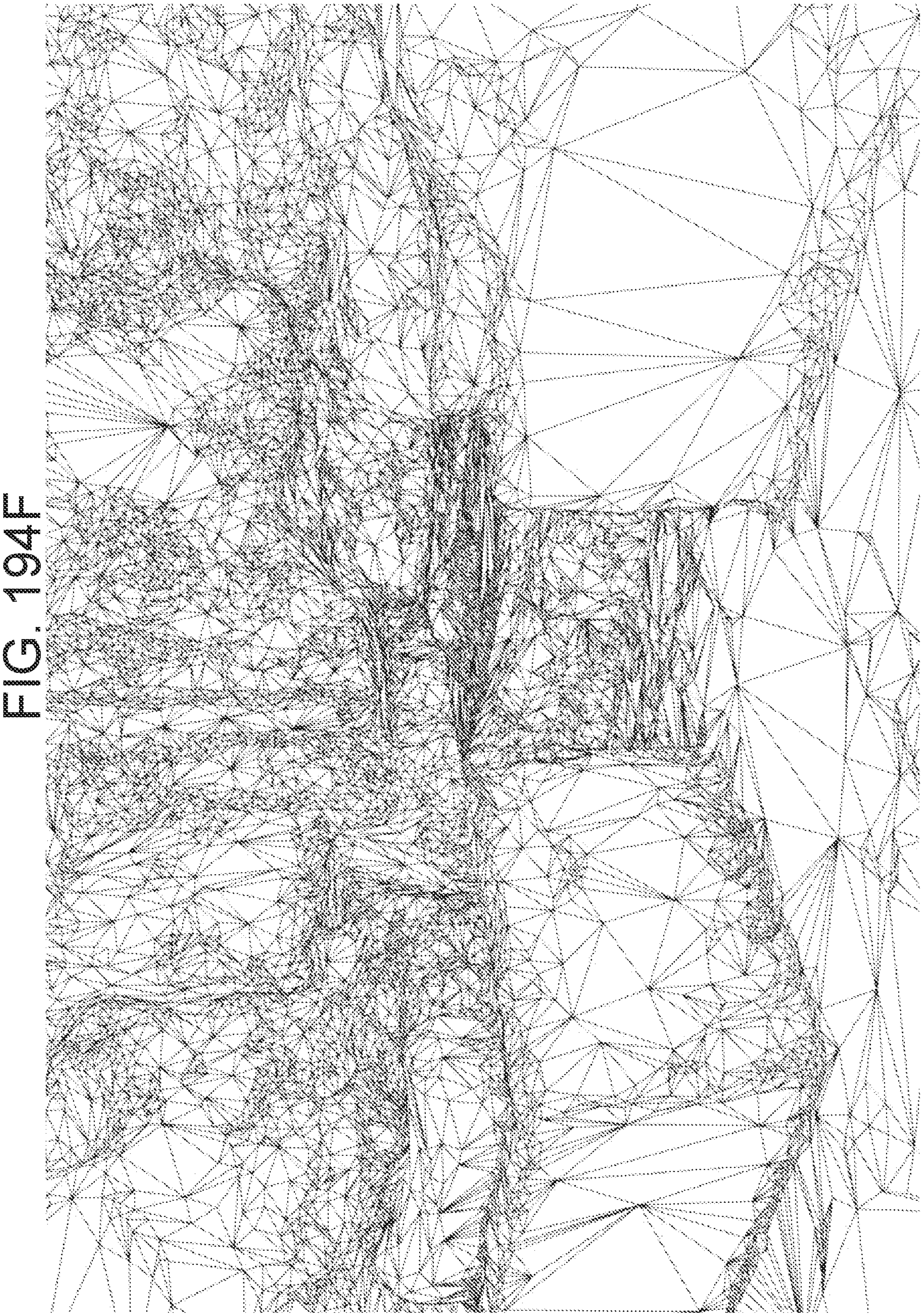

FIG. 194B illustrates a mesh layered on top of the image perceived by the robot FIGS. 194C-194F illustrate different levels of mesh density that may be used.

Figure 194G:
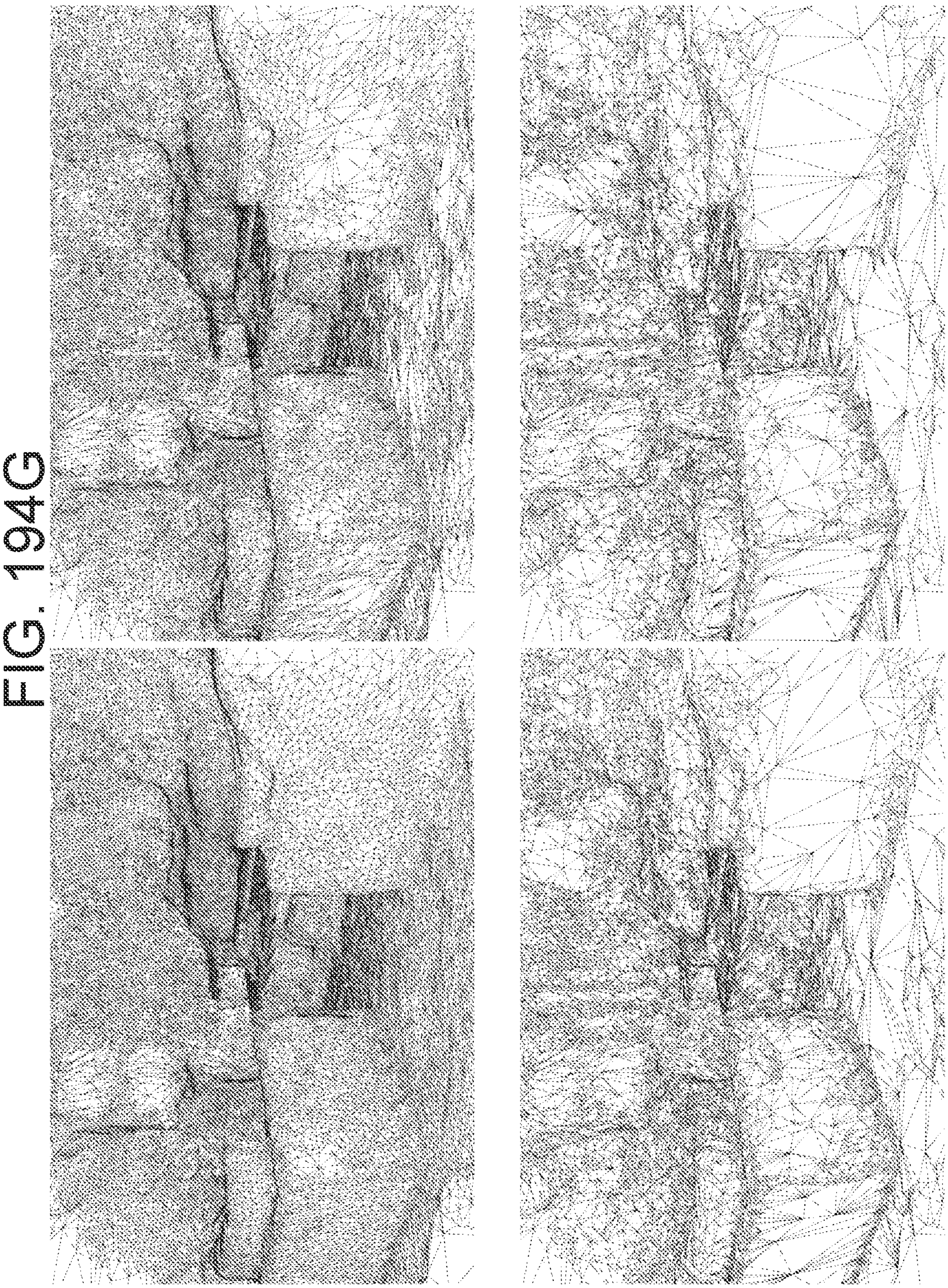

FIG. 194G illustrates a comparison of meshes with different resolutions.

Figure 194H:
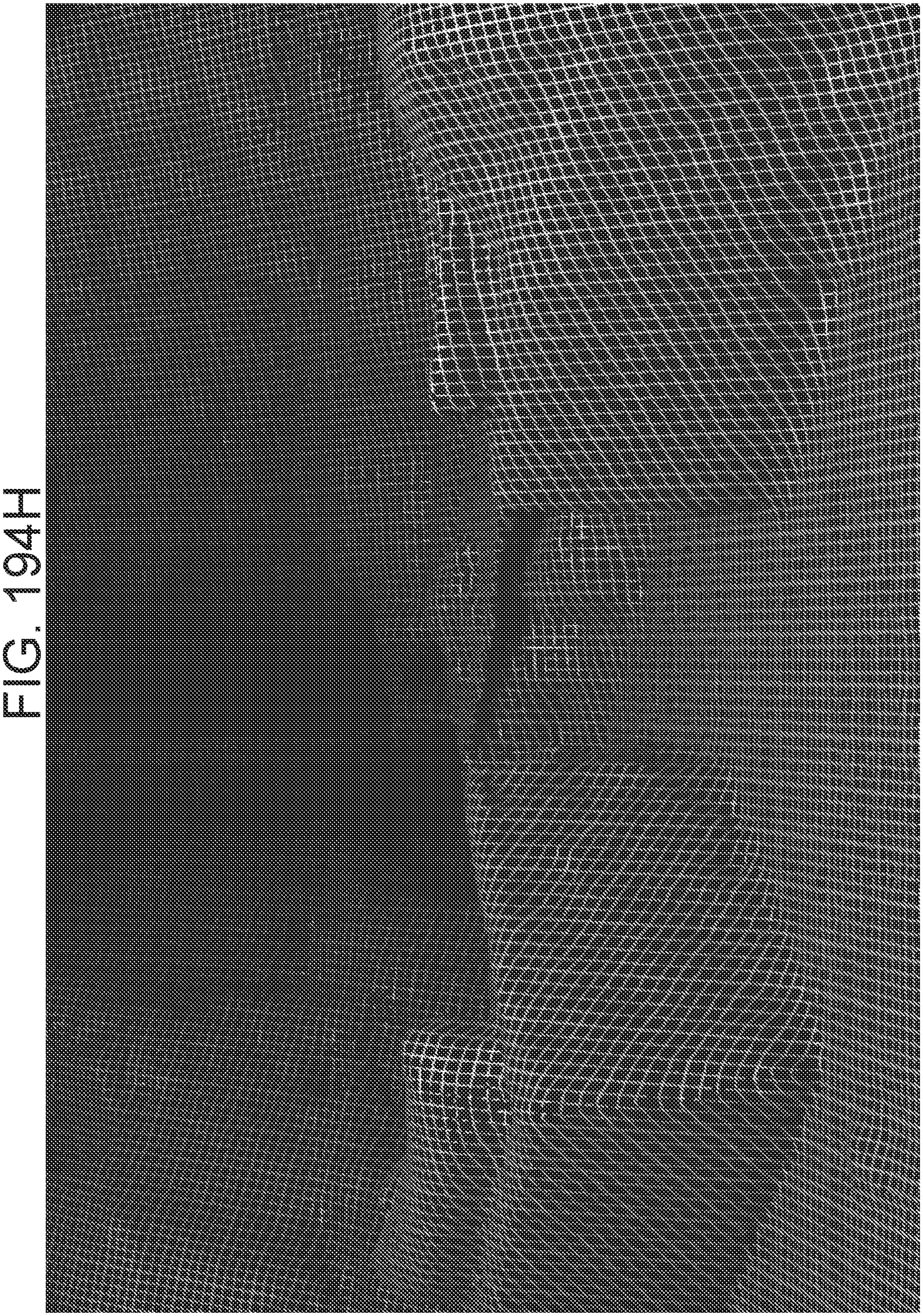
Figure 194I:
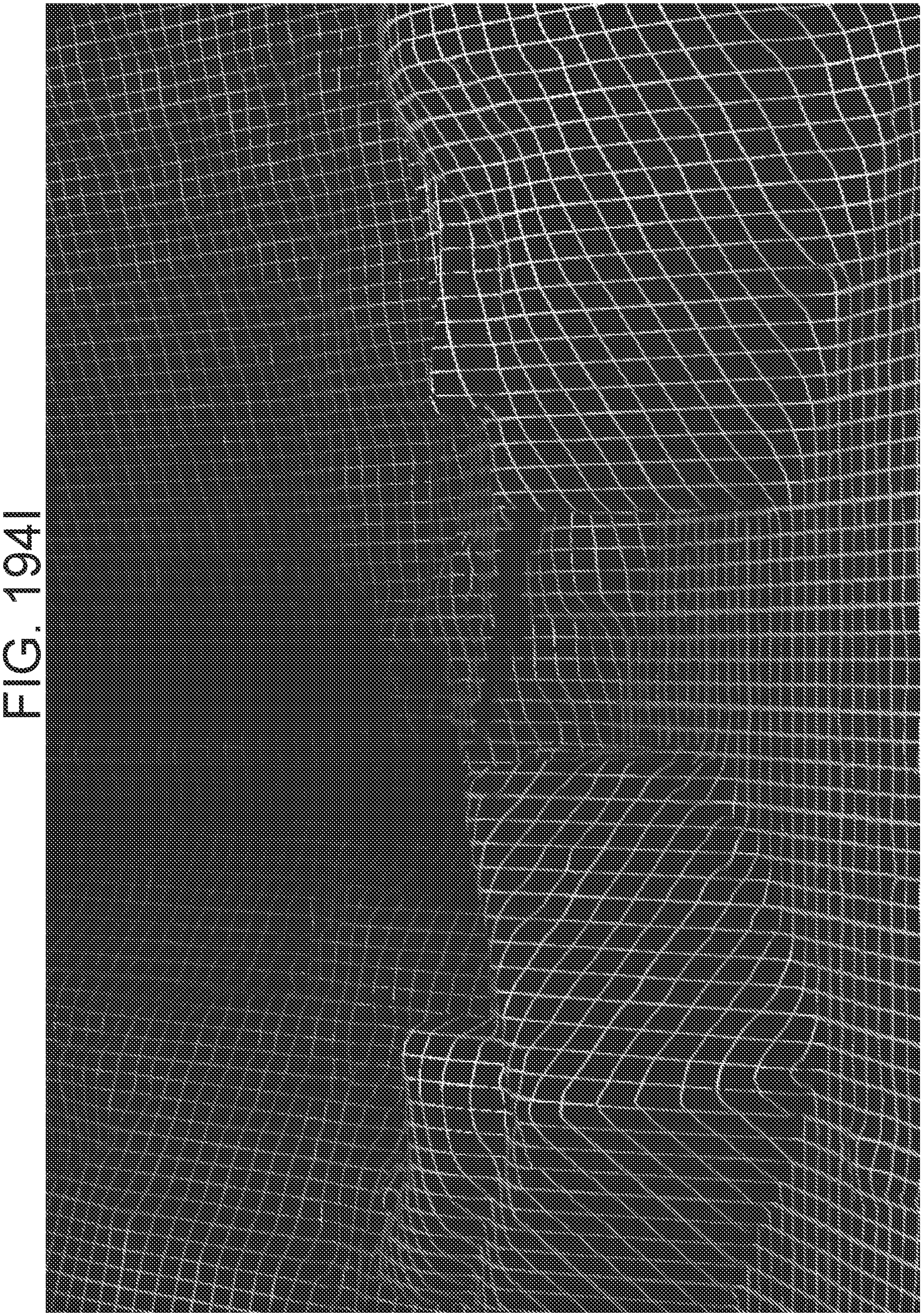
Figure 194J:
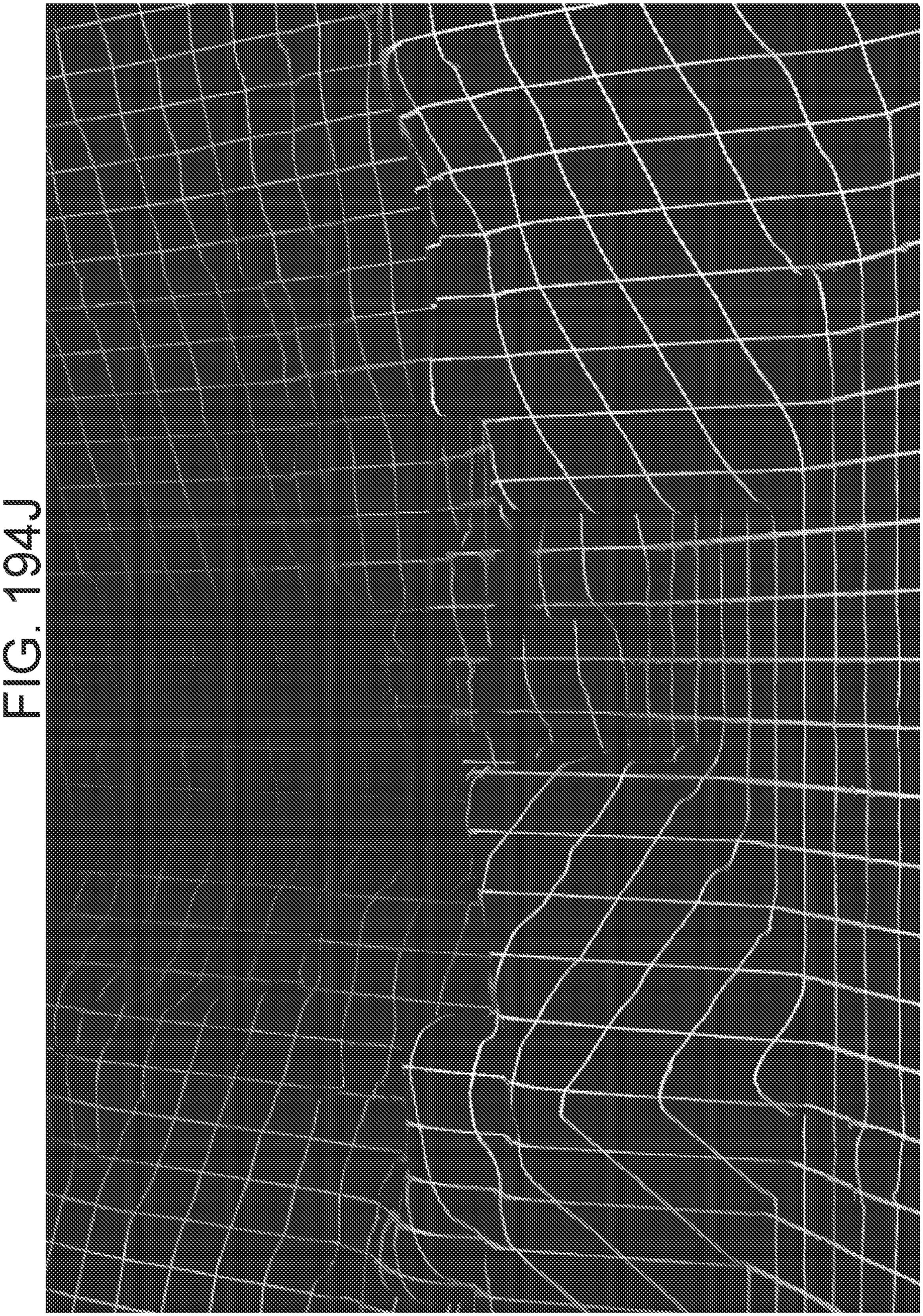

FIGS. 194H-194J illustrate structured light with various levels of resolution.

Figure 194K:
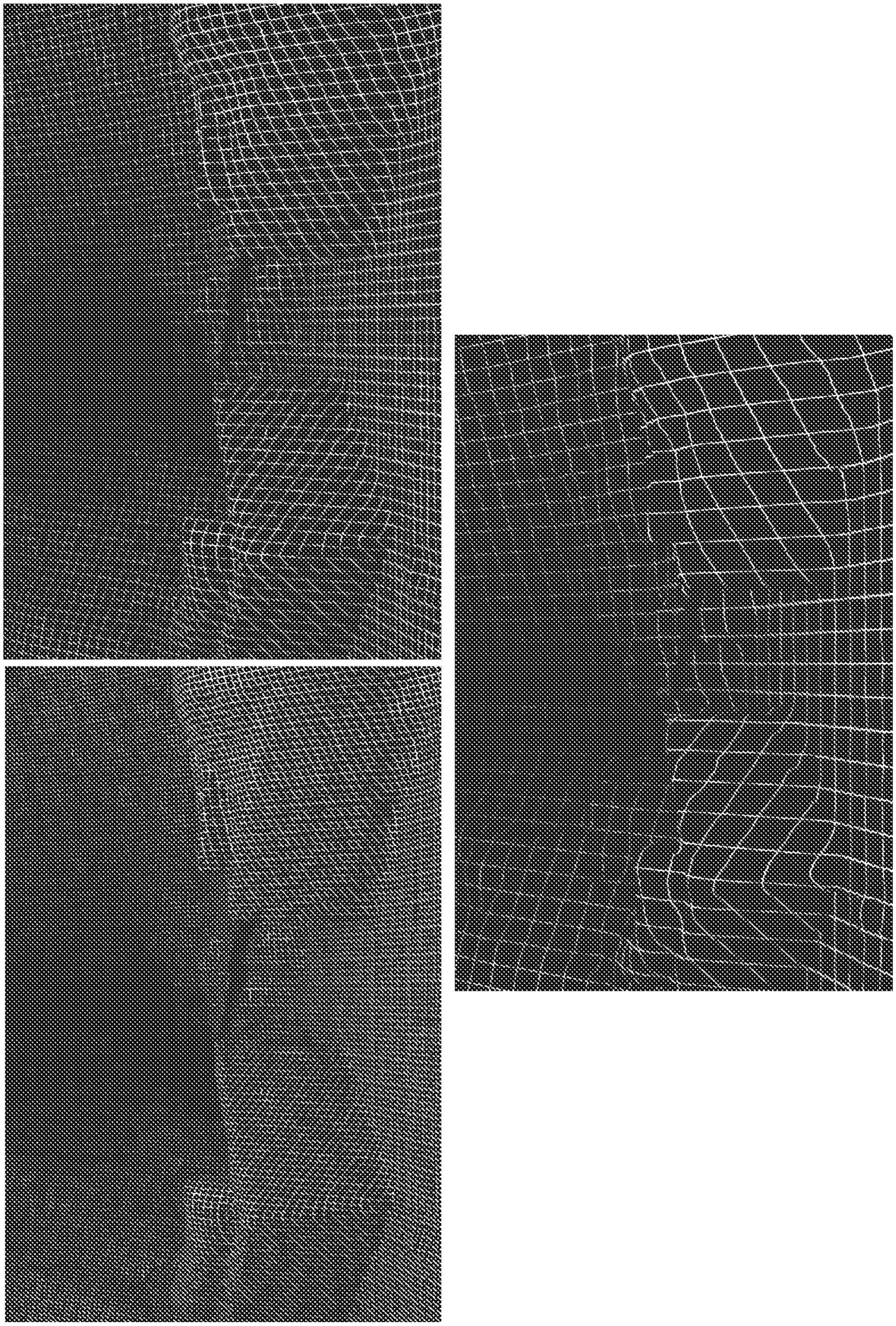

FIG. 194K illustrates a comparison of various density levels of structured light for the same environment.

Figure 194L:
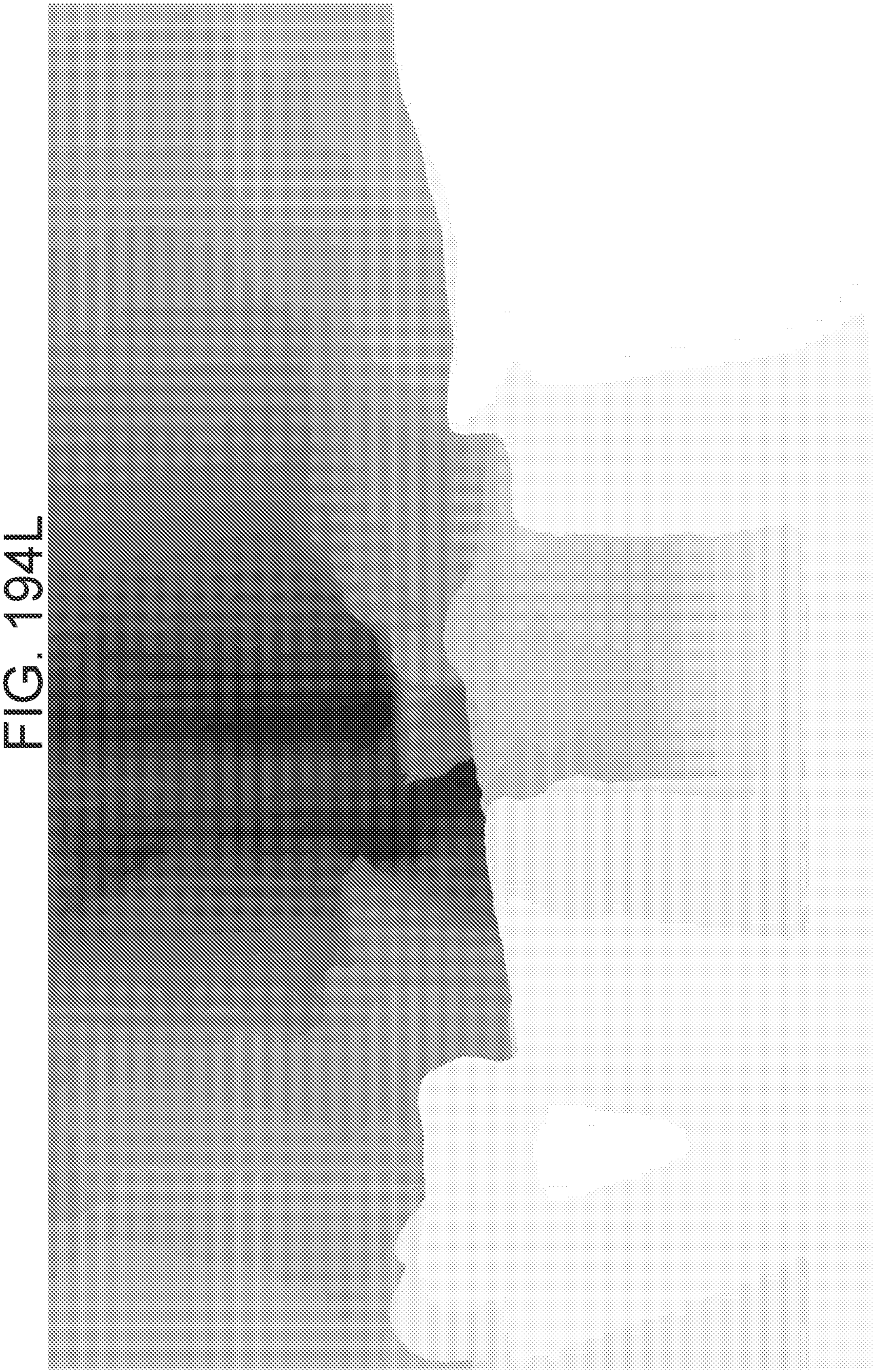

FIG. 194L illustrates the same environment with distances represented by different shades varying from white to black.

Figure 194M:
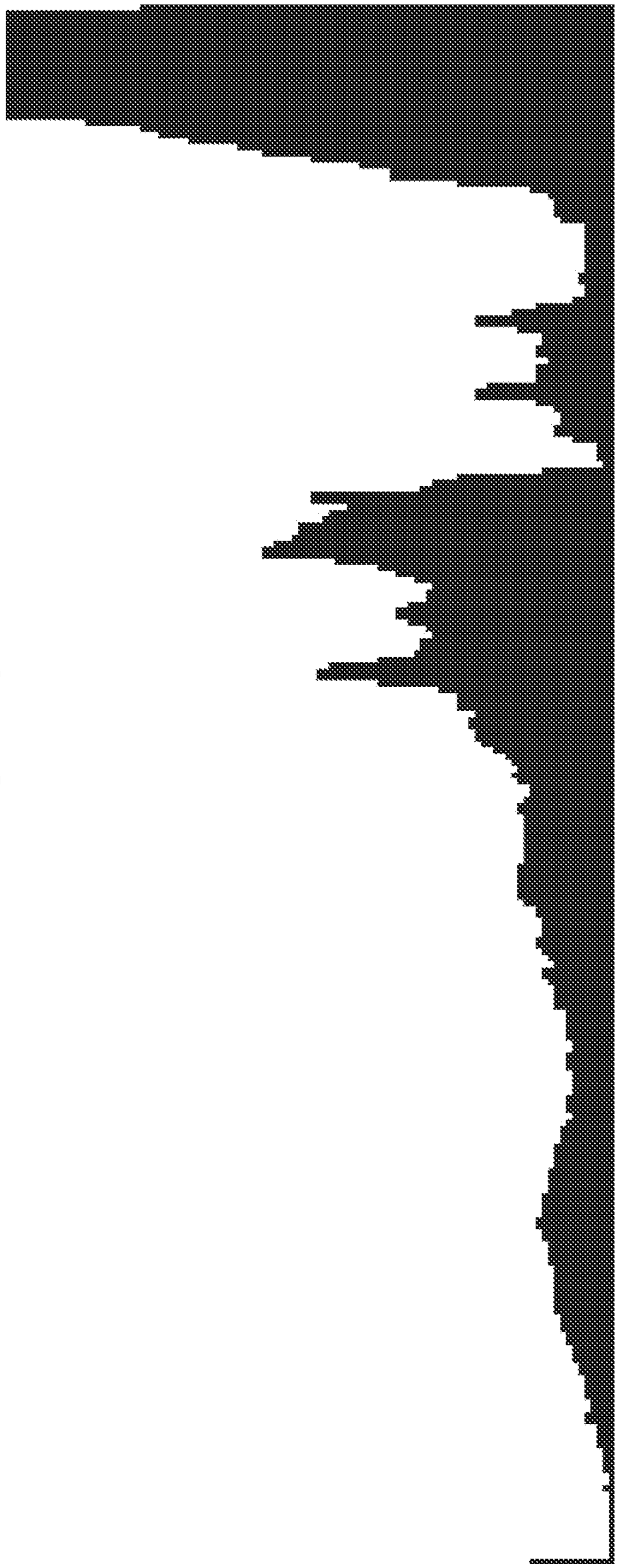

FIG. 194M illustrates FIG. 194L represented in a histogram which may be useful for searching a three dimensional map.

Figure 194N:
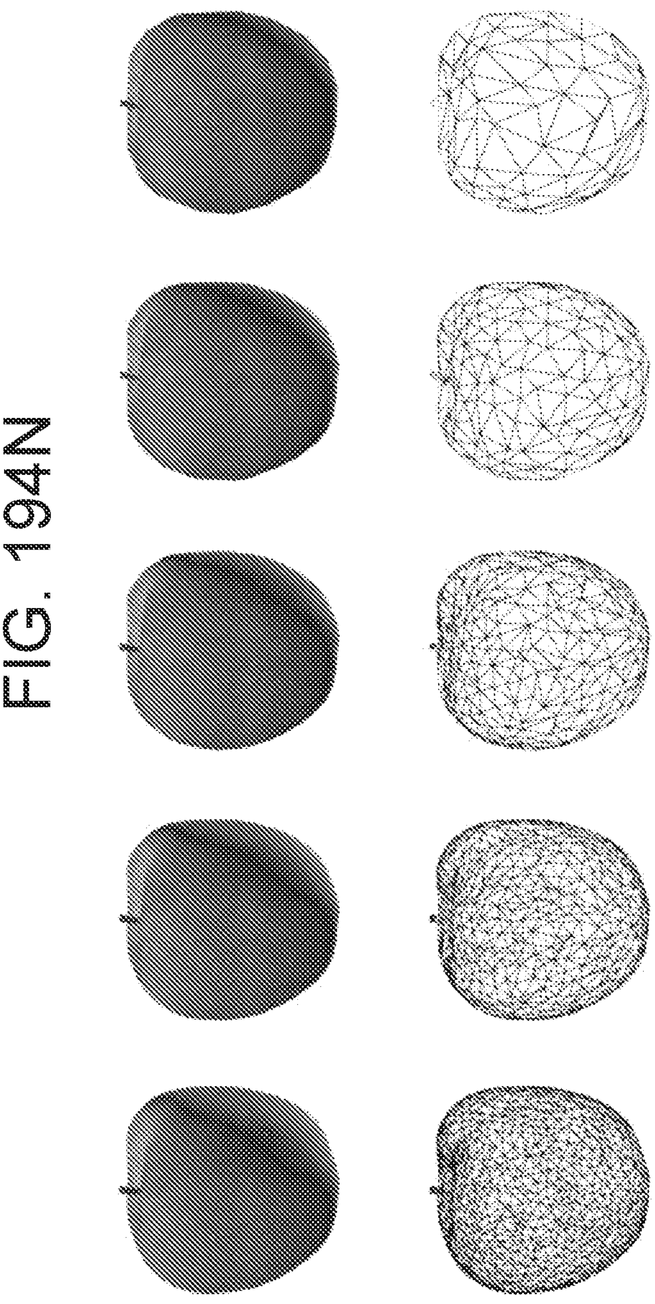

FIG. 194N illustrates an apple shown in different resolutions.

FIGS. 195A-195H illustrate light patterns projected onto objects from a structured light source in various positions captured by each of two cameras.

FIG. 195I illustrates the two cameras position setup in relation to each other and the objects.

Figure 196B:
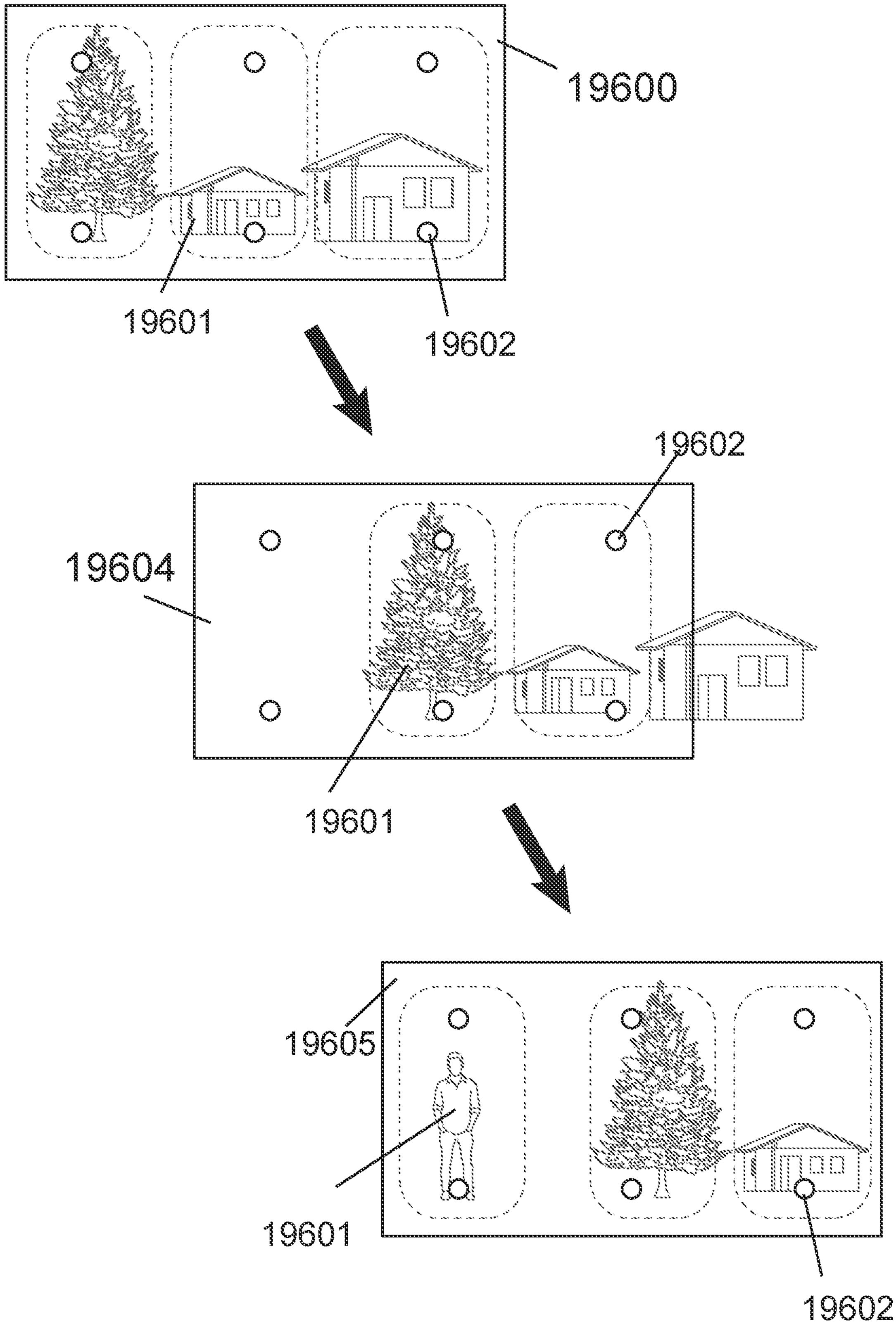

FIGS. 196A-196B illustrate structured light association and dissociation to features within the image FIG. 197A illustrates a robot with a spinning LED light point generator.

FIG. 197B illustrates an example when light point generator is faster than camera.

FIG. 197C illustrates the robot with four cameras.

Figure 198:
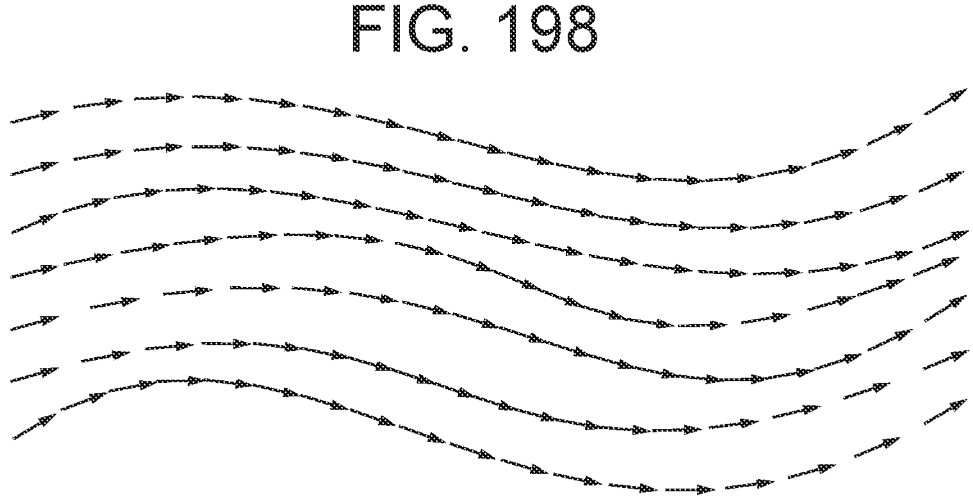

FIG. 198 illustrates an example of a velocity map.

Figure 199:
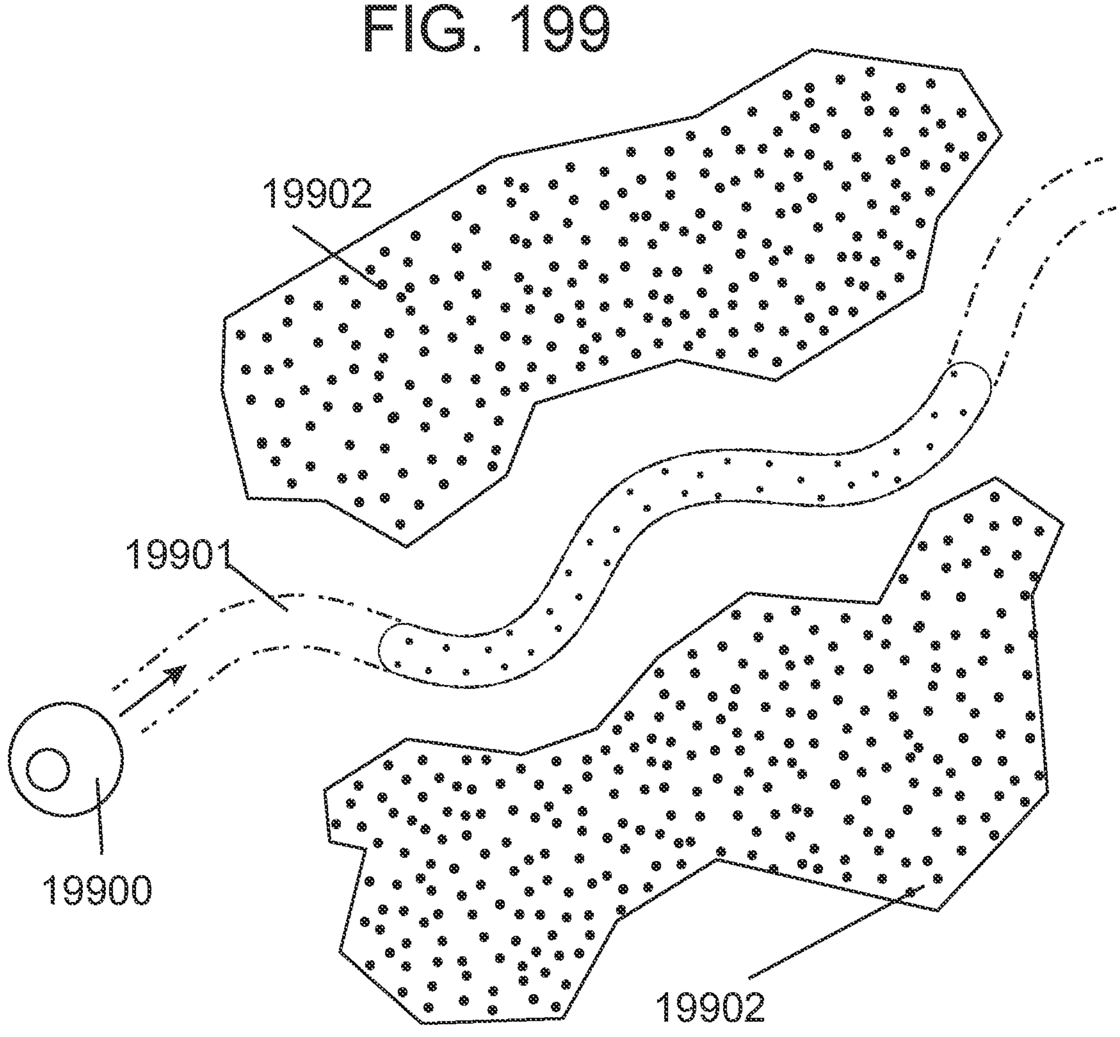

FIG. 199 illustrates a robot tasked with passing through a narrow path with obstacles on both sides.

Figure 200:
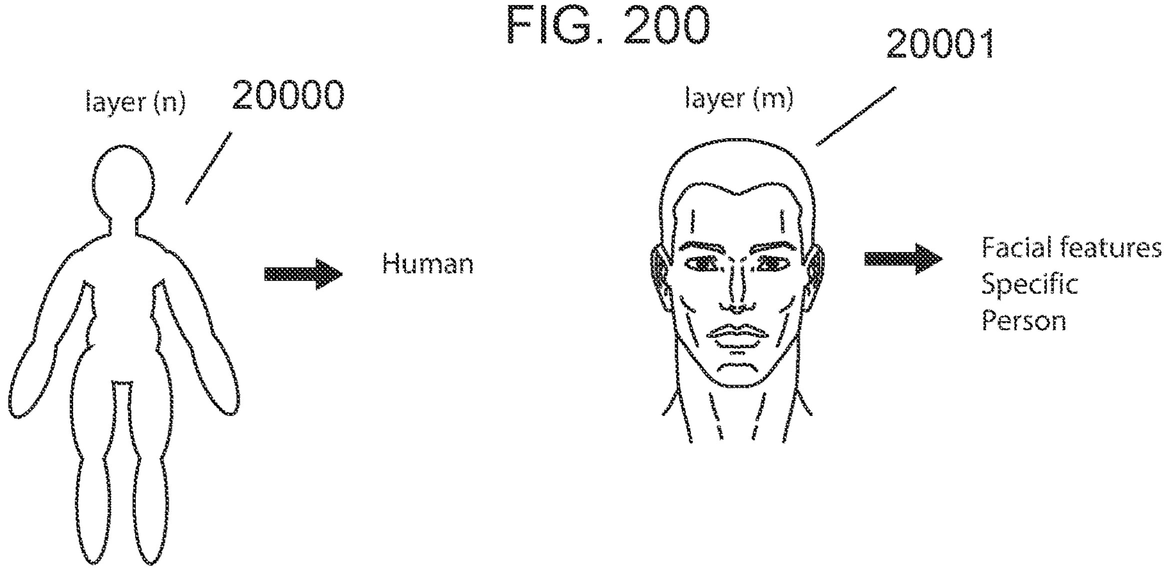

FIG. 200 illustrates a higher level layer of neurons may detect a human another layer of neurons may recognize the person based on recognition of facial features.

Figure 201:
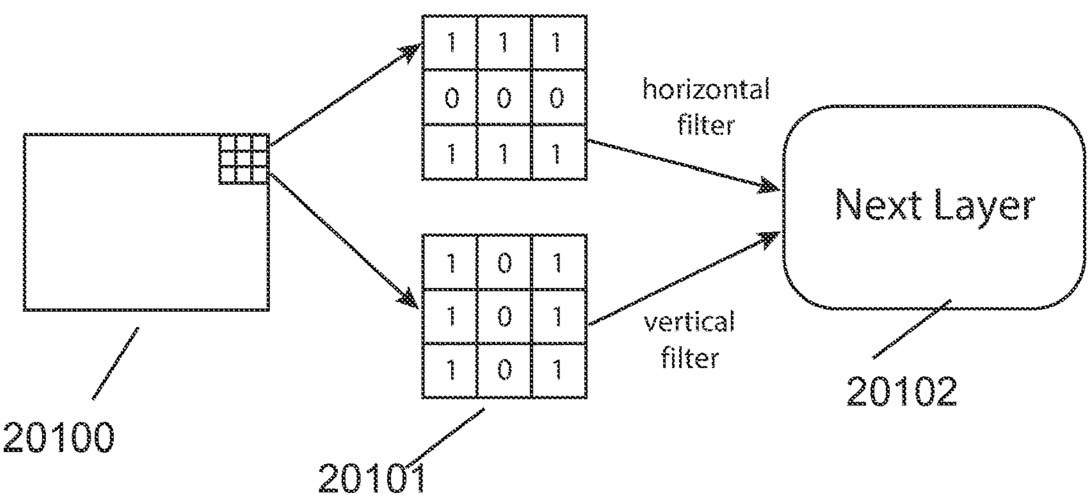

FIG. 201 illustrates an example of hierarchical feature engineering.

Figure 202:
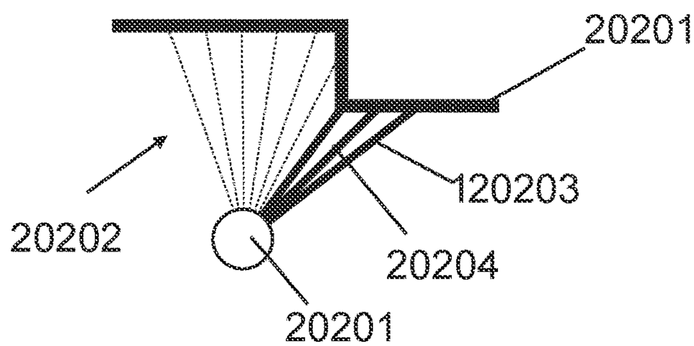

FIG. 202 illustrates a wall, a robot, and measurements captured by a depth sensor of the robot.

Figure 203:
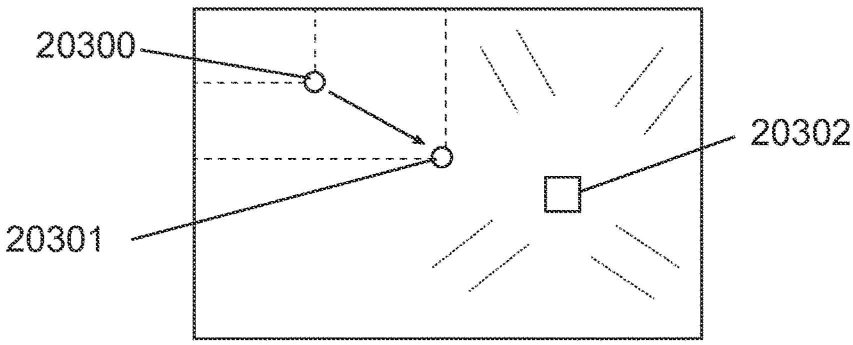

FIG. 203 illustrates a top view of an environment with a robot moving from an initial point to a second point.

Figure 204:
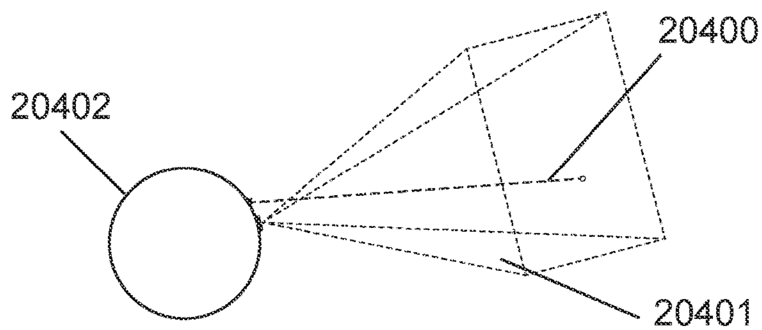

FIG. 204 illustrates a line of sight of a rangefinder and a FOV of a camera positioned on a robot.

Figure 205:
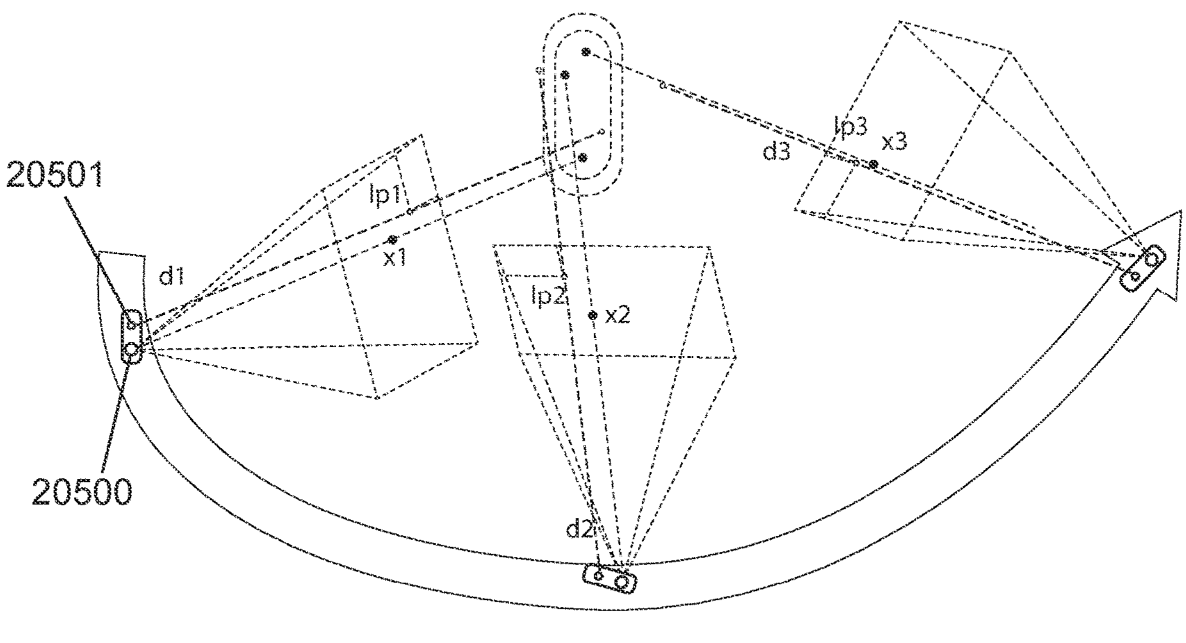

FIG. 205 illustrates the rangefinder frame of reference is different from the features frame of reference within the environment.

Figure 206:
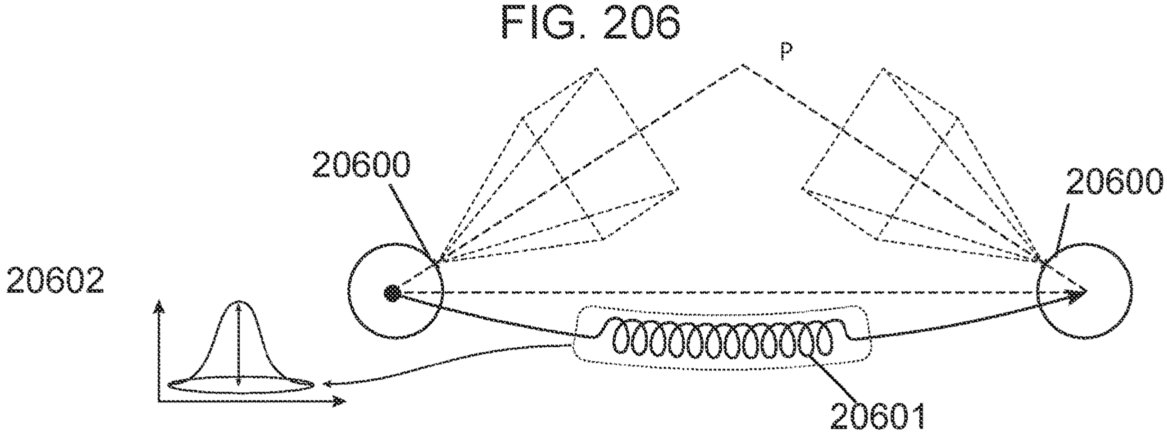

FIG. 206 illustrates two cameras connected by a virtual spring in an epipolar plane setup.

Figure 207:
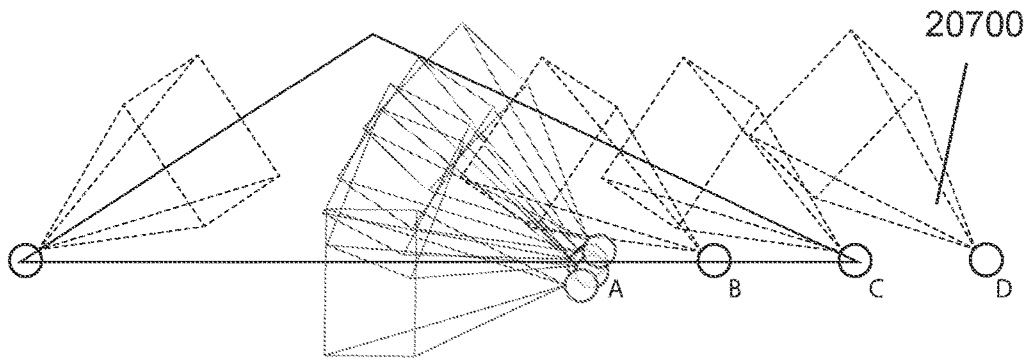

FIG. 207 illustrates a camera is subjected to both translational noise, as well as angular noise.

Figure 208:
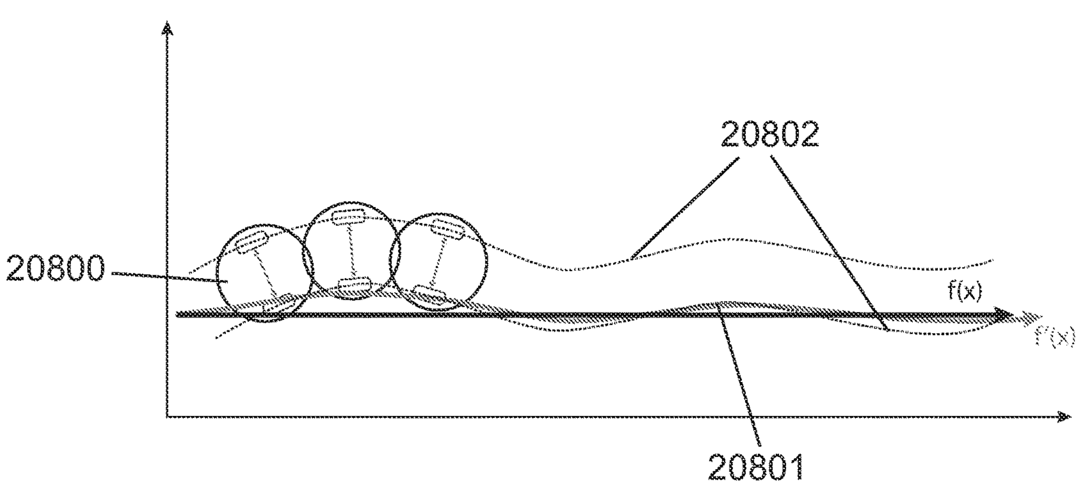

FIG. 208 illustrates a robot and a trajectory of each wheel and trajectory of the robot.

Figure 209A:
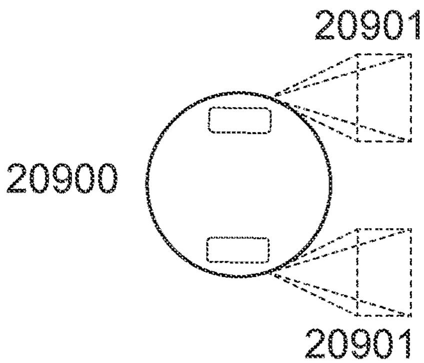

FIG. 209A illustrates a robot with two cameras positioned on each side.

Figure 209B:
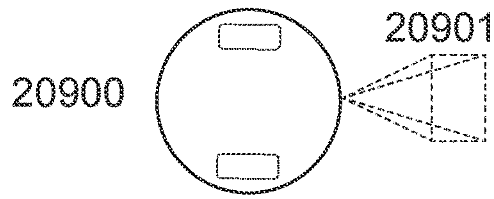

FIG. 209B illustrates the robot with one camera positioned on a front side.

Figure 210:
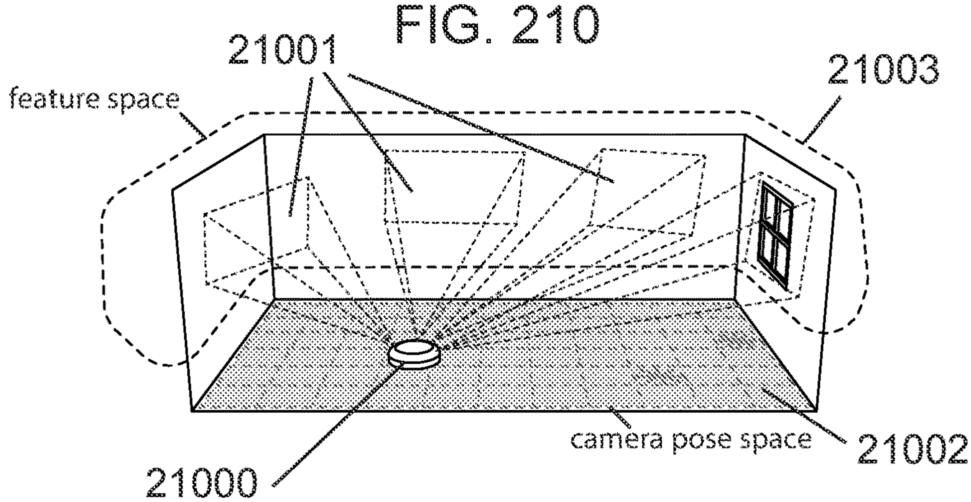

FIG. 210 illustrates a robot with cameras observing an environment.

Figure 211:
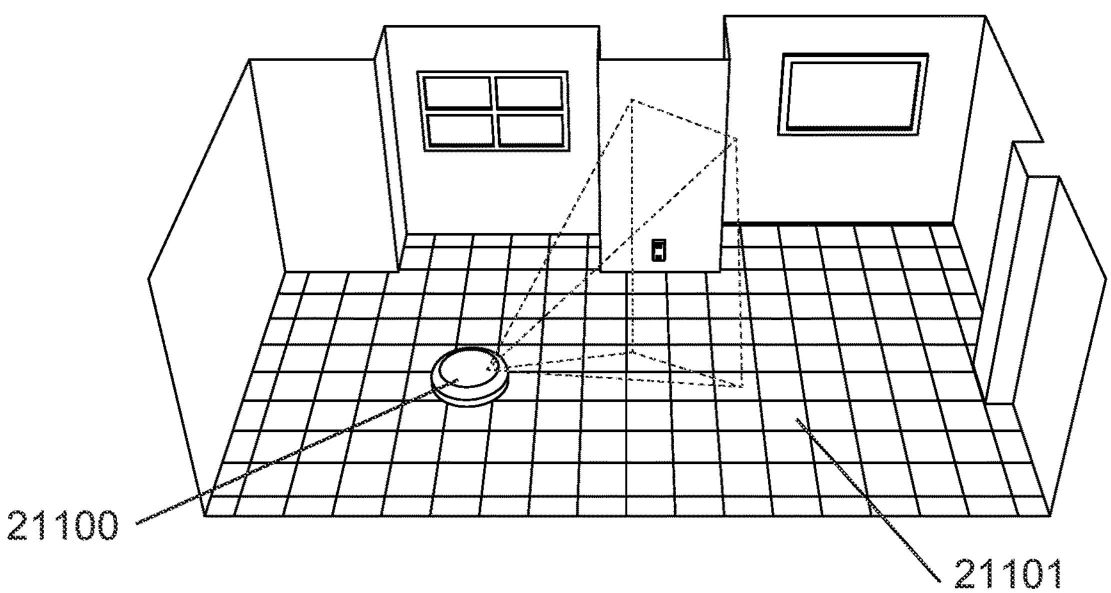

FIG. 211 illustrates a robot within a 3D environment, wherein an actuation space is separate from an observation space.

Figure 212:
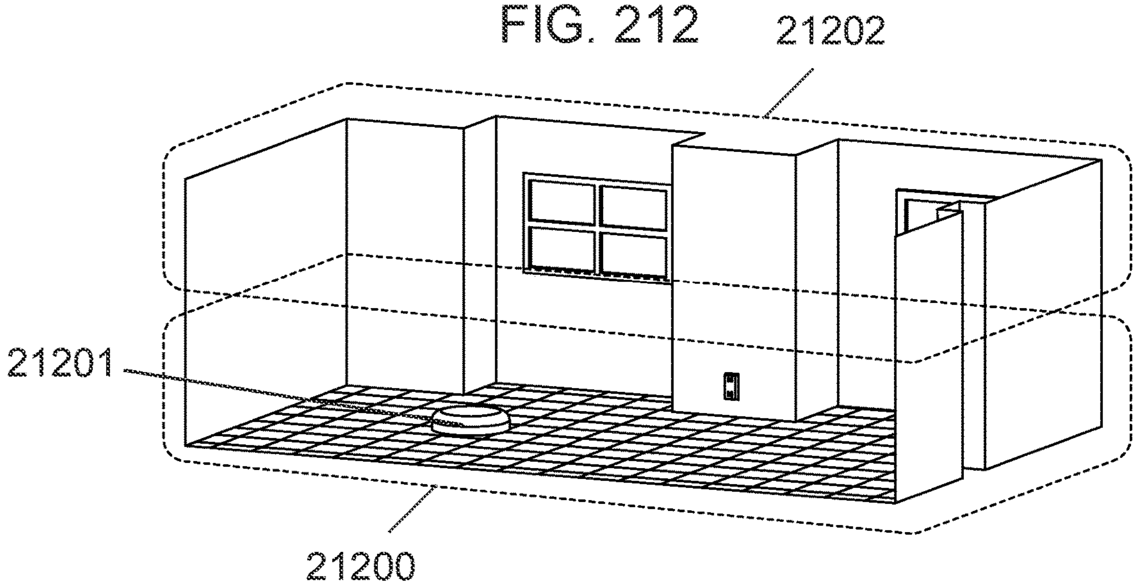

FIG. 212 illustrates another example, wherein an actuation space of a robot is different from an observation space.

Figure 213:
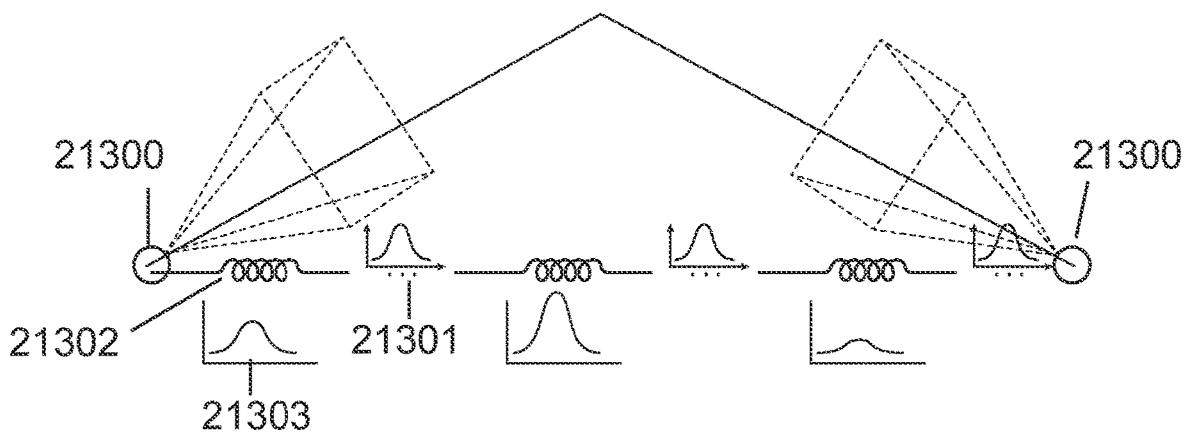

FIG. 213 illustrates the concept of epipolar geometry in the context of collaborative devices.

Figure 214A:
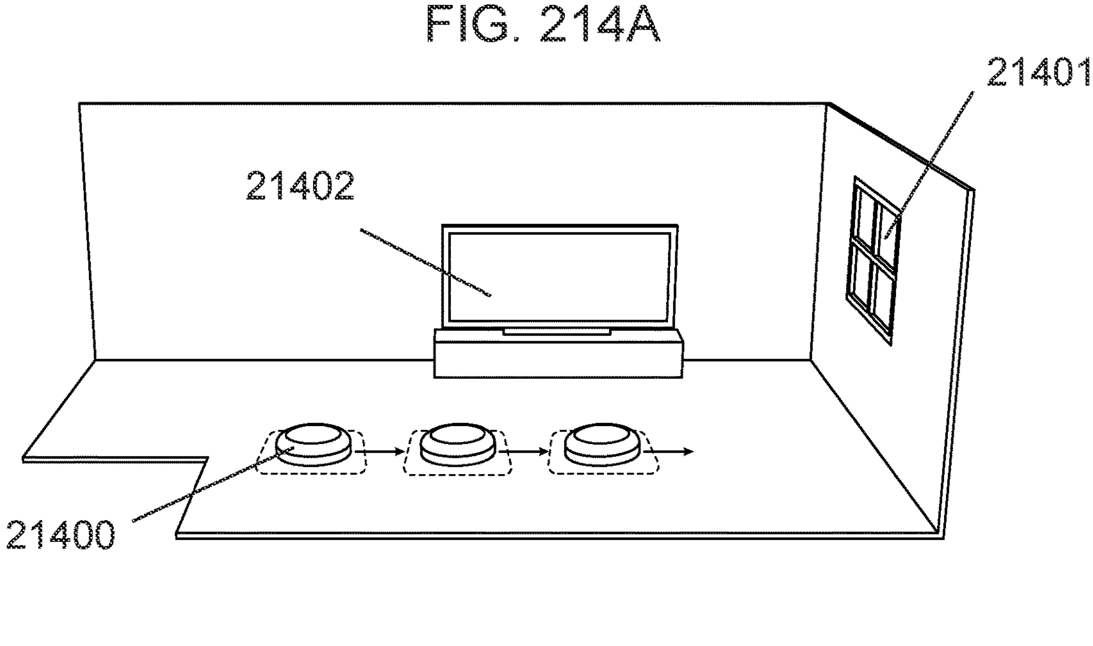

FIG. 214A illustrates a robot 21400 moving in an environment.

FIG. 214B illustrates how observed features change in the images captured by the robot FIG. 214C illustrates a navigation path of the robot on a 2D plane of the environment.

FIG. 215A illustrates a geometric correlation between features in a feature space and a camera location of a robot in an actuation space.

FIG. 215B illustrates the geometric correlation.

Figure 216A:
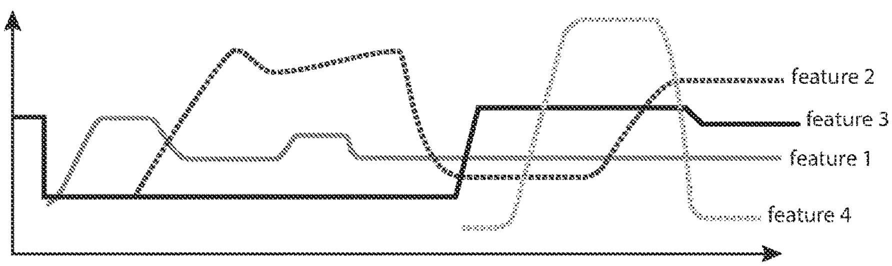
Figure 216B:
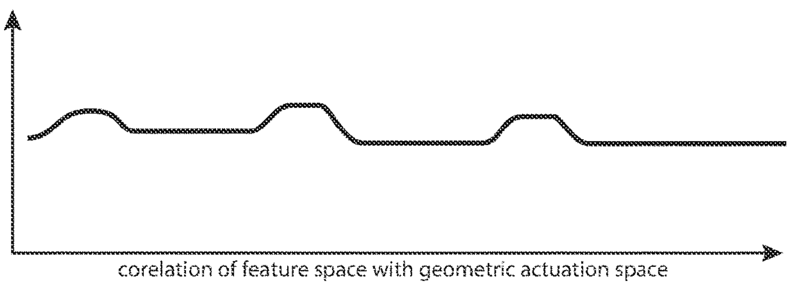

FIG. 216A illustrates a graph depicting a correlation between different features in a feature. space FIG. 216B illustrates a graph depicting correlation between the feature space and the actuation space over time and a camera location.

Figure 217A:
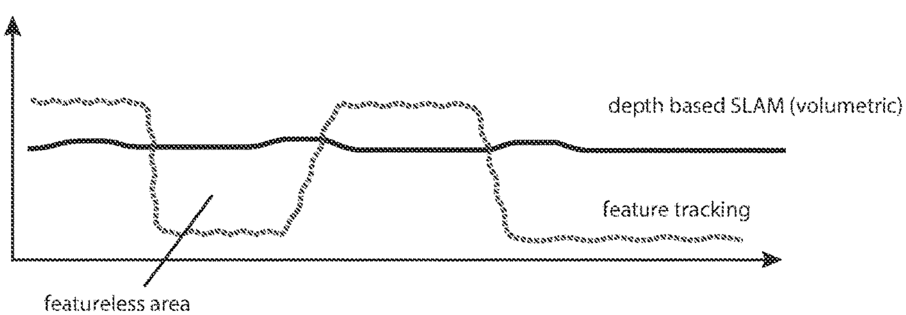

FIG. 217A illustrates a graph depicting depth based SLAM and feature tracking over time.

Figure 217B:
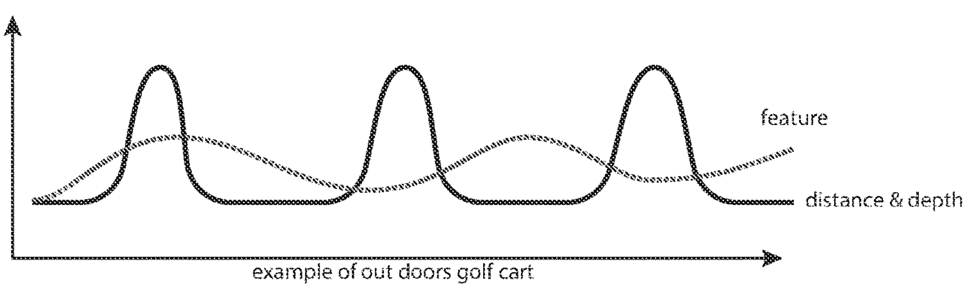

FIG. 217B illustrates a graph depicting depth based SLAM and feature tracking over time for an autonomous golf cart.

Figure 218:
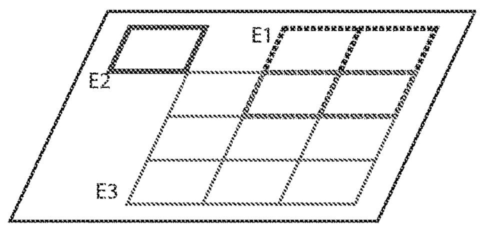

FIG. 218 illustrates a state space with events E1, E2 and E3.

Figure 219A:
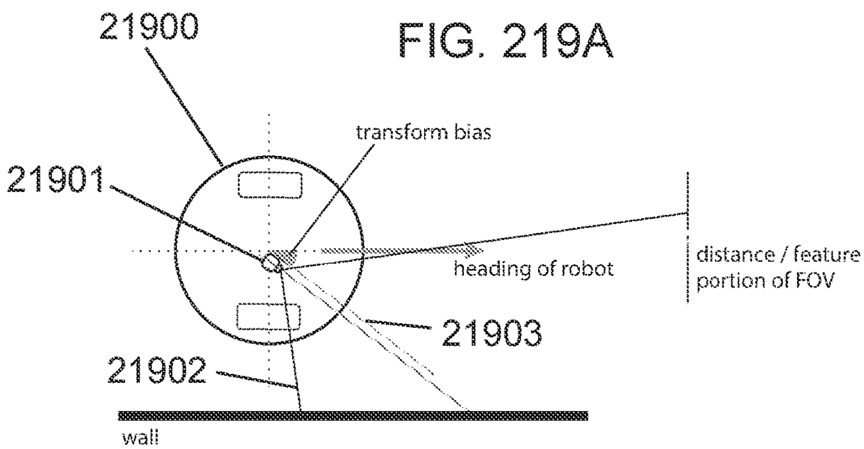

FIG. 219A illustrates a robot with a camera mounted at an angle to a heading of the robot.

Figure 219B:
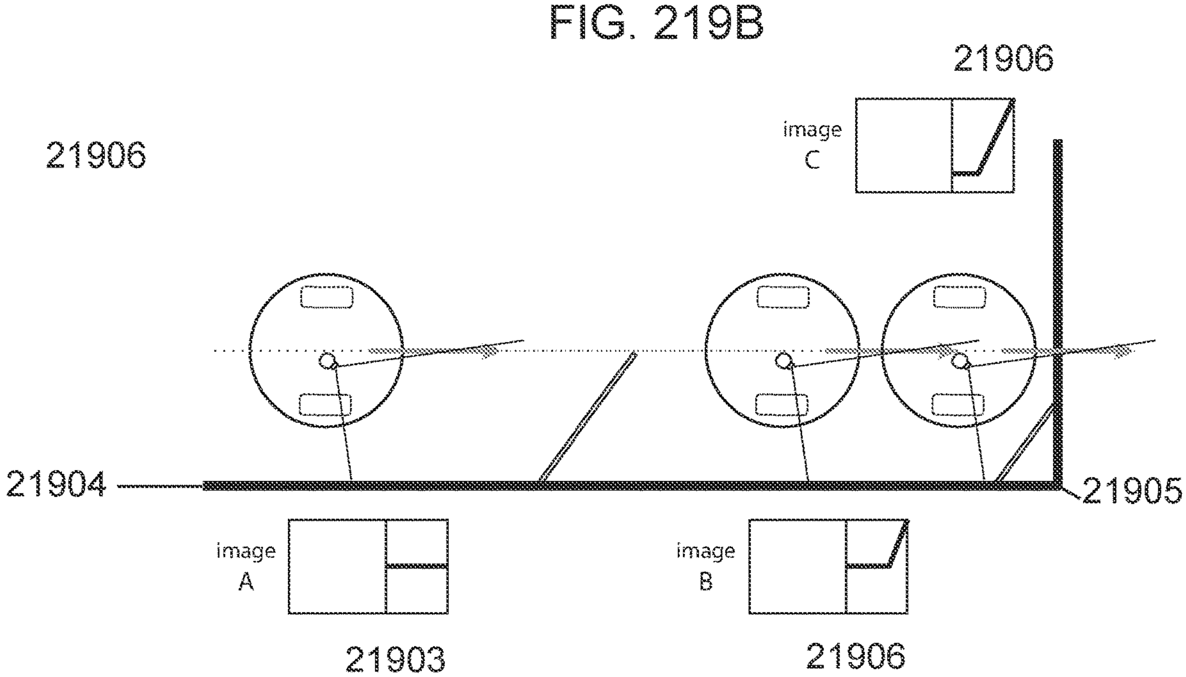

FIG. 219B illustrates robot in 3 different states.

Figure 220:
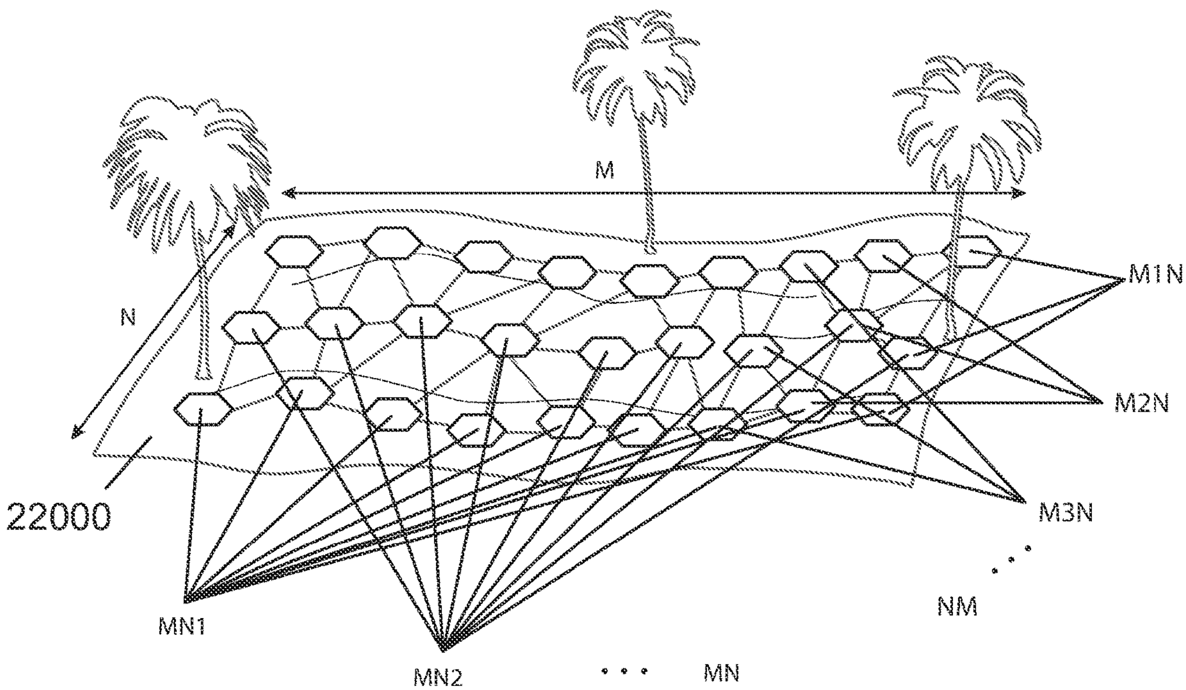

FIG. 220 represents an open field golf course with varying topological heights.

Figure 221:
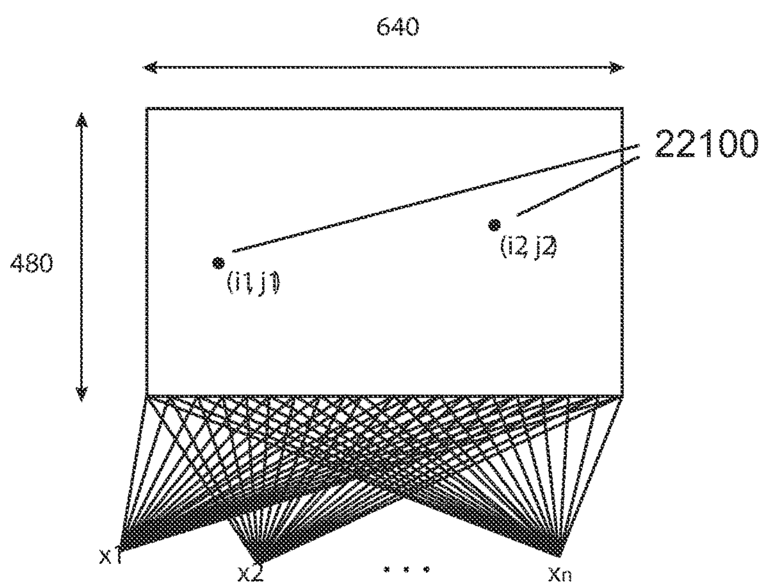

FIG. 221 illustrates an example of a Kohonen map.

Figure 222:
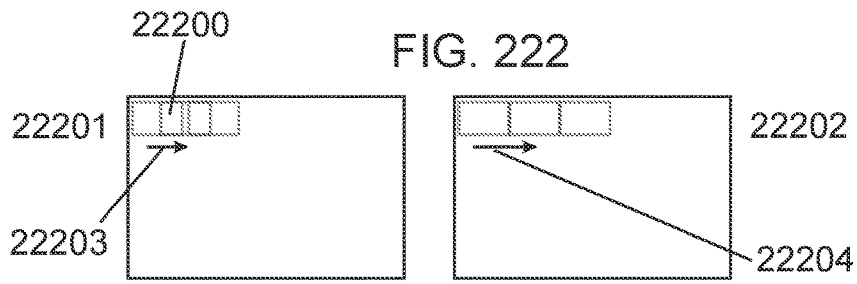

FIG. 222 illustrates an example of a sliding window in images.

Figure 223:
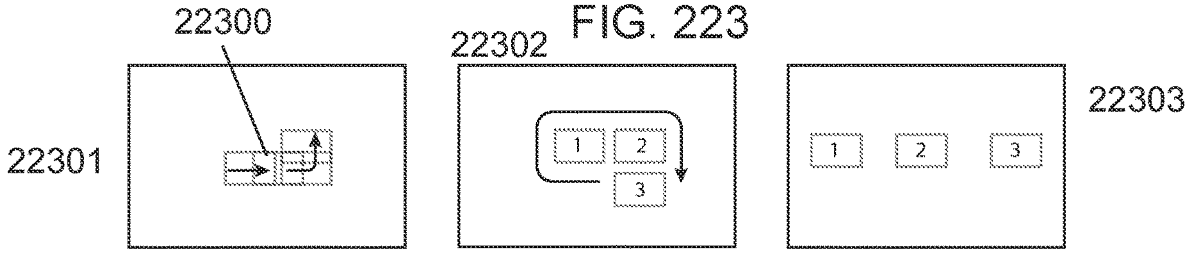

FIG. 223 illustrates various possibilities, wherein the sliding window begins in a middle of the images.

Figure 224:
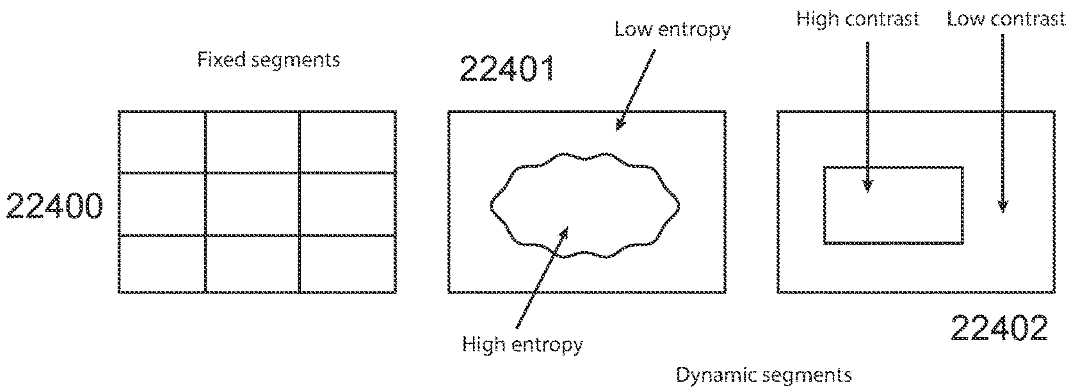

FIG. 224 illustrates various possibilities for segmenting the images.

Figure 225:
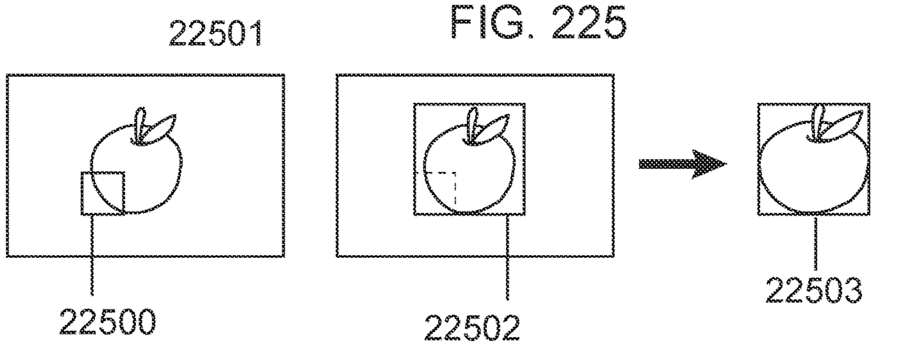

FIG. 225 illustrates expansion of a sliding window.

Figure 226:
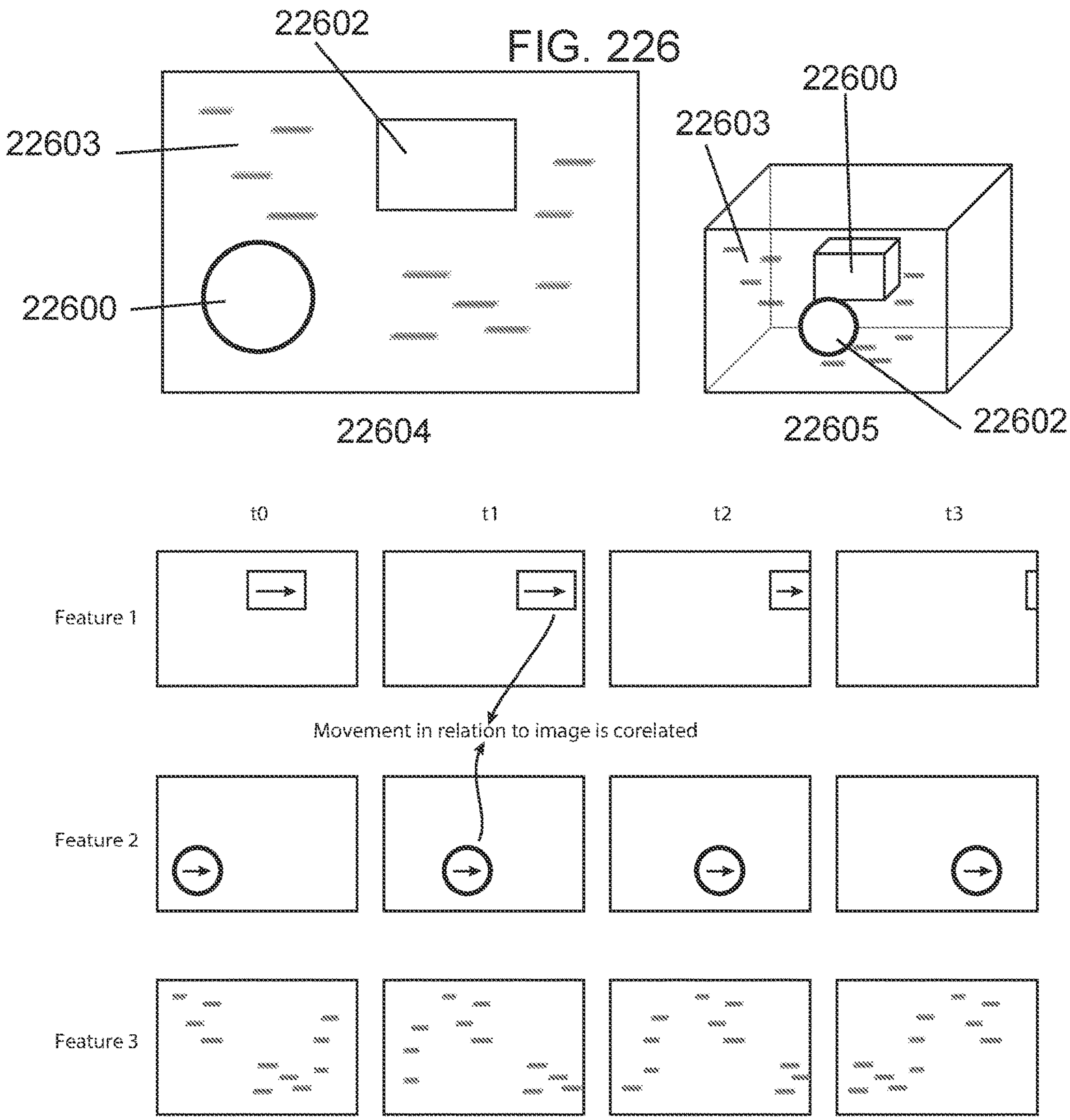

FIG. 226 illustrates various features in two-dimensions and three dimensions.

Figure 227A:
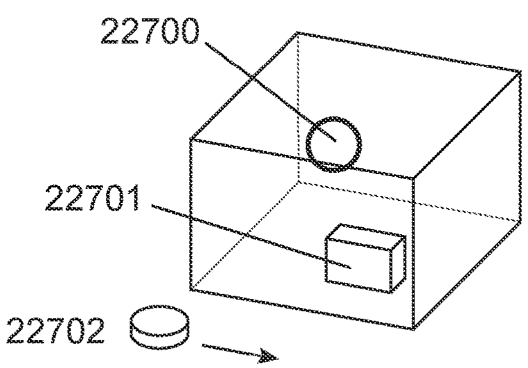
Figure 227B:
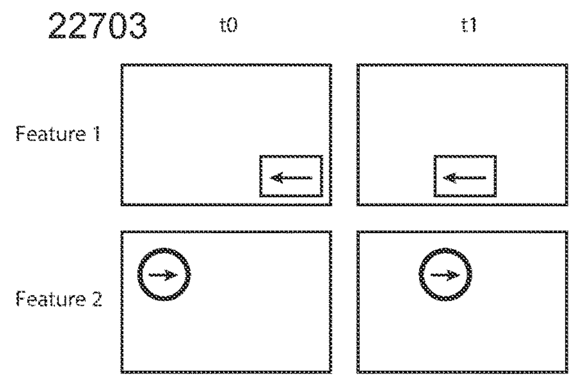

FIGS. 227A-227B illustrate two features tracked by a processor of robot.

Figure 228:
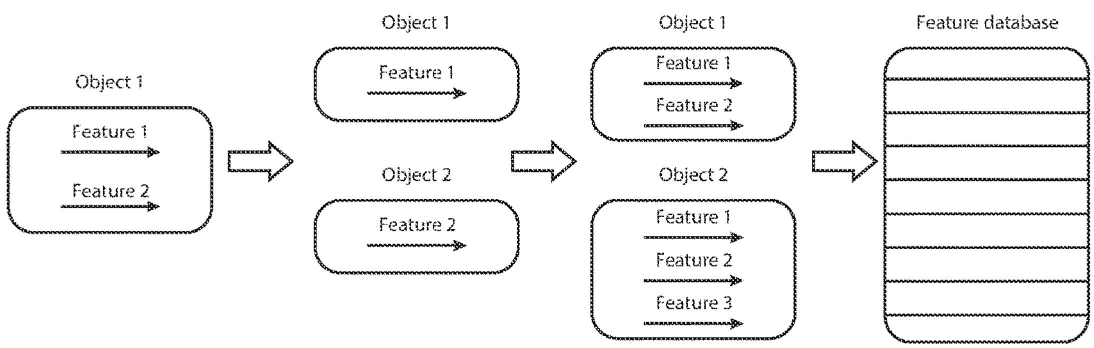

FIG. 228 illustrates the process of classification of an object with two features into feature database.

Figure 229:
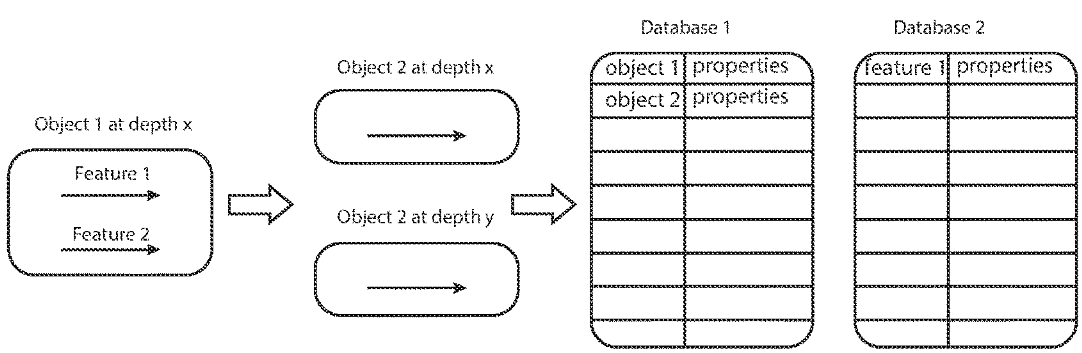

FIG. 229 illustrates the process of classification of an object with two features into object and feature databases.

Figure 230:
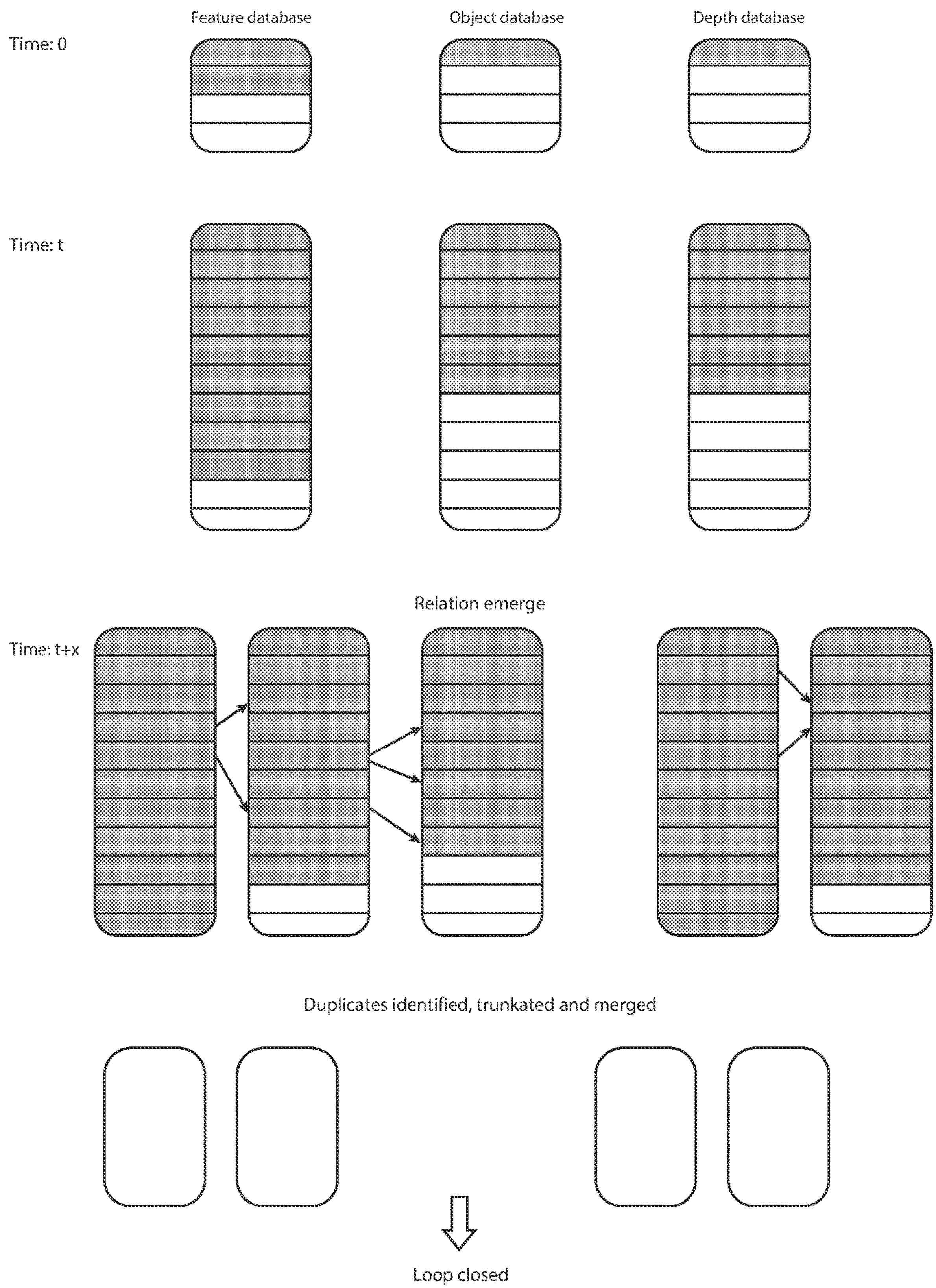

FIG. 230 illustrates as more information appears, more data structures emerge.

Figure 231:
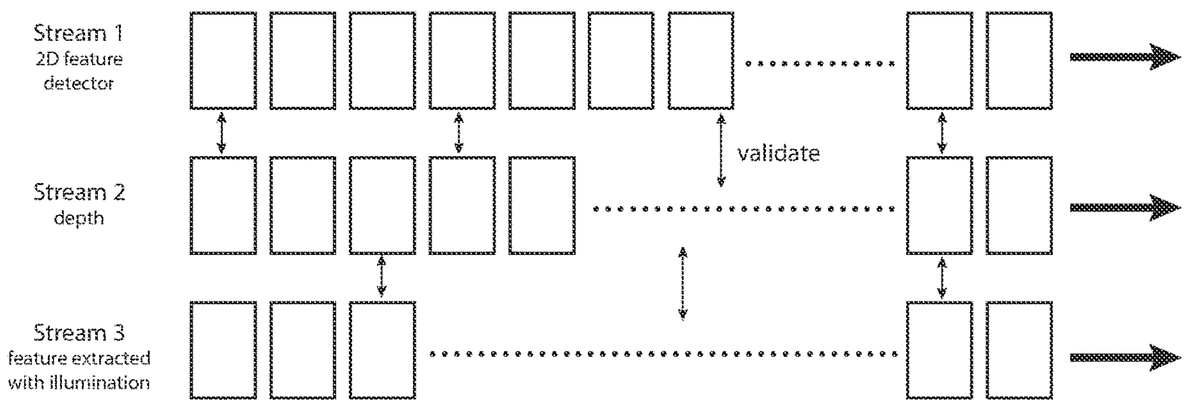

FIG. 231 illustrates three different streams of data and how they are being used to validate each other.

Figure 232:
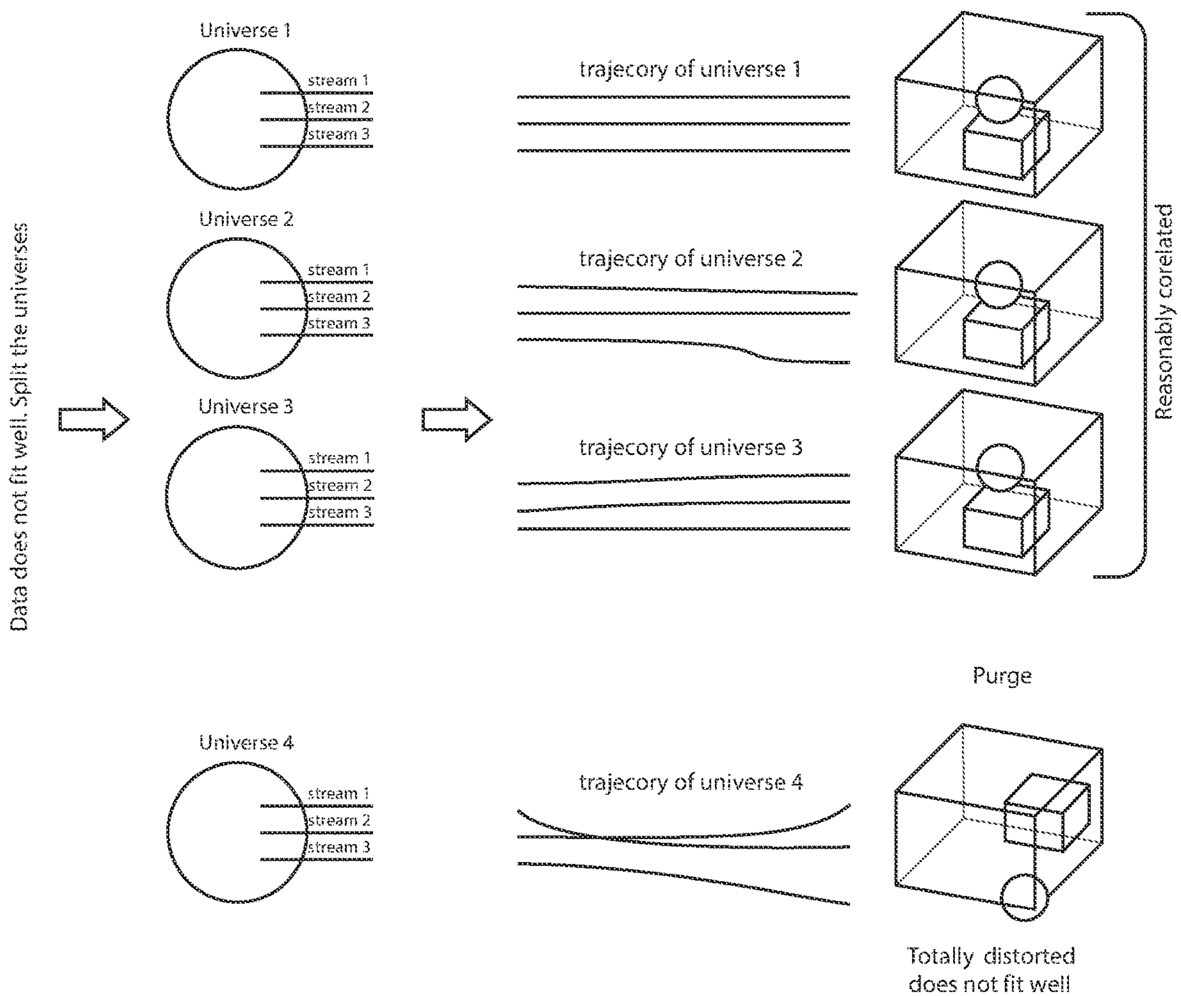

FIG. 232 illustrates the data split into various possible scenarios.

FIGS. 233A-233E illustrate, each color channel of image data can be processed independently, or combined into greyscale at any level for further processing.

Figure 233A:
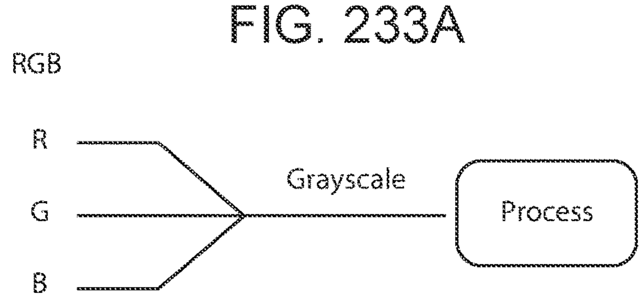
Figure 233B:
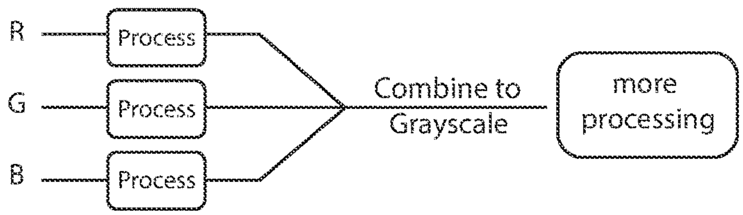
Figure 233C:
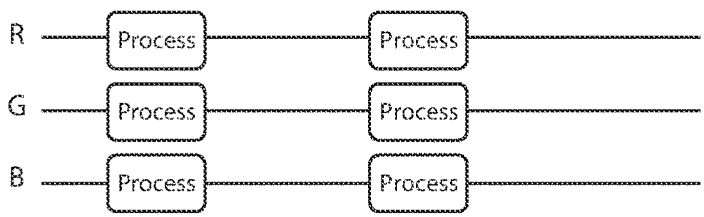
Figure 233D:
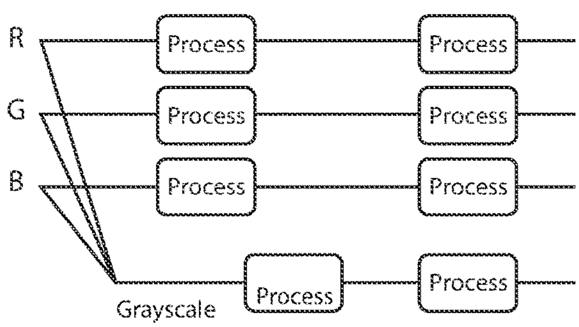
Figure 233E:
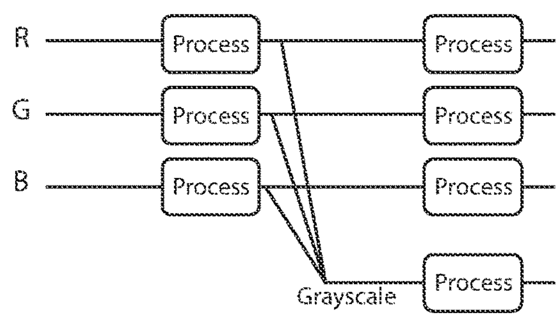
Figure 233F:
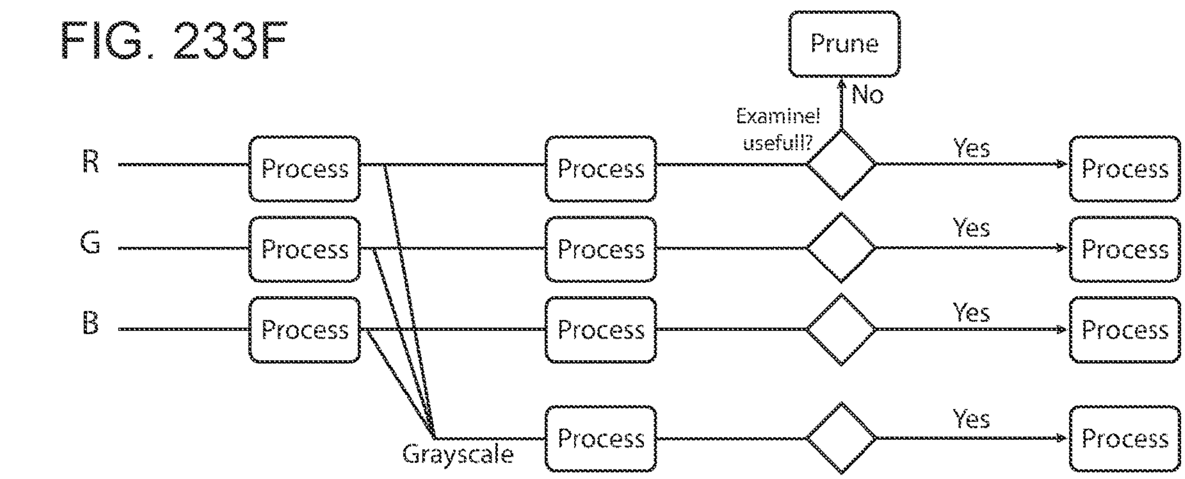

In FIG. 233F all processed data are examined by an arbitrator.

Figure 233G:
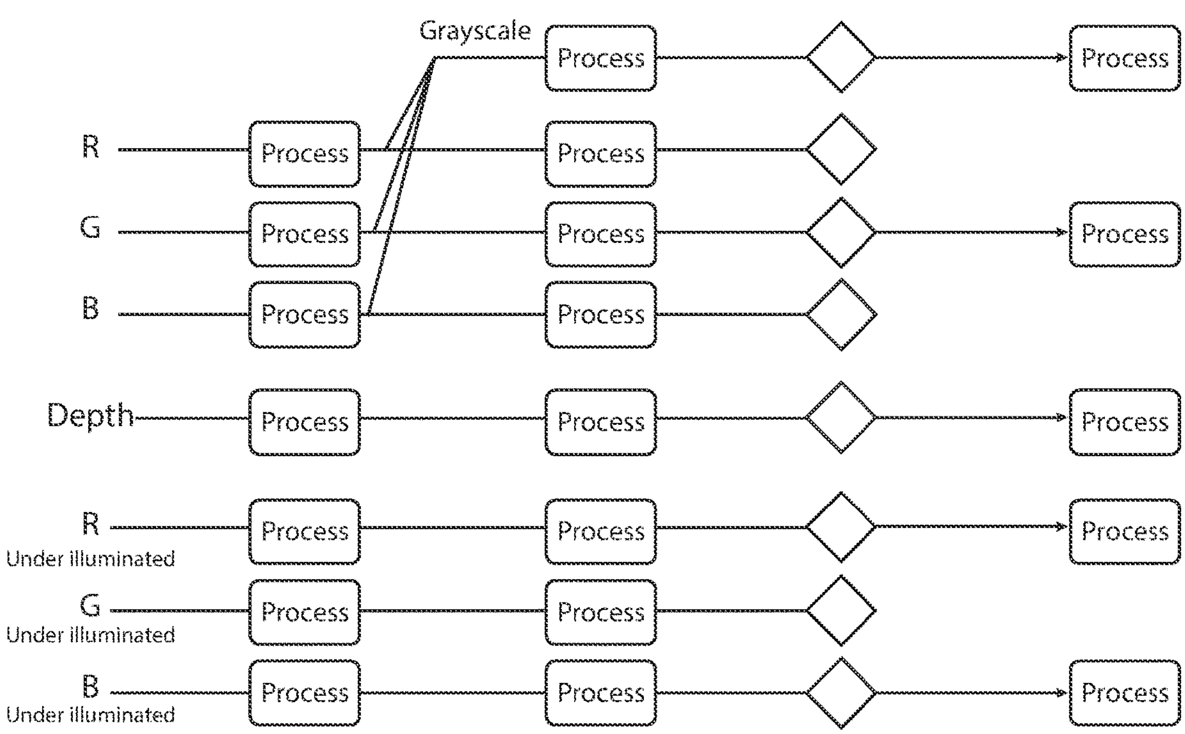

FIG. 233G illustrates the addition of depth data and RGB data under illumination to the process.

Figure 234A:
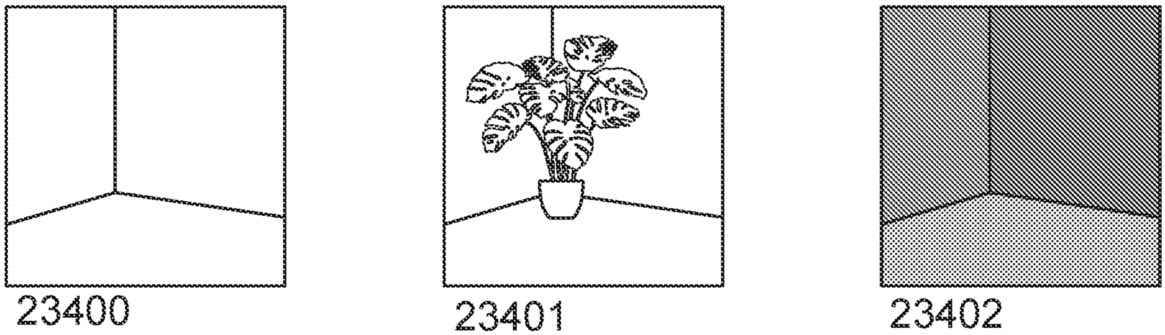
Figure 234B:
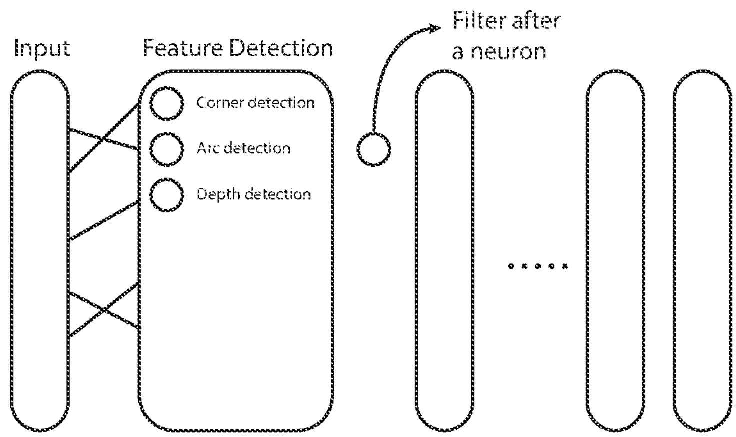

FIG. 234A-234B illustrate the concept of dynamic pruning of image selectors in a network.

Figure 235:
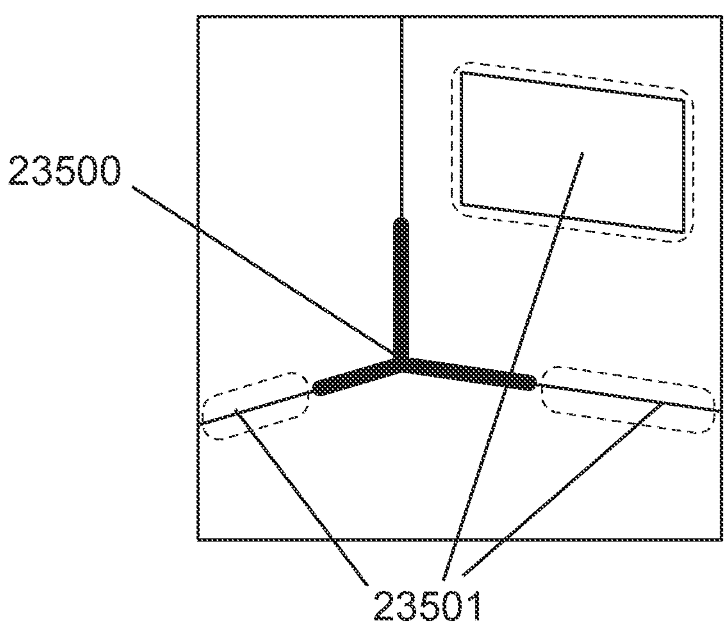

FIG. 235 illustrates an example of an image with features having high and low confidences.

Figure 236:
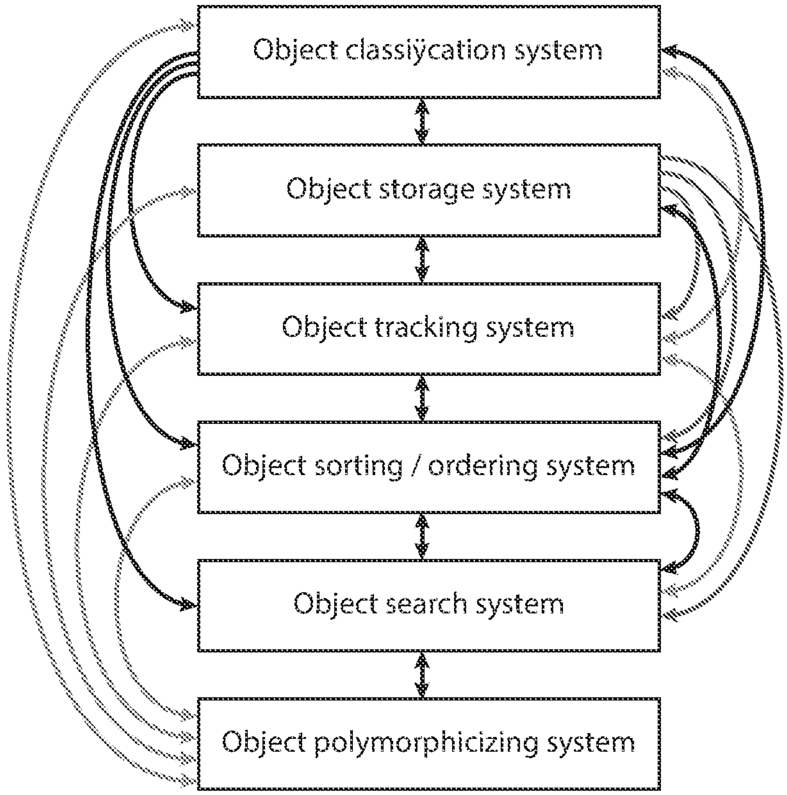

FIG. 236 illustrates examples of relations between different subsystems in identifying and tracking objects.

Figure 237:
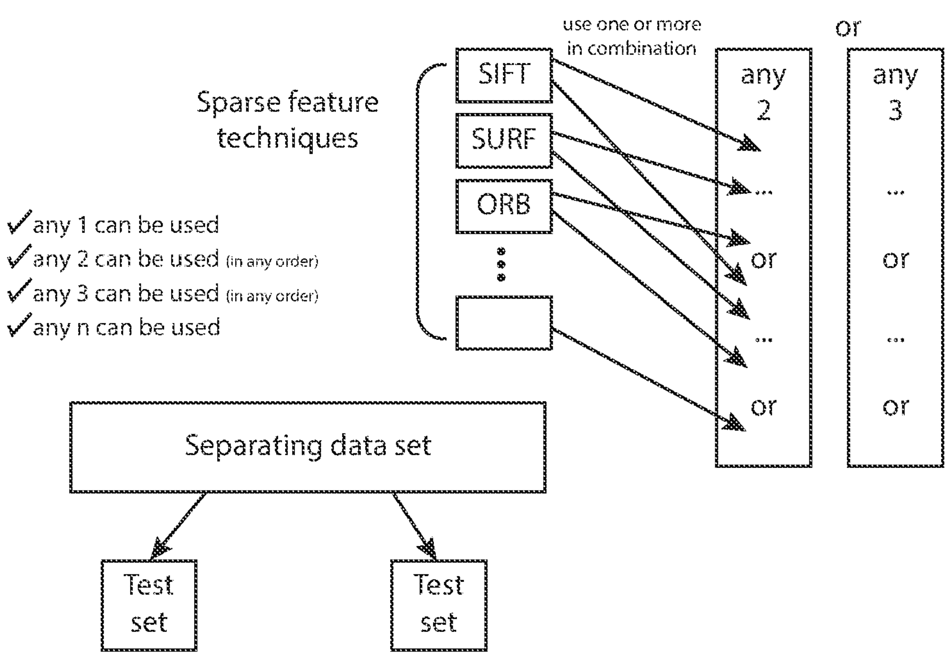

FIG. 237 illustrates a sequence of training, testing, training, testing, and so forth.

Figure 238:
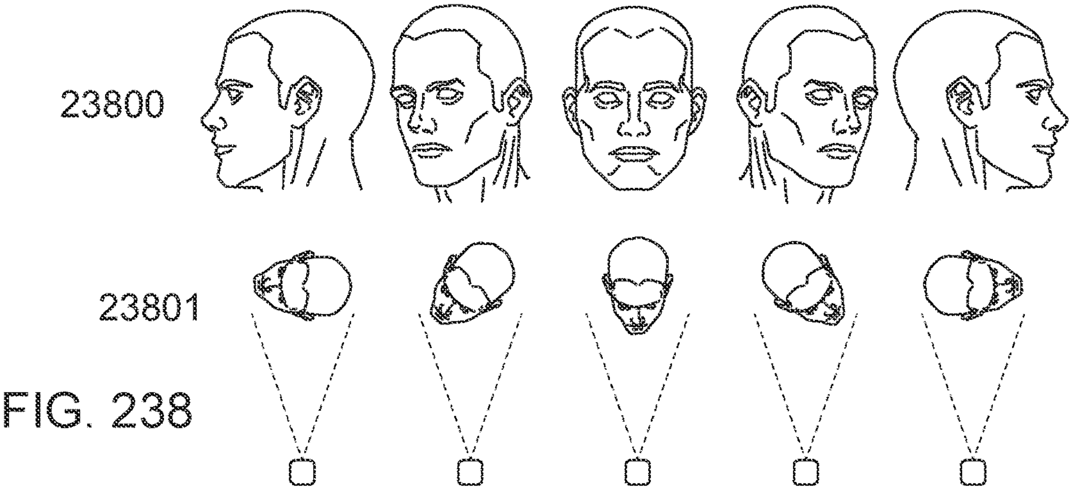

FIG. 238 illustrates a correlation between success in identifying a face and an angle of the face relative to the camera.

Figure 239:
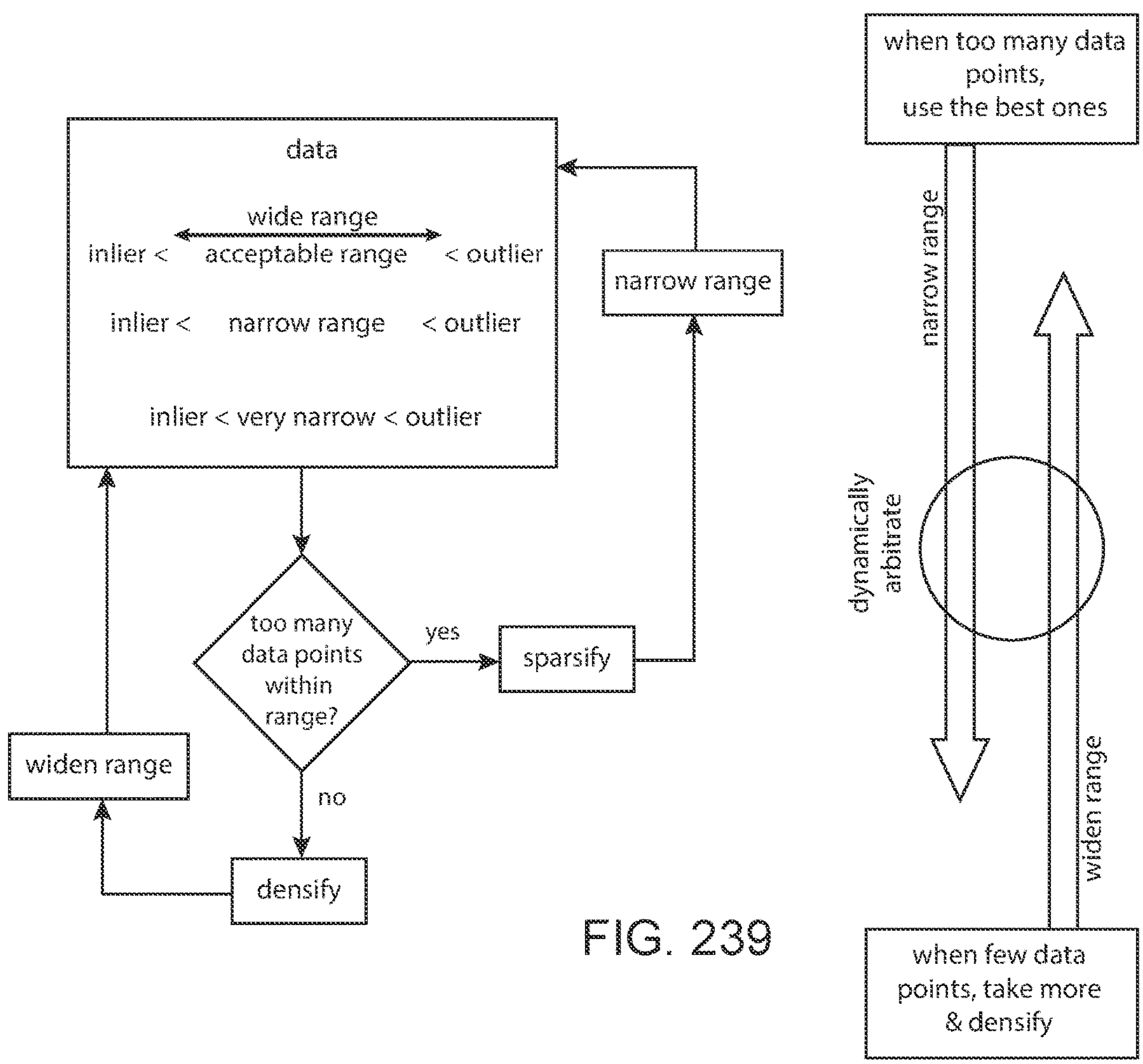

FIG. 239 illustrates the process of densifying and sparsifying data points within a range.

Figure 240:
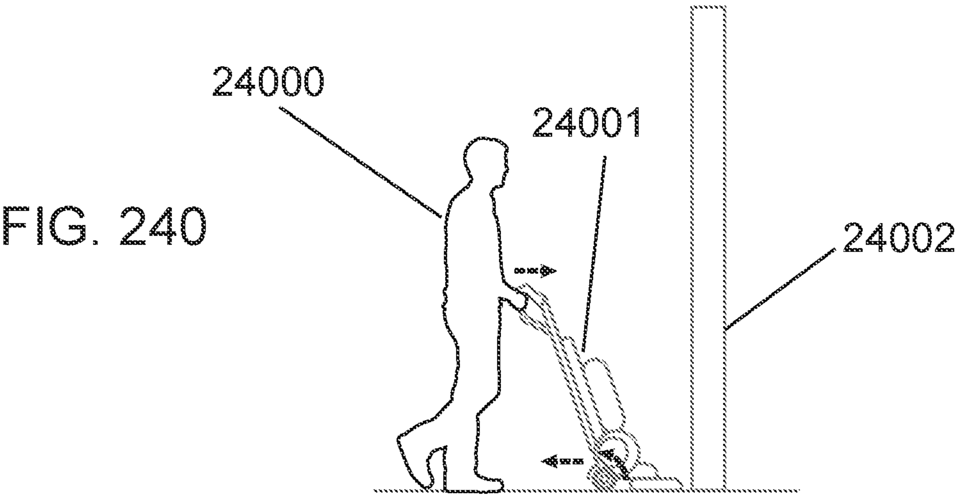

FIG. 240 illustrates a user operating a vacuum and approaching wall.

Figure 241A:
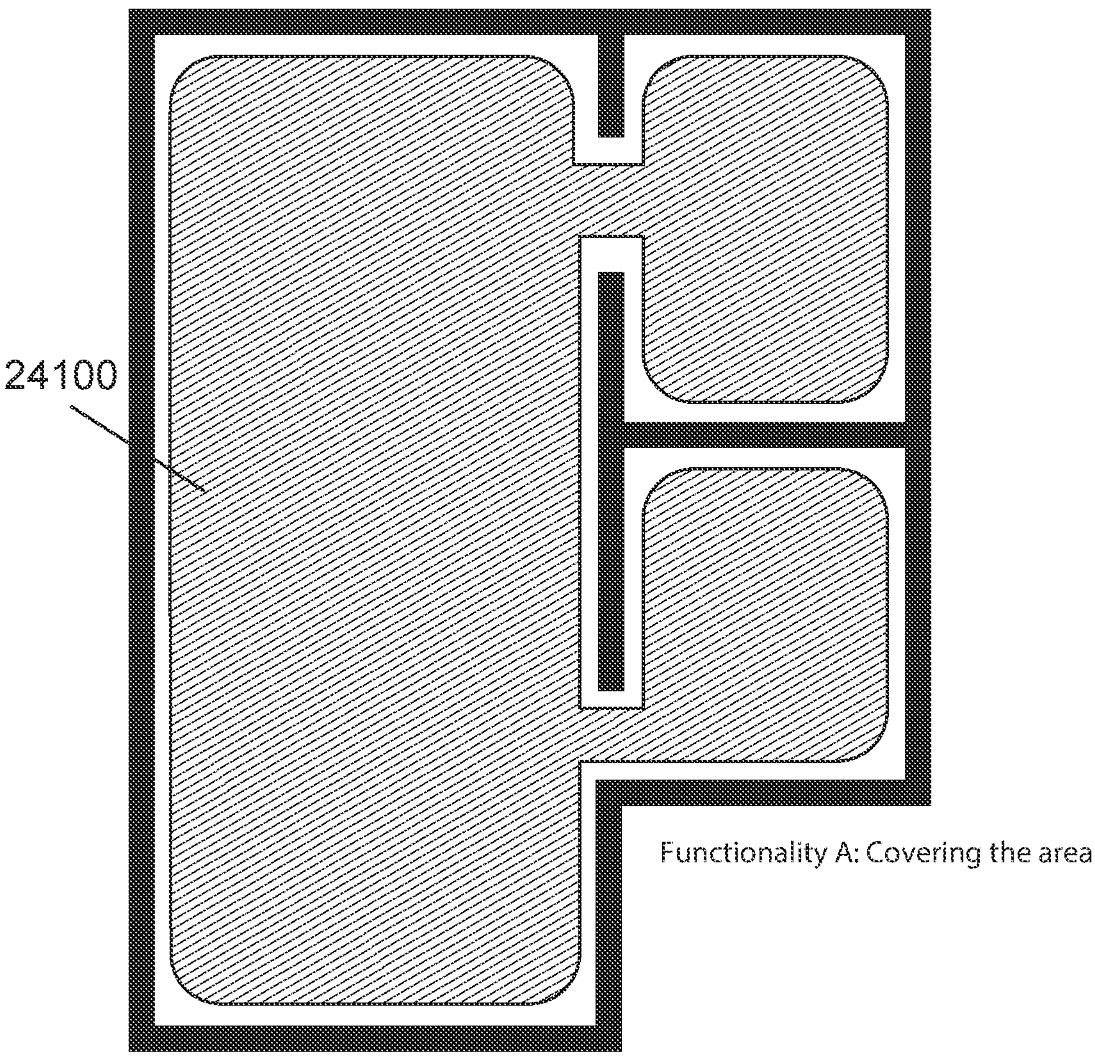
Figure 241B:
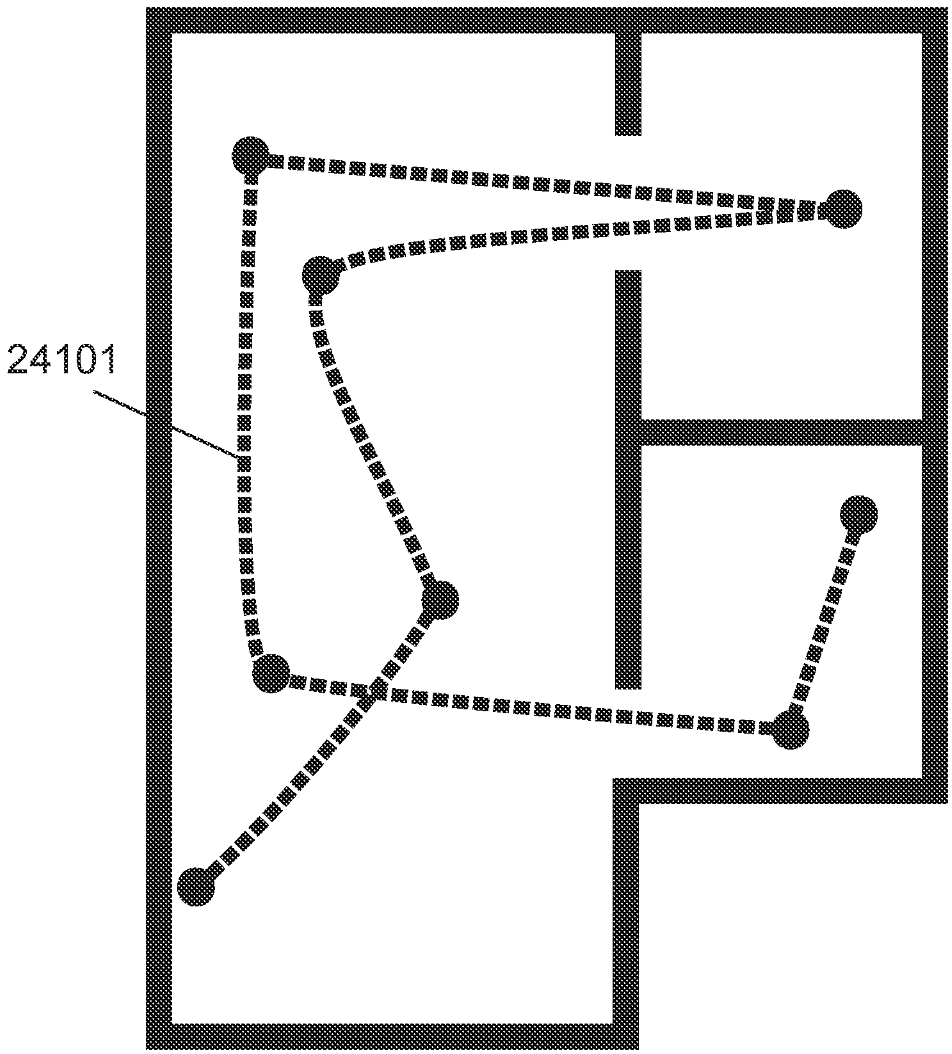
Figure 241C:
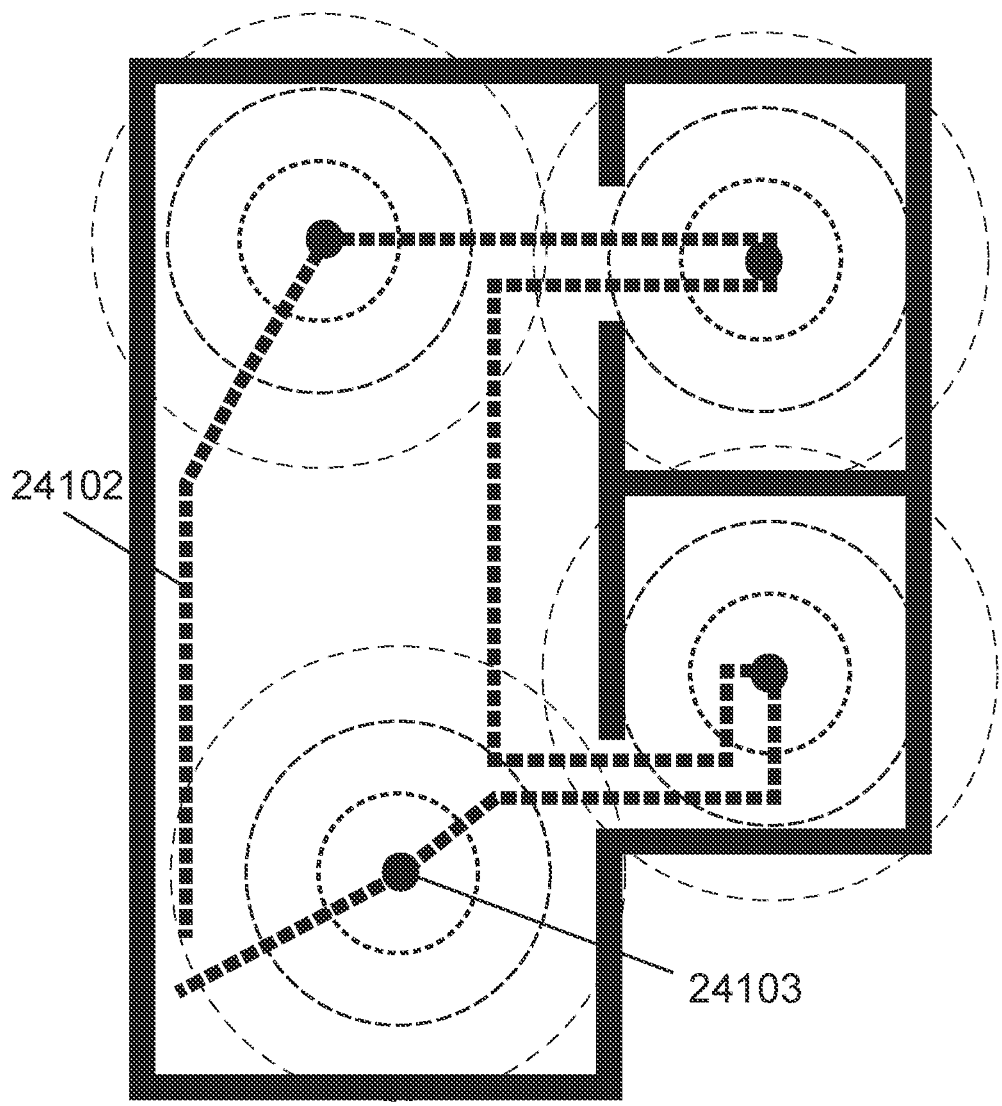

FIGS. 241A-241C illustrate examples of coverage functionalities of the robot.

Figure 242A:
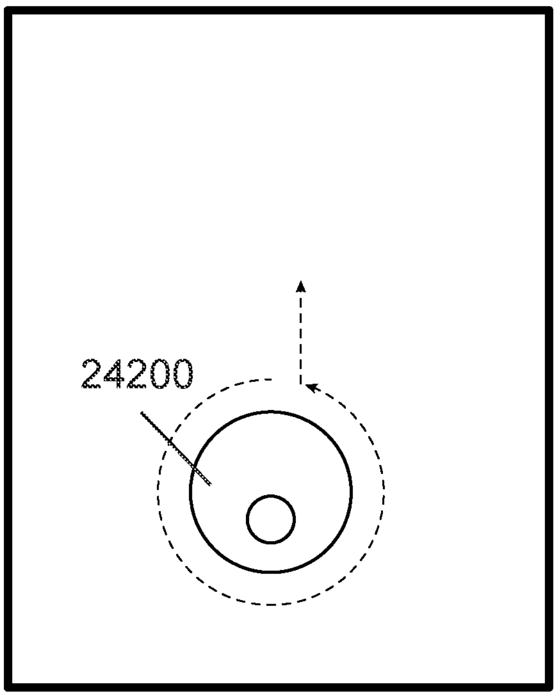
Figure 242C:
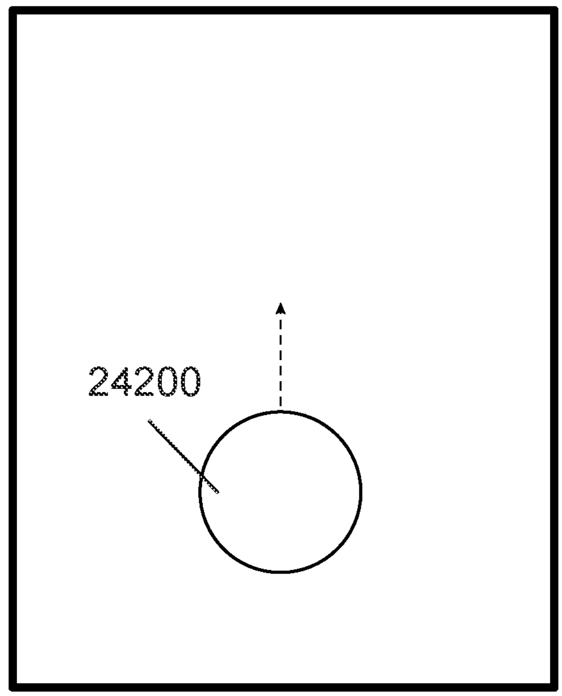
Figure 242B:
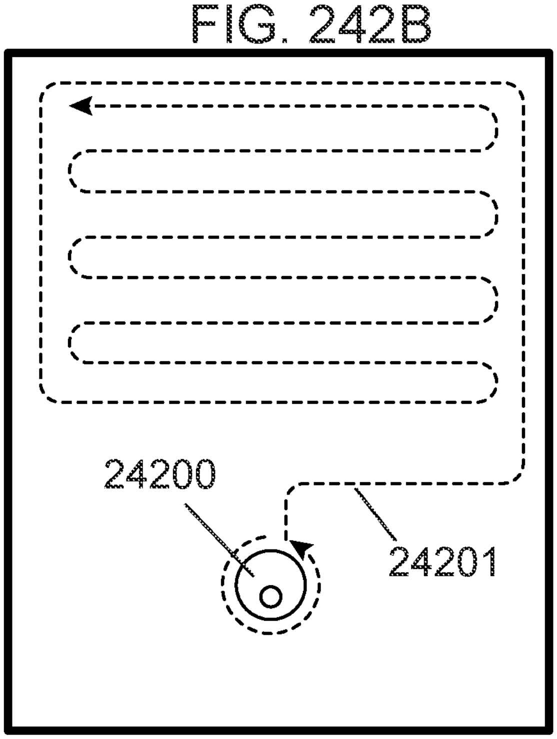

FIGS. 242A-242B illustrate traditional methods of initial mapping before run.

Figure 242D:
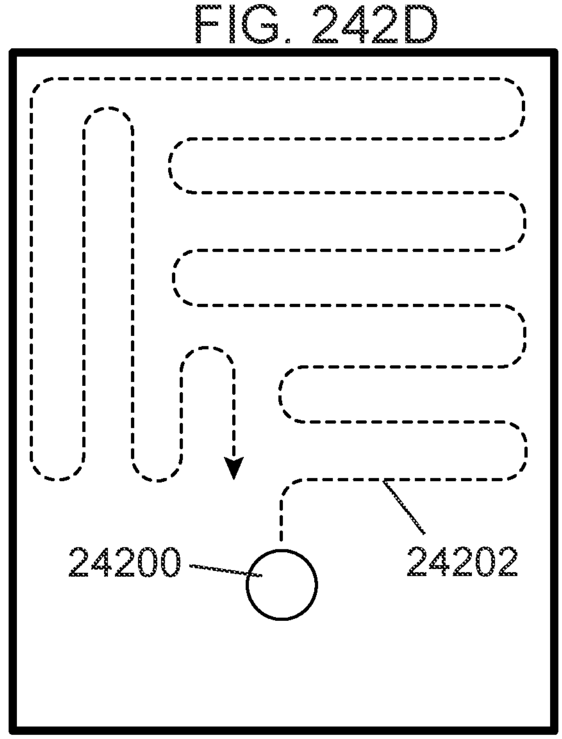

FIGS. 242C-242D illustrate new methods of navigation which doesn't require initial mapping.

Figure 243A:
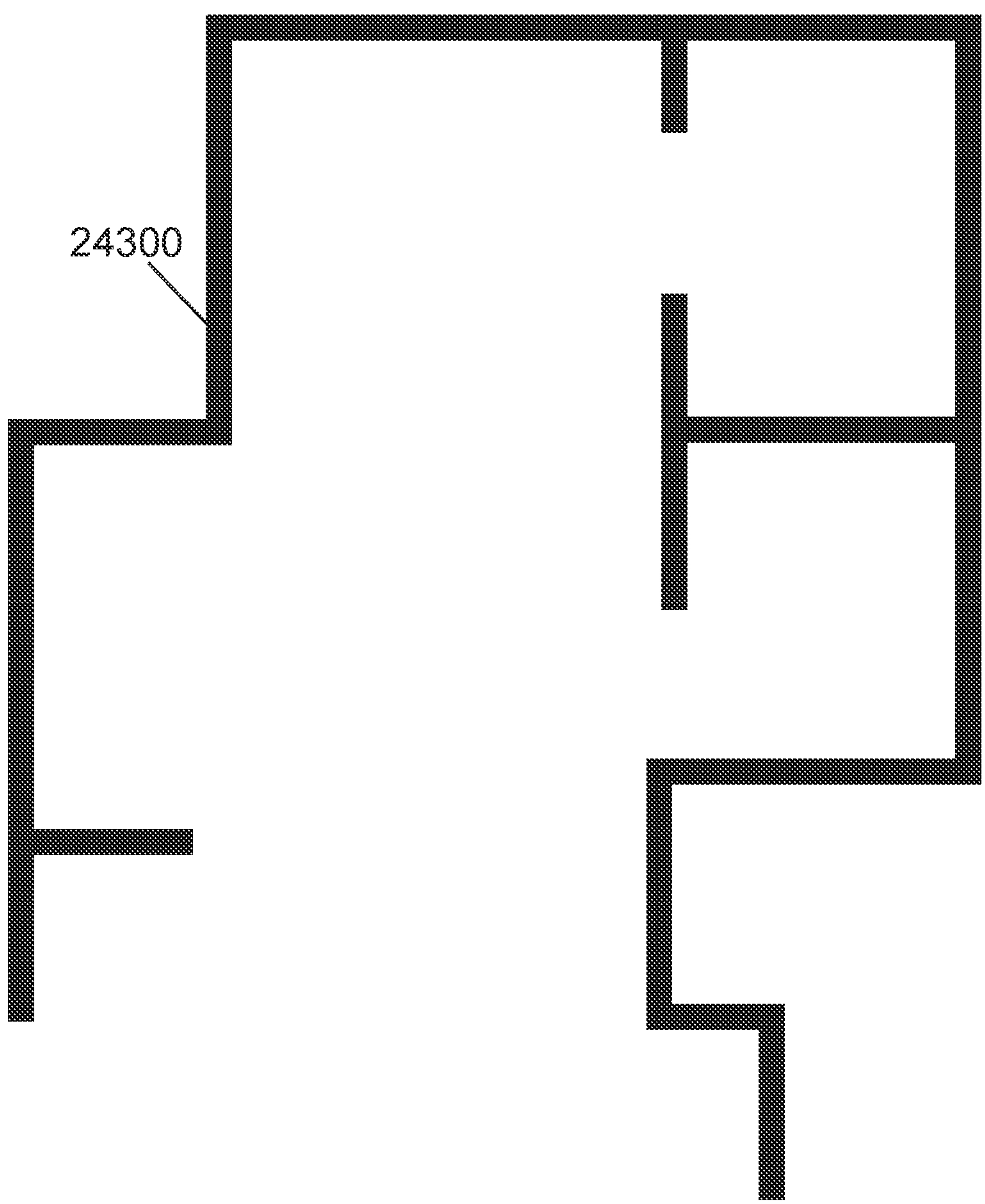

FIG. 243A illustrates a spatial representation of an environment built by the processor of the robot.

Figure 243B:
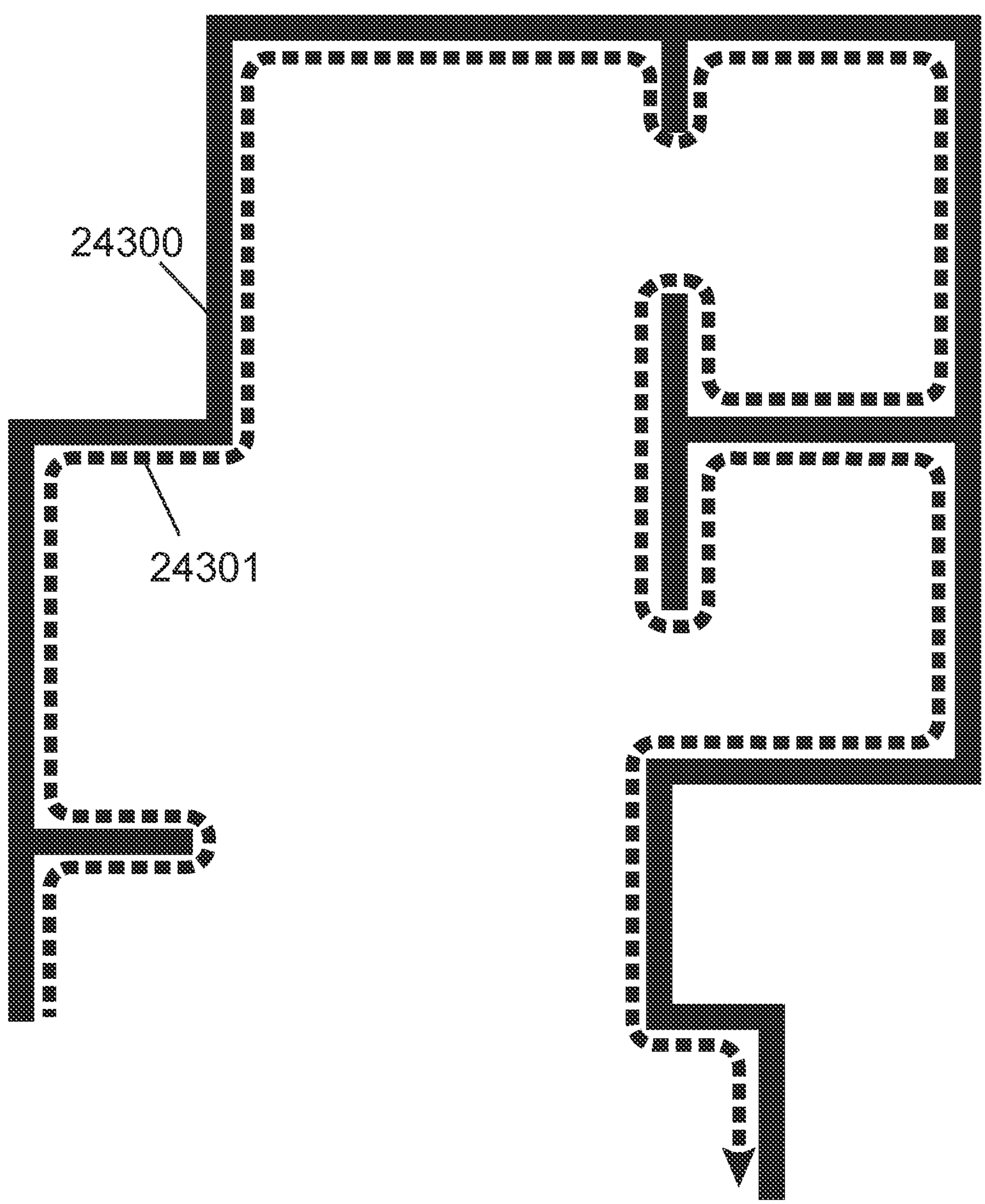

FIG. 243B illustrates a wall follow path of the robot generated by the processor.

Figure 244A:
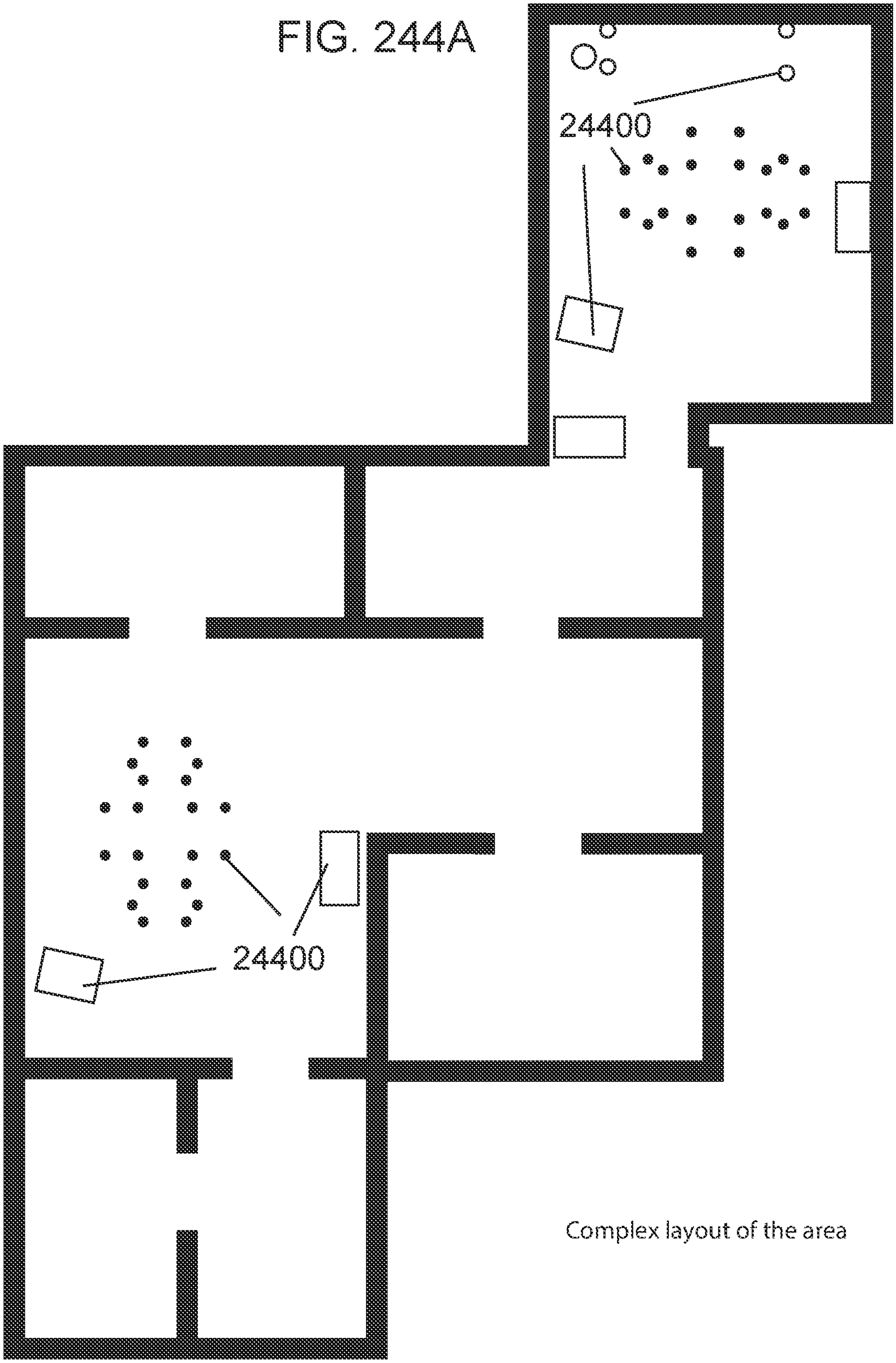

FIG. 244A illustrates an example of a complex environment including obstacles.

Figure 244B:
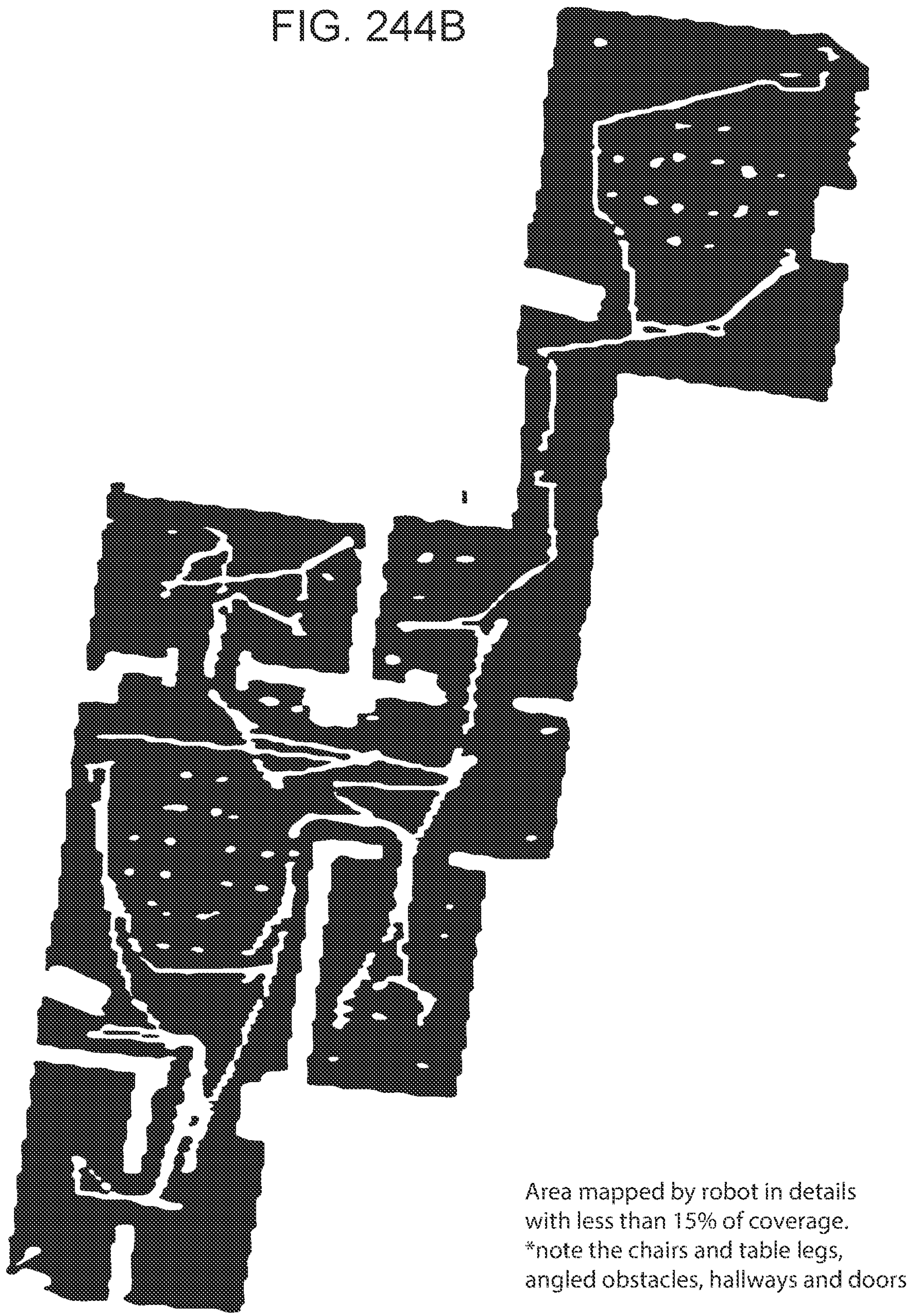

FIG. 244B illustrates a map of the environment created with less than 15% coverage of the environment.

Figure 245A:
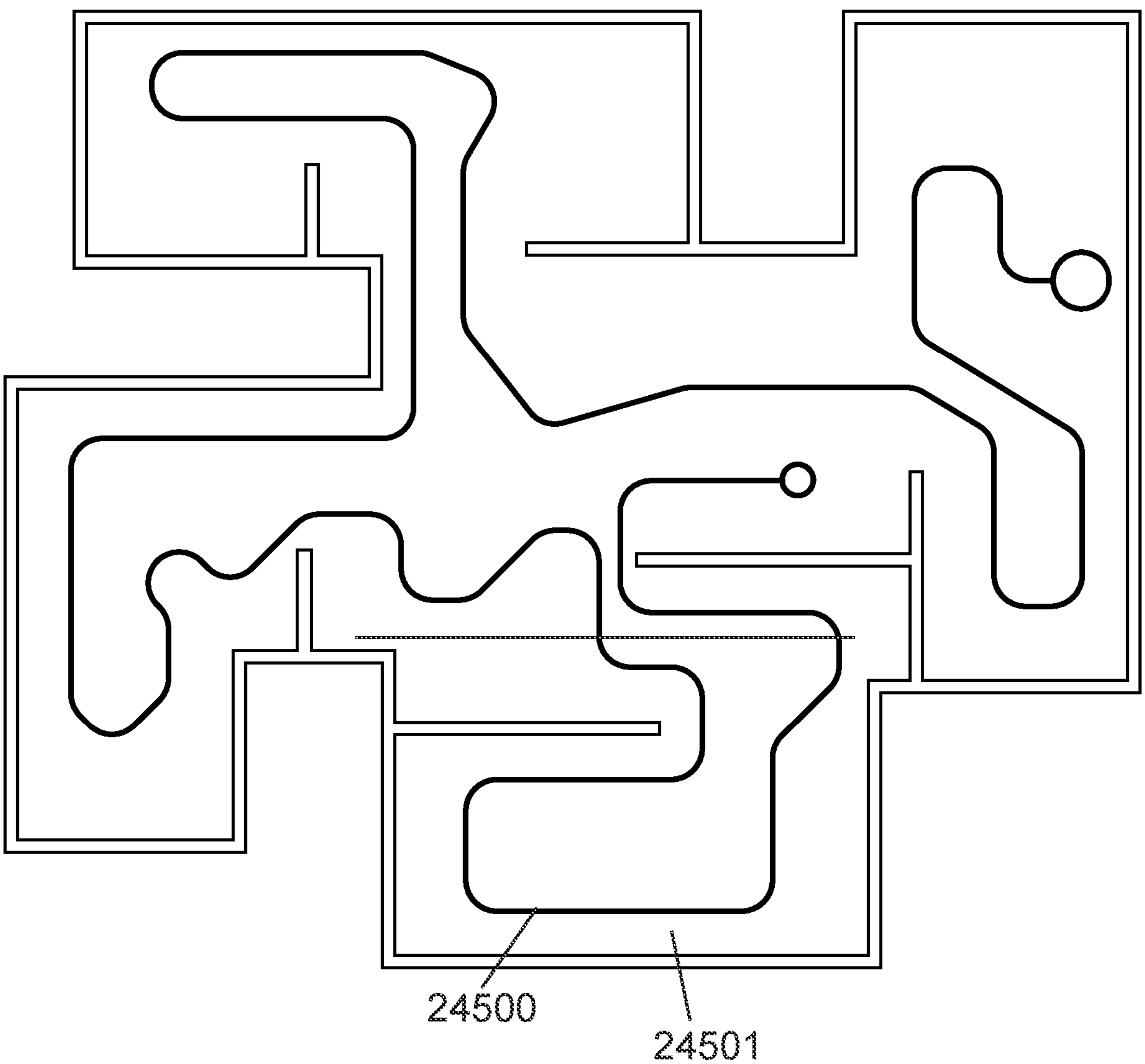

FIG. 245A illustrates an example of a path of a robot using traditional methods to create a spatial representation of the environment.

Figure 245B:
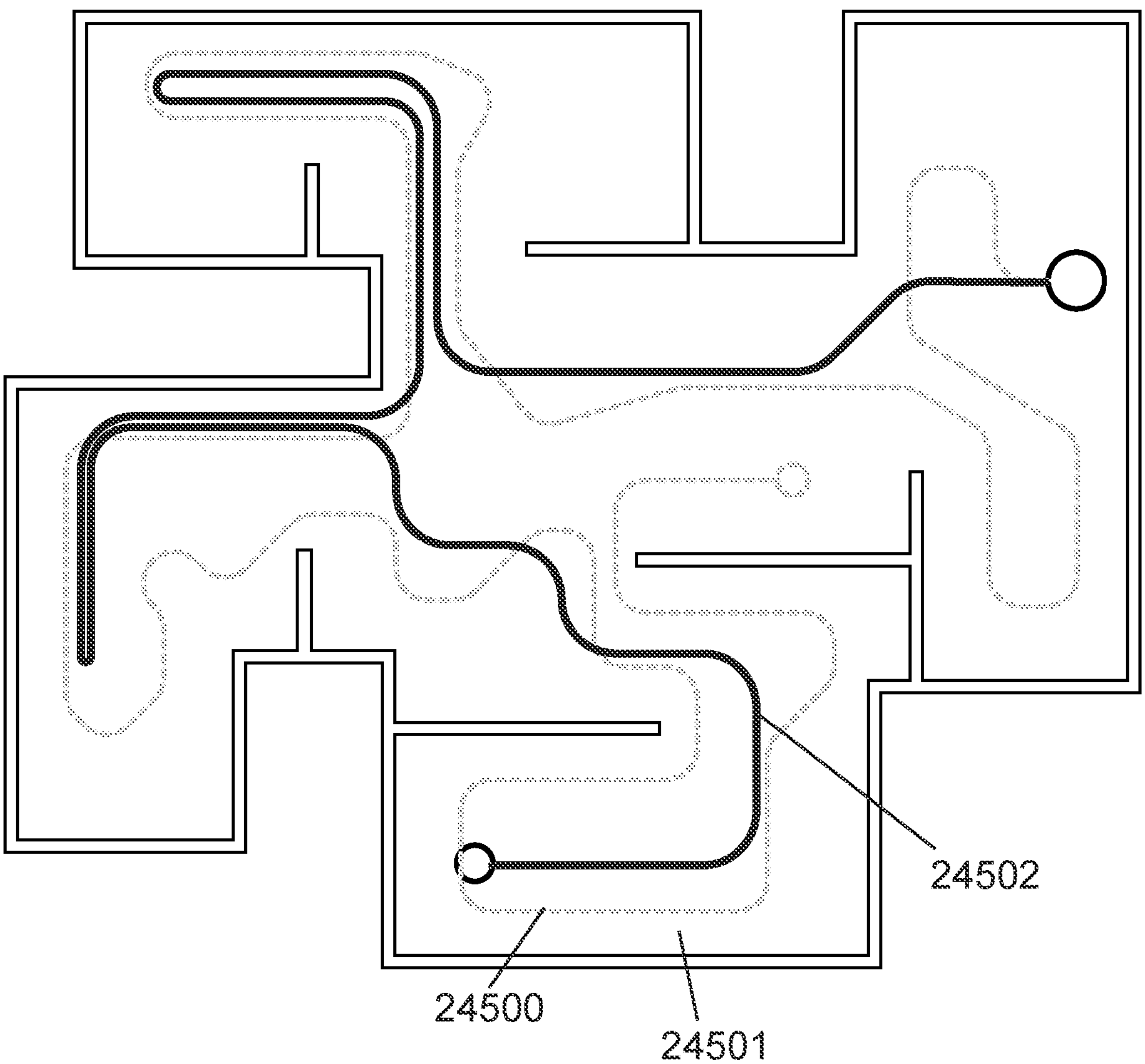

FIG. 245B illustrates an example of a path of the robot using a cost function to minimize the length of the path.

Figure 246A:
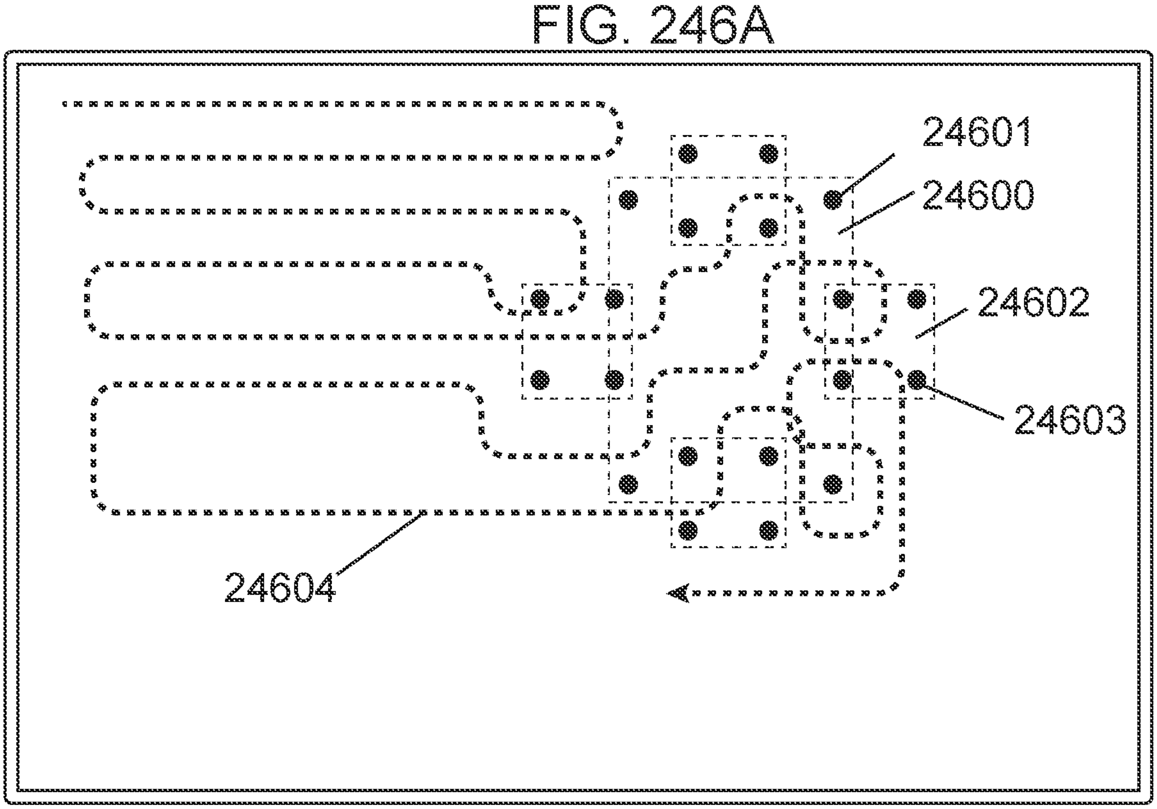

FIG. 246A illustrates an example of an environment including a table, four chairs and a path generated using traditional path planning methods.

Figure 246B:
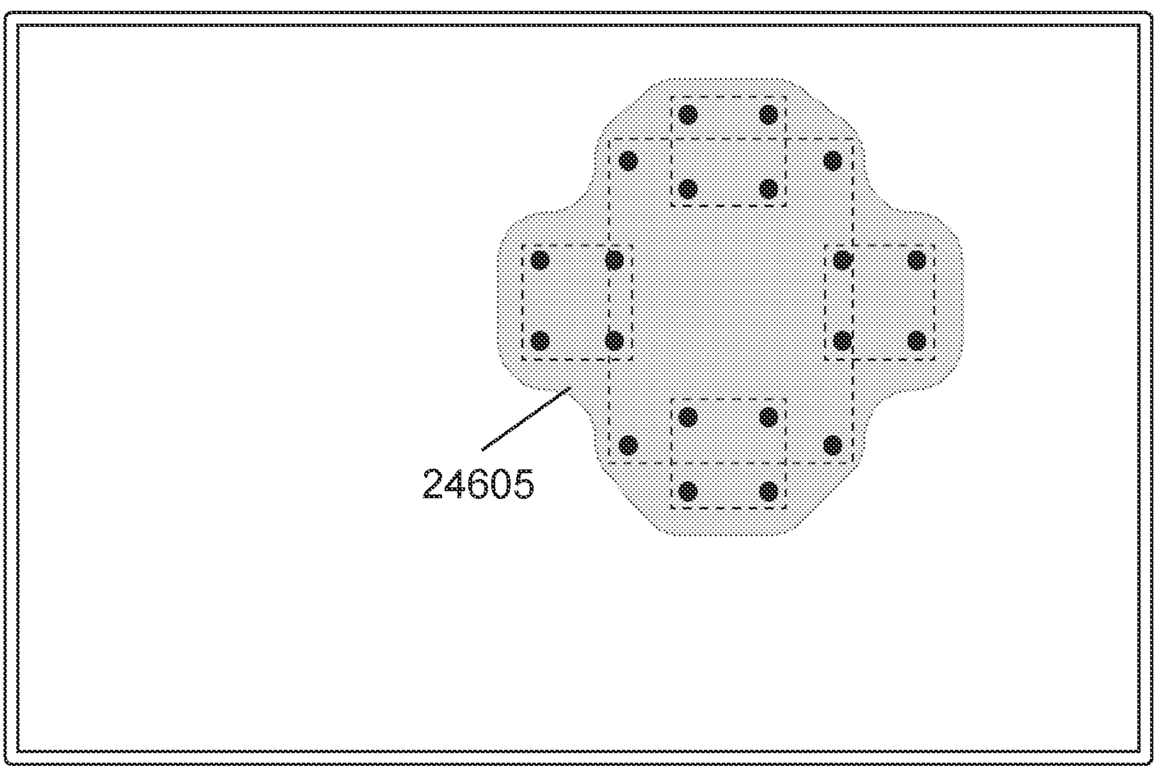

FIG. 246B illustrates an example of a high obstacle density area identified by the processor of the robot.

FIGS. 246C-246F illustrate examples of different paths planned based on open or low obstacle density areas and high obstacle density areas.

Figure 247A:
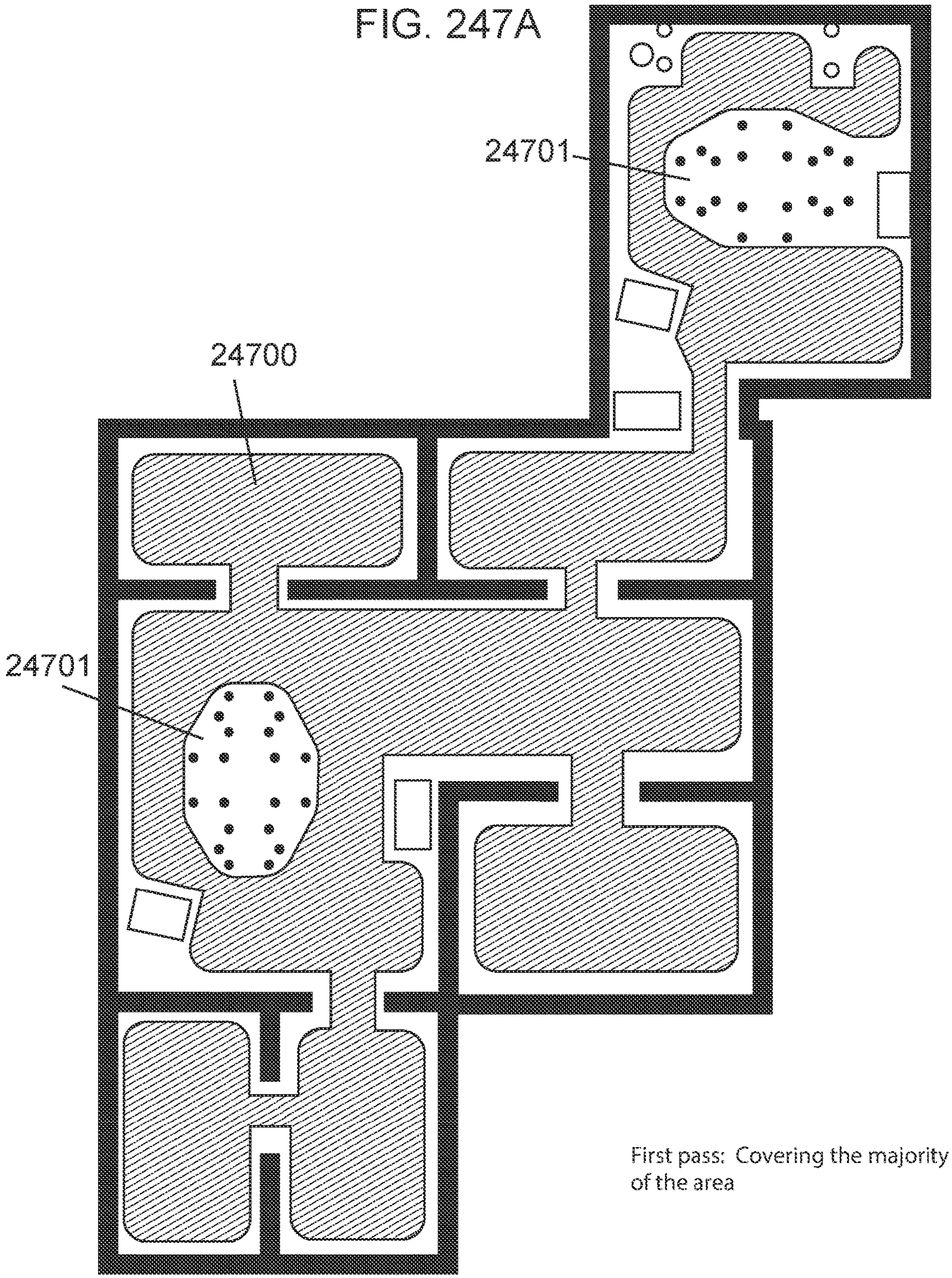
Figure 247B:
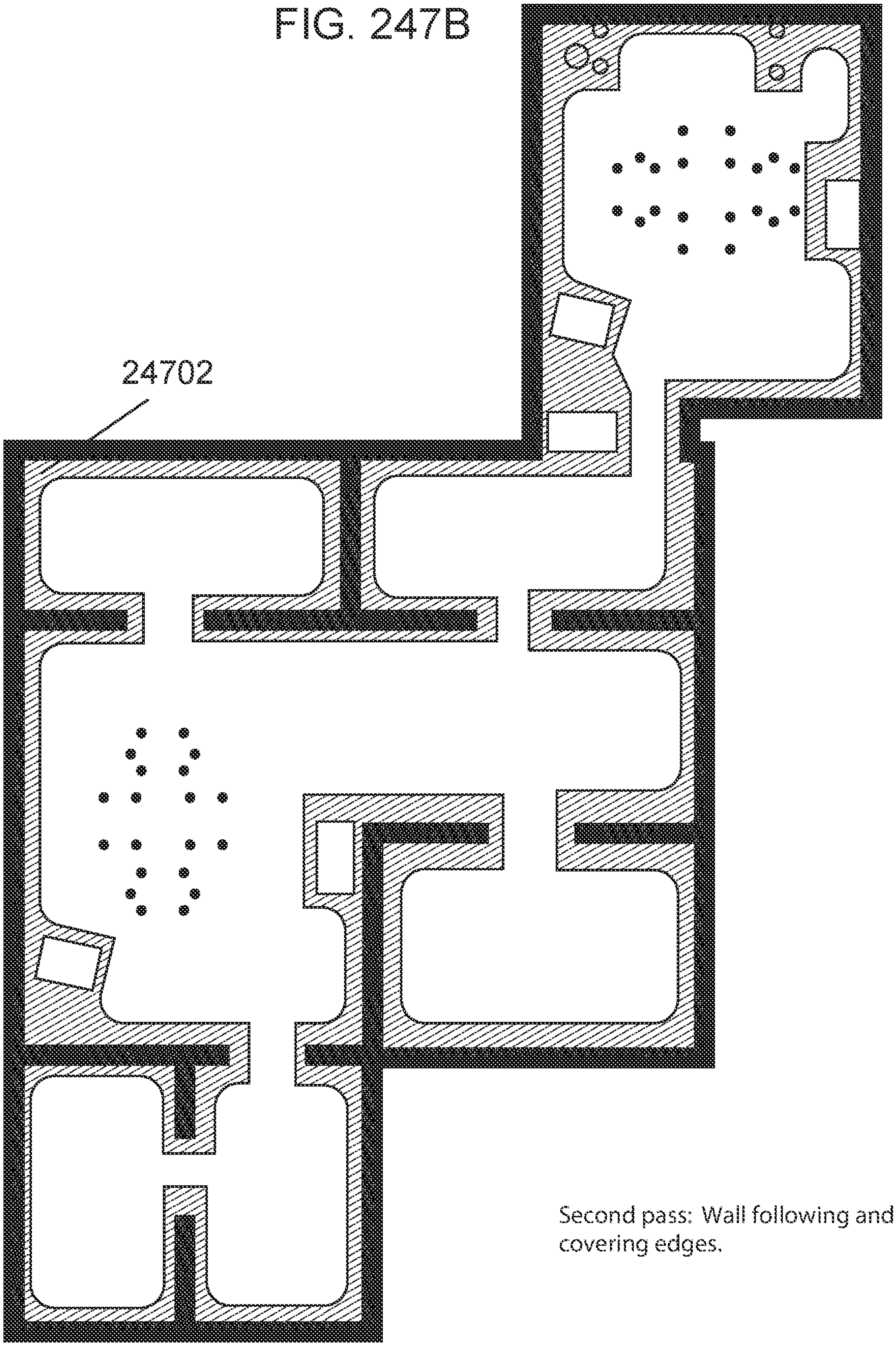
Figure 247C:
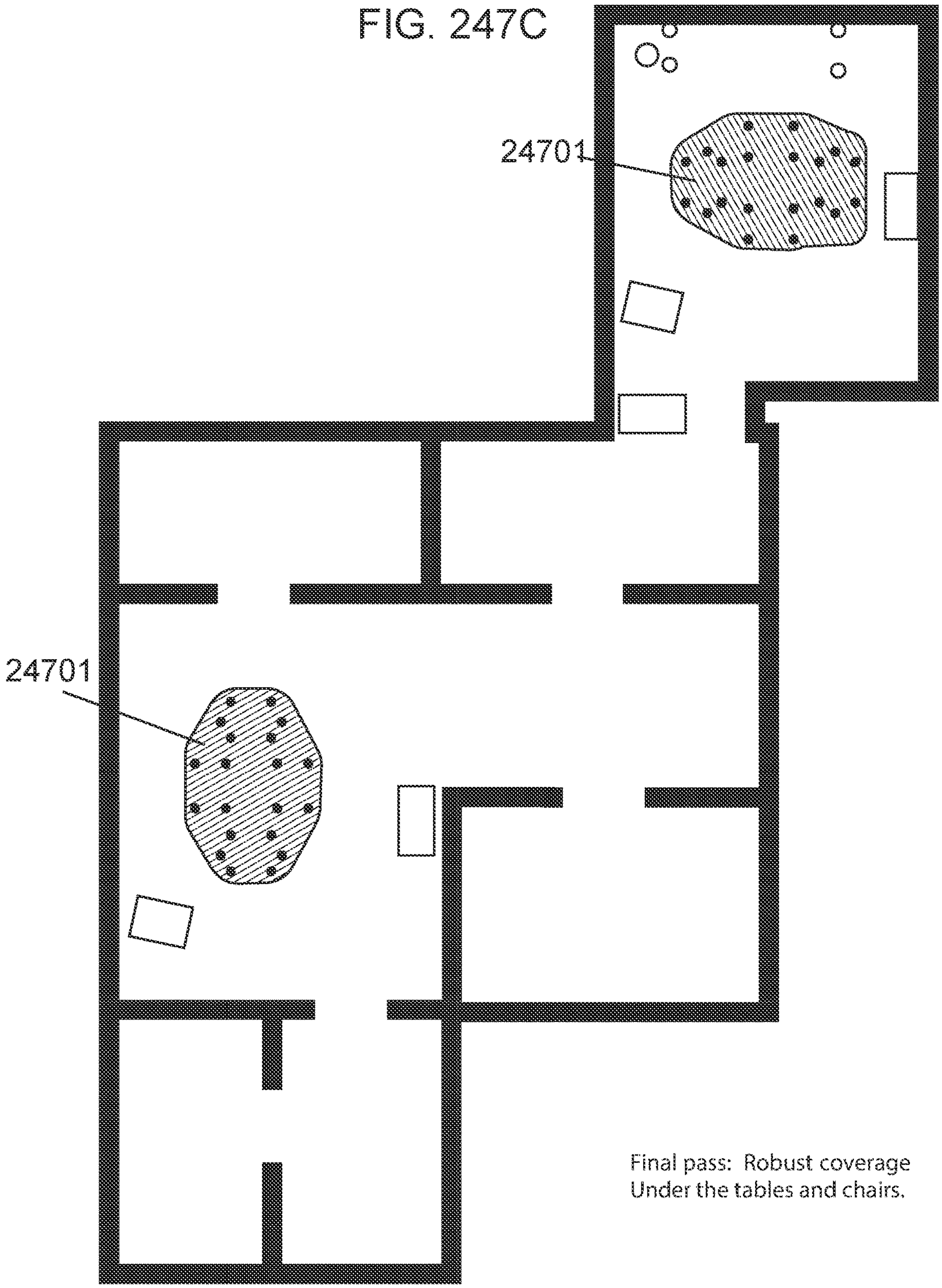

FIGS. 247A-247C illustrate an example of different coverage passes based on low and high obstacle density areas.

Figure 247D:
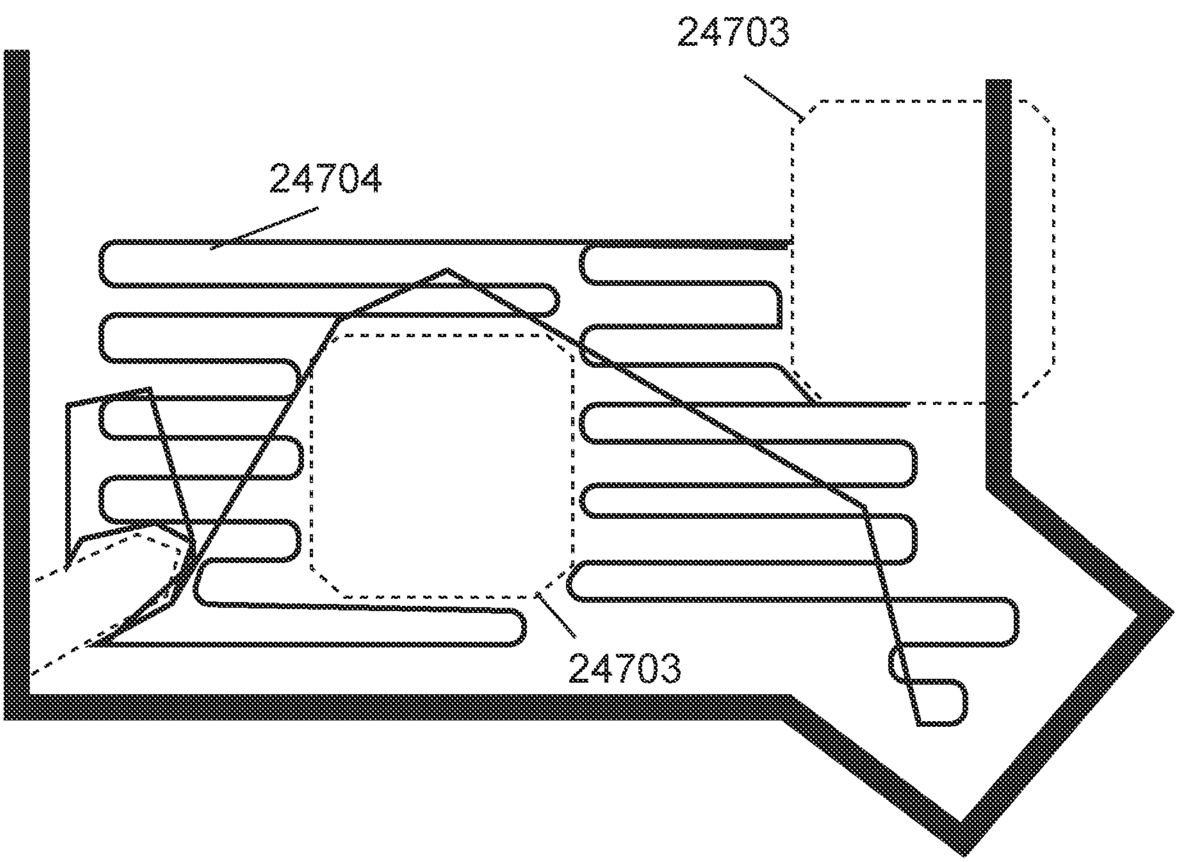

FIG. 247D illustrates an example of a map including map fences and a path of the robot that avoids entering map fences.

FIGS. 248A-248E illustrate and explains comparisons between traditional SLAM and QSLAM methods.

Figure 249:
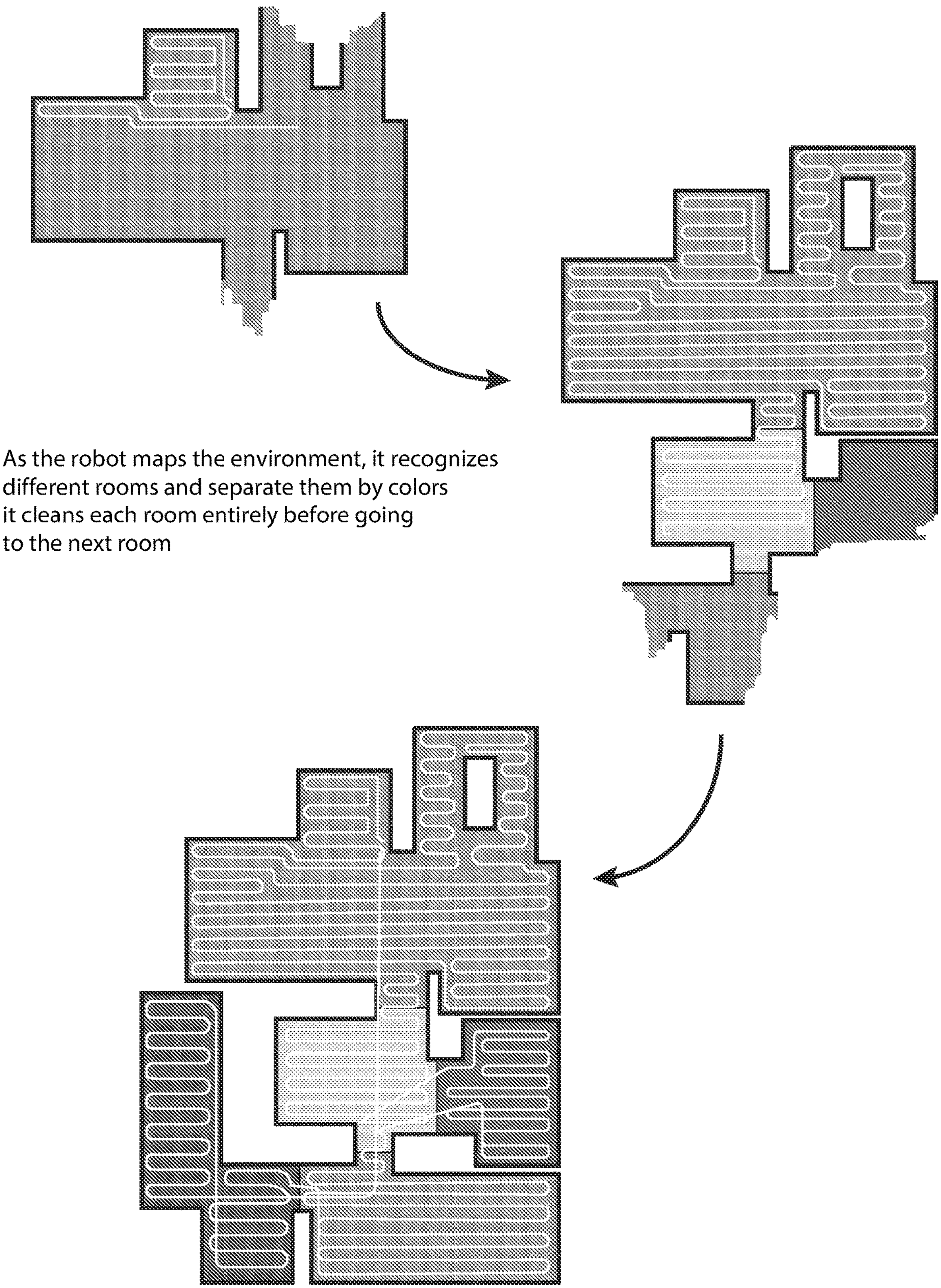

FIG. 249 illustrates an example of real time room identification and separation.

Figure 250A:
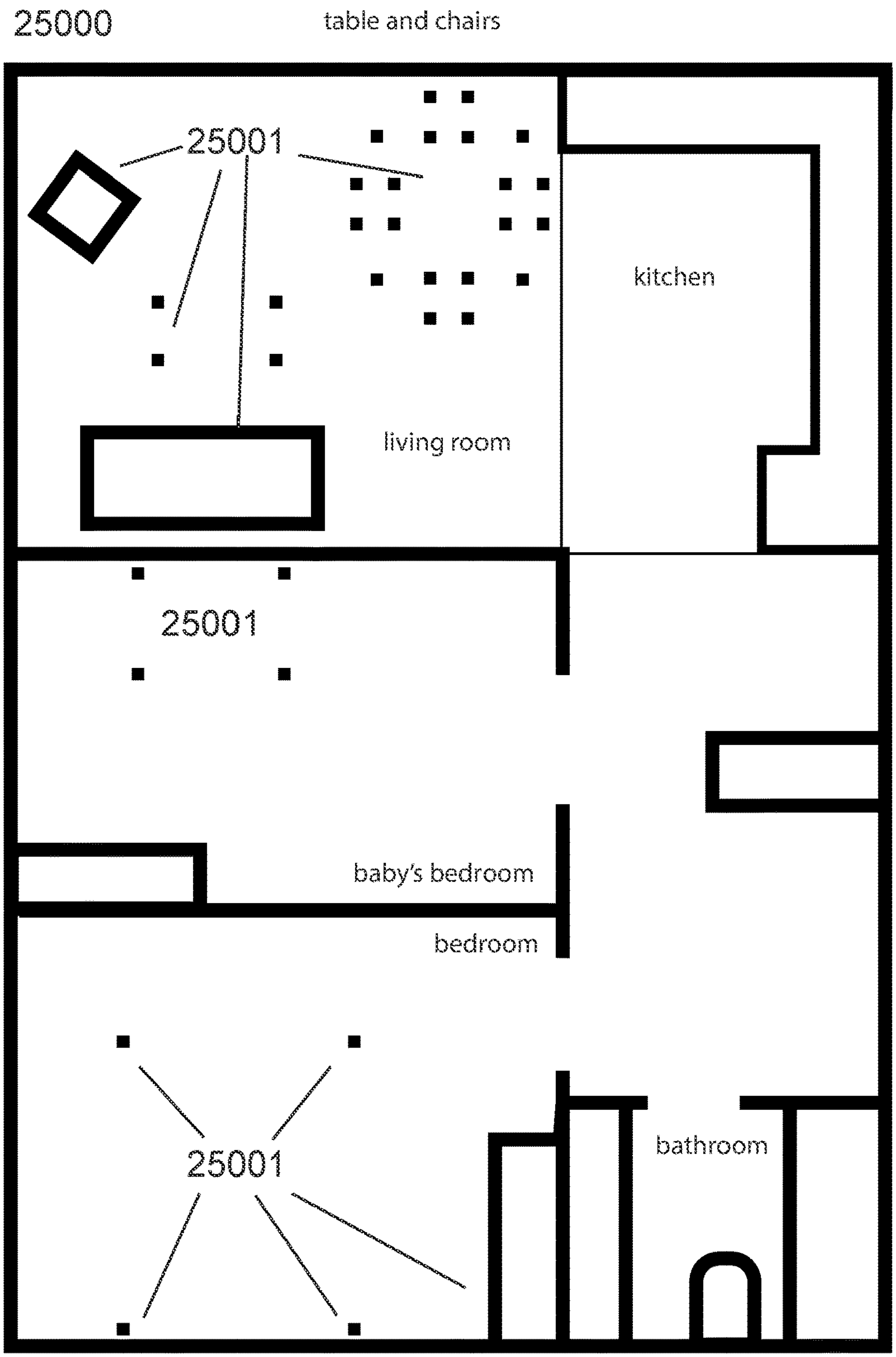
Figure 250B:
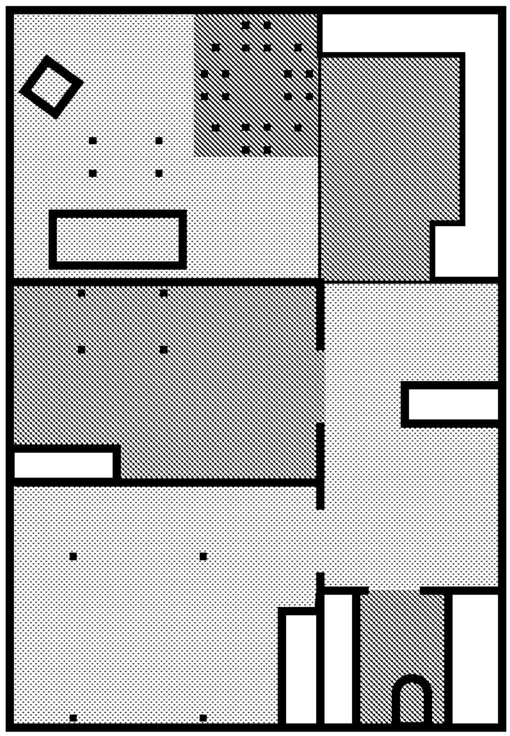

FIGS. 250A-250B illustrate the robot may use different cleaning strategies depending on the room/zone or floor type.

Figure 251A:
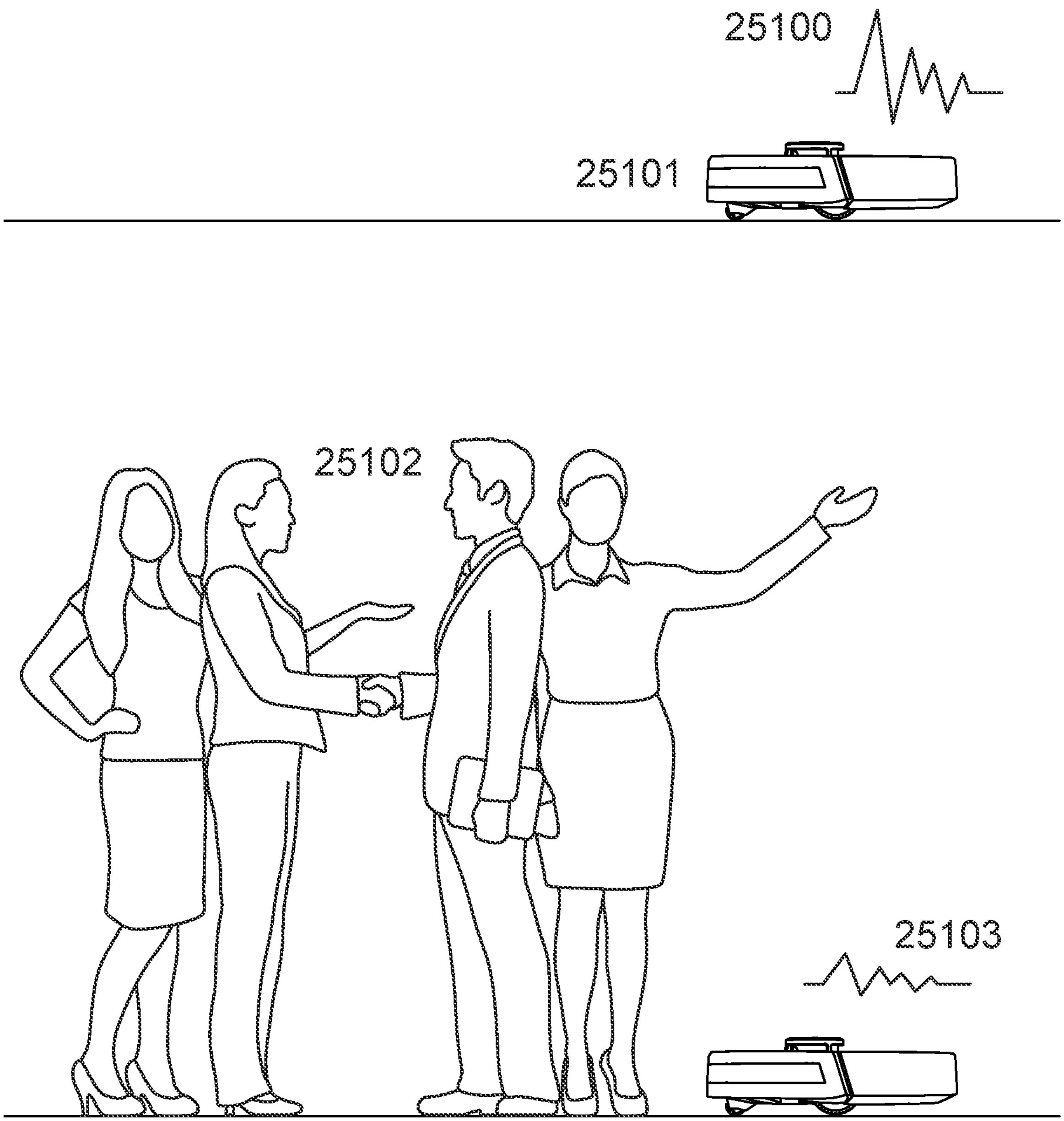

FIG. 251A illustrates the robot may reduce its noise level around observed people.

Figure 251B:
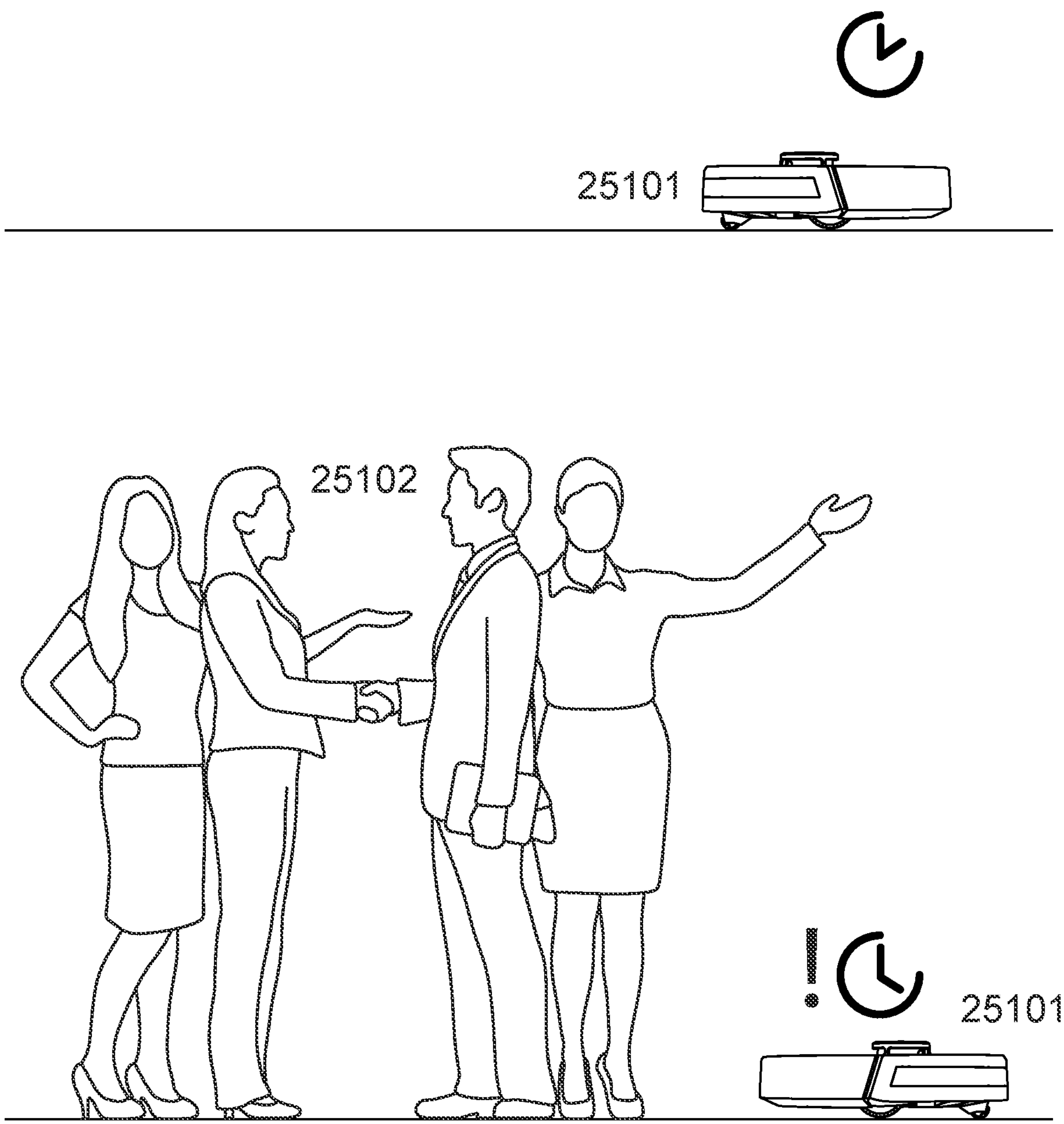

FIG. 251B illustrates the robot may reschedule its run time when it observes a crowd of people FIGS. 252A-252H illustrate the process of coverage and map building of the robot while it's mapping sensor is temporary not available.

Figure 253:
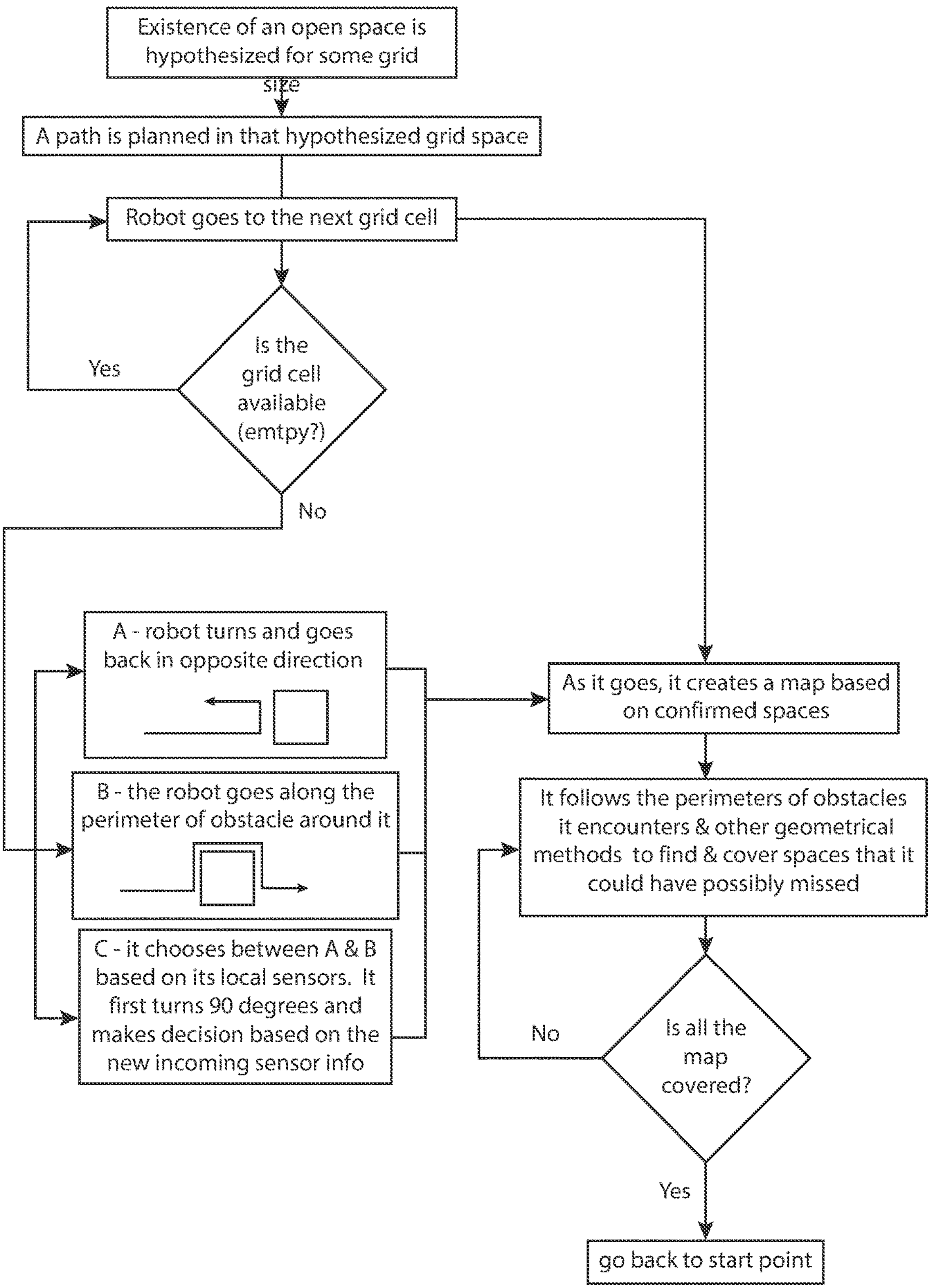

FIG. 253 illustrates the process of coverage and map building of the robot while it's mapping sensor is temporary not available in a flowchart.

FIGS. 254A-254B illustrate sliders that may be displayed by the application to adjust coverage and run time before emptying the bin.

FIGS. 255A-255C illustrate path alteration robot may take to clean a spot or area.

FIG. 256 illustrates an example of a map including open area and high object density area.

FIGS. 257A-257E illustrate a robot's position within an environment form top view, obstacles and areas discovered by the robot and blind spots.

Figure 258:
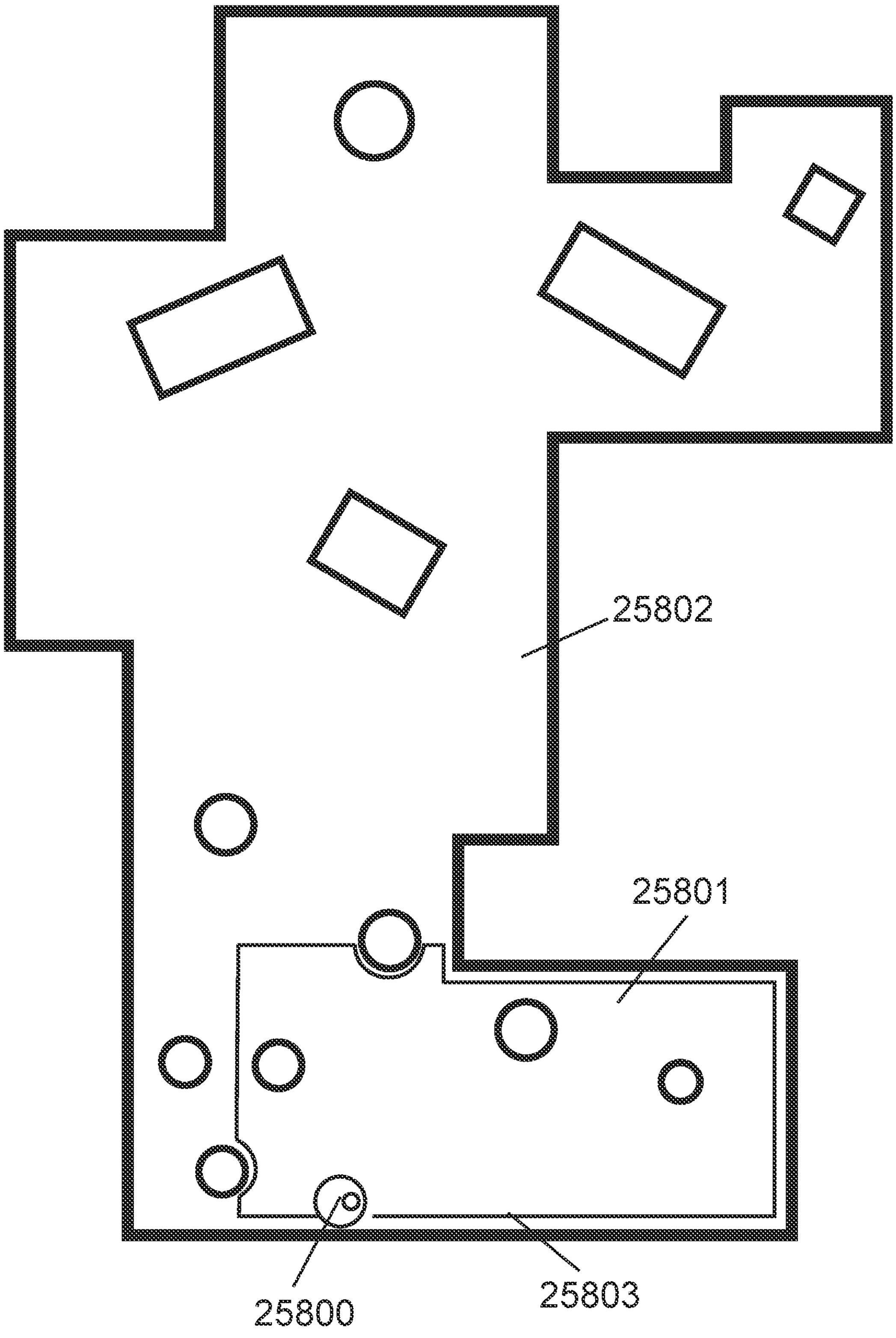

FIG. 258 illustrates an example of traditional method of mapping and coverage.

Figure 259A:
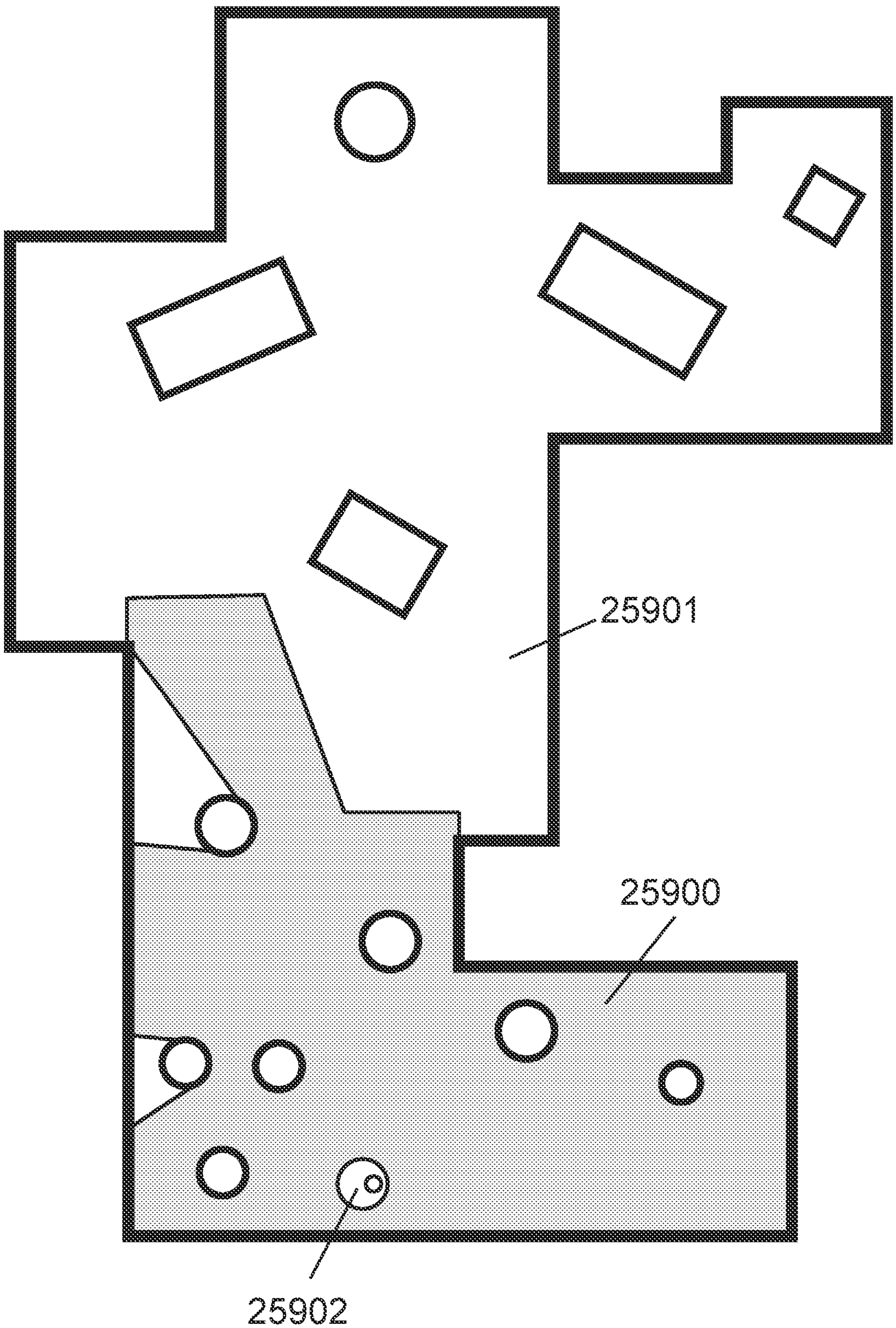

FIG. 259A illustrates an example of an area within an environment discovered by the robot before beginning any work in a first work session.

Figure 259B:
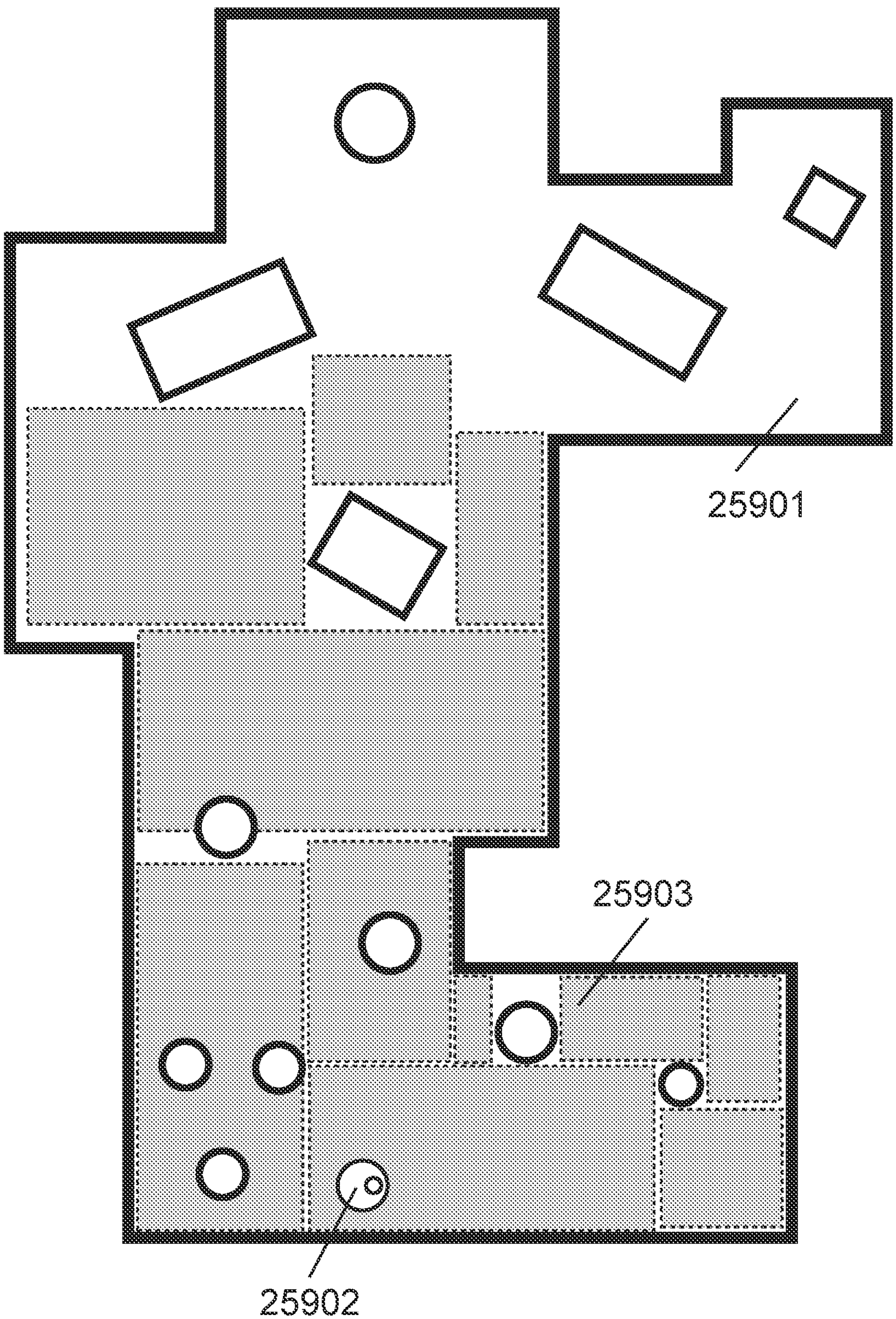

FIG. 259B illustrates areas discovered by the processor using sensor data during the first work session.

Figure 259C:
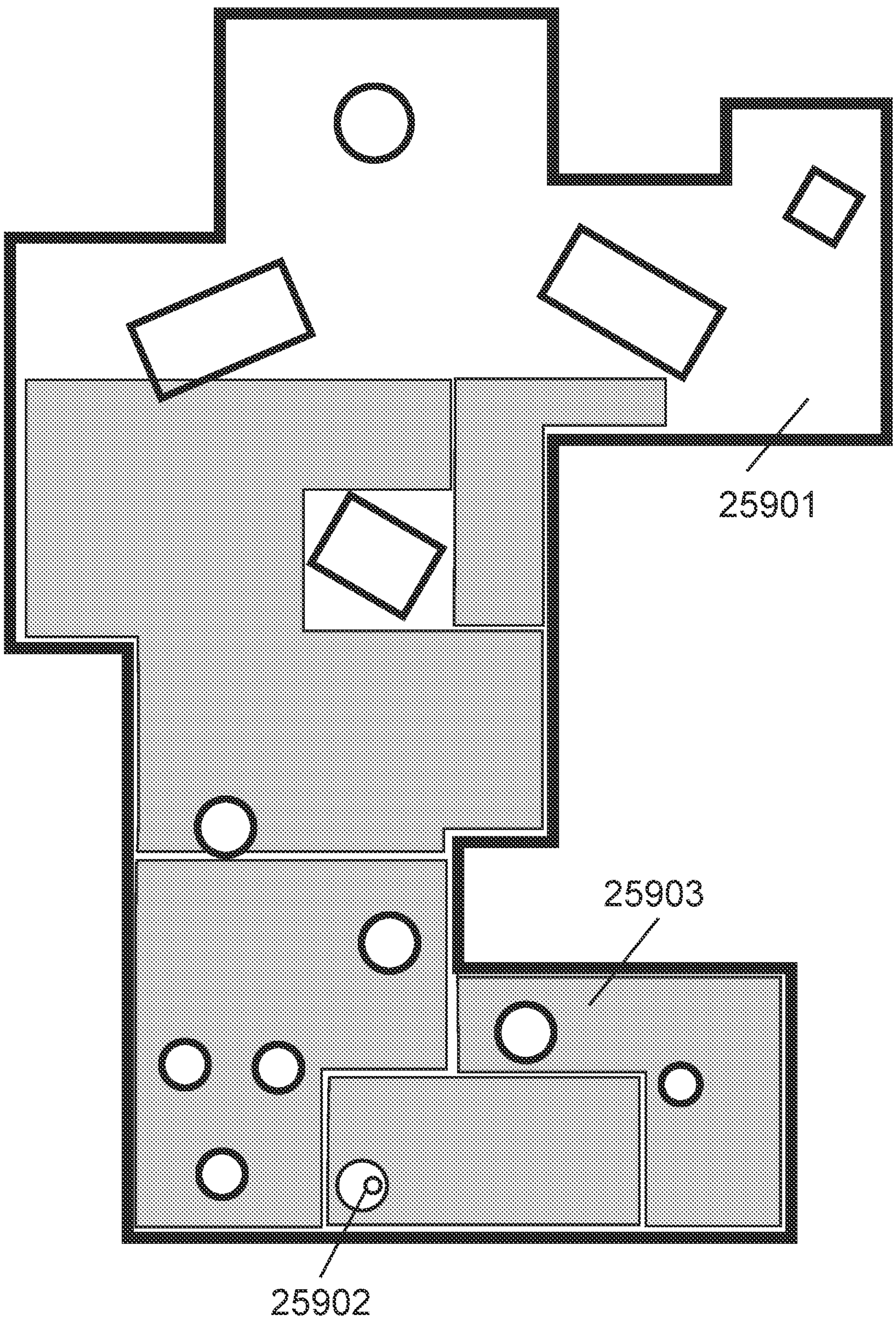

FIG. 259C illustrates the enhanced map and coverage plan after the first session.

Figure 260:
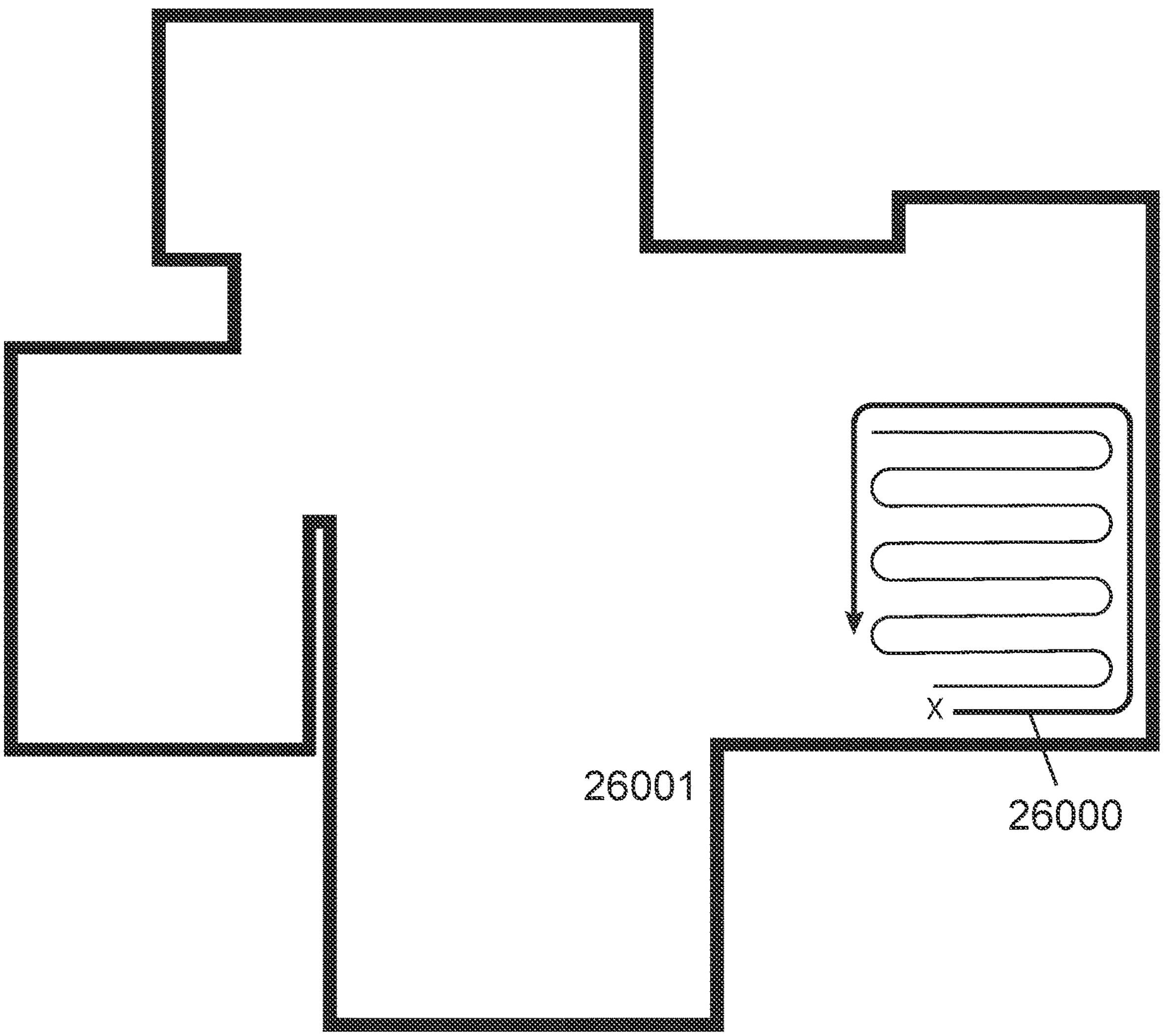

FIG. 260 illustrates an example of prior art, wherein a robot begins by executing a wall follow path prior to beginning any work in environment.

Figure 261A:
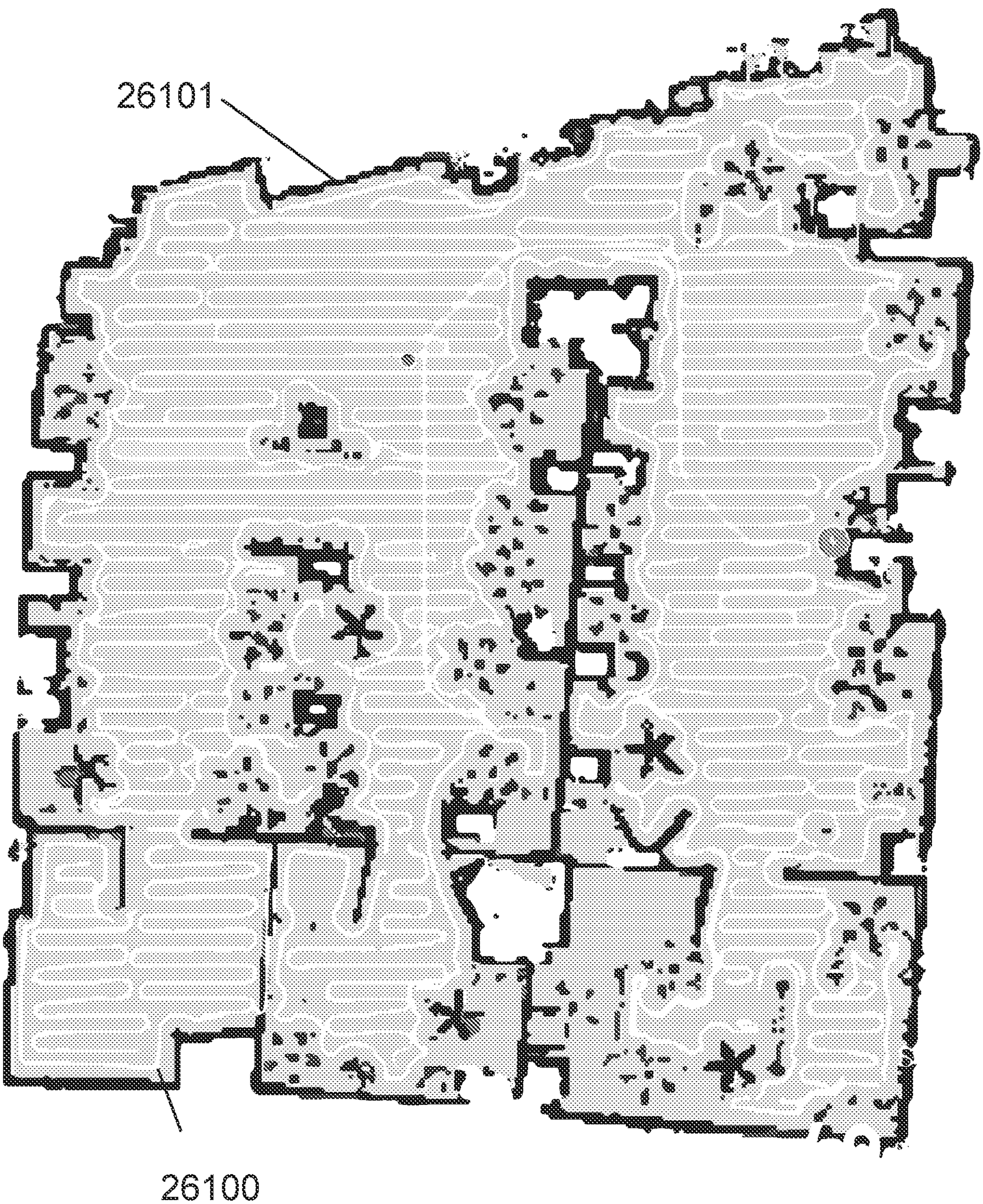

FIG. 261A illustrates coverage map of an environment during the first session.

Figure 261B:
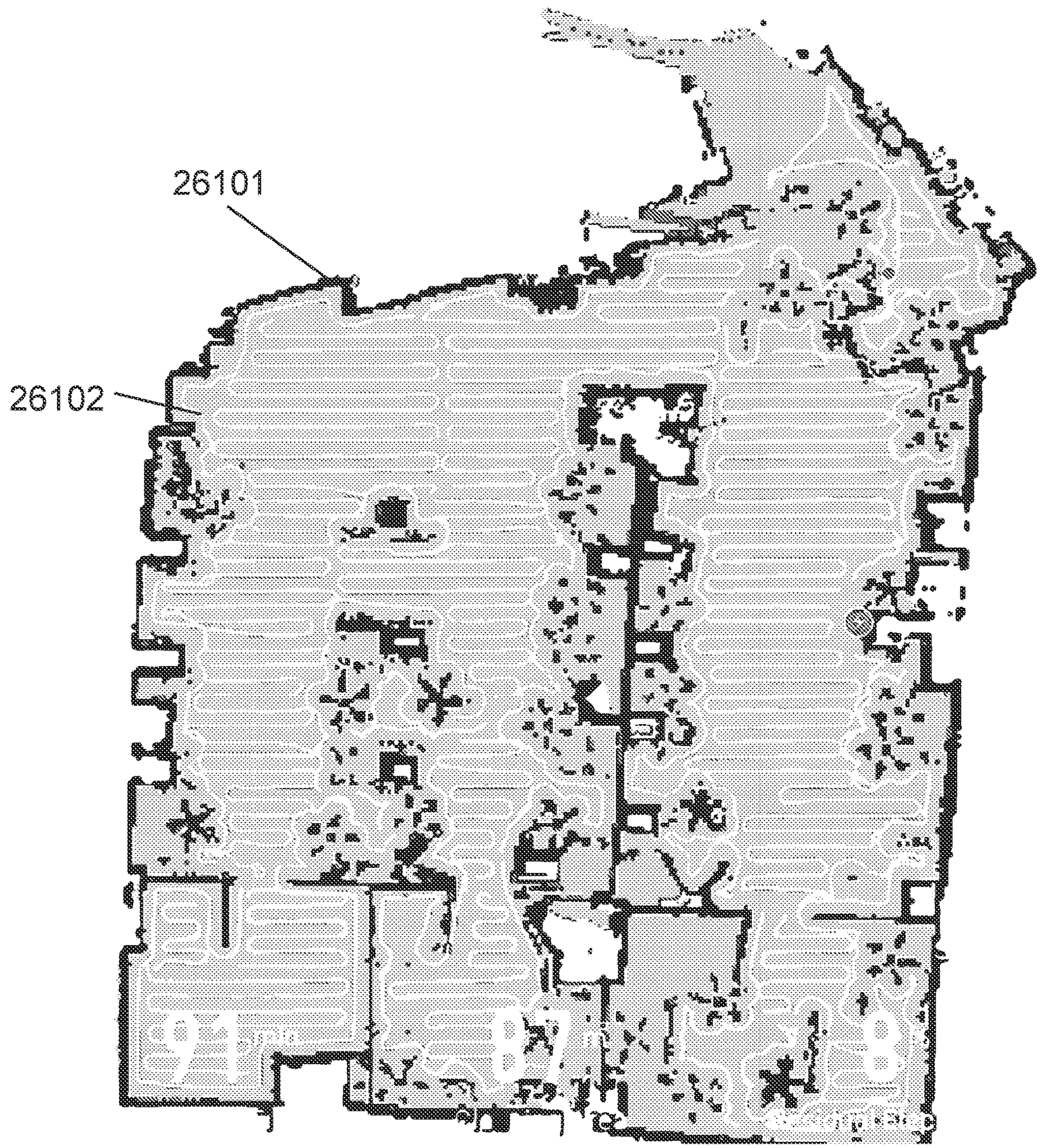

FIG. 261B illustrates an improved coverage map of an environment during the second session.

Figure 261C:
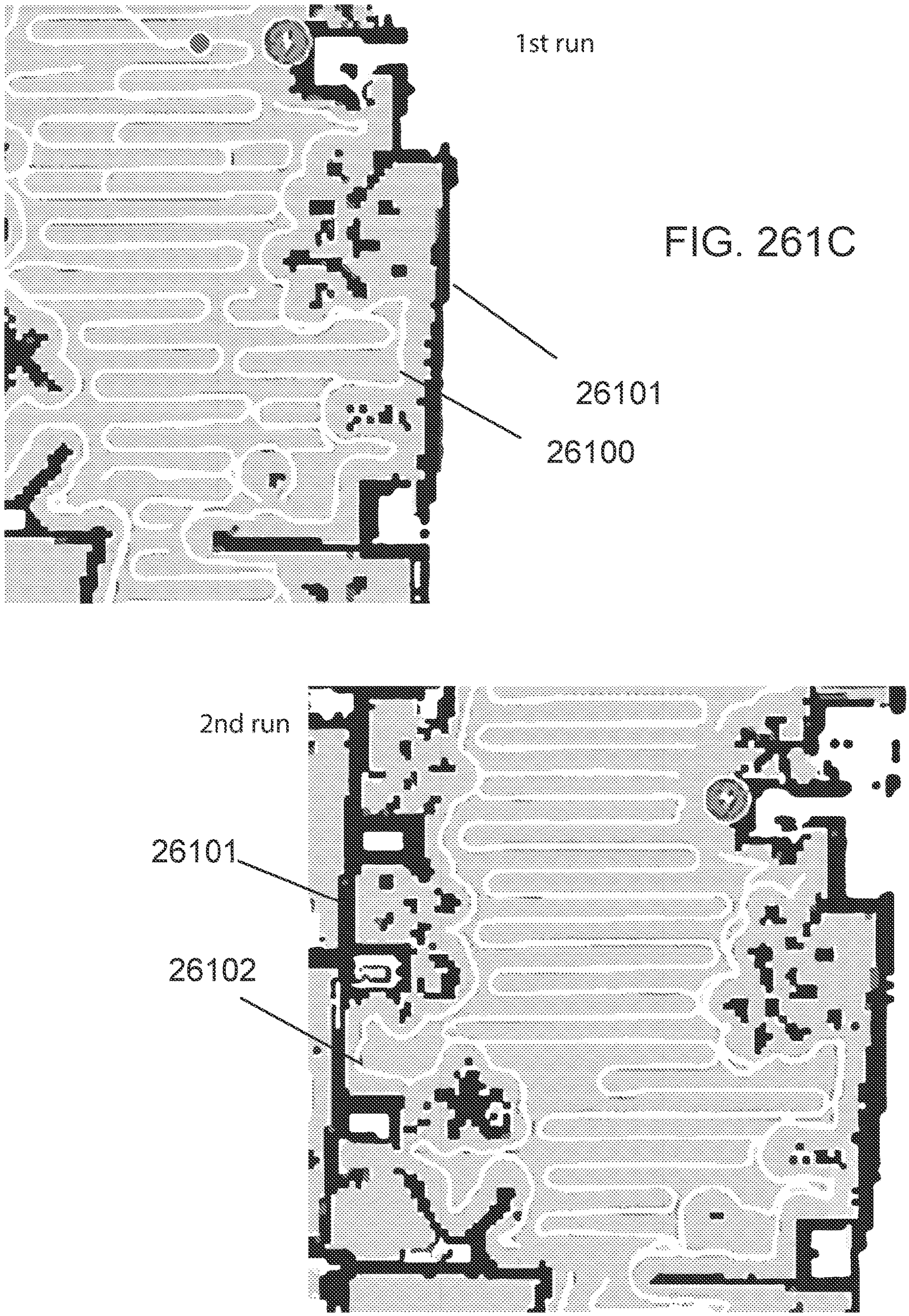

FIG. 261C compares first and second coverage maps in close up.

Figure 262A:
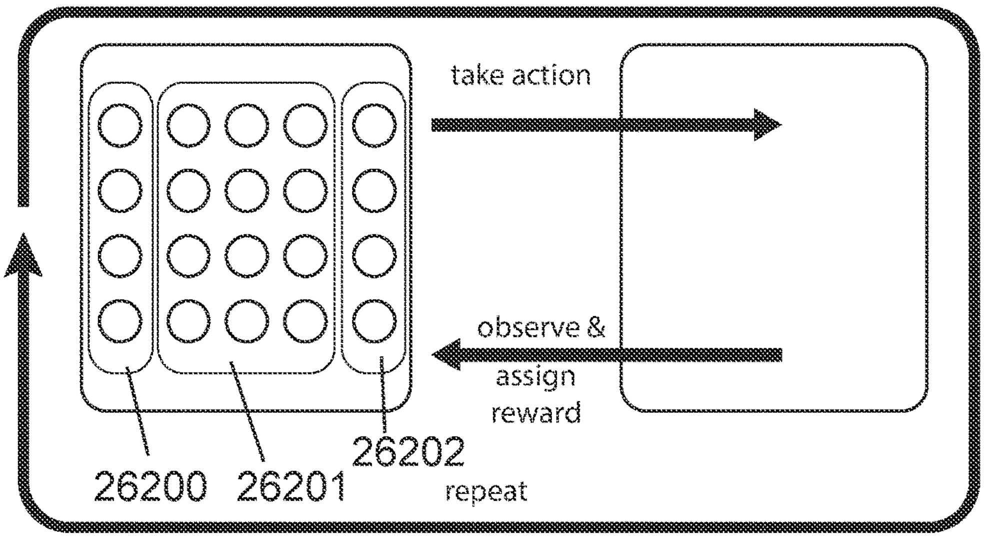

FIG. 262A illustrates a visualization of reinforcement learning.

Figure 262B:
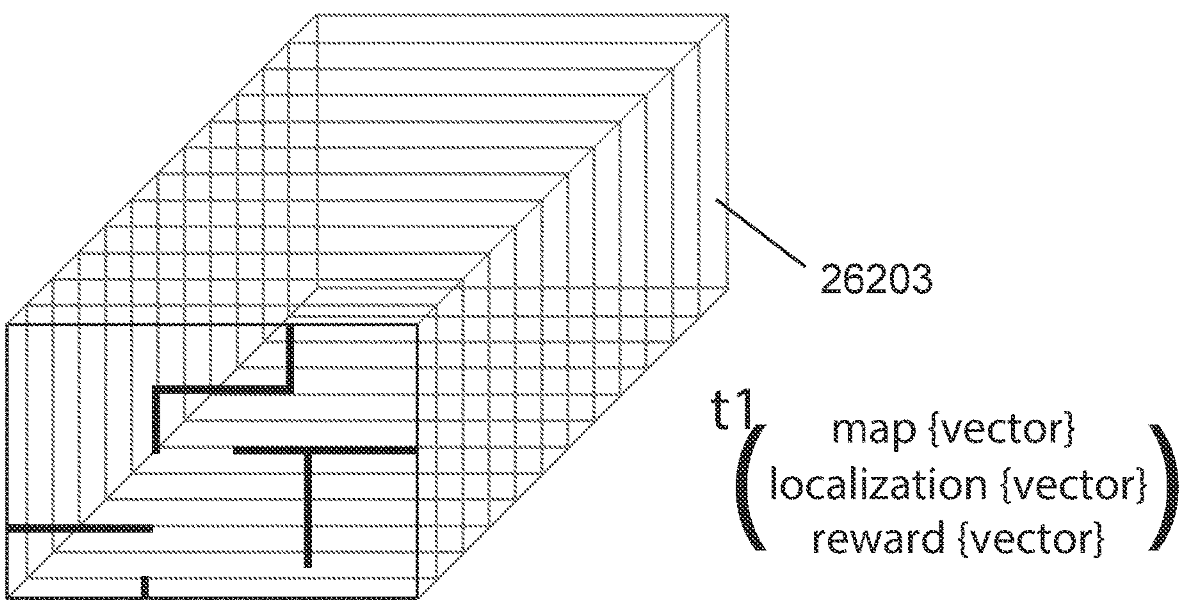

FIG. 262B illustrates a three-dimensional matrix structure.

Figure 263A:
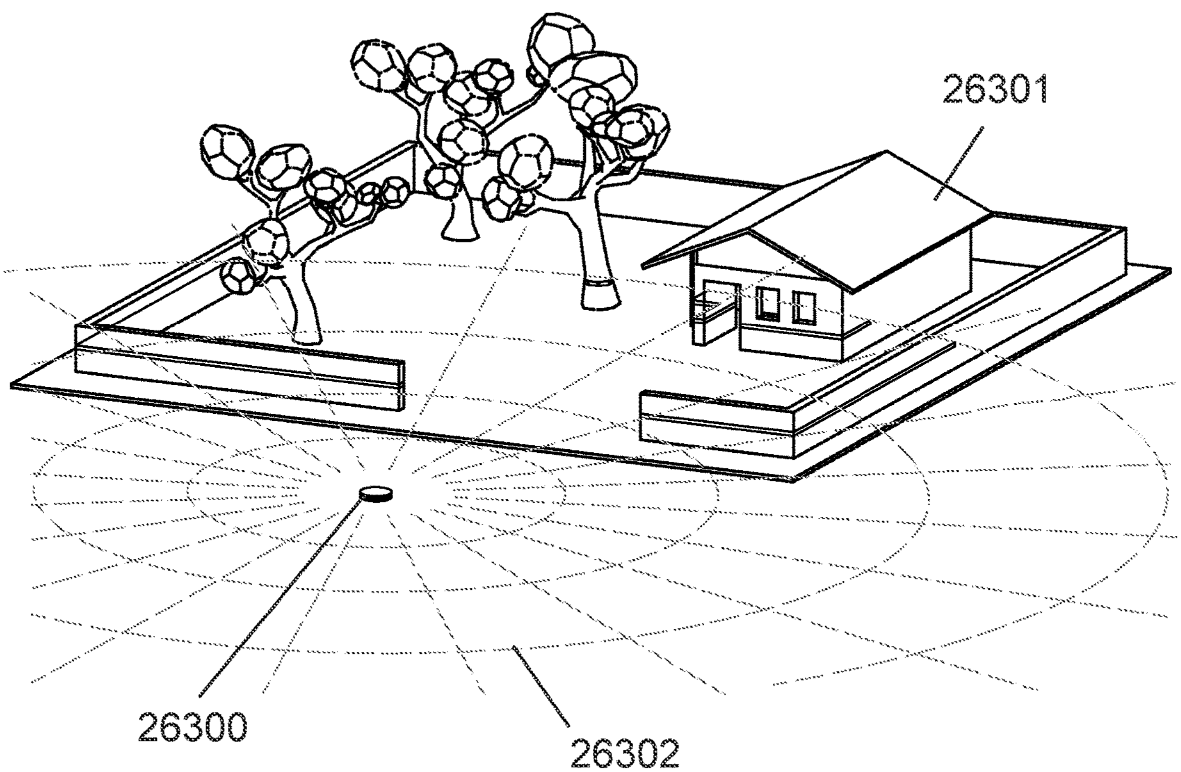
Figure 263B:
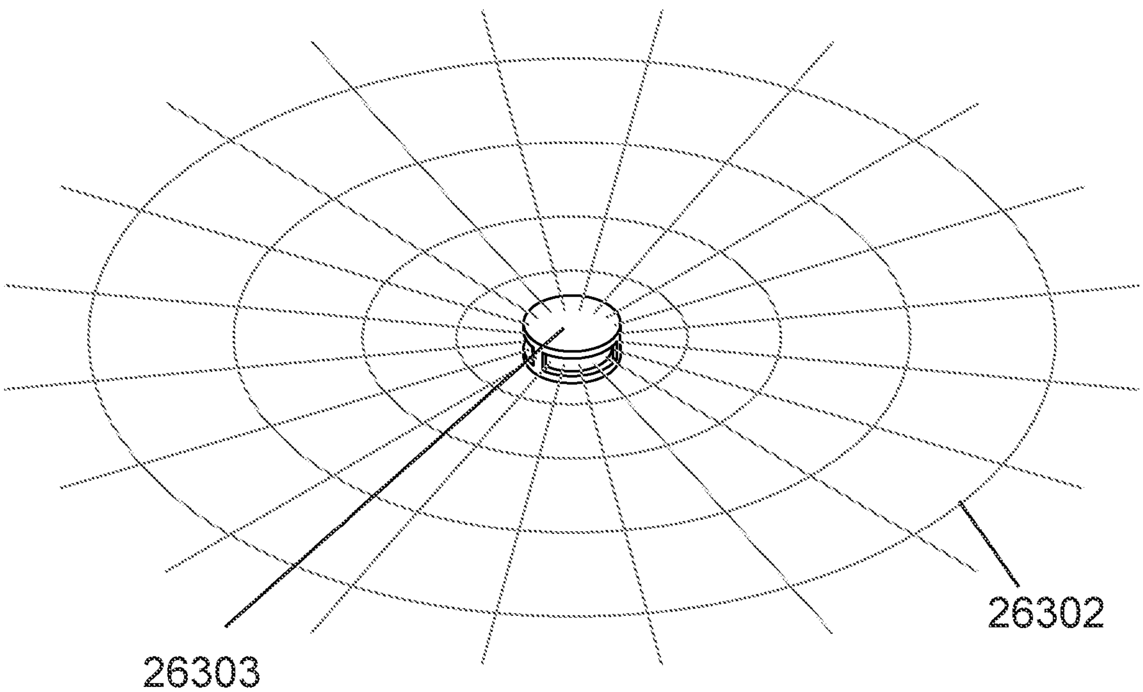

FIG. 263A illustrates a robot using a LIDAR to measure distances to objects within environment FIG. 263B illustrates the LIDAR and the 360 degrees plane.

Figure 263C:
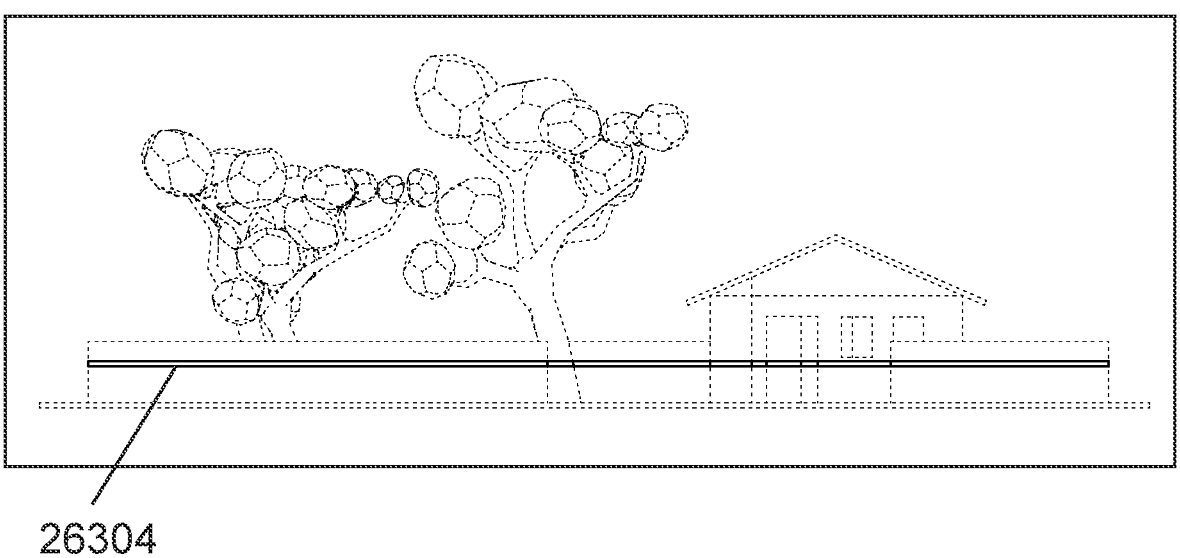

FIG. 263C illustrates the robot's viewport when measuring distances to objects in FIG. 263A.

Figure 264A:
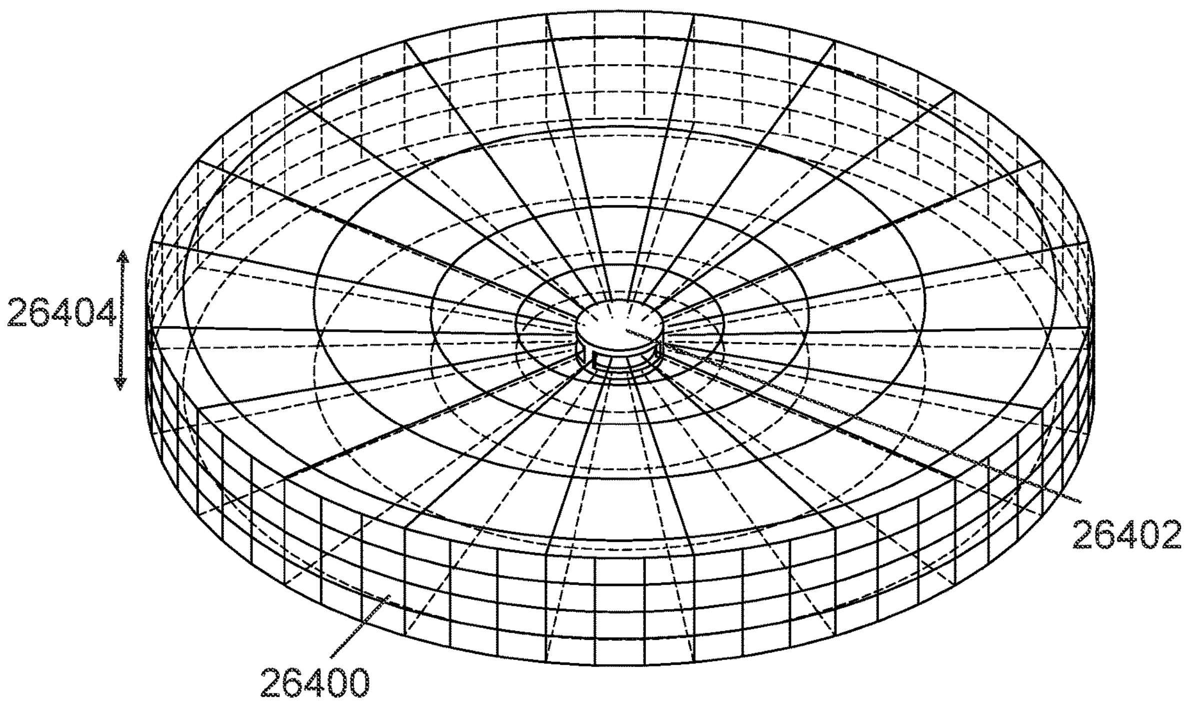
Figure 264B:
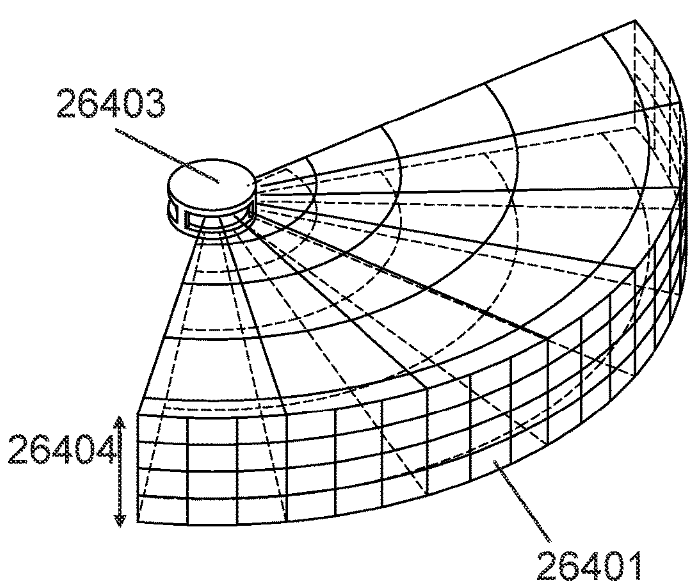

FIGS. 264A-264B illustrate examples of the field of views of two-and-a-half dimensional LIDARS.

Figure 265A:
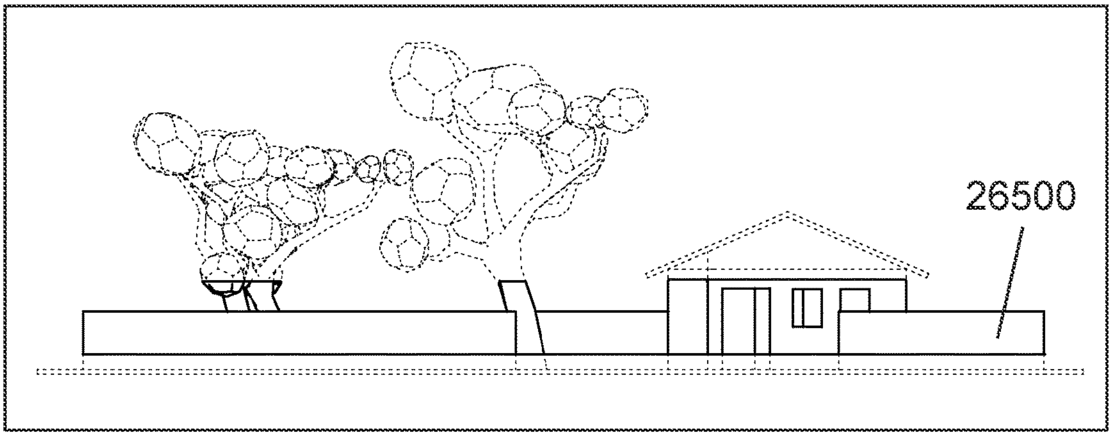

FIG. 265A illustrates a front view of a robot while measuring distances using a LIDAR.

Figure 265B:
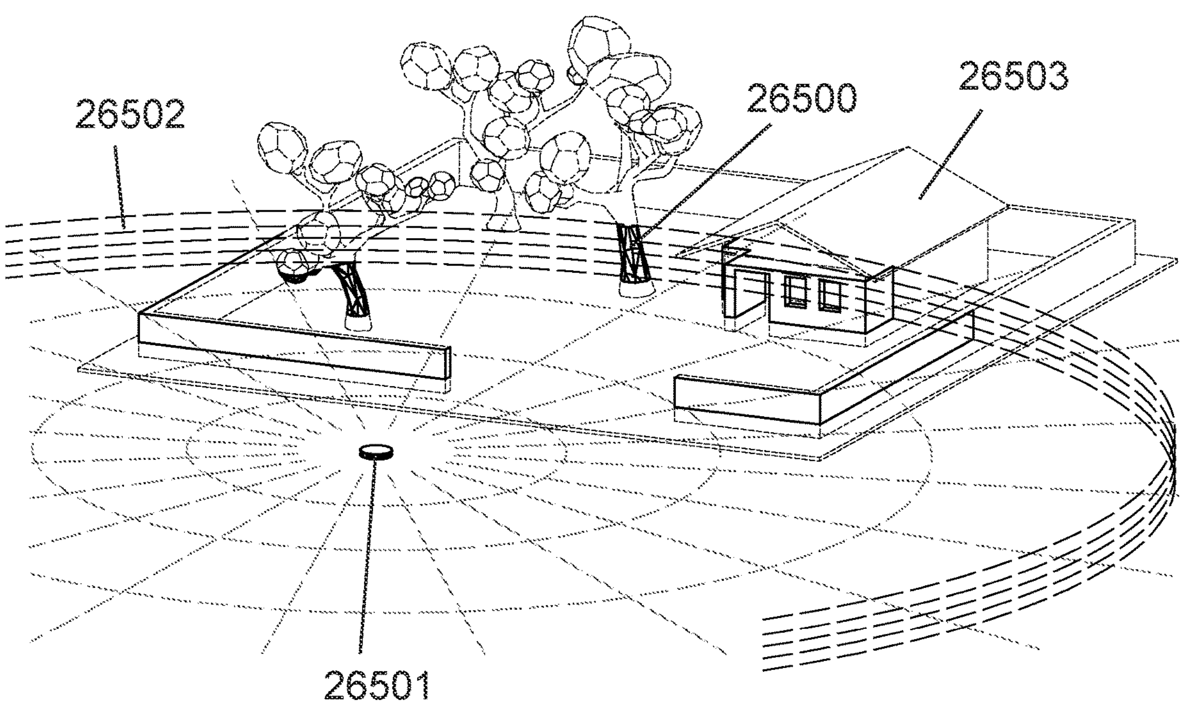

FIG. 265B illustrates the robot 26501 measuring distances to objects within the environment using a two-and-a-half dimensional LIDAR.

Figure 266A:
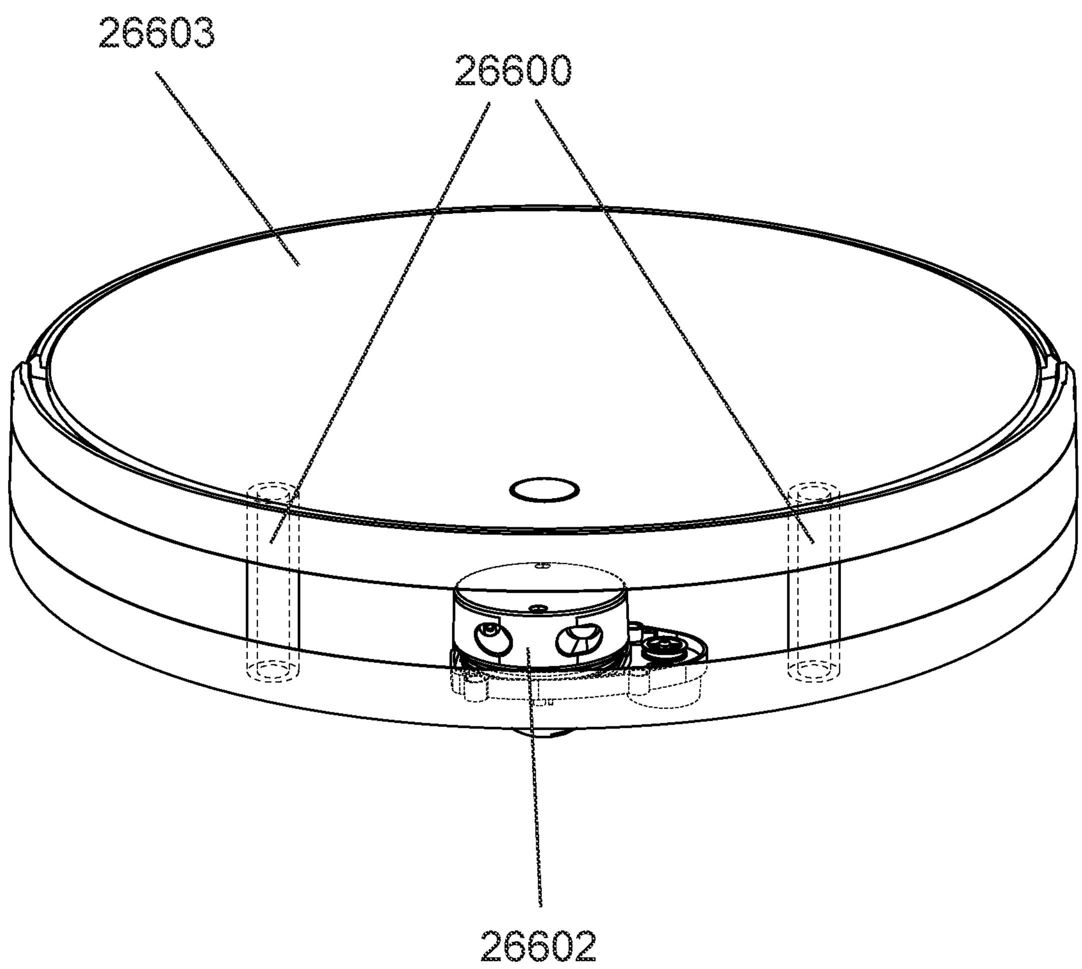
Figure 266B:
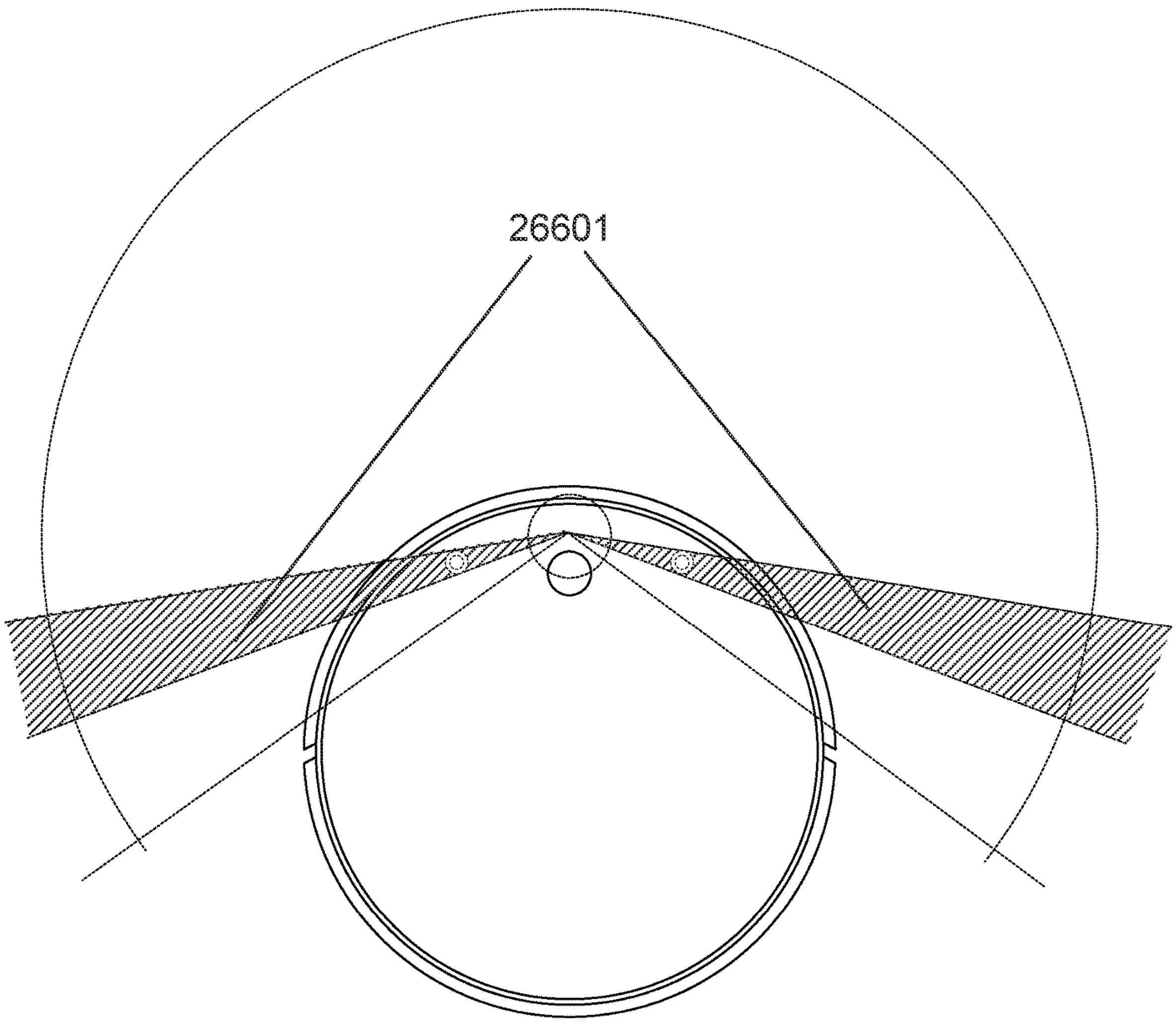
Figure 267A:
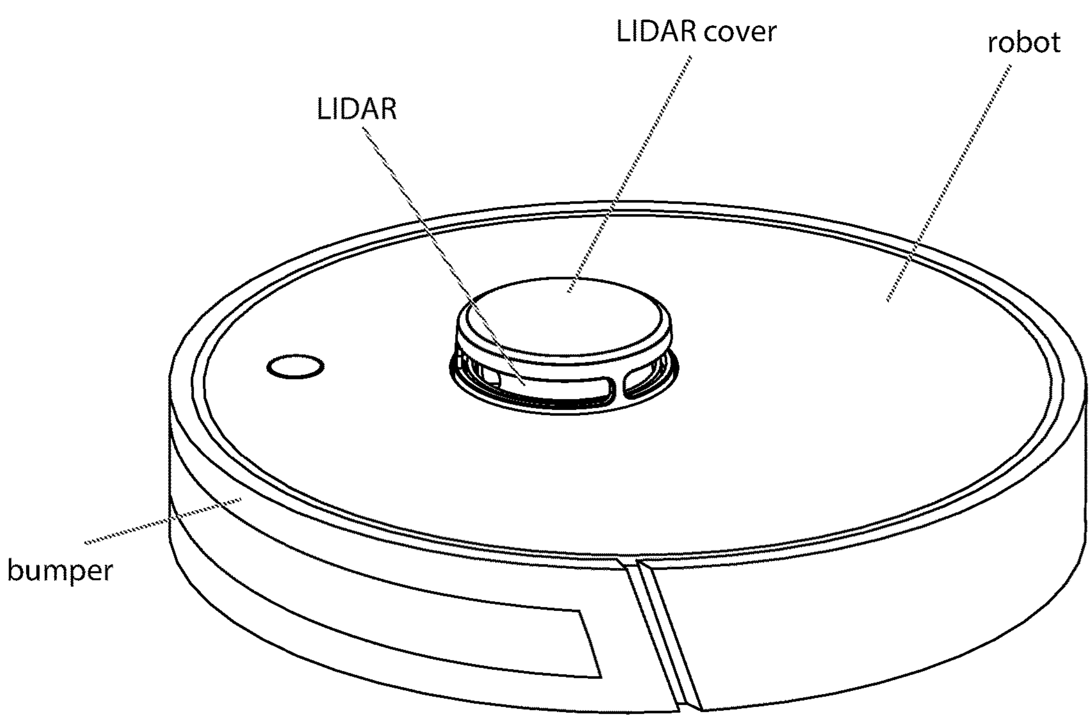
Figure 267B:
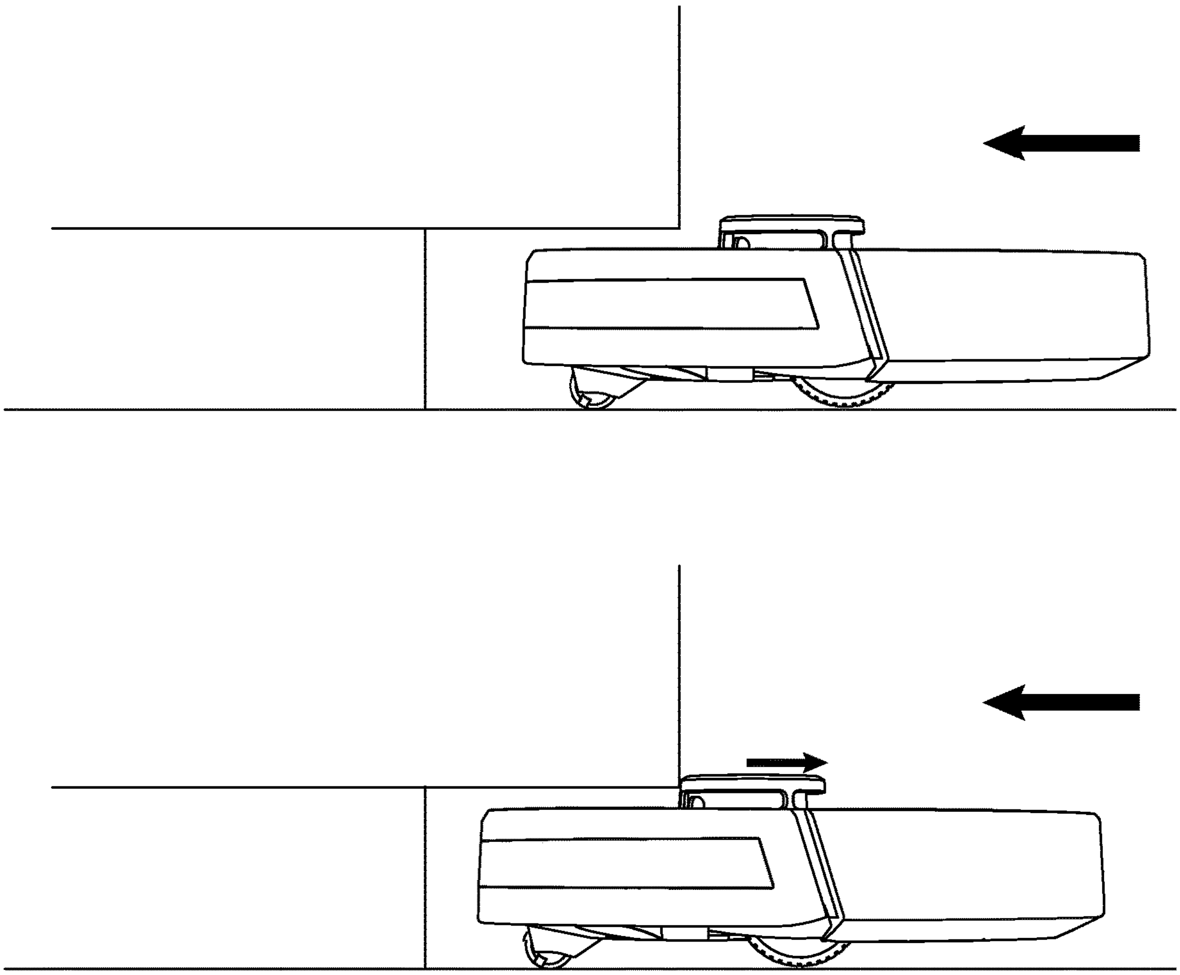
Figure 267F:
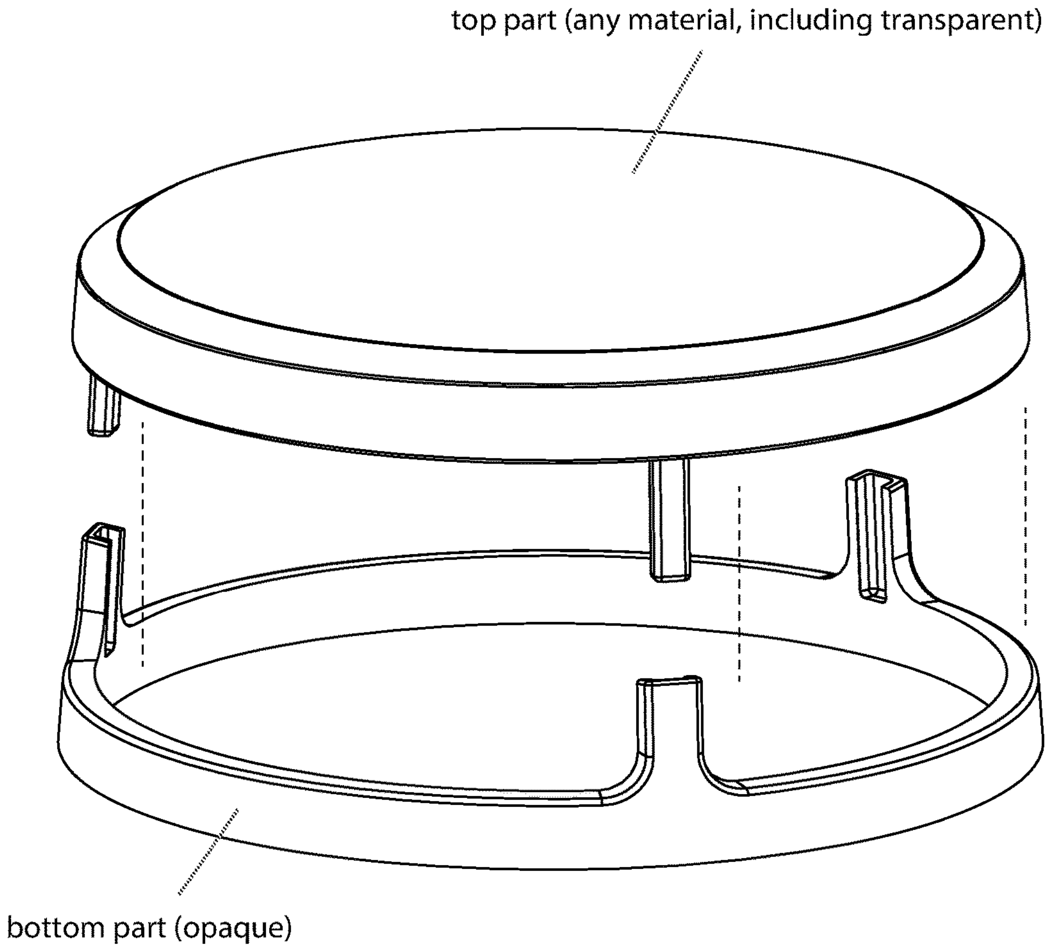
Figure 267H:
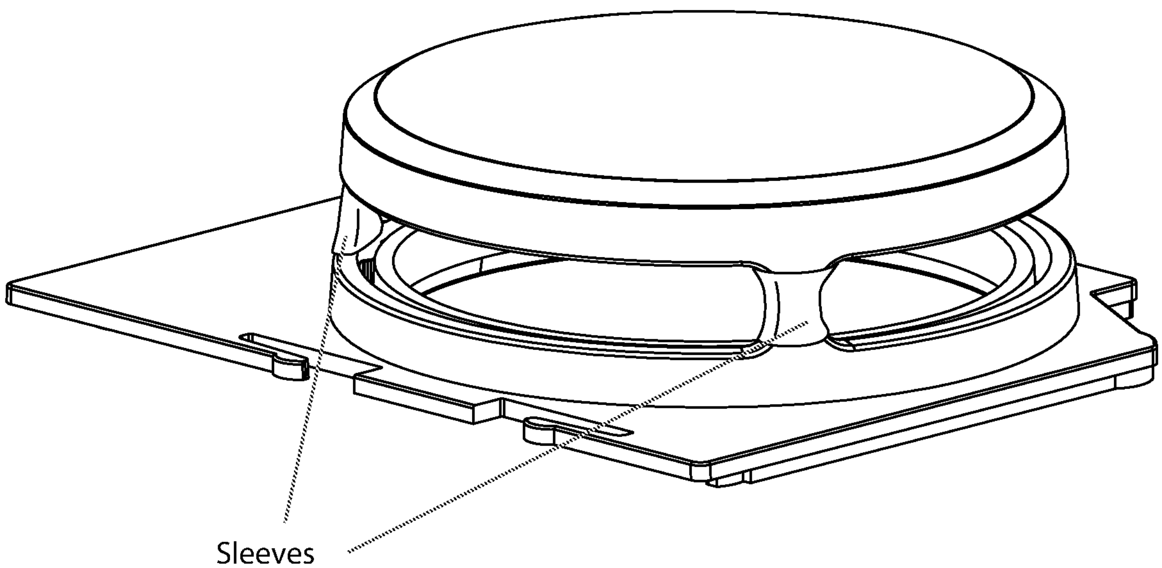

FIGS. 266A-266B illustrate a robot with LIDAR placed inside the robot.

FIGS. 267A-267H illustrate a LIDAR cover with bumper.

Figure 268A:
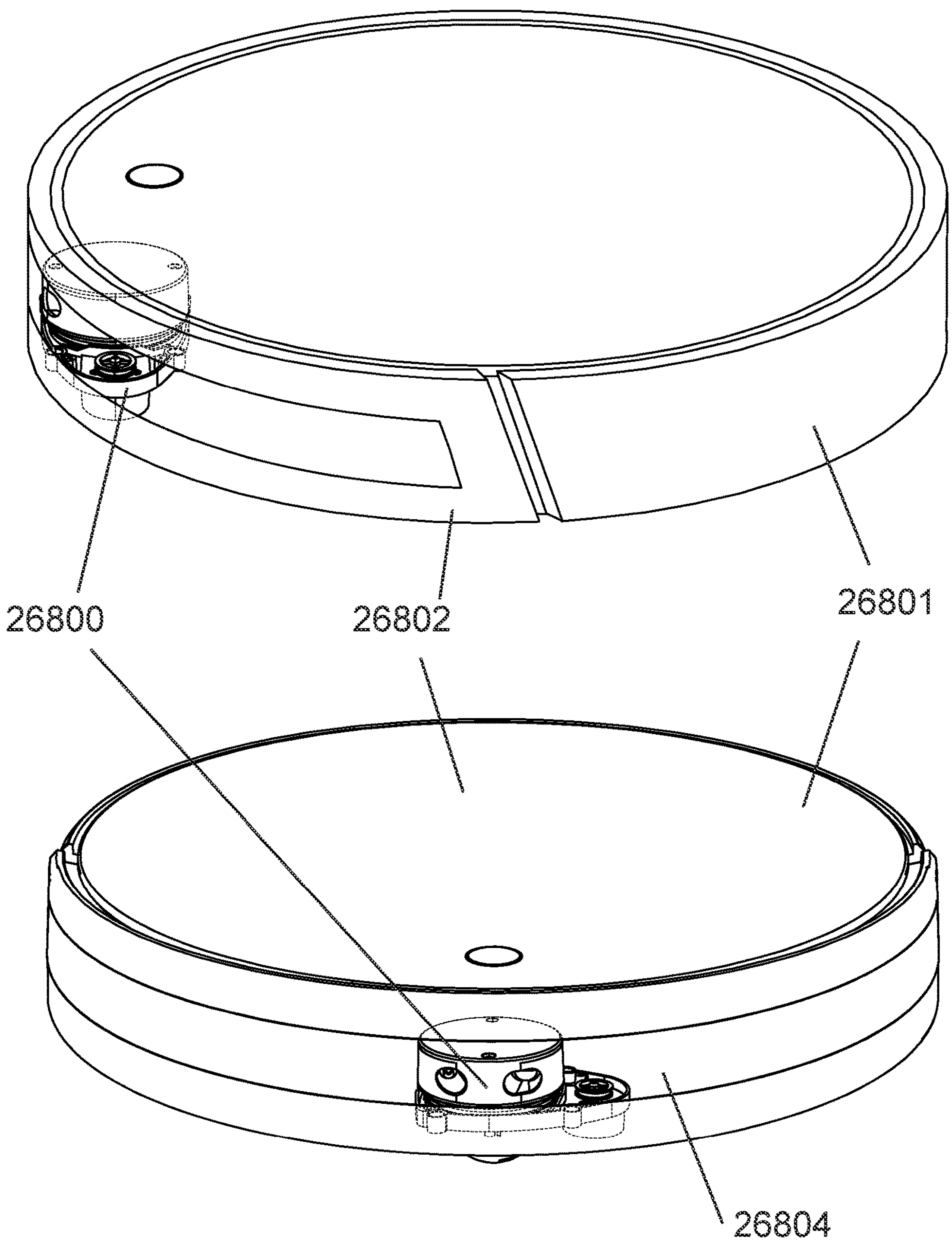
Figure 268B:
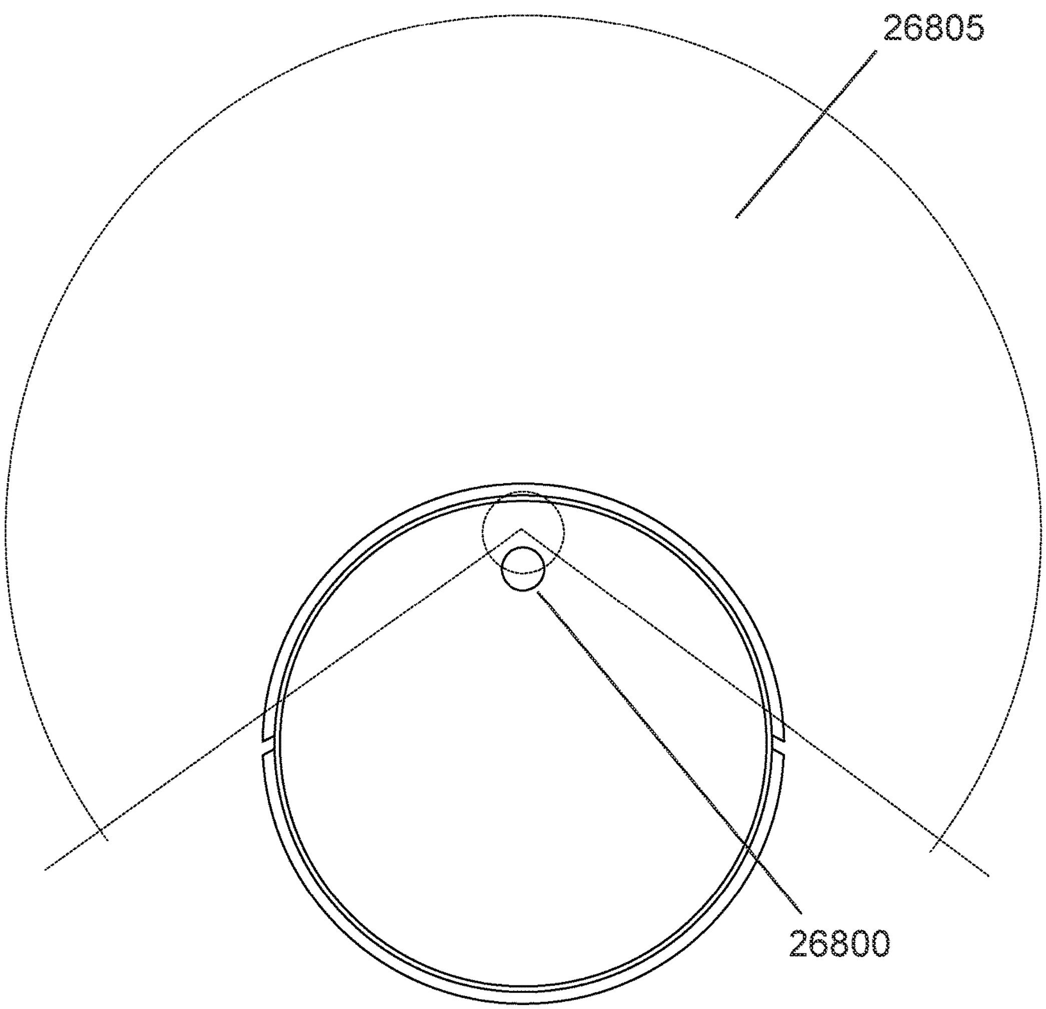

FIGS. 268A-268B illustrate a robot with LIDAR placed inside the robot behind the bumper.

Figure 269:
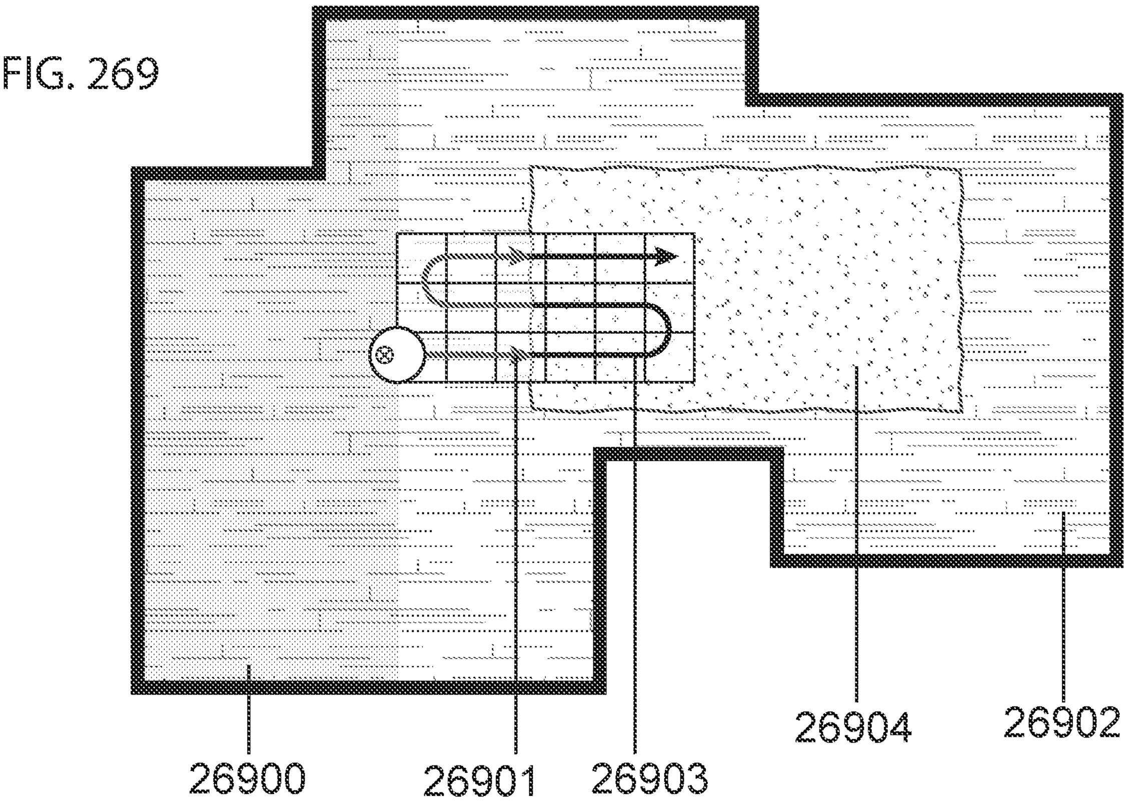

FIG. 269 illustrates covering hard surface areas only using gyro and covering carpet areas only using OTS in undiscovered areas.

Figure 270:
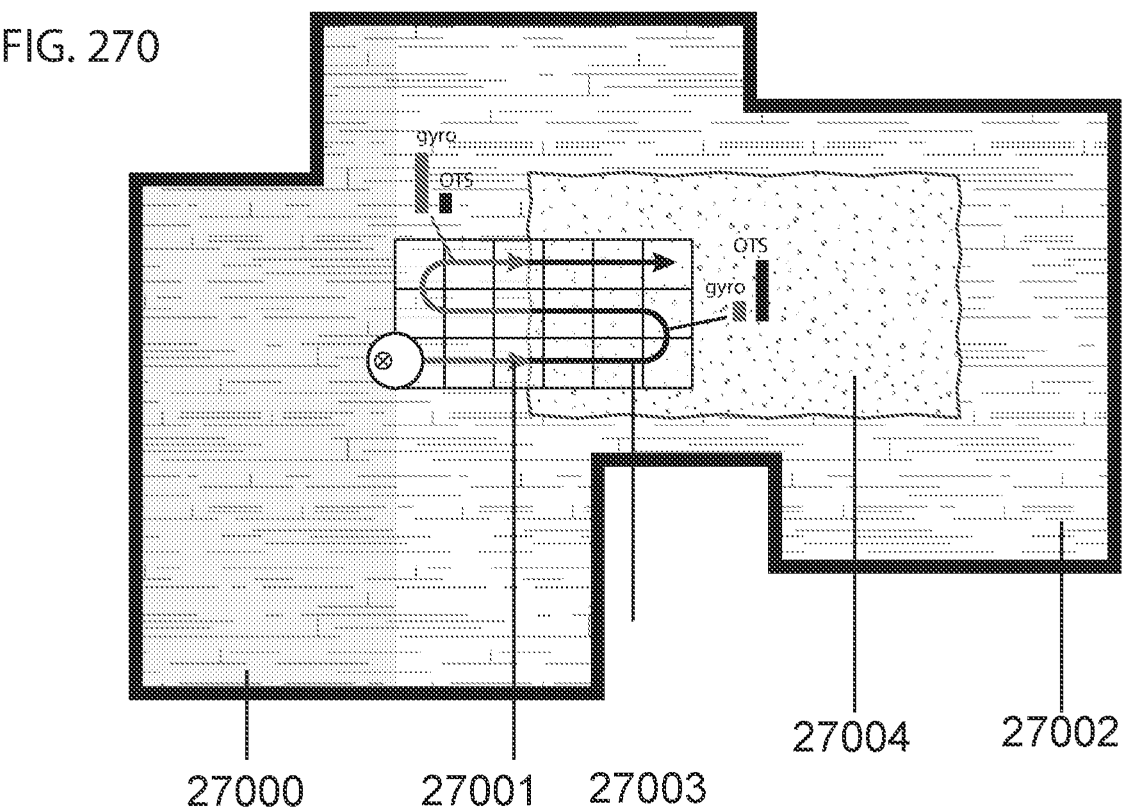

FIG. 270 illustrates covering surfaces by weighting gyro over OTS on hard surface areas and OTS over gyro on carpet areas in undiscovered areas.

Figure 271:
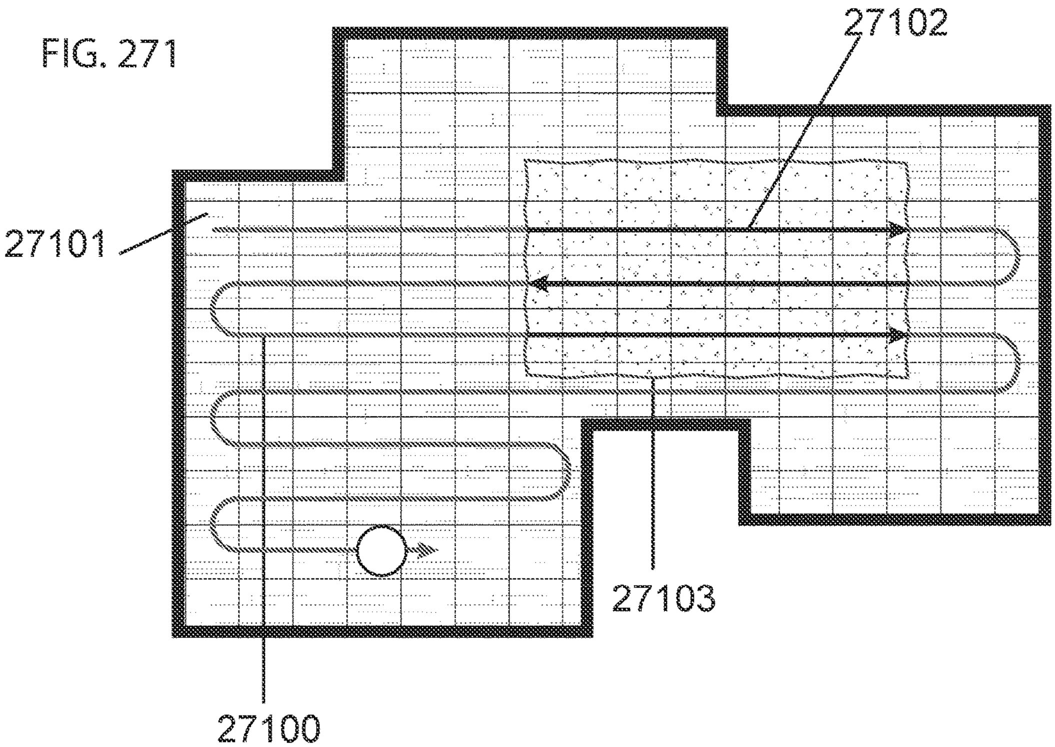

FIG. 271 illustrates mapping and covering surfaces by weighting gyro over OTS on hard surface areas and OTS over gyro on carpet areas for a robot without LIDAR.

Figure 272:
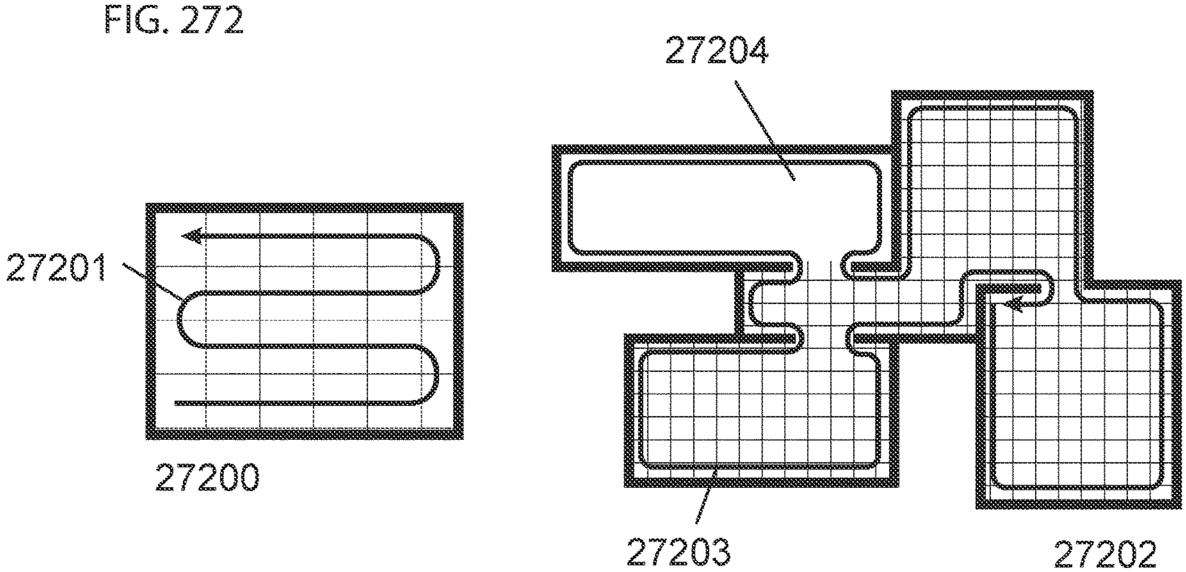

FIG. 272 compares a simple square room and a complex environment in terms of coverage and mapping.

Figure 273:
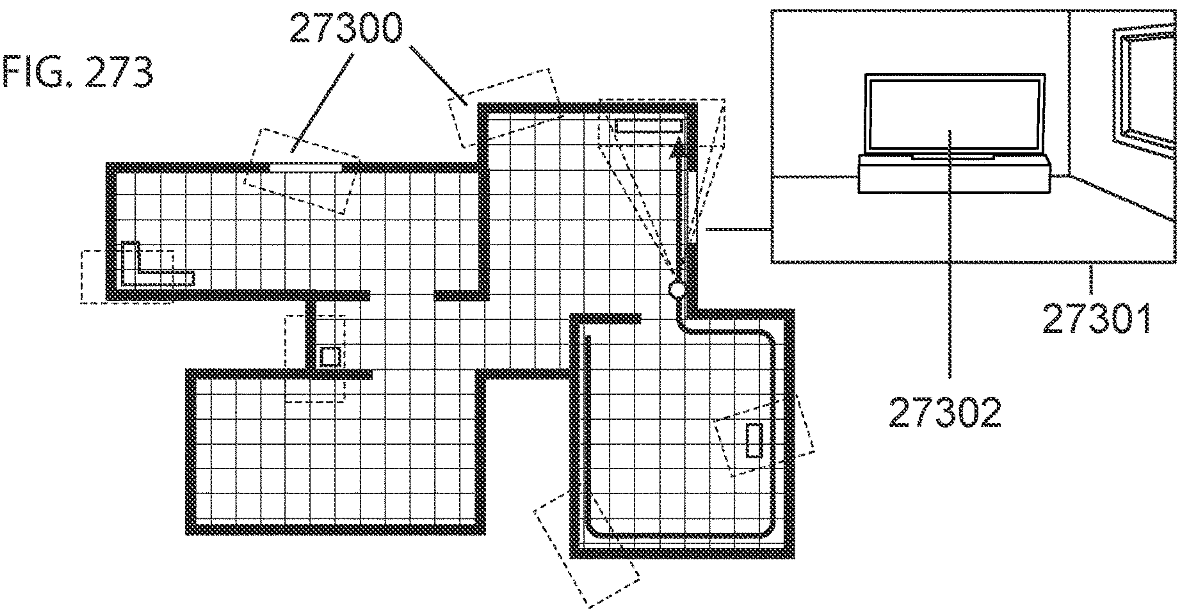

FIG. 273 illustrates visual cues that may be used by the processor of the robot to identify each room.

Figure 274:
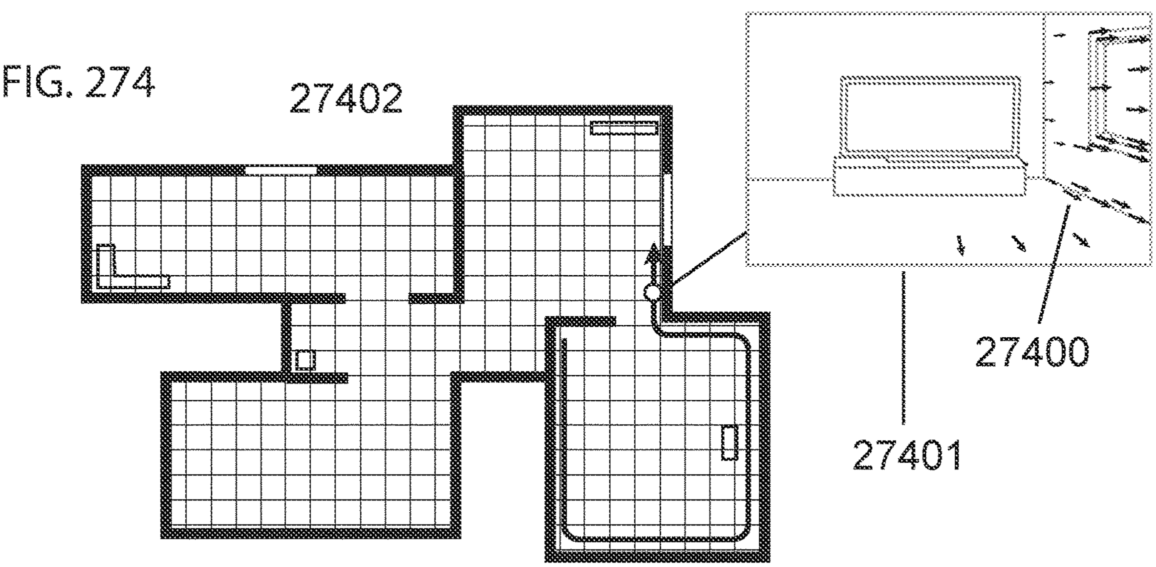

FIG. 274 illustrates optical flow that may be used by the processor of the robot to identify each room.

Figure 275:
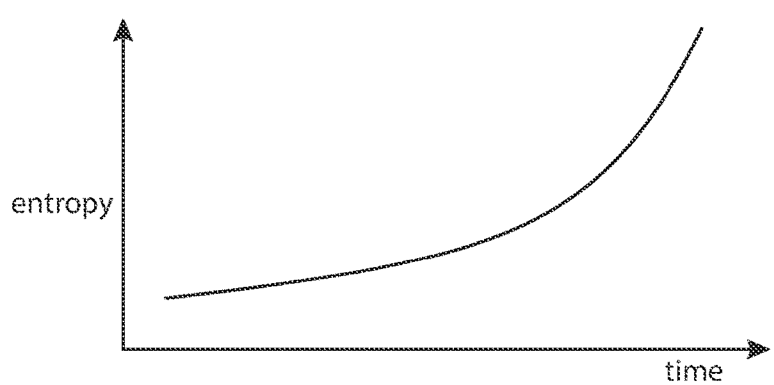

FIG. 275 illustrates where blind coverage is used, increase in entropy is observed overtime.

Figure 276:
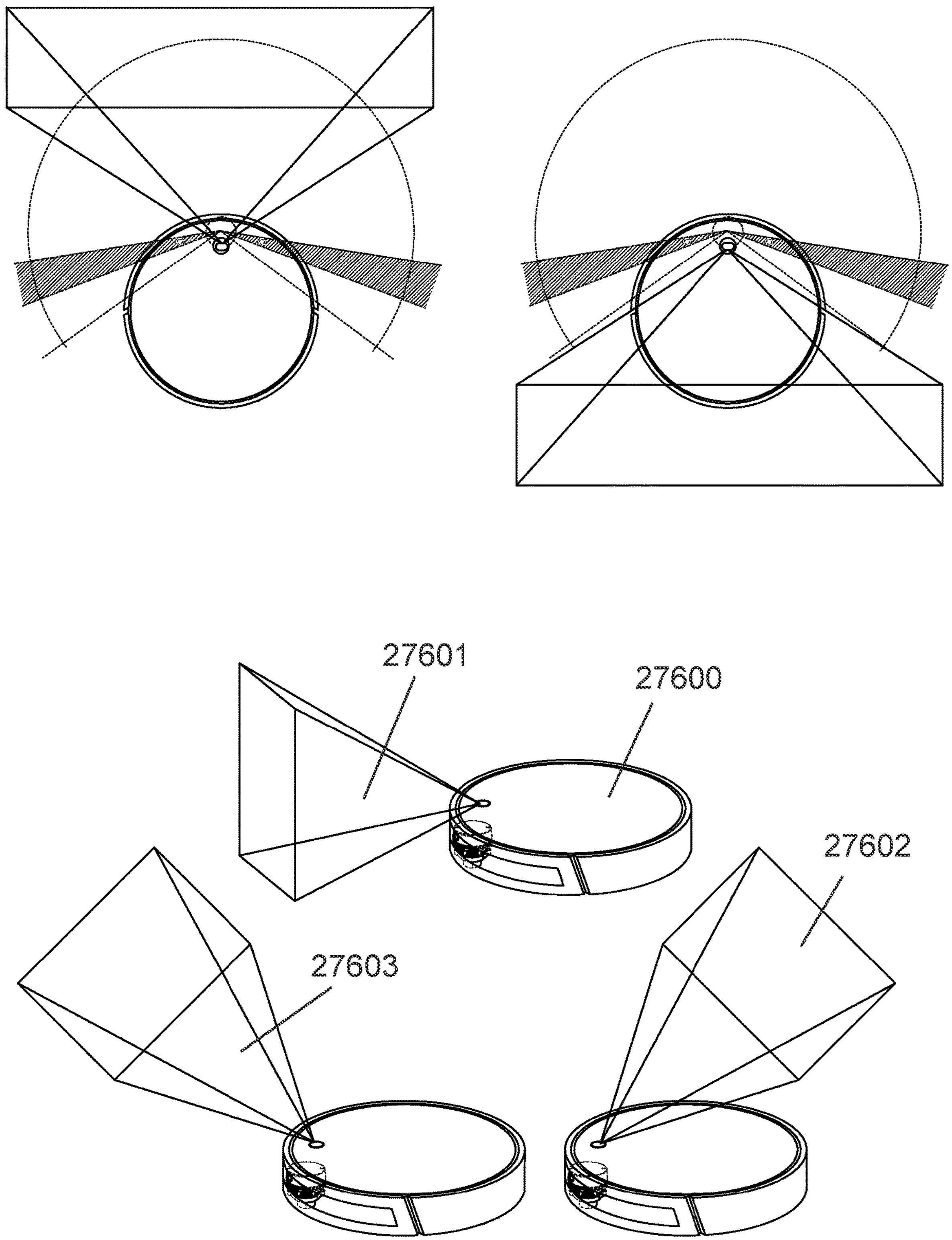

FIG. 276 illustrates examples of a robot with LIDAR combined with a camera with FOV in different directions.

Figure 277:
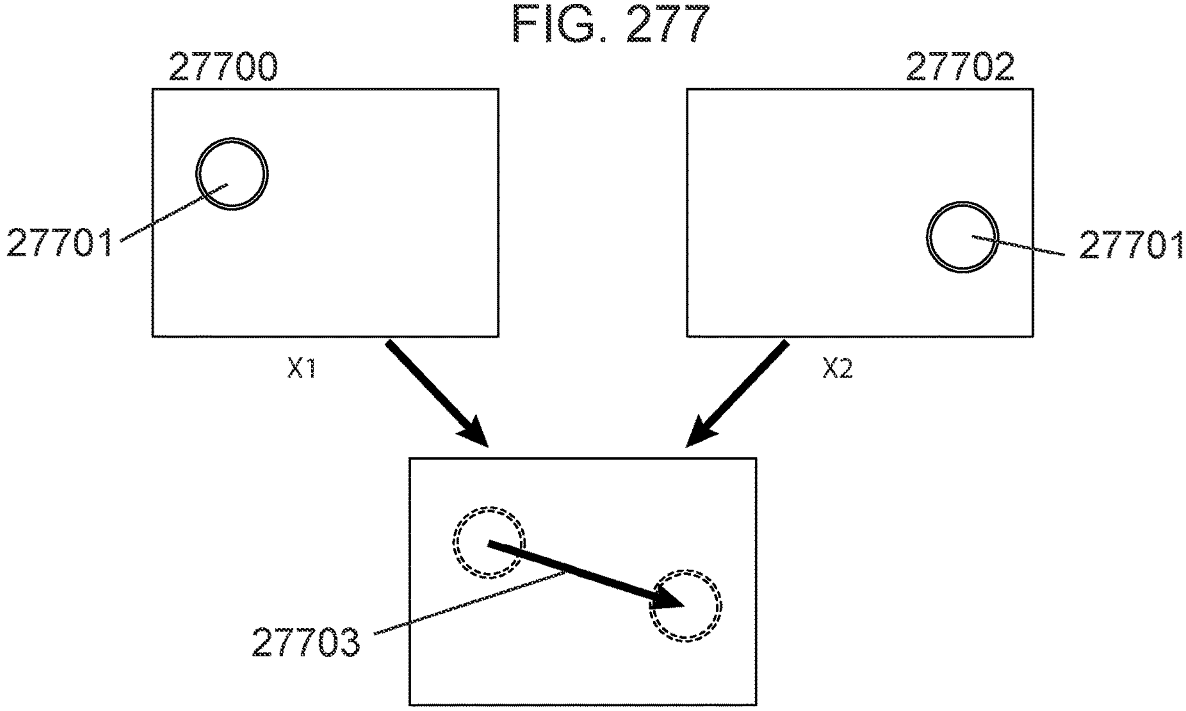

FIG. 277 illustrates 2 images of a lamp on the ceiling in two different times superimposed together to determine the displacement.

Figure 278:
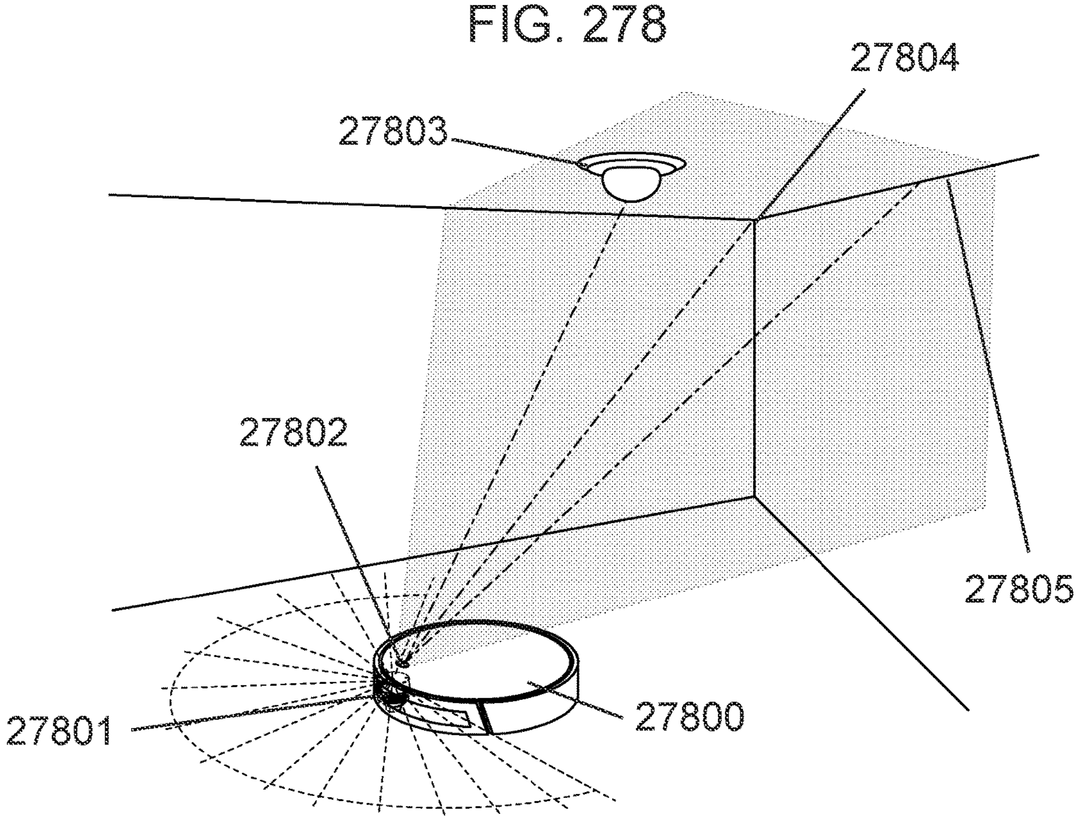

FIG. 278 illustrates a robot includes a LIDAR with a limited FOV and a rear-up looking camera.

Figure 279:
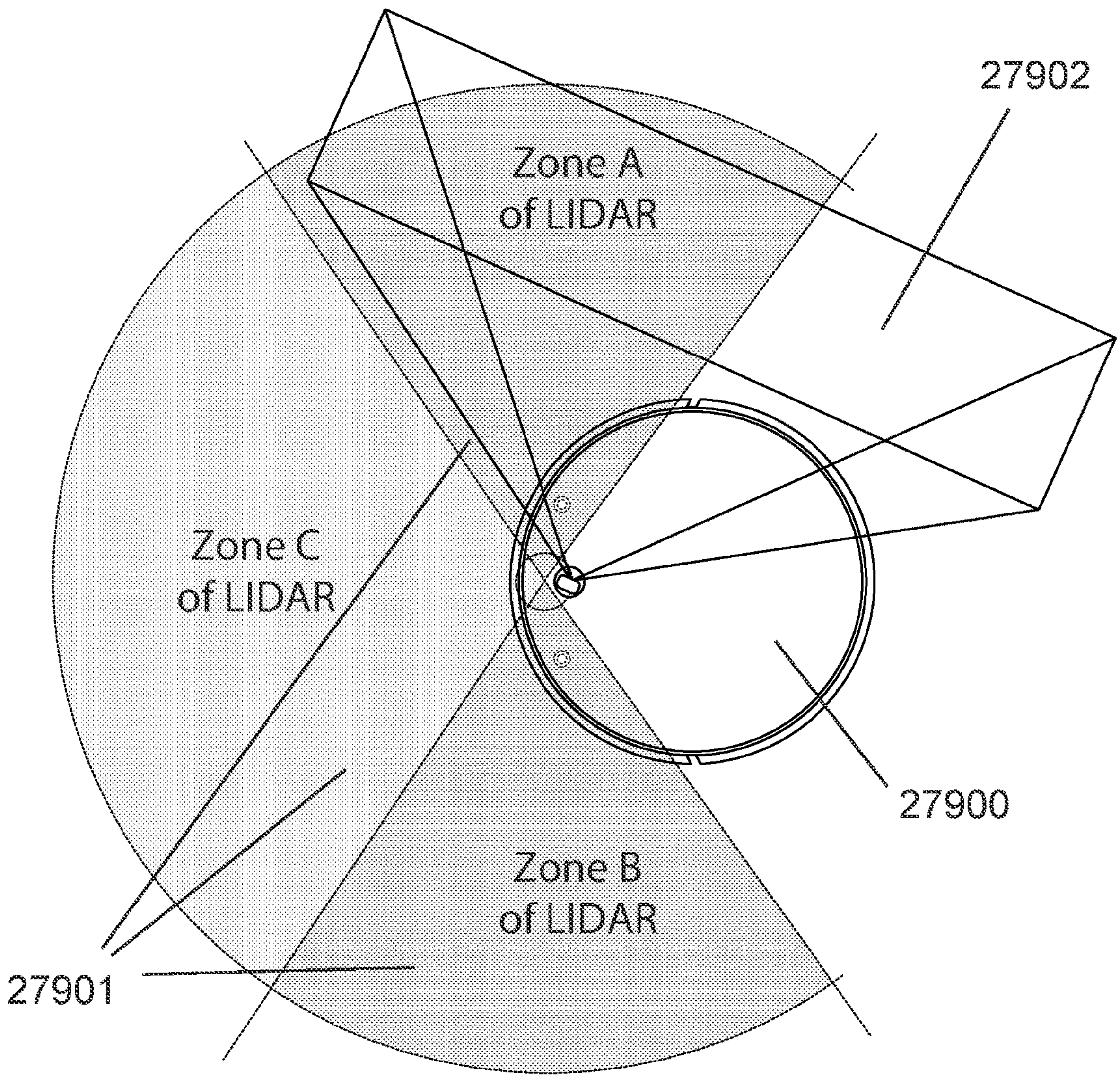

FIG. 279 illustrates an example of a robot including a LIDAR with limited FOV and a camera looking at the side inclined to back.

FIGS. 280A-280C illustrates how image data may be stored in human-readable formats.

Figure 281A:
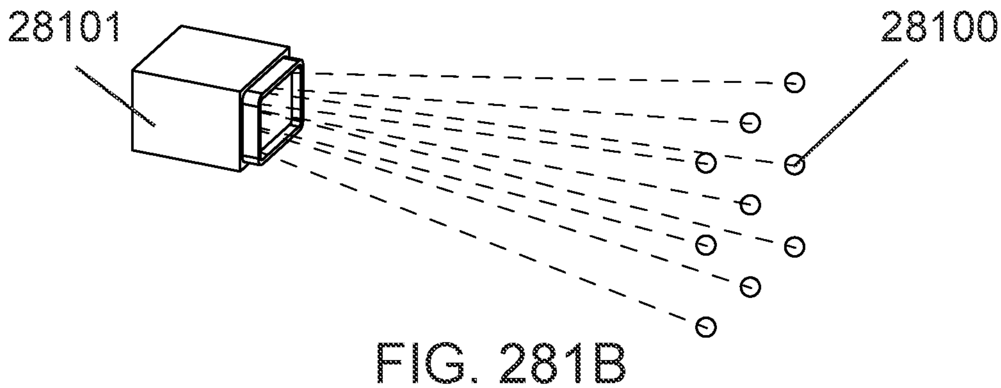

FIG. 281A illustrates an example of a structured light pattern emitted by laser diode.

Figure 281B:
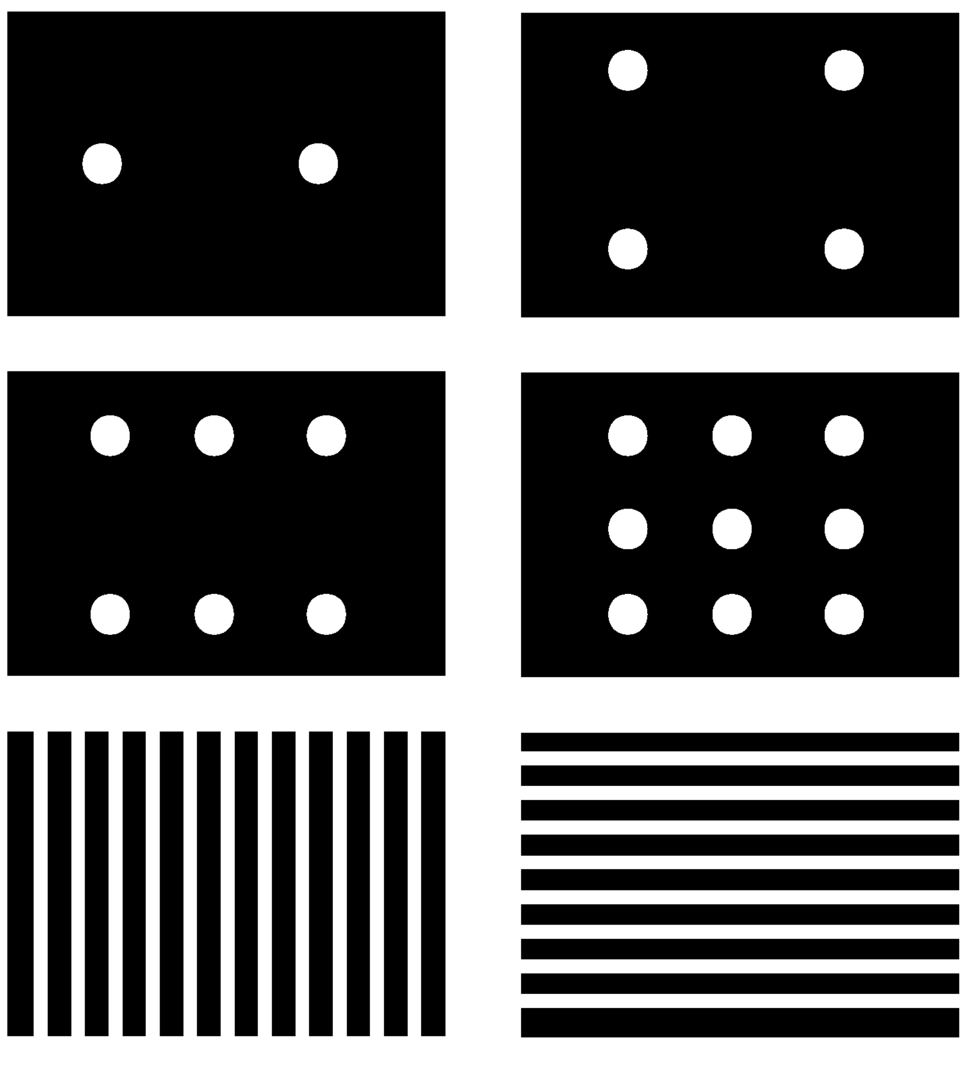

FIG. 281B illustrates examples of different structured light patterns.

Figure 282A:
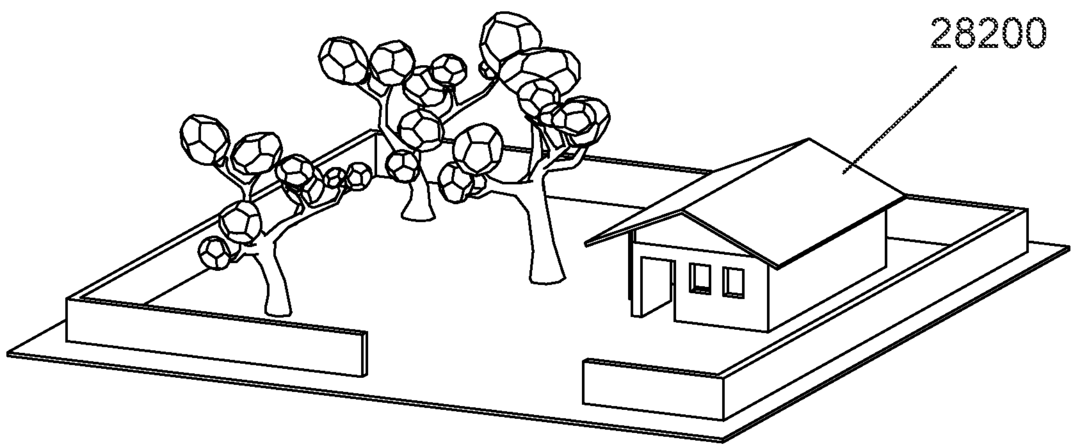

FIG. 282A illustrates an environment.

Figure 282B:
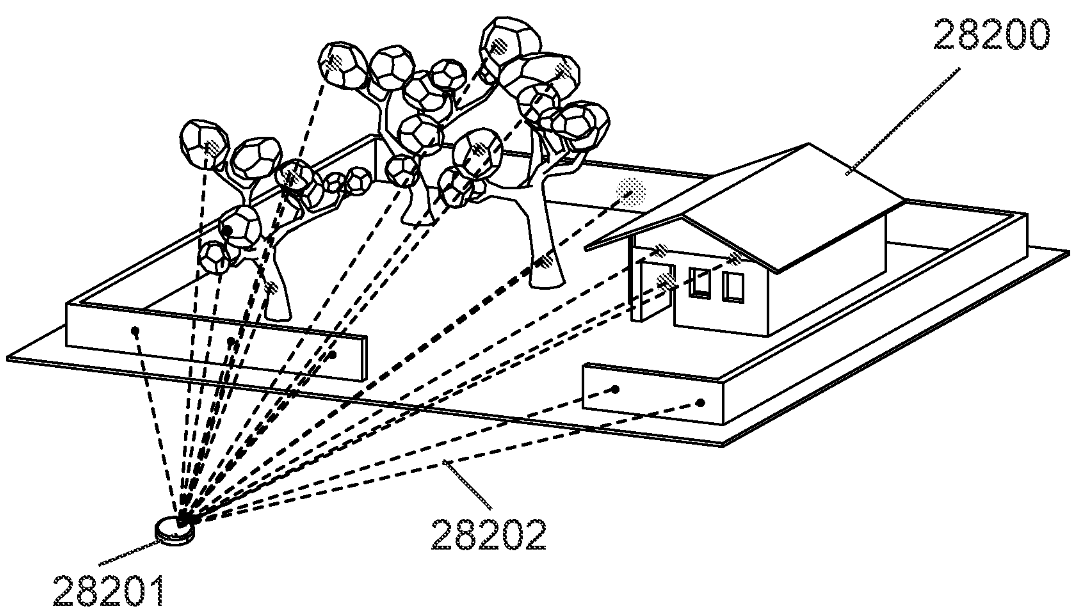

FIG. 282B illustrates a robot with a laser diode emitting a light pattern onto surfaces of objects within the environment.

Figure 282C:
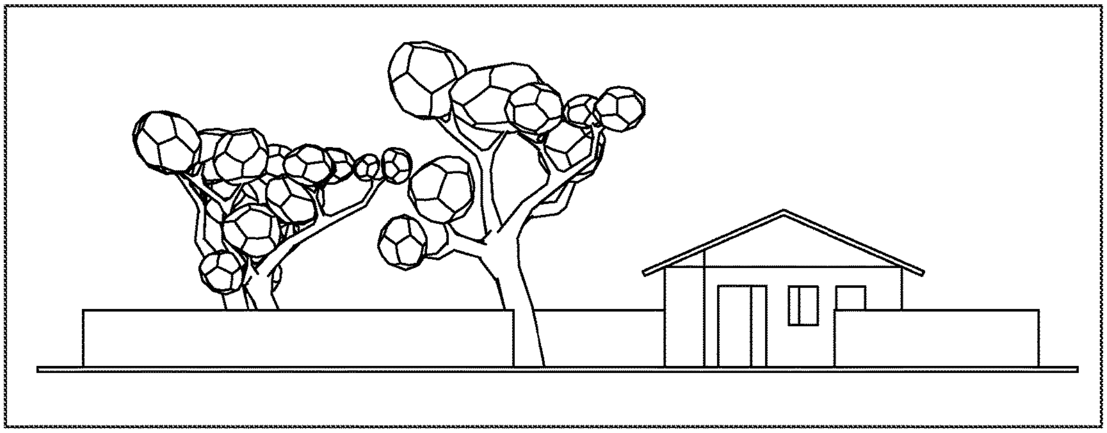

FIG. 282C illustrates a captured two dimensional image of the environment

Figure 282D:
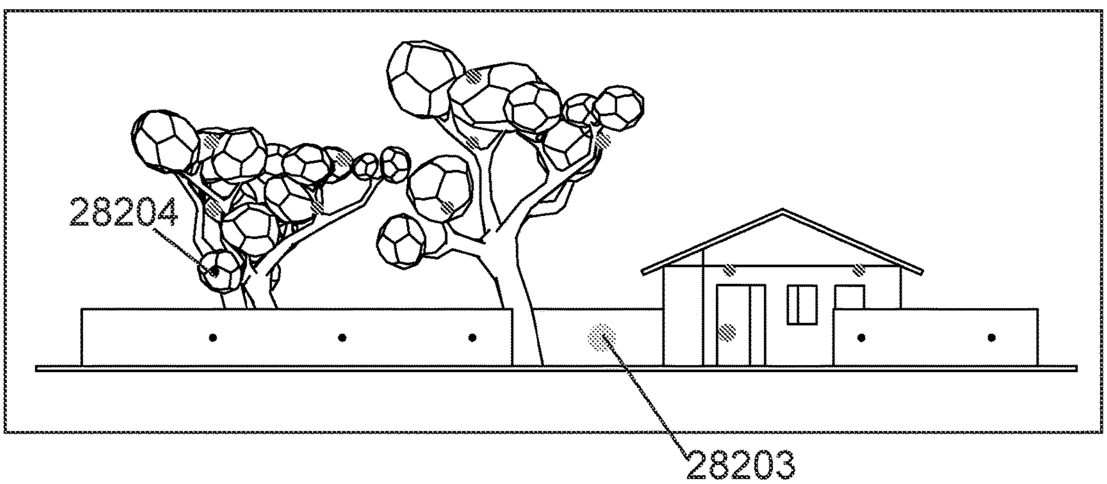

FIG. 282D illustrates a captured image of the environment including the light pattern.

Figure 282E:
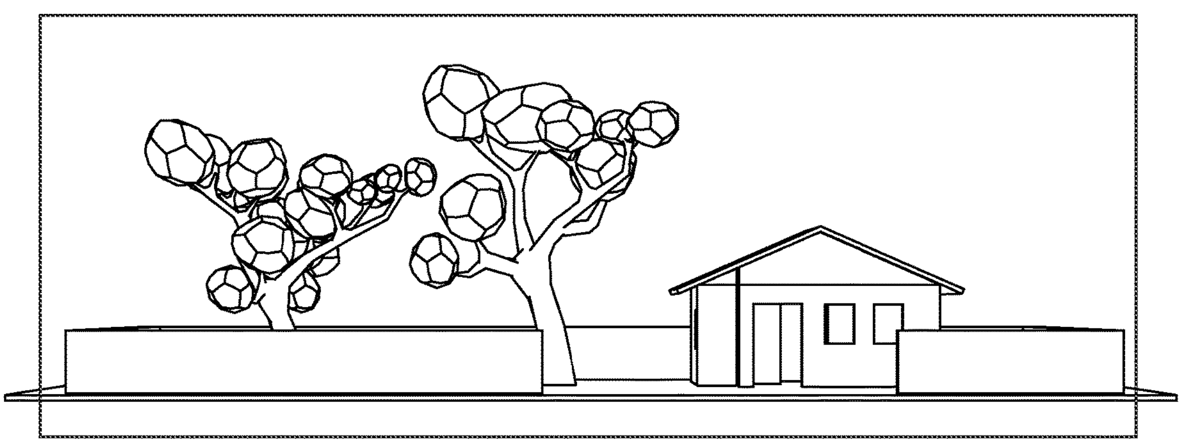

FIG. 282E illustrates a three dimensional image of the environment created by processor of the robot.

Figure 283:
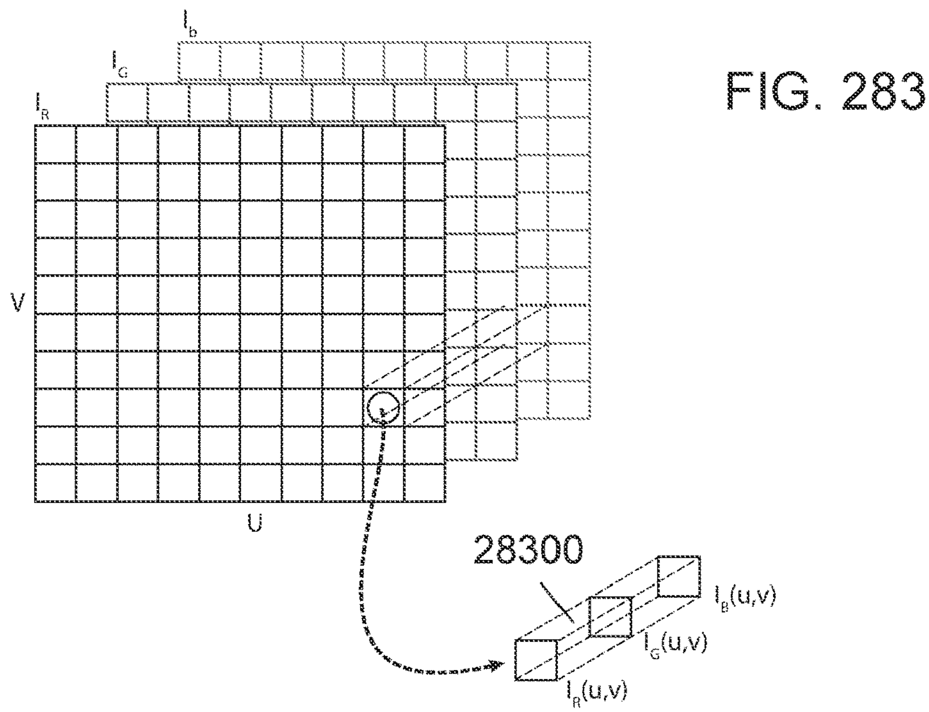

FIG. 283 illustrates the three arrays $I_R$, $I_G$, $I_B$ of the color image array I.

Figure 284:
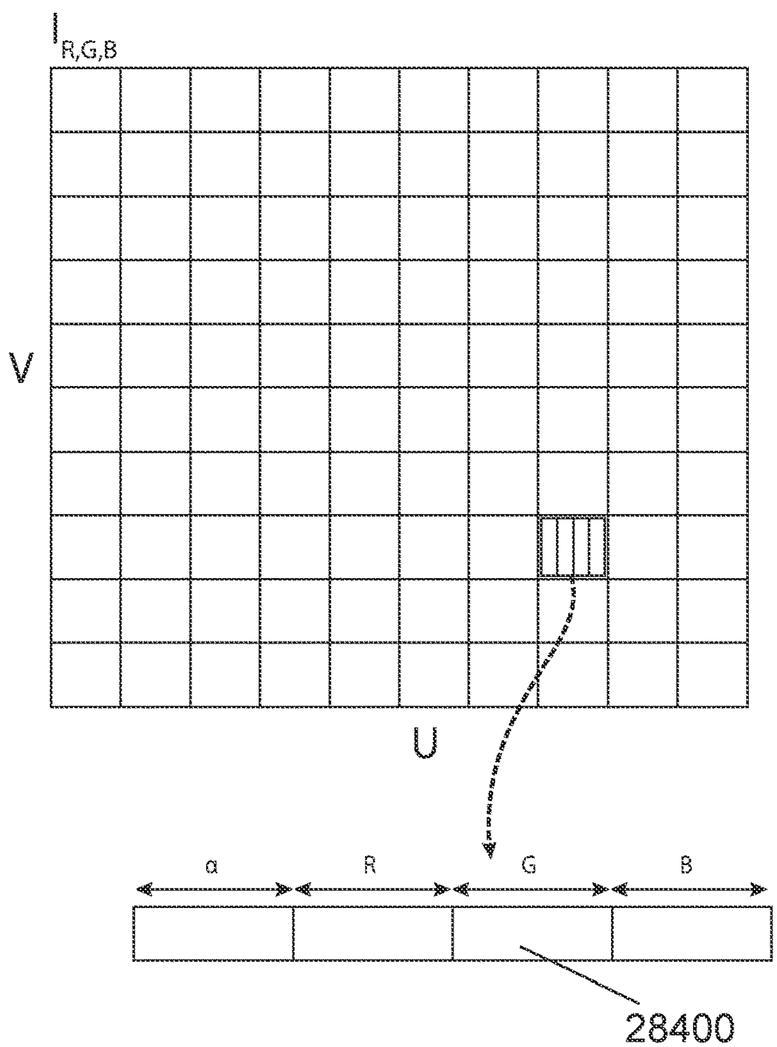

FIG. 284 illustrates the array $I_R$, $I_G$, $I_B$ and the components of a pixel at some position.

Figure 285:
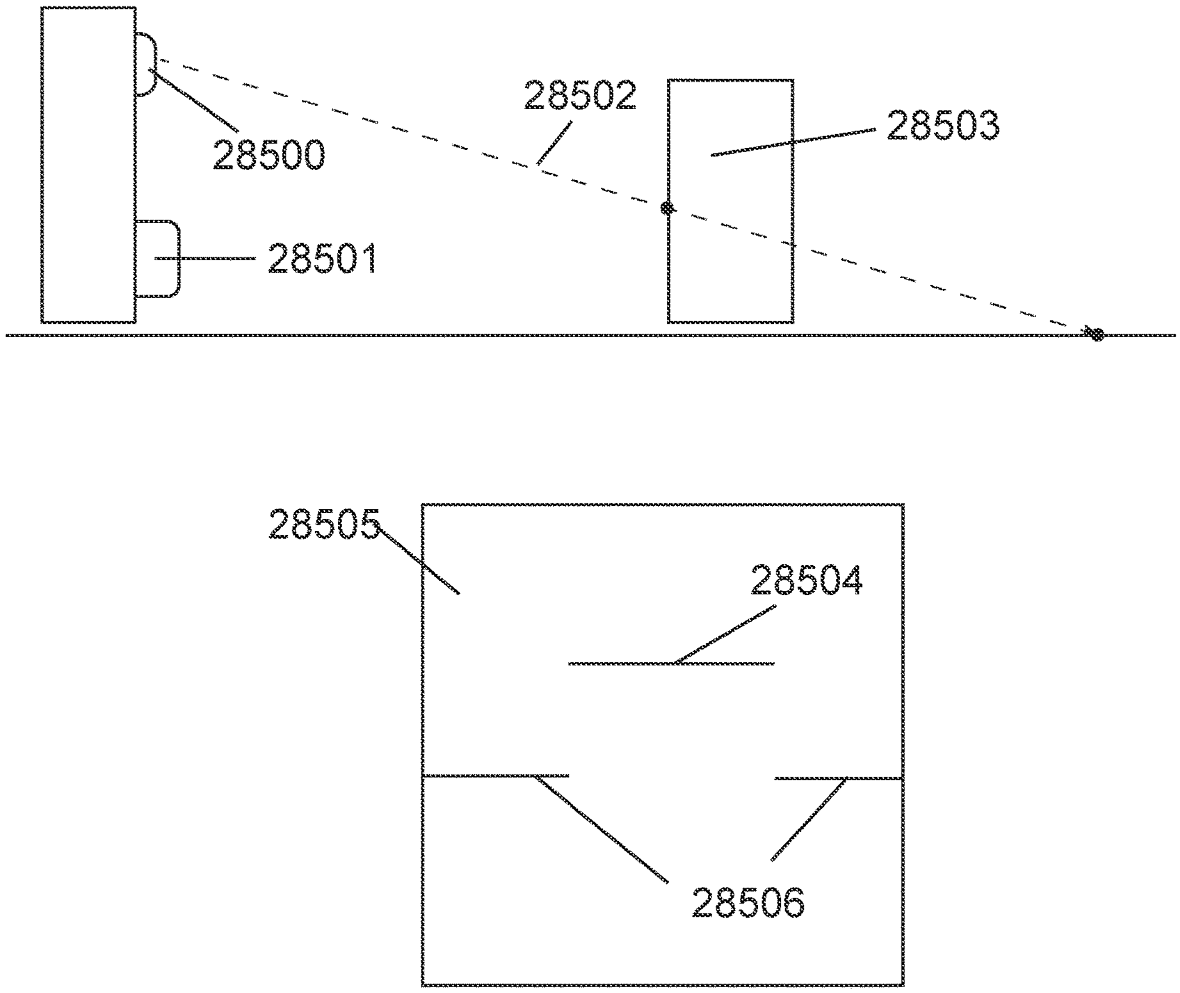

FIG. 285 illustrates a light source and a camera and an object.

Figure 286:
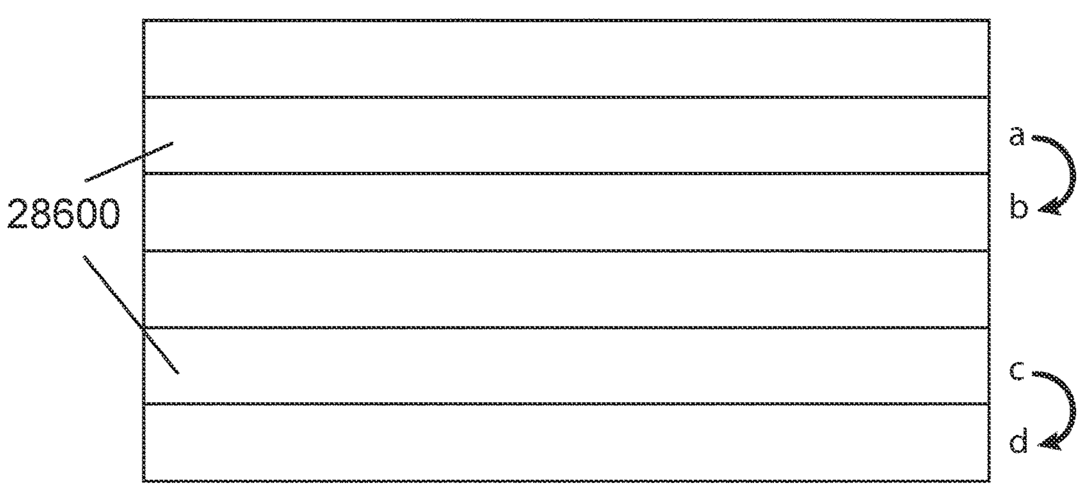

FIG. 286 illustrates areas of a captured image which represent possible positions of the light within the captured image relative to a bottom edge of the image.

Figure 287:
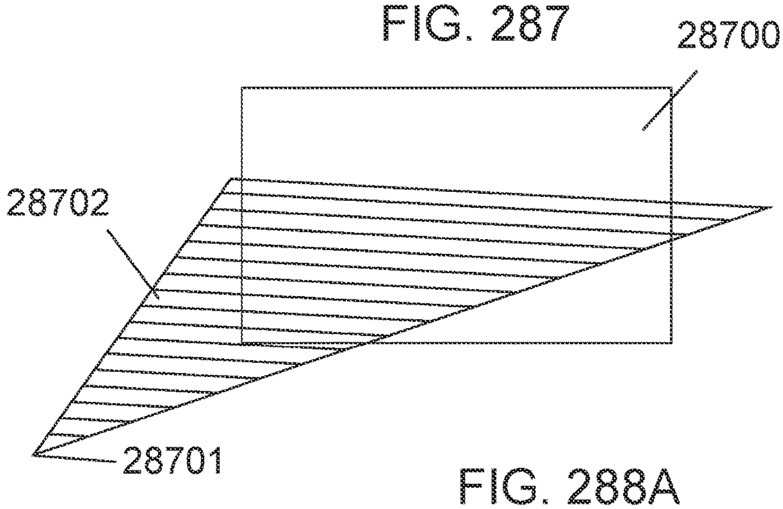

FIG. 287 illustrates an object surface, an origin of a light source emitting a laser line, and a visualization of the size of the projected laser line for various hypothetical object distances from the origin.

Figure 288A:
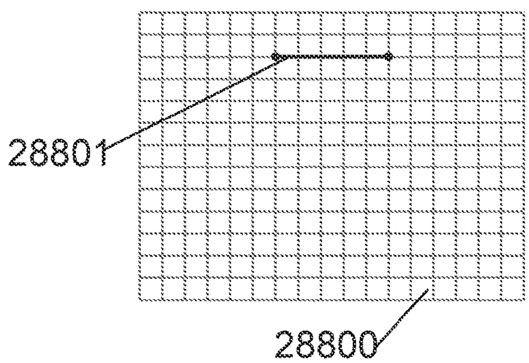

FIG. 288A illustrates a captured image of a projected laser line emitted from a laser positioned at a downward angle.

Figure 288B:
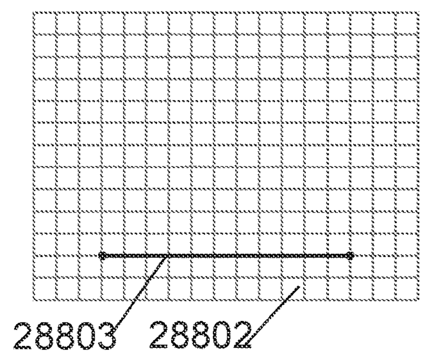

FIG. 288B illustrates a captured image of the projected laser line indicative of the light source being further from the object.

Figure 289A:
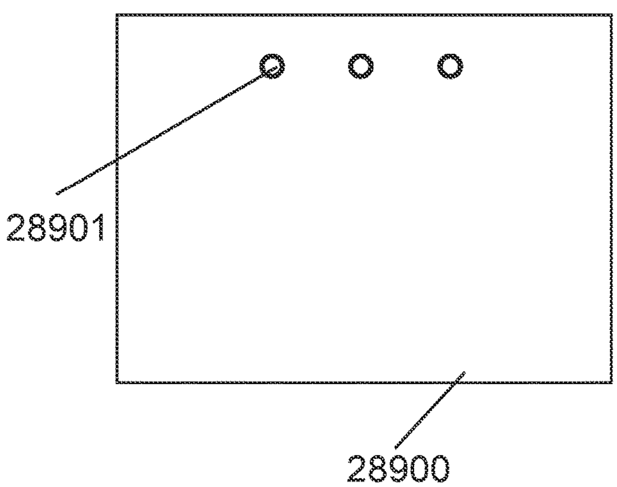
Figure 289B:
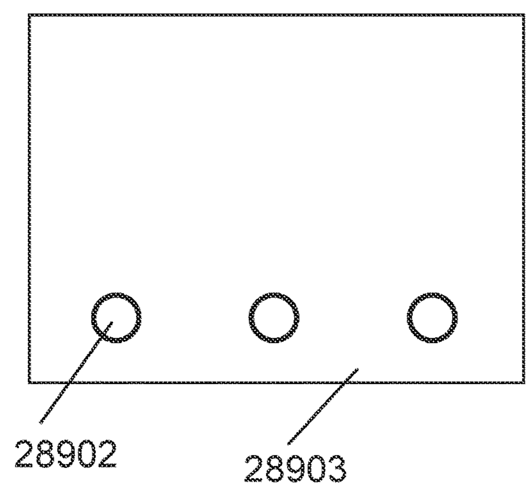

FIGS. 289A-289B illustrate structured light point in captured images changing on encountering near and far objects.

Figure 290A:
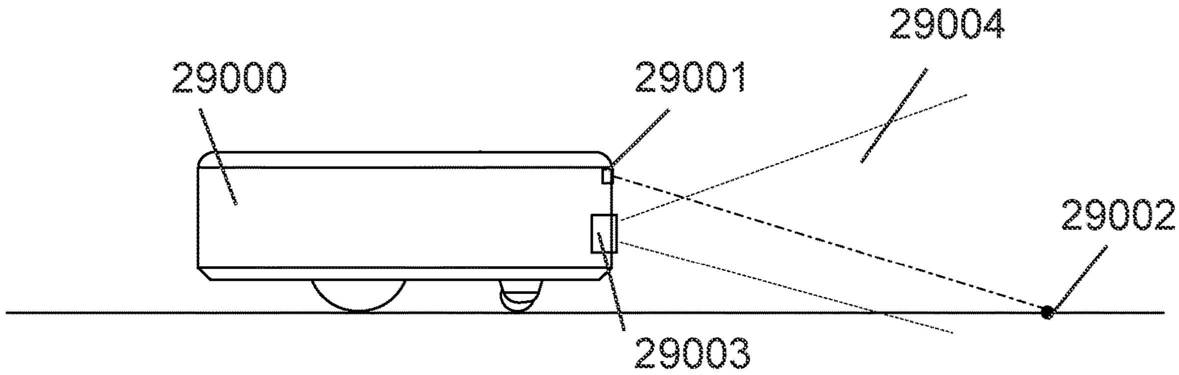
Figure 290B:
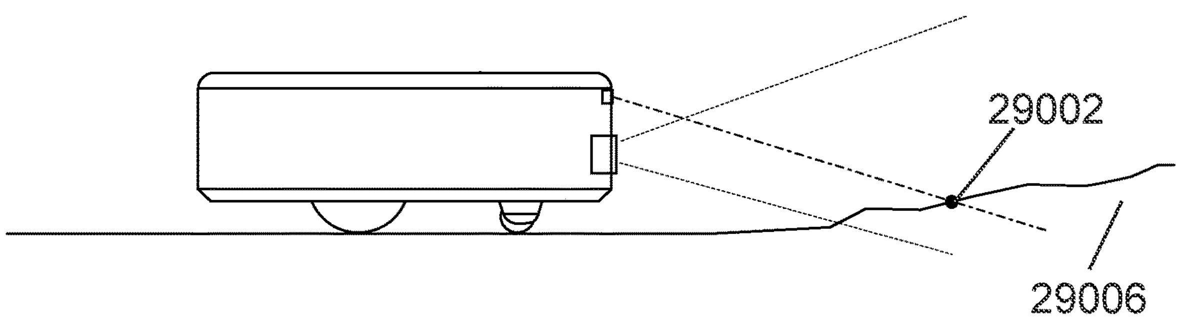
Figure 290C:
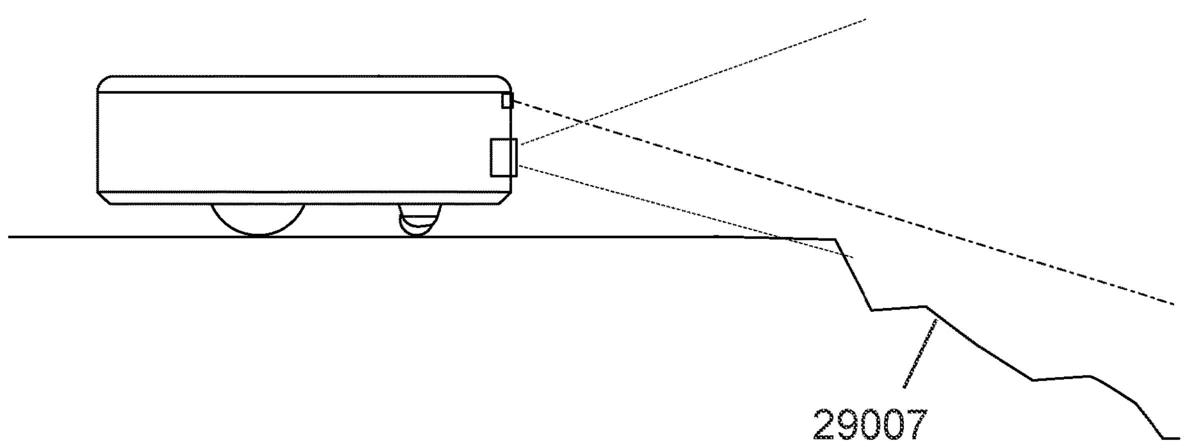

FIGS. 290A-290C illustrate a robot with a downward looking light point and a camera on the flat ground, approaching an obstacle and approaching a cliff respectively.

Figure 291A:
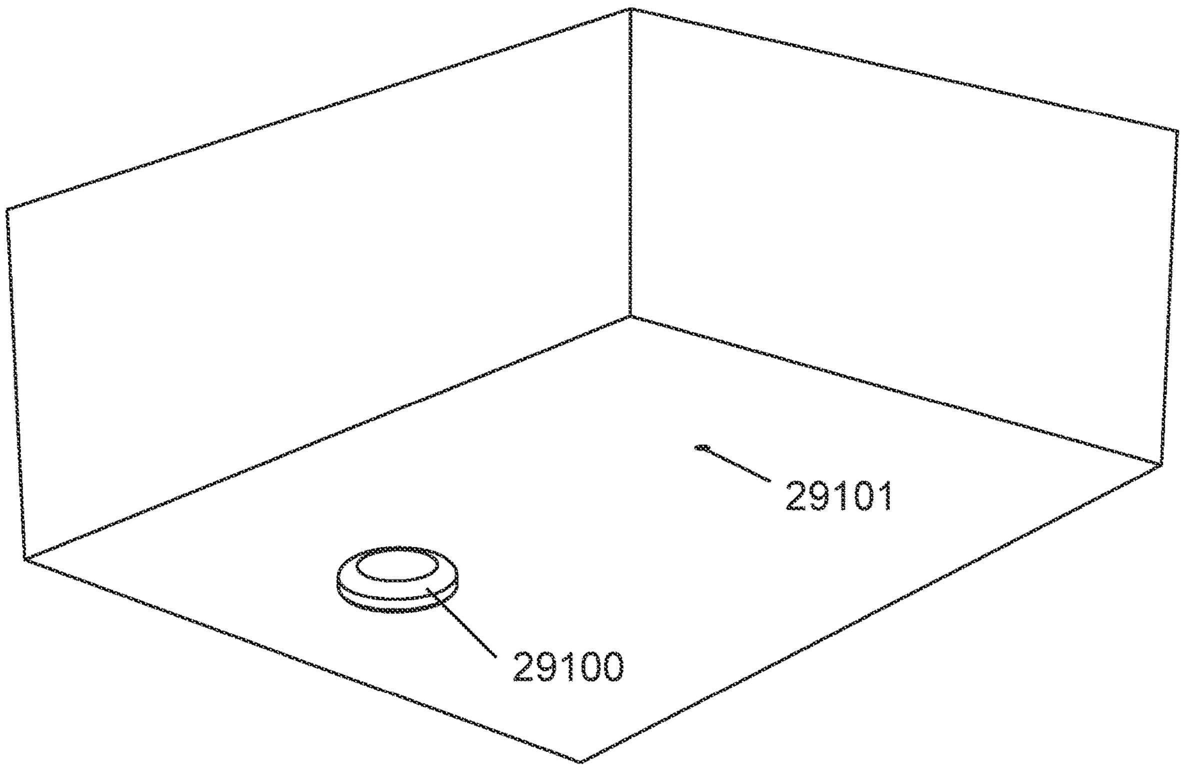

FIG. 291A illustrates a robot with a downward looking light point and a camera on a flat floor.

Figure 291B:
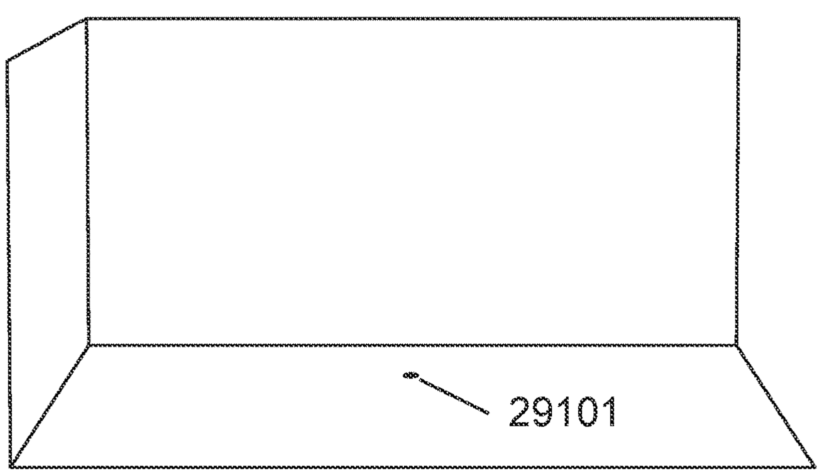

FIG. 291B illustrates a FOV of a camera of the robot on a flat floor.

Figure 291C:
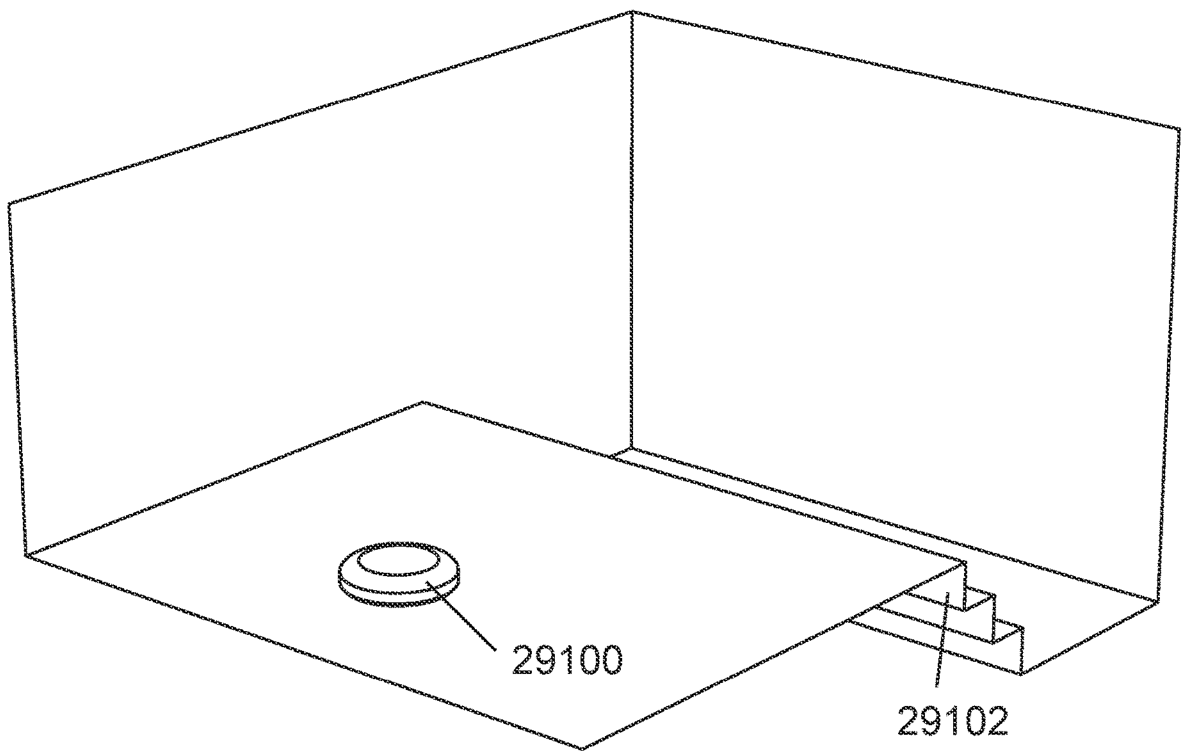

FIG. 291C illustrates a robot with a downward looking light point and a camera approaching a cliff.

Figure 291D:
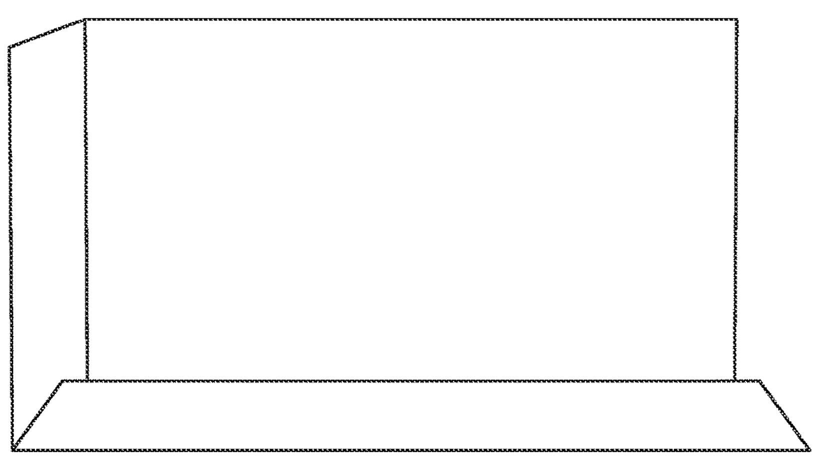

FIG. 291D illustrates a FOV of a camera of the robot approaching a cliff.

Figure 291E:
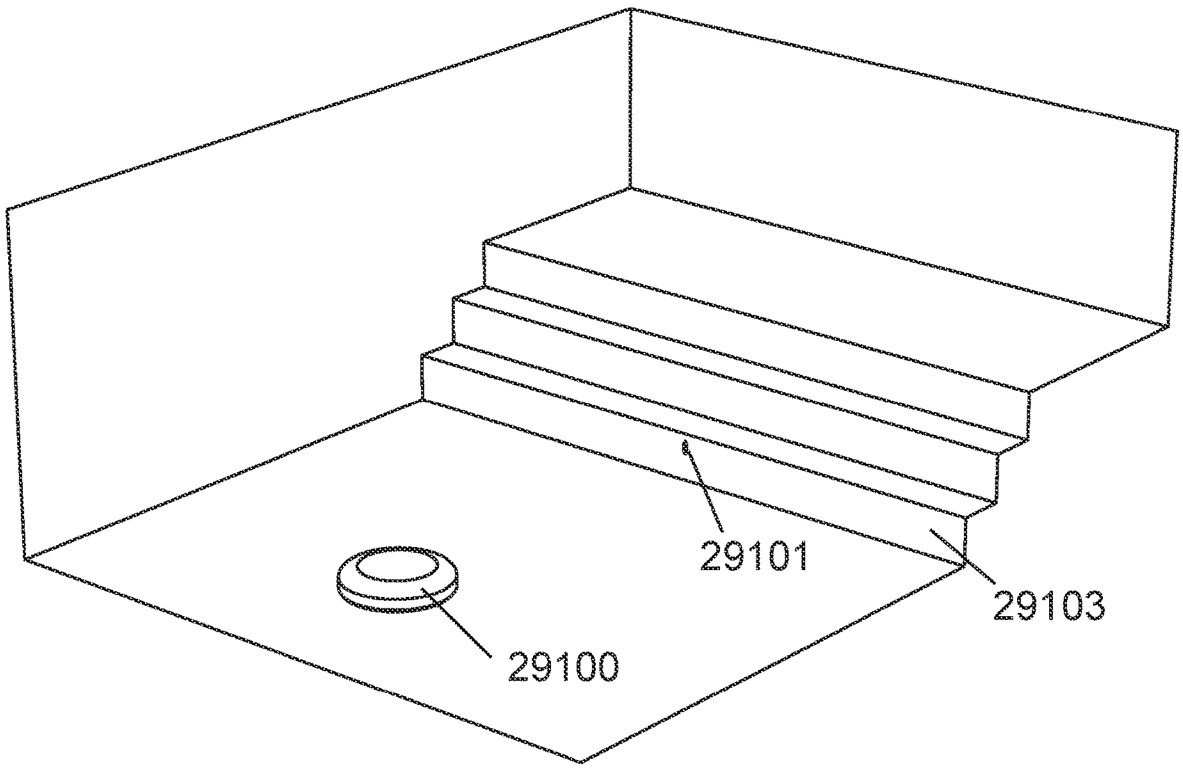

FIG. 291E illustrates a robot with a downward looking light point and a camera approaching an obstacle.

Figure 291F:
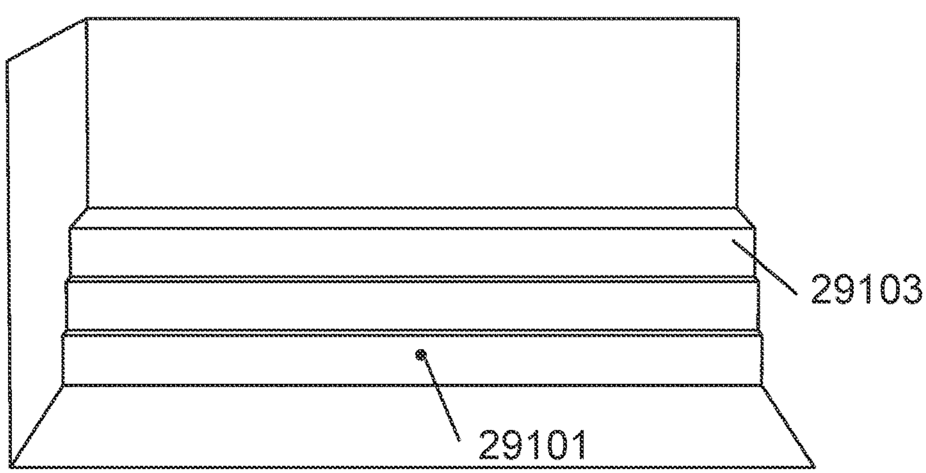

FIG. 291F illustrates a FOV of a camera of the robot approaching an obstacle.

FIG. 292A illustrates an image with a pixel having values of R, G, B, and I.

FIG. 292B illustrates a first structured light pattern emitted by a green IR or LED sensor.

FIG. 292C illustrates a second structured light pattern emitted by a red IR or LED sensor.

FIG. 292D illustrates an image of light patterns projected onto an object surface.

FIG. 292E illustrates the structured light pattern that is observed by the green IR or LED sensor.

FIG. 292F illustrates the structured light pattern that is observed by the red IR or LED sensor.

FIGS. 293A-293C illustrate examples of image divided into sections.

Figure 294B:
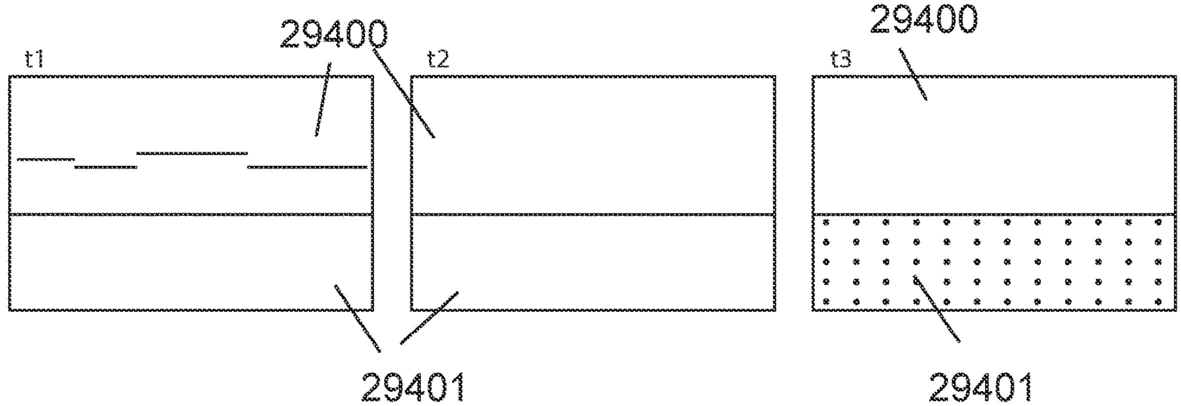
Figure 294C:
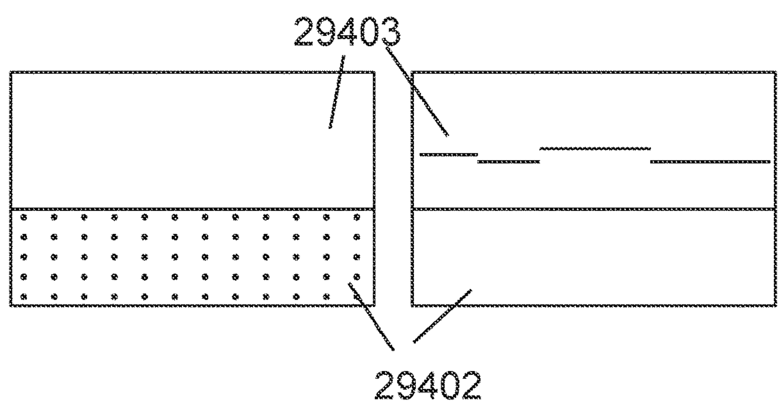

FIGS. 294A-294C illustrate examples of image divided into sections to capture different patterns of structured light.

Figure 295:
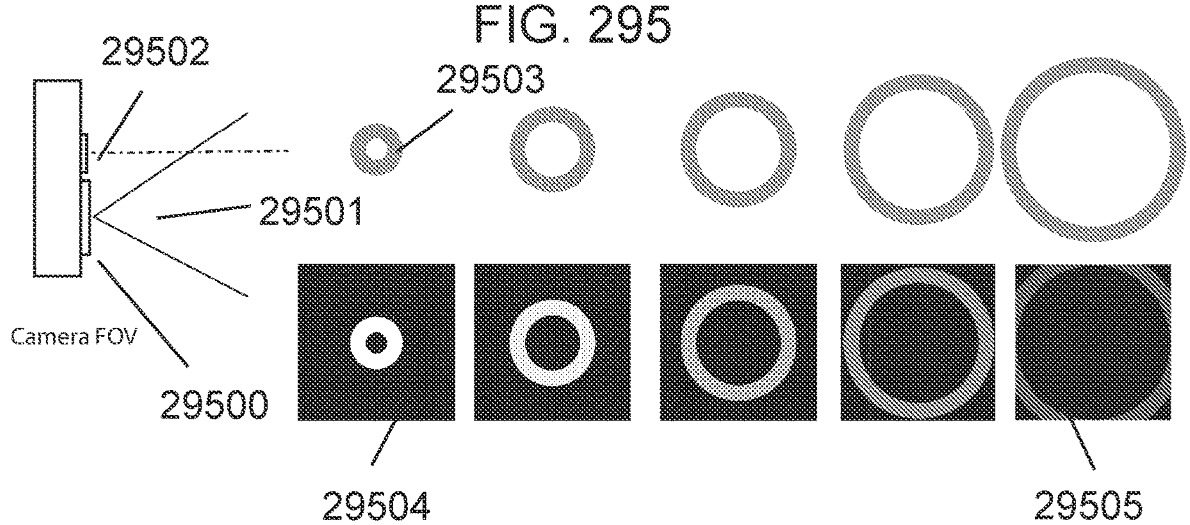

FIG. 295 illustrates a camera and light emitter emitting a ring shaped light.

Figure 296:
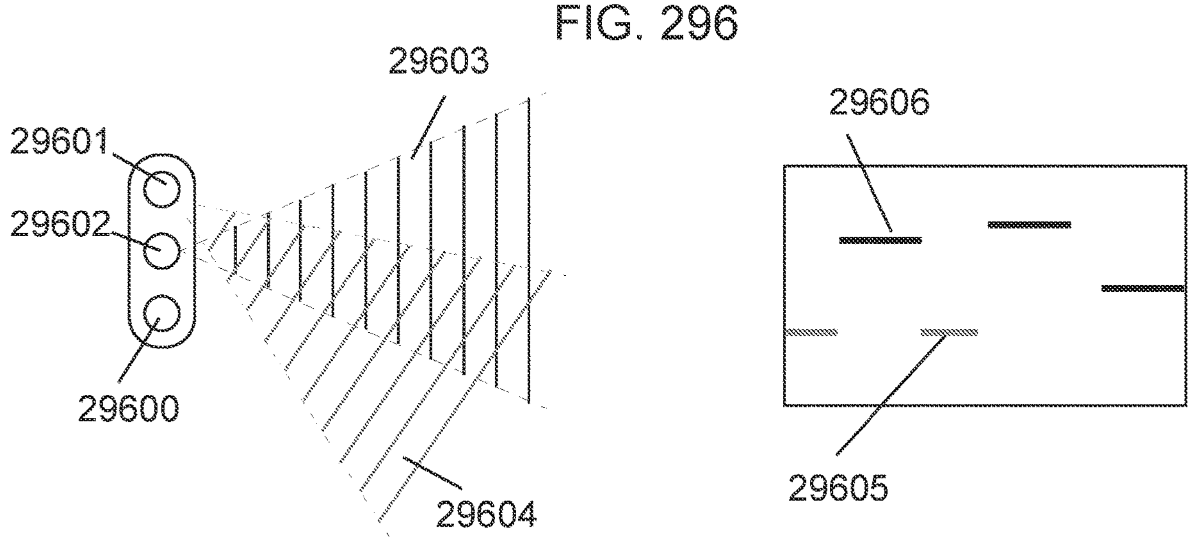

FIG. 296 illustrates a camera and two line lasers at different angles.

Figure 297:
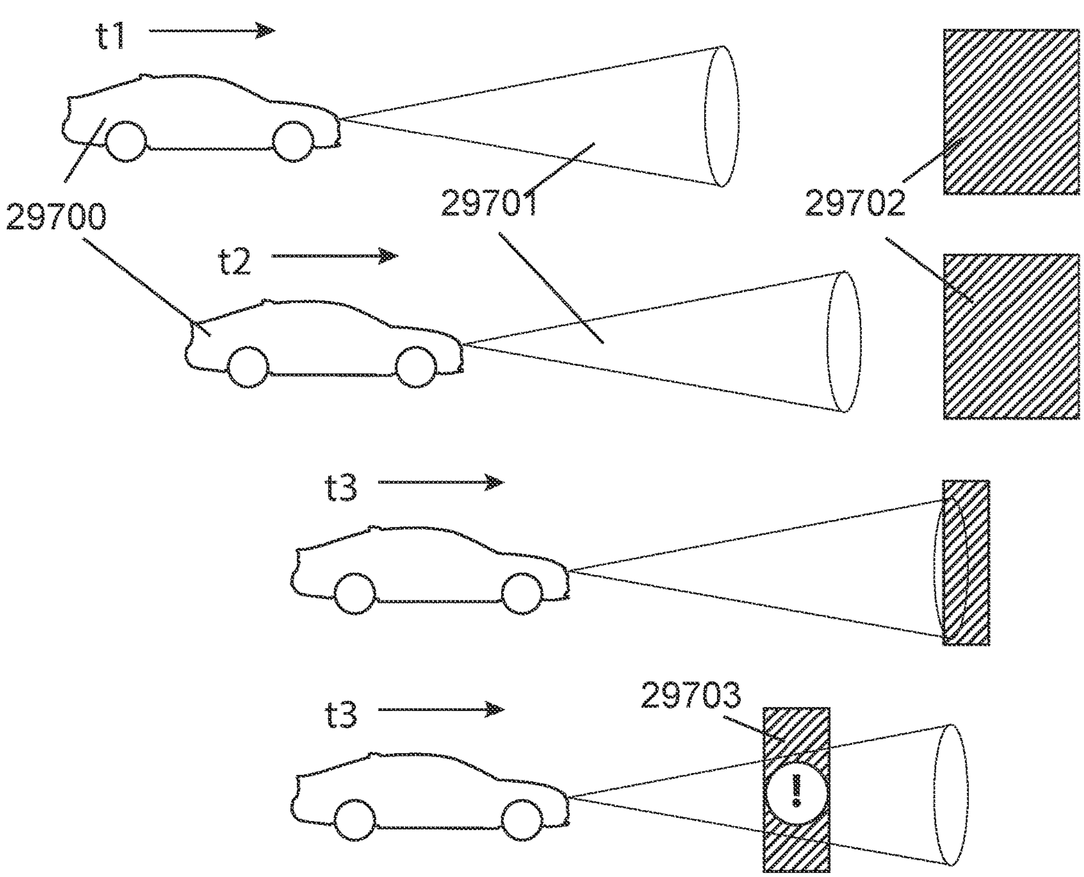

FIG. 297 illustrates an autonomous vehicle and a conical FOV of a camera of the vehicle at different time points.

FIG. 298A-298B illustrate the robot with two cameras looking the opposite ways passing by an object.

FIG. 299A illustrates an autonomous car with two cameras looking the opposite ways.

FIG. 299B illustrates an autonomous car with two cameras looking the opposite ways with overlapping FOVs.

Figure 299C:
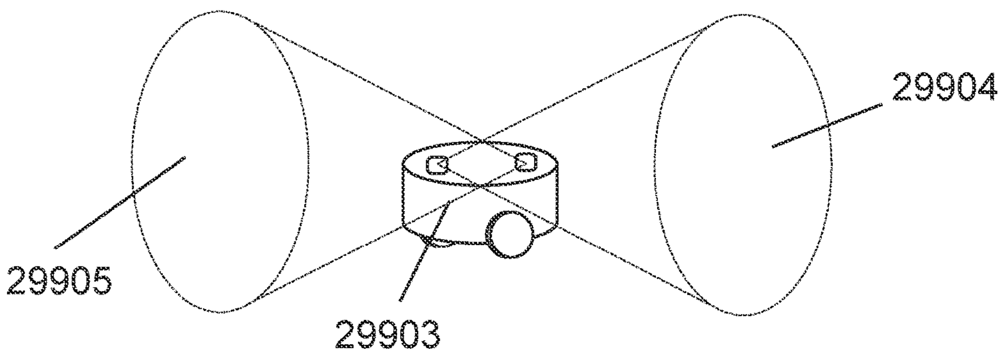

FIG. 299C illustrates an example of a robot with two cameras looking the opposite ways with overlapping FOVs.

Figure 300:
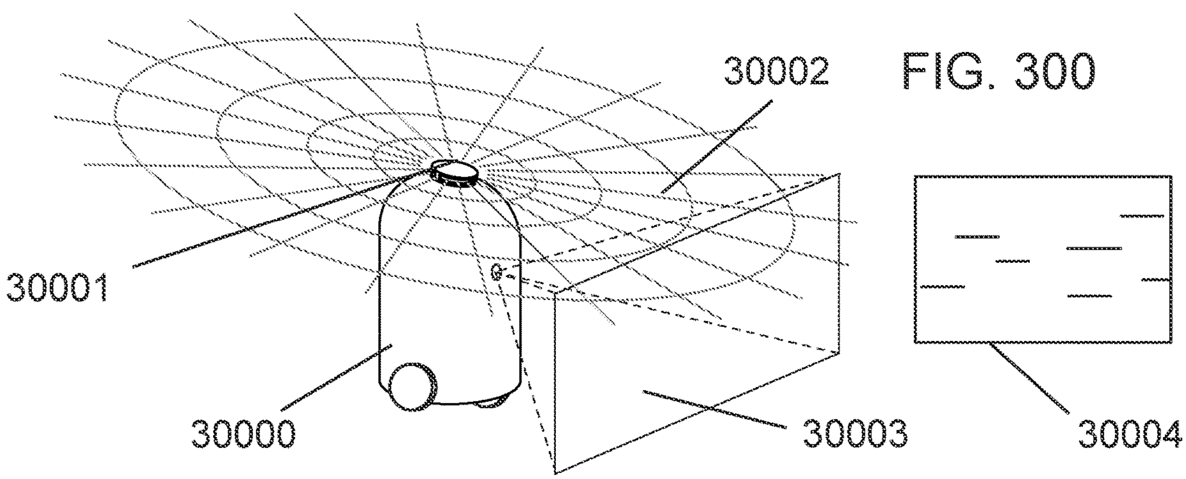

FIG. 300 illustrates an example of a robot with a LIDAR scanning at an angle towards the horizon. The beams of the LIDAR fall within a FOV of a camera of the robot.

Figure 301:
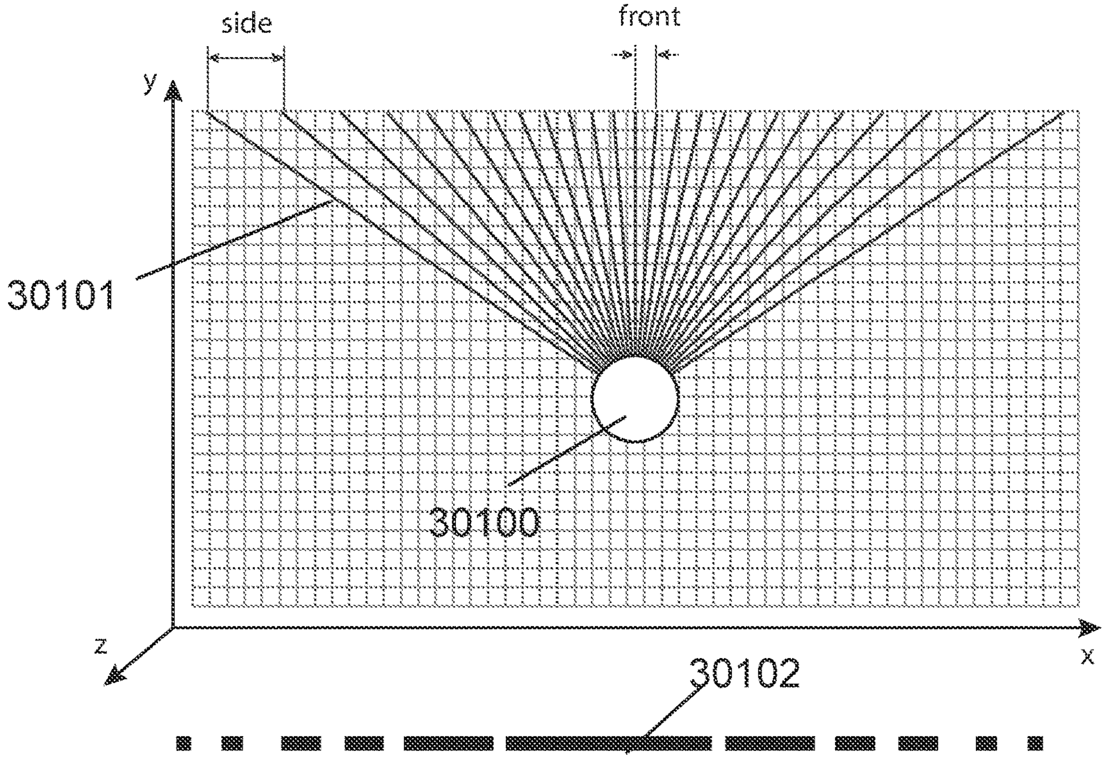

FIG. 301 illustrates an example of a robot emitting light rays. The light rays to the front are closer together than the light rays to the side.

Figure 302:
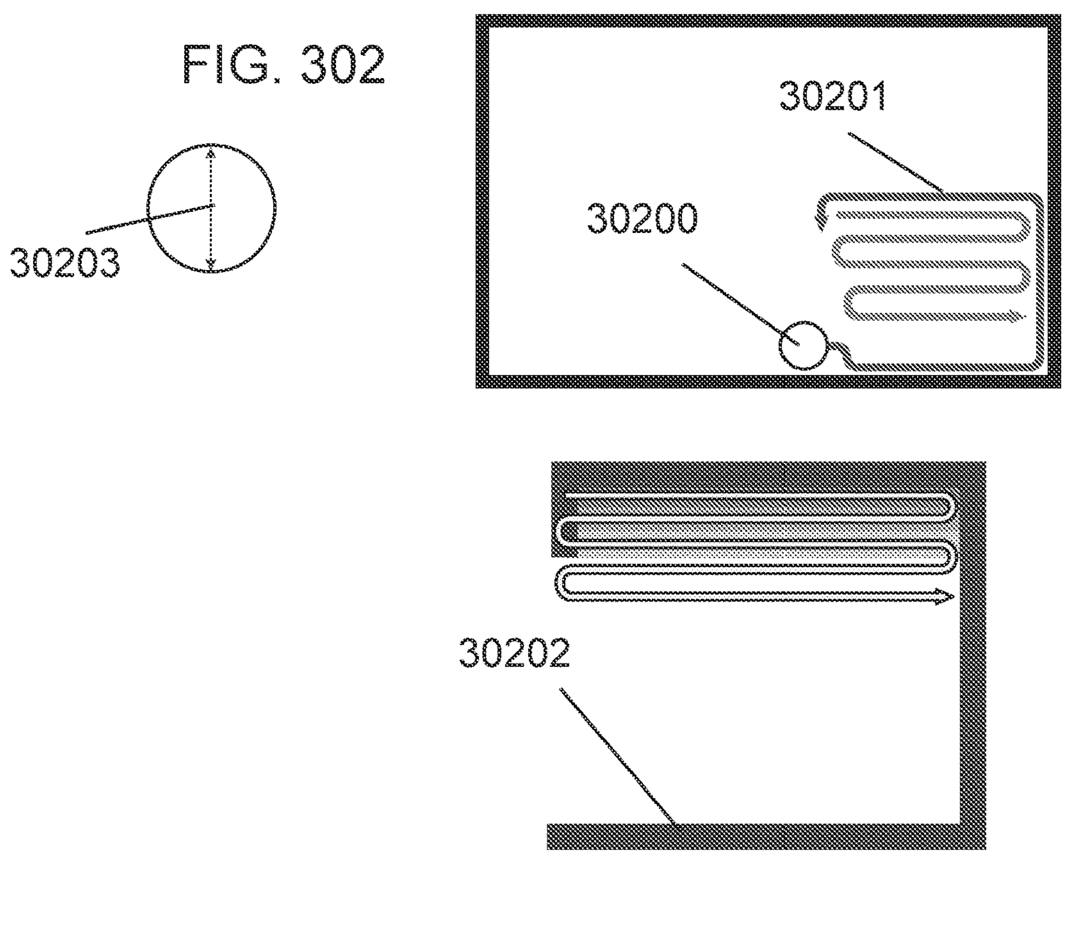

FIG. 302 illustrates a robot 30200 executing a wall follow path.

Figure 303A:
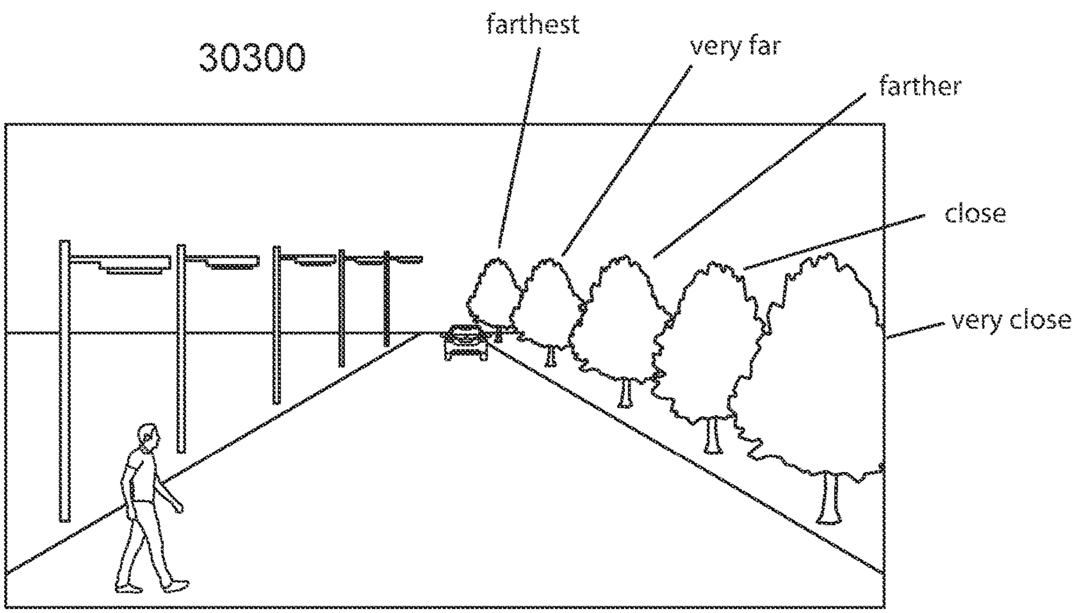

FIG. 303A illustrates an image captured with various objects at different depths.

Figure 303B:
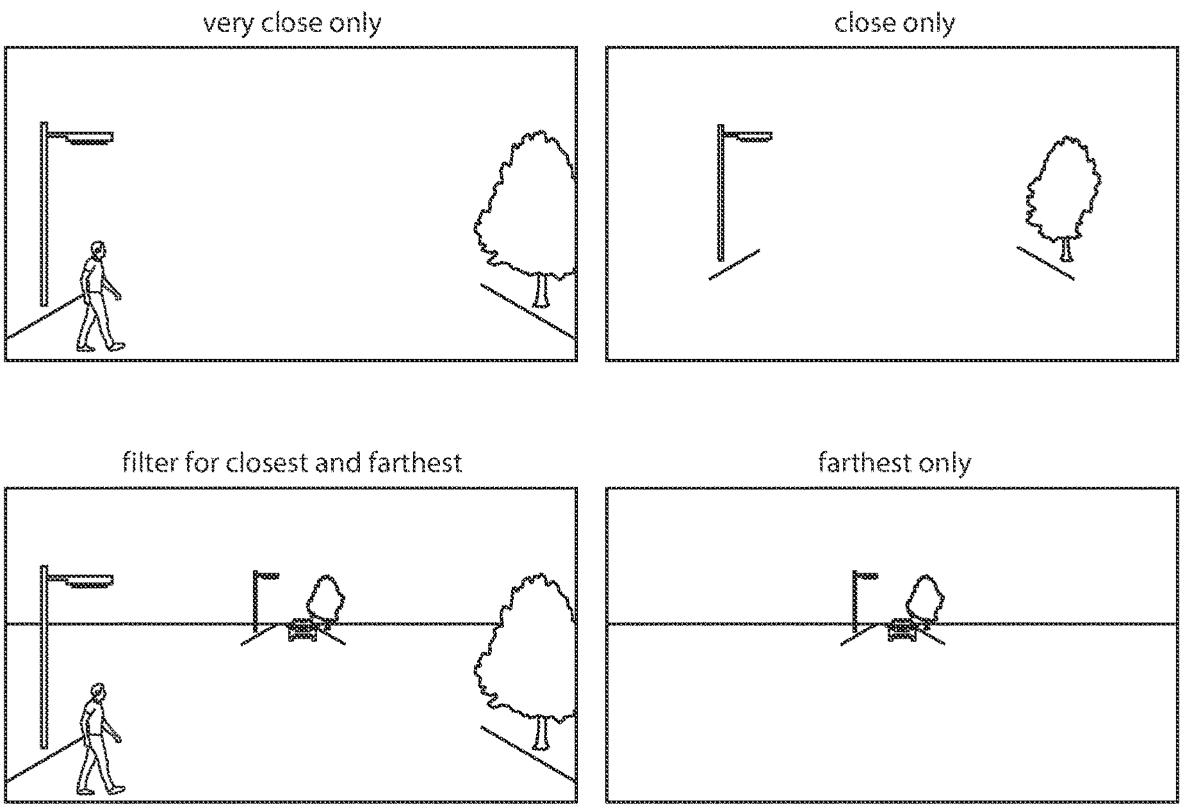

FIG. 303B illustrates the image filtered based on the depth values.

Figure 303C:
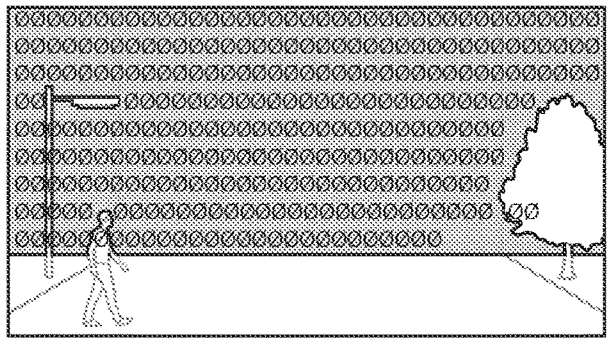

FIG. 303C illustrate portions of the image that include close objects.

Figure 303D:
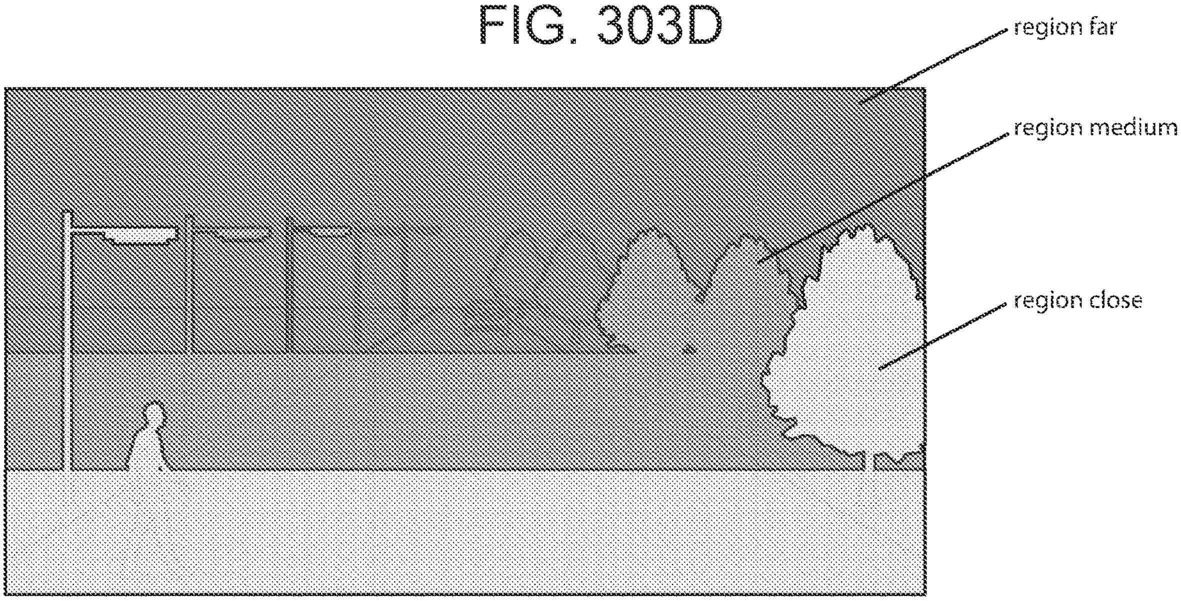

FIG. 303D illustrates segments of the image that belong to different depth regions.

Figure 303E:
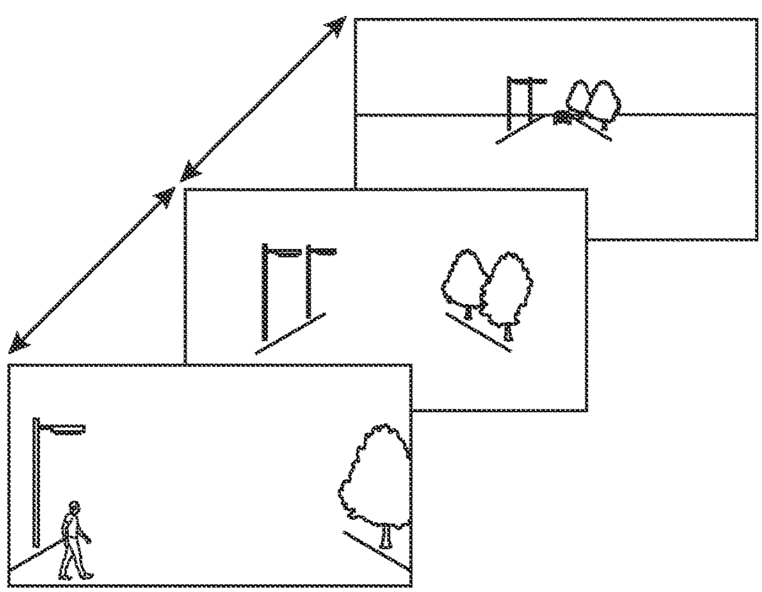

FIG. 303E illustrates an image separated into three different depth layers.

Figure 303F:
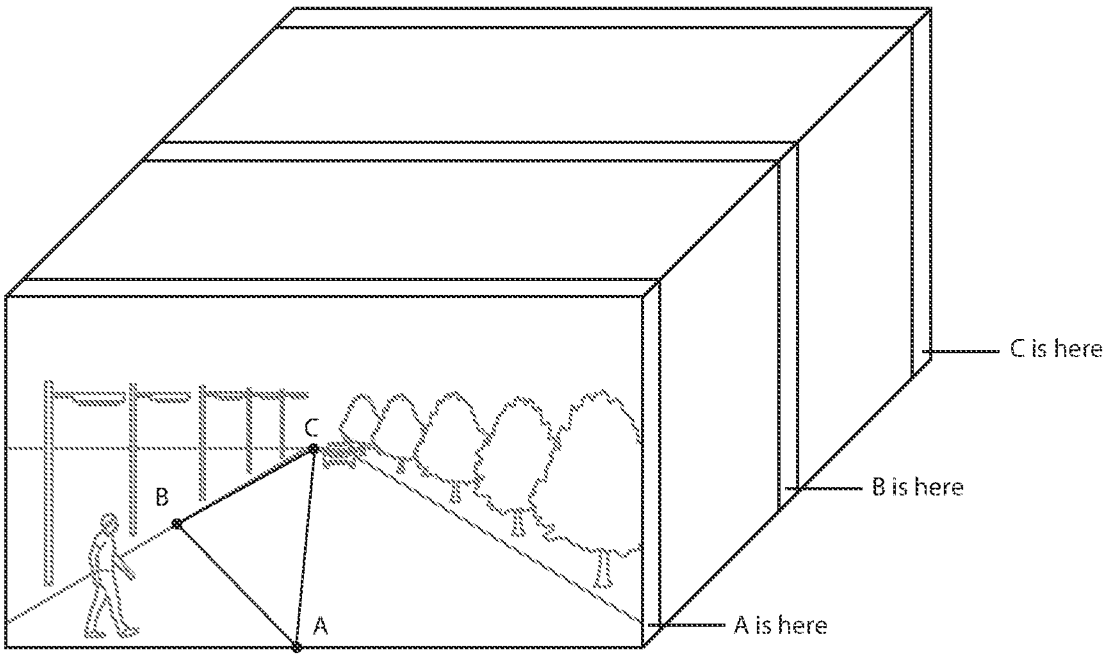
Figure 303G:
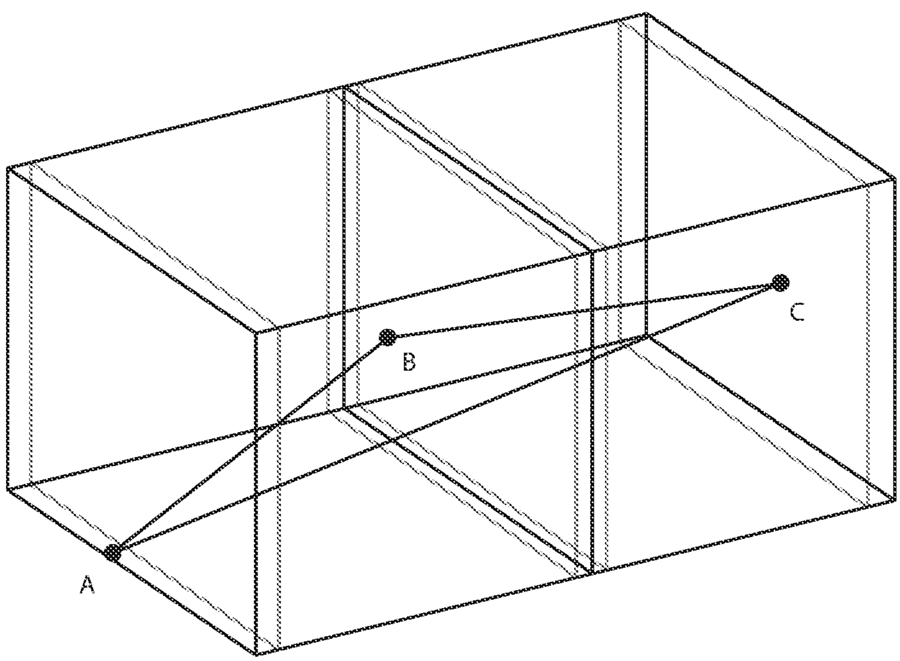

FIGS. 303F-303G illustrate three points A, B, C within the image and each of their depths in different depth layers.

Figure 304:
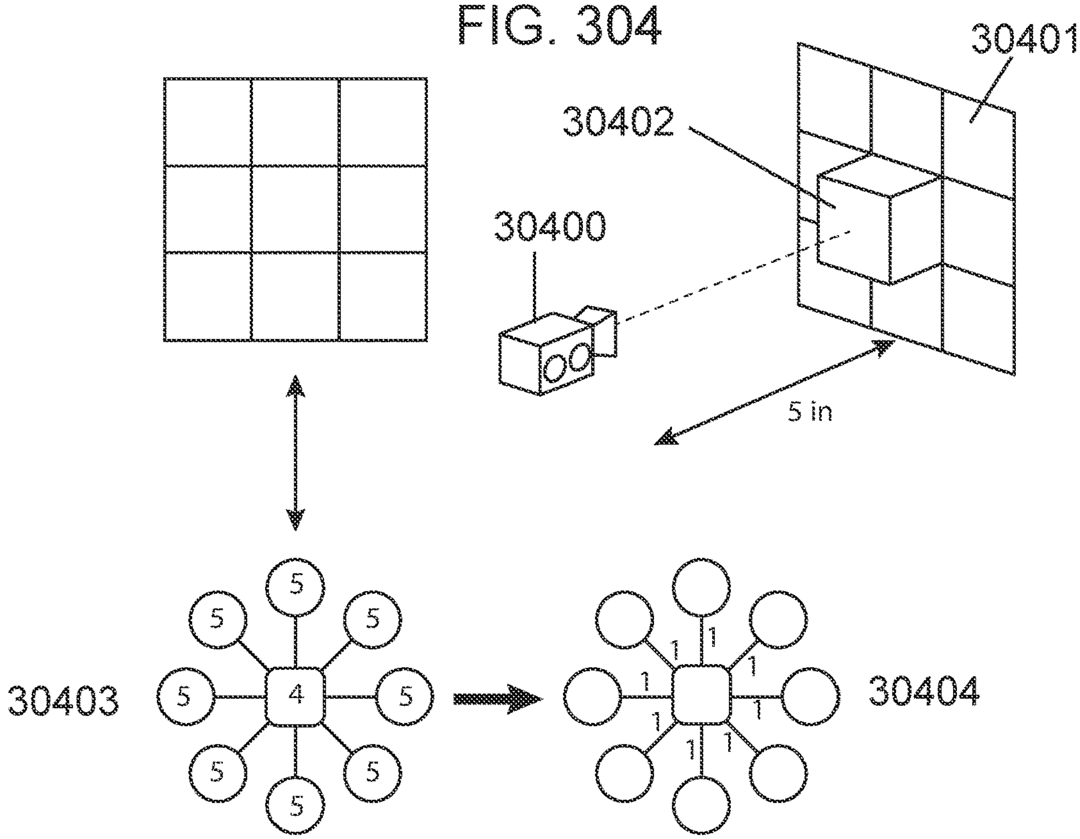

FIG. 304 illustrates a camera at resolution of 9 pixels capturing a picture of a plane with one toy block glued in the middle.

Figure 305:
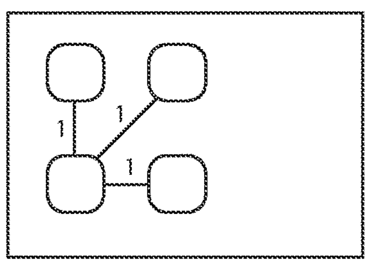

FIG. 305 illustrates 4 points and their depth relation in a larger array of pixels.

Figure 306:
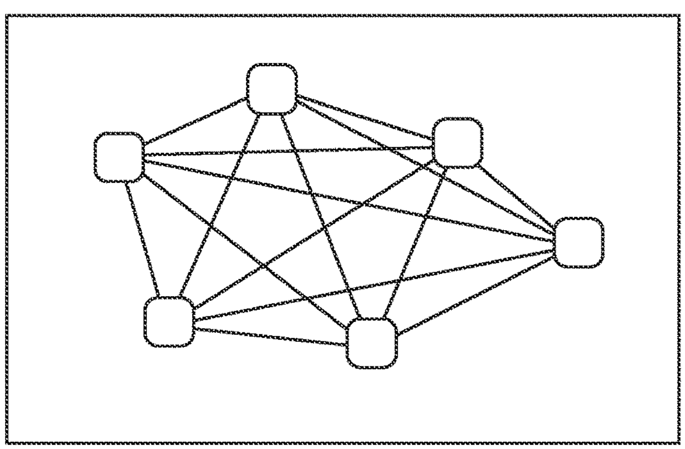

FIG. 306 illustrates many points and their depth relation in a larger array of pixels.

FIG. 307 illustrates how the image changes as the camera moves from a first angle to a third angle.

FIG. 308 illustrates a visual representation of a 3D room in 2D.

FIGS. 309A and 309B illustrate a robot with two depth sensors at two different time slots.

FIGS. 310A-310B illustrate an example of a neural network output after training the system.

FIG. 311 illustrates different features the image and their locations indifferent depth layers.

FIG. 312A-312B illustrates the robot with two depth sensors measuring depth of different features in different time slots.

Figure 313:
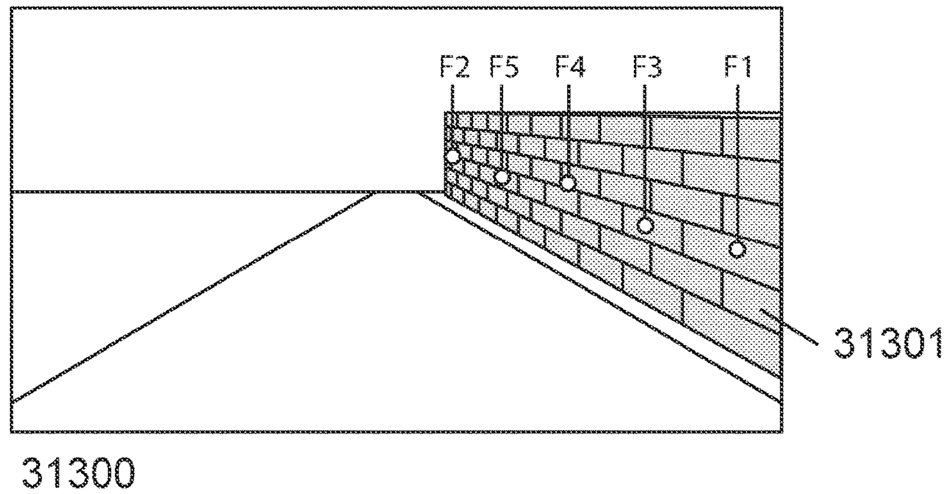

FIG. 313 demonstrates an image comprising a continuous wall of a single color.

Figure 314:
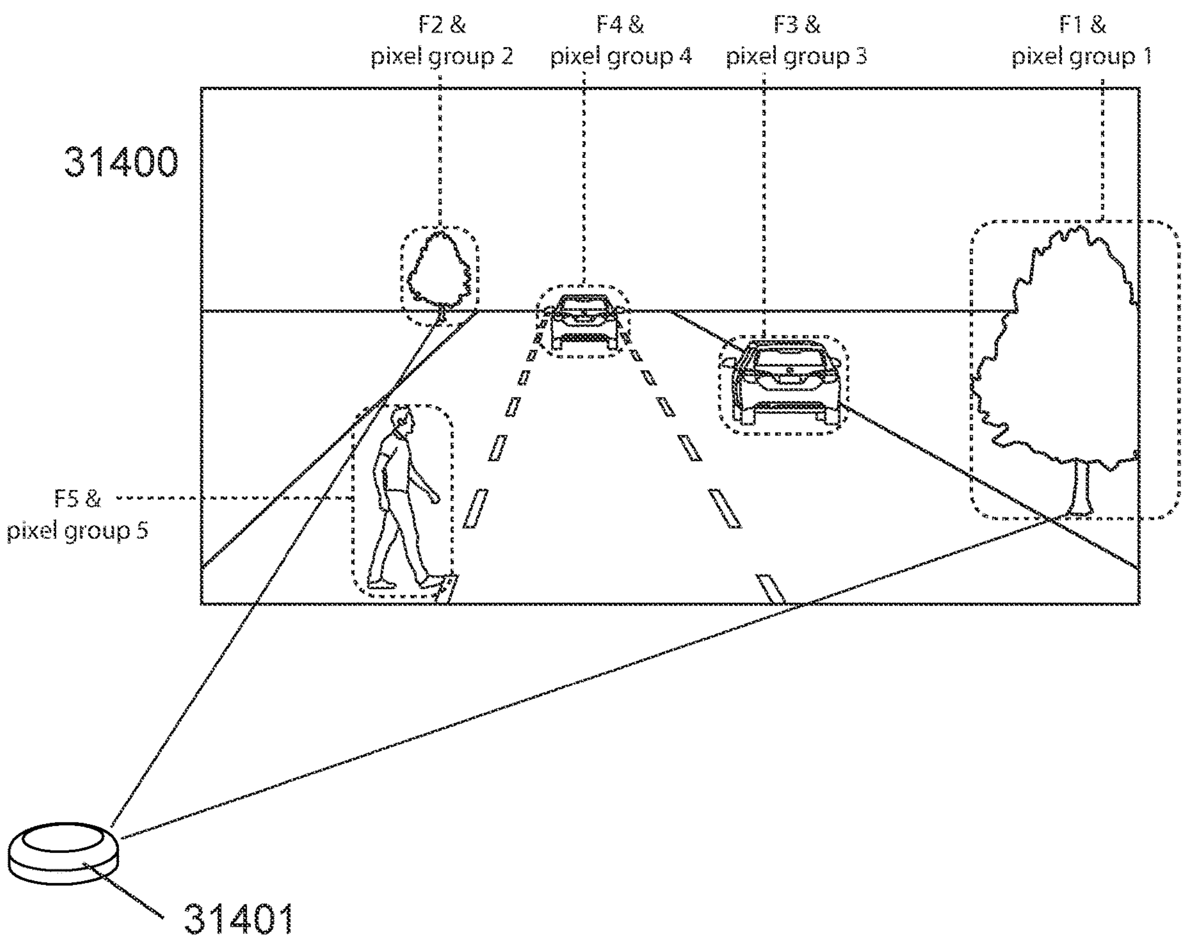

FIG. 314 illustrates the POV of a robot. Different pixel groups are assigned to different features.

Figure 315:
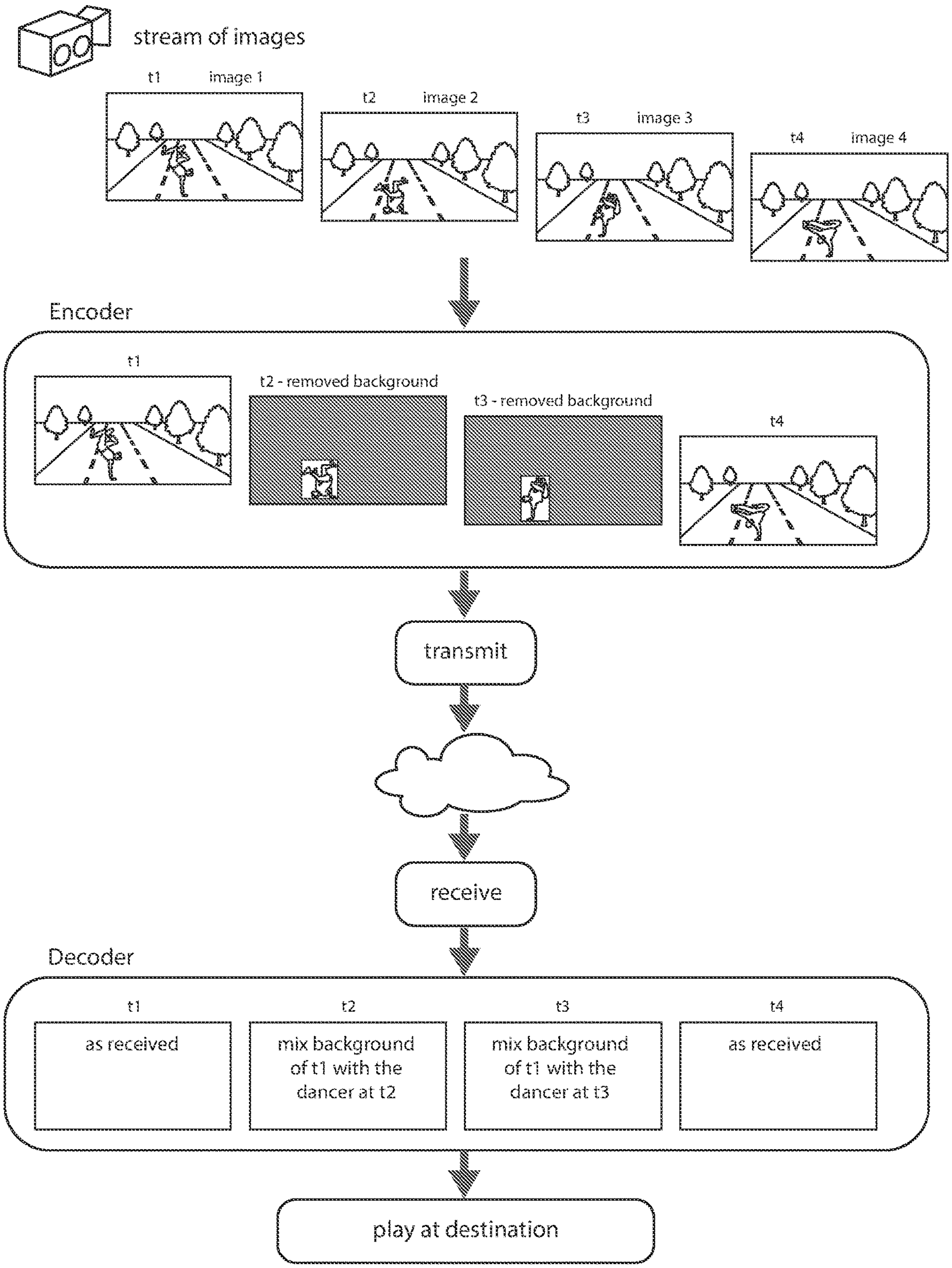

FIG. 315 illustrates a flowchart of a process of encoding and decoding an image stream.

Figure 316:
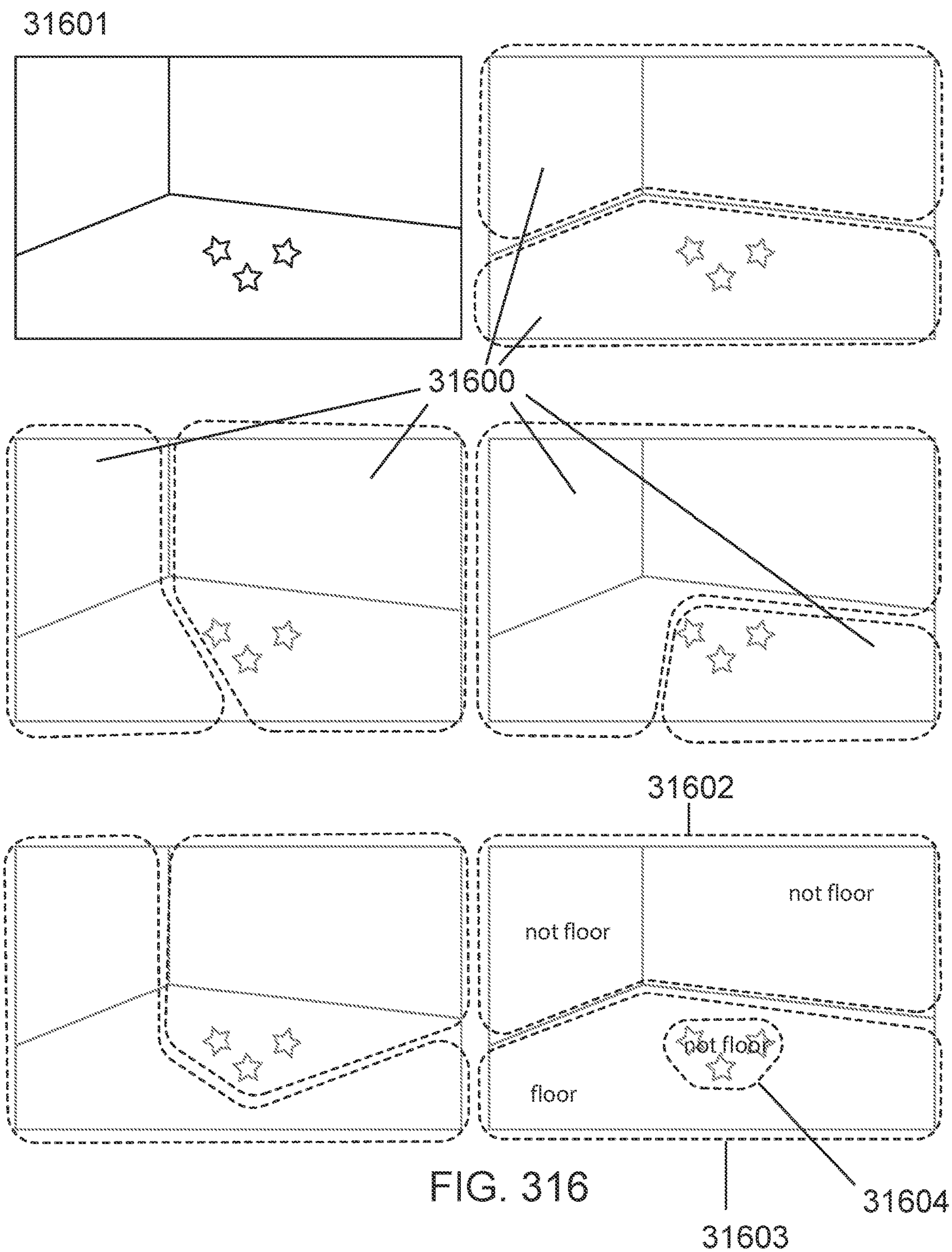

FIG. 316 illustrates different segmentations of an image to determine groups having similar features.

Figure 317:
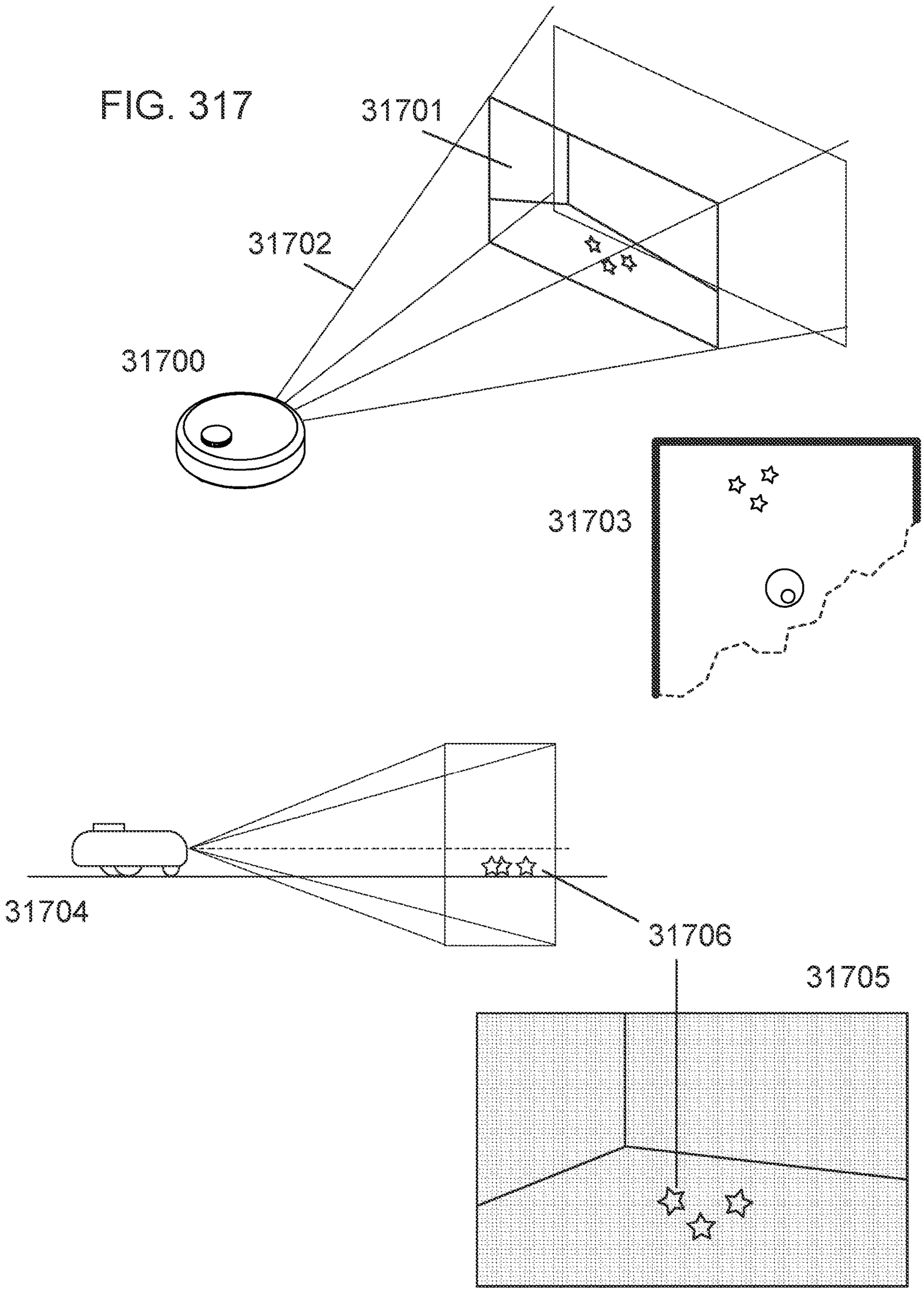

FIG. 317 illustrates a robot and an image captured in a FOV of a camera positioned on the robot and the image captured by the camera.

Figure 318:
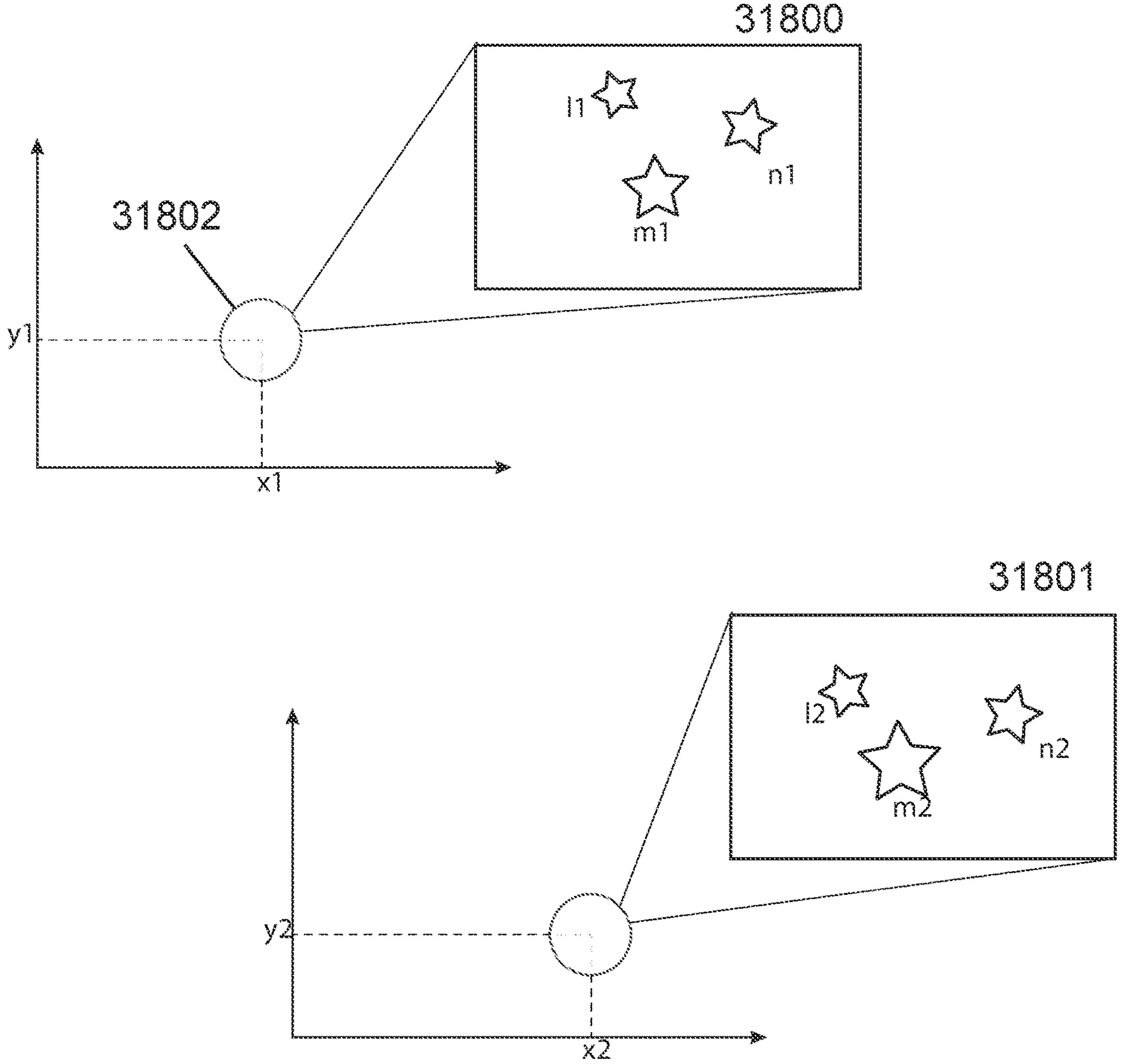

FIG. 318 illustrates images captured by a camera of a robot at two different positions.

FIG. 319A illustrates a representation of a three-dimensional matrix of the map at different time points.

FIG. 319B illustrates the results of minimizing the cost function.

FIG. 319C illustrates slices of three-dimensional matrix of the map.

Figure 320A:
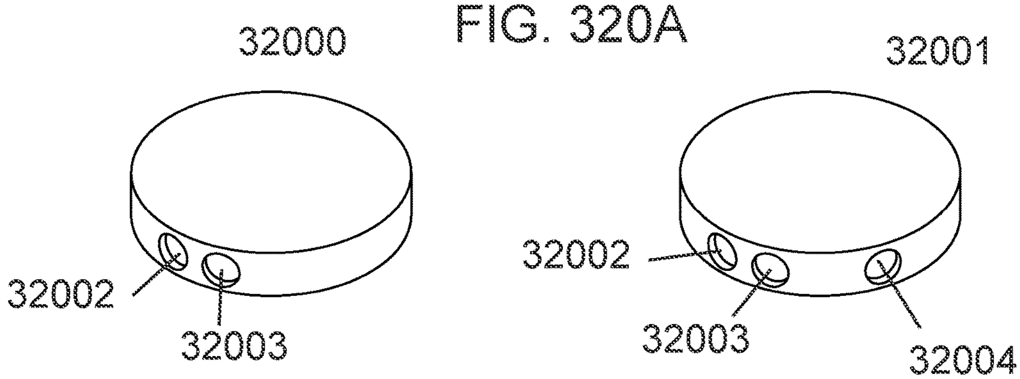

FIG. 320A illustrates different variations of a LIDAR.

Figure 320B:
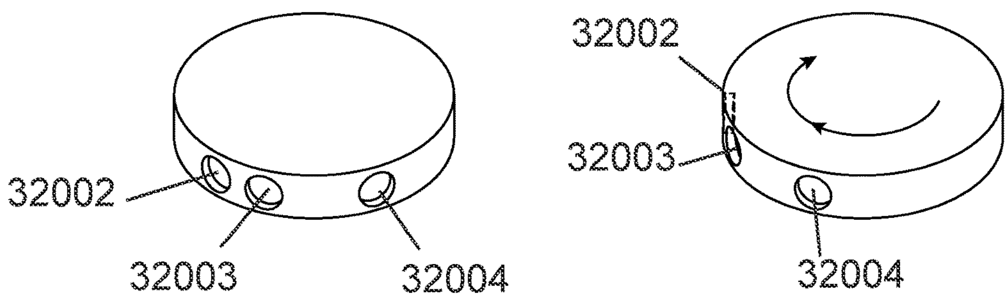

FIG. 320B illustrates the LIDAR at two different time slots.

Figure 320C:
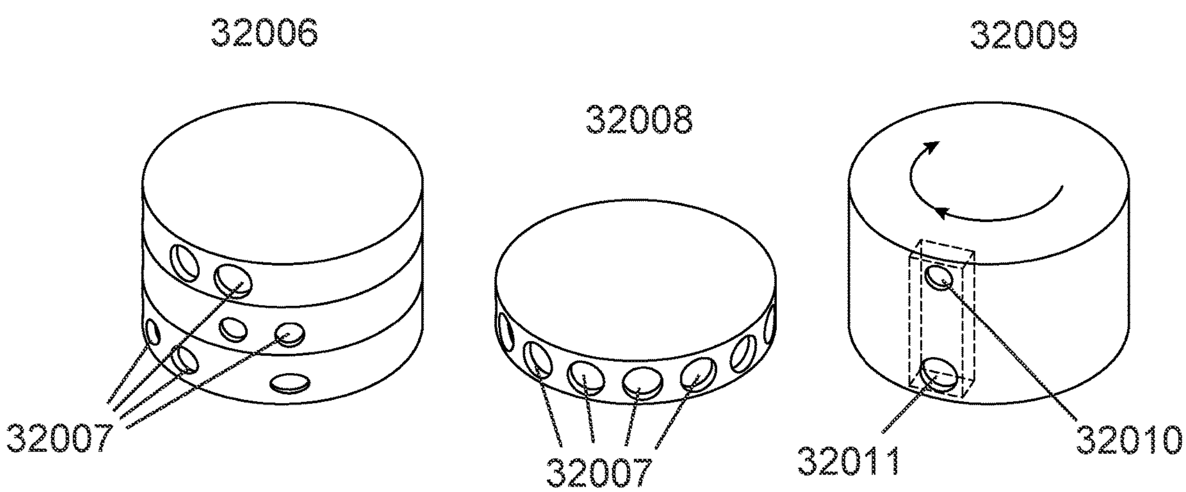

FIG. 320C illustrates examples of variations on cameras, depth measuring system combination on LIDAR.

Figure 321:
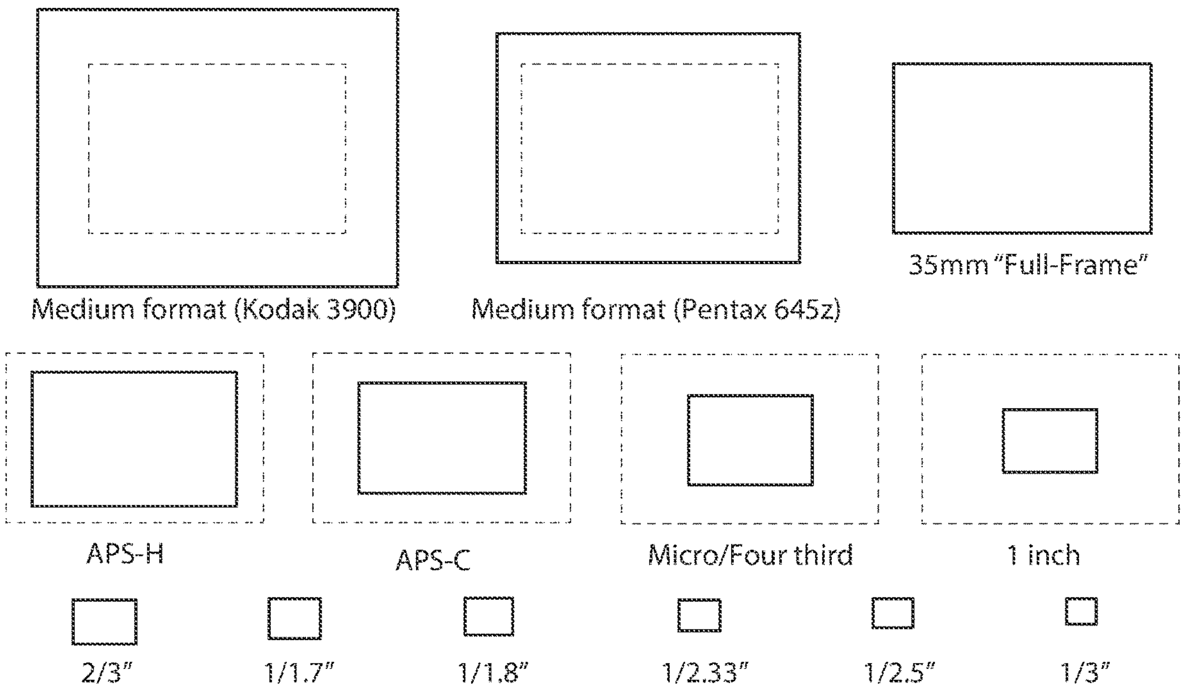

FIG. 321 illustrates examples of different sensor formats and sizes in comparison to each other.

Figure 322:
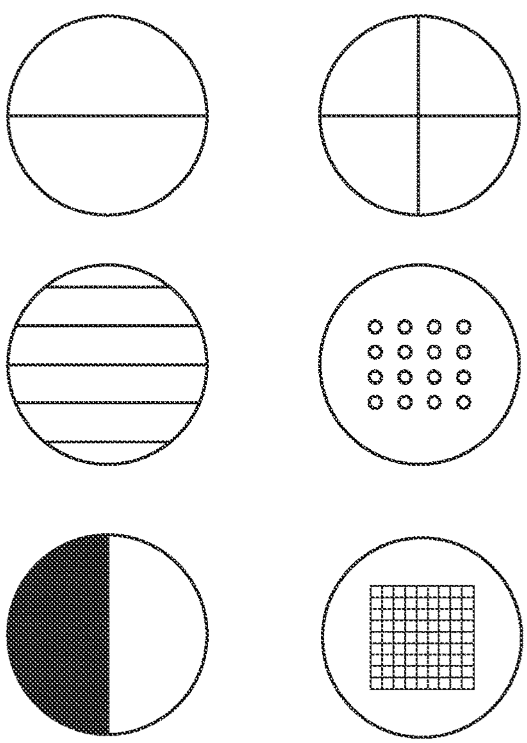

FIG. 322 illustrates examples of different structured light patterns.

Figure 323A:
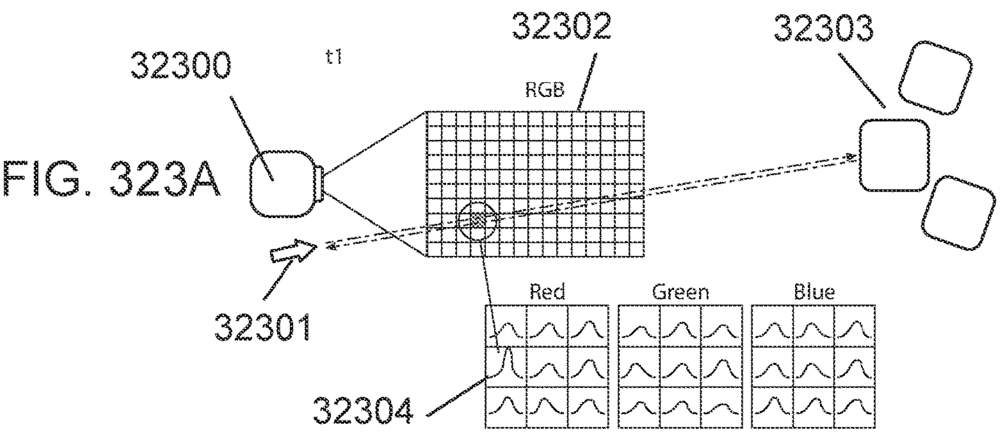
Figure 323B:
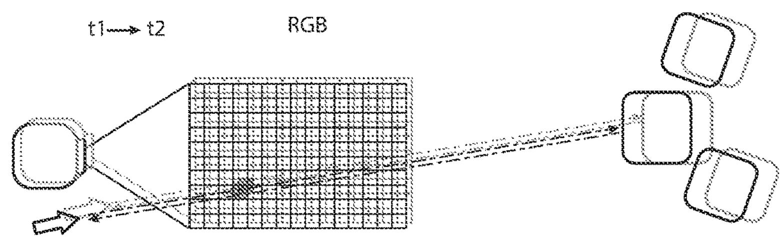

FIG. 323A-323B illustrate a camera with laser beam and RGB image data from observing an object at times t1 and t2.

Figure 324A:
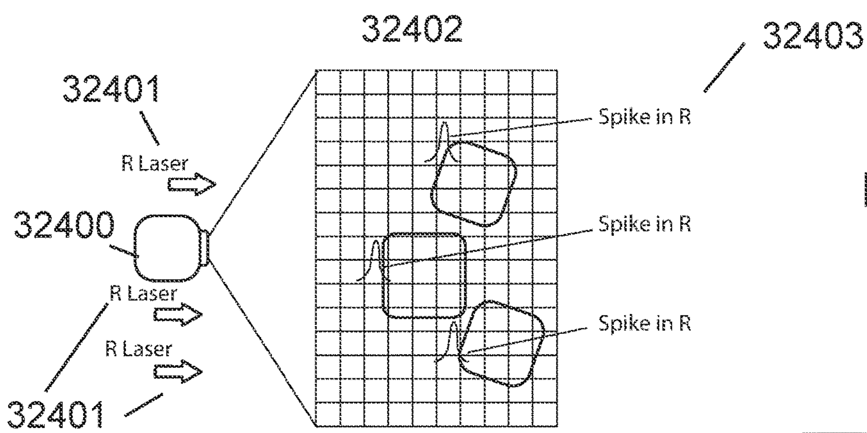

FIG. 324A illustrates camera with three red lasers.

Figure 324B:
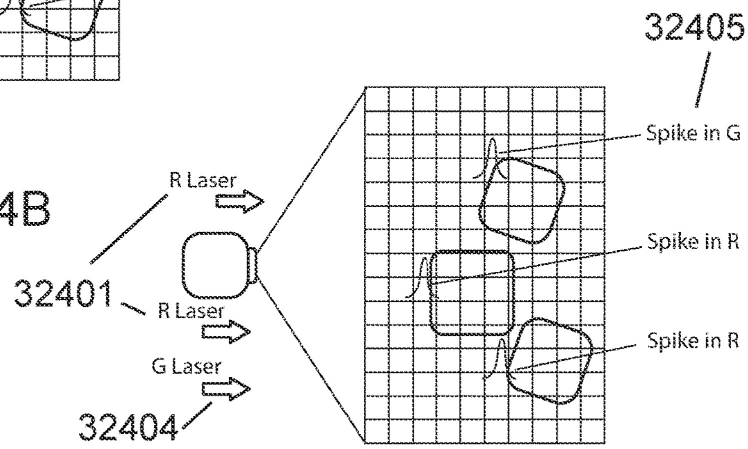

FIG. 324B illustrates camera with two red lasers and one green laser.

Figure 325A:
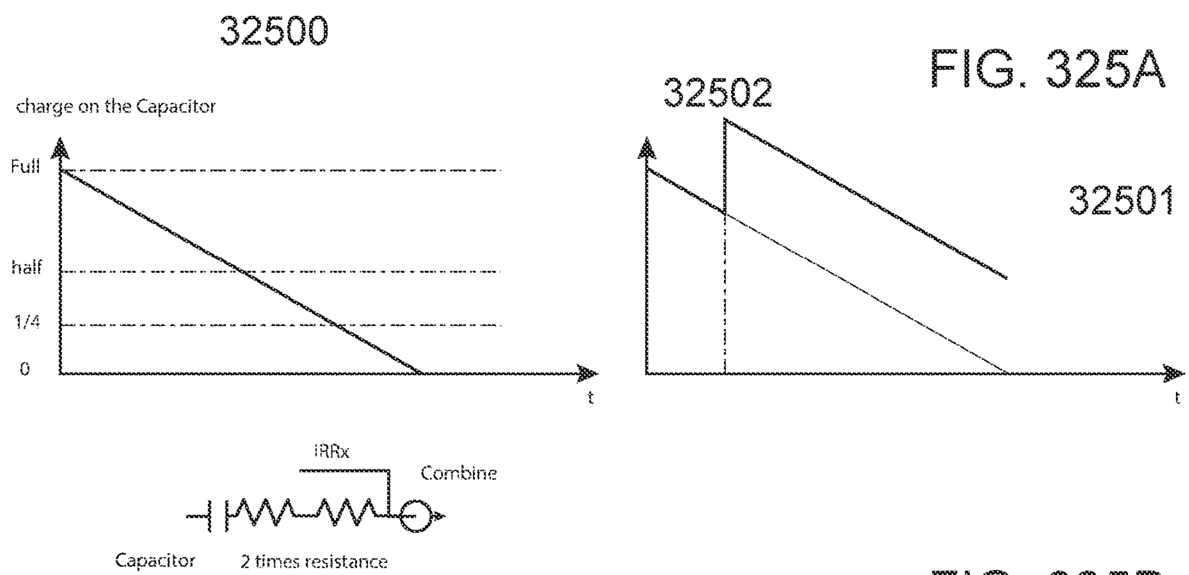
Figure 325B:
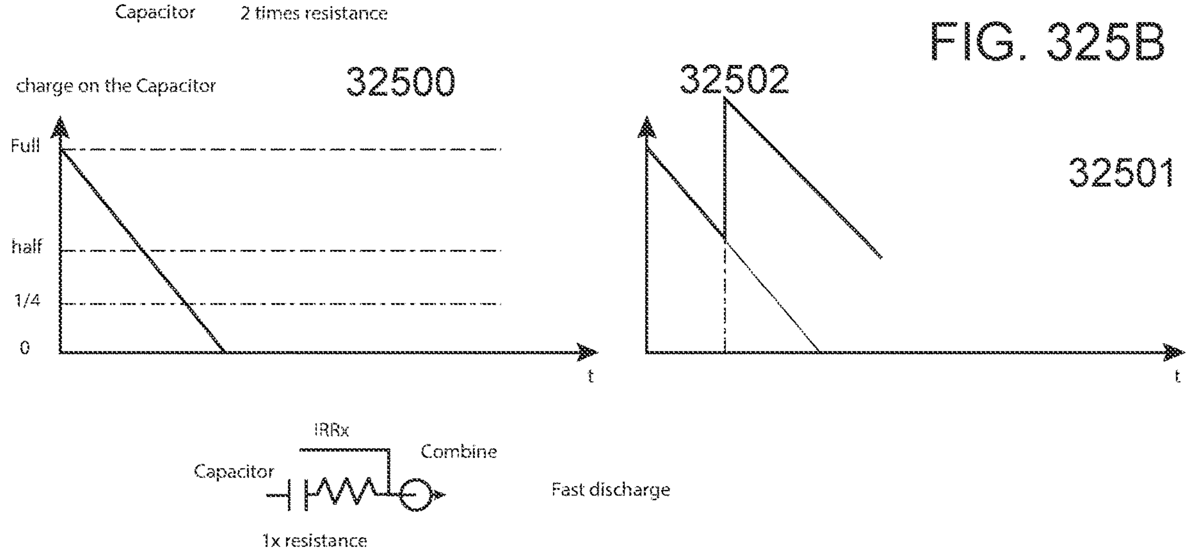
Figure 325C:
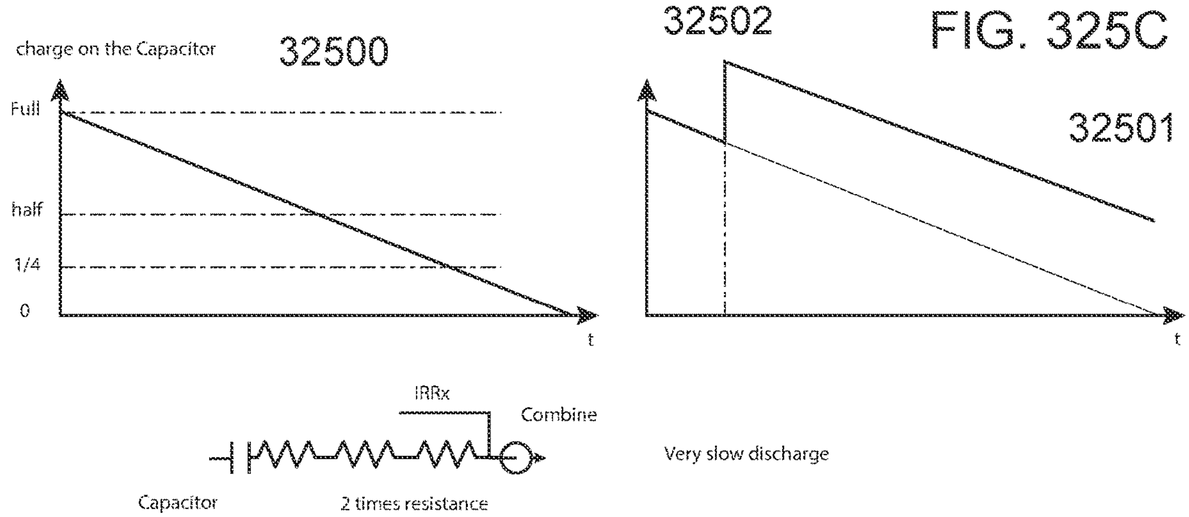

FIGS. 325A-325C illustrate on the left hand side the discharge of a capacitor over time for 1, 2, and 3 times resistance, respectively. It is illustrated on the right hand side that the amount of spike charge could be measured which is correlated with how far the object is.

FIG. 326 illustrates three cameras, each with different shutter speeds.

FIG. 327 illustrates a sensor observing an object.

FIG. 328 illustrates laser diodes, TOF sensor, lens assembly.

Figure 329A:
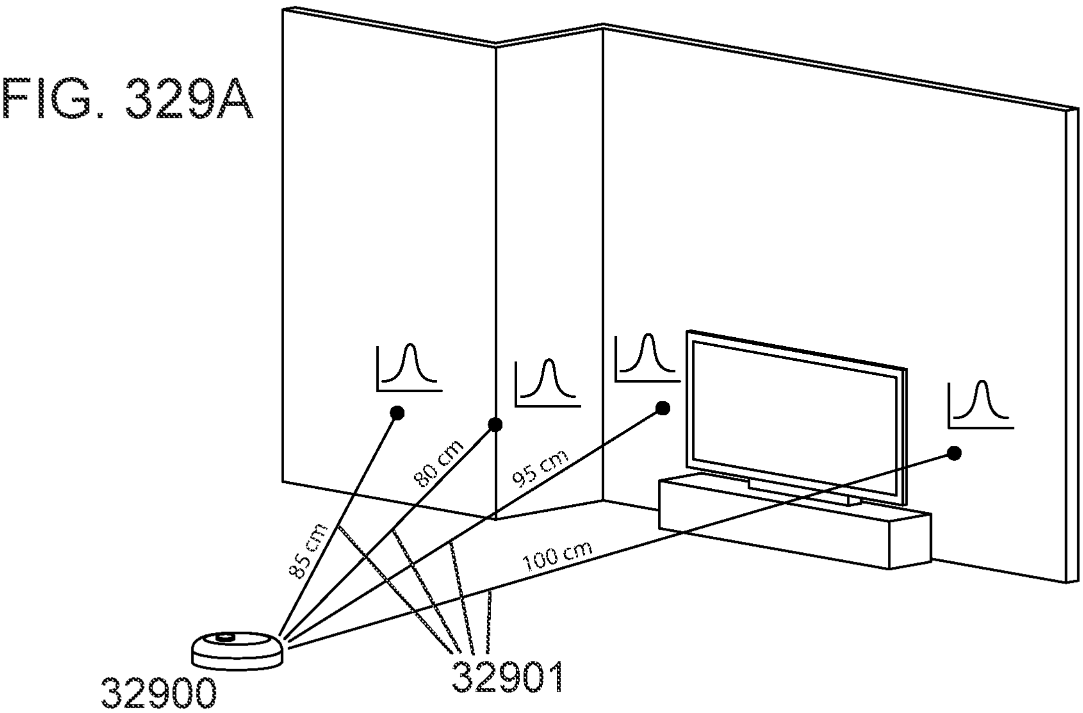

FIG. 329A shows a 3D representation of a robot in an environment measuring 4 different distances.

Figure 329B:
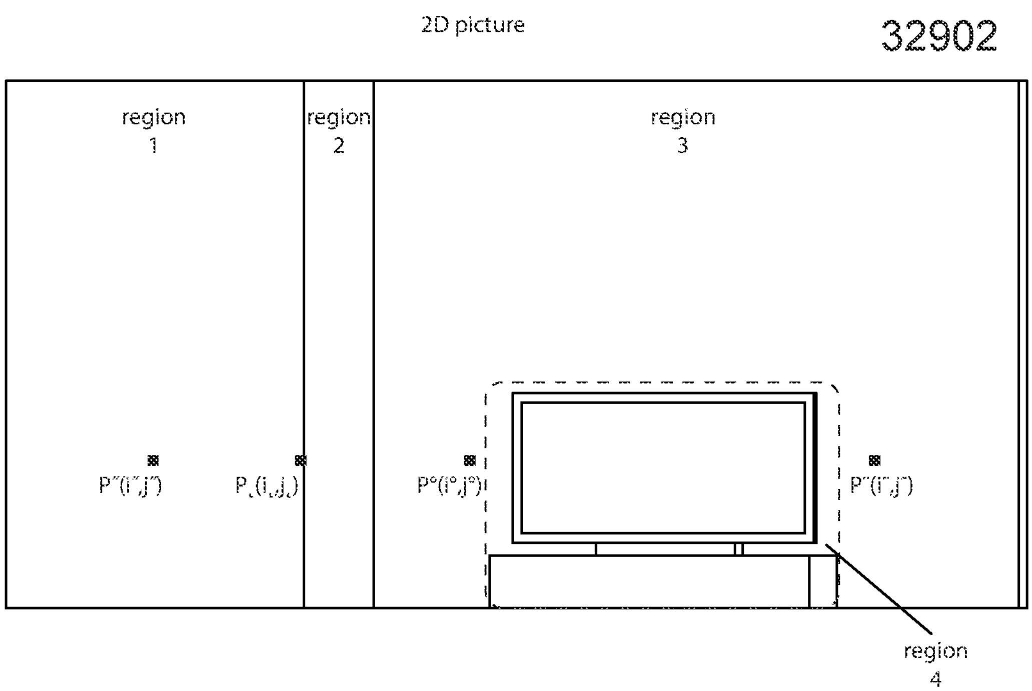

FIG. 329B shows the robot's POV.

Figures 330, 331:
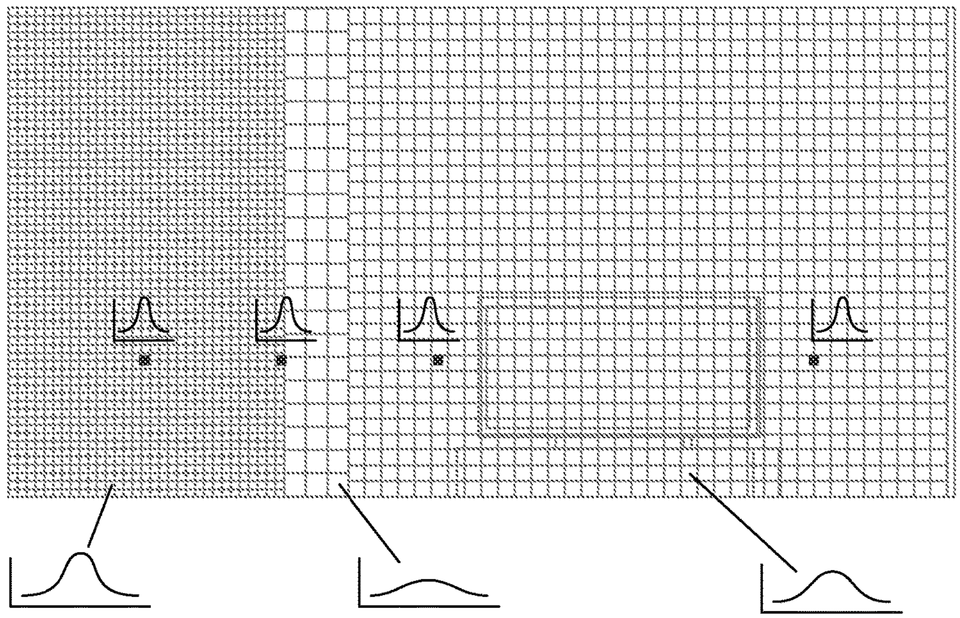

FIG. 330 illustrates different regions within robot's POV and their measurement confidence.

FIG. 331 visualizes the gathered information in a table.

Figure 332:
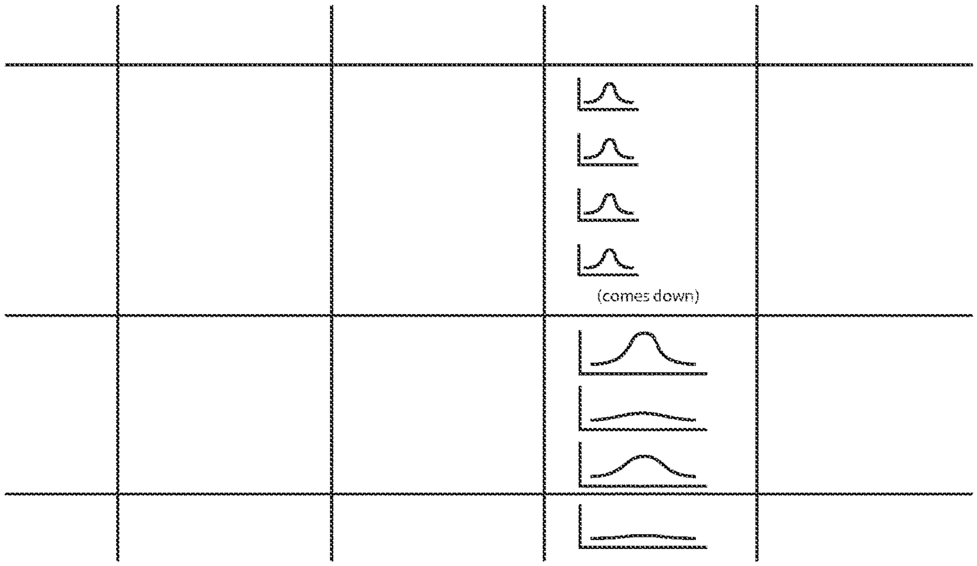

FIG. 332 visualizes the gathered information in a table after robot moves 2 cm.

Figure 333:
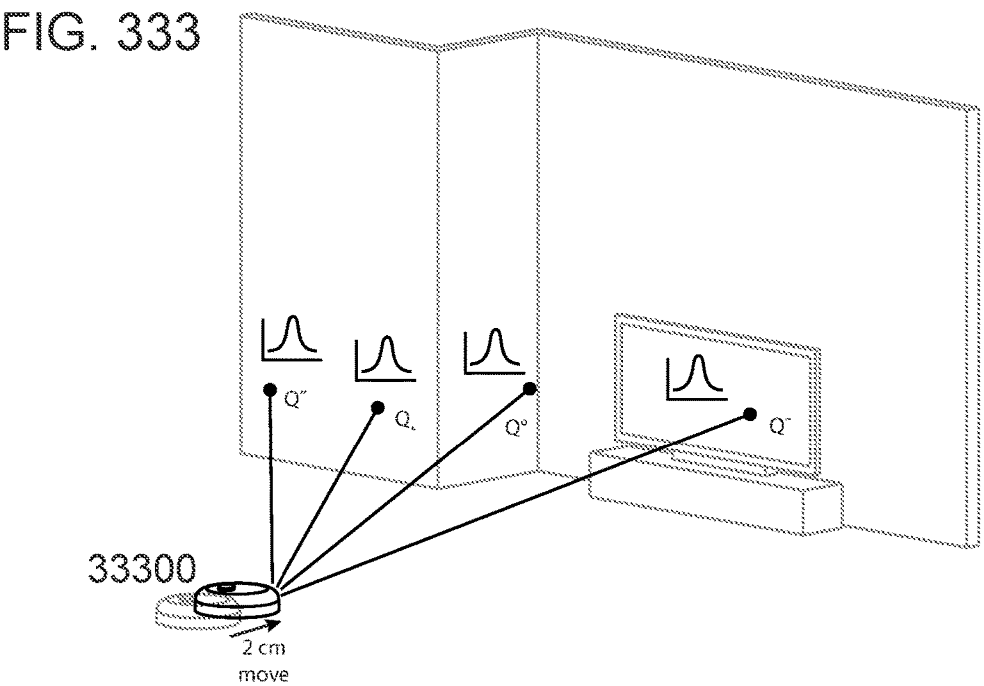

FIG. 333 at time t2, robot is moved 2 cm, 4 new points are measured.

FIG. 334 visualizes the updated table including 4 new measured points.

FIG. 335 illustrates as time passes with more data points collected, we can make the area separation more granular.

FIG. 336 illustrates the horizontal array with data points within the 640×480 grid.

Figure 337:
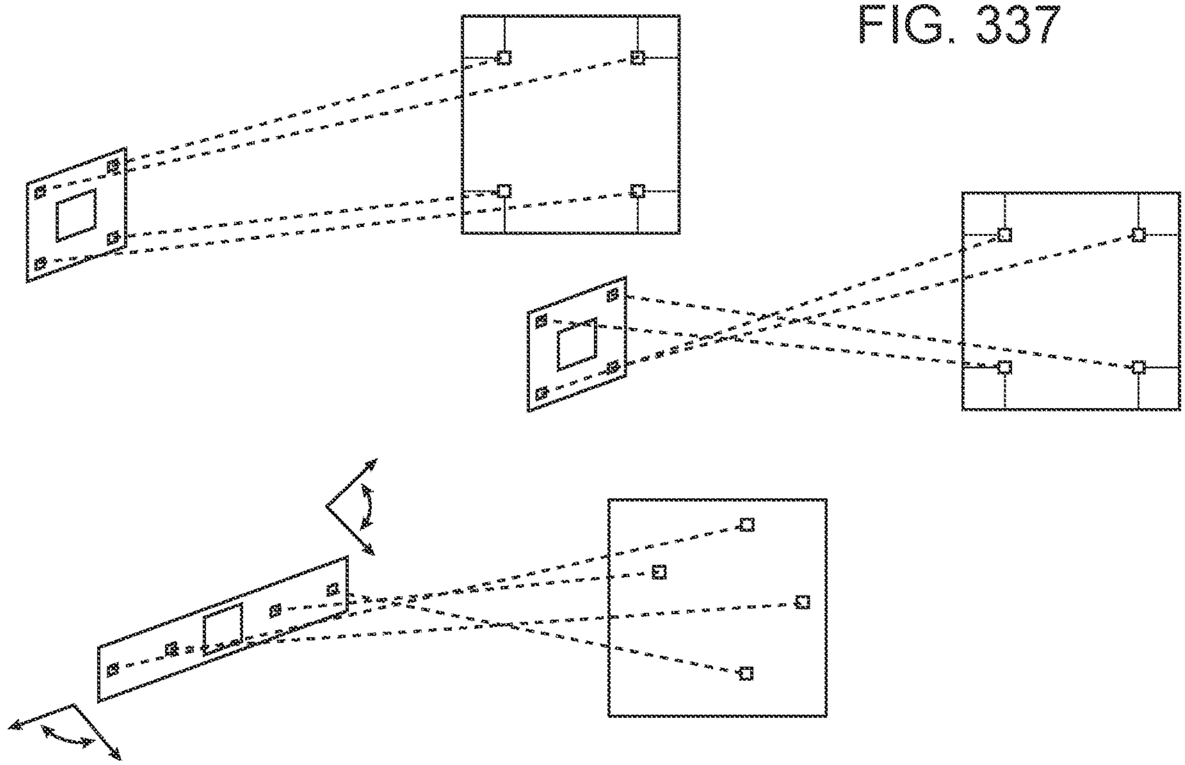

FIG. 337 illustrates examples of different layouts of sensor and CMOS setup and their possible misalignments.

Figure 338:
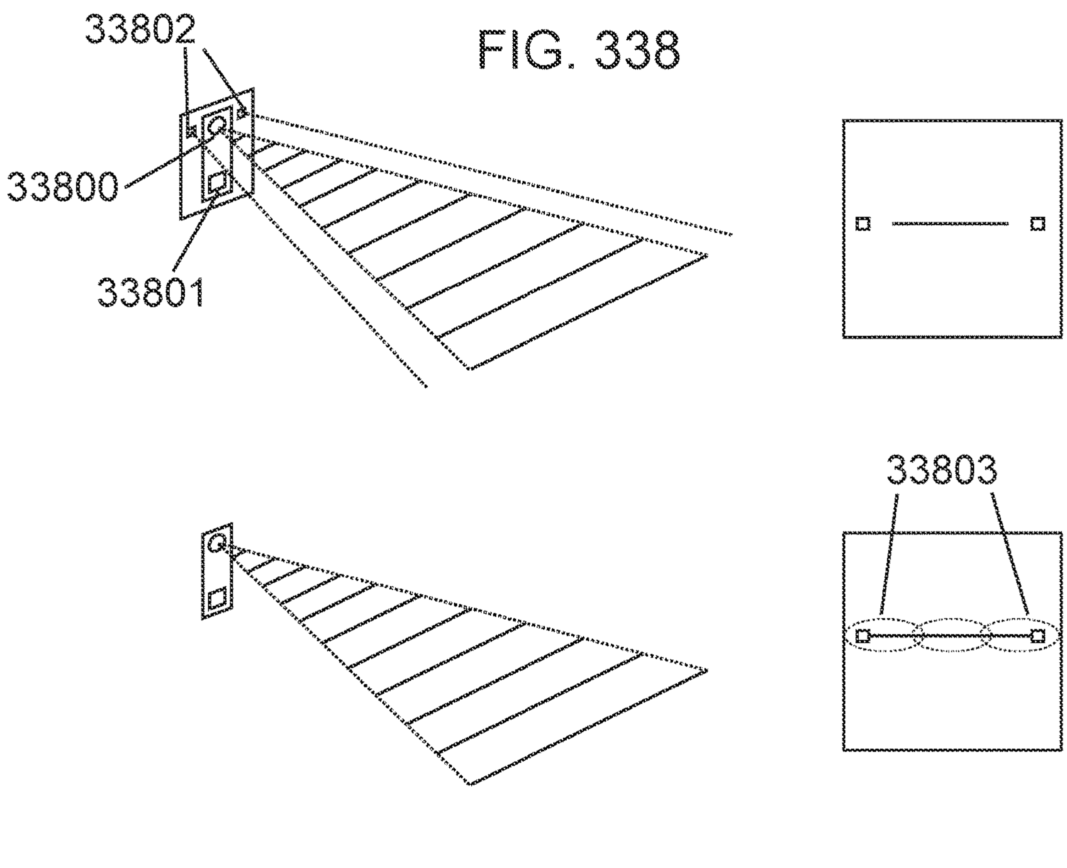

FIG. 338 illustrates a line laser and camera with and without TOF sensors on each side.

Figure 339A:
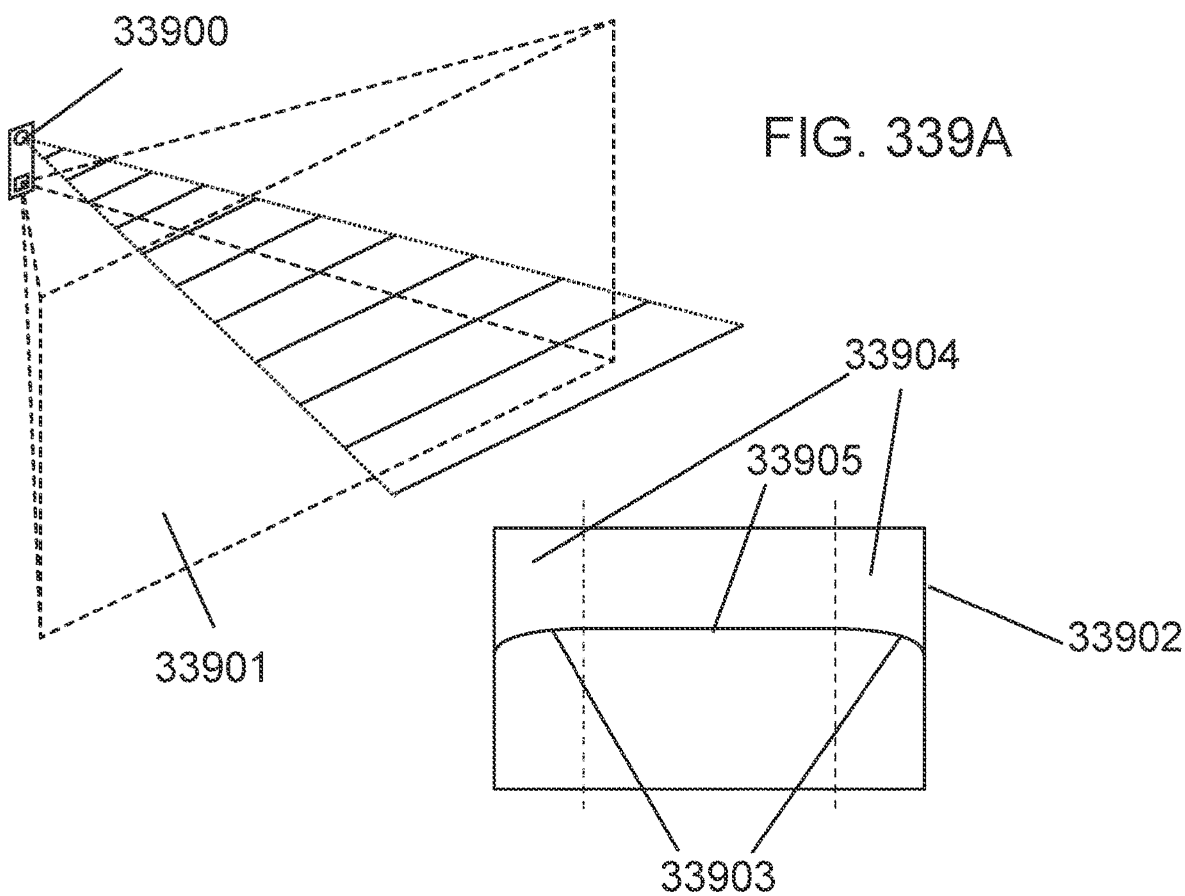

FIG. 339A illustrates a line laser range finder in combination with a wide angle lens camera.

Figure 339B:
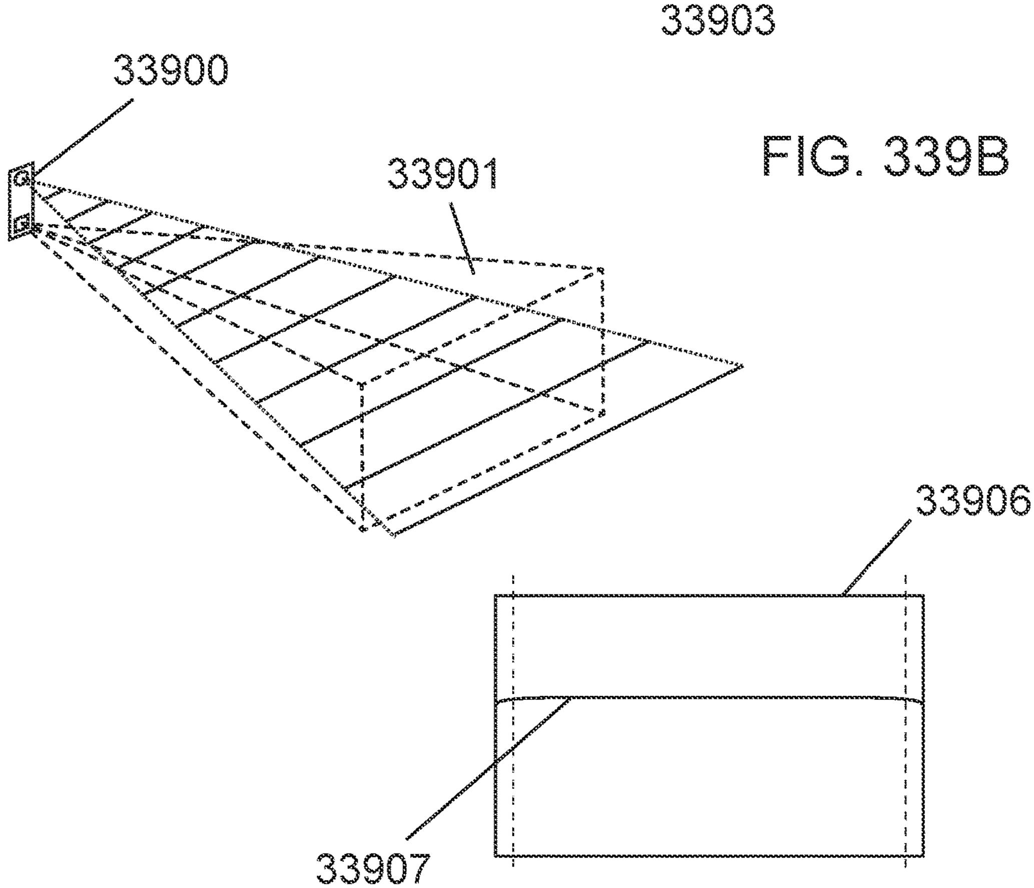

FIG. 339B illustrates a line laser range finder in combination with a narrow lens camera.

Figure 340:
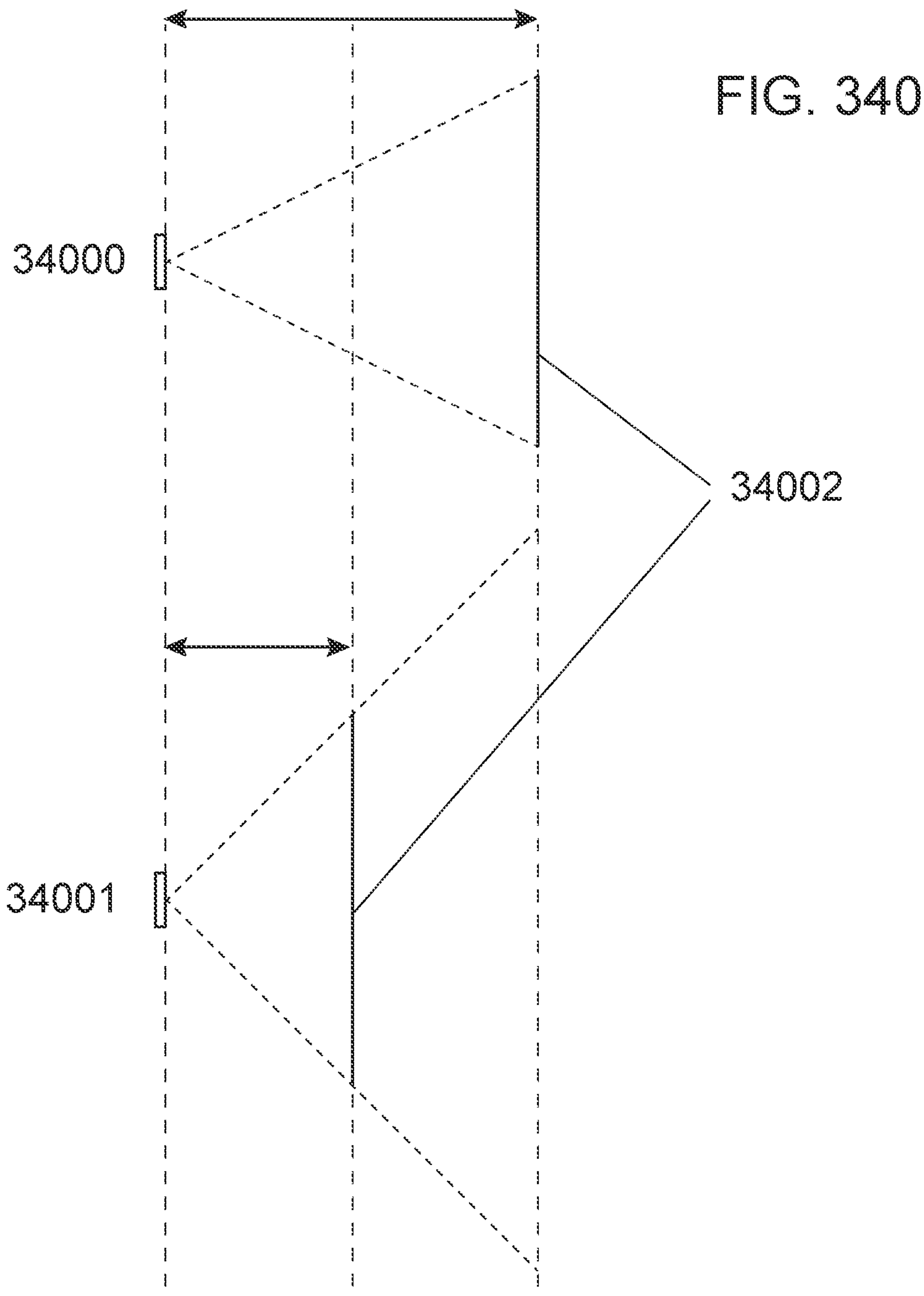

FIG. 340 Compares the line formation in two cameras with 45 degrees field of view and 90 degrees field of view.

Figure 341A:
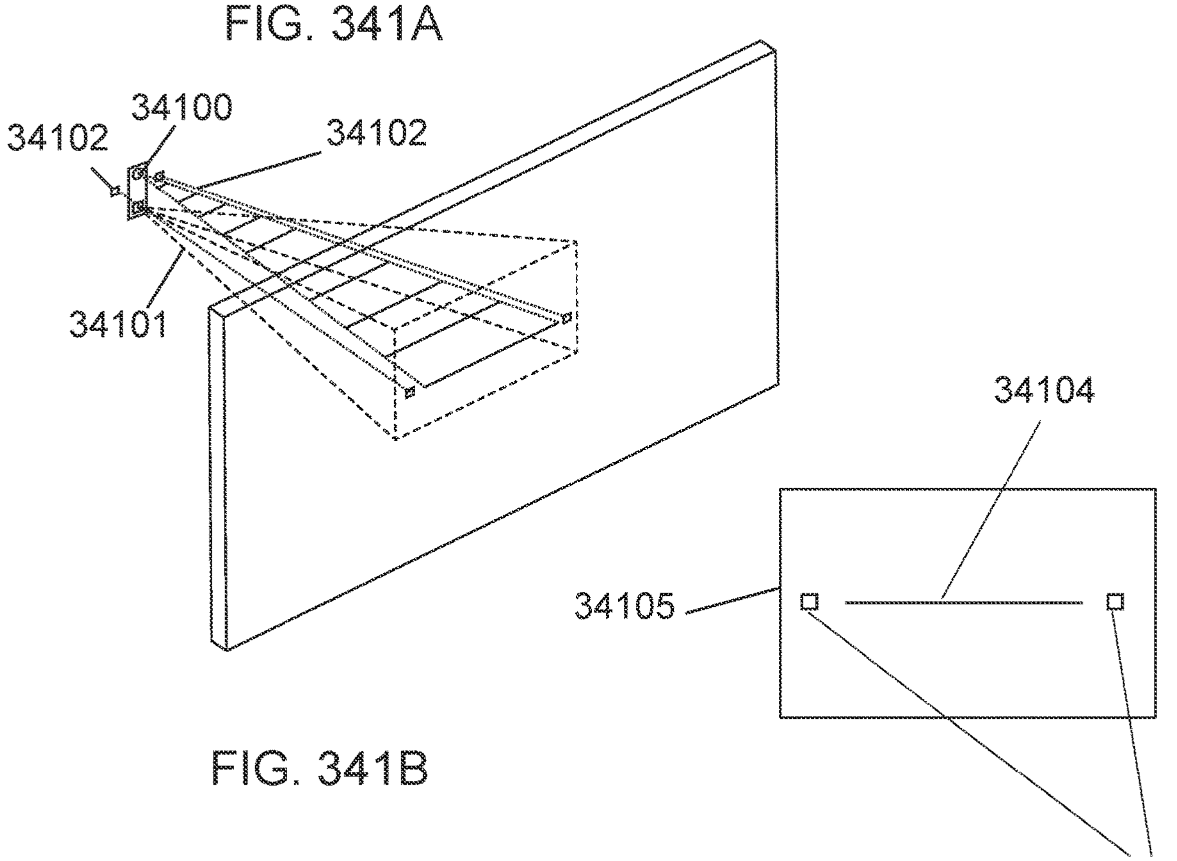
Figure 341B:
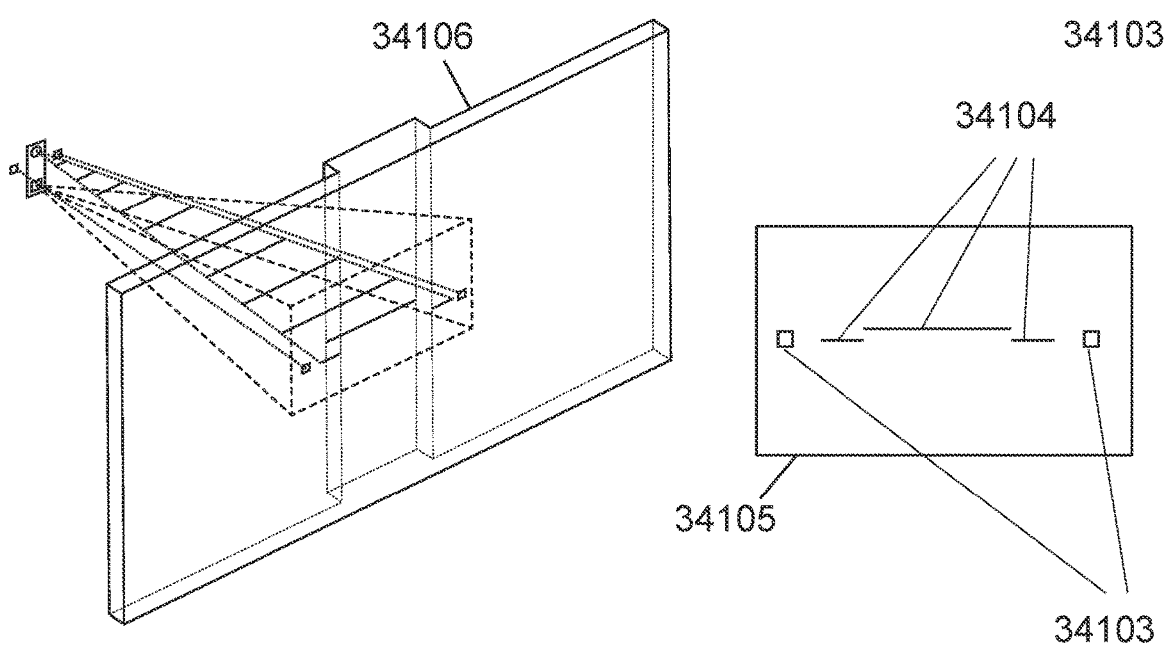

FIG. 341A-341B illustrate examples of a line laser range finder in combination with a narrow lens camera 34101 and two points measurement sensors (TOFs) at each side facing the incident plane.

Figure 342:
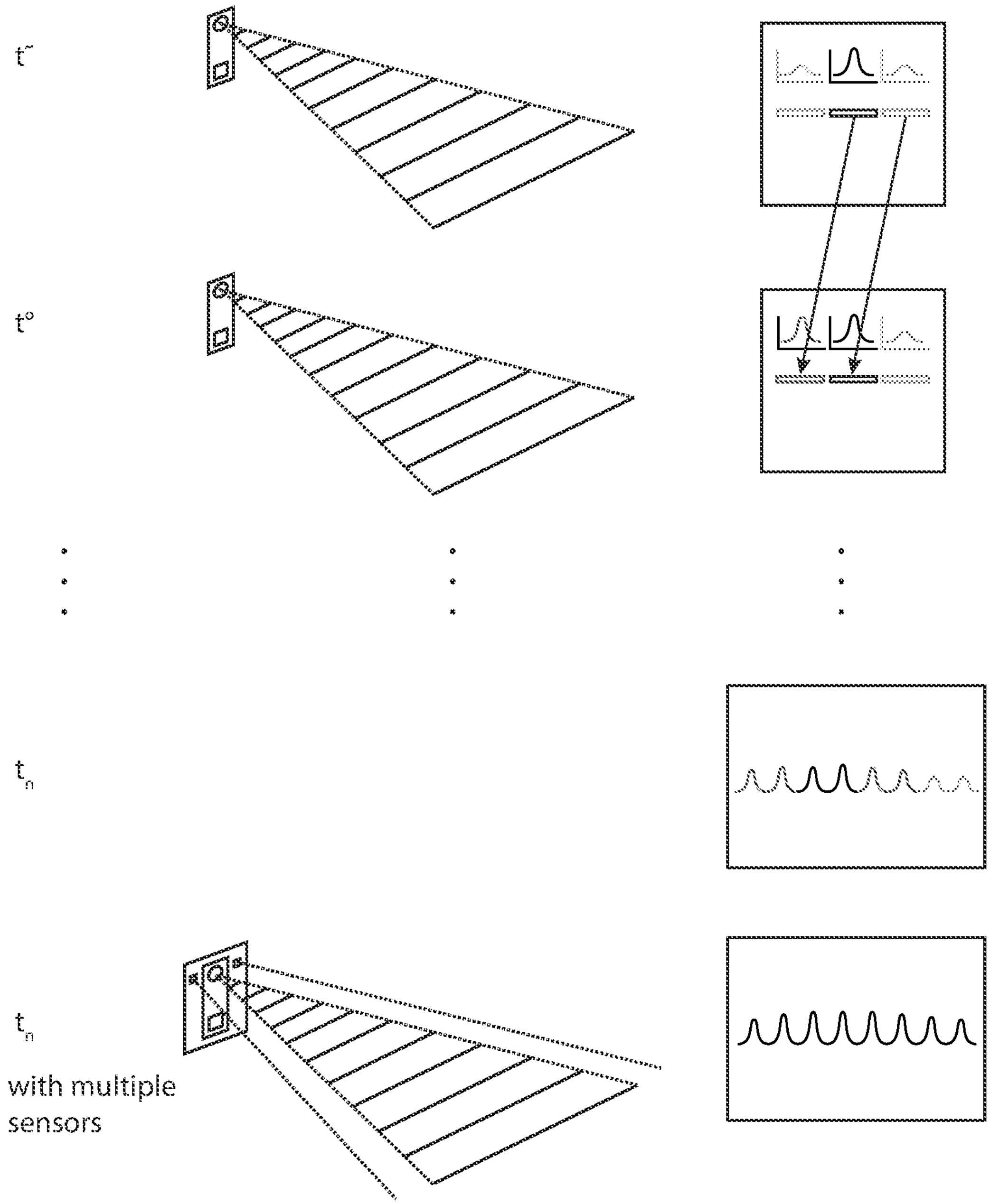

FIG. 342. illustrates how more confident reading of the line laser at each time stamp remains and the less confident ones will be retired.

Figure 343:
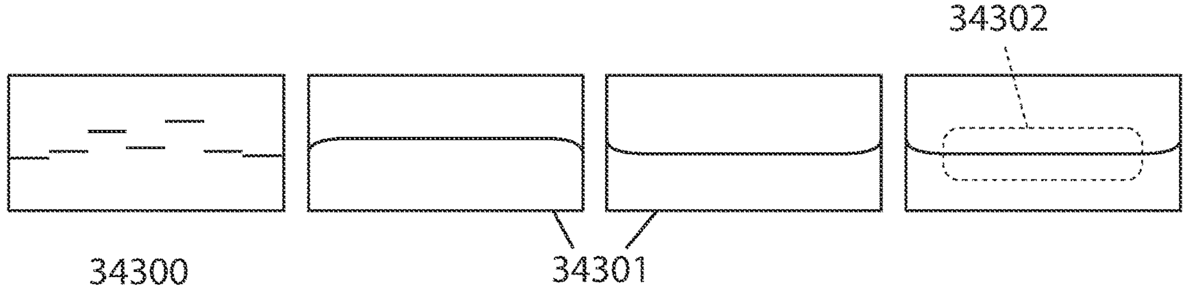

FIG. 343 illustrates readings of a line laser by CMOS, different depths will appear higher or lower.

Figure 344:
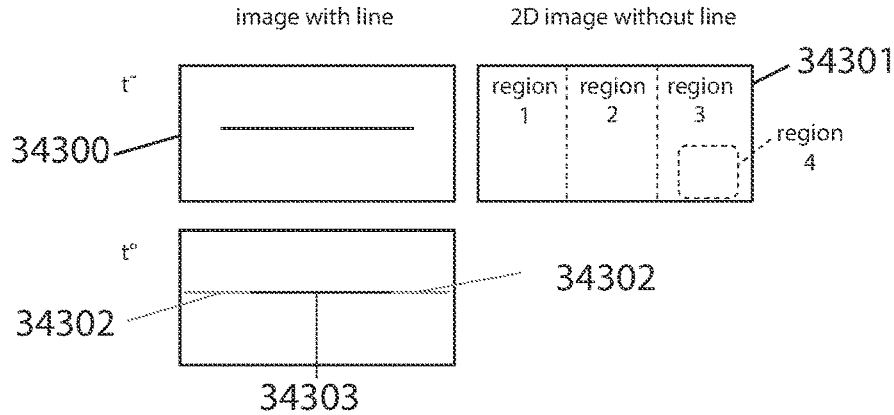

FIG. 344 illustrates line laser reading and regions based on the pixel intensities and colors.

Figure 345:
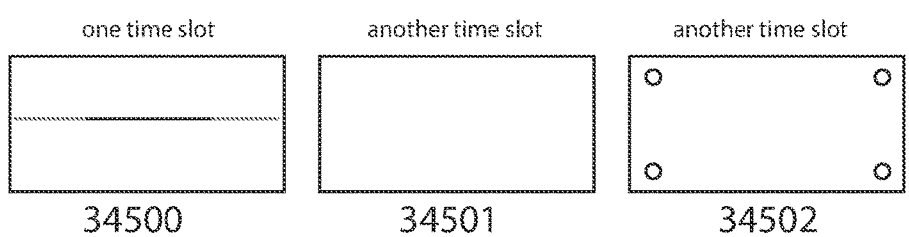

FIG. 345 shows line laser, RGB 2D image and point depth measurement each taken in a separate time slot and can be combined.

FIG. 346A illustrates structured light in the form of a circle.

FIG. 346B illustrates structured light in the form of a pattern and how the intensity of the light may vary in far and close distances.

FIG. 346C illustrates structured light in the form of a pattern and how the light may get scattered in far and close distances.

FIG. 347 illustrates examples of various types of patterns for structured light.

FIG. 348 illustrates that the light can be directed to sweep the scene.

FIG. 349 illustrates the robot with camera and projector.

FIG. 350 illustrates the robot with camera and projector.

Figure 351:
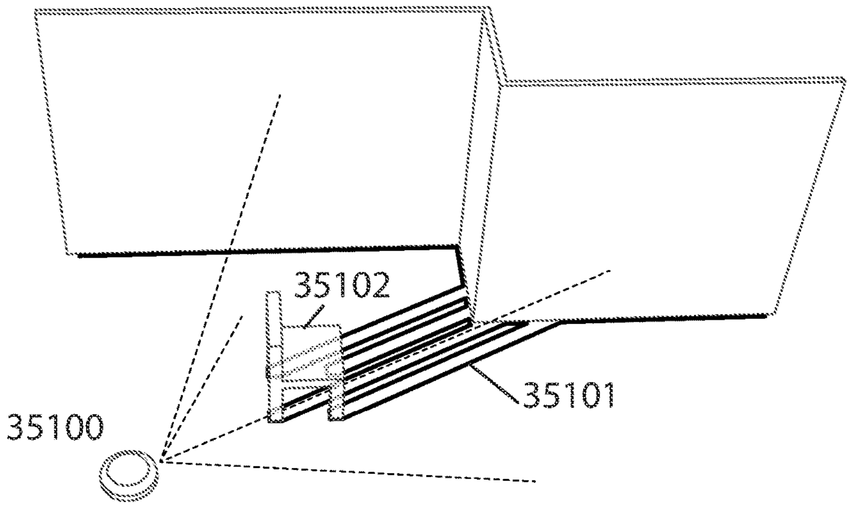

FIG. 351 illustrates the trained robot sees a large fluctuation compared to data set collected in the training phase.

Figure 352:
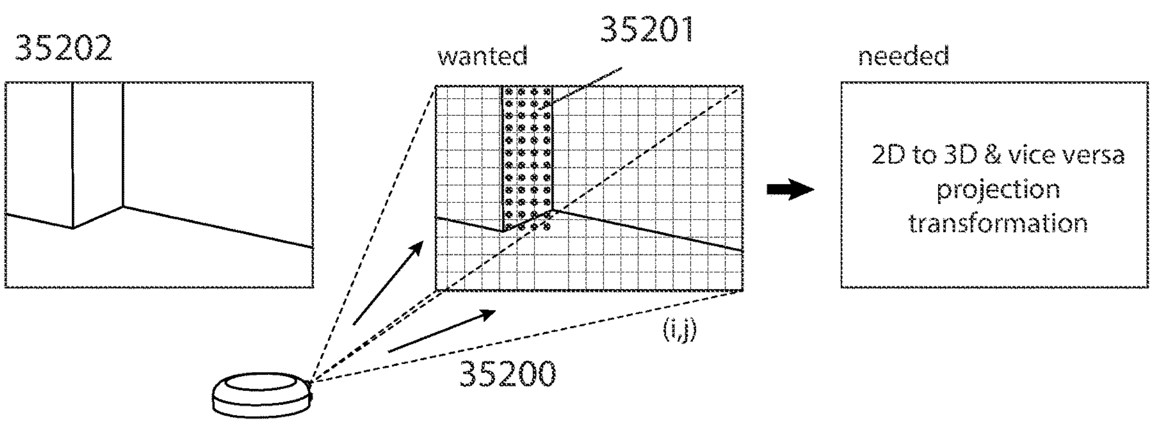

FIG. 352 illustrates how the structured light can be intelligently modified to illuminate a certain part of a 3D environment.

Figure 353:
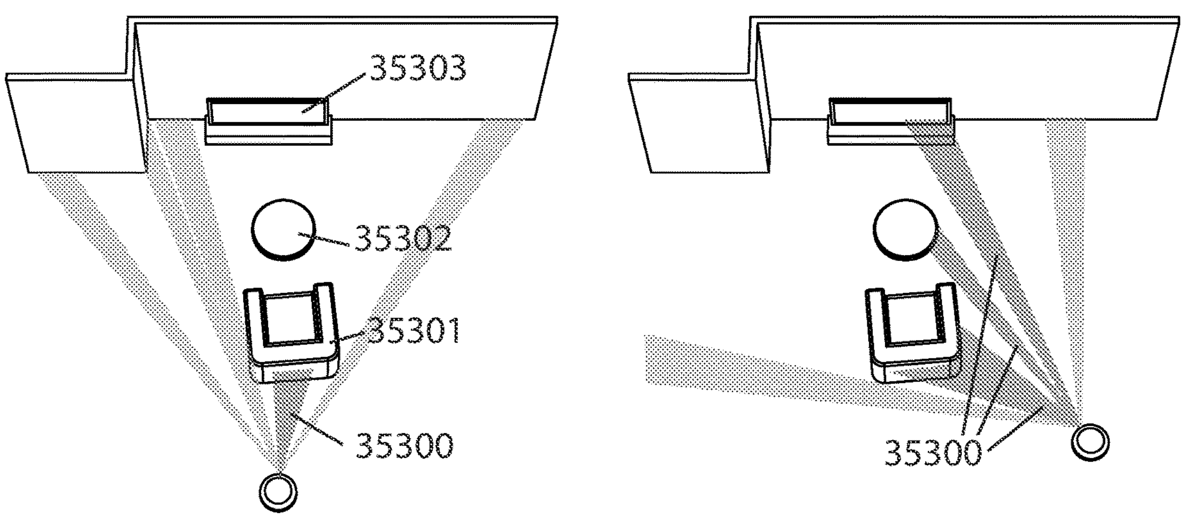

FIGS. 353A-353B illustrate examples of targeted illumination.

Figure 354:
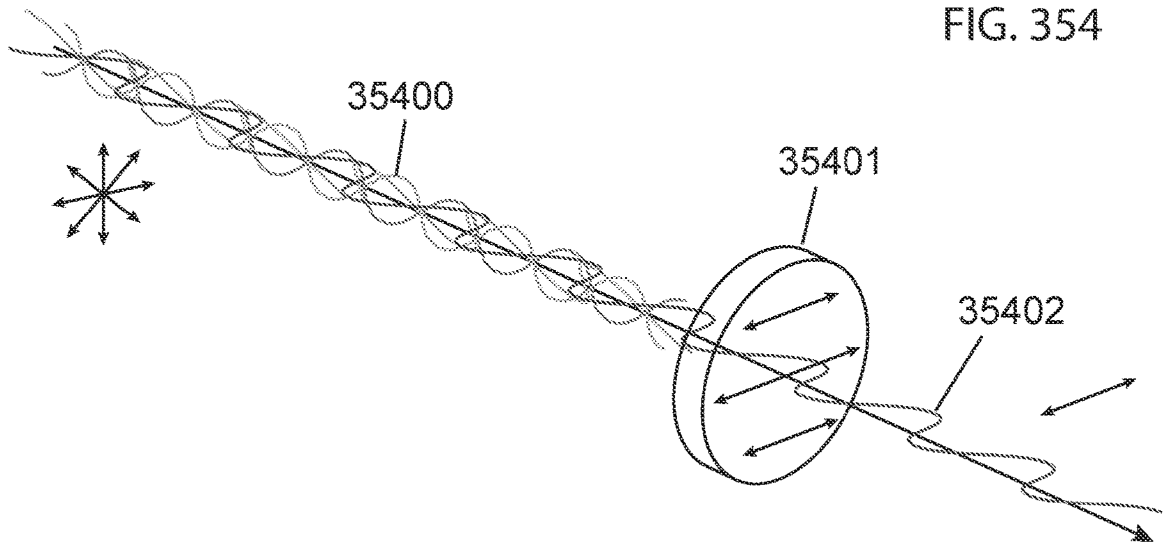

FIG. 354 illustrates polarization of the light using polarization filter.

Figure 355:
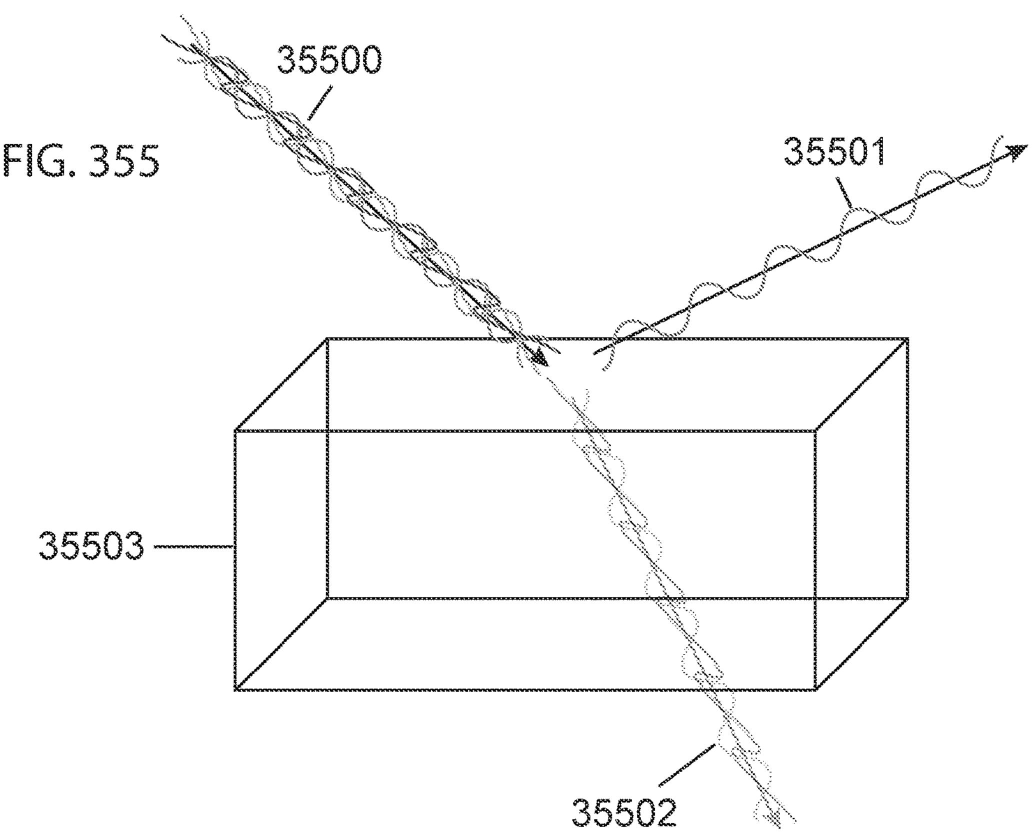

FIG. 355 illustrated unpolarized light that is polarized by reflection and refraction on surface of object.

Figure 356:
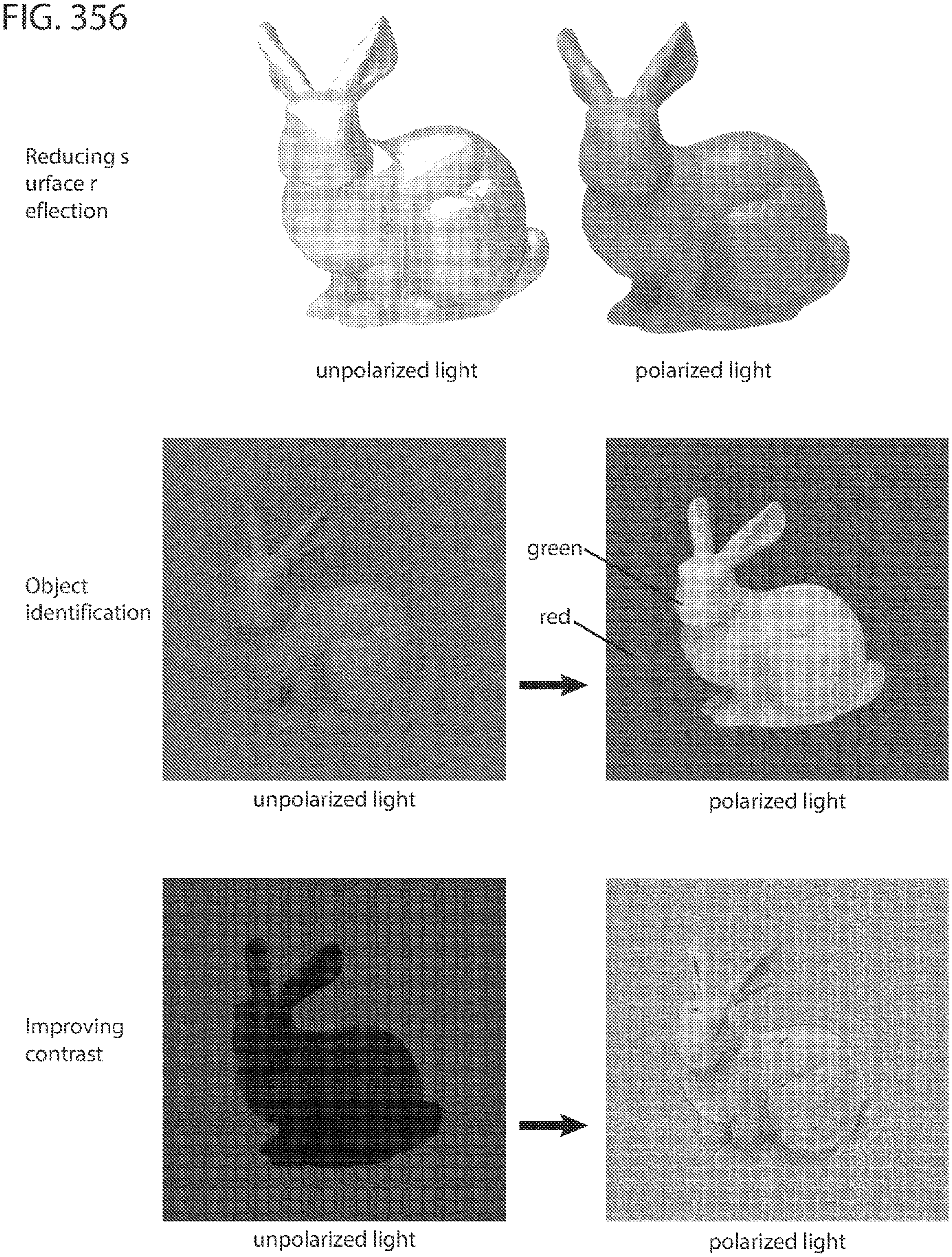

FIG. 356 demonstrates some polarization applications for image processing.

FIG. 357A illustrates three cameras and three corresponding filters.

FIG. 357B illustrates a camera and a rotating filter.

FIG. 357C illustrates a polarizer sensor.

Figures 358A, 358B, 358C:
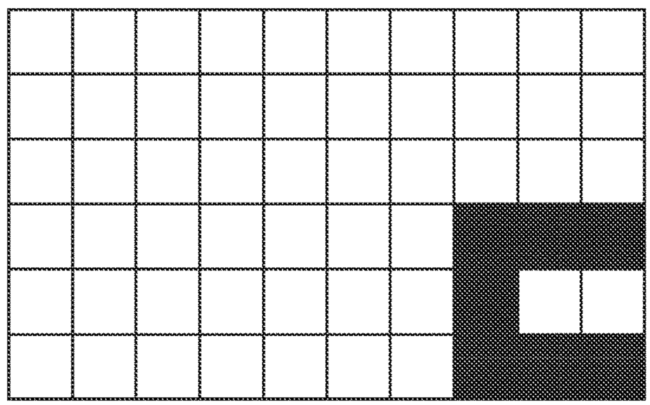

FIGS. 358A-358C illustrate the ways image data can be stored in a file with editable text.

Figure 359:
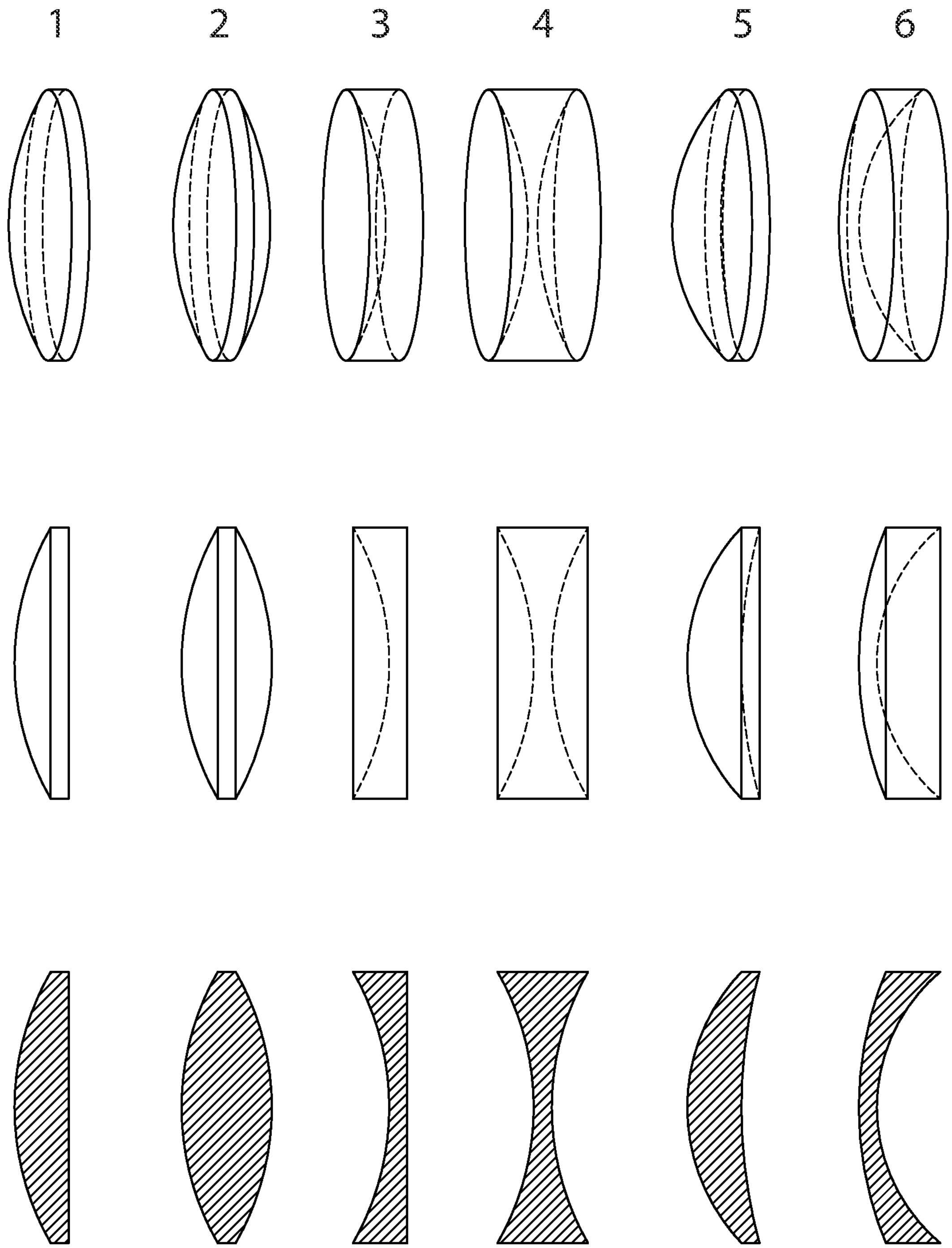

FIG. 359 illustrates six different lens types.

Figure 360:
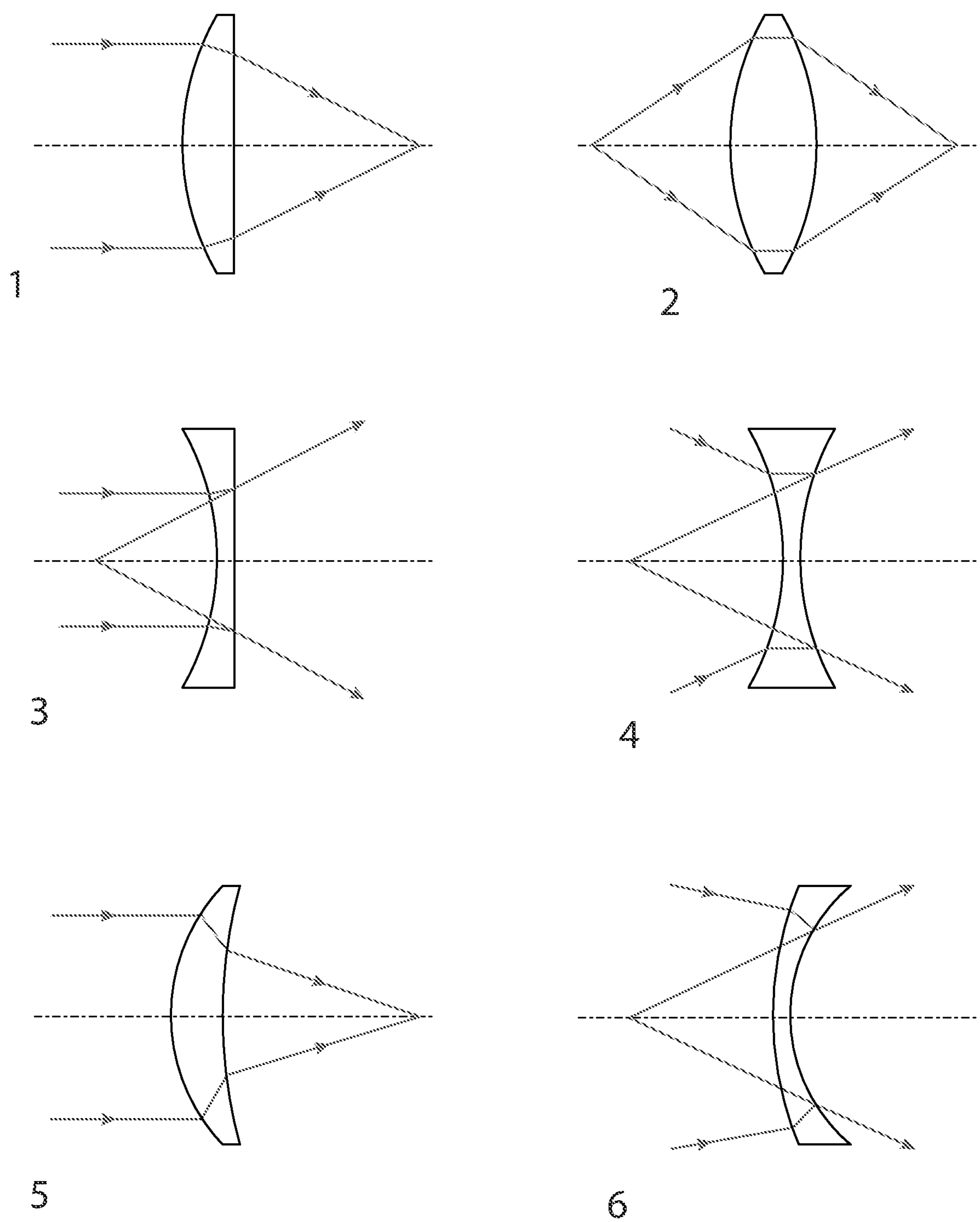

FIG. 360 illustrates light behavior for the six lens types.

Figure 361A:
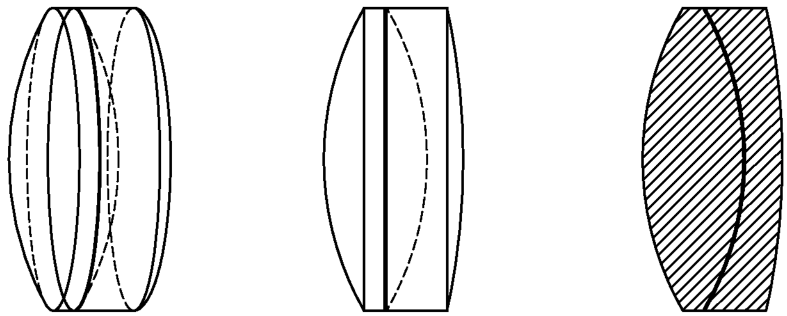

FIG. 361A illustrates an achromatic lens in perspective, side and cross section view.

Figure 361B:
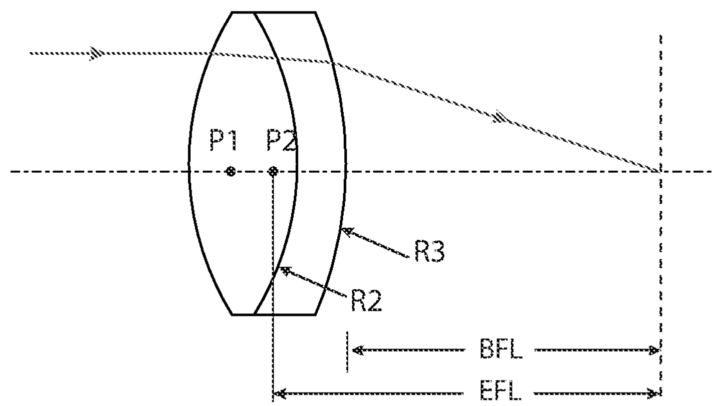
Figure 361C:
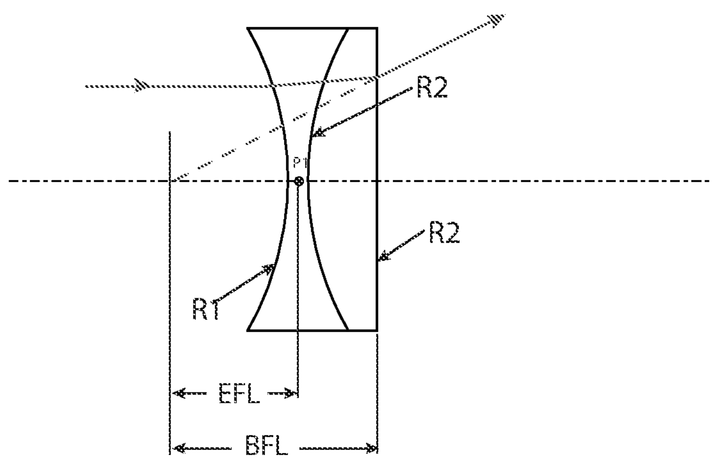

FIGS. 361B and 361C illustrate light behavior on the positive and negative achromatic lenses.

Figure 361D:
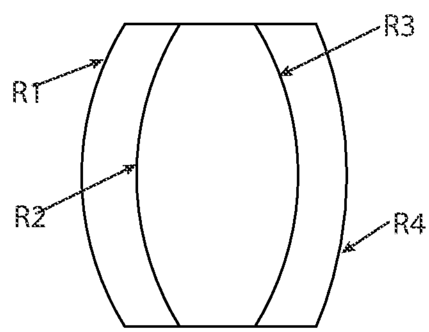

FIG. 361D illustrates an achromatic triplet lens.

Figure 362:
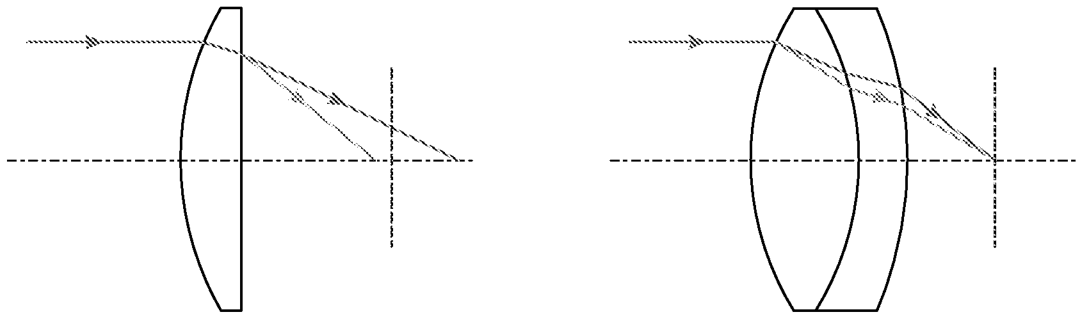

FIG. 362 compares the differences between a PCX lens and an achromatic lens on chromatic aberration.

Figure 363:
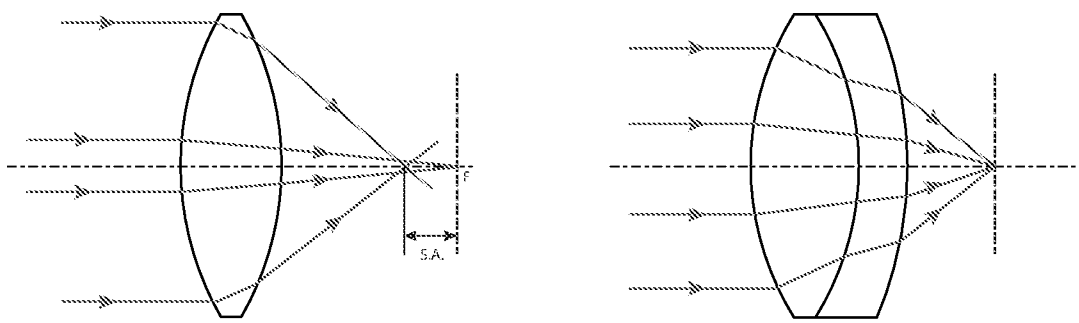

FIG. 363 compares the differences between a DCX and an achromatic lens on spherical aberration.

Figure 364:
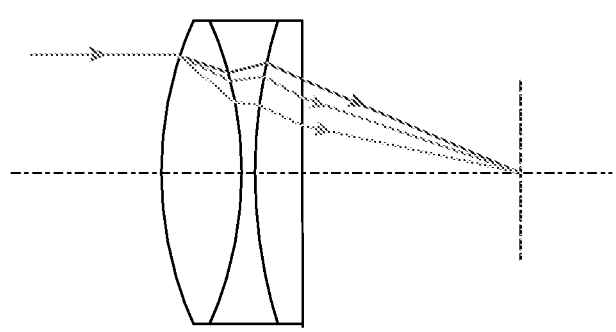

FIG. 364 illustrates an example of apochromatic lens correcting three wavelengths (colors) aberration.

Figure 365:
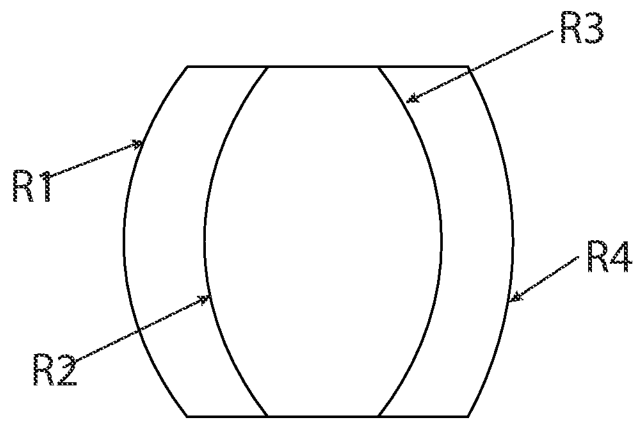

FIG. 365 illustrates a triplet achromatic lens.

Figure 366:
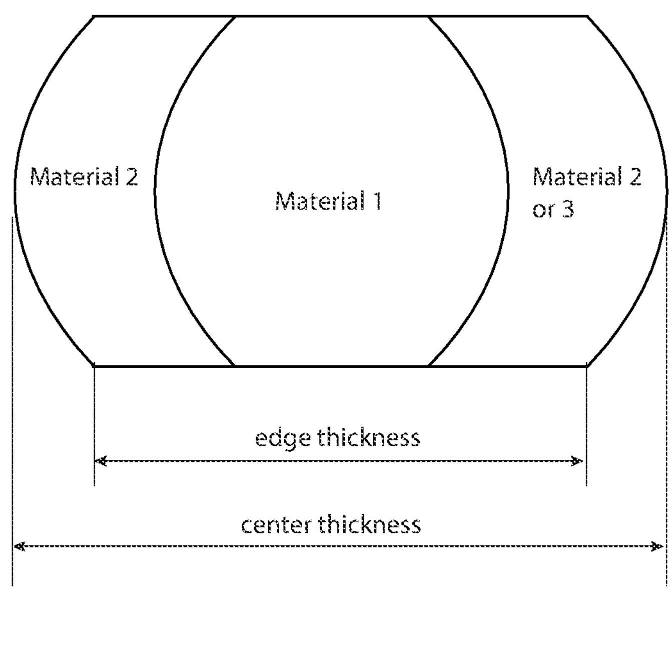

FIG. 366 illustrates each element in an achromatic lens fabricated from different materials.

FIG. 367 illustrates a thick lens mode.

Figure 368:
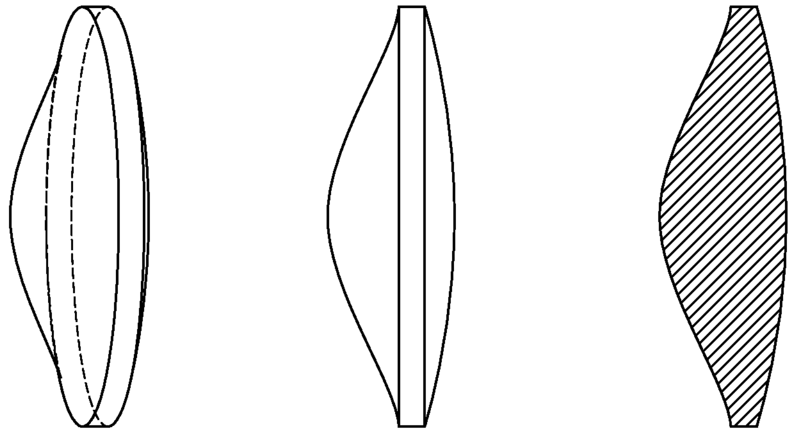

FIG. 368 illustrates an example of bi-convex aspheric lens.

Figure 369:
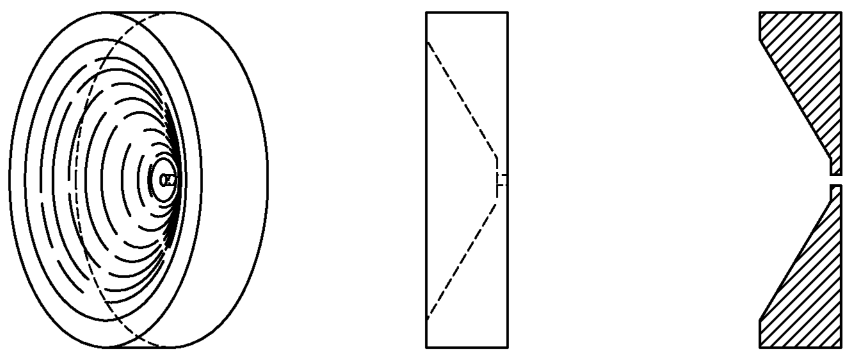

FIG. 369 illustrates an example of a wide angle pinhole.

Figure 370:
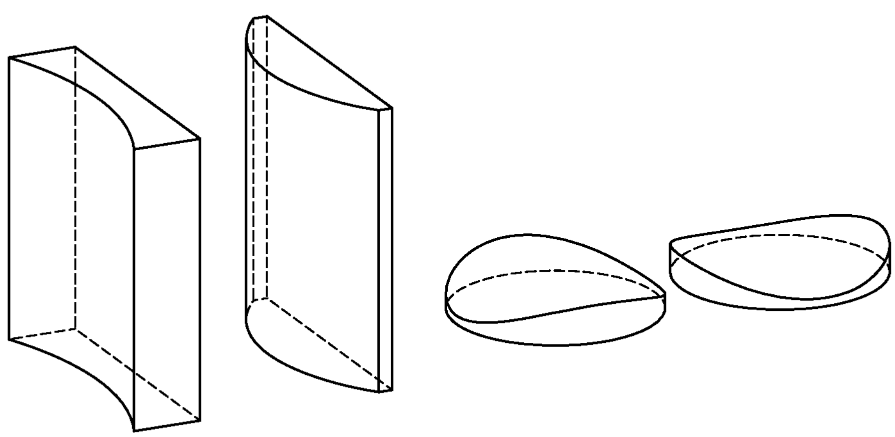

FIG. 370 illustrates examples of convex and concave cylindrical lenses.

Figure 371:
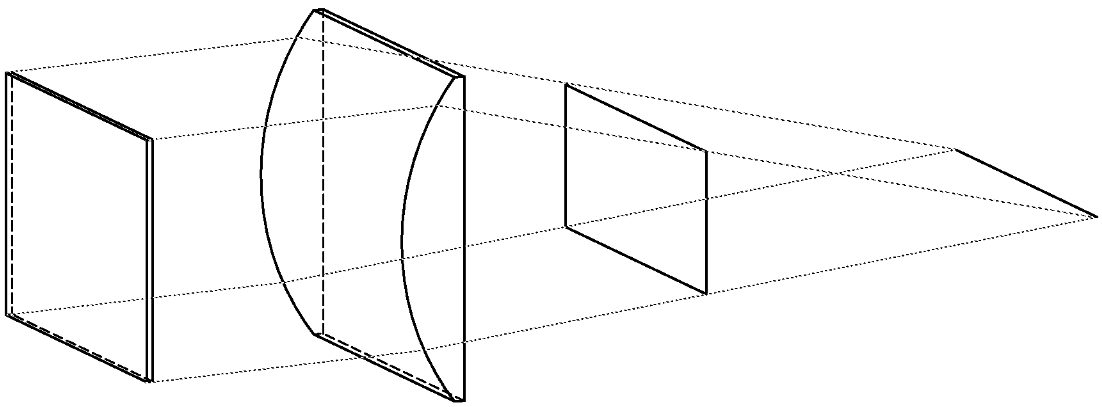

FIG. 371 illustrates a cylindrical lens only changing the image scale in one direction and instead of a focal point a focal line with cylindrical lenses.

Figure 372:
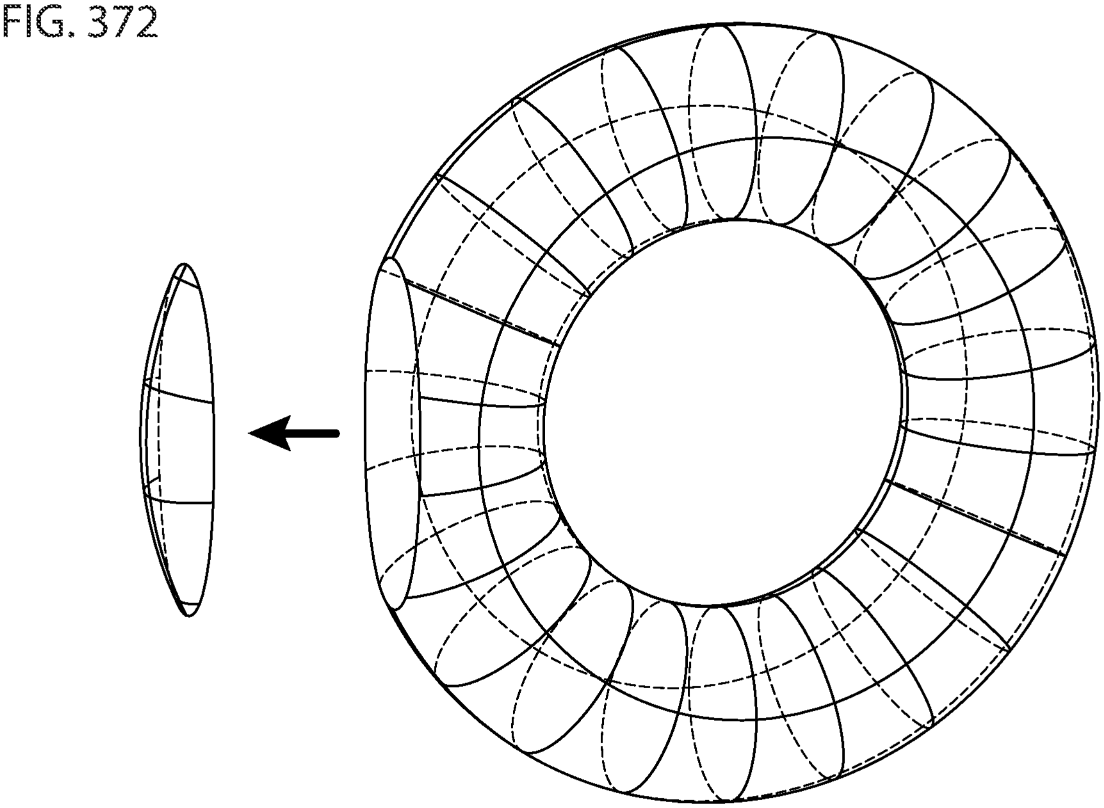

FIG. 372 illustrates a toric lens as a section of torus.

Figure 373:
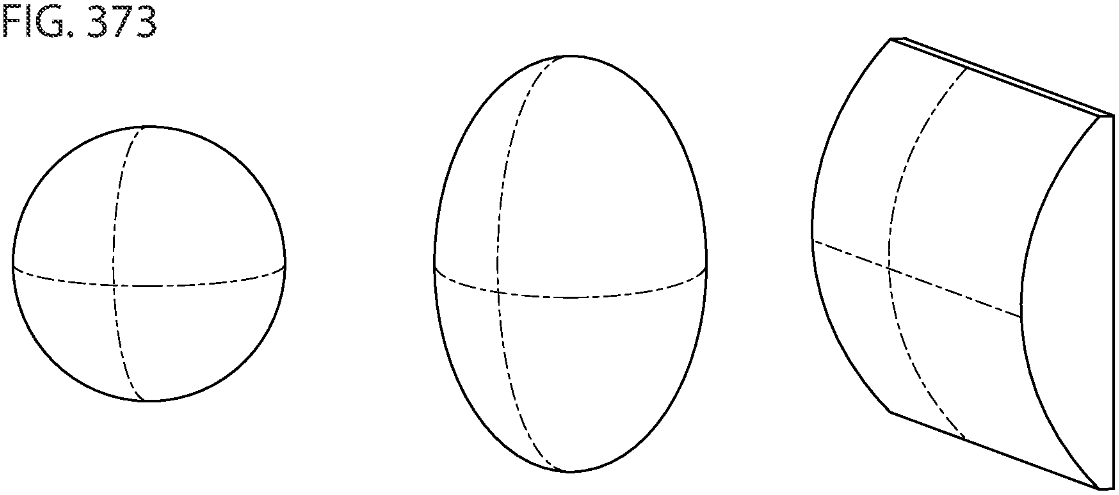

FIG. 373 compares a toric lens with a spherical lens and a cylindrical lens.

Figure 374:
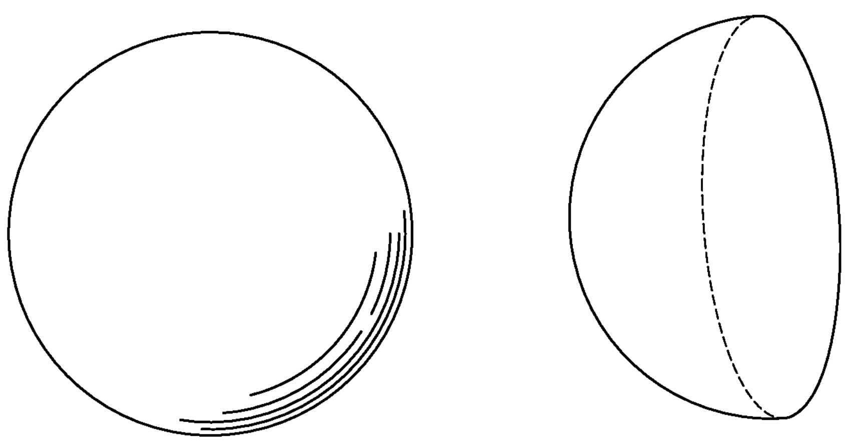

FIG. 374 illustrates examples of ball and half ball lenses.

Figure 375:
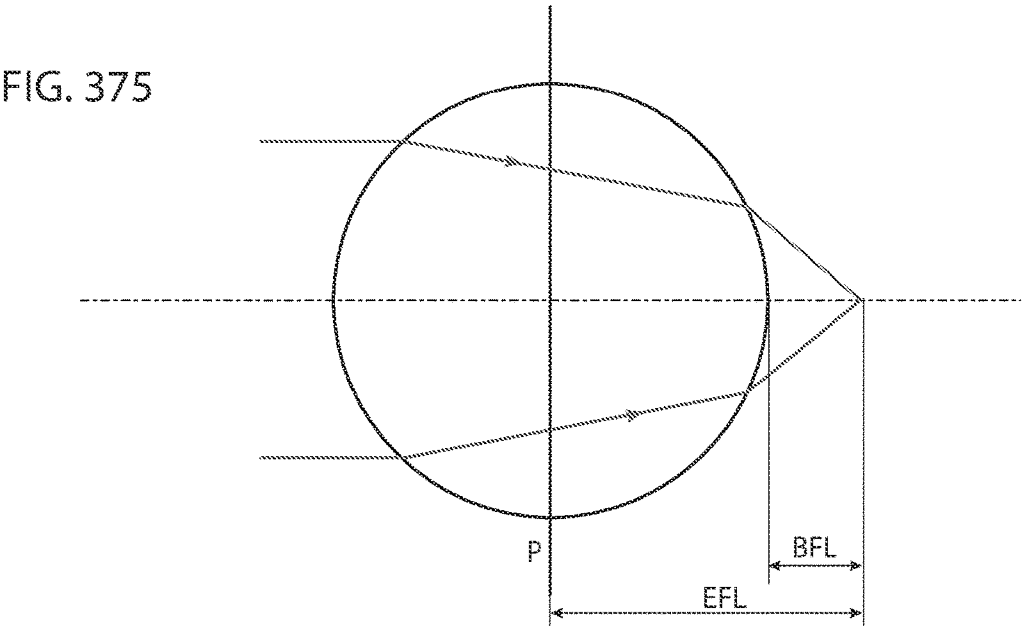

FIG. 375 demonstrates elements of a ball lens.

Figure 376:
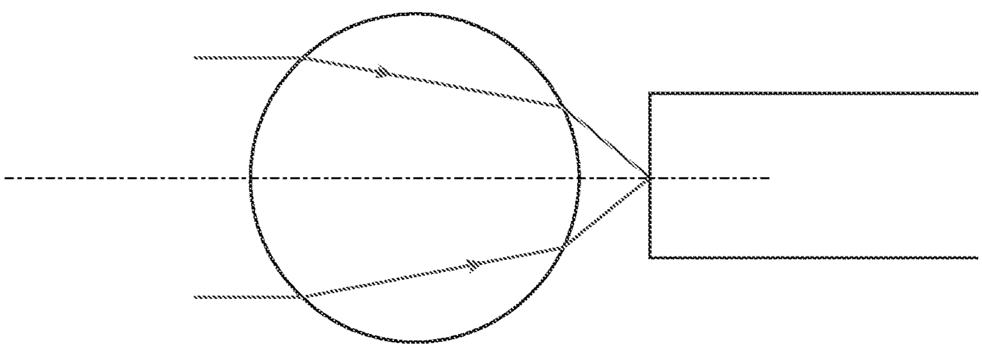

FIG. 376 illustrates a ball lens used for laser to fiber optic coupling.

Figure 377:
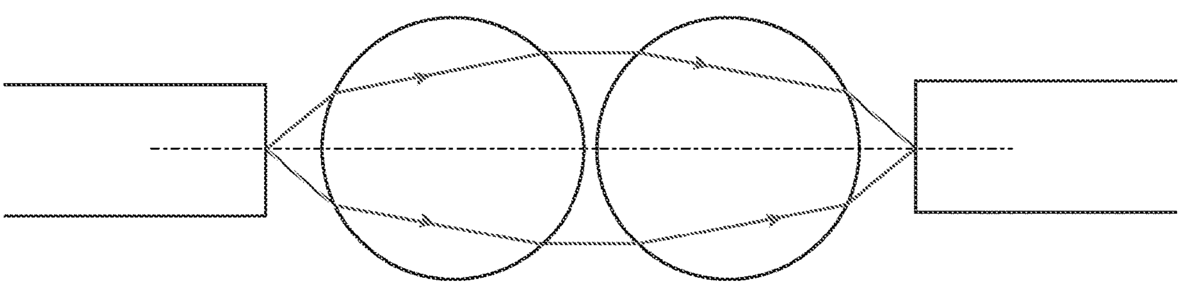

FIG. 377 illustrates two ball lenses used for coupling two fiber optics with identical NA.

Figure 378:
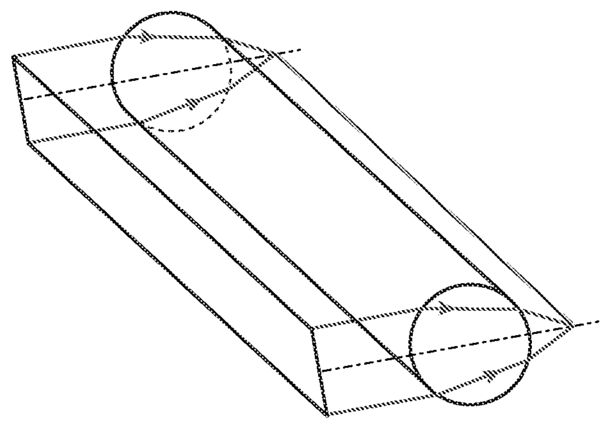

FIG. 378 illustrates an example of a rod lens Fast Axis Collimator (FAC).

Figure 379:
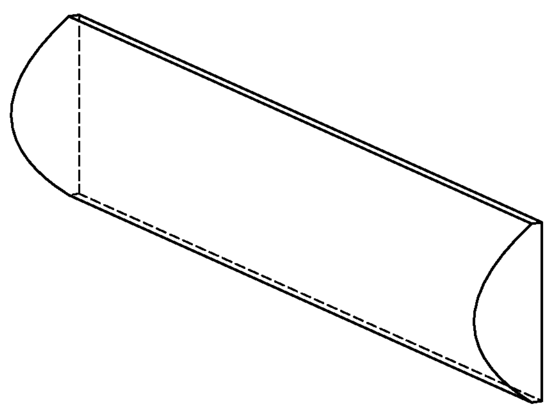

FIG. 379 illustrates an example of a fast axis collimator.

Figure 380:
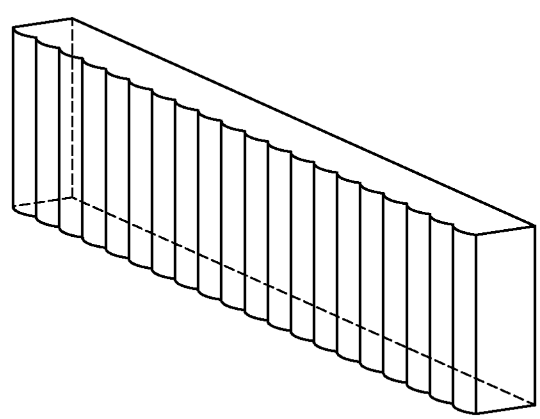

FIG. 380 illustrates an example of a slow axis collimator.

Figure 381:
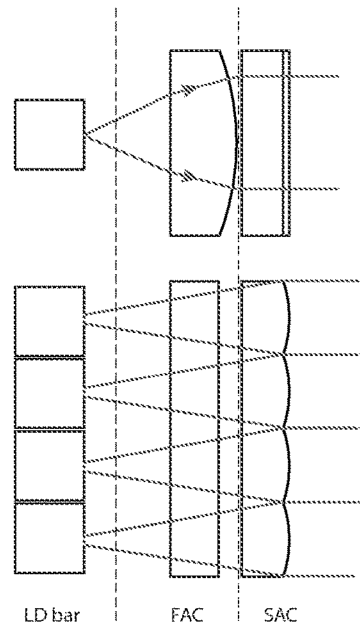

FIG. 381 illustrates FAC and SAC lenses used to collimate beams from a laser diode bar.

Figure 382A:
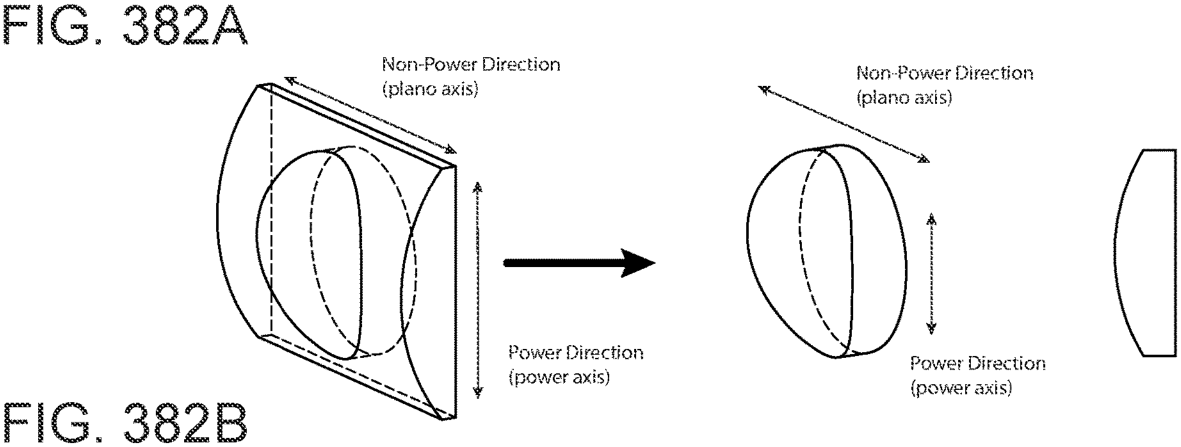

FIG. 382A illustrates cylindrical lens plano and power axis.

Figure 382B:
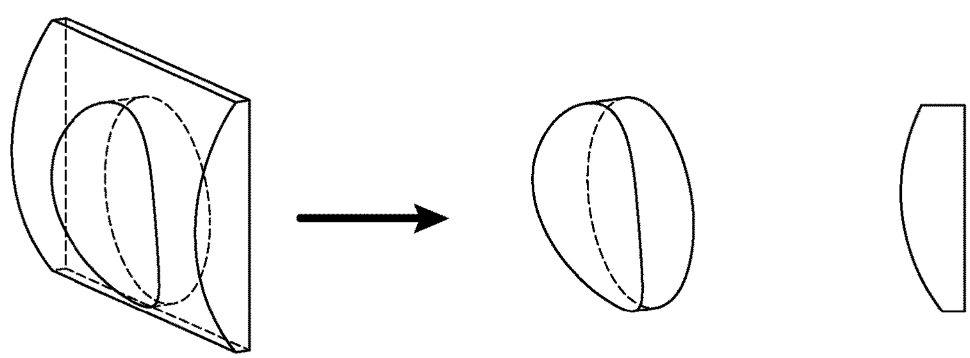

FIG. 382B illustrates inaccurate cuts in cylindrical lenses may cause errors and aberrations on the lens performance.

Figure 383:
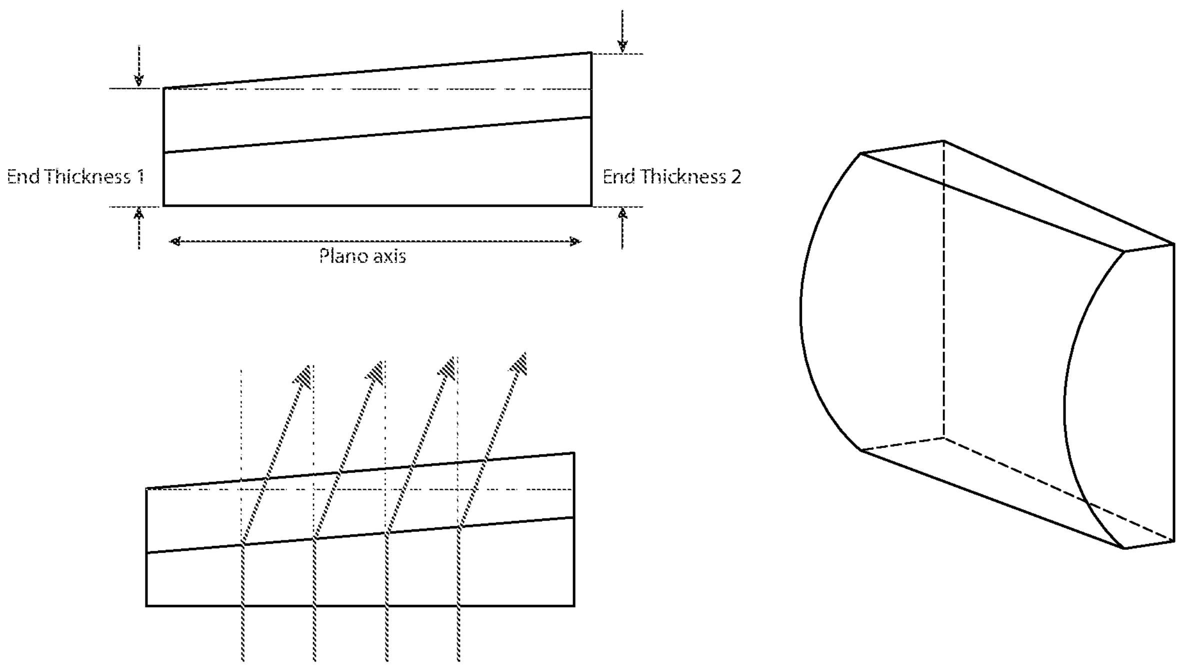

FIG. 383 illustrates the wedge error in 3D and top view Centration.

Figure 384:
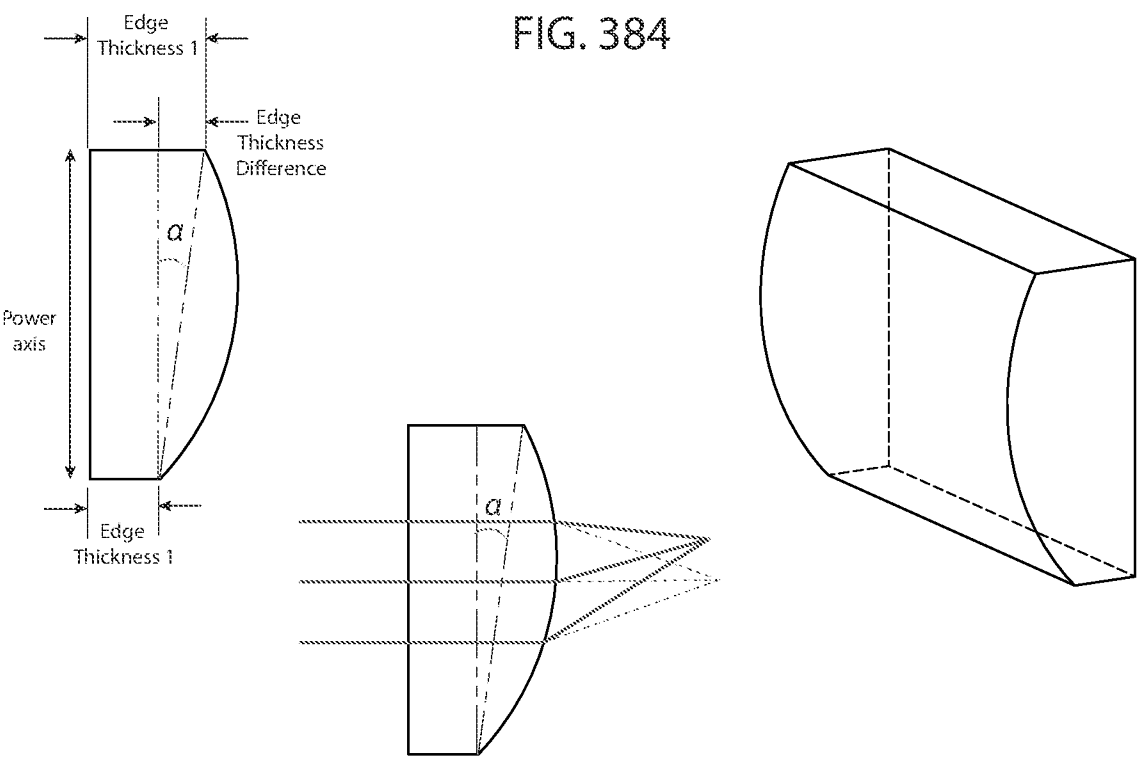

FIG. 384 illustrates centration error in 3D and side view.

Figure 385:
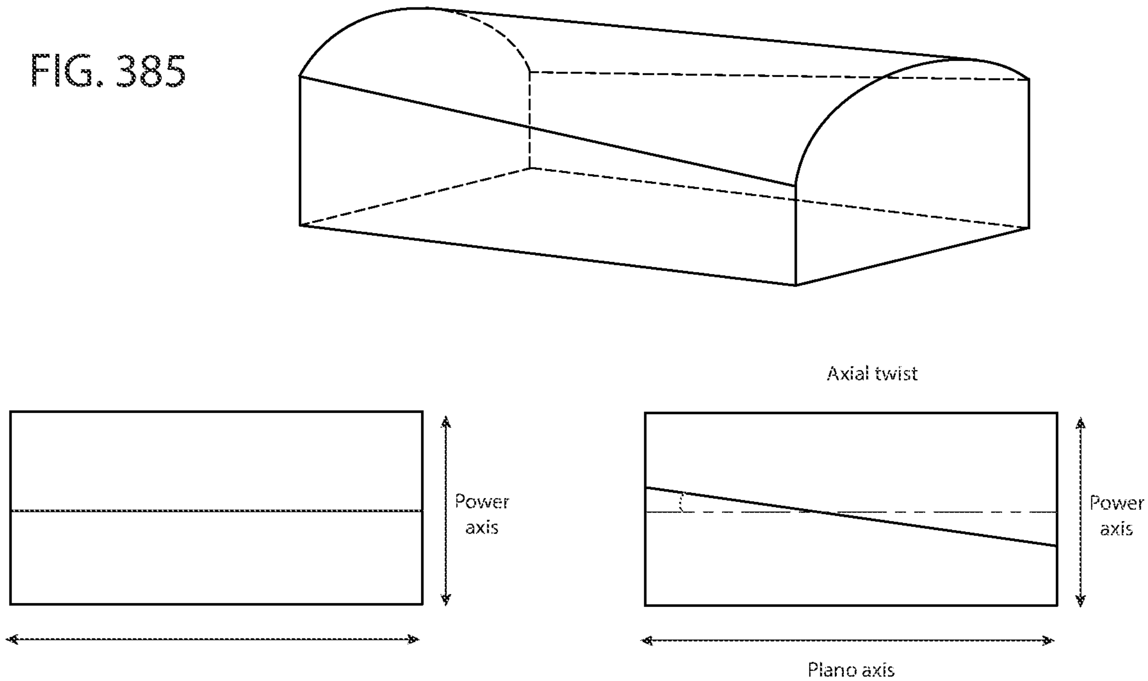

FIG. 385 illustrates axial twist error in 3D and side view.

Figure 386:
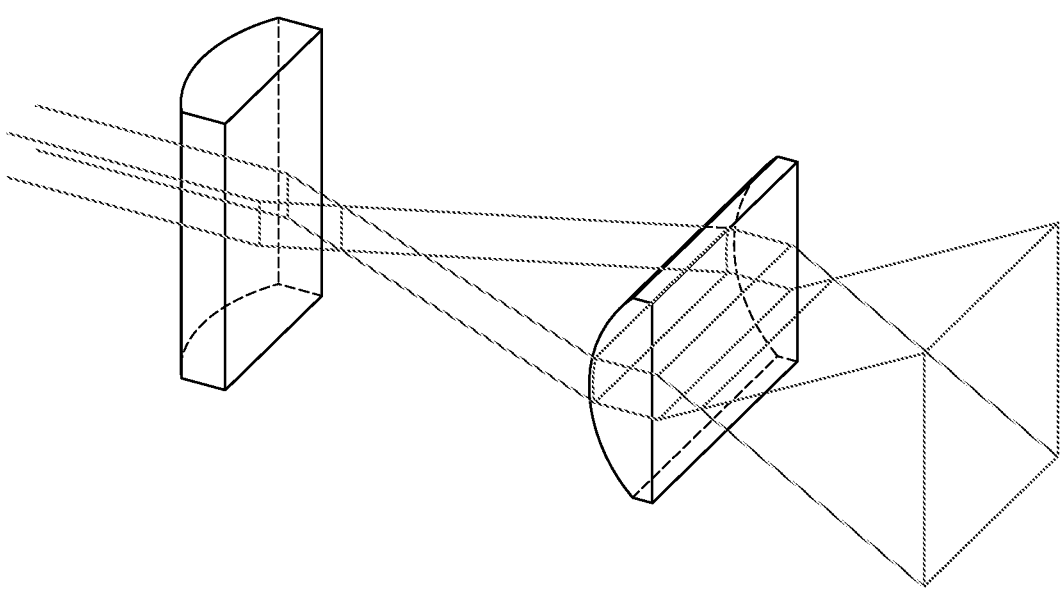

FIG. 386 demonstrates the process of forming a light sheet using two cylindrical lenses.

Figure 387:
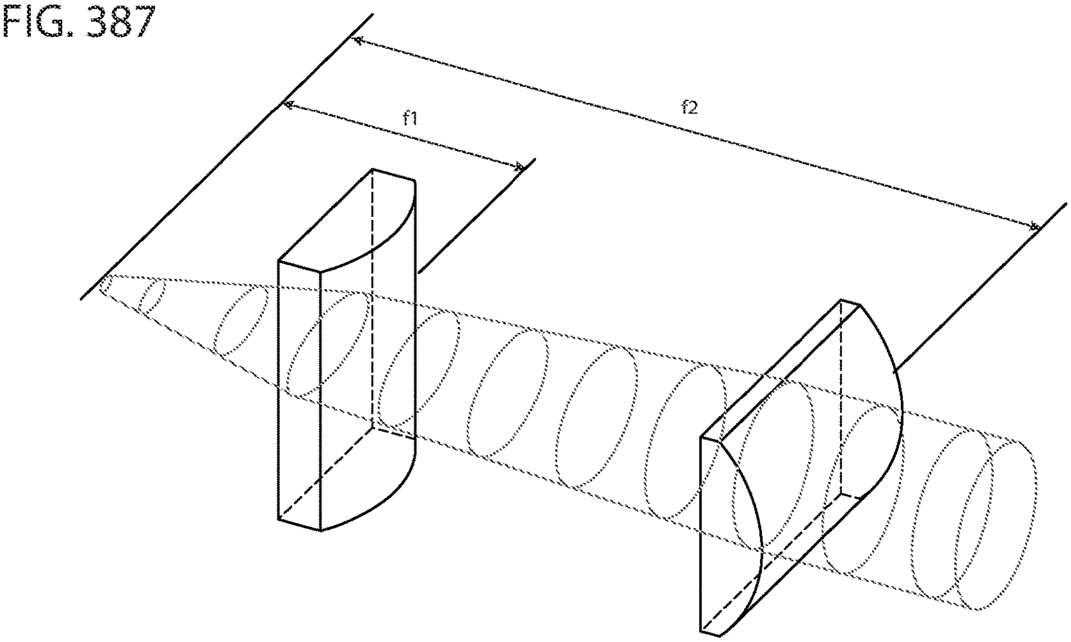

FIG. 387 illustrates beam circularization.

Figure 388:
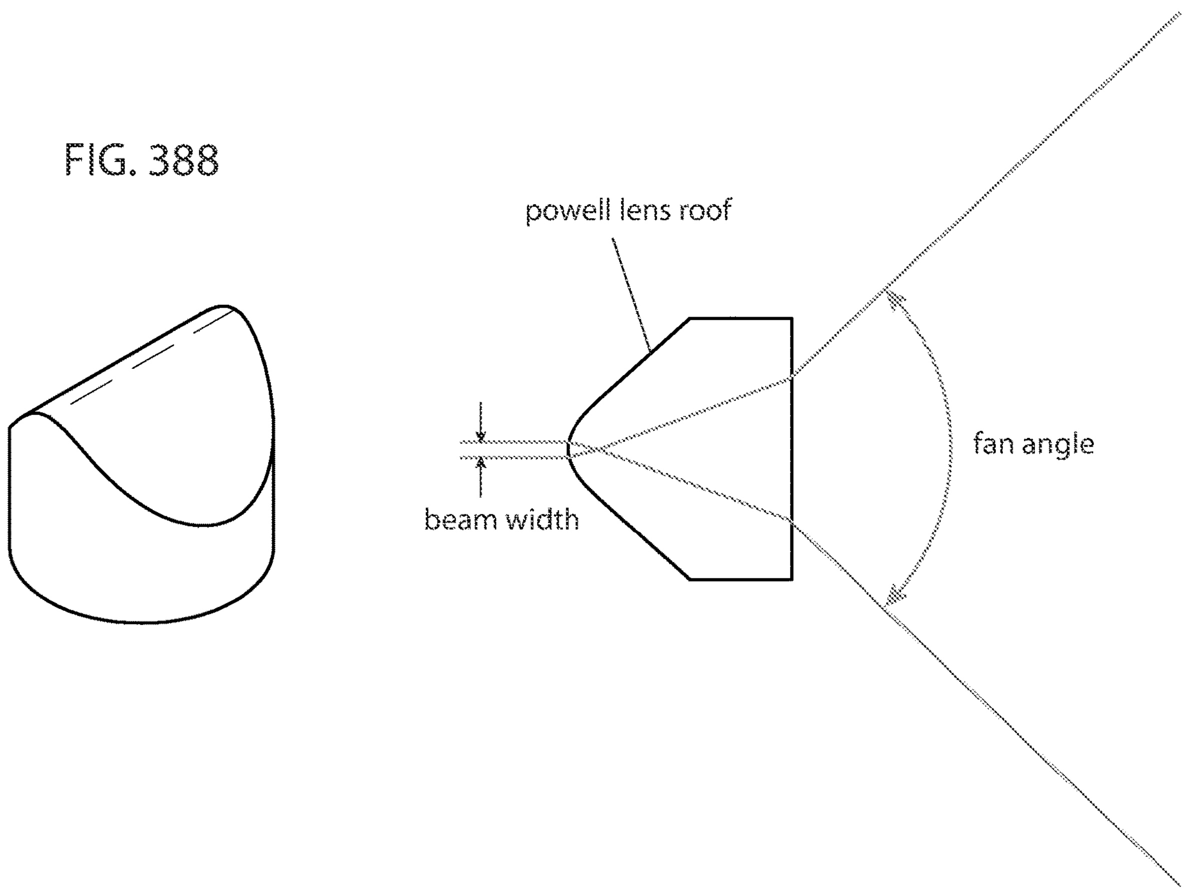

FIG. 388 illustrates an example of Powell lens and its features.

Figure 389:
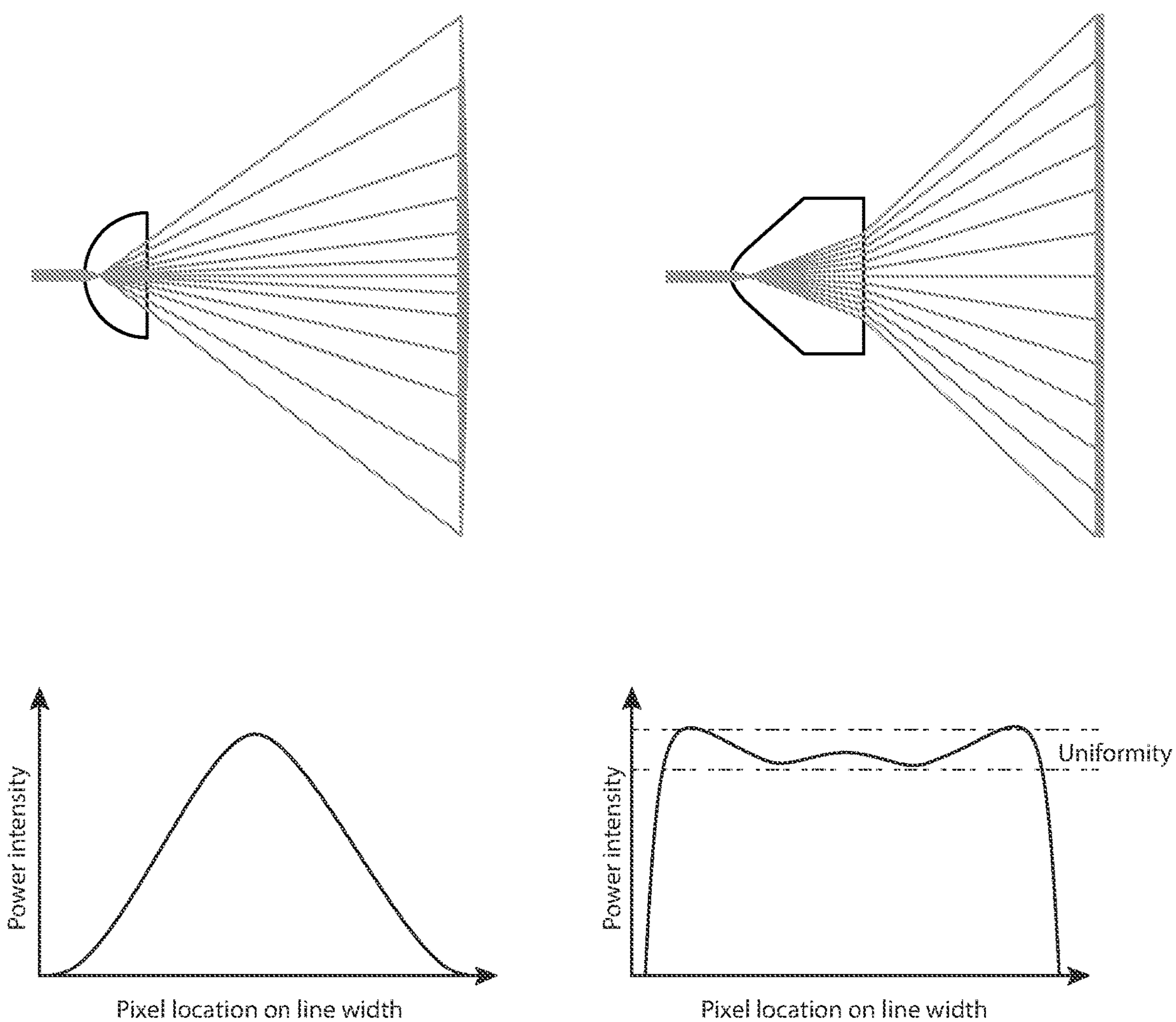

FIG. 389 illustrates the difference in power distribution between normal cylindrical lens and Powell lens.

Figure 390:
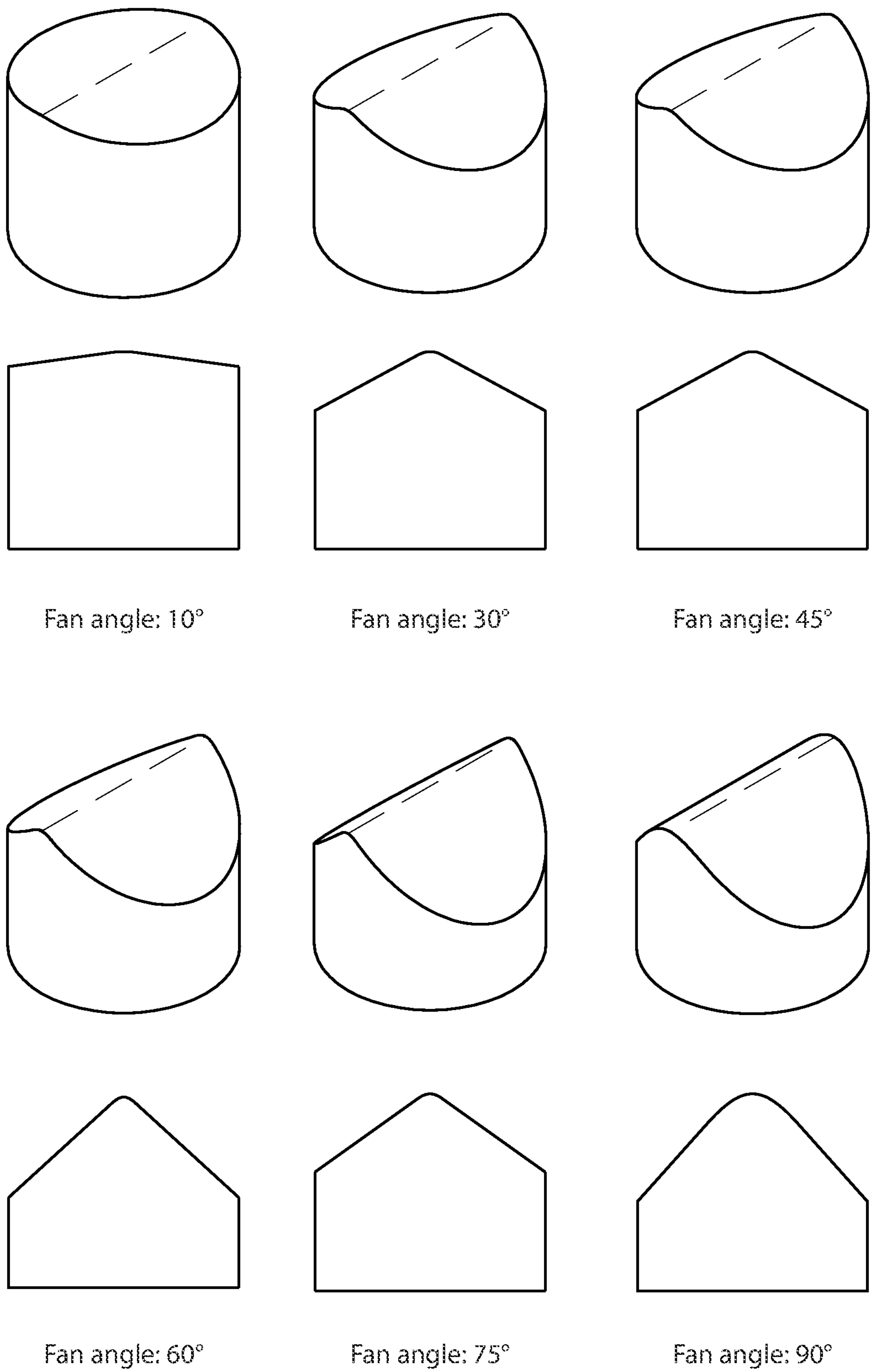

FIG. 390 illustrates examples of Powell lenses with different fan angles designed for different laser beam widths.

Figure 391:
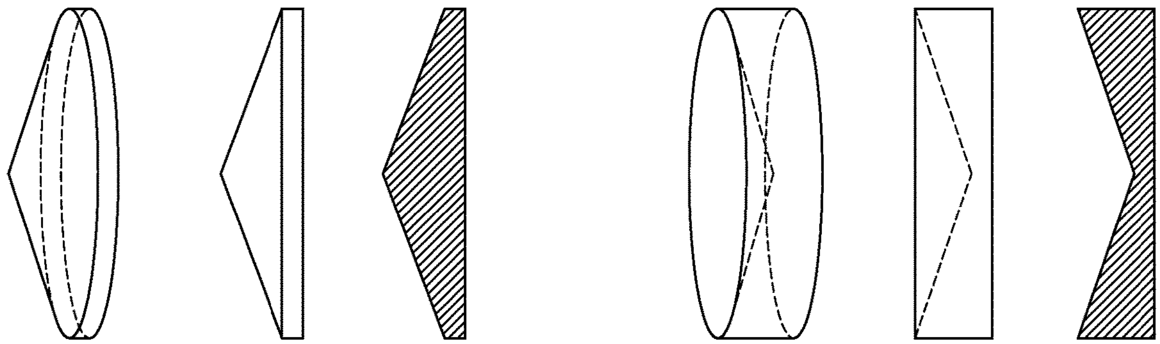

FIG. 391 illustrates examples of convex and concave axicons.

Figure 392:
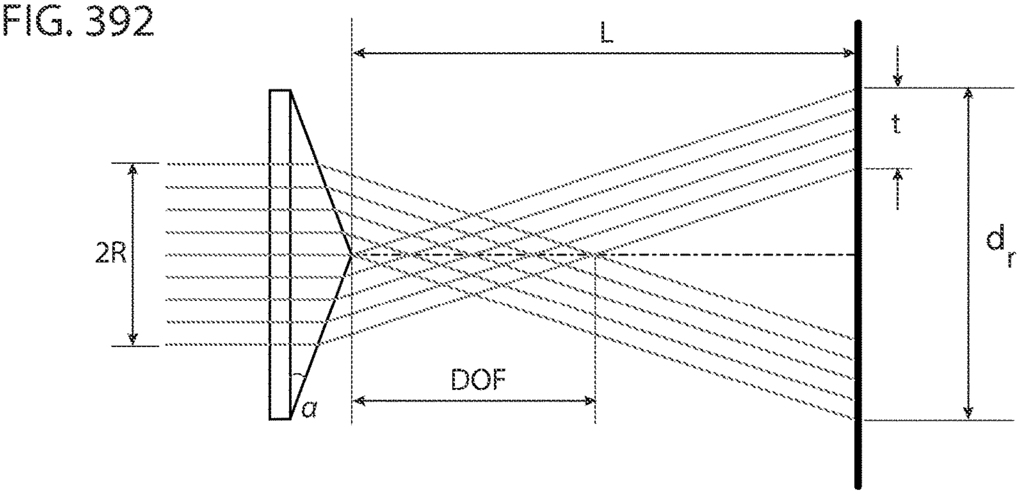

FIG. 392 illustrates Bessel beam features of an axicon.

Figure 393:
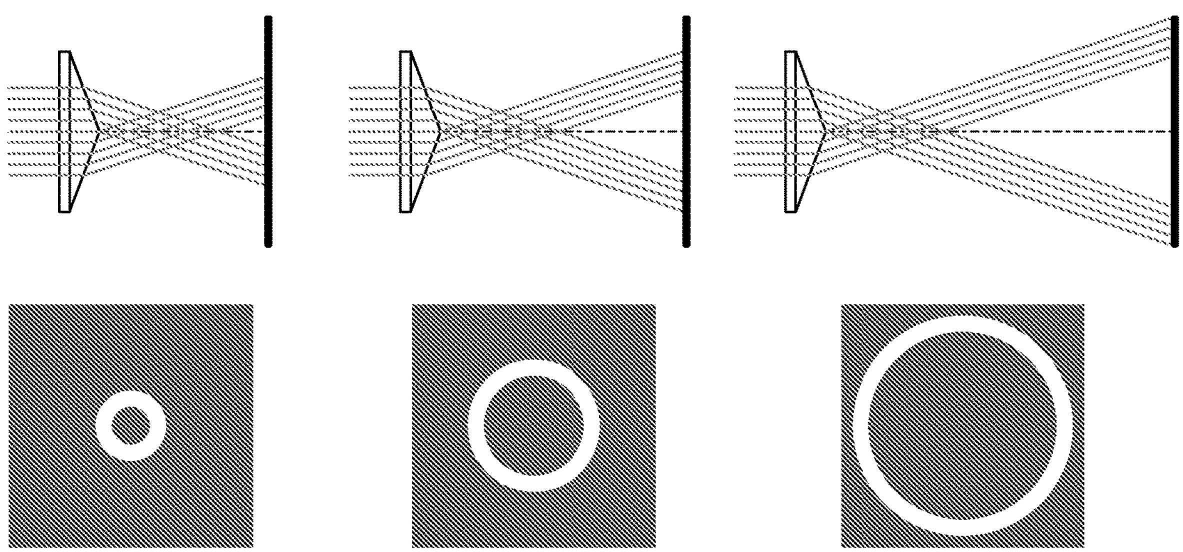

FIG. 393 illustrates the generated bessel beam diameter increasing relative to the distance of the image plane and the lens.

Figure 394:
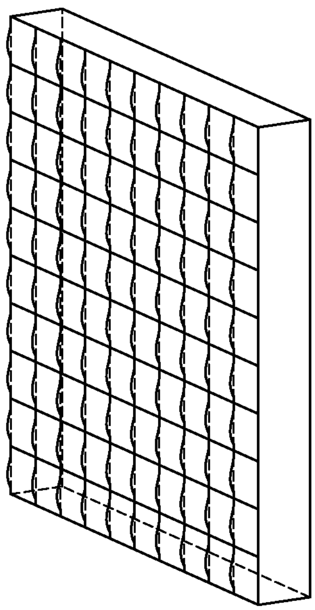

FIG. 394 illustrates a square microlens array.

Figure 395:
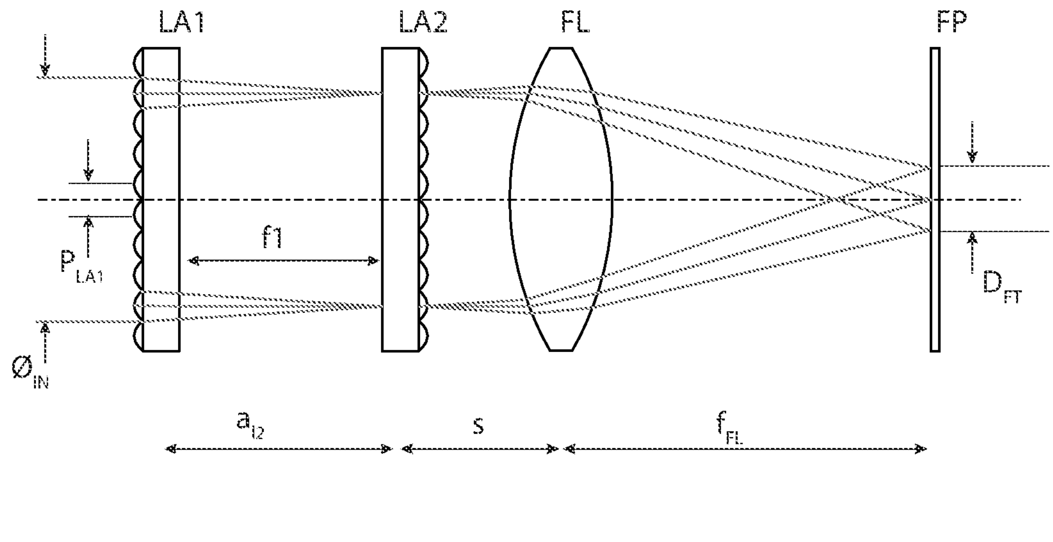

FIG. 395 illustrates a combination of two lens arrays and a bi-convex lens homogenizing the beam.

Figure 396:
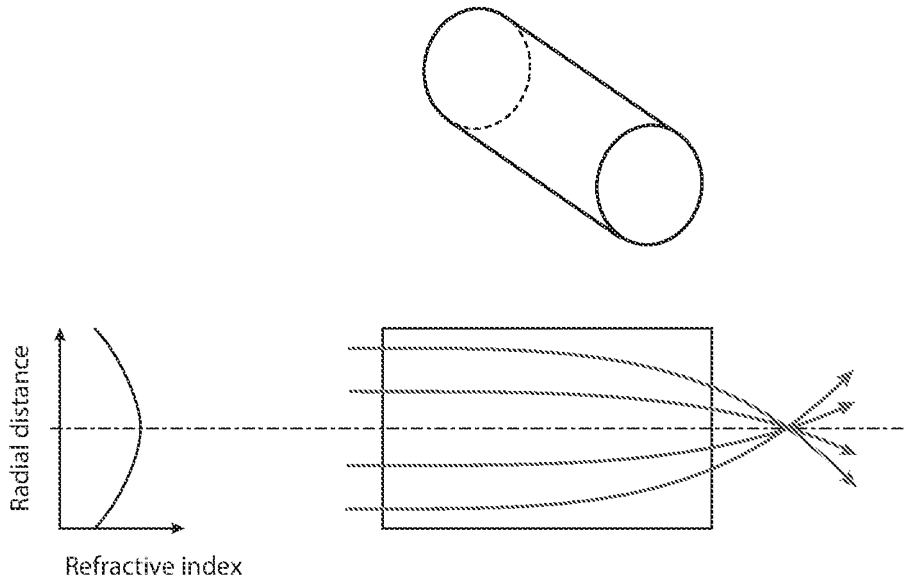

FIG. 396 illustrates an example of a GRIN lens.

Figure 397:
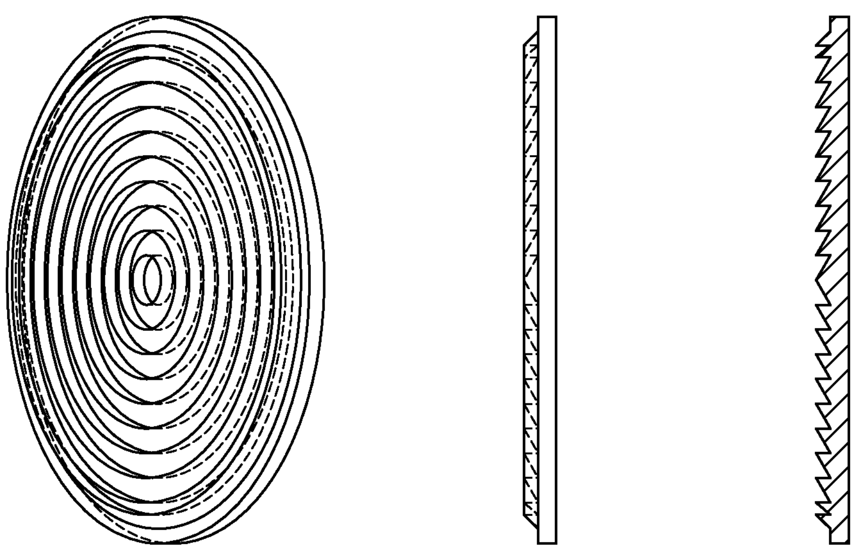

FIG. 397 illustrates an example of Fresnel lens.

Figure 398:
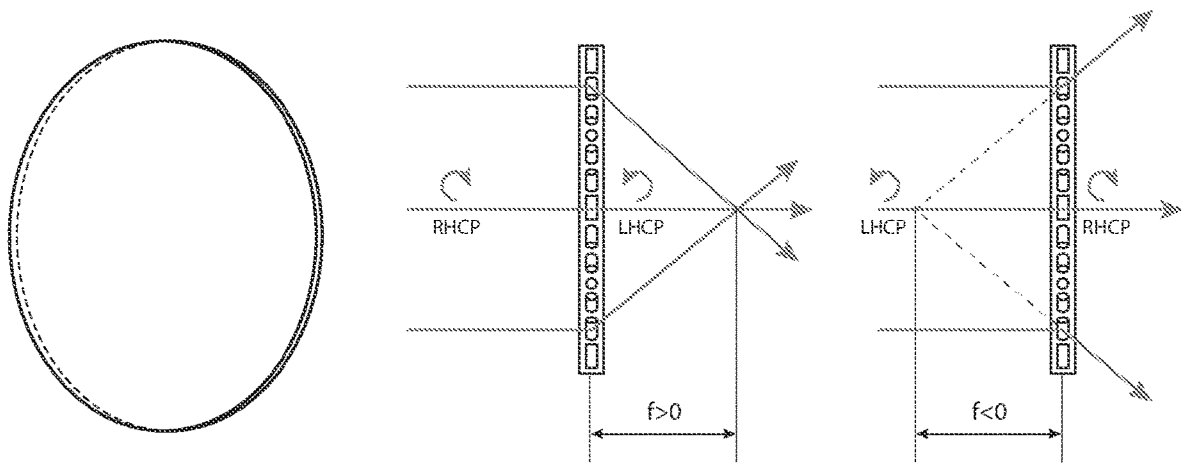

FIG. 398 illustrates left handed and right handed circularly polarized light resulting in positive and negative focal points in Polarization Directed Flat lenses.

Figure 399:
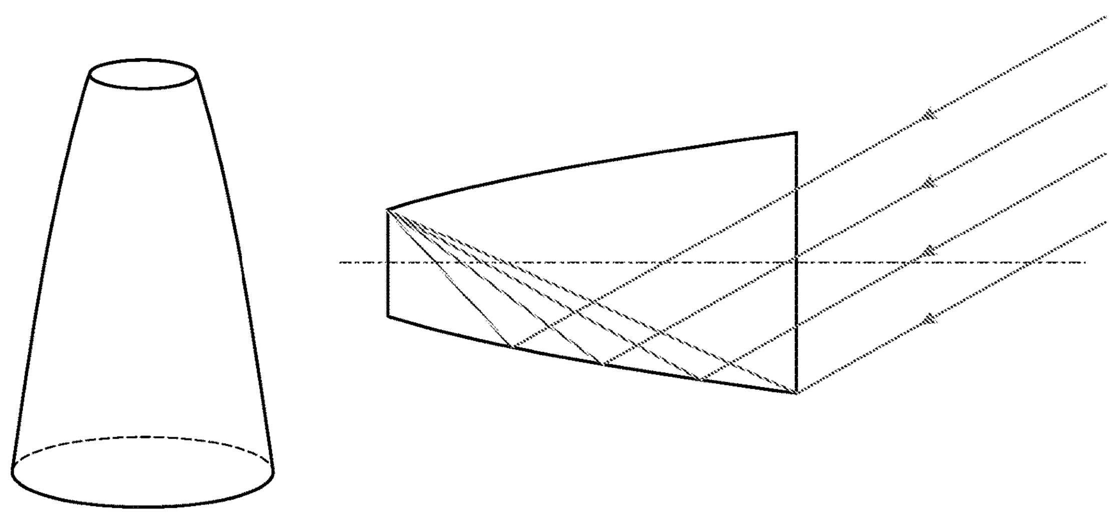

FIG. 399 illustrates a CPC lens.

Figure 400:
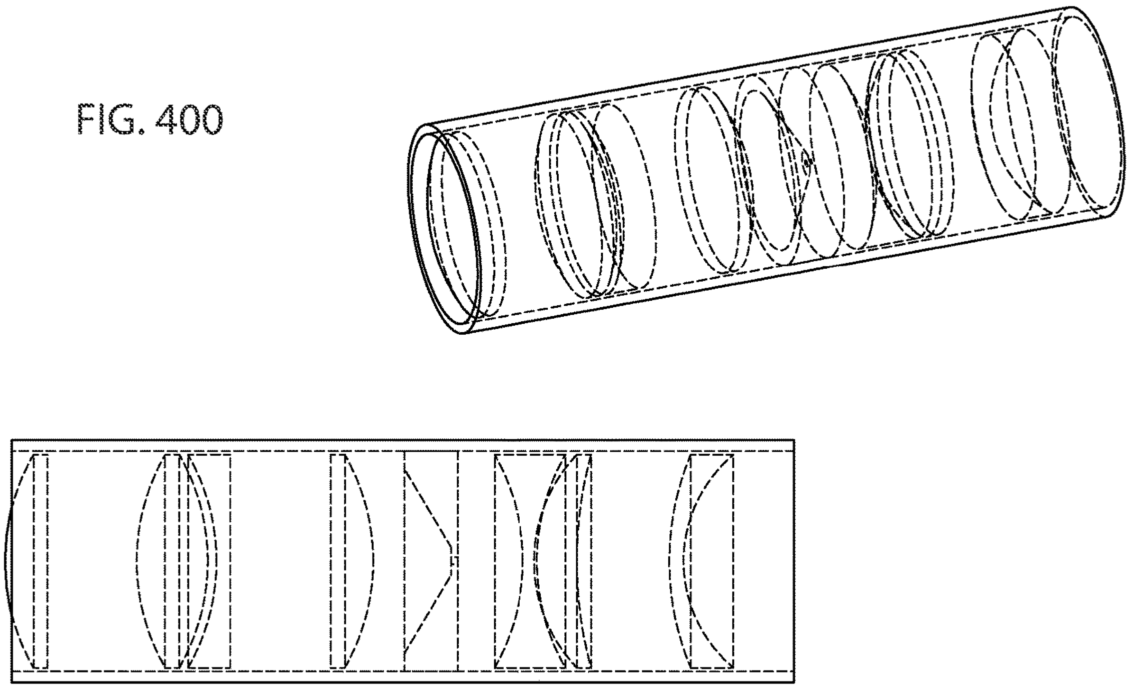

FIG. 400 illustrates an example of a tube system with various elements inside it.

Figure 401:
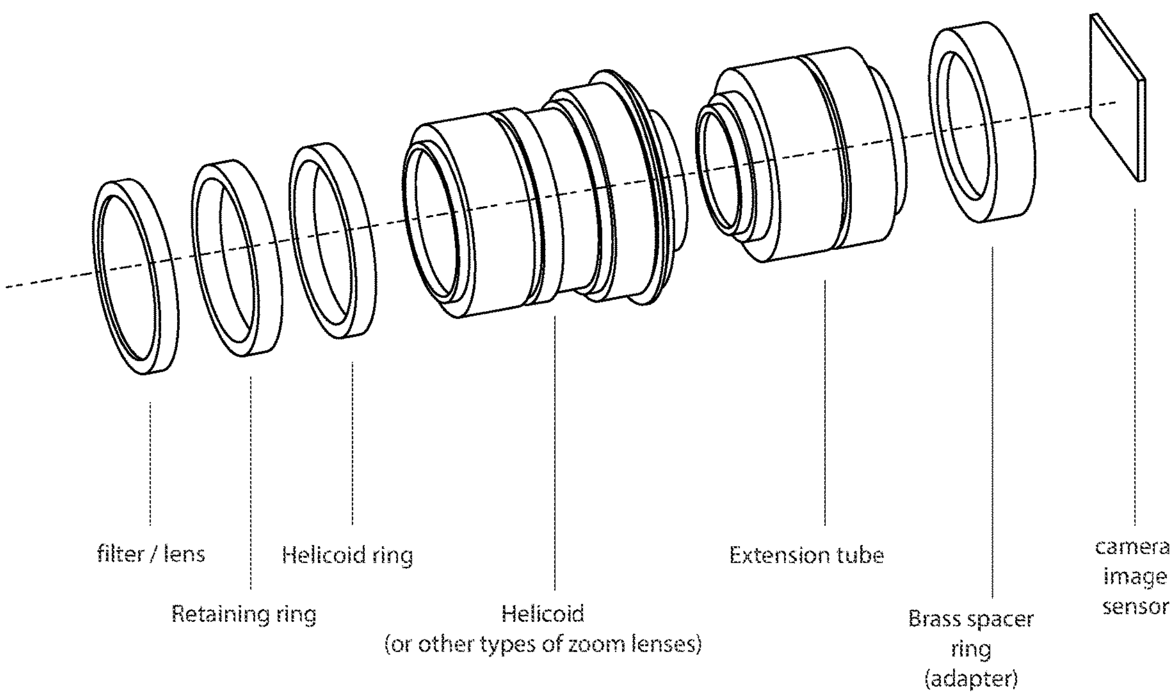

FIG. 401 illustrates an example of high magnification zoom lens in exploded view.

Figure 402:
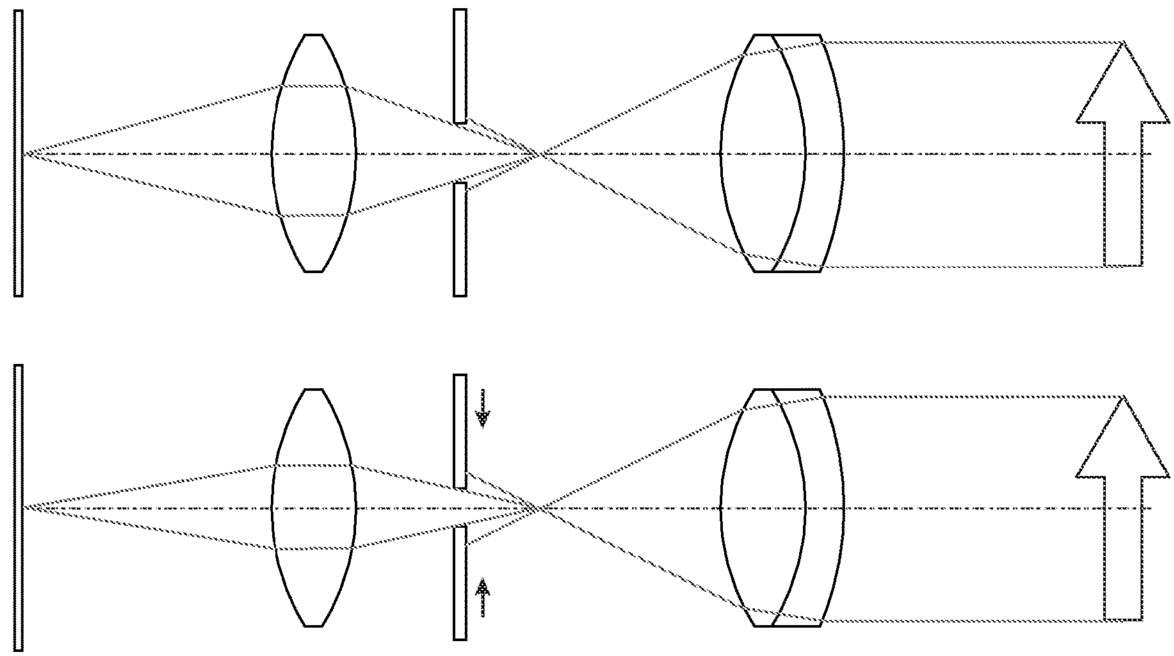

FIG. 402 illustrates the F-Number of the lens system adjusted by adjusting aperture.

Figure 403:
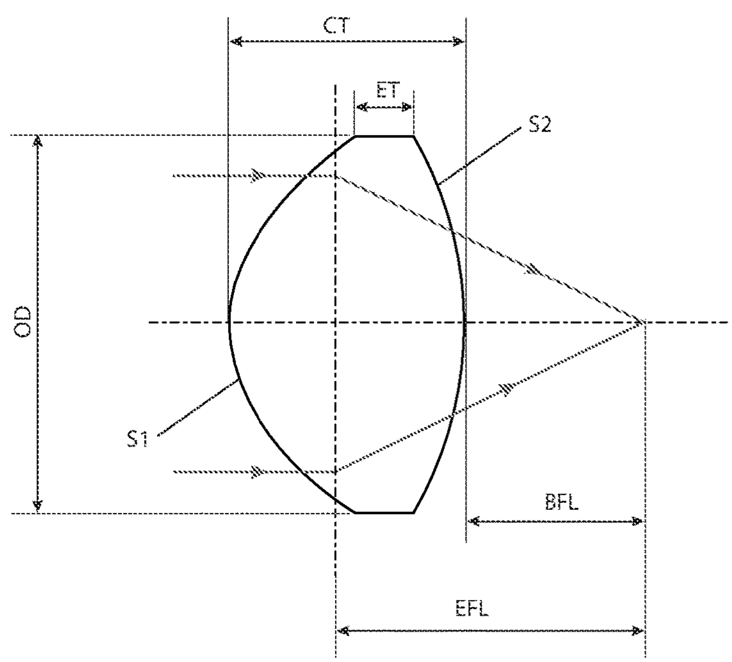

FIG. 403 illustrates an aspheric condenser lens and its features.

Figure 404:
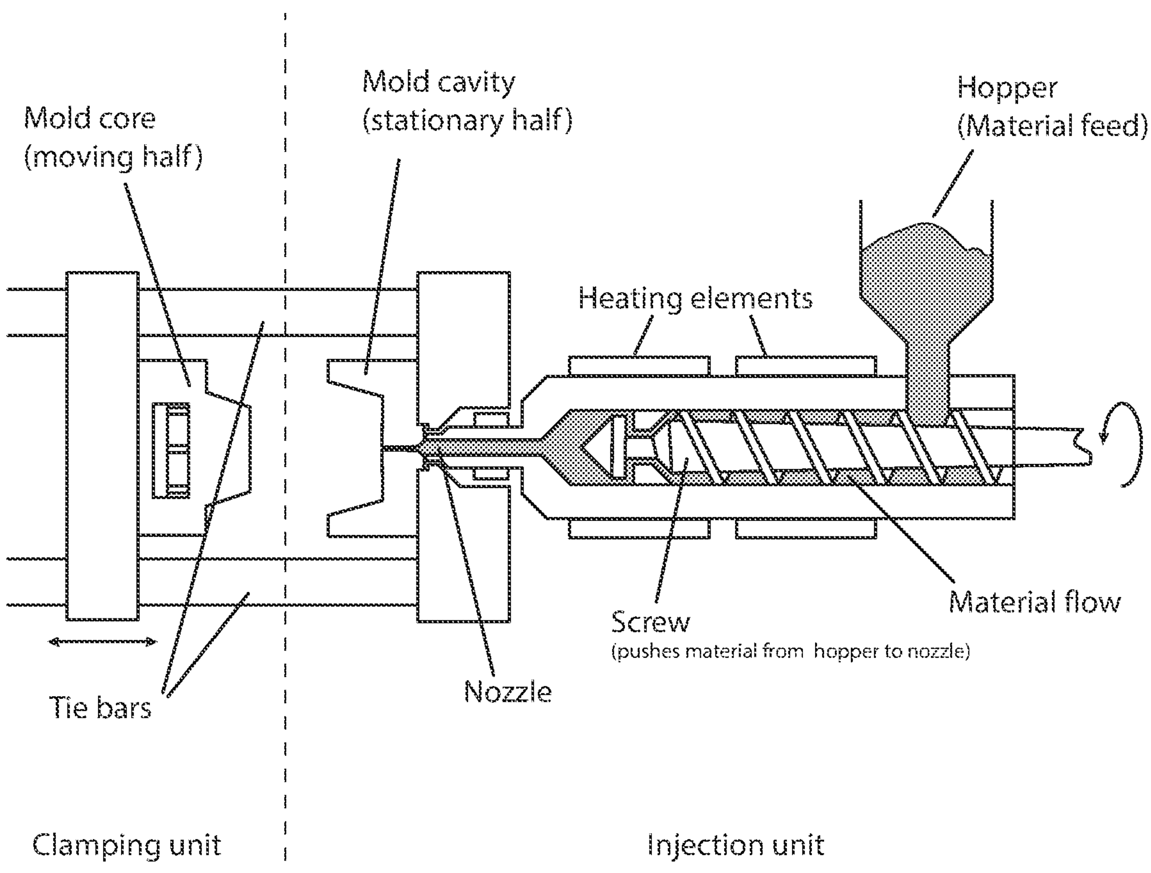

FIG. 404 illustrates basic injection molding machine diagram and its features.

Figure 405:
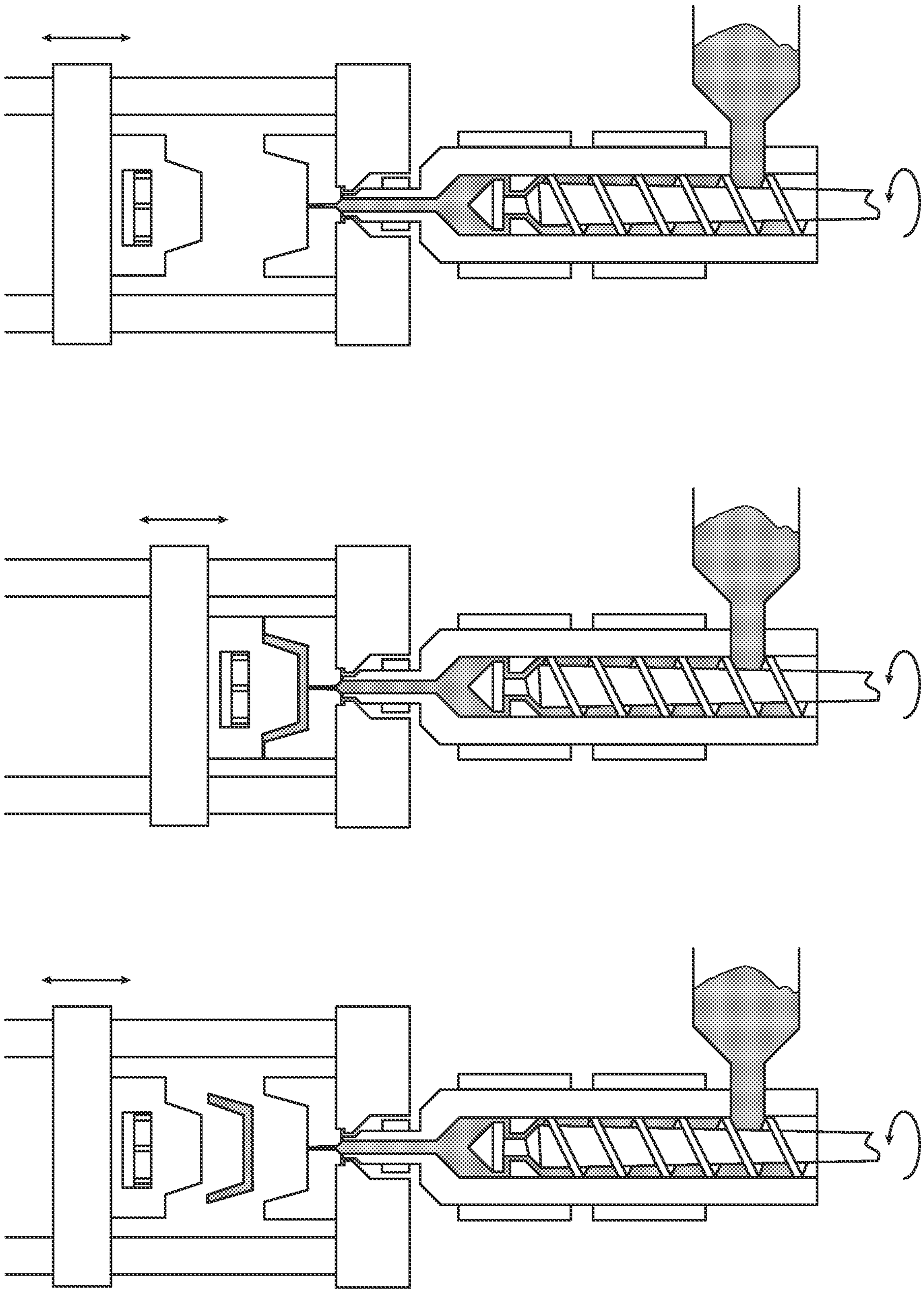

FIG. 405 illustrates the different molding steps on the injection molding machine.

Figure 406:
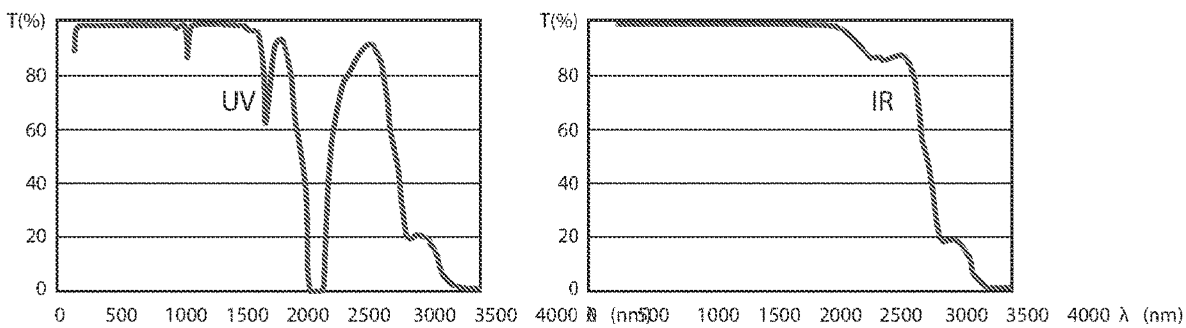

FIG. 406 compares transmission data for UV and IR grade fused silica for a 5 mm thick sample without Fresnel reflections.

Figure 407:
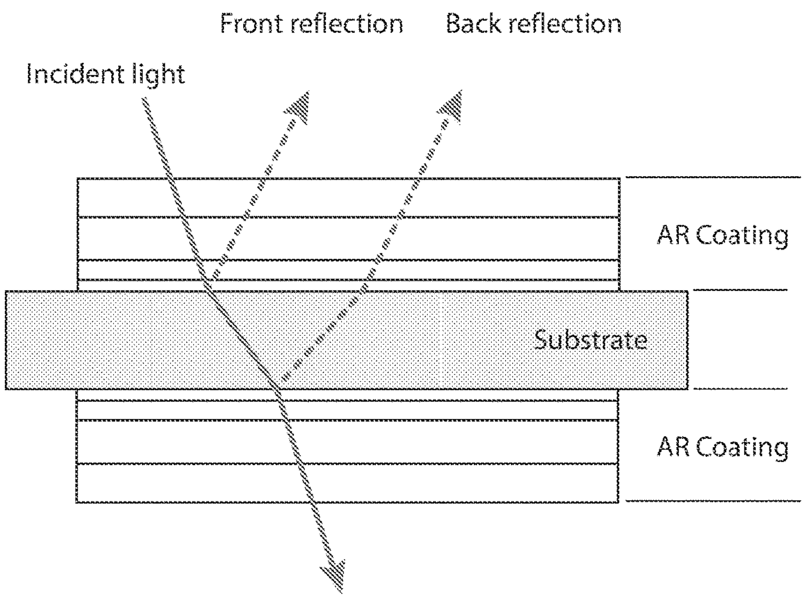

FIG. 407 is an example of a typical multilayer anti-reflection coating.

Figure 408:
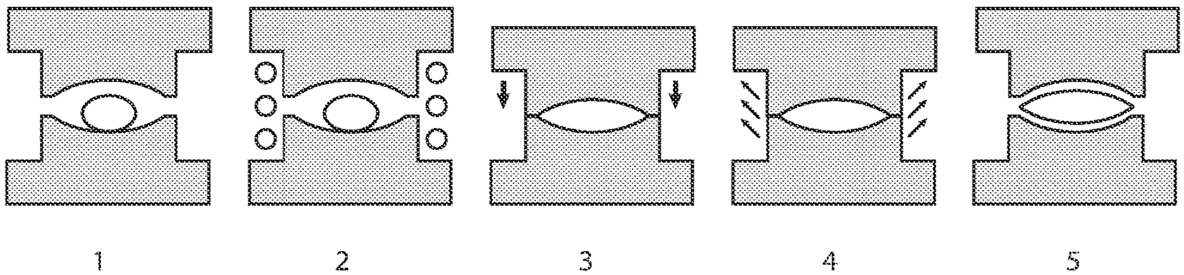

FIG. 408 illustrates the steps of precision glass molding.

Figure 409:
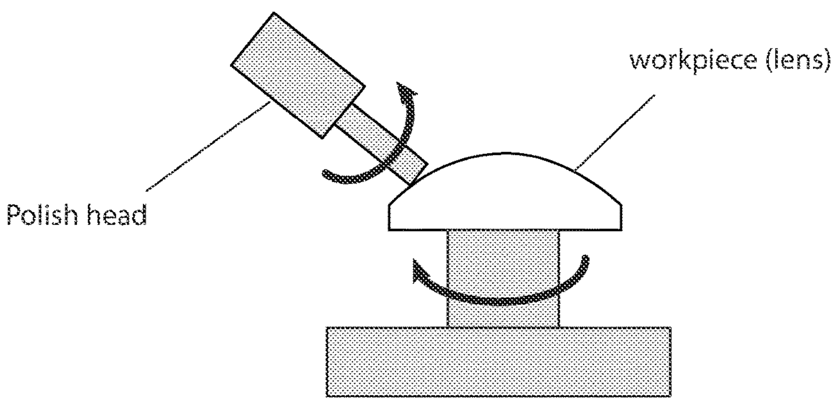

FIG. 409 illustrates a schematic of computer controlled precision polishing.

Figure 410:
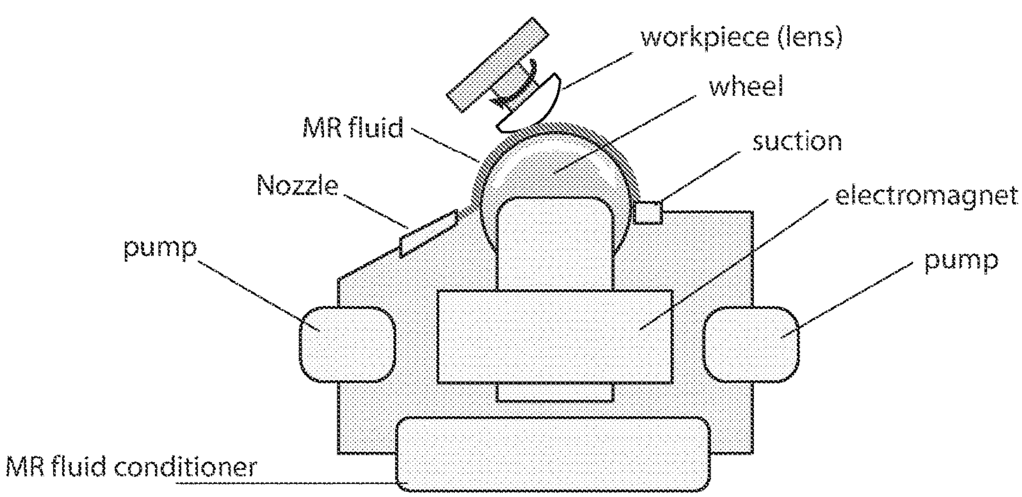

FIG. 410 illustrates a schematic of a MRF machine.

Figure 411:
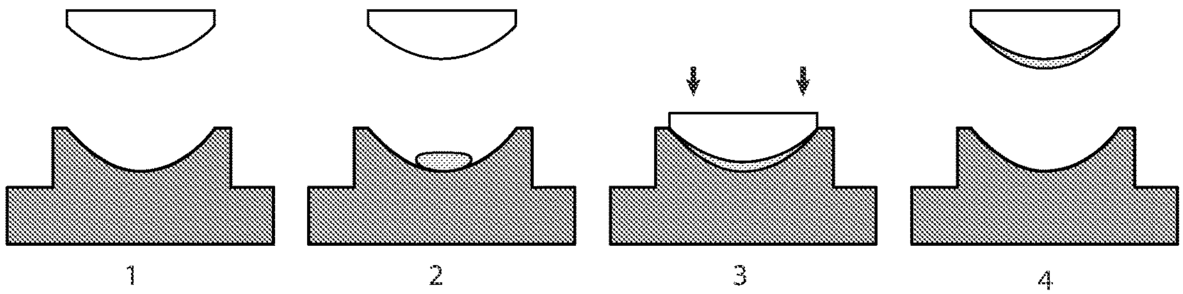

FIG. 411 illustrates the steps of polymer molding for achromatic lenses with aspheric surface.

Figure 412:
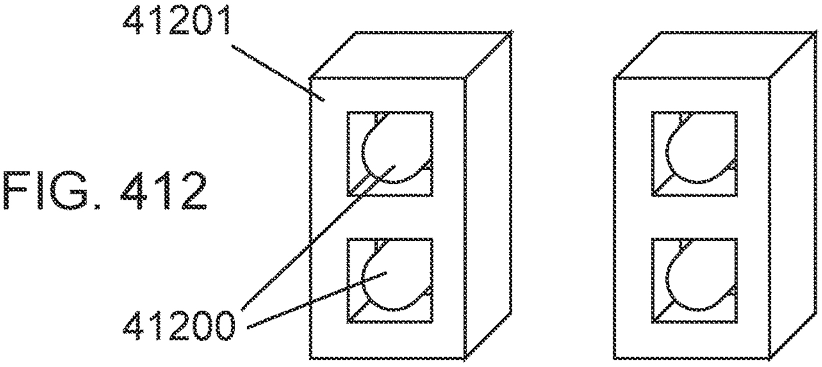

FIG. 412 illustrates an example of sensors and foam casings.

Figure 413:
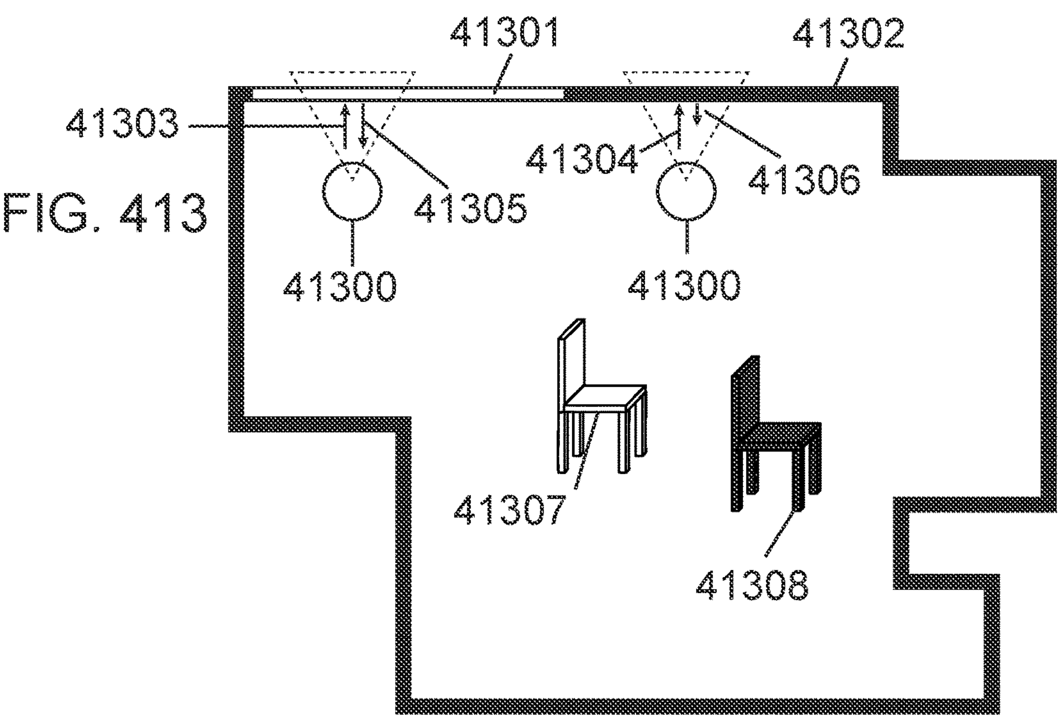

FIG. 413 illustrates a robot emitting and receiving a signal to and from a white wall and a black wall.

Figure 414:
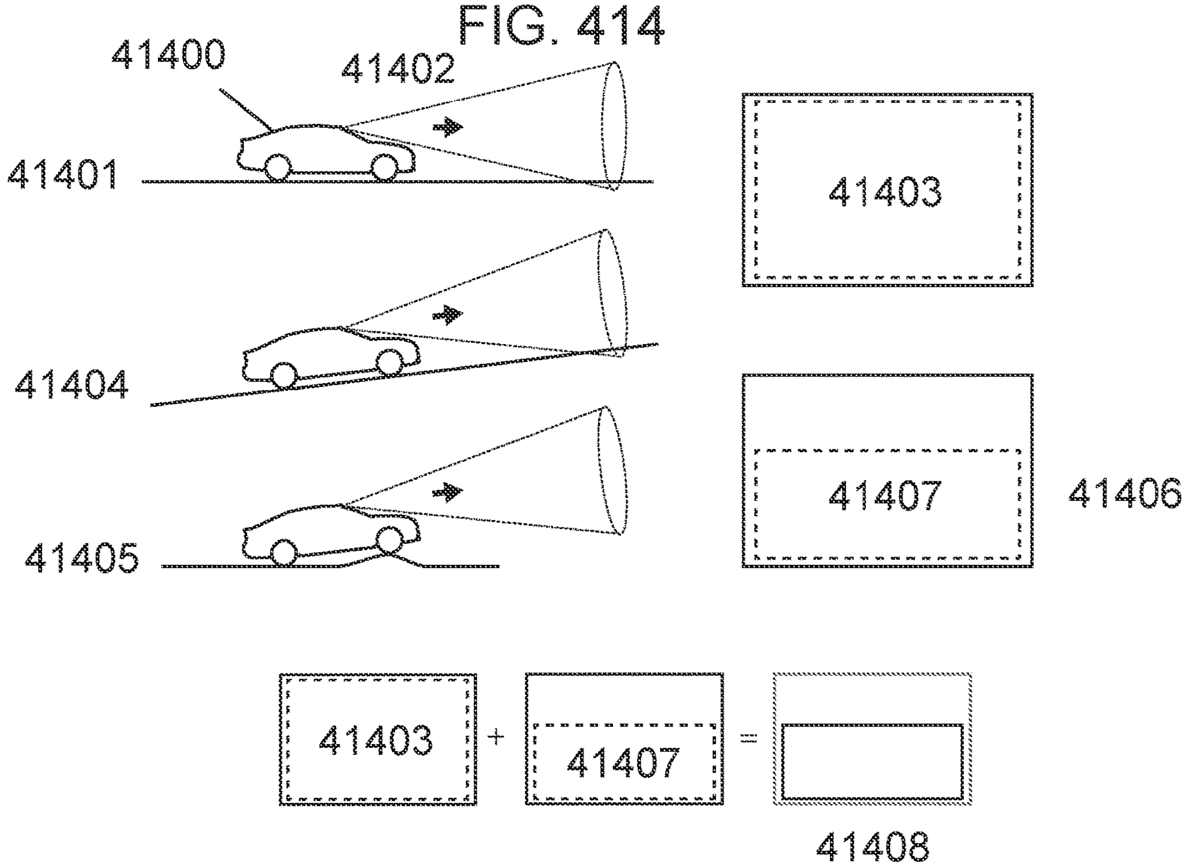

FIG. 414 illustrates an autonomous vehicle and the FOV of the camera of the vehicle driving in different surface situations.

Figure 415:
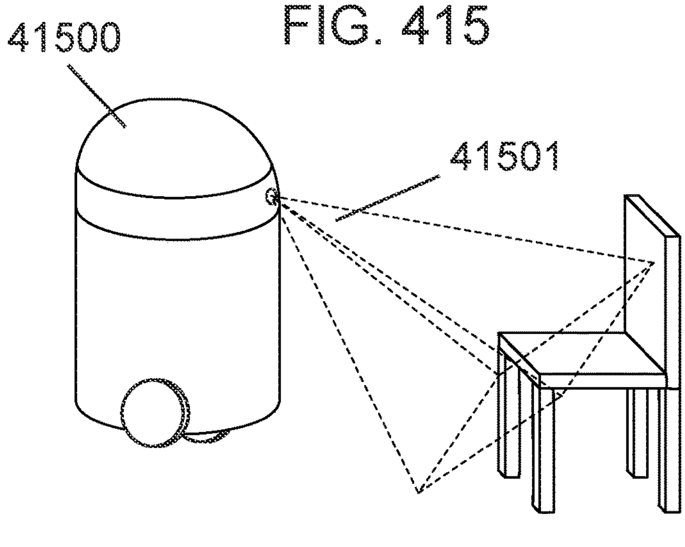

FIG. 415 illustrates an example of a robot with a camera angled downwards.

Figure 416:
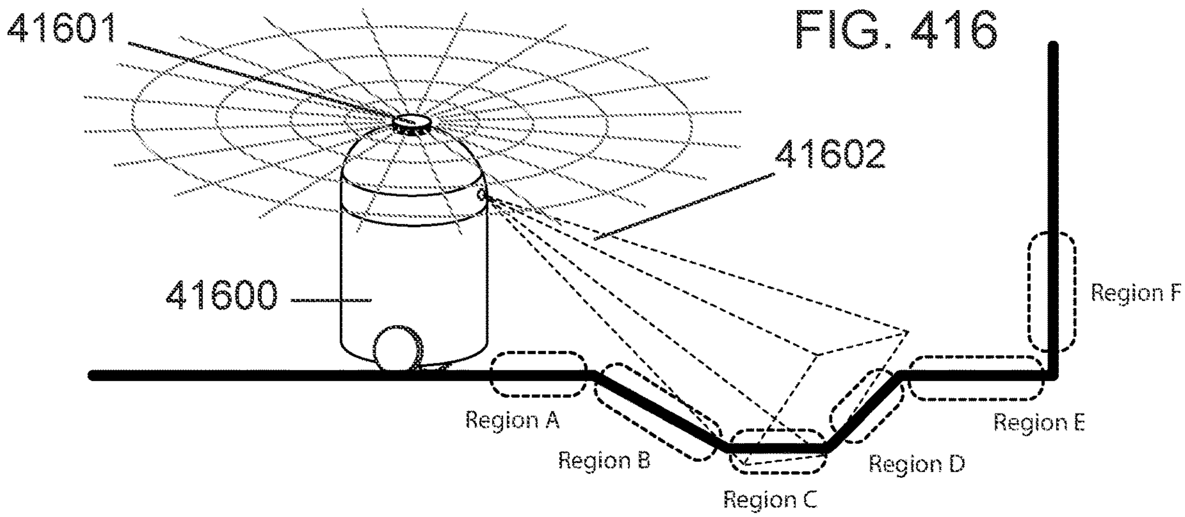

FIG. 416 illustrates an example of a robot with a LIDAR and a camera and the ground with different slope regions.

Figure 417:
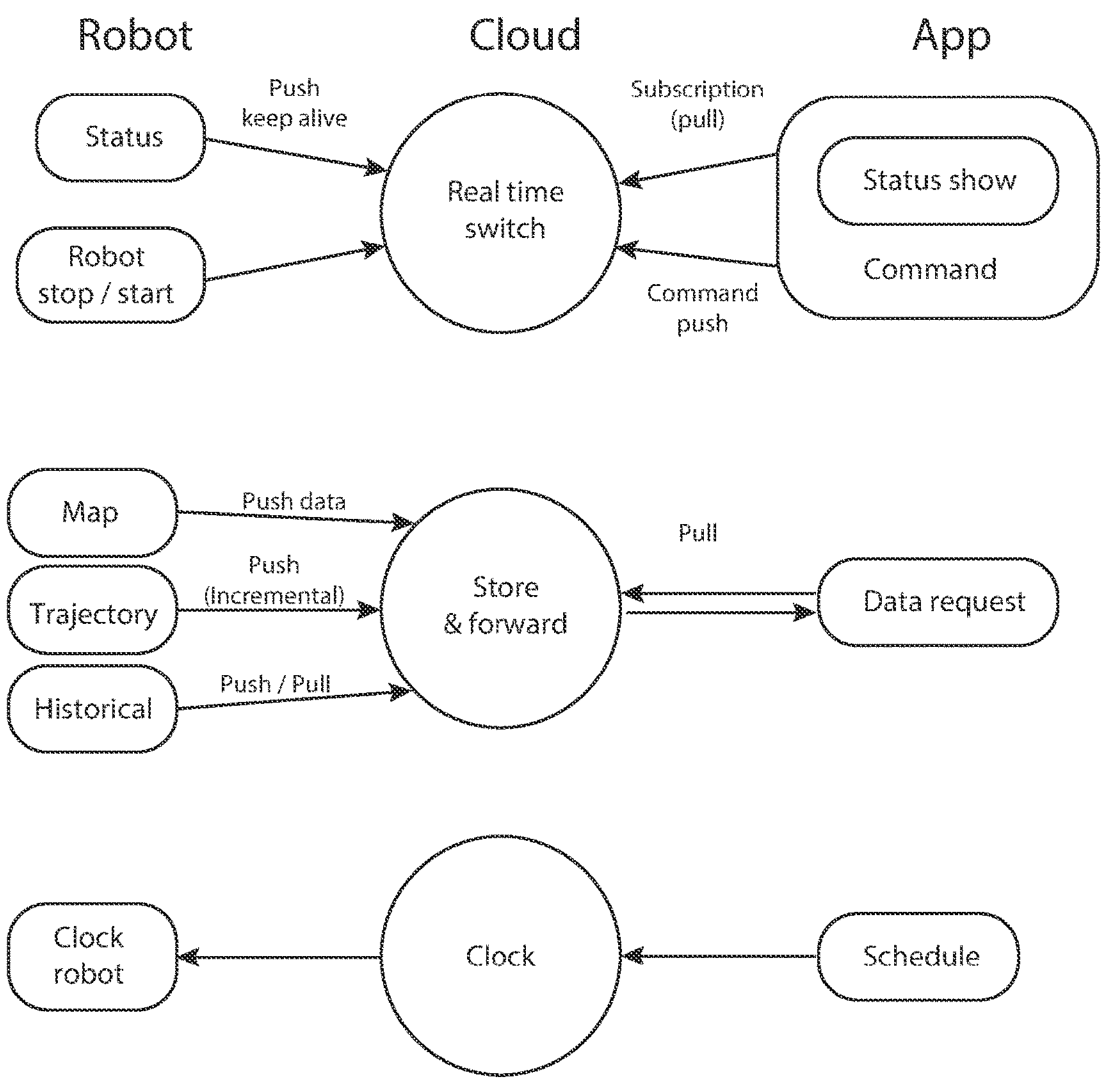

FIG. 417 illustrates an example of communication between the system of the robot and the application via the cloud.

Figure 418:
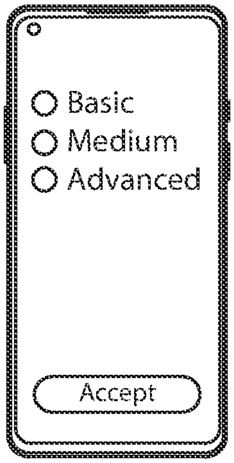

FIG. 418 illustrates an example of an application displaying possible configuration choices from which a user may choose from.

Figure 419:
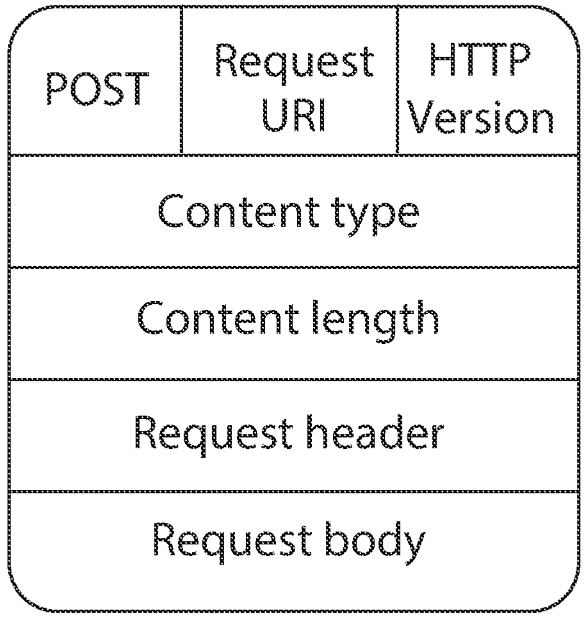

FIG. 419 illustrates an example of a format of a POST request.

Figure 420:
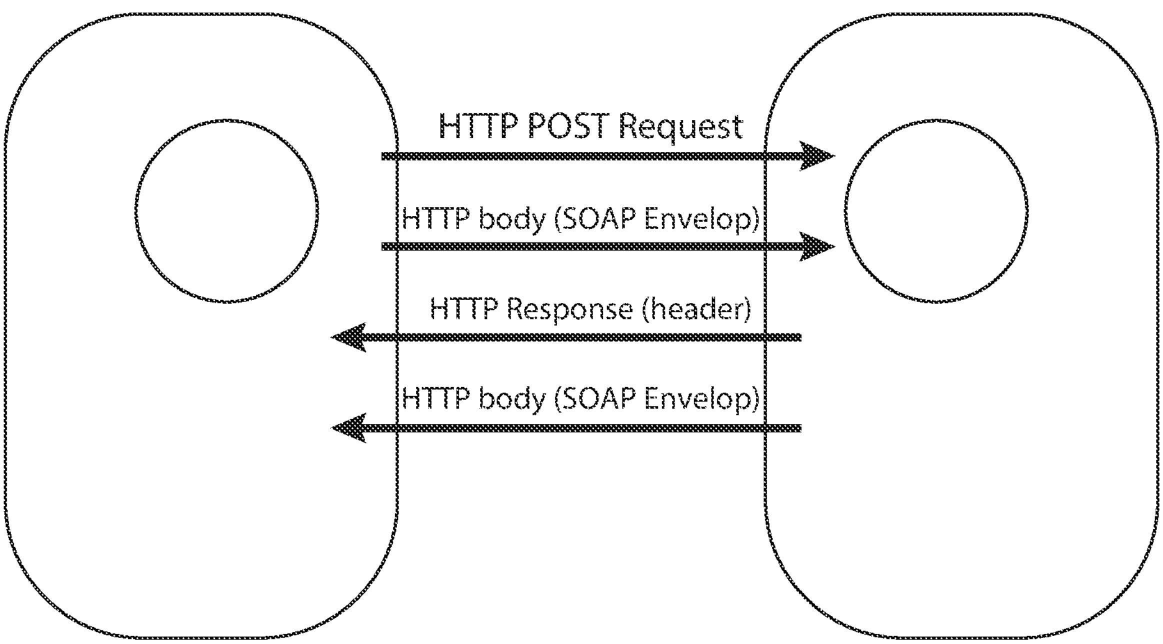

FIG. 420 illustrates an example of exchange of information between two applications.

Figure 421A:
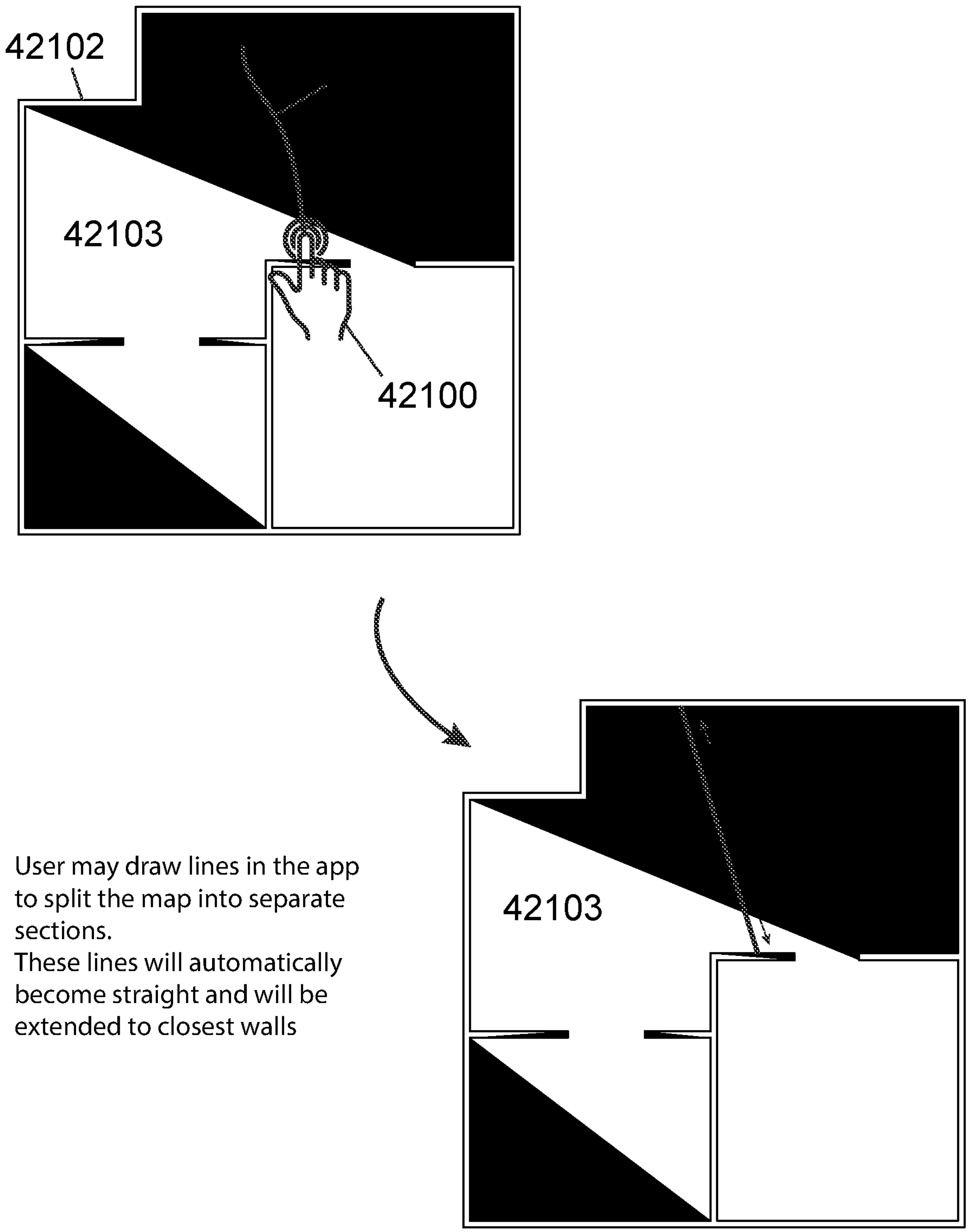

FIGS. 421A-421B illustrate the application may be used to display the map and manipulate areas of the map.

Figure 421C:
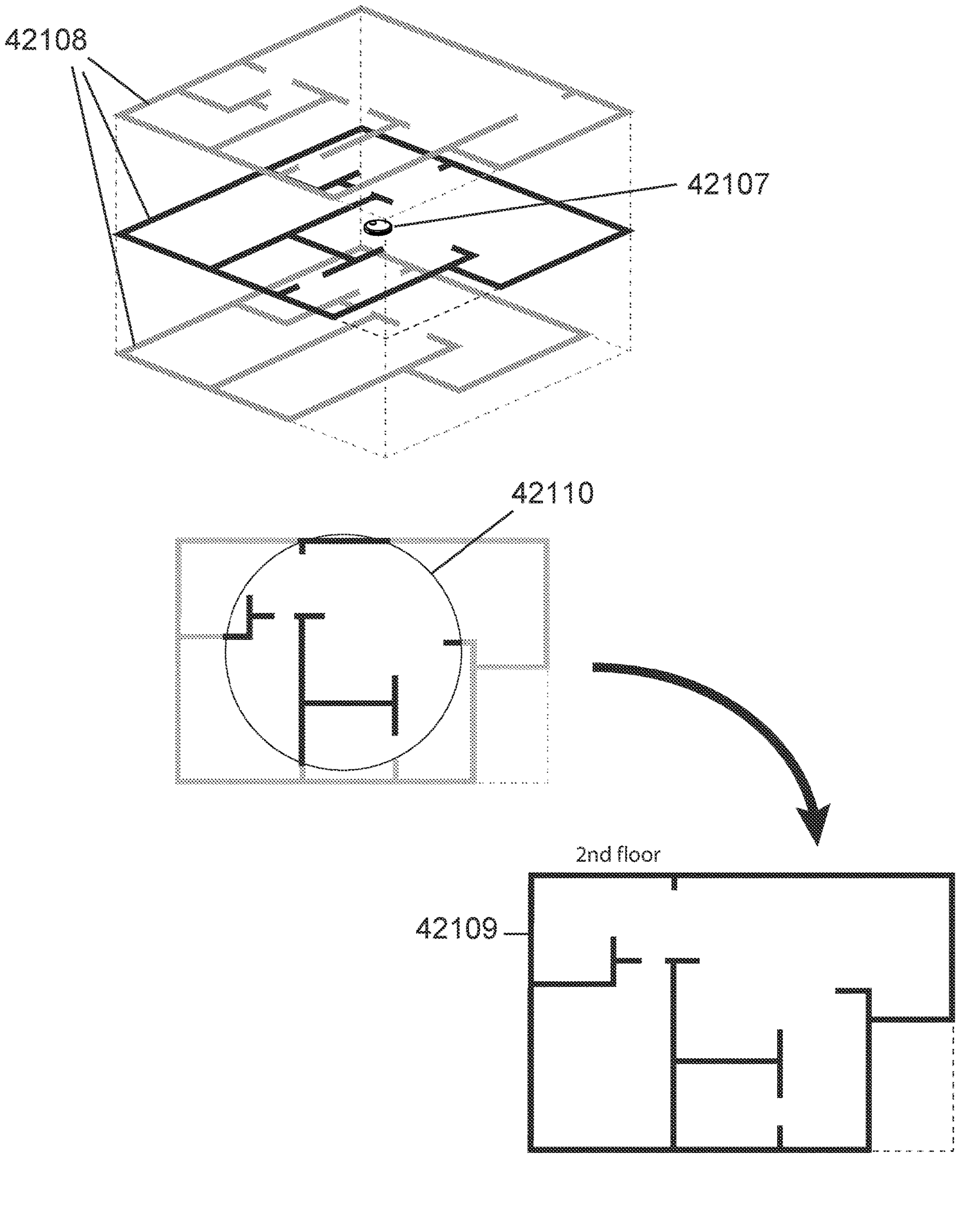

FIG. 421C illustrates the robot may have maps of several floors in the memory.

Figure 421D:
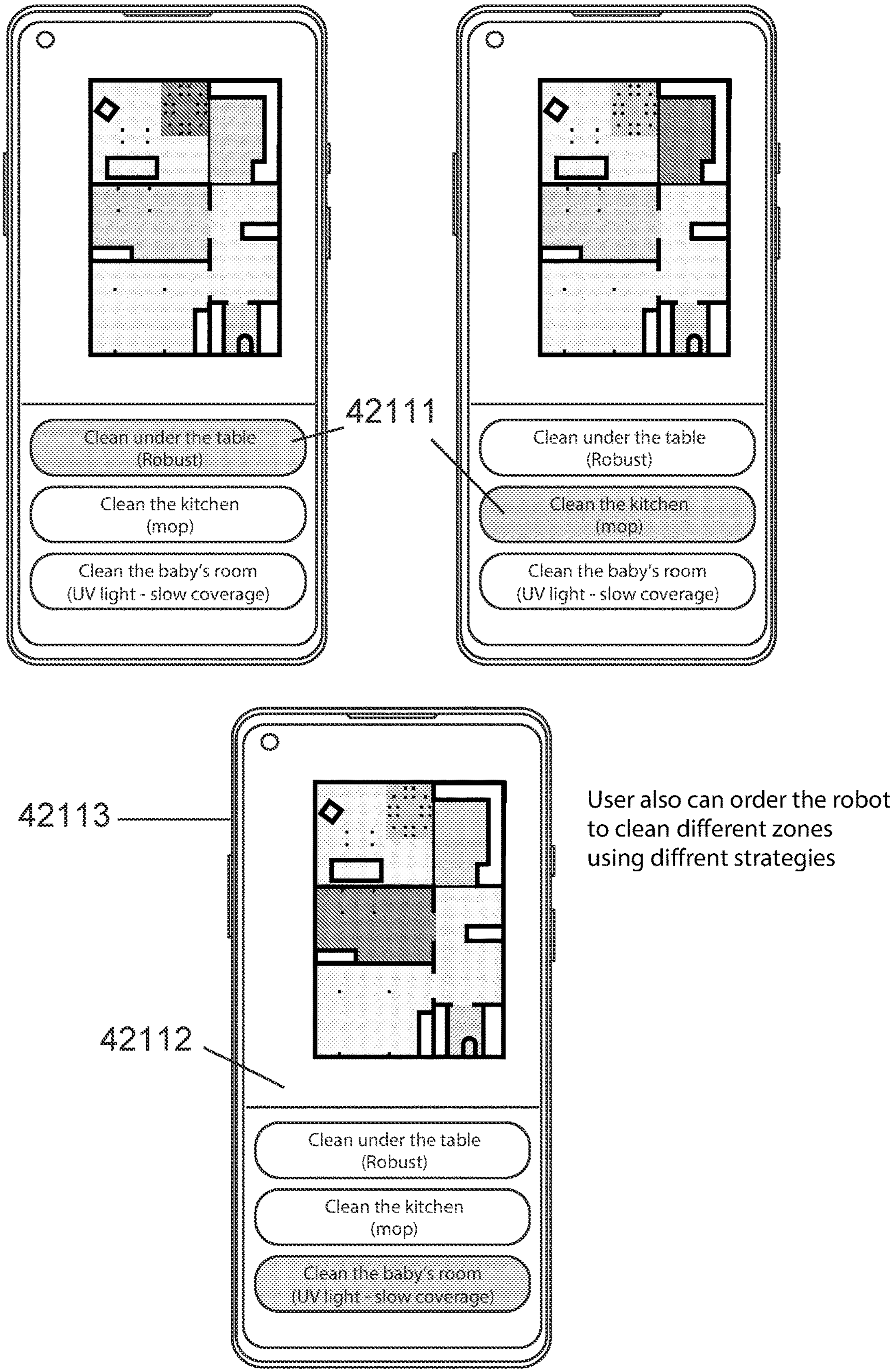

FIG. 421D illustrates User also can order the robot to clean different zones by selecting different strategies on an application of a communication device.

FIG. 422 illustrates an example of a map displayed by the application and a virtual dog house and a virtual rug added to the map by a user.

FIG. 423A-423B illustrate that a virtual rug icon in the map may have different meaning for different tasks.

FIG. 424 illustrates no overlap, medium overlap, high overlap, and dense overlap on the path of the robot.

Figure 425:
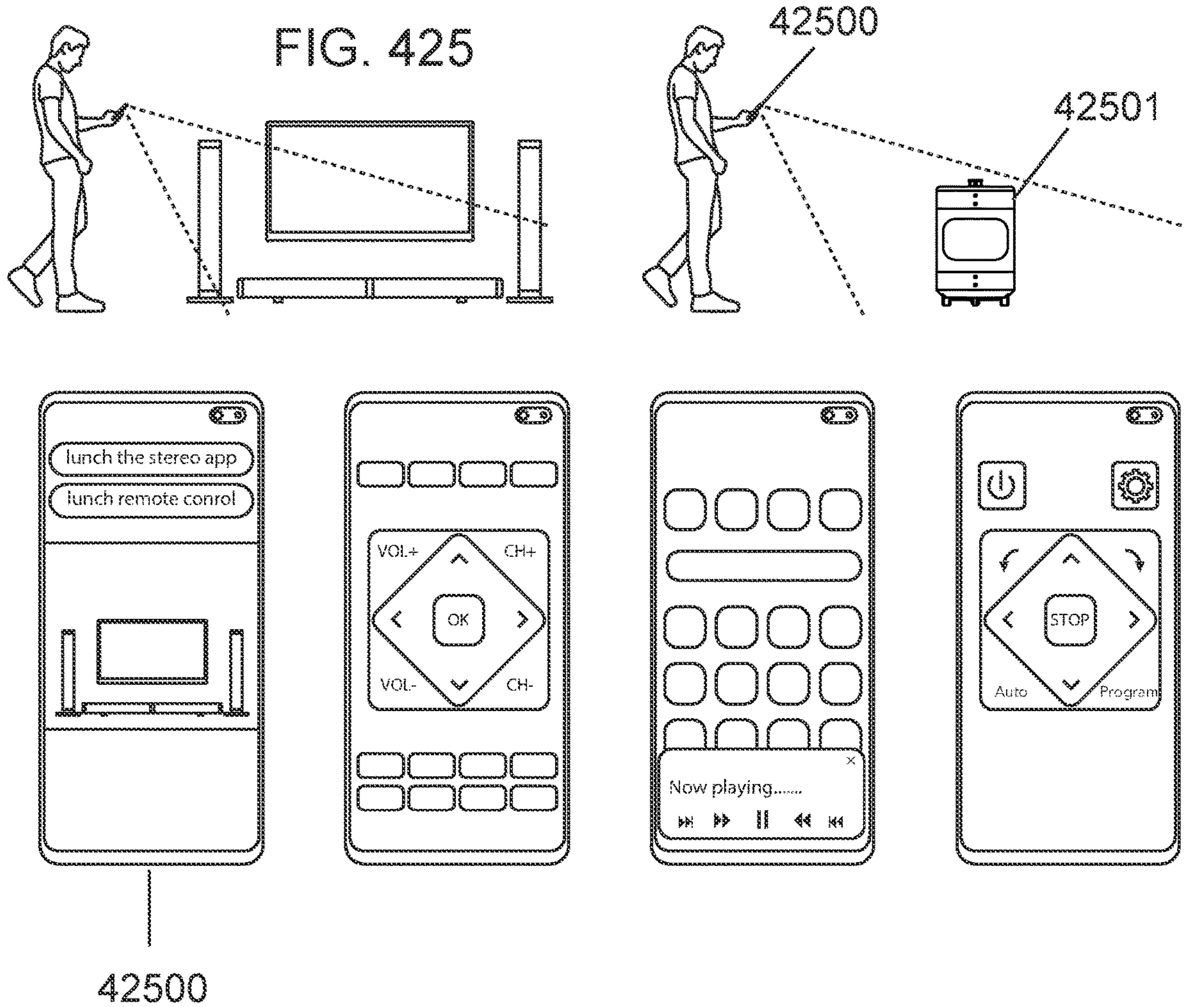

FIG. 425 illustrates that the user may point their cell phone at the robot or any IOT device and based on what cell phone sees a different user interface may pop up.

FIGS. 426A-426D illustrate a charging station with emptying mechanism for a larger robot type.

Figure 427A:
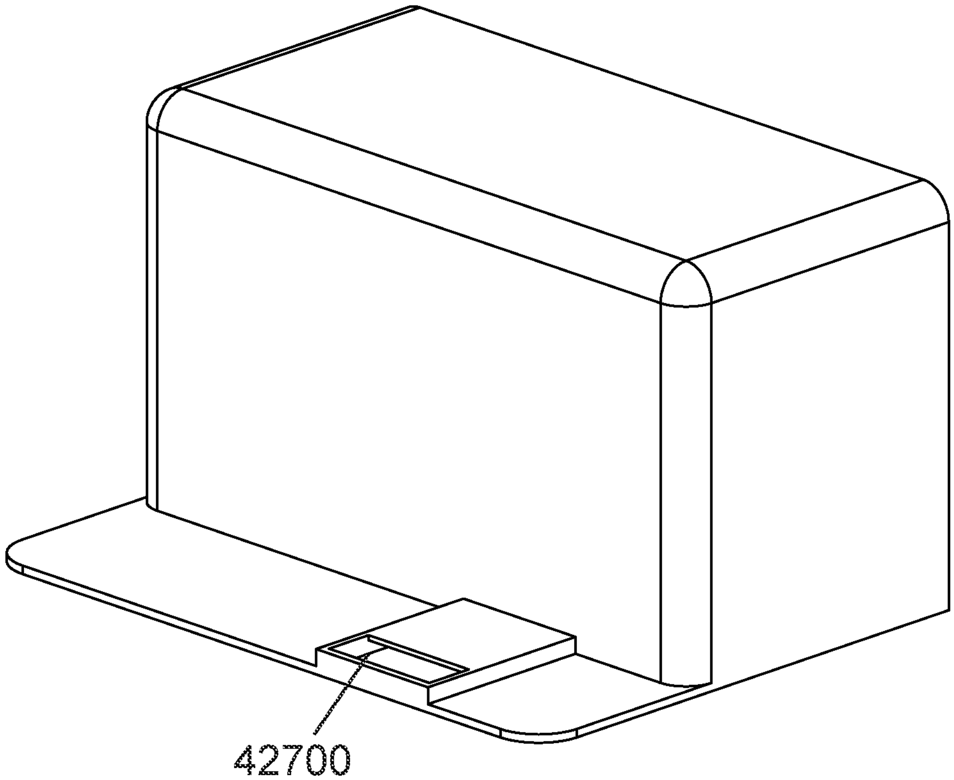
Figure 427B:
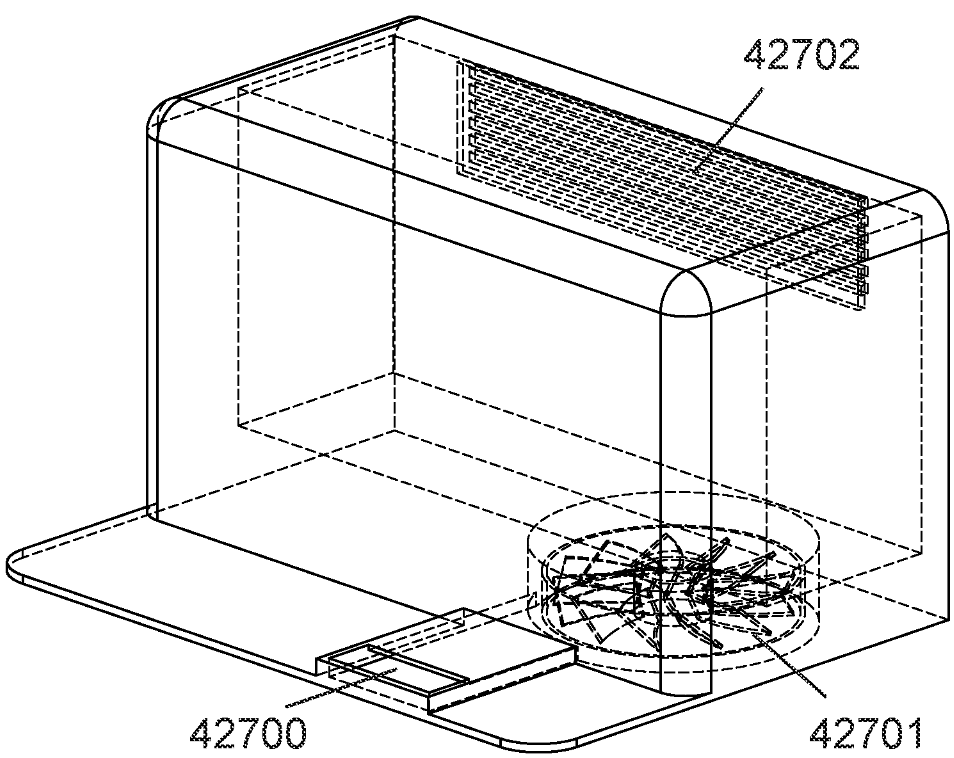

FIGS. 427A-427B illustrate a variation of charging station with emptying mechanism.

Figure 428A:
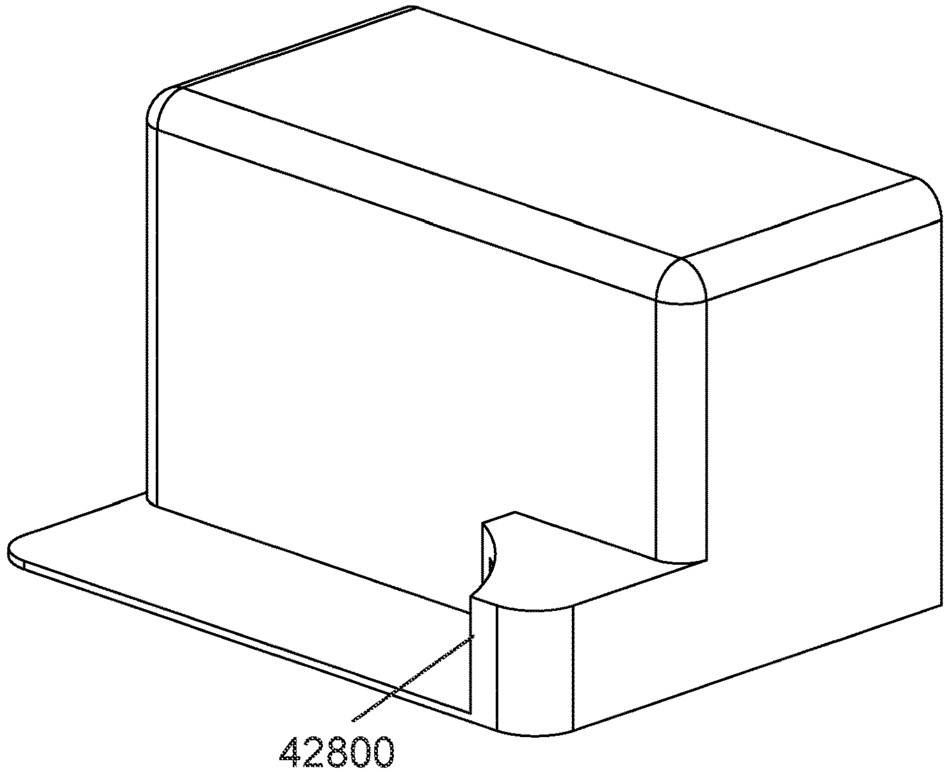
Figure 428B:
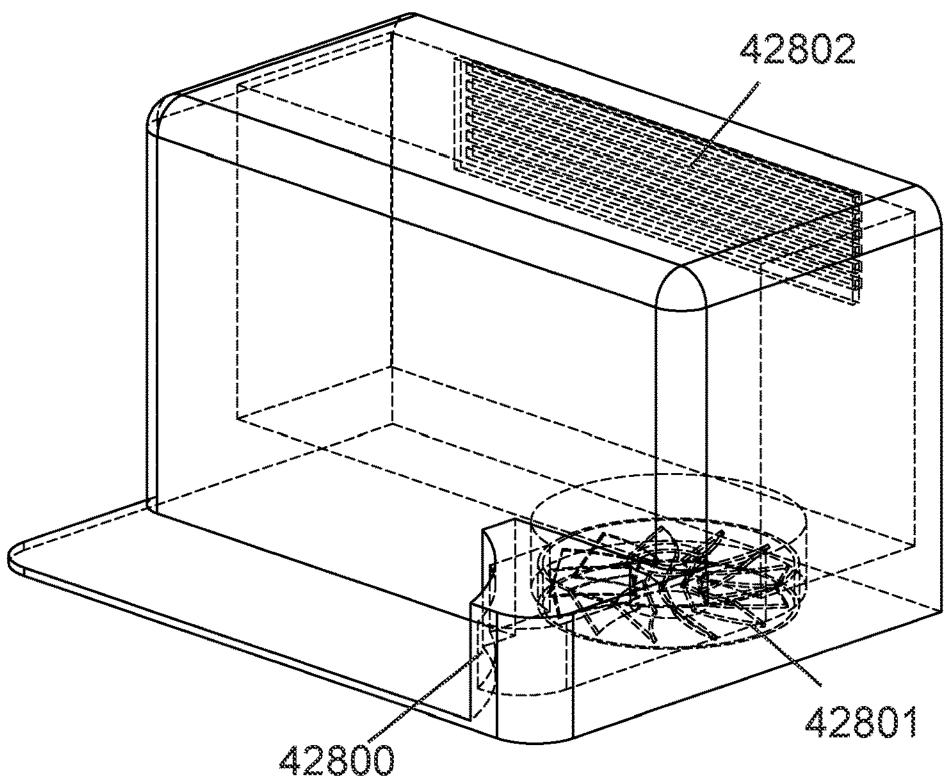
Figure 428C:
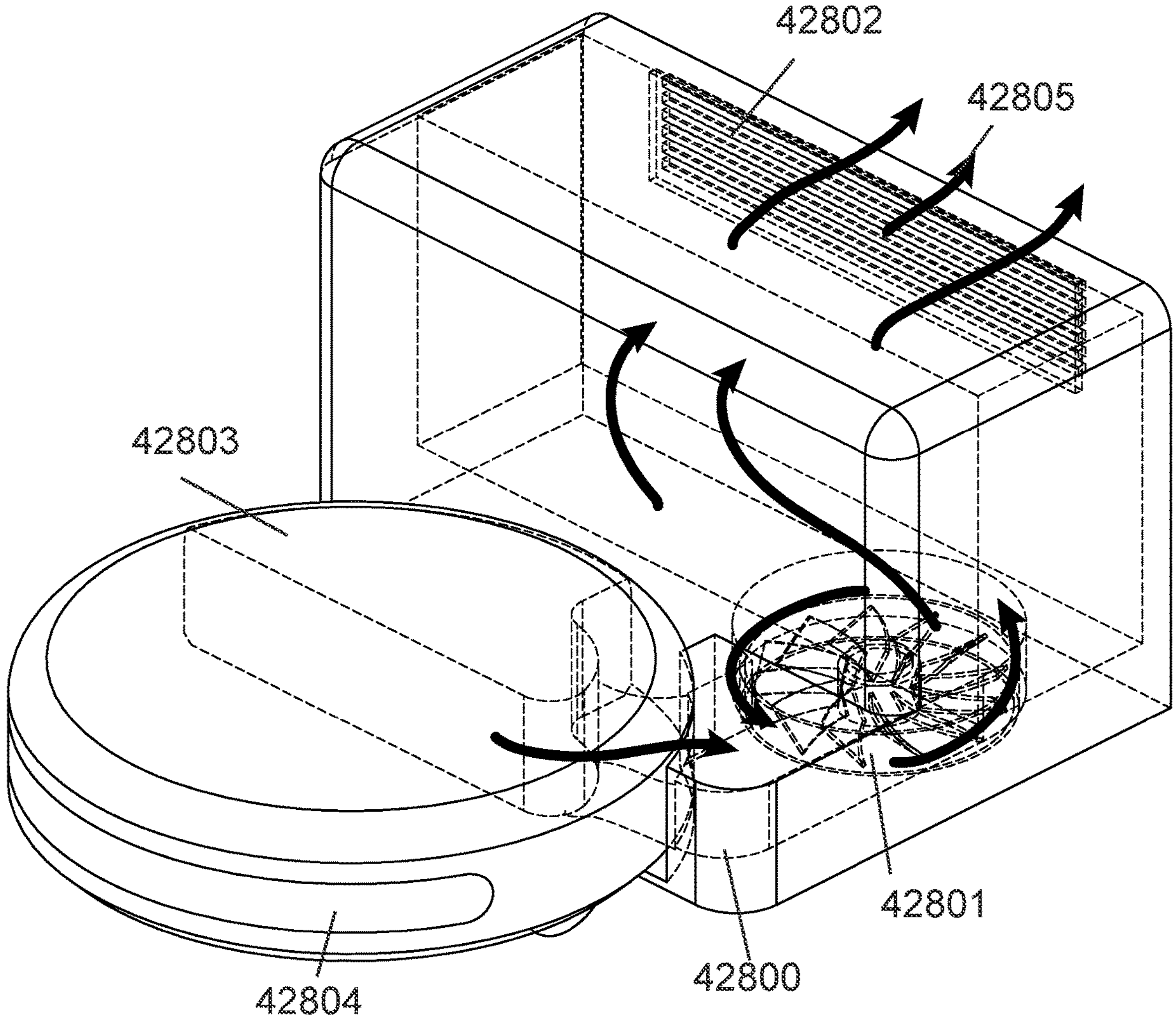
Figure 429A:
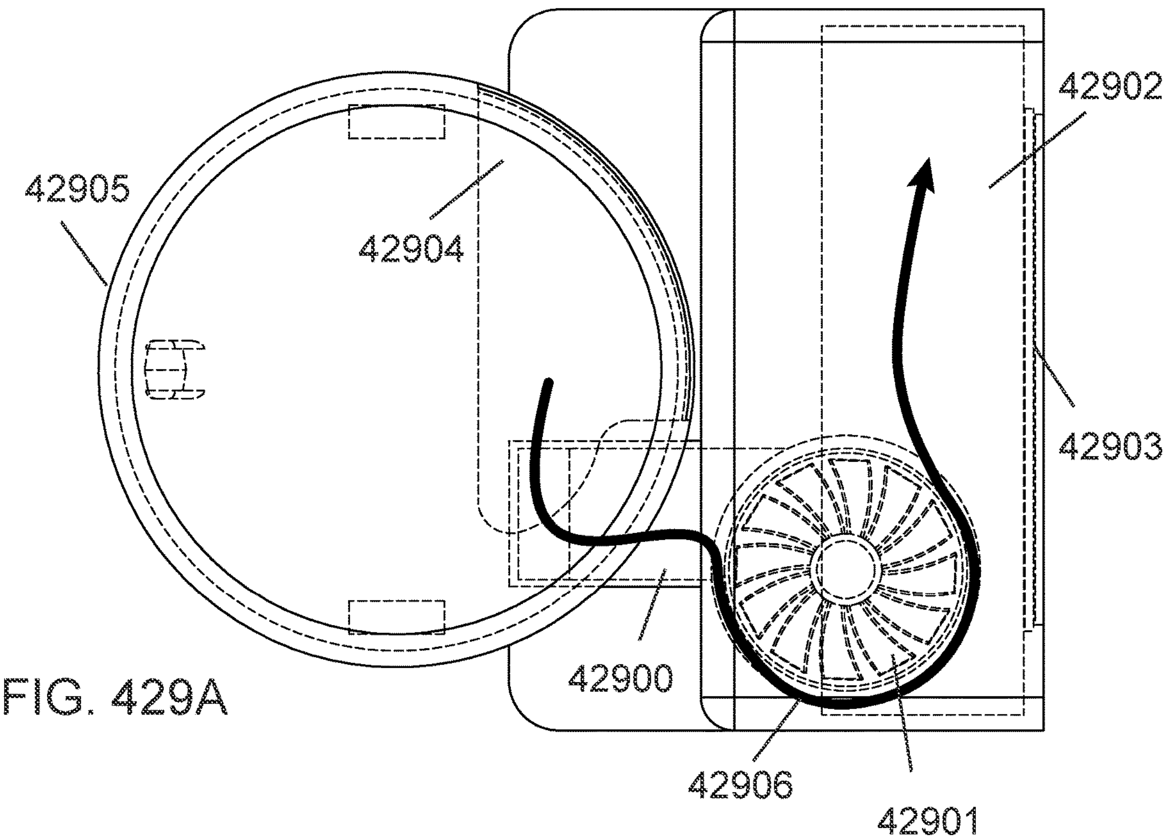
Figure 429B:
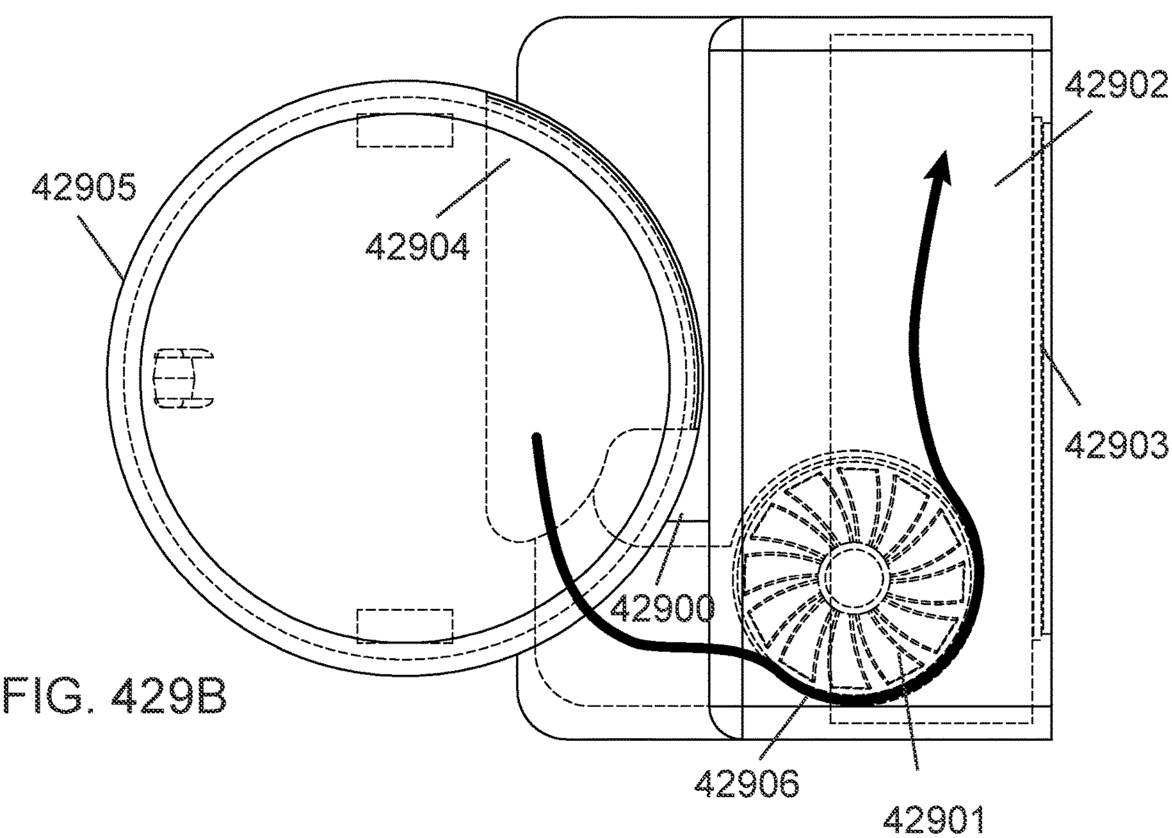
Figure 429C:
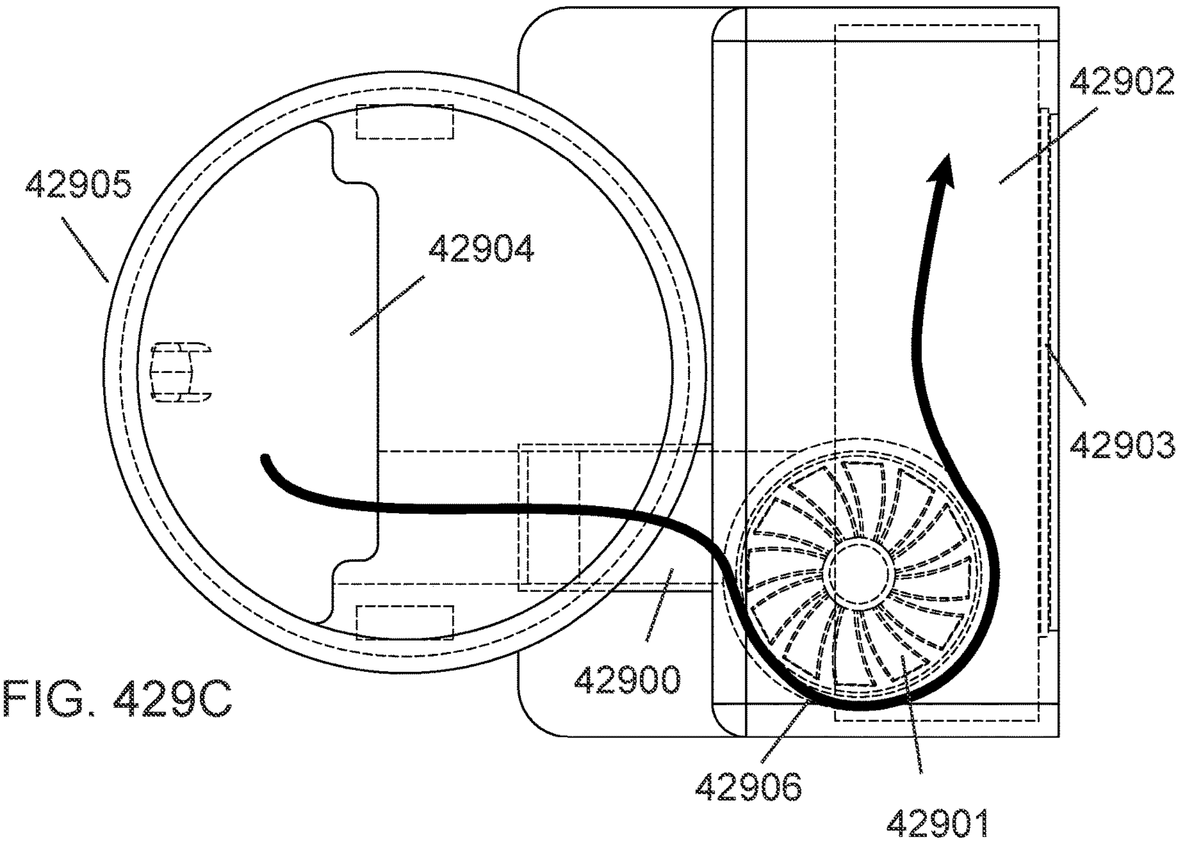
Figure 429D:
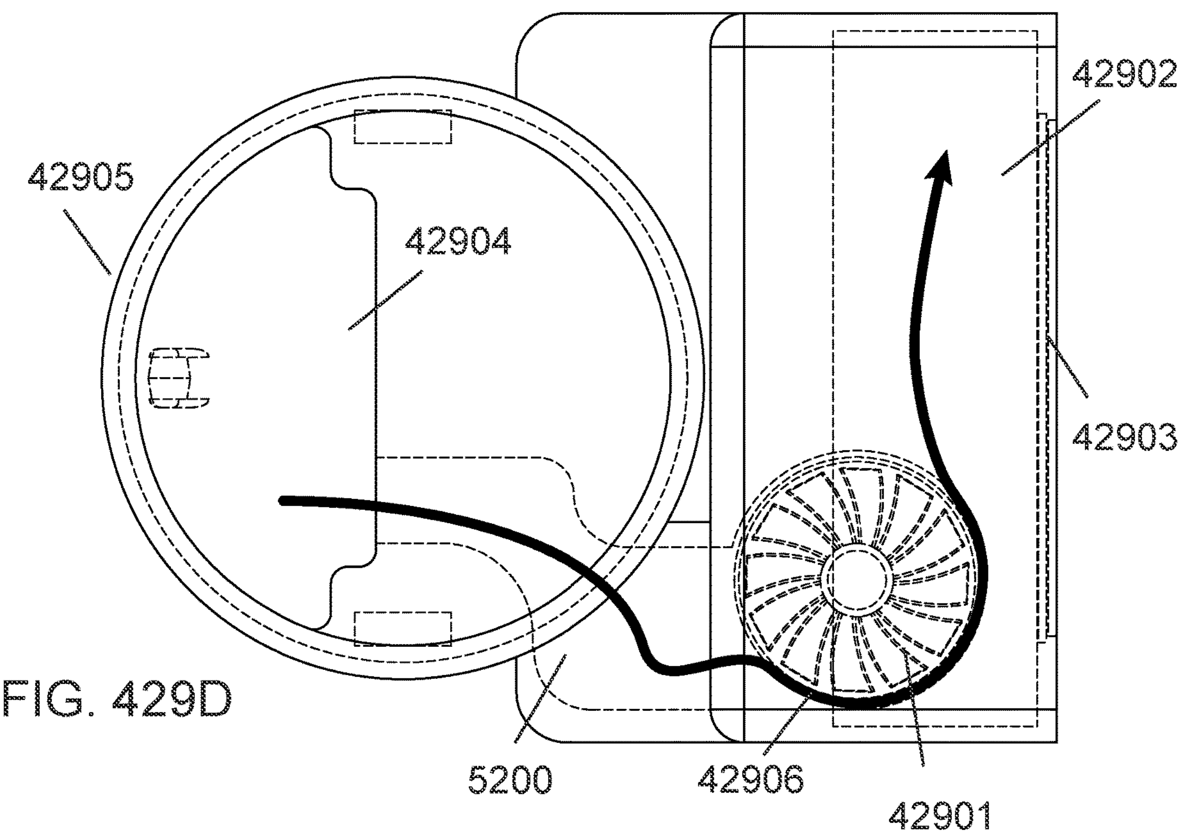
Figure 429E:
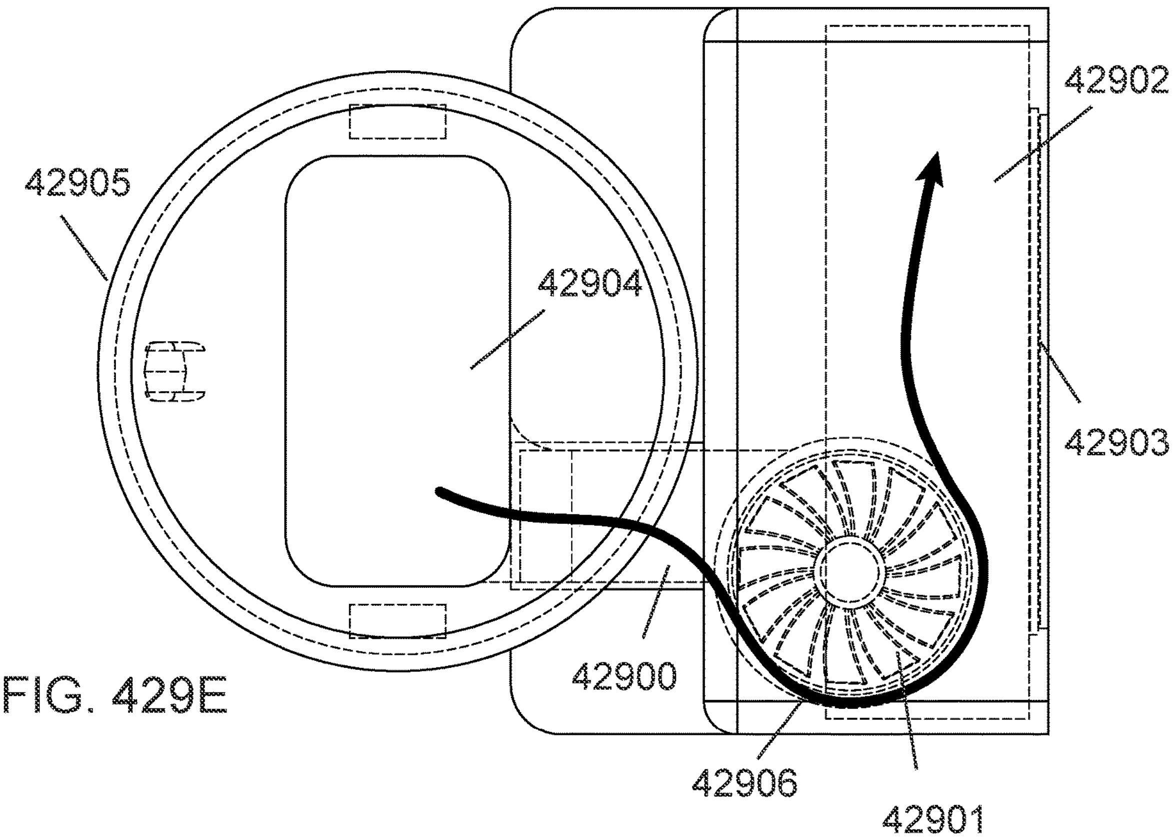
Figure 429F:
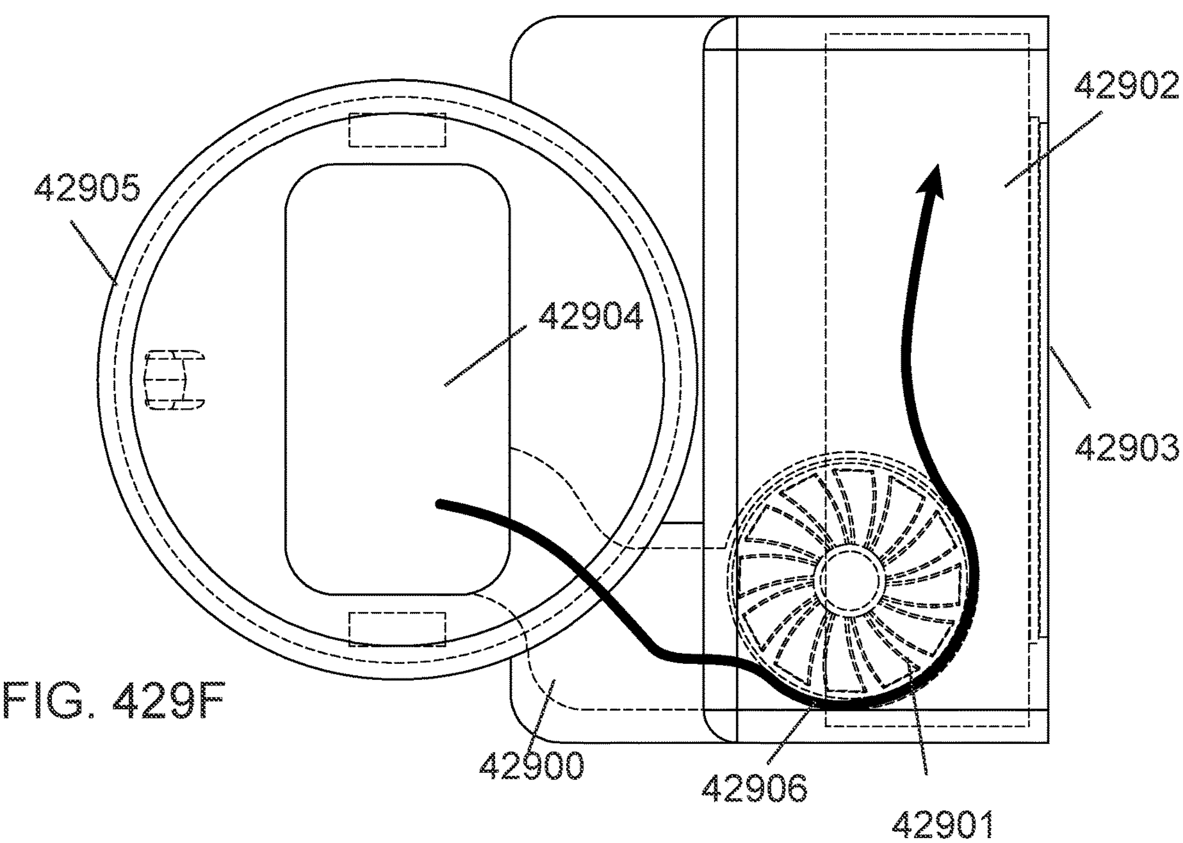
Figure 429G:
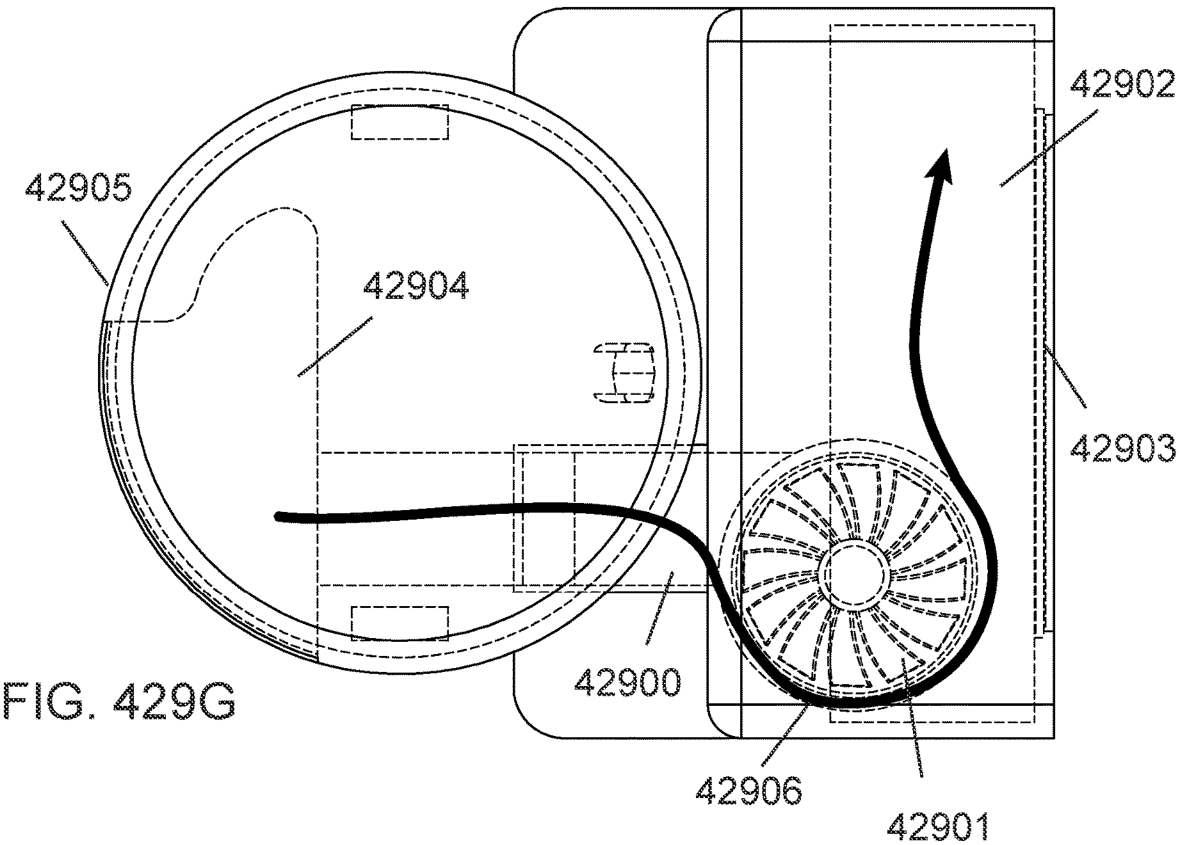
Figure 429H:
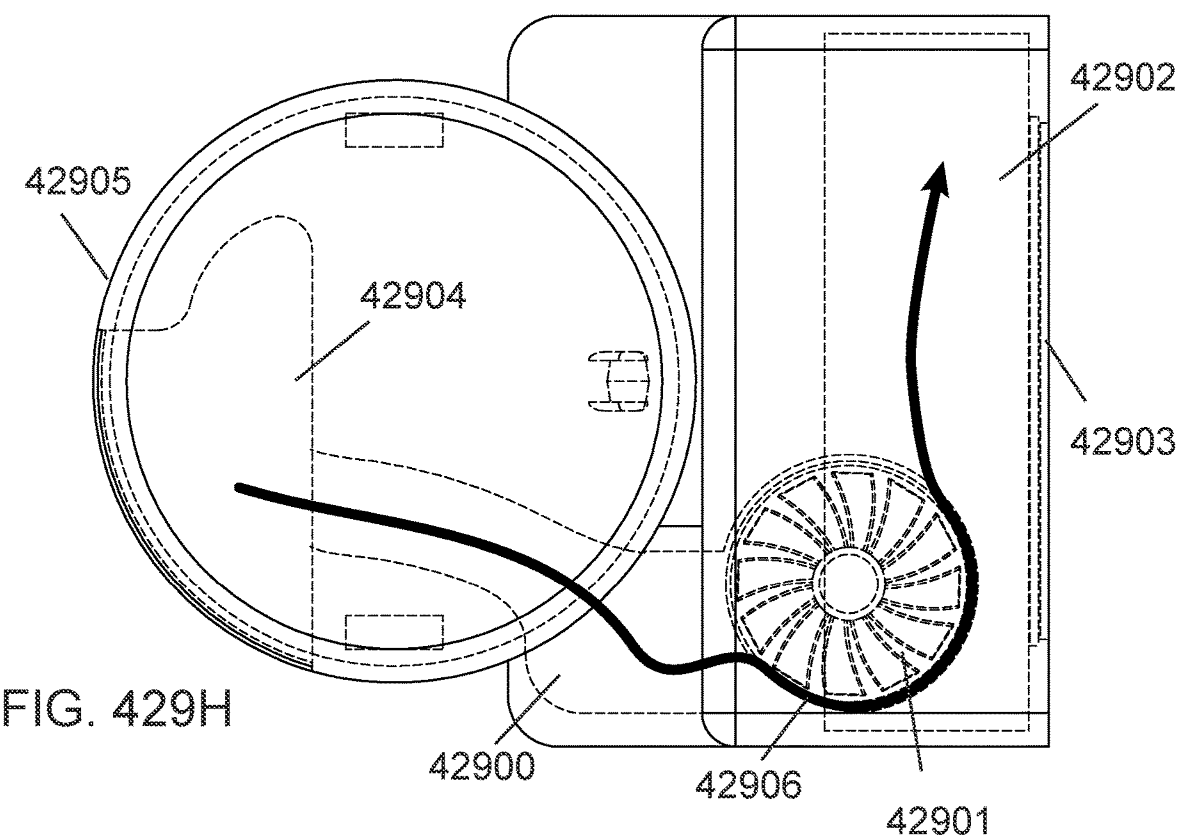
Figure 429I:
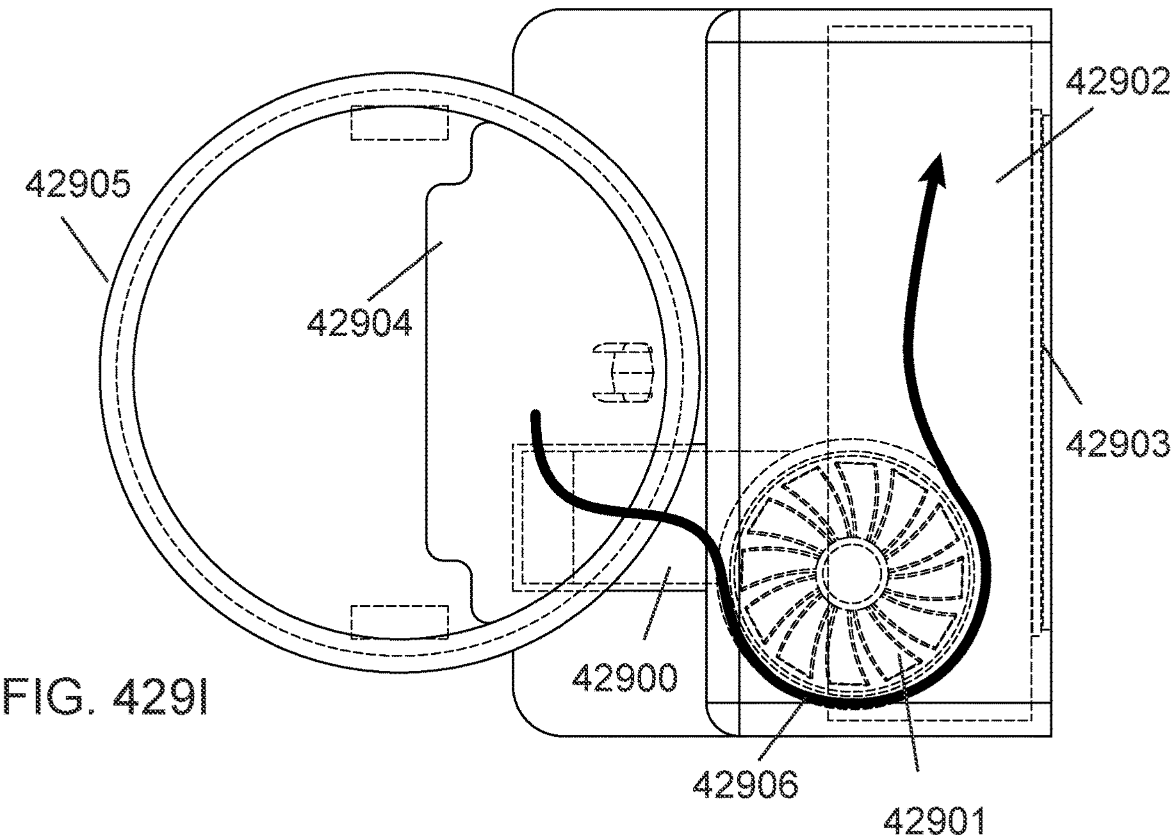
Figure 429J:
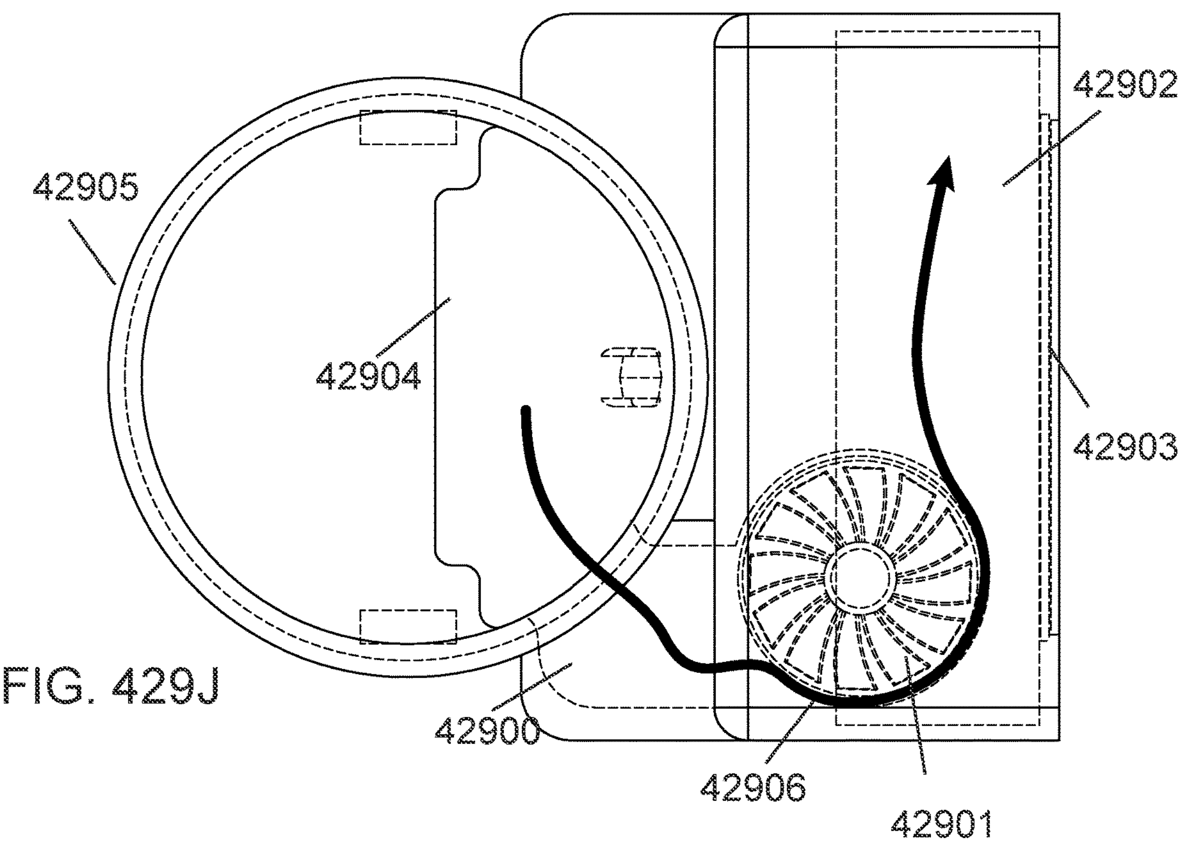
Figure 429K:
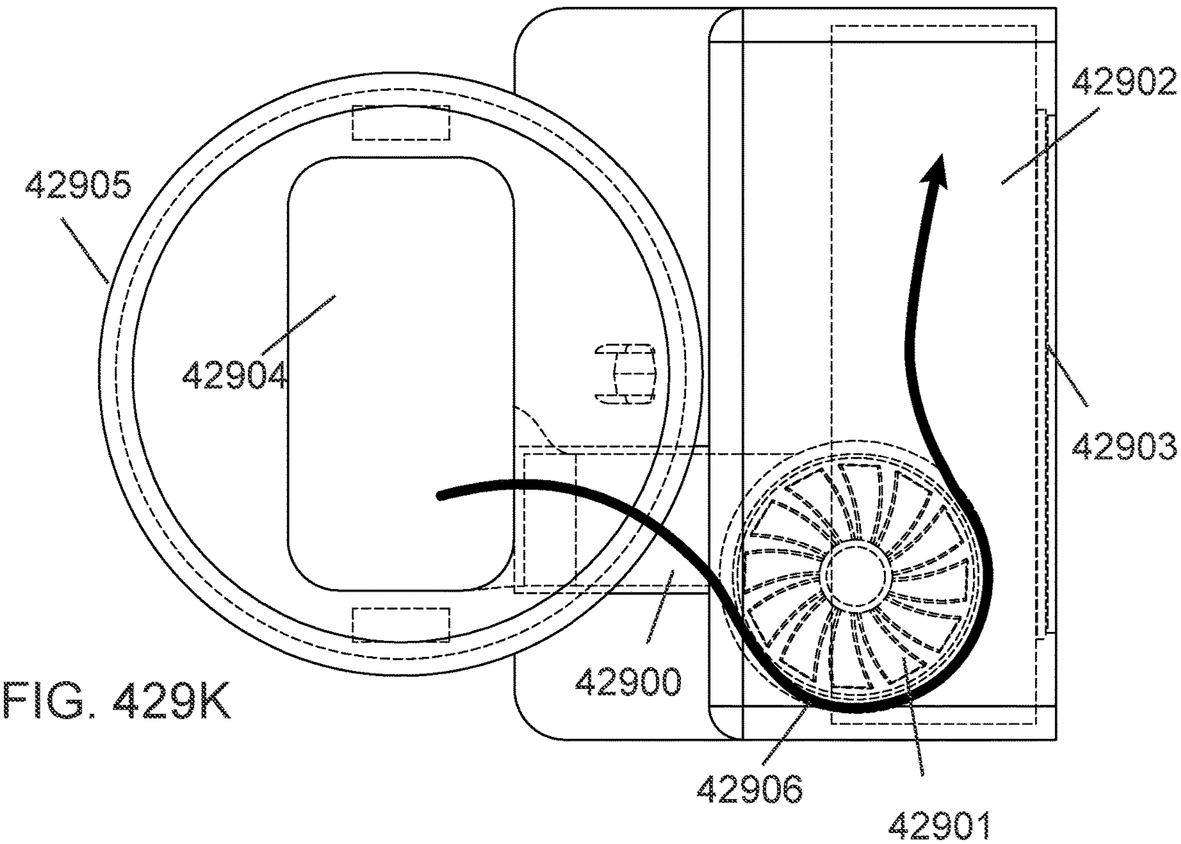
Figure 429L:
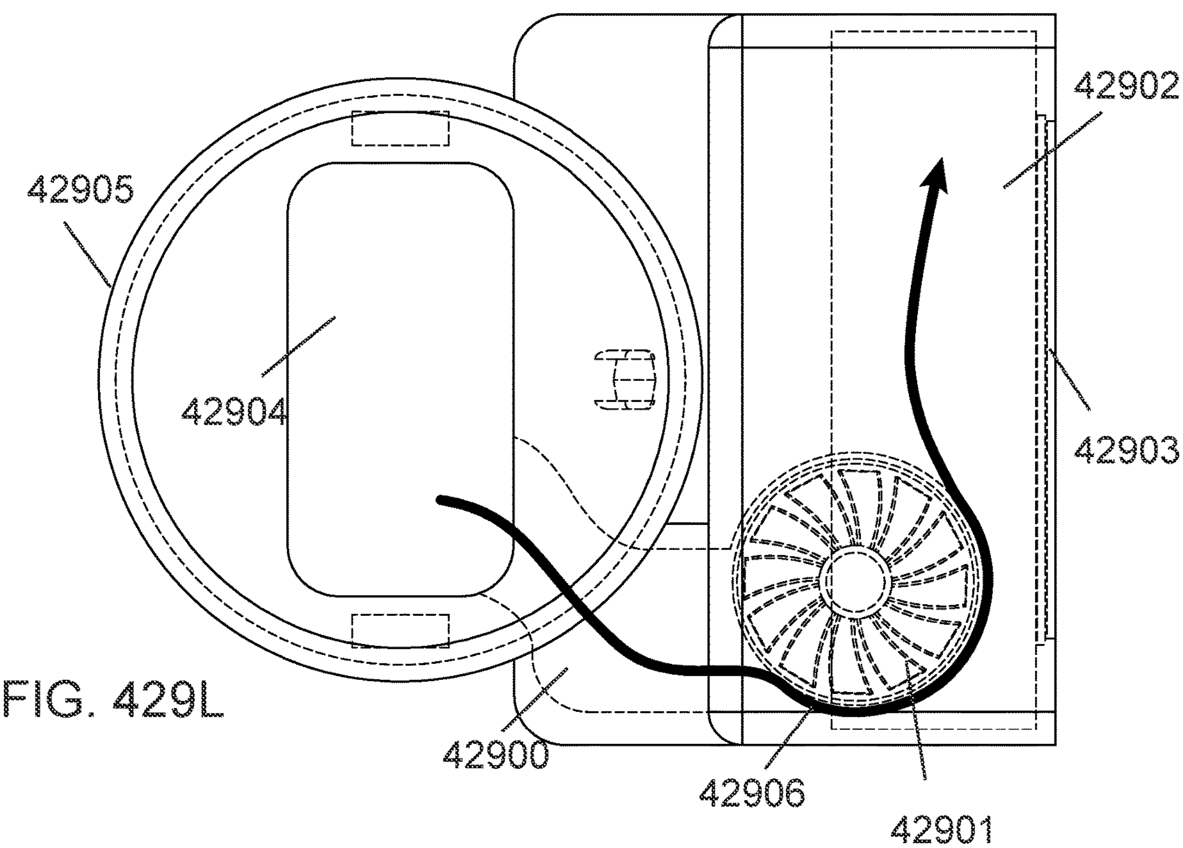

FIGS. 428A-428C illustrate a variation of charging station with emptying mechanism.

FIGS. 429A-429L illustrate a combination of a charging station with emptying mechanism and a robot with its dustbin located in various places in the robot.

FIG. 430 illustrates examples of a curved user interface display.

FIGS. 431A-431B illustrate touch base and gesture based user interaction with the robot.

FIG. 431C illustrates gesture based user interaction with the robot using a communication device.

FIG. 431D illustrates examples of possible gesture movements for interacting with the robot.

FIGS. 432A-432C illustrate an example of a vending machine robot.

FIGS. 433-443 illustrate possible states a cleaning robot may give and possible transitions between them.

FIGS. 444A-444C illustrate examples of vertical and horizontal user interface layout.

FIG. 445 illustrates a list of each button function and a state of the robot before and after activating each button.

FIG. 446 illustrates state transitions resulting from UI button input.

FIG. 447 illustrates a list of UI LED indicator functions.

FIG. 448 illustrates state transitions based on battery power.

FIG. 449 illustrates an example of a list of cleaning tasks of the robot.

FIGS. 450A-450F illustrates paths the robot may take during each cleaning task.

FIG. 451 illustrates an example of a list of critical issues the robot may encounter.

FIG. 452 illustrates an example of list of other issues the robot may encounter.

FIG. 453 illustrates an example of a list of audio prompts of the robot.

FIG. 454 illustrates an example of a scale representing the type of behavior of the robot, with reactive on one end and cognitive on the other.

FIG. 455A illustrates examples of upright robot vacuums.

FIGS. 455B-455D illustrate when the user pushes or pulls the vacuum cleaner. The machine senses the direction of the push or pull and accelerate its wheels rotation based on that direction.

FIGS. 456A-456B illustrate as the user and vacuum approaches an obstacle the robot may instruct the motor to stop enforcing torque earlier.

FIG. 457 illustrates the difference of range of motion for users with different heights.

FIG. 458 illustrates an example of a baby using a walker robot.

FIG. 459 illustrates an example of a walker robot and a person using the walker FIG. 460 illustrates an example of a bumper of a robot.

FIG. 461 illustrates different levels of user access to the robot and robot groups.

FIG. 462 illustrates an example of a robot driver attached to a device.

FIG. 463 illustrates a battery.

FIGS. 464A-464B illustrates a user may interact with the robot using different gestures and interaction types.

FIG. 465A illustrates an example of an assembled BLDC motor.

FIG. 465B illustrates an exploded view of the BLDC motor.

FIG. 465C illustrates an exploded view of the stator.

FIGS. 465D-465E illustrate the stator core wiring.

FIGS. 465F-465G illustrate the rotor including its magnets.

FIG. 466A illustrates an example of a user interface with backlit logo.

FIG. 466B illustrates an exploded view of the user interface including the backlit logo.

FIGS. 467A-467I illustrate a medical testing robot.

FIGS. 468A-468J illustrate an example of a testing process that may be executed by the medical care robot.

FIG. 469A illustrates the medical care robot printing a slip indicating the test results are negative.

FIG. 469B illustrates the slip with barcode.

FIG. 469C illustrates the slip may be received electronically from the robot using an application of a communication device.

FIG. 469D illustrates gates that may be opened to gain entry to a particular area upon scanning barcode.

FIGS. 470A-470F illustrate examples of visualization displayed on a user interface of the medical care robot during testing.

FIGS. 471A-471C illustrate an example of a shopping cart which can be hooked to a robot.

FIG. 471D illustrates the robot aligning itself with the shopping cart using an identification object with specific indentation.

FIGS. 471E-471G illustrate the coupling process between robot and the shopping cart FIG. 471H illustrates the robot pulling and driving the shopping cart.

FIG. 471I illustrates the robot retrieving or returning the shopping cart from a storage location of multiple shopping carts.

FIGS. 472A-472B illustrate an alternative example, wherein the shopping cart itself is a robot.

FIGS. 473A-473C illustrate a house with a backyard, curbside and a trash bin robot and the robot using visual cues to navigate from the backyard to the curbside.

FIG. 474A illustrates an example of data gathered by an image sensor after three runs from the storage location to the refuse collection location.

FIG. 474B illustrates images captured over time during two runs.

FIG. 474C illustrates stamps from the real time may not correlate with state event times.

FIG. 475 illustrates an example of a robot transporting food and drinks for delivery to a work station of employees.

FIGS. 476A-476B illustrate an example of a shelf stock monitoring robot.

FIG. 477 illustrates a first room of parents and a second room of a baby. Using acoustic sensors, the crib may detect the baby is crying and may autonomously drive to first room.

FIG. 478 illustrates an example of a flowchart that may be implemented and executed by the robot to detect a language and translate it.

FIGS. 479A-479D illustrate and describe an example of a tennis playing robot.

FIGS. 480A-480I illustrate and describe an example of a robotic baby walker.

FIGS. 481A-481H illustrate and describe an example of a delivery robot including a smart pivoting belt system.

FIG. 482A illustrates an autonomous hospital bed with IV hookup and monitoring system.

FIG. 482B illustrates an autonomous hospital bed. IV hookup and monitoring system are on a separate robot.

FIGS. 483A-483C illustrate an example of an autonomous CT scanner machine FIG. 484 illustrates the robot pushed by an operator.

FIGS. 485A-485D illustrate a CT scanner robot navigating to and performing a scanning session.

FIG. 486 illustrates an example of an MRI robot.

FIG. 487 illustrates an example of an X-ray robot.

FIG. 488 illustrates a checkout page of an online shopping application.

FIG. 489 illustrate the ordered goods place within a compartment of a delivery robot.

FIG. 490A illustrates a location of the robot in the application.

FIG. 490B illustrates the robot approaching the customer by locating their phone.

FIG. 491 illustrates the robot arriving at a location of the customer.

FIG. 492 illustrates the door opening automatically upon being unlocked for the user to pick up their ordered goods.

FIG. 493 illustrates the relation between the tennis player and their proxy robot.

FIG. 494 illustrates the player wearing a VR headset and the headset viewport.

FIG. 495A illustrates the VR headset viewport. Additional information may be displayed on top of the display.

FIG. 495B illustrates the VR headset viewport and a special trajectory for the ball.

FIG. 495C illustrates the VR headset viewport and virtual floating obstacles.

FIG. 496 illustrates the passenger pod's cabin as a gondola cabin.

FIG. 497 illustrates the gondola system from top view.

FIG. 498 illustrates the chassis picking up cabins landed from the gondola at destination.

FIGS. 499A-499B illustrate the wing carrying chassis in drive mode and operation mode.

FIGS. 500A-500B illustrate the wing carrying chassis in drive mode and operation mode carrying the wings attachment.

FIG. 501 illustrates the process of coupling the wings attachment to the cabin.

FIG. 502 illustrates the steps wings attachment takes to be ready for the fly mode.

FIGS. 503A-503C illustrates the steps passenger pod takes to take off.

FIG. 504 illustrates the cabin in fly mode.

FIG. 505 illustrates the cabin in landing mode over the chassis.

FIG. 506 illustrates arrangement of several cabins can be boarded into a large plane for long distance trips.

FIG. 507A illustrates a concept semi-autonomous wheelbarrow.

FIGS. 507B-507C illustrate the relation between BLDC wheels, driver boards and main PCB.

FIGS. 508A-508B illustrate a variation on the semi-autonomous wheelbarrow concept without LIDAR.

FIGS. 509A-509F illustrate variations of the wheelbarrow concept.

FIG. 510A illustrates the general method of operating the wheelbarrow robot.

FIG. 510B illustrates the resisting mode of the wheelbarrow robot.

FIG. 511 illustrates creating a character for a cutout method animation

FIG. 512 demonstrates an example of the forward kinematic animation.

FIG. 513 demonstrates an example the inverse kinematic animation.

FIG. 514A illustrates a relation between audio, text driven from the audio and sign language.

FIG. 514B illustrates the process and use cases of converting audio to text and sign language using neural network.

FIG. 515A illustrates two users each wearing a VR headset. They may interact in a common virtual space.

FIG. 515B illustrates an example of avatars hanging out in a virtual theater.

FIGS. 515C-515E illustrate various virtual sitting areas that may be chosen to customize the virtual theater space.

FIG. 515F illustrates a robot that may be used for VR and telecommunication.

FIG. 515G illustrates two users located in separate locations communicating with one another using the telecommunication robot.

FIG. 515H illustrates the user leaving the room and the robot following the user.

FIG. 515I illustrates a virtual reconstruction of the user.

FIG. 515J illustrates the static VR base.

FIG. 515K illustrates the portable robotic VR base.

FIG. 515L illustrates a smart screen and a camera that may be used for telecommunications.

FIGS. 515M-515O illustrate multiple devices that are synched with each other to play different types of media.

FIG. 516 illustrates components of VR and AR.

FIGS. 517A-517G illustrate and describe an example of a SLAM enable device used to view an augmented reality of a data center.

FIG. 518 illustrates examples of lines on different surfaces in a real world setting.

FIG. 519 illustrates examples of leading lines directing the eye to the focal point.

FIG. 520 illustrates a group of horizontal lines in a rectangle that make its size appear to be wider than rectangle.

FIG. 521 illustrates thicker lines may appear closer or farther to viewer's eye FIG. 522 illustrates an example of C and S curves.

FIG. 523 illustrates an example of curve that directs the eye from one surface plane to another.

FIG. 524 illustrates different types of interpolation between a series of points.

FIG. 525 illustrates how a same set of points 52500 may result in different types of curves.

FIG. 526 illustrates a shape as a positive space, defined by a boundary line, and a negative space.

FIG. 527 illustrates examples of blending a triangle and a circle

FIG. 528 illustrates a combination of a hexagonal and triangular pattern.

FIG. 529 illustrates two cubes with the same height, with and depth but one appears to be smaller because of its rounded edges.

FIG. 530 illustrates that in addition to rounded edges, a setback can be defined on corners.

FIG. 531 illustrates three types of surface transitions.

FIG. 532 illustrates a sphere plastic surface with variable amount of glossiness.

FIG. 533 illustrates a sphere metallic surface with variable amount of glossiness.

FIG. 534 illustrates an example of metallic paint structure.

FIG. 535 illustrates changes in clear coat roughness, changes in the amount of metal flakes and changes in the roughness of metal flakes in a metallic painted surface.

FIG. 536 illustrates samples of reflective symmetry.

FIG. 537 illustrates examples of rotational symmetry.

FIG. 538 illustrates examples of transitional symmetry.

FIG. 539 illustrates the off symmetry property.

FIG. 540 illustrates examples of contrast in size, shape, shade, and color.

FIG. 541 illustrates the same pattern applied to a surface in four different ways.

FIG. 542 illustrates the same pattern illuminated on a different material.

FIG. 543 illustrates some examples of balancing visual weights.

FIG. 544 illustrates a light spectrum.

FIG. 545 illustrates color properties such as hue, saturation, and lightness.

FIG. 546 illustrates tint, tone and shade of white, grey, and black, respectively.

FIG. 547 illustrates examples of additive and subtractive color mixing.

FIG. 548 illustrates an example of a color wheel.

FIG. 549 illustrates various known color palettes.

FIG. 550 illustrates usually warm colors are used for subjects or accents and cool colors are used for background of filler.

Figure 551:
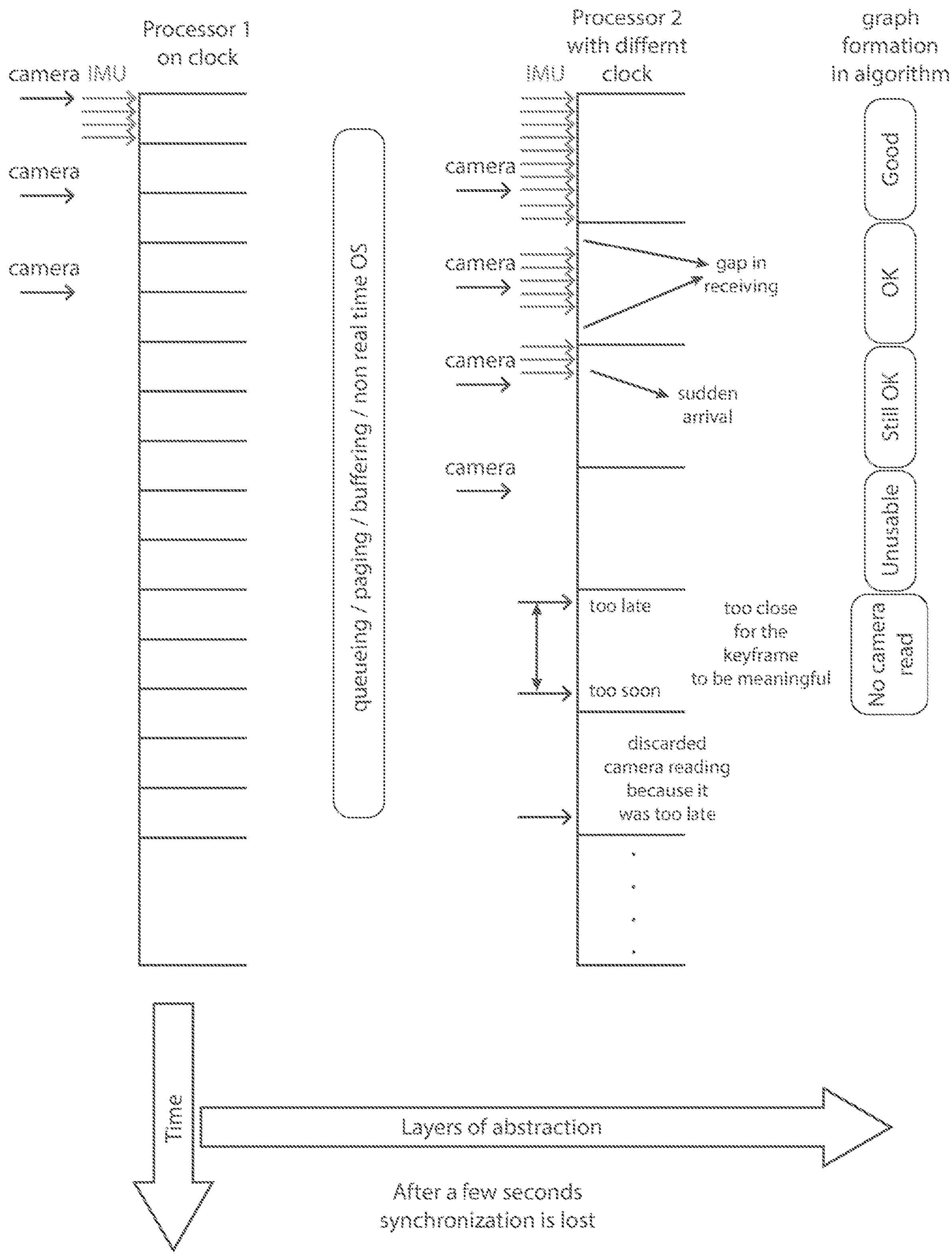
Figure 552:
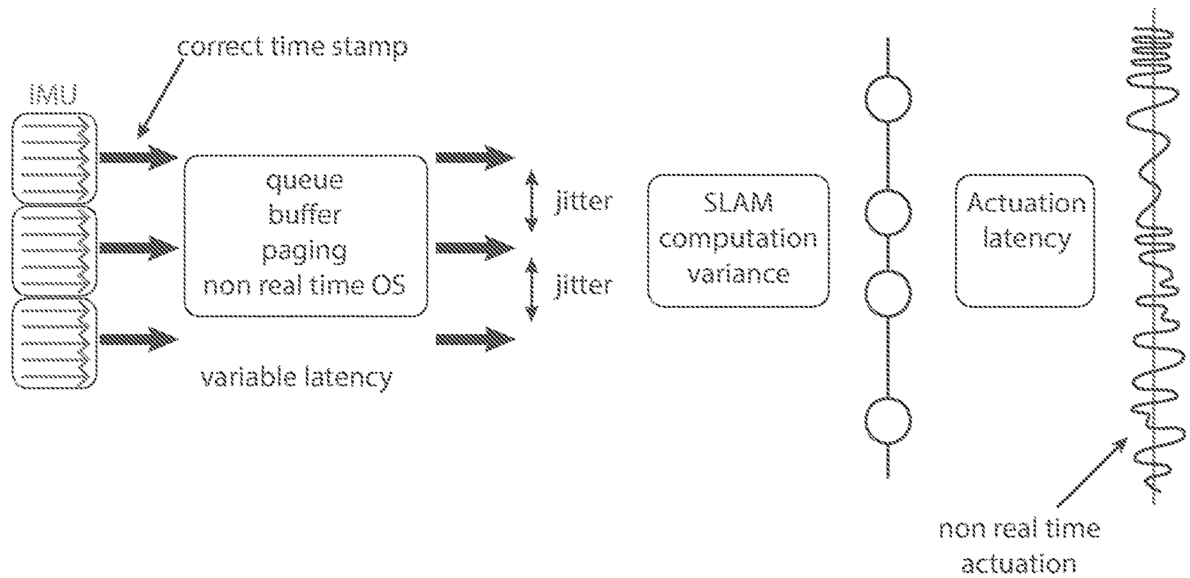

FIGS. 551 and 552 illustrate an example of a robot system obtaining sensor data.

Figure 553:
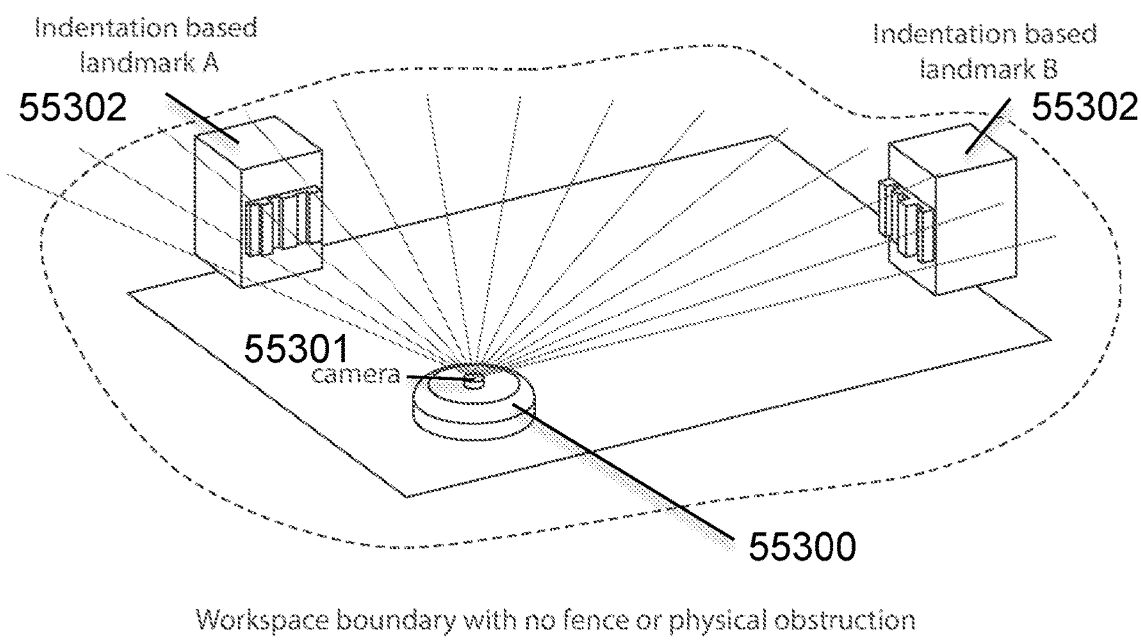

FIG. 553 illustrates an example of robot localization.

Figure 554:
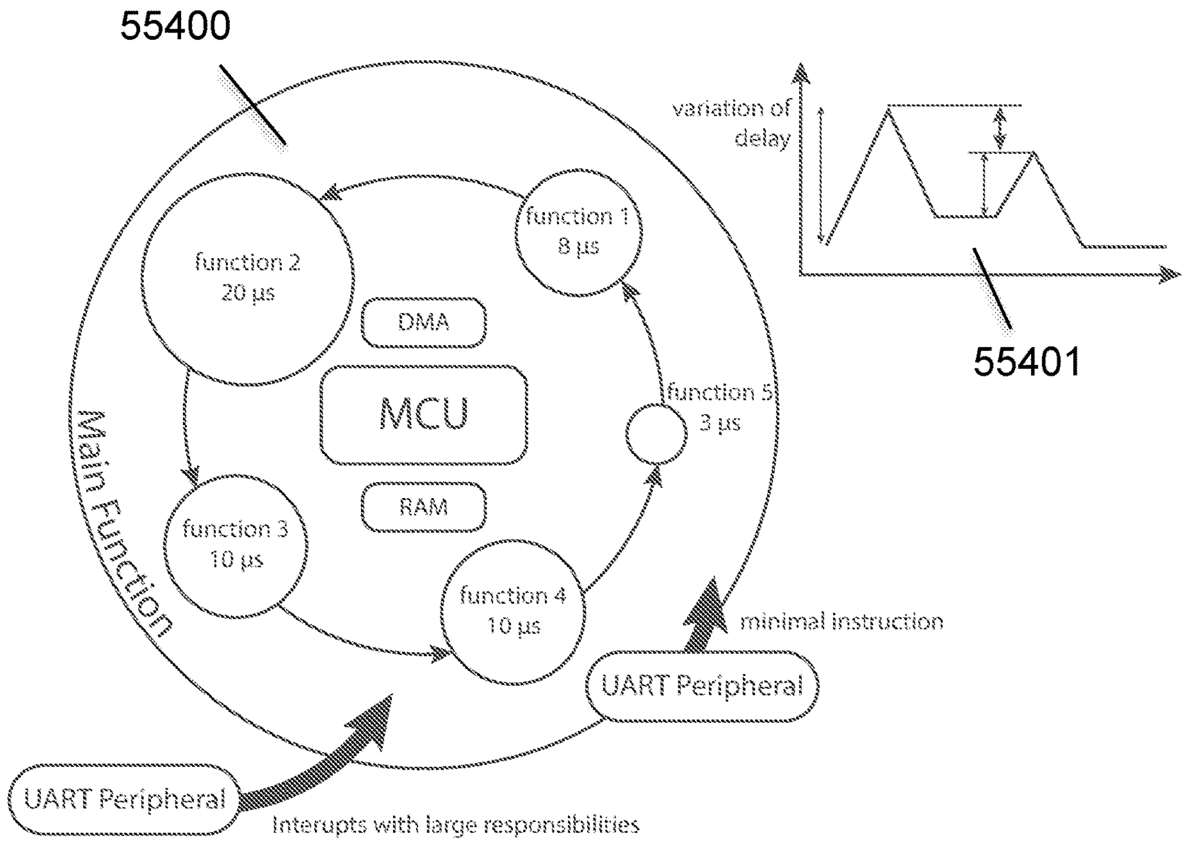
Figure 555:
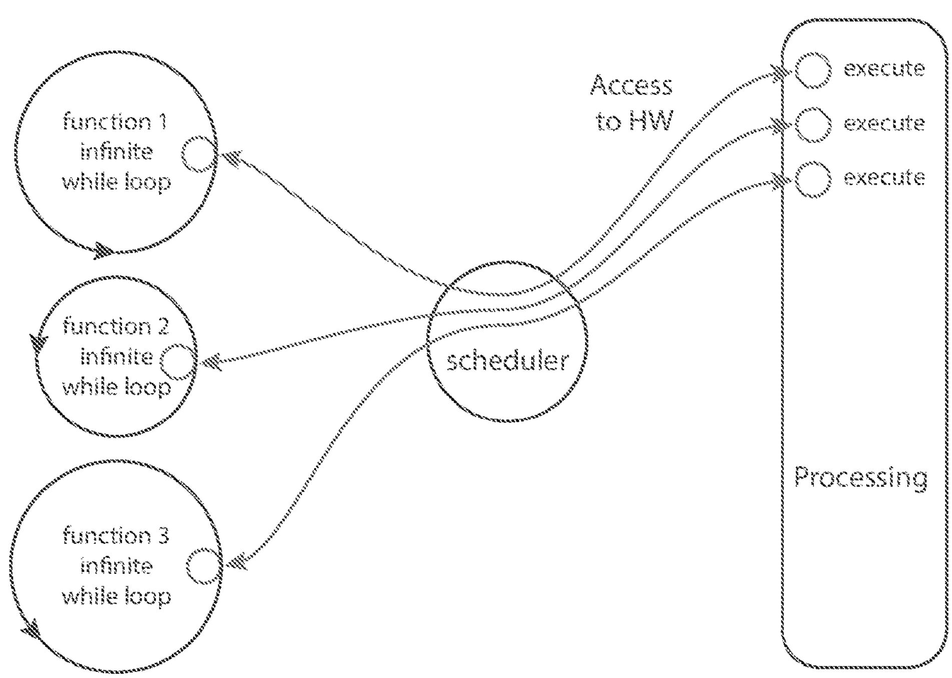

FIGS. 554 and 555 illustrate examples of a super loop.

Figure 556:
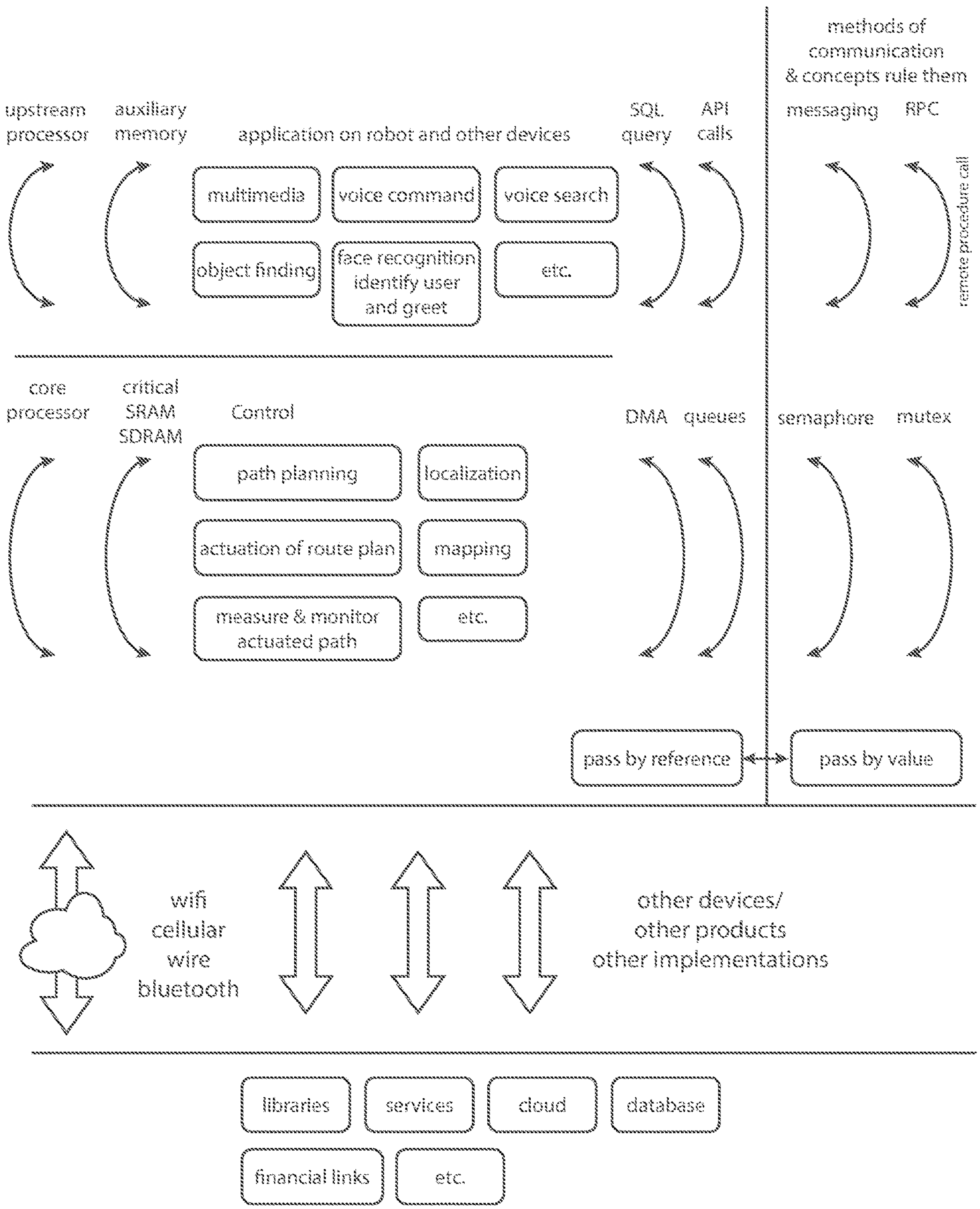

FIG. 556 illustrates an example of a system of a robot.

Figure 557:
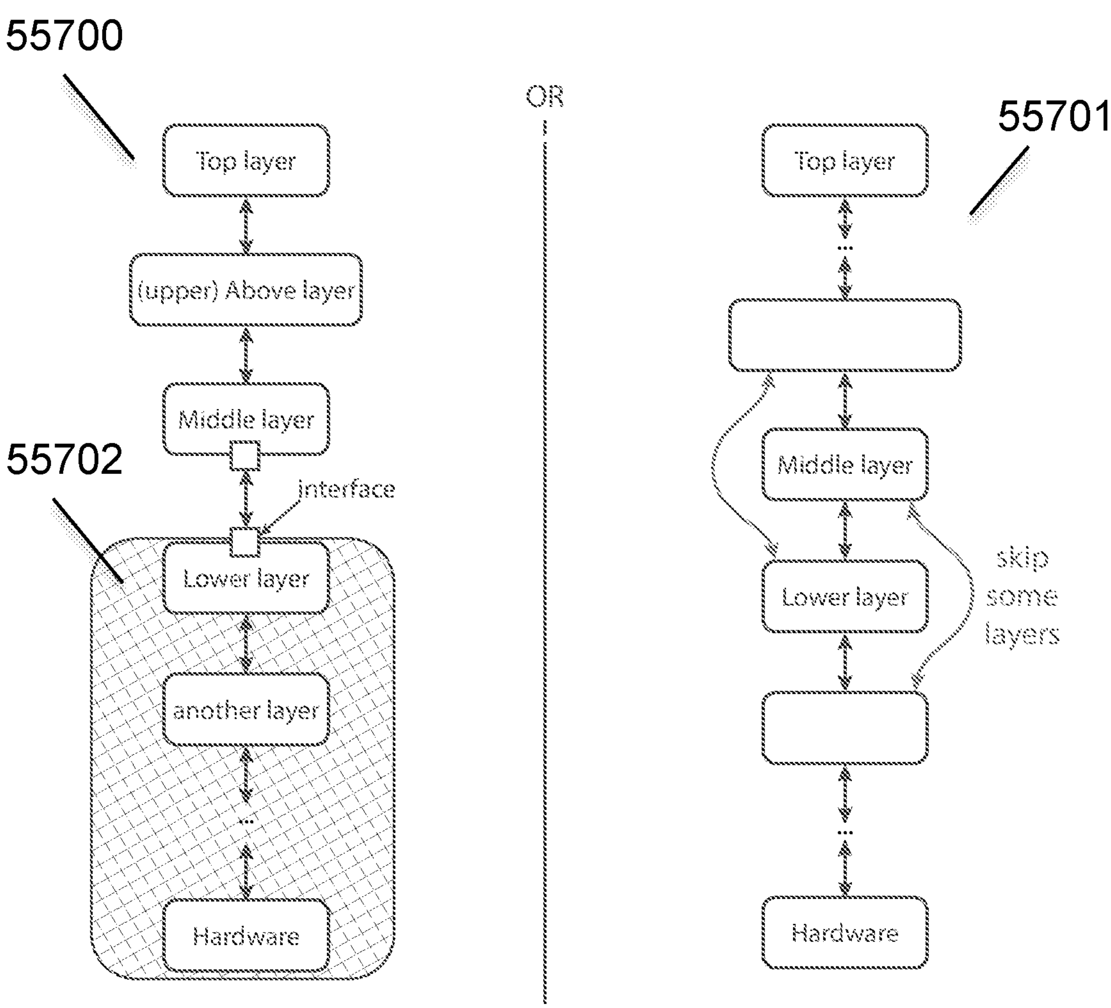

FIG. 557 illustrates an example of layers of abstraction.

Figure 558:
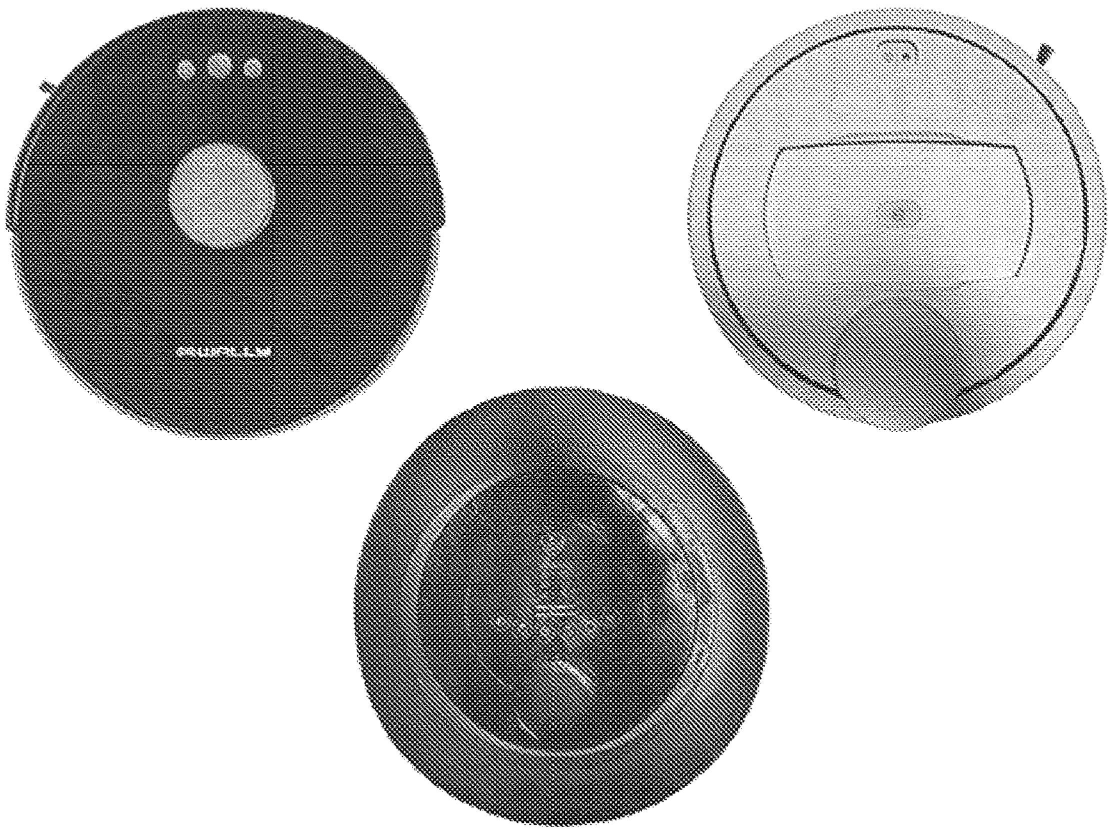

FIG. 558 illustrates examples of robot prototypes.

Figure 559:
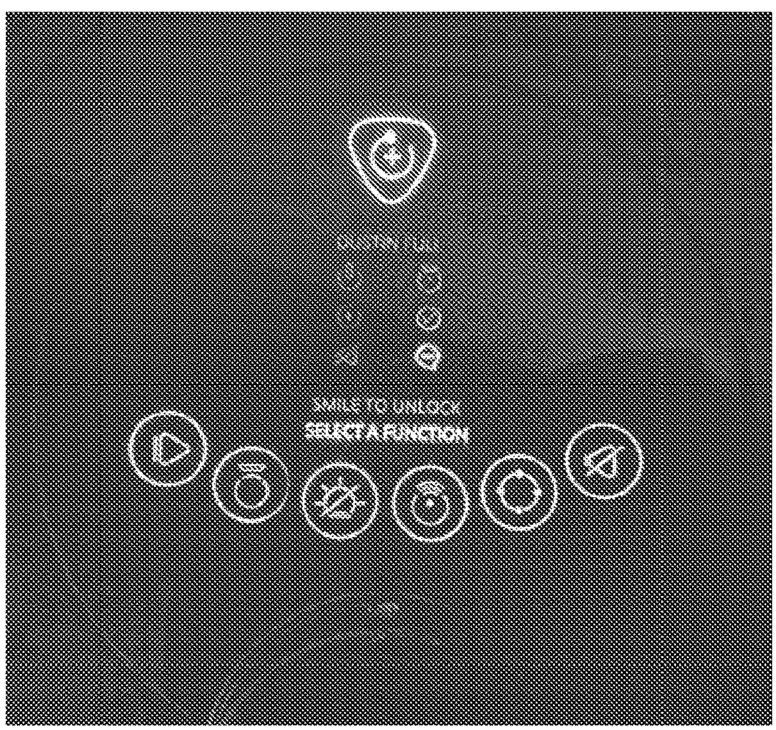

FIG. 559 illustrates an example of a user interface of a robot.

Figure 560:
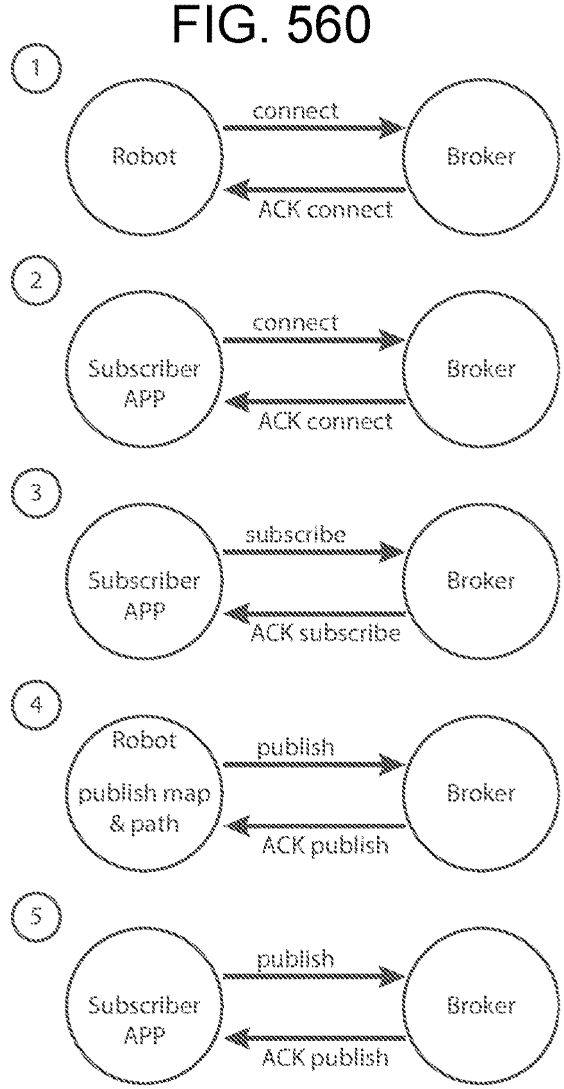

FIG. 560 illustrates an example of a system of a robot publishing a map.

Figure 561:
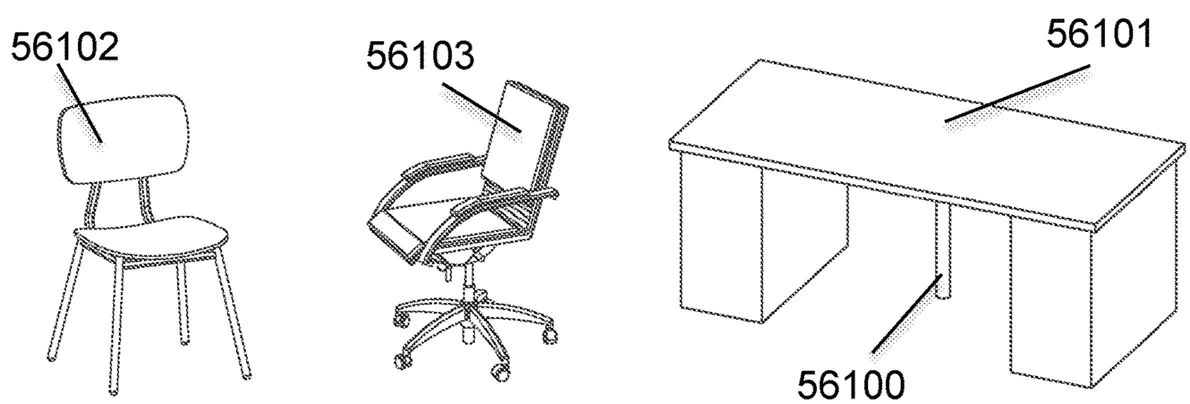
Figure 562:
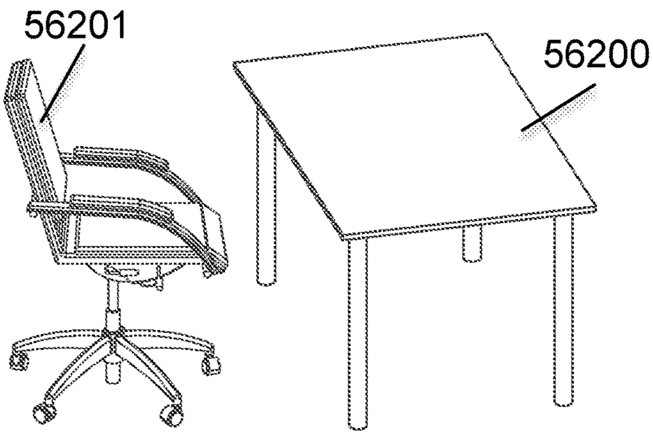
Figure 563:
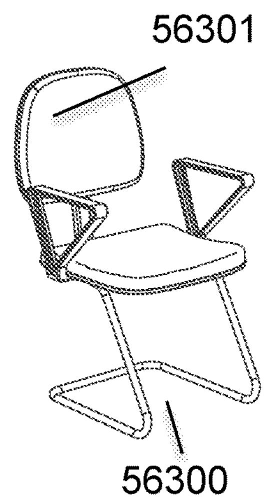

FIGS. 561-563 illustrate examples of objects a robot may encounter in a work session.

FIGS. 564A-564C, 565, and 566 illustrate examples of boustrophedon coverage and obstacle coverage by a robot.

Figure 567:
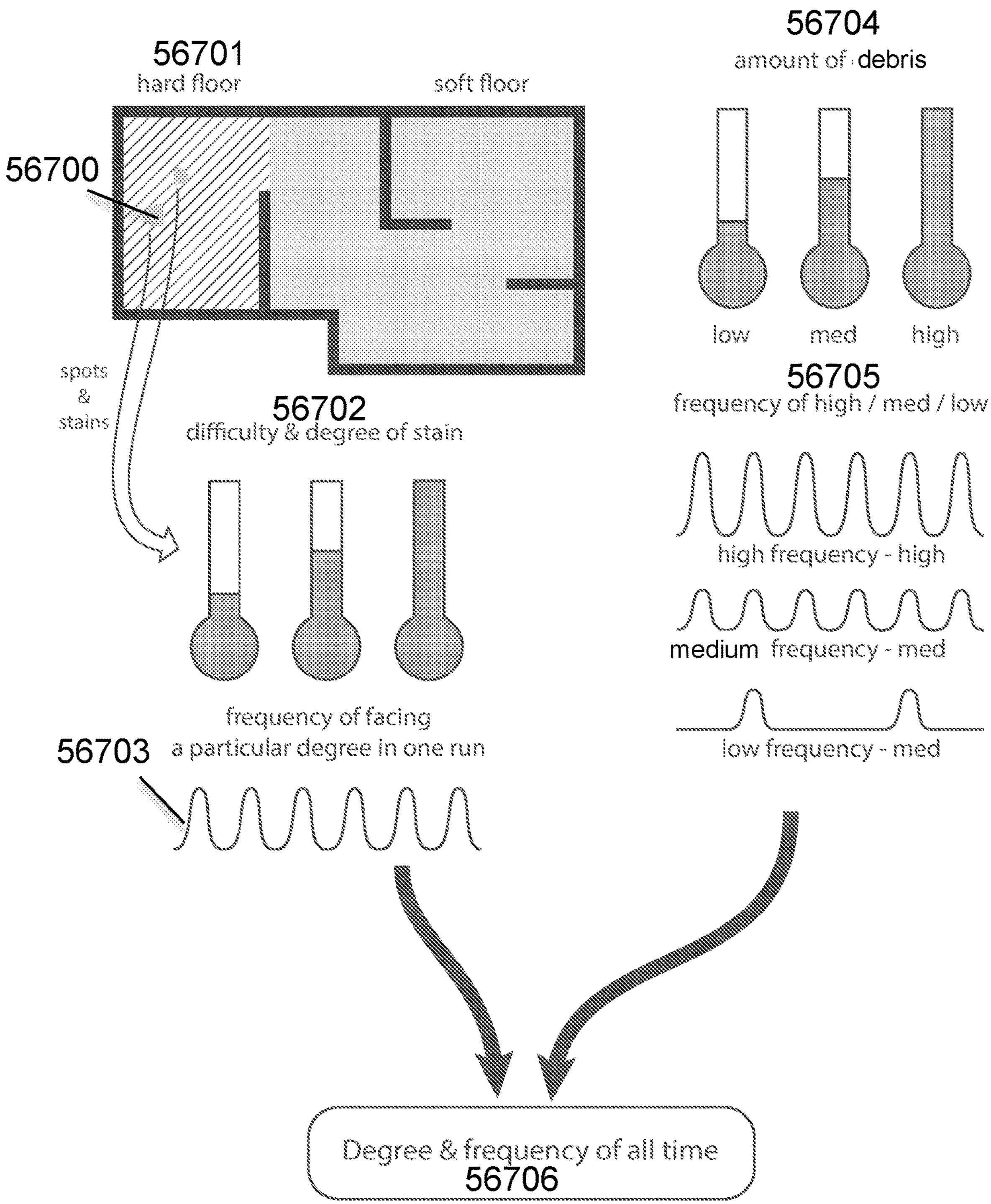

FIG. 567 illustrates varying levels of stain and debris observed by a robot.

Figure 568:
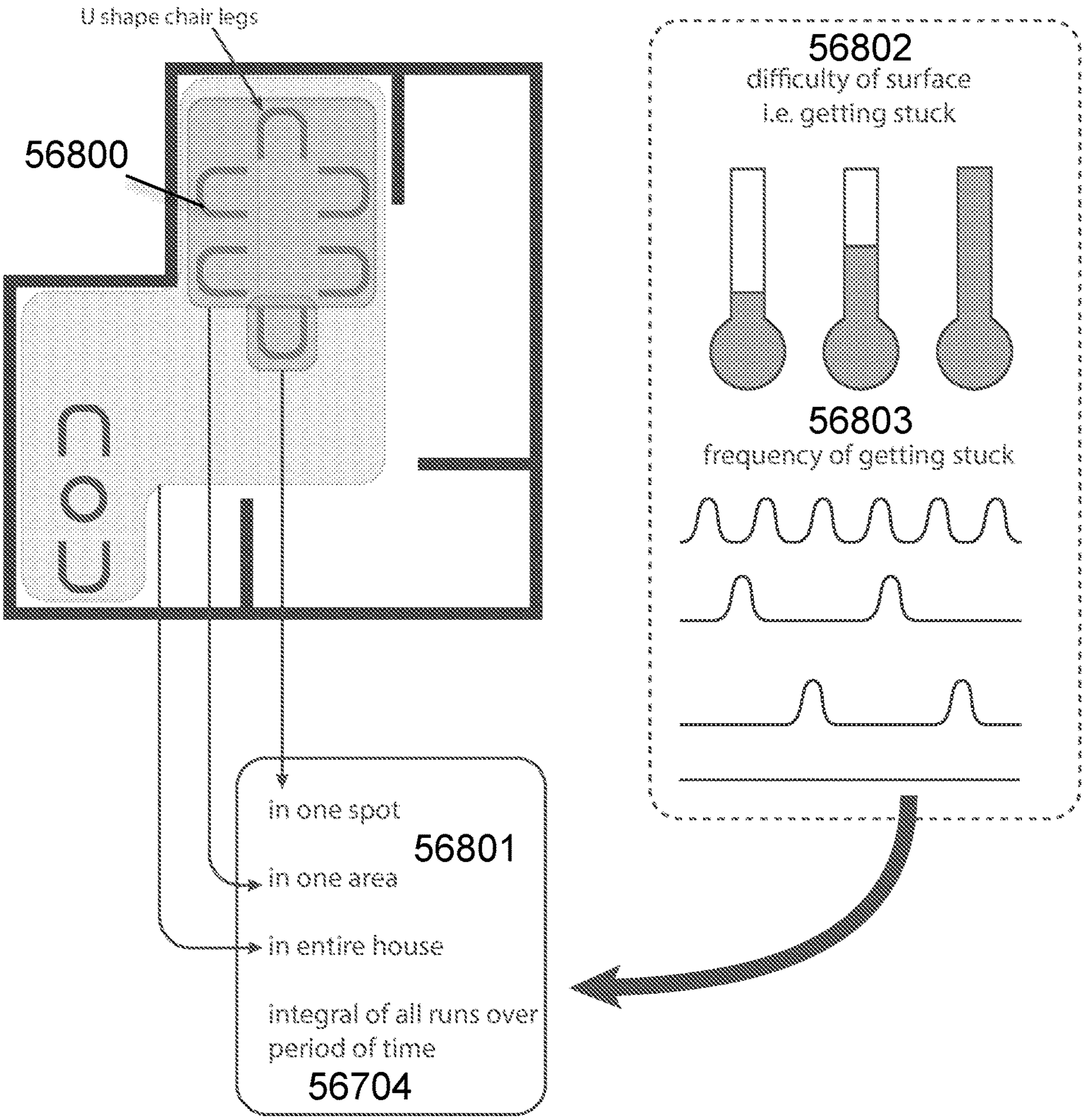

FIG. 568 illustrates varying levels of encounters with obstacles.

Figure 569:
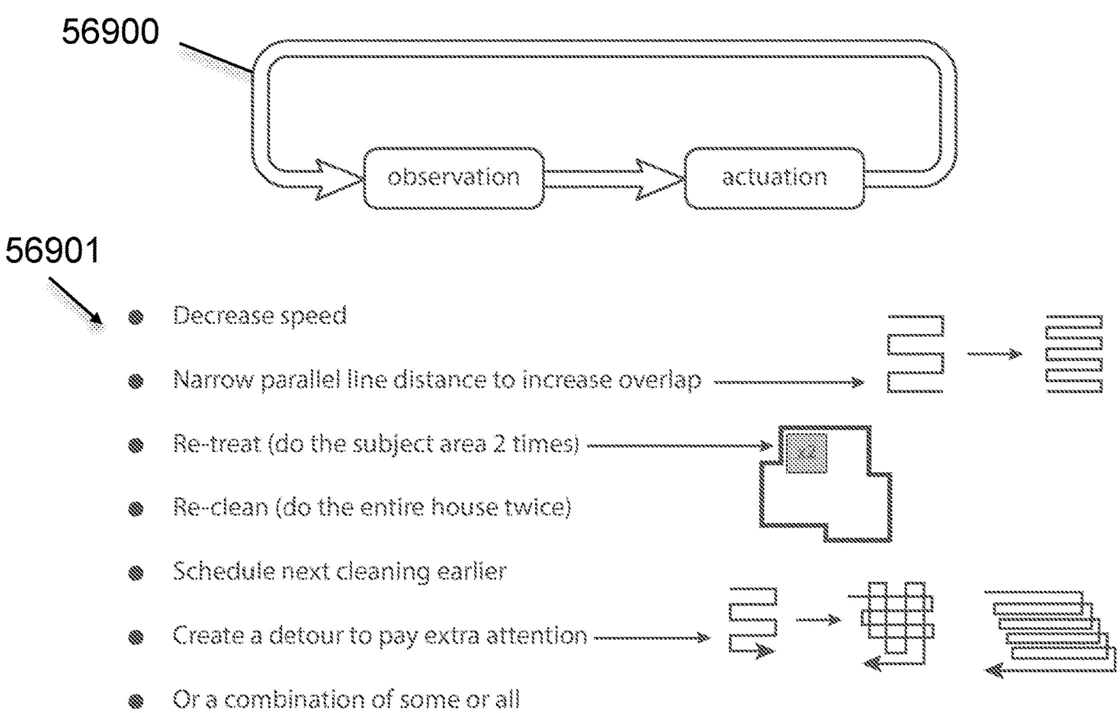

FIG. 569 illustrates a decision-making loop and actuations.

Figure 570:
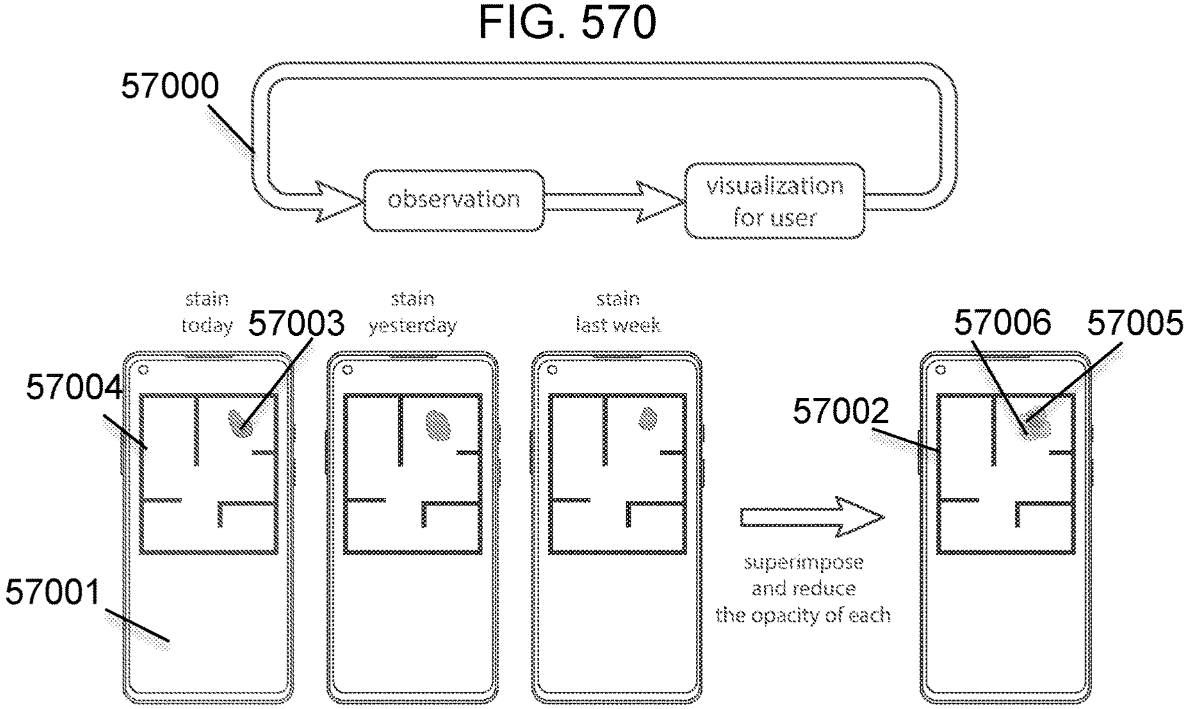

FIG. 570 illustrates an observation and visualization loop.

Figure 571:
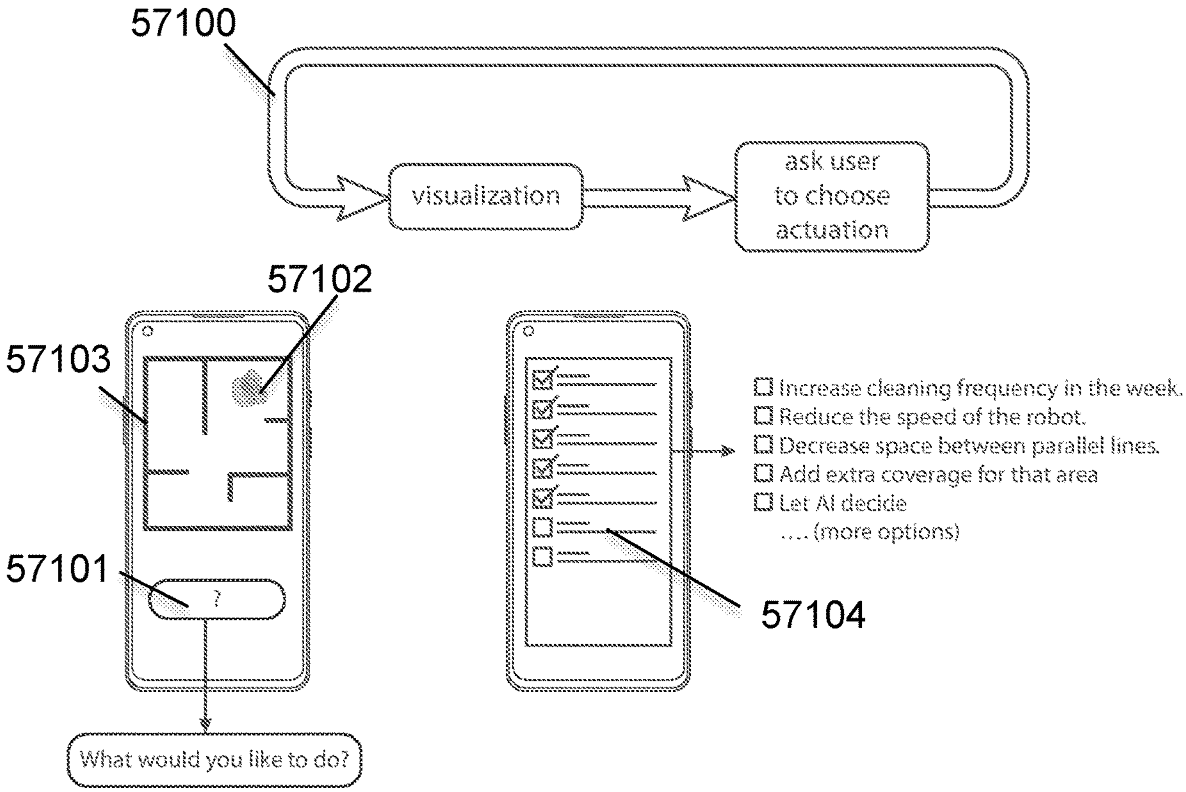

FIG. 571 illustrates a visualization and user-chosen actuation loop.

Figure 572:
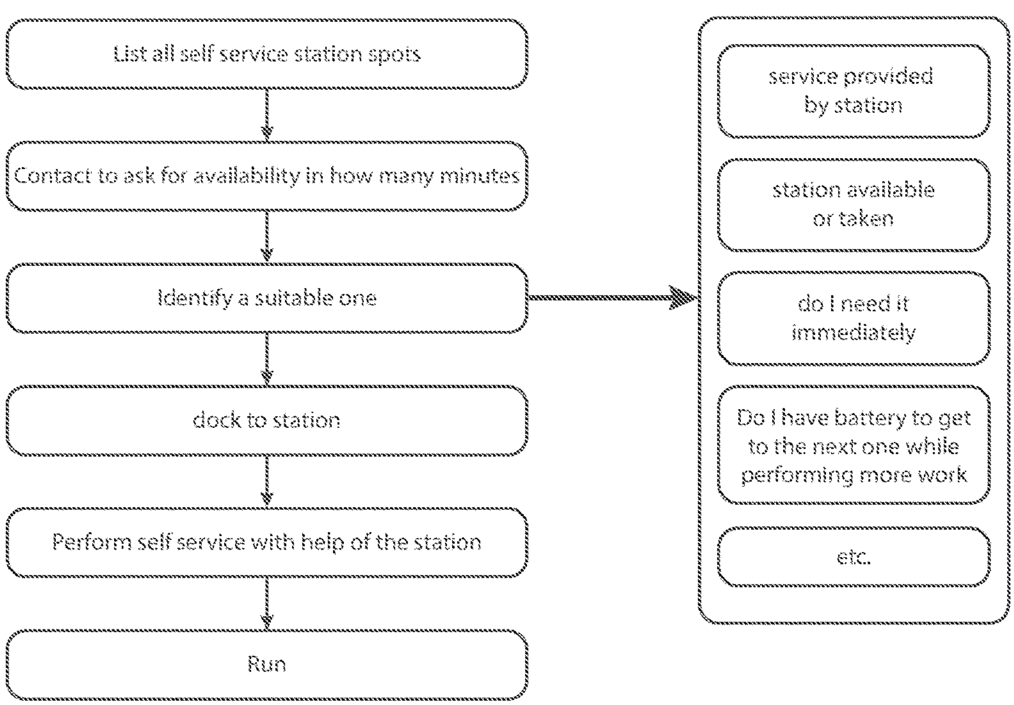

FIG. 572 illustrates an example of a process for choosing a service station.

Figure 573:
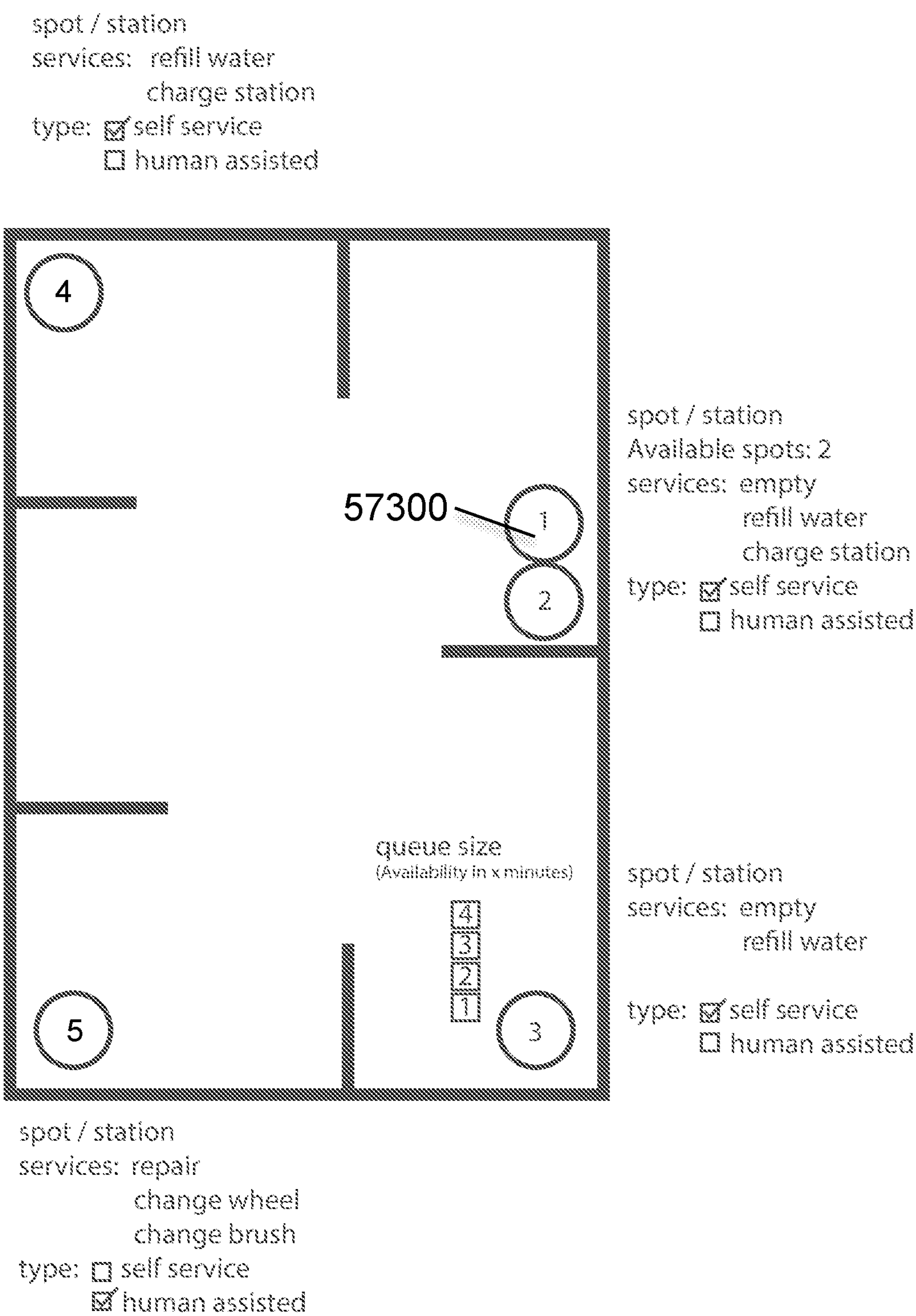

FIG. 573 illustrates an example of service stations.

FIGS. 574A-574E illustrate a robot of various shapes.

Figure 575:
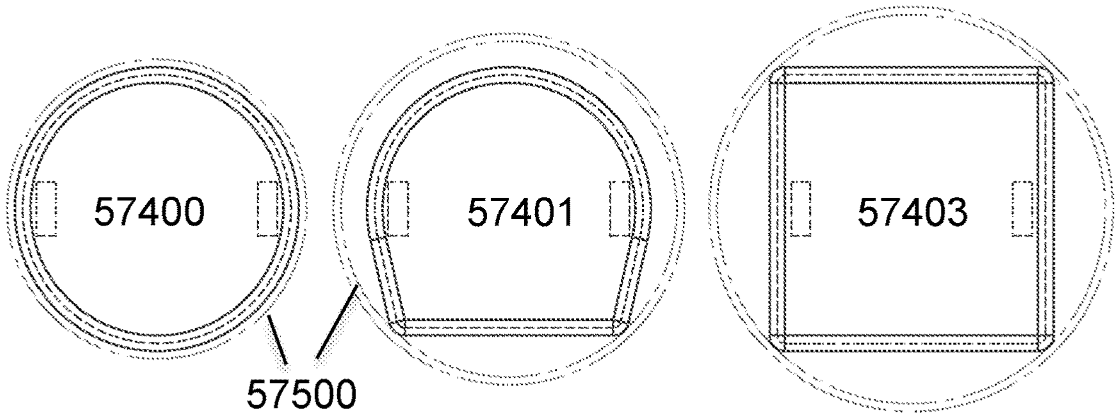
Figure 576A:
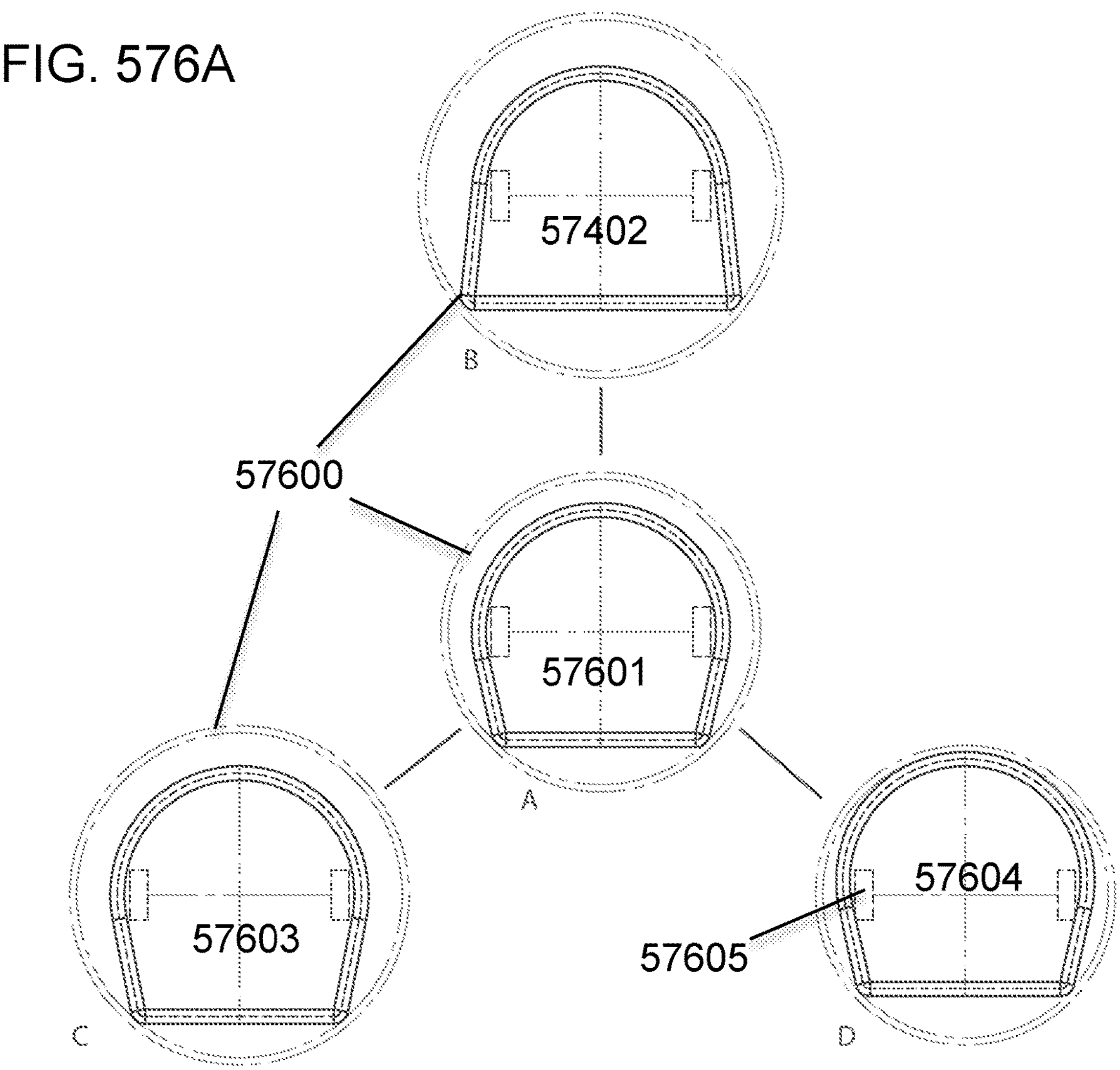
Figure 576B:
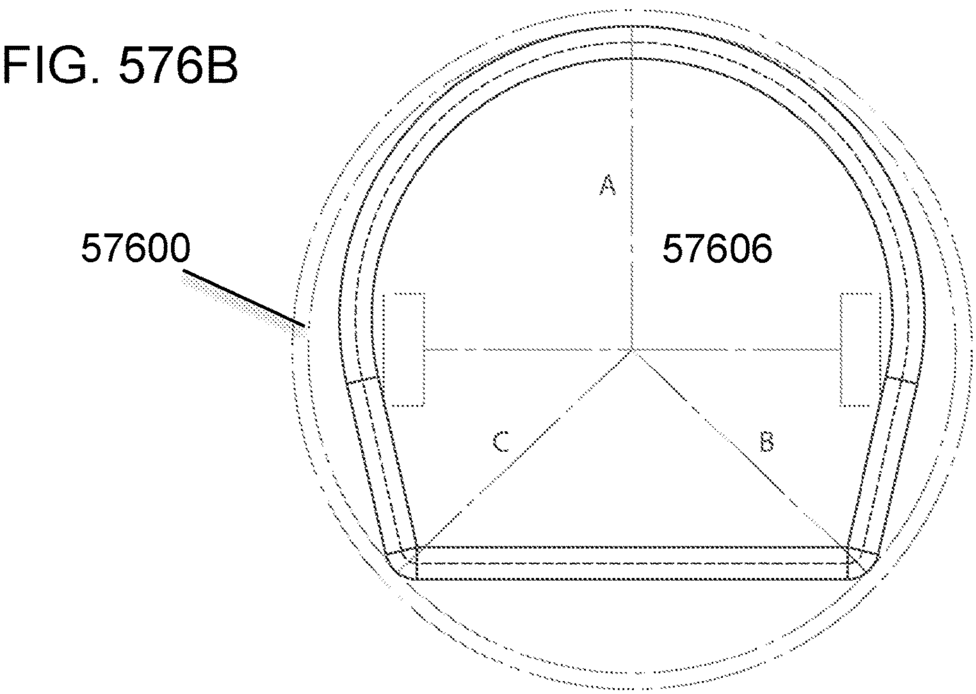

FIGS. 575, 576A, and 576B illustrates a safe turning space for a robot.

FIGS. 577-579 and 580A-580C illustrate an example of a bumper of a robot.

Figure 581:
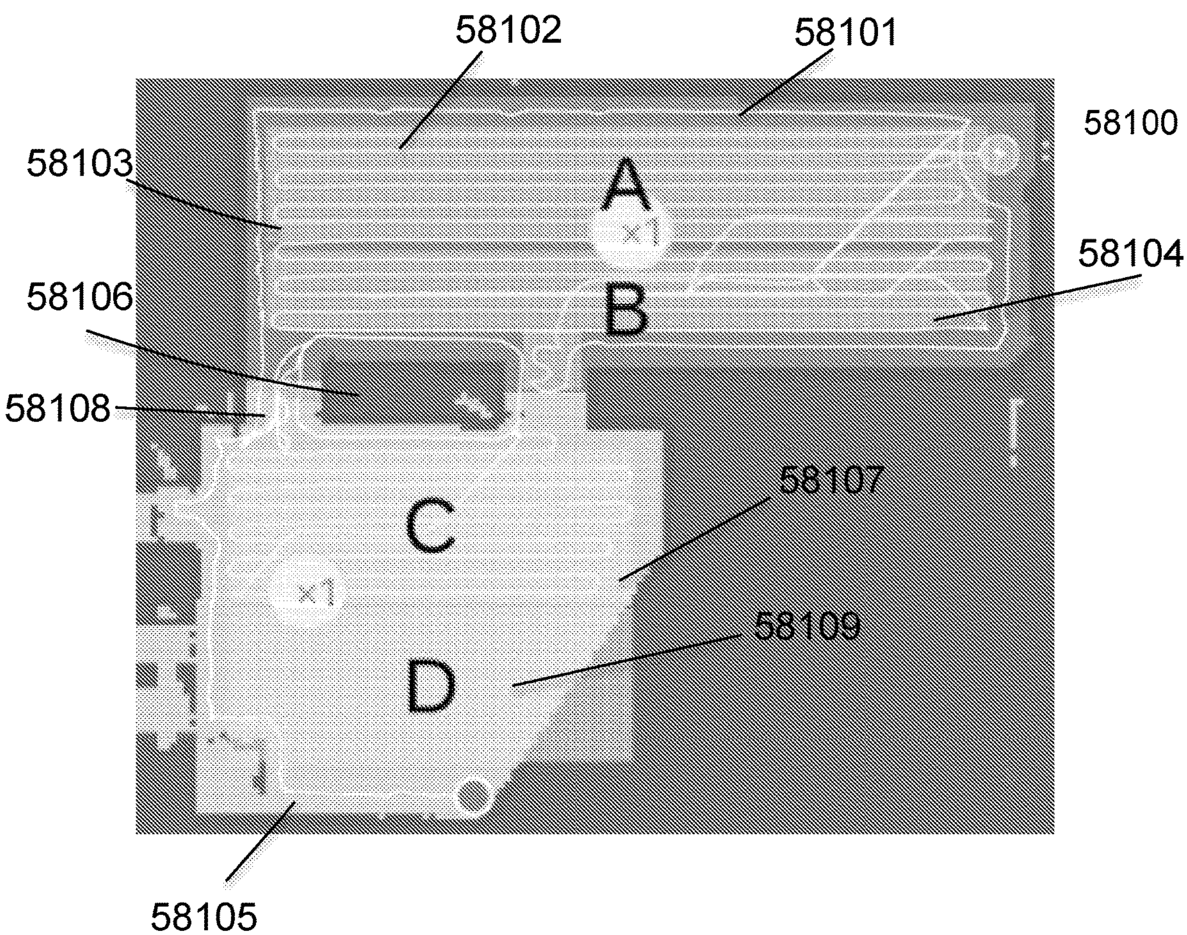

FIG. 581 illustrates an example of coverage by a robot.

DETAILED DESCRIPTION OF SOME EMBODIMENTS

In some embodiments, a battery operated, real-time computing, and autonomous robot implements Quantum Simultaneous Localization and Mapping (QSLAM), an improvement of traditional SLAM methods. In a real-time system, to achieve concurrency, encapsulated software components are required to share hardware resources. Encapsulation allows reuse of software such that some components may be used for various usages. In embodiments, a group of the software components may run on a single physical device or in a distributed fashion spanning multiple physical devices. Each of the components may run independently, may be self-contained and may interact with other components to receive and send data through ports and interfaces of the components joined via connectors.

In a distributed system, the distance between processors and processes is not necessarily physically far. For instance, a Central Processing Unit (CPU) on a Printed Circuit Board (PCB) and a Microcontroller Unit (MCU) positioned centimeters from the PCB is considered to have some physical distance. In embodiments, a software component must be close to the hardware on which it is processed. The smaller the distance between software components and corresponding hardware, the faster the processing. Therefore, if data needs to be sent to a processor that is on a same PCB, there is still some sacrifice to the real-time property of the system.

When a resource, service, component, or object is shared between multiple reader/writers, a mutual exclusion type algorithm may be used to perform synchronization. In embodiments, multi-threading may be used to split large tasks into smaller tasks. For example, an incoming service request may be treated as a new thread with a limited or unlimited number of total threads available.

Some embodiments may use dynamic binding, wherein a connection is built in a distributed system through a name table/service, making physical location irrelevant.

In some embodiments, time-critical tasks are treated with highest priority while non-time-critical tasks may have less priority and/or may run in the background. In some embodiments, computationally intensive tasks may be executed in the background and preempted as higher priority tasks arrive. In some embodiments, some computational intensive tasks may run after the run time. For example, while a robot obtains input data during a first run, a graph of constraints is obtained using information from encoders, Inertial Measurement Units (IMUs), cameras, etc. In some embodiments, during run time of a first run, data from encoders, IMUs, etc. may be integrated and the relating equations solved by the processor. In some embodiments, vision data, being more computationally intensive, may be integrated after the first run when the robot is charging or not working. In a second run, the robot may have a more complete map and the processor may localize the robot and verify and/or improve the map in future runs. As more runs occur, more data may be integrated with previously collected data to improve map density.

In embodiments, methods such as temporal task clustering or sequential task clustering may be used. In embodiments, a state dependent system may go through a sequential state machine associated with control tasks. In embodiments, a control clustering system may allow arriving tasks to activate another task based on a demand driven model. In some embodiments, a state machine may be encapsulated in a class and an instance of the class (i.e., a state machine object is instantiated, initialized and executed).

Some embodiments may use a transition table. A transition table may include rows indexed by events and columns indexed by state (or vice versa). Each cell in the table may represent an event that could occur in a state and dictates which action or state is to be executed next by the robot. When encapsulated in a class, the details of what happens, which may be any other class, are hidden from the user of the state machine. In some embodiments, each incoming event invokes an operation. When an event occurs, the processor may identify the current state of the machine in the table and may determine the next state. Once the transition to the next state occurs, a series of defined actions may then take place.

In a real-time system, the intervals of receiving data from sensors must be well managed. For example, an IMU produces data output at a much faster rate than a camera. One example includes a specific time slot with two participating processors operating on different clocks. Processor 1 receives camera and IMU data, the IMU generating output at a faster rate than the camera (output being represented by each arrow) over time. Processor 2 is on a different clock. Various scenarios of obtaining output data from the IMU and camera are illustrated and the corresponding graph formation in an algorithm, wherein a gap in receiving output and sudden arrival still provide adequate graph formation and output received too late or too soon is unusable. In some embodiments, this may be dealt with by combining a series of IMU readings, taking the average of those readings, and sending them to the processor at a corrected interval. However, the problem with this approach is the loss of synchronization at a next processing step. In some embodiments, non-real-time actuation may cause the encoder readings to have jitters and lose synchronization. Even if synchronization is pushed to the next processing step, propagation of error still occurs at a later time. For instance, the first 800 readings of 1000 readings received in a second may be obsolete by the time the 1000 readings are processed.

In embodiments, processing occurs on the same controller or MCU that sensing and actuating occur on, eliminating the physical distance between the point of data collection and data processing. Some embodiments implement a method for reducing the computational intensity of SLAM by use of a microcontroller or MCU for information processing at the source instead of a CPU that must be distanced from corresponding sensors and actuators.

In a real-time system, concurrent components are referred to as active when they have their own way of controlling processing through an object, process, thread, task or method and as passive when another active or passive object triggers their operation. In embodiments, new states may be created by allowing a child class to inherit from a parent state machine. In embodiments, all states, events, transitions, etc. are inherited from the parent and may develop more well-defined states concurrent with the state machine. For example, a map class may be broken down to allow more granular operations on the map, (e.g., using different resolutions or different stitch criteria). In another example, localization may be broken down into a spectrum spanning from global to local. This is also true for entity objects. In some embodiments, composition and decomposition techniques may impact the efficiency of the system and may be used advantageously.

In some embodiments, a real-time navigation system may be implemented on an MCU, CPU, application-specific integrated component (ASIC), Field Programmable Gate Array (FPGA), or Complex Programmable Logic Device (CPLD) with analog and discrete digital sensors. In some embodiments, primitives such as threads and mutexes may be used to create multi-threading and protected access may be given data that is shared among them. In embodiments, a navigational real-time system may have hard, soft or firm requirements.

As a robot moves in the work environment, it may use some auxiliary devices to help with its localization. For example, in a lawn mowing robot, there may not be enough boundaries in the environment to detect the boundary. In one example a robot with a camera uses markers, each distinguishable by their unique indentations, to localize the robot. Passive markers may take the form of blocks with specific indentations, scanned images, or the like. Electronic transmitters or receivers may also be used as markers. In some embodiments, electronic markers may be equipped with solar panels. In some embodiments, markers may have rechargeable batteries to charge during the day such that they are available during the night or during cloudy days. The way in which the camera of the robot observes each of the markers, such is if one or two markers are observed and how the markers appear in relation to one another in one image and subsequent images, provides additional information.

In embodiments, markers may not be inside the work area. Markers may be positioned outside the work area and their observation by the robot may trigger instructions to the robot to stay within a desired boundary. In some embodiments, markers may provide location information only and not boundary information, wherein the robot receives boundary information from its own program, an external application, or another source. In some embodiments, upon localizing against a marker, the instruction associated with the observance of the marker may be improved by an Artificial Intelligence (AI) or Machine Learning (ML) system or by a user.

In some embodiments, multiple markers may be used in a work area. In some embodiments, triangulation and trilateration may be used to further discover location and spatial information about the work area. In embodiments, markers may send or receive radio or infrared signals, ultrasound information, or Ultra-Wide Band (UWB) signals to each other, the robot, or a control unit. The markers may process their location with respect to one another or a control unit and communicate pre-processed information to the robot comprising the spatial information collected from one or more markers. In some embodiments, this information may be transferred between the markers, robot, and other devices through Radio Frequency (RF) at various bandwidth frequencies. The smaller the data packets are relative to the amount of information the packets carry, the faster decisions may be made.

The processor of the robot may also send information to markers or participate in triangulation or trilateration as one node. The processor of the robot may continuously send information relating to the robot to markers in one pass for use in a later pass, future runs, or future passing robots.

In some embodiments, each marker may identify itself by adding an identification label to the message to distinguish itself from other markers. In some embodiments, markers may use different frequencies to enable a receiver to distinguish between markers. In some embodiments, markers may send keep alive messages to one another to keep a communication channel open. Communication may be via local RF, Wi-Fi router, Local Area Network (LAN), Wide Area Network (WAN), or cloud.

Different markers may have different capabilities than others. Different types of markers, as described above, may be used together in a same system. For example, some markers may be identified based on unique indentations; QR codes; unique indentations and QR codes; and unique RF frequencies, indentations and QR codes. In some embodiments, passive indentations on a block marker may be replaced with transmitters or receivers. In some embodiments, the indentations may be enhanced with electronic transmitters and receivers.

In some embodiments, awhile loop may implemented wherein the main loop never returns. In some embodiments, Interrupt Service Routines (ISRs) may be implemented such that a minimal amount of work is performed. However, in a super loop, a function may cause other functions to wait. In other embodiments, each task may be allowed a private stack to run on to prevent interference and each task may be assigned a priority. In some embodiments, preemptive scheduling may be implemented. In some embodiments, a task-based programming system may be used, wherein each task has a dedicated while loop. For example, for three functions, each having its own while loop, the scheduler parallelizes the execution of each function by fairly providing a slice of time to each function by managing context switching.

In some embodiments, a smaller function may be completed faster than a large function because it requires fewer time slices. In the preferred embodiment, a scheduler may preempt, such that the most important task is running at all times except for interrupts.

In some embodiments, tasks may be deleted after they are completed, freeing up stack and making resources available again. In some embodiments, at least one late initialization in a startup routine may be ran inside a task. In some embodiments, completed tasks may be deleted by another task. In some embodiments, when a task is defined, dynamic memory allocation is implemented using leap to perform the task. In some embodiments, at least some memory may be allocated statically to a task. In some embodiments, a Memory Protection Unit (MPU) may be used to prevent a task to write outside its allocated memory.

In some embodiments, a task in a running state may make a call that transitions the running task to a blocked state. In some embodiments, a task in a running state may be switched by a scheduler when its time slot is used up or it is preempted by another higher priority task. When a task is waiting to be switched by a scheduler to a running state, it is in a ready state. A blocked state may end when a timer expires or an event is triggered that causes the state to transition from a blocked state to a ready state. In some embodiments, a task may be suspended, wherein the task does not use processing resources until it is explicitly called.

In some embodiments, ISRs and Direct Memory Access (DMA) may replace a polling loop task that has its own while loop continuously running. In some embodiments, a tickless idle task is configured to allow power savings.

In some embodiments, layers of abstractions may be used, such that each upper layer may use services that are provided by an immediate lower layer. The lower layer abstracts the layer below it from the upper layer. The reverse is also true, wherein each upper layer abstracts away its complexity and details to the lower layer below it. In some embodiments, each layer may only interact with a layer immediately below or above it. In some embodiments, layers may interact with layers that are not immediately below or above them.

In embodiments, there are different ways to achieve layers of abstraction. The goal is to create well-defined interfaces, operations, procedures and functions that may be used by other layers without having to know the details, how they are implemented, and/or hot to interpret or process data or develop the functions. In doing so, an abstraction penalty may be incurred. In embodiments using real-time navigational stack with SLAM, a state machine or hierarchical state machine may provide centralized control of the system. Each input and output component may interact with others or with outside systems through the centralized state machine system and each event may cause a transition from one state to another while localization, mapping, path planning, actuation, and Proportional-Integral-Derivative (PID) run concurrently. Events that occur drive transition from one state of the state machine to another state of the state machine, thereby controlling the entire operations and behavior of the robot and allowing the robot to react with the environment in real-time.

In some embodiments, an application may also run concurrently in the same state machine. In other embodiments, an application may be performed on another processing unit. For example, for a cleaning robot, an application may run the brush motors and fan motors. In the case of a telepresence robot, an application may serve as an audio/video call transmitter. In the preferred embodiment, room detection also runs in the same state machine on the same microcontroller, along with SLAM, control, sensing, actuation, battery management and other operations of the robot.

In some cases, it may be suitable to run the application along with the navigational stack inside the same state machine. For example, robot may have cleaning functions controlled in the same state machine as the navigational stack. In some robots, all processes run on a single MCU that includes User Interface (UI), Wi-Fi, etc. For other robots, the UI is offloaded to a separate MCU to allow more comprehensive and detailed user interaction as well as capacitive touch sensing and finger slide sensing.

In all three examples above, the same single MCU controls the navigational stack, sensing and actuation, and PID control, as well as an application that controls the brush, water pump, Ultra-Violet (UV) light, side brush, fan motor and other devices of the robot.

In some embodiments, an application is offloaded to a different subsystem. In embodiments, additional MCUs, CPUs, Graphics Processing Units (GPUs), Neural Processing Units (NPUs), etc. may be used to accommodate the operation of an application. For example, a system of a surveillance and security robot may offload identification of people the robot encounters to upstream subsystems that may be implemented on other processing devices. If the application requires identification of a person from a selected list of candidates, their identification may be executed with minimal overhead more easily than a scenario wherein the user must be identified from an infinite number of possible persons. For example, the system of the robot may only need to identify a person from a group of persons that live in a particular household. A broader list of persons from which the system needs to identify the person may include guests that the robot has observed to visit the residence before. In one embodiments, the list may be developed from a person's connections on social media platforms. However, the list would be broader than the list developed from physical visitors observed to visit the residence. In one embodiments, the system may begin the search to identify the person by searching through persons living at the residence and then progress to broader lists in a hierarchy manner. In some embodiments, the system generates an index of the hierarchy when the robot is not performing any other activities or when the robot is offline. For example, a system of a security robot may have a list indexed of common visitors of a train station. An example of a fast operation for the system of the robot includes identifying whether a person is a common visitor of the train station, and if so, finding a history of past visits and other desired information associated with the person.

In some embodiments, the control system may be distributed to more than one physical processor that collectively form a single conceptual state machine. Multiple physical processing devices or processor cores may collectively be regarded as a single logical unit that transitions from one state to another, wherein no single processing unit has individual control over the system. The distribution may be on the same physical board or on several different boards organized on a single robot. In some embodiments, the distribution of the control system may span multiple physical locations. In embodiments wherein the control system is distributed, each individual system (which itself may have one or more subsystems) may have partial or full autonomy. For example, in a collaborative system of cleaning, described in U.S. patent application Ser. No. 16/185,000, the entirety of which is incorporated by reference herein, each robot has autonomy in their own navigation but contributes to a larger system with a common goal (e.g., covering the entire floor surface of a shopping mall or airport).

In some embodiments, control of a system may occur as a hierarchy. For instance, a central control system (e.g., automated, manual, or hybrid) may control overall functions of a system of robots, but each individual robot system may have at least some autonomy within a criteria defined by the central control system. For example, in collaborative cleaning of a commercial area (e.g., an airport or shopping mall) may be divided into zones, wherein different robots are assigned to clean and maintain each zone. The system of each individual robot may determine when to carry out certain operations like emptying their bin, charging their batteries, and the order in which to clean the area assigned to them. In embodiments, hierarchical control is not limited to physically separate devices. In one device, an MCU may gather all sensor information, perform preprocessing, and present the pre-processed data to another MCU that uses the obtained data to run a navigation system. For example, a robot includes one MCU for collecting information from cameras, performing visual odometry, and sending pre-processed information to another MCU that uses at least some of the information to execute a navigation subsystem. The visual odometry or other sensor data may be pre-processed by an MCU of a different make and model, or by a CPU, GPU, NPU, etc.

In some embodiments, the relation between components forms a service-client relationship. In one example, a cloud service may store and save all previous mapping information and localizations of a robot as history. This history may be provided as a service to clients (e.g., similar to history stored by a web browser), wherein a person may search for data from a specific work session of the robot. In some embodiments, the history may be sent to an application that sorts, organizes and/or analyzes the data. In some embodiments, a data mining client may collect data from the histories of multiple robots (e.g., 100, 1000, 300000, or all robots) over periods of time to deduce large-scale patterns or reasoning. For example, traffic data associated with a particular location historic number of robot accidents, historic battery use, etc. may be aggregated and used to improve performance of robots. In embodiments, such services do not need to be on a physical server and may be geographically spread out. There may be multiple services that are available to multiple clients. In some embodiments, clients may, in part, provide services to other clients and vice versa. In some embodiments, a service provider to one client may itself be a client of one or more services.

An advantage of a real-time navigational stack is its use in high-reliability system applications. Such systems require redundancy and hot takeover of a primary core or processor by another core or processor when the primary processor encounters a problem. In embodiments, multiple processors or cores are in lock-step with each other such that the primary processor may be taken offline upon experiencing a fault while a redundant processor takes over the operations without any interruption. In some embodiments, the processor taken offline is tested, and if recovered, is restored to an online state. This hot failsafe system allows a navigation system to continue with no interruptions. In less critical systems, a warm failsafe or a cold failsafe system may suffice. The above process may be implemented with multiple cores or multiple MCUs. In some implementations, a pair of CPUs may be used.

Influential factors in a high-reliability system include latency, jitter (i.e., variations of delay), reliability requirements, error definition and detection mechanisms, acceptable time for handling errors, throughput requirements, proportion of control data versus application data, types of applications, number of interacting components, and physical distance between components. When all of these factors are considered, a real-time system may provide better parallel operation and processing and a tighter coupling.

Some embodiments may use a multicore (i.e., a single chip containing multiple processors) and/or a multiprocessor (i.e., multiple physical chips on a Printed Circuit Board Assembly (PCBA)). In embodiments, communication hardware methods between processors include, but are not limited to, Controller Area Network (CAN), Inter-Integrated Circuits (I2C), Serial Peripheral Interface (SPI), and Local Interconnect Network (LIN). Alternatively, Ethernet, Modbus and UBS may be used. Some embodiments may use a master/slave configuration, wherein the slave executes its task and sends the output to the master and the master makes use of the output data obtained. In embodiments, communication software may take the form of synchronized object access, wherein concurrent tasks communicate and access shared data. In cases where access to a software class needs to be available to more than one task or operation, the class is responsible for synchronizing access to what it encapsulates. This may be accomplished through mutual exclusion. In embodiments, a task may acquire operation on a semaphore and release the operation on the semaphore when it is complete.

In some embodiments, information hiding and synchronization may be combined such that data objects that encapsulate data and have operations are executed in a mutually exclusive manner. In some embodiments, a monitor lock may be used such that only one task is active. In embodiments where data is communicated across the cloud, protocols categorized as Message-Oriented Middleware (MOM) or restful model are used. Advanced Message Queuing Protocol (AMQP), Message Queue Telemetry Transport (MQTT), and Simple (or Streaming) Text Oriented Message Protocol (STOMP) are some examples of MOM implementations.

In embodiments, producers and consumers of messages may have a publish/subscribe type relationship and/or have a broker. In object broker or object request broker models, the broker is a middleman between a client and a service. In embodiments, services may register with a broker or clients may aggregate at the broker to reach services. When a broker is used, clients do not have to worry about the physical/virtual location of the services or how the services are implemented as there is transparency for location, platform, etc. COBRA and Java messaging are some examples of messaging services.

Restful model provides control to the server when a client initiates access to resources through a synchronous request response method of communication, such that the state of resources is controlled by the server and HTTP methods (e.g., GET, PUT, POST, or DELETE) interact through Universal Resource Identifier (URI) without the need for a broker.

Some embodiments may use MQTT providing a pairing topology where a consumer is paired with a producer. MQTT is capable of carrying any type of data with any format. As such, MQTT may carry, for example, a robot map, a video stream, commands to a robot from an application, and updates from a robot to an application, and any voice or gesture commands.

In embodiments, the one transmitting a message is a publisher and the one receiving the message is a subscriber.

In the middle, a broker provides additional advantages such as subject, content, and type filtering, allowing the broker to intercept and decide whether to answer or block messages based on topic, content, type, etc. This decouples the publisher from the consumer and abstracts away information such as IP/MAC address from both sides. In embodiments, filtering for topic comprises pruning messages when there is no subscriber tuned for a specific topic (i.e., channel) of communication. In some contexts, a topic may be a communication channel that a subscriber tunes into to obtain information from a publisher. In embodiments, payloads may be encrypted text or JavaScript Object Notation (JSON) objects. In some embodiments, shared subscription may be implemented using the feature subscription group provided by MQTT.

In embodiments, messaging systems may have synchronous or asynchronous nature. In embodiments, messages may be unidirectional or bidirectional. In some embodiments, the broker may have a handle. In some embodiments, after the broker connects the client to a service, the broker does not participate in message transfer. In some embodiments, the service first needs to register with a broker, providing details such as service nature, location, etc. In some embodiments, the client attempts to discover services by sending a message to the broker and the broker responds with a list of previously registered services. In some embodiments, multicast is desirable, wherein a group is the recipient of a service or message.

In embodiments, variations may include group recipients or may allow for the subscriber to leave or join groups such that the subscriber may not receive or receives messages. In embodiments, messages may have priorities or importance levels. Depending on protocol, a session may start with a hello message, connect message, keep alive message, and/or init message, each message serving the purpose of initiating a communication. This may be replied with an ack message if the protocol provides a connection-oriented service.

In some embodiments, protocols such as STOMP, Constrained Application Protocol (CoAP), AMQP or Hypertext Transfer Protocol (HTTP) may be used. In some embodiments, messages may be sent as JSON objects. In some embodiments, Remote Procedure Call (RPC) communication method may be used.

In some embodiments, an authorization, authentication and accounting method may be used to keep track of users and services, access, and usage. Keystone is an example of an identity manager, but according to needs, a proprietary version may provide advantages. In some embodiments, a Lightweight Directory Access Protocol (LDAP) may be used to manage resources and access.

In embodiments, latency is increased as physical distance is increased. Latency of sensors of the robot must be comparable with other similar sensors. For example, Wi-Fi signals may have a latency of 1.5 ms. In embodiments, processing occurs where the data is located as opposed to transferring the data to a location where processing occurs.

In a real-time system, the runtime behavior of the robot is instant and on-the-fly decisions, outputs, and such are executed. For example, with QSLAM, a new room is instantaneously distinguished upon the room being observed by the system of the robot. In comparison, some prior art distinguishes a new room only after the completion of the work session of the robot. In operating instantaneously and on-the-fly, the problem of partial observability is solved as well.

At a global level, obstacles are observed by a Light Detection and Ranging (LIDAR) of the robot as positioned at distances closer to the robot than the rest of the environment. In some embodiments, a depth camera or vision sensor may be used in addition to or instead of the LIDAR. Alternative or additional options may also include RGBD cameras, TOF sensors, etc. In some embodiments, as a complementary obstacle management solution, Infrared (IR) sensors ultrasound sensors, TSSP sensors, TSOP sensors, and the like may be used. Sharp distance sensors and ST Micro flight sensors are also complementary sensors that may be integrated into the obstacle management system of the robot.

Some embodiments may use speed cop, a software component that manages the speed, acceleration, and deceleration of the robot in various situations. In older behavioral systems, the robot executes a reactive preset movement when an IR receiver of a local obstacle sensor receives the reflection of a signal that was emitted by an IR transmitter of the sensor, without learning or storing any information, including the sensed obstacle.

However, in the new system described herein, object detection is more complex. As opposed to using 1 or 0 to distinguish the presence of an obstacle, a statistical and probabilistic approach is used. The system compares and examines sensed data against the global map and determines if there have been unexpected encounters in this area before (e.g., based on data from a global sensor, LIDAR, camera, structured light, etc.). In embodiments, areas in which unexpected encounters occurred are marked within the map such that in future runs the areas are approached with more caution. In embodiments, the system of the robot examines and determines if an obstacle encounter is a single encounter or a series of encounters. For example, a single encounter may be determined for an encounter with a standalone skinny pole, such as a pole of a desk, and a series of encounters may be determined for an encounter with a chair with four or five skinny legs in close proximity of each other. In embodiments, the system of the robot determines whether the obstacle may move a little if bumped by the robot (e.g., a chair with caster wheels) and if the movement of the obstacle results in one or more other obstacles moving, such as a fixed table next to a wheeled chair. In embodiments, the system of the robot determines if a trap-like area exists, such as the area under a chair. The robot may avoid such trap-like areas in future runs. In some embodiments, the system of the robot may inflate obstacles that have previously or are predicted to cause the robot to become stuck. In embodiments, the system may increase or decrease an inflation rate of the obstacle in following runs.

In some embodiments, the boustrophedon coverage (e.g., coverage of areas with low obstacle density or open spaces) is independent of obstacle coverage. In some embodiments, the boustrophedon coverage and obstacle coverage occur concurrently wherein obstacles are covered during boustrophedon coverage. In one example, a robot executes boustrophedon coverage, wherein interior obstacles are avoided and their coverage postponed. The robot may execute boustrophedon coverage of a sub-area skipped in the previous pass as a separate boustrophedon coverage task. The robot may then execute some obstacle coverage (i.e., obstacle wall following coverage) postponed during the boustrophedon task as a separate task. In another example of coverage by a robot, obstacle coverage occurs concurrently with boustrophedon coverage. The processor of the robot considers a new boustrophedon box within which boustrophedon coverage is planned and executed. The robot continues obstacle coverage in the first boustrophedon box and then generates another smaller boustrophedon box for any uncovered remaining area within the first boustrophedon box. The robot may then execute wall follow coverage before defining another boustrophedon box within which boustrophedon coverage and obstacle coverage are planned and executed.

In some embodiments, the robot may encounter stains on the floor during a working session. In some embodiments, different stains (e.g., material composition of stain, size of stain, etc.) on the floor may require varying levels of cleaning intensity to remove the stain from, for example, a hardwood floor. In some embodiments, the robot may encounter debris on floors. In some embodiments, debris may be different for each encounter (e.g., type of debris, amount of debris, etc.). In some embodiments, these encounters may be divided into categories (e.g., by amount of debris accumulation encountered or by size of stain encountered or by type of debris or stain encountered). In some embodiments, each category may occur at different frequencies in different locations within the environment. For example, the robot may encounter a large amount of debris accumulation at a high frequency in a particular area of the environment. In some embodiments, the processor of the robot may record such frequencies for different areas of the environment during various work sessions and determine patterns related to stains and debris accumulation based on the different encounters. For example, the processor may identify particular areas as being likely to have hard to clean stains and may actuate the robot to perform a deep clean in such areas. In some embodiments, the processor may adjust cleaning strategies based on the derived patterns.

In some embodiments, similar techniques are applied for obstacle encounters. For instance, the processor may record the frequency of encountering an obstacle in a particular area, the frequency of encountering obstacles the robot is likely to become stuck on or have difficulty navigating around in particular areas, etc. In some embodiments, the processor determines patterns of encounters with obstacles for one particular area or an entire environment. In some embodiments, the processor determines patterns of encounters with obstacles based on encounters with obstacles within the environment recorded during a single work session, multiple work sessions, or all work sessions.

In some embodiments, the processor executes a decision-making loop comprising of observation and actuation in response to the observation. Examples of actuations include decreasing speed, decreasing the distance between parallel lines in the robot path to increase overlap coverage by the robot, repeating treatment or cleaning of an area or entire environment, scheduling a next cleaning earlier, creating a detour to provide extra attention to an area, or a combination of some or all of these actuations.

In some embodiments, observations captured by sensors of the robot may be visualized by a user using an application of a communication device. For instance, a stain observed by sensors of the robot at a particular location may be displayed in a map of the environment at the particular location it was observed. In some embodiments, stains observed in previous work sessions are displayed in a lighter shade and stain observed during a current work session are displayed in a darker shade. This allows a user to visualize areas in which stains are often observed and currently observed.

In some embodiments, the user may choose an actuation based on the visualization displayed to the user, such as observed locations of stains or high debris accumulation. Examples of actuations include increasing cleaning frequency, reducing the speed of the robot, decrease a distance between parallel lines in the robot path or increasing coverage overlap, adding extra coverage for an area, autonomous AI actuation, etc.

In some embodiments, the processor of a robot, such as a commercial cleaner, may determine an optimal service station for the robot. In some embodiments, the processor comprises listing all self service station locations, contacting service stations to determine duration of time required before availability, identifying a suitable service station, docking at the selected service station, performing self-service with assistance from the service station, and resuming operation. In some embodiments, the processor of identifying the suitable service station comprises determining services provided by different service stations, determining availability of service stations, determining whether service is required immediately or at a later time, and determining if the robot has enough battery to navigate to the service station while performing work.

In some embodiments, there may be multiple service stations and robots within a facility. Each station may provide different combinations of services and different capacities and may or may not be occupied.

In some embodiments, air flow and/or suction may be measured using one or more sensors to determine if there is a block in an air passage of the robot based on the sensor data.

In some embodiments, the robot may have a flat side on a rear side or a front side or both sides of its body. In some embodiments, the front side of the robot body is flat and the rear side of the body is rounded. In some embodiments, the front side of the robot body is rounded and the rear side of the body is flat. The robot body may also be rectangular or square, wherein both rear and front sides of the body are flat. Angles on a flat edge surface of a robot body may be 90 degrees or close to 90 degrees. Rounded corners of the robot body may be 90 degrees, less than 90 degrees or more than 90 degrees.

Some robots require more room to turn because of the shape of the robot body. The needed space for turning is dependent on a length of the robot, width of a flat edge of the robot body and the intersection location between wheels axis and the robot center axis (i.e., the location of the wheels in relation to the length of the robot). A width of the flat edge increasing results in an expansion of the needed space for turning. A length of the robot increasing results in an expansion of the space needed for turning. Wheels located closer to a flat edge of the body of the robot results in a contraction of the space needed for turning. If the wheels are closer to the flat edge of the body a smaller space is needed for the robot to turn. However, there is a limit where shifting the wheels becomes ineffective. In embodiments, the optimal placement of the wheels is at a position where the distance of the midpoint of the wheel axis to the front of the robot is equal to the distance of the midpoint of the wheel axis to each corner of the robot body.

Depending on the use case, the bumper of robots may cover the perimeter of the robot body. Depending on the use case, side movement of the bumper may be necessary, wherein the bumper may be triggered from the side of the robot. In some embodiments, this may be implemented by using tension springs on both sides. Regardless of the shape of the robot, the bumper may be integrated and cover the entire body of the robot. In some cases, the body of the robot may be beneath the integrated bumper. In some embodiments, there may be other elements such as a user interface on top of the bumper. In this case the moving edge of the bumper may be hidden under such elements. In some embodiments, the bumper moves underneath a user interface frame of the robot. There may be a gap between the bumper and the user interface (covered by the user interface frame) that allows the bumper to move when it is triggered.

Another example of a robot comprises a body with rounded front and rear sides, a user interface and a bumper. The bumper may cover the entire perimeter of the robot and the edge of the bumper may be hidden under the user interface.

In some embodiments, a robot body shape that is a fusion between a square and a circle may be referred to as a squircle shaped robot. The squircle shape may be defined by the equation $(x-a)^4+(y-b)^4=r^4$, wherein a and b are the x and y coordinates of the center and r is the minor radius of the squircle. In some embodiments, the robot body shape may comprise a semi-squircle wherein only one half of the body shape is a squircle. The other half may be a semi-circle or a semi-square or a semi-rectangle. In embodiments, the body shape of the robot may be any combination or fusion of different shapes.

In a first work session, a previously generated map may not be available to the processor of the robot. In such cases, the processor determines decisions in real-time based on information that has been gathered up to a current point at which a decision is to be made dynamically to select between three different tasks, coverage, wall-following, and exploration. In embodiments, the decision is determined adaptively and based on a current position of the robot resulting from execution of a previous task and given observability is partial. For example, in a work session of a robot, the robot starts at a charging station. If a processor of the robot has no access to a map of the environment, its initial priority is exploration. Therefore, the robot explores to a center of a current room during which the processor completes its map of the room. Then the robot covers the room by executing a boustrophedon path within one or more boustrophedon boxes (i.e., a box within which a boustrophedon path is executed). The robot may complete coverage of a perimeter of the room before beginning coverage of a second room. In the final parts of wall-following the current room, the robot may follow along a perimeter of an island that is within the current room, leading the robot to the second room. To gain more knowledge on the second room, the robot may navigate to a more central location of the second room and once the processor deems to have reasonable knowledge of a map of the second room, the robot begins coverage by executing a boustrophedon path within a first boustrophedon box. During coverage within the first boustrophedon box, the processor may notice that some areas were missed between the initial room and the second room and actuates the robot to cover the uncovered areas within narrow boustrophedon boxes before moving on to new areas. If the robot is already close to the island, the robot may cover the perimeter of island positioned within the second room from right to left and continue on to cover perimeter points between the first boustrophedon box and the wall to the left of the first boustrophedon box. Had the processor of the robot chosen a second boustrophedon box positioned below the first boustrophedon box earlier, then the robot would have to come back to wall follow the wall to the left side of the first boustrophedon box. This would not be optimal. After completing wall-following along the wall on the left side of the first boustrophedon box, the processor of the robot may determine whether to cover the second boustrophedon box (since the second room is already mapped, the robot does not need to explore) or continue with wall-following the wall further before starting coverage of the second boustrophedon box. Continuing wall-following first saves the robot from having to come back to wall-follow the wall to the left side of the first boustrophedon box. The robot may then cover the second boustrophedon box.

In some embodiments, the processor of the robot determines a main coverage angle by determining an angle and length for all walls, binning the walls based on their angles ranging from zero to pi/2, choosing the angle of the bin having the longest accumulation of wall lengths, and rotating the map by the shortest angle that matches the chosen angle. After rotation, the main coverage angle may be set to zero. A minor perturbation of the robot start pose may cause a 90 degree flip.

Some embodiments may provide a robot including communication, mobility, actuation, and processing elements. In some embodiments, the robot may include, but is not limited to include, one or more of a casing, a chassis including a set of wheels, a motor to drive the wheels, a receiver that acquires signals transmitted from, for example, a transmitting beacon, a transmitter for transmitting signals, a processor, a memory storing instructions that when executed by the processor effectuates robotic operations, a controller, a plurality of sensors (e.g., tactile sensor, obstacle sensor, temperature sensor, imaging sensor, light detection and ranging (LIDAR) sensor, camera, depth sensor, time-of-flight (TOF) sensor, TSSP sensor, optical tracking sensor, sonar sensor, ultrasound sensor, laser sensor, light emitting diode (LED) sensor, etc.), network or wireless communications, radio frequency (RF) communications, power management such as a rechargeable battery, solar panels, or fuel, and one or more clock or synchronizing devices. In some cases, the robot may include communication means such as Wi-Fi, Worldwide Interoperability for Microwave Access (WiMax), WiMax mobile, wireless, cellular, Bluetooth, RF, etc. In some cases, the robot may support the use of a 360 degrees LIDAR and a depth camera with limited field of view. In some cases, the robot may support proprioceptive sensors (e.g., independently or in fusion), odometry devices, optical tracking sensors, smart phone inertial measurement units (IMU), and gyroscopes. In some cases, the robot may include at least one cleaning tool (e.g., disinfectant sprayer, brush, mop, scrubber, steam mop, cleaning pad, ultraviolet (UV) sterilizer, etc.). The processor may, for example, receive and process data from internal or external sensors, execute commands based on data received, control motors such as wheel motors, map the environment, localize the robot, determine division of the environment into zones, and determine movement paths. In some cases, the robot may include a microcontroller on which computer code required for executing the methods and techniques described herein may be stored.

In some embodiments, at least a portion of the sensors of the robot are provided in a sensor array, wherein the at least a portion of sensors are coupled to a flexible, semi-flexible, or rigid frame. In some embodiments, the frame is fixed to a chassis or casing of the robot. In some embodiments, the sensors are positioned along the frame such that the field of view of the robot is maximized while the cross-talk or interference between sensors is minimized. In some cases, a component may be placed between adjacent sensors to minimize cross-talk or interference. In some embodiments, the robot may include sensors to detect or sense objects, acceleration, angular and linear movement, temperature, humidity, water, pollution, particles in the air, supplied power, proximity, external motion, device motion, sound signals, ultrasound signals, light signals, fire, smoke, carbon monoxide, global-positioning-satellite (GPS) signals, radio-frequency (RF) signals, other electromagnetic signals or fields, visual features, textures, optical character recognition (OCR) signals, spectrum meters, and the like. In some embodiments, a microprocessor or a microcontroller of the robot may poll a variety of sensors at intervals.

In some embodiments, the robot may be wheeled (e.g., rigidly fixed, suspended fixed, steerable, suspended steerable, caster, or suspended caster), legged, or tank tracked. In some embodiments, the wheels, legs, tracks, etc. of the robot may be controlled individually or controlled in pairs (e.g., like cars) or in groups of other sizes, such as three or four as in omnidirectional wheels. In some embodiments, the robot may use differential-drive wherein two fixed wheels have a common axis of rotation and angular velocities of the two wheels are equal and opposite such that the robot may rotate on the spot. In some embodiments, the robot may include a terminal device such as those on computers, mobile phones, tablets, or smart wearable devices.

Figure 2:
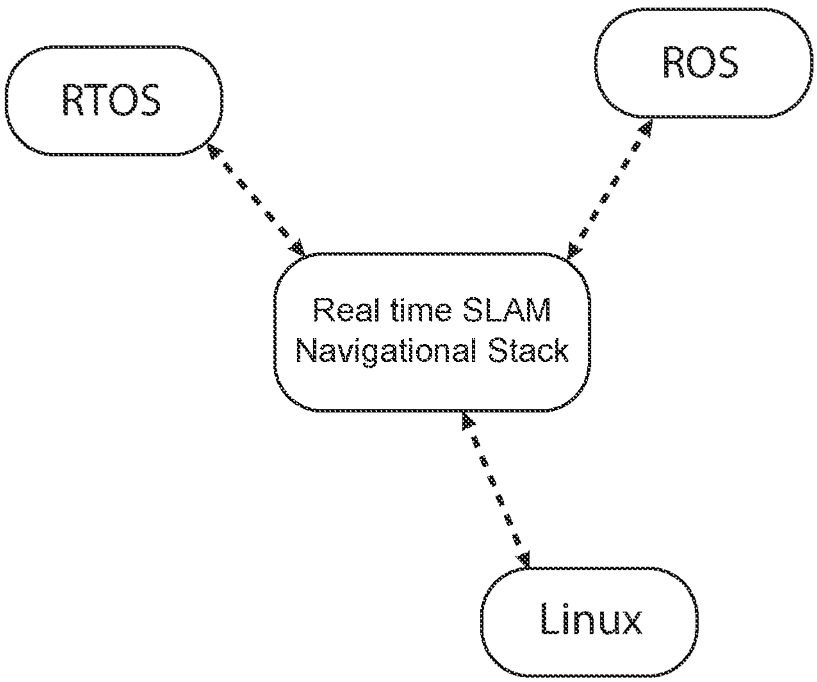

Some embodiments may provide a real time navigational stack configured to provide a variety of functions. In embodiments, the real time navigational stack may reduce computational burden, and consequently may free the hardware (HW) for functions such as object recognition, face recognition, voice recognition, and other AI applications. Additionally, the boot up time of a robot using the real time navigational stack may be faster than prior art methods. For instance, FIG. 1 illustrates the boot up time of a robotic vacuum using the real time navigational stack in comparison to popular brands of robotic vacuums using other technologies known in the art (e.g., ROS and Linux). In general, the real time navigational stack may allow more tasks and features to be packed into a single device while reducing battery consumption and environmental impact. The collection of the advantages of the real time navigational stack consequently improve performance and reduce costs, thereby paving the road forward for mass adoption of robots within homes, offices, small warehouses, and commercial spaces. In embodiments, the real time navigational stack may be used with various different types of systems, such as Real Time Operating System (RTOS), Robot Operating System (ROS), and Linux, as illustrated in FIG. 2.

Figure 3:
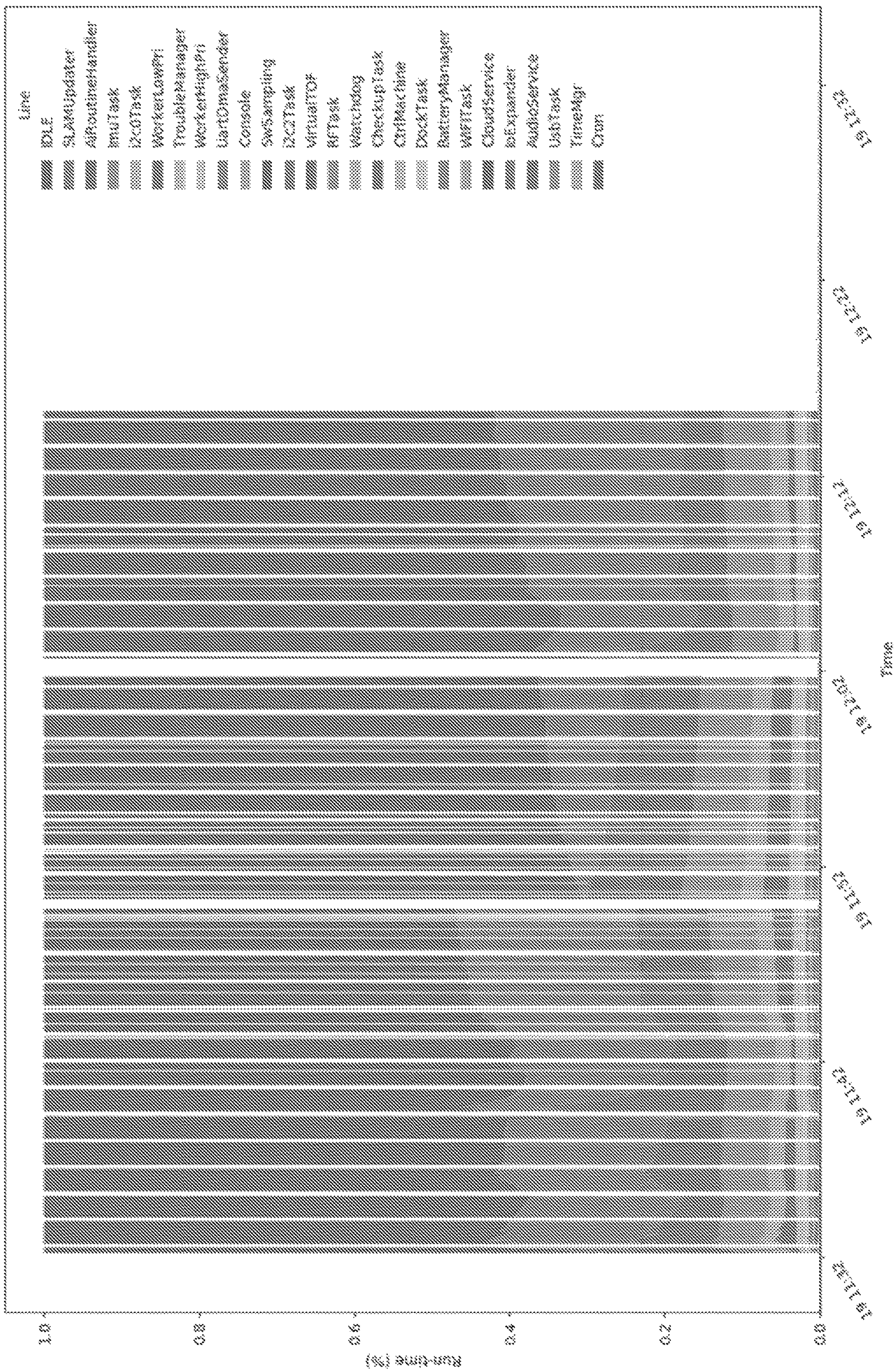

Some embodiments may use a Microcontroller Unit (MCU) (e.g., SAM70S MC) including built in 300 MHz clock, 8 MB Random Access Memory (RAM), and 2 MB flash memory. In some embodiments, the internal flash memory may be split into two or more blocks. For example, a lower block may be used as default storage for program code and constant data. In some embodiments, the static RAM (SRAM) may be split into two or more blocks. FIG. 3 provides a visualization of multitasking in real time on an ARM Cortex M7 MCU, model SAM70 from Atmel. Each task is scheduled to run on the MCU. Information is received from sensors and is used in real time by AI algorithms. Decisions actuate the robot without buffer delays based on the real time information. Examples of sensors include, but are not limited to, inertial measurement unit (IMU), gyroscope, optical tracking sensor (OTS), depth camera, obstacle sensor, floor sensor, edge detection sensor, debris sensor, acoustic sensor, speech recognition, camera, image sensor, time of flight (TOF) sensor, TSOP sensor, laser sensor, light sensor, electric current sensor, optical encoder, accelerometer, compass, speedometer, proximity sensor, range finder, LIDAR, LADAR, radar sensor, ultrasonic sensor, piezoresistive strain gauge, capacitive force sensor, electric force sensor, piezoelectric force sensor, optical force sensor, capacitive touch-sensitive surface or other intensity sensors, global positioning system (GPS), etc. In embodiments, other types of MCUs or CPUs than that described in FIG. 3 may be used to achieve similar results. A person skilled in the art would understand the pros and cons of different available options and would be able to choose from available silicon chips to best take advantage of their manufactured capabilities for the intended application.

In embodiments, the core processing of the real time navigational stack occurs in real time. In some embodiments, a variation RTOS may be used (e.g., Free-RTOS). In some embodiments, a proprietary code may act as an interface to providing access to the HW of the CPU. In either case, AI algorithms such as SLAM and path planning, peripherals, actuators, and sensors communicate in real time and take maximum advantage of the HW capabilities that are available in advance computing silicon. In some embodiments, the real time navigation stack may take full advantage of thread mode and handler mode support provided by the silicon chip to achieve better stability of the system. In some embodiments, an interrupt may occur by a peripheral, and as a result, the interrupt may cause an exception vector to be fetched and the MCU (or in some cases CPU) may be converted to handler mode by taking the MCU to an entry point of the address space of the interrupt service routine (ISR). In some embodiments, a Microprocessor Unit (MPU) may control access to various regions of the address space depending on the operating mode.

Figure 4:
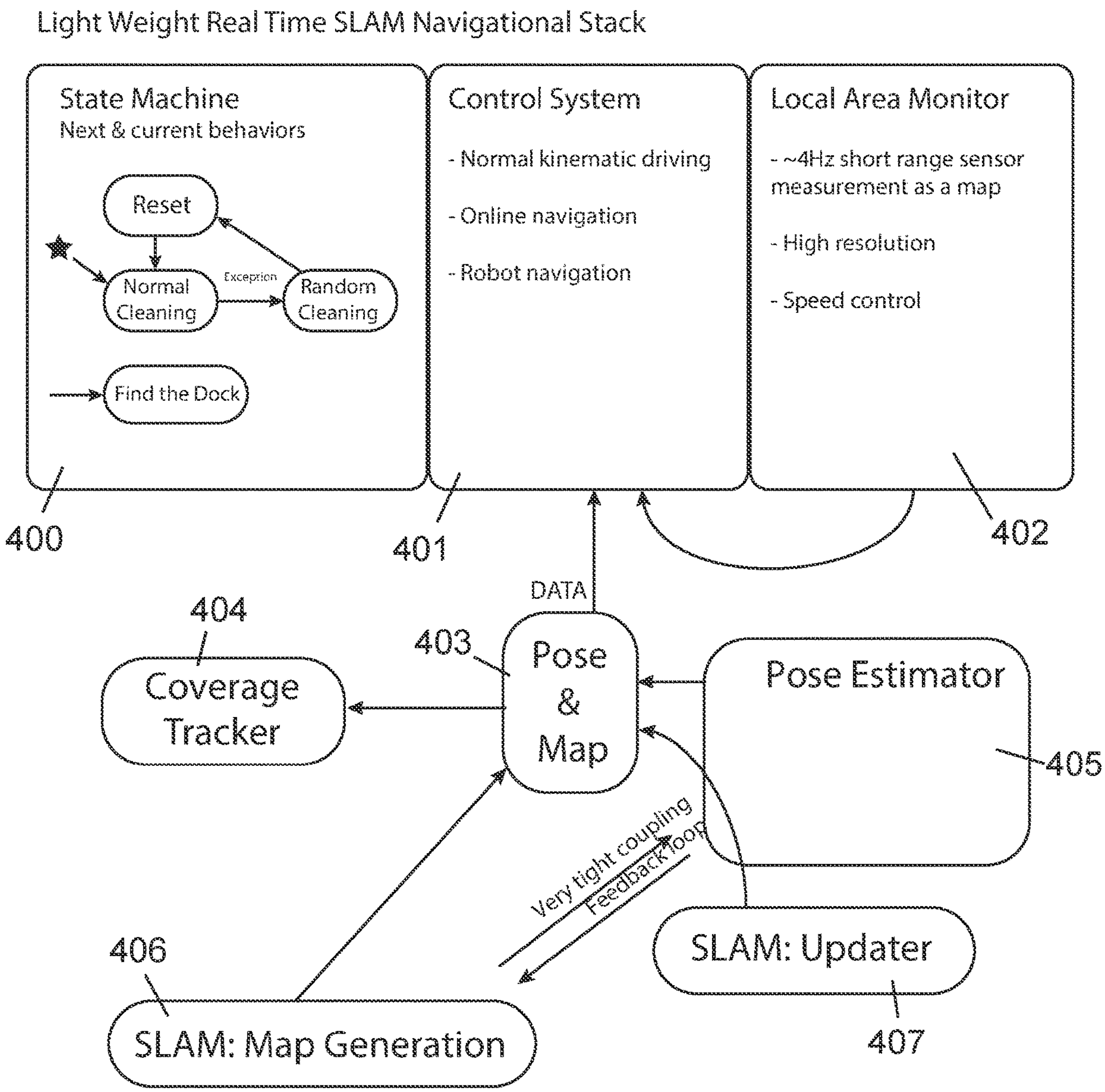

In some embodiments, Light Weight Real Time SLAM Navigational Stack may include a state machine portion, a control system portion, a local area monitor portion, and a pose and maps portion. FIG. 4 provides a visualization of an example of a Light Weight Real Time SLAM Navigational Stack algorithm. The state machine 1100 may determine current and next behaviors. At a high level, the state machine 1100 may include the behaviors reset, normal cleaning, random cleaning, and find the dock. The control system 1101 may determine normal kinematic driving, online navigation (i.e., real time navigation), and robust navigation (i.e., navigation in high obstacle density areas). The local area monitor 1102 may generate a high resolution map based on short range sensor measurements and control speed of the robot. The control system 301 may receive information from the local area monitor 1102 that may be used in navigation decisions. The pose and maps portion 1103 may include a coverage tracker 1104, a pose estimator 1105, SLAM 1106, and a SLAM updater 1107. The pose estimator 1105 may include an Extended Kalman Filter (EKF) that uses odometry, IMU, and LIDAR data. SLAM 1106 may build a map based on scan matching. The pose estimator 1105 and SLAM 1106 may pass information to one another in a feedback loop. The SLAM updated 1107 may estimate the pose of the robot. The coverage tracker 1104 may track internal coverage and exported coverage. The coverage tracker 1104 may receive information from the pose estimator 1105, SLAM 1106, and SLAM updated 1107 that it may use in tracking coverage. In one embodiment, the coverage tracker 1104 may run at 2.4 Hz. In other indoor embodiments, the coverage tracker may run at between 1-50 Hz. For outdoor robots, the frequency may increase depending on the speed of the robot and the speed of data collection. A person in the art would be able to calculate the frequency of data collection, data usage, and data transmission to control system. The control system 1101 may receive information from the pose and maps portion 1103 that may be used for navigation decisions.

In embodiments, the real time navigational system of the robot may be compatible with a 360 degrees LIDAR and a limited Field of View (FOV) depth camera. This is unlike robots in prior art that are only compatible with either the 360 degrees LIDAR or the limited FOV depth camera. In addition, navigation systems of robots described in prior art require calibration of the gyroscope and IMU and must be provided wheel parameters of the robot. In contrast, some embodiments of the real time navigational system described herein may autonomously learn calibration of the gyroscope and IMU and the wheel parameters.

Since different types of robots may use the Light Weight Real Time SLAM Navigational Stack describes herein, the diameter, shape, positioning, or geometry of various components of the robots may be different and may therefore require updated distances and geometries between components. In some embodiments, the positioning of components of the robot may change. For example, in one embodiment the distance between an IMU and a camera may be different than in a second embodiment. In another example, the distance between wheels may be different in two different robots manufactured by the same manufacturer or different manufacturers. The wheel diameter, the geometry between the side wheels and the front wheel, and the geometry between sensors and actuators, are other examples of distances and geometries that may vary in different embodiments. In some embodiments, the distances and geometries between components of the robot may be stored in one or more transformation matrices. In some embodiments, the values (i.e., distances and geometries between components of the robot) of the transformation matrices may be updated directly within the program code or through an API such that the licensees of the software may implement adjustments directly as per their specific needs and designs.

In some cases, the real time navigational system may be compatible with systems that do not operate in real time for the purposes of testing, proof of concepts, or for use in alternative applications. In some embodiments, a mechanism may be used to create a modular architecture that keeps the stack intact and only requires modification of the interface code when the navigation stack needs to be ported. In some embodiments, an Application Programming Interface (API) may be used to interface between the navigational stack and customers to provide indirect secure access to modify some parameters in the stack. In some embodiments, sensors of the robot may be used to measure depth to objects within the environment. In some embodiments, the information sensed by the sensors of the robot may be processed and translated into depth measurements. In some embodiments, the depth measurements may be reported in a standardized measurement unit, such as millimeter or inches, for visualization purposes, or may be reported in non-standard units, such as units that are in relation to other readings. In some embodiments, the sensors may output vectors and the processor may determine the Euclidean norms of the vectors to determine the depths to perimeters within the environment. In some embodiments, the Euclidean norms may be processed and stored in an occupancy grid that expresses the perimeter as points with an occupied status.

An issue that remains a challenge in the art relates to the association of feature maps with geometric coordinates. Maps generated or updated using traditional SLAM methods (i.e., without depth) are often approximate and topological and may not scale. This may be troublesome when object recognition is expected. For example, the processor of the robot may create an object map and a path around an object having only a loose correlation with the geometric surrounding. If one or more objects are moving, the problem becomes more challenging. Light weight real time QSLAM methods described herein address such issues in the art. When objects move in the environment, features associated with the objects move along the trajectory of the respective object while background features remain stationary. Each set of features corresponding to the various objects may be tracked as they evolve with time using iterative closest point algorithm or other algorithms. In embodiments, depth awareness creates more value and accuracy to for the system as a whole. Prior to elaborating further on the techniques and methods used in associating feature maps with geometric coordinates, the system of the robot is described.

Figure 5:
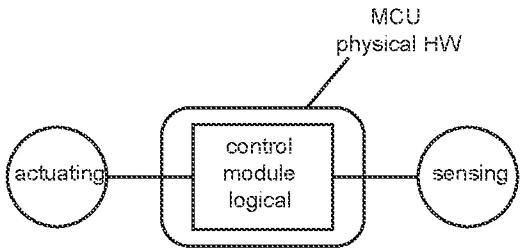
FIG. 5 illustrates an example of an MCU of the robot.
Figure 6:
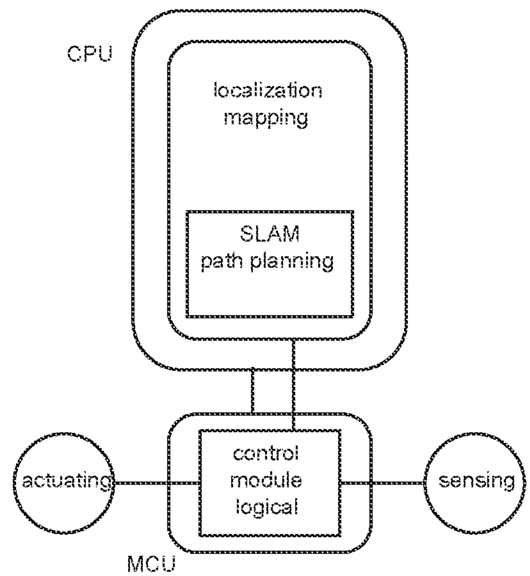
FIG. 6 illustrates an MCU and CPU of a robot of the art.

In embodiments, the MCU reads data from sensors such as obstacle sensors or IR transmitters and receivers on the robot or a dock or a remote device, reads data from an odometer and/or encoder, reads data from a gyroscope and/or IMU, reads input data provided to a user interface, selects a mode of operation, automatically turns various components on and off or per user request, receives signals from remote or wireless devices and send output signals to remote or wireless devices using Wi-Fi, radio, etc., self-diagnoses the robot system, operates the PID controller, controls pulses to motors, controls voltage to motors, controls the robot battery and charging, controls the fan motor, sweep motor, etc., controls robot speed, and executes the coverage algorithm using, for example, RTOS or Bare-metal. FIG. 5 illustrates an example of an MCU of the robot and various tasks executed by the MCU. With the advancement of SLAM and HW cost reduction, path planning, localization, and mapping are possible with the use of a CPU, GPU, NPU, etc. However, some algorithms in the art may not be mature enough to operate in real time and require a lot of HW. Despite using powerful CPUs and GPUs, a struggle remains in the art, wherein some SLAM solutions use a CPU to offload SLAM, path planning, etc. computation and processing. For example, FIG. 6 illustrates an MCU and CPU of a robot of the art, with the more advanced computation and processing occurring at the CPU level.

Figure 7:
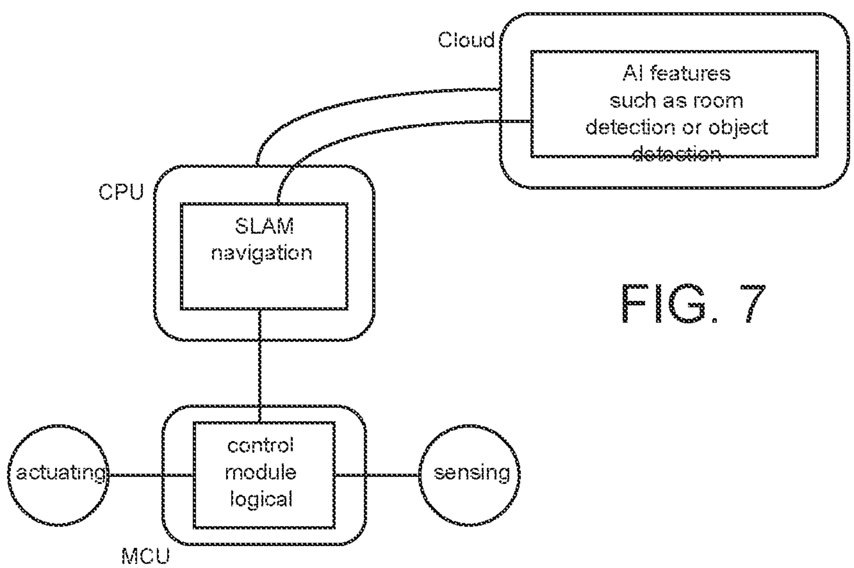
FIG. 7 illustrates the relation between MCU, CPU and cloud.

In the art, several decisions are not real time and are sent to the CPU to be processed. The CPU, such as a Cortex A ARM, runs on a Linux (desktop) OS that does not have time constraints and may queue the tasks and treat them as a desktop application, causing delays. Over time, as various AI features have emerged, such as autonomously splitting an environment into rooms, recognizing rooms that have been visited, choosing robot settings based on environmental conditions, etc., the implementation of such AI features consume increased CPU power. Some prior art implement the computation and processing such AI features on the cloud. However, this further increases the delay and is opposite from real time operation. In some art, autonomous room division is not even suggested until at least one work session is completed and in some cases the division of rooms are not the main basis of a cleaning strategy. FIG. 7 expands on FIG. 6, wherein the more advanced AI features are shown as processed on the cloud, further increasing delays. In contrast, FIG. 8 illustrates light weight and real time QSLAM, wherein SLAM, navigation, AI features, and control features are executed at the MCU level. QSLAM is so lightweight that not only is the control and SLAM computation and processing executed on one MCU, but also many AI features that are traditionally computationally intensive are executed on the same MCU as well. In addition to all control and computations and processing executed on the same MCU, all are done in real time as well. In some embodiments, QSLAM architecture may include a CPU. In some embodiments, a CPU and/or GPU may be used to further reform AI and/or image processing. For example, FIG. 9 illustrates the use of a CPU in the QSLAM architecture for more advanced processing, such as object detection and face recognition (i.e., image processing). Further, in some embodiments, some QSLAM processing may occur on the cloud. For example, FIG. 10 illustrates the addition of cloud based processing to different QSLAM architectures. In 1000 the cloud is add directly to the MCU (top left), in 1001 the cloud is added to CPU and CPU added to MCU (top right), in 1002 the cloud and CPU are directly added to the MCU independent of each other (bottom left), and in 1003 the MCU, CPU, and cloud are all connected to each other (bottom right).

In some embodiments, a server used by a system of the robot may have a queue. For example, a compute core may be compared to an ATM machine with people lining up to use the ATM machine in turns. There may be two, three, or more ATM machines. This concept is similar to a server queue. In embodiments, $T_1$ may be a time from a startup of a system to arrival of a first job. $T_2$ may be a time between the arrival of the first job and an arrival of the second job and so on while $S_i$ (i.e., service time) may be a time each job needs of the core to perform the job itself. This is shown in Table 1 below. Service time may be dependent on the instructions per minute (or seconds) that the job requires, $S_i=R_iC$, wherein $R_i$ is the required instructions.

TABLE 1

| Arrivals and Time Required of Core | | | |
|---|---|---|---|
| Arrivals | $T_1$ | $T_1 + T_2$ | $T_1 + T_2 + T_3$ |
| Time required of core | $S_1$ | $S_2$ | $S_3$ |

Figure 11:
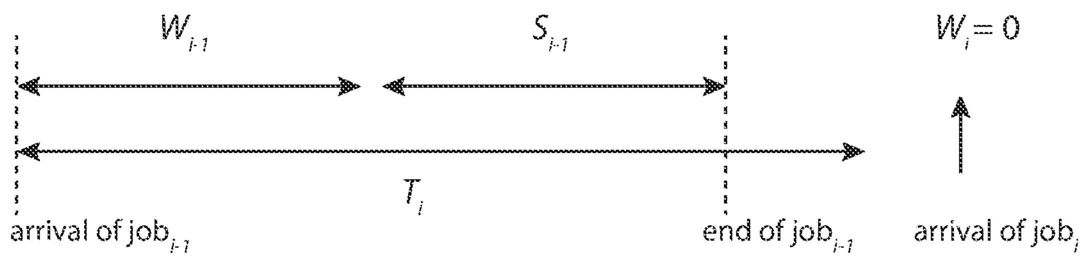
FIG. 11 illustrates a new job arriving after a previous job ends.
Figure 12:
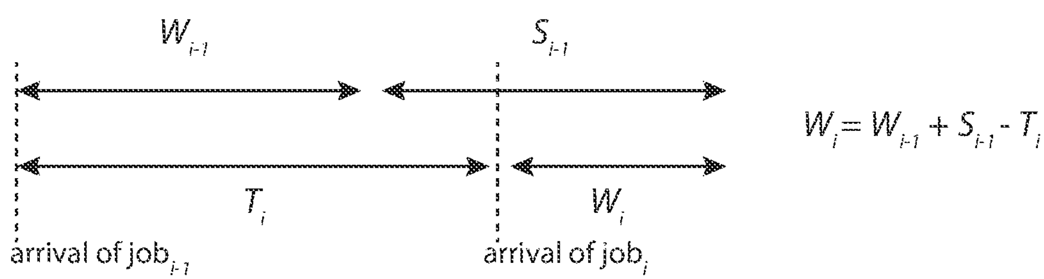
FIG. 12 illustrates a new job arriving before a previous job ends.

In embodiments, the core has the capacity to process a certain number of instructions per second. In some embodiments, $W_i$ is the waiting time of job i, wherein $W_i=\max\{W_{i-1}, +S_{i-1}-T_i, 0\}$. Since the first job arrives when there is no queue, $W_i=0$. For job i, the waiting time depends on how long job i−1 takes. If job i arrives after job i−1 ends, then $W_i=0$. This is illustrated in FIG. 11. In contrast, if job i arrives before the end of job i−1, the waiting time of $W_i$ is the amount of time remaining to finish job i−1. This is illustrated in FIG. 12.

In embodiments, current implementations of SLAM methods and techniques depend on Linux distributions, such as Fedora, Ubuntu, Debian, etc. These are often desktop operating systems that are installed in full or as a subset where the desktop environment is not required. Some implementations further depend on ROS or ROS2 which themselves rely on Linux, Windows, Mac, etc. operating systems to operate. Linux is a general-purpose operating system (GPOS) and is not real time capable. A real-time implementation, as is required for QSLAM, requires scheduling guarantees to ensure deterministic behavior and timely response to events and interrupts. A priority based preemptive scheduling is required to run continuously and preempt lower priority tasks. Embedded Linux versions are at best referred to as "soft real-time", wherein latencies in real-time Linux can be hundreds of microseconds. Real-time Linux requires significant resources just for boot up. For example, a basic system with 200 Million Instructions Per Second (MIPS), a 32-bit processor with a Memory Management Unit (MMU) and 4 MB of ROM, and 16 MB of RAM require a long time to boot up. As a result of depending on such operating systems to perform low level tasks, these implementations may run on CPUs which are designed for full featured desktop computers or smartphones. As an example, Intel x86 has been implemented on an ARM Cortex-A processors. These are in fact laptops and smartphones without a screen. Such implementations are capable of running on Cortex M and Cortex R. While the techniques and methods described herein may run on a Cortex M series MCU, they may also run on an ATMEL SAM 70 providing only a 300 MHz clock rate. Further, in embodiments, the entire binary (i.e., executable) file and storage of the map and NVRAM may be configured within 2 MB of flash provided within the MCU. In embodiments, implementation of the methods and techniques described herein may use FREE RTOS for scheduling. In some embodiments, the methods and techniques described herein may run on bare metal.

Figure 13:
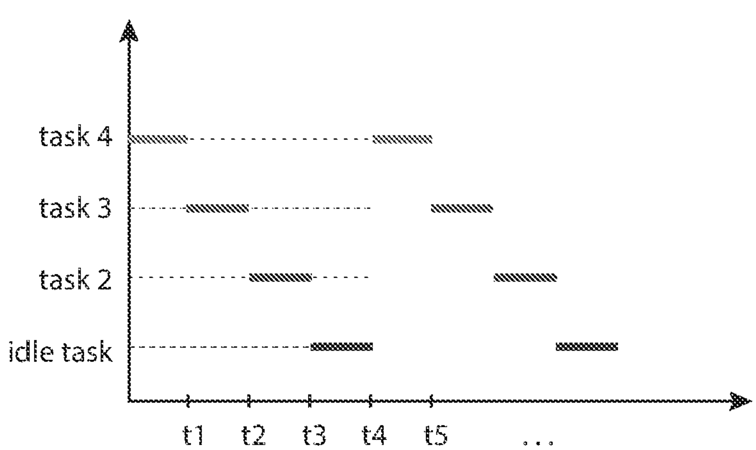
FIG. 13 illustrates an example of a scheduler.

In embodiments, the scheduler decides which tasks are executed and where. In embodiments, the scheduler suspends (i.e., swaps out) and resumes tasks which are sequential pieces of code. FIG. 13 illustrates an example of a scheduler with tasks shown along the y-axis and time along the x-axis. The highest priority task is task 4 and the lowest priority task is the idle task.

In embodiments, real time embedded systems are designed to provide timely response to real world events. These real-world events may have certain deadlines and the scheduling policy must accommodate such needs. This is contrary to a desktop and/or general-purpose OS wherein each task receives a fair share of execution time. Each of the tasks kicked out and brought in experience the exact same context that they saw before being kicked out when brought in again. As such, a task does not know if or when it gets or got kicked out and brought in. While real time computation is sought after in robotic systems, some SLAM implementations in the art compensate the shortcomings of real time computation by using more powerful processors. While high performance CPUs may mask some shortcomings of real time requirements, a need for deterministic computation cannot be fully compensated for by adding performance. Deterministic computation requires providing a correct computation at the required time without failure. In a “hard real time” requirement, missing a deadline is considered a system failure. In a “soft or firm real time” requirement, a deadline has cost. An embedded real time SLAM must be able to schedule fast, be responsive, and operate in real time. The real time QSLAM described herein may run on bare metal, RTOS with either a microKernel or monolithic architecture, FREERTOS, Integrity (from Green Hills software), etc.

Figure 14:
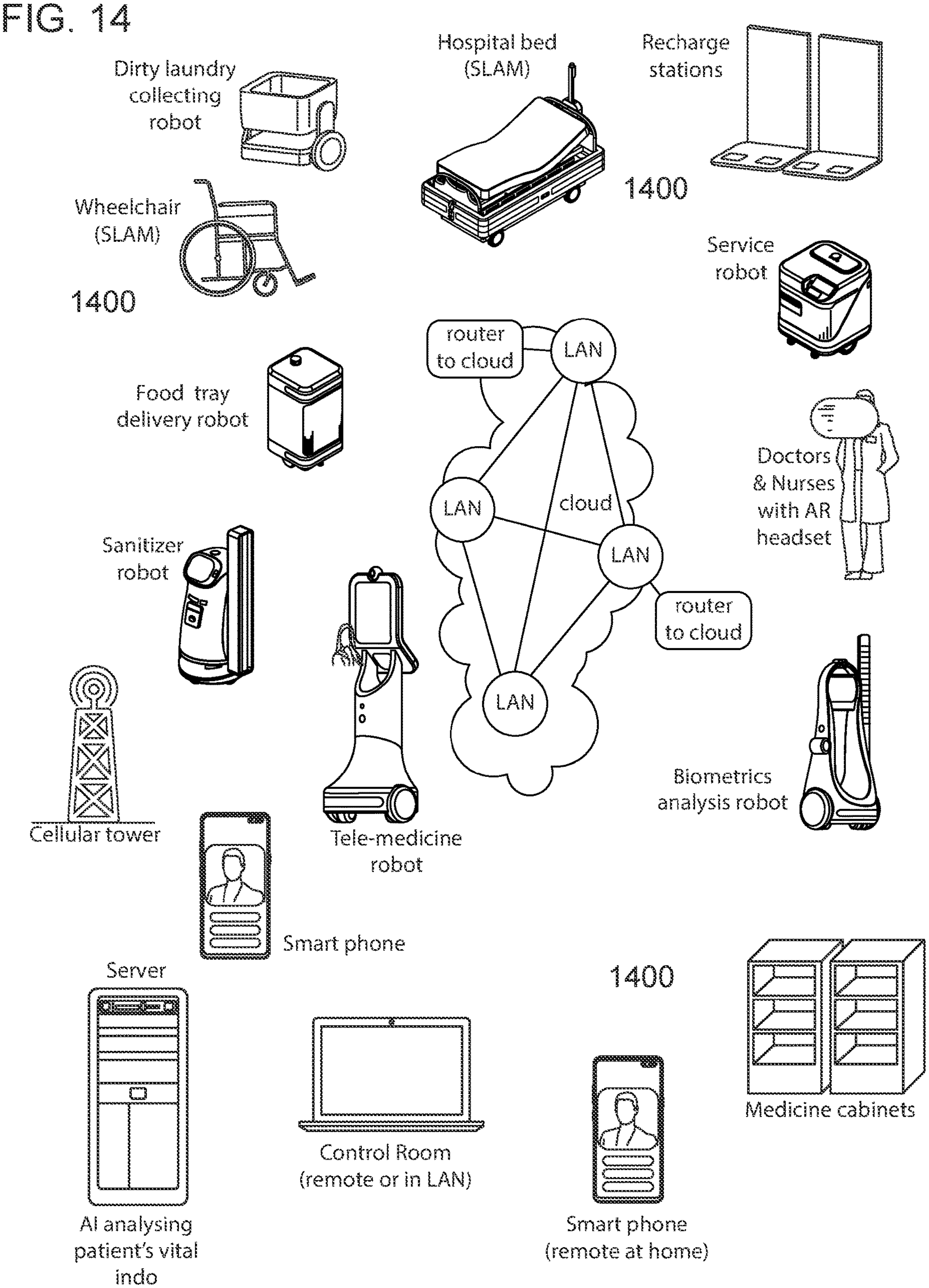
FIG. 14 illustrates various electronics that may take advantage of light weight SLAM

In embodiments, the real time light weight QSLAM may be able to take advantage of advanced multicore systems with either asymmetrical multiprocessing or symmetrical multiprocessing. In embodiments, the real time light weight QSLAM may be able to support virtualization. In embodiments, the real time light weight QSLAM may be able to provide a virtual environment to drives and hardware that have specific requirements and may require other environments. FIG. 14 illustrates various electronics 1400 that may use such advantages of the real time light weight SLAM. FIG. 15 illustrates an example of tasks executed by the MCU of the robot.

Figure 17:
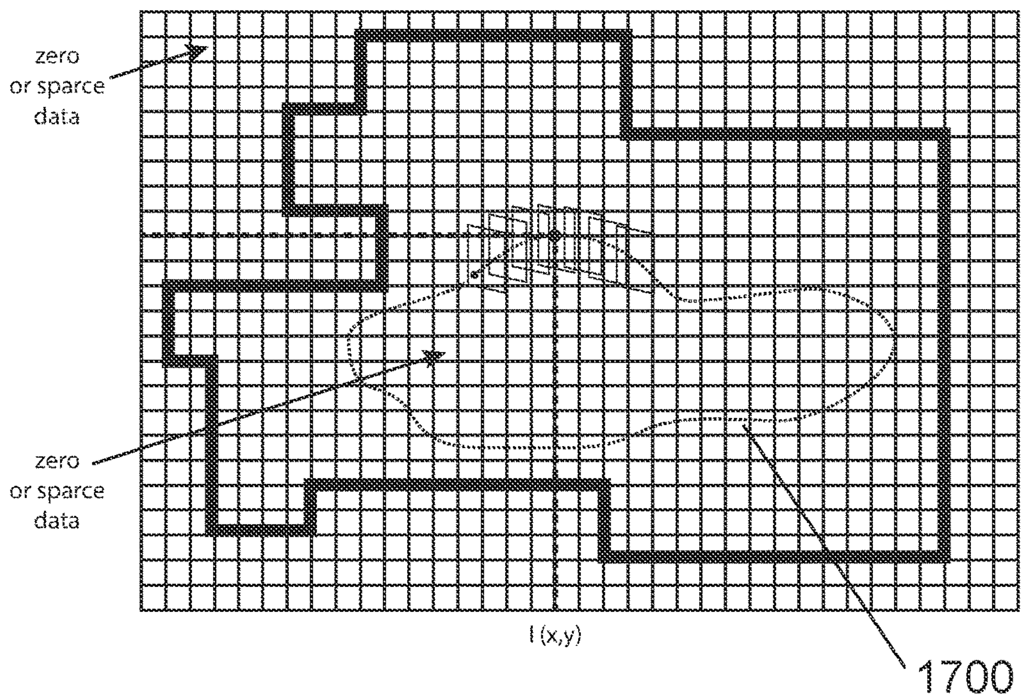
FIG. 17 illustrates an example of a 2D matrix.

In embodiments, the structures that are used in storing and presenting data may influence performance of the system. It may also influence superimposing of coordinates derived from depth and 2D images. For example, in some state of art, 2D images are stored as a function of time or discrete states. In some embodiments of the techniques and methods described herein, 3D images are captured, bundled with a secondary source of data such as IMU data, wheel encoder data, steering wheel angle data, etc. at each interval as the robot moves along a trajectory. For example, FIG. 16A illustrates images 1600 bundled with secondary data 1601 at each time slot ($t_0$, $t_1$, . . . ) along a trajectory 1602 of the robot. This provides a 1D stream of data that comprises a 2D stream of data. FIG. 16B illustrates an example of a 1D stream of data 1603 comprising a 2D stream of images 1604. In cases wherein depth readings are used, the processor of the robot may create a 2D map of a supposed plane of the environment. In embodiments, the plane may be represented by a 2D matrix similar to that of an image. In some embodiments, probability values representing a likelihood of existence of boundaries and obstacles are stored in the matrix, wherein entries of the matrix each correspond with a location on the plane of the environment. In embodiments, a trajectory of the robot along the plane of the environment falls within the 2D matrix. In embodiments, for every location I(x, y) on the plane of the environment, there may be a correlated image I(m, n) captured at respective locations I(x, y). In embodiments, there may be a group of images or no images captured at some location I(x, y). In cases wherein the trajectory of the robot does not encompass all possible states (i.e., in cases other than a coverage task), the representation is sparse and sparse matrices are advantageous for computation purposes. FIG. 17 illustrates an example of a 2D matrix including a trajectory 1700 of the robot and an image I(m, n) correlated with a location I(x, y) from which the image was taken. Structures such as described in the above examples improves performance of the system in terms of computation and processing.

Figure 18:
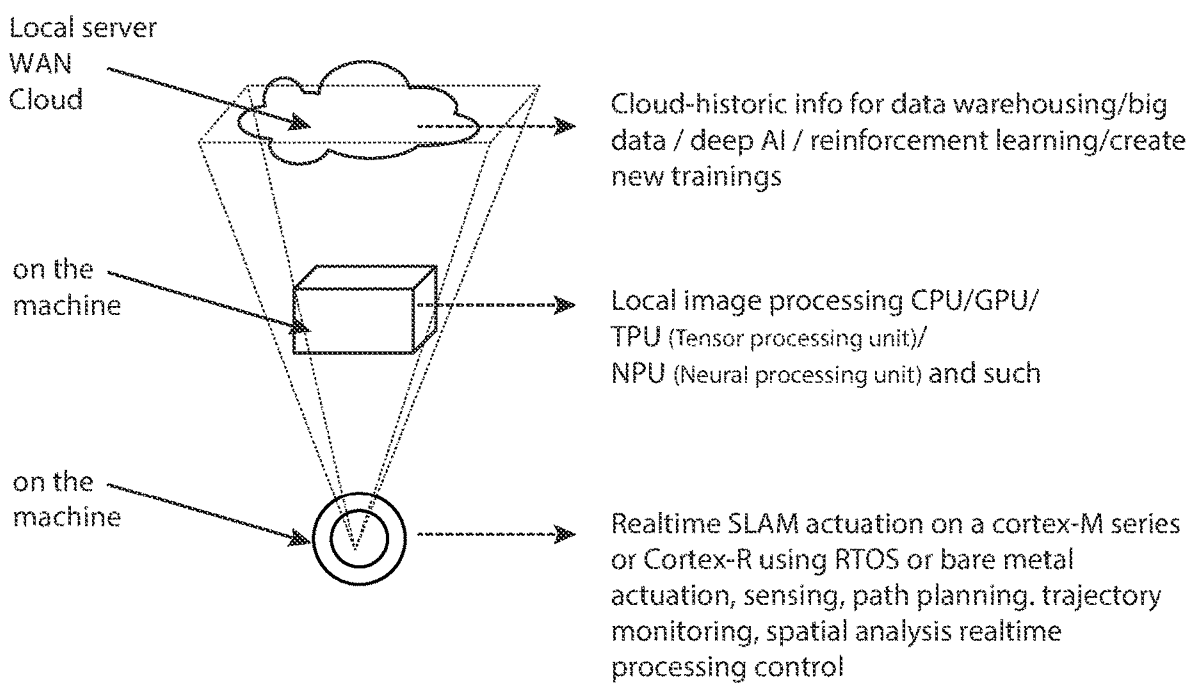
FIG. 18 illustrates an example of different processing levels.

Since a lot of GPUs, TPUs (tensor processing unit), and other hardware are designed with image processing in mind, some embodiments take advantage of the compression, parallelization, etc., offered by such equipment. For example, the processor of the robot may rearrange 3D data into a 1D array of 2D data or may rearrange 4D data into a 2D representation of 2D data. While rearranging, the processor may not have a fixed or rigid method of doing so. In some embodiments, the processor arranges data such that chunks of zeros are created and ordered in a certain manner that forms sparse matrices. In doing so, the processor may divide the data into sub-groups and/or merge the data. In some embodiments, the processor may create a rigid matrix and present variations of the matrix by convolving a minimum, maximum filter to describe a range of possibilities of the rigid matrix. Therefore, in some embodiments, the processor may compress a large set of data into a rigid representation with predictions of variations of the rigid matrix. FIG. 18 illustrates an example of different processing levels, locations in which processing occurs, and tasks executed within a Q SLAM system in real time.

FIG. 19 compares an example of processing levels and tasks executed at the various processing levels for traditional SLAM and QSLAM. In the traditional SLAM method, processes such as LIDAR processing, path planning, and SLAM are executed at the CPU level while in QSLAM all such processes are pushed to the MCU level under the SLAM umbrella, freeing up processing power and resources at CPU level for more comprehensive tasks executed locally on the robot. In embodiments, wherein SLAM is executed on the CPU and the MCU is controlling sensors, actuators, encoders, and PID, a time arrives where it may be required to send signals back and forth between the CPU and MCU.

In contrast to SLAM that is deployed on a same processor that perceives, actuates, and runs the control system, computations and processing are returned with higher agility. In the implementation of QSLAM described herein, a faster speed in reacting to stimuli is achieved. For example, in using an architecture where SLAM is processed on a CPU, it takes four seconds for the robot to increase fan speed upon driving onto carpet. In contrast, a robot using QSLAM only requires 1.8 seconds to increase fan speed upon driving onto carpet. Four seconds is a long reaction time, particularly if a narrow carpet is in the environment, wherein the robot is at risk of missing operation of a high fan speed on the carpet.

Avoiding bits without much information or with useless information is also important in data transmission (e.g., over a network) and data processing. For example, during relocalization a camera of the robot may capture local images and the processor may attempt to locate the robot within the state-space by searching the known map to find a pattern similar to its current observation. As the processor tries to match various possibilities within the state space, and as possibilities are ruled out from matching with the current observation, the information value of the remaining states increases. In another example, a linear search may be executed using an algorithm to search from a given element within an array of n elements. Each state space containing a series of observations may be labeled with a number, resulting in array={100001, 101001, 110001, 101000, 100010, 10001, 10001001, 10001001, 100001010, 100001011}. The algorithm may search for the observation 100001010, which in this case is the ninth element in the array, denoted as index 8 in most software languages such as C or C++. The algorithm may begin from the leftmost element of the array and compare the observation with each element of the array. When the observation matches with an element, the algorithm may return the index. If the observation doesn't match with any elements of the array the algorithm may return a value of −1. As the algorithm iterates through indexes of the array, that value of each iteration progressively increases as there is a higher probability that the iteration will yield a search result. For the last index of the array, the search may be deterministic and return the result of the observed state not being existent within the array. In various searches the value of information may decrease and increase differently. For example, in a binary search, an algorithm may search a sorted array by repeatedly dividing the search interval in half. The algorithm may begin with an interval including the entire array. If the value of the search key is less than the element in the middle of the interval, the algorithm may narrow the interval to the lower half. Otherwise, the algorithm may narrow the interval to the upper half. The algorithm may continue to iterate until the value is found or the interval is empty. In some cases, an exponential search may be used, wherein an algorithm may find a range of the array within which the element may be present and execute a binary search within the found range. In one example, an interpolation search may be used, as in some instances it may be an improvement over a binary search. In an interpolation search the values in a sorted array are uniformly distributed. In binary search the search is always directed to the middle element of the array whereas in an interpolation search the search may be directed to different sections of the array based on the value of the search key. For instance, if the value of the search key is close to the value of the last element of the array, the interpolation search may be likely to start searching the elements contained within the end section of the array. In some cases, a Fibonacci search may be used, wherein the comparison-based technique may use Fibonacci numbers to search an element within a sorted array. In a Fibonacci search an array may be divided in unequal parts, whereas in a binary search the division operator may be used to divide the range of the array within which the search is performed. A Fibonacci search may be advantageous as the division operator is not used, but rather addition and subtraction operators, and the division operator may be costly on some CPUs. A Fibonacci search may also be useful when a large array cannot fit within the CPU cache or RAM as the search examines elements positioned relatively close to one another in subsequent steps. An algorithm may execute a Fibonacci search by finding the smallest Fibonacci number m that is greater than or equal to the length of the array. The algorithm may then use m−2 Fibonacci number as the index i and compare the value of the index i of the array with the search key. If the value of the search key matches the value of the index i, the algorithm may return i. If the value of the search key is greater than the value of the index i, the algorithm may repeat the search for the subarray after the index i. If the value of the search key is less than the value of the index i, the algorithm may repeat the search for the subarray before the index i.

The rate at which the value of a subsequent search iteration increases or decreases may be different for different types of search techniques. For example, a search that may eliminate half of the possibilities that may match the search key in a current iteration may increases the value of the next search iteration much more than if the current iteration only eliminated one possibility that may match the search key. In some embodiments, the processor may use combinatorial optimization to find an optimal object from a finite set of objects as in some cases exhaustive search algorithms may not be tractable. A combinatorial optimization problem may be a quadruple including a set of instances I, a finite set of feasible solutions $f(x)$ given an instance $x \in I$, a measure $m(x, y)$ of a feasible solution y of x given the instance x, and a goal function g (either a min or max). The processor may find an optimal feasible solution y for some instance x using $m(x, y)=g\{m(x, y')|y' \in f(x)\}$. There may be a corresponding decision problem for each combinatorial optimization problem that may determine if there is a feasible solution from some particular measure m. For example, a combinatorial optimization problem may find a path with the fewest edges from vertex u to vertex v of a graph G. The answer may be six edges. A corresponding decision problem may inquire if there is a path from u to v that uses fewer than either edges and the answer may be given by yes or no. In some embodiments, the processor may use nondeterministic polynomial time optimization (NP-optimization), similar to combinatorial optimization but with additional conditions, wherein the size of every feasible solution $y \in f(x)$ is polynomially bounded in the size of the given instance x, the languages $\{x|x \in I\}$ and $\{(x, y)|y \in f(x)\}$ are recognized in polynomial time, and m is polynomial-time computed. In embodiments, the polynomials are functions of the size of the respective functions' inputs and the corresponding decision problem is in NP. In embodiments, NP may be the class of decision problems that may be solved in polynomial time by a non-deterministic Turing machine. With NP-optimization, optimization problems for which the decision problem is NP-complete may be desirable. In embodiments, NP-complete may be the intersection of NP and NP-hard, wherein NP-hard may be the class of decision problems to which all problem in NP may be reduced to in polynomial time by a deterministic Turing machine. In embodiments, hardness relations may be with respect to some reduction. In some cases, reductions that preserve approximation in some respect, such as L-reduction, may be preferred over usual Turing and Karp reductions.

In some embodiments, the processor may increase the value of information by eliminating blank spaces. In some embodiments, the processor may use coordinate compression to eliminate gaps or blank spaces. This may be important when using coordinates as indices into an array as entries may be wasted space when blank or empty. For example, a grid of squares may include H horizontal rows and V vertical columns and each square may be given by the index (i, j) representing row and column, respectively. A corresponding H×W matrix may provide the color of each square, wherein a value of zero indicates the square is white and a value of one indicates the square is black. To eliminate all rows and columns that only consist of white squares, assuming they provide no valuable information, the processor may iteratively choose any row or column consisting of only white squares, remove the row or column and delete the space between the rows or columns. In another example, a large N×N grid of squares can each either be traversed or is blocked. The N×N grid includes M obstacles, each shaped as a 1×k or k×1 strip of grid squares and each obstacle is specified by two endpoints ($a_i$, $b_i$) and ($c_i$, $d_i$), wherein $a_i=c_i$ or $b_i=d_i$. A square that is traversable may have a value of zero while a square blocked by an obstacle may have a value of one. Assuming that N=10' and M=100, the processor may determine how many squares are reachable from a starting square (x, y) without traversing obstacles by compressing the grid. Most rows are duplicates and the only time a row R differs from a next row R+1 is if an obstacle starts or ends on the row R or R+1. This only occurs ~100 times as there are only 100 obstacles. The processor may therefore identify the rows in which an obstacle starts or ends and given that all other rows are duplicates of these rows, the processor may compress the grid down to ~100 rows. The processor may apply the same approach for columns C, such that the grid may be compressed down to ~100×100. The processor may then run a breadth-first search (BFS) and expand the grid again to obtain the answer. In the case where the rows of interest are 0 (top), R−1 (bottom), $a_i-1$, $a_i$, $a_i+1$ (rows around obstacle start), and $c_i-1$, $c_i$, $c_i+1$ (rows around obstacle end), there may be at most 602 identified rows. The processor may sort the identified rows from low to high and remove the gaps to compress the grid. For each of the identified rows the processor may record the size of the gap below the row, as it is the number of rows it represents, which is needed to later expand the grid again and obtain an answer. The same process may be repeated for columns C to achieve a compressed grid with maximum size of 602×602. The processor may execute a BFS on the compressed grid. Each visited square (R, C) counts R×C times. The processor may determine the number of squares that are reachable by adding up the value for each cell reached. In another example, the processor may find the volume of the union of N axis-aligned boxes in three dimensions (1≤N≤100). Coordinates may be arbitrary real numbers between 0 and 10'. The processor may compress the coordinates, resulting in all coordinates lying between 0 and 199 as each box has two coordinated along each dimension. In the compressed coordinate system, the unit cube [x, x+1]x[y, y+1]×[z, z+1] may be either completely full or empty as the coordinates of each box are integers. Therefore, the processor may determine a 200×200×200 array, wherein an entry is one if the corresponding unit cube is full and zero if the unit cube is empty. The processor may determine the array by forming the difference array then integrating. The processor may then iterate through each filled cube, map it back to the original coordinates, and add its volume to the total volume. Other methods than those provided in the examples herein may be used to remove gaps or blank spaces.

In some embodiments, the processor may use run-length encoding (RLE), a form of lossless data compression, to store runs of data (consecutive data elements with the same data value) as a single data value and count instead of the original run. For example, an image containing only black and white may have many long runs of white pixels and many short runs of black pixels. A single row in the image may include 67 characters, each of the characters having a value of 0 or 1 to represent either a white or black pixel. However, using RLE the single row of 67 characters may be represented by 12W1B12W3B24W1B14 W, only 18 characters which may be interpreted as a sequence of 12 white pixels, 1 black pixel, 12 white pixels, 3 black pixels, 24 white pixels, 1 black pixel, and 14 white pixels. In embodiments, RLE may be expressed in various ways depending on the data properties and compression algorithms used.

In some embodiments, the processor executes compression algorithms to compress video data across pixels within a frame of the video data and across sequential frames of the video data. In embodiments, compression of the video data saves on bandwidth for transmission over a communications network (e.g., Internet) and on storage space (e.g., at data center storage, on a hard disk, etc.). In embodiments, compression algorithms may be used in hardware and/or a graphical processing unit (GPU) or other secondary processing unit-based decompression to free up a primary processing unit for other tasks. In some embodiments, the processor may, at minimum, encode a color video with 1 byte (8 bits) per color (red, green, and blue) per pixel per frame of the video. To achieve higher quality, more bytes, such as 2 bytes, 4 bytes, and 8 bytes, may be used instead of 1 byte.

A relatively short video stream with 480×200 pixel resolution per frame, for example, requires a lot of data. In some cases, this magnitude of storage may be excessive, especially in an application such as an autonomous robot or a self-driving car. For self-driving cars, for example, each car may have multiple cameras recording and sending streams of data in real time. Multiple self-driving cars driving on a same highway may each be sending multiple streams of data. However, the environment observed by each self-driving car is the same, the only difference between their streams of data being their own location within the environment. When data from their cameras are stitched at overlapping points, a universal frame of the environment within which each car moves is created. However, the overlapping pixels in the universal frame of the environment are redundant. A universal map (comprising stitched data from cameras of all the self-driving cars) at each instance of time may serve a same purpose as multiple individual maps with likely smaller FOV. A universal map with a bigger FOV may be more useful in many ways. In some embodiments, a processor may refactor the universal map at any time to extract the FOV of a particular or all self-driving cars to almost a same extent. In some embodiments, a log of discrepancies may be recorded for use when absolute reconstruct is necessary. In some embodiments, compression is achieved when the universal map is created in advance for all instances of time and the localization of each car within the universal map is traced using time stamps.

In some embodiments, the methods described above may be used as complementary to individual maps and/or for archiving information (e.g., for legal purposes). Storage space is important as self-driving cars need to store data to, for example, train their algorithms, investigate prior bugs or behaviors, and for legal purposes. In some embodiments, compression algorithms may be more freely used. For example, video pixels may be encoded 2 bits per pixel per color or 4 bits per pixel per color. In some embodiments, a video that is in red, green, blue (RGB) format may be converted to a video in a different format, such as YCoCg color space format. In some embodiments, an RGB color space format is transformed into a luma value (Y), a chrominance green value (Cg), and a chominance orange value (Co). In embodiments, matrix manipulation of an RGB matrix obtains YCoCg matrix. The transformation may have good coding gain and may be losslessly converted to and from RGB with fewer bits than are required with other color space formats. Video and image compression designs such as H.264/MPEG-4 AVC, HEVC, JPEG XR, and Dirac support YCoCg color space format. Compression in the context of other formats such as YCbCr, YCoCg-R, YCC, YUV, etc. may also be used. In some embodiments, after pixels of a video are converted to new color space format and resolution is compressed, the video may be compressed further by using the resolution compressed pixel data such that it spans across multiple frames of the video. For instance, each of the Y (uncompressed), Co (resolution compressed), and Cg (resolution compressed) data for the video may be arranged as triplets across frames of the video. In some embodiments, texture compression may also be used (e.g., Ericson Texture Compression 1 (ETC1) and/or Ericson Texture Compression 2 (ETC2)). Such compression algorithms may be performed on hardware, such as on graphical processing units (GPUs) that are optimized for the ETC algorithms. In some embodiments, texture compressed data may be concatenated with one other.

In implementing such compression methods, compressed videos may be more efficiently stored for indoor use cases (e.g., home service robotic devices), particularly on client devices, such as smartphones that have limited storage capacity and/or memory. Additionally, the compressed video may be transported via a network (e.g., Internet) using a reduced bandwidth to transmit the compressed video. In some embodiments, asymmetric compression may be used. Asymmetric compression, while lossy, may result in a relatively high quality compressed video. For example, the luminance (Y data) of the video, are generally more important in keeping an image structure. Therefore, the processor may not compress luminance or may not compress luminance as much as the other color data (Co data, Cg data). In such a case, the data losses from the video compression do not result in degradation of quality in a linear manner. As such, the perception of low quality is reduced a lot less than the data required to store or transport the data. In embodiments, compression and decompression algorithms may be performed on the robot, on the cloud, or on another device such as a smart phone.

In some embodiments, the processor uses atomicity, consistency, isolation and durability (ACID) for various purposes such as maintaining the integrity of information in the system or for preventing a new software update from having a negative impact on consistency of the previously gathered data. For example, ACID may be used to keep information relating to a fleet of robots in an IOT based backend database. In using ACID, an entire transaction will not proceed if any particular aspect of the transaction fails and the system returns to its previous state (i.e., performs a rollback). FIG. 20 illustrates an example stored information relating to a fleet of robots. The database may use Create, Read, Update, Delete (CRUD) processes.

Throughout all processes executed on the robotic device, on external devices, or on the cloud, security of data is of utmost importance. Security of the data at rest (e.g., data stored in a data center or other storage medium), data in transit (e.g., data moving back forth between the robotic device system and the cloud) as well as data in use (e.g., data currently being processed) is necessary. Confidentiality, integrity, and availability (CIA) must be protected in all states of data (i.e., data at rest, in transit, and in use). In some embodiments, a fully secured memory controller and processor is used to enclave the processor environment with encryption. In some embodiments, a secure crypto-processor such as a CPU, a MCU, or a processor that executes processing of data in an embedded secure system is used. In some embodiments, a hardware security module (HSM) including one or more crypto-processors and a fully secured memory controller may be used. The HSM keeps processing secure as keys are not revealed and/or instructions are executed on the bus such that the instructions are never in readable text. A secure chip may be included in the HSM along with other processors and memory chips to physically hide the secure chip among the other chips of the HSM. In some embodiments, crypto-shredding may be used, wherein encryption keys are overwritten and destroyed. In some embodiments, users may use their own encryption software/architecture/tools and manage their own encryption keys.

In some embodiments, some data, such as old data or obsolete data, may be discarded. For instance, observation data of a home that has been renovated may be obsolete or some data may be too redundant to be useful and may be discarded. In some embodiments, data collected and/or used within the past 90 days is kept intact. In some embodiments, data collected and/or used more than two years ago may be discarded. In some embodiments, the data collected and/or used more than 90 days ago but before two years ago that does not show statistically significant difference from their counterparts may be discarded. In some embodiments, auto-encoders with a linear activation and a cost function (e.g., mean squared error) may be used to reconstruct data.

In embodiments, the processor executes deep learning to improve perception, improve trajectory such that it follows the planned path, improve coverage, improve obstacle detection and prevention, make decisions that are more human-like, and to improve operation of the robot in situations where data becomes unavailable (e.g., due to a malfunctioning sensor).

In embodiments, the actions performed by the processor as described herein may comprise the processor executing an algorithm that effectuates the actions performed by the processor. In embodiments, the processor may be a processor of a microcontroller unit.

While three-dimensional data have been provided in examples, there may be several more dimensions. For example, there may be (x, y, z) coordinates of the map, orientation, number of bumps corresponding with each coordinate of the map, stuck situations, inflation size of objects, etc. In some embodiments, the processor combines related dimensions into a vector. For example, vector $v=(x, y, z, \theta)$ representing coordinates and orientation. In some embodiments, the processor uses a Convolutional Neural Network (CNN) to process such large amounts of data. CNNs are useful as spaces of a network are connected between different layers. The development of CNNs is based on brain vision function, wherein most neurons in the visual cortex react to only a limited part of the field that is observable. The neurons each focus on a part of the FOV, however, there may be some overlap in the focus of each neuron. Some neurons have larger receptive fields and some neurons react to more complex patterns in comparison to other neurons. FIG. 21 illustrates an example of two layers, 2100 and 2101, of a CNN. To maintain the height and width of a previous layer, zero padding is used, wherein empty spaces are set as zero. While the layers shown are connected with flat layers in parallel to one another, it is unnecessary that the distance between cells 2103 in each layer 2100 and 2101 is the same in every region. When a kernel is applied to an input layer of the CNN, it convolves the input layer with its own weight and sends the output result to the next layer. In the context of image processing, for example, this may be viewed as a filter, wherein the convolution kernel filters the image based on its own weight. For instance, a kernel may be applied to an image to enhance a vertical line in the image.

In embodiments, a kernel may consist of multiple layers of feature maps, each designed to detect a different feature. All neurons in a single feature map share the same parameters and allow the network to recognize a feature pattern regardless of where the feature pattern is within the input. This is important for object detection. For example, once the network learns that an object positioned in a dwelling is a chair, the network will be able to recognize the chair regardless of where the chair is located in the future. For a house having a particular set of elements, such as furniture, people, objects, etc., the elements remain the same but may move positions within the house. Despite the position of elements within the house, the network recognizes the elements. In a CNN, the kernel is applied to every position of the input such that once a set of parameters is learned it may be applied throughout without affecting the time taken because it is all done in parallel (i.e., one layer).

In some embodiments, the processor implements pooling layers to sample the input layer and create a subset layer. Each neuron in a pooling layer is connected to outputs of some of the neurons in the adjacent layers. In each layer, there may exist several stages of processing. For example, in a first stage, convolutions are executed in parallel and a set of linear activations (i.e., affine transform) are produced. In a second stage, each linear activation goes through a non-linear activation (i.e., rectified linear). In a third stage, pooling occurs. Pooling over spatial regions may be useful with invariance to translation. This may be helpful when the objective is to determine if a feature is present rather than finding exactly where the feature is.

The architecture of a CNN is defined by how the stacking of convolutional layers (each commonly followed by a ReLu) and the pooling layer are organized. A typical CNN architecture includes a series of convolution, ReLu, pooling, convolution, ReLu, pooling, convolution, ReLu, pooling, and so on. Particular architectures are created for different applications. Some architectures may be more effective than others for a particular application. For example, a Residual Network developed by Kaiming He et al. in "*Deep Residual Learning for Image Recognition*", 2015, uses 152 layers and short cut connections. The signal feeding into a layer is also added to the output of a layer located above in the stack architecture. Going as deep as 152 layers, for example, raises the challenge of computational cost and accommodating real time applications. For indoor robotics and robotic vehicles (e.g., electric or self-driving vehicles), a portion of the computations may be performed on the robotic device and as well as on the cloud. Achieving small memory usage and a low processing footprint is important. Some features on the cloud permit for seamless code execution on the endpoint device as well as on the cloud. In such a setup, a portion of the code is seamlessly executed on the robotic device as well as on the cloud.

In embodiments, a CNN uses less training data in comparison to a DNN as layers are partially connected to each other and weights are reused, resulting in fewer parameters. Therefore, the risk of overfitting is reduced and training is faster. Additionally, once a CNN learns a kernel that detects a feature in a particular location, the CNN can detect the feature in any location on an image. This is advantageous to a DNN, wherein a feature can only be detected in a particular location. In a CNN, lower layers identify features in small areas of the image while higher layers combine the lower-level identified features to identify higher-level features.

In some embodiments, the processor uses an autoencoder to train a classifier. In some embodiments, unlabeled data is gathered. In some embodiments, the processor trains a deep autoencoder using data including labelled and unlabeled data. Then, the processor trains the classifier using a portion of that data, after which the processor then trains the classifier using only the labelled data. The processor cannot put each of these data sets in one layer and freeze the reused layers. This generative model regenerates outputs that are reasonably close to training data.

In embodiments, DNN and CNN are advantageous as there are several different tools that may be used to a necessary degree. In embodiments, the activation functions of a network determine which tools are used and which aren't based on backpropagation and training of the network. In embodiments, a set of soft constraints may be adjusted to achieve the desired results. DNN tweaking amounts to capturing a good dataset that is diverse, meaningful, and large enough; training the DNN well; and encompassing activities included but not limited to creative use of initialization techniques; activation functions (ELU, ReLU, leaky ReLu, tanh, logistic, softmax, etc.); normalization; regularization; optimizer; learning rate scheduling; augmenting the dataset by artificially and skillfully linearly and angularly transposing objects in an image; adding various light to portions of the image (e.g., exposing the object in the image to a spot light); and adding/reducing contrast, hue, saturation, color and temperature of the object in the image and/or the environment of the object (e.g., exposing the object and/or the environment to different light temperatures such as artificially adjusting an image that was taken in daylight to appear as if it was captured at night, in fluorescent light, at dawn, or in a candle lit room). For example, proper weight initialization may break symmetries or advantageously choosing ELU or ReLu where negative values or those close to a value of zero are important or using leaky ReLu to advantageously increase performance for a more real-time experience or use of sparsification technique by selecting FTRL over Adam optimization.

FIG. 22A illustrates an example of a neural network. A first layer receives input. A second layer extracts extreme low level features by detecting changes in pixel intensity and entropy. A third layer extracts low level features using techniques such as Fourier descriptors, edge detection techniques, corner detection techniques, Faber-Schauder, Franklin, Haar, surf, MSER, fast, Harris, Shi-Tomasi, Harris-Laplacian, Harris-Affine, etc. A fourth layer applies machine learning techniques such as nearest neighbour and other clustering and homography. Further layers in between detect high level features and a last layer matches labels. For example, the last layer may output a name of a person corresponding with observation of a face, an age of the person, a location of the person, a feeling of the person (e.g., hungry, angry, happy, tired, etc.), etc. In cases wherein there is a single node in each layer, the problem reduces to traditional cascading machine learning. In cases wherein there is a single layer with a single node, the problem reduces to traditional atomic machine learning. FIG. 22B illustrates an example of a neural network used for speech recognition. Sensor data is provided to the input layer. The second layer extracts extreme low level features such as lip shapes and letter extraction based on the lip shapes 2200 corresponding to different letters. The third layer extract low level features such as facial expressions. Other layers in between extract high level features and the last layer outputs the recognized speech.

In some embodiments, the processor uses various techniques to solve problems at different stages of training a neural network. A person skilled in the art may choose particular techniques based on the architecture to achieve the best results. For example, to overcome the problem of exploding gradients, the processor may clip the gradients such that they do not exceed a certain threshold. In some embodiments, for some applications, the processor freezes the lower layer weights by excluding variables that below to the lower layers from the optimizer and the output of the frozen layers may then be cached. In some embodiments, the processor may use Nesterov Accelerated Gradient to measure the gradient of the cost function a little ahead in the direction of momentum. In some embodiments, the processor may use adaptive learning rate optimization methods such as AdaGrad, RMSProp, Adam, etc. to help converge to optimum faster without much hovering around it.

In some embodiments, data may be stationary (i.e., time dependent). For instance, data that may be stored in a database or data warehouse from previous work sessions of a fleet of robots operating in different parts of the world. In some embodiments, an H-tree may be used, wherein a root node is split into leaf nodes. FIG. 23 illustrates an example of an H-tree including a root node split into three leaf nodes. As new instantiations of classes are received, the tree may keep track of the categories and classes.

In some embodiments, time dependent data may include certain attributes. For instance, all data may not be collected before a classification tree is generated; all data may not be available for revisiting spontaneously; previously unseen data may not be classified; all data is real-time data; data assigned to a node may be reassigned to an alternate node; and/or nodes may be merged and/or split.

In some embodiments, the processor uses heuristics or constructive heuristics in searching for an optimum value over a finite set of possibilities. In some embodiments, the processor ascends or descends the gradient to find the optimum value. However, accuracy of such approaches may be affected by local optima. Therefore, in some embodiments, the processor may use simulated annealing or tabu search to find the optimum value.

In some embodiments, a neural network algorithm of a feed forward system may include a composite of multiple logistic regression. In such embodiments, the feed forward system may be a network in a graph including nodes and links connecting the nodes organized in a hierarchy of layers. In some embodiments, nodes in the same layer may not be connected to one other. In embodiments, there may be a high number of layers in the network (i.e., deep network) or there may be a low number of layers (i.e., shallow network). In embodiments, the output layer may be the final logistic regression that receives a set of previous logistic regression outputs as an input and combines them into a result. In embodiments, every logistic regression may be connected to other logistic regressions with a weight. In embodiments, every connection between node j in layer k and node m in layer n may have a weight denoted by $w^{kn}$. In embodiments, the weight may determine the amount of influence the output from a logistic regression has on the next connected logistic regression and ultimately on the final logistic regression in the final output layer.

In some embodiments, the network may be represented by a matrix, such as an m×n matrix $$[a_{11} \cdots a_{1n} \vdots \ddots \vdots a_{m1} \cdots a_{mn}].$$

In some embodiments, the weights of the network may be represented by a weight matrix. For instance, a weight matrix connecting two layers may be given by $[w_{11}(=0.1)\ w_{12}(=0.2)\ w_{13}(=0.3)\ w_{21}(=1)\ w_{22}(=2)\ w_{23}(=3)]$. In embodiments, inputs into the network may be represented as a set $x=(x_1, x_2, \ldots, x_n)$ organized in a row vector or a column vector $x=(x_1, x_2, \ldots, x_n)^T$. In some embodiments, the vector x may be fed into the network as an input resulting in an output vector y, wherein $f_i$, $f_h$, $f_o$ may be functions calculated at each layer. In some embodiments, the output vector may be given by $y=f_o(f_h(f_i(x)))$. In some embodiments, the knobs of weights and biases of the network may be tweaked through training using backpropagation. In some embodiments, training data may be fed into the network and the error of the output may be measured while classifying. Based on the error, the weight knobs may be continuously modified to reduce the error until the error is acceptable or below some amount. In some embodiments, backpropagation of errors may be determined using gradient descent, wherein $w_{updated}=w_{old}-\eta\nabla E$, w is the weight, η is the learning rate, and E is the cost function.

In some embodiments, the $L_2$ norm of the vector $x=(x_1, x_2, \ldots, x_n)$ may be determined using $L_2(x)=\sqrt{(x_1+x_2, \ldots +x_n)}=\|x\|_2$. In some embodiments, the $L_2$ norm of weights may be provided by $\|w\|_2$. In some embodiments, an improved error function $E_{improved}=E_{original}+\|w\|_2$ may be used to determine the error of the network. In some embodiments, the additional term added to the error function may be an $L_2$ regularization. In some embodiments, $L_1$ regularization may be used in addition to $L_2$ regularization. In some embodiments, $L_2$ regularization may be useful in reducing the square of the weights while $L_1$ focuses on absolute values.

In some embodiments, the processor may flatten images (i.e., two dimensional arrays) into image vectors. In some embodiments, the processor may provide an image vector to a logistic regression. FIG. 24 illustrates an example of flattening a two dimensional image array 2400 into an image vector 2401 to obtain a stream of pixels. In some embodiments, the elements of the image vector may be provided to the network of nodes that perform logistic regression at each different network layer. For example, FIG. 25 illustrates the values of elements of vector array 2500 provided as inputs A, B, C, D, . . . into the first layer of the network 2501 of nodes that perform logistic regression. The first layer of the network 2501 may output updated values for A, B, C, D, . . . which may then be fed to the second layer of the network 2502 of nodes that perform logistic regression. The same processor continues, until A, B, C, D, . . . are fed into the last layer of the network 2503 of nodes that perform the final logistic regression and provide the final result 2504.

In some embodiments, the logistic regression may be performed by activation functions of nodes. In some embodiments, the activation function of a node may be denoted by S and may define the output of the node given a set of inputs. In embodiments, the activation function may be a sigmoid, logistic, or a Rectified Linear Unit (ReLU) function. For example, a ReLU of x is the maximal value of 0 and x, $\rho(x)=\max(0, x)$, wherein 0 is returned if the input is negative, otherwise the raw input is returned. In some embodiments, multiple layers of the network may perform different actions. For example, the network may include a convolutional layer, a max-pooling layer, a flattening layer, and a fully connected layer. FIG. 26 illustrates a three layer network, wherein each layer may perform different functions. The input may be provided to the first layer, which may perform functions and pass the outputs of the first layer as inputs into the second layer. The second layer may perform different functions and pass the output as inputs into the second and the third (i.e., final) layer. The third layer may perform different functions, pass an output as input into the first layer, and provide the final output.

In some embodiments, the processor may convolve two functions g(x) and h(x). In some embodiments, the Fourier spectra of g(x) and h(x) may be G(ω) and H(ω), respectively. In some embodiments, the Fourier transform of the linear convolution g(x)*h(x) may be the pointwise product of the individual Fourier transforms G(ω) and H(ω), wherein $g(x)*h(x)\rightarrow G(\omega)\cdot H(\omega)$ and $g(x)\cdot h(x)\rightarrow G(\omega)*H(\omega)$. In some embodiments, sampling a continuous function may affect the frequency spectrum of the resulting discretized signal. In some embodiments, the original continuous signal g(x) may be multiplied by the comb function III(x). In some embodiments, the function value g(x) may only be transferred to the resulting function $g^{-}(x)$ at integral positions $x=x_i \in Z$ and ignored for all non-integer positions. FIG. 27A illustrates an example of a continuous complex function g(x). FIG. 27B illustrates the comb function III(x). FIG. 27C illustrates the result of multiplying the function g(x) with the comb function III(x). In some embodiments, the original wave illustrated in FIG. 27A may be found from the result in FIG. 27C. Both waves in FIGS. 27A and 27C are identical. In some embodiments, the matrix Z may represent a feature of an image, such as illumination of pixels of the image. FIG. 28 illustrates illumination of a point 2800 on an object 2801, the light passes through the lens 2802, resulting in image 2803. A matrix 2804 may be used to represent the illumination of each pixel in the image 2803, wherein each entry corresponds to a pixel in the image 2803. For instance, point 2800 corresponds with pixel 2805 of image 2803 which corresponds with entry 2806 of the matrix 2804.

Based on theorems proven by Kolmogorov and some others, any continuous function (or more interestingly posterior probability) may be approximated by a three-layer network if a sufficient number of cells are used in the hidden layer. According to Kolmogorov $g(x)=\Sigma_{j=1}^{2n+1}\ \Xi_j$ and $\Phi_{ij}$ $(\Sigma_{i=1}^{d}\ \Phi_{ij}(x_i))$, given $\Xi_j$ and $\Phi_{ij}$ functions are created properly. Each single hidden cell (j=1 to 2n+1) receives an input comprising a sum of non-linear functions (from i=1 to i=d) and outputs Ξ, a non-linear function of all its inputs. In some embodiments, the processor provides various training set patterns to a network (i.e., network algorithm) and the network adjusts network knobs (or otherwise parameters) such that when a new and previously unseen input is provided to the network, the output is close to the desired teachings. In embodiments, the training set comprises patterns with known classes and is used by the processor to train the network in classification. In some embodiments, an untrained network receives a training pattern that is routed through the network and determines an output at a class layer of the network. The output values produced are compared with desired outputs that are known to belong to the particular class. In some embodiments, differences between the outputs from the network and the desired outputs are defined as errors. In embodiments, the error is a function of weights of network knobs and the network minimizes the function to reduce the error by adjusting the weights. In some embodiments, the network uses backpropagation and assigns weights randomly or based on intelligent reasoning and adjusts the weights in a direction that results in a reduction of the error using methods such as gradient descent. In embodiments, at the beginning of the training process, weights are adjusted in larger increments and in smaller increments near the end of the training processor. This is known as the learning rate.

In embodiments, the training set may be provided to the network as a batch or serially with random (i.e., stochastic) selection. The training set may also be provided to the network with a unique and non-repetitive training set (online) and/or over several passes. After training the network, the processor provides a validation set of patterns (e.g., a portion of the training set that is kept aside for the validation set) to the network and determines how well the network performs in classifying the validation set. In some embodiments, first order or second order derivatives of sum squared error criterion function, methods such as Newton's method (using a Taylor series to describe change in the criterion function), conjugate gradient descent, etc. may be used in training the network. In embodiments, the network may be a feed forward network. In some embodiments, other networks may be used such as convolutional neural network, time delay neural network, recurrent network, etc.

In some embodiments, the cells of the network may comprise a linear threshold unit (LTU) that may produce an off or on state. In some embodiments, the LTU comprises a Heaviside step function, heaviside (z)={0 if z<0 1 if z≥0. In some embodiments, the network adjusts the weights between inputs and outputs at each time step, wherein weight of connection at t+1 between input i and output (i+1)=weight of previous step input i−1 and output $i+\eta(\hat{y}_{i+1}-y_{i+1})x_i$. η is the learning rate, $x_i$ is the ith input value, $\hat{y}_{i+1}$ is the actual output, and $y_{i+1}$ is the target or expected output.

In embodiments, for each training set provided to the network, the network outputs a prediction in a forward pass, determines the error in its prediction, reverses (i.e., backpropagates) through each of the layers to determine the cell from which the errors are stemming, and reduces the weight for that respective connection. In embodiments, the network repeats the forward pass, each time tweaking the weights to ultimately reduce the error with each repetition. In some embodiments, cells of the network may comprise a leaky ReLU function. In some embodiments, the cells of the network may comprise exponential linear unit (LU) randomized leaky ReLU (RReLU) or parametrical leaky ReLU (PReLU). In some embodiments, the network may use hyperbolic tangent functions, logit functions, step functions, softmax functions, sigmoid functions, etc. based on the application for which the network is used for. In some embodiments, the processor may use several initialization tactics to avoid vanishing/exploding/saturation gradient problems. In some embodiments, the processor may use initialization tactics such as that proposed by Xavier and He or Glorot initialization.

In some embodiments, the processor uses a cost function to quantify and formalize the errors of the network outputs. In some embodiments, the processor may use cross entropy between the training set and predictions of the network as the cost function. In embodiments, entropy may be the negative log-likelihood. In embodiments, finding a method of regularization that reduces an amount of variance while maintaining the bias (i.e., minimal increase in bias) may be challenging. In some embodiments, the processor may use $L^2$ regularization, ridge regression, or Tikhonov regularization based on weight decay. In some embodiments, the processor may use feature selection to simplify a problem, wherein a subset of all the information is used to represent all the information. $L^1$ regularization may be used for such purposes. In some embodiments, the processor uses bootstrap aggregation wherein several network models are combined to reduce generalization error. In embodiments, several different networks are trained separately, provided training data separately, and each provide their own outputs. This may help with predictions as different networks have a different level of vulnerability to the inputs.

In some embodiments, the robot moves in a state space. As the robot moves, sensors of the robot measure x(t) at each time interval t. In some embodiments, the processor averages the sensor readings collected over a number of time steps to smoothen the sensor data. In some embodiments, the processor assigns more weight to most recently collected sensor data. In some embodiments, the processor determines the average using $A(t)=\int x(t')\omega(t-t')dt'$ wherein t is the current time, t' is the time passed since collecting the data, and ω is a probability density function. In discrete form, $A(t)=(x*\omega)(t)=\Sigma_{t'=0}^{t'=t} x(t')\omega(t-t')$, wherein each x and ω may be a vector of two.

In embodiments, x is a first function and is the input to the network, ω is a second function called a kernel, and the output of the network is a feature map. In some embodiments, a convolutional network may be used as they allow for sparse interactions. For example, a floor map with a Cartesian coordinate system with large size and resolution may be provided as input to a convolutional network. Using a convolutional network, a subset of the map may be saved in memory requirements (e.g., edges). For example, FIG. 29A illustrates a map 2900 and an edge detector 2901 received as input and an output 2902 comprising a subset of the map defined by edges. FIG. 29B illustrates an image of a person 2903 and an edge detector 2904 received as input and an output 2902 comprising a subset of the image defined by edges. In addition to allowing sparse interactions, convolutional networks allow parameter sharing and equivalence. In embodiments, parameter sharing comprises sharing a same parameter for more than one function in a same network model. Parameter sharing facilitates the application of the network model to different lengths of sequences of data in a recurrent or recursive networks and generalizes across different forms. Due to sparse interaction of convolutional networks, not every cell is connected to other cells in each layer. For example, in an image, not every single pixel is connected to the layer as input. In embodiments, zero padding may be used to help reduce computational loss and focus on more structural features in one layer and detailed features in another layer.

Quantum interpretation of an ANN. Cells of a neural network may be represented by slits or openings through which data may be passed onto a next layer using a governing protocol. For example, FIG. 30A illustrates a double slit experiment. The governing rule in this example is particle propagation. A particle is released from 3000 towards a wall 3001 with openings 3002 and 3003 positioned in front of an absorber 3004 with a sensitive screen 3005. A probability distribution 3006 ($P_1$) representing the case when opening 3002 is open, a probability distribution 3007 ($P_2$) representing the case when opening 3003 is open, and the probability distribution 3008 ($P_{12}=P_1+P_2$) representing when both are open are shown. FIG. 30B illustrates a similar example, however, the governing rule is wave propagation. A wave is propagated from wave source 3009 towards a wall 3010 with openings 3011 and 3012 positioned in front of an absorber 3013 with a detecting surface 3014. A probability distribution 3015 ($I_1=|h_1|^2$) representing the case when opening 3011 is open, a probability distribution 3016 ($I_2=|h_2|^2$) representing the case when opening 3012 is open, and the probability distribution 3017 ($I_{12}=|h_1+h_2|^2$) representing when both are open are shown. In these example, the activation function of the neural network switches the propagation rule to particle or wave. For instance, if the activation function is on, then the rules of particle propagation apply and if the activation function is off, then the rules of wave propagation apply. With training and back propagation knobs are adjusted such that when a signal is passing through one aperture it either acts like a particle without interference or acts as a wave and is influenced by other cells. In a way, each cell may be controlled such that the cell acts interpedently or in a collective setting.

In some embodiments, an integral may not be exactly calculated and a sampling method may be used. For example, Monte Carlo sampling represents the integral from a perspective of expectation under a distribution and then approximates the expectation by a corresponding average. In some embodiments, the processor may represent the estimated integral $s=\int p(x)f(x)dx=E_p[f(x)]$, as an expectation $$s\ n=\frac{1}{n}\Sigma_{i=1}^{n}\ f(x_i),$$

wherein p is a probability density over the random variable x and n samples from $x_1$ to $x_n$ are drawn from p. The distribution of average converges to a normal distribution with a mean s and variance $$\mathrm{var}\frac{[f(x)]}{n}$$

based on the central limit theorem. In decomposing the integrand, it is important to determine which portion of the integrand is the probability p(x) and which portion of the integrand is the quantity f(x). In some embodiments, the processor assigns a wave preference where the integrand is large, thereby giving more importance to some samples. In some embodiments, the processor uses an alternative to importance sampling, that is, biased importance sampling. Importance sampling improves the estimate of the gradient of the cost function used in training model parameters in a stochastic gradient descent setup.

In some embodiments, the processor uses a Markov chain to initialize a state n of the robot with an arbitrary value to overcome the dependence between localization and mapping as the machine moves in a state space or work area. In following time steps, the processor randomly updates x repeatedly and it converges to a fair sample from the distribution p(x). In some embodiments, the processor determines the transition distribution T(x'|x), when the chain transforms from a random state x to a state x'. The transition distribution is the probability that the random update is x' given the start state is x. In a discrete state space with n spaces, the state of the Markov chain is drawn from some distribution $q^{(t)}(x)$, wherein t indicates the time step from (0, 1, 2, . . . , t). When t=0, the processor initializes an arbitrary distribution and in following time steps $q^{(t)}$ converges to p(x). The processor may represent the probability distribution at q(x=i) with a vector v, and after a single time step may determine $q^{t+1}(x')=\Sigma_x q^{(t)}(x)T(x'|x)$ In some embodiments, the processor may determine a multitude of Markov chains in parallel. In embodiments, the time required to burn into the equilibrium distribution, known as mixing time, may take long. Therefore, in some embodiments, the processor may use an energy based model, such as the Boltzmann distribution $\tilde{p}(x)=\exp(-E(x))$, wherein $\nabla x$, $\tilde{p}(x)>0$, and E(x), being an energy function, guarantees that there are no zero probabilities for any states.

In embodiments, diagrams may be used to represent which variables interact directly or indirectly, or otherwise, which variables are conditionally independent from one another. For instance, a set of variables $A=\{a_i\}$ is conditionally independent (or separated) or not separated from a set of variables $B=\{b_i\}$, given a third set of variables $S=\{s_i\}$ is represented using the diagrams shown in FIGS. 31A and 31B. FIG. 31A indicates that a is connected to b by a path involving unobserved variable s (i.e., a is not separated from b). In this case, unobserved variable s is active. FIG. 31B indicates that a is connected to b by a path involving observed variable s (i.e., a is not separated from b). In this case, unobserved variable s is inactive. Since the path between variables a and b is through inactive variable s, variables a and b are conditionally independent. FIG. 31C indicates that variables a and c and d and c are conditionally independent given variable b is inactive, however, variables a and d are not separated.

In some embodiments, the processor may use Gibbs samples. Gibbs samples produces a sample from the joint probability distribution of multiple random variables by constructing a Monte Carlo Markov Chain (MCMC) and updating each variable based on its conditional distribution given the state of the other variables. FIG. 32 illustrates a multi-dimensional rectangular prism comprising map data, wherein each slice of the rectangular prism comprises a map 3200 corresponding to a particular run (i.e., work session) of the robot. The map 3200 includes a door 3201 and the position of the door 3201 may vary between runs as shown in the map 3202. In a Jordan Network, the context layer is fed to $f_1$ from the output . . . , as illustrated in FIG. 33. An Elman network is similar, however, . . . or the context may be taken from anywhere between $f_1$ and $f_2$, rather than just the output of $f_2$. In some embodiments, the processor detect a door in the environment using at least some of the door detection methods described in U.S. Non-Provisional patent application Ser. Nos. 15/614,284, 17/240,211, 16/163,541, and 16/851,614, each of which is hereby incorporated by reference.

Figure 34:
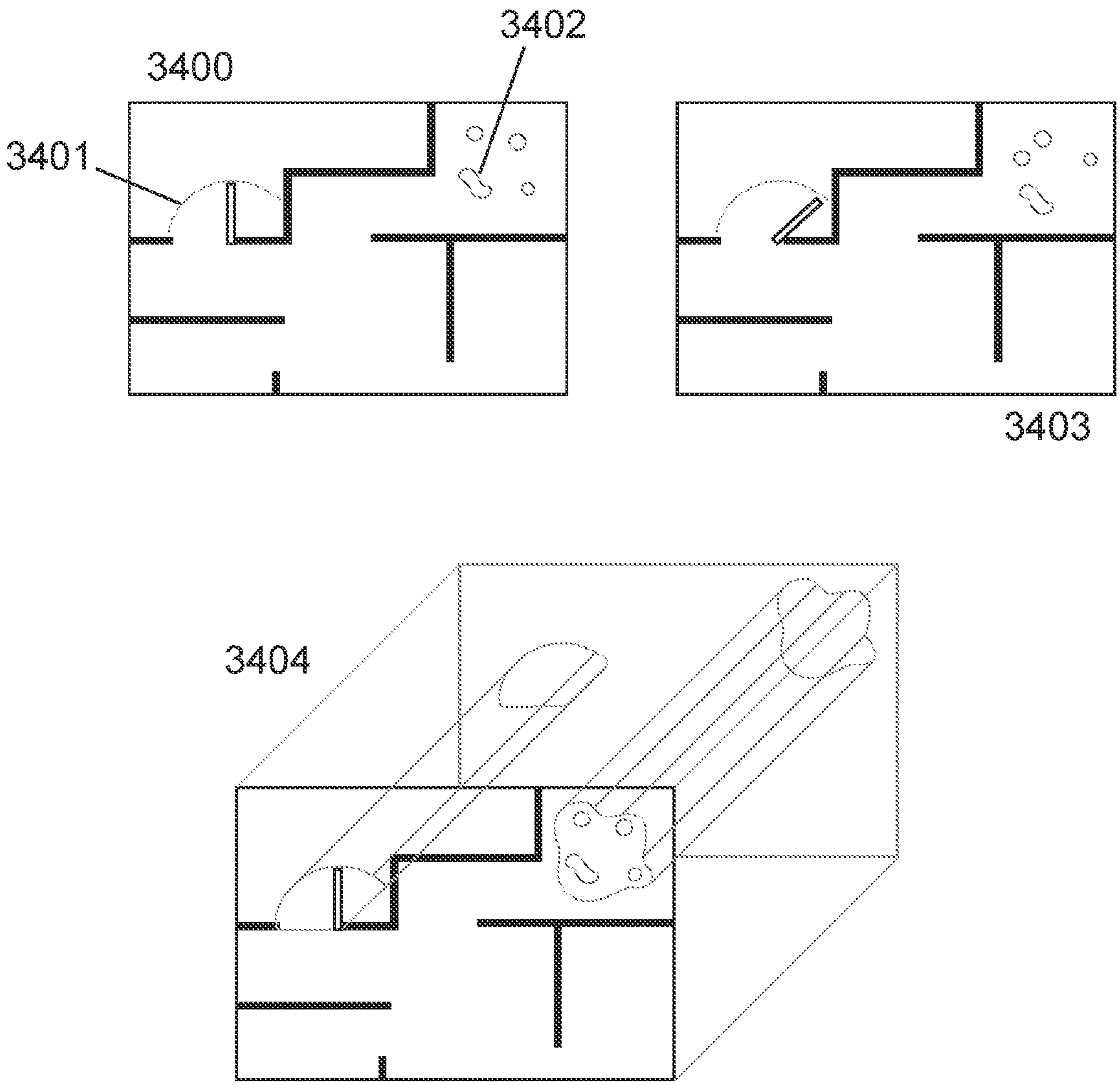
Figure 35:
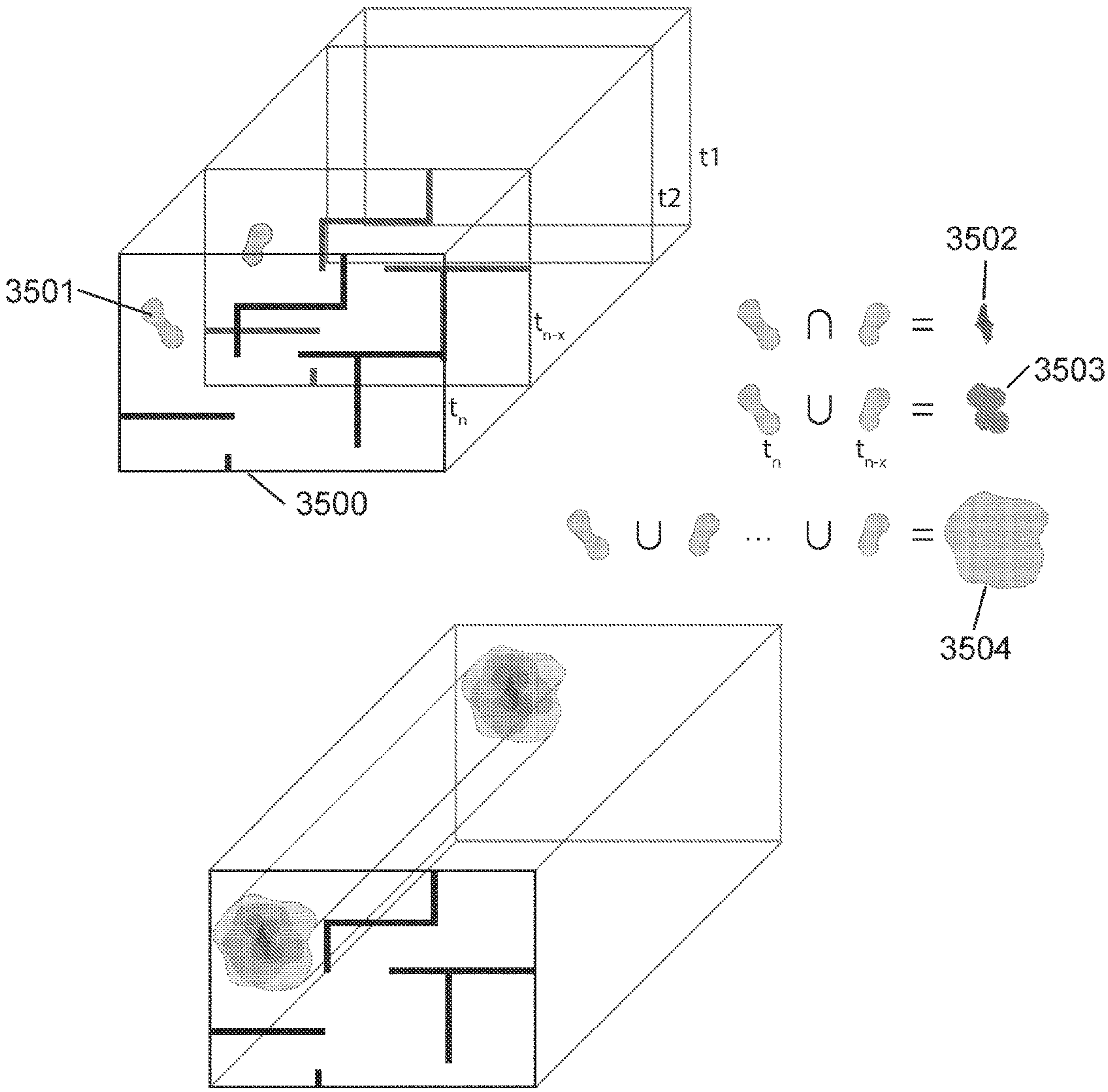

FIG. 34 illustrates another example of a multi-dimensional rectangular prism comprising map data, wherein each slice of the rectangular prism comprises a map 3400 corresponding to a particular run (i.e., work session) of the robot. The map 3400 includes a door 3401 and objects 3402 (e.g., toys) and the position of the door 3401 and objects 3402 may vary between runs as shown in the maps 3403 and 3404 corresponding with different runs. FIG. 35 illustrates an example of a multi-dimensional rectangular prism comprising map data, wherein each slice of the rectangular prism comprises a map 3500 corresponding to a particular time stamp t. The map 3500 includes debris data, indicating locations with debris accumulation 3501 and the position of locations with high accumulation of debris data may vary for each particular time stamp. Depending on sensor observations over some amount of time, the debris data may indicate high debris probability density areas 3502, medium debris probability density areas 3503, and low debris probability density areas 3504, each indicated by a different shade. FIGS. 36 and 37 illustrate other examples of multi-dimensional rectangular prisms comprising map data, wherein each slice of the rectangular prism comprises a map 3600 corresponding to a particular time stamp t. The map 3600 in FIGS. 36 and 37 include data indicating increased floor height 3601 and obstacles 3602 (e.g., u-shaped chair leg), respectively. Depending on sensor observations over some amount of time, the floor height data may indicate high increased floor height probability density areas 3603, medium increased floor height probability density areas 3604, and low increased floor height probability density areas 3605, each indicated by a different shade. Similarly, based on sensor observations over some amount of time, the obstacle data may indicate high obstacle probability density areas 3606, medium obstacle probability density areas 3607, and low obstacle probability density areas 3608, each indicated by a different shade. In some embodiments, the processor may inflate a size of observed obstacles to reduce the likelihood of the robot colliding with the obstacle. For example, the processor may detect a skinny obstacle (e.g., table post) based on data from a single sensor and the processor may inflate the size of the obstacle to prevent the robot from colliding with the obstacle.

In embodiments, DNN tweaking amounts to capturing a data set that is diverse, meaningful, and large, training the network well, and encompassing activities that include, but are not limited to, creative use of initialization techniques, proper activation functions (ELU, EeLu, Leaky ReLu, tanh, logistic, softmax, etc. and their variants), proper normalization, regularization, optimizer, learning rate scheduling, and augmenting a data set by artificially and skillfully transposing linearly and angularly objects in an image. Further, a data set may be augmented by adding light to different portions of the image (e.g., exposing the object in the image to a spot light), adding and/or reducing contrast, hue, saturation, and/or color temperature to the object or environment within the image, and exposing the object and/or the environment to different light temperatures (e.g., artificially adjusting an image that was taken in daylight to appear as if it was taken at night, in fluorescent lighting, at dusk, at dawn, or in a candle light). Depending on the application and goals, different method and techniques are used in tweaking the network. In one example, proper weight initialization, to break symmetries, or advantageously choosing ELU over ReLu are important in cases where negative values or values hovering close to zero are present. In another example, leaky ReLu may advantageously increase performance for more real-time experience. In another setting, sparsification techniques may be used by choosing FTRL over Adam optimization.

In some embodiments, the processor uses a neural network to stitch images together and form a map. Various methods may be used independently or in combination in stitching images at overlapping points, such as least square method. Several methods may work in parallel, organized through a neural network to achieve better stitching between images. Particularly with 3D scenarios, using one or more methods in parallel, each method being a neuron working within the bigger network, is advantageous. In embodiments, these methods may be organized in a layered approach. In embodiments, different methods in the network may be activated based on large training sets formulated in advance and on how the information coming into the network (in a specific setting) matches the previous training data. FIG. 38 illustrates that such methods offer real time operation, a small foot print, and lower battery consumption. Also, examples of VR and AR that may use such methods including head mounted virtual reality, wearable AR or VR, and mixed reality applications, are shown.

In some embodiments, a camera based system (e.g., mono) is trained. In some embodiments, the robot initially navigates as desired within an environment. The robot may include a camera. The data collected by the camera may be bundled with data collected by one or more of an OTS, an encoder, an IMU, a gyroscope, etc. The robot may also include a 3D or 2D LIDAR for measuring distances to objects as the robot moves within the environment. For example, FIG. 39A illustrates an example of a robot 3900 whose processor associates data from any of odometry, gyroscope, OTS, IMU, TOF, etc. with LIDAR data. The LIDAR data may be used as ground truth, from which a calibration may be derived by a processor of the robot. After training and during runtime, the processor may compare camera data bundled with data from any of odometry, gyroscope, OTS, IMU, TOF, etc. and eventually convergence occurs. In some embodiments, convergence results are better with data collected from two cameras or one camera and a point measurement device, as opposed to a single camera. FIG. 39B illustrates another example, wherein a processor of a robot 3901 bundles sensor data 3902 with ground truth LIDAR readings, from which a pattern emerges.

In embodiments, deep learning maybe used to improve perception, improve trajectory such that it follows the planned path more accurately, improve coverage, improve obstacle detection and collision prevention, improve decision making such that it is more human-like, improve decision making in situation wherein some data is missing, etc. In some embodiments, the processor implements deep bundling. For example, FIG. 40 illustrates an example of deep bundling wherein given the robot is at a position A and that the processor knows the robot's distance to point 1 and point 2, the robot knows how far it is from both point 1 and point 2 when the robot moves some displacement to position B. In another example illustrated in FIG. 41, the processor of the robot knows that Las Vegas is approximately X miles from the robot. The processor of the robot learns that L.A. is a distance of Y miles from the robot. When the robot moves 10 miles in a particular direction with a noisy measurement apparatus, the processor determines a displacement of 10 miles and determines approximately how far the robot is from both Las Vegas and Los Angeles. The processor may iterate and determine where the robot is. In some embodiments, this iterative process may be framed as a neural network that learns as new data is collected and received by the network. The unknown variable may be anything. For example, in some instances, the processor may be blind with respect to movement of the robot wherein no displacement or angular movement is measured. In that case, the processor would be unaware that the robot travelled 10 miles. With consecutive measurements organized in a deep network, the information provided to the network may be distance readings or position with respect to feature readings and the desired unknown variable may be displacement. In some circumstances, displacement may roughly be known but accuracy may be needed. For instance, an old position may be known, displacement may be somewhat known, and it may be desired to predict a new location of the robot. The processor may use deep bundling (i.e., the related known information) to approximate the unknown.

Neural networks may be used for various applications, such as object avoidance, coverage, quality, traversability, human intuitiveness, etc. In another example, neural networks may be used in localization to approximate a location of the robot based on wireless signal data. In a large indoor area with a symmetrical layout, such as airports or multi-floor buildings with a similar layout on all or some floors, the processor of the robot may connect the robot to a strongest Wi-Fi router (assuming each floor has one or more Wi-Fi routers). The Wi-Fi router the robot connects to may be used by the processor as an indication of where the robot is. In consumer homes and commercial establishments, wireless routers may be replaced by a mesh of wireless/Wi-Fi repeaters/routers. For example, FIG. 42 illustrates wireless/Wi-Fi repeaters/routers 2200 at various levels within a home. In large establishments such as shopping malls or airports they may be access points. For example, FIG. 43A illustrates an example of an airport with six access points (AP1 to AP6). The processor of the robot may use a neural network to approximate a location of the robot based on a strength of signals measured from different APs. For instance, distance d1, d2, d3, d4, and d5 are approximately correlated to strength of the signal that is received by the robot which is constantly changing as the robot gets farther from some APs and closer to others. At timestamp to, the robot may be at a distance d4 from AP1, a distance d3 from AP3, and a distance d5 from AP6. At timestamp $t_1$, the processor of the robot determines the robot is at a distance d3 from AP1, a distance d5 from AP3, and a distance d5 from AP6. As the robot moves within the environment and this information is fed into the network, a direction of movement and location of the robot emerges. Over time, the approximation in direction of movement and location of the robot based on the signal strength data provided to the network increases in accuracy as the network learns. Several methods such as least square methods or other methods may also be used. In some embodiments, approximation may be organized in a simple atomic way or multiple atoms may work together in a neural network, each activated based on the training executed prior to runtime and/or fine-tuned during runtime. Such Wi-Fi mapping may not yield accurate results for certain applications, but may be as sufficient as GPS data is for an autonomous car when used for indoor mobile robots (e.g., a commercial airport floor scrubber). In a similar manner, autonomous cars may use 5G network data to provide more accurate localization than previous cellular generations.

In some embodiments, wherein the accuracy of approximations are low, the approximations may be enhanced using a deep architecture that converges over a period of training time. Over time, the processor of the robot determines a strength of signal received from each AP at different locations within the floor map. This is shown for two different runs in FIGS. 43B and 43C, wherein the signal strength from AP1 to AP4 is determined for different locations within the floor map. In the first run, sensors of the robot observe signal strengths from APs as a function of time and a location of the robot. In the first run, as the robot moved from position 1 to position 2, signal 4300 weakened a little, signal 4301 strengthened and signals 4302 and 4303 remained substantially the same. In the second run, the robot moves from position 1 to position 2. Note trajectory does not have to be the same as long as the processor obtains measurements from each position. Sensors of the robot may collect multiple measurements from each position in the same run.

Although the places of the APs are fixed, because of different noise factors and other variables, the signal strengths are not deterministic. In the second run, the signal strength 4302 at position 1 remained almost the same but at position 2 reduced in strength by a minimal amount. Signal 4303 slightly increased in strength in moving from position 1 to 2 at a faster pace than in run 1. The same was observed with signal 4301 while the signal strength of 4300 remained substantially the same. FIG. 43D illustrates run 1 to run n combined. Eventually, the data collected on signal strength at different locations are combined to provide better estimates of a location of the robot based on the signal strengths from different APs received. In embodiments, stronger signals translate to less deviation and more certainty. In some embodiments, the AP signal strength data collected by sensors of the robot are fed into the deep neural network model along with accurate LIDAR measurements. In some embodiments, the LIDAR data and AP signal strength data are combined into a data structure then provided to the neural network such that a pattern may be learned and the processor may infer probabilities of a location of the robot based on the AP signal strength data collected, as shown in FIG. 44.

FIG. 45 illustrates an example of merging of various types of data 2500 into a data structure, cleaning of the data, extraction of the converged data, encoding to automatic encoders, their use and/or storage in the cloud, and if stored in the cloud, retrieving only what is needed for use locally at the robot or network level. Such merged data structures may be used by algorithms that remove outlines, algorithms that decide dynamic obstacle half-life or decay rate, algorithms that inflate troublesome obstacles, algorithms that identify where different types sensors act weak and when to integrate their readings (e.g., a sonar range finder acts poor where there are corners or sharp and narrow obstacles), etc. In each application patterns emerge and may be simplified into automatic deep network encoders. In some embodiments, the processor fine tunes neural networks using Markov Decision Process (MDP), deep reinforcement, deep Q. In some embodiments, neurons of the neural network are activated and deactivated based on need and behavior during operation of the robot.

In some embodiments, some or all computation and processing may be off-loaded to the cloud. FIG. 46 illustrates an example of various levels of off-loading from the local robot level 2600 to the cloud level 2601 via LAN level 2602. In some embodiments, the various levels, local, LAN, and cloud, may have different security. FIG. 47 illustrates different levels of security at the local robot, LAN, and cloud levels. With auto encoding, the data isn't obtained individually, as such information of a home robot, for example, is not compromised when a LAN local server is hacked.

FIG. 48 illustrates an example of where the neural network 4800 is stored within a memory of the robot 4801. In embodiments, various devices may be connected via Wi-Fi router and/or the cloud/cellular network. Examples of cell phone connections are described in Table 2 below.

TABLE 2

Connection of cell phone to Wi-Fi LAN and robot

| Cell Phone Connection | Physical and Logical Location | Method of Connection |
|---|---|---|
| cell phone connection to Wi-Fi LAN | Physically local Logically remote | Cell phone connects to LAN but the data goes through the cloud to communicate with robot |
| | Physically local Logically local | Cell phone connects to and traverses LAN to reach the smartphone |
| cell phone paired with robot via Bluetooth, radio RF card, or Wi-Fi module | Physically local Logically local | There is no need for a Wi-Fi router, the robot may act as an AP or sometimes the cell phone may be used for an initial pairing of the robot with the Wi-Fi network (particularly when the robot does not have an elaborate UI that can display the available Wi-Fi networks and/or a keypad to enter a password) |

FIGS. 49A-49D illustrate schematics wherein a neural network is stored in a charging station, a Wi-Fi router, the cloud/cellular network, or a cellphone, respectively, and the method by which the robot may access the neural network. In some embodiments, the neural network is not a deep neural network. The neural network may be of any configuration. When there is only a single neuron in the network, it reduces to an atomic machine learning. In embodiments, the act of learning, whether neural or atomic machine learning may be executed on various devices and in various locations in an individual manner or distributed between the various devices located at various locations. FIGS. 49E and 49F illustrate the concept of placing neural networks on any machine and in any architecture. For example, a CNN may be on the local robot while some convolution layers and convolution processing may take place on the cloud. Concurrently, the robot may use reinforcement learning for a task such as its calibration, obstacle inflation, bump reduction, path optimization, etc. and a recurrent type of network on the cloud for the incorporation of historically learned information into its behavior. The processor of the robot may then send its experiences to the cloud to reinforce the recurrent network that stores and uses historically learned information for a next run.

In some embodiments, parallelization of neural networks may be used. The larger a network becomes, the more process intense it gets. In such cases, tasks may be distributed on multiple devices, such as the cloud or on the local robot. For example, the robot may locally run the SLAM on its MCU, such as the light weight real time QSLAM described herein (note that QSLAM may run on a CPU as well as it is compatible with CPU and MCU for real time operation). Some vision processing and algorithms may be executed on the MCU itself. However, additional tasks may be offloaded to a second MCU, a CPU, a GPU, the cloud, etc. for additional speed. For instance, FIG. 50 illustrates different portions of a neural network, net 1, divided between GPU 1, CPU 1, CPU 2, and the cloud. This may be the case for various neural networks, such as net 2, net 3, . . . , net n. The GPU 1, CPU 1, CPU 2, and the cloud may execute different portions of each network, as can be seen in comparing the division of net 1 and net n among the GPU 1, CPU 1, CPU 2, and the cloud. In another example, Amazon Web Services (AWS) hosts GPUs on the cloud and Google cloud machine learning service provides TPUs that are dedicated services.

The task distribution of neural networks across multiple devices such as the local robot, a computer, a cell phone, any other device on a same network, or across one or more clouds may be done manually or automated. In embodiments, there may be more than one cloud on which the neural network is distributed. For example, net 1 may use the AWS cloud, net 2 may use Google cloud, net 3 may use Microsoft cloud, net 4 may use AI Incorporated cloud, and net 5 may use some or all of the above-mentioned clouds. FIGS. 51A and 51B illustrate this concept further, wherein the neural network is executed by multiple CPUs. In FIG. 51A, each layer is executed by different CPUs, whereas in FIG. 51B top and bottom portions of the network architecture are executed by different CPUs. In FIG. 51A, the disadvantage is that every layer must wait for the output of the previous layer to arrive. In some embodiments, it may be better to have less communication points between devices. Ideally, the neural network is split where the mesh is not full. For instance, FIG. 51C illustrates the division of a network into two portions at a location where there are minimal communication points between the split portions of the network. In some embodiments, it may be better to run the entire network on one device, have many identical devices and networks, and split the data into smaller data set chunks and have them run in parallel.

Some embodiments may include a method of tuning robot behavior using an aggregate of one or more nodes, each configured to perform a single type of processing organized in layers, wherein nodes in some layers are tasked with more abstract functions and while nodes in other layers are tasked with more human understandable functions. The node may be organized such that any combination of one or more nodes may be active or inactive during runtime depending on prior training sessions. The nodes may be fully or partially meshed and connected to subsequent layers.

FIG. 52 illustrates another example of a neural network. Images 6700 are captured from cameras positioned at different locations on the robot and are provided to a first layer (layer 1) of the network, in addition to data from other sensors such as IMU, odometry, timestamp etc. Image data such as RGB, depth, and/or grayscale 6701 may be provided to the first layer as well. In some instances, RGB data may be used to generate grayscale data. In some instances, depth data is provided when the image is a 2D image. In some embodiments, the processor may use the image data to perform intermediate calculations such as pose of the robot. At layer n, feature maps each having a same width and height are processed. There may be combination of various feature map sizes (e.g., 3×3, 5×5, 10×10, 2×2, etc.) At a layer m, data is compressed and at layers o and p, data is either pushed forward or sent back. The last layer of the network provides outputs. In embodiments, any portion of the network may be offloaded to other devices or dedicated hardware (e.g., GPU, CPU, cloud, etc.) for faster processing, compression, etc. Those classifications that do not require fast response may be sent back.

In some embodiments, classifications require fast response. In some embodiments, low level features are processed in real time. FIG. 53 illustrates different outputs which may each require a different speed of response from the robot. For instance, output 3 indicates probabilities of a distance of the robot from an object. This requires fast response from the robot to avoid a collision. Output 2 indicates probabilities that the object is moving and remaining still. Output 10 indicates probabilities of the type of object while output 11 indicates probabilities of the person in cases where the object is a human.

In some embodiments, only intermediary calculations are need to be sent to other systems or other subsystems within the system. For example, before sending information to a convolutional network, image data bundled with IMU data may be directly sent to a pose estimation subsystem. While more accurate data may be derived as information is processed in upper layers of the network, a real-time version of the data may be helpful for other subsystems or collaborative devices. For example, the processor of the robot may send out pose change estimation comprising a translational and an angular change in position based on time stamped images and IMU and/or odometer data to an outside collaborator. This information may be enhanced, tuned, and sent out with more precision as more computations are performed in next steps. In embodiments, there may be various classes of data and different levels of confidence assigned to the data as they are sent out.

In some embodiments, the system or subsystem receiving the information may filter out some information if it is not needed. For instance, while a subsystem that tracks dynamic obstacles such as pets and humans or a subsystem that classifies the background, environmental obstacles, indoor obstacles, and moving obstacles rely on appearing and disappearing features to make their classification, another subsystem such as a pose estimator or angular displacement estimation subsystem may filter out moving obstacles as outliers. At each subsystem, each layer, and each device, different filters may be applied. For example, a quick pose estimation may be necessary in creating a computer generated visual representation of the robot and vehicle pose in relation to the environment. Such visualization may be overlaid in a windshield of a vehicle for a passenger to view or shown in an application paired with a mobile robot. FIG. 54 illustrates a pose of a vehicle 5400 shown on its windshield 5401 as a virtual vehicle 5402 or an arrow 5403. In embodiments, the vehicle may be autonomous with no driver. FIG. 55 illustrates the pose of the robot 5404 within a map 5405 displayed on a screen of a communication device 5406.

In some embodiments, filters may be used to prepare data for other subsystems or system. In some subsystems, sparsification may be necessary when data is processed for speed. In some subsystems, the neural network may be used to densify the spatial representation of the environment. For example, if data points are sparse (e.g., when the system is running with fewer sensors) and there is more elapsed time between readings and a spatial representation needs to be shown to a user in a GUI or 3D high graphic setting, the consecutive images taken may be extrapolated using a CNN network. For the spatial representations needs to be used for avoiding obstacles, a volumetric relatively sparse representation suffices. For presenting a virtual presence experience, the consecutive images may be used in a CNN to reconstruct a higher resolution of the other side. In some embodiments, low bandwidth leads to automatic or manual reduction of camera resolution at the source (i.e., where camera is). When viewed at another destination, the low resolution images may be reconstructed with more spatial clarity and higher resolution. Particularly when stationary background images are constant, they may quickly and easily be shown with higher resolution at another destination.

In embodiments, different data have different update frequency. For example, global map data may have less refresh rates when presented to a user. In embodiments, different data may have different resolution or method of representation. For example, for a robot that is tasked to clean a supermarket, information pertaining to boxes and cans that are on shelves is not needed. In this scenario, information related to items on the shelves, such as percent of stock of items that often changes throughout the day as customers pick up items and staff replenish the stock, is not of interest for this particular cleaning application. However, for a survey robot that is tasked to take inventory count of isles, it is imperative that this information is accurately determined and conveyed to the robot. In some embodiments, two methods may be used in combination, namely, volumetric mapping with 2D images and size of items may be helpful in estimating which and how many items are present (or missing).

In some embodiments, neural network may be advantageous for older, manually constructed features that are human understandable and, to some extent, in removing the human middleman from the process. In some embodiments, a neural network may be used to adjudicate depth sensing, extract movement (e.g., angular and linear) of the robot, combine iterations of sensor readings into a map, adjudicate location (i.e., localization), extract dynamic obstacles and separate them from structural points, and actuate the robot such that the trajectory of the robot better matches the planned path.

In some embodiments, a neural network may be used in approximating a location of the robot. The one-dimension grid type data of position versus time may comprise (x, y, z) and (yaw, roll, pitch) data and may therefore include multiple dimensions. For simplicity, in this example, a location L of the robot may be given by (x, y, Θ) and changes with respect to time. Since the robot is moving, the most recent measurements captured by the robot may be given more weight as they are more relevant. For instance, data at a current timestamp t is given more weight than older measurements captured at t−1, t−2, . . . , t−i. In some embodiments, the position of the robot may be a multidimensional array or tensor and the kernel may be a set of parameters organized in a multidimensional array. The two multidimensional arrays may be convolved to produce a feature map. In some embodiments, the network adjusts the parameters during the training and learning process.

Instead of matrix multiplication, wherein each element of the input interacts with each element of the second matrix, in convolution, the kernel is usually smaller in dimension than the input, therefore such sparse connectivity makes it more computationally effective to operate. In embodiments, the amount of information carried by an original image reduces in terms of diversity but increases in terms of targeted information as the data moves up in the layers of the network. FIG. 56 illustrates information at various layers of a network. As the network moves up in layers, the amount of information carried by the original image reduces in terms of diversity but increases in terms of targeted information. In this example, detailed shapes of a plant 5600 are reduced to a series of primitive shapes 5601, and using this information, the network may deduce with higher probability that the plant 5600 is a stationary obstacle in comparison to a moving object, shown in graph 5602. In embodiments, the upper layers of the network have a more definitive answer about a more human perceived concept, such as an object moving or not moving, but far less diversity. For example, at a low level the network may extract optical flow but at a higher level, pixels are combined, smoothened, and/or destroyed, so while an edge may be traced better or probabilities of facial recognition more accurately determined, some data is lost in generalization. Therefore, in some embodiments, multiple sets of neural networks may be used, each trained and structured to extract different high level concepts. FIG. 57 illustrates the use of multiple neural networks 5700 trained and structured to extract different high level concepts.

In some embodiments, some kernels useful for a particular application may be damaging for another application. Kernels mat act in-phase and out-phase, therefore when parameter sharing is deployed care must be taken to control and account for competing functions on data. In some embodiments, neural networks may use parameter sharing to reach equivariance. In embodiments, convolution may be used to translate the input to a phase space, perform multiplication with the kernel in the frequency space, and convert back to time space. This is similar to what a Fourier transform-inverse Fourier transform may do.

In embodiments, the combination of the convolution layer, detector layer (i.e., ReLu), and pooling layer are referred to as the convolution layer (although each layer could be technically viewed as an independent layer). Therefore, in the figures included herein, some layers may not be shown. While pooling helps reach invariance, which is useful for detecting edges, corners and identifying objects, eyes, and faces, it suppresses properties that may help detect translational or angular displacement. Therefore, in embodiments, it is necessary to pool over the output of separately parametrized convolutions and train the network on where invariance is needed and where it is harmful. FIG. 58A illustrates a case in which invariance is required to distinguish the number 5 based on, for example, edge detection. FIG. 58B illustrates a case in which invariance may be harmful, wherein the goal is to determine a change in position of the robot. If the objective is to distinguish the number 5, invariance is needed, however, if the objective is to use the number 5 to determine how the robot changed in position and heading, invariance jeopardizes the application. The network may conclude that the number 5 at a current time is observed to be larger in size and therefore the robot is closer to the number 5 or that the number 5 at a current time is distorted and therefore the robot is observing the number 5 from a different angle.

In some contexts, the processor may extrapolate sparse measured characteristics to an entire set of pixels of an image. FIG. 59A illustrates an image 5900 and two measured distances $d_1$ and $d_2$ from a robot 5901 to two points 5902 and 5903 on the image 5900 at a first time point. FIG. 59A also illustrates an image 5904 and two measured distances $d'_1$ and $d'_2$ from a robot 5901 to two points 5902 and 5903 on the image 5904 at a second time point. Using the distances $d_1$ and $d_2$ and $d'_1$ and $d'_2$, the processor of the robot may determine a displacement of the robot and may extrapolate distances to other points on the image. In some embodiments, a displacement matrix measured by an IMU or odometer may be used as a kernel and convolved with an input image to produce a feature map comprising depth values that are expected for certain points. This is illustrated in FIG. 59B wherein distance to corner 5905 are determined, which may be used in localizing the robot. Although the point range finding sensor has fixed relations with the camera, pixel $x_1'$, $y_1'$ is not necessarily the same as pixel as $x_1$, $y_1$. With iteration of t, to t', to t'' and finally to t'' we have n number of states. In some embodiments, the processor may represent the state of the robot using $S_{(t)}=f(S_{(t-1)}; \Theta)$. For example, at t=3, $S_{(3)}=f(S_{(2)}; \Theta)=f(f(S_{(1)}; \Theta); \Theta)$, which has the concept of recurrence built into the equation. In most instances, it may not be required to store all previous states to form a conclusion. In embodiments, the function receives a sequence and produces a current state as output. During training, the network model may be fed with ground truth output $y_{(t)}$ as an input at time t+1. In some embodiments, teacher forcing, a method that emerges from maximum likelihood or conditional maximum likelihood, may be used.

Instead of using traditional methods relying on a shape probability distribution, embodiments may integrate a prior into the process, wherein real observations are made based on the likelihood described by the prior and the prior is modified to obtain a posterior. A prior may be used in a sequential iterative set of estimations, such as estimations modeled in a Markovian chain, wherein as observations arrive the posteriors constantly and iteratively revise the current state and predict a next state. In some embodiments, minimum mean squared error, maximum posterior estimator, and median estimator may be used in various steps described above to sequentially and recursively provide estimations for the next time step. In some embodiments, some uncertainty shapes such as Dirac's delta, Bernoulli Binomial, uniform, exponential, Gaussian or normal, gamma, and chi-squared may be used. Since maximization is local (i.e., finding a zero in the derivative) in maximum likelihood methods of estimation, the value of the approximation for unknown parameters may not be globally optimal. Minimizing the expected squared error (MSE) or minimizing total sum of squared errors between observations and model predictions and calculating parameters for the model to obtain such minimums are generally referred to as least square estimators.

In the art, a challenge to be addressed relates to approximating a function using popular methods such as variations of gradient descent, wherein the function appears flat throughout the curve until it suddenly falls off a cliff thereby rendering a very small portion of the curve to change suddenly and quickly. Methods such as clipping the gradients are proposed and used in the art to make the reaction to the cliff region more moderate by restricting the step size. Sizing the model capacity, deciding regularization features, tuning and choosing error metrics, how much training data is needed, depth of the network, stride, zero padding, etc. are further steps to make the network system work better. In embodiments, more depth data may mean more filters and more features to be extracted. As described above, at higher layers of the network feature clues from the depth data are strengthened while there may be loss of information in non-central areas of the image. In embodiments, each filter results in an additional feature map. Data at lower layers or at input generally have a good amount of correlation between neighboring samples. For example, if two different methods of sampling are used on an image, they are likely to preserve the spatial and temporal based relations. This is also expanded to two images taken at two consecutive timestamps or a series of inputs. In contrast, at a higher level, neighboring pixels in one image or neighboring images in a series of image streams show a high dynamic range and often samples show very little correlation.

In embodiments, the processor of the robot may map the environment. In addition to the mapping and SLAM methods and techniques described herein, the processor of the robot may, in some embodiments, use at least a portion of the mapping methods and techniques described in U.S. Non-Provisional patent application Ser. Nos. 16/163,541, 16/851,614, 16/418,988, 16/048,185, Ser. Nos. 16/048,179, 16/594,923, 17/142,909, 16/920,328, 16/163,562, 16/597,945, 16/724,328, 16/163,508, 16/542,287, and 17/159,970, each of which is hereby incorporated by reference.

In some embodiments, a mapping sensor (e.g., a sensor whose data is used in generating or updating a map) runs on a Field Programmable Gate Array (FPGA) and the sensor readings are accumulated in a data structure such as vector, array, list, etc. The data structure may be chosen based on how that data may need to be manipulated. For example, in one embodiment a point cloud may use a vector data structure. This allows simplification of data writing and reading. FIG. 60 illustrates a mapping sensor 6000 including an image sensor (e.g., camera, LIDAR, etc.) that runs on a FPGA or Graphics Processing Unit (GPU) or an Application Specific Integrated Circuit (ASIC). Data is passed between the mapping sensor and the CPU. FIG. 60 also illustrates the flow of data in Linux based SLAM, indicated by path 6000. In traditional SLAM 1200, data flows between real time sensors 1 and 2 and the MCU and then between the MCU and CPU which may be slower due to several levels of abstraction in each step (MCU, OS, CPU). These levels of abstractions are noticeably reduced in Light Weight Real Time SLAM Navigational Stack, wherein data flows between real time sensors 1 and 2 and the MCU. While, Light Weight Real Time SLAM Navigational Stack may be more efficient, both types of SLAM may be used with the methods and techniques described herein.

For a service robot, it may desirable for the processor of the robot to map the environment as soon as possible without having to visit various parts of the environment redundantly. For instance, a map complete with a minimum percentage of coverage to entire coverable area may provide better performance. FIG. 61 illustrates a table comparing time to map an entire area and percentage of coverage to entire coverable area for a robot using Light Weight Real Time SLAM Navigational Stack and a robot using traditional SLAM for a complex and large space. The time to map the entire area and the percentage of area covered were much less with Light Weight Real Time SLAM Navigational Stack, requiring only minutes and a fraction of the space to be covered to generate a complete map. Traditional SLAM techniques require over an hour and some VSLAM solutions require the complete coverage of areas to generate a complete map. In addition, with traditional SLAM, robots may be required to perform perimeter tracing (or partial perimeter tracing) to discover or confirm an area within which the robot is to perform work in. Such SLAM solutions may be unideal for, for example, service oriented tasks, such as popular brands of robotic vacuums. It is more beneficial and elegant when the robot begins to work immediately without having to do perimeter tracing first. In some applications, the processor of the robot may not get a chance to build a complete map of an area before the robot is expected to perform a task. However, in such situations, it is useful to map as much of the area as possible in relation to the amount of the area covered by the robot as a more complete map may result in better decision making. In coverage applications, the robot may be expected to complete coverage of an entire area as soon as possible. For example, for a standard room setup based on International Electrotechnical Commission (IEC) standards, it is more desirable that a robot completes coverage of more than 70% of the room in under 6 minutes as compared to only 40% in under 6 minutes. FIG. 62 illustrates room coverage percentage over time for a robot using Light Weight Real Time SLAM Navigational Stack and four robots using traditional SLAM methods. As can be seen, the robot using Light Weight Real Time SLAM Navigational Stack completes coverage of the room much faster than robots using traditional SLAM methods.

In some embodiments, an image sensor of the robot captures images as the robot navigates throughout the environment. For example, FIG. 63A illustrates a robot 6300 navigating along a path 6301 throughout environment 6302 while capturing images 6303 using an image sensor. FIG. 63B illustrates the images 6303 captured as the robot 6300 navigates along path 6301. In some embodiments, the processor of the robot connects the images 6303 to one another. In some embodiments, the processor connects the images using similar methods as a graph G with nodes n and edges E. In some instances, images I may be connected with vertices V and edges E. In some embodiments, the processor connects images based on pixel densities and/or the path of the robot during which the images were captured (i.e., movement of the robot measured by odometry, gyroscope, etc.). FIG. 64 illustrates three images 6400, 6401, and 6402 captured during navigation of the robot and the position of the same pixels 6403 in each image. The processor of the robot may identify the same pixels 6403 in each image based on the pixel densities and/or the movement of the robot between each captured image or the position and orientation of the robot when each image was captured. The processor of the robot may connect images 6400, 6401, and 6402 based on the position of the same pixels 6403 in each image such that the same pixels 6403 overlap with one another when images 6400, 6401, and 6402 are connected. The processor may also connect images based on the measured movement of the robot between captured images 6400, 6401, and 6402 or the position and orientation of the robot within the environment when images 6400, 6401, and 6402 were captured. In some cases, images may be connected based on identifying similar distances to objects in the captured images. For example, FIG. 65 illustrates three images 6500, 6501, and 6502 captured during navigation of the robot and the same distances to objects 6503 in each image. The distances to objects 6503 always fall along the same height in each of the captured images as a two-and-a-half dimensional LIDAR measured the distances. The processor of the robot may connect images 6500, 6501, and 6502 based on the position of the same distances to objects 6503 in each image such that the same distances to objects 2903 overlap with one another when images 6500, 6501, and 6502 are connected. In some embodiments, the processor may use the minimum mean squared error to provide a more precise estimate of distances within the overlapping area. Other methods may also be used to verify or improve accuracy of connection of the captured images, such as matching similar pixel densities and/or measuring the movement of the robot between each captured image or the position and orientation of the robot when each image was captured.

In some cases, images may not be accurately connected when connected based on the measured movement of the robot as the actual trajectory of the robot may not be the same as the intended trajectory of the robot. In some embodiments, the processor may localize the robot and correct the position and orientation of the robot. FIG. 66A illustrates three images 6600, 6601, and 6602 captured by an image sensor of the robot during navigation with same points 6603 in each image. Based on the intended trajectory of the robot, same points 6603 are expected to be positioned in locations 6604. However, the actual trajectory resulted in captured image 6601 with same points 6603 positioned in unexpected locations. Based on localization of the robot during navigation, the processor may correct the position and orientation of the robot, resulting in FIG. 66B of captured image 6601 with the locations of same points 6603 aligning with their expected locations 6604 given the correction in position and orientation of the robot. In some cases, the robot may lose localization during navigation due to, for example, a push or slippage. In some embodiments, the processor may relocalize the robot and as a result images may be accurately connected. FIG. 67 illustrates three images 6700, 6701, and 6702 captured by an image sensor of the robot during navigation with same points 6703 in each image. Based on the intended trajectory of the robot, same points 6703 are expected to be positioned at locations 6704 in image 6702, however, due to loss of localization, same points 6703 are located elsewhere. The processor of the robot may relocalize and readjust the locations of same points 6703 in image 6702 and continue along its intended trajectory while capturing image 6705 with same points 6703.

In some embodiments, the processor may connect images based on the same objects identified in captured images. In some embodiments, the same objects in the captured images may be identified based on distances to objects in the captured images and the movement of the robot in between captured images and/or the position and orientation of the robot at the time the images were captured. FIG. 68 illustrates three images 6800, 6801, and 6802 captured by an image sensor and same points 6803 in each image. The processor may identify the same points 6803 in each image based on the distances to objects within each image and the movement of the robot in between each captured image. Based on the movement of the robot between a position from which image 6800 and image 6801 were captured, the distances of same points 6803 in captured image 6800 may be determined for captured image 6801. The processor may then identify the same points 6803 in captured image 6801 by identifying the pixels corresponding with the determined distances for same points 6803 in image 6801. The same may be done for captured image 6802. In some cases, distance measurements and image data may be used to extract features. For instance, FIG. 69A illustrates a two dimensional image of a feature 6900. The processor may use image data to determine the feature 6900. In FIG. 69A the processor may be 80% confident that the feature 6900 is a tree. In some cases, the processor may use distance measurements in addition to image data to extract additional information. In FIG. 69B the processor determines that it is 95% confident that the feature 6900 is a tree based on particular points in the feature 6900 having similar distances.

In some embodiments, the processor may locally align image data of neighbouring frames using methods (or a variation of the methods) described by Y. Matsushita, E. Ofek, Weina Ge, Xiaoou Tang and Heung-Yeung Shum, "Full-frame video stabilization with motion inpainting," in IEEE Transactions on Pattern Analysis and Machine Intelligence, vol. 28, no. 7, pp. 1150-1163, July 2006. In some embodiments, the processor may align images and dynamically construct an image mosaic using methods (or a variation of the methods) described by M. Hansen, P. Anandan, K. Dana, G. van der Wal and P. Burt, "Real-time scene stabilization and mosaic construction," Proceedings of 1994 IEEE Workshop on Applications of Computer Vision, Sarasota, FL, USA, 1994, pp. 54-62.

In some embodiments, the processor may use least squares, non-linear least squares, non-linear regression, preemptive RANSAC, etc. for two dimensional alignment of images, each method varying from the others. In some embodiments, the processor may identify a set of matched feature points $\{(x_i, x_i')\}$ for which the planar parametric transformation may be given by $x'=f(x; p)$, wherein p is best estimate of the motion parameters. In some embodiments, the processor minimizes the sum of squared residuals $E_{LS}(u)=\Sigma_i \|r_i\|^2=\Sigma_i \|f(x_i; p)-x'_i\|^2$, wherein $r_i=f(x_i; p)-x_i'=x_i\hat{}'-$ $x_i^{\sim\prime}$ is the residual between the measured location $x_i^{\wedge\prime}$ and the predicted location $x^{\sim\prime}=f(x_i; p)$. In some embodiments, the processor may minimize the sum of squared residuals by solving the Symmetric Positive Definite (SPD) system of normal equations and associating a scalar variance estimate of with each correspondence to achieve a weighted version of least squares that may account for uncertainty. FIG. 70A illustrates an example of four unaligned two dimensional images. FIG. 70B illustrates the alignment of the images achieved using methods such as those described herein, and FIG. 70C illustrates the four images stitched together after alignment. In some embodiments, the processor may use three dimensional linear or non-linear transformations to map translations, similarities, affine, by least square method or using other methods. In embodiments, there may be several parameters that are pure translation, a clean rotation, or affine. Therefore, a full search over the possible range of values may be impractical. In some embodiments, instead of using a single constant translation vector such as u, the processor may use a motion field or correspondence map x'(x; p) that is spatially varying and parameterized by a low dimensional vector p, wherein x' may be any motion model. Since the Hessian and residual vectors for such parametric motion is more computationally demanding than a simple translation or rotation, the processor may use a sub block and approach the analysis of motion using parametric methods. Then, once a correspondence is found, the processor may analyze the entire image using non-parametric methods.

In some embodiments, the processor may not know the correspondence between data points a priori when merging images and may start by matching nearby points. The processor may then update the most likely correspondence and iterate on. In some embodiments, the processor of the robot may localize the robot against the environment based on feature detection and matching. This may be synonymous to pose estimation or determining the position of cameras and other sensors of the robot relative to a known three dimensional object in the scene. In some embodiments, the processor stitches images and creates a spatial representation of the scene after correcting images with preprocessing.

In some embodiments, the processor may add different types of information to the map of the environment. For example, FIG. 71 illustrates four different types of information that may be added to the map, including an identified object such as a sock 7100, an identified obstacle such as a glass wall 7101, an identified cliff such as a staircase 7102, and a charging station of the robot 7103. The processor may identify an object by using a camera to capture an image of the object and matching the captured image of the object against a library of different types of objects. The processor may detect an obstacle, such as the glass wall 7101, using data from a TOF sensor or bumper. The processor may detect a cliff, such as staircase 7102, by using data from a camera, TOF, or other sensor positioned underneath the robot in a downwards facing orientation. The processor may identify the charging station 7103 by detecting IR signals emitted from the charging station 7103. In one example, the processor may add people or animals observed in particular locations and any associated attributes (e.g., clothing, mood, etc.) to the map of the environment. In another example, the processor may add different cars observed in particular locations to the map of the environment.

In some embodiments, the processor of the robot may insert image data information at locations within the map from which the image data was captured from. FIG. 72 illustrates an example of a map including undiscovered area 7200 and mapped area 7201. Images 7202 captured as the robot maps the environment while navigating along the path 7203 are placed within the map at a location from which each of the images were captured from. In some embodiments, images may be associated with a location from the images are captured from. In some embodiments, the processor stitches images of areas discovered by the robot together in a two dimensional grid map. In some embodiments, an image may be associated with information such as the location from which the image was captured from, the time and date on which the image was captured, and the people or objects captured within the image. In some embodiments, a user may access the images on an application of a communication device. In some embodiments, the processor or the application may sort the images according to a particular filter, such as by date, location, persons within the image, favorites, etc. In some embodiments, the location of different types objects captured within an image may be recorded or marked with the map of the environment. For example, images of socks may be associated with the location at which the socks were found in each time stamp. Over time, the processor may know that socks are more likely to be found in the bedroom as compared to the kitchen. In some embodiments, the location of different types of objects and/or object density may be included in the map of the environment that may be viewed using an application of a communication device. For example, FIG. 73A illustrates an example of a map of an environment 7300 including the location of object 7301 and high obstacle density area 7302. FIG. 73B illustrates the map 7300 viewed using an application of a communication device 7303. A user may use the application to confirm that the object type of the object 7301 is a sock by choosing yes or no in the dialogue box 7304 and to determine if the high density obstacle area 7302 should be avoided by choosing yes or no in dialogue box 7305. In this example, the user may choose to not avoid the sock, however, the user may choose to avoid other object types, such as cables.

In some embodiments, image data captured are rectified when there is more than one camera. For example, FIG. 74 illustrates cameras $c_1, c_2, c_3, \ldots, c_n$ each having their own respective field of view $FOV_1, FOV_2, FOV_3, \ldots, FOV_n$. Each field of view observed data at each time point $t_1, t_{(t+1)}, t_{(t+2)}, \ldots, t_n$. FIG. 74 illustrates the rectifying process wherein the observations captured in fields of view $FOV_1, FOV_2, FOV_3, \ldots, FOV_n$ of cameras $c_1, c_2, c_3, \ldots, c_n$ are bundled. FIG. 74 illustrates different types of data that may be bundled, such as any of GPS data, IMU data, SFM data, laser range finder data, depth data, optical tracker data, odometer data, radar data, sonar data, etc. For instance, arrows 7400 illustrate examples of types of data that may be bundled. Bundling data is an iterative process that may be implemented locally or globally. For SFM, the process solves a non-linear least squares problem by determining a vector x that minimizes a cost function, $x=\operatorname{argmin}\|y-F(x)\|^2$. The vector x may be multidimensional.

In some embodiments, the bundled data may be transmitted to, for example, the data warehouse, the real-time classifier, the real-time feature extractor, the filter (for noise removal), the loop closure, and the object distance calculator. The data warehouse may transmit data to, for example, the offline classifier, the offline feature extractor, and deep models. The offline classifier, the offline feature extractor, and deep models may recurrently transmit data to, for example, a database and the real-time classifier, the real-time feature extractor, the filter (for noise removal), and the loop closure. The database may transmit and receive data back and forth from an autoencoder that performs recoding to reconstruct data and save space. The data warehouse, the real-time classifier, the real-time feature extractor, the filter (for noise removal), the loop closure, and the object distance calculator may transmit data to, for example, mapping, localization/re-localization, and path planning algorithms. Mapping and localization algorithms may transmit and receive data from one another and transmit data to the path planning algorithm. Mapping, localization/re-localization, and path planning algorithms may transmit and receive data back and forth with the controller that commands the robot to start and stop by moving the wheels of the robot. Mapping, localization/re-localization, and path planning algorithms may also transmit and receive data back and forth with the trajectory measurement and observation algorithm. The trajectory measurement and observation algorithm uses a cost function minimize the difference between the controller command and the actual trajectory. The algorithm assigns a reward or penalty based on the difference between the controller command and the actual trajectory. This continuous process fine tunes the SLAM and control of the robot over time. At each time sequence, data from the controller, SLAM and path planning algorithms, and the reward system of trajectory measurement and observation algorithm are transmitted to the database for input into the Deep Q-Network for reinforcement learning. In embodiments, reinforcement learning algorithms may be used to fine tune perception, actuation, or another aspect. For example, reinforcement learning algorithms may be used to prevent or reduce bumping into an object. Reinforcement learning algorithms may be used to learn by how much to inflate a size of the object or a distance to maintain from the particular object, or both, to prevent bumping into the object. In another example, reinforcement learning algorithms may be used to learn how to stitch data points together. For instance, this may include stitching data collected at a first and a second time point; stitching data captured by a first camera and a second camera with overlapping or non-overlapping fields of view; stitching data captured by a first LIDAR and a second LIDAR; or stitching data captured by a LIDAR and a camera. FIGS. 79A and 79B illustrates the flow of data within the robotic device system as described.

In some embodiments, the processor determines a bundle adjustment by iteratively minimizing the error when bundles of imaginary rays connect the centers of cameras to three-dimensional points. For example, FIG. 75 illustrates cameras 7500 and imaginary rays 7501, 7502, 7503, and 7504 connecting the centers of cameras 7500 and corresponding with bundle1, bundle2, bundle3, bundle4, respectively. The bundles may be used in several equations that may be solved. For displacements, data may be gathered from one or more of GPS data, IMU data, LIDAR data, radar data, sonar data, TOF data (single point or multipoint), optical tracker data, odometer data, structured light data, second camera data, tactile sensor data (e.g., tactile sensor data detects a pushed bumper of which the displacement is known), data from various image processing methods, etc.

In embodiments, the processor may stitch data collected at a first and a second time point or a same time point by a same or a different sensor type; stitch data captured by a first camera and a second camera with overlapping or non-overlapping fields of view; stitch data captured by a first LIDAR and a second LIDAR; and stitch data captured by a LIDAR and a camera. FIG. 76A illustrates stitching data 7600 captured at times t1, t2, t3, . . . , tn to obtain combined data 7601. FIG. 76B illustrates two overlapping sensor fields of view 7602 and 7603 of vehicle 7604 and two non-overlapping sensor fields of view 7605 and 7606 of vehicle 7607. Data captured within the overlapping sensor fields of view 7602 and 7603 may be stitched together to combine the data. Data captured within the non-overlapping sensor fields of view 7605 and 7606 may be stitched together as well. The sensors having sensor fields of view 7605 and 7606 of vehicle 7607 are rigidly connected, however, data captured within fields of view of sensors that are not rigidly connected may be stitched as well. For example, FIG. 76C illustrates vehicle 7608 including a camera with a field of view 7609 and a field of view 7610 of a CCTV camera positioned within the environment. The position of the vehicle 7608 relative to the CCTV camera is variable. The data captured within the field of view 7609 of the camera and the field of view 7610 of the CCTV camera may be stitched together.

In some embodiments, different types of data captured by different sensor types combined into a single device may be stitched together. For instance, FIG. 76D illustrates a single device including a camera 7611 and a laser 7612. Data captured by the camera 7611 and data captured by the 7612 may be stitched together. At a first time point the camera 7611 may only collect data. At a second time point, both the camera 7611 and the laser 7612 may collected data to obtain depth and two dimensional image data. In some cases, different types of data captured by different sensor types that are separate devices may be stitched together. For example, a 3D LIDAR 7613 and a camera 7614 or a depth camera 7615 and a camera 7616, the data of which may be combined. For instance, a depth measurement 7618 may be associated with a pixel 7619 of an image 7620 captured by the camera 7614. In some embodiments, data with different resolutions may be combined by, for example, regenerating and filling in the blanks or by reducing the resolution and homogenizing the combined data. FIG. 76E illustrates data 7621 with high resolution and data 7622 with low resolution and their combination 7623. In some embodiments, the resolution in one directional perspective may be different than the resolution in another directional perspective. FIG. 76F illustrates data 7624 collected by a sensor of the robot at a first time point, data 7625 collected by the sensor at a second time point after the robot rotates by a small angle, and the combined data 7626 of data 7624 and 7625 with a higher resolution from the vertical perspective.

Each data instance in a stream/sequence of data may have an error that is propagated forward. For instance, the processor may organize a bundle of data into a vector V. The vector may include an image associated with a frame of reference of a spatial representation and confidence data. The vector V may be subject to, for example, Gaussian noise. The vector V having Gaussian noise may be mapped to a function $f$ that minimizes the error and may be approximated with linear Taylor expansion. The Gaussian noise of the vector V may be propagated to the Gaussian noise of the function $f$ such that the covariance matrix of $f'$ may be estimated with uncertainty ellipsoids for a given probability and may be used to readjust elements in the stream of data. The processor may use methods such Gauss-Newton method, Levenberg-Marquardt method, or other methods. In some embodiments, the user may use an image sensor of a communication device (e.g., cell phone, tablet, laptop, etc.) to capture images and/or video of the surroundings for generating a spatial representation of the environment. For example, images and/or videos of the walls and furniture and/or the floor of the environment. In some embodiments, more than one spatial representation may be generated from the captured images and/or videos. In such embodiments, the robot requires less equipment and may operate within the environment and only localize. For example, with a spatial representation provided, the robot may only include a camera and/or TOF sensor to localize within the map.

In some embodiments, the processor may use an extended Kalman filter such that correspondences are incrementally updated. This may be applied to both depth readings and feature readings in scenarios wherein the FOV of the robot is limited to a particular angle around the 360 degrees perimeter of the robot and scenarios wherein the FOV of the robot encompasses 360 degrees through combination of the FOVs of complementary sensors positioned around the robot body or by a rotating LIDAR device. The SLAM algorithms used by the processor may use data from solid state sensors of the robot and/or a 360 degrees LIDAR with an internally rotating component positioned on the robot. The FOV of the robot may be increased by mechanically overlapping the FOV of sensors positioned on the robot. FIG. 77A illustrates an example of overlapping FOVs 7700 of cameras 7701 positioned on the robot 7702. The overlap of FOVs 7700 extends the horizontal FOV of the robot 7702. FIG. 77B illustrates an example of overlapping FOVs 7703 of cameras 7704 positioned on the robot 7702. The overlap of FOVs 7703 extends the vertical FOV of the robot 7702. In some cases, the robot includes a set of sensors that are used concurrently to generate data with improved accuracy and more dimensions. FIG. 77C illustrates the robot 7702 including a two-dimensional LIDAR 7705 and a camera 7706, which when used in tandem generates three-dimensional data 7707.

In some embodiments, the processor connects two or more sensor inputs using a series of techniques such as least squares methods. For instance, the processor may integrate new sensor readings collected as the robot navigates within the environment into the map of the environment to generate a larger map with more accurate localization. The processor may iteratively optimize the map and certainty of the map increases as the processor integrates mores perception data. In some embodiments, a sensor may become inoperable or damages and the processor may cease to receive usable data from the sensor. In such cases, the processor may use data collected by one or more other sensors of the robot to continue operations in a best effort manner until the sensor becomes operable, at which point the processor may relocalize the robot.

In some embodiments, the processor combines new sensor data corresponding with newly discovered areas to sensor data corresponding with previously discovered areas based on overlap between sensor data. FIG. 78A illustrates a workspace 7800. Area 7801 is the mapped area, area 7802 is the area that has been covered by the robot, and area 7803 is the undiscovered area. After covering area 7802, the processor of the robot may cease to receive information from a sensor used in SLAM at a location 7804. The processor may use sensor data from other sensors to continue operation. The sensor may become operable again and the processor may begin receiving information from the sensor at a location 7805, at which point the processor observes a different part of the workspace 7800 than what was observed at location 7804. FIG. 78B illustrates the workspace 7800, area observed by the processor 7806, remaining undiscovered area 7803, and unseen area 7807. The area of overlap 7808 between the mapped areas 7801 and the area observed 7806 may be used by the processor to combine sensor data from the different areas and relocalize the robot. The processor may use least square method, local or global search methods, or other methods to combine information corresponding to different areas of the workspace 7800. In some cases, the processor may not immediately recognize any overlap between previously collected sensor data and newly observed sensor data. For example, FIG. 79 illustrates a position of the robot at a first time point t0 and second time point t1. A LIDAR of the robot becomes impaired at second time point t1, at which point the processor has already observed area 7900. The robot continues to operate after the impairment of the sensor. At a third time point t2, the sensor becomes operable again and observes area 7901. In this example, other sensory information was impaired and/or was not enough to maintain localization of the robot due minimal amount of data collected prior to the sensor becoming impaired and the extended time and large space traveled by the robot after impairment of the sensor. The area 7901 observed by the processor appears different than the workspace previously observed in area 7900. Despite that, the robot continues to operate from the location at third time point t2 and sensors continue to collect new information. At a particular point, the processor recognizes newly collected sensor data that overlaps with sensor data corresponding to area 7900 and integrates all the previously collected data with the sensor data corresponding with area 7901 at overlapping points such that there are no duplicate areas in the most updated map.

In some cases, the sensors may not observe an entire space due to a low range of the sensor, such as a low range LIDAR, or due to limited FOV, such as limited FOV of a solid state sensor or camera. The amount of space observed by a sensor, such as a camera, of the robot may also be limited in point to point movement. The amount of space observed by the sensor in coverage applications is greater as the sensors collect data as the robot drives back and forth throughout the space. FIG. 80 illustrates an example of areas 8000 and 8001 observed by a processor of the robot with a covered camera of the robot at different time points. The camera cannot observe a backside of the robot and the FOV does not extend to a distance. However, once the processor recognizes new sensor data that corresponds with an area that has been previously observed, the processor may integrate the newly collected sensor readings with the previously collected sensor readings at overlapping points to maintain the integrity of the map.

In some embodiments, the processor integrates two consecutive sensor readings. In some embodiments, the processor sets soft constraints on the position of the robot in relation to the sensed data. As the robot moves, the processor adds motion data and sensor measurement data. In some embodiments, the processor approximates the constraints using maximum likelihood to obtain relatively good estimates. In some embodiments, the processor applies the constraints to depth readings at any angular resolution or subset of the environment, such a feature detected in an image. In some embodiments, a function comprises the sum of all constraints accumulated to the moment and the processor approximates the maximum likelihood of the robot path and map by minimizing the function. In cases wherein depth data is used, there are more constraints and data to handle. Depth readings taken at higher angular resolution result in a higher density of data.

In some embodiments, the processor may execute a sparsification process wherein one or a few features are selected from a FOV to represent an entirety of the data collected by the sensor. FIG. 81 illustrates an example of sparsification. The sensor of the robot captures measurements 8101 at a first location 8102 and a second location 8103. The processor uses one constraint 8104 from each of the measurements 8101 captured from the first and second locations 8102 and 8103, respectively. This may be beneficial as using many constraints in between the constraints 8104 results in high density network. In embodiments, sparsification may be applied to various types of data.

In some cases, newly collected data does not carry enough new information to justify processing the data. For instance, when the robot is stationary a camera of the robot captures images of a same location, in which case the images provide redundant information. Or in another example, the robot may execute a rotational or translational displacement much slower than the frames per second of an image sensor, in which case immediately consecutive images may not provide meaningful change in the data collected. However, every few images capture may provide meaningful change in the data captured. In some embodiments, the processor analyzes a captured image and only processes and/or stores the image when the image provides a meaningful difference in information in comparison to the prior image processed and/or stored. In some embodiments, the processor may use Chi square test in making such determinations.

In some embodiments, the processor of the robot combines data collected from a far-sighted perception device and a near-sighted perception device for SLAM. In some embodiments, the processor combines the data from the two different perception devices at overlapping points in the data. In some embodiments, the processor combines the data from the two different perception devices using methods that do not require overlap between the sensed data. In some embodiments, the processor combines depth perception data with image perception data.

In some embodiments, a neural network may be trained on various situations instead of using look up tables to obtain better results at run time. However, regardless of how well the neural networks are trained, during run time the robot system increases its information and learns on the job. In some embodiments, the processor of the robot makes decisions relating to robot navigation and instructs the robot to move along a path that may be (or may not be) the most beneficial way for the robot to increase its depth confidences. In embodiments, motion may be determined based on increasing confidences of enough number of pixels which may be achieved by increasing depth confidences. In embodiments, the robot may at the same time execute higher level tasks. This is yet another example of exploitation versus exploration.

In some embodiments, exploration is seamless or may be minimal in a coverage task (e.g., the robot moves from point A to B without having discovered the entire floor plan), as is the case in in the point navigation and spot coverage features implemented in QSLAM. FIG. 82 illustrates a robot 8200 tasked to navigate from point A to point B without the processor knowing (i.e., discovering) the entire map. A portion of the map is known to the processor of the robot while the rest is unknown. In another example, a trash can robot may never have to explore the entire yard. With some logic, the processor of the robot may balance learning depth values (which in turn may be used in the map) corresponding to pixels and executing higher level tasks. In embodiments, generating the map is a higher level task than finding depth values corresponding to pixels. For example, the current depth values and confidences may be sufficient to build a map.

In some embodiments, a neural network version of the MDP may be used in generating a map, or otherwise, a reinforcement neural learning method. In embodiments, different navigational moves provide different amounts of information to the processor of the robot. For example, transitional movement and angular movement do not provide the same amount of information to the processor. FIG. 83 illustrates a robot 8300 and its trajectory 8301 (past location and possible future locations) within an environment with objects 8302 (e.g., TV, coffee table, sofa) at different depths from the robot 8300. As the robot 8300 moves along its trajectory 8301 these objects 8302 may block one another depending on a POV of the robot 8301. FIG. 84 illustrates POVs 8400 of the robot at different time stamps and measured points 8401 and their confidence levels 8402. As the robot moves, measured points with low confidence are inferred by the processor of the robot and new measured points with high confidence are added to the data set. After a while, readings of different depths with high confidence are obtained. In embodiments, the processor of the robot uses sensor data to obtain distances to obstacles immediately in front of the robot. In some embodiments, the processor fails to observe objects beyond a first obstacle. However, in transition towards a front, left, right, or back direction, occluded objects may become visible.

Since the processor integrates depth readings over time, all methods and techniques described here for data used in SLAM apply to depth readings. For example, the same motion model used in explaining the reduction of certainties of distance between the robot and objects may be used for the reduction of certainties in depth corresponding to each pixel. In some embodiments, the processor models the accumulation of data iteratively and uses models such as Markov Chain and Monte Carlo. In embodiments, a motion model may reduce the certainties of previously measured points while estimating their new values after displacement. In embodiments, new observations may increase certainties of new points that are measured. Note that, although the depth values per pixel may be used to eventually map the environment, they do not necessarily have to be used for such purposes. This use of the SLAM stack may be performed at a lower level, perhaps at a sensor level. The output may be directly used for upstream SLAM or may first be turned into metric numbers which are passed on to a yet another independent SLAM subsystem. Therefore, the framework of integrating measurements over a time period from different perspectives may be used to accumulate more meaningful and more accurate information. FIG. 85 illustrates SLAM used and implemented at different levels, combined with each other or independently. FIG. 86 illustrates accumulated readings 8600 used to form a map 8601 and accumulated readings 8602 used to form depth images 8603.

In some embodiments, the robot may extract an architectural plan of the environment based on sensor data. For example, the robot may cover an interior space and extract an architectural plan of the space including architectural elements. FIG. 87A-87C illustrate an interior mapping robot 8700 comprising a 360-degree camera 8701 for capturing an environment, LIDAR 8702 for both navigation and generating a 3D model of the environment, front camera and structured light 8703, processor 8704, main PCB 8705, front sensor array positioned behind sensor window 8706 used for obstacle detection, battery 8707, drive wheels 8708, caster wheels 8709, rear depth camera 8710, and rear door 8711 to access the interior of the robot (e.g., for maintenance).

In some embodiments, the processor of the robot may generate architectural plans based on SLAM data. For instance, in addition to the map the processor may locate doors and windows and other architectural elements. In some embodiments, the processor may use the SLAM data to add accurate measurement to the generated architectural plan. In some embodiments, a portion of this process may be executed automatically using, for example, a software that may receive main dimensions and architectural icons (e.g., doors, windows, stairs, etc.) corresponding to the space as input. In some embodiments, a portion of the process may be executed interactively by a user. For example, a user may specify measurements of a certain area using an interactive ruler to measure and insert dimensions into the architectural plan. In some embodiments, the user may also add labels and other annotations to the plan. In some embodiments, computer vision may be used to help with the labeling. For instance, the processor of the robot may recognize cabinetry, an oven, and a dishwasher in a same room and may therefore assume and label the room as the kitchen. Bedrooms, bathrooms, etc. may similarly be identified and labelled. In some embodiments, the processor may use history cubes to determine elements with direction. For example, directions that doors open may be determined using images of a same door at various time stamps. FIG. 88A illustrates a map 8800 generated using SLAM. FIG. 88B illustrates an architectural plan 8801 generated by combination of the generated map 8800 and computer vision. A history cube 8802 may be used by the processor to identify a door 8803 and its opening direction. FIG. 88C additional data added to the map by a user or the processor, including labels for each room, specific measurement, notes, etc.

In some embodiments, the processor generates a 3D model of the environment using captured sensor data. In some embodiments, the process of generating a 3D model based on point cloud data captured with a LIDAR or other device (e.g., depth camera) comprises obtaining a point cloud, optimization, triangulation, and optimization (decimation). This process of generating a 3D model is illustrated in FIG. 89. In a first step of the process, the cloud is optimized and duplicate or unwanted points are removed. Then, in a second step, a triangulated 3D model is generated by connecting each nearby three points to form a face. These faces form a high poly count model. In a third step, the model is optimized for easier storing, viewing, and further manipulation. Optimizing the model may be done by combining small faces (i.e., triangles) to larger faces using a given variation threshold. This may significantly reduce the model size depending on the level of detail. For example, the face count of a flat surface from an architectural model (e.g., a wall) may be reduced from millions of triangles to only two triangles defined by only four points. Noe that in this method, the size of triangles depends on the size of flat surfaces in the model. This is important when the model is represented with color and shading by applying textures to the surfaces.

In some embodiments, the processor applies textures to the surfaces of faces in the model. To do so, the processor may define a texture coordinate for each surface to help with applying a 2D image to a 3D surface. The processor defines where each point in the 2D image space is mapped onto the 3D surface. An example of this is illustrated in FIG. 90, wherein textures 1, 2, and 3 in the 2D image 9000 are mapped to the 3D surface model 9001 resulting in 2D and 3D models 9002 and 9003 with texture. This way, the processor may save the texture file separately and load it whenever it is needed. Further, the processor may add or swap different textures based on the generated coordinate system. In some embodiments, the processor may generate texture for the 3D model by using the color data of the point cloud (if available) and interpolating between them to fill the surface. Although each point in the cloud may have an RGB value assigned to it, it is not necessary to account for all of them to generate the 3D model texture. After optimization of the model and generating texture coordinates for each surface, the processor may generate the texture using images captured by a standard camera positioned on the robot while navigating along a path by projecting them on the 3D model. FIG. 91 illustrates a 3D model 9100 and an image 9101 captured in the environment projected onto the 3D model 9100.

In some embodiments, the processor executes projection mapping. In some embodiments, the processor may project an image captured from a particular angle within the environment from a similar angle and position within the 3D model such that pixels of the projected image fall in a correct position on the 3D model. In some embodiments, lens distortion may be present, wherein images captured within the environment have some lens distortion. In some embodiments, the processor may compensate for the lens distortion before projection. For instance, FIG. 92 illustrates pixel distortions 9200 and 9201 of images 9202 and 9203, respectively. Their distortions are compensated for, resulting in corrected pixel distortion 9204 and image 9205. In some embodiments, projection distortion may be present, wherein depending on an angle of projection and an angle of the surface on which the image is projected, there may be some distortion resulting in the projected image being squashed or stretched in some places. FIG. 93 illustrates an example of an image of the environment, and portions of the image that were squashed and stretched. This may result in inconsistency of the details on the projected image. To avoid this issue, the processor may use images captured from an angle perpendicular (or close to perpendicular) from the surface on which the image is projected. Alternatively, or in addition, the processor may use multiple image projections from various angles and take an average of the multiple images to obtain the end result. For example, FIG. 94 illustrates a dependency of pixel distortion of an image on an angle of a FOV 9400 of a camera 9401 relative to the 3D surface captured in the image.

In some embodiments, the processor may use texture baking. In some embodiments, the processor may use the generated texture coordinates for each surface to save the projected image in a separate texture file and load it onto the model when needed. FIG. 95 illustrates an example of a 3D model with no texture and the 3D model with texture loaded onto the model. Although the proportions of the texture are related to the texture coordinates, the size of the texture may vary, wherein the texture may be saved in smaller or larger resolution. This may be useful for representation of the model in the application or for other devices. In embodiments, the texture may be saved in various resolutions and depending on the size of the model in the viewport (i.e., its distance from the camera) a texture with different levels of detail may be loaded onto the model. For example, for models further away from the camera, the processor may load a texture with lower level of details and as the model becomes closer to the camera, the processor may switch the texture to a higher level of details. FIG. 96 illustrates a model 9600 further away from a camera comprising texture with low level of details and a model 9601 closer to the camera comprising texture with a high level of details.

In some embodiments, a 3D model (environment) may be represented on a 2D display by defining a virtual camera within the 3D space and observing the model through the virtual camera. The virtual camera may include properties of the real camera, such as position and orientation defined by a point coordinate and a direction vector and lens and focal point which together define the perspective distortion of the resulting images. With zero distortion, an orthographic view of the model is obtained, wherein objects remain a same size regardless of their distance from the camera. Orthographic views may appear unrealistic, especially for larger models, however, they are useful for measuring and giving an overall understanding of the model. Examples of orthographic views include isometric, dimetric, and trimetric, as illustrated in FIG. 97. As the orientation of the camera (and therefore the viewing plane) changes, these orthographic views may be converted from one to another. In some embodiments, an oblique projection may be used. In embodiments, an oblique projection may appear even less realistic compared to orthographic projection. With oblique projection, each point of the model is projected onto the viewing plane using parallel lines, resulting in an uneven distortion of the faces depending on their angle with the viewing plane. Examples of oblique projections include cabinet, cavalier, and military, as illustrated in FIG. 98.

In embodiments, a perspective projection of the model may be closest to the way humans observe the environment. In this method, objects further from the camera (viewing plane) may appear distorted depending on the angle of lines and the type of perspective. With perspective projection, parallel lines converge to a single point, the vanishing point. The vanishing point is positioned on a virtual line, the horizon line, related to a height and orientation of the camera (or viewing plane). FIG. 99 illustrates an example of vanishing points on a horizon line. One point perspective consists of one vanishing point and a horizon line. For example, FIG. 100A illustrates a vanishing point 10000 and a horizon line 10001. In this method, all the lines on a plane parallel to the viewing plane are scaled as they extend further backwards but do not converge. Convergence only happens in the depth dimension, i.e., two points perspective comprising two vanishing points and a horizon line. For example, FIG. 100B illustrates vanishing points 10002 and a horizon line 10003. In this method, all the parallel lines except the vertical lines converge. These types of perspectives first emerged as drawing techniques and are therefore defined by the orientation of the subject in relation to the viewing plane. For instance, in one point perspective, one face of the subject is always parallel to the viewing plane and in two points perspectives, one axis of the subject (usually the height axis) is always parallel to the viewing plane. Therefore, if the object is rotated, the perspective system changes. In fact, in two points perspectives, there may be more than two vanishing points. In FIG. 101, cubes 1, 2, and 3 are in a same orientation and their parallel lines converge to vanishing points VP1 and VP2, while cubes 4, 5, and 6 are in a different orientation and their parallel lines converge to vanishing points VP3 and VP4, all vanishing points lying on horizon 10100. Three points perspectives may be defined by at least three vanishing points, two of them on the horizon line and the third for converging the vertical lines. This is illustrated in FIG. 102, wherein vanishing points VP1 and VP2 are on horizon line 10200 while vanishing point VP3 is where vertical lines converge. In embodiments, three points perspectives may be used to represent 3D models as it is easier to understand by viewers, despite it being different from how humans perceive the environment. While humans may observe the world in a curvilinear fashion (due to the structure of eyes), the brain may correct the curves subconsciously and turn them back into lines. The same thing occurs with lens distortion of a camera, wherein lens distortion is corrected to some extent within the lens and camera by using complex lens systems and by post processing. FIG. 103 illustrates an example of a distorted lens 10300 that is corrected to 10301 with reduced distortion.

In some embodiments, the 3D model of the environment may be represented using textures and shading. In some embodiments, one or more ambient light may be present in the scene to illuminate the environment, creating highlights and shadows. For example, the SLAM system may recognize and locate physical lights within the environment and those lights may be replicated within the scene. In some embodiments, the use of a high dynamic range (HDR) image as an environment map may be used to light the scene. This type of map may be projected on a dome, half dome, or a cylinder including more ranges of bright and dark values in pixels. FIG. 104 illustrates an example of a map 10400 projected onto dome 10401 and includes bright areas on the HDR map. The bright areas of the map may be interpreted as light sources and illuminate the scene. Although the lighting with this method may not be physically accurate, it is acceptable through a viewer's eyes. In some embodiments, the 3D model of the environment may be represented using shading by applying the same lighting methods described above. However, instead of having textures on surfaces, the model is represented by solid colors (e.g., light grey). For example, FIG. 105 illustrates a map represent by solid color. This style of representation may be helpful in showing the geometry of the 3D model without the distraction of texture. The color of the model may be changed using the application of the communication device.

In some embodiments, the 3D model may be represented using a wire frame, wherein the model is represented by lines connecting vertices. FIG. 106 illustrates examples of maps represented by wire frame. This type of representation may be faster at generating, however, the 3D model may be too difficult to see and understand for more complicated 3D models. One method that may be used to improve the readability or understanding of the wire frame includes omitting lines of the surfaces facing backwards (i.e., away from the camera) or surfaces behind other faces, otherwise known as back face cooling. FIG. 107 illustrates a wire frame example with backface cooling and solid shading.

In some embodiments, the 3D model may be represented using a flat shading representation. This style is similar to the shading style but without highlights and shadows, resulting in flat shading. Flat shading may be used for representing textures and showing dark areas in regular shading. FIG. 108 illustrates an example of a map modeled using flat shading. In some embodiments, flat shading with outlines may be used to represent the 3D model. With flat shading, it may become difficult to observe surface breaks, edges, and corners. Flat shading with outlines introduces a layer of outlines to the represented 3D model. The processor of the robot may determine where to put a line and a thickness of the line based on an angle of two connecting or intersecting surfaces. In some embodiments, the processor may determine the thickness of the line in 3D environment units, wherein lines are narrower as they get further away from the camera In some embodiments, the processor may determine the thickness of the line in 2D screen units (i.e., pixels), which results in a more coherent outline independent of the depth. FIG. 109 illustrates examples of a map modeled as flat with outlines using 2D screen units and 3D environment units. When using 2D screen unit lines are more coherent, whereas in using 3D environment units line thicknesses vary.

In a 2D representation of the environment, various elements may be categorized in separate layers. This may help in assigning different properties to the elements, hiding and showing the elements, or using different blending modes to define their relation with the layers below them. In a 2D representation of the environment order of the layers is important (i.e., it is important to know which layer is on top and which one is on the bottom) as the relations defined between the layers are various operational procedures and changing the order of the layer may change the output result. Further, with a 2D representation of the environment, the order of layers defines which pixel of each layer should be shown or masked by the pixels of the layers on top of it. In some embodiments, a 3D representation of the environment may include layers as well. However, layers in a 3D model are different from layers in a 2D representation. In 3D, the processor may categorize different objects in separate layers. In a 3D model, the order of layers is not important as positions of objects are defined in 3D space, not by their layer position. In embodiments, layers in a 3D representation of the environment are useful as the processor may categorize and control groups of objects together. For example, the processor may hide, show, change transparency, change render style, turn shadows on or off, and many more modifications of the objects in layers at a same time. For example, in a 3D representation of a house objects may be included in separate 3D layers. Architectural objects, such as floors, ceilings, walls, doors, windows, etc., may be included in the base layer. Furniture and other objects, such as sofas, chairs, tables, TV, etc., may be included in first separate layer. Augmented annotations added by robot, such as such obstacles, difficult zones, covered areas, planned and executed paths, etc. may be included in a second separate layer. Augmented annotations that are added by users, such as no go zones, room labels, deep covering areas, notes, pictures, etc., may be included in a third separate layer. Augmented annotations added from later processing, such as room measurements, room identifications, etc., may be included in a fourth separate layer. Augmented annotations or objects generated by the processor or added from other sources, such as piping, electrical map, plumbing map, etc., may be included in a fifth separate layer. In embodiments, users may use the application to hide, unhide, select, freeze, and change the style of each layer separately. This may provide the user with a better understanding and control over the representation of the environment.

In embodiments, the 3D model may be observed by a user using various navigation modes. One navigation mode is dollhouse. This mode provides an overview of the 3D modelled environment. This mode may start (but does not have to) as an isometric or dimetric orthographic view and may turn into other views as the user rotates the model. Dollhouse mode may also be in three points perspective but usually with a narrower lens and less distortion. This view may be useful for showing separate layers in different spaces. For example, the user may shift the layers in the vertical axis to show their alignments. Another mode is walkthrough mode, wherein the user may explore the environment virtually on the application or website using a VR headset. A virtual camera may be placed within the environment and may represent the eyes of the viewer. The camera may move to observe the environment as the user virtually navigates within the environment. Depending on the device, different navigation methods may be defined to navigate the virtual camera.

On the mobile application navigation may be touch based, wherein holding and dragging may be translated to camera rotation. For translation, users may double tap on a certain point in the environment to move the camera there. There may be some hotspots placed within the environment to make navigation easier. Navigation may use the device gyroscope. For example, the user may move through the 3D environment by where they hold the device, wherein the position and orientation of the device may be translated to position and orientation of the virtual camera. The combination of these two methods may be used with mobile devices. For example, the user may use dragging and swiping gestures for translation of the virtual camera and rotation of the mobile phone to rotate the virtual camera. On a website (i.e., desktop mode), the user may use the keyboard arrows to navigate (i.e., translate) and the mouse to rotate the camera. In a VR, mixed reality (MR) model, the user wears a headset and as the user moves or turns their head, their movements are translated to movements of the camera.

Similar to walkthrough mode, in explore mode, there is a virtual camera within the environment, however, navigation is a bit different. In explore mode, the user uses the navigation method to directly move the camera within the environment. For example, with an application of mobile device, the user may touch and drag to move the virtual camera up and down, swipe up or down to move the camera forward or backwards, and use two fingers to rotate the camera. In desktop mode, the user may use the left mouse button to drag the camera, right mouse button to rotate the camera, and middle mouse button to zoom or change the FOV of the camera. In VR, MR mode, the user may move the camera using hand movements or gestures. Replay mode is another navigation mode users may use, wherein a replay of the robot's coverage in 3D may be viewed. In this case, a virtual camera is moves along the paths the robot has already completed. The user has some control over the replay by forwarding, rewinding, adjusting a speed, time jumping, playing, pausing, or even changing the POV of the replay. For example, if sensors of the robot are facing forward as the robot completes the path, during the replay, the user may change their POV such that they face towards the sides or back of the robot while the camera still follows along the path of the robot.

In some embodiments, the processor stores data in a data tree. FIG. 110 illustrates a map 11000 generated by the processor during a current work session. Portion 11001 is yet to be discovered by the robot. Various previously generated maps are stored in a data tree 11002. Data tree 11002 may store maps of a first floor in branch 11003, a second floor in branch 11004, a third floor in branch 11005, and unclassified maps in branch 11006. Several maps may be stored for each floor. For instance, for the first floor, there are first floor maps X07 from a first work session, a second work sessions, and so on. In some embodiments, a user notifies the processor of the robot of the floor on which the robot is positioned using an application paired with the robot, a button or the like positioned on the robot, a user interface of the robot, or other means. For example, the user may use the application to choose a previously generated map corresponding with the floor on which the robot is positioned or may choose the floor from a drop down menu or list. In some embodiments, the user may use the application to notify the processor that the robot is positioned in a new environment or the processor of the robot may autonomously recognize it is in a new environment based on sensor data. In some embodiments, the processor performs a search to compare current sensor observations against data of previously generated maps. In some embodiments, the processor may detect a fit between the current sensor observations and data of a previously generated map and therefore determine the area in which the robot is located. However, if the processor cannot immediately detect the location of the robot, the processor builds a new map while continuing to perform work. As the robot continues to work and moves within the environment (e.g., translating and rotating), the likelihood of the search being successful in finding a previous map that fits with the current observations increases as the robot may observe more features that may lead to a successful search. The features observed at a later time may be more pronounced or may be in a brighter environment or may correspond with better examples of the features in the database.

In some embodiments, the processor immediately determines the location of the robot or actuates the robot to only execute actions that are safe until the processor is aware of the location of the robot. In some embodiments, the processor uses the multi-universe method to determine a movement of the robot that is safe in all universes and causes the robot to be another step closer to finishing its job and the processor to have a better understanding of the location of the robot from its new location. The universe in which the robot is inferred to be located in is chosen based on probabilities that constantly change as new information is collected. In cases wherein the saved maps are similar or in areas where there are no features, the processor may determine that the robot has equal probability of being located in all universes.

In some embodiments, the processor stitches images of the environment at overlapping points to obtain a map of the environment. In some embodiments, the processor uses least square method in determining overlap between image data. In some embodiments, the processor uses more than one method in determining overlap of image data and stitching of the image data. This may be particularly useful for three-dimensional scenarios. In some embodiments, the methods are organized in a neural network and operate in parallel to achieve improved stitching of image data. Each method may be a neuron in the neural network contributing to the larger output of the network. In some embodiments, the methods are organized in layers. In some embodiments, one or more methods are activated based on large training sets collected in advance and how much the information provided to the network (for specific settings) matches the previous training sets.

In some embodiments, the processor trains a camera based system. For example, a robot may include a camera bundled with one or more of an OTS, encoder, IMU, gyro, one point narrow range TOF sensor, etc., and a three- or two-dimension LIDAR for measuring distances as the robot moves. FIG. 111A illustrates a robot 11100 including a camera 11101, LIDAR 11102, and one or more of an OTS, encoder, IMU, gyro, and one point narrow range TOF sensor. 11103 is a database of LIDAR readings which represent ground truth. 11104 is a database of sensor readings taken by the one or more of OTS, encoder, IMU, gyro, and one point narrow range TOF sensor. The processor of the robot 11100 may associate the readings of database 11103 and 11104 to obtain associated data 11105 and derive a calibration. In some embodiments, the processor compares the resulting calibration with the bundled camera data and sensor data (taken by the one or more of OTS, encoder, IMU, gyro, and one point narrow range TOF sensor) 11106 after training and during runtime until convergence and patterns emerge. Using two or more cameras or one camera and a point measurement may improve results.

In embodiments, the robot may be instructed to navigate to a particular location, such as a location of the TV, so long as the location is associated with a corresponding location in the map. In some embodiments, a user may capture an image of the TV and may label the TV as such using the application paired with the robot. In doing so, the processor of the robot is not required to recognize the TV itself to navigate to the TV as the processor can rely on the location in the map associated with the location of the TV. This significantly reduces computation. In some embodiments, a user may use an application paired with the robot to tour the environment while recording a video and/or capturing images. In some embodiments, the application may extract a map from the video and/or images. In some embodiments, the user may use the application to select objects in the video and/or images and label the objects (e.g., TV, hallway, kitchen table, dining table, Ali's bedroom, sofa, etc.). The location of the labelled objects may then be associated with a location in the two-dimensional map such that the robot may navigate to a labelled object without having to recognize the object. For example, a user may command the robot to navigate to the sofa so the user can begin a video call. The robot may navigate to the location in the two-dimensional map associated with the label sofa.

In some embodiments, the robot navigates around the environment and the processor generates map using sensor data collected by sensors of the robot. In some embodiments, the user may view the map using the application and may select or add objects in the map and label them such that particular labelled objects are associated with a particular location in the map. In some embodiments, the user may place a finger on a point of interest, such as the object, or draw an enclosure around a point of interest and may adjust the location, size, and/or shape of the highlighted location. A text box may pop up and the user may provide a label for the highlighted object. Or in another implementation, a label may be selected from a list of possible labels. Other methods for labelling objects in the map may be used.

In some embodiments, the robot captures a video of the environment while navigating around the environment. This may be at a same time of constructing the map of the environment. In embodiments, the camera used to capture the video may be a different or a same camera as the one used for SLAM. In some embodiments, the processor may use object recognition to identify different objects in the stream of images and may label objects and associate locations in the map with the labelled objects. In some embodiments, the processor may label dynamic obstacles, such as humans and pets, in the map. In some embodiments, the dynamic obstacles have a half life that is determine based on a probability of their presence. In some embodiments, the probability of a location being occupied by a dynamic object and/or static object reduces with time. In some embodiments, the probability of the location being occupied by an object does not reduce with time when they are fortified with new sensor data. In such cases, a location in which a moving person was detected and eventually moved away from reduces to zero. In some embodiments, the processor uses reinforcement learning to learn a speed at which to reduce the probability of the location being occupied by the object. For example, after initialization at a seed value, the processor observes whether the robot collides with vanishing objects and may decrease a speed at which the probability of the location being occupied by the object is reduced if the robot collides with vanished objects. With time and repetition this converges for different settings. Some implementations may use deep/shallow or atomic traditional machine learning or Markov decision process.

Figure 112A:
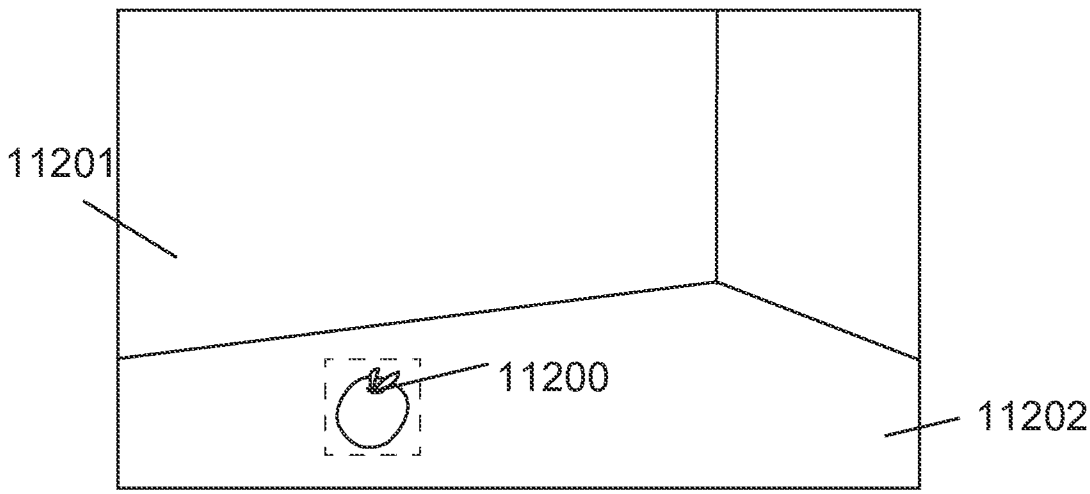
Figure 112B:
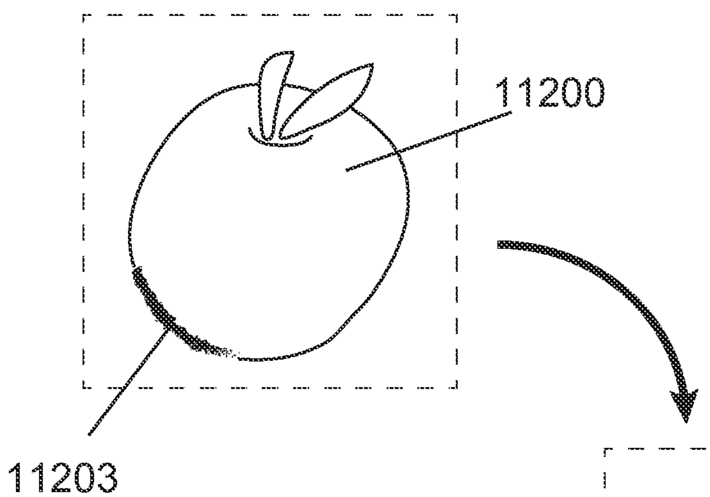
Figure 112C:
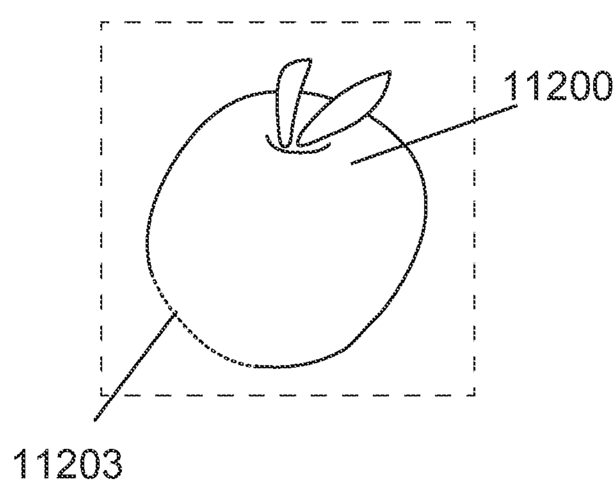
Figure 112D:
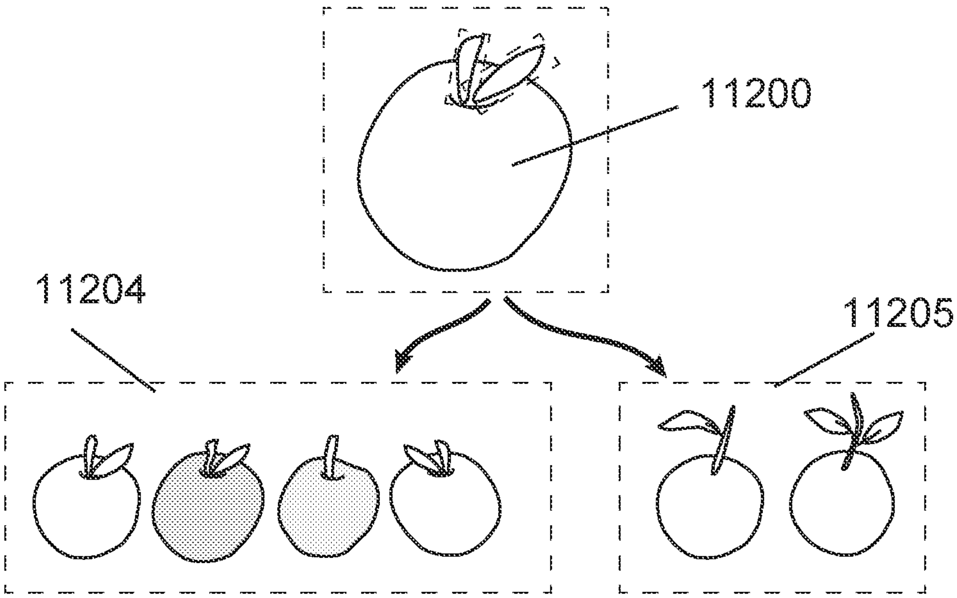

In some embodiments, the processor of the robot may perform segmentation wherein an object captured in an image is separated from other objects and the background of the image. In some embodiments, the processor may alter the level of lighting to adjust the contrast threshold between the object and remaining objects and the background. For example, FIG. 112A illustrates an image of an object 11200 and a background of the image including walls 11201 and floor 11202. The processor of the robot may isolate object 11200 from the background of the image and perform further processing of the object 11200. In some embodiments, the object separated from the remaining objects and background of the image may include imperfections when portions of the object are not easily separated from the remaining objects and background of the image. For example, FIG. 112B illustrates an imperfection 11203 on a portion of object 11200 that was difficult to separate from the background of the image. In some embodiments, the processor may repair the imperfection based on a repair that most probably achieves the true of the particular object or by using other images of the object captured by the same or a second image sensor or captured by the same or the second image sensor from a different location. For instance, FIG. 112C illustrates the object 11200 after imperfection 11203 is repaired by the processor. In some embodiments, the processor identifies characteristics and features of the extracted object. In some embodiments, the processor identifies the object based on the characteristics and features of the object. Characteristics of the object 11200, for example, may include shape, color, size, presence of a leaf, and positioning of the leaf. Each characteristic may provide a different level of helpfulness in identifying the object 11200. For instance, the processor of the robot may determine the shape of object 11200 is round, however, in the realm of foods, for example, this characteristic only narrows down the possible choices as there are multiple round foods (e.g., apple, orange, kiwi, etc.). For example, FIG. 112D illustrates the object 11200 narrowed down based on shape, leaving two possible options 11204 and 11205 of the object type of object 11200. The list may further be narrowed by another characteristic such as the size or color or another characteristic of the object.

In some cases, the object may remain unclassified or may be classified improperly despite having more than one image sensor for capturing more than one image of the object from different perspectives. In such cases, the processor may classify the object at a later time, after the robot moves to a second position and captures other images of the object from another position. FIG. 113A illustrates an image of two objects 11300 and 11301. If the processor of the robot is not able to extract and classify object 11300, the robot may move to a second position and capture one or more images from the second position. FIG. 113B illustrates two possible images 11302 and 11303 from the second position. In some cases, as in 11302, the image from the second position may be better for extraction and classification, while in other cases, as in 11303, the image from the second position may be worse. In the latter case, the robot may capture images from a third position. As illustrated, objects appear differently from different perspectives. For example, FIG. 114 illustrates an image sensor of a robot capturing image 11400 and 11401 of an object 11402 from two different perspectives. In image 11400, the image sensor observes the object 11402 from bottom to top while in image 11401 the image sensor observes the object 11402 straight on.

In some embodiments, the processor chooses to classify an object or chooses to wait and keep the object unclassified based on the consequences defined for a wrong classification. For instance, the processor of the robot may be more conservative in classifying objects when a wrong classification results in an assigned punishment, such as a negative reward. In contrast, the processor may be liberal in classifying objects when there are no consequences of misclassification of an object. In some embodiments, different objects may have different consequences for misclassification of the object. For example, a large negative reward may be assigned for misclassifying pet waste as an apple. In some embodiments, the consequences of misclassification of an object depends on the type of the object and the likelihood of encountering the particular type of object during a work session. The chances of encountering a sock, for example, is much more likely than encountering pet waste during a work session. In some embodiments, the likelihood of encountering a particular type of object during a work session is determined based on a collection of past experiences of at least one robot, but preferably, a large number of robots. However, since the likelihood of encountering different types of objects varies for different dwellings, the likelihood of encountering different types of objects may also be determined based on the experiences of the particular robot operating within the respective dwelling.

In some embodiments, the processor of the robot may initially be trained in classification of objects based on a collection of past experiences of at least one robot, but preferably, a large number of robots. In some embodiments, the processor of the robot may further be trained in classification of objects based on the experiences of the robot itself while operating within a particular dwelling. In some embodiments, the processor adjusts the weight given to classification based on the collection of past experiences of robots and classification based on the experiences of the respective robot itself. In some embodiments, the weight is preconfigured. In some embodiments, the weight is adjusted by a user using an application of a communication device paired with the robot. In some embodiments, the processor of the robot is trained in object classification using user feedback. In some embodiments, the user may review object classifications of the processor using the application of the communication device and confirm the classification as correct or reclassify an object misclassified by the processor. In such a manner, the processor may be trained in object classification using reinforcement training.

In some embodiments, the processor may determine a generalization of an object based on its characteristics and features. For example, FIG. 115 illustrates a generalization of pears 11500 and tangerines 11501 based on size and roundness (i.e., shape) of the two objects. Using the generalization, the processor may assume objects which fall within area 11502 of the graph are pears and those that fall within area 11503 are tangerines. Generalization of objects may vary depending on the characteristics and features considered in forming the generalization. FIG. 116 illustrates various examples of different generalizations. Due to the curse of dimensionality, there is a limit to the number of characteristics and features that may be used in generalizing an object. Therefore, a set of best features that best represents an object is used in generalizing the object. In embodiments, different objects have differing best features that best represent them. For instance, the best features that best represent a baseball differ from the best features that best represent spilled milk. In some embodiments, determining the best features that best represent an object requires considering the goal of identifying the object; defining the object; and determining which features best represent the object. For example, in determining the best features that best represent an apple it is determined whether the type of fruit is significant or if classification as a fruit in general is enough. In some embodiments, determining the best features that best represents an object and the answers to such considerations depends on the actuation decision of the robot upon encountering the object. For instance, if the actuation upon encountering the object is to simply avoid bumping the object, then details of features of the object may not be necessary and classification of the object as a general type of object (e.g., a fruit or a ball) may suffice. However, other actuation decisions of the robot may be a response to a more detailed classification of an object. For example, an actuation decision to avoid an object may be defined differently depending on the determined classification of the object. Avoiding the object may include one or more actions such as remaining a particular distance from the object; wall-following the object; stopping operation and remaining in place (e.g., upon classifying an object as pet waste); stopping operation and returning to the charging station; marking the area as a no-go zone for future work sessions; asking a user if the area should be marked as a no-go zone for future work sessions; asking the user to classify the object; and adding the classified object to a database for use in future classifications.

In some embodiments, a camera of the robot captures an image of an object and the processor determines to which class the object belongs. For example, FIG. 117A illustrates an apple 6000 in a FOV 117001 of a camera of the robot 117002. The camera captures image 117003 of the apple 6000. In some embodiments, a discriminant function $f_i(x)$ is used, wherein $i \in \{1, \ldots, n\}$ and $\omega_i$ represents a class. In some embodiments, the processor uses the function to assign a vector of features to class $\omega_i$ if $f_i(x) > f_j(x)$ for all $j \neq i$. FIG. 117B illustrates the complex function $f(x)$ receiving inputs $x_1, x_2, \ldots, x_n$ of features and outputting the classes $\omega_i, \omega_j, \omega_k, \omega_l, \ldots$ to which the vectors of features are assigned. In some embodiments, the complex function $f(x)$ may be organized in layers, as in FIG. 117C, wherein the function $f(x)$ receives inputs $x_1, x_2, \ldots, x_n$ which is processed through multiple layers 117004, then outputs the classes $\omega_i, \omega_j, \omega_k, \omega_l, \ldots$ to which the vectors of features are assigned. In this case, the function $f(x)$ is in fact $f(f'(f''(x)))$.

In some embodiments, Bayesian decision methods may additionally be used in classification, however, Bayesian methods may not be effective in cases where the probability densities of underlying categories are unknown in advance. For example, there is no knowledge ahead of time on the percentage of soft objects (e.g., socks, blankets, shirts, etc.) and hard objects encountered by the robot (e.g., cables, remote, pen, etc.) in a dwelling. Or there is no knowledge ahead of time on the percentage of static (e.g., couch) and dynamic objects (e.g., person) encountered by the robot in the dwelling. In cases wherein a general structure of properties is known ahead of time, the processor may use maximum likelihood methods. For example, for a sensor measuring an incorrect distance there is knowledge on how the errors are distributed, the kinds of errors there could be, and the probability of each scenario being the actual case.

Without prior information, the processor, in some embodiments, may use a normal probability density in combination with other methods for classifying an object. In some embodiments, the processor determines a one variate continuous density using $$p(x) = \frac{1}{\sqrt{(2\pi\sigma)}}$$

-continued $$\text{expexp}\left[-\frac{1}{2}\left(\frac{(x-\mu)}{\sigma}\right)^2\right],$$

the expected value of x taken over the feature space using $\mu \equiv \varepsilon[x] = \int_{-\infty}^{+\infty} x p(x)dx$, and the variance using $\sigma^2 \equiv \varepsilon[(x-\mu)^2] = \int_{-\infty}^{+\infty} (x-\mu)^2 p(x)dx$. In some embodiments, the processor determines the entropy of the continuous density using $H(p(x)) = -\int p(x) \ln p(x)dx$. In some embodiments, the processor uses error handling mechanisms such as Chernoff bounds and Bhattacharyya bounds. In some embodiments, the processor minimizes the conditional risk using argmin (R(x)). In a multivariate Gaussian distribution, the decision boundary is hyperquadratics and depending on a priori mean and variance, will change form and position.

In some embodiments, the processor may use a Bayesian belief net to create a topology to connect layers of dependencies together. In several robotic applications, prior probabilities and class conditional densities are unknown. In some embodiments, samples may be used to estimate probabilities and probability densities. In some embodiments, several sets of samples, each independent and identically distributed (IID), are collected. In some embodiments, the processor assumes that the class conditional density $p(x|\omega_j)$ has a known parametric form that is identified uniquely by the value of a vector and uses it as ground truth. In some embodiments, the processor performs hypothesis testing. In some embodiments, the processor may use maximum likelihood, Bayesian expectation maximization, or other parametric methods. In embodiments, the samples reduce the learning task of the processor from determining the probability distribution to determining parameters. In some embodiments, the processor determines the parameters that are best supported by the training data or by maximizing the probability of obtaining the samples that were observed. In some embodiments, the processor uses a likelihood function to estimate a set of unknown parameters, such as $\theta$, of a population distribution based on random IID samples $X_1, X_2, \ldots, X_n$ from that said distribution. In some embodiments, the processor uses the Fisher method to further improve the estimated set of unknown parameters.

In some embodiments, the processor may localize an object. The object localization may comprise a location of the object falling within a FOV of an image sensor and observed by the image sensor (or depth sensor or other type of sensor) in a local or global map frame of reference. In some embodiments, the processor locally localizes the object with respect to a position of the robot. In local object localization, the processor determines a distance or geometrical position of the object in relation to the robot. In some embodiments, the processor globally localizes the object with respect to the frame of reference of the environment. Localizing the object globally with respect to the frame of reference of the environment is important when, for example, the object is to be avoided. For instance, a user may add a boundary around a flower pot in a map of the environment using an application of a communication device paired with the robot. While the boundary is discovered by the local frame of reference with respect to the position of the robot, the boundary must also be localized globally with respect to the frame of reference of the environment.

In embodiments, the objects may be classified or unclassified and may be identified or unidentified. In some embodiments, an object is identified when the processor identifies the object in an image of a stream of images (or video)

captured by an image sensor of the robot. In some embodiments, upon identifying the object the processor has not yet determined a distance of the object, a classification of the object, or distinguished the object in any way. The processor has simply identified the existence of something in the image worth examining. In some embodiments, the processor may mark a region of the image in which the identified object is positioned with, for example, a question mark within a circle. FIG. 118 illustrates an example of a region of an image in which an object is positioned marked with a question mark 11800. In embodiments, an object may be any object that is not a part of the room, wherein the room may include at least one of the floor, the walls, the furniture, and the appliances. In some embodiments, an object is detected when the processor detects an object of certain shape, size, and/or distance. This provides an additional layer of detail over identifying the object as some vague characteristics of the object are determined. In some embodiments, an object is classified when the actual object type is determined (e.g., bike, toy car, remote control, keys, etc.). In some embodiments, an object is labelled when the processor classifies the object. However, in some cases, a labelled object may not be successfully classified and the object may be labelled as, for example, "other". In some embodiments, an object may be labelled automatically by the processor using a classification algorithm or by a user using an application of a communication device (e.g., by choosing from a list of possible labels or creating new labels such as sock, fridge, table, other, etc.). In some embodiments, the user may customize labels by creating a particular label for an object. For example, a user may label a person named Sam by their actual name such that the classification algorithm may classify the person in a class named Sam upon recognizing them in the environment. In such cases, the classification may classify persons by their actual name without the user manually labelling the persons. In some instance, the processor may successfully determine that several faces observed are alike and belong to one person, however may not know which person. Or the processor may recognize a dog but may not know the name of the dog. In some embodiments, the user may label the faces or the dog with the name of the actual person or dog such that the classification algorithm may classify them by name in the future.

In some embodiments, the processor may use shape descriptors for objects. In embodiments, shape descriptors are immune to rotation, translation, and scaling. In embodiments, shape descriptors may be region based descriptors or boundary based descriptors. In some embodiments, the processor may use curvature Fourier descriptors wherein the image contour is extracted by sampling coordinates along the contour, the coordinates of the sample being $S=\{s_1(x_1, y_1), s_2(x_2, y_2), \ldots, s_n(x_n, y_n)\}$. The contour may then be smoothened using, for example, a Gaussian with different standard deviation. The image may then be scaled and the Fourier transform applied. In some embodiments, the processor describes any continuous curve $f(t)=(x\ y)_t=(f_x(t)\ f_y(t))$, wherein $0<t<t_{max}$ and t is the path length along the curvature. Sampling a curve uniformly creates a set that is infinite and periodic. To create a sequence, the processor selects an arbitrary point $g_1$ in the contour with a position $(x_0\ y_0)$ and continues to sample points with different x, y positions along the path of the contour at equal distance steps. For example, FIG. 119 illustrates a contour 11900 and a first arbitrary point $g_1$ with a position $(x_0\ y_0)$ and subsequent points $g_2$, $g_3$ and so on with different x, y positions along the path of the contour 11900 at equal distance steps. In some embodiments, the processor applies a Discrete Fourier Transform (DFT) to contour points $G=\{g_i\}$ to obtain Fourier descriptors. In some embodiments, the processor applies an inverse DFT to reconstruct the original signal g from the set G. FIG. 120 illustrates an example of reconstruction of a contour of a sock on a floor. 12000 illustrates a reconstruction using frequencies passing through points 12001. From 12000, the points 12001 at equal distances from one another are reconstructed as shown in 12002. From 12002, the contour 12003 is reconstructed, wherein the continuous contour passes through the original samples. From contour 12003, the original image 12004 is reconstructed. In embodiments, the contour, reconstructed by inverse DFT, is the sum of each of the samples that each represent a shape in the spatial domain. Therefore, the original contour is given by point-wise addition of each of the individual Fourier coefficients. In some embodiments, the processor arranges the Fourier coefficients in a coefficient matrix that may be manipulated in a similar manner as matrices, wherein $C_{ij}=A_{i1}B_{1j}+A_{i2}B_{2j}+\ldots+A_{in}B_{nj}$. In embodiments, invariant Fourier descriptors are immune to scaling as the magnitude of all Fourier coefficients are multiplied by the scale factor. FIG. 121A illustrates an example of different signals collected for reconstruction. FIG. 121B illustrates an example of a partial reconstruction 12100 of a sock 12101 by superposition of one Fourier descriptor pair. These first harmonics are elliptical. FIG. 121B illustrates the reconstruction 12100 of the sock 12101 by superposition of five Fourier descriptor pairs and the reconstruction 12100 of the sock 12101 by superposition of 100 Fourier descriptor pairs. The use of Fourier descriptors functions well with a DNN and CNN. For example, FIG. 122 illustrates an example of a CNN including various layers. Input is provided to the first layer and the last layer of the CNN provides an output. The first layer of the CNN may use some number of Fourier descriptor pairs while the second layer may use a different number of Fourier descriptor pairs. The third layer may use high frequency signals while the last layer may use low frequency signals. The DNN allows for the sparse connectivity between layers.

In some embodiments, the processor determines if a shape is reasonably similar to a shape of an object in a database of labeled objects. In some embodiments, the processor determines a distance that quantifies a difference between two Fourier descriptors. The Fourier descriptors $G_1$ and $G_2$ may be scale normalized and have a same number of coefficient pairs. In some embodiments, the processor determines the $L_2$ norm of the magnitude difference vector using $$dist_M(G_1, G_2) = \left[\sum_{m=-M_p\neq 0}^{M_p} (|G_1(m)| - |G_2(m)|)^2\right]^{\frac{1}{2}} = \left[\sum_{m=1}^{M_p} (|G_1(-m)| - |G_2(-m)|)^2 + (|G_1(m)| - |G_2(m)|)^2\right]^{\frac{1}{2}},$$

wherein $M_p$ denotes the number of coefficient pairs. In some embodiments, the processor applies magnitude reconstruction to some layers for sorting out simple shape and unique shapes. In some embodiments, the processor reduces the complex-valued Fourier descriptors to their magnitude vectors such that they operate like a hash function. While many different shapes may end up in a same hash value, the chance of collision may be low. Due its simplicity, this process may be implemented in a lower level of the CNN. For example, FIG. 123 illustrates an example of a CNN with lower level layers, higher level layers, input, and output. The lower level layers perform magnitude-only matching as described.

While magnitude matching serves well for extracting some characteristics, at a lower computational cost the phase may need to be preserved and used to create a better matching system. For instance, for applications such as reconstruction of the perimeters of a map, magnitude-matching may be inadequate. In such cases, the processor performs normalization for scale, start point shift, and rotation of the Fourier descriptors $G_1$ and $G_2$. In some embodiments, the processor determines the $L_2$ norm of the magnitude difference vector using $$dist_M(G_1, G_2) = (G_1 - G_2)\left[\Sigma_{m=-M_p}^{M_p} (|G_1(m)| - |G_2(m)|)^2\right]^{\frac{1}{2}},$$

however, in this case there are complex values. Therefore, the $L_2$ norm is a complex-valued difference between $G_1-G_2$ where $m \neq 0$.

In some embodiments, reflection profiles may also be used for acoustic sensing. Sound creates a wide cone of reflection that may be used in detecting obstacles for added safety. For instance, the sound created by a commercial cleaning robot. Acoustic signals reflected off of different objects and objects in areas with varying geometric arrangements are different from one another. In some embodiments, the sound wave profile may be changed such that the observed reflections of the different profiles may further assist in detecting an obstacle or area of the environment. For example, a pulsed sound wave reflected off of a particular geometric arrangement of an area has a different reflection profile than a continuous sound wave reflected off of the particular geometric arrangement. In embodiments, the wavelength, shape, strength, and time of pulse of the sound wave may each create a different reflection profile. These allow further visibility immediately in front of the robot for safety purposes.

In some embodiments, some data, such as environmental properties or object properties, may be labelled or some parts of a data set may be labelled. In some embodiments, only a portion of data, or no data, may be labelled as not all users may allow labelling of their private spaces. In some embodiments, only a portion of data, or no data, may be labelled as users may not allow labelling of particular or all objects. In some embodiments, consent may be obtained from the user to label different properties of the environment or of objects or the user may provide different privacy settings using an application of a communication device. In some embodiments, labelling may be a slow process in comparison to data collection as it manual, often resulting in a collection of data waiting to be labelled. However, this does not pose an issue. Based on the chain law of probability, the processor may determine the probability of a vector x occurring using $p(x)=\Pi_{i-1}{}^{n}p(x_i|x_1, \ldots, x_{i-1})$. In some embodiments, the processor may solve the unsupervised task of modeling p(x) by splitting it into n supervised problems. Similarly, the processor may solve the supervised learning problem of p(y|x) using unsupervised methods. The processor may learn the joint distribution and obtain $$p(y \mid x) = \frac{p(x, y)}{\Sigma'_y p(x, y')}.$$

In some embodiments, the processor may approximate a function $f^*$. In some embodiments, a classifier $y=f^*(x)$ may map an image array x to a category y (e.g., cat, human, refrigerator, or other objects), wherein x∈{set of images} and y∈{set of objects}. In some embodiments, the processor may determine a mapping function $y=f(x; \theta)$, wherein θ may be the value of parameters that return a best approximation. In some cases, an accurate approximation requires several stages. For instance, $f(x)=f(f(x))$ is a chain of two functions, wherein the result of one function is the input into the other. A visualization of a chain of functions is illustrated in FIG. 124. Given two or more functions, the rules of calculus apply, wherein if $f(x)=h(g(x))$, then $f'(x)=h'(g(x)) \times g'(x)$ and $$\frac{dy}{dx} = \frac{dy}{du} \times \frac{du}{dx}.$$

For linear functions, accurate approximations may be easily made as interpolation and extrapolation of linear functions is straight forward. Unfortunately, many problems are not linear. To solve a non-linear problem, the processor may convert the non-linear function into linear models. This means that instead of trying to find x, the processor may use a transformed function such as φ(x). The function φ(x) may be a non-linear transformation that may be thought of as describing some features of x that may be used to represent x, resulting in $y=f(x; \theta, \omega)=\phi(x; \theta)^T\omega$. The processor may use the parameters θ to learn about φ and the parameters ω that map φ(x) to the desired output. In some cases, human input may be required to generate a creative family of functions φ(x; θ) for the feed forward model to converge for real practical matters. Optimizers and cost functions operate in a similar manner, except that the hidden layer φ(x) is hidden and a mechanism or knob to compute hidden values is required. These may be known as activation functions. In embodiments, the output of one activation function may be fed forward to the next activation function. In embodiments, the function $f(x)$ may be adjusted to match the approximation function $f^*(x)$. In some embodiments, the processor may use training data to obtain some approximate examples of $f^*(x)$ evaluated for different values of x. In some embodiments, the processor may label each example $y \approx f^*(x)$. Based on the example obtained from the training data, the processor may learn what the function $f(x)$ is to do with each value of x provided. In embodiments, the processor may use obtained examples to generate a series of adjustments for a new unlabeled example that may follow the same rules as the previously obtained examples. In embodiments, the goal may be to generalize from known examples such that a new input may be provided to the function $f(x)$ and an output matching the logic of previously obtained examples is generated. In embodiments, only the input and output are known, the operations occurring in between of providing the input and obtaining the output are unknown. This may be analogous to FIG. 125 wherein a fabric 12500 of a particular pattern is provided to a seamstress and a tie or suit 12502 is the output delivered to the customer. The customer only knows the input and the received output but has no knowledge of the operations that took place in between of providing the fabric and obtaining the tie or suit.

In some embodiments, different objects within an environment may be associated with a location within a floor plan of the environment. For example, a user may want the robot to navigate to a particular location within their house, such as a location of a TV. To do so, the processor requires the TV to be associated with a location within the floor plan.

In some embodiments, the processor may be provided with one or more images comprising the TV using an application of a communication device paired with the robot. A user may label the TV within the image such that the processor may identify a location of the TV based on the image data. For example, the user may use their mobile phone to manually capture a video or images of the entire house or the mobile phone may be placed on the robot and the robot may navigate around the entire house while images or video are captured. The processor may obtain the images and extract a floor plan of the house. The user may draw a circle around each object in the video and label the object, such as TV, hallway, living room sofa, Bob's room, etc. Based on the labels provided, the processor may associate the objects with respective locations within the 2D floor plan. In some embodiments, the floor plan may be a bird's eye view of the environment. Then, if the robot is verbally instructed to navigate to the living room sofa to start a video call, the processor may actuate the robot to navigate to the floor plan coordinate associated with the living room sofa.

In one embodiment, a user may label a location of the TV within a map using the application. For instance, the user may use their finger on a touch screen of the communication device to identify a location of an object by creating a point, placing a marker, or drawing a shape (e.g., circle, square, irregular, etc.) and adjusting its shape and size to identify the location of the object in the floor plan. In embodiments, the user may use the touch screen to move and adjust the size and shape of the location of the object. A text box may pop up after identifying the location of the object and the user may label the object that is to be associated with the identified location. In some embodiments, the user may choose from a set of predefined object types in a drop-down list, for example, such that the user does not need to type a label. We can select from a list. In other embodiments, locations of objects are identified using other methods. In some embodiments, a neural network may be trained to recognize different types of objects within an environment. In some embodiments, a neural network may be provided with training data and may learn how to recognize the TV based on features of TVs. In some embodiments, a camera of the robot (the camera used for SLAM or another camera) captures images or video while the robot navigates around the environment. Using object recognition, the processor may identify the TV within the images captured and may associate a location within the floor map with the TV. However, in the context of localization, the process does not need to recognize the object type. It suffices that the location of the TV is known to localize the robot. This significantly reduces computation. There are certain ways to do this.

In some embodiments, dynamic obstacles, such as people or pets, may be added to the map by the processor of the robot or a user using the application of the communication device paired with the robot. In some embodiments, dynamic obstacle may have a half-life, wherein a probability of their presence at particular locations within the floor plan reduces over time. In some embodiments, the probability of a presence of all obstacles and walls sensed at particular locations within the floor plan reduces over time unless their existence at the particular locations is fortified or reinforced with newer observations. In using such an approach, the probability of the presence of an obstacle at a particular location in which a moving person was observed but travelled away from reduces to zero with time. In some embodiments, the speed at which the probabilities of presence of obstacles at locations within the floor plan are reduced (i.e., the half-life) may be learned by the processor using reinforcement learning. For example, after an initialization at some seed value, the processor may determine the robot did not bump into an obstacle at a location in which the probability of existence of an obstacle is high, and may therefore reduce the probability of existence of the obstacle at the particular locations faster in relation to time. In places where the processor of the robot observed a bump against an obstacle or existence of an obstacle that was recently faded away, the processor may reduce the rate of reduction in probability of existence of an obstacle in the corresponding places. Over time data is gathered and with repetition convergence is obtained for every different setting. In embodiments, implementation of this method may use deep, shallow, or atomic machine learning and MDP.

In some embodiments, the processor of the robot tracks objects that are moving within the scene while the robot itself is moving. Moving objects may be SLAM capable (e.g., other robots) or SLAM incapable (e.g., humans and pets). In some embodiments, two or more participating SLAM devices may share information for continuous collaborative SLAM object tracking. FIG. 126 illustrates two devices that start collaborating and sharing information at $t_5$. At $t_6$ device 1 has both its own information 12600 gathered at $t_5$ as well as information 12601 device 2 gathered at $t_5$, and vice versa. When device 3 is added, a process of pairing (e.g., invite/accept steps) may occur, after which a collaboration work group is formed between device 1, device 2 and device 3. At $t_7$, device 3 joins and shares its knowledge 12602 with devices 1 and 2 and vice versa. In some embodiments, localization information is blended, wherein the processor of device 1 not only localizes itself within the map, it also observes other devices within its own map. The processor of device 1 also observes other device within their own respective map and how those devices localize device 1 within their own respective map.

In embodiments, object tracking may be challenging when the robot is on the move. With the robot, its sensing devices are moving, and in some cases, the object being tracked is moving as well. In some embodiments, the processor may track movement of a non-SLAM enabled object within a scene by detecting a presence of the object in a previous act of sensing and its lack of presence in a current act of sensing and vice versa. A displacement of the object in an act of sensing (e.g., a captured image) that does not correspond to what is expected or predicted based on movement of the robot may also be used by the processor as an indication of a moving object. In some embodiments, the processor may be interested in more than just the presence of the object. For example, the processor of the robot may be interested in understanding a hand gesture, such as an instruction to stop or navigate to a certain place given by a hand gesture such as finger pointing. Or the processor may be interested in understanding sign language for the purpose of translating to audio in a particular language or to another signed language.

In embodiments, more than just the presence and lack of presence of objects and object features contribute to a proper perception of the environment. Features of the environment that are substantially constant over time and that may be blocked by the presence of a human are also a source of information. The features that get blocked depend on the FOV of a camera of the robot and its angle relative to the features that represent the background. In embodiments, the processor may extract such background features due to a lack of a straight line of sight. Some embodiments may track objects separately from the background environment and may form decisions based on a combination of both.

In embodiments, SLAM technologies described herein (e.g., object tracking) may be used in combination with AR technologies, such as visually presenting a label in text form to a user by superimposing the label on the corresponding real-world object. Superimposition may be on a projector, a transparent glass, a transparent LCD, etc. In embodiments, SLAM technologies may be used to allow the label to follow the object in real time as the robot moves within the environment and the location of the object relative to the robot changes.

In some embodiments, a map of the environment is separately built from the obstacle map. In some embodiments, an obstacle map is divided into two categories, moving and stationary obstacle maps. In some embodiments, the processor separately builds and maintains each type of obstacle map. In some embodiments, the processor of the robot may detect an obstacle based on an increase in electrical current drawn by a wheel or brush or other component motor. For example, when stuck on an object, the brush motor may draw more current as it experiences resistance cause by impact against the object. In some embodiments, the processor superimposes the obstacle maps with moving and stationary obstacles to form a complete perception of the environment.

In some embodiments, upon observing an object moving within an environment within which the robot is also moving, the processor determines how much of the change in scenery is a result of the object moving and how much is a result of its own movement. In such cases, keeping track of stationary features may be helpful. In a stationary environment, consecutive images captured after an angular or translational displacement may be viewed as two images captured in a standstill time frame by two separate cameras that are spatially related to each other in an epipolar coordinate system with a base line that is given by the actual translation (angular and linear). When objects move in the environment the problem becomes more complicated, particularly when the portion of the scene is moving is greater than the portion of the scene stationary. In some embodiments, a history of the mapped scene may be used to overcome such challenges. For a constant environment, over time a set of features and dimensions emerge as stationary as more and more data is collected and compiled. In some embodiments, it may be helpful for a first run of the robot to occur at a time where the environment is less crowded (with, for example, dynamic objects) to provide a baseline map. This may be repeated a few times.

In some embodiments, it may be helpful to introduce the processor of the robot to some of the moving objects the robot is likely to encounter within the environment. For example, if the robot operated within a house, it may helpful to introduce the processor of the robot to the humans and pets occupying the house by capturing images of them using a mobile device or a camera of the robot. It may be beneficial to capture multiple images or a video stream (i.e., a stream of images) from different angles to improve detection of the humans and pets by the processor. For example, the robot may drive around a person while capturing images from various angles using its camera. In another example, a user may capture a video stream while walking around the person using their smartphone. The video stream may be obtained by the processor via an application of the smartphone paired with the robot. The processor of the robot may extract dimensions and features of the humans and pets such that when the extracted features are present in an image captured in a later work session, the processor may interpret the presence of these features as moving objects. Further, the processor of the robot may exclude these extracted features from the background in cases where the features are blocking areas of the environment. Therefore, the processor may have two indications of a presence of dynamic objects, a Bayesian relation of which may be used to obtain a high probability prediction. FIG. 127 illustrates the Bayesian relation. In some embodiments, 3D drawings, such as CAD drawings processed, prepared, and enhanced for object and/or environment tracking, may be added and used as ground truth.

As the processor makes use of various information, such as optical flow, entropy pattern of pixels as a result of motion, feature extractors, RGB, depth information, etc., the processor may resolve the uncertainty of association between the coordinate frame of reference of the sensor and the frame of reference of the environment. In some embodiments, the processor uses a neural network to resolve the incoming information into distances or adjudicates possible sets of distances based on probabilities of the different possibilities. Concurrently, as the neural network processes data at a higher level, data is classified into more human understandable information, such as an object name (e.g., human name or object type such as remote), feelings and emotions, gestures, commands, words, etc. However, all the information may not be required at once for decision making. For example, the processor may only need to extract data structures that are useful in keeping the robot from bumping into a person and may not need to extract the data structures that indicate the person is hungry or angry at that particular moment. That is why spatial information, for example, may require real time processing while labeling, for instance, done concurrently does not necessary require real time processing. For example, ambiguities associated with a phase-shift in depth sensing may need a faster resolution than object recognition or hand gesture recognition, as reacting to changes in depth may need to be resolved sooner than identifying a facial expression.

When the neural network is in the training phase, various elements of perception may be processed separately. For example, sensor input may be translated to depth using some ground truth equipment by the neural network. The neural network may be separately trained for object recognition, gesture recognition, face recognition, lip-reading, etc. FIG. 128 illustrates components and both real-time and non real-time operations of a system of a robot. Information is transferred back and forth between real-time and non real-time portions of the system. Additionally, the robot may interact with other devices, such as Device 2, in real-time.

In some embodiments, the neural network resolves a series of inputs into probabilities of distances. For example, in FIG. 128 the neural network 12800 receives input 12801 and determines probabilities of a distance of the robot from an object, wherein the distance measurement is most likely to be 10 cm. In embodiments, having multiple sources of information help increase resolution. In this example, various labels are presented as possibilities of the distance measured. In some embodiments, labelling may be used to determine if a group of neighboring pixels are in about a same neighborhood as the one, two, or more pixels having corresponding accurately measured distances. In some embodiments, labeling may be used to create segments or groups of pixels which may belong to different depth groups based on few ground truth measurements. In some embodiments, labeling may be used to determine the true value for a TOF phase-shift reading from a few possible values and extend the range of the TOF sensor.

In some embodiments, labeling may be used to separate a class of foreground objects from background objects. In some embodiments, labeling may be used to separate a class of stationary objects from periodically moving objects, such as furniture rearrangements in a home. In some embodiments, labeling may be used to separate a class of stationary objects from randomly appearing and disappearing objects within the environment (e.g., appearing and disappearing human or pet wandering around the environment). In some embodiments, labeling may be used to separate an environmental set of features such as walls, doors, and windows from other obstacles such as toys on the floor. In some embodiments, labeling may be used to separate a moving object with certain range of motion from other environmental objects. For example, a door is an example of an environmental object that has a specific range of motion comprising fully closed to fully open. In some embodiments, labeling may be used to separate an object within a certain substantially predictable range of motion from other objects within the environmental map that have non-predictable range of motion. For example, a chair at a dining table has a predictable range of motion. Although the chair may move, its whereabouts remain somewhat the same.

In some embodiments, the processor of the robot may recognize a direction of movement of a human or animal or object (e.g., car) based on sensor data (e.g., acoustic sensor, camera sensor, etc.). In some embodiments, the processor may determine a probability of direction of movement of the human or animal for each possible direction. For example, FIG. 130 illustrates different possible directions 13000 of human 13001. So far, the processor of the robot has determined different probabilities (i.e., 10%, 80%, 7%, and 3% in FIG. 130) for directions 13000 based on sensor data. For instance, if the processor analyzes acoustic data and determines the acoustics are linearly increasing, the processor may determine that it is likely that the human is moving in a direction towards the robot. In some embodiments, the processor may determine the probability of which direction the person or animal or object will move in next based on current data (e.g., environmental data, acoustics data, etc.) and historical data (e.g., previous movements of similar objects or humans or animals, etc.). For example, the processor may determine the probability of which direction a person will move next based on image data indicating the person is riding a bicycle and road data (e.g., is there a path that would allow the person to drive the bike in a right or left direction). FIG. 131 illustrates a car 13100, a person on a bike 13101, a person 13102, and a dog 13103 and possible directions 13104 they may each take. Based on recognizing a car 13100 or a bike 13101 and known roadways, the processor of the robot may determine probabilities of different possible directions 13104. If the processor analyzes image sensor data and determines the size of person 13102 or dog 13103 are decreasing, the processor may determine that it is likely that the person 13102 is moving in a direction away from the robot.

In some embodiments, the processor avoids collisions between the robot and objects (including dynamic objects such as humans and pets) using sensors and a perceived path of the robot. In some embodiments, the executes the path using GPS, previous mappings, or by following along rails. In embodiments wherein the robot follows along rails the processor is not required to make any path planning decisions. The robot follows along the rails and the processor uses SLAM methods to avoid objects, such as humans. For example, FIG. 132A illustrates robot train 13200 following along rails 13201. The processor of the robot train 13200 uses sensor data to avoid collisions with objects, such as persons. In some embodiments, the robot executes the path using markings on the floor that the processor of the robot detects based on sensor data collected by sensors of the robot. For example, FIG. 132B illustrates robot 13202 executing a path by following marking 13203 on the floor. The processor uses sensor data to continuously detect and follow marking 13203. In some embodiments, the robot executes the path using digital landmarks positioned along the path. The processor of the robot detects the digital landmarks based on sensor data collected by sensors of the robot. In some embodiments, the robot executes the path by following another robot or vehicle driven by a human. In these various embodiments, the processor may use various techniques to avoid objects. In some embodiments, the processor of the robot may not use the full SLAM solution but may use sensors and perceived information to safely operate. For example, a robot transporting passengers may execute a predetermined path by following observed marking on the road or by driving on a rail and may use sensor data and perceived information during operation to avoid collisions with objects.

In some embodiments, the observations of the robot may capture only a portion of objects within the environment depending on, for example, a size of the object and a FOV of sensors of the robot. For example, FIG. 133A illustrates a table 13300 and a stool 13301. Sensors of a robot may observe areas indicated by arrows 13302 and 13303 of the table 13300 and stool 13301, respectively. Sensors of the robot observe a narrow table and stool leg-shaped object in areas indicated by arrows 13302 and 13303, respectively, despite the table 13300 and stool 13301 comprising more. FIG. 133B illustrates another example, wherein sensors of a larger robot 13304 observe area indicated by arrow 13305 of a table 13306. The portion of the table indicated by arrow 13305 is all that is observed by the sensors of the robot 13304, despite the table comprising more. Based on the portion of the table observed, the processor may determine that the robot 13304 can navigate in between the legs 13307 as indicated by arrows 13308. During operation, the robot 13304 may bump into the table 13306 in attempting to maneuver in between or around the legs 13307. Over time, the processor may inflate the size of the legs 13307 to prevent the robot 13304 from becoming stuck or struggling when moving around the legs 13307, as described in the flowchart of FIGS. 75C and 75D. FIG. 133C illustrates three-dimensional data indicative of a location and size of a leg 13307 of table 13306 at different time points (e.g., different work sessions). A two-dimensional slice of the three-dimensional data includes data indicating a location and size of the leg 13307 of table 13306. At a first initial time point 13309 the size of the leg 13307 is not inflated and the number of times the robot 13304 bumps into the leg 13307 is 200 times. The processor may then inflate the size of the leg 13307 to prevent the robot 13304 from bumping and struggling when maneuvering around the leg 13307. At a second time point 13310 the size of the leg 13307 is inflated and the number of times the robot 13304 bumps into the leg 13307 is 55 times. The processor may then further inflate the size of the leg 13307 to further prevent the robot 13304 from bumping and struggling when maneuvering around the leg 13307. At a third time point 13311 the size of the leg 13307 is further inflated and the number of times the robot 13304 bumps into the leg 13307 is 5 times. This is repeated once more such that at a current time point 13312 the robot 13304 no longer bumps into leg 13307.

In some embodiments, the robot becomes struggles during operation due to entanglement with an object. The robot may escape the entanglement but with a struggle. For example, FIG. 134A illustrates a chair 13400 with a U-shaped base 13401. A robot 13402 becomes entangled with the U-shaped base 13401 during operation. In some embodiments, the processor inflates a size of an object with which the robot has become entangled with and/or struggled to navigate around for a current and future work sessions. For example, FIG. 134B illustrates the U-shaped base 13401 with an inflated size 13403. If the robot 13402 becomes stuck on the object again after inflating its size a first time, the processor may inflate the size more to 13404 then 13405 if needed. FIG. 134C illustrates a flowchart describing a process for preventing the robot from becoming entangled with an object. At a first step 13406, the processor determines if the robot becomes stuck or struggles with navigation around an object. If yes, the processor proceeds to step 13407 and inflates a size of the object. At a third step 13408, the processor determines if the robot still becomes stuck or struggles with navigation around an object. If no, the processor proceeds to step 13409 and maintains the inflated size of the object. If yes, the processor returns to step 13407 and inflates the size of the object again. This continues until the robot no longer becomes stuck or struggles navigating around the object. In some embodiments, the robot may become stuck or struggle to navigate around only a particular portion of an object. In such cases, the processor may only inflate a size of the particular portion of the object. FIG. 134D illustrates a flowchart describing a process for preventing the robot from becoming entangled with a portion of an object. At a first step 13410, the processor determines if the robot becomes stuck or struggles with navigation around a particular portion of the object relative to other portions of the object. If yes, the processor proceeds to step 13411 and inflates a size of the particular portion of the object. At a third step 13412, the processor determines if the robot still becomes stuck or struggles with navigation around the particular portion of the object. If no, the processor proceeds to step 13413 and maintains the inflated size of the particular portion of the object. If yes, the processor returns to step 13411 and inflates the size of the particular portion of the object again. This continues until the robot no longer becomes stuck or struggles navigating around the particular portion of the object. In FIG. 135C, the robot 13507 struggles in overcoming obstacle 13508. As such, the processor of the robot automatically inflates a size of the obstacle 13508 to occupy area 13509 in the map such that the robot may avoid encountering the obstacle 13508 at a next time. The inflation may be proportional to the time of struggle experienced by the robot. In embodiments wherein the struggle continues, the processor may inflate the size of the obstacle 13508 to occupy a greater area 13510 for a next time the robot may encounter the obstacle 13508, and so on.

In some embodiments, the robot may avoid damaging the wall and/or furniture by slowing down when approaching the wall and/or objects. In some embodiments, this is accomplished by applying torque in an opposite direction of the motion of the robot. For example, FIG. 240 illustrates a user 24000 operating a vacuum 24001 and approaching wall 24002. The processor of the vacuum 24001 may determine it is closely approaching the wall 24002 based on sensor data and may actuate an increase in torque in an opposite direction to slow down (or apply a break to) the vacuum and prevent the user from colliding with the wall 24002.

In some embodiments, the processor of the robot may use at least a portion of the methods and techniques of object detection and recognition described in U.S. patent application Ser. Nos. 15/442,992, 16/832,180, 16/570,242, 16/995,500, 16/995,480, 17/196,732, 15/976,853, 17/109,868, 16/219,647, 15/017,901, and 17/021,175, each of which is hereby incorporated by reference.

In some embodiments, the processor localizes the robot within the environment. In addition to the localization and SLAM methods and techniques described herein, the processor of the robot may, in some embodiments, use at least a portion of the localization methods and techniques described in U.S. Non-Provisional patent application Ser. Nos. 16/297,508, 16/509,099, 15/425,130, 15/955,344, 15/955,480, 16/554,040, 15/410,624, 16/504,012, 16/353,019, and 17/127,849, each of which is hereby incorporated by reference.

In some embodiments, the processor of the robot may localize the robot within a map of the environment. Localization may provide a pose of the robot and may be described using a mean and covariance formatted as an ordered pair or as an ordered list of state spaces given by x, y, z with a heading theta for a planar setting. In three dimensions, pitch, yaw, and roll may also be given. In some embodiments, the processor may provide the pose in an information matrix or information vector. In some embodiments, the processor may describe a transition from a current state (or pose) to a next state (or next pose) caused by an actuation using a translation vector or translation matrix. Examples of actuation include linear, angular, arched, or other possible trajectories that may be executed by the drive system of the robot. For instance, a drive system used by cars may not allow rotation in place, however, a two-wheel differential drive system including a caster wheel may allow rotation in place. The methods and techniques described herein may be used with various different drive systems. In embodiments, the processor of the robot may use data collected by various sensors, such as proprioceptive and exteroceptive sensors, to determine the actuation of the robot. For instance, odometry measurements may provide a rotation and a translation measurement that the processor may use to determine actuation or displacement of the robot. In other cases, the processor may use translational and angular velocities measured by an IMU and executed over a certain amount of time, in addition to a noise factor, to determine the actuation of the robot. Some IMUs may include up to a three axis gyroscope and up to a three axis accelerometer, the axes being normal to one another, in addition to a compass. Assuming the components of the IMU are perfectly mounted, only one of the axes of the accelerometer is subject to the force of gravity. However, misalignment often occurs (e.g., during manufacturing) resulting in the force of gravity acting on the two other axes of the accelerometer. In addition, imperfections are not limited to within the IMU, imperfections may also occur between two IMUs, between an IMMU and the chassis or PCB of the robot, etc. In embodiments, such imperfections may be calibrated during manufacturing (e.g., alignment measurements during manufacturing) and/or by the processor of the robot (e.g., machine learning to fix errors) during one or more work sessions.

In some embodiments, the processor of the robot may track the position of the robot as the robot moves from a known state to a next discrete state. The next discrete state may be a state within one or more layers of superimposed Cartesian (or other type) coordinate system, wherein some ordered pairs may be marked as possible obstacles. In some embodiments, the processor may use an inverse measurement model when filling obstacle data into the coordinate system to indicate obstacle occupancy, free space, or probability of obstacle occupancy. In some embodiments, the processor of the robot may determine an uncertainty of the pose of the robot and the state space surrounding the robot. In some embodiments, the processor of the robot may use a Markov assumption, wherein each state is a complete summary of the past and used to determine the next state of the robot. In some embodiments, the processor may use a probability distribution to estimate a state of the robot since state transitions occur by actuations that are subject to uncertainties, such as slippage (e.g., slippage while driving on carpet, low-traction flooring, slopes, and over obstacles such as cords and cables). In some embodiments, the probability distribution may be determined based on readings collected by sensors of the robot. In some embodiments, the processor may use an Extended Kalman Filter for non-linear problems. In some embodiments, the processor of the robot may use an ensemble consisting of a large number of virtual copies of the robot, each virtual copy representing a possible state that the real robot is in. In embodiments, the processor may maintain, increase, or decrease the size of the ensemble as needed. In embodiments, the processor may renew, weaken, or strengthen the virtual copy members of the ensemble. In some embodiments, the processor may identify a most feasible member and one or more feasible successors of the most feasible member. In some embodiments, the processor may use maximum likelihood methods to determine the most likely member to correspond with the real robot at each point in time. In some embodiments, the processor determines and adjusts the ensemble based on sensor readings. In some embodiments, the processor may reject distance measurements and features that are surprisingly small or large, images that are warped or distorted and do not fit well with images captured immediately before and after, and other sensor data that appears to be an outlier. For instance, optical components or the limitation of manufacturing them or combing them with illumination assemblies may cause warped or curved images or warped or curved illumination within the images. For example, a line emitted by a line laser emitter captured by a CCD camera may appear curved or partially curved in the captured image. In some cases, the processor may use a lookup table, regression methods, or AI or ML methods to create a correlation and translate a warped line into a straight line. Such correction may be applied to the entire image or to particular features within the image.

In some embodiments, the processor may correct uncertainties as they accumulate during localization. In some embodiments, the processor may use second, third, fourth, etc. different type of measurements to make corrections at every state. For instance, measurements for a LIDAR, depth camera, or CCD camera may be used to correct for drift caused by errors in the reading stream of a first type of sensing. While the method by which corrections are made may be dependent on the type of sensing, the overall concept of correcting an uncertainty caused by actuation using at least one other type of sensing remains the same. For example, measurements collected by a distance sensor may indicate a change in distance measurement to a perimeter or obstacle, while measurements by a camera may indicate a change between two captured frames. While the two types of sensing differ, they may both be used to correct one another for movement. In some embodiments, some readings may be time multiplexed. For example, two or more IR or TOF sensors operating in the same light spectrum may be time multiplexed to avoid cross-talk. In some embodiments, the processor may combine spatial data indicative of the position of the robot within the environment into a block and may processor the spatial data as a block. This may be similarly done with a stream of data indicative of movement of the robot. In some embodiments, the processor may use data binning to reduce the effects of minor observation errors and/or reduce the amount of data to be processed. The processor may replace original data values that fall into a given small interval, i.e. a bin, by a value representative of that bin (e.g., the central value). In image data processing, binning may entail combing a cluster of pixels into a single larger pixel, thereby reducing the number of pixels. This may reduce the amount data to be processor and may reduce the impact of noise.

In some embodiments, the processor may obtain a first stream of spatial data from a first sensor indicative of the position of the robot within the environment. In some embodiments, the processor may obtain a second stream of spatial data from a second sensor indicative of the position of the robot within the environment. In some embodiments, the processor may determine that the first sensor is impaired or inoperative. In response to determining the first sensor is impaired or inoperative, the processor may decrease, relative to prior to the determination that the first sensor is impaired or inoperative, influence of the first stream of spatial data on determinations of the position of the robot within the environment or mapping of dimensions of the environment. In response to determining the first sensor is impaired or inoperative, the processor may increase, relative to prior to the determination that the first sensor is impaired or inoperative, influence of the second stream of spatial data on determinations of the position of the robot within the environment or mapping of dimensions of the environment.

In some embodiments, the processor associates properties with each room as the robot discovers rooms one by one. In some embodiments, the properties are stored in a graph or a stack, such the processor of the robot may regain localization if the robot becomes lost within a room. For example, if the processor of the robot loses localization within a room, the robot may have to restart coverage within that room, however as soon as the robot exits the room, assuming it exits from the same door it entered, the processor may know the previous room based on the stack structure and thus regain localization. In some embodiments, the processor of the robot may lose localization within a room but still have knowledge of which room it is within. In some embodiments, the processor may execute a new re-localization with respect to the room without performing a new re-localization for the entire environment. In such scenarios, the robot may perform a new complete coverage within the room. Some overlap with previously covered areas within the room may occur, however, after coverage of the room is complete the robot may continue to cover other areas of the environment purposefully. In some embodiments, the processor of the robot may determine if a room is known or unknown. In some embodiments, the processor may compare characteristics of the room against characteristics of known rooms. For example, location of a door in relation to a room, size of a room, or other characteristics may be used to determine if the robot has been in an area or not. In some embodiments, the processor adjusts the orientation of the map prior to performing comparisons. In some embodiments, the processor may use various map resolutions of a room when performing comparisons. For example, possible candidates may be short listed using a low resolution map to allow for fast match finding then may be narrowed down further using higher resolution maps. In some embodiments, a full stack including a room identified by the processor as having been previously visited may be candidates of having been previously visited as well. In such a case, the processor may use a new stack to discover new areas. In some instances, graph theory allows for in depth analytics of these situations.

In some embodiments, the robot may be unexpectedly pushed while executing a movement path. In some embodiments, the robot senses the beginning of the push and moves towards the direction of the push as opposed to resisting the push. In this way, the robot reduces its resistance against the push. In some embodiments, as a result of the push, the processor may lose localization of the robot and the path of the robot may be linearly translated and rotated. In some embodiments, increasing the IMU noise in the localization algorithm such that large fluctuations in the IMU data are acceptable may prevent an incorrect heading after being pushed. Increasing the IMU noise may allow large fluctuations in angular velocity generated from a push to be accepted by the localization algorithm, thereby resulting in the robot resuming its same heading prior to the push. In some embodiments, determining slippage of the robot may prevent linear translation in the path after being pushed. In some embodiments, an algorithm executed by the processor may use optical tracking sensor data to determine slippage of the robot during the push by determining an offset between consecutively captured images of the driving surface. The localization algorithm may receive the slippage as input and account for the push when localizing the robot. In some embodiments, the processor of the robot may relocalize the robot after the push by matching currently observed features with features within a local or global map.

In some embodiments, the processor may localize the robot using color localization or color density localization. For example, the robot may be located at a park with a beachfront. The surroundings include a grassy area that is mostly green, the ocean that is blue, a street that is grey with colored cars, and a parking area. The processor of the robot may have an affinity to the distance to each of these areas within the surroundings. The processor may determine the location of the robot based on how far the robot is from each of these areas describes. FIG. 136 illustrates the robot 13600, the grassy area 13601, the ocean 13602, the street 13603 with cars 13604, and the parking area 13605. The springs 13606 represent an equation that best fits with each cost function corresponding to areas 13601, 13602, 13603, and 13605. The solution may factor in all constraints, adjust the springs 13606, and tweak the system resulting in each of the springs 13606 being extended or compressed.

In some embodiments, the processor may localize the robot by localizing against the dominant color in each area. In some embodiments, the processor may use region labeling or region coloring to identify parts of an image that have a logical connection to each other or belong to a certain object/scene. In some embodiments, sensitivity may be adjusted to be more inclusive or more exclusive. In some embodiments, the processor may use a recursive method, an iterative depth-first method, an iterative breadth-first search method, or another method to find an unmarked pixel. In some embodiments, the processor may compare surrounding pixel values with the value of the respective unmarked pixel. If the pixel values fall within a threshold of the value of the unmarked pixel, the processor may mark all the pixels as belonging to the same category and may assign a label to all the pixels. The processor may repeat this process, beginning by searching for an unmarked pixel again. In some embodiments, the processor may repeat the process until there are no unmarked areas.

In some embodiments, the processor may infer that the robot is located in different areas based on image data of a camera at the robot navigates to different locations. For example, FIG. 137 illustrates observations 13700 of a camera of a robot at a first location 13701 at a first time point, a second location 13702 at a second time point, and a third location 13703 at a third time point. Based on the observations 13700 collected at the locations 13701, 13702, and 13703, the processor may infer the observations correspond to different areas. However, as the robot continues to operate and new image data is collected, the processor may recognize that new image data is an extension of the previously mapped areas based previous observations 13700. Eventually, the processor integrates the new image data with the previous image data and closes the loop of the spatial representation.

In some embodiments, the processor infers a location of the robot based on features observed in previously visited areas. For example, FIG. 138 illustrates observations 13800 of a camera of a robot at a first time point t0, at a second time point t1, and at a third time point t1. At the first time point t0, the processor observes a chair 13810 based on image data. At the second time point t1, the processor does not observe the chair 13801 but rather observes a window 13802 based on image data. At the third time point t2, the processor does not observe the window 13802 but rather observes a corner 13803 based on image data. As the robot operates, the processor may recognize an area as previously visited based on observing features 13801, 13802, and 13803 that were previously observed. The processor may use such features to localize the robot. The processor may apply the concept to determine on which floor of an environment the robot is located. For instance, sensors of the robot may capture information and the processor may compare the information against data of previously saved maps to determine a floor of the environment on which the robot is located based on overlap between the information and data of previously saved maps of different floors. In some embodiments, the processor may load the map of the floor on which the robot is located upon determining the correct floor. In some embodiments, the processor of the robot may not recognize the floor on which the robot is located. In such cases, the processor may build a new floor plan based on newly collected sensor data and save the map as a newly discovered area. In some cases, the processor may recognize the floor as a previously visited location while building a new floor plan, at which point the processor may appropriately categorize the data as belonging to the previously visited area.

In some embodiments, the maps of different floors may include variations (e.g., due to different objects or problematic nature of SLAM). In some embodiments, classification of an area may be based on commonalities and differences. Commonalities may include, for example, objects, floor types, patterns on walls, corners, ceiling, painting on the walls, windows, doors, power outlets, light fixtures, furniture, appliances, brightness, curtains, and other commonalities and how each of these commonalities relate to one another. FIG. 139 illustrates an example of different commonalities observed for an area, such as a bed 13900, the color of the walls 13901 and the tile flooring 13902. Based on these observed commonalities 13903, the processor may classify the area.

In some embodiments, the processor loses localizations of the robot. For example, localization may be lost when the robot is unexpectedly moved, a sensor malfunctions, or due to other reasons. In some embodiments, during relocalization the processor examines the prior few localizations performed to determine if there are any similarities between the data captured from the current location of the robot and the data corresponding with the locations of the prior few localizations of the robot. In some embodiments, the search during relocalization may be optimized. Depending on the speed of the robot and change of scenery observed by the processor, the processor may leave bread crumbs at intervals wherein the processor observes a significant enough change in the scenery observed. In some embodiments, the processor determines if there is significant enough change in the scenery observed using Chi square test or other methods. FIG. 140 illustrates the robot 14000 and a trajectory 14001 of the robot 14000. At a first time point t0, the processor observes area 14002. Since the data collected corresponding to observed area 14002 is significantly different from any other data collected, the location of the robot 14000 at the first time point t0 is marked as a first rendezvous point and the processor leaves a bread crumb. At a second time point t1, the processor observes area 14003. There is some overlap between areas 14002 and 14003 observed from the location of the robot at first and time points t0 and t1, respectively. In determining an approximate location of the robot, the processor may determine that robot is approximately in a same location at the first and second time points t0 and t1 and the data collected corresponding to observed area 14003 is therefore redundant. The processor may determine that the data collected from the first time point t0 corresponding to observed area 14002 does not provide enough information to relocalize the robot. In such a case, the processor may therefore determine it is unlikely that the data collected from the next immediate location provides enough information to relocalize the robot. At a third time point t2, the processor observes area 14004. Since the data collected corresponding to observed area 14004 is significantly different from other data collected the location of the robot at the third time point t2 is marked as a second rendezvous point and the processor leaves a bread crumb. During relocalization, the processor of the robot 14000 may search rendezvous points first to determine a location of the robot 14000. Such an approach in relocalization of the robot is advantageous as the processor performs a quick search in different areas rather than spending a lot of time in a single area which may not produce any result. If there are no results from any of the quick searches, the processor may perform more detailed search in the different areas.

In some embodiments, the processor generates a new map when the processor does not recognize a location of the robot. In some embodiments, the processor compares newly collected data against data previously captured and used in forming previous maps. Upon finding a match, the processor merges the newly collected data with the previously captured data to close the loop of the map. In some embodiments, the processor compares the newly collected data against data of the map corresponding with rendezvous points as opposed the entire map as it is computationally less expensive. In embodiments, rendezvous points are highly confident. In some embodiments, a rendezvous point is the point of intersection between the most diverse and most confident data. For example, FIG. 141 illustrates confidence in the map/localization 14100, change in the scenery data observed 14101 and intersection 14102 of the confidence 14100 and the change in data observed 14101. Intersection point 14102 is the rendezvous point. In some embodiments, rendezvous points may be used by the processor of the robot where there are multiple floors in a building. It is likely that each floor has a different layout, color profile, arrangement, decoration, etc. These differences in characteristics create a different landscape and may be good rendezvous points to search for initially. For example, when a robot takes an elevator and goes to another floor of a 12-floor building, the entry point to the floor may be used as a rendezvous point. Instead of searching through all the images, all the floor plans, all LIDAR readings, etc., the processor may simply search through 12 rendezvous points associated with 12 entrance points for a 12-floor building. While each of the 12 rendezvous points may have more than one image and/or profile to search through, it can be seen how this method reduces the load to localize the robot immediately within a correct floor. In some embodiments, a blind folded robot (e.g., a robot with malfunctioning image sensors) or a robot that only know a last localization may use its sensors to go back to a last known rendezvous point to try to relocalize based on observations from the surrounding area. In some embodiments, the processor of the robot may try other relocalization methods and techniques prior returning to a last known rendezvous point for relocalization.

In some embodiments, the processor of the robot may use depth measurements and/or depth color measurements in identifying an area of an environment or in identifying its location within the environment. In some embodiments, depth color measurements include pixel values. The more depth measurements taken, the more accurate the estimation may be. For example, FIG. 142A illustrates an area of an environment. FIG. 142B illustrates the robot 14200 taking a single depth measurement 14201 to a wall 14202. FIG. 142C illustrates the robot 14200 taking two depth measurements 14203 to the wall 14202. Any estimation made by the processor based on the depth measurements may be more accurate with increasing depth measurements, as in the case shown in FIG. 142C as compared to FIG. 142B. To further increase the accuracy of estimation, both depth measurements and depth color measurements may be used. For example, FIG. 143A illustrates a robot 14300 taking depth measurements 14301 to a wall 14302 of an environment. An estimate based on depth measurements 14301 may be adequate, however, to improve accuracy depth color measurements 14303 of wall 14304 may also be taken, as illustrated in FIG. 143B. In some embodiments, the processor may take the derivative of depth measurements 14301 and the derivative of depth color measurements 14303. In some embodiments, the processor may use a Bayesian approach, wherein the processor may form a hypothesis based on a first observation (e.g., derivative of depth color measurements) and confirm the hypothesis by a second observation (e.g., derivative of depth measurements) before making any estimation or prediction. In some cases, measurements 14305 are taken in three dimensions, as illustrated in FIG. 143C.

In some embodiments, the processor may determine a transformation function for depth readings from a LIDAR, depth camera, or other depth sensing device. In some embodiments, the processor may determine a transformation function for various other types of data, such as images from a CCD camera, readings from an IMU, readings from a gyroscope, etc. The transformation function may demonstrate a current pose of the robot and a next pose of the robot in the next time slot. Various types of gathered data may be coupled in each time stamp and the processor may fuse them together using a transformation function that provides an initial pose and a next pose of the robot. In some embodiments, the processor may use minimum mean squared error to fuse newly collected data with the previously collected data. This may be done for transformations from previous readings collected by a single device or from fused readings or coupled data.

In some embodiments, the processor of the robot may use visual clues and features extracted from 2D image streams for local localization. These local localizations may be integrated together to produce global localization. However, during operation of the robot, streams of images coming in may suffer from quality issues arising from a dark environment or relatively long continuous stream of featureless images arising due to a plain and featureless environment. Some embodiments may prevent the SLAM algorithm from detecting and tracking the continuity of an image stream due to the FOV of the camera being blocked by some object or an unfamiliar environment captured in the images as a result of moving objects around, etc. These issues may prevent a robot from closing the loop properly in a global localization sense. Therefore, the processor may use depth readings for global localization and mapping and feature detection for local SLAM or vice versa. It is less likely that both sets of readings are impacted by the same environmental factors at the same time whether the sensors capturing the data are the same or different. However, the environmental factors may have different impacts on the two sets of readings. For example, the robot may include an illuminated depth camera and a TOF sensor. If the environment is featureless for a period of time, depth sensor data may be used to keep track of localization as the depth sensor is not severely impacted by a featureless environment. As such, the robot may pursue coastal navigation for a period of time until reaching an area with features.

In embodiments, regaining localization may be different for different data structures. While an image search performed in a featureless scene due lost localization may not yield desirable results, a depth search may quickly help the processor regain localization of the robot and vice versa. For example, depth readings impacted by short readings caused by dust, particles, human legs, pet legs, a feature that is located at a different height, or an angle, may remain reasonably intact within the timeframe in which the depth readings were unclear. When trying to relocalize the robot, the first guess of the processor may comprise where the processor predicts the location of the robot to be. Based on control commands issued to the robot to execute a planned path, the processor may predict the vicinity in which the robot is located. In some embodiments, a best guess of a location of the robot may include a last known localization. In some embodiments, determining a next best guess of the location of the robot may include a search of other last known places of the robot, otherwise known as rendezvous points (RP). In some embodiments, the processor may use various methods in parallel to determine or predict a location of the robot.

FIG. 144 illustrates an example of a corner 14400 that may be detected by a processor of a robot based on sensor data and used to localize the robot. For instance, a camera positioned on the robot 14401 captures a first image 14402 of the environment and detects a corner 14403 at a first time point $t_0$. At a second time point $t_1$, the camera captures a second image 14404 and detects a new position of the corner 14402. The difference in position 14405 between the position of corner 14402 in the first image 14403 and the second image 14404 may be used in determining an amount of movement of the robot and localization. In some embodiments, the processor detects the corner based on change in pixel intensity, as the rate of change in pixel intensity increases in the three directions that intersect to form the corner.

In some embodiments, the displacement of the robot may be related to the geometric setup of the camera and its angle in relation to the environment. When localized from multiple sources and/or data types, there may be differences in the inferences concluded based on the different data sources and each corresponding relocalization conclusion may have a different confidence. An arbitrator may choose and select a best relocalization. For example, FIG. 145 illustrates an arbitrator proposing four different localization scenarios, the first proposal (proposal 1) having the highest confidence in the relocalization proposed and the last proposal (proposal 4) having the lowest confidence in the relocalization proposed. In embodiments, the proposal having the highest confidence in the relocalization of the robot may be chosen by the arbitrator.

In some embodiments, the processor of the robot may keep a bread crumb path or a coastal path to its last known rendezvous point. For example, FIG. 146A illustrates a path 14600 of the robot, beginning at a charging station 14601 and ending at 14602, wherein the processor of the robot has lost localization. A last known rendezvous point 14603 is known by the processor. The processor also kept a bread crumb path 14605 to the charging station 14601 and a break crumb path 14606 to the rendezvous point 14603. FIG. 146B illustrates a safe bread crumb path 14607 that the robot follows back to the charging station 14601. The bread crumb path 14607 generally remains in a middle area of the environment to prevent the robot from collisions or becoming stuck. FIG. 146C illustrates a coastal path 14608 that the robot may follow to return to the charging station 14601. FIG. 146D illustrates a coastal path 14609 that the robot may follow to last known point 14610 in which a reliable localization was determined. Although in going back to the last known location 14610 the robot may not have functionality of its original sensors, the processor may use data from other sensors to follow a path back to its last known good localization as best as possible because the processor kept a bread crumb path, a safe path (in the middle of the space), and a coastal path. In embodiments, the processor may be any of a bread crumb path, a safe path (in the middle of the space), and a coastal path. In embodiments, any of the bread crumb path, the safe path (in the middle of the space), and the coastal path comprise a path back to a last known good localized point, one point to a last known good localized point, two, three or more points to a last known good localized point, and to the start. In executing any of these paths back to a last known good localization point, the robot may drift as it does not have all of its sensors available and may therefore not be able to exactly follow a trajectory as planned. However, because the last known good localized point may not be too far, the robot is likely to succeed. The robot may also succeed in reaching the last known good localized point as the processor may use other methods to follow a coastal localization and/or because the processor may select to navigate in areas that are wide such that even if the robot drifts it may succeed.

FIG. 147 illustrates an example of a flowchart illustrating methods implemented in a localization arbitrator algorithm. The localization arbitrator algorithm constantly determines confidence level of localization and examines alternative localization candidates to converge to a best prediction. The localization arbitrator algorithm also initiates relocalization and chooses a next action of the robot in such scenarios.

Figure 148A:
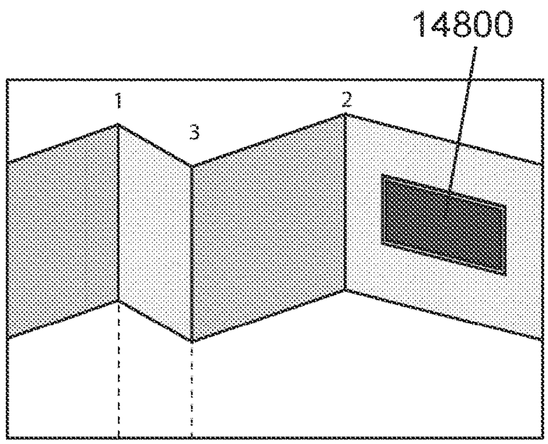
Figure 148B:
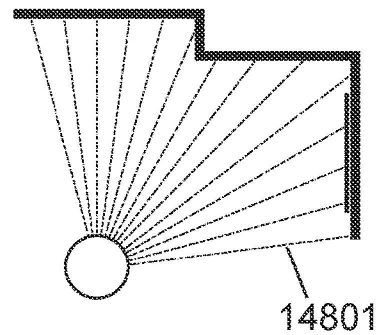
Figure 148C:
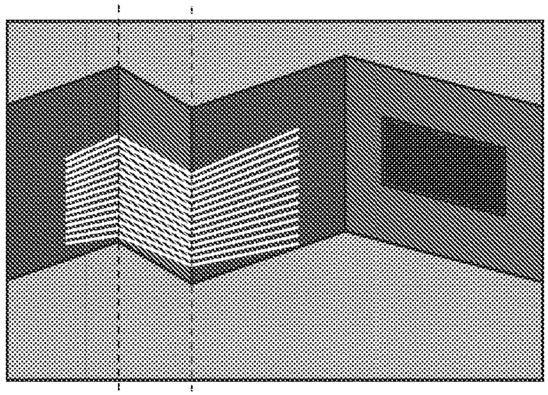
Figure 148D:
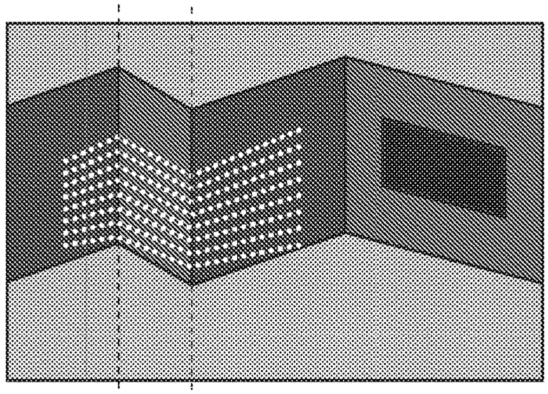
Figure 148F:
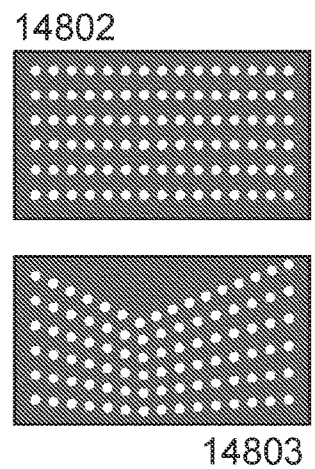
Figure 148E:
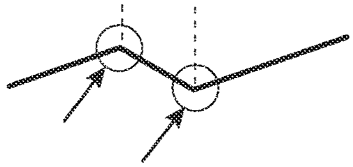

In yet another example, a RGB camera is set up with a structured light such that it is time multiplexed and synched. For instance, the camera at 30 FPS may illuminate 15 images of the 30 images captured in one second with structured light. At a first timestamp, an RGB image may be captured. In FIG. 148A, the processor of the robot detects a set of corners 1, 2 and 3 and TV 14800 as features based on sensor data. In FIG. 148B, a next time slot, the area is illuminated and the processor of the robot extracts L2 norm distances 14801 to a plane. With more sophistication, this may be performed with 3D data. In addition to the use of structured light in extracting distance, the structured light may provide an enhanced clear indication of corners. For instance, a grid like structured light projected onto a wall with corners is distorted at the corners. This is illustrated in FIGS. 148C and 148D, wherein the distortion is shown to correlate with the corners shown in FIGS. 148A and 148E. In a close-up image of the structured light, FIG. 148F illustrates the structured light when projected on a flat wall 14802 in comparison to the distorted structured light when projected on a wall with a corner 14803. The distorted structured light extracted from the RGB image based on examining a change of intensity and filters correlates with corners. Because of this correspondence, the illumination and depth may be used to keep the robot localized or help regain localization in cases where image feature extraction fails to localize the robot.

In some embodiments, a camera of the robot may capture images $t_0, t_1, t_2, \ldots, t_n$. In some embodiments, the processor of the robot may use the images together with SLAM concepts described herein in real time to actuate a decision and/or series of decisions. For example, the methods and techniques described herein may be used in determining a certainty in a position of a robot arm in relation to the robot itself and the world. This may be easily determined for a robot arm when its fixed on a manufacturing site to act as screwdriver as the robot arm is fixed in place. The range of the arm may be very controlled and actions are almost deterministic. FIG. 149 illustrates a factory robot 14900 and an autonomous car 14901. The car 14901 may approach the robot in a controlled way and ends up where it is supposed to be given the fixed location of the factory robot 14900. In contrast to a carwash robot 15000 illustrated in FIG. 150, the position of the robot in relation to a car 15001 is probabilistic on its own. With the robot 15000 on a floor 15002 that is not mathematically flat further issues arise and an end of the arm 15003 of the robot 15000 does not end up where it is supposed to be relative to the vehicle. In another example including a tennis playing robot, a location of the robot arm with respect to itself is uncertain due to freedom of motion and inaccuracy of motors. FIG. 151 illustrates a tennis court 15100 on which a human player 15101 is playing against a robot player 15102. Positions of the player, ball, robot and robot arm in relation to the map are highlighted with their mean and variances in 15103, 15104, 15105 and 15106, respectively.

In some embodiments, the processor of the robot may account for uncertainties that the robot arm may have with respect to uncertainties of the robot itself. For instance, actuation may not be perfect and there may be an error in a predicted location of the robot that may impact an end point of the arm. Further, motors of joints of the robot arm may be prone to error and the error in each motor may add to the uncertainty. In another example, two people in two different cities play tennis with each other remotely via two proxy robots. FIG. 152 illustrates two remote tennis courts 15200 and 15201. Human players 15202 and 15203 are playing against each other remotely using robot proxies 15204 and 15205, respectively. In this manner, it is as if they were actually playing in a same court, as depicted in 15206. In some embodiments, the remote tennis came may be broadcasted. For broadcasting, the side of the court on which human players 15202 and 15203 are playing may be superimposed to visually display the players 15202 and 15203 as playing against each other, as in 15206. In embodiments, various factors may need to be accounted for such as differences in gravity and/or pressure that each user experiences due to geographical circumstances. The game may be broadcasted on TV or on an augmented reality (AR) or virtual reality (VR) headset of a player or viewer. In some embodiments, the headset may provide extra information to a player. In embodiments, each player may receive three virtual balls to serve. The virtual ball may obey a set of rules that differ from the physical rules of the environment, such as a sudden change of gravity, gravity of another planet, or following an imaginary trajectory, etc. In embodiments, the virtual ball of a player may be shown on the augmented reality headset of the opponent. In some embodiments, the robot may be trained to act, play, and behave like a particular tennis player. For example, to train the robot to play similarly to Andre Agassi, a user may buy or rent a pattern extracted from all of his games (or current year of his game or another range of time) that define his tennis play to simulate him via the robot. In embodiments, historical data gathered from games played by him are provided to a neural network, the pattern defining his tennis play emerges and may be used by the robot to play as if it was Andre Agassi. FIG. 153 illustrates movements 15300 of a player captured by sensors that may be provided as input to a neural network executed by a processor of a robot such that it may learn and implement movements of a human in playing tennis.

FIG. 154A illustrates an example of a neural network, receiving images from various cameras 15400 positioned on a robot and various layers of the network that extract Fourier descriptors, Harr descriptors, ORB, Canny features, etc. FIG. 154B illustrates two neural networks 15401, each receiving images from cameras 15402 as input. One network outputs depth while the other extracts features such as edges. Processing of feature extraction and depth may be done in parallel. The two networks 15401 may be kept separate, compared by minimizing error or a new universe may be created when the data output does not fit observations of sensors of the robot well but are reasonable.

In some embodiments, an image may be segmented to areas and a feature may be selected from each segment. In some embodiments, the processor uses the feature in localizing the robot. In embodiments, images may be divided into high entropy areas and low entropy areas. In some embodiments, an image may be segmented based on geometrical settings of the robot. FIG. 155 illustrates various types of image segmentations. For instance, image segmentation for feature extraction based on entropy segmentation 15500, exposure segmentation 15501, and geometry segmentation 15502 based on geometrical settings of the robot. In embodiments, the processor of the robot may extract a different number of features from different segmented areas of an image. In some embodiments, the processor dynamically determines the number of features to track based on a normalized trust value that depends on quality, size, and distinguishability of the feature. For example, if the normalized trust value for five features are 0.4, 0.3, 0.1, 0.05, and 0.15, only features corresponding with 0.4 and 0.3 trust values are selected and tracked. In such a way, only the best features are tracked.

In some embodiments, the processor of the robot may use readings from a magnetic field sensor and a magnetic map of a floor, a building, or an area to localize the robot. A magnetic field sensor may measure magnetic floor densities in its surroundings in direction x, y and z. A magnetic map may be created in advance with magnetic field magnitudes, magnetic field inclination, and magnetic field azimuth with horizontal and vertical components. The information captured by the magnetic field sensor, whether real time, or historical, may be used by the processor to localize the robot in a six-dimensional coordinate system. When the sensors have a fixed relation with the robot frame, azimuth information may be useful for geometric configuration. In embodiments, the z-coordinate may align with the direction of the gravity. However, indoor environments may have a distortion in their magnetic fields and their azimuth may not perfectly align with the earth's north. In some embodiments, gyroscope information and/or accelerometer information may provide additional information and enhance the 6D localization. In embodiments, gyroscope information may be used to provide angular information. In embodiments, gravity may be used in determining roll and pitch information. The combination of these data types may provide enhanced 6D localization. Specially in localization of a mobile robot with an extension arm, a 6D localization is essential. For example, for a wall painting robot, the spray nozzle is optimal when it is perpendicular in relation to the wall. If the robot wheels are not on an exactly planer surface perpendicular to the wall, errors accumulate. In such cases, 6D localization is essential.

FIG. 156 illustrates a tennis court at two different time slots, time slot 0 and time slot 1, wherein a human player 15600 is playing against a robot 15601. Multiple measurements are determined by a processor of the robot 15601 based on sensor data (e.g., FOV 15602 of a camera of the robot 15601), such as player displacement, player hand displacement, player racket displacement, player posture, ball displacement, robot displacement, etc. In embodiments, a camera of the robot captures an image stream. In some embodiments, the processor selects images that are different enough from prior images to carry information using various methods, such as chi square test. In some embodiments, the processor uses information theory to avoid processing images that do not bear information. This step in the process is the key frame/image selection step. In embodiments, the processor may remove blurred images due to motion, lighting issues, etc. to filter out undesired images. In some embodiments, discarded images may be sent and used elsewhere for more in depth processing. For example, the discarded images may be sent to higher up processors, GPUs, the cloud, etc. After pruning unwanted images, the processor may determine using two consecutive images how much the camera positioned on the robot moved (i.e., or otherwise how much the robot moved) and how much the tennis ball moved. The processor may infer where the ball will be located next by determining the heading angular and linear speed and momentum of the ball, geo-characteristics of the environment, rules of motion of the ball, and possible trajectories.

In some embodiments, the processor may mix visual information with odometry information of dynamic obstacles moving around the environment to enhance results. For instance, extracting the odometry of the robot alone, in addition to visual, inertial, and wheel encoder information may be helpful. In some literature, depending on which sensor information is used to extract more specific perception information from the environment, these methods are referred to as visual-inertial or visual-inertial odometry. While an IMU may detect an inertial acceleration after the robot has accelerated a desired cruise speed, the accelerometer may not be helpful in detecting motion with a constant speed. Therefore, in such cases, odometry information from the wheel encoder may be more useful. These elements discussed herein may be loosely coupled, tightly coupled or dynamically coupled. For example, if the wheels of the robot are slipping on a pile of cords on the ground, IMU data may be used by the processor to detect an acceleration as the robot attempts to release itself by applying more force. The wheel turns in place due to slippage and therefore the encoder records motion and displacement. In embodiments, tight coupling, loose coupling, dynamic coupling, machine learned coupling, and neural network learned coupling may be used in coupling elements. In this scenario, visual information may be more useful in determining the robot is stuck in place however, if objects in the surroundings are moving the processor of the robot may misinterpret the visual information and conclude the robot is moving. In some embodiments, a fourth source of information, such as optical tracking system (OTS), may be dynamically consulted with to arbitrate the situation. OTS in this example may not record any displacement. This is an example of dynamic coupling versus tight or loose. In embodiments, a type, method, and level of coupling may depend on application and hardware. For example, a SLAM headset may not have a wheel encoder but may have a step counter that may yield different types of results.

In some embodiments, the processor of the robot may determine how much the player and how their racket each move. How the racket of the player moves may be used by the processor before the ball is hit by the player to predict how the player intends to hit the ball. In some embodiments, the processor determines the relative constant surroundings such as the playfield, the net, etc. The processor may relatively ignore the motions of the net due to light wind or the ball catcher moving and such. Where not useful, the processor may ignore some dynamic objects or may track them with low interval priority or best effort and with low latency requirement.

In some embodiments, the processor may extract some features from two images, run some processing and track the features. For example, if two lines are close enough and have a relatively similar size or are sufficiently parallel, the processor may conclude they represent the same feature. Tracking features that are relatively stationary in the environment, such as a stadium structure, may provide motion of the robot based on images captured at two consecutive discrete time slots. In some embodiments, odometry data from wheel encoders of the robot may be enhanced and corrected using odometry information from a visual source (e.g., camera) to yield more confident information. In some embodiments, the two separate sources of odometry information may be used individually when less accuracy is required. In embodiments, combining the data from different sources may be seen as a non-linear least square problem. Many equations may be written and solved for (or estimated) in a framework referred to as graph optimization.

Different techniques may be used to separate features that may be used for differentiating robot motion from other moving objects. For example, alignment of the odometry with stationary features. Another technique uses physical constraints of the robot and possible trajectories for a robot, a human, and a ball. For example, if some detected blob is moving at 100 miles per hour, it may be concluded that it is the tennis ball.

In some embodiments, a set of objects are included in a dictionary of objects of interest. For example, a court and the markings on the court may be easy to predict and exist in the game setting. Such visual clues may be determined and entered into the dictionary. In another example, a tennis ball is green and of a certain size. The tennis ball may take certain trajectories and may be correlated with trajectories of a racket in a few time slots. Magnus force imposes a force on a spinning object by causing the drag force to unevenly impact the top and bottom of the ball. This force may be created by the player to achieve a superior shot. FIG. 157 illustrates examples of different superior tennis ball shots. The green color of the ball causes the moving ball in consecutive images to be in the G channel of the RGB channels while RGB (and especially R channel) may not register much information or see the ball at all in extreme cases. Therefore, a green blob in the G channel may be tracked and represents ball movement. Similarly, a human shape may be an expected shape with certain possible postures. For example, FIG. 158 illustrates a human 15800 depicted as a stick figure representation 15801 with a racket 15802 depicted as a stick 15803. In applications such as the movie industry, an actor or actress that may not know how to dance may be shown to be dancing by extracting the stick figure motion of a professional dancer and applying the same motion to the actor or actress. Within the green channel, higher intensities are observed for objects perceived to be green in color. For example, a group of high intensity pixels surrounded by pixels of low intensity pixels in the green channel may be detected in an image as an object with green color. Some embodiments may adjust a certain intensity requirement of pixels, a certain intensity requirement of pixels when surrounded by pixels of a certain intensity, relative intensity of the pixels in relation to the surrounding pixels, etc. Such values may also be adjusted based on frame rate of camera, resolution, number of cameras, their geometric configuration, epipolar constraints, etc. Depending on what feature needs to be detected, line segments detector, ORB, FAST algorithms, BRIEF, etc. may be used.

In some embodiments, the processor of the robot must obtain information fast such the robot may execute a next move. In such cases, the processor may obtain a large number of low quality features fast. However, in some cases, the processor may need a few high quality features and may perform more processing to choose the few high quality features. In some embodiments, the processor may extract some features really fast and actuate the robot to execute some actions that are useful with a good degree of confidence. For example, assuming a tennis court is blue and given a tennis ball is green, the processor may generate a binary image, perform some quick filtration to detect a blob (i.e., tennis ball) in the binary image, and actuate the robot based on the result. The actions taken by the robot may veer the robot in a correct direction while waiting for more confident data to arrive. In some embodiments, the processor may statistically determine if the robot is better off taking action based on real time data and may actuate the robot based on the result. In embodiments, the robot system may be configured to use real time extracted features in such a manner that benefits the bigger picture of robot operation.

In embodiments, the robot, a headset of a player, and a standalone observing camera, may each have a local frame of reference in which they perceive the environment. In such a case, six dimensions may account for space and one dimension may account for time for each of the device. Internally, each device may have a set of coordinates, such as epipolar, to resolve intrinsic geometric relations and perceptions of their sensors. When the perceptions captured from these frames of reference of the three devices are integrated, the loop is closed and all errors accounted for, a global map emerges. The global may theoretically be a spatial model (e.g., including time, motion, events, etc.) of the real world. In embodiments, the six dimensions are ignored and three dimensions of space are assigned to each of the devices in addition to time to show how the data evolves over a sequence of positions of the device. FIGS. 159A and 159B illustrates two tennis courts 15900 in two different time zones with proxy robots 15900 an 15901 facilitating a remote tennis game against human players 15902 and 15903. Each robot may move in three dimensions of space (x, y, z) and has one dimension of time. Once the robots collaborate to facilitate the remote tennis game, each robot must process or understand two frames of reference of space and time.

In embodiments, a first collaborative SLAM robot may observe the environment from a starting time and has a map from time zero to time n that provides partial visibility to the environment. The first robot may not observe a world of a second robot that has a different geographic area and a different starting time that may not necessarily be simultaneous with the world of the for robot. Once the collaboration starts between the two robots, the processor of each robot deals with two sets of reference frames of space and time, their own and that of their collaborator. To track relations between these universes, a fifth dimension is required. While it may be thought that time and sensing mean the same thing for each of the SLAM collaborators, each SLAM collaborators work based on discrete time. For example, the processor of the first robot may use a third image of a stream of images while the processor of the second robot may use the fifth image of the stream of images for a same purpose. Further, the intrinsic differences of each robot, such as CPU clock rates, do not have a universal meaning. Even if the robot clocks were synced with NTP (network time protocol), their clocks may not have the exact same sync. A clock or time slice does not have a same meaning for another robot. To accommodate and account for the different stretches of the time concepts in the two universes of the robot, a fifth dimension is required. Therefore, the first robot may be understood to be at a location x,y,z in a 3D world at time $t_x$ within its own frame of reference for time and the second robot is at a location x,y,z in a 3D world at time $t'_x$, a different frame of reference for time. In embodiments, there may be equations relating t to t'. If both robots had identical time source and clock (e.g., two robots of a same make and model next to each other with internet connectivity from a same router), then t-t'=0 theoretically.

In some embodiments, the locations x,y,z and the 3D worlds of each robot may have differences in their resolution, units (e.g., imperial, SI, etc.), etc. For example, a camera on the first robot may be of a different make and model from the camera on the second robot (or on the headset or fixed camera previously referred to). Therefore, to account for what x means in the world of first robot and how it relates to x', the equivalent variable in the world of the second robot, an extra dimension may be used to denote and separate x from x'. This is a sixth dimension. Similarly, dimensions seven and eight are required for y and z and y' and z'. In an example, the first robot may perceive the tennis court as a planar court. Since a tennis court is mostly flat, such a perception should not cause any problems. However, the second robot may perceive minute bumps in a z-direction on the ground. Such disparities may be resolved using equations and perhaps understood but deliberately ignored to simplify the process or reduce cost.

In some embodiments, a ninth dimension may be introduced. The map of spatial information of the first robot has may not always be constant with respect to another map, wherein the universe of first robot may be changing position in relation to another universe. The following two examples depict this. In a first example, a third and a fourth player may be added to the remote tennis game previously described between two players. The third and fourth players do not play in a tennis court and do not play with a real ball, they join the game by playing in an augmented, virtual, or mixed reality environment. FIG. 160A illustrates a virtually displayed double match between four players 16000, 16001, 16002, and 16003. The four players are each playing remotely as illustrated in FIGS. 160B and 160C. Players 16000, 16001, and 16002 are each playing against a proxy robot 16003 that replicates the movements of the component of the respective player. Player 16003 is playing in an indoor environment using virtual reality screen 16004. In some cases, players wear VR headsets so they may virtually see and react to other players. The differences between each of the 3D versions of the world created by each of the various devices and the real world may vary. In another example, car company 1 selling self-driving cars may have previously created a 3D map of the world based on data from sensors of its cars collected while driving around the world. The 3D map corresponds to the realities of cities and the world but there may be (safely negligible) discrepancies and noise within the map. Car company 2 also has its own 3D version of the world which has some (often negligible) differences with the real world. The differences between the 3D version of the world company car 1 created and the real world does not necessarily align with the differences between the 3D version of the world car company created and the real world. FIG. 161 illustrates a graph comparing the deviation of the 3D versions of the world generated by two car companies and the actual real world. The changes or derivatives of these discrepancies that company 1 and company 2 experience appear as if they are moving with respect to one another, which may be modeled by the ninth dimension. Two cars with a same make but different model, resolution of sensors, locations, and connection network time protocol sources live in a same eighth dimension. In the example of the tennis game described above in FIG. 160 and in the example illustrated in FIG. 161, differences in the 3D world of each device relative to the real world are the result of noise accuracy of sensors, number and method of feature tracked density and sparsity of constructed spatial model of the environment, resolution, method of construction of the spatial model, etc.

In the tennis game example illustrated in FIG. 160, an operator sitting at a control center may intercept the game and change a behavior of the ball as observed by player 2 (remotely playing via virtual, augmented, or mixed reality). The change in behavior of the ball may be different than the trajectory of the ball caused by an action of player 3 or 4. Similarly, the operation may change an appearance of a trajectory of the ball caused by an action of player 2 as observed by players 3 and 4. Such changes in the behavior of the ball necessitate the existence of a tenth dimension. In some embodiments, someone other than the operator may elicit such behavior changes. For example, players on a same team may intercept or recover a missed intention of their teammate. If player 1 missed the ball, player 2 may recover and hit the ball. Both players performed an action, however, the action of player 2 overrides the action of player 1 in defining the behavior of the ball. This change is tracked and accounted for in the tenth dimension. Therefore, to model a collaborative SLAM system, a total of eleven dimensions are required (dimension zero to dimension ten). In embodiments, the methods and techniques described herein may be used with reasonable modification to the math, code, and literature as a framework for collaborative SLAM or collaborative AI.

In some embodiments, apart from the robot, the external camera, or the headset, the ball, the rackets, etc. each having sensors such as cameras, IMU, force sensors, etc. may be connected to the collaborative SLAM system as well. For instance, sensors of the racket may be used to sense how the strings are momentarily pulled and at what coordinate. A player may wear shoes that are configured to record and send step meter information to a processor for gait extraction. A player may wear gloves that are configured to interpret their gesture and send information based on IMU or other sensors it may have. The ball may be configured to use visual inertia to report its localization information. In some embodiments, some or all information of all smart devices may pass through the internet or cloud or WAN. Some information may be passed locally and directly to physically connected participants if they are local. In one case, the shoes and gloves may be connected via Bluetooth using a pairing process with the headset the user is wearing. In another case, the ball may be paired with a Wi-Fi router in a same way as other devices are. The ball may have an actuator within and may be configured to manipulate its center of mass to influence its direction. This may be used by players to add complexity to the game. The ball may be instructed by a user (e.g., via an application paired with the ball) to apply a filter that causes the ball to perform a certain series of actuations.

In some embodiments, the tennis ball may include visual sensors, such as one camera, two cameras, etc. In some embodiments, the tennis ball may include an IMU sensor. FIG. 162A illustrates examples of a ball 16200 with one camera 16201, two cameras 16202 and multiple cameras 16203. FIG. 162B illustrates IMU data (e.g., rotation and acceleration) data over time and FIG. 162C illustrates data captured by a camera FOV 16204 of the ball 16200 over time. FIG. 162D illustrates the combination of camera and IMU data to generate localization data and correct a pose of the robot. This information may be sent out as a sensor reading. In some embodiments, the processor may use gauss-newton, newton, Levenberg-Marquardt, etc. optimization functions to approximate (perhaps repeatedly) optimized solutions starting from an initial point using, for example, gradual and curvature of a function. This allows the processor to predict where ball will be at a time $t_1$. In embodiments, the processor may filter out a person walking captured in the image as it is not useful information.

In embodiments, a Kalman filter may be used by the processor to iteratively estimate a state of the robot from a series of noisy and incomplete measurements. An EKF may be used by the processor to linearize non-linear measurement equations by performing first-order linear traction on a Taylor expansion of the non-linear function and ignoring the remaining higher order terms. Other variations of linearizing create other flavors of the Kalman filter. For brevity, only a Kalman filter is described, which in a broader sense determines a current state $S_i$ based on a previous state $S_{i-1}$, a current actuation $u_i$, and an error covariance $P_i$ of the current state. The degree of correction that is performed is referred to as the Kalman gain. FIG. 163 illustrates an example of a process of a Kalman filter consisting of nodes and edges and the computations and outputs that occur at each node. In some embodiments, the optimization may occur in batches and iteration of a group of nodes and edges. In some embodiments, PNP function, Gauss-Newton optimization function, or Levenberg optimization function may be used by the processor.

In some embodiments, the processor selects features to be detected from a group of candidates. Each feature type may comprise multiple candidates of that type. Feature types may include, for example, a corner, a blob, an arc, a circle, an edge, a line, etc. Each feature type may have a best candidate and multiple runner up candidates. Selections of features to be detected from a group of candidates may be determined based on any of pixel intensities, pixel intensity derivative magnitude, and direction of pixel intensity gradients of groups of pixels, and inter-relations among a group of pixels with other groups of pixels. In some embodiments, features may be selected (or weighed) to be selected by the processor based on where they appear in the image. For example, a high entropy area may be preferred and a feature discovered within that area may be given more weight. Or a feature at a center of the image may have more weight compared to features detected in less central areas.

During selection of features, those found to share similar characteristics such as angle in the image and length of the feature and that appear in close proximity to each other are learned to be a same feature and are merged. In some embodiments, one of the two merged features may be deleted while the other one continues to live, or a sophisticated method may be used, such as an error function, to determine a proper representation of the two seemingly representations of the same real feature. In some embodiments, the processor may recognize a feature to be a previously observed feature in a previously captured image by resizing the image to larger or smaller version such that the feature appears larger or smaller from a different perspective. In some embodiments, the processor creates an image pyramid by multiple instantiations of the same image at different sizes. In one example, a ball may have more than one camera. In embodiments, cameras may be tiny and placed inside the ball. In some embodiments, the ball may be configured to extract motion information from moving parallax, physical parallax, stereo vision and epipolar geometry. The ball may include multiple cameras with overlapping or non-overlapping features. Whether one or more cameras is used, depth information emerges as a side effect. With one camera moving, the parallax effect provides depth in addition to features.

In some embodiments, the processor may use features to obtain heading angle and translational motion. Depth may add additional information. Further, some illumination or use of TOF depth camera instead of RGB camera may also provide more information. The same may be applied to the tennis robot, to the headset worn by the players, to other cameras moving or stationary, to wearables such as gloves, shoes, rackets, etc. In some embodiments, the ball may be previously trained within an environment, during a game, during a first part of a game until loop closure during which time the ball gathers features in its database that may later be used to find correspondences between data through search methods. FIG. 164 illustrate a displacement of a ball 16400 from ($x_1$, $y_1$, $z_1$) to ($x_2$, $y_2$, $z_2$). When calculating merely the movement of the ball, displacement data, velocity data, (angular or linear), acceleration, etc. may be computed and sent out at all times to other collaborative SLAM participants. As such, the ball may be thought of as a sensor extension that is wirelessly connected to the system. In embodiments, the ball may be configured to act as an independent sensor capable of sensing and sending SLAM information to other devices. Instead of a depth sensor or IMU sensor, the ball is introduced as a sensor capable of sending all that data combined into a useful, polished, and processed output. The ball may be considered a SLAM sensor that may be used as an entity inside another device or as an extension to another device. FIG. 165 illustrates a ball 16500 including cameras 16501 and IMU sensor configured to operate as a SLAM sensor. The ball 16500 may be attached to a drone 16502 that may gather data independently itself. In embodiments, the ball may be an extension that is physically or wirelessly connected or connected through internal circuit buses via USB, USART, UART, etc.

When the ball is in the air, the ball may be configured to rely on visual internal sensing in determining displacement. When the ball rolls on the floor, the ball may be configured to determine displacement based on how many rotations the ball completed determined using sensor data, the radius of the ball, and visual, inertial odometer sensing SLAM. For a bike, steering of a front wheel may be used as an additional source of information in the prediction step. For a car, the steering of the wheel may be measured and incorporated in predicting the motion of the car. Steering may be controlled to actuate a desired path as well. For a car, GPS information may be bundled with images, wheel odometer data, steering angle data, etc.

When SLAM is viewed as a sensor, its real-time and its light weight properties become an essential factor. Various names may be thought of for SLAM as a sensor, such as SLAM camera, collaborative SLAM participant, motion acquisition device, spatial reconstruction device and sensor. This device may be independently used for surveying an environment. For example, a smart phone may not be required for observing an environment, a SLAM sensor such as the ball may be thrown in the environment and may capture all the information needed. In some cases, the actuator inside the ball may be used to guide the ball in a particular way. In some embodiments, the ball may be configured to access GPS information through an input port, wirelessly or wired and use the information to further enhance the output. Other information that may enhance the output includes indoor GPS, magnetic finger print map of indoors, Wi-Fi router locations, cellular 5G tower locations, etc. Note that while a ball is used throughout in various examples, the ball may be replaced by any other object, such as any robot type, a hockey stick, rollerblades, a Frisbee, etc.

In some embodiments, the SLAM sensor may be configured to read information from previously provisioned signs indoors or outdoors. To reiterate that depth information may be determined in multiple ways, in one embodiment the ball may include a camera equipped with optical TOF capabilities and depth may be extracted from the phase lag of modulated light reflected from the environment and captured by the camera having a modulated shutter acting in coordination with the emitted structured light. The depth may be an additional dimension, forming RGBD readings.

In embodiments, structured light emission and the electronic shutter of the camera with a sensor array may work in tandem and with predetermined (or machine learned) modulations with an angular offset to create a controlled time gap between the light emission and shutter. When the range of the depth values are larger than half of the distances traveled by light during one modulation, c/2f, there is more than one answer for the equation. Therefore, consecutive readings and equations resolve the depth. Alternatively, neighboring pixels and their RGB values may be used as a clue to conclude the same similar distances.

In embodiments, 2D feature extractions may add additional information used in approximating a number of equations less than a number of unknowns. In such settings, a group of candidates may be the answer to the equation rather than one candidate. In embodiments, machine learning, computer vision and convolutional neural network methods may be used as additional tools to adjudicate and pick the right answer from a group of candidates. In some embodiments, the sensor capturing data may be configured to use point cloud readings to distinguish between moving objects, stationary objects, and background which is structural in nature. For example, FIG. 166 illustrates a satellite 16600 generating a point cloud 16601 above a jungle area 16602 at a first time point $t_i$. As the satellite 16600 moves and gathers more data points, the processor separates the sparse points that reach ground level from the dense points that reach the tops of trees. Dense point clouds are created based on reflection of laser points from the leaves of trees. Sparse, thin point clouds are created based on reflections of the few laser points penetrating to the surface and reflecting back. The high density point cloud fits into its own set of equations organized in a first graph. The low density point cloud fits into a second set of equations organized in a second graph. In creating a baseline of the two point clouds, any moving object inside the jungle may be easily tracked. This concept may provide a rich level of information in robotics. When a robot with a depth camera or LIDAR, or both traverses on environment, point clouds are organized in more than just one set of graphs. In embodiments, the processor uses least square methods to approximate a best guess of the surroundings based on collected point clouds. In embodiments, the processor removes the outlier points that do not fit well with previous data. In this example, the point clouds are categorized into more than just one group. The processor uses a classification method to clarify which point clouds belong to which group and then optimizes two separate graphs, each with a group of point clouds that belong to each set. FIGS. 167A-167C illustrate a robot with LIDAR 16700, a moving person 16701 and a wall 1102. As the robot generates point clouds 16703 and 16704 corresponding to the person 16701 and wall 1102, respectively, the processor separates the data points into point clouds 16703 and 16704 and separate graphs based on their characteristics.

Figure 170B:
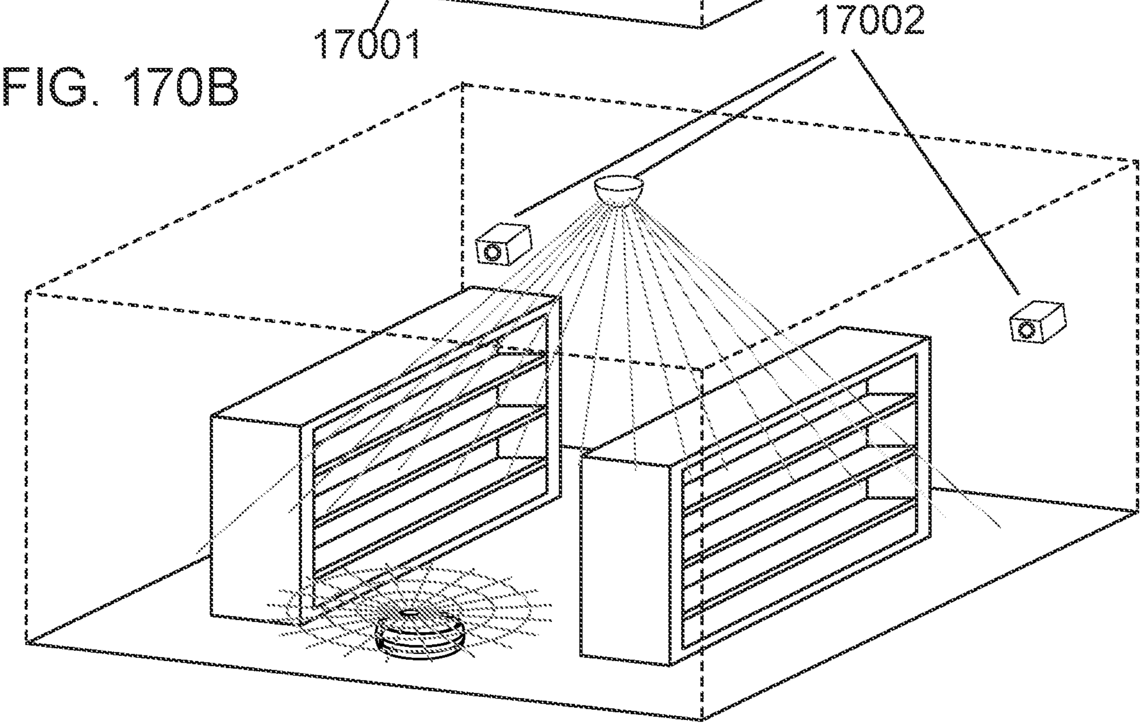

Some embodiments may implement unsupervised classification and methods. In separating points, L2 or mandola distances or other factors may be used. Prior to runtime, measurements captured for establishing a baseline by on-site training may be useful. For example, prior to a marathon race, a robot may map the race environment while no dynamic obstacles or persons are present. This may be accomplished by the robot performing a discovery or training run. In embodiments, additional equipment may be used to add to the dimension, resolution, etc. of the map. For example, a processor of a wheeled robot with a 2.5D laser rangefinder LIDAR may create a planar map of the environment that is flattened in comparison to reality in cases where the robot is moving on an uneven surface. This may be due to the use of observations from the LIDAR in correcting the odometer information, which ignores uneven surfaces and assumes that the field of work is flat. This may acceptable in some applications, however, in some applications such as farming, mining, construction, etc. robots this may be undesired. FIG. 168 illustrates the use of LIDAR readings 16800 to correct odometer information on an uneven plane 16801 resulting in a distorted map 16802 of the environment. One solution may be to use a drone with LIDAR to survey the environment prior to runtime. FIG. 169 illustrates a drone with LIDAR 16900 surveying an environment 16901 before runtime to have a more accurate model 16902 of the real world. This may be useful for the automotive industry. In fact, the automotive industry is creating a detailed 3D reconstruction of an entire transportation infrastructure including places cars may drive. This 3D reconstruction may serve as one of the frame of references within which the autonomous car drives in. A similar spatial recreation of the workplace may be performed for indoor spaces. For example, a commercial cleaning robot operating within a super store may have access to a previously constructed map of the workplace in full 3D. The map may be acquired by the processor of the robot itself running a few times to train to map the construction of the environment. In some cases, some additional mapping information may be provided by a special mapping robot or drone that may have a higher resolution than the robot itself. FIG. 170A illustrates using a mapping robot/drone 17000 with higher resolution capabilities in the training phase to help generate a previously constructed map for a working robot 17001. FIG. 170B illustrates using spatial equipment such as separate cameras 17002 positioned on the walls and ceiling to help the robot localize itself within the map. Information between all devices shown in FIGS. 170A and 170B may be transferred wirelessly to one another.

In one example, a detailed map of the environment may be generated by a processor of a specialized robot and/or specialized equipment during multiple runs. In embodiments, the map may include certain points of interest or clues that may be used by the robot in SLAM, path planning, etc. For example, a detected sign may be used to as a virtual barrier for confinement of the robot to particular areas or to actuate the robot to execute particular instructions. In some cases, cameras or LIDARs positioned on a ceiling may be used to constantly monitor moving obstacles (including people and pets) by comparing a first, a second, a third, etc. classes of point clouds against a baseline. Once a baseline of the environment is set up and some physical clues are placed, the cleaning robot may be trained to operate within the environment.

In some embodiments, the robot operates within the environment and the processor learns to map the environment based on comparison with maps previously generated by collaborators at higher resolutions and with errors that are addressed and accounted for. Similar to this, a tennis ball with a small processing power may not comprise heavy equipment. As such, the ball may be trained during play such that it may more easily localize itself at runtime.

In some embodiments, a bag of visual words may be created in advance or during a first runtime of the robot or at any time. In embodiments, a visual word refers to features of the environment extracted from images that are captured. The features may be 2D extracted features, depth features, or manually placed features. At runtime, the robot may encounter these visual words and the processor of the robot may compare the visual words encountered with the bag of visual words saved in its database to identify the feature observed. In embodiments, the robot may execute a particular instruction based on the identified feature associated with the visual word. FIG. 171A illustrates an example of an object 17100 with a particular indentation pattern, the features of which are defined by visual words. The object 17100 may be identified by the processor of the robot based on detecting the unique indentation pattern of the object 17100 and may be used to localize the robot given a known location of the object 17100. For instance, FIGS. 171B and 171C illustrate the object 17100 installed at the end of aisles 17101 and a path 17102 of the robot during a first few runs. The robot is pushed by a human operator along a path 17102 during which sensors of the robot observe the environment, including landmark objects 17100, such that they may learn the path 17102 and execute it autonomously in later work sessions. In future work sessions, the processor may understand a location of the robot and determine a next move of the robot upon sensing the presence of the object 17100. In FIGS. 172A and 172B, the human operator may alternatively use an application of a communication device 17103 to draw the path of the robot 17102 in a displayed map 17104. In some embodiments, upon detecting one or more particular visual words, such as the features defining the indentation pattern of object 17100, the robot may autonomously execute one or more instructions. In embodiments, the robot may be manually set to react in various ways for different visual words or may be trained using a neural network that observes human behaviors while the robot is pushed around by the human. In embodiments, planned paths of the robot may almost be the same as a path a human would traverse and actual trajectories of the robot are deemed as acceptable. As the robot passes by landmarks, such as the object with unique indentation pattern, the processor of the robot may develop a reinforced sense of where the robot is expected to be located upon observing each landmark and where the robot is supposed to go. In some embodiments, the processor may be further refined by the operator training the robot digitally (e.g., via an application). The spatial representation of the environment (e.g., 2D, 3D, 3D+RGB, etc.) may be shown to the user using an application (e.g., using a mobile device or computer) and the user may use the application to draw lines that represent where the user wants the robot to drive.

In some embodiments, two or more sets of data are rigidly correlated wherein a translation is provided as the form of correlation between the two or more sets of data. For example, the Lucas-Kanade method, wherein $g(x)=f(x-t)$. The processor determines the disparity $$t = \frac{f(x) - g(x)}{f'(x)}$$

in the x direction for the two functions $g(x)$ and $f(x)$, assuming that $g(x)$ is a shifted version of $f(x)$, as illustrated in FIG. 173. In some embodiments, the processor performs a scale invariant feature transform wherein a space is scaled to capture features at multiple scales. Such technique may be useful for stitching image data captured from different distances or with differing parameters. As the robot moves or remains static, the robot transitions from one state to another. Concurrently, an image sensor captures a video stream comprising a sequence of images and other sensors capture data. The state transition of the robot may be a function of time, displacement, or change in observation. FIG. 174A illustrates an example of state transition from $s_1$ to $s_2$. Even though the FOV 17400 of a camera 17401 of the robot, and consequently the observations, remain the same, the state of the robot transitions as the chronic time changed. FIG. 174B Illustrates the state of the robot transitioning as the robot remains in a same location because a person walked into the FOV 17400 of the camera 17401, thereby changing the observations of the robot. FIG. 174C illustrates the state of the robot transitioning because the robot and hence the camera 17401 moved locations.

The integral of all the constraints that connect the robot to the surroundings may be a least squares problem. The sparseness in the information matrix allows for variable elimination. FIG. 175 illustrates an example of at least a portion of a real-time system of the robot. In some embodiments, the processor determines a best match between features based on minimum distance in the feature space, a search for the nearest neighbor. All possible matches between two sets of descriptors $S_1$ and $S_2$ with size of $N_1$ elements and $N_2$ elements, respectively, require Nix $N_2$ feature distance comparisons. In some embodiments, the processor may use a K-dimensional tree to solve the problem. In some embodiments, an approximation method is preferred in solving the problem because of the curse of dimensionality. For example, the processor may use a best bin first method to search for neighboring feature space partitions by starting at the closest distance. The processor stops searching after a number of top candidates are identified.

In embodiments, a simulation may model a specific scenario created based on assumptions and observe the scenario. From the observations, the simulation may predict what may occur in a real-life situation that is similar to the scenario created. For instance, airplane safety is simulated to determine what may happen in real-life situations (e.g., wing damage).

In some embodiments, the processor may use Latin Hypercube Sampling (LHS), a statistical method that generates near-random samples of parameter values from a distribution. In some embodiments, the processor may use orthogonal sampling. In orthogonal sampling, the sample space is divided into equally probable subspaces. In some embodiments, the processor may use random sampling.

In embodiments, simulations may run in parallel or series. In some embodiments, upon validation of a particular simulation, other simulations may be destroyed or kept alive to run in parallel to the validated simulation. In some embodiments, the processor may use Many World Interpretation (MWI) or relative state formation (also known as Everett interpretation). In such cases, each of the simulation run in parallel and are viewed as a branch in a tree of branches. In some embodiments, the processor may use quantum interpretation, wherein each quantum outcome is realized in each of the branches. In some applications, there may be a limited number of branches. The processor may assign a feasibility metric to each branch and localize based on the most feasible branch. In embodiments, the processor chooses other feasible successors when the feasibility metric of the main tree deteriorates. This is advantageous to Rao-Blackwellized particles as in such methods the particles may die off unless too many particles are used. Therefore, either particle deprivation or the use of too many particles occurs. Occam's razor or law of parsimony states that entities should not be multiplied without necessity. In the use of Rao-Blackwellized particles, each samples robot path corresponds with an individual map that is represented by its own local Gaussian. In practice, a large number of particles must be generated to overcome the well-known problem of particle deprivation. The practical issue with Rao-Blackwellization is its weakness in loop closure. When the robot runs long enough many improbable trajectories die off (due to low importance weight) and the live particles may all track back to a common ancestor/history at some point in the past. This is solvable if the number of particles are high (i.e., the run time of robot is short).

In some embodiments, the processor may use quantum multi-universe methods to enhance the robotic device system and take advantage of both worlds. In some cases, resampling may be incorporated as well to prohibit some simulations from continuing to drift apart from reality. In some embodiments, the processor may use multinominal resampling, residual resampling, stratified resampling, or systematic resampling. In some embodiments, the processor keeps track of the current universe by a reinforced neural network and back propagation. In some sensor, the current universe may be the universe that the activation functions chooses to operate while keeping others in standby. In some embodiments, the processor may use reinforcement learning for self-teaching. In some embodiments, the neural network may reduce to a single neuron, in which case finding which universe is the current universe is achieved by simple reinforcement learning and optimization of a cost function. The multi-universe may be represented by $U=\{u_1, u_2, \ldots, u_n\}$. With multiverse theorem the issue of scalability is solved. In a special case, there may only be a single universe, wherein $U=\{u_1\}$. In some embodiments, the special case of $U=\{u_1\}$ may be used when a coverage robot is displaced by two meters or less. In this case, the processor may easily maintain localization of the robot.

In embodiments, the real-time implementation described herein does not prohibit higher level processing and use of additional HW. In some embodiments, real time and light-weight localization may be performed at the MCU and more robust localization may be carried out on the CPU or the cloud. In some embodiments, after an initial localization, object tracking may fill in the blanks until a next iteration of localization occurs. In some embodiments, concurrent tracking and localization of the robot and multiple moving (or stationary) objects may be performed in parallel. In such scenarios, a map of a stationary environment may be enhanced with an object database, the movement patterns and predictions of objects within the supposed stationary surrounding. The prediction of the map of the surroundings may further enhance navigation decisions. For example, in a two way street a processor of a vehicle may not only localize the vehicle against its surroundings but may localize other cars, including those driving in an opposite direction, and create an assumed map of the surrounding and plan the motion of the vehicle by predicting a next move of the other vehicles, rather than waiting to see what the other vehicles do and then reacting. FIG. 176 compares traditional localization and mapping against the enhance method of mapping and localization described herein. Using traditional SLAM, a processor of a car localizes the robot and plans its next move based on the localization. In the enhanced SLAM method, additional localization and mapping is determined for other vehicles within the surroundings to predict their movements. Those predicted movements of other vehicles may be used by the processor of the vehicle in planning a next move.

Since mapping is often performed initially and localization is the majority of task performed after the initial mapping (assuming the environment does not change significantly), in some embodiments, a graph with data from any of odometry, IMU, OTS, and point range finder (e.g., flight sense by ST Micro) may be generated. In embodiments, iterative methods may be used to optimize the collected information incrementally. FIG. 177 illustrates the use of iterative methods in optimizing collected information incrementally. Different data inputs from different sensors (e.g., IMU, odometer, etc.) are matched with different image inputs captured by the camera. In embodiments, the data are merged after an initial run using ICP or other statistical methods. In some embodiments, this may use as a set of soft constraints which may later be reinforced with visual information that can help with both correcting the errors and closing the loop.

In embodiments, a path planner of the robot may actuate the robot to explore the environment to locate or identify objects. As such, the path planner may actuate the robot to drive around an object to observe the object from various angles (e.g., 360 degrees). In some cases, the robot drives around the object at some radial distance from the object. The object information gathered (whether the object is recognized, identified, and classified or not) may be tracked in a database. The database may include coordinates of the object observed in a global frame of reference. In embodiments, the processor may organize the objects that are observed in sequence sequentially or in a graph. The graph may be one dimensional (serial) or arranged such that the objects maintain relations with K-nearest neighbour objects. In sequential runs, as more data is collected by sensors of the robot or as the data are labelled by the user, the density of information increases and leads to more logical conclusion or arrangement of data. For example, in a real-time ARM architecture, Nested Vector Interrupt Controller (NVIC) may service up to 240 interrupt sources while fast & deterministic interrupt handling includes a deterministic (12 g cycles every time) from when the interrupt is raised until reaching a first line of "C" in interrupt service routine. In embodiments, the processor may use the objective function $\Sigma c_i x_i$ wherein $1 \leq i \leq n$, and the constraint function $$\sum a_i x_i \geq = \leq b_1 \sum a_2 x_i \geq = \leq b_2 \vdots \sum a_m x_i \geq = \leq b_m$$

wherein $1 \leq i \leq n$. In some embodiments, the constraint function may be minimization or maximization. The objective function used may be Maximize Minimize $\Sigma c_i x_i$, such that $a_i x_i = b$.

FIG. 178 illustrates that with movement from real time to buffering there is time performance guarantee and less surprises. At the real-time end of the spectrum there are poor worst case scenarios. In some embodiments, the processor finds an optimum over a finite set of alternatives by enumerating all the alternatives and selecting the best alternative. However, this method does not scale well. Therefore, in some embodiments, the processor groups alternatives together and creates a representative for each set. When the representative is ruled out, the whole set is ruled out. Only when the representative is within a feasible region, then other alternatives in the set are considered in finding a better match. Groups may have sub-groups with representatives, and when the representative of the sub-group is ruled out the entire sub-group is ruled out and when the representative is within a feasible range its constituents are examined.

In some embodiments, this may be applied to localization. There may be n possible positions/states for the robot, $(x_1, y_1), (x_2, y_2), \ldots (x_n, y_n)$. The processor may examine all possible y values for each value of $x_1$, $x_2$, and so forth. In some embodiments, this results in the formation of a tree. In one case, the processor may localize the robot in the state space by assuming $(x_1, y_1)$ and determining if it fits, then assuming $(x_2, y_i)$ and determining if it fits, and so forth. The processor may examine different values of x or y first. FIG. 179A illustrates a grid map with possible states for the robot represented by coordinate (x, y). The processor localizes the robot in the state space by assuming $(x_1, y_1)$ and determining if it fits, then assuming $(x_2, y_1)$ and determining if it fits, and so forth. This process is illustrated in FIG. 179B. In another case, the processor may group some states together and search the groups to determine if the state of the robot is approximately within one of the groups. Upon identifying a group, the processor may search further until a final descendant is found. FIG. 180 illustrates groups of states. The processor searches the groups to determine if the state of the robot is approximately within one of the groups. Upon identifying a group, the processor searches further until a final descendant is found.

In embodiments, the SLAM algorithm executed by the processor of the robot provides consistent results. For example, a map of a same environment may be generated ten different times using the same SLAM algorithm and there is almost no difference in the maps that are generated. In embodiments, the SLAM algorithm is superior to SLAM methods described in prior art as it is less likely to lose localization of the robot. For example, using traditional SLAM methods, localization of the robot may be lost if the robot is randomly picked up and moved to a different room during a work session. However, using the SLAM algorithm described herein, localization is not lost.

A function $f(x)=A^{-1}x$, given $A\in R^{n\times n}$, with an eigenvalue decomposition may have a condition number $$\left|\frac{\lambda_i}{\lambda_j}\right|.$$

The condition number may be the ratio of the largest eigenvalue to the smallest eigenvalue. A large condition number may indicate that the matrix inversion is very sensitive to error in the input. In some cases, a small error may propagate. The speed at which the output of a function changes with the input the function receives is affected by the ability of a sensor to provide proper information to the algorithm. This may be known as sensor conditioning. For example, poor conditioning may occur when a small change in input causes a significant change in the output. For instance, rounding errors in the input may have a large impact on the interpretation of the data. Consider the functions $y=f(x)$ and $$f'(x)=\frac{dy}{dx},$$

wherein $$\frac{dy}{dx}$$

is the slope of $f(x)$ at point x. Given a small error $\in$, $f(x+\in)\approx f(x)+\in f'(x)$. In some embodiments, the processor may use partial derivatives to gauge effects of changes in the input on the output. The use of a gradient may be a generalization of a derivative in respect to a vector. The gradient $\nabla_x f(x)$ of the function $f(x)$ may be a vector including all first partial derivatives. The matrix including all first partial derivatives may be the Jacobian while the matrix including all the second derivatives may be the Hessian, $$H(f(x))_{i,j}=\frac{\partial^2}{\partial x_i\partial x_j}f(x).$$

The second derivatives may indicate how the first derivatives may change in response to changing the input knob, which may be visualized by a curvature.

In some embodiments, a sensor of the robot (e.g., two-and-a-half dimensional LIDAR) observes the environment in layers. For example, FIG. 181A illustrates a robot 18100 taking sensor readings 18101 using a sensor, such as a two-and-a-half dimensional LIDAR. The sensor may observe the environment in layers. For example, FIG. 181B illustrates an example of a first layer 18102 observed by the sensor at a height 10 cm above the driving surface, a second layer 18103 at a height 40 cm above the driving surface, a third layer 18104 at a height 80 cm above the driving surface, a fourth layer 18105 at a height 120 cm above the driving surface, and a fifth layer 18106 at a height 140 cm from the driving surface, corresponding with the five measurement lines in FIG. 181A. In some embodiments, the processor of the robot determines an imputation of the layers in between those observed by the sensor based on the set of layers S={layer 1, layer 2, layer 3, . . . } observed by the sensor. In some embodiments, the processor may generate a set of layers S'={layer 1', layer 2', layer 3', . . . } in between the layers observed by the sensor, wherein layer 1', layer 2', layer 3' may correspond with layers that are located a predetermined height above layer 1, layer 2, layer 3, respectively. In some embodiments, the processor may combine the set of layers observed by the sensor and the set of layers in between those observed by the sensor, S'+S={layer 1, layer 1', layer 2, layer 2', layer 3, layer 3', . . . }. In some embodiments, the processor of the robot may therefore generate a complete three dimensional map (or two-and-a-half dimensional when the height of the map is limited to a particular range) with any desired resolution. This may be useful in avoiding analysis of unwanted or useless data during three dimensional processing of the visual data captured by a camera. In some embodiments, data may be transmitted in a medium such as bits, each comprised of a zero or one. In some embodiments, the processor of the robot may use entropy to quantify the average amount of information or surprise (or unpredictability) associated with the transmitted data. For example, if compression of data is lossless, wherein the entire original message transmitted can be recovered entirely by decompression, the compressed data has the same quantity of information but is communicated in fewer characters. In such cases, there is more information per character, and hence higher entropy. In some embodiments, the processor may use Shannon's entropy to quantify an amount of information in a medium. In some embodiments, the processor may use Shannon's entropy in processing, storage, transmission of data, or manipulation of the data. For example, the processor may use Shannon's entropy to quantify the absolute minimum amount of storage and transmission needed for transmitting, computing, or storing any information and to compare and identify different possible ways of representing the information in fewer number of bits. In some embodiments, the processor may determine entropy using $H(X)=E[-\log_2 p(x_i)]$, $H(X)=-\int p(x_i)\, p(x_i)\, dx$ in a continuous form, or $H(X)=-\Sigma_i\, p(x_i)p(x_i)$ in a discrete form, wherein H(X) is Shannon's entropy of random variable X with possible outcomes $x_i$ and $p(x_i)$ is the probability of $x_i$ occurring. In the discrete case, $-\log_2 p(x)$ is the number of bits required to encode $x_i$.

Considering that information may be correlated with probability and a quantum state is described in terms of probabilities, a quantum state may be used as carrier of information. Just as in Shannon's entropy, a bit may carry two states, zero and one. A bit is a physical variable that stores or carries information, but in an abstract definition may be used to describe information itself. In a device consisting of N independent two-state memory units (e.g., a bit that can take on a value of zero or one), N bits of information may be stored and $2^N$ possible configurations of the bits exist. Additionally, the maximum information content is $\log_2(2^N)$. Maximum entropy occurs when all possible states (or outcomes) have an equal chance of occurring as there is no state with higher probability of occurring and hence more uncertainty and disorder. In some embodiments, the processor may determine the entropy using $H(X)=-\Sigma_{i=1}^{w} p_i p_i$, wherein $p_i$ is the probability of occurrence of the $i^{th}$ state of a total of w states. If a second source is indicative of which state (or states) i is more probable, then the overall uncertainty and hence entropy reduces. The processor may then determine the conditional entropy H(X|second source). For example, if the entropy is determined based on possible states of the robot and the probability of each state is equivalent, then the entropy is high as is the uncertainty. However, if new observations and motion of the robot are indicative of which state is more probable, then the uncertainty and entropy are reduced. In such as example, the processor may determine conditional entropy H(X|new observation and motion). In some embodiments, information gain may be the outcome and/or purpose of the process.

Depending on the application, information gain may be the goal of the robot. In some embodiments, the processor may determine the information gain using $IG=H(X)-H(X|Y)$, wherein H(X) is the entropy of X and H(X|Y) is the entropy of X given the additional information Y about X. In some embodiments, the processor may determine which second source of information about X provides the most information gain. For example, in a cleaning task, the robot may be required to do an initial mapping of all of the environment or as much of the environment as possible in a first run. In subsequent runs the processor may use that the initial mapping as a frame of reference while still executing mapping for information gain. In some embodiments, the processor may compute a cost r of navigation control u taking the robot from a state x to x'. In some embodiments, the processor may employ a greedy information system using argmax $\alpha=(H_p(x)-E_z[H_b(z,u))+\int r(x,u)b(x)dx$, wherein $\alpha$ is the cost the processor is willing to pay to gain information, $(H_p(x)-E_z[H_b(z,u))$ is the expected information gain and $\int r(x,u)b(x)dx$ is the cost of information. In some cases, it may not be ideal to maximize this function. For example, the processor of a robot exploring as it performs works may only pay a cost for information when the robot is running in known areas. In some cases, the processor may never need to run an exploration operation as the processor gains information as the robot works (e.g., mapping while performing work). However, it may be beneficial for the processor to initiate an exploration operation at the end of a session to find what is beyond some gaps.

In some embodiments, the processor may store a bit of information in any two-level quantum system as basis vectors in a Hilbert space given by $|0\rangle$ and $|1\rangle$. In addition to the basis vectors, a continuum of passive states may be possible due to superposition $|\psi\rangle=c_0|0\rangle+c_1|\rangle$, wherein complex coefficients fit $|c_0|^2+|c_1|=1$. Assuming the two-dimensional space is isomorphic, the continuum may be seen as a state of $-\frac{1}{2}$ spin system. If the information basis vectors of $|0\rangle$ and $|1\rangle$ are given by spin down and spin up eigenvectors $\sigma_z$, then there are $\sigma$ matrices, and measuring the component $\sigma$ in any chosen direction results in exactly one bit of information with the value of either zero or one. Consequently, the processor may formalize all information gains using the quantum method and the quantum method may in turn be reduced to classical entropy.

In embodiments, it may be advantageous to avoid processing empty bits without much information or that hold information that is obvious or redundant. In embodiments, the bits carrying information that are unobvious or are not highly probable within a particular context may be the most important bits. In addition to data processing, this also pertains to data storage and data transmission. For example, a flash memory may store information as zeroes and ones and may have N memory spaces, each space capable of registering two states. The flash memory may store $W=2^N$ distinct states, and therefore, the flash memory may store W possible messages. Given the probability of occurrence $P_i$ of the state i, the processor may determine the Shannon entropy $H=-\Sigma_{i+1}^{W} P_i P_i$. The Shannon entropy may indicate the amount of uncertainty in which of the states in W may occur. Subsequent observation may reduce the level of uncertainty and subsequent measurements may not have equal probability of occurrence. The final entropy may be smaller than the initial entropy as more measurements were taken. In some embodiments, the processor may determine the average information gain I as the difference between the initial entropy and the final entropy $I=H_{initial}-H_{final}$. For the final state, wherein measurement reveals a message that is fully predictable, because all but one of the last message possibilities are ruled out, the probability of the state is one and the probability of all other states is zero. This may be synonymous to a card game with two decks, the first deck being dealt out to players and the second deck used to choose and eliminate cards one by one. Players may bet on one of their cards matching the next chosen card from the second deck. As more cards are eliminated, players may increase their bets as there is a higher chance that they hold a card matching the next chosen card from the second deck. The next chosen card may be unexpected and improbable and therefore correlates to a small probability $P_i$. The next chosen card determines the winner of the current round and is therefore considered to carry a lot of information. In another example, a bit of information may store the state of an on/off light switch or may store a value indicating the presence/lack of electricity, wherein on and off or presence of electricity and lack of electricity may be represented by a logical value of zero and one, respectively. In reality, the logical value of zero and one may actually indicate +5V and 0V or +5V and −5V or +3V and +5V or +12V and +5V, etc.

Similarly, a bit of information may be stored in any two level quantum state. In some embodiments, the basis states may be defined in Hilbert space vectors $|0\rangle$ and $|1\rangle$. For a physical interpretation of the Hilbert space, the Hilbert space may be reduced to a subset that may be defined and modified as necessary. In some embodiments, the superposition of the two basis vectors may allow a continuum of pure states, $|\Psi\rangle=c_0|0\rangle+c_1|1\rangle$, wherein $c_0$ and $c_1$ are complex coefficients satisfying the condition $|c_0|^2+|c_1|^2=1$. In embodiments, a two dimensional Hilbert space is isomorphic and may be understood as a state of a spin $-\frac{1}{2}$ system, $o=\frac{1}{2}(1+\pi\cdot\sigma)$. In embodiments, the processor may define the basis vectors $|0\rangle$ and $|1\rangle$ as spin up and spin down eigenvectors of $\sigma_z$ and $\sigma$ matrices, which are defined by the same underlying mathematics as spin up and spin down eigenvectors.

Some embodiments may include a method of simultaneous localization and mapping, comprising providing a certain number of pulses per slot of time to a wheel motor and/or cleaning component motors (e.g., main brush, fan, side brush) to control wheel and/or cleaning component speed; collecting one of IMU, LIDAR, camera, encoder, floor sensor, and obstacle readings and processing the readings; executing localization, relocalization, mapping, map manipulation, room detection, coverage tracking, detection of covered areas, path planning trajectory tracking, and control of LED, buttons, and a speaker to play sound signals or a recorded voice, all of which are executed on one microcontroller. In embodiments, the same microcontroller may control any of Wi-Fi module and a camera including obtaining an image feed of the camera. In some embodiments, the MCU may be connected with other MCUs, CPUs, MPUs, and/or GPUs to enhance handling and further processing of images, environments, and obstacles.

In some embodiments, distances to objects may be two dimensional or three dimensional and objects may be static or dynamic. For instance, with two dimensional depth sensing, depth readings of a person moving within a volume may appear as a line moving with respect to a background line. For example, FIGS. 182A-182C illustrate a person 18200 moving within an environment 18201 and corresponding depth readings 18202 from perspective 18203 appearing as a line. Depth readings 18204 appearing as a line and corresponding with background 18205 of environment 18201 are also shown. As the person 18200 moves closer in FIGS. 182B and 182C, depth readings 18202 move further relative to background depth readings 18204. In other cases, different types of patterns may be identified. For example, a dog moving within a volume may result in a different pattern with respect to the background. This is illustrated in FIGS. 183A-183C, wherein a dog 18300 is moving within an environment 18301. Depth readings 18302 from perspective 18303 appearing as a line correspond with dog 18300 and depth readings 18304 appearing as a line correspond with background 18305 of environment 18301. With many samples of movements in many different environments, a deep neural network may be used to set signature patterns which may be searched for by the target system. The signature patterns may three dimensional as well, wherein a volume moves within a stationary background volume.

In some embodiments, the processor may identify static or dynamic obstacles within a captured image. In some embodiments, the processor may use different characteristics to identify a static or dynamic obstacle. For example, FIG. 184A illustrates the robot 18400 approaching an object 18401. The processor may detect the object 18401 based on data from an obstacle sensor and may identify the object 18401 as a sock based on features of the object 18401. FIG. 184B illustrates the robot 18400 approaching an object 18402. The processor may detect the object 18402 based on data from an obstacle sensor and may identify the object 18402 as a glass of liquid based on features of the object 18402. In some embodiments, the processor may translate three dimensional obstacle information into two dimensional representation. For example, FIG. 185A illustrates the processor of the robot 18500 identifying objects 18501 (wall socket), 18502 (ceiling light), and 18503 (frame) and their respective distances from the robot in three dimensions. FIG. 185B illustrates the object information from FIG. 185A shrunken into a two dimensional representation. This may be more efficient for data storage and/or processing. In some embodiments, the processor may use speed of movement of an object or an amount of movement of an object in captured images to determine if an object is dynamic. Examples of some objects within a house and their corresponding characteristics include a chair with characteristics including very little movement and located within a predetermined radius, a human with characteristic including ability to be located anywhere within the house, and a running child with characteristics of fast movement and small volume. In some embodiments, the processor compares captured images to extract such characteristics of different objects. In some embodiments, the processor identifies the object based on features. For example, FIG. 186A illustrates an image of an environment. FIG. 186B illustrates an image of a person 18600 within the environment. The processor may identify an object 18601 (in this case the face of the person 18600) within the image. FIG. 186C illustrates another image of the person 18600 within the environment at a later time. The processor may identify the same object 18601 within the image based on identifying similar features as those identified in the image of FIG. 186B. FIG. 186D illustrates the movement 18602 of the object 18601. The processor may determine that the object 18601 is a person based on trajectory and/or the speed of movement of the object 18601 (e.g., by determining total movement of the object between the images captured in FIGS. 186B and 186C and the time between when the images in FIGS. 186B and 186C where taken). In some embodiments, the processor may identify movement of a volume to determine if an object is dynamic. FIG. 187A illustrates depth measurements 18700 to a static background of an environment. Depth measurements 18700 to the background are substantially constant. FIG. 187B illustrates depth measurements 18701 to an object 18702. Based on the depth measurements 18700 of the background of the environment and depth measurements 18701 of the object 18702, the processor may identify a volume 18703 captured in several images, illustrated in FIG. 187C, corresponding with movement of the object 18702 over time, illustrated in FIG. 187D. The processor may determine an amount of movement of the object over a predetermined amount of time or a speed of the object and may determine whether the object is dynamic or not based on its movement or speed. In some cases, the processor may infer the type of object.

Figure 188D:
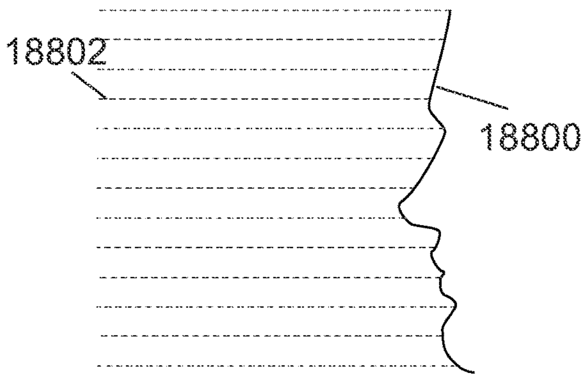
Figure 188E:
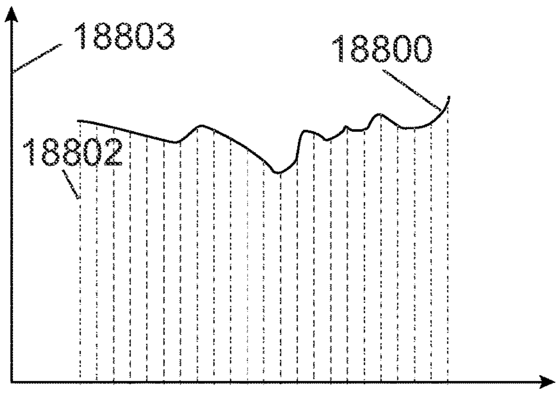

In some embodiments, the processor executes facial recognition based on unique facial features of a person. In some embodiments, the processor executes facial recognition based on unique depth patterns of a face. For instance, a face of a person may have a unique depth pattern when observed. FIG. 188A illustrates a face of a person 18800. FIG. 188B illustrates unique features 18801 identified by the processor that may be used in identifying the person 18800. FIGS. 188C and 188D illustrate depth measurements 18802 to different points on the face of the person 18800 from a frontal and side view, respectively. FIG. 188E illustrates a unique depth histogram 18803 corresponding with depth measurements 18802 of the face of person 18800. The processor may identify person 18800 based on their features and unique depth histogram 18803. In some embodiments, the processor applies Bayesian techniques. In some embodiments, the processor may first form a hypothesis of who a person is based on a first observation (e.g., physical facial features of the person (e.g., eyebrows, lips, eyes, etc.)). Upon forming the hypothesis, the processor may confirm the hypothesis by a second observation (e.g., the depth pattern of the face of the person). After confirming the hypothesis, the processor may infer who the person is. In some embodiments, the processor may identify a user based on the shape of a face and how features of the face (e.g., eyes, ears, mouth, nose, etc.) relate to one another. For example, FIG.

Figure 190A:
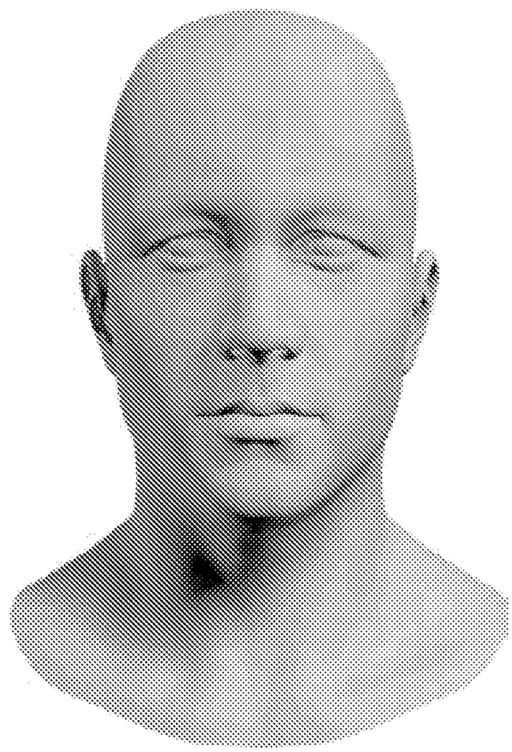
Figure 190B:
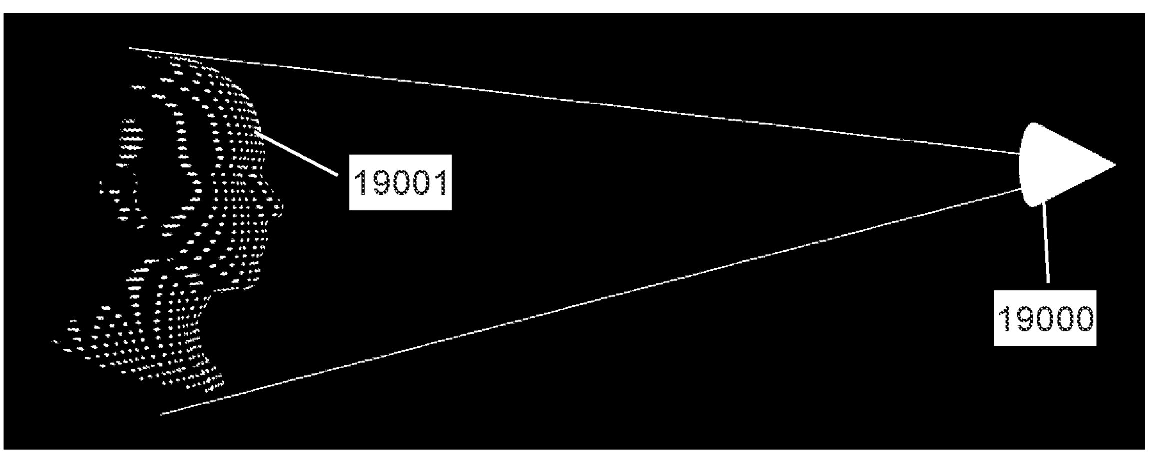
Figure 190C:
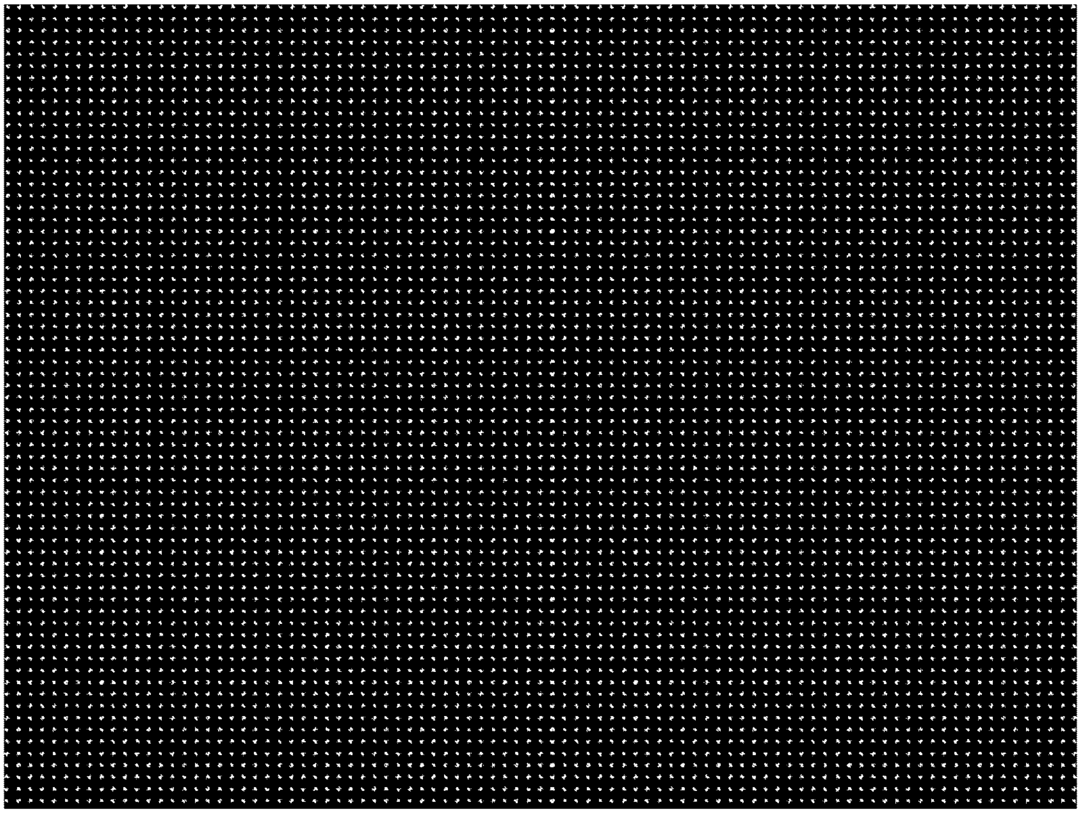
Figure 190D:
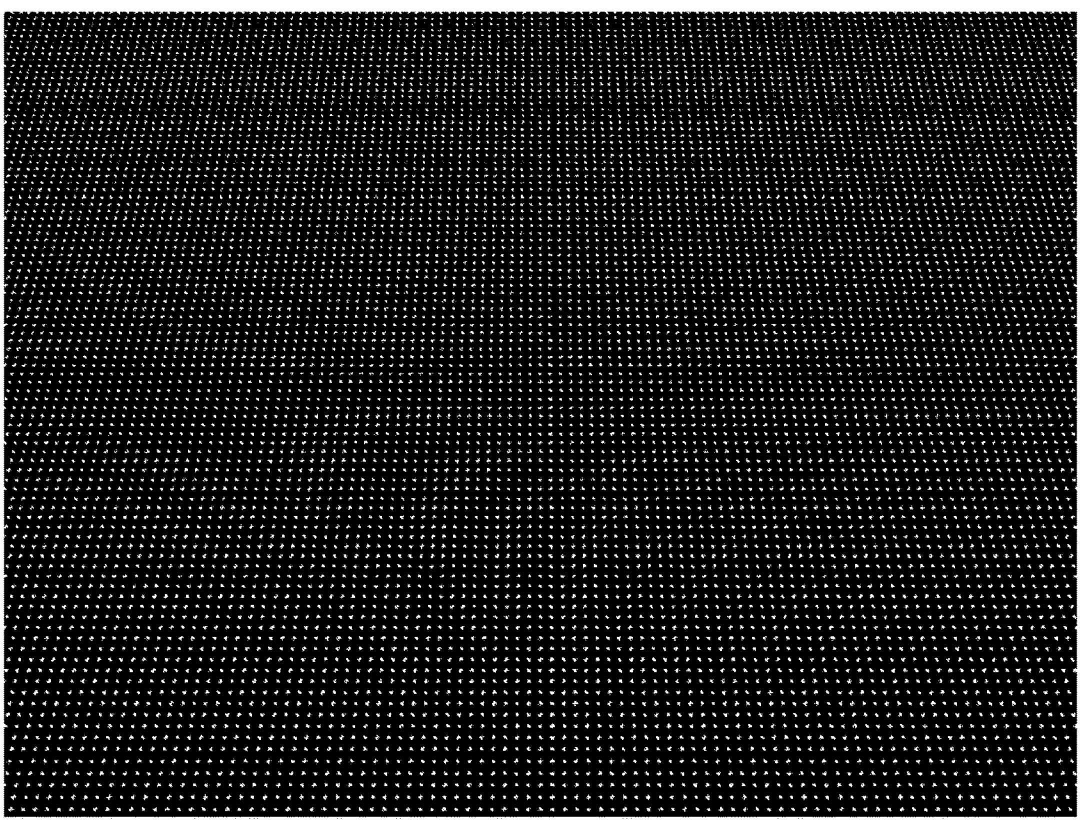
Figure 190E:
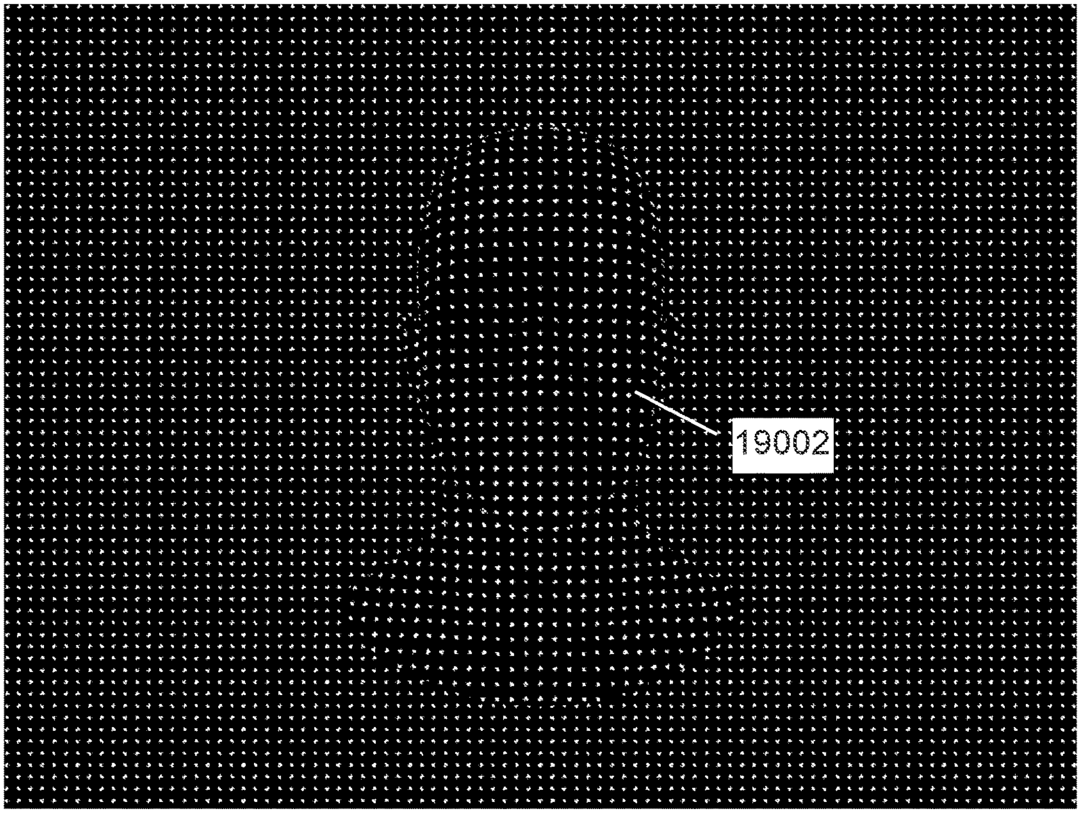
Figure 190F:
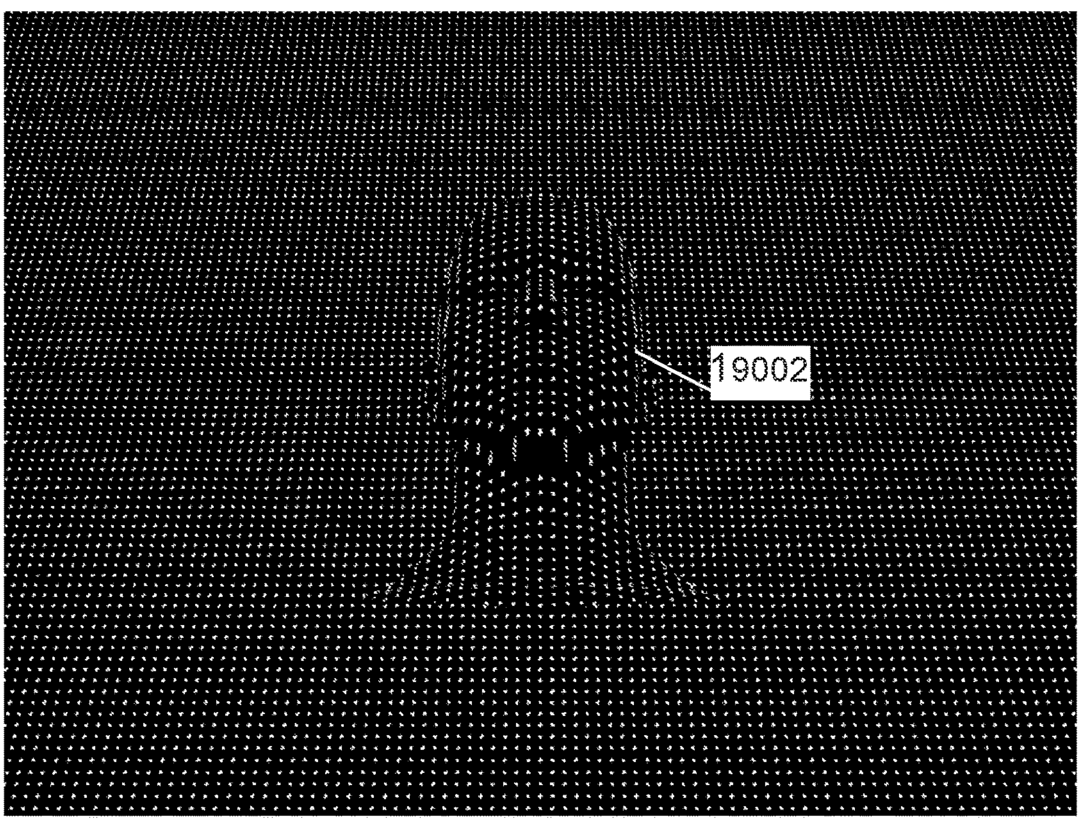

189A illustrates a front view of a face of a user and FIG. 189B illustrates features 18900 identified by the processor. FIG. 189C illustrates the geometrical relation 18901 of the features 18900. The processor may identify the face based on geometry 18901 of the connected features 18900. FIG. 189D illustrates a side view of a face of a user and features 18900 identified by the processor. The processor may use the geometrical relation 18902 to identify the user from a side view. FIG. 189E illustrates examples of different geometrical relations 18903 between features 18904 that may be used to identify a face. Examples of geometrical relations may include distance between any two features of the face, such as distance between the eyes, distance between the ears, distance between an eye and an ear, distance between ends of lips, and distance from the tip of the nose to an eye or ear or lip. Another example of geometrical relations may include the geometrical shape formed by connecting three or more features of the face. In some embodiments, the processor of the robot may identify the eyes of the user and may use real time SLAM to continuously track the eyes of the user. For example, the processor of the robot may track the eyes of a user such that virtual eyes of the robot displayed on a screen of the robot may maintain eye contact with the user during interaction with the user. In some embodiments, a structured light pattern may be emitted within the environment and the processor may recognize a face based on the pattern of the emitted light. For example, FIG. 190A illustrates a face of a user and FIG. 190B illustrates structured light emitted by a light emitter 19000 and the pattern of the emitted light 19001 when projected on the face of the user. The processor may recognize a face based on the pattern of the emitted light. FIG. 190C illustrates the pattern of emitted light on a wall when the structured light is emitted in a direction perpendicular to the wall. FIG. 190D illustrates the pattern of emitted light on a wall when the structured light is emitted onto the wall at an upwards angle relative to a horizontal plane. FIG. 190E illustrates the pattern of emitted light on the face of the user 19002 positioned in front of a wall when the structured light is emitted in a direction perpendicular to the wall. FIG. 190F illustrates the pattern of emitted light on the face of the user 19002 positioned in front of a wall when the structured light is emitted at an upwards angle relative to a horizontal plane. In some embodiments, the processor may also identify features of the environment based on the pattern of the emitted light projected onto the surfaces of objects within the environment. For example, FIG. 191A illustrates the pattern of emitted light resulting from the structured light projected onto a corner of two meeting walls when the structured light is emitted in a direction perpendicular to the front facing wall. The corner may be identified as the point of transition between the two different light patterns. For example, FIG. 191B illustrates the pattern of emitted light resulting from the structured light projected onto a corner of two meeting walls when the structured light is emitted at an upwards angle relative to a horizontal plane.

In embodiments, the amount of information included in storage, transmission, and processing is of importance. In the case of images, edge-like structures and contours are particularly important as the amount of information in an image is related to the structures and discontinuities within the image. In embodiments, distinctiveness of an image may be described using the edges and corners found in the image. In some embodiments, the processor may determine the first derivative $$f'(x) = \frac{df}{dx}(x)$$

of the function $f$. Positions resulting in a positive change may indicate a rise in intensity and positions resulting in a negative change may indicate a drop in intensity. In some embodiments, the processor may determine a derivative of a multi-dimensional function along one of its coordinate axes, known as a partial derivative. In some embodiments, the processor may use first derivative methods such as Prewitt and Sobel, differing only marginally in the derivative filters each method uses. In some embodiments, the processor may use linear filters over three adjacent lines and columns, respectively, to counteract the noise sensitivity of the simple (i.e., single line/column) gradient operators.

In some embodiments, the processor may determine the second derivative of an image function to measures its local curvature. In some embodiments, edges may be identified at positions corresponding with a second derivative of zero in a single direction or at positions corresponding with a second derivative of zero in two crossing directions. In some embodiments, the processor may use Laplacian-of-Gaussian method for Gaussian smoothening and determining the second derivatives of the image. In some embodiments, the processor may use a selection of edge points and a binary edge map to indicate whether an image pixel is an edge point or not. In some embodiments, the processor may apply a threshold operation to the edge to classify it as edge or not. In some embodiments, the processor may use Canny Edge Operator including the steps of applying a Gaussian filter to smooth the image and remove noise, finding intensity gradients within the image, applying a non-maximum suppression to remove spurious response to edge detection, applying a double threshold to determine potential edges, and tracking edges by hysteresis, wherein detection of edges is finalize by suppressing other edges that are weak and not connected to strong edges. In some embodiments, the processor may identify an edge as a location in the image at which the gradient is especially high in a first direction and low in a second direction normal to the first direction. In some embodiments, the processor may identify a corner as a location in the image which exhibits a strong gradient value in multiple directions at the same time. In some embodiments, the processor may examine the first or second derivative of the image in the x and y directions to find corners. In some embodiments, the processor may use the Harris corner detector to detect corners based on the first partial derivatives (i.e., gradient) of the image function I(u,v), $$I_x(u, v) = \frac{\partial I}{\partial x}(u, v) \text{ and } I_y(u, v) = \frac{\partial I}{\partial y}(u, v).$$

In some embodiments, the processor may use Shi-Tomasi corner detector to detect corners (i.e., a junction of two edges) which detects corners by identifying significant changes in intensity in all directions. A small window on the image may be used to scan the image bit by bit while looking for corners. When the small window is positioned over a corner in the image, shifting the small window in any direction results in a large change in intensity. However, when the small window is positioned over a flat wall in the image there are no changes in intensity when shifting the small window in any direction.

While gray scale images provide a lot of information, color images provide a lot of additional information that may help in identifying objects. For instance, an advantage of color images are the independent channels corresponding to each of the colors that may be use in a Bayesian network to increase accuracy (i.e., information concluded given the gray scale | given the red channel | given the green channel | given the blue channel). In some embodiments, the processor may determine the gradient direction from the color channel of maximum edge strength using $$\Phi_{col}(u) = \left(\frac{I_{m,y}(u)}{I_{m,x}(u)}\right),$$

wherein m=$E_k$(u). In some embodiments, the processor may determine the gradient of a scalar image I at a specific position u using $$\nabla I(u) = \left(\frac{\partial I}{\partial x}(u)\frac{\partial I}{\partial y}(u)\right).$$

In embodiments, for multiple channels, the vector of the partial derivatives of the function I in the x and y directions and the gradient of a scalar image may be a two dimensional vector field. In some embodiments, the processor may treat each color channel separately, wherein, I=($I_R$, $I_G$, $I_B$), and may use each separate scalar image to extract the gradients $$\nabla I_R(u) = \left(\frac{\partial I_R}{\partial x}(u)\frac{I_R}{\partial y}(u)\right),\ \nabla I_G(u) = \left(\frac{\partial I_G}{\partial x}(u)\frac{I_G}{\partial y}(u)\right),\text{ and}$$
$$\nabla I_B(u) = \left(\frac{\partial I_B}{\partial x}(u)\frac{I_B}{\partial y}(u)\right).$$

In some embodiments, the processor may determine the Jacobian matrix using $$J_I(u) = ((\partial I_R)^T(u)(I_G)^T(u)(I_B)^T(u)) = \left(\frac{\partial I_R}{\partial x}(u)\frac{I_R}{\partial y}(u)\frac{I_G}{\partial x}(u)\frac{I_G}{\partial y}(u)\frac{I_B}{\partial x}(u)\frac{I_B}{\partial y}(u)\right) = (I_x(u), I_y(u)).$$

In some embodiments, the processor may determine positions u at which intensity change along the horizontal and vertical axes occurs. In some embodiments, the processor may then determine the direction of the maximum intensity change to determine the angle of the edge normal. In some embodiments, the processor may use the angle of the edge normal to derive the local edge strength. In other embodiments, the processor may use the difference between the eigenvalues, $\lambda_1-\lambda_2$, to quantify edge strength.

In some embodiments, a label collision may occur when two or more neighbors have labels belonging to different regions. When two labels a and b collide, they may be "equivalent", wherein they are contained within the same image region. For example, a binary image includes either black or white regions. Pixels along the edge of a binary region (i.e., border) may be identified by morphological operations and difference images. Marking the pixels along the contour may have some useful applications, however, an ordered sequence of border pixel coordinates for describing the contour of a region may also be determined. In some embodiments, an image may include only one outer contour and any number of inner contours. For example, FIG. 192 illustrates an image of a vehicle including an outer contour and multiple inner contours. In some embodiments, the processor may perform sequential region labeling, followed by contour tracing. In some embodiments, an image matrix may represent an image, wherein the value of each entry in the matrix may be the pixel intensity or color of a corresponding pixel within the image. In some embodiments, the processor may determine a length of a contour using chain codes and differential chain codes. In some embodiments, a chain code algorithm may begin by traversing a contour from a given starting point $x_s$ and may encode the relative position between adjacent contour points using a directional code for either 4-connected or 8-connected neighborhoods. In some embodiments, the processor may determine the length of the resulting path as the sum of the individual segments, which may be used as an approximation of the actual length of the contour. FIGS. 193A and 193B illustrate an example of a 4-chain code and 8-chain code, respectively. FIG. 193C illustrates an example of a contour path 19300 described using the 4-chain code in an array 19301. FIG. 193D illustrates an example of a contour path 19302 described using the 8-chain code in an array 19303. In some cases, directional code may alternatively be used in describing a path of the robot. For example, FIGS. 193E and 193F illustrate 4-chain and 8-chain contour paths 19304 and 19305 of the robot in three dimensions, respectively. In some embodiments, the processor may use Fourier shape descriptors to interpret two-dimensional contour C=($x_0$, $x_1$, . . . , $x_{M-1}$) with $x_i$=($u_i$, $v_i$) as a sequence of values in the complex plane, wherein $z_i$=($u_i$+i·$v_i$)∈C. In some embodiments, for an 8-chain connected contour, the processor may interpolate a discrete, one-dimensional periodic function $f(s)\in C$ with a constant sampling interval over s, the path along the contour. Coefficients of the one dimensional Fourier spectrum of the function $f(s)$ may provide a shape description of the contour in the frequency space, wherein the lower spectral coefficients deliver a gross description of the shape.

In some embodiments, the processor may describe a geometric feature by defining a region R of a binary image as a two-dimensional distribution of foreground points $p_i$=($u_i$, $v_i$) on the discrete plane $Z^2$ as a set R={$x_0$, . . . , $x_{N-1}$}={($u_0$, $v_0$), ($u_1$, $v_1$), . . . , ($u_{N-1}$, $v_{(N-1)}$)}. In some embodiments, the processor may describe a perimeter P of the region R by defining the region as the length of its outer contour, wherein R is connected. In some embodiments, the processor may describe compactness of the region R using a relationship between an area A of the region and the perimeter P of the region. In embodiments, the perimeter P of the region may increase linearly with the enlargement factor, while the area A may increase quadratically. Therefore, the ratio $$\frac{A}{P^2}$$

remains constant while scaling up or down and may thus be used as a point of comparison in translation, rotation, and scaling. In embodiments, the ratio $$\frac{A}{P^2}$$

may be approximated as $$\frac{1}{4\pi}$$

when the shape of the region resembles a circle. In some embodiments, the processor may normalize the ratio $$\frac{A}{P^2}$$

against a circle to show circularity of a shape.

In some embodiments, the processor may use Fourier descriptors as global shape representations, wherein each component may represent a particular characteristic of the entire shape. In some embodiments, the processor may define a continuous curve C in the two dimensional plane can using $f: R \rightarrow R^2$. In some embodiments, the processor may use the function $f(t)=(x_t\ y_t)=(f_x(t)\ f_y(t))$, wherein $f_x(t)$, $f_y(t)$ are independent, real-valued functions and t is the length along the curve path and a continuous parameter varied over the range of $[0, t_{max}]$. If the curve is closed, then $f(0)=f(t_{max})$ and $f(t)=f(t+t_{max})$. For a discrete space, the processor may sample the curve C, considered to be a closed curve, at regularly spaced positions M times, resulting in $t_0$, $t_1, \ldots, t_{M-1}$ and determine the length using $$t_i - t_{i-1} = \Delta_t = \frac{\text{length}(C)}{M}.$$

This may result in a sequence (i.e., vector) of discrete two dimensional coordinates $V=(v_0, v_i, \ldots, v_{M-1})$, wherein $v_k=(x_k, y_k)=f(t_k)$. Since the curve is closed, the vector V represents a discrete function $v_k=v_k+pM$ that is infinite and periodic when $0 \leq k \leq M$ and $p \in Z$.

In some embodiments, the processor may execute a Fourier analysis to extract, identify, and use repeated patterns or frequencies that are incurred in the content of an image. In some embodiments, the processor may use a Fast Fourier Transform (FFT) for large-kernel convolutions. In embodiments, the impact of a filter varies for different frequencies, such as high, medium, and low frequencies. In some embodiments, the processor may pass a sinusoid $s(x)=\sin(2\pi fx+\varphi_i)=\sin(\omega x+\varphi_i)$ of known frequency f through a filter and may measure attenuation, wherein $\omega=2\pi f$ is the angular frequency and $\varphi_i$ is the phase. In some embodiments, the processor may convolve the sinusoidal signal s(x) with a filter including an impulse response h(x), resulting in a sinusoid of the same frequency but different magnitude A and phase $\varphi_0$. In embodiments, the new magnitude A is the gain or magnitude of the filter and the phase difference $\Delta\varphi=\varphi o-\varphi i$ is the shift or phase. A more general notation of the sinusoid including complex numbers may be given by $s(x)=ej\omega x=\cos \omega x+j \sin \omega x$ while the convolution of the sinusoid s(x) with the filter h(x) may be given by $o(x)=h(x)*s(x)=Ae^{j\omega x*\varphi}$.

The Fourier transform is the response to a complex sinusoid of frequency a passed through the filter h(x) or a tabulation of the magnitude and phase response at each frequency, $H(\omega)=F$, wherein $\{h(x)\}=Aej\varphi$. The original transform pair may be given by $F(\omega)=F\{f(x)\}$. In some embodiments, the processor may perform a superposition of $f_1(x)+f_2(x)$ for which the Fourier transform may be given by $F_1(\omega)+F_2(\omega)$. The superposition is a linear operator as the Fourier transform of the sum of the signals is the sum of their Fourier transforms. In some embodiments, the processor may perform a signal shift $f(x-x_0)$ for which the Fourier transform may be given by $F(\omega)e^{-j\omega x_0}$. The shift is a linear phase shift as the Fourier transform of the signal is the transform of the original signal multiplied by $e^{-j\omega x_0}$. In some embodiments, the processor may reverse a signal $f(-x)$ for which the Fourier Transform may be given by $F^*(\omega)$. The reversed signal that is Fourier transformed is given by the complex conjugate of the Fourier transform of the signal. In some embodiments, the processor may convolve two signals $f(x)*h(x)$ for which the Fourier transform may be given by $F(\omega)H(\omega)$. In some embodiments, the processor may perform the correlation of two functions $f(x)\circledast h(x)$ for which the Fourier transform may be given by $F(\omega)H^*(\omega)$. In some embodiments, the processor may multiply two functions $f(x)h(x)$ for which the Fourier transform may be given by $F(\omega)*H(\omega)$. In some embodiments, the processor may take the derivative of a signal $f'(x)$ for which the Fourier transform may be given by $j\omega F(\omega)$. In some embodiments, the processor may scale a signal $f(ax)$ for which the Fourier transform may be given by $$\frac{1}{a}F\left(\frac{\omega}{a}\right).$$

In some embodiments, the transform of a stretched signal may be the equivalently compressed (and scaled) version of the original transform. In some embodiments, real images may be given by $f(x)=f^*(x)$ for which the Fourier transform may be given by $F(\omega)=F(-\omega)$ and vice versa. In some embodiments, the transform of a real-valued signal may be symmetric around the origin.

Figure 195A:
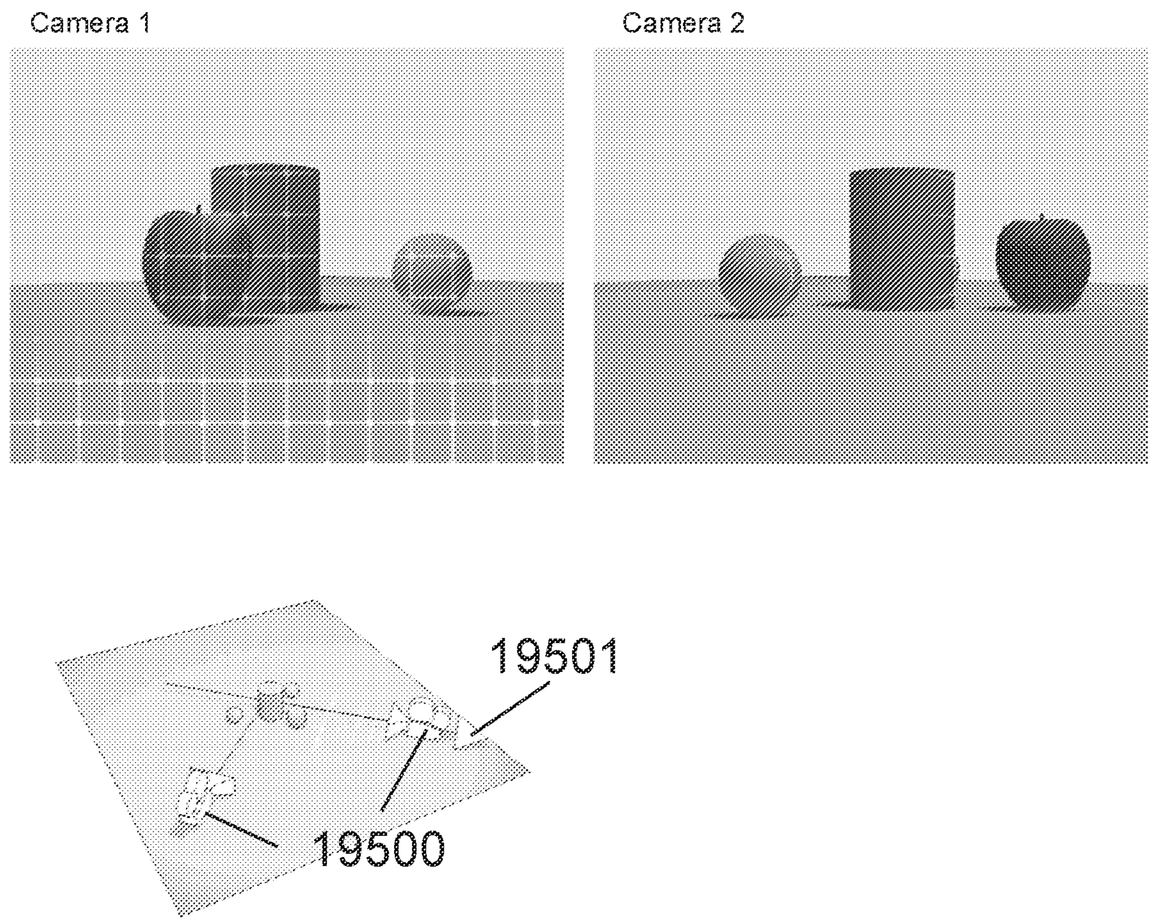
Figure 195B:
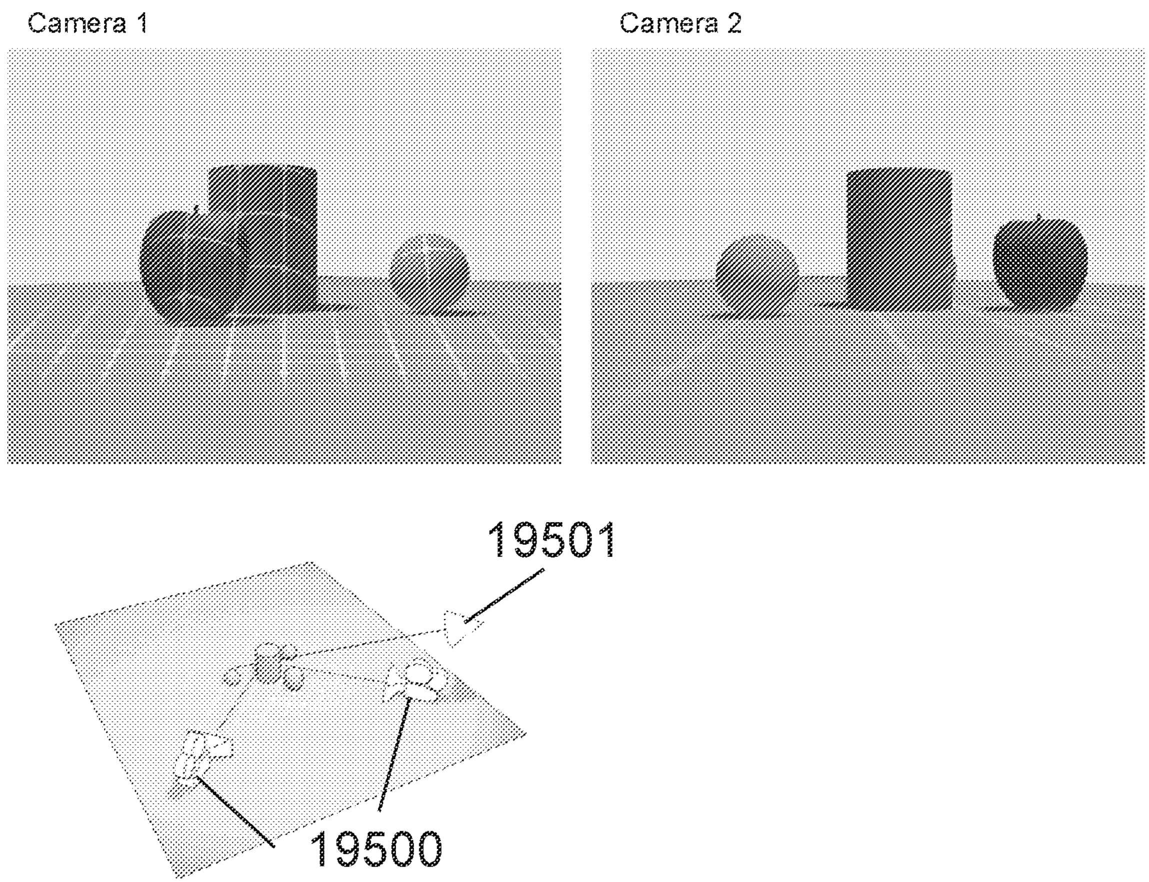
Figure 195E:
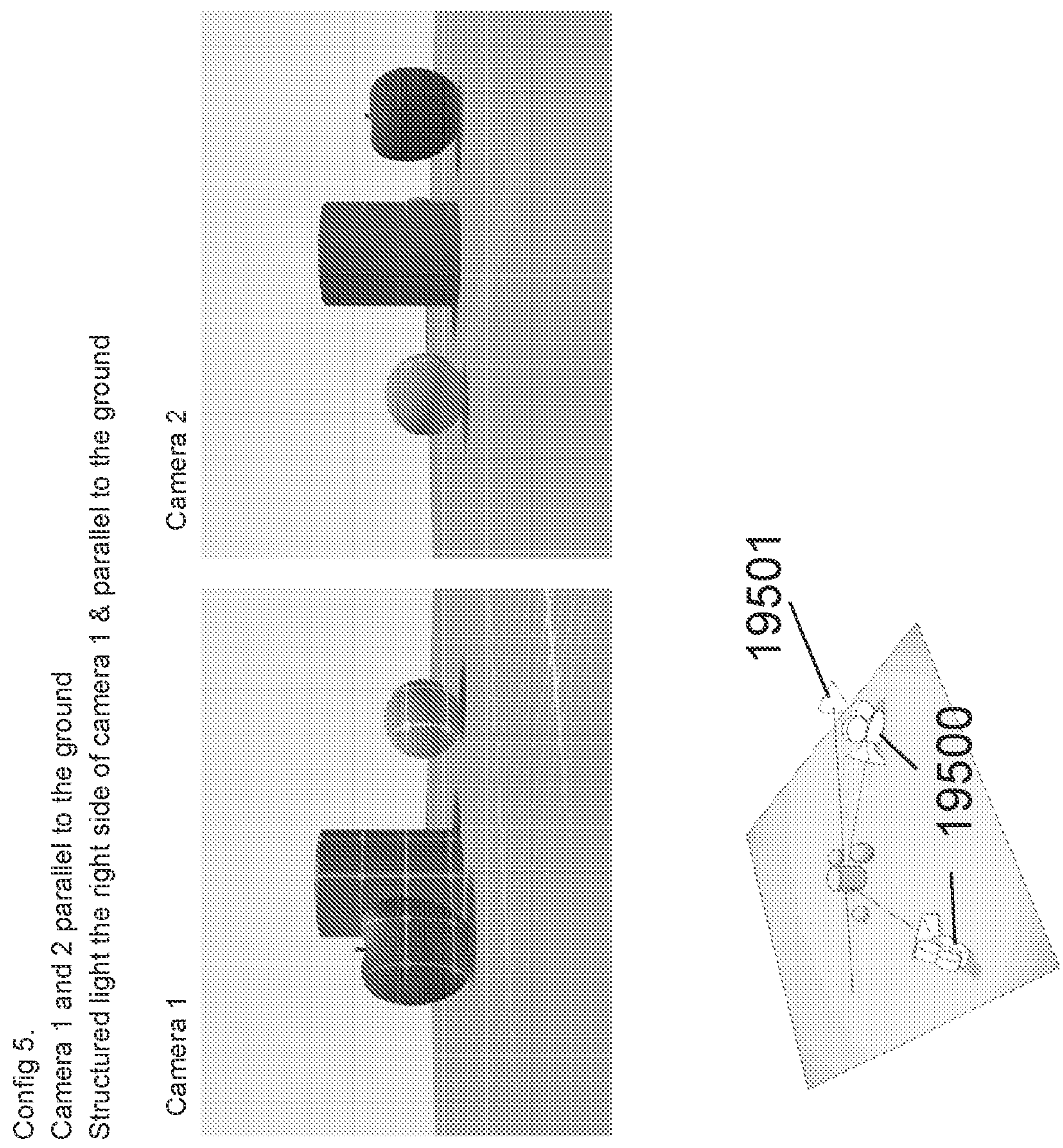
Figure 195F:
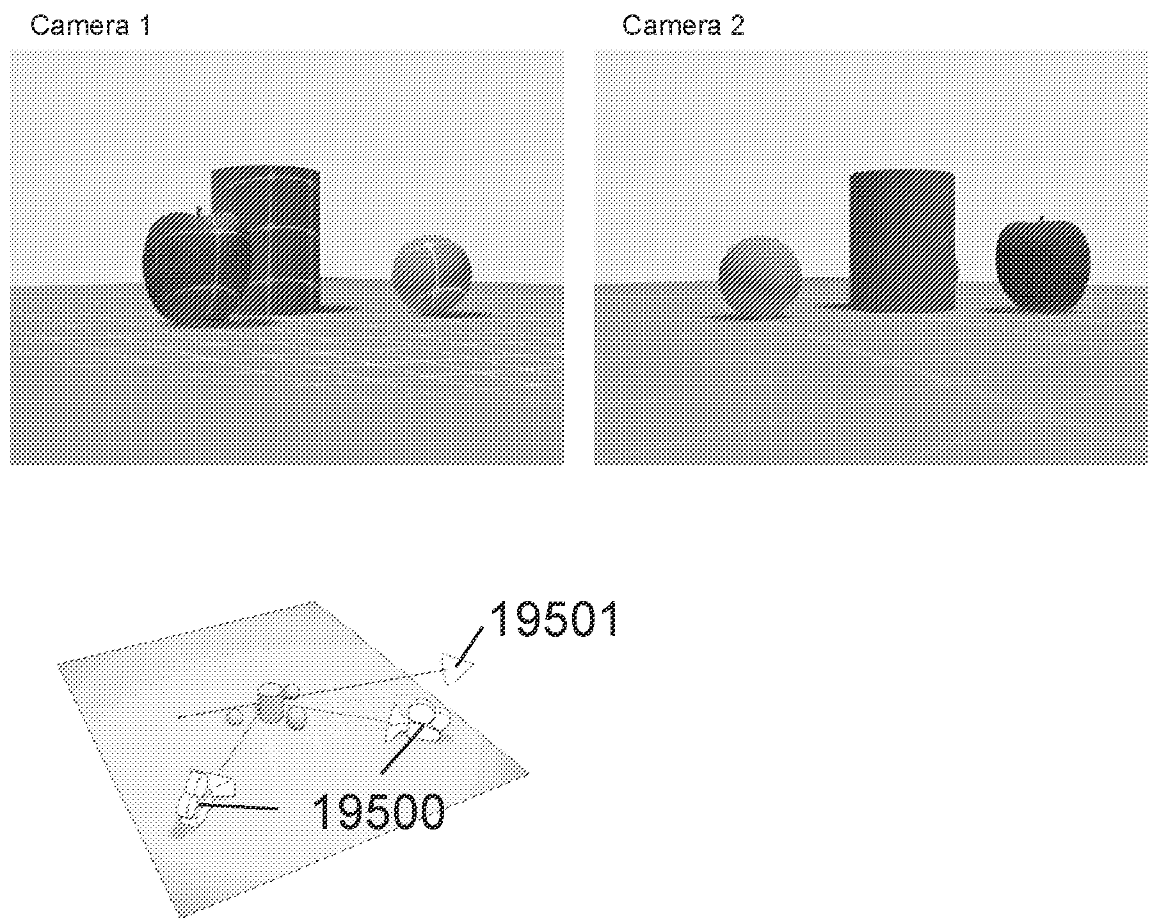
Figure 195G:
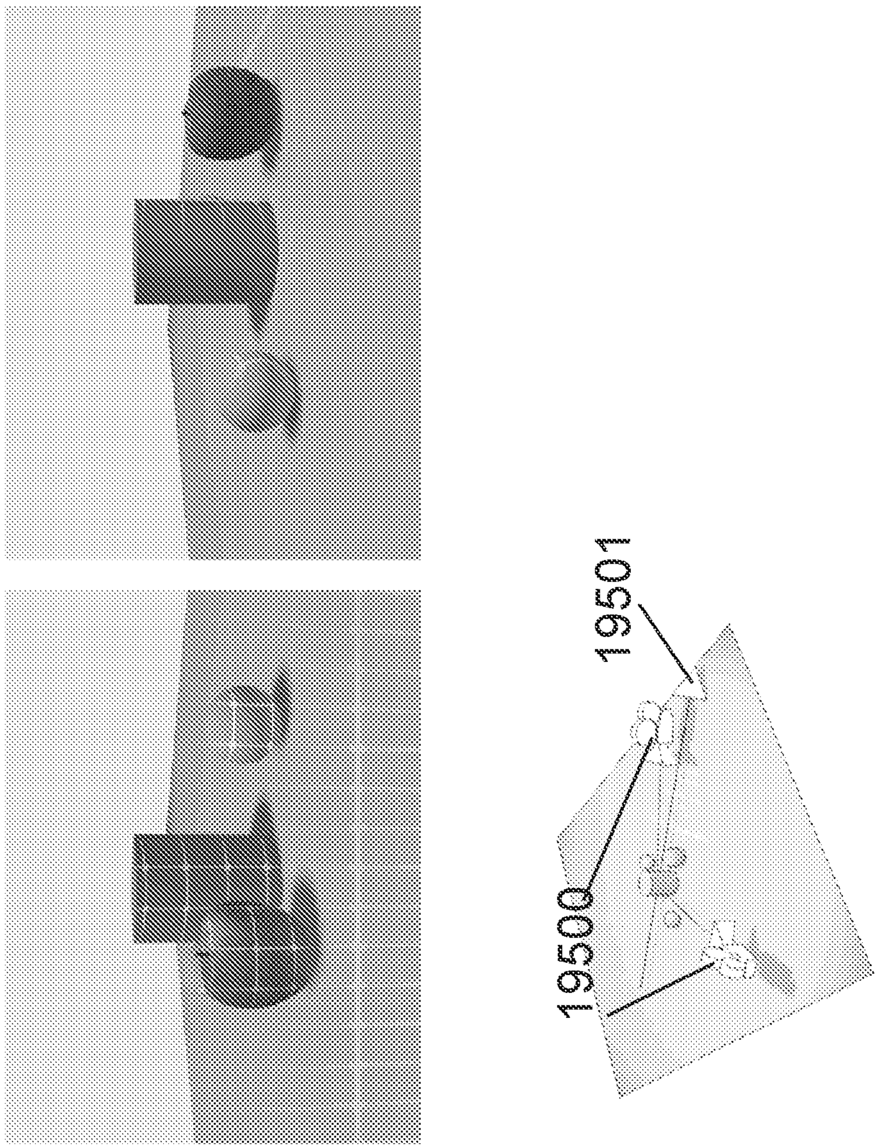
Figure 195H:
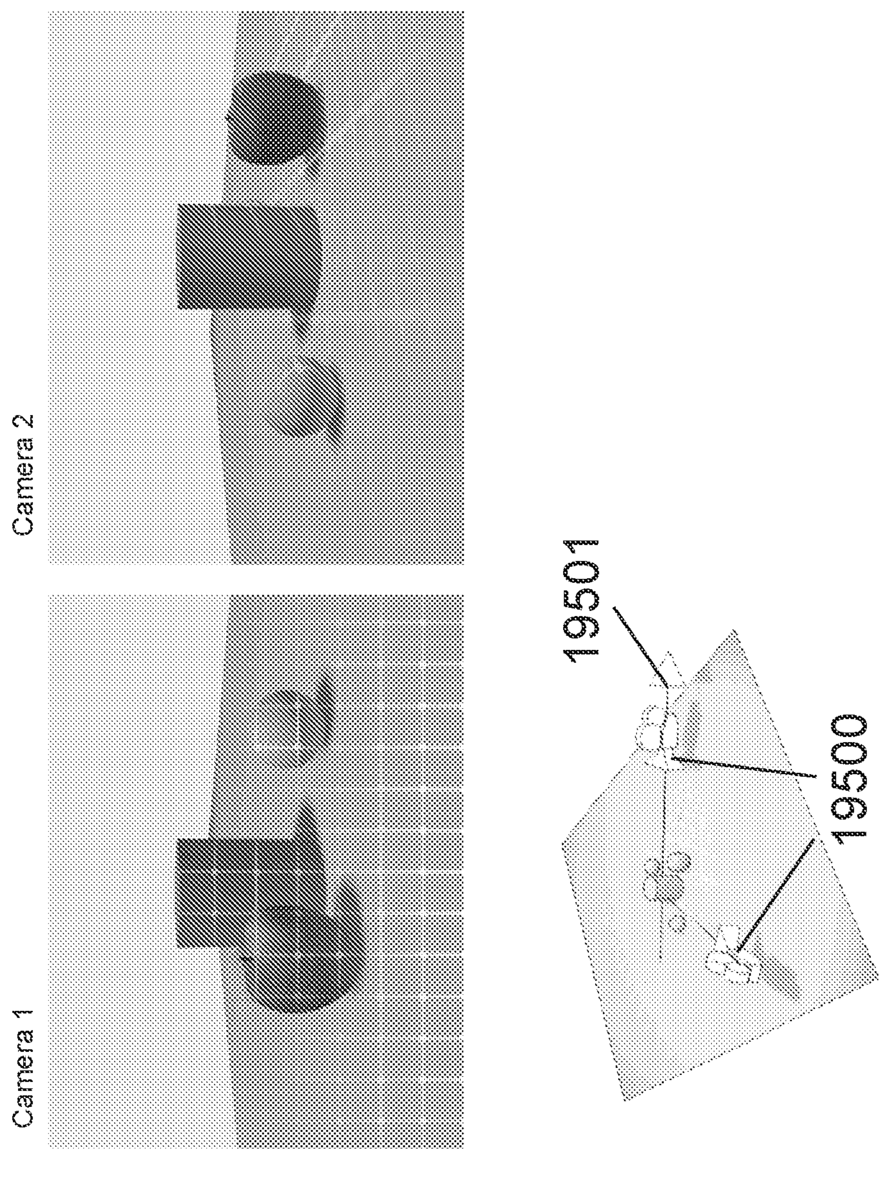

Some common Fourier transform pairs include impulse, shifted impulse, box filter, tent, Gaussian, Laplacian of Gaussian, Gabor, unsharp mask, etc. In embodiments, the Fourier transform may be a useful tool for analyzing the frequency spectrum of a whole class of images in addition to the frequency characteristics of a filter kernel or image. A variant of the Fourier Transform is the discrete cosine transform (DCT) which may be advantageous for compressing images by taking the dot product of each N-wide block of pixels with a set of cosines of different frequencies. In some embodiments, the processor may user interpolation or decimation wherein the image is up-sampled to a higher resolution or down-sampled to reduce the resolution, respectively. In embodiments, this may be used to accelerate coarse-to-fine search algorithms. particularly when searching for an object or pattern. In some embodiments, the processor may use multi-resolution pyramids. An example of a multi-resolution pyramid includes the Laplacian pyramid of Burt and Adelson which first interpolates a low resolution version of an image to obtain a reconstructed low-pass of the original image and then subtracts the resulting low-pass version from the original image to obtain the band-pass Laplacian. This may be particularly useful when creating multilayered maps in three dimensions. For example, FIG. 194A illustrates a representation of a living room as it is perceived by the robot. FIG. 194B illustrates a mesh layered on top of the image perceived by the robot in FIG. 194A which is generated by connecting depth distances to each other. FIGS. 194C-194F illustrate different levels of mesh density that may be used. FIG. 194G illustrates a comparison of meshes with different resolutions. Although the different resolutions vary in number of faces they more or less represent the same volume. This may be used in a three dimensional map including multiple layers of different resolutions. The different resolutions of the layers of the map may be useful for searching the map and relocalizing, as processing a lower resolution map is faster. For example, if the robot is lifted from a current place and is placed in a new place, the robot may use sensors to collect new observations. The new observations may not correlate with the environment perceived prior to being moved. However, the processor of the robot has previously observed the new place before within the complete map. Therefore, the processor may use a portion or all of its new observations and search the map to determine the location of the robot. The processor may use a low resolution map to search or may begin with a low resolution map and progressively increase the resolution to find a match with the new observations. FIGS. 194H-194J illustrate structured light with various levels of resolution. FIG. 194K illustrates a comparison of various density levels of structured light for the same environment. FIG. 194L illustrates the same environment with distances represented by different shades varying from white to black, wherein white represents the closest distances and black the farthest distances. FIG. 194M illustrates FIG. 194L represented in a histogram which may be useful for searching a three dimensional map. FIG. 194N illustrates an apple shown in different resolutions In some embodiments, at least two cameras and a structured light source may be used in reconstructing objects in three dimensions. The light source may emit a structured light pattern onto objects within the environment and the cameras may capture images of the light patterns projected onto objects. In embodiments, the light pattern in images captured by each camera may be different and the processor may use the difference in the light patterns to construct objects in three dimensions. FIGS. 195A-195H illustrate light patterns (projected onto objects (apple, ball, and can) from a structured light source) captured by each of two cameras 19500 (camera 1 and camera 2) for different configurations of the two cameras 19500 and the light source 19501. In each case, a perspective and top view of the configuration of the two cameras 19500 and light source 19501 are shown below the images captured by each of the two cameras 19500. In the perspective and top views of the configuration, camera 1 is always positioned on the right while camera 2 is always positioned on the left. This is shown in FIG. 195I.

In some embodiments, the processor may use Shannon's Sampling Theorem which provides that to reconstruct a signal the minimum sampling rate is at least twice the highest frequency, $f_s \geq 2f_{max}$, known as Nyquist frequency, while the inverse of the minimum sampling frequency $$r_s = \frac{1}{f_s}$$

is the Nyquist rate. In some embodiments, the processor may localize patches with gradients in two different orientations by using simple matching criterion to compare two image patches. Examples of simple matching criterion include the summed square difference or weighted summed square difference, $E_{WSSD}(u)=\Sigma_i\ \omega(x_i)[I_1(x_i+u)-I_0(x_i)]^2$, wherein $I_0$ and $I_1$ are the two images being compared, u=(u,v) is the displacement vector, w(x) is a spatially varying weighting (or window) function. The summation is over all the pixels in the patch. In embodiments, the processor may not know which other image locations the feature may end up being matched with. However, the processor may determine how stable the metric is with respect to small variations in position du by comparing an image patch against itself. In some embodiments, the processor may need to account for scale changes, rotation, and/or affine invariance for image matching and object recognition. To account for such factors, the processor may design descriptors that are rotationally invariant or estimate a dominant orientation at each detected key point. In some embodiments, the processor may detect false negatives (failure to match) and false positives (incorrect match). Instead of finding all corresponding feature points and comparing all features against all other features in each pair of potentially matching images, which is quadratic in the number of extracted features, the processor may use indexes. In some embodiments, the processor may use multi-dimensional search trees or a hash table, vocabulary trees, K-Dimensional tree, and best bin first to help speed up the search for features near a given feature. In some embodiments, after finding some possible feasible matches, the processor may use geometric alignment and may verify which matches are inliers and which ones are outliers. In some embodiments, the processor may adopt a theory that a whole image is a translation or rotation of another matching image and may therefore fit a global geometric transform to the original image. The processor may then only keep the feature matches that fit the transform and discard the rest. In some embodiments, the processor may select a small set of seed matches and may use the small set of seed matches to verify a larger set of seed matches using random sampling or RANSAC. In some embodiments, after finding an initial set of correspondences, the processor may search for additional matches along epipolar lines or in the vicinity of locations estimated based on the global transform to increase the chances over random searches.

In some embodiments, the processor may execute a classification algorithm for baseline matching of key points, wherein each class may correspond to a set of all possible views of a key point. The algorithm may be provided various images of a particular object such that it may be trained to properly classify the particular object based on a large number of views of individual key points and a compact description of the view set derived from statistical classifications tools. At run-time, the algorithm may use the description to decide to which class the observed feature belongs. Such methods (or modified versions of such methods) may be used and are further described by V. Lepetit, J. Pilet and P. Fua, "Point matching as a classification problem for fast and robust object pose estimation," Proceedings of the 2004 IEEE Computer Society Conference on Computer Vision and Pattern Recognition, 2004, the entire contents of which are hereby incorporated by reference. In some embodiments, the processor may use an algorithm to detect and localize boundaries in scenes using local image measurements. The algorithm may generate features that respond to changes in brightness, color and texture. The algorithm may train a classifier using human labeled images as ground truth. In some embodiments, the darkness of boundaries may correspond with the number of human subjects that marked a boundary at that corresponding location. The classifier outputs a posterior probability of a boundary at each image location and orientation. Such methods (or modified versions of such methods) may be used and are further described by D. R. Martin, C. C. Fowlkes and J. Malik, "Learning to detect natural image boundaries using local brightness, color, and texture cues," in IEEE Transactions on Pattern Analysis and Machine Intelligence, vol. 26, no. 5, pp. 530-549, May 2004, the entire content of which is hereby incorporated by reference. In some embodiments, an edge in an image may correspond with a change in intensity. In some embodiments, the edge may be approximated using a piecewise straight curve composed of edgels (i.e., short, linear edge elements), each including a direction and position. The processor may perform edgel detection by fitting a series of one-dimensional surfaces to each window and accepting an adequate surface description based on least squares and fewest parameters. Such methods (or modified versions of such methods) may be used and are further described by V. S. Nalwa and T. O. Binford, "On Detecting Edges," in IEEE Transactions on Pattern Analysis and Machine Intelligence, vol. PAMI-8, no. 6, pp. 699-714, November 1986. In some embodiments, the processor may track features based on position, orientation, and behavior of the feature. The position and orientation may be parameterized using a shape model while the behavior is modeled using a three-tier hierarchical motion model. The first tier models local motions, the second tier is a Markov motion model, and the third tier is a Markov model that models switching between behaviors. Such methods (or modified versions of such methods) may be used and are further described by A. Veeraraghavan, R. Chellappa and M. Srinivasan, "Shape-and-Behavior Encoded Tracking of Bee Dances," in IEEE Transactions on Pattern Analysis and Machine Intelligence, vol. 30, no. 3, pp. 463-476, March 2008.

In some embodiments, the processor may detect sets of mutually orthogonal vanishing points within an image. In some embodiments, once sets of mutually orthogonal vanishing points have been detected, the processor may search for three dimensional rectangular structures within the image. In some embodiments, after detecting orthogonal vanishing directions, the processor may refine the fitted line equations, search for corners near line intersections, and then verify the rectangle hypotheses by rectifying the corresponding patches and looking for a preponderance of horizontal and vertical edges. In some embodiments, the processor may use a Markov Random Field (MRF) to disambiguate between potentially overlapping rectangle hypotheses. In some embodiments, the processor may use a plane sweep algorithm to match rectangles between different views. In some embodiments, the processor may use a grammar of potential rectangle shapes and nesting structures (between rectangles and vanishing points) to infer the most likely assignment of line segments to rectangles.

In some embodiments, the processor may associate a feature in a captured image with a light point in the captured image. In some embodiments, the processor may associate features with light points based on machine learning methods such as K nearest neighbors or clustering. In some embodiments, the processor may monitor the relationship between each of the light points and respective features as the robot moves in following time slots. The processor may disassociate some associations between light points and features and generate some new associations between light points and features. FIG. 196A illustrates an example of two captured images 19600 including three features 19601 (a tree, a small house, a large house) and light points 19602 associated with each of the features 19601. Associated features 19601 and light points 19602 are included within the same dotted shape 19603. FIG. 196B illustrates the captured image 19600 in FIG. 196A at a first time point, a captured image 19604 at a second time point, and a captured image 19605 at a third time point as the robot moves within the environment. As the robot moves, some features 19601 and light points 81962 associated at one time point become disassociated at another time point, such as in image 19604 wherein a feature (the large house) from image 19600 is no longer in the image 19604. Or some new associations between features 19601 and light points 19602 emerge at a next time point, such as in image 19605 wherein a new feature (a person) is captured in the image. In some embodiments, the robot may include an LED point generator that spins. FIG. 197A illustrates a robot 19700, a spinning LED light point generator 19701, light points 19702 that are emitted by light point generator 19701, and camera 19703 that captures images of light points 19702. In some embodiments, the camera of the robot captures images of the projected light point. In some embodiments, the light point generator is faster than the camera resulting in multiple light points being captured in an image fading from one side to another. This is illustrated in FIG. 197B, wherein light points 19704 fade from one side to the other. In some embodiments, the robot may include a full 360 degrees LIDAR. In some embodiments, the robot may include multiple cameras. This may improve accuracy of estimates based on image data. For example, FIG. 197C illustrates the robot 19700 with four cameras 19703.

In embodiments, the goal of extracting features of an image is to match the image against other images. However, it is not uncommon that matched features need some processing to compensate for feature displacements. Such feature displacements may be described with a two or three dimensional geometric or non-geometric transformation. In some embodiments, the processor may estimate motion between two or more sets of matched two dimensional or three dimensional points when superimposing virtual objects, such as predictions or measurements on a real live video feed. In some embodiments, the processor may determine a three dimensional camera motion. The processor may use a detected two dimensional motion between two frames to align corresponding image regions. The two dimensional registration removes all effects of camera rotation and the resulting residual parallax displacement field between the two region aligned images is an epipolar field centered at the Focus-of-Expansion. The processor may recover the three dimensional camera translation from the epipolar field and may compute the three dimensional camera rotation based on the three dimensional translation and detected two dimensional motion. Such methods (or modified versions of such methods) may be used and are further described by M. Irani, B. Rousso and S. Peleg, "Recovery of ego-motion using region alignment," in IEEE Transactions on Pattern Analysis and Machine Intelligence, vol. 19, no. 3, pp. 268-272, March 1997. In some embodiments, the processor may compensate for three dimensional rotation of the camera using an EKF to estimate the rotation between frames. Such methods (or modified versions of such methods) may be used and are further described by C. Morimoto and R. Chellappa, "Fast 3D stabilization and mosaic construction," Proceedings of IEEE Computer Society Conference on Computer Vision and Pattern Recognition, San Juan, Puerto Rico, USA, 1997, pp. 660-665. In some embodiments, the processor may execute an algorithm that learns parametrized models of optical flow from image sequences. A class of motions are represented by a set of orthogonal basis flow fields computed from a training set. Complex image motions are represented by a linear combination of a small number of the basis flows. Such methods (or modified versions of such methods) may be used and are further described by M.

J. Black, Y. Yacoob, A. D. Jepson and D. J. Fleet, "Learning parameterized models of image motion," Proceedings of IEEE Computer Society Conference on Computer Vision and Pattern Recognition, San Juan, Puerto Rico, USA, 1997, pp. 561-567. In some embodiments, the processor may align images by recovering original three dimensional camera motion and a sparse set of three dimensional static scene points. The processor may then determine a desired camera path automatically (e.g., by fitting a linear or quadratic path) or interactively. Finally, the processor may perform a least squares optimization that determines a spatially-varying warp from a first frame into a second frame. Such methods (or modified versions of such methods) may be used and are further described by F. Liu, M. Gleicher, H. Jin and A. Agarwala, "Content-preserving warps for 3D video stabilization," in ACM Transactions on Graphics, vol. 28, no. 3, article 44, July 2009.

In some embodiments, the processor may generate a velocity map based on multiple images taken from multiple cameras at multiple time stamps, wherein objects do not move with the same speed in the velocity map. Speed of movement is different for different objects depending on how the objects are positioned in relation to the cameras. FIG. 198 illustrates an example of a velocity map, each line corresponding with a different object. In embodiments, tracking objects as a whole, rather than pixels, results in objects at different depths moving in the scene at different speeds. In some embodiments, the processor may detect objects based on features and objects grouped together based on shiny points of structured light emitted onto the object surfaces (as described above). In some embodiments, the processor may determine at which speed the shiny points in the images move. Since the shiny points of the emitted structured light move within the scene when the robot moves, each of the shiny points create a motion, such as Brownian Motion. According to Brownian motion, when speed of movement of the robot increases, the entropy increases. In some embodiments, the processor may categorize areas with higher entropy with different depths than areas with low entropy. In some embodiments, the processor may categorize areas with similar entropy as having the same depths from the robot. In some embodiments, the processor may determine areas the robot may traverse based on the entropy information. For example, FIG. 199 illustrates a robot 19900 tasked with passing through a narrow path 19901 with obstacles 19902 on both sides. The processor of the robot 19900 may know where to direct the robot 19900 based on the entropy information. Obstacles 19902 on the two sides of the path 19901 have similar entropies while the path 19901 has a different entropy than the obstacles as the path 19901 is open ended, resulting in the entropy presenting as far objects which is opposite than the entropy of obstacles 19902 presenting as near objects.

In some embodiments, the processor of the robot extracts features of the environment from sensory data. For the processor, feature extraction is a classification problem that examines sensory information. In some embodiments, the processor determines the features to localize the robot against, the process of localization broadly including obstacle recognition, avoidance, or handling. Object recognition and handling are a part of localization as localization comprises the understanding of a robot in relation to its environment and perception of its location with the environment. For example, the processor may localize the robot against an object found on a floor, an edge on a ceiling or a window, a power socket, or a chandelier or a light bulb on a ceiling. In a volumetric localization, the processor may localize the robot against perimeters of the environment. In embodiments, the processor uses the position of the robot in relation to objects in the surroundings to make decisions about path planning.

In some embodiments, the processor classifies the type, size, texture, and nature of objects. In some embodiments, such object classifications are provided as input to the Q-SLAM navigational stack, which then returns as output a decision on how to handle the object with the particular classifications. For example, a decision of the Q-SLAM navigational stack of an autonomous car may be very conservative when an object has even the slightest chance of being a living being, and may therefore decide to avoid the object. In the context of a robotic vacuum cleaner, the Q-SLAM navigational stack may be extra conservative in its decision of handling an object when the object has the slightest chance of being pet bodily waste.

In some embodiments, the processor uses Bayesian methods in classifying objects. In some embodiments, the processor defines a state space including all possible categories an object could possibly belong to, each state of the state space corresponding with a category. In reality, an object may be classified into many categories, however, in some embodiments, only certain classes may be defined. In some embodiments, a class may be expanded to include an "other" state. In some embodiments, the processor may assign an identified feature to one of the defined states or an "other" state of a state.

In some embodiments, $\omega$ denotes the state space. States of the state space may represent different objects categories. For example, state $\omega_1$ of the state space may represent a sock, $\omega_2$ a toy doll, and $\omega_3$ pet bodily waste. In some embodiments, the processor of the robot describes the state space $\omega$ in a probabilistic form. In some embodiments, the processor determines a probability to assign to a feature based on prior knowledge. For example, a processor of the robot may execute a better decision in relation to classifying objects upon having prior knowledge that a pet does not live in a household of the robot. In contrast, if the household has pets, prior knowledge on the numbers of pets in the household, their size, their history of having bodily waste accidents may help the processor better classify objects. A priori probabilities provide prior knowledge on how likely it is for the robot to encounter a particular object. In some embodiments, the processor assigns a priori probability to objects. For instance, a priori probability $P(\omega_1)$ is the probability that the next object is a sock, $P(\omega_2)$ is the probability that the next object is a doll toy, and $P(\omega_3)$ is the probability the next object is pet bodily waste. Given only $\omega_1$, $\omega_2$, $\omega_3$ in this example, $\Sigma P(\omega)$ is one. Initially, the processor may not define any "other" states and may later include extra states.

In some embodiments, the processor determines an identified feature belongs to $\omega_1$ when $P(\omega_1)>P(\omega_2)>P(\omega_3)$. Given a lack of information, the processor determines ⅓ probability for each of the states $\omega_1$, $\omega_2$, $\omega_3$. Given prior information and some evidence, the processor determines the density function $P_X(x|\omega_1)$ for the random variable X given evidence. In some embodiments, the processor determines a joint probability density for finding a pattern that falls within category ωj and has feature value x using $P(\omega_j, x)=P(x)P(x)=P(\omega_j)P(\omega_j)$ or Bayes' formula $$P(x) = \frac{P(\omega_j)P(\omega_j)}{P(x)}.$$

In observing the value of x, the processor may convert the a priori probability $P(\omega_j)$ to an a posteriori probability P(x), i.e., the probability of a state of the object being of given the feature value x has been observed. $P(\omega_j)$ is the probability of observing the feature value x given the state of the object is $\omega_j$. The product of $P(\omega_j)P(\omega_j)$ is a significant factor in determining the a posteriori probability whereas the evidence P(x) is a normalizer to ensure the a posteriori probabilities sum to one. In some embodiments, the processor considers more than one feature by replacing the scalar feature value x by a feature vector x, wherein x is of a multi-dimensional Euclidean space $R^n$ or otherwise the feature space. For the feature vector x, a n-component vector-valued random variable, $P(\omega_j)$ is the state-conditional probability density function for x, i.e., the probability density function for x conditioned on $\omega_j$ being the true category. $P(\omega_j)$ describes the a priori probability that the state is $\omega_j$. In some embodiments, the processor determines the a posteriori probability P(x) using Bayes' formula $$P(x) = \frac{P(\omega_j)P(\omega_j)}{P(x)}.$$

The processor may determine the evidence P(x) using $P(x) = \Sigma_{j=1} p(\omega_j)P(\omega_j)$ wherein j is any value from one to n.

In some embodiments, the processor assigns a penalty for each incorrect classification using a loss function. Given a finite state space comprising states (i.e., categories) $\omega_1, \ldots, \omega_n$ and a finite set of possible actions $\alpha_1, \ldots, \alpha_a$, the loss function $\lambda(\alpha_i|\omega_j)$ describes the loss incurred for executing an action $\alpha_i$ when the particular category is $\omega_j$. In embodiments, when a particular feature x is observed, the processor may actuate the robot to execute action $\alpha_i$. If the true state of the object is $\omega_j$, the processor assigns a loss $\lambda(\alpha_i|\omega_j)$). In some embodiments, the processor determines a risk of taking an action $\alpha_i$ by determining the expected loss, or otherwise conditional risk of taking the action $\alpha_i$ when x is observed, $R(x)=\Sigma\lambda(\omega_j)P(\omega_j|x)$.

In some embodiments, the processor determines a policy or rule that minimizes the overall risk. In some embodiments, the processor uses a general decision policy or rule given by a function $\alpha(x)$ that provides the action to take for every possible observation. For every observation x the function $\alpha(x)$ takes one of values $\alpha_1, \ldots, \alpha_a$. In some embodiments, the processor determines the overall risk R of making decisions based on the policy by determining the total expected loss. In some embodiments, the processor determines the overall risk as the integral of all possible decisions, $R=\int R(x)P(x)dx$, wherein dx is equivalent to n.

Similar to the manner in which humans may change focus, the processor of the robot may use artificial intelligence to choose on which aspect to focus. For example, at a party a human may focus to hear a conversation that is taking place across the room despite nearby others speaking and music playing loudly. The processor of the robot may similarly focus its attention when observing a scene, just as a human may focus their attention on a particular portion of a stationary image. A similar process may be replicated in AI by using a CNN for perception of the robot. In a CNN, each layer of neurons may focus on a different aspect of an incoming image. For instance, a layer of the CNN may focus on deciphering vertical edges while another may focus on identifying circles or bulbs. For example, in FIG. 200, a higher level layer of neurons 20000 may detect a human by putting together the detected bulbs and edges and yet another layer of neurons 20100 may recognize the person based on recognition of facial features. FIG. 201 illustrates an example of hierarchical feature engineering. An image 20100 may be provided as input. Low level features (e.g., edges and corners) may first be detected by executing, for instance, horizontal and vertical filters 20101. The output of the filters 20101 may be provided as input to the next layer of the CNN 20102. The next layer 20102 may detect mid-level features such as geometrical shapes (e.g., rectangle, oval, circle, triangle, etc.). The output of layer 20102 may be provided to a next layer (not shown) to detect high level features such as objects (e.g., a car, a human, a table, a bike, etc.).

In some embodiments, the processor detects an edge based on a rate of change of depth readings collected by a sensor (e.g., depth sensor) or a rate of change of pixel intensity of pixels in an image. In embodiments, the processor may use various methods to detect an edge or any other feature that reduces the points against which the processor localizes the robot. For instance, different features extracted from images or from depth data may be used by the processor to localize the robot. In cases wherein depth data is used, the processor uses the distance between the robot and the surroundings (e.g., a wall, an object, etc.) at each angular resolution as a constraint that provides the position of the robot in relation to the surroundings. In embodiments, the robot and a measurement at a particular angle form a data pair. For example, FIG. 2021 illustrates a wall 202100, a robot 202101, and measurements 202102 captured by a depth sensor of the robot 202101. Each measurement taken at a particular angle and the robot form a data pair. For instance, single measurement 202103 at a particular angle and the robot form a data pair and single measurement 202104 at a particular angle and the robot from another data pair, and so on. In some embodiments, the processor organizes all the data pairs in a matrix. In some embodiments, depth sensor data is used to infer a particular feature, such as edge, and the processor reduces the density to those data pairs in between the robot and the particular feature, thereby sparsifying the number of constraints. Edges and other tracked features may also be detected by other methods such as feature extraction from an image. In embodiments, the number of constraints increases as the number of features tracked increases, resulting in a higher density network. In some embodiments, the processor reduces the set of constraints by integrating out either all or some of the map variables, leaving only the constraints related to robot pose variables over time. Alternatively, the processor reduces the set of constraints by integrating out the robot pose variables, leaving only the constraints related to map variables. In some embodiments, the processor constantly generates and accumulates a set of constraints as the robot navigates along a path. In some cases, solving for many constraints may become too computationally expensive. Therefore, in some embodiments, the processor stacks sets of older constraints until their use is needed while keeping the latest constraints active.

Some embodiments may use engineered feature detectors such as Forstner corner, Harris corner, SIFT, SURF MSER, SFOP, etc. to detect features based on human understandable structures such as a corner, blob, intersection, etc. While such features make it more intuitive for a human brain to understand the surroundings, an AI system does not have to be bound to these human friendly features. For example, capturing derivatives of intensity may not meet a threshold for what a human may use to identify a corner, however, but the processor of the robot may make sense of such data to detect a corner. In some methods, some features are chosen over others based on how well they stand out with respect to one another and based on how computationally costly they are to track.

Some embodiments may use a neural network that learns patterns by provided the network with a stream of inputs. The neural network may receive feedback scored based on how well the probability of a target outcome of the network aligns with the desired outcome. Weighted sums computed by hidden layers of the network are propagated to the output layer which may present probabilities to describe a classification, an object detection (to be tracked), a feature detection (to be tracked), etc. In embodiments, the weighted sums correlate with activations. Each connection between a node may learn a weight and/or bias, although in some instances, they may weight and bias may be shared in a specific layer. In embodiments, a neural network (deep or shallow) may be taught to recognize features or extract depth to the recognized features, recognize objects or extract depth to the recognized objects, or identify scenes in images or extract depth to the identified depths in the images. In embodiments, pixels of an image may be fed into the input layer of the network and the outputs of the first layer may indicate the presence of low-level features in the image, such as lines and edges. When a stream of images is fed into the input layer of the network, distance from the camera recorder to those lower-level features are identified. Similarly, a change in a location of features tracked in two consecutive images may be used to obtain angular or linear displacement of the camera and therefore displacement of the camera within the surroundings may be inferred.

In embodiments, nodes and layers may be organized in a directed, weighted graph. Some nodes may or may not be connected based on the existence of paths of data flow between nodes in the graph. Weighted graphs, in comparison to unweighted graphs, include values that determine an amount of influence a node has on the outcome. In embodiments, graphs may be cyclic, part cyclic, or acyclic, may comprise subgraphs, and may be dense or sparsely connected. In a feed-forward setup, computations run sequentially, operation after operation, each operation based on the outputs received from a previous layer, until the final layer generates the outputs.

While CNNs may not be the only type of neural network, they may be the most effective in cases wherein a known grid type topology is the subject of interest as convolution is used in place of matrix multiplication. Time series data or a sequence of trajectories and respective sensed data samples collected at even (or uneven) time stamps are examples of 1D grid data. Image data or 2D map data of a floor plan are examples of 2D grid data. A spatial map of the environment is an example of 3D grid data. A sequence of trajectories and respective sensed 2D images collected are another example of 3D grid data. These types of data may be useful in learning, for example, categories of images and providing an output of statistical likelihoods of possible categories within which the image may fall. These types of data may also be useful for, for example, obtaining statistical likelihoods of possible depth categories which sensor data may fall. For example, where a sensor output may have ambiguities of 12 CM, 13 CM, 14 CM, and 15 CM, may be adjudicated with probabilities and the one with highest probability may be the predicted depth. Each convolutional layer may or may not be followed by a pooling layer. A pooling layer may be placed at every multiple of a convolutional layer and may or may not be used. Another type of neural network includes a recurrent neural network. A recurrent neural network may be shown using part cycles to convey looped-back connections and recurrent weights. A recurrent neural network may be thought to include an internal memory that may allow dependencies to affect the output, for example Long Short-Term Memory (LSTM) variation.

In arranging and creating the neural network, the graph nodes may be intentionally designed such not all possible connections between nodes are implemented, representing a sparse design. Alternatively, some connections between nodes may have a weight of zero, thereby effectively removing the connection between the nodes. Sparsely connected layers obtained by using connections between only certain nodes differs from sparsely connected layers emerging from activations having zero weight, wherein it is the result of training implicitly implying that the node did not have much of an influence on the outcome or backpropagation for the correct classification to occur. In embodiments, pooling is another means by which sparsely connected layers may be materialized as the outputs of a cluster of nodes may be replaced by a single node by finding and using a maximum value, minimum value, mean value, or median value instead. At subsequent layers, features may be evaluated against one another to infer probabilities of more high level features. Therefore, from arrangements of lines, arcs, corners, edges, and shapes, geometrical concepts may emerge. The output may be in the form of probabilities of possible outcomes, the outcomes being high-level features such as object type, scene, distance measurement, or displacement of a camera.

Layer after layer, the convolutional neural network propagates a volume of activation information to another volume of activation through a differentiable function. In some embodiments, the network may undergo a training phase during which the neural network may be taught a behavior (e.g., proper actuation to cause an acceleration or deceleration of a car such that a human may feel comfortable), a judgment (e.g., the object is cat or not a cat), a displacement measurement prediction (e.g., 12 cm linear displacement and 15 degrees of angular displacement), a depth measurement prediction (e.g., the corner is 11 cm away), etc. In such a learning phase, upon achieving acceptable prediction outputs, the neural network records the values of weights and possibly biases them through backpropagation. Prior to training, organization of nodes into layers, number of layers, connections between the nodes of each layer, density and sparsity of the connections, and the computation and tasks executed by each of nodes are decided and remain constant during training. Once trained, the neural network may use the values for the weights or biases the learned weights for a sample to values that are acceptable or correct for the particular sample to make new decisions, judgments, or calls. Biasing the value of weight may be based on various factors such an image including a particular feature, object, person, etc.

Depending on the task, some or all images may be processed. Some may be determined to be more valuable and bear more information. Similarly, in one image, some parts of the image or a specific feature may be better than others. Key-point detection and adjudication methods may be provisioned to order candidates based on merits, such as most information bearing or least computationally taxing. These arbitrations may be performed by subsystems or may be implemented as filters in between each layer before data is output to a next layer. One with knowledge in the art may use algorithms to divide input images into a number of blocks and search for feature words already defined in a dictionary. A dictionary may be predetermined or learned at run time or a combination of both. For example, it may be easier to identify a person in an image from a pool of images corresponding to social networks a person is connected to. If a picture of a total stranger was in a photo, it may be hard to identify the person from a pool of billions of people. Therefore, a dictionary may be a dynamic entity built and modified and refined.

When detecting and storing detected key-points, there may be a limitation based on the number of items stored with highest merit. It may be statically decided that the three key-points with highest merits are stored. Alternatively, any number of key-points above a certain merit value may be nominated and stored. Or one key-point has a high value ratio in comparison to a second key-point, the first keyword suffices. In some embodiments, a dictionary may be created based on features the robot is allowed to detect, such as dictionary of corners, Fourier Descriptors, Haar Wavelet, Discrete Cosine Transform, a cosine or sine, Gabor Filter, Polynomial Dictionary, etc.

In a supervised learning method of training, all training samples are labeled. For example, an angle of displacement of a camera between two consecutive images are labeled with correct angular displacement. In another example, a stream of images captured as a camera moves in an environment are labelled with correct corresponding depths. In unsupervised learning, where training samples are not labeled, the goal is to find a structure in the data or clusters in the data. A combination of the two learning methods, i.e., semi-supervised learning, lies somewhere between supervised and unsupervised learning, wherein a subset of training data is labeled. A first image after convolution with ReLU produces one or more output feature maps and activation data which is an input for the second convolution.

In embodiments, an image processing function may be any of image recognition, object detection, object classification, object tracking, floor detection, angular displacement between consecutive images, linear displacement of the camera between consecutive displacement of the camera, depth extraction from one or more consecutive images, separation of spatial constructive elements such as pillars from ceilings and floor, extraction of a dynamic obstacle, extraction of a human in front of another human positioned further from the robot, etc. In embodiments, a CNN may operate on a numerical or digital representation of the image represented as a matrix of pixel values. In embodiments using a multi-channel image, a separate measure for each channel per image block may be compared to determine how evident features are and how computationally intensive the features may be to extract and track. These separate comparisons may be combined to reach a final measure for each block. The combining process may use a multiplication method, a linearly devised method for combining, convolution, a dynamic method, a machine learned method, or a combination of one or more methods followed by a normalization process such as a min-max normalization, zero mean-unit amplitude normalization, zero mean-unit variance normalization, etc.

In embodiments, an HD feed may produce frames captured and organized in an array of pixels that is, for example, 1920 pixels wide and 1080 pixels high. In embodiments, color channels may be separated into red (R), green (G), and blue (B) or luma (Y), chroma red (Cr), and chroma blue (Cb) channels. Each of these channels may be captured with time multiplexed. In one example, a greyscale image may be added to RGB channels to create a total of four channels. In another example, RGB, greyscale, and depth may be combined to create five channels. In embodiments, each of the channels may be represented as a single two-dimensional matrix of pixel values. In embodiments using 8-bits, pixel values may range between 0 and 255. In context of depth, 0 may correspond with a minimum depth in a range of possible depth values and 255 may correspond with a maximum depth of a depth range of the sensor. For example, for a sensor with a depth range of zero meters to four meters, a value of 128 may correlate to approximately two meters depth. When more bits are used, the upper bound of 255 increases, the upper bound depending on how many bits are used (e.g., 16 bits, 32 bits, 64 bits, etc.).

In embodiments, each node of the convolutional layer may be connected to a region of pixels of the input image or the receptive field. ReLu may apply an elementwise activation function. Pooling may down sample operation along the spatial dimensions (width, height), resulting in a reduction in the data size. Sometimes an image may be split into two or more sub-images. Sometimes sparse representation of the image blocks may be used. Sometimes a sliding window may be used. Sometimes images may be scaled, skewed, stretched, rotated and a detector may be applied separately to each of the variations of the images. In the end, a fully connected layer may output a probability for each of the possible classes that are the matter of adjudication, which may include a drastic reduction in data size. For example, for depth values extrapolated from a captured image and two depth measurements from a point range finder, the output may simply be a probability values for possible depths of pixels that did not have their depth measured with the point range finder. In another example, probabilities of an intersection of lines being either a corner where walls meet at the ceiling, a window, or a TV may be output. In another example, the outputs may be probabilities of possible pointing directions of an extracted hand gesture. In one example, wherein the goal of the operation is to extract features from an input image, the output may include probabilities of the possible features the extracted feature may be, such as edges, curves, corners, blobs, etc. In another example, wherein the goal of the operation is to output an angular displacement of the robot, the output may be a probability of four different possible angular displacements being the actual angular displacement of the robot. In embodiments, convolution may or may not preserve the spatial relationship between pixels by learning image features using small squares of input data.

In contrast to a velocity motion model, an odometry motion model wherein, for example, a wheel encoder measurement count is integrated over time, suffers as wheel encoder measurements may only be counted after the robot has made its intended move, not before or during, and therefore may not be used in a prediction step. This is unlike control information that is known at a time the controls are issued, such as a number of pulses in a PWM command to a motor. For a two-wheeled robot, an angular movement may be the result of a difference between the two wheel velocities. Therefore, the motion of the robot may be broken down to three components. In embodiments, the processor of the robot may determine an initial angular and translational displacement that are accounted for in a prediction step and a final adjustment of pose after the motion is completed. More specifically, an odometric motion model may include three independent components of motion, a rotation, a translation, and a rotation, in this particular order. Each of the three components may be subject to independently introduced noise. In either of the cases of odometry or velocity models of motion, the translational component may be extracted by visual behavior, wherein all points move to gather around or move away from a common focus of expansion (FoE). FIG. 203 illustrates a top view of an environment with a robot moving from an initial point 20300 to a second point 20301. As the robot moves, all points move to gather around or move away from a common focus of expansion (FoE) 20302. In embodiments, a commonly used eight point algorithm by Christopher Longuet-Higgins (1981) may used to extract the essential matrix (or fundamental matrix) that connects corresponding image points.

FIG. 204 illustrates a line of sight 20400 of a rangefinder and a FOV 20401 of a camera positioned on a robot 20401. In extrapolating depth of a point range finder from one or two measured points to all or many points in the image, the point of the laser seen in the image may be distinct and different from 3D rays of corresponding 2D features that are matched in two consecutive images. The reason is that the laser point moves along with the frame of reference of the robot which is not stationary in the frame of the environment, while a 2D feature is substantially stationary in the frame of reference of the environment. FIG. 205 further illustrates this concept. As a camera 20500 and rangefinder 20501 move within an environment, the laser point reading lp and the extracted feature x are distinct and different as the frame of reference of the feature is the environment and stationary while the laser point frame of reference is the robot is not stationary relative to the frame of reference of the environment. As the robot moves the distance measured by the laser point d changes as well.

In a simple structure from motion problem, some nonlinear equations may be converted to approximate a set of linear least square problems. Epipolar geometry may be used to create the equations. In embodiments, a set of soft constraints that relate the epipolar geometry to the frame of reference define the constructional geometry of the environment. This allows the processor to refine the construction of the 3D nature of the environment along with more accurate measurement of motion. This additional constraint may not be needed in cases where stereovision is available, wherein the geometry of a first camera in relation to a second camera is well known and fixed. In embodiments, rotation and translation between two cameras may subject to uncertainties of motion. This may be modeled by connecting two stereo cameras to each other with a spring that introduces a stochastic nature to how the two cameras relate to each other geometrically. When the rotation and translation of two cameras in epipolar geometry are subject to uncertainties of motion, they may be metaphorically connected by a spring. For example, FIG. 206 illustrates two cameras 20600 connected by a spring 20601 and an epipolar plane P. Mean and variance of the spring motion are shown in graph 20602.

In a velocity motion model, the translational velocity at time $t_0$ may be denoted with $V_t$ and the rotational velocity during a same duration may be denoted by $W_t$. The spring therefore consists of not just translational noise but also angular noise. The measurement captured after a certain velocity is applied to the spring may cause the camera to land in positions A, B, C, D, each of which may have variations. FIG. 207 illustrates a camera 20700 subjected to both translational noise, wherein it may actually be located at points A, B, C or D, as well as angular noise wherein it may have angular deviation when positioned at any of points A to D (only shown for point A). A rotation matrix of a first rotation in both motion models (velocity and odometry) is somewhat known as it is dictated by control. The second rotation, specific to the odometry motion model, computes visuals to resolve the residual uncertainties, apart from non-parametric tools. In embodiments, odometry information derived from an encoder on a wheel of the robot performs better where movement is straight. The performance degrades with rotation as the resolution may not be enough to provide smaller rotations. In embodiments, data from any of gyroscopes, IMUs, compasses, etc. may help with this problem when fused using EKF. In some embodiments, a training phase of a neural network model may be used to establish velocity and/or motion profiles based on the geometric configuration of the robot, which may then be used as priors. In some cases, older methods of establishing priors, such as lookup tables or combination of the methods, may be useful. In a velocity model, a command may be issued in the form of pulses to create a particular velocity at each of the wheels, V1 and V2. In embodiments, the processor determines a difference in the velocity of the wheels, ΔV, and a distance d1 and d2 that each wheel travels using d1=v1*t and d2=v2*t. Given the two wheels of the robot have a distance of d3 in between them, the processor may determine the angular displacement of the robot using |d1−d2|/d3.

In some embodiments, PID may be used to smoothen the curve on the function f'(x) representing trajectory and minimize deviation from the path that is planned f(x) (in the context of straight movement only). FIG. 208 illustrates a robot 20800 and a trajectory 20801 of each wheel 20802. A trajectory f(x) of the robot 20800 is smoothed to minimize its deviation from the planned path f(x). In embodiments, the movement and velocity of the camera may be correlated to the wheels. For example, two cameras on two sides of the robot, their velocities V1 and V2, and observations follow the trajectory of each of the two wheels. FIG. 209A illustrates a robot 20900 with two cameras 20901 positioned on each side and FIG. 209B illustrates the robot 20900 with one camera 20901 positioned on a front side. When there is one camera, the momentary pose of the camera may be derived using |d1−d2|/d3 when t0. When it is possible to predict a rotation from odometry and account for residual uncertainty, it is equally possible to use iterative minimization of error (e.g., nonlinear least squares) in a set of estimation MCMC Markov chain and/or Monte Carlo structure rays, wherein connecting camera centers to 3D points is enhanced. When the processor combines odometry (fused with any possible secondary sensor) with structure from motion, the processor examines the energy-based model and samples using a Markovian chain, more specifically a Harris chain, when the state space is limited, discrete, and enumerable.

When the processor updates a single state x in the chain to x' the processor obtains $P^{(t+1)}(x)=\in P^{(t)}(x)T(x'|x)$, wherein P is the distribution over possible outcomes. The chain definition may allow the processor to compute derivatives and Jacobians and at a same time take advantage of sparsification. In embodiments, each feature that is being tracked has a correspondence with a point in 3D state space and a correspondence with a camera location and pose in a 3D state space. Whether discrete and countable or not, the Markovian chain repeatedly applies a stochastic update until it reaches samples that are derived from an equilibrium distribution, of which the number of time steps required to reach this point is unknown. This time may be referred to as the mixing time. As the size of the chain expands, it becomes difficult to deal with backward looking frames growing in size. In embodiments, a variable state dimension filter or a fixed or dynamic sliding window may be used. In embodiments, features may appear and disappear. In some implementations, the problem may be categorized as two smaller problems. One problem be viewed as online/real-time and while another may be a backend/database based problem. In some cases, each of the states in the chain may be Rao Blackwellized. With importance sampling, many particles may go back to the same heritage at one point of time. Some particles may get lost in a run and cause issue with loop closure, specifically when some features remain out of sight for some extended period of time.

In the context of mixed reality mixed with SLAM, the problem is even more challenging. For example, a user playing tennis with other player remotely via virtual reality plays with a virtual tennis ball. In this example, the ball is not real and is a simulation in CGI form of the real ball being played with by the other players. This follows the match move problem (i.e., Roble 1999). For this, a 3D map of the environment is created and after a training period, the system may converge using underlying methods such as those described by Bogart (1991). Sometimes the 3D state spaces may be the same.

In some cases, a drone in a closed environment or the 3D state space may obtain some geometric correlations. FIG. 210 illustrates a robot 21000 including cameras with FOVs 21001 observing an environment. A camera pose space is on a driving surface plane 21002 of the robot 21000 while a feature space is above the driving surface on walls 21003 of the environment (capturing features such as windows, picture frames, wall corners, etc.). Embodiments are not necessarily referring to physical space as features are 2D and not volumetric, however, perceived depth and optical flow may be volumetric. In one example, a floor plan is the desired outcome. The state space of features may not have overlap with the desired state space. FIG. 211 illustrates a robot 21100 within a 3D environment, wherein an actuation space is on a driving surface 21101 (i.e., the space corresponding to movement of the robot) is separate from an observation space (i.e., the space corresponding with observed features). FIG. 212 illustrates another example, wherein an actuation space 21200 of a robot 21201 is different from an observation space 21202 of a camera of the robot. The actuation space is separate from observation space, which may or may not be geometrically connected.

In the context of collaborative SLAM or collaborative participants, cameras may not be connected with a base or a spring with somewhat predictable noise or probabilistic rules. Cameras may be connected and/or disconnected from each other. At times of connection, the cameras may include different probabilistic noise. The connections may be intermittent, moving, and noisy and unpredictable. However, the 3D state space that the cameras operate within may be a same state space (e.g., multiple commercial cleaners in one area working on a same floor). FIG. 213 illustrates the concept of epipolar geometry in the context of collaborative devices. Here, cameras 21300 are not connected by a solid base or a noisy spring like base. Their connections are intermittent, noisy and unpredictable, as represented by intermittent connection 21301 and springs 21302 with probabilistic noise 21303, but they may operate in a same state space. In some embodiments, the issue of difference in camera intrinsic may rise when different cameras have different intrinsics, reconstruction, or calibration.

FIG. 214A illustrates a robot 21400 moving in an environment. As the robot 21400 moves sensors positioned on the robot 21400 observe features such as window 21401 and TV 21402. FIG. 214B illustrates how these features 21401 and 21402 change in the image frames 1 to 9 as the robot moves within the environment. The features may become larger or smaller or may enter or exit the image frame. Feature spaces, such as in this example, are not volumetric or geometric in nature, while the path of the robot is on a 2D plane and geometric in nature. FIG. 214C illustrates a navigation path 21403 of the robot on a 2D plane of the environment. The path 21403 is executed by the robot as an image sensor captures the image frames shown in FIG. 214B.

In embodiments, there may be a sparse geometric correlation. FIG. 215A illustrates a geometric correlation 21500 between features 21501 in a feature space and a camera location of a robot 21502 in an actuation space. FIG. 215B illustrates the geometric correlation 21500. Such correlations may establish, increase, decrease, disappear, and reestablish. In the above example, there may be no correlation with the TV, however the correlation may become established, strengthened, and eventually the window will lose the correlation. When a room is featureless for some time steps, correlations between two spaces are reduced. FIG. 216A illustrates a graph depicting a correlation between different features in a feature space and a camera location (i.e., robot location given camera is positioned on the robot) in an actuation space over time. FIG. 216B illustrates a graph depicting correlation between the feature space and the actuation space over time.

In some embodiments, the processor uses depth to maintain correlation and for loop closure benefits where features are not detected or die off because of Rao Blackwellization. FIG. 217A illustrates a graph depicting depth based SLAM and feature tracking over time. The combination of depth based SLAM and feature tracking may keep the loop closure possibility alive at all times. FIG. 217B illustrates a similar concept for an autonomous golf cart in a golf field wherein distance and depth and feature tracking are shown over time. In this particular case, their combination is useful as distance and depth are measured sparsely. This is particularly helpful because different methods follow different shapes of uncertainty. In embodiments wherein a map may not be built due to space being substantially open and a lack of barriers such as walls to formalize the space, the processor may define a state space S with events E as possible outcomes. Events E may be a single state E={E1} or a set of states E={E1, E2, . . . E3}. E1, E2, E3, or any E may be a set. FIG. 218 illustrates a state space with events E1, E2 and E3. Here E1 and E3 are sets of events and intersect. In using an energy model the processor assumes that no event may be an empty set or have zero probability.

In feature domain state spaces, a continuous stream of images I(x) may each be related to a next image. Through samples taken at one or more pixels $\{x, =x_i, y_i\}$ from the pixel domain of possible events, the processor may calculate a sum of squared differences $\Sigma_i [I''(x_i\text{+displacement vector})-I'(x_i)]^2$. In areas where the two images captured overlap in field of view, sum of absolute differences or L1 norm or sum of absolute transform differences or the like may be used. In actuation domain state spaces, the motion of the camera follows the motion of the robot, wherein the camera is considered to be in a central location. A transform bias may be used when the camera is located at locations other than the center and a field of view of the camera differs from the heading of the robot. FIG. 219A illustrates a robot 21900 with a camera 14001 with FOV 14002 mounted at an angle to a heading of the robot 21900 and a laser 21903. This provides the camera 14001 with an angular transform bias which is helpful for wall following the wall. FIG. 219B illustrates robot 21900 in a first, second, and third state and images A, B, and C captured at each state. As the robot moves along the wall 21904 in a first state, the line laser 21903 captured in image A appears as a horizontal line. As the robot approaches the corner 21905 in a second state, the line laser 21906 captured in image B appears as two lines due to its projection onto the corner 21906. The same is see in the third state, wherein the line laser 21906 captured in image C appears as two lines. From A, B and C the processor may determine a high likelihood for a corner and how far the corner is.

In some embodiments, the state space of a mobile robot is a curved space (macro view) where the sub segment within which the workspace is located is a tangent space that appears flat. While work spaces are assumed to be flat, there are hills and valleys and mountains, etc. on the surface. For example, a golf course cart mobile robot may obtain sparse depth readings because the area in which it operates is wide open and obstacles are far and random, unlike an indoor space wherein there are walls and indoor obstacles to which depth may be determined from reflection of structured light, laser, sonar, or other signals. In areas such as golf courses, wherein the floor is not even and least square methods or any other error correction learning are used, the measurement step flattens all measurements into a plane. Therefore, alternative artificial neural network arrangements may be more beneficial. Competitive learning such as the Kohonen map may help with maintaining track of the topological characteristics of the input space. FIG. 220 represents an open field golf course 22000 with varying topological heights defined by M×N. Because of this variation in height, tessellation of space is not square grids of 2D or 3D or voxels where each point has an associated random variable assigned to it representing obstacle occupation or absence. Further it is not like a point map, point cloud, free space map or landmark map. To visualize, each cell may be larger or smaller than the actual space available allowing the grid to be warped. While use of octree representation and voxel trees are beneficial, they are distinct and separate method and may be used individually and in combination with other methods. FIG. 221 illustrates an example of a Kohonen map, wherein a limited number (e.g., one, two, three, ten) of depth measurements are extracted into the entire array of a camera (e.g., 640×480), wherein points 22100 are accurate rangefinder measurements. In this setup, each data point competes for representation. Once weight vectors are initialized, a sample vector is used as the best matching unit and every node is examined to determine the ones that are most similar to the BMU. The neighbors are rewarded when they are similar to BMU.

In embodiments, a Fourier transform of a shifted signal share the same magnitude of the original signal with only a linear variation in phase. A convolution in the spatial domain has a correspondence with multiplication in the Fourier domain, therefore to convolve two images, the processor may obtain the Fourier transforms, multiply them, and inverse the result. Fourier computation of a convolution may be used to find correlations and/or provide a considerably computationally cost effective sum of squared differences function. For example, a group of collaborative robot cleaners may work in an airport or mall. The path of each robot K may comprise a set of sequence of positions $\{X_{t1}^k, X_{t2}^k, \ldots, X_{ti}^k, \ldots, X_{tn}^k\}$ up to time t, where at each of the time stamps up to t the position vector X consists of $(x_t^k, y_{ti}^k, \theta_{ti}^k)$, representing a 2D location and a heading in a plane. In embodiments, $Z_{m,i}^{n,j}$ is a measure subject to covariance of $\Sigma_{m,i}^{n,j}$, a constraint described in the edge between nodes.

When an image is processed it is possible to look for features in a sliding window. The sliding window may have a small stride (moving one, two, or a few pixels) or a large stride to a point of no overlap with the previous window. FIG. 222 illustrates an example of a sliding window 22200 in images 22201 and 22202. The sliding window 22200 may have different strides. For instance, image 22201 has a small stride 22203 as compared to image 22202 which has a larger stride 22204. The window may slide horizontally, vertically, etc. In another embodiment, the window may start from an advantageous location of the image. For example, it may be advantageous to have the window start from the middle. FIG. 223 illustrates various possibilities, wherein the sliding window 22300 begins in a middle of the images 22301, 22302, and 22303, each with different strides. In another embodiment, it may be beneficial to segment the image to several sections and process them. FIG. 224 illustrates various possibilities for segmenting the images 22400, 22401, and 22402. For instance, image 22401 illustrates fixed segmentation, whereas images 22401 and 22402 illustrate segmentation based on entropy and contrast, respectively. Sometimes it may be better to expand the window, rather than sliding it. For example, FIG. 225 illustrates sliding window 22500 in image 22501 that is expanded to sliding window 22502 to obtain 22503. In some embodiments, the processor may normalize the size of the window so it fits well with other data sources. In this case or any case, where image sizes that are compared are not of the same size, images may be passed through filters and normalized.

In some embodiments, the best features are selected from a group of features. For example, FIG. 226 illustrates various features 22600, 22602, and 22603 in two-dimensions 22604 and three dimensions 22605. The processor may select the circular feature 22600 and rectangular feature 22602 as they are clear in comparison to blurry features 22603, which the processor may have less confidence in their characteristics. A feature arbitrator selects which one of the features to track. In some embodiments, more than one feature is tracked, such as two features belonging to one object. For instance, the three features of three-dimensional object 22605 may be tracked over time by the processor of the robot. Features 1, 2, and 3 are tracked at time steps $t_0$ to $t_4$ and beyond. In embodiments, the processor correlates robot movement in relation to the images. With tracking more than one feature and its evolution as the robot moves, 3D spatial information and how these features in images are related with one another in a 3D spatial coordinate frame of reference may be inferred. If two features belong to the same object, they may change. FIGS. 227A and 227B illustrate two features 22700 and 22701 tracked by a processor of robot 22702 in images 22703 as it moves within an environment at a first time step to and a second time step $t_1$. As the robot 22702 moves right, both features 22700 and 22701 move towards a middle of the image and are divergent from one another. In contrast to separate objects positioned at different depths, tracked features 1, 2, and 3 may diverge and may not fit together, even when considered in a 3D spatial frame of reference. At each time step a confidence value may be assigned to features and tracked. In some embodiments, some features may be omitted and replaced by new features. In some embodiments, the features detected belong to different color channels (RGB) or some features are different in nature (actively illuminated and extracted features) or yet of a different nature, such as depth. In some embodiments, various filters are applied to images to prepare them before extracting features.

When two features belong to different objects and this information is revealed, the objects may split into two separate entities in the object tracking subsystem while remaining as one entity in the feature tracking subsystem. FIG. 228 illustrates object 1 with two features, which based on sensor data, is found to include two features. As such, two objects, each corresponding to a feature emerge, and over time additional features of each object are observed and provided to a feature database. In another example, FIG. 229 illustrates object 1 including two features at some depth x. The properties of object 1 may be determined at different depths. This is represented as object 2, wherein the properties are determined at depths x and y. Such information may be saved in two feature databases, the first including properties of the entire object at different depths and the second including properties of the features within the entire object. As a property, a feature may belong to an object class or have that field undetermined or to be determined.

As more information appears, more data structures emerge. This is shown in FIG. 230, wherein over time, t=0 to t+x, more entries (shown in grey) are obtained in each database and eventually relations between the databases emerge. Duplicated data is identified, truncated, and merged, and the loop is closed.

In some embodiments, multiple streams of data structures are created and tracked concurrently and one is used to validate the other in a Bayesian setup. Examples include property of feature X | given depth Y; property of feature X | given feature x with illumination still detected; and property of corner Y | given depth readings confirming the existence of corner by the pixel value derivatives indicating change in two directions. FIG. 231 illustrates three different streams of data, wherein the data inferred from stream 2 is used to validate the data inferred from stream 1 and vice versa and the data inferred from stream 3 is used to validate the data inferred from stream 2 and vice versa. Validation steps may or may not consolidate information based on minimizing minimum mean square distance or mahalanobis distance or such methods.

At times when data does not fit well, the robot may split the universe and may consider multiple universes. At each point, the processor may shrink the number of universes if they diverge from measured reality by purging the unfitting universes. For example, FIG. 232 illustrates the data split into various possible scenarios, namely universe 1 to 4, and their corresponding trajectories. Since universe 4 diverges from reality, the processor of the robot purges the possible scenario.

Some prior art converts data into greyscale and uses the greyscale data in its computations. This is shown in FIG. 233A. An alternatively new method is shown in FIG. 233B wherein the RGB is individually processed then combined to grayscale. In this enhanced greyscale method, only strong information is infused because if one of them does not bear enough information, it only reduces the value in the mix. By not infusing it or giving it low weight, the greyscale is enhanced. The possible architectures that may be used in processing the RGB data are shown in FIGS. 233C-233E. In FIG. 233C three channels are maintained, whereas in FIGS. 233D and 233E four channels are maintained, the fourth being the combination to grayscale, either before or after processing the RGB data, respectively. FIGS. 233F and 233G illustrate processes that may be used in processing RGB data. In FIG. 233F all processed data are examined by an arbitrator to determine whether to prune a portion of the data in cases where the data does not fit well or is not useful. FIG. 233G illustrates the addition of depth data and RGB data under illumination to the process, wherein all data is similarly examined by an arbitrator to eliminate data that is not useful. In some embodiments, an arbitrator compares the levels of information of data and keep the best data. Some embodiments prune redundant data or data that does not bring lots of value. This is performed when depth data or structured light enhanced RGB data is added.

Some embodiments may use dynamic pruning of feature selectors in a network. For example, sensors may read RGB and depth. For instance, the images 23400, 23401, and 23402 in FIG. 234A may be provided to the neural network illustrated in FIG. 234B to extract features. In some embodiments, there may be filters after each layer or filters after each neuron. In image 1, for example, an arc detection may be a best metric and may provide more confident information. In image 2, a Harris corner detector may outperform other detectors and a confidence matrix may be generated and convolved at each layer. In image 3, where the ambience is very dark, only TOF depth information may be reliable and images are less useful. At any stage the less helpful detectors may be pruned either as a result of back propagation (which is plain and unsophisticated). In addition, there may be additional processing, wherein, for example, the detector detecting one or more features provides confidence of the detected features. This additional intelligence may itself use neural network training methods. For example, the neural network may be separately trained for predicting a level of light in images under similar settings.

In some embodiments, frame rate or shutter speed may be increased to capture more frames and increase data acquisition speed dynamically and in proportion to a required confidence level, quality, speed of the robot, etc. Similarly, when a feature detector detects more than one usable point, it may prune the less desirable points and only use 1, 2, 3 or a subset of what the points tracked that are more distinguished or useful. For example, FIG. 235 illustrates an example of an image with features 23500 having high confidence and features 23501 having low confidence. The processor of the robot may prune features 23501 with low confidence. In some embodiments, some images from a set of images in an image stream may be pruned depending on factors such as quality, redundancy, and/or combination. For example, when the robot is standing still or moving slowly and all incoming images are substantially similar, the redundant images may be thrown away by the processor. If some images have less of a quality score, the images with lower quality levels may be thrown away and for some other tasks not fully processed. For example, the discarded images may be archived or used for historical analysis and extracting structure from history. If, however, based on displacement or speed, the rate of quality images captured is not high enough, lower quality images and/or features may be used to compensate. Sometimes a CNN may be used to increase resolution of two consecutive images in an image stream by extracting features and creating a correspondence matrix.

FIG. 236 illustrates examples of relations between different subsystems in identifying and tracking objects. FIG. 237 illustrates a sequence of training, testing, training, testing, and so forth . . . with sparse feature techniques. Note that any number of algorithms or techniques may be used in any order. In embodiments, training may be performed until the testing phase meets a validation standard of being able to generalize from examples. Estimating position, posture, shape, color, etc. of an obstacle or object may be a different problem than recognizing what the object type. Various sources of information may help identify each of the above object characteristics, such as information collected by sensors, such as a camera or distance measurement sensor or polarization sensor. A polarization sensor works based on identification of polarized light that is reflected off of the part of the object that is facing the sensor. In some embodiments, polarized imaging may be used by cosine curve fitting on an intensity of light that has arrived at the sensor.

In some embodiments, success in identification of objects is proportional to an angle of the sensor and an angle of the object in relation to one other as they each move within the environment. For example, success in identifying a face by a camera on a robot may have a correlation to an angle of the face relative to the camera when captured. FIG. 238 illustrates a correlation between success in identifying a face and an angle of the face relative to the camera when captured. Image 23800 captured by the camera and the relation 23801 between success in identifying a face and an angle of the face relative to the camera when captured are illustrated. FIG. 239 illustrates the process of densifying and sparsifying data points within a range and when widening or narrowing the data range is needed. When there are too many data points within a range, the processor may sparsify by narrowing the data range and using the best points. When there are few data points within the range, the processor may widen the range use more data points to densify. The processor may dynamically arbitrate whether there are too many or too few data points within the range and decide accordingly.

In order to save computational costs, the processor of the robot does not have to identify a face based on all faces of people on the planet. The processor of the robot or AI system may identify the person based on a set of faces observed in data that belongs to people connected to the person (e.g., family and friends). Social connection data may be available through APIs from social networks. Similarly, the processor of the robot may identify objects based on possible objects available within its environment (e.g., home or supermarket). In one instance, a training session may be provided through an application of a communication device or the web to label some objects around the house. The processor of the robot may identify objects and present them to the user to label or classify them. The user may self-initiate and take pictures of objects or rooms within the house and label them using the application. This, combined with large data sets that are pre-provided from the manufacturer during a training phase makes the task of object recognition computationally affordable.

In some embodiments, the processor may determine a movement path of the robot. In some embodiments, the processor may use at least a portion of the path planning methods and techniques described in U.S. Non-Provisional patent application Ser. Nos. 14/673,633, 15/676,888, 16/558,047, 15/286,911, 16/241,934, 15/449,531, 16/446,574, 17/316,018, 16/041,286, 16/422,234, 15/406,890, 16/796,719, and 16/179,861, each of which is hereby incorporated by reference.

In some embodiments, the robot may avoid damaging the wall and/or furniture by slowing down when approaching the wall and/or objects. In some embodiments, this is accomplished by applying torque in an opposite direction of the motion of the robot. For example, FIG. 240 illustrates a user 24000 operating a vacuum 24001 and approaching wall 24002. The processor of the vacuum 24001 may determine it is closely approaching the wall 24002 based on sensor data and may actuate an increase in torque in an opposite direction to slow down (or apply a break to) the vacuum and prevent the user from colliding with the wall 24002.

In embodiment, a cause may trigger a navigation task. For example, the robot may be sent to take a blood sample or other bio-specimen from a patient according to a schedule decided by AI, a human (e.g., doctor, nurse, etc.), etc. In such events, a task order is issued to the robot. The task may include a coordinate on the floor plan that the robot is to visit. At the coordinate, the robot may either execute the non-navigational portion of the task or wait for human assistance to perform the task. For example, when a laundry robot is called by a patient, the robot may receive the coordinate of the patient, go to the coordinate, wait for the user to put the laundry in a container of the robot, close the container, and prompt the robot to go to another coordinate on the floor plan.

In embodiments, the robot executes a wall-follow path without impacting the wall during execution of the wall-follow. In some embodiments, the processor of the robot uses sensor data to maintain a particular distance between the robot and the wall while executing the wall-follow path. Similarly, in some embodiments, the robot executes obstacle-follow path without impacting the obstacle during execution of the obstacle-follow. In some embodiments, the processor of the robot uses sensor data to maintain a particular distance between the robot and the obstacle surface while executing the obstacle-follow path. For example, TOF data collected by a TOF sensor positioned on a side of the robot may be used by the processor to measure a distance between the robot and the obstacle surface while executing the obstacle-follow path and based on the distance measured, the processor may adjust the path of the robot to maintain a desired distance from the obstacle surface.

In embodiments, the processor of the robot may implement various coverage strategies, methods, and techniques for efficient operation. In addition to the coverage strategies, methods, and techniques described herein, the processor of the robot may, in some embodiments, use at least a portion of the coverage strategies, methods, and techniques described in U.S. Non-Provisional patent application Ser. Nos. 14/817,952, 15/619,449, 16/198,393, and 16/599,169, each of which is hereby incorporated by reference.

In embodiments, the robot may include various coverage functionalities. For example, FIGS. 241A-241C illustrates examples of coverage functionalities of the robot. FIG. 241A illustrates a first coverage functionality including coverage of an area 24100. FIG. 241B illustrates a second coverage functionality including point-to-point and multipoint navigation 24101. FIG. 241C illustrates a third coverage functionality including patrolling 24102, wherein the robot navigates to different areas 24103 of the environment and rotates in each area 24103 for observation.

Traditionally, robots may initially execute a 360 degrees rotation and a wall follow during a first run or subsequent runs prior to performing work to build a map of the environment. However, some embodiments of the robot described herein begin performing work immediately during the first run and subsequent runs. FIGS. 242A and 242B illustrate traditional methods used in prior art, wherein the robot 24200 executes a 360 degrees rotation and a wall follow prior to performing work in a boustrophedon pattern, the entire path plan indicated by 24201. FIGS. 242C and 242D illustrate methods used by the robot described herein, wherein the robot 24200 immediately begins performing work by navigating along path 24202 without an initial 360 degrees rotation or wall follow.

In some embodiments, the robot executes a wall follow. However, the wall follow differs from traditional wall follow methods. In some embodiments, the robot may enter a patrol mode during an initial run and the processor of the robot may build a spatial representation of the environment while visiting perimeters. In traditional methods, the robot executes a wall follow by detecting the wall and maintaining a predetermined distance from a wall using a reactive approach that requires continuous sensor data monitoring for detection of the wall and maintain a particular distance from the wall. In the wall follow method described herein, the robot follows along perimeters in the spatial representation created by the processor of the robot by only using the spatial representation to navigate the path along the perimeters (i.e., without using sensors). This approach reduces the length of the path, and hence the time, required to map the environment. For example, FIG. 243A illustrates a spatial representation 24300 of an environment built by the processor of the robot during patrol mode. FIG. 243B illustrates a wall follow path 24301 of the robot generated by the processor based on the perimeters in the spatial representation 24300. FIG. 244A illustrates an example of a complex environment including obstacles 24400. FIG. 244B illustrates a map of the environment created with less than 15% coverage of the environment when using the techniques described herein. In some embodiments, the robot may execute a wall follow to disinfect walls using a disinfectant spray and/or UV light. In some embodiments, the robot may include at least one vertical pillar of UV light to disinfect surfaces such as walls and shopping isles in stores. In some embodiments, the robot may include wings with UV light aimed towards the driving surface and may drive along isles to disinfect the driving surface. In some embodiments, the robot may include UV light positioned underneath the robot and aimed at the driving surface. In some embodiments, there may be various different wall follow modes depending on the application. For example, there may be a mapping wall follow mode and a disinfecting wall follow mode. In some embodiments, the robot may travel at a slower speed when executing the disinfecting wall follow mode.

Figure 246C:
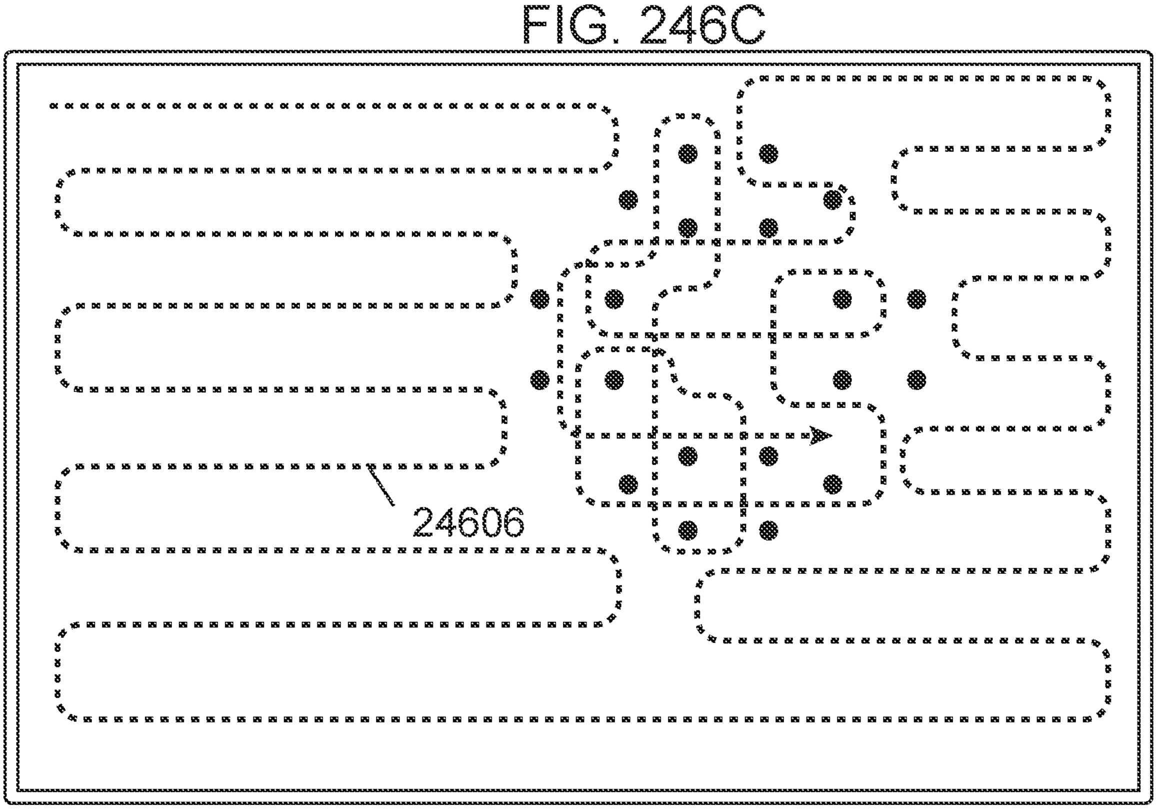
Figure 246D:
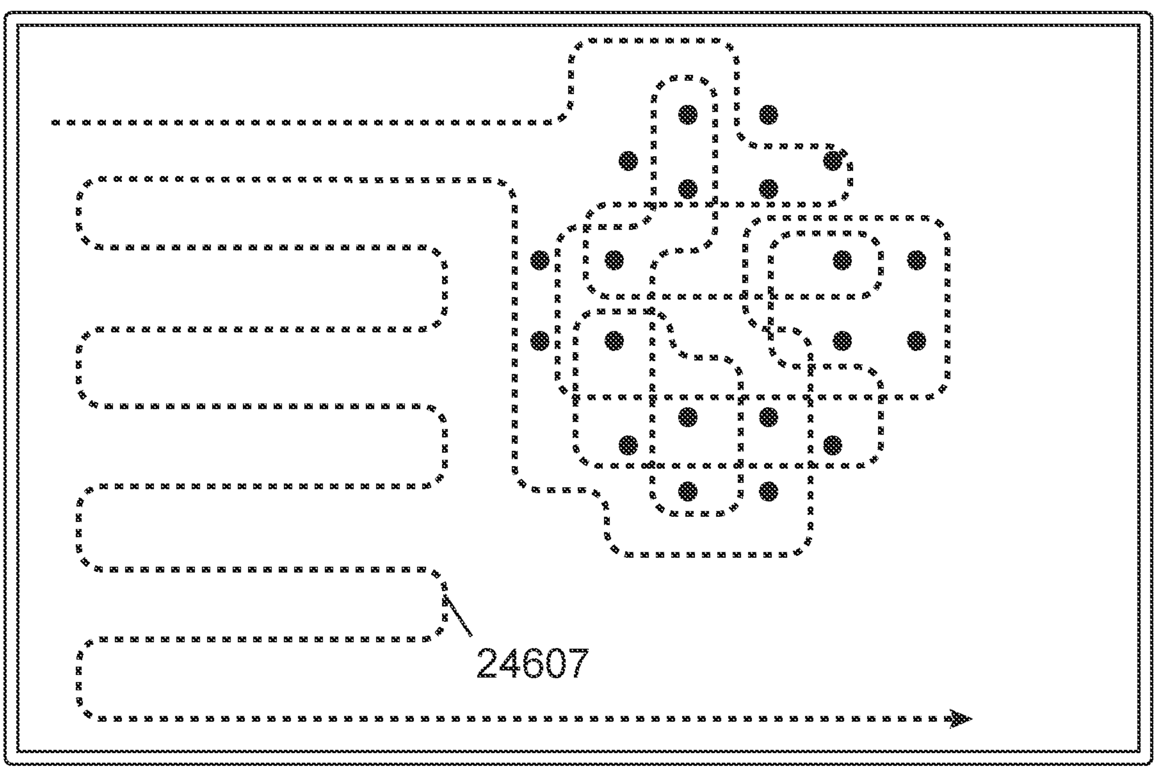
Figure 246E:
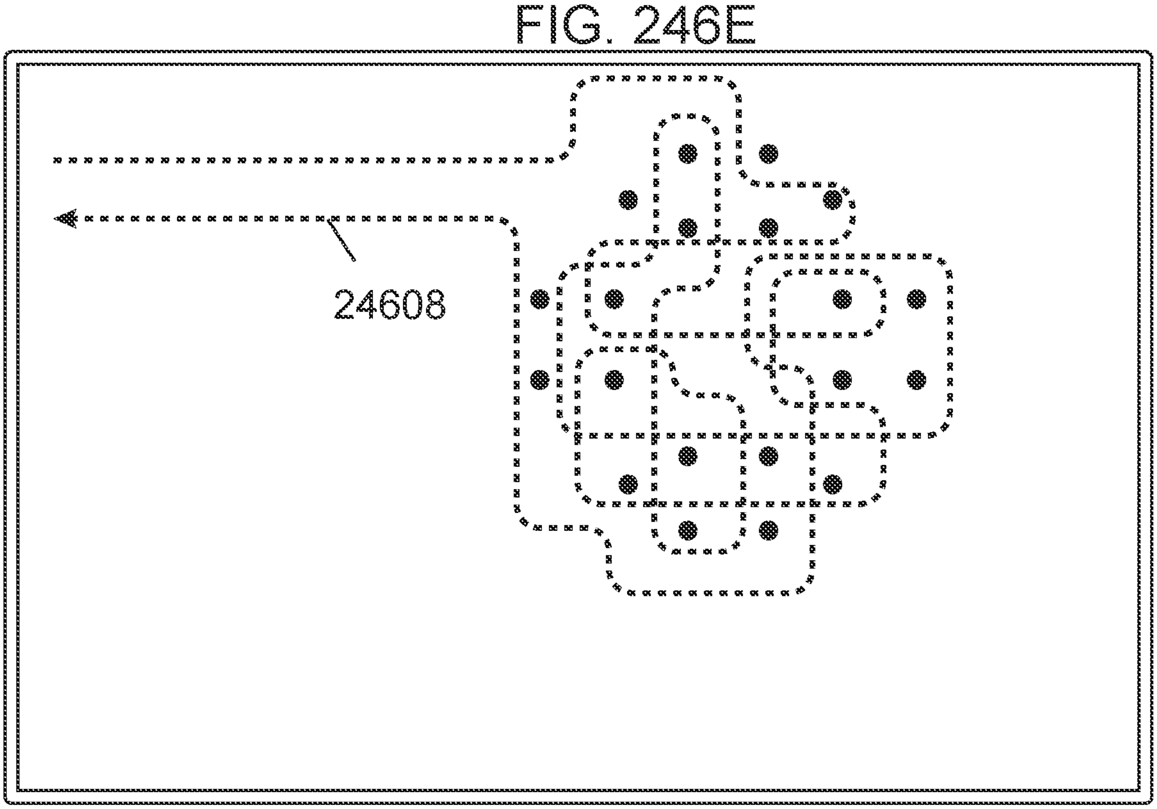
Figure 246F:
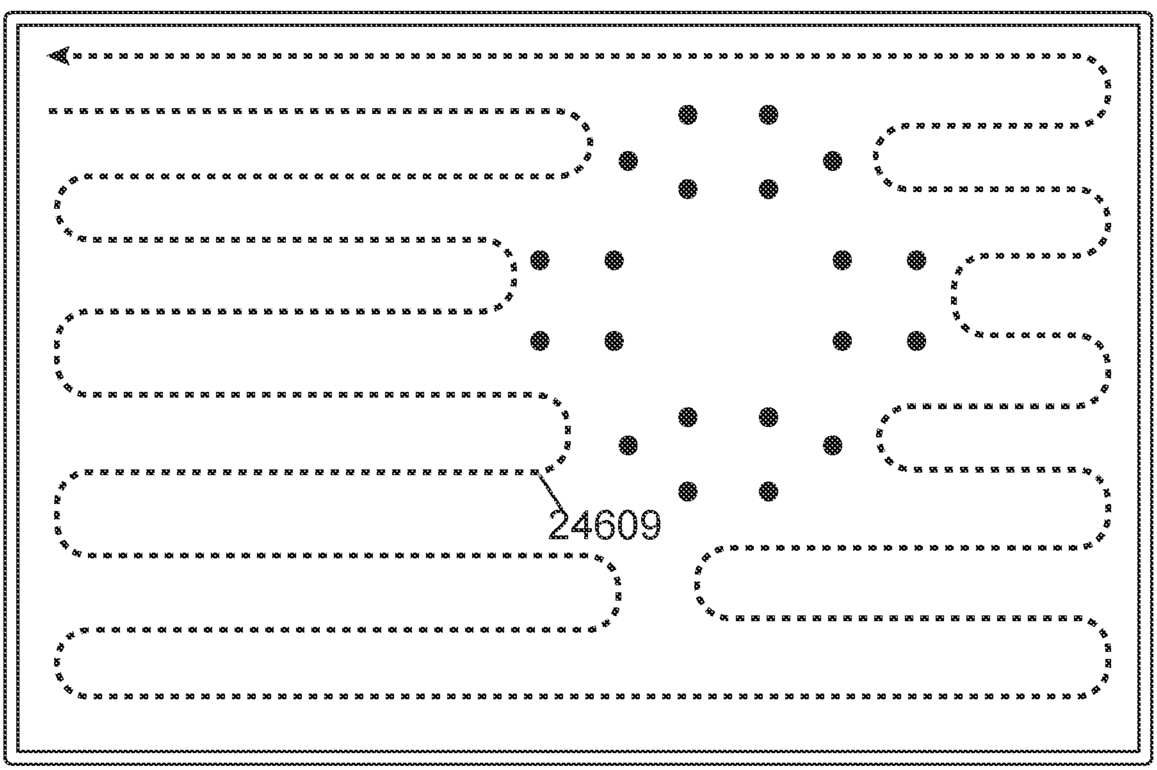

In some embodiments, the robot may initially enter a patrol mode wherein the robot observes the environment and generates a spatial representation of the environment. In some embodiments, the processor of the robot may use a cost function to minimize the length of the path of the robot required to generate the complete spatial representation of the environment. FIG. 245A illustrates an example of a path 24500 of a robot using traditional methods to create a spatial representation of the environment 24501. FIG. 245B illustrates an example of a path 24502 of the robot using a cost function to minimize the length of the path of the robot required to generate the complete spatial representation. The path 24502 is much shorter in length than the path 24500 generated using traditional path planning methods described in prior art. In some cases, path planning methods described in prior art cover open areas and high obstacle density areas simultaneously without distinguishing the two. However, this may result in inefficient coverage as different tactics may be required for covering open areas and high obstacle density areas and the robot may become stuck in the high obstacle density areas, leaving other parts of the environment uncovered. For example, FIG. 246A illustrates an example of an environment including a table 24600 with table legs 24601, four chairs 24602 with chair legs 24603, and a path 24604 generated using traditional path planning methods, wherein the arrowhead indicates a current or end location of the path. The path 24604 covers open areas and high obstacle density areas at the same time. This may result with a large portion of the open areas of the environment uncovered by the time the battery of the robot depletes as covering high obstacle density areas can be time consuming due to all the maneuvers required to move around the obstacles or the robot may become stuck in the high obstacle density areas. In some embodiments, the processor of the robot described herein may identify high obstacle density areas. FIG. 246B illustrates an example of a high obstacle density area 24605 identified by the processor of the robot. In some embodiments, the robot may cover open or low obstacle density areas first then cover high obstacle density areas or vice versa. FIG. 246C illustrates an example of a path 24606 of the robot that covers open or low obstacle density areas first then high obstacle density areas. FIG. 246D illustrates an example of a path 24607 of the robot that covers high obstacle density areas first then open or low obstacle density areas. In some embodiments, the robot may only cover high obstacle density areas. FIG. 246E illustrates an example of a path 24608 of the robot that only covers high obstacle density areas. In some embodiments, the robot may only cover open or low obstacle density areas. FIG. 246F illustrates an example of a path 24609 of the robot that only covers open or low obstacle density areas. FIG. 247A illustrates another example wherein the robot covers the majority of areas 24700 initially, particularly open or low obstacle density areas, leaving high obstacle density areas 24701 uncovered. In FIG. 247B, the robot then executes a wall follow to cover all edges 24702. In FIG. 247C, the robot finally covers high obstacle density areas 24701 (e.g., under tables and chairs). During initial coverage of open or low obstacle density areas, the robot avoids map fences (e.g., fences fencing in high obstacle density areas) but wall follows their perimeter. For example, FIG. 247D illustrates an example of a map including map fences 24703 and a path 24704 of the robot that avoids entering map fences 24703 but wall follows the perimeters of map fences 24703.

In some embodiments, the processor of the robot may determine a next coverage area. In some embodiments, the processor may determine the next coverage based on alignment with one or more walls of a room such that the parallel lines of a boustrophedon path of the robot are aligned with the length of the room, resulting in long parallel lines and a minimum the number of turns. In some embodiments, the size and location of coverage area may change as the next area to be covered is chosen. In some embodiments, the processor may avoid coverage in unknown spaces until they have been mapped and explored. In some embodiments, the robot may alternate between exploration and coverage. In some embodiments, the processor of the robot may first build a global map of a first area (e.g., a bedroom) and cover that first area before moving to a next area to map and cover. In some embodiments, a user may use an application of a communication device paired with the robot to view a next zone for coverage or the path of the robot.

Figure 248A:
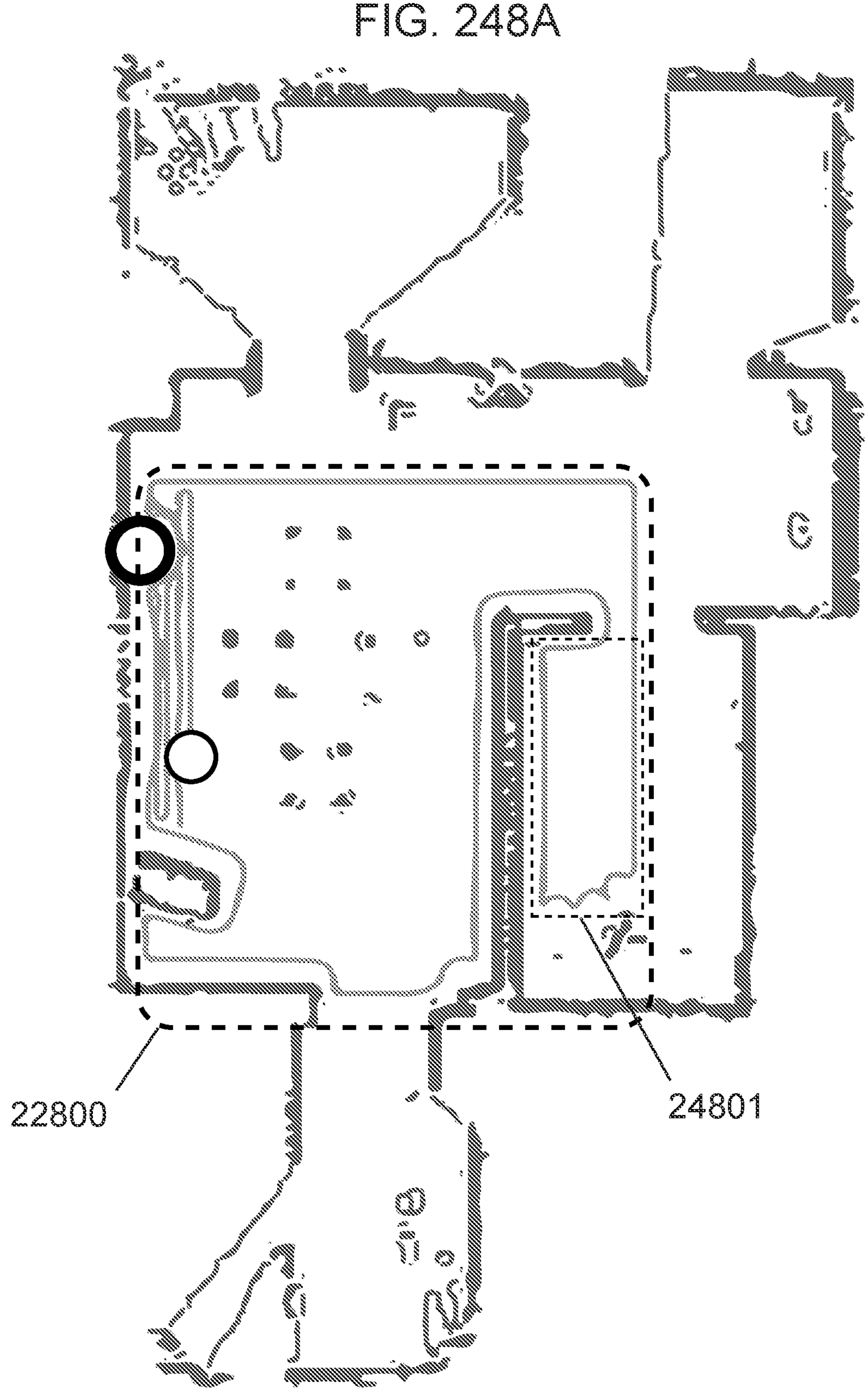
Figure 248D:
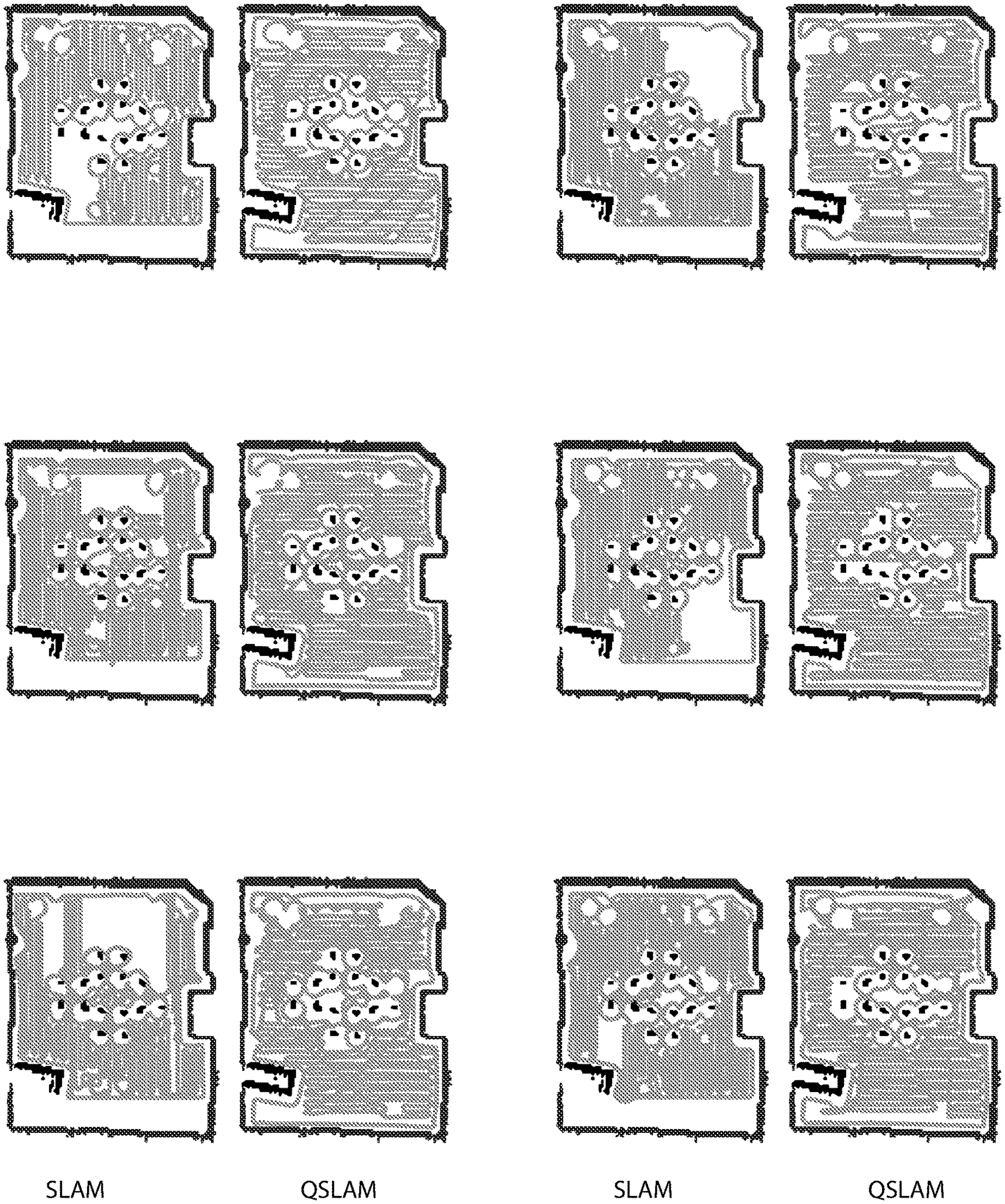

In some embodiments, the processor of the robot uses QSLAM algorithm for navigation and mapping. FIGS. 248A-248E illustrate and explain comparisons between traditional SLAM and QSLAM methods. FIG. 248A illustrates a rigid size box that spills to nearby room 24800 and an area of nearby room 24801. Regular SLAM uses a rigid size box to determine the cleaning area. This box is independent from room shapes and sizes and may cause inefficiencies. FIG. 248B illustrates traditional SLAM wherein a robot 24802 traces a perimeter of the environment along path 24803 before covering the internal area by following path 24804. For example, in FIGS. 248A and 248B, the robot misses a part of the room 24805 due to its rigid wall following and area size needed at the beginning. This result in a cleaning task that is split into two areas 24806 and 24805, shown in FIG. 248C. In comparison, the use of QSLAM results in coverage of the whole area in one take, as shown by path 24807 of the robot. Further, in using QSLAM, the lack wall following at the beginning does not delay the start of coverage. FIG. 248C illustrates at a same time an amount covered by a path 24808 and 24809 of the robot 24802 for SLAM and QSLAM, respectively. By 3.5 minutes, using QSLAM, a good portion of the room is completed. FIG. 248D illustrates comparisons of the two methods in 6 runs which shows QSLAM finishes the job in a less amount of time, wherein darker areas are areas covered by the robot 24802. Since QSLAM does not rely on rigid area determination, it may clean each room correctly before going to the next room. This is illustrated in FIG. 248E wherein with QSLAM the path 24810 of the robot drives less in between different areas, as compared to the path 24811 with SLAM.

In some embodiments, the processor of the robot recognizes rooms and separates them by different colors that may be seen on an application of a communication device, as illustrated in FIG. 249. In some embodiments, the robot cleans an entire room before moving onto a next room. In some embodiments, the robot may use different cleaning strategies depending on the particular area being cleaned. FIG. 250 illustrates a map 25000 including obstacles 25001. The robot may use different strategies based on each zone. For example, a robot vacuum may clean differently in each room. FIG. 250B illustrates different shades in different areas of the map 25000, representing different cleaning strategies. The processor of the robot may load different cleaning strategies depending on the room, zone, floor type, etc. Examples of cleaning strategies may include, for example, mopping for the kitchen, steam cleaning for the toilet, UV sterilization for the baby room, robust coverage under chairs and tables, and regular cleaning for the rest of the house. In UV mode, the robot may drive slow and may spend 30 minutes covering each square foot.

In some embodiments, the robot may adjust settings or skip an area upon sensing the presence of people. The processor of the robot may sense the presence of people in the room and adjust its performance accordingly. In one example, the processor may reduce its noise level or presence around people. This is illustrated in FIGS. 251A and 251B. In FIG. 251A a noise level 25100 of the robot 25101 is high as no people are observed. When the processor of the robot 25101 observes people 25102 in the room it reduces its noise level to 25103. In FIG. 251B, the robot 25101 cleans an area as no people are observed. However, upon observing people 25102, the processor of the robot 25101 reschedules its cleaning time in the room.

Figure 252A:
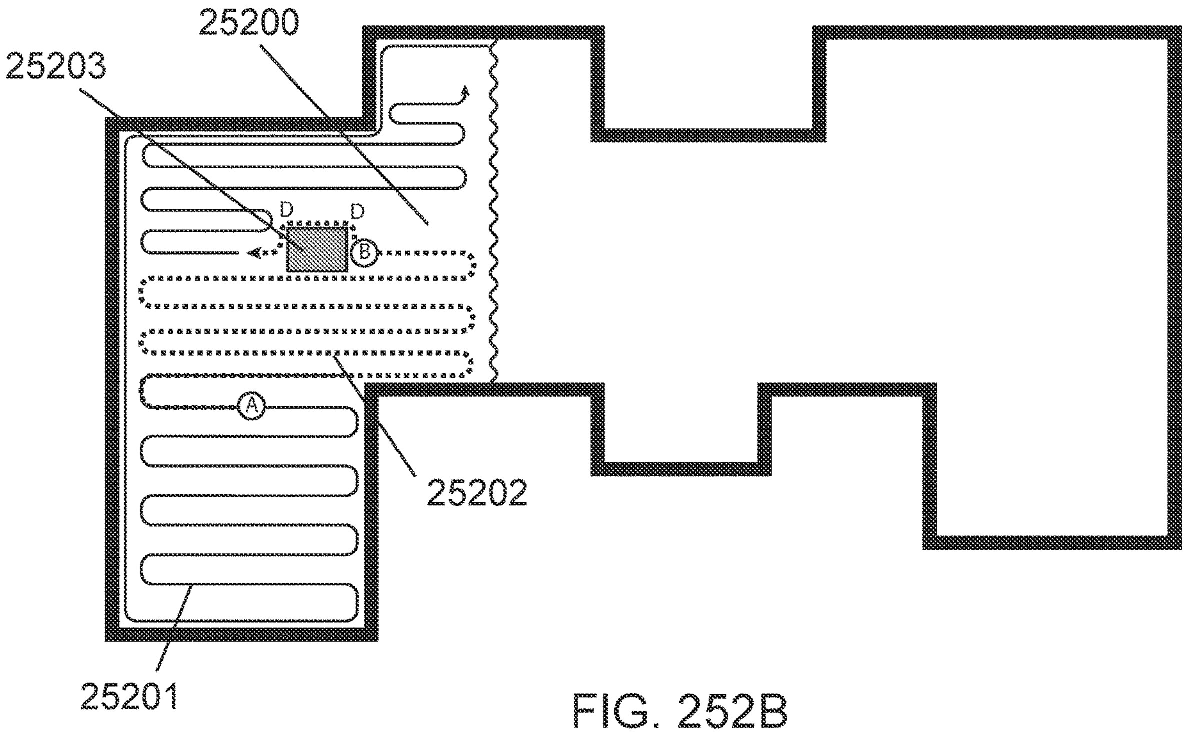
Figure 252B:
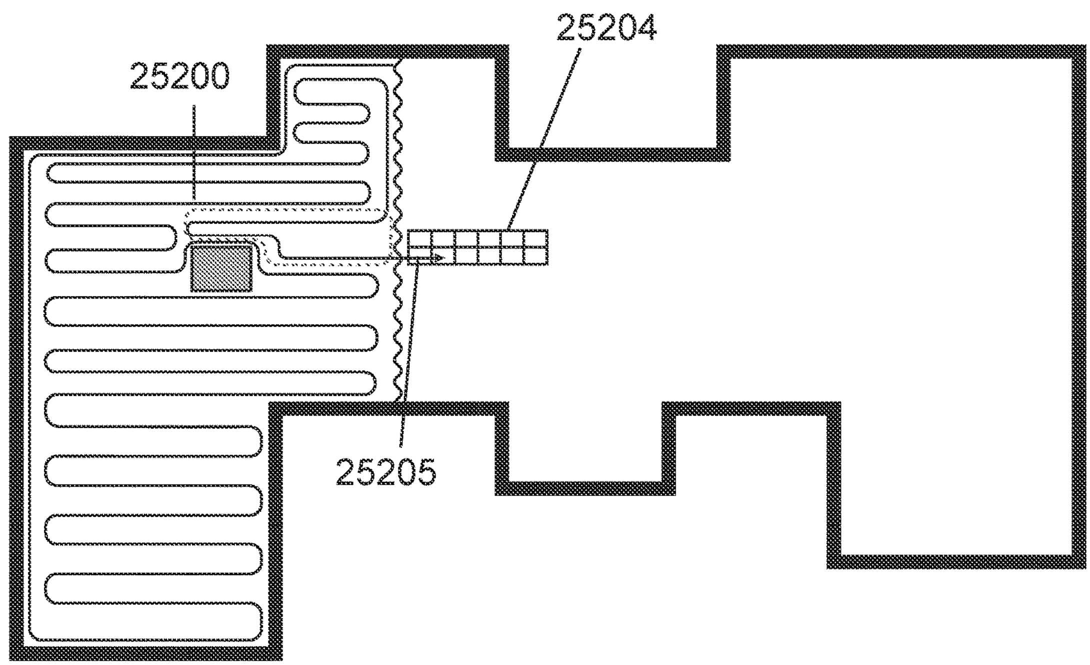
Figure 252C:
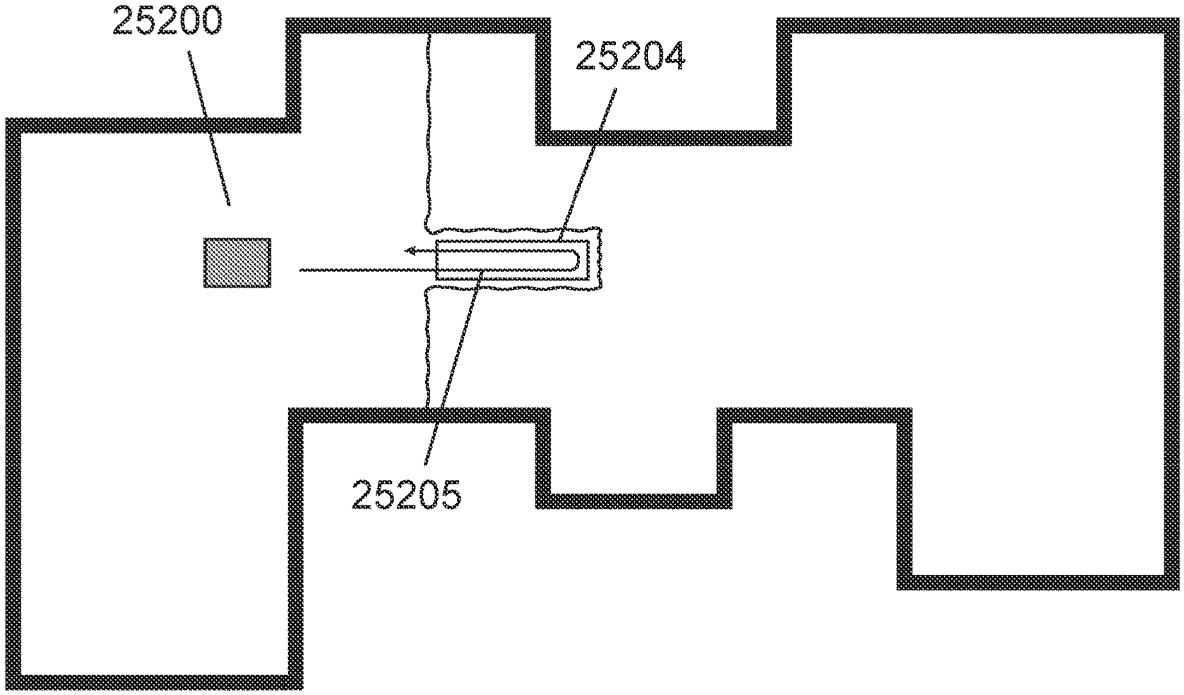
Figure 252D:
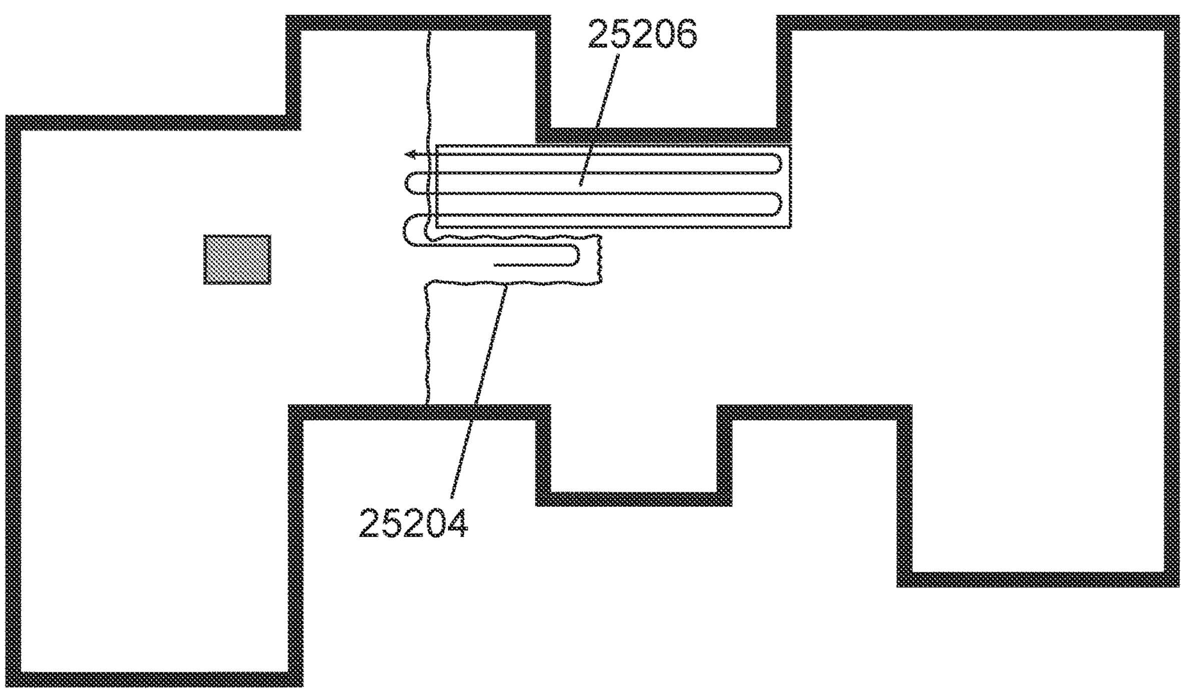
Figure 252H:
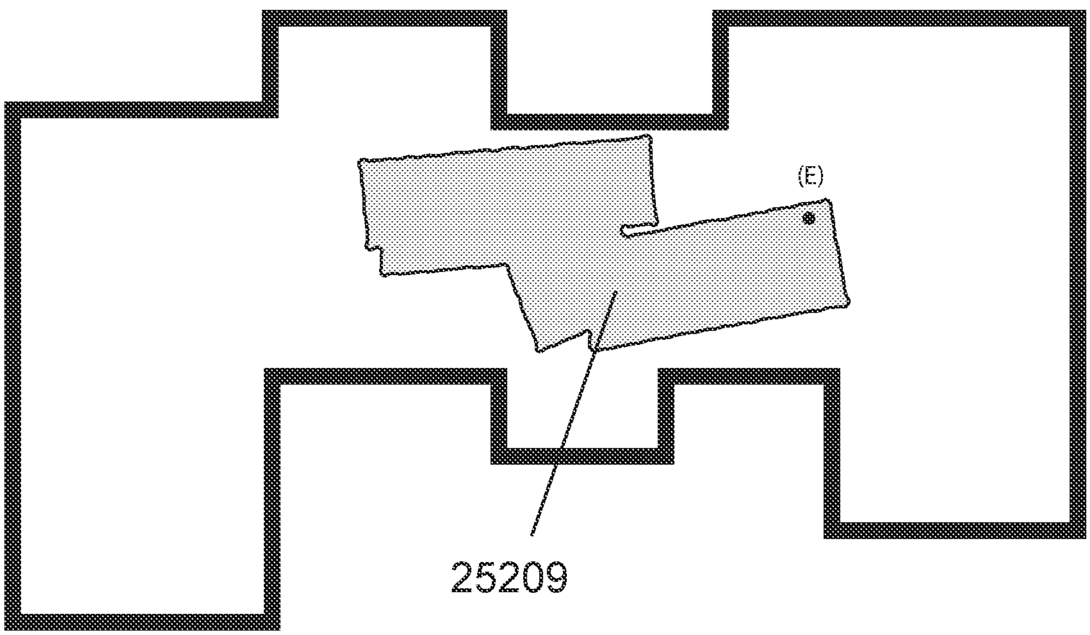

In some embodiments, during coverage sensors of the robot may lose functionality. FIG. 252A illustrates a discovered area 25200 of an environment and path 25201 of the robot within the discovered area of the environment. At point A, a LIDAR or depth sensor of the robot malfunctions. The robot has a partial map and uses it to continue to work in the discovered portion of the map by following path 25202 despite the LIDAR or depth sensor malfunctioning at point A. At point B, the robot faces an obstacle 25203 that the processor has not detected before. The processor adjusts the path 25202 of the robot to take detour D around the object 25203, along its perimeter, attempting to get back on its previous path. It uses other sensory information to maintain proper angle information to get back on track. After passing the object 25203 the robot continues to operate in the discovered area using the partial map. In FIG. 252B, after the robot covers the previously discovered part 25200 of the work space and any missed areas, the robot attempts to explore new areas and extends the map as it covers the new areas. The processor of the robot first plans a path in a new area 25204 with a length L and a width W and the robot moves along the path. When the coverage path 25205 in new area 25204, shown in FIG. 252C, is successfully completed, the processor adds the new area 25204 to the map and expands the path plan a bit more in the neighboring areas of the newly covered area 25204. FIG. 252D illustrates the processor continuing to plan a path in a larger area 25206 as compared to area 25204 as the robot did not encounter any obstacles in covering area 25204. However, dad the robot bumped into an obstacle in covering new area 25204, as illustrated in FIG. 252E, the processor would only add the area covered up to the location in which the collision occurred. FIG. 252F illustrates other areas A, B, C, D planned and covered as the robot traverses the environment. FIG. 252G illustrates areas 25208 that the robot actually covered when covering areas A, B, C, D due to malfunction of LIDAR or camera. When the camera is covered the processor of the robot thinks it covered areas A-D but when the camera is uncovered based on new relocalization, the processor infers that it has probably covered only areas 25208 so when it wants to plan route, it discounts its previous understanding of covered areas to a new hypothesis of covered areas based on where the robot is localized. At any time, if the LIDAR or camera is uncovered or some light is detected to allow the camera to observe the environment, the processor adds the new information to the map. FIG. 252H illustrates the combined area 25209 that the robot actually covered while it was blind.

In some embodiments, existence of an open space is hypothesized for some grid size, a path is planned within that hypothesized grid space, from the original point, grids are covered moving along the path planned within the hypothesized space, and either the hypothesized space is available and empty in which coverage is continued until all grids in the hypothesized space are covered or the space is not available and the robot faces an obstacle. In facing an obstacle, the robot may turn and go back in an opposite direction, the robot may drive along the perimeter of the obstacle, or may choose between the two options based on its local sensors. The robot may first turns 90 degrees and the processor may make a decision based on the new incoming sensor information. As the robot navigates within the environment, the processor creates a map based on confirmed spaces. The robot may follow the perimeters of the obstacles it encounters and other geometries to find and cover spaces that may have possibly been missed. When finished coverage, the robot may go back to the starting point. This process is illustrated in the flow chart of FIG. 253.

In some embodiments, the robot autonomously empties its bin based on any of an amount of surface area covered since a last time the bin was emptied, an amount of runtime since a last time the bin was emptied, the amount of overlap in coverage (i.e., a distance between parallel lines in the boustrophedon movement path of the robot), a volume or weight of refuse collected in the bin (based on sensor data), etc. In some embodiments, the user may choose when the robot is to empty its bin using the application. For instance, FIGS. 254A and 254B illustrate sliders that may be displayed by the application and adjusted by the user to determine at which amount of surface area or runtime, respectively, since a last time the bin was emptied the robot should empty its bin.

In some embodiments, the user may choose an order of coverage of rooms using the application or by voice command. In some embodiments, the processor may determine which areas to clean or a cleaning path of the robot based on an amount of currently and/or historically sensed dust and debris. For example, FIG. 255A illustrates a path 25500 of the robot, debris 25501 and a distance w between parallel coverage lines of the path 25500. Upon sensing debris 25501 in real time, the processor of the robot adjusts its path 25500 such that the distance between parallel lines of the path 25500 are reduced to w/2, thereby resulting in an increased overlap in coverage by the robot in the area in which debris is sensed. FIG. 255B illustrates a similar example, wherein the processor adjusts the path of the robot for increased coverage in the area in which debris 25501 is sensed by reducing distance between parallel lines to w/2. The processor continues the previously planned path 25500 with distance w in between parallel lines upon detecting a decrease in debris 25500 at location 25502. In FIG. 255C, a similar adjustment to the path 25500 is illustrated, however, the amount of overlap in coverage is increased further to w/4 as the amount of debris sensed is increased. In some embodiments, the processor determines an amount of overlap in coverage based on an amount of debris accumulation sensed.

In some embodiments, the processor of the robot detects rooms in real time. In some embodiments, the processor predicts a room within which the robot is in based on a comparison between real time data collected and map data. For example, the processor may detect a particular room upon identifying a particular feature known to be present within the particular room. In some embodiments, the processor of the robot uses room detection to perform work in one room at a time. In some embodiments, the processor determines a logical segmentation of rooms based on any of sensor data and user input received by the application designating rooms in the map. In some embodiments, rooms segmented by the processor or the user using the application are different shapes and sizes and are not limited to being a rectangular shape.

In some embodiments, the robot performs robust coverage in high object density areas, such as under a table as the chair legs and table legs create a high object density area. FIG. 256 illustrates an example of a map including open area 25600 and high object density area 25601. In some embodiments, the robot may cover all open and low object density areas first and then cover high object density areas at the end of a work session. In some embodiments, the robot circles around a high object density area and covers the area at the end of a work session. In some embodiments, the processor of the robot identifies a high object density area, particularly an area including chair legs and/or table legs. In some embodiments, the robot cleans the high object density area after a meal. In some embodiments, the robot skips coverage of the high object density area unless a meal occurs. In some embodiments, a user sets a coverage schedule for high object density areas and/or open or low object density areas using the application of the communication device paired with the robot. For example, the user uses the application to schedule coverage of a high object density area on Fridays at 7:00 PM. In some embodiments, different high object density areas have different schedules. For instance, a first high object density area in which a kitchen table and chairs used on a daily basis are disposed and a second high object density area in which a formal dining table and chairs used on a bi-weekly basis are disposed have different cleaning schedules. The user may schedule daily cleaning of the first high object density area at the end of the day at 8:00 PM and bi-weekly cleaning of the second high object density area.

Figure 257A:
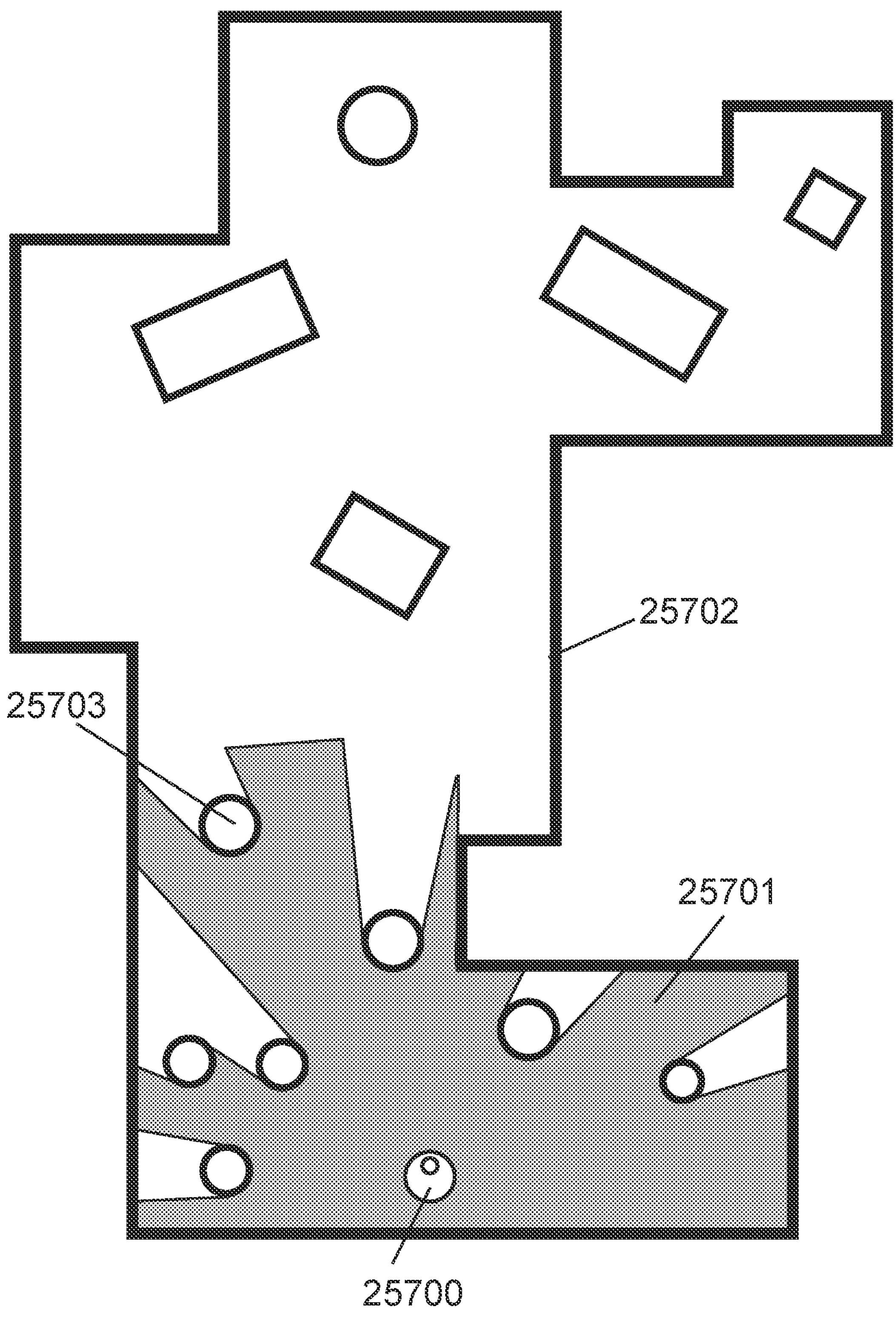
Figure 257B:
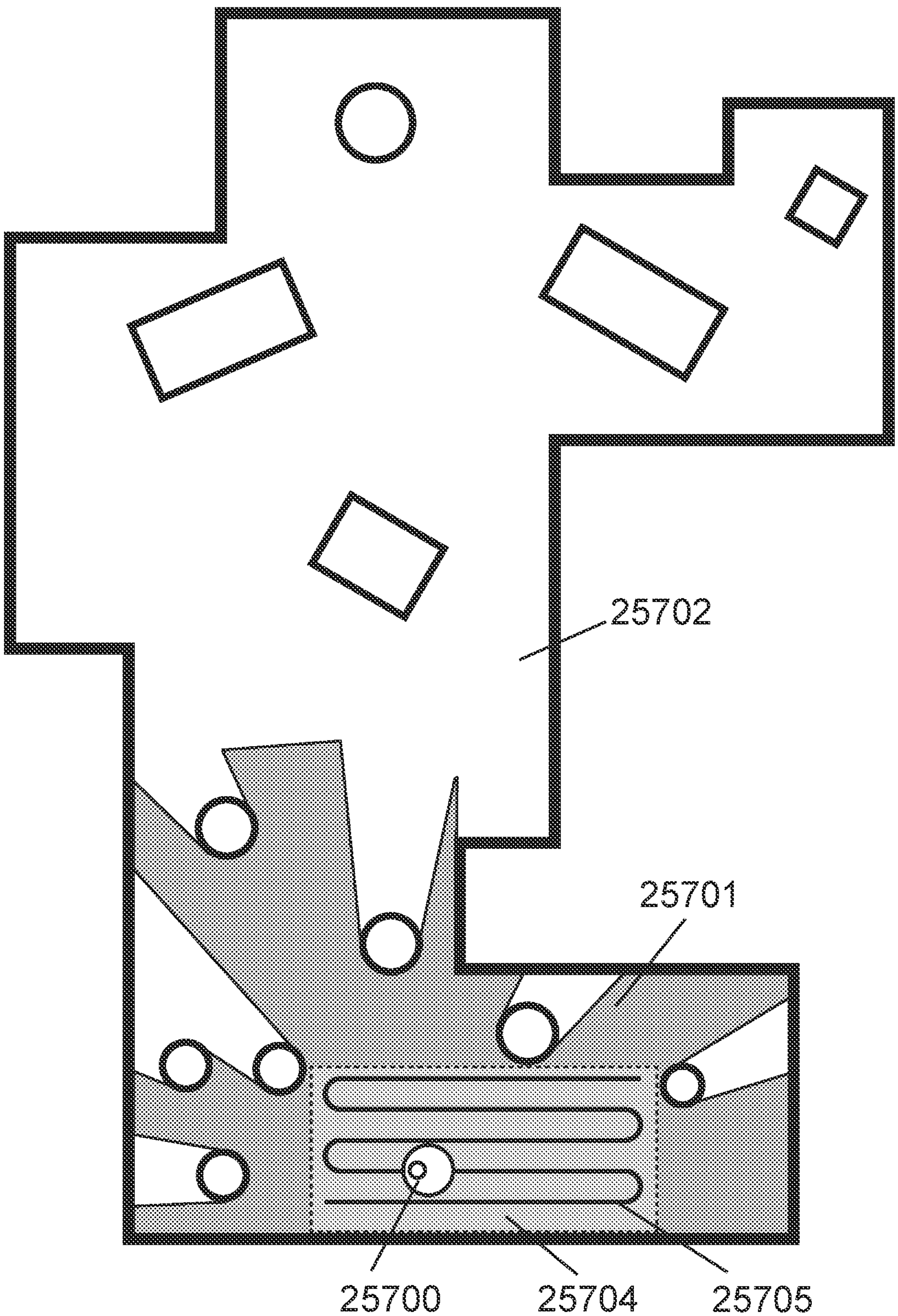
Figure 257C:
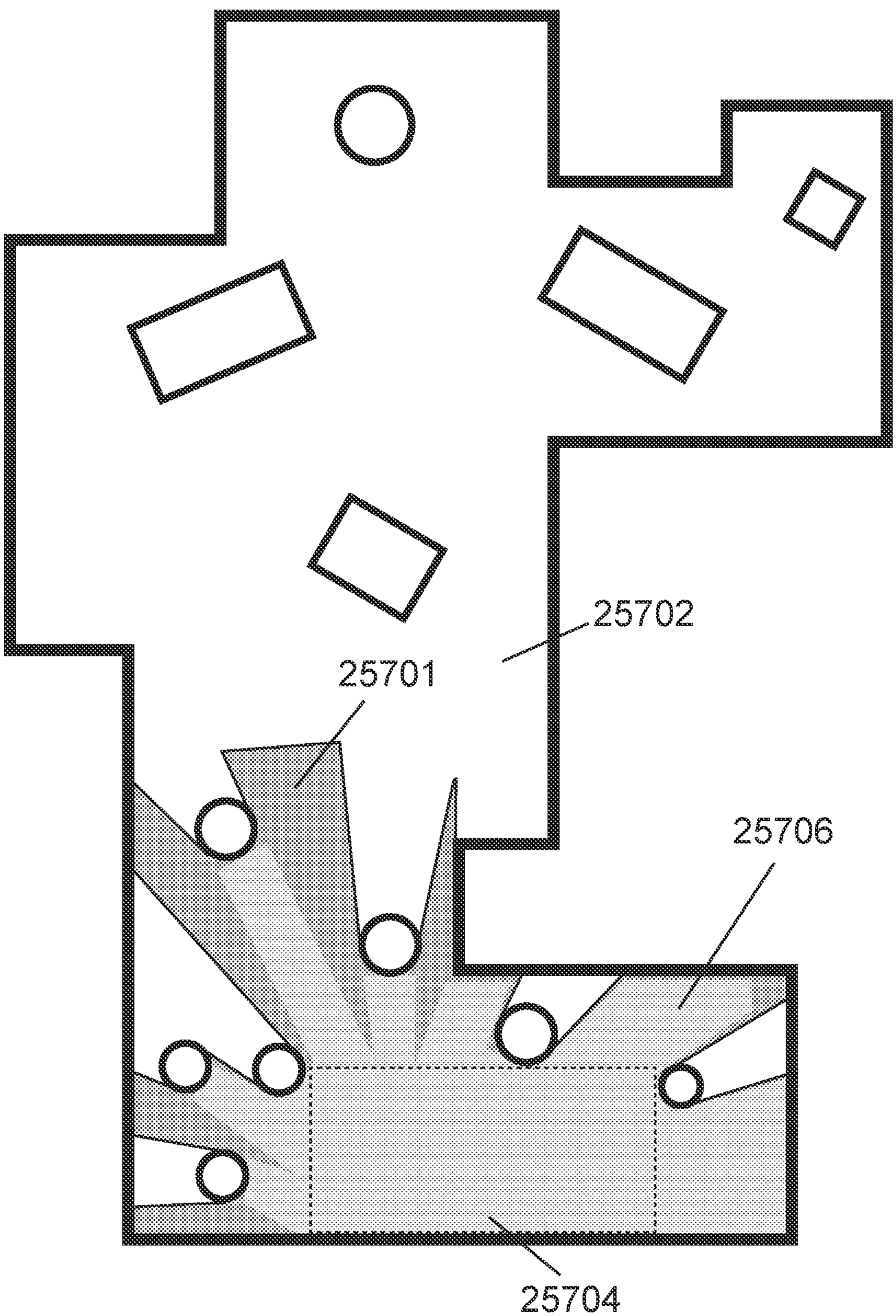
Figure 257D:
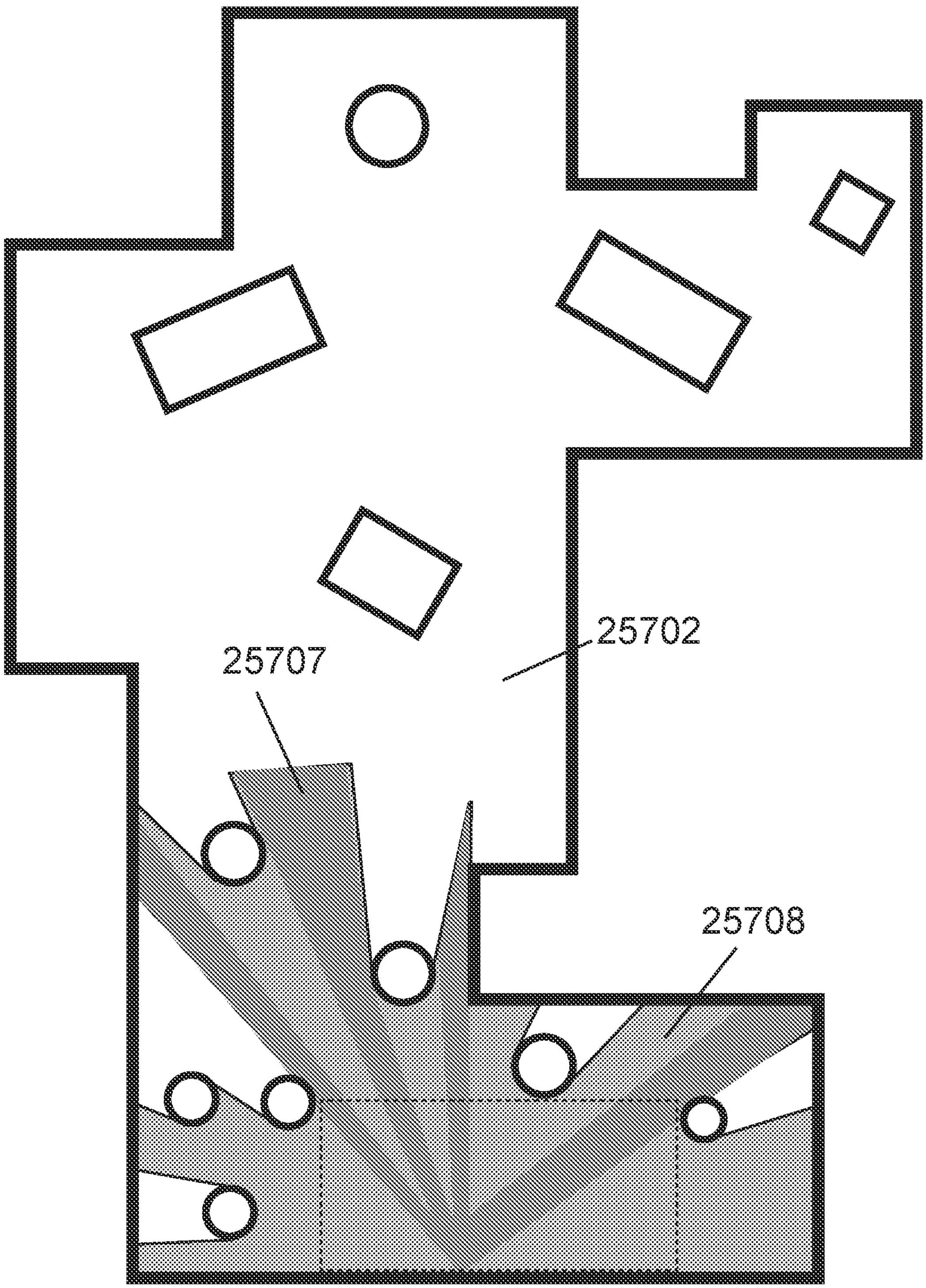
Figure 257E:
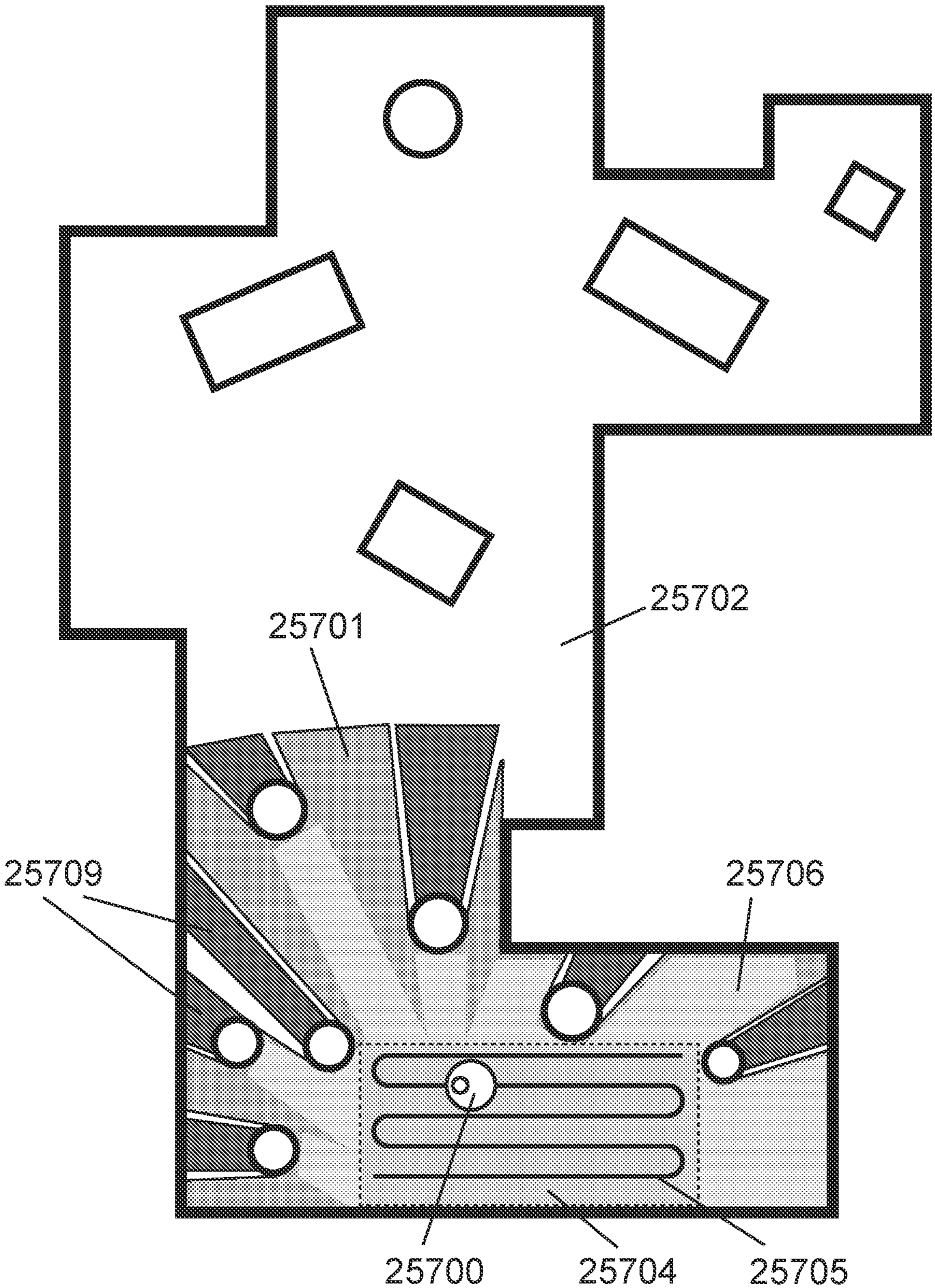

In some embodiments, the robot immediately starts cleans after turning on. FIG. 257A illustrates an example of a robot 25700 at the beginning of cleaning. Initially the robot observes area 25701 of the environment 25702 including obstacles 25703. In some embodiments, the processor determines the available area to clean based on the initial information observed by the sensors of the robot. For example, FIG. 257B illustrates area 25704 that the processor of the robot 25700 identifies as available area to clean based on initial information. The robot 25700 begins cleaning within area 25704 by following along movement path 25705. The processor has high confidence in the sensor observations defining area 25704. In fact, the processor determines the available area to clean based on the sensor observations having high confidence. FIG. 257C illustrates area 25701 initially observed by the robot, area 25706 characterized by sensor data with high confidence, and area 25704 within which the robot initially cleans. This may be an efficient strategy as opposed to initially attempting to clean areas based on sensor observations having low confidence. In such cases, sensor observations having low confidence, such as areas 25707 in FIG. 257D, are interweaved with sensor observations having high confidence, such as areas 25708, shedding doubt on the general confidence of observations. In some embodiments, the processor discovers more areas of the environment as the robot cleans and collects sensor data. Some areas, however, may remain as blind spots. These may be discovered at a later time point as the robot covers more discovered areas of the environment. For example, FIG. 257E illustrates area 25701 initially observed by the robot 25700, area 25706 characterized by sensor data with high confidence, area 25704 within which the robot initially cleans, and blind spots 25709. In embodiments, the processor of the robot builds the complete map of the environment using sensor data while the robot concurrently cleans. By discovering areas of the environment as the robot cleans, the robot is able to being performing work immediately, as opposed to driving around the environment prior to beginning work. For example, FIG. 258 illustrates an example of prior art, wherein a robot 25800 initially observes area 25801 within environment 25802 and begins by first rotating 360 degrees and then executing a wall follow path 25803 prior to beginning any work. In some embodiments, the application of the communication device paired with the robot displays the map as it is being built by the processor of the robot. In some embodiments, the processor improves the map after a work session such that at a next work session the coverage plan of the robot is more efficient than the prior coverage plan executed. For instance, the processor of the robot may create areas in real time during a first work session. After the first work session, the processor may combine some of the areas discovered, to allow for an improved coverage plan of the environment. FIG. 259A illustrates an example of an area 25900 within environment 25901 discovered by the processor of a robot 25902 before beginning any work in a first work session. FIG. 259B illustrates areas 25903 discovered by the processor using sensor data during the first work session. After the work session, the processor may combine the sensor data characterizing areas 25903 to improve the determined coverage plan of the environment 25901, as illustrated in FIG. 259C. FIG. 260 illustrates another example of prior art, wherein a robot begins by executing a wall follow path 26000 prior to beginning any work in environment 26001. In contrast, FIG. 261A illustrates a coverage path 26100 of a robot in environment 26101 during a first work session when using Q-SLAM methods, wherein the robot begins performing work immediately. In embodiments, the processor of the robot improves the map and consequently the coverage path in successive work sessions. FIG. 261B illustrates an improved coverage path 26102 of the robot during a second work session after improving the map after the first work session. A close-up portion of the coverage path 26100 in the first work session and the coverage path 26102 in the second work session are shown in FIG. 261C.

In some embodiments, the processor of the robot identifies a room. In some embodiments, the processor identifies rooms in real time during a first work session. For instances, during the first work session the robot may enter a second room after mapping a first room and as soon as the robot enters the second room, the processor may know the second room is not the same room as the first room. The processor of the robot may then identify the first room if the robot so happens to enter the first room again during the first work session. After discovering each room, the processor of the robot can identify each room during the same work session or future work sessions. In some embodiments, the processor of the robot combines smaller areas into rooms after a first work session to improve coverage in a next work session. In some embodiments, the robot cleans each room before going to a next room. In embodiments, the Q-SLAM algorithm executed by the processor is used with 90 degrees field of view (FOV).

In some embodiments, the processor determines when to discover new areas and when to perform work within areas that have already been discovered. The right balance of discovering new areas and performing work within areas already discovered may vary depending on the application. In some embodiments, the processor uses deep reinforcement learning algorithms to learn the right balance between discovery and performing with in discovered areas. For instance, FIG. 262A illustrates a visualization of reinforcement learning including an input layer 26200 of a reinforcement learning network that receives input, hidden layers 26201, and an output layer 26202 that provides an output. Based on the output, the processor actuates the robot to perform an action. Based on the observed outcome of the action, the processor assigns a reward. This information is provided back to the network such that the network may readjust and learn from the actions of the robot. In embodiments, the reward assigned may be a vector in a three-dimensional matrix structure, wherein each dimension is itself a vector. For example, FIG. 262B illustrates a three-dimensional matrix structure. At a particular time point 26203 (a slice of the matrix), for instance, the map may be a vector, localization may be a vector, and the reward may be a vector. In some embodiments, the processor may use various methods for reinforcement learning such as Markov decision, value iteration, temporal difference learning, Q-learning, and deep Q-learning.

In some embodiments, some peripherals or sensors may require calibration before information collected by the sensors is usable by the processor. For example, traditionally, robots may be calibrated on the assembly line. However, the calibration process is time consuming and slows production, adding costs to production. Additionally, some environmental parameters of the environment within which the peripherals or sensors are calibrated may impact the readings of the sensors when operating in other surroundings. For example, a pressure sensor may experience different atmospheric pressure levels depending on its proximity to the ocean or a mountain. Some embodiments may include a method to self-calibrate sensors. For instance, some embodiments may self-calibrate the gyroscope and wheel encoder.

In some embodiments, the robot may use a LIDAR (e.g., 360 degrees LIDAR) to measure distances to objects along a two dimensional plane. For example, FIG. 263A illustrates a robot 26300 using a LIDAR to measure distances to objects within environment 26301 along a 360 degrees plane 26302. FIG. 263B illustrates the LIDAR 26303 and the 360 degrees plane 26302 along which distances to objects are measured. FIG. 263C illustrates a front view of the robot 26300 when measuring distances to objects in FIG. 263A, the line 26304 representing the distances to objects measured along the 360 degrees plane 26302. In some embodiments, the robot may use a two-and-a-half dimensional LIDAR. For example, the two-and-a-half dimensional LIDAR may measure distances along multiple planes at different heights corresponding with the total height of illumination provided by the LIDAR. FIGS. 264A and 264B illustrate examples of the field of views (FOV) 26400 and 26401 of two-and-a-half dimensional LIDARS 26402 and 26403, respectively. LIDAR 26402 has a 360 degrees field of view 26400 while LIDAR 26403 has a more limited FOV 26401, however, both FOVs 26400 and 26401 extend over a height 26404. FIG. 265A illustrates a front view of a robot while measuring distances using a LIDAR. Areas 26500 within solid lines are the areas falling within the FOV of the LIDAR. FIG. 265B illustrates the robot 26501 measuring distances 26502 to objects within environment 26503 using a two-and-a-half dimensional LIDAR. Areas 26500 within solid lines are the areas falling within the FOV of the LIDAR.

In some embodiments, the robot comprises a LIDAR. In some embodiments, the LIDAR is encased in a housing. In some embodiments, the LIDAR housing includes a bumper to protect the LIDAR from damage. In some embodiments, the bumper operates in a similar manner as the bumper of the robot. In some embodiments, the LIDAR housing includes an IR sensor. In some embodiments, the robot may include internal obstacles within the chassis and sensors, such as a LIDAR, may therefore have blind spots within which observations of the environment are not captured. This is illustrated in FIGS. 266A and 266B, wherein internal obstacles 26600 cause bling spots 26601 for the LIDAR 26602 robot 26603. In some embodiments, the LIDAR of the robot may be positioned on a top surface of the robot and a LIDAR cover to protect the LIDAR. The LIDAR cover may function similar to a bumper of the robot. The LIDAR cover is illustrated in FIGS. 267A-267H. In some cases, the LIDAR may be positioned within a front portion of the robot adjacent to the bumper. The bumper may include an opening through which the LIDAR observes the environment. In FIGS. 268A and 268B, a LIDAR 26800 is position in a front portion of the robot 26801 adjacent to the bumper 26802 and can see through opening 26804. The bumper may include an opening through which the LIDAR observes the environment. In this method, the LIDAR field of view is reduced (e.g., between 180 to 270 degrees, as illustrated by LIDAR FOV 26805 in FIG. 268B, depending on the placement and shape of the robot), which works with QSLAM.

In case of the LIDAR being covered (i.e., not available), the processor of the robot may use gyroscope data to continue mapping and covering hard surfaces since a gyroscope performs better on hard surfaces. The processor may switch to OTS (optical track sensor) for carpeted areas since OTS performance and accuracy is better in those areas. For example, FIG. 269 illustrates mapped area using LIDAR 26900, coverage 26901 on hard surface 26902 by the robot using only gyroscope sensor, coverage 26903 on carpet 26904 by the robot using OTS sensor. Furthermore, the processor of the robot may use the data from both sensors but with different weights. In hard surface areas, the processor may use the gyroscope readings with more weight and OTS readings with less weight and for carpet areas it may use the gyroscope readings with less weight and OTS readings with more weight. For example, FIG. 270 illustrates mapped area using LIDAR 27000, coverage 27001 on hard surface 27002 by the robot using gyroscope and OTS sensor with gyroscope data having higher weight, and coverage 27003 on carpet 27004 by the robot using gyroscope and OTS sensor with OTS data having higher weight. All of these are applicable for robots without LIDAR as well. Meaning the processor of the robot may use gyroscope and OTS sensors for mapping and covering the environment. For example, FIG. 27100 illustrates coverage 27100 on hard surface 27101 by the robot using gyroscope and OTS sensor with gyroscope data having higher weight, and coverage 27102 on carpet 27103 by the robot using gyroscope and OTS sensor with OTS data having higher weight.

In this case, after identifying and covering the hypothesized areas, the robot may perform wall follow to close the map. In a simple square room the initial covering may be sufficient since the processor may build the map by taking the covered areas into consideration, but in more complicated plans, the wall follow may help with identifying doors and openings to the other areas which need to be covered. For example, FIG. 272 illustrates a simple square room 27200 wherein initial coverage 27201 is sufficient. However, for a more complex environment 27202, coverage 27203 along a perimeter of the environment is useful in detecting missed areas, such as areas 27204. In some embodiments, the processor of the robot may use visual cues to identify each room and avoid repeating the covered areas. For example, FIG. 273 illustrates visual cues 27300 that may be used by the processor of the robot to identify each room. At this instant, a camera of the robot captures image 27301 comprising a television 27302 that the processor may use in identifying the room the robot is within. The processor may determine it has recognized this room before and it has been covered. Also, using the camera, the processor may incorporate optical flow to localize the robot and drive along the walls and have a more accurate coverage. This is illustrated in FIG. 274 by arrows 27400 in the image 27401 captured from a current location of the robot in the map 27402. Where blind coverage occurs, increase entropy is observed over time. The increase of entropy over time is shown in FIG. 275. This is to increase chances of finding nooks and corners that remain hidden with following an algorithm that does not have depth visibility (e.g., due to LIDAR and/or camera malfunctioning or unavailable).

In some embodiments, the processor may couple LIDAR or camera measurements with IMU, OTS, etc. data. This may be especially useful when the robot has a limited FOV with a LIDAR. For example, the robot may have a 234 degrees FOV with LIDAR. A camera with a FOV facing the ceiling, the front, the back or both front and back may be used to measure angular displacement of the robot through optical flow. FIG. 276 illustrates an example of a robot 27600 with a camera with a frontal field of view 27601, a rear and upwards field of view 27602 and a front and upwards field of view 27603. For example, if the robot gets stuck on cables and the odometer illustrates movement of the wheels but the robot is not moving the image of the ceiling appears the same or similar at two consecutive timestamps. However, if the robot is kidnapped and displaced for two meters, the translation matrix between the two images from the ceiling shows the displacement. 277 illustrates a first image 27700 of the ceiling at a first time step with a lamp 27701 at a first position $x_1$. In a second image 27702 of the ceiling at second time step, the lamp 27701 is at a position $x_2$. In some embodiments, the processor superimposes images 27700 and 27702 and determines a displacement 27703 of the lamp 27701. In some embodiments, the displacement 27703 of the lamp 27701 is the displacement of the robot on which the camera is positioned. This is especially helpful where the FOV is limited and not 360 degrees. With 360 degrees FOV, the robot may easily measure distances and its relation to features behind the robot to localize. However, where there are limitations in FOV of LIDAR or a structured light depth camera, using an image sensor may be helpful. FIG. 278 illustrates a robot 27800 includes a LIDAR with a limited FOV 27801. The LIDAR positioned in a front portion of the robot 27800 may capture a more dense set of readings, depending on its angular resolution (e.g., 1, 0.7, 0.4, or 0.4 degrees in between each reading). The robot 27800 also includes a camera 27802. The processor of the robot may use data collected by the camera to track a location of features, such as the light fixture 27803, corner 27804, and edge 27805. In some embodiments, the camera 27802 may be slightly recessed and angled rearward. In some embodiments, the processor uses the location of features to localize the robot. This way the processor of the robot may observe behind the path the robot takes with the camera and sparsely tracks objects and/or uses optical flow information and its LIDAR (or structured light depth sensor) in the front to capture a more dense set of readings with high angular resolution. The processor may determine and track distances to corners, light spots, edges, etc. The processor may also track optical flow, structure from motion, pixel entropy in different zones, and how pixel groups or edges, objects, blobs move up and down in the image or video stream. In yet another embodiment, the angle of the camera is tilted to the side to capture a portion of the LIDAR illuminations by the camera. The FOV of the camera has some overlap with LIDAR. FIG. 279 illustrates an example of a robot 27900 including a LIDAR with a FOV 27901 and a camera with a FOV 27902. In this example, a portion of the FOVs of the LIDAR and the camera overlap. In another embodiment, the camera is facing forward to observe obstacles that the LIDAR cannot observe. The LIDAR may be 2D or 3D but may still miss some obstacles that the camera may capture.

In some embodiments, the MCU of the robot (e.g., ARM Cortex M7 MCU, model SAM70) may provide an onboard camera controller. In some embodiments, the onboard camera controller may receive data from the environment and may send the data to the MCU, an additional CPU/MCU, or to the cloud for processing. In some embodiments, the camera controller may be coupled with a laser pointer that emits a structured light pattern onto surfaces of objects within the environment. In some embodiments, that the camera may use the structured light pattern to create a three dimensional model of the objects. In some embodiments, the structured light pattern may be emitted onto a face of a person, the camera may capture an image of the structured light pattern projected onto the face, and the processor may identify the face of the person more accurately than when using an image without the structured light pattern. In some embodiments, frames captured by the camera may be time-multiplexed to serve the purpose of a camera and depth camera in a single device. In some embodiments, several components may exist separately, such as an image sensor, imaging module, depth module, depth sensor, etc. and data from the different the components may be combined in an appropriate data structure. For example, the processor of the robot may transmit image or video data captured by the camera of the robot for video conferencing while also displaying video conference participants on the touch screen display. The processor may use depth information collected by the same camera to maintain the position of the user in the middle of the frame of the camera seen by video conferencing participants. The processor may maintain the position of the user in the middle of the frame of the camera by zooming in and out, using image processing to correct the image, and/or by the robot moving and making angular and linear position adjustments.

In embodiments, the camera of the robot may be a charge-coupled device (CCD) or a complementary metal-oxide semiconductor (CMOS). In some embodiments, the camera may receive ambient light from the environment or a combination of ambient light and a light pattern projected into the surroundings by an LED, IR light, projector, etc., either directly or through a lens. In some embodiments, the processor may convert the captured light into data representing an image, depth, heat, presence of objects, etc. In embodiments, the camera of the robot (e.g., depth camera or other camera) may be positioned in any area of the robot and in various orientations. For example, sensors may be positioned on a back, a front, a side, a bottom, and/or a top of the robot. Also, sensors may be oriented upwards, downwards, sideways, and/or in any specified angle. In some cases, the position of sensors may be complementary to one other to increase the FOV of the robot or enhance images captured in various FOVs.

In some embodiments, the camera of the robot may capture still images and record videos and may be a depth camera. For example, a camera may be used to capture images or videos in a first time interval and may be used as a depth camera emitting structured light in a second time interval. Given high frame rates of cameras some frame captures may be time multiplexed into two or more types of sensing. In some embodiments, the camera output may be provided to an image processor for use by a user and to a microcontroller of the camera for depth sensing, obstacle detection, presence detection, etc. In some embodiments, the camera output may be processed locally on the robot by a processor that combines standard image processing functions and user presence detection functions. Alternatively, in some embodiments, the video/image output from the camera may be streamed to a host for further processing or visual usage.

In some embodiments, the size of an image may be the number of columns M (i.e., width of the image) and the number of rows N (i.e., height of the image) of the image matrix. In some embodiments, the resolution of an image may specify the spatial dimensions of the image in the real world and may be given as the number of image elements per measurement (e.g., dots per inch (dpi) or lines per inch (lpi)), which may be encoded in a number of bits. In some embodiments, image data of a grayscale image may include a single channel that represents the intensity, brightness, or density of the image. In some embodiments, images may be colored and may include the primary colors of red, green, and blue (RGB) or cyan, magenta, yellow, black (CYMK). In some embodiments, colored images may include more than one channel. For example, one channel for color in addition to a channel for the intensity gray scale data. In embodiments, each channel may provide information. In some embodiments, it may be beneficial to combine or separate elements of an image to construct new representations. For example, a color space transformation may be used for compression of a JPEG representation of an RGB image, wherein the color components Cb, Cr are separated from the luminance component Y and are compressed separately as the luminance component Y may achieve higher compression. At the decompression stage, the color components and luminance component may be merged into a single JPEG data stream in reverse order.

In some embodiments, Portable Bitmap Format (PBM) may be saved in a human-readable text format that may be easily read in a program or simply edited using a text editor. For example, the image in FIG. 280A may be stored in a file with editable text, such as that shown in FIG. 280B. P2 in the first line may indicate that the image is plain PBM in human readable text, 10 and 6 in the second line may indicate the number of columns and the number of rows (i.e., image dimensions), respectively, 255 in the third line may indicate the maximum pixel value for the color depth, and the # in the last line may indicate the start of a comment. Lines 4-9 are a 6×10 matrix corresponding with the image dimensions, wherein the value of each entry of the matrix is the pixel value. In some embodiments, the image shown in FIG. 280A may have intensity values $I(u,v)\in[0, K-1]$, wherein I is the image matrix and K is the maximum number of colors that may be displayed at one time. For a typical 8-bit grayscale image K=28=256. FIG. 280C illustrates a histogram corresponding with the image in FIG. 280A, wherein the x-axis is the entry number, beginning at the top left hand corner and reading towards the right of the matrix in FIG. 280B and the y-axis is the number of color. In some embodiments, a text file may include a simple sequence of 8-bit bytes, wherein a byte is the smallest entry that may be read or written to a file. In some embodiments, a cumulative histogram may be derived from an ordinary histogram and may be useful for some operations, such as histogram equalization. In some embodiments, the sum H(i) of all histogram values h(j) may be determined using $H(i)=\Sigma_{j=0}^{i} h(j)$, wherein $0\leq i<K$. In some embodiments, H(i) may be defined recursively as H(i)={h(0) ƒ or i=0 H(i−1)+h(i) for 0<i<K. In some embodiments, the mean value p of an image I of size M×N may be determined using pixel values I(u,v) or indirectly using a histogram h with a size of K. In some embodiments, the total number of pixels MN may be determined using $MN=\Sigma_i h(i)$. In some embodiments, the mean value of an image may be determined using $$\mu = \frac{1}{MN}\cdot\sum_{u=0}^{M-1}\sum_{v=0}^{N-1} I(u, v) = \frac{1}{MN}\cdot\sum_{i=0}^{K-1} h(i)\cdot i.$$

Similarly, the variance $\sigma^2$ of an image I of size M×N may be determined using pixel values I(u,v) or indirectly using a histogram h with a size of K. In some embodiments, the variance $\sigma^2$ may be determined using $$\sigma^2 = \frac{1}{MN}\cdot\sum_{u=0}^{M-1}\sum_{v=0}^{N-1}[I(u, v)-\mu]^2 = \frac{1}{MN}\cdot\sum_{i=0}^{K-1}(i-\mu)^2\cdot h(i).$$

In some embodiments, the processor may use integral images (or summed area tables) to determine statistics for any arbitrary rectangular sub-images. This may be used for several of the applications used in the robot, such as fast filtering, adaptive thresholding, image matching, local feature extraction, face detection, and stereo reconstruction. For a scalar-valued grayscale image I: M×N→R, the processor may determine the first-order integral of an image using $\Sigma_1(u,v)=\Sigma_{i=0}^{u}\Sigma_{j=0}^{v} I(i,j)$. In some embodiments, $\Sigma_1(u,v)$ may be the sum of all pixel values in the original image I located to the left and above the given position (u,v), wherein $\Sigma_1(u,v)$={0 for u<0 or v<0 $\Sigma_1(u-1, v)+\Sigma_1(u, v-1)-\Sigma_1(u-1, v-1)+I(u,v)$ for u, v≥0. For positions u=0, . . . , M−1 and V=0, . . . , N−1, the processor may determine the sum of the pixel values in a given rectangular region R, defined by the corner positions $a=(u_a, v_a)$, $b=(u_a, v_b)$ using the first-order block sum $S_1(R)=\Sigma_{i=u_a}^{u_b} \Sigma_{j=v_a}^{v_b} I(i,j)$. In embodiments, the quantity $\Sigma_1 (u_a-1, v_a-1)$ may correspond to the pixel sum within rectangle A, and $\Sigma_1 (u_b, v_b)$ may correspond to the pixel sum over all four rectangles A, B, C and R. In some embodiments, the processor may apply a filter by smoothening an image by replacing the value of every pixel by the average of the values of its neighboring pixels, wherein a smoothened pixel value I'(u,v) may be determined using $$I'(u, v) \leftarrow \frac{p_0 + p_1 + p_2 + p_3 + p_4 + p_5 + p_6 + p_7 + p_8}{9}.$$

Examples of non-linear filters that the processor may use include median and weighted median filters.

In some embodiments, structured light, such as a laser light, may be used to infer the distance to objects within the environment using at least some of the methods described in U.S. Non-Provisional patent application Ser. Nos. 15/243,783, 15/954,335, 17/316,006, 15/954,410, 16/832,221, 15/224,442, 15/674,310, 17/071,424, 15/447,122, 16/393,921, 16/932,495, 17/242,020, 15/683,255, 16/880,644, 15/257,798, 16/525,137 each of which is hereby incorporated by reference. FIG. 281A illustrates an example of a structured light pattern 28100 emitted by laser diode 28101. The light pattern 28100 includes three rows of three light points. FIG. 281B illustrates examples of different light patterns including light points and lines (shown in white). In some embodiments, time division multiplexing may be used for point generation. In some embodiments, a light pattern may be emitted onto objects surfaces within the environment. In some embodiments, an image sensor may capture images of the light pattern projected onto the object surfaces. In some embodiments, the processor of the robot may infer distances to the objects on which the light pattern is projected based on the distortion, sharpness, and size of light points in the light pattern and the distances between the light points in the light pattern in the captured images. In some embodiments, the processor may infer a distance for each pixel in the captured images. In some embodiments, the processor may label and distinguish items in the images (e.g., two dimensional images). In some embodiments, the processor may create a three dimensional image based on the inferred distances to objects in the captured images. FIG. 282A illustrates an environment 28200. FIG. 282B illustrates a robot 28201 with a laser diode emitting a light pattern 28202 onto surfaces of objects within the environment 28200. FIG. 282C illustrates a captured two dimensional image of the environment 28200. FIG. 282D illustrates a captured image of the environment 28200 including the light pattern 28202 projected onto surfaces of objects within the environment 28200. Some light points in the light pattern, such as light point 28203, appear larger and less concentrated, while other light points, such as light points 28204, appear smaller and sharper. Based on the size, sharpness, and distortion of the light points and the distances between the light points in the light pattern 28202, the processor of the robot 28201 may infer the distance to the surfaces on which the light points are projected. The processor may infer a distance for each pixel within the captured image and create a three dimensional image, such as that illustrated in FIG. 282E. In some embodiments, the images captured may be infrared images. Such images may capture live objects, such as humans and animals. In some embodiments, a spectrometer may be used to determine texture and material of objects.

In some embodiments, the processor may extract a binary image by performing some form of thresholding to convert the grayscale image into an upper side of a threshold or a lower side of the threshold. In some embodiments, the processor may determine probabilities of existence of obstacles within a grid map as numbers between zero and one and may describe such numbers in 8 bits, thus having values between zero to 255 (discussed in further detail above). This may be synonymous to a grayscale image with color depth or intensity between zero to 255. Therefore, a probabilistic occupancy grid map may be represented using a grayscale image and vice versa. In embodiments, the processor of the robot may create a traversability map using a grayscale image, wherein the processor may not risk traversing areas with low probabilities of having an obstacle. In some embodiments, the processor may reduce the grayscale image to a binary bitmap.

In some embodiments, the processor may represent color images in a similar manner as grayscale images. In some embodiments, the processor may represent color images by using an array of pixels in which different models may be used to order the individual color components. In embodiments, a pixel in a true color image may take any color value in its color space and may fall within the discrete range of its individual color components. In some embodiments, the processor may execute planar ordering, wherein color components are stored in separate arrays. For example, a color image array I may be represented by three arrays, $I=(I_R, I_G, I_B)$, and each element in the array may be given by a single color $[I_R(u,v)I_G(u,v)I_B(u,v)]$. For example, FIG. 283 illustrates the three arrays $I_R$, $I_G$, $I_B$ of the color image array I and an element 28300 of the array I for a particular position (u,v) given as $[I_R(u,v)\ I_G(u,v)\ I_B(u,v)]$. In some embodiments, the processor may execute packed ordering, wherein the component values that represent the color of each pixel are combined inside each element of the array. In some embodiments, each element of a single array may contain information about each color. For instance, FIG. 284 illustrates the array $I_{R,G,B}$ and the components 28400 of a pixel at some position (u,v). In some instances, the combined components may be 32 bits. In some embodiments, the processor may use a color palette including a subset of true color. The subset of true color may be an index of colors that are allowed to be within the domain. In some embodiments, the processor may convert R, G, B values into grayscale or luminance values. In some embodiments, the processor may determine luminance using $$Y = \frac{w_R + w_G + w_B}{3},$$

the weighted combination of the three colors.

Some embodiments may include a light source, such as laser, positioned at an angle with respect to a horizontal plane and a camera. The light source may emit a light onto surfaces of objects within the environment and the camera may capture images of the light source projected onto the surfaces of objects. In some embodiments, the processor may estimate a distance to the objects based on the position of the light in the captured image. For example, for a light source angled downwards with respect to a horizontal plane, the position of the light in the captured image appears higher relative to the bottom edge of the image when the object is closer to the light source. FIG. 285 illustrates a light source 28500 and a camera 28501. The light source 28500 emits a laser light 28502 onto the surface of object 28503. The camera 28501 captures an image 28505 of the projected light. The processor may extract the laser light line 28504 from the captured image 28505 by identifying pixels with high brightness. The processor may estimate the distance to the object 28503 based on the position of the laser light line 28504 in the captured image 28505 relative to a bottom or top edge of the image 28505. Laser light lines 28506 may correspond with other objects further away from the robot than object 28503. In some cases, the resolution of the light captured in an image is not linearly related to the distance between the light source projecting the light and the object on which the light is projected. For example, FIG. 286 illustrates areas 28600 of a captured image which represent possible positions of the light within the captured image relative to a bottom edge of the image. The difference in the determined distance of the object between when the light is positioned in area a and moved to area b is not the same as when the light is positioned in area c and moved to area d. In some embodiments, the processor may determine the distance by using a table relating position of the light in a captured image to distance to the object on which the light is projected. In some embodiments, using the table comprises finding a match between the observed state and a set of acceptable (or otherwise feasible) values. In embodiments, the size of the projected light on the surface of an object may also change with distance, wherein the projected light may appear smaller when the light source is closer to the object. FIG. 287 illustrates an object surface 28700, an origin 28701 of a light source emitting a laser line, and a visualization 28702 of the size of the projected laser line for various hypothetical object distances from the origin 28701 of the light source. As the hypothetical object distances decrease and the object becomes closer to the origin 28701 of the light source, the projected laser line appears smaller. Considering that both the position of the projected light and the size of the projected light change based on the distance of the light source from the object on which the light is projected, FIG. 288A illustrates a captured image 28800 of a projected laser line 28801 emitted from a laser positioned at a downward angle. The captured image 28800 is indicative of the light source being close to the object on which the light was projected as the line 28801 is positioned high relative to a bottom edge of the image 28800 and the size of the projected laser line 28801 is small. FIG. 288B illustrates a captured image 28802 of the projected laser line 28803 indicative of the light source being further from the object on which the light was projected as the line 28804 is positioned low relative to a bottom edge of the image 28802 and the size of the projected laser line 28803 is large. This same observation is made regardless of the structure of the light emitted. For instance, the same example as described in FIGS. 288A and 288B are shown for structured light points in FIGS. 289A and 289B. The light points 28900 in image 28901 appear smaller and are positioned higher relative to a bottom edge of the image 28900 as the object is positioned closer to the light source. The light points 28902 in image 28903 appear larger and are positioned lower relative to the bottom edge of the image 28902 as the object is positioned further away from the light source. In some cases, other features may be correlated with distance of the object. The examples provided herein are for the simple case of light project on a flat object surface, however, in reality object surfaces may be more complex and the projected light may scatter differently in response. To solve such complex situations, optimization may be used to provide a value that is most descriptive of the observation. In some embodiments, the optimization may be performed at the sensor level such that processed data is provided to the higher level AI algorithm. In some embodiments, the raw sensor data may be provided to the higher level AI algorithm and the optimization may be performed by the AI algorithm.

In some embodiments, the robot may include an LED or flight sensor to measure distance to an obstacle. In some embodiments, the angle of the sensor is such that the emitted point reaches the driving surface at a particular distance in front of the robot (e.g., one meter). In some embodiments, the sensor may emit a point. In some embodiments, the point may be emitted on an obstacle. In some embodiments, there may be no obstacle to intercept the emitted point and the point may be emitted on the driving surface, appearing as a shiny point on the driving surface. In some embodiments, the point may not appear on the ground when the floor is discontinued. In some embodiments, the measurement returned by the sensor may be greater than the maximum range of the sensor when no obstacle is present. In some embodiments, a cliff may be present when the sensor returns a distance greater than a threshold amount from one meter. FIG. 290A illustrates a robot 29000 with an LED sensor 29001 emitting a light point 29002 and a camera 29003 with a FOV 29004. The LED sensor 29001 may be configured to emit the light point 29002 at a downward angle such that the light point 29002 strikes the driving surface at a predetermined distance in front of the robot 29000. The camera 29003 may capture an image within its FOV 29004. The light point 29002 is emitted on the driving surface 29005. The distance returned may be the predetermined distance in front of the robot 29000 as there are no obstacles in sight to intercept the light point 29002. In FIG. 290B the light point 29002 is emitted on an obstacle 29006 and the distance returned may be a distance smaller than the predetermined distance. In FIG. 290C the robot 29000 approaches a cliff 29007 and the emitted light is not intercepted by an obstacle or the driving surface. The distance returned may be a distance greater than a threshold amount from the predetermined distance in front of the robot 29000. FIG. 291A illustrates another example of a robot 29100 emitting a light point 29101 on the driving surface a predetermined distance in front of the robot 29100. FIG. 291B illustrates a FOV of a camera of the robot 29100. In FIG. 291C the light point 29101 is not visible as a cliff 29102 is positioned in front of the robot 29100 and in a location on which the light point 29101 would have been projected had there been no cliff 29102. FIG. 291D illustrates the FOV of the camera, wherein the light point 29101 is not visible. In FIG. 291E the light point 29101 is intercepted by an obstacle 29103. FIG. 291F illustrates the FOV of the camera. In some embodiments, the processor of the robot may use Bayesian inference to predict the presence of an obstacle or a cliff. For example, the processor of the robot may infer that an obstacle is present when the light point in a captured image of the projected light point is not emitted on the driving surface as is intercepted by another object. Before reacting, the processor may require a second observation confirming that an obstacle is in fact present. The second observation may be the distance returned by the sensor being less than a predetermined distance. After the second observation, the processor of the robot may instruct the robot to slow down. In some embodiments, the processor may continue to search for additional validation of the presence of the obstacle or lack thereof or the presence of a cliff. In some embodiments, the processor of the robot may add an obstacle or cliff to the map of the environment. In some embodiments, the processor of the robot may inflate the area occupied by an obstacle when a bumper of the robot is activated as a result of a collision.

In some embodiments, an emitted structured light may have a particular color and particular color. In some embodiments, more than one structured light may be emitted. In embodiments, this may improve the accuracy of the predicted feature or face. For example, a red IR laser or LED and a green IR laser or LED may emit different structured light patterns onto surfaces of objects within the environment. The green sensor may not detect (or may less intensely detects) the reflected red light and vice versa. In a captured image of the different projected structured lights, the values of pixels corresponding with illuminated object surfaces may indicate the color of the structured light projected onto the object surfaces. For example, a pixel may have three or four values, such as R (red), G (green), B (blue), and I (intensity), that may indicate to which structured light pattern the pixel corresponds to. FIG. 292A illustrates an image 29200 with a pixel 29201 having values of R, G, B, and I. FIG. 292B illustrates a first structured light pattern 29202 emitted by a green IR or LED sensor. FIG. 292C illustrates a second structured light pattern 29203 emitted by a red IR or LED sensor. FIG. 292D illustrates an image 29204 of light patterns 29202 and 29203 projected onto an object surface. FIG. 292E illustrates the structured light pattern 29202 that is observed by the green IR or LED sensor despite the red structured light pattern 29203 emitted on the same object surface. FIG. 292F illustrates the structured light pattern 29203 that is observed by the red IR or LED sensor despite the green structured light pattern 29202 emitted on the same object surface. In some embodiments, the processor divides an image into two or more sections. In some embodiments, the processor may use the different sections for different purposes. For example, FIG. 293A illustrates an image divided into two sections 29300 and 29301. FIG. 293B illustrates section 29300 used as a far field of view and 29301 as a near field of view. FIG. 293C illustrates the opposite. FIG. 294A illustrates another example, wherein a top section 29400 of an image captures a first structured light pattern projected onto object surfaces and bottom section 29401 captures a second structured light pattern projected onto object surfaces. Structured light patterns may be the same or different color and may be emitted by the same or different light sources. In some cases, sections of the image may capture different structured light patterns at different times. For instance, FIG. 294B illustrates three images captured at three different times. At each time point different patterns are captured in the top section 29400 and bottom section 29401. In embodiments, the same or different types of light sources (e.g., LED, laser, etc.) may be used to emit the different structure light patterns. For example, FIG. 294C illustrates a bottom section 29402 of an image capturing a structured light pattern emitted by an IR LED and a top section 29403 of an image capturing a structured light pattern emitted by a laser. In some cases, the same light source mechanically or electronically generates different structured light patterns at different time slots. In embodiments, images may be divided into any number of sections. In embodiments, the sections of the images may be various different shapes (e.g., diamond, triangle, rectangle, irregular shape, etc.). In embodiments, the sections of the images may be the same or different shapes.

In some cases, the power of structured light may be too strong for near range objects and too weak for far range obstacles. In one example, a light ring with a fixed thickness may be transmitted to the environment, the diameter of which increases at the robot is farther from the object. FIG. 295 illustrates a camera 29500 with FOV 29501 and light emitter 29502 emitting ring 29503. As the distance from the light emitter 29502 increases, the size of the ring 29503 increases. At a near distance 29504 there is high power reflection while at a far distance 29505 there is dimmed power reflection, where there may not even be enough power to impact the silicon of the camera. In embodiments, the power of the structured light may be too strong for objects that are near range when the same power is used during the pulse of light emission. The reflection may saturate the camera silicon, particularly because at closer distances the reflection is more concentrated. Therefore, in some embodiments, the processor may increase the power during the duration of the pulse such that the camera has an equal chance of capturing enough energy regardless of the distance of the object.

In some embodiments, the robot comprises two lasers with different or same shape positioned at different angles. For example, FIG. 296 illustrates a camera 29600, a first laser 29601 and a second laser 29602, each laser positioned at a different angle and emitting laser lines 29603 and 29604, respectively. In some embodiments, the light emission from lasers may be timed such that light emission from only a single laser appears in the FOV of the camera at once. In some embodiments, the light emission from more than one laser may be captured within the FOV of the camera at the same time. In such cases, the processor may analyze the captured image data to determine from which laser each light emission originated. For example, the processor may differentiate the laser light captured in an image based on the orientation and/or position of the light within the image. For example, FIG. 296 illustrates an image within which laser lines 29605 and 29606 were captured. The position of the laser lines 29605 and 29606 with respect to a bottom edge of the captured image may correspond with, for example, a laser positioned at a particular angle and/or height. In FIG. 296A the first laser 29601 is positioned at a downwards angle, as such laser lines 29605 may be positioned lower than laser lines 29606 emitted from the second laser 29602 directed forwards. However, this may not always be the case depending on the angle at which each laser is positioned. In some embodiments, the processor determines a distance of the object on which the laser lines are projected based on a position of the laser lines relative to an edge of the image. In embodiments, the wavelength of light emitted from one or more lasers may be the same or different. In some embodiments, a similar result may be captured using two cameras positioned at two different angles and a single laser. In embodiments, a greater number of cameras and lasers yield better results. In embodiments, various different types of sensors may be used such as light based or sonar based sensors.

In some embodiments, the power of the structured light may be adjusted based on a speed of the robot. In some embodiments, the power of the structured light may be adjusted based on observation collected during an immediately previous time stamp or any previous time stamp. For instance, the power of the structured light may be weak initially while the processor determines if there are any objects at a small range distance from the robot. If there are no objects nearby, the processor may increase the power of the structured light and determine if there are any objects at medium range distance from the robot. If there are still no objects observed, the processor may increase the power yet again and observe if there are any objects a far distance from the robot. Upon suddenly and unexpectedly discovering an object, the processor may reduce the power and may attempt to determine the distance more accurately for the near object. In some embodiments, the processor may unexpectedly detect an object as the robot moves at a known speed towards a particular direction. A stationary object may unexpectedly be detected by the processor upon falling within a boundary of the conical FOV of a camera of the robot. For example, FIG. 297 illustrates an autonomous vehicle 29700 and a conical FOV 29701 of a camera of the vehicle 29700 at different time points. At a first time point a house 29702 falls outside the FOV 29701 of the camera. As the vehicle 29700 drives forward, at a second time point the house 29702 is closer to the FOV 29701 but still falls outside of the FOV 29701. At a third time point, after the vehicle 29700 has driven further, the house 29702 hits a boundary of the FOV 29701 and is detected. However, if at a third time point, the house 29702 falls within the FOV 29701 at location 29703, the house 29702 is unexpectedly detected. The robot may need to slow down and change focus to nearby objects.

In embodiments, a front facing camera of the robot observes an object as the robot moves towards the object. As the robot gets closer to the object, the object appears larger. As the robot drives by the object, a rear facing camera of the robot observes the object. FIG. 298A illustrates the robot 29800 moving in a direction 29801. An object 29802 falls within a FOV 29803 of a front facing camera of the robot 29800 as the robot moves towards the object 29802. The object 29802 appears larger to the front facing camera as the robot 29800 drives closer to the object 29802. FIG. 298B illustrates the robot 29800 after driving by the object 29802. The object 29802 now falls within a FOV 29804 of a rear facing camera of the robot 29800. The object 29802 appears smaller to the rear facing camera as the robot 29800 drives away from the object 29802. In some embodiments, the processor may use the data collected as the robot drives towards, passed, and away from the object for better and/or redundant localization and mapping and/or extracting depth of field.

In some embodiments, the FOV of sensors positioned on the robot overlap while in other embodiments, there is no overlap in the FOV of sensors. FIG. 299A illustrates an example of an autonomous vehicle 29900 with a front facing FOV 29901 of a first sensor and a rear facing FOV 29902 of a second sensor. In this case, the FOV 29901 and FOV 29902 do not overlap. FIG. 299B illustrates the autonomous vehicle 29900 with the front facing FOV 29901 of the first sensor and the rear facing FOV 29902 of the second sensor. In this case, the FOV 29901 and FOV 29902 overlap due to the changed positioning of the first and second sensor on the autonomous vehicle 29900. A close up view of the area of overlap 29903 of the FOV 29901 and FOV 29902 is shown. FIG. 299C illustrates a robot 29903 with a forward facing camera having FOV 29904 and a rear facing camera having FOV 29905. The FOV 29904 and FOV 29905 overlap. In some embodiments, the beams from a LIDAR sensor positioned on a robot fall within the FOV of a camera of the robot. The beams may be observed at different heights. In some embodiments, the processor may use the observed beams for obstacle avoidance.

In some embodiments, the processor uses a neural network to determine a distance of an objects based on images of one or more laser beams projected on the objects. The neural network may be trained based on training data. Manually predicting all pixel arrangements that are caused by reflection of structured light is difficult and tedious. A lot of manual samples may be gathered and provided to the neural network as training data and the neural network may also learn on its own. In some embodiments, an accurate LIDAR is positioned on a robot and a camera of the robot captures images of laser beams of the LIDAR reflected onto objects within the environment. To train the neural network, the neural network associates pixel combinations in the captured images with depth readings to the objects on which the beams are reflected in the captured images. FIG. 300 illustrates an example of a robot 30000 with a LIDAR 30001 scanning at an angle towards the horizon. The beams 30002 of the LIDAR fall within a FOV 30003 of a camera of the robot. The beams 30002 are captured in an image 30004 as lines at different heights depending on the distance of the objects on which the beams 30002 are projected. The processor trains a neural network by associating pixel combinations in the captured images with depth readings to the objects on which the beams are reflected in the captured images. Many training data points may be gathered, such as millions of data points. After training, the processor uses the neural network to determine a distance of objects based on a position of beams reflected on the objects in a captured image and actuates the robot to avoid the objects.

In some embodiments, the distance between light rays emitted by a light source of the robot may be different. For example, FIG. 301 illustrates an example of a robot 30100 emitting light rays 30101. The light rays to the front are closer together than the light rays to the side. This results in light pattern 30102. Distance between adjacent light rays may be different in different area due to, for example, openings in a wall or when a wall or object is close to the light source of the robot causing light rays emitted on the wall or object to be positioned much closer together. In such cases, multiple rays may fit into just a couple resolutions and the processor has more data points from the light rays to determine the distance to the nearby wall or object on which the light rays are emitted. This increases the confidence in the determined distance for nearby walls or objects. Therefore, in some cases, the robot initially executes a wall follow path to obtain a dense point cloud. FIG. 302 illustrates a robot 30200 executing a wall follow path 30201. The processor may then create a high confidence map 30202 by following along the wall for a substantial amount of time. The processor may create the map by drawing lines at a distance substantially less than the width 30203 of the robot such that there is overlap with a previously highly confident mapped area. This approach however may not be as efficient as the robot cannot immediately begin to work but rather needs to rotate 360 degrees and/or execute a wall follow. In cases of point to point navigation or patrolling, executing these movements before working is inefficient.

Some embodiments filter a depth camera image based on depth. FIG. 303A illustrates an image captured with various objects 30300 at different depths. Objects include trees, light poles, a car and a human pedestrian. If the image is a traditional 2D image, only objects at specified distances may be show. If the image comprises 2D depth value including (RGB) and depth then the processor may filter the image for close objects wherein only pixels that have a specific depth recorded are show. FIG. 303B illustrates the image filtered based on the depth values. Various filtration combinations are shown. For some tasks, some specific depths are more relevant than other depths. Therefore, parts of the image where relevant depths are found may be processed. These parts of the image may be processed along with some surrounding pixels to ensure that nothing important is missed. In one example, for obstacle detection, parts of the image including further depths are less relevant and are therefore processed with less frequency or lower resolution. This allows the portions of the images with further depths to be masked with zeros in some processing, which improves processing speed. FIG. 303C illustrate portions of the image that include close objects, wherein pixels that are associated with a depth that are greater than some threshold are replaced by zeros. In another example, for the purpose of obstacle avoidance, nearby obstacles are important and further depths may be zeroed out. In contrast, for the purpose of localization against a structural part of the environment, the further depths are relevant and nearby depths may be zeroed out. FIG. 303D illustrates segments of the image that belong to different depth regions, three regions of depth in this case.

When a depth image is taken and considered independently, for each pixel (i,j) in the image, there is a depth value D. When SLAM is used to combine the images and depth sensing into a reconstruction of the spatial model, then for each pixel (i,j), there is a corresponding physical point which may be described by an (x,y,z) coordinate in the grid space frame of reference. Since there could be multiple pictures of a physical point in the environment, the x,y,z location may appear in more than one (often many) images at any i,j location in the image. If two images are taken from an exact same x,y,z location by a camera at an exact same pose, then i', j' of the second image will have exact values as i,j of the first image, wherein the pixels represent the same location in physical space. In processing various ranges of depth pixels, the processor may divide the image into depth layers. FIG. 303E illustrates an image separated into three different depth layers, each layer representing objects falling within a different range of depth. In some, embodiments, the processor may transfer depth more often for some tasks in comparison to others to save processing time. For example, the processor may send depth pixels from a video feed of a security robot when moving objects are observed more frequently. In a conference call or telepresence robot pixels corresponding with a person sitting in a foreground may be transmitted at a same frame rate as the camera captures while the background pixels may be sent less frequently, at a lower resolution, as an averaged background, or as a fake image background that is played on the receiving side for a length corresponding to a few frames rather during just during one frame. This allows for implementation of compression methods to take advantage of the zeroed-out portion of each frame as they are sent to the cloud and/or WAN and received on the receiving side. In the tennis game example described earlier, data relating to the ball may have a top priority requirement for maximum speed of transmission followed data relating to the player. FIGS. 303F and 303G illustrate three points A, B, C within the image and each of their depths in different depth layers. This concept differs from 3D representation in a 2D plane. Stereo imaging (playing or capturing), wherein one camera records a right eye view and one camera at a distance (i.e., the base) records a left eye view concurrently may be played as such. This is important to understand because each pixel in the image is related to its surrounding pixels depth wise. This may be shown with a graph or some sort of geometry. FIG. 304 illustrates a camera 30400 at resolution of nine pixels capturing a picture of a plane 30401 with one toy block 30402 glued in the middle. The distance between camera 30400 and the plane 30401 is five inches and the block size is one inch. The depth relation of pixels in depth map 30403 indicate a depth of five for the pixels of the plane while the depth for the pixels of the block (in the middle) are four. The relationship between the pixels corresponding with the block 30402 and its surrounding pixels is one, as illustrated in the depth relationship map 30404.

In embodiments, a depth relation map drawn for a 480×640 resolution camera may comprise a large graph. Some points (e.g., 4 points) within the entire image may be selected and a depth map for the points may be generated. FIG. 305 illustrates four points and their depth relation in a larger array of pixels (depth relation is only shown for one point). The four points may be four pixels or may each be a block of pixels. FIG. 306 illustrates the same concept with more points. While in some embodiments fixed size spacing may be useful, in some other embodiments each point is selected only where a feature is detected. In some other embodiments, the chosen spacing may correlate with a structured light angle and geometry of configuration. For instance, the processor may stitch two depth images based on features or based on depth or a combination of both. Two separate stitches may be executed and evolved. One stitch may be a Bayesian prior to the second stitch, the two images merged based on a least square or other error minimizing method. In embodiments, the processor may create an ensemble to track different possible worlds that evolve or may use trees and branches to represent different possible world. Ensembles may be reduced in number or trees and branches may be pruned.

In embodiments, each depth in an image may be represented by a glass layer, each glass layer being stacked back to back and including a portion of an image such that in viewing the stack of glass layers from a front or top, the single image is observed. FIG. 307 illustrates how an image 30700 changes as the camera moves from a first angle to a third angle. These changes are different in different depth layers. In embodiments, the processor may use the observation from the front or top of the stack of layers when stitching images based on features. In contrast, the processor may use the observation from a middle of end of the stack when stitching images based on depth as they show overlapping depth values. In some embodiments, the processor may discard or crop the overlapping area of the two images stitched together. In some applications, a visual representation of the environment may be needed while in other applications, visual representation may not be needed. FIG. 308 illustrates a visual representation of a 3D room in 2D. In some embodiments, the processor may obtain depth measurements from two TOF point depth measurement devices and extrapolate depth to other regions of the 2D image. FIG. 309A illustrates a robot 30900 with two depth sensors, sensor 1 and sensor 2. At time t, depth 1 measured by sensor 1 indicates that tree $F_1$ may be reasonably thought of as close as point A is known to be close and $F_1$ is either on the pixel A or close enough. In some embodiments, the processor may use a machine learned trained system and a classifier (deep or shallow) to determine with what probability F1 falls on glass $g_1, g_2, g_3, g_4, \ldots,$ or $g_i$. For example, the classifier may correctly classify that $F_1$ is, with a high probability, on glass $g_1$, with lower probability on glass $g_2$, and with much lower probability on glass $g_3$. FIG. 309B illustrates that as the robot 30900 moves to pose 2 at time t', the processor obtains new depth readings for the points C and D of features $F_1$ and $F_2$. In embodiments, such results may be obtained by training a neural network or a traditional classifier. This may be achieved by running a ground truth depth measuring LIDAR along with the neural network or classifier. In its simplest form, a lookup table or an adaptive lookup table may be hand crafted. For example, FIGS. 310A and 310B illustrate an example of a neural network output after training the system, wherein probabilities of different depth ranges are output to best predict a location of features. A time t in FIG. 309A, depth 1 is measured by sensor 2. Sensor 1 along with a camera may provide some more useful information than a single camera with no depth measurement device. This information may be used for enhancements in iterations as the robot moves within the environment and collects more data. Using a second, a third, a fourth, etc., set of data points increases accuracy. While only two TOF sensors are described in this example, more depth sensors may be used. Based on depth 1 of sensor 2, the classifier may predict feature $F_2$ is on the $g_{ith}$ layer and creates a table illustrated in FIG. 310B.

While the classification of the surrounding pixels to a measured distance may be a relatively easier task, a more difficult task may be determining the distances to each of the groups of pixels between feature $F_1$ and features $F_3$, $F_4$, $F_5$, for example. For instance, given that $F_1$ is on glass $g_1$, and $F_2$ is on glass $g_2$, the processor may determine which glasses $F_3$, $F_4$, $F_5$ belong to. FIG. 311 illustrates different features $F_1$ to $F_5$ in the image 31100 and their locations in different depth layers 31101. Or, more specifically, to which glass layer the pixel groups belong to. In this example, there are five depth categories: (1-3), (3-5), (5-7), (7-9), and (9-11). Using the classifier or a neural network it is determined that pixel group 2 falls within the (9-11) depth category and pixel group 1 falls within the (1-3) depth category. In cases where the processor has no information, the processor may guess and evenly distribute pixel group 3 to the (3-5) depth category, pixel group 4 to the (5-7) depth category, and pixel group 5 to the (7-9) depth category. In some cases, the processor may have more information to help with an assumption of even distribution, such as a Bayesian prior. While the robot moves sensors gather accurate measurements to more features and therefore depth to more pixel groups become known, leaving a less number of guesses to be made. FIG. 312A illustrates a robot 31200 measuring depth 1 using sensor 1 and a depth 2 using the sensor 2 at time t''. FIG. 312B illustrates at some point in the next few time slots t''', while the robot 31200 drives along its trajectory, a sensor may measure a depth 3 to feature $F_3$ ($F_3$ is shown in FIG. 311). Based on depth 3, the processor may determine that, with a high probability, feature $F_3$ is on glass $g_3$ in addition to the pixels surrounding the feature. In measuring depth 3, displacement of the robot from pose 1 to pose 3 may be accounted for. However, due to uncertainty of motion, the boundaries of pixel groups corresponding to features $F_1$ and $F_3$ may not be crystal clear. As new information is collected, the boundaries become clearer.

In embodiments, objects within the scene may have color densities that are shared by certain objects, textures, and obstacles. FIG. 313 illustrates an image 31300 comprising a continuous wall 31301 of a single color with features $F_1$ through to $F_5$. The continuous wall 31301 of single color is observed as if there are no bricks and features may be points of clues in the substantially similar colored background. If in fact the pixels connecting $F_1$ to $F_2$ were of the same color depth, then an even distribution would be reasonable. The reason for this is further elaborated on in U.S. Non-Provisional patent application Ser. Nos. 15/447,122, 16/393,921, 16/932,495, and 17/242,020, each which is hereby incorporated by reference. This may be a likely scenario if the two measured points were close enough to be considered a part of a same object and when the contour of one object finishes it is known that depth changes. In scenarios where the distance range between features $F_1$ and $F_2$ encompass a range of distances (based on the geometry of arranged sensors), the arrangement of colors that are within a certain range of pixel density are more likely to belong to a same depth. FIG. 314 illustrates a POV 31400 of a robot 31401. Different pixel groups are assigned to different features $F_1$ through to $F_4$ in the scene. In assigning pixel groups, the processor may consider color depth boundaries and contours and group those together before determining which depth class the pixels belong to. This way, before the robot starts moving, the processor may not have an evenly guessed "prior" to assign pixel group 3. When the processor finds an association between depth measurement and a pixel group, the information becomes more meaningful. While the example is explained in simple terms, in embodiments, data coming in from SFM, optical flow, visual odometry, IMU, odometer, may be provided as input to a neural network. The neural network may be trained a series of times prior to run time and a series of times during run time while the robot is working within homes. Such training may result in the neural network providing outputs with high accuracy from basic inputs. As more measured points are captured, increase in efficiency is observed.

Regardless of how depth is measured, depth information may have a lot of applications, apart from estimating pose of the robot. For example, a processor of a telepresence robot may replace a background of a user transmitting a video with a fake background for privacy reasons. The processor may hide the background by separating the contour of the user from the image and replacing a background of the user with a fake background image. The task may be rather easy because the camera capturing the user and the user are substantially stationary with respect to each other. However, if the robot or the object captured by a camera of the robot is in motion, SLAM methods may be necessary to account for uncertainties of motion of the robot and the object and uncertainties of perception due to motion of the robot and the object captured by the camera of the robot.

FIG. 315 illustrates a flowchart of a process of encoding and decoding an image stream. At different time slots $t_1$, $t_2$, . . . , $t_4$ image frames 1, 2, . . . , 4 are captured by a camera. The encoder compares each frame with a previous one and separates and removes the background area that is constant in both frames. In embodiments, the whole image frame may be kept for every few frames captured to avoid losing data, these frames may be called keyframes. By removing the background in image frames, a smaller file size that is easier to transmit is obtained. On the receiving side, a decoder may add the background of a previous frame to each frame with a removed background (i.e., reconstructs the frame) and may play the decoded version at the destination. With multiple collaborative AI participants, this provides a huge bandwidth saving. In the case where a user chooses to use a fake background described above, there is no need to send any images with the real background. Only the portion of the images corresponding with the user and the fake background are sent and at destination the fake background may be displayed. The fake background may be sent once at a beginning of a session.

In embodiments, data acquisition (e.g., stream of images from a video) occurs in a first step. In a next step, all or some images are processed. In order to process meaningful information, redundant information may be filtered out. For instance, the processor may use a Chi test to determine if an image provides useful enough information. In embodiments, the processor may use all images or may select some images for use. In embodiments, each image may be preprocessed. For example, images may pass through a low pass filter to smoothen the images and reduce noise. In embodiments, feature extraction may be performed using methods such as Harris or Canny edge detection. Further processing may then be applied, such as morphological operations, inflation and deflation of objects, contrast manipulation, increase and decrease in lighting, grey scale, geometric mean filtering, and forming a binary image.

In some embodiments, the processor segments an image into different areas and reconnects the different areas and repeats the process until the segmented areas comprise similar areas grouped together. FIG. 316 illustrates different segmentations 31600 of an image 31601 to determine groups having similar features. The processor repeated the process until, groups 31602, 31603, and 31604 that each comprise similar area, namely floor areas and non-floor areas, were the result of the segmentation.

Some embodiments may transpose an obstacle from an image coordinate frame of reference into a floor map coordinate frame of reference. FIG. 317 illustrates a robot 31700 and an image 31701 captured within a FOV 31702 of a camera positioned on the robot 31700. The data captured in image 31701 is used by the processor to generate a partial map 31703. In embodiments, the processor may transpose the image from a frame of reference of the camera to a frame of reference of the map or may connect the two frames of reference. FIG. 317 also illustrates a side view of the robot 31700, the FOV 31702, and a driving surface 31704. An amount the image that includes the driving surface 31704 depends on an angle of the camera with respect to the horizon, a height of the camera from the driving surface when the robot is positioned stably on the driving surface, the FOV 31702 of the camera, and the specific parameters of the camera, such as lens and focal distance, etc. FIG. 317 illustrates image 31705 captured by the camera and a relation between the obstacle 31706 and pixels (i.e., small squares) of the image 31705. The processor may determine a location x, y of the obstacle 31706, positioned at pixels L,M,N in the image, in the coordinate frame of reference of the map. FIG. 318 illustrates images 31800 and 31801 captured by a camera of a robot 31802 at a first position ($x_1$, $y_1$) and a second position ($x_2$, $y_2$). At the first position, the image 31800 captures obstacles at pixels ($L_1$, $M_1$, $N_1$) and in the second position, the image captures the obstacles at other pixels ($L_2$, $M_2$, $N_2$). The processor may determine the first and second positions of the obstacles from the first and second pixel positions in the frame of reference of the camera based on a displacement of the robot (angular and linear), a change in size of the obstacle in the images, and the objects moving faster and slower in the image depending on how far the objects are from the camera.

In some embodiments, data collected by sensors at each time point form a three-dimensional matrix. For instance, a two-dimensional slice of the three-dimensional matrix may include map data (e.g., boundaries, walls, and edges) and data indicating a location of one or more objects at a particular time point. In observing data corresponding to different time points, the map data and location of objects vary. The variation of data at different time points may be caused by a change in the location of objects and/or a variance in the data observed by the sensors indicative of a location of the robot relative to the objects. For example, a location of a coffee table may be different at different time points, such as each day. The difference in the location of the coffee table may be caused by the physical movement of the table each day. In such a case, the location of the table is different at different time points and has a particular mean and variance. FIG. 319A illustrates a representation of three-dimensional matrix 31900 of the map at different time points. Each two-dimensional slice of the three-dimensional matrix 31900 indicates the locations 31901 of a plant at different time points and the localization 31902 of the robot at different time points. Based on the data 31901, a mean and variance 31903 for the location of the plant is determined. The difference in the location of the plant may also be caused by slight changes in the determined localization of the robot over time. Based on the data 31902, a mean and variance 31904 for the position of the robot is determined. In some cases, both the physical movement of the plant and slight changes in the determined localization of the robot may cause the location of the object to vary in different time points. In some embodiments, the processor uses a cost function that accounts for both factors affecting the determined location of the object. In some embodiments, the processor minimizes the cost function to narrow down a region around the mean. In some embodiments, the processor uses a non-parametric method within the narrowed down region. In some embodiments, more confidence in the location of the plant and robot is required. For example, in FIG. 319A the shaded area surrounding the plant represents the uncertainty in the location 31901 of the plant. Similarly, the shaded area surrounding the robot representing the uncertainty in the location 31902 of the robot. The probability density 31904 of the location 31902 of the robot has a large variance and the region surrounding the mean is large due to low confidence. In some embodiments, the processor may relate the location of the plant and the position of the robot using a cost function and minimize the cost function to narrow down a region around the mean. FIG. 319B illustrates the results of minimizing the cost function. The shaded areas surrounding the plant and robot are smaller as uncertainty in their locations is reduced. The probability density 31903 and 31904 also has a smaller region around the mean and reduced variance as confidence is increased. In some embodiments, the processor then uses a non-parametric method wherein the processor generates an ensemble of simulated robots and objects, each simulation having different relative position between the simulated robot and object, the majority of simulated robots and objects located around the mean with few located in variance regions. In some embodiments, the processor determines the best scenario describing the environment, and hence localization of the robot, from the ensemble based on information collected by sensors of the robot. At different time points, such as different work sessions, the information collected by sensors may be slightly different and thus a different scenario of any of the feasible scenarios of the ensemble may be determined to be a current localization of the robot. FIG. 319C illustrates slices 31905 of matrix 31900.

Some embodiments may use one camera and laser with structured light and a lookup table at intervals in determining depth. Other embodiments may use one camera and a LIDAR, two cameras, two cameras and structured light, one camera and a TOF point measurement device, and one camera and an IR sensor. In some embodiments, one camera and structured light may be preferred, especially when a same camera is used to capture an image without structured light and an image with the structured light and is scheduled to shoot at programmed and/or required time slots. Such a setup may solve the problem of calibration to a great extent. Some embodiments may prefer a LIDAR that captures images as it is spinning such that in one time slot the LIDAR captures an image of the laser point and in a next time slot the LIDAR captures an image without the laser point. FIG. 320A illustrates different variations 32000 and 32001 of a LIDAR. Variation 32000 comprises a regular LIDAR with laser 32002 and camera 32003. Variation 32001 comprises a LIDAR with an additional separate camera 32004 to capture the environment without the laser 32002. FIG. 320B illustrates the LIDAR from variation 32001 at time $t_0$. While the laser 32002 is being emitted, camera 32001 captures the illuminated scene with laser points, image $P_0$. As the LIDAR spins 32005, camera 32004 captures the environment without the laser 32002, image $P_1$, which is what camera 32001 may capture in the next instant but including laser 32002. Camera 1 and camera 2 may be of different types. Also, laser emitter 1 and camera 1 may be replaced with a TOF or other distance measuring systems, whereas camera 2 may capture images. FIG. 320C illustrates examples of variations of cameras and depth measuring system combination of a LIDAR. Variation 32006 comprises a LIDAR with an array of various measuring systems 32007 that may be stacked at a height of the spinning LIDAR. Variation 32008 comprises a LIDAR with an array of various measuring systems 32007 (sensors, cameras, TOF, laser, etc.) placed on a perimeter of the spinning LIDAR. Variation 32009 illustrates a combination of structured light 32010 and camera 32011 that may be placed vertically on the spinning LIDAR.

For cameras, data transfer rate for different wired and wireless interface types are provided in Table 3 below.

TABLE 3

Different wired and wireless interface types and data transfer rates

| Wired Interface | Wireless Interface |
|---|---|
| USB 3.0 → 5.0 Gb/s | Wifi 2.4/5.0 |
| USB 2.0 → 480 Mb/s | 802.11ac |
| Camera link → 3.6 Gb/s | 802.11 ab |
| Firewire → 800 Mb/s | 802.11 n |
| GigE(PoE) → 1000 Mb/s | 802.11 g |
| USART | 802.11 a |
| UART | 802.11 b |
| CAN | Cellular (SIM card) |
| SPI | Bluetooth |
| | Zigbee |

Some embodiments may construct an image one line at a time. For example, 10000 pixels per line. In embodiments, a camera with an aspect ratio of 4:3 may comprise a frame per second (FPS) up to a few hundred FPS. In embodiments, shutter (rolling, global, or both) time may be slow or fast. In embodiments, the camera may be a CCD or a CMOS camera. In embodiments using a CCD camera, each pixel charge is translated to a voltage. FIG. 321 illustrates examples of different sensor formats and sizes in comparison to each other. In embodiments, settings such as gain, exposure, AOI, white balance, frame rate, trigger delay, and select digital output (flash) delay and duration may be adjusts. In embodiments, image formats may be JPEG, bitmap, AVI, etc. In embodiments features of a camera may include image mirroring, binning, hot pixel correction, contrast, shake (reduction), direct show (WDM), activeX, TWAIN, and auto focus. In embodiments, bad illumination may cause shadows and such shadows may result in incorrect edge detection. Poor illumination may also cause low signal to noise ratio. The imaging lens aperture (f/#) may indicate an amount of light incident on camera. Types of illumination may include fiber optic illumination, telecentric illumination, LED illumination, IR LED illumination, laser pointer (i.e., point) illumination, structured light (e.g., line, grid, dots, patterns) illumination, and negatively patterned structured light. FIG. 322 illustrates examples of different structured light patterns. In embodiments, colors wavelengths may comprise red (625 nm), green (530 nm), blue (455 nm), and white (390 to 700 nm). FIGS. 323A and 323B illustrate a camera 32300 with laser beam 32301 and RGB image data 32302 from observing an object 32303 at a time $t_1$. A spike 32304 is seen in the red channel because the IR is near the red range. FIG. 324A illustrates camera 32400 with three red lasers 32401 and RGB data 32402. Spikes 32403 in the red channel are observed because the IR is near the red range. FIG. 324 illustrate a similar example, however with two red lasers 32401 and one green laser 32404. Corresponding spikes 32405 are seen in the red and green channels where IR is near red and green IR ranges.

Time of flight sensors function based on two principles, pulse and phase shift. A pulse is shot at a same time a capacitor with a known half time is discharged. Some embodiments set an array of capacitors with variable discharge. FIGS. 325A-325C illustrate graphs 32500 depicting the discharge of a capacitor over time for 1, 2, and 3 times resistance, respectively. The laser is fired and when it comes back the energy is allowed to influence each of the capacitors and the energy level output is measured. The amount of spike charge may be measured which is correlated with how far the object is. This is shown in FIGS. 325A-325C in graphs 32501 wherein spikes 32502 represent the level of energy increase which may then be correlated with distance of the object.

Some embodiments may use multiple cameras with multiple shutter speeds. FIG. 326 illustrates three cameras, each with different shutter speeds. Shutters may be managed electronically. In embodiments, the sensing range of cameras may be split into increments. With one sensor, a FOV of the robot may be widened, but with two or more cameras the FOV of the robot may be increased even more. In using an IR/RED pulse laser, such as a TOF sensor, the laser may be further isolated because the impact it places on the R channel is greater than the remaining channels. In some embodiments, the distance to an object may be determined by the processor using $d=C/4\pi f$. In embodiments, the ambiguity interval (wherein the roundtrip distance is more than the wavelength) may be reduced by transmitting an additional wave with a 90 degrees phase shift. As the robot moves on a plane, successive measurements with different modulations may create an extra equation for each additional modulation. These signals may be combined with logical operators such as OR, AND, and NOT. A multiple-modulated phase-shift may be combined or alternated with frequency modulation, modulation frequency, timing of shutter control, etc. In embodiments, an LED, a laser emitter, projectors, modulated illumination at a frequency may be constant or variable, which is advantageously configured to synchronize and/or syncopate with shutter of the sensing array inside the camera. In some embodiments, the modulated illumination may be projected at intervals of fixed time and/or at intervals of variable time. For example, two back to back quick emissions may be sent, followed by a known pause time, followed by another three subsequent emissions, etc. These may be well timed with the shutters of cameras. In some embodiments, sensors, such as Sony depth sense IMX556, a back illuminated CMOS monochrome sensor comprising progressive SCAN time of flight sensor with resolution of 640 (height)×480 (width) pixels and pixel size of 10 μm resulting in sensor active area of 6.4 mm×4.8 mm, may be used. Such sensors provide readings in a z direction in addition to x and y directions. FIG. 327 illustrates a sensor 32700 observing an object 32701. Data from the sensor may be used to determine x, y, and z dimensions of the object. Such a sensor provides a 2D image and a depth image. This sensor may be placed on an illumination board behind a lens.

The system may work on a wave phase-shift principle, TOF principle, structured light principle, TOF camera principle and/or a combination of these. The laser diode may have depth sense capabilities such as flight sense by ST Micro.

FIG. 328 illustrates laser diodes 32800, TOF sensor 32801, lens 32802, sensor board 32803, sensor 32804, lens holder 32805, and illumination board 32806. FIG. 329A illustrates a robot 32900 measuring four different depths 32901. FIG. 329B illustrates a POV 32902 the robot 32900. At time $t_1$ readings for four pixels $P_1$, $P_2$, $P_3$ and $P_4$ at locations $(i_1, j_1)$, $(i_2, j_2)$, $(i_3, j_3)$ and $(i_4, j_4)$ may be obtained. TOF 1 may read a distance of 100 cm to a far wall while TOF 2 may read a distance of 95 cm as it is closer to forming a right angle with the wall than TOF 1. TOF 3 may read a distance of 80 cm as the wall is closer to the sensor. TOF 4 may read a distance of 85 cm as the sensor forms a wider angle with the wall. At time $t_1$ we have a high confidence level of depth readings for pixels $P_1$, $P_2$, $P_3$ and $P_4$. In some embodiments the processor may form assumptions for depths based on color shades. FIG. 330 illustrates region 1 includes two depth readings for pixels $P_3$ and $P_4$ and is a small region. The processor may have a relatively good confidence in the depth readings, especially for pixels around pixels $P_3$ and $P_4$. For region 2, there no depth readings but with a low confidence the processor may predict the depth is somewhere between region 1 and region 3. Region 3 is bigger than region 1 has two readings, therefore predicted depths for pixels within region 3 have a lower confidence than predicted depths for pixels within region 1 but higher confidence than predicted depths for pixels within region 2. FIG. 331 visualizes the gathered information in a table. The table includes pixels and their depth measurements, inferred distances for each region, the confidence amount and score for depth measurements and inferred depths. In region 4 there are no measurements but because the region is between two measurements to pixels within region 3, a same depth range is assigned to the pixels in region 4 but with lower confidence. The robot may move and measure a 2 cm movement with its other sensors (e.g., IMU, odometer, OTS, etc.), therefore the table evolves to that shown in FIG. 332 after the robot moves 2 cm. Then at a time $t_2$, measurements for four other pixels $Q_1$, $Q_2$, $Q_3$ and $Q_4$ other than pixels $P_1$, $P_2$, $P_3$ and $P_4$ are taken. FIG. 333 illustrates the robot 33300 at the time $t_2$ moving 2 cm and taking depth measurements to pixels $Q_1$, $Q_2$, $Q_3$ and $Q_4$. At the time $t_2$, while a reliable depth measurement for pixels $P_1$, $P_2$, $P_3$ and $P_4$ exists, the measurements may provide some information about region 3 and region 1, information about $Q_1$, $Q_2$, $Q_3$ and $Q_4$ may be obtained with a high confidence, which may provide more information on region 4 and region 2. As such, the table evolves to that shown in FIG. 334. With more data points collected over time, the processor may separate areas more granularly. For example, FIG. 335 illustrates at a time $t_1$ and $t_2$, the TV 33500 and the table 33501 on which the TV 33500 sits are assumed to be one color depth region, however, at a time $t_3$ the processor divides the TV 33500 and the table 33501 resulting in five regions. In one example, a TOF sensor, such as a ST Micro flight sense, may take 50 readings per second. The processor may obtain four of the readings and have a 640×480 resolution camera. As such, the processor may have 640 pixels (in width) to determine a corresponding depth for. At each second, 200 accurate data points may be collected, assuming motion of the robot is ideally arranged to fill the horizontal array with data points. FIG. 336 illustrates a horizontal array 33600 with data points within the 640×480 grid 33601.

Depending on the geometry of a point measurement sensor with respect to a camera, there may be objects at near distances that do not show up within the FOV and 2D image of the camera. Some embodiments may adjust the geometry to pick up closer distances or further distance or a larger range of distance. In some embodiments, point sensing sensors may create a shiny point in the 2D image taken from FOV of the camera. Some embodiments may provide an independent set of measurement equations that may be used in conjunction with the measurement of the distance from the sensor to the point of incident. Different depth measurement sensors may use a variety of methods, such as TOF of ray of light in conjunction (or independently of) frame rate of camera, exposure time of reflection, emission time/period/frequency, emission pulse or continuous emission, amplitude of emission, phase shift upon reflection, intensity of emission, intensity of reflection/refraction, etc. As new readings come in, old readings with lower confidence may expire. This may be accomplished by using a sliding window or an arbitrator, statically (preset) or through a previously trained system. An arbitrator may assert different levels of weight or influence of some readings over others.

In embodiments, a wide line laser encompassing a wide angle may be hard to calibrate because optical components may have misalignments. A narrow line laser may be easier to make. However, a wide angle FOV may be needed to be able to create a reliable point cloud. Therefore, time multiplex of a structured light emission with some point measurements may be used. FIG. 337 illustrates examples of different layouts of sensors and CMOS sensors and their possible misalignments. FIG. 338 illustrates a line laser 33800 and camera 33801 with and without TOF sensors 33802 on each side. The narrower line laser is more accurate and easier to calibrate and the two TOF sensors 33802 on the sides may compensate for the narrower line. A wide line laser is harder to calibrate and is not as accurate on each side. The areas 33803 highlighted on each side of the line have less confidence. FIG. 339A illustrates a line laser range finder 33900 in combination with a wide angle lens camera 33901 and an image 33902 captured. Line 33903 is distorted at each end 33904 due to lens distortion, and only the middle portion 33905 of the line 33903 is usable. FIG. 339B illustrates the line laser range finder 33900 in combination with a narrow lens camera 33905 and the captured image 33906. The amount of distortion at each end of the line 33907 is less compared to the line captured by the wide lens camera 33901 and a larger area in the middle of the line 33907. FIG. 340 compares the line formation in two cameras with 45 degrees field of view 34000 and 90 degrees field of view 34001. A narrower FOV forms the lines 34002 with the same length at a further incident distance. FIG. 341A illustrates a line laser range finder 34100 in combination with a narrow lens camera 34101 and two points measurement sensors (TOFs) 34102 at each side. These two sensors 34102 add additional readings 34103 on each side when the formed line 34104 does not cover the entire frame of the camera 34101. FIG. 341B illustrates a same setup as in FIG. 341A. Here the incident plane (i.e., wall) 34106 has a bump on it which affects the line formation in the middle. FIG. 342 illustrates accurate and more confident readings of a line laser at each time stamp are kept and while readings with less confidence are retired. This way as time passes and the robot moves the overall readings have more confidence. The addition of multiple sensors (such as ToF sensors on each side of the robot) may be used to achieve a higher level of confidence in a same amount of time. In some embodiments, at each time step, some older readings may retire. This may be preset or dynamic. In a preset setting, the processor may discard anything that is, for example, 10 seconds older. Particularly in cases where new readings do not match previous readings, some older readings may be retired. In some embodiments, there could be a time decay factor assigned to readings. In some embodiments, there may be a confidence decay factor assigned to readings. In some embodiments, there may be a time and confidence decay factor assigned to readings. In some embodiments, there may be an arbitrator that decides if new information should replace old information. For example, a new depth value inferred may not be better than a depth value measured some time slots ago, as it is inferred rather than measured.

In embodiments, a neural network trained system or more traditional machine learned system may be implemented anywhere to enhance the overall robot system. For example, instead of a look up table, a trained system may provide a much more robust interpretation of how structured light is reflected from the environment. Similarly, a trained system may provide a much more robust interpretation TOF point readings and their relation to 2D images and areas of similar colored regions.

Some embodiments may use structured light and fixed geometrical lenses to project a particularly shaped beam. For example, a line laser may project a line at an angle with a CMOS to create shapes of shiny areas in an image taken with the CMOS. In some embodiments, calibrating a line laser may be difficult due to difficulty in manufacturing lenses and coupling of lenses with the imager or CMOS. For example, a line reflected at a straight wall may be straight in the middle but curved at the sides. Therefore, the far right readings and the far left readings may be misleading and introduce inaccurate information. In such cases, only readings corresponding to the middle of the line may be used while those corresponding to the sides of the line are ignored. In such cases the FOV may be too narrow for a point cloud to be useful. However, data may be combine as the robot rotates or translates to expand the FOV. FIG. 343 illustrates readings of a line laser by CMOS 34300, different depths appearing higher or lower. Line laser readings may be inaccurate at far ends 34301 of the line. In these cases, only a middle part 34302 of the line may be used in measuring depth and while the remaining portions of the line are ignored.

Some embodiments may combine images or data without structured light taken at multiplexed time intervals. FIG. 344 illustrates line laser readings 34400 and regions 34401 based on the pixel intensities and colors. In a next time slot, depth on each side 34402 of the frame is inferred with low confidence based on the regions of the 2D image while depth in the middle of the frame 34403 are measured with high confidence. Some embodiments may extrapolate the depth readings from the line laser into other regions based on the pixel intensities and colors (grey or RGB or both). FIG. 345 illustrates line laser 34500, RGB 2D image 34501 and point depth measurement 34502, each taken in a separate time slot, may be combined together. Some embodiments may use statistics and probabilistic methods to enhance predictions or inferences rather than deterministic look up tables. FIG. 346A illustrates a structured light in the form of a circle and how the diameter of the circle varying at far and close distances. FIG. 346B illustrates a structured light in the form of a pattern and an intensity of the light varying in far and close distances. FIG. 346C illustrates a structured light in the form of a pattern and scattering of light varying for far and close distances. FIG. 347 illustrates examples of various types of patterns of structured light. In some embodiments, structured light may be projected dynamically in the same way that a projector shines an image on a screen or wall. The structured light does not have to be a line or circle, it may take any form or may be a pattern or series of patterns. Projections of the structured light may be synched up with the frame rate of a CMOS. In some embodiments, light may be directed to sweep the scene. For example, a line, a circle, a grid, a sweep of rows and columns, etc. may be emitted. FIG. 348 illustrates light directed to sweep a scene. In this case the direction of sweep is from left to right and top to bottom.

One useful structured light pattern may comprise the image from a moment ago. The image may be projected onto the environment. As the robot moves, projecting an image from a split second ago or illuminating the environment with an image that was taken a split second ago and comparing the illuminated scene with a new image without illumination theoretically creates a small discrepant image which has some or all of its features enhanced. FIG. 349 illustrates a robot 34900 with a camera 34901 and a projector 34902. At one time slot the camera 34901 captures an image of the environment 34903. At the next time slot, projector 34902 projects the previously captured image 34904 on the environment and the camera captures an image of the scene 34905 illuminated with the image of the past time slot. The difference in illuminated areas may help in measuring the depth. Some embodiments may project the opposite of the image or part of the image or a specific color channel of the image or a most useful part of the image, such as the extracted features. FIG. 350 illustrates a robot 35000 with a camera 35001 and a projector 35002. At one time slot, the camera 35001 captures an image of the environment 35003. At the next time slot, projector 35002 projects features extracted from the previously taken image 35004 on the environment and camera 35001 captures an image of the scene 35005 illuminated with the image of the past time slot comprising only extracted features. The difference in illuminated areas may help in measuring depths. In another example, features may be kept dark while everything else in the image is illuminated or a sequence of illumination is played or a sequence of light illumination may sweep the environment.

In embodiments, a trained neural network (or simple ML algorithm) may learn to play a light pattern such that the neural network may better make sense of the environment. In another case, the neural network may learn what sequence/pattern/resolution to play for different scenarios or situations to yield a best result. With a large set of training data points computation logic may be formed which is much more robust than manually crafted look up tables. Using regressors, training neural networks makes it possible to select a pattern of measurement. For example, a system trained in an environment comprising chairs and furniture may learn the perimeter and structural parts of the indoor environment tend to have low fluctuations in their depth readings based on training with tens of hundred million of data sets. However, large fluctuations may be observed in internal areas. For example, the processor of the robot may observe an unsmooth perimeter, however, the processor may infer that there is likely an obstacle in the middle area occluding the perimeter based on what was learned from training. In some embodiments, the robot may navigate to see beyond an occluding obstacle. Training may help find a most suitable sequence from a set of possibilities (with or without constraints). FIG. 351 illustrates a processor of trained robot 35100 observing a large fluctuation 35101 compared to data set collected in the training phase, which in this case represents an internal obstacle 35102.

In some embodiments, the search to find a suitable match between real time observation and trainings may be achieved using simulated annealing methods of predictions based on optimization. The arrangements of neurons and type of network and type of learning may be adjusted based on the needs of the application. For example, at the factory, development, or research stages, the training phase may mostly rely on supervised methods. Providing labeled examples during run time, the training phase may rely on reinforcement methods, learning from experience, unsupervised methods, or general action and classification. Run time may have one or more training sessions that may be user assisted or autonomous.

In some embodiments, training may be used to project light or illumination in a way to better understand depths. In embodiments, a structured light may be projected intelligently and directed at a certain portion of the room purposefully to increase information about an object, such as tier depth, resolution of the depth, static or dynamic nature of the obstacle, perimeter or structural nature or an internal obstacle, etc. For this purpose, a previous captured image of the environment plays a key role in how the projection may appear. For example, the act of obtaining a 2D image may indicate use of projection of a light in the 3D world such that a pixel in the 2D image is illuminated in a desired way. FIG. 352 illustrates a structured light 35200 intelligently modified to illuminate a certain portion of a 3D environment 35201 based on a given 2D image of the environment 35202.

In some embodiments, a pattern of illumination may be deferred by the scene. For example, as the robot translates, rays may be projected differently and with some predictability. Since the projection beam is likely to be directed onto grids of pixels, then a position (i,j) requiring illumination in a next time slot may be illuminated by a projector sending a light to position (i,j) of its projection range and not to other positions. However, this may be challenging when the robot is in motion. For a moving robot, the processor must predict at which coordinate to project the light onto while the robot is moving such that the illumination is seen at position (i,j). While making predictions based on 2D images is useful, spatial and depth information accumulated from prior time stamps helps the projections become even more purposeful. For example, if the robot had previously visited at least part of the scene behind a sofa the processor may make better decisions. FIGS. 353A and 353B illustrate examples of targeted illumination. Illumination may be used to determine only one depth in the regions shown in relation to the background. Therefore, the illumination must be targeted accordingly. If the robot rotates in place, illumination remains mostly the same. As the robot translates (or translates and rotates) the need for illumination changes and is more obvious. In this example, illumination is needed such that depth values of the three objects may be determined in relation to the background. In FIG. 353A the targeted illumination 35300 is directed at the sofa 35301 since coffee table 35302 and TV 35303 are blocked by the sofa. In FIG. 353B targeted illumination 35300 is directed at all three objects.

Some embodiments may use a cold mirror or prism at angle to separate and direct different wavelength lasers to different image sensors arranged in an array. Some embodiments may use sweeping wavelength, wherein the processor starts at a seed wavelength and increases/decreases the wavelength from there. This may be done with manipulating parameters of the same emitter or with multiple emitters time-multiplexed to take turns. In embodiments, for the timing of the laser emissions to match the shutter open of sensors, hard time deadlines may be set.

Some embodiments may use polarization. An unpolarized light beam consists of waves with vibrations randomly oriented perpendicular to the light direction. When an unpolarized light hits the polarization filter, the filter allows the wave with certain vibration direction to pass through and blocks the rest of the waves. FIG. 354 illustrates unpolarized light 35400 passing through filter 35401 and wave 35402 with particular vibration that passes through the filter 35401 while the remaining waves are blocked. In reality, the intensity of the other waves are reduced as they pass through the filter. Polarization may happen through reflection and refraction. Non-metallic surfaces such as semi-transparent plastic, glass or water may polarize the light through reflection. They also partially polarize the light through refraction. For example, FIG. 355 illustrates unpolarized light 35500 that is polarized by reflection 35501 and refraction 35502 on surface of object 35503. Polarization may help with machine vision and image processing. Some of the applications of polarization include stress inspection, reducing glare and reflection for surface inspection, improving contrast in low light situations, scratch inspection on transparent and semi-transparent materials, such as glass and plastic, and object detection. FIG. 356 demonstrates some polarization applications for image processing that are useful for robot vision. A first traditional polarization solution may use several cameras with different polarization filters assigned to each camera. For example, FIG. 357A illustrates three cameras 35700 and three corresponding filters 35701. This system uses more components, making the system costlier. Also, due to the use of three or more cameras, there is distortion in the captured images. A second traditional polarization solution may use one camera with several filters rotating, each to be placed in front of the lens mechanically. For example, FIG. 357B illustrates a camera 35702 and rotating filters 35703. Since this system relies on mechanically moving parts, there are always some inaccuracies. Also, there may be some time delay between polarizing filters. A new method proposed herein may use a polarized sensor to address previous systems challenges. This system uses a single camera, Polarization happens between the lens and image sensor. A polarized sensor consists of an array of micro lenses, a polarizer array and an array of photodiodes that capture the image after polarization. The polarizer array consists of filters with a size of the sensor's pixel oriented 0, 45, 90 and 135 degrees adjacent to each other. Each of the four adjacent filters form a calculation unit. This calculation unit allows for the detection of all linear angles of polarized light. This is possible through comparing the rise and fall in intensities transmitted between each pixel in the four-pixel block. For example, FIG. 357C illustrates a polarizer sensor 35704 comprised of a micro lens array, a polarizer array and a pixel array, positioned adjacent to a camera 35705.

In some embodiments, the processor may use methods such as video stabilization used in camcorders and still cameras and software such as Final Cut Pro or iMovie for improving the quality of shaky hands to compensate for movement of the robot on imperfect surfaces. In some embodiments, the processor may estimate motion by computing an independent estimate of motion at each pixel by minimizing the brightness or color difference between corresponding pixels summed over the image. In continuous form, this may be determined using an integral. In some embodiments, the processor may perform the summation by using a patch-based or window-based approach. While several examples illustrate or describe two frames, wherein one image is taken and a second image is taken immediately after, the concepts described herein are not limited to being applied to two images and may be used for a series of images (e.g., video).

In embodiments, elements used in representing images that are stored in memory or processed are usually larger than a byte. For example, an element representing an RGB color pixel may be a 32-bit integer value (=4 bytes) or a 32 bit word. In embodiments, the 32-bit elements forming an image may be stored or transmitted in different ways and in different orders. To correctly recreate the original color pixel, the processor must assemble the 32-bit elements back in the correct order. When the arrangement is in order of most significant byte to least significant byte, the ordering is known as big endian, and when ordered in the opposite direction, the ordering is known as little endian.

In some embodiments, the processor may use run length encoding (RLE), wherein sequences of adjacent pixels may be represented compactly as a run. A run, or contiguous block, is a maximal length sequence of adjacent pixels of the same type within either a row or a column. In embodiments, the processor may encode runs of arbitrary length compactly using three integers, wherein $Run_i = (row_i, column_i, length_i)$. When representing a sequence of runs within the same row, the number of the row is redundant and may be left out. Also, in some applications, it may be more useful to record the coordinate of the end column instead of the length of the run. For example, the image in FIG. 358A may be stored in a file with editable text, such as that shown in FIG. 358B. P2 in the first line may indicate that the image is plain PBM in human readable text, 10 and 6 in the second line may indicate the number of columns and the number of rows (i.e., image dimensions), respectively, 255 in the third line may indicate the maximum pixel value for the color depth, and the # in the last line may indicate the start of a comment. Lines 4-9 are a 6×10 matrix corresponding with the image dimensions in FIG. 358A, wherein the value of each entry of the matrix is the pixel value. In some cases, the image in FIG. 358A may be represented with only possible values for color depth as 0 and 1, as illustrated in FIG. 88C. Then, the matrix in FIG. 358C may be represented using runs <4, 8, 3>, <5, 9, 1>, and <6, 10, 3>. According to information theory, representing the image in this way increases the value of each bit.

In some embodiments, the autonomous robot may use an image sensor, such as a camera, for mapping and navigation. In some embodiments, the camera may include a lens. Information pertaining to various types of lenses and important factors considered in using various types of lenses for cameras of the robot are described below[1].

[1] https://www.newport.com/c/plano-convex-lenses; https://www.newport-.com/c/bi-convex-lenses; http://hyperphysics.phy-astr.gsu.edu/hbase/geoopt/coma.html; https://www.newport.com/c/plano-concave-lenses; https://www.newport.com/c/bi-concave-lenses; https://www.ophiropt.com/co2-lasers-optics/focusing-lens/knowledge-center/tutorial/lens-design; https://www.thorlabs.com/newgrouppage9.com?objectgroup_id=130; https://www.thorlabs.com/Navigation.frm?Guide_ID=105; https://www.edmundoptics.com/knowledge-center/application-notes/optics/why-use-an-achroma tie-lens/; https://www.newport.com/c/achromatic-lenses; https://stason.org/TULARC/recreation/photography/lenses-faq/31-What-do-APO-and-Apochromatic-mean.html; http://hyperphysics/phy-astr.gsu.edu/hbase/geoopt/priplan.html; https://www.edmundoptics.com/knowledge-center/application-notes/optics/all-about-aspheric-lenses/; https://www.nikonusa.com/en/lear-and-explore/a/tips-and-techniques/understanding-maximum-aperture.html; https://www.edmundoptics.com/knowledge-center/application-notes/optics/what-are-cylinder-lenses; http://www.laramyk.com/wp-content/uploads/2010/05/Principles_of_Atoric_Lens_Design.pdf; https://www.oculist.net/downaton502/prof/ebook/duanes/pages/v1/v1c051b.html; https://www.endmundoptics.com/knowledge-center/application-notes/optics/understanding-ball-lenses/; https://www.shanghai-optics.com/components/custom-shapes/rod-lens/; https://www.laserfocusworld.com/optics/article/16560788/edmunds-optics-releases-axis-collimators; https://www.edmundoptics.com/f/fast-axis-collimators/14738/; https://www.edmundoptics.com/f/slow-axis-collimators/14819/; https://www.edmundoptics.com/knowledge-center/application-notes/lasers/considerations-when-using-cylinder-lenses/; http://laserlineoptics.com/powell_primer.html https://www.laserlineoptics.com/store/buyers-guide/; https://www.edmundoptics.com/knowledge-center/application-notes/lasers/an-in-depth-look-at-axicons; https://www.rp-photomics.com/gradient_index-_lenses.html; http://diverseoptics.com/optics-materials/?gclid=CjwKCAiAq8f-BRBtEiwAGr3DQs6Q_b5K9hV8luJualZwo7yuQYCwNqEIMR_MovmGyDQKwmZKNccSBoCfeAQAvD_BwE; https://www.edmundoptics.com/knowledge-center/application-notes/optics/advantages-of-fresnel-lenses/; https://www.edmundoptics.com/f/polarization-directed-flat- lenses/15038/; https://www.edmundoptics.com/f/compound-parabolic-contrators-cpcs-3213/13944/; https://www.newport.com/f/lens-tube-multi-element-lens-holders#:~:text=Complex%20Lens%20Systems, Lens%20Tunes%20Tubes%20allow%20the%20combining%20of%20several%20optical%20components%20into, %2C%20microscopes%2C%20collimators%20and%20more; https://www.thorlabs.com/newgrouppage9.cfm?objectgroup_id=6708; https://www-.global-optosigma.com/en_jp/Catlogsgno/?from=page&pnoname=AGL*ccode=W30373&dcode=&gnoname=AGL-50-50P·:~:text=Aspheric%20condenser%20lens%20is%20a, side%20is%20plano%20or%20convex.

Plano-Convex (PCX) lenses are the best choice for focusing parallel rays of light to a single point. They can be used to focus, collect and collimate light. The asymmetry of these lenses minimizes spherical aberration in situations where the object and image are located at unequal distances from the lens. Double-Convex (Bi-convex, DCX) lenses have the same radius of curvature on both sides of the lens and function similarly to plano-convex lenses by focusing parallel rays of light to a single point. As a guideline, bi-convex lenses perform with minimum aberration at conjugate ratios between 5:1 and 1:5. Outside this range, plano-convex lenses are usually more suitable. Bi-Convex lenses are the best choice when the object and image are at equal or near equal distance from the lens. Not only is spherical aberration minimized, but coma, distortion and chromatic aberration are identically canceled due to the symmetry. Coma is an aberration which causes rays from an off-axis point of light in the object plane to create a trailing "comet-like" blur directed away from the optic axis (for positive coma). A lens with considerable coma may produce a sharp image in the center of the field, but become increasingly blurred toward the edges. Plano-Concave (PCV) lenses bend parallel input rays to diverge from one another on the output side of the lens and hence have a negative focal length. They are the best choice when object and image are at absolute conjugate ratios greater than 5:1 and less than 1:5 to reduce spherical aberration, coma and distortion. Because the spherical aberration of the Plano-Concave lenses is negative, they can be used to balance aberrations created by other lenses. Bi-Concave (Double-Concave) lenses have equal radius of curvature on both sides of the lens and function similarly to plano-concave lenses by causing collimated incident light to diverge. Bi-Concave lenses are generally used to expand light or increase focal length in existing systems, such as beam expanders and projection systems, and are the best choice when the object and image are at absolute conjugate ratios closer to 1:1 with a converging input beam. Meniscus lenses have one concave surface and one convex surface. They create a smaller beam diameter, reducing the spherical aberration and beam waste when precision cutting or marking and provide a smaller spot size with increased power density at the workpiece. Positive meniscus (convex-concave) lenses are designed to minimize spherical aberration. When used in combination with another lens, a positive meniscus lens will shorten the focal length and increase the numerical aperture (NA) of the system without introducing significant spherical aberration. When used to focus a collimated beam, the convex side of the lens should face the source to minimize spherical aberration. Negative meniscus (concave-convex) lenses are designed to minimize spherical aberration. In combination with another lens, a negative meniscus lens will decrease the NA of the system. A negative meniscus lens is a common element in beam expanding applications. FIG. 359 illustrates lens types 1 to 6 in perspective, side view and cross-sectional view. FIG. 360 illustrates light behavior for lens types 1 to 6.

Additional types of lenses are further described below. For instance, some embodiments may use an achromatic lens. An achromatic lens, also referred to as an achromat, typically consists of two optical components cemented together, usually a positive low-index (crown) element and a negative high-index (flint) element. In comparison to a singlet lens, or singlet for short, which only consists of a single piece of glass, the additional design freedom provided by using a doublet design allows for further optimization of performance. Therefore, an achromatic lens will have noticeable advantages over a comparable diameter and focal length singlet. Achromatic doublet lenses are excellent focusing components to reduce the chromatic aberrations from broadband light sources used in many analytical and medical devices. Unlike singlet lenses, achromatic lenses have constant focal length independent of aperture and operating wavelength and have superior off-axis performance. They can be designed to have better efficiency in different wavelength spectrums (UV, VIS, IR). An achromatic lens comes in a variety of configurations, most notably, positive, negative, triplet, and aspherized. It is important to note that it can be a doublet (two elements) or triplet (three elements); the number of elements is not related to the number of rays for which it corrects. In other words, an achromatic lens designed for visible wavelengths corrects for red and blue, independent of it being a doublet or triplet configuration. However apochromatic lenses are designed to bring three colors into focus in the same plane. Apochromatic designs require optical glasses with special dispersive properties to achieve three color crossings. This is usually achieved using costly fluoro-crown glasses, abnormal flint glasses, and even optically transparent liquids with highly unusual dispersive properties in the thin spaces between glass elements. The temperature dependence of glass and liquid index of refraction and dispersion must be accounted for during apochromat design to assure good optical performance over reasonable temperature ranges with only slight re-focusing. In some cases, apochromatic designs without anomalous dispersion glasses are possible.

FIG. 361A illustrates an achromatic in perspective, side and cross section view. FIGS. 361B and 361C illustrate light behavior on the positive and negative achromatic lenses. FIG. 361D illustrates an achromatic triplet lens. FIG. 362 compares the differences between a PCX lens and an achromatic lens on chromatic aberration. On the PCX lens, red and blue rays do not focus on the same point while achromatic lens corrects this aberration. FIG. 363 compares the differences between a DCX and an achromatic lens on spherical aberration. FIG. 364 illustrates an example of apochromatic lens correcting three wavelengths (colors) aberration. FIG. 365 illustrates a triplet achromatic lens. Any of the radius surfaces may be aspherized. An aspherized achromatic lens is cost-effective featuring excellent correction for both chromatic and spherical aberrations, creating an economical way to meet the stringent imaging demands of today's optical and visual systems. Relays, condensing systems, high numerical aperture imaging systems, and beam expanders are a few examples of lens designs that could improve with the aid of an aspherized achromatic lens. FIG. 366 illustrates each element in an achromatic lens fabricated from different material. Use of three different materials reduces pincushion distortion as well as chromatic and spherical aberration.

FIG. 367 illustrates a thick lens mode. Effective focal length is the distance between focal point and its corresponding principal point (center of principal plane). The principal planes are two hypothetical planes in a lens system at which all the refraction can be considered to happen. For a given set of lenses and separations, the principal planes are fixed and do not depend upon the object position.

In some embodiments, the lens may be aspheric. An aspheric or asphere lens is a lens whose surface profiles are not portions of a sphere or cylinder. In photography, a lens assembly that includes an aspheric element is often called an aspherical lens. The complex surface profile of the asphere lens may reduce or eliminate spherical aberration, compared to a simple lens. A single aspheric lens can often replace a much more complex multi-lens system. The resulting device is smaller and lighter, and sometimes cheaper than the multi-lens design. Aspheric elements are used in the design of multi-element wide-angle and fast normal lenses to reduce aberrations. Small molded aspheres are often used for collimating diode lasers. FIG. 368 illustrates an example of bi-convex aspheric lens.

Some embodiments may use pinholes. Pinholes in fact are not lenses. They are devices to guide the light through tiny holes to the image sensor. Small size of the hole means a very high aperture, therefore the image sensor needs a high amount of light or longer time to form the image. The resulting image is not sharp compared to conventional lenses and usually it contains a heavy vignetting around the edges. Overall this device is more useful on the artistic side. Shape of the hole itself will affect the highlights in the image (e.g., bokeh shape). FIG. 369 illustrates an example of a wide-angle pinhole.

Some embodiments may use a cylindrical lens. A cylindrical lens is a lens which focuses light into a line instead of a point, as a spherical lens would. The curved face or faces of a cylindrical lens are sections of a cylinder, and focus the image passing through it into a line parallel to the intersection of the surface of the lens and a plane tangent to it. The lens compresses the image in the direction perpendicular to this line, and leaves it unaltered in the direction parallel to it (in the tangent plane). This can be helpful when image aspect ratio is not as important. For example, a robot can use a smaller sensor (vertically shorter) to obtain a skewed image and use that image data directly or interpolate it if needed for processing. FIG. 370 illustrates examples of convex and concave cylindrical lenses. FIG. 371 illustrates a cylindrical lens only changing the image scale in one direction and instead of focal point a focal line with cylindrical lenses.

Some embodiments may use a toric lens. A toric lens is a lens with different optical power and focal length in two orientations perpendicular to each other. One of the lens surfaces is shaped like a cap from a torus, and the other one is usually spherical. Such a lens behaves like a combination of a spherical lens and a cylindrical lens. Toric lenses are used primarily in eyeglasses, contact lenses and intraocular lenses to correct astigmatism. They can be useful when the image needs to be scaled differently in two directions. FIG. 372 illustrates a toric lens as a section of torus and the curvature differing in vertical and horizontal directions. FIG. 373 compares a toric lens with a spherical lens and a cylindrical lens. Notice how the vertical and horizontal curve varies in each lens. In the spherical lens, horizontal and vertical curves are equal while in the toric lens they vary.

In the cylindrical lens the horizontal curve turns to a straight line meaning there is no image distortion in that direction.

Some embodiments may use ball lenses. Ball lenses are great optical components for improving signal coupling between fibers, emitters, and detectors because of their short positive focal lengths. They are also used in endoscopy, bar code scanning, ball pre-forms for aspheric lenses, and sensor applications. Ball lenses are manufactured from a single substrate of glass and can focus or collimate light, depending upon the geometry of the input source. Half-ball lenses are also common and can be interchanged with full ball lenses if the physical constraints of an application require a more compact design. FIG. 374 illustrates examples of ball and half ball lenses. FIG. 375 demonstrates elements of a ball lens, including its principal plane, effective and back focal lengths. FIG. 376 illustrates a ball lens used for laser to fiber optic coupling. When coupling light from a laser into a fiber optic, the choice of ball lens is dependent on the NA (numerical aperture) of the fiber and the diameter of the laser beam, or the input source. The diameter of the laser beam is used to determine the NA of the ball lens. The NA of the ball lens must be less than or equal to the NA of the fiber optic in order to couple all of the light. The ball lens is placed at its back focal length from the fiber. FIG. 377 illustrates two ball lenses used for coupling two fiber optics with identical NA.

Some embodiments may use a rod lens. A Rod lens is a special type of cylinder lens, and is highly polished on the circumference and ground on both ends. Rod lenses perform in a manner analogous to a standard cylinder lens, and can be used in beam shaping and to focus collimated light into a line. FIG. 378 illustrates an example of rod lens Fast Axis Collimator (FAC). Fast Axis Collimators are compact, high performance aspheric cylindrical lenses designed for beam shaping or laser diode collimation applications. The aspheric cylindrical designs and high numerical apertures allow for uniform collimation of the entire output of a laser diode while maintaining high beam quality. FIG. 379 illustrates an example of fast axis collimator.

Some embodiments may use a Slow Axis Collimator. Slow Axis Collimators consist of a monolithic array of cylindrical lenses designed to collimate the individual emitters of a laser bar. To meet an application's unique collimation needs, Slow Axis Collimators can also be used with Fast Axis Collimators for custom collimation combinations. FIG. 380 illustrates an example of slow axis collimator. FIG. 381 illustrates FAC and SAC lenses used to collimate beams from a laser diode bar. FIG. 382A illustrates cylindrical lens plano and power axis. It also shows the cylindrical lens can have other form factors like circular shape. In FIG. 382B, note that inaccurate cuts in cylindrical lenses may cause errors and aberrations on the lens performance. Here, the circle cut center is not aligned with the lens power surface axis.

In some embodiments, there may be errors and aberration in cylindrical lenses. In an ideal cylinder, the planar side of the lens is parallel to the cylinder axis. Angular deviation between the planar side of the lens and the cylinder axis is known as the wedge. This angle is determined by measuring the two end thicknesses of the lens and calculating the angle between them. Wedge leads to an image shift in the plano axis direction. FIG. 383 illustrates the wedge error in 3D and top view Centration. The optical axis of the curved surface is parallel to the edges of the lens in an ideal cylinder lens. The centration error of a cylinder lens is an angular deviation of the optical axis with respect to the edges of the lens. This centration angle (ca) causes the optical and mechanical axes of the lens to no longer be collinear, leading to beam deviation. If the edges of the lens are used as a mounting reference, this error can make optical alignment very difficult. However, if the edges of the lens are not relied on for mounting reference, it is possible to remove this error by decentering the lens in the correct direction. The larger the diameter of a cylinder lens, the larger the associated edge thickness difference for a given centration angle. FIG. 384 illustrates centration error in 3D and side view. Axial twist is an angular deviation between the cylinder axis and the edges of a lens. Axial twist represents a rotation of the powered surface of the cylinder lens with respect to the outer dimensions, leading to a rotation of the image about the optical plane. This is especially detrimental to an application when rectangular elements are secured by their outer dimensions. Rotating a cylinder lens to realign the cylinder axis can counteract axial twist. FIG. 385 illustrates axial twist error in 3D and side view.

Some embodiments may form a light sheet using two cylindrical lenses. A light sheet is a beam that diverges in both the X and the Y axes. Light sheets include a rectangular field orthogonal to the optical axis, expanding as the propagation distance increases. A laser line generated using a cylinder lens can also be considered a light sheet, although the sheet has a triangular shape and extends along the optical axis. To create a true laser light sheet with two diverging axes, a pair of cylinder lenses orthogonal to each other are required. Each lens acts on a different axis and the combination of both lenses produces a diverging sheet of light. FIG. 386 demonstrates the process of forming a light sheet using two cylindrical lenses.

Some embodiments may circularize a beam. A laser diode with no collimating optics will diverge in an asymmetrical pattern. A spherical optic cannot be used to produce a circular collimated beam as the lens acts on both axes at the same time, maintaining the original asymmetry. An orthogonal pair of cylinder lenses allows each axis to be treated separately. To achieve a symmetrical output beam, the ratio of the focal lengths of the two cylinder lenses should match the ratio of the X and Y beam divergences. Just as with standard collimation, the diode is placed at the focal point of both lenses and the separation between the lenses is therefore equal to the difference of their focal lengths. Mag (magnification power) is calculated by dividing the focal length of the second lens (f2) by the focal length of the first one (f1), Mag=f2/f1. FIG. 387 illustrates the above process.

Some embodiments may use a Powell lens. The Powell lens resembles a round prism with a curved roof line. The lens is a laser line generator, stretching a narrow laser beam into a uniformly illuminated straight line. FIG. 388 illustrates an example of Powell lens and its features. A cylinder lens produces a poorly illuminated line, one limited by the non-uniform, Gaussian laser beam. The Powell lens' rounded roof is in fact a complex two-dimensional aspheric curve that generates a tremendous amount of spherical aberration that redistributes the light along the line; decreasing the light in the central area while increasing the light level at the line's ends. The result is a very uniformly illuminated line used in all manner of machine vision applications; from bio-medical and automobile assembly. FIG. 389 illustrates the difference in power distribution between normal cylindrical lens and Powell lens. FIG. 390 illustrates examples of Powell lenses with different fan angles designed for different laser beam widths.

Some embodiments may use an axicon. An Axicon is a conical prism defined by its alpha (ca) and apex angles. Unlike a converging lens (e.g., a plano-convex (PCX), double-convex (DCX), or aspheric lens), which is designed to focus a light source to a single point on the optical axis, an axicon uses interference to create a focal line along the optical axis. Within the beam overlap region (called the depth of focus, DOF), the axicon can replicate the properties of a Bessel beam, a beam composed of rings equal in power to one another. The Bessel beam region may be thought of as the interference of conical waves formed by the axicon. FIG. 391 illustrates examples of convex and concave axicons.

FIG. 392 illustrates Bessel beam features of an axicon. Unlike a Gaussian beam which deteriorates over distance, a Bessel beam is non-diffracting, maintaining an unchanged transversal distribution as it propagates. Although a true Bessel beam would require an infinite amount of energy to create, an axicon generates a close approximation with nearly non-diffracting properties within the Axicon's depth of focus (DOF). DOF is a function of the radius of the beam entering the axicon (R), the axicon's index of refraction (n), and the alpha angle (ca), wherein $$DOF = \frac{R\sqrt{1-n^2\sin^2\alpha}}{\sin\alpha\cos\alpha\left(n\cos\alpha - \sqrt{1-n^2\sin^2\alpha}\right)} \approx \frac{R}{(n-1)\alpha}.$$

The simplified equation assumes that the angle of refraction is small and becomes less accurate as a decreases. Beyond the axicon's depth of focus, a ring of light is formed. The thickness of the ring (t) remains constant and is equivalent to R, wherein $$t = \frac{R\sqrt{1-n^2\sin^2\alpha}}{\cos\alpha\left(n\sin^2\alpha + \cos\alpha\sqrt{1-n^2\sin^2\alpha}\right)} \approx R.$$

The simplified equation again assumes small angles of refraction. The diameter of the ring is proportional to distance; increasing length from lens output to image (L) will increase the diameter of the ring ($d_r$), and decreasing distance will decrease it. The diameter of the ring $$d_r = 2L\left[\frac{\sin\alpha\left(n\cos\alpha - \sqrt{1-n^2\sin^2\alpha}\right)}{n\sin^2\alpha + \cos\alpha\sqrt{1-n^2\sin^2\alpha}}\right] \approx 2L\tan[(n-1)\alpha]$$

is approximately related to twice the length, the tangent of the product of the refractive index (n), and the alpha angle (α).

FIG. 393 illustrates the generated bessel beam diameter increasing relative to the distance of the image plane and the lens. Notice the thickness of the beam remains the same. FIG. 394 illustrates a square microlens array. They can create a spot pattern & a square flat top pattern. They are used in fiber coupling, Laser ablation, drilling, welding, etc. FIG. 395 illustrates a combination of two lens arrays and a bi-convex lens homogenizing the beam. The first array LA1 divides the incident beam into multiple beamlets. The second array LA2 in combination with the spherical lens FL superimposes the image of each of the beamlets onto homogenized plane FP (focal plane). Dimension of beam in the homogenization plane may be determined using $$D_{FT} = P_{LA1} \times \frac{f_{FL}}{f_{LA1} \times f_{LA2}}[(f_{LA1} + f_{LA2}) - a_{L2}]$$

and divergence θ (half angle) after the homogenized plane may be determined using $$\tan\theta = \frac{\Theta + D_{FT}}{2f_{FT}}.$$

In ordinary lenses, the radially varying phase delay is produced by varying the thickness of the lens material. An alternative operation principle is that of a gradient index lens (GRIN lens), where the thickness is usually constant, while the refractive index varies in the radial direction. It is also possible (but not common) to combine both operation principles, i.e., to make GRIN lenses with curved surfaces. Typical GRIN lenses have a cylindrical rod shape, although a wide range of other shapes is possible. There is a range of quite different optical fabrication methods for GRIN lenses. One example includes ion exchange methods. If a glass material is immersed into a liquid, some ions of the glass may be exchanged with other ions in the liquid, such that the refractive index is modified. Applying such a technique to the mantle of a cylindrical glass part can lead to the required refractive index profile. Another example is partial polymerization wherein a polymer material may be exposed to radially varying doses of ultraviolet light which causes polymerization. Another example is direct laser writing. The refractive index of various transparent media can also be changed with point-by-point laser writing, where the exposure dose is varied in the radial direction. One example is chemical vapor deposition. Glass materials can be deposited from a chemical vapor, where the chemical composition is varied during the process such that the required index gradient is obtained. Another example is neutron irradiation can be used to generate spatially varying refractive index modifications in certain boron-rich glasses. GRIN lenses can be used for a wide range of applications such as fiber collimators, where GRIN lens may be fused to a fiber end, fiber-to-fiber coupling, mode field adapters, focusing applications (e.g. optical data storage), monolithic solid-state lasers, and ophthalmology (e.g. for contact lenses with high dioptric power). Typical advantages of GRIN lenses are that they can be very small and that their flat surfaces allow simple mounting together with other optical components. In some cases, flat surfaces are cemented together in order to obtain a rugged monolithic setup. If the used fabrication method allows for precise control of the radial index variation, the performance of a GRIN lens may be high, with only weak spherical aberrations similar to those of aspheric lenses. Besides, some fabrication techniques allow for cheap mass production. FIG. 396 illustrates an example of GRIN lens. Notice how refractive index changes based on radial distance.

Some embodiments may use Fresnel lens. A Fresnel lens replaces the curved surface of a conventional lens with a series of concentric grooves, molded into the surface of a thin, lightweight plastic sheet. The grooves act as individual refracting surfaces, like tiny prisms when viewed in cross section, bending parallel rays in a very close approximation to a common focal length. Because the lens is thin, very little light is lost by absorption. Fresnel lenses are a compromise between efficiency and image quality. High groove density allows higher quality images, while low groove density yields better efficiency (as needed in light gathering applications). In infinite conjugate systems, the grooved side of the lens should face the longer conjugate. Fresnel lenses are most often used in light gathering applications, such as condenser systems or emitter/detector setups. Fresnel lenses can also be used as magnifiers or projection lenses; however, due to the high level of distortion, this is not recommended. FIG. 397 illustrates an example of Fresnel lens in 3D, side view and cross section.

Some embodiments may use Polarization Directed Flat Lenses. Polarization Directed Flat lenses are flat lenses formed with polymerized liquid crystal thin-films that create a focal length that is dependent on polarization state. These unique lenses will have either a positive or negative focal length depending on the phase of the input polarization. With right handed circularly polarized light, the lenses will produce one focal length, while left handed circularly polarized light will present a focal length with the opposite sign. Unpolarized light will produce a positive and negative focal length at the same time. Both output waves are circularly polarized and orthogonal to each other. FIG. 398 illustrates left handed and right handed circularly polarized light resulting in positive and negative focal points in this type of lens.

Some embodiments may use Compound Parabolic Concentrator (CPC). Compound Parabolic Concentrators (CPCs) are designed to efficiently collect and concentrate distant light sources. CPCs are able to accommodate a variety of light sources and configurations. Compound Parabolic Concentrators are critical components in solar energy collection, wireless communication, biomedical and defense research, or for any applications requiring condensing of a divergent light source. FIG. 399 shows a CPC lens in 3D and side view. Notice how incoming rays of light will be converged at the same point (focus point) due to parabolic shape of the lens. Some embodiments may use lens tubes. Lens tubes allow the combining of several optical components into stable and rigid assemblies and are used to create beam expanders, telescopes, microscopes, collimators, ETC. They are Ideal for Fast Prototyping of Complex Lens Systems. FIG. 400 illustrates an example of a tube system with various elements inside it. Some embodiments may use high magnification zoom lens system. Zoom Lenses are ideal for high-magnification machine vision and imaging applications, providing an optimal balance between optical performance and a large zoom range. These zoom lenses must be used with an extension tube. Combination of lenses will achieve higher or lower zoom factor. FIG. 401 illustrates an example of high magnification zoom lens in exploded view, wherein $$\text{Magnification} = \frac{\text{Image side Achromat } FL}{\text{Object side Achromat } FL}.$$

FIG. 402 illustrates the F-Number of the lens system adjusted by adjusting aperture, wherein $$F - \text{Number} = \frac{\text{Image side Achromat } FL}{\text{Aperture Diameter}}.$$

FIG. 403 illustrates an aspheric condenser lens and its features; OD: overall diameter, CT: Center thickness, ET: Edge thickness, EFL: effective focal length, BFL: back focal length, S1: surface 1 (usually aspheric), and S2: surface 2 (usually spherical). Aspheric condenser lens is a single lens for collection and condensing, in which the radius of curvature of one side is changed according to the height from the optical axis to minimize spherical aberration. The other side is plano or convex. These lenses can condense light at a short focal length superior to what can be achieved with spherical lenses.

In manufacturing small lenses for robotic camera applications, a number of considerations need to be taken into account to ensure that injection molding has ideal results, these factors are described below[2]. FIG. 404 illustrates basic injection molding machine diagram and its features. Plastic raw material is fed through the hopper. And the screw pushes the material from the hopper to the nozzle while heating elements melts the plastic. Melted plastic enters the mold through the nozzle. The clamp side moves back and the molded part is pushed outside. FIG. 405 illustrates the different molding steps on the injection molding machine. To eliminate shrinkage and warping and meet the tolerance of the product, a number of factors have to be considered including primarily, temperature, pressure, timing, cooling, material, part and mold design, and material. The temperature should be kept as low as possible with consideration to the melting point of the given material. The pressure must be controlled for both sides of the mold and the exact amount depends upon the material properties (especially viscosity and flow rate). Ideally the mold is filled at the highest pressure possible in the shortest amount of time. The holding pressure is intended to complete the filling of the mold to solidify the plastic while the mold is full, dense, and packed with material at very high pressure. The pressure can be released after the gate freezes. The injection time and injection hold time need to be considered to ensure even and complete filling of the mold and the cooling time must be slow enough to ensure that internal residual stresses aren't created. The mold opening, ejection, and part removal time also must be considered. For the design of the mold, it is important to ensure that the gates are located to ensure even a uniform flow pattern and even filling. The cooling system must also be uniform across the part.

[2] http://www.zeon.co.jp/business_e/enterprise/speplast/speplast1; https://topas.com/products/topas-coc-polymers; https://www.ogc.co.jp/e/productus/fluorene/okp.html; https://www.accuratus.com/fused.html; https://www.newport.com/f/uv-fused-silica-parallel-windwos; https://www.newport.com/c/uv-fused-silica-bi-concave-lenses; https://www.edmundoptics.com/knowledge-center/application-notes/optics/uv-vs.-ir-grade-fused-silica/; https://www.edmundoptics.com/knowledge-center/application- notes/lasers/laser-damage-threshold-testing/; https://materion.com/resource-center/product-data-and-related-literature/inorganic-chemicals/fluorides/magnesium-fluordide-mgf2-for-optical-coating; https://www.allentownoptical.com/anti-reflective-coatings/; https://www.edmundoptics.com/resource-page/application-notes/optics/all-about-aspheric-lenses;

For the design of the lens itself, uniform wall thickness is paramount therefore the material selection must be carefully decided. A photosensitive polymer can be fused with glass on one or both faces to create the product. Certain materials are more likely to warp and so those should be taken into consideration along with all of the other material properties when designing the product. Glass has excellent transmission, very low refractive index, very low birefringence, very low water absorption and heat resistance, and excellent coat adhesion; however, it also has poor impact resistance and only fair moldability. There are specific methods for molding glass which are explained below.

PMMA (acrylic) has excellent transmission, low refractive index, low birefringence, but is not as good with water absorption and is only relatively good with impact and moldability. It also has poor heat resistance and is fairly okay with coating adhesion. Polycarbonate (PC) is good with transmission but does not have a great refractive index.

It has relatively high birefringence and has low water absorption (good). It is extremely impact resistant, extremely moldable, and has a relatively good heat resistance (especially compared to PMMA). PC is fair with coating adhesion. Polystyrene has very good transmission but is poor in refraction index and poor in birefringence. It has excellent water absorption and is good with impact resistance, has excellent moldability, poor heat resistance, and has acceptable coating adhesion. Cyclo Olefin Polymer (COP) has excellent transmission, very low refractive index, very low birefringence, and very low water absorption. COP also has good impact resistance, moldability, heat resistance, and coating adhesion. Certain grades of Cyclo Olefin Polymer (COP) offer good resistance to long-term exposure to blue light and NIR wavelengths, such as those found in blue laser optical pick-up systems and 3D position sensing. Cyclo olefin Copolymer (COC) is very similar to COP in terms of material properties. Resists moisture, alcohols, acids and more for product protection in foods, medicine, and electronics. Optical Polyester (OKP) is a special polyester for optical use arising from coal chemistry. OKP has a high refractive index of 1.6 or more, extremely low birefringence, and high fluidity. Therefore, it is easy to obtain high performance injection-molded objects and films.

Fused silica is a noncrystalline (glass) form of silicon dioxide (quartz, sand). Typical of glasses, it lacks long range order in its atomic structure. It's highly cross linked three dimensional structure gives rise to its high use temperature and low thermal expansion coefficient. Some key fused silica properties include near zero thermal expansion, exceptionally good thermal shock resistance, very good chemical inertness, can be lapped and polished to fine finishes, low dielectric constant, and good UV transparency. Some typical uses of fused silica include high temperature lamp envelopes, temperature insensitive optical component supports lenses, mirrors in highly variable temperature regimes, microwave and millimeter wave components, and microwave and millimeter wave components.

UV Fused Silica glasses feature low distortion, excellent parallelism, low bulk scattering, and fine surface quality. This makes them perfectly suited for a wide variety of demanding applications, including multiphoton imaging systems, and intracavity laser applications. UV Grade Fused Silica is synthetic amorphous silicon dioxide of extremely high purity providing maximum transmission from 195 to 2100 nm. This non-crystalline, colorless silica glass combines a very low thermal expansion coefficient with good optical qualities, and excellent transmittance in the ultraviolet region. Transmission and homogeneity exceed those of crystalline quartz without the problems of orientation and temperature instability inherent in the crystalline form. It will not fluoresce under UV light and is resistant to radiation. For high-energy applications, the extreme purity of fused silica eliminates microscopic defect sites that could lead to laser damage. UV grade fused silica is manufactured synthetically through the oxidation of high purity silicon by flame hydrolysis. The UV grade demonstrates high transmittance in the UV spectrum, but there are dips in transmission centered at 1.4 μm, 2.2 μm, and 2.7 μm due to absorption from hydroxide (OH—) ion impurities. IR grade fused silica differs from UV grade fused silica by its reduced amount of OH-ions, resulting in higher transmission throughout the NIR spectrum and reduction of transmission in the UV spectrum. OH— ions can be reduced by melting high-quality quartz or using special manufacturing techniques. Developments in lasers with wavelengths around 2 μm, including thulium (2080 nm) and holmium (2100 nm), have led to many more applications utilizing lasers in the 2 μm wavelength region. 2 μm is close to one of the OH— absorption peaks in UV grade fused silica, making IR grade fused silica a much better option for 2 μm applications. The high absorption of UV grade fused silica around 2 μm will lead to heat generation and potentially cause damage. However, IR grade fused silica optical components often have a higher cost and lower availability. FIG. 406 compares transmission data for UV and IR grade fused silica for a 5 mm thick sample without Fresnel reflections.

Lasers may potentially damage the lens. The laser damage threshold (LDT) or laser induced damage threshold (LIDT) is the limit at which an optic or material will be damaged by a laser given the fluence (energy per area), intensity (power per area), and wavelength. LDT values are relevant to both transmissive and reflective optical elements and in applications where the laser induced modification or destruction of a material is the intended outcome. LDT can be categorized as thermal, dielectric breakdown, and avalanche breakdown. For long pulses or continuous wave lasers the primary damage mechanism tends to be thermal. Since both transmitting and reflecting optics both have non-zero absorption, the laser can deposit thermal energy into the optic. At a certain point, there can be sufficient localized heating to either affect the material properties or induce thermal shock. Dielectric breakdown occurs in insulating materials whenever the electric field is sufficient to induce electrical conductivity. Although this concept is more common in the context of DC and relatively low frequency AC electrical engineering the electromagnetic fields from a pulsed laser can be sufficient to induce this effect, causing damaging structural and chemical changes to the optic. For very short, high power pulses, avalanche breakdown can occur. At these exceptionally high intensities, multiphoton absorption can cause the rapid ionization of atoms of the optic. This plasma readily absorbs the laser energy, leading to the liberation of more electrons and a run-away "avalanche" effect, capable of causing significant damage to the optic.

Anti-Reflection coatings may be deposited onto optical surfaces to reduce specular reflectivity. Anti-Reflection coatings are comprised of a single layer or multiple layers. These designs are optimized to create destructive interference with respect to the reflected light. This design approach will allow the maximum amount of light transmission without compromising image quality. FIG. 407 is an example of a typical multilayer anti-reflection coating. The AR coatings range from the UV (ultraviolet), VIS (visible) and IR (infrared). They can be optimized to ensure maximum throughput at a specific wavelengths of different laser sources (including HeNe, diode and Nd:YAG). Magnesium fluoride produces a highly pure, dense material form that is particularly well suited for optical coating. $MgF_2$, a low index coating material, has been used for many years in anti-reflection and multilayer coatings. It is insoluble and hard if deposited on hot substrates. Anti-reflection coatings are made from extremely thin layers of different dielectric materials that are applied in a high vacuum onto both surfaces of the lens. The quality of the AR depends upon the number of layers applied to the lens. The early coatings had only a single layer of magnesium fluoride or perhaps two but nowadays most coatings have at least six layers and are known as broadband coatings. The anti-reflection stack is the most important part of the Reflection Free lens. It is made up of quarter wavelength interference layers of alternating high and low index materials. The usual materials are silicon dioxide with a low refractive index of 1.45 and titanium dioxide with the higher refractive index of 2.25.

Various factors must be considered to eliminate shrinkage and warping and meet the tolerances of the lens. For example, temperature, particularly the melting point for the given material and keep the temperature as low as possible. Also, pressure has to be controlled for both sides, the exact amount depends on the material properties (especially viscosity and flow rate). Ideally the mold is filled with the highest pressure in the shortest amount of time. The holding pressure is intended to complete the filling of the mold to solidify the plastic while the mold is full, dense, and packed with material at high pressure. Removal of the pressure after the gate freeze. Another factor is distance such as travel of the moving part. Another factor is time including mold open time, ejection time, part removal time, cooling time (slow enough to avoid creating residual stresses in the part), injection hold time, and injection time (even and complete filling of the mold). Other factors are uniform wall thickness to facilitate a more uniform flow and cooling across the part; uniform flow pattern (i.e., gate design and locations); cooling system that is uniform across the part; and material selection to avoid materials that are more likely to warp.

Some embodiments may use precision glass molding. Precision glass molding is a manufacturing technique where optical glass cores are heated to high temperatures until the surface becomes malleable enough to be pressed into the mold. After the cores cool down to room temperature, the resulting lenses maintain the shape of the mold. Creating the mold has high initial startup costs because the mold must be precisely made from very durable material that can maintain a smooth surface, while the mold geometry needs to take into account any shrinkage of the glass in order to yield the desired aspheric shape. However, once the mold is finished the incremental cost for each lens is lower than that of standard manufacturing techniques for aspheres, making this technique a great option for high volume production. This method can be used for both spherical and aspherical lenses. FIG. 408 shows the steps of this process, which include glass core is placed on the mold; glass core is heated to high temperature to become malleable; while heating continues to halves of the mold are pressed together to form the glass core; force cooling results the glass to keep its form; and release the part (lens) of the mold.

Some embodiments may use precision polishing. This method is more suitable for aspheric lenses and low volume production. In precision polishing, small contact areas on the order of square millimeters are used to grind and polish aspheric shapes. These small contact areas are adjusted in space to form the aspheric profile during computer controlled precision polishing. If even higher quality polishing is required, magneto-rheological finishing (MRF) is used to perfect the surface using a similar small area tool that can rapidly adjust the removal rates to correct errors in the profile. FIG. 409 shows a schematic of computer controlled precision polishing. FIG. 410 shows a schematic of a MRF machine. Some embodiments may use diamond turning. Similar to grinding and polishing, single point diamond turning (SPDT) can be used to manufacture single lenses one at a time. However, the tool size used in SPDT is significantly smaller than in precision polishing, producing surfaces with improved surface finishes and form accuracies. Material options are also much more limited with SPDT then with other techniques because glass cannot be shaped through diamond turning, whereas plastics, metal, and crystals can. SPDT can also be used in making metal molds utilized in glass and polymer molding.

Some embodiments may use molded polymer aspheres. Polymer molding begins with a standard spherical surface, such as an achromatic lens, which is then pressed onto a thin layer of photopolymer in an aspheric mold to give the net result of an aspheric surface. This technique is useful for high volume precision applications where additional performance is required and the quantity can justify the initial tooling costs. Polymer molding uses an aspheric mold created by SPDT and a glass spherical lens. The surface of the lens and the injected polymer are compressed and UV cured at room temperature to yield an aspherized lens. Since the molding happens at room temperature instead of at a high temperature, there is far less stress induced in the mold, reducing tooling costs and making the mold material easier to manufacture. The thickness of the polymer layer is limited and constrains how much aspheric departure can exist in the resulting asphere. The polymer is also not as durable as glass, making this is an unideal solution for surfaces that will be exposed to harsh environments. FIG. 411 illustrates these process steps, which include SPDT aspheric mold and achromat, photopolymer injected to the mold, achromat compression and UV curing, and finished achromatic lens with aspheric surface.

In some embodiments, light transmitters and receivers may be used by the robot to observe the environment. In some embodiments, IR sensors transmit and receive code words. For example, code words may be used with TSOP and TSSP IR sensors to distinguish between ambient light, such as sunlight coming inside the window, and the reflection of the transmitter sensors. In some embodiments, IR sensors used in array may be arranged inside a foam holder or other holder to avoid cross talk between sensors. FIG. 412 illustrates an example of sensors 41200 and foam casings 41201 within which the sensors 41200 are positioned. The foam 41201 positioned in between sensors 41200 avoids cross talk between sensors 41200. The multiplexing allows the signals to be identified from one other. A code word may also help in distinguishing between each sensor pair. Each pair may be coded with a different code word and the receiver may only listen for its respective code word. In embodiments, different materials have different reflections, therefore, the power or brightness that is received by the receiver may not always be the same. Similarly, different textures have different reflections. Therefore, it may be concluded that the received signal strength is not a linear function of distance. Further, all transmitter and receiver sensors are not exactly the same. These sensors have a range of tolerance and when paired together, the uncertainty and range of tolerance are further increased. Each of the receivers and transmitters have a different accuracy and differences in terms of environment, reflection resulting from different surface color, texture, etc. Therefore, a one-solution fits all model using deterministic look up tables or preconfigured settings may not work.

A better solution may include a combination of preruntime training that is performed at large scale in advance of production and at factory based on a deep model and a deep reinforcement online and runtime training. This may be organized in a deep or shallow neural network model with multiple functions obtained. Further, the network may be optimized for a specific coordinate, which may address the issue of reflectivity better. Therefore, the signal received may have different interpretations in different parts of the map. At each of the points, the processor may treat the received signal with a different interpretation with respect to distance and a chance of bumping into a wall/furniture/other obstacle/person unwantedly. For example, FIG. 413 illustrates a robot 41300 emitting and receiving a signal to and from a white wall 41301 and a black wall 41302. The emitted signals 41303 and 41304 towards the white wall 41302 and black wall 41302 are similar, however, the reflected received signals 41305 and 41306 from the white wall 41302 and black wall 41302 differ as there is less reflection from the black wall 41302. Similar results in signal reflections may occur with white chair 41307 and black chair 41308. The robot either inflates an obstacle based on the understanding of the environment the robot is working within or an assumption that the robot is closer to the obstacle than it actually is. This may be applied for inner obstacles, skinny obstacles such as chair legs and table legs, stool bases, etc. In some embodiments, sensors are calibrated per location. This concept of inflation may be applied to tune maps, LIDAR discoveries, cameras, etc. This method may provide each sensor pair to be calibrated with another sensor pair in the array. As we said, this can be done based on large previously gathered data sets and/or at the manufacturing, testing, quality control, and/or runtime levels to calibrate based on the actual sensor pair parameters, an exemplary test environment, etc. This use of AI, ML, DNN, provides a superior performance over previous methods that function based deterministic and physical settings hard coded in the system of the robot.

In embodiments, illumination, shadows, and lightning may change for a bump. In some embodiments, illumination, shadow, lighting and FOV of an image captured by an image sensor of the robot may vary based on an angle of the driving surface of the robot. For example, FIG. 414 illustrates an autonomous vehicle 41400 driving along a flat surface 41401 and the FOV 41402 of the camera of the vehicle 41400 with the area of interest 41403. When the vehicle 41400 drives on angled surface 41404 or over a bump 41405, the FOV of the camera changes. For instance, when the vehicle 41400 drives over the bump 41404 the FOV of the camera changes to 41406 and only a portion 41407 of the area of interest 41403 is captured. When stitching images together, the robot may combine the images using overlapping areas, i.e., 41403 and 41407 to obtain image 41408. Image blur may occur because of a bump or sudden movement of the camera. Motion blur may even exist in a normal course of navigation but the impact is manageable.

In some embodiments, the processor of the robot may detect edges or cliffs within the environment using methods such as those described in U.S. Non-Provisional patent application Ser. Nos. 14/941,385, 16/279,699, 17/155,611, and 16/041,498, each of which is hereby incorporated by reference. In embodiments, a camera of the robot may face downwards to observe cliffs on the floors. For example, FIG. 415 illustrates an example of a robot 41500 with a camera 41501 angled downwards such that a bottom portion of obstacles, cliffs, and floor transitions may be observed. In addition, the camera faces downwards to observe the obstacles that are not as high as the robot. As the robot gets closer to or further away from these objects, depending on the angle of the camera, the images move up and down relative to previously captured images. In some embodiments, the distances to objects may be correlated to resolution of the camera, speed of the robot, and how fast the same object moves up and down in the image. This correlation may be used to train a neural network that may make sense of these changes. The higher the resolution of the camera, the higher the accuracy. In embodiments, accurate LIDAR distances may be used as ground truth in training the neural network. FIG. 416 illustrates an example of a robot 41600 with a LIDAR 41601 and a camera 41602. In this scenario, for every step the robot takes, there is a ground truth distance measured by the LIDAR that correlates with the movement of pixels captured by the camera. There is also additional information that correlates such as encoder from wheels (odometry), gyroscope data, accelerometer data, compass data, optical tracking sensor data, etc. All of the regions of the image move differently and with different speeds. It may be difficult to manually make sense of these data but with 3D LIDAR data used during the training period, meaningful information may be extracted where data sizes are large. In addition to feature detections and tracking features, patterns emerge from monitoring entropy of pixel values in different regions of an image stream as the robot moves.

In some embodiments, floor data collected by sensors at each time point form a three-dimensional matrix. A two-dimensional slice of the three-dimensional matrix may include data indicating locations of different types of flooring at a particular time point. In observing data corresponding to different time points, the data may vary. A three-dimensional matrix may represent locations of different types of flooring at a particular time points. Each two-dimensional slice of the three-dimensional matrix indicates the locations of different types of flooring at different time points. In observing a particular two-dimensional slice, data indicating locations of different types of flooring at a particular time point are provided. In some embodiments, the processor may execute a process similar to that described above to determine a best scenario for the locations of different types of flooring. Initially, the location 7400 of hardwood flooring in the map 7401 of the environment may have a lower certainty, as shown by the shaded areas surrounding location 7400. In applying a similar process 7402 as described above, the certainty of the location 7400 of the hardwood flooring is increased, as shown by the defined location 7400 after process 7402. In some embodiments, an application of a communication 7403 paired with the robot displays the different types of flooring in the map 7401 of the environment.

In embodiments, an application of a communication device (e.g., mobile phone, tablet, laptop, remote, smart watch, etc., as referred to throughout herein, may be paired with the robot. In some embodiments, the application of the communication device includes at least a portion of the functionalities and techniques of the application described in U.S. Non-Provisional patent application Ser. Nos. 15/449,660, 16/667,206, 15/272,752, 15/949,708, 16/277,991, and 16/667,461, each of which is hereby incorporated by reference. In some embodiments, the application is paired with the robot using pairing methods described in U.S. Non-Provisional patent application Ser. No. 16/109,617, which is hereby incorporated by reference.

In some embodiments, the system of the robot may communicate with an application of a communication device via the cloud. In some embodiments, the system of the robot and the application may each communicate with the cloud. FIG. 417 illustrates an example of communication between the system of the robot and the application via the cloud. In some cases, the cloud service may act as a real time switch. For instance, the system of the robot may push its status to the cloud and the application may pull the status from the cloud. The application may also push a command to the cloud which may be pulled by system of the robot, and in response, enacted. The cloud may also store and forward data. For instance, the system of the robot may constantly or incrementally push or pull map, trajectory, and historical data. In some cases, the application may push a data request. The data request may be retrieved by the system of the robot, and in response, the system of the robot may push the requested data to the cloud. The application may then pull the requested data from the cloud. The cloud may also act as a clock. For instance, the application may transmit a schedule to the cloud and the system of the robot may obtain the schedule from the cloud. In embodiments, the methods of data transmission described herein may be advantageous as they require very low bandwidth.

In some embodiments, the map of the area, including but not limited to doorways, sub areas, perimeter openings, and information such as coverage pattern, room tags, order of rooms, etc. is available to the user through a graphical user interface (GUI) such as a smartphone, computer, tablet, dedicated remote control, or any device that may display output data from the robot and receive inputs from a user. Through the GUI, a user may review, accept, decline, or make changes to, for example, the map of the environment and settings, functions and operations of the robot within the environment, which may include, but are not limited to, type of coverage algorithm of the entire area or each subarea, correcting or adjusting map boundaries and the location of doorways, creating or adjusting subareas, order of cleaning subareas, scheduled cleaning of the entire area or each subarea, and activating or deactivating tools such as UV light, disinfectant sprayer, and steam. User inputs are sent from the GUI to the robot for implementation. For example, the user may use the application to create boundary zones or virtual barriers and cleaning areas. In some embodiments, the user may use the application to also define a task associated with each zone (e.g., no entry, steam cleaning, UV cleaning). In some cases, the task within each zone may be scheduled using the application (e.g., UV cleaning hospital beds on floor 2 on Tuesdays at 10:00 AM and Friday at 8:00 PM). In some embodiments, the robot may avoid entering particular areas of the environment. In some embodiments, a user may use an application of a communication device (e.g., mobile device, laptop, tablet, smart watch, remote, etc.) and/or a graphical user interface (GUI) of the robot to access a map of the environment and select areas the robot is to avoid. In some embodiments, the processor of the robot determines areas of the environment to avoid based on certain conditions (e.g., human activity, cleanliness, weather, etc.). In some embodiments, the conditions are chosen by a user using the application of the communication device.

In some embodiments, the application may display the map of the environment as it is being built and updated. The application may also be used to define a path of the robot and zones and label areas. In some cases, the processor of the robot may adjust the path defined by the user based on observations of the environment or the use may adjust the path defined by the processor. In some cases, the application displays the camera view of the robot. This may be useful for patrolling and searching for an item. In some embodiments, the user may use the application to manually control the robot (e.g., manually driving the robot or instructing the robot to navigate to a particular location).

In some embodiments, the processor of the robot may transmit the map of the environment to the application of a communication device (e.g., for a user to access and view). In some embodiments, the map of the environment may be accessed through the application of a communication device and displayed on a screen of the communication device, e.g., on a touchscreen. In some embodiments, the processor of the robot may send the map of the environment to the application at various stages of completion of the map or after completion. In some embodiments, the application may receive a variety of inputs indicating commands using a user interface of the application (e.g., a native application) displayed on the screen of the communication device. Some embodiments may present the map to the user in special-purpose software, a web application, or the like. In some embodiments, the user interface may include inputs by which the user adjusts or corrects the map perimeters displayed on the screen or applies one or more of the various options to the perimeter line using their finger or by providing verbal instructions, or in some embodiments, an input device, such as a cursor, pointer, stylus, mouse, button or buttons, or other input methods may serve as a user-interface element by which input is received. In some embodiments, after selecting all or a portion of a perimeter line, the user may be provided by embodiments with various options, such as deleting, trimming, rotating, elongating, shortening, redrawing, moving (in four or more directions), flipping, or curving, the selected perimeter line. In some embodiments, the user interface presents drawing tools available through the application of the communication device. In some embodiments, a user interface may receive commands to make adjustments to settings of the robot and any of its structures or components. In some embodiments, the application of the communication device sends the updated map and settings to the processor of the robot using a wireless communication channel, such as Wi-Fi or Bluetooth.

In some embodiments, the map generated by the processor of the robot (or one or remote processors) may contain errors, may be incomplete, or may not reflect the areas of the environment that the user wishes the robot to service. By providing an interface by which the user may adjust the map, some embodiments obtain additional or more accurate information about the environment, thereby improving the ability of the robot to navigate through the environment or otherwise operate in a way that better accords with the user's intent. For example, via such an interface, the user may extend the boundaries of the map in areas where the actual boundaries are further than those identified by sensors of the robot, trim boundaries where sensors identified boundaries further than the actual boundaries, or adjusts the location of doorways. Or the user may create virtual boundaries that segment a room for different treatment or across which the robot will not traverse. In some cases where the processor creates an accurate map of the environment, the user may adjust the map boundaries to keep the robot from entering some areas.

In some embodiments, the application suggests a correcting perimeter. For example, embodiments may determine a best-fit polygon of a perimeter of the (as measured) map through a brute force search or some embodiments may suggest a correcting perimeter with a Hough Transform, the Ramer-Douglas-Peucker algorithm, the Visvalingam algorithm, or other line-simplification algorithm. Some embodiments may determine candidate suggestions that do not replace an extant line but rather connect extant segments that are currently unconnected, e.g., some embodiments may execute a pairwise comparison of distances between endpoints of extant line segments and suggest connecting those having distances less than a threshold distance apart. Some embodiments may select, from a set of candidate line simplifications, those with a length above a threshold or those with above a threshold ranking according to line length for presentation. In some embodiments, presented candidates may be associated with event handlers in the user interface that cause the selected candidates to be applied to the map. In some cases, such candidates may be associated in memory with the line segments they simplify, and the associated line segments that are simplified may be automatically removed responsive to the event handler receive a touch input event corresponding to the candidate. Suggestions may be determined by the robot, the application executing on the communication device, or other services, like a cloud-based service or computing device in a base station.

In embodiments, perimeter lines may be edited in a variety of ways such as, for example, adding, deleting, trimming, rotating, elongating, redrawing, moving (e.g., upward, downward, leftward, or rightward), suggesting a correction, and suggesting a completion to all or part of the perimeter line. In some embodiments, the application may suggest an addition, deletion or modification of a perimeter line and in other embodiments the user may manually adjust perimeter lines by, for example, elongating, shortening, curving, trimming, rotating, translating, flipping, etc. the perimeter line selected with their finger or buttons or a cursor of the communication device or by other input methods. In some embodiments, the user may delete all or a portion of the perimeter line and redraw all or a portion of the perimeter line using drawing tools, e.g., a straight-line drawing tool, a Bezier tool, a freehand drawing tool, and the like. In some embodiments, the user may add perimeter lines by drawing new perimeter lines. In some embodiments, the application may identify unlikely boundaries created (newly added or by modification of a previous perimeter) by the user using the user interface. In some embodiments, the application may identify one or more unlikely perimeter segments by detecting one or more perimeter segments oriented at an unusual angle (e.g., less than 25 degrees relative to a neighboring segment or some other threshold) or one or more perimeter segments comprising an unlikely contour of a perimeter (e.g., short perimeter segments connected in a zig-zag form). In some embodiments, the application may identify an unlikely perimeter segment by determining the surface area enclosed by three or more connected perimeter segments, one being the newly created perimeter segment and may identify the perimeter segment as an unlikely perimeter segment if the surface area is less than a predetermined (or dynamically determined) threshold. In some embodiments, other methods may be used in identifying unlikely perimeter segments within the map. In some embodiments, the user interface may present a warning message using the user interface, indicating that a perimeter segment is likely incorrect. In some embodiments, the user may ignore the warning message or responds by correcting the perimeter segment using the user interface.

In some embodiments, the application may autonomously suggest a correction to perimeter lines by, for example, identifying a deviation in a straight perimeter line and suggesting a line that best fits with regions of the perimeter line on either side of the deviation (e.g. by fitting a line to the regions of perimeter line on either side of the deviation). In other embodiments, the application may suggest a correction to perimeter lines by, for example, identifying a gap in a perimeter line and suggesting a line that best fits with regions of the perimeter line on either side of the gap. In some embodiments, the application may identify an end point of a line and the next nearest end point of a line and suggests connecting them to complete a perimeter line. In some embodiments, the application may only suggest connecting two end points of two different lines when the distance between the two is below a particular threshold distance. In some embodiments, the application may suggest correcting a perimeter line by rotating or translating a portion of the perimeter line that has been identified as deviating such that the adjusted portion of the perimeter line is adjacent and in line with portions of the perimeter line on either side. For example, a portion of a perimeter line is moved upwards or downward or rotated such that it is in line with the portions of the perimeter line on either side. In some embodiments, the user may manually accept suggestions provided by the application using the user interface by, for example, touching the screen, pressing a button or clicking a cursor. In some embodiments, the application may automatically make some or all of the suggested changes.

In some embodiments, the user may create different areas within the environment via the user interface (which may be a single screen, or a sequence of displays that unfold over time). In some embodiments, the user may select areas within the map of the environment displayed on the screen using their finger or providing verbal instructions, or in some embodiments, an input device, such as a cursor, pointer, stylus, mouse, button or buttons, or other input methods. Some embodiments may receive audio input, convert the audio to text with a speech-to-text model, and then map the text to recognized commands. In some embodiments, the user may label different areas of the environment using the user interface of the application. In some embodiments, the user may use the user interface to select any size area (e.g., the selected area may be comprised of a small portion of the environment or could encompass the entire environment) or zone within a map displayed on a screen of the communication device and the desired settings for the selected area. For example, in some embodiments, a user selects any of: disinfecting modes, frequency of disinfecting, intensity of disinfecting, power level, navigation methods, driving speed, etc. The selections made by the user are sent to a processor of the robot and the processor of the robot processes the received data and applies the user changes.

In some embodiments, the user interface may present a map, e.g., on a touchscreen, and areas of the map (e.g., corresponding to rooms or other sub-divisions of the environment, e.g., collections of contiguous unit tiles in a bitmap representation) in pixel-space of the display may be mapped to event handlers that launch various routines responsive to events like an on-touch event, a touch release event, or the like. In some cases, before or after receiving such a touch event, the user interface may present the user with a set of user-interface elements by which the user may instruct embodiments to apply various commands to the area. Or in some cases, the areas of a working environment may be depicted in the user interface without also depicting their spatial properties, e.g., as a grid of options without conveying their relative size or position. Examples of commands specified via the user interface may include assigning an operating mode to an area, e.g., a cleaning mode or a mowing mode. Modes may take various forms. Examples may include modes that specify how a robot performs a function, like modes that select which tools to apply and settings of those tools. Other examples may include modes that specify target results, e.g., a "heavy clean" mode versus a "light clean" mode, a quite vs loud mode, or a slow versus fast mode. In some cases, such modes may be further associated with scheduled times in which operation subject to the mode is to be performed in the associated area. In some embodiments, a given area may be designated with multiple modes, e.g., a disinfecting mode and a quite mode. In some cases, modes may be nominal properties, ordinal properties, or cardinal properties, e.g., a disinfecting mode, a heaviest-clean mode, a 10/seconds/linear-foot disinfecting mode, respectively. Other examples of commands specified via the user interface may include commands that schedule when modes of operations are to be applied to areas. Such scheduling may include scheduling when a task is to occur or when a task using a designed mode is to occur. Scheduling may include designating a frequency, phase, and duty cycle of the task, e.g., weekly, on Monday at 4, for 45 minutes. Scheduling, in some cases, may include specifying conditional scheduling, e.g., specifying criteria upon which modes of operation are to be applied. Examples may include events in which no motion is detected by a motion sensor of the robot or a base station for more than a threshold duration of time, or events in which a third-party API (that is polled or that pushes out events) indicates certain weather events have occurred, like rain. In some cases, the user interface may expose inputs by which such criteria may be composed by the user, e.g., with Boolean connectors, for instance, if no-motion-for-45-minutes, and raining, then apply vacuum mode in the area labeled kitchen.

In some embodiments, the user interface may display information about a current state of the robot or previous states of the robot or its environment. Examples may include a heat map of bacteria or debris sensed over an area, visual indications of classifications of floor surfaces in different areas of the map, visual indications of a path that the robot has taken during a current session or other work sessions, visual indications of a path that the robot is currently following and has computed to plan further movement in the future, and visual indications of a path that the robot has taken between two points in the environment, like between a point A and a point B on different sides of a room or a building in a point-to-point traversal mode. In some embodiments, while or after a robot attains these various states, the robot may report information about the states to the application via a wireless network, and the application may update the user interface on the communication device to display the updated information. For example, in some cases, a processor of a robot may report which areas of the working environment have been covered during a current working session, for instance, in a stream of data to the application executing on the communication device formed via a Web RTC Data connection, or with periodic polling by the application, and the application executing on the computing device may update the user interface to depict which areas of the working environment have been covered. In some cases, this may include depicting a line of a path traced by the robot or adjusting a visual attribute of areas or portions of areas that have been covered, like color or shade or areas or boundaries. In some embodiments, the visual attributes may be varied based upon attributes of the environment sensed by the robot, like an amount of bacteria or a classification of a flooring type since by the robot. In some embodiments, a visual odometer implemented with a downward facing camera may capture images of the floor, and those images of the floor, or a segment thereof, may be transmitted to the application to apply as a texture in the visual representation of the working environment in the map, for instance, with a map depicting the appropriate color of wood floor texture, tile, or the like to scale in the different areas of the working environment.

In some embodiments, the user interface may indicate in the map a path the robot is about to take (e.g., according to a routing algorithm) between two points, to cover an area, or to perform some other task. For example, a route may be depicted as a set of line segments or curves overlaid on the map, and some embodiments may indicate a current location of the robot with an icon overlaid on one of the line segments with an animated sequence that depicts the robot moving along the line segments. In some embodiments, the future movements of the robot or other activities of the robot may be depicted in the user interface. For example, the user interface may indicate which room or other area the robot is currently covering and which room or other area the robot is going to cover next in a current work sequence. The state of such areas may be indicated with a distinct visual attribute of the area, its text label, or its perimeters, like color, shade, blinking outlines, and the like. In some embodiments, a sequence with which the robot is currently programmed to cover various areas may be visually indicated with a continuum of such visual attributes, for instance, ranging across the spectrum from red to blue (or dark grey to light) indicating sequence with which subsequent areas are to be covered.

In some embodiments, via the user interface or automatically without user input, a starting and an ending point for a path to be traversed by the robot may be indicated on the user interface of the application executing on the communication device. Some embodiments may depict these points and propose various routes therebetween, for example, with various routing algorithms such as the path planning methods incorporated by reference herein. Examples include A*, Dijkstra's algorithm, and the like. In some embodiments, a plurality of alternate candidate routes may be displayed (and various metrics thereof, like travel time or distance), and the user interface may include inputs (like event handlers mapped to regions of pixels) by which a user may select among these candidate routes by touching or otherwise selecting a segment of one of the candidate routes, which may cause the application to send instructions to the robot that cause the robot to traverse the selected candidate route.

In some embodiments, the map may include information such as debris or bacteria accumulation in different areas, stalls encountered in different areas, obstacles, driving surface type, driving surface transitions, coverage area, robot path, etc. In some embodiments, the user may use user interface of the application to adjust the map by adding, deleting, or modifying information (e.g., obstacles) within the map. For example, the user may add information to the map using the user interface such as debris or bacteria accumulation in different areas, stalls encountered in different areas, obstacles, driving surface type, driving surface transitions, etc.

In some embodiments, the user may choose areas within which the robot is to operate and actions of the robot using the user interface of the application. In some embodiments, the user may use the user interface to choose a schedule for performing an action within a chosen area. In some embodiments, the user may choose settings of the robot and components thereof using the application. For example, some embodiments may include using the user interface to set a disinfecting mode of the robot. In some embodiments, setting a disinfecting mode may include, for example, setting a service condition, a service type, a service parameter, a service schedule, or a service frequency for all or different areas of the environment. A service condition may indicate whether an area is to be serviced or not, and embodiments may determine whether to service an area based on a specified service condition in memory. Thus, a regular service condition indicates that the area is to be serviced in accordance with service parameters like those described below. In contrast, a no service condition may indicate that the area is to be excluded from service. A service type may indicate what kind of disinfecting is to occur (e.g., disinfectant spray, steam, UV, etc.). A service parameter may indicate various settings for the robot. In some embodiments, service parameters may include, but are not limited to, an impeller speed or power parameter, a wheel speed parameter, a brush speed parameter, a sweeper speed parameter, a disinfectant dispensing speed parameter, a driving speed parameter, a driving direction parameter, a movement pattern parameter, a disinfecting intensity parameter, and a timer parameter. Any number of other parameters may be used without departing from embodiments disclosed herein, which is not to suggest that other descriptions are limiting. A service schedule may indicate the day and, in some cases, the time to service an area. For example, the robot may be set to service a particular area on Wednesday at noon. In some instances, the schedule may be set to repeat. A service frequency may indicate how often an area is to be serviced. In embodiments, service frequency parameters may include hourly frequency, daily frequency, weekly frequency, and default frequency. A service frequency parameter may be useful when an area is frequently used or, conversely, when an area is lightly used. By setting the frequency, more efficient overage of environments may be achieved. In some embodiments, the robot may disinfect areas of the environment according to the disinfecting mode settings.

In some embodiments, the user may answer a questionnaire using the application to determine general preferences of the user. In some embodiments, the user may answer the questionnaire before providing other information.

In some embodiments, a user interface component (e.g., virtual user interface component such as slider displayed by an application on a touch screen of a smart phone or mechanical user interface component such as a physical button) may receive an input (e.g., a setting, an adjustment to the map, a schedule, etc.) from the user. In some embodiments, the user interface component may display information to the user. In some embodiments, the user interface component may include a mechanical or virtual user interface component that responds to a motion (e.g., along a touchpad to adjust a setting which may be determined based on an absolute position of the user interface component or displacement of the user interface component) or gesture of the user. For example, the user interface component may respond to a sliding motion of a finger, a physical nudge to a vertical, horizontal, or arch of the user interface component, drawing a smile (e.g., to unlock the user interface of the robot), rotating a rotatable ring, and spiral motion of fingers.

In some embodiments, the user may use the user interface component (e.g., physically, virtually, or by gesture) to set a setting along a continuum or to choose between discrete settings (e.g., low or high). For example, the user may choose the speed of the robot from a continuum of possible speeds or may select a fast, slow, or medium speed using a virtual user interface component. In another example, the user may choose a slow speed for the robot during UV sterilization treatment such that the UV light may have more time for sterilization per surface area. In some embodiments, the user may zoom in or out or may use a different mechanism to adjust the response of a user interface component. For example, the user may zoom in on a screen displayed by an application of a communication device to fine tune a setting of the robot with a large movement on the screen. Or the user may zoom out of the screen to make a large adjustment to a setting with a small movement on the screen or a small gesture.

In some embodiments, the user interface component may include a button, a keypad, a number pad, a switch, a microphone, a camera, a touch sensor, or other sensors that may detect gestures. In some embodiments, the user interface component may include a rotatable circle, a rotatable ring, a click-and-rotate ring, or another component that may be used to adjust a setting. For example, a ring may be rotated clockwise or anti-clockwise, or pushed in or pulled out, or clicked and turned to adjust a setting. In some embodiments, the user interface component may include a light that is used to indicate the user interface is responsive to user inputs (e.g., a light surrounding a user interface ring component). In some embodiments, the light may dim, increase in intensity, or change in color to indicate a speed of the robot, a power of an impeller fan of the robot, a power of the robot, voice output, and such. For example, a virtual user interface ring component may be used to adjust settings using an application of a communication device and a light intensity or light color or other means may be used to indicate the responsiveness of the user interface component to the user input.

In some embodiments, a historical report of prior work sessions may be accessed by a user using the application of the communication device. In some embodiments, the historical report may include a total number of operation hours per work session or historically, total number of charging hours per charging session or historically, total coverage per work session or historically, a surface coverage map per work session, issues encountered (e.g., stuck, entanglement, etc.) per work session or historically, location of issues encountered (e.g., displayed in a map) per work session or historically, collisions encountered per work session or historically, software or structural issues recorded historically, and components replaced historically.

In some embodiments, the user may use the user interface of the application to instruct the robot to begin performing work (immediately. In some embodiments, the application displays a battery level or charging status of the robot. In some embodiments, the amount of time left until full charge or a charge required to complete the remaining of a work session may be displayed to the user using the application. In some embodiments, the amount of work by the robot a remaining battery level can provide may be displayed. In some embodiments, the amount of time remaining to finish a task may be displayed. In some embodiments, the user interface of the application may be used to drive the robot. In some embodiments, the user may use the user interface of the application to instruct the robot to perform a task in all areas of the map. In some embodiments, the user may use the user interface of the application to instruct the robot to perform a task in particular areas within the map, either immediately or at a particular day and time. In some embodiments, the user may choose a schedule of the robot, including a time, a day, a frequency (e.g., daily, weekly, bi-weekly, monthly, or other customization), and areas within which to perform a task. In some embodiments, the user may choose the type of task. In some embodiments, the user may use the user interface of the application to choose preferences, such as detailed or quiet disinfecting, light or deep disinfecting, and the number of passes. The preferences may be set for different areas or may be chosen for a particular work session during scheduling. In some embodiments, the user may use the user interface of the application to instruct the robot to return to a charging station for recharging if the battery level is low during a work session, then to continue the task. In some embodiments, the user may view history reports using the application, including total time of working and total area covered (per work session or historically), total charging time per session or historically, number of bin empties (if applicable), and total number of work sessions. In some embodiments, the user may use the application to view areas covered in the map during a work session. In some embodiments, the user may use the user interface of the application to add information such as floor type, debris (or bacteria) accumulation, room name, etc. to the map. In some embodiments, the user may use the application to view a current, previous, or planned path of the robot. In some embodiments, the user may use the user interface of the application to create zones by adding dividers to the map that divide the map into two or more zones. In some embodiments, the application may be used to display a status of the robot (e.g., idle, performing task, charging, etc.). In some embodiments, a central control interface may collect data of all robots in a fleet and may display a status of each robot in the fleet. In some embodiments, the user may use the application to change a status of the robot to do not disturb, wherein the robot is prevented from working or enacting other actions that may disturb the user.

In some embodiments, the application may display the map of the environment and allow zooming-in or zooming-out of the map. In some embodiments, a user may add flags to the map using the user interface of the application that may instruct the robot to perform a particular action. For example, a flag may be inserted into the map and the flag may indicate storage of a particular medicine. When the flag is dropped a list of robot actions may be displayed to the user, from which they may choose. Actions may include stay away, go there, go there to collect an item. In some embodiments, the flag may inform the robot of characteristics of an area, such as a size of an area. In some embodiments, flags may be labelled with a name. For example, a first flag may be labelled front of hospital bed and a characteristic, such size of the area, may be added to the flag. This may allow granular control of the robot. For example, the robot may be instructed to clean the area front of the hospital bed through verbal instruction or may be scheduled to clean in front of the hospital bed every morning using the application.

In some embodiments, the user interface of the application (or interface of the robot or other means) may be used to customize the music played when a call is on hold, ring tones, message tones, and error tones. In some embodiments, the application or the robot may include audio-editing applications that may convert MP3 files a required size and format, given that the user has a license to the music. In some embodiments, the application of a communication device (or web, TV, robot interface, etc.) may be used to play a tutorial video for setting up a new robot. Each new robot may be provided with a mailbox, data storage space, etc. In some embodiments, there may be voice prompts that lead the user through the setup process. In some embodiments, the user may choose a language during setup. In some embodiments, the user may set up a recording of the name of the robot. In some embodiments, the user may choose to connect the robot to the internet for in the moment assistance when required. In some embodiments, the user may use the application to select a particular type of indicator be used to inform the user of new calls, emails, and video chat requests or the indicators may be set by default. For example, a message waiting indicator may be an LED indicator, a tone, a gesture, or a video played on the screen of the robot. In some cases, the indicator may be a visual notification set or selected by the user. For example, the user may be notified of a call from a particular family member by a displayed picture or avatar of that family member on the screen of the robot. In other instances, other visual notifications may be set, such as flashing icons on an LCD screen (e.g., envelope or other pictures or icons set by user). In some cases, pressing or tapping the visual icon or a button on/or next to the indicator may activate an action (e.g., calling a particular person and reading a text message or an email). In some embodiments, a voice assistant (e.g., integrated into the robot or an external assistant paired with the robot) may ask the user if they want to reply to a message and may listen to the user message, then send the message to the intended recipient. In some cases, indicators may be set on multiple devices or applications of the user (e.g., cell phone, phone applications, Face Time, Skype, or anything the user has set up) such that the user may receive notification regardless of their proximity to the robot. In some embodiments, the application may be used to setup message forwarding, such that notifications provided to the user by the robot may be forwarded to a telephone number (e.g., home, cellular, etc.), text pager, e-mail account, chat message, etc.

In some embodiments, more than one robot and device (e.g., medical car robot, robot cleaner, service robot with voice and video capability, and other devices such as smart appliances, TV, building controls such as lighting, temperature, etc., tablet, computer, and home assistants) may be connected to the application and the user may use the application to choose settings for each robot and device. In some embodiments, the user may use the application to display all connected robots and other devices. For example, the application may display all robots and smart devices in a map of a home or in a logical representation such as a list with icons and names for each robot and smart device. The user may select each robot and smart device to provide commands and change settings of the selected device. For instance, a user may select a smart fridge and may change settings such as temperature and notification settings or may instruct the fridge to bring a medicine stored in the fridge to the user. In some embodiments, the user may choose that one robot perform a task after another robot completes a task. In some embodiments, the user may choose schedules of both robots using the application. In some embodiments, the schedule of both robots may overlap (e.g., same time and day). In some embodiments, a home assistant may be connected to the application. In some embodiments, the user may provide commands to the robot via a home assistant by verbally providing commands to the home assistant which may then be transmitted to the robot. Examples of commands include commanding the robot to disinfect a particular area or to navigate to a particular area or to turn on and start disinfecting. In some embodiments, the application may connect with other smart devices (e.g., smart appliances such as smart fridge or smart TV) within the environment and the user may communicate with the robot via the smart devices. In some embodiments, the application may connect with public robots or devices. For example, the application may connect with a public vending machine in a hospital and the user may use the application to purchase a food item and instruct the vending machine or a robot to deliver the food item to a particular location within the hospital.

In some embodiments, the user may be logged into multiple robots and other devices at the same time. In some embodiments, the user receives notifications, alerts, phone calls, text messages, etc. on at least a portion of all robots and other devices that the user is logged into. For example, a mobile phone, a computer, and a service robot of a user may ring when a phone call is received. In some embodiments, the user may select a status of do not disturb for any number of robots (or devices). For example, the user may use the application on a smart phone to set all robots and devices to a do not disturb status. The application may transmit a synchronization message to all robots and devices indicating a status change to do not disturb, wherein all robots and devices refrain from pushing notifications to the user.

In some embodiments, the application may display the map of the environment and the map may include all connected robots and devices such as TV, fridge, washing machine, dishwasher, heater control panel, lighting controls, etc. In some embodiments, the user may use the application to choose a view to display. For example, the user may choose that only a debris map is generated based on historic cleaning, an air quality map for each room, or a map indicating status of lights as determined based on collective artificial intelligence is displayed. Or in another example, a user may select to view the FOV of various different cameras within the house to search for an item, such as keys or a wallet. Or the user may choose to run an item search wherein the application may autonomously search for the item within images captured in the FOV of cameras (e.g., on robots moving within the area, static cameras, etc.) within the environment. Or the user may choose that the search focus on searching for the item in images captured by a particular camera. Or the user may choose that the robot navigates to all areas or a particular area (e.g., storage room) of the environment in search of the item. Or the user may choose that the robot checks places the robot believes the item is likely to be in an order that the processor of the robot believes will result in finding the item as soon as possible.

In some embodiments, an application of a communication device paired with the robot may be used to execute an over the air firmware update (or software or other type of update). In other embodiments, the firmware may be updated using another means, such as USB, Ethernet, RS232 interface, custom interface, a flasher, etc. In some embodiments, the application may display a notification that a firmware update is available and the user may choose to update the firmware immediately, at a particular time, or not at all. In some embodiments, the firmware update is forced and the user may not postpone the update. In some embodiments, the user may not be informed that an update is currently executing or has been executed. In some embodiments, the firmware update may require the robot to restart. In some embodiments, the robot may or may not be able to perform routine work during a firmware update. In some embodiments, the older firmware may be not replaced or modified until the new firmware is completely downloaded and tested. In some embodiments, the processor of the robot may perform the download in the background and may use the new firmware version at a next boot up. In some embodiments, the firmware update may be silent (e.g., forcefully pushed) but there may be audible prompt in the robot.

In some embodiments, the process of using the application to update the firmware includes using the application to call the API and the cloud sending the firmware to the robot directly. In some embodiments, a pop up on the application may indicate a firmware upgrade available (e.g., when entering the control page of the application). In some embodiments, a separate page on the application may display firmware info information, such as current firmware version number. In some embodiments, available firmware version numbers may be displayed on the application. In some embodiments, changes that each of the available firmware versions impose may be displayed on the application. For example, one new version may improve the mapping feature or another new version may enhance security, etc. In some embodiments, the application may display that the current version is up to date already if the version is already up to date. In some embodiments, a progress page (or icon) of the application may display when a firmware upgrade is in progress. In some embodiments, a user may choose to upgrade the firmware using a settings page of the application. In some embodiments, the setting page may have subpages such as general, cleaning preferences, firmware update (e.g., which may lead to firmware information). In some embodiments, the application may display how long the update may take or the time remaining for the update to finish. In some embodiments, an indicator on the robot may indicate that the robot is updating in addition to or instead of the application. In some embodiments, the application may display a description of what is changed after the update. In some embodiments, a set of instructions may be provided to the user via the application prior to updating the firmware. In embodiments wherein a sudden disruption occurs during a firmware update, a pop-up may be displayed on the application to explain why the update failed and what needs to be done next. In some embodiments, there may be multiple versions of updates available for different versions of the firmware or application. For example, some robots may have voice indicators such as "wheel is blocked" or "turning off" in different languages. In some embodiments, some updates may be marked as beta updates. In some embodiments, the cloud application may communicate with the robot during an update and updated information may be available on the control center or on the application. In some embodiments, progress of the update may be displayed in the application using a status bar, circle, etc. In some embodiments, the user may choose to finish or pause a firmware update using the application. In some embodiments, the robot may need to be connected to a charger during a firmware update. In some embodiments, a pop up message may appear on the application if the user chooses to update the robot using the application and the robot is not connected to the charger.

In some embodiments, the user may use the application to register the warranty of the robot. If the user attempts to register the warranty more than once, the information may be checked against a database on the cloud and the user be informed they have already done so. In some embodiments, the application may be used to collect possible issues of the robot and may send the information to the cloud. In some embodiments, the robot may send possible issues to the cloud and the application may retrieve the information from the cloud or the robot may send possible issues directly to the application. In some embodiments, the application or a cloud application may directly open a customer service ticket based on the information collected on issues of the robot. For example, the application may automatically open a ticket if a consumable part is detected to wear off soon and customer service may automatically send a new replacement to the user without the user having to call customer service. In another example, a detected jammed wheel may be sent to the cloud and a possible solution may pop up on the application from an auto diagnose machine learned system. In some embodiments, a human may supervise and enhance the process or merely perform the diagnosis. In some embodiments, the diagnosed issue may be saved and used as a data for future diagnoses.

In some embodiments, previous maps and work sessions may be displayed to the user using the application. In some embodiments, data of previous work sessions may be used to perform better work sessions in the future. In some embodiments, previous maps and work sessions displayed may be converted into thumbnail images to save space on the local device. In some embodiments, there may be a setting (or default) that saves the images in original form for a predetermined amount of time (e.g., a week) and then converts the images to thumbnails or pushes the original images to the cloud. All of these options may be configurable or a default be chosen by the manufacturer.

In some embodiments, a user may have any of a registered email, a username, or a password which may be used to log into the application. If a user cannot remember their email, username, or password, an option to reset any of the three may be available. In some embodiments, a form of verification may be required to reset an email, password, or username. In some embodiments, a user may be notified that they have already signed up when attempting to sign up with a username and name that already exists and may be asked if they forgot their password and/or would like to reset their password.

In some embodiments, the application executed by the communication device may include three possible configurations. In some embodiments, a user may choose a configuration by providing an input to the application using the user interface of the application. The basic configuration may limit the number of manual controls as not all users may require granular control of the robot. Further, it is easier for some to learn few controls. The intermediate configuration provides additional manual controls of the robot while advanced configuration provides granular control over the robot. FIG. 418 illustrates an example of an application displaying possible configuration choices from which a user may choose from.

In some embodiments, an API may be used. An API is a software that acts as an intermediary that provides the means for two other software applications to interact with each other in requesting or providing information, software services, or access to hardware. In some embodiments, Representational State Transfer (REST) APIs or RESTful APIs may use HTTP methods and functions such as GET, HEAD, POST, PUT, PATCH, DELETE, CONNECT, OPTIONS, and TRACE to request a service, post data or add new data, store or update data, delete data, run diagnostic traces, etc. In some embodiments, RESTful APIs may use HTTP methods and functions such as those described above to run Create, Read, Update, Delete (CRUD) operations on a database. For example, the HTTP method POST maps to operation CREATE, GET maps to operation READ, PATCH maps to operation UPDATE, and DELETE maps to operation DELETE. FIG. 419 illustrates an example of a format of a POST request. In one example, an application may use a RESTful APO with a GET request to remotely obtain the temperature in their house.

In embodiments, data is sent or received using one of several standard formats, such as XML, JSON, YAML, HTML, etc. Some embodiments may use Simple Object Access Protocol (SOAP), an independent platform and operating system protocol used for exchanging information between applications that are written in different programming language. FIG. 420 illustrates an example of exchange of information between two applications X00 and X01 using SOAP. Some embodiments may use MQ Telemetry Transport (MQTT), a publish/subscribe messaging protocol that is ideal for machine to machine communication or Internet of Things (IoT). In some embodiments, both REST and MQTT APIs are available for use.

In some embodiments, the application may be used to display the map and manipulate areas of the map. Examples are shown and explained in FIGS. 421A-421B. In FIG. 421A a User 42100 may draw lines 42101 in the app to split the map 42102 into separate sections 42103 and 42104. These lines will automatically become straight and will be extended to closest walls. In FIG. 421B In the app charging station 'zone' may be drawn by colored or dotted lines 42105 indicating the IR beams emitting from the station 42106. User may guide the robot 42107 to this zone for it to find the station 42106. In FIG. 421D robot 42107 may have maps 42108 of several floors in the memory. when the user put it in second floor 42109, it can recognize the floor by initial mapping 42110 and load performing strategies based on that second floor 42109. FIG. 421E illustrates the user ordering the robot to clean different zones by selecting different strategies 42111 on an application 42112 of a communication device 42113.

In embodiments, a user may add virtual walls, do not enter zones or boxes, do not mop zones, do not vacuum zones, etc. to the map using the application. In embodiments, the user may define virtual places and objects within the map using the application. For example, the user may know the its cat has a favorite place to sleep. The user may virtually create the sleeping place of the cat within the map for convenience. For example, FIG. 422 illustrates an example of a map displayed by the application and a virtual dog house 42200 and a virtual rug 42201 added to the map by a user. In some cases, the user may specify particular instructions relating to the virtual object. For instance, the user may specify the robot is to avoid the edges of the virtual rug 42201 as its tassels may become intertwined with the robot brush. While there is no dog house in the real world the virtual dog house implies certain template profile instructions that may be configured or preset, which may be easier or more useful than plainly blocking the area out. When a map and virtual reconstruction of the environment is shared with other devices in real time, a virtual object such as rug having one set of corresponding actions for one kind of robot may have a different set of corresponding actions for a different robot. For example, a virtual rug created at a certain place in the map may correspond to actions such as vacuum and sweep the rug but remain distant from the edges of the rug. As described above, this may be to avoid entanglement with the tassels of the rug. This is shown in FIG. 423A. For a mopping robot, the virtual rug may correspond to actions such as avoid the entire rug. This is shown in FIG. 423B. For a service robot, the virtual rug may not correspond to any specific instructions. This example illustrates that a virtual object may have advantages over manually interacting with the map.

In embodiments, a virtual object created on one device may be automatically shared with other devices. In some embodiments, the user may be required to share the virtual object with one or more SLAM collaborators. In some embodiments, the user may create, modify, or manipulate an object before sending it to one or more SLAM collaborating devices. This may be done using an application, an interface of a computer or web application, by a gesture on a wearable device, etc. The user may use an interface of a SLAM device to select one or more receivers. In some embodiments, the receiving SLAM collaborator may or may not accept the virtual object, forward the virtual object to other SLAM collaborating devices, after modification for example, comment, change the virtual object, manipulate the virtual object, etc. The receiver may send the virtual object back to the sender, as is, or after modification, comments, etc. SLAM collaborators may be pure robots, or have users control them.

In some embodiments, a user may manually determine the amount of overlap in coverage by the robot. For instance, when the robot executes a boustrophedon movement path, the robot travels back and forth across a room along parallel lines. Based on the amount of overlap desired, the distance between parallel lines is adjusted, wherein the distance between parallel lines decreases as the amount of desired overlap increases. In some embodiments, the processor determines an amount of overlap in coverage using machine learning techniques. For example, the processor may increase an amount of overlap in areas with increase debris accumulation, both historically and in a current work sessions. For example, FIG. 424 illustrates no overlap 42400, medium overlap 42401, high overlap 42402, and dense overlap 42403. In some cases, an area may require a repeat run 42402. In some embodiments, such symbols may appear as quick action buttons on an application of a communication device paired with the robot. In some embodiments, the processor may determine the amount of overlap in coverage based on a type of cleaning of the robot, such as vacuuming, mopping, UV, mowing, etc. In some embodiments, the processor or a user may determine a speed of cleaning based on a type of cleaning of the robot. For example, the processor may reduce a speed of the robot or remain still for a predetermined duration on each 30 cm×30 cm area during UV cleaning.

In some embodiments, the application of a communication device may display a map of the environment. In some embodiments, different floor types are displayed in different color, textures, patterns, etc. For example, the application may display areas of the map with carpet as a carpet-appearing texture and areas of the map with wood flooring with a wood pattern. In some embodiments, the processor determines the floor type of different areas based on sensor data such as data from laser sensor or electrical current drawn by a wheel or brush motor. For example, the light reflected back from a laser sensor emitted towards a carpet is more distributed than the light reflected back when emitted towards hardwood flooring. Or, in the case of electrical current drawn by a wheel or brush motor, electrical current drawn to maintain a same motor speed is increased on carpet due to increased resistance from friction between the wheel or brush and the carpet.

In some embodiments, a user may provide an input to the application to designate floor type in different areas of the map displayed by the application. In some embodiments, the user may drop a pin in the displayed map. In some embodiments, the user may use the application to determine a meaning of the dropped pin (e.g., extra cleaning here, drive here, clean here, etc.). In some embodiments, the robot provides extra cleaning in areas in which the user dropped a pin. In some embodiments, the user may drop a virtual barrier in the displayed map. In some embodiments, the robot does not cross the virtual barrier and thereby keeps out of areas as desired by the user. In some embodiments, the user may use voice command or the application of the communication device to instruct the robot to leave a room. In some embodiments, the user may physically tap the robot to instruct the robot to leave a room or move out of the way.

In some embodiments, the application of the communication device displays different rooms in different colors such that may be distinguished from one another. Any map with clear boundaries between regions requires only four colors to prevent two neighbouring regions from being colored alike.

In some embodiments, a user may use the application to request dense coverage in a large area to be cleaned during a work session. In such cases, the application may ask the user if they would like to split the job into two work sessions and to schedule the two sessions accordingly. In some embodiments, the robot may empty its bin during the work sessions as more debris may be collected with dense coverage.

Some embodiments use a cellphone to map the environment. In some embodiments, the processor of the robot localizes the robot based on camera data. In some embodiments, a mobile device may be pointed towards the robot and an application paired with the robot may open on the mobile device screen. In embodiments, the mobile device may be pointed to any IOT device, such as a stereo player (music), and their respective control panel and/or remote, paired application, etc. may pop up on the mobile device screen. In FIG. 425 a user may point their cell phone 42500 at a robot 42501 or any IOT device and based on what cell phone detects, an application or control panel or remote of the robot may pop up on the screen of the cell phone 42500. Some embodiments may use a cheap camera may scan a QR code on the robot or vice versa.

In some embodiments, the robot collaborates with one or more robot. In addition to the collaboration methods and techniques described herein, the processor of the robot may, in some embodiments, use at least a portion of the collaboration methods and techniques described in U.S. Non-Provisional patent application Ser. Nos. 16/418,988, 15/981,643, 16/747,334, 16/584,950, 16/185,000, 16/402,122, and 15/048,827, each of which is hereby incorporated by reference.

Some embodiments may include a fleet of robots with charging capabilities. In some embodiments, the robots may autonomously navigate to a charging station to recharge batteries or refuel. In some embodiments, charging stations with unique identifications, locations, availabilities, etc. may be paired with particular robots. In some embodiments, the processor of a robot or a control system of the fleet of robots may chose a charging station for charging. An example of control systems that may be used in controlling the fleet of robot are described in U.S. Non-Provisional patent application Ser. Nos. 16/130,880 and 16/245,998, each of which is hereby incorporated by reference. In some embodiments, the processor of a robot or the control system of the fleet of robots may keep track of one or more charging stations within a map of the environment. In some embodiments, the processor a robot or the control system of the fleet of robots may use the map within which the locations of charging stations are known to determine which charging station to use for a robot. In some embodiments, the processor of a robot or the control system of the fleet of robots may organize or determine robot tasks and/or robot routes (e.g., for delivering a pod or another item from a current location to a final location) such that charging stations achieve maximum throughput and the number of charged robots at any given time is maximized. In some embodiments, charging stations may achieve maximum throughput and the number of charged robots at any given time may be maximized by minimizing the number of robots waiting to be charged, minimizing the number of charging stations without a robot docked for charging, and minimizing transfers between charging stations during ongoing charging of a robot. In some embodiments, some robots may be given priority for charging. For example, a robot with 70% battery life may be quickly charged and ready to perform work, as such the robot may be given priority for charging if there are not enough robots available to complete a task (e.g., a minimum number of robots operating within a warehouse that are required to complete a task by a particular deadline). In some embodiments, different components of the robot may connect with the charging station (or another type of station in some cases). In some embodiments, a bin (e.g., dust bin) of the robot may connect with the charging station. In some embodiments, the contents of the bin may be emptied into the charging station.

Figure 426A:
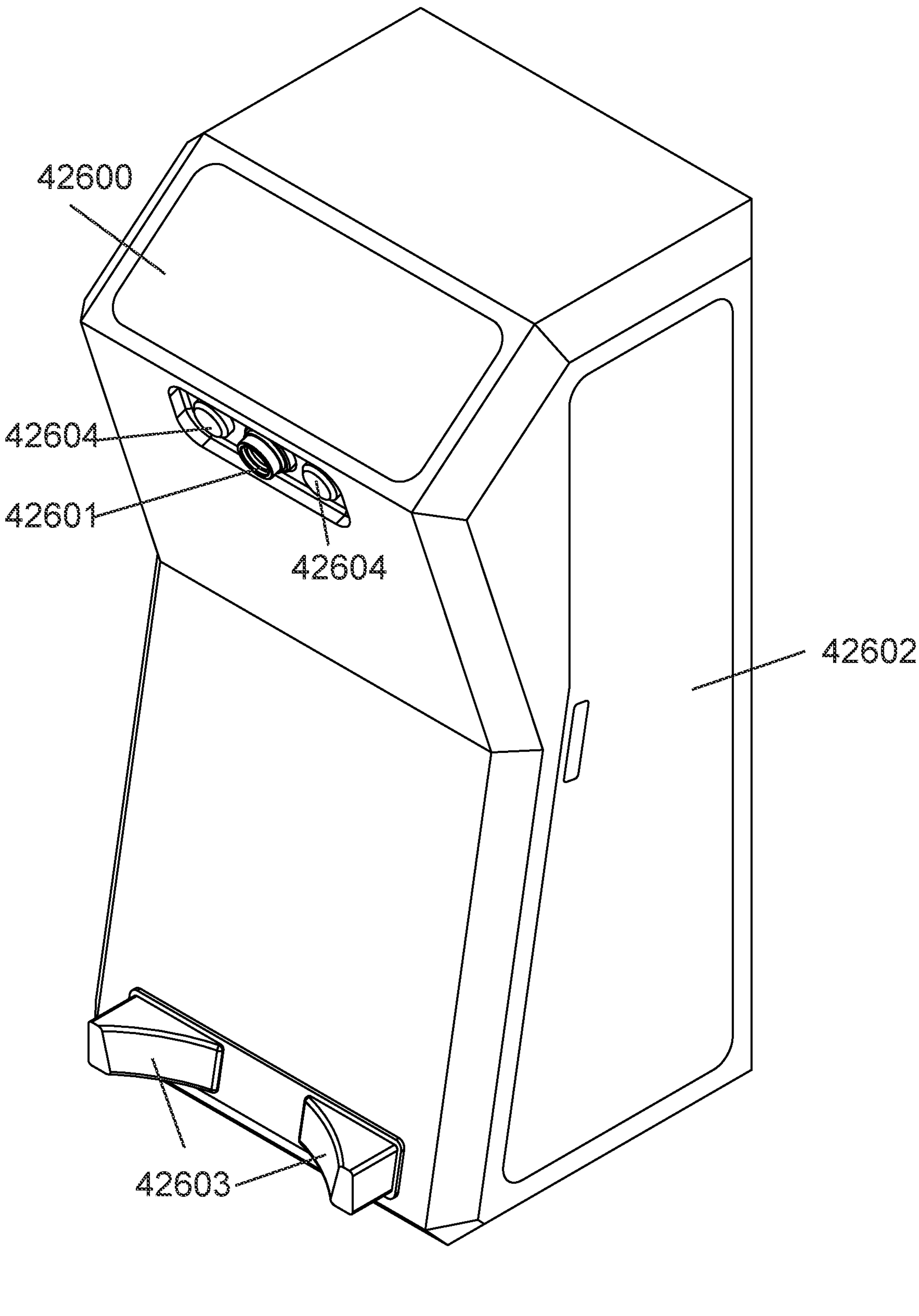
Figure 426B:
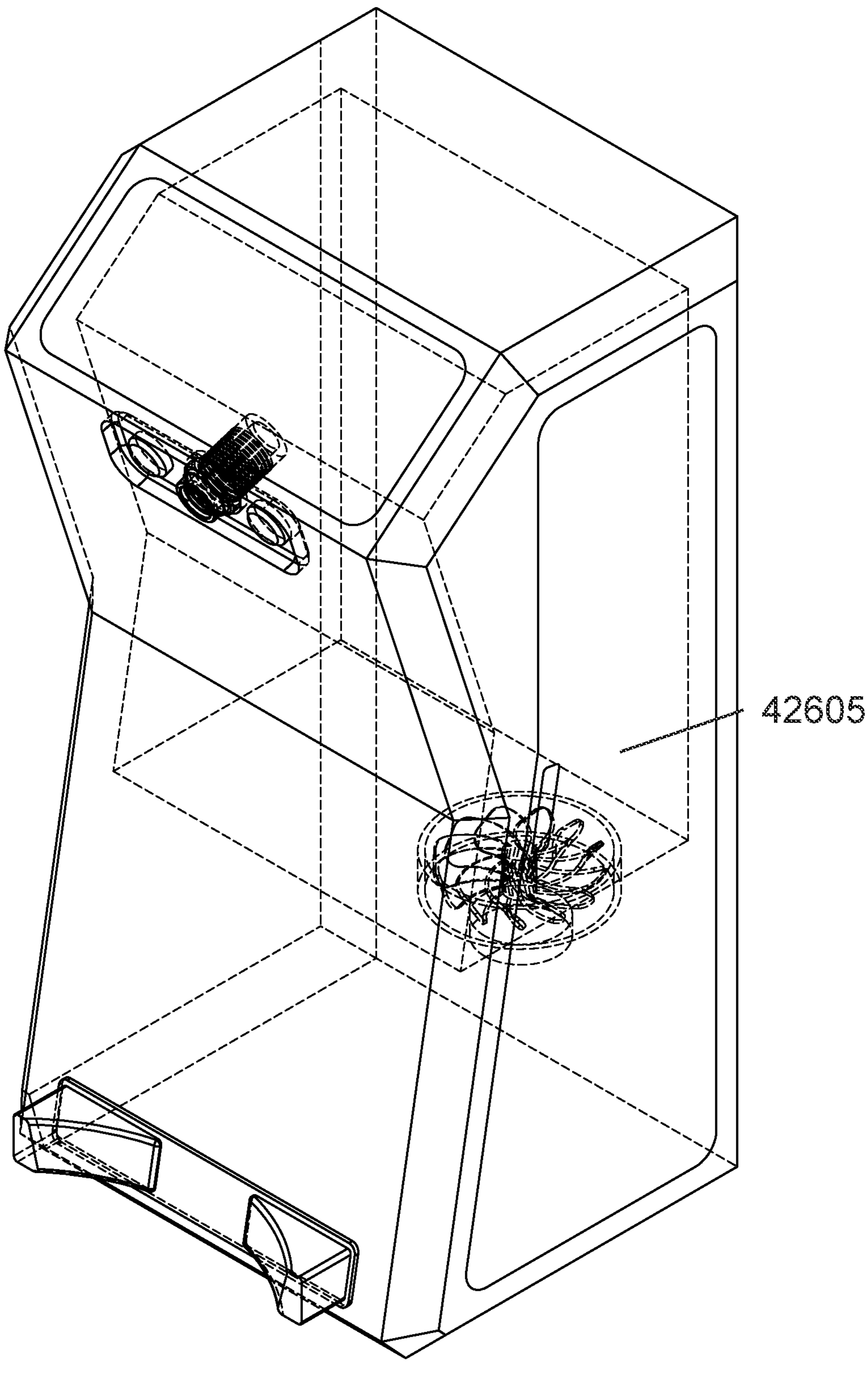
Figure 426C:
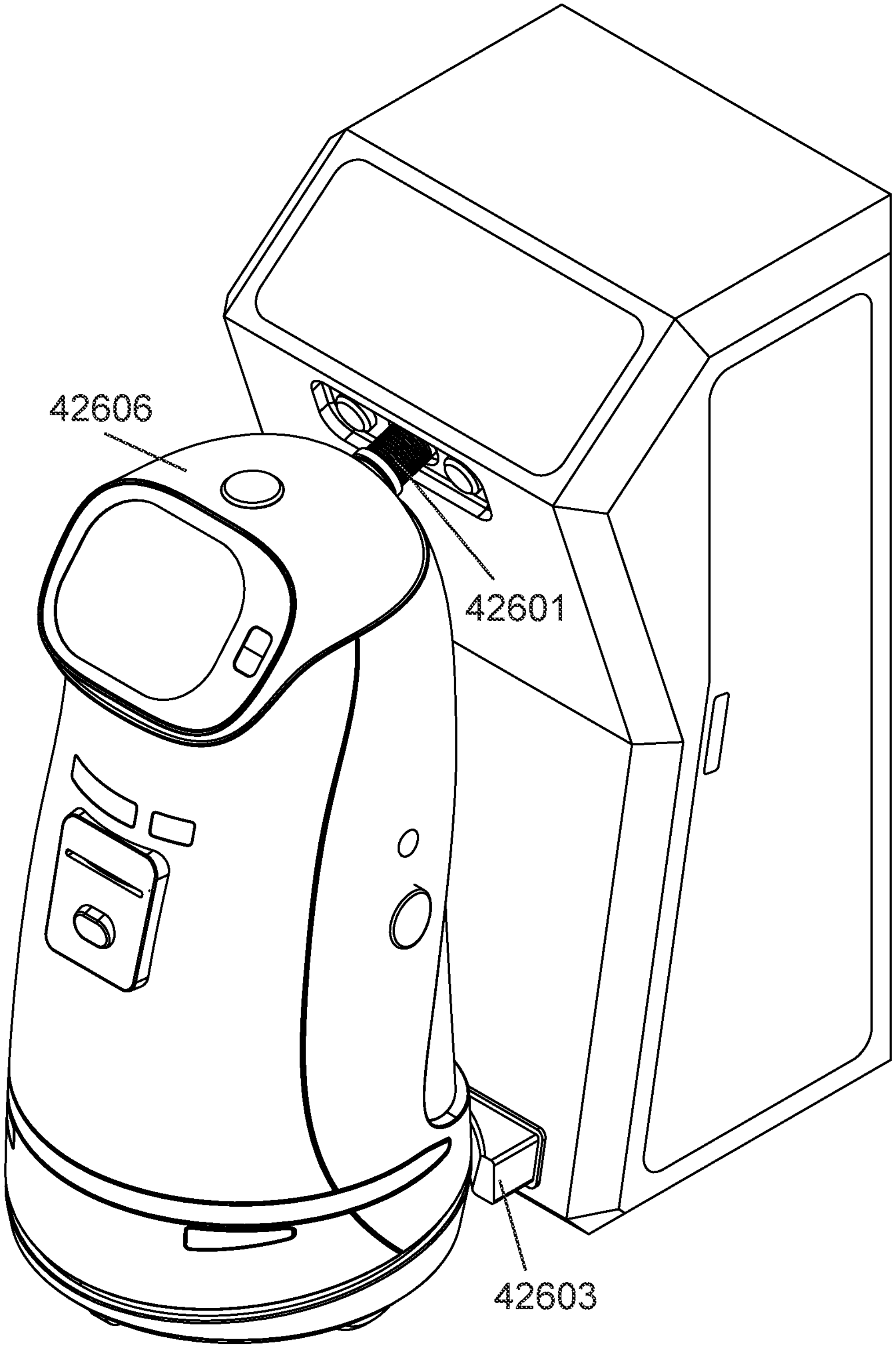
Figure 426D:
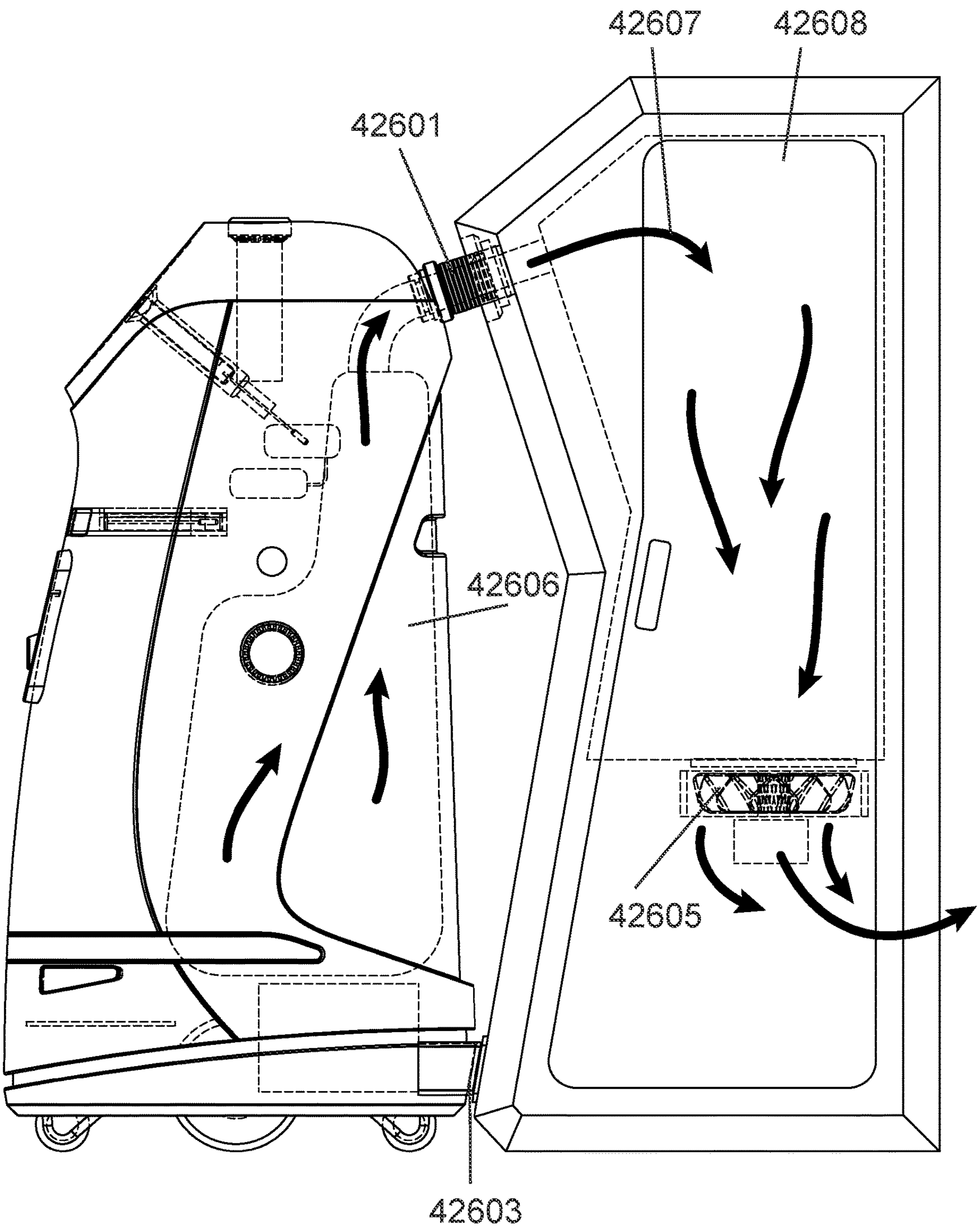

For example, FIG. 426A illustrates an example of a charging station including an interface 42600 (e.g., LCD touchscreen), a suction hose 42601, an access door 42602, and charging pads 42603. In some cases, sensors 42604 may be used to align a robot with the charging station. FIG. 426B illustrates internal components of the charging station including suction motor and impeller 42605 used to create suction needed to draw in the contents of a bin of a robot connected to charging station via the suction hose 42601. FIG. 426C illustrates a robot 42606 (described in detail in FIGS. 467A-467D) connected with the charging station via suction hose 42601. In some cases, the suction hose 42601 may extend from the charging station to connect with the robot 42606. Internal contents of the robot 42606 may be removed via suction hose 42601. Charging contacts of the robot 42606 are connected with charging pads 42603 for recharging batteries of the robot 42606. FIG. 426D illustrates arrows 42607 indicative of the flow path of the contents within the robot 42606, beginning from within the robot 42606, passing through the suction hose 42601, and into a container 42608 of the charging station. The suction motor and impeller 42605 are positioned on a bottom of the container 42608 and create a negative pressure, causing the contents of robot 42606 to be drawn into container 42608. The air drawn into the container 42608 may flow past the impeller and may be expelled through the rear of the charging station. Once container 42608 is full, it may be emptied by opening access door 42602. In other embodiments, the components of the charging station may be retrofitted to other charging station models. For instance, FIGS. 427A and 427B illustrate another variation of a charging station for smaller robots, including suction port 42700 through which contents stored within the robot may be removed, impeller and motor 42701 for generating suction, and exhaust 42702 for expelling air. FIGS. 428A and 428B illustrate yet another variation of a charging station for robots, including suction port 42800 through which contents stored within the robot may be removed, impeller and motor 42801 for generating suction, and exhaust 42802 for expelling air. FIG. 428C illustrates a bin 42803 of a robot 42804 connected with the charging station via suction port 42800. Arrows 42805 indicate the flow of air, eventually expelled through the exhaust 42802. Suction ports of charging stations may be configured differently based on the position of the bin within the robot. For example, FIGS. 429A-429L illustrate a top view of charging stations, each including a suction port 42900, an impeller and motor 42901, a container 42902, and an exhaust 42903. Each charging station is configured with a different suction port 42900, depending on the shape and position of a dustbin 42904 of a robot 42905 connected to the charging station via the suction port 42900. In each case, the flow path of air indicated by arrow 42906, also changes based on the position and shape of the dustbin 42904 of the robot and the suction port 42900 of the charging station.

In some embodiments, robots may require servicing. Examples of services include changing a tire or inflating the tire of a robot. In the case of a commercial cleaner, an example of a service may include emptying waste water from the commercial cleaner and adding new water into a fluid reservoir. For a robotic vacuum, an example of a service may include emptying the dustbin. For a disinfecting robot, an example of a service may include replenishment of supplies such as UV bulbs, scrubbing pad, or liquid disinfectant. In some embodiments, robots may be services at a service station or at the charging station. In some cases, particularly when the fleet of robots is large, it may be more efficient for servicing to be provided at a station that is different from the charging station as servicing may require less time than charging. In some embodiments, servicing received by the robots may be automated or may be manual. In some embodiments, robots may be serviced by stationary robots. In some embodiments, robots may be services by mobile robots. In some embodiments, a mobile robot may navigate to and service a robot while the robot is being charged at a charging station. In some embodiments, a history of services may be recorded in a database for future reference. For example, the history of services may be referenced to ensure that maintenance is provided at the required intervals. In some cases, maintenance is provided on an as-need basis. In some cases, the history of services may reducing redundant operations performed on the robots. For example, if a part of a robot was replaced due to failure of the part, the new due date of service is calculated from the date on which the part was replaced instead of the last service date of the part.

In some instances, the environment includes multiple robots, humans, and items that are freely moving around. As robots, humans, and items move around the environment, the spatial representation of the environment (e.g., a point cloud version of reality) as seen by the robot changes. In some embodiments, the change in the spatial representation (i.e., the current reality corresponding with the state of now) may be communicated to processors of other robots. In some embodiments, the camera of the wearable device may capture images (e.g., a stream of images) or videos as the user moves within the environment. In some embodiments, the processor of the wearable device or another processor may overlay the current observations of the camera with the latest state of the spatial representation as seen by the robot to localize. In some embodiments, the processor of the wearable device may contribute to the state of the spatial representation upon observing changes in environment. In some cases, with directional and non-directional microphones on all or some robots, humans, items, and/or electronic devices (e.g., cell phones, smart watches, etc.) localization against the source of voice may be more realistic and may add confidence to a Bayesian inference architecture.

In addition to sharing mapping and localization information, collaborating devices may also share information relating to path planning, next moves, virtual boundaries, detected obstacles, virtually created objects, etc. in real time. For example, a rug may be created by a user in a map of the environment of a first SLAM device using an application of a communication device. The rug may propagate automatically or may be pushed to the maps of other devices by the first SLAM device or the user by using an application of the communication device. The other devices may or may not have an interface and may or may not accept the virtual object. This is also true for commands and tasks. A task ticket may be opened by a user (or a device itself) on a first device (or on a central control system) and the task may be pushed to one or more other devices. A receiving device may or may not accept the task. If accepted, the receiving device may position the task in a task queue and may plan on executing the task based on arrival of tasks in order or an algorithm that optimizes performance and/or an algorithm that optimizes the entire system as a whole (i.e., the system including all devices).

In some embodiments, a mid-size group of robots collaborate with one another. In some embodiments, various robots may use the techniques and method described herein. For example, the robot may be a sidewalk cleaner robot, a commercial cleaner robot, a commercial sanitizing robot, an air quality monitoring and measurement robot, a germ (or bacteria or virus) measurement and monitoring robot, etc. In some embodiments, a processor of the germ/bacteria/virus measurement and monitoring robot adjusts a speed, a distance of the robot from a surface, and power to ensure surfaces are fully disinfected. In some embodiments, such settings are adjusted based on an amount of germs/bacteria/virus detected by sensors of the robot. In some embodiments, the processor of the robot powers off the UV/ozone or other potentially dangerous disinfection tool upon detecting a human or animal within a predetermined range from the robot. In some embodiments, a person or robot may announce themselves to the robot and the processor responds by shutting of the disinfection tool. In some embodiments, persons or animals are detected based on visual sensors, auditory sensors, etc.

In some embodiments, the robot includes a touch-sensitive display or otherwise a touch screen. In some embodiments, the touch screen may include a separate MCU or CPU for the user interface may share the main MCU or CPU of the robot. In some embodiments, the touch screen may include an ARM Cortex M0 processor with one or more computer-readable storage mediums, a memory controller, one or more processing units, a peripherals interface, Radio Frequency (RF) circuitry, audio circuitry, a speaker, a microphone, an Input/Output (I/O) subsystem, other input control devices, and one or more external ports. In some embodiments, the touch screen may include one or more optical sensors or other capacitive sensors that may respond to a hand of a user approaching closely to the sensor. In some embodiments, the touch screen or the robot may include sensors that measure intensity of force or pressure on the touch screen. For example, one or more force sensors positioned underneath or adjacent to the touch sensitive surface of the touch screen may be used to measure force at various points on the touch screen. In some embodiments, physical displacement of a force applied to the surface of the touch screen by finger or hand may generate a noise (e.g., a "click" noise) or movement (e.g., vibration) that may be observed by the user to confirm that a particular button displayed on the touch screen is pushed. In some embodiments, the noise or movement is generated when the button is pushed or released.

In some embodiments, the touch screen may include one or more tactile output generators for generating tactile outputs on the touch screen. These components may communicate over one or more communication buses or signal lines. In some embodiments, the touch screen or the robot may include other input modes, such as physical and mechanical control using a knob, switch, mouse, or button). In some embodiments, peripherals may be used to couple input and output peripherals of the touch screen to the CPU and memory. The processor executes various software programs and/or sets of instructions stored in memory to perform various functions and process data. In some embodiments, the peripherals interface, CPU, and memory controller are implemented on a single chip or, in other embodiments, may be implemented on separate chips.

In some embodiments, the touch screen may display the frame of camera captured and transmitted and displayed to the others during a video conference call. In some embodiments, the touch screen may use liquid crystal display (LCD) technology, light emitting polymer display (LPD) technology, LED display technology with high or low resolution, capacitator touch screen display technology, or other older or newer display technologies. In some embodiments, the touch screen may be curved in one direction or two directions (e.g., a bowl shape). For example, the head of a humanoid robot may include a curved screen that is geared towards transmitting emotions. FIG. 430 includes examples of screens curved in one or more directions.

In some embodiments, the touch screen may include a touch-sensitive surface, sensor, or set of sensors that accept input from the user based on haptic and/or tactile contact. In some embodiments, detecting contact, a particular type of continuous movement, and the eventual lack of contact may be associated with a specific meaning. For example, a smiling gesture (or in other cases a different gesture) drawn on the touch screen by the user may have a specific meaning. For instance, drawing a smiling gesture on the touch screen to unlock the robot may avoid accidental triggering of a button of the robot. In embodiments, the gesture may be drawn with one finger, two fingers, or any other number of fingers. The gesture may be drawn in a back and forth motion, slow motion, or fast motion and using high or low pressure. In some embodiments, the gesture drawn on the touch screen may be sensed by a tactile sensor of the touch screen. In some embodiments, a gesture may be drawn in the air or a symbol may be shown in front of a camera of the robot by a finger, hand, or arm of the user or using another device. In some embodiments, gestures in front of the camera may be sensed by an accelerometer or indoor/outdoor GPS built into a device held by the user (e.g., a cell phone, a gaming controller, etc.). FIG. 431A illustrates a user 43100 drawing a gesture on a touch screen 43101 of the robot 43102. FIG. 431B illustrates the user 43100 drawing the gesture 43103 in the air. FIG. 431C illustrates the user 43100 drawing the gesture 43103 while holding a device 43104 that may include a built-in component used in detecting movement of the user. FIG. 431D illustrates various alternative smiling gestures.

In some embodiments, the robot may project an image or video onto a screen (e.g., like a projector). In some embodiments, a camera of the robot may be used to continuously capture images or video of the image or video projected. For example, a camera may capture a red pointer pointing to a particular spot on an image projected onto a screen and the processor of the robot may detect the red point by comparing the projected image with the captured image of the projection. In some embodiments, this technique may be used to capture gestures. For example, instead of a laser pointer, a person may point to a spot in the image using fingers, a stylus, or another device.

In some embodiments, the robot may communicate using visual outputs such as graphics, texts, icons, videos and/or by using acoustic outputs such as videos, music, different sounds (e.g., a clicking sound), speech, or by text to voice translation. In embodiments, both visual and acoustic outputs may be used to communicate. For example, the robot may play an upbeat sound while displaying a thumb up icon when a task is complete or may play a sad tone while displaying a text that reads 'error' when a task is aborted due to error.

In some embodiments, the robot may include a RF module that receives and sends RF signals, also known as electromagnetic signals. In some embodiments, the RF module converts electrical signals to and from electromagnetic signals to communicate. In some embodiments, the robot may include an antenna system, an RF transceiver, one or more amplifiers, memory, a tuner, one or more oscillators, and a digital signal processor. In some embodiments, a Subscriber Identity Module (SIM) card may be used to identify a subscriber. In some embodiments, the robot includes wireless modules that provide mechanisms for communicating with networks. For example, the Internet provides connectivity through a cellular telephone network, a wireless Local Area Network (LAN), a Metropolitan Area Network (MAN), a Wide Area Network (WAN), and other devices by wireless communication. In some embodiments, the wireless modules may detect Near Field Communication (NFC) fields, such as by a short-range communication radio. In some embodiments, the system of the robot may abide to communication standards and protocols. Examples of communication standards and protocols that may be used include Global System for Mobile Communications (GSM), Enhanced Data GSM Environment (EDGE), High-Speed Downlink Packet Access (HSDPA), High-Speed Uplink Packet Access (HSUPA), Evolution Data Optimized (EV-DO), High Speed Packet Access (HSPA), HSPA+, Dual-Cell HSPA (DC-HSPDA), Long Term Evolution (LTE), Near Field Communication (NFC), Wideband Code Division Multiple Access (W-CDMA), Code Division Multiple Access (CDMA), Time Division Multiple Access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), and Wi-MAX. In some embodiments, the wireless modules may include other internet functionalities such as connecting to the web, Internet Message Access Protocol (IMAP), Post Office Protocol (POP), instant messaging, Session Initiation Protocol for Instant Messaging and Presence Leveraging Extensions (SIMPLE), Instant Messaging and Presence Service (IMPS), Short Message Service (SMS), etc.

In some embodiments, the robot may carry voice and/or video data. In embodiments, the average human ear may hear frequencies from 20-20,000 Hz while human speech may use frequencies from 200-9,000 Hz. Some embodiments may employ the G.711 standard, an International Telecommunications Union (ITU) standard using pulse code modulation (PCM) to sample voice signals at a frequency of 8,000 samples per second. Two common types of binary conversion techniques employed in the G.711 standard include u-law (used in the United States, Canada, and Japan) and a-law (used in other locations). Some embodiments may employ the G.729 standard, an ITU standard that samples voice signals at 8,000 samples per second with bit rate fixed at 8 bits per sample and is based on Nyquist rate theorem. In embodiments, the G.729 standard uses compression to achieve more throughput, wherein the compressed voice signal only needs 8 Kbps per call as opposed to 64 Kbps per call in the G.711 standard. The G.729 codec standard allows eight voice calls in same bandwidth required for just one voice call in the G.711 codec standard. In embodiments, the G.729 standard uses a conjugative-structure algebraic-code-excided liner prediction (CS-ACELP) and alternates sampling methods and algebraic expressions as a codebook to predict the actual numeric representation. Therefore, smaller algebraic expressions sent are decoded on the remote site and the audio is synthesized to resemble the original audio tones. In some cases, there may be degradation of quality associated with audio waveform prediction and synthetization. Some embodiments may employ the G.729a standard, another ITU standard that is a less complicated variation of G.729 standard as it uses a different type of algorithm to encode the voice. The G.729 and G.729a codecs are particularly optimized for human speech. In embodiments, data may be compressed down to 8 Kbps stream and the compressed codecs may be used for transmission of voice over low speed WAN links. Since codecs are optimized for speech, they often do not provide adequate quality for music streams. A better quality codec may be used for playing music or sending music or video information. In some cases, multiple codecs may be used for sending different types of data. Some embodiments may use H.323 protocol suite created by ITU for multimedia communication over network based environments. Some embodiments may employ H.450.2 standard for transferring calls and H.450.3 standard for forwarding calls. Some embodiments may employ Internet Low Bitrate Codec (ILBC), which uses either 20 ms or 30 ms voice samples that consume 15.2 Kbps or 13.3 Kbps, respectively. The ILBC may moderate packet loss such that a communication may carry on with little notice of the loss by the user. Some embodiments may employ internet speech audio codec which uses a sampling frequency of 16 kHz or 32 kHz, an adaptive and variable bit rate of 10-32 Kbps or 10-52 Kbps, an adaptive packet size 30-60 ms, and an algorithmic delay of frame size plus 3 ms. Several other codecs (including voice, music, and video codecs) may be used, such as Linear Pulse Code Modulation, Pulse-density Modulation, Pulse-amplitude Modulation, Free Lossless Audio Codec, Apple Lossless Audio Codec, monkey's audio, OptimFROG, WavPak, True Audio, Windows Media Audio Lossless, Adaptive differential pulse-code modulation, Adaptive Transform Acoustic Coding, MPEG-4 Audio, Linear predictive coding, Xvid, FFmpeg MPEG-4, and DivX Pro Codec. In some embodiments, a Mean Opinion Score (MOS) may be used to measure the quality of voice streams for each particular codec and rank the voice quality on a scale of 1 (worst quality) to 5 (excellent quality).

In some embodiments, Session Initiation Protocol (SIP), an IETF RFC 3261 standard signaling protocol designed for management of multimedia sessions over the internet, may be used. The SIP architecture is a peer-to-peer model in theory. In some embodiments, Real-time Transport Protocol (RTP), an IETF RFC 1889 and 3050 standard for the delivery of unicast and multicast voice/video streams over an IP network using UDP for transport, may be used. UDP, unlike TCP, may be an unreliable service and may be best for voice packets as it does not have a retransmit or reorder mechanism and there is no reason to resend a missing voice signal out of order. Also, UDP does not provide any flow control or error correction. With RTP, the header information alone may include 40 bytes as the RTP header may be 12 bytes, the IP header may be 20 bytes, and the UDP header may be 8 bytes. In some embodiments, Compressed RTP (cRTP) may be used, which uses between 2-5 bytes. In some embodiments, Real-time Transport Control Protocol (RTCP) may be used with RTP to provide out-of-band monitoring for streams that are encapsulated by RTP. For example, if RTP runs on UDP port 22864, then the corresponding RTCP packets run on the next UDP port 22865. In some embodiments, RTCP may provide information about the quality of the RTP transmissions. For example, upon detecting a congestion on the remote end of the data stream, the receiver may inform the sender to use a lower-quality codec.

In some embodiments, a video or specially developed codec may be used to send SLAM packets within a network. In some embodiments, the codec may be used to encode a spatial map into a series of image like. In some embodiments, 8 bits may be used to describe each pixel and 256 statuses may be available for each cell representing the environment. In some cases, pixel color may not necessarily be important. In some embodiments, depending on the resolution, a spatial map may include a large amount of information, and in such cases, representing the spatial map as video stream may not be the best approach. Some examples of video codecs may include AOM Video 1, Libtheora, Dirac-Research, FFmpeg, Blackbird, DivX, VP3, VP5, Cinepak, and RealVideo.

In some embodiments, packets may be lost because of a congested or unreliable network connection. In some embodiments, particular network requirements for voice and video data may be employed. In addition to bandwidth requirements, voice and video traffic may need an end-to-end one way delay of 150 ms or less, a jitter of 30 ms or less, and a packet loss of 1% or less. In some embodiments, the bandwidth requirements depend on the type of traffic, the codec on the voice and video, etc. For example, video traffic consumes a lot more bandwidth than voice traffic. Or in another example, the bandwidth required for SLAM or mapping data, especially when the robot is moving, is more than a video needs, as continuous updates need to go through the network. In another example, in a video call without much movement, lost packets may be filled using intelligent algorithms whereas in a stream of SLAM packets this cannot be the case. In some embodiments, maps may be compressed by employing similar techniques as those used for image compression.

In some embodiments, any of a Digital Signal Processor (DSP) and Single Input-Multiple Data (SIMD) architecture may be used. In some embodiments, any of a Reduced Instruction Set (RISC) system, an emulated hardware environment, and a Complex Instruction Set (CISC) system using various components such as a Graphic Processing Unit (GPU) and different types of memory (e.g., Flash, RAM, double data rate (DDR) random access memory (RAM), etc.) may be used. In some embodiments, various interfaces, such as Inter-Integrated Circuit (I2C), Universal Asynchronous Receiver/Transmitter (UART), Universal Synchronous/Asynchronous Receiver/Transmitter (USART), Universal Serial Bus (USB), and Camera Serial Interface (CSI), may be used. In embodiments, each of the interfaces may have an associated speed (i.e., data rate). For example, thirty 1 MB images captured per second results in the transfer of data at a speed of 30 MB per second. In some embodiments, memory allocation may be used to buffer incoming or outgoing data or images. In some embodiments, there may be more than one buffer working in parallel, round robin, or in serial. In some embodiments, at least some incoming data may be time stamped, such as images or readings from odometry sensors, IMU sensor, gyroscope sensor, LIDAR sensor, etc.

In some embodiments, the robot includes a theft detection mechanism. In some embodiments, the robot includes a strict security mechanism and legacy network protection. In some embodiments, the system of the robot may include a mechanism to protect the robot from being compromised. In some embodiments, the system of the robot may include a firewall and organize various functions according to different security levels and zones. In some embodiments, the system of the robot may prohibit a particular flow of traffic in a specific direction. In some embodiments, the system of the robot may prohibit a particular flow of information in a specific order. In some embodiments, the system of the robot may examine the application layer of the Open Systems Interconnection (OSI) model to search for signatures or anomalies. In some embodiments, the system of the robot may filter based on source address and destination address. In some embodiments, the system of the robot may use a simpler approach, such as packet filtering, state filtering, and such.

In some embodiments, the system of the robot may be included in a Virtual Private Network (VPN) or may be a VPN endpoint. In some embodiments, the system of the robot may include an antivirus software to detect any potential malicious data. In some embodiments, the system of the robot may include an intrusion prevention or detection mechanism for monitoring anomalies or signatures. In some embodiments, the system of the robot may include content filtering. Such protection mechanisms may be important in various applications. For example, safety is essential for a robot used in educating children through audio-visual (e.g., online videos) and verbal interactions. In some embodiments, the system of the robot may include a mechanism for preventing data leakage. In some embodiments, the system of the robot may be capable of distinguishing between spam emails, messages, commands, contacts, etc. In some embodiments, the system of the robot may include antispyware mechanisms for detecting, stopping, and reporting, suspicious activities. In some embodiments, the system of the robot may log suspicious occurrences such that they may be played back and analyzed. In some embodiments, the system of the robot may employ reputation-based mechanisms. In some embodiments, the system of the robot may create correlations between types of events, locations of events, and order and timing of events. In some embodiments, the system of the robot may include access control. In some embodiments, the system of the robot may include Authentication, Authorization, and Accounting (AAA) protocols such that only authorized persons may access the system. In some embodiments, vulnerabilities may be patched where needed. In some embodiments, traffic may be load balanced and traffic shaping may be used to avoid congestion of data. In some embodiments, the system of the robot may include rule based access control, biometric recognition, visual recognition, etc.

In some embodiments, the robot may include speakers and a microphone. In some embodiments, audio data from the peripherals interface may be received and converted to an electrical signal that may be transmitted to the speakers. In some embodiments, the speakers may convert the electrical signals to audible sound waves. In some embodiments, audio sound waves received by the microphone may be converted to electrical pulses. In some embodiments, audio data may be retrieved from or stored in or transmitted to memory and/or RF signals.

In some embodiments, a user may instruct the robot to navigate to a location of the user or to another location by verbally providing an instruction to the robot. For instance, the user may say "come here" or "go there" or "got to a specific location". For example, a person may verbally provide the instruction "come here" to a robotic shopping cart to place bananas within the cart and may then verbally provide the instruction "go there" to place a next item, such as grapes, in the cart. In other applications, similar instructions may be provided to robots to, for example, help carry suitcases in an airport, medical equipment in a hospital, fast food in a restaurant, or boxes in a warehouse. In some embodiments, a directional microphone of the robot may detect from which direction the command is received from and the processor of the robot may recognize key words such as "here" and have some understanding of how strong the voice of the user is. In some embodiments, electroacoustic devices such as speakers or other audio components and/or electromechanical devices that convert energy into linear motion such as a motor, solenoid, electroactive polymer, piezoelectric actuator, electrostatic actuator, or other tactile output generating component may be used. In some cases, a directional microphone may be insufficient or inaccurate if the user is in a different room than the robot. Therefore, in some embodiments, different or additional methods may be used by the processor to localize the robot relative to the verbal command of "here". In one method, the user may wear a tracker that may be tracked at all times. For more than one user, each tracker may be associated with a unique user ID. In some embodiments, the processor may search a database of voices to identify a voice, and subsequently the user, providing the command. In some embodiments, the processor may use the unique tracker ID of the identified user to locate the tracker, and hence the user that provided the verbal command, within the environment. In some embodiments, the robot may navigate to the location of the tracker. In another method, cameras may be installed in all rooms within an environment. The cameras may monitor users and the processor of the robot or another processor may identify users using facial recognition or other features. In some embodiments, the processor may search a database of voices to identify a voice, and subsequently the user, providing the command. Based on the camera feed and using facial recognition, the processor may identify the location of the user that provided the command. In some embodiments, the robot may navigate to the location of the user that provided the command. In one method, the user may wear a wearable device (e.g., a headset or watch) with a camera. In some embodiments, the processor of the wearable device or the robot may recognize what the user sees from the position of "here" by extracting features from the images or video captured by the camera. In some embodiments, the processor of the robot may search its database or maps of the environment for similar features to determine the location surrounding the camera, and hence the user that provided the command. The robot may then navigate to the location of the user. In another method, the camera of the wearable device may constantly localize itself in a map or spatial representation of the environment as understood by the robot. The processor of the wearable device or another processor may use images or videos captured by the camera and overlays them on the spatial representation of the environment as seen by the robot to localize the camera. Upon receiving a command from the user, the processor of the robot may then navigate to the location of the camera, and hence the user, given the localization of the camera. Other methods that may be used in localizing the robot against the user include radio localization using radio waves, such as the location of the robot in relation to various radio frequencies, a Wi-Fi signal, or a sim card of a device (e.g., apple watch). In another example, the robot may localize against a user using heat sensing. A robot may follow a user based on readings from a heat camera as data from a heat camera may be used to distinguish the living (e.g., humans, animals, etc.) from the non-living (e.g., desks, chairs, and pillars in an airport). In embodiments, privacy practices and standards may be employed with such methods of localizing the robot against the verbal command of "here" or the user.

In embodiments, the robot may perform or provide various services (e.g., shopping, public area guide such as in an airport and mall, delivery, etc.). In some embodiments, the robot may be configured to perform certain functions by adding software applications to the robot as needed (e.g., similar to installing an application on a smart phone or a software application on a computer when a particular function, such as word processing or online banking, is needed). In some embodiments, the user may directly install and apply the new software on the robot. In some embodiments, software applications may be available for purchase through online means, such as through online application stores or on a website. In some embodiments, the installation process and payment (if needed) may be executed using an application (e.g., mobile application, web application, downloadable software, etc.) of a communication device (e.g., smartphone, tablet, wearable smart devices, laptop, etc.) paired with the robot. For instance, a user may choose an additional feature for the robot and may install software (or otherwise program code) that enables the robot to perform or possess the additional feature using the application of the communication device. In some embodiments, the application of the communication device may contact the server where the additional software is stored and allows that server to authenticate the user and check if a payment has been made (if required). Then, the software may be downloaded directly from the server to the robot and the robot may acknowledge the receipt of new software by generating a noise (e.g., a ping or beeping noise), a visual indicator (e.g., LED light or displaying a visual on a screen), transmitting a message to the application of the communication device, etc. In some embodiments, the application of the communication device may display an amount of progress and completion of the install of the software. In some embodiments, the application of the communication device may be used to uninstall software associated with certain features.

In some embodiments, the application of the communication device may be used to manage subscription services. In embodiments, the subscription services may be paid for or free of charge. In some embodiments, subscription services may be installed and executed on the robot but may be controlled through the communication device of the user. The subscription services may include, but are not limited to, Social Networking Services (SNS) and instant messaging services (e.g., Facebook, LinkedIn, WhatsApp, WeChat, Instagram, etc.). In some embodiments, the robot may use the subscription services to communicate with the user (e.g., about completion of a job or an error occurring) or contacts of the user. For example, a nursing robot may send an alert to particular social media contacts (e.g., family members) of the user if an emergency involving the user occurs. In some embodiments, subscription services may be installed on the robot to take advantage of services, terminals, features, etc. provided by a third party service provider. For example, a robot may go shopping and may use the payment terminal installed at the supermarket to make a payment. Similarly, a delivery robot may include a local terminal such that a user may make a payment upon delivery of an item. The user may choose to pay using an application of a communication device without interacting with the delivery robot or may choose to use the terminal of the robot. In some embodiments, a terminal may be provided by the company operating the robot or may be leased and installed by a third party company such as Visa, Amex, or a bank.

In embodiments, various payment methods may be accepted by the robot or an application paired with the robot. For example, coupons, miles, cash, credit cards, reward points, debit cards, etc. For payments, or other communications between multiple devices, near-field wireless communication signals, such as Bluetooth Low Energy (BLE), Near Field Communication (NFC), IBeacon, Bluetooth, etc., may be emitted. In embodiments, the communication may be a broadcast, multicast, or unicast. In embodiments, the communication may take place at layer 2 of the OSI model with MAC address to MAC address communication or at layer 3 with involvement of TCP/IP or using another communication protocol. In some embodiments, the service provider may provide its services to clients who use a communication device to send their subscription or registration request to the service provider, which may be intercepted by the server at the service provider. In some embodiments, the server may register the user, create a database entry with a primary key, and may allocate additional unique identification tokens or data to recognize queries coming in from that particular user. For example, there may be additional identifiers such as services associated with the user that may be assigned. Such information may be created in a first communication and may be used in following service interactions. In embodiments, the service may be provided or used at any location such a restaurant, a shopping mall, or a metro station.

In some embodiments, the processor may monitor the strength of a communication channel based on a strength value given by Received Signal Strength Indicator (RSSI). In embodiments, the communication channel between a server and any device (e.g., mobile phone, robot, etc.) may kept open through keep alive signals, hello beacons, or any simple data packet including basic information that may be sent at a previously defined frequency (e.g., 10, 30, 60, or 300 seconds). In some embodiments, the terminal on the service provider may provide prompts such that the user may tap, click, or approach their communication device to create a connection. In some embodiments, additional prompts may be provided to guide a robot to approach its terminal to where the service provider terminal desires. In some embodiments, the service provider terminal may include a robotic arm (for movement and actuation) such that it may bring its terminal close to the robot and the two can form a connection. In embodiments, the server may be a cloud based server, a backend server of an internet application such as an SNS application or an instant messaging application, or a server based on a publicly available transaction service such as Shopify. FIG. 432A illustrates an example of a vending machine robot including an antenna 43200, a payment terminal 43201, pods 43202 within which different items for purchase are stored, sensor windows 43203 behind which sensors used for mapping and navigation are positioned, and wheels 43204 (side drive wheels and front and rear caster wheels). The payment terminal may accept credit and debit cards and payment may be transacted by tapping a payment card or a communication device of a user. In embodiments, various different items may be purchased, such as food (e.g., gum, snickers, burger, etc.). In embodiments, various services may be purchased. For example, FIG. 432B illustrates the purchase of a mobile device charger rental from the vending machine robot. A user may select the service using an application of a communication device, a user interface on the robot, or by verbal command. The robot may respond by opening pod 43205 to provide a mobile device charger 43206 for the user to use. The user may leave their device within the secure pod 43205 until charging is complete. For instance, a user may summon a robot using an application of a mobile device upon entering a restaurant for dining. The user may use the application to select mobile device charging and the robot may open a pod including a charging cable for the mobile device. The user may plug their mobile device into the charging cable and leave the mobile device within the pod for charging while dining. When finished, the user may unlock the pod using an authentication method to retried their mobile device. In another example illustrated in FIG. 432C, the user may pay to replace a depleted battery pack in their possession with a fully charged battery pack 43207 or may rent a fully charged battery pack 43207 from pod 43208 of the vending machine robot. For instance, a laptop of a user working in a coffee shop may need to be charged. The user may rent a charging adaptor from the vending machine robot and may return the charging adapter when finished. In some cases, the user may pay for the rental or may leave a deposit to obtain the item which may be refunded after returning the item. In some embodiments, the robot may issue a slip including information regarding the item purchased or service received. For example, the robot may issue a slip including details of the service received, such as the type of service, the start and end time of the service, the cost of the service, the identification of the robot that provided the service, the location at which the service was provided, etc. Similar details may be included for items purchased.

In some embodiments, the robot may include cable management infrastructure. For example, the robot may include shelves with one or more cables extending from a main cable path and channeled through apertures available to a user with access to the corresponding shelf. In some embodiments, there may be more than one cable per shelf and each cable may include a different type of connector. In some embodiments, some cables may be capable of transmitting data at the same time. In some embodiments, data cables such as USB cables, mini-USB cables, firewire cables, category 5 (CAT-5) cables, CAT-6 cables, or other cables may be used to transfer power. In some embodiments, to protect the security and privacy of users plugging their mobile device into the cables, all data may be copied or erased. Alternatively, in some embodiments, inductive power transfer without the use of cables may be used.

In some embodiments, the robot may include various software components and/or drivers for controlling and managing general system tasks (e.g., memory management, storage device control, power management, etc.) and facilitating communication between various hardware and software components and data received by various software components from RF and/or external ports such as USB, firewire, or Ethernet. In some embodiments, the robot may include capacitate buttons, push buttons, rocker buttons, dials, slider switches, joysticks, click wheels, keyboard, an infrared port, a USB port, and a pointer device such as a mouse, a laser pointer, motion detector (e.g., a motion detector for detecting a spiral motion of fingers), etc. In embodiments, different interactions with user interfaces of the robot may provide different reactions or results from the robot. For example, a long press, a short press, and/or a press with increased pressure of a button may each provide different reactions or results from the robot. In some cases, an action may be enacted upon the release of a button or upon pressing a button.

In embodiments, the robot may exist in one of several states. For example, FIGS. 433-443 illustrate possible states a cleaning robot may have and possible transitions between them. FIG. 433 illustrates a summary of a robot state machine including all possible state transitions. Each arrow represents a transition from one state of the robot to another state of the robot. FIG. 434 illustrates shutdown state transitions, wherein each arrow demonstrates the transition to or from this state and the event triggering each transition. In similar schematics, FIG. 435 illustrates standby state transitions, FIG. 436 illustrates sleep state transitions, FIG. 437 illustrates cleaning state transitions, FIG. 438 illustrates pause state transitions, FIG. 439 illustrates docking state transitions, FIG. 440 illustrates charging state transitions, FIG. 441 illustrates full power state transitions, FIG. 442 illustrates Wi-Fi pairing state transitions, FIG. 443 illustrates trouble state transitions.

In some embodiments, the state of the robot may depend on inputs received by a user interface (UI) of the robot. FIG. 444A illustrates an example of a vertical UI structure including indicators and buttons that may be implemented within the robot. FIG. 444B illustrates a horizontal UI structure including indicators and buttons that may be implemented within the robot. FIG. 444C illustrates an example of the UI in practice, wherein each indicator has its own icon. FIG. 445 illustrates a list of each button function and a state of the robot before and after activating each button. FIG. 446 illustrates state transitions resulting from UI button input. Each arrow illustrates the transition between two states of the robot, and above each arrow, the button function triggering each transition. FIG. 447 illustrates a list of UI LED indicator functions. In different robot states, each UI LED indicator may be in one of the following states: solid wherein the LED is enabled and is not animating, off wherein the LED is disabled and is not animating, blinking wherein the LED transitions between solid and off within the given period, and fade wherein the LED transitions between solid to off and off to solid with a gradual change in intensity. Fading steps may not be visible to the human eye.

FIG. 448 illustrates state transitions based on battery power. Possible transitions between states are shown with arrows, the battery states that trigger each transition shown above each corresponding arrow. FIG. 449 illustrates an example of a list of cleaning tasks of the robot. Cleaning task may refer to the actions of robot while cleaning. FIGS. 450A-450F illustrate paths the robot may take during each cleaning task. FIG. 450A illustrates an example of a path during a smart clean task, FIG. 45013 illustrates an example of a path during a partial clean task, FIG. 450C illustrates an example of a path during a point clean task, FIG. 450D illustrates an example of a path during a spot clean task, FIG. 450E illustrates an example of a path during a wall follow task, and FIG. 450G illustrates an example of a path during a manual clean task. FIG. 451 illustrates an example of a list of critical issues the robot may encounter. The robot may enter a trouble state when any of these issues are detected and may alert the user via a UI of the robot and/or the application of the communication device paired with the robot. FIG. 452 illustrates an example of list of other issues the robot may encounter. The robot may alert the user through its UI and/or the application if any of these issues are detected but may not enter a trouble state. FIG. 453 illustrates an example of a list of audio prompts of the robot and when each audio prompt may play.

In some embodiments, the processor is reactive. This occurs in cases wherein the robot encounters an object or cliff during operation and the processor makes a decision based only on the sensing of the object or cliff. In some embodiments, the processor is cognitive. This occurs in cases wherein the processor observes an object or cliff on the map and reasons based on the object or cliff within the map. FIG. 454 illustrates an example of a scale representing the type of behavior of the robot, with reactive on one end and cognitive on the other.

Some embodiments may include a midsize or upright vacuum cleaner. In embodiments, the manual operation of a midsize robot or an upright robot vacuum cleaner may be assisted by a motor that provides some amount of torque to aid in overcoming the weight of the device. For example, for a robot cleaner, the motor provides some amount of torque that keeps the device from moving on its own but when pushed by a user moves such that the device feels easy to push by the user. The motor of the robot provides enough energy to overcome friction and a small amount of force applied to the robot allows the robot to move. In some low friction surfaces, such as shiny stone, marble, hardwood, and shiny ceramic surfaces, the motor of the robot may overcome the friction and the robot may start to move very slowly on the surface. In such cases, the processor may perceive the movement based on data from an odometer sensor, encoder sensor or other sensors of the robot and may adjust the power of the motor or reduce the number of pulses per second to prevent the robot from moving. In embodiments, the strikes of an upright vacuum are back and forth. When there is a push provided by a motor in one direction, movement in another direction is difficult. To overcome this, an upright robot vacuum may have a seed value for a user strike size or range of motion when a hand and body of the user extends and retracts during vacuuming. To maximize the aid provided by the upright robot cleaner, the motor may not enforce any torque at 3 or z of the range of motion. FIG. 455A illustrates examples of upright robot vacuums. FIG. 455B illustrates an example of an upright robot vacuum 45500 that rotate about a pivot point, indicated by arrow 45501. A user pushes the upright robot vacuum 45500 in a direction 45502. FIG. 455C illustrates a range of motion 45504 of a hand and body of the user during vacuuming as the user pushes in a direction 45502 and pulls in a direction 45503 is shown. FIG. 455D visually illustrates the portion of the push in direction 45502 and pull in direction 45503 during which the robot applies force via the motor to enforce torque to aid in the movement of the vacuum 45500.

In some embodiments, the processor of the upright vacuum cleaner may predict a range of motion when an object or wall is observed in order to prevent hitting of the object or wall, particularly when the user has a longer range of motion. In such a case, the motor may stop applying torque earlier than normal for the particular area. FIG. 456A illustrates a user operating upright robot vacuum 45500 that is approaching a wall 45505. The processor of the vacuum 45500 may detect the wall 45505 and may instruct the motor to stop enforcing torque earlier. This is shown in FIG. 456B, wherein the portion of the range of motion in which the torque is enforced 45506 is reduced when approaching the wall, as indicated by the smaller size of the arrows. In embodiments, the range of motion varies based on the user as well as work session. For example, FIG. 457 illustrates a first user 45700 and a second user 45701 operating an upright robot vacuum 45702. The first user 45700 is taller and has a longer range of motion than the second user 45701 that is shorter. In some embodiments, a reinforced learning algorithm may be used in determining a user strike size or range of motion. In some embodiments, the processor of the upright robot vacuum learns the strike size of a user of group of users. In embodiments, the processor may use unsupervised learning (or deep versions of it) to detect when there are multiple users, each with different range of motion. In some embodiments, the processor may learn lengths of range of motion of the user in an online manner.

In some embodiments, the processor of the power assisted upright robot vacuum may use a training set of data to train offline prior to learning additional user behaviors during operation. For example, prior to manufacturing, the algorithms executed by the processor may be trained based on large training data sets such that the processor of the upright robot vacuum is already aware of various information, such as correlation between user height and range of motion of strikes (e.g., positively correlated), etc. In some embodiments, the processor of the power assisted upright robot vacuum may identify a floor type based on data collected by various types of sensors. In some embodiments, the processor may adjust the power of the motor based on the type of floor. Sensors may include light based sensors, IR sensors, laser sensors, cameras, electrical current sensors, etc. In some embodiments, the coverage of an upright robot vacuum when operated by a user may be saved. An autonomous robotic vacuum may execute the saved coverage.

The various methods and techniques described herein, such as SLAM, ML enhanced SLAM, neural network enhanced SLAM, may be used for various manually operated devices, semi-automatic devices, and autonomous devices. For instance, an upright vacuum cleaner (similar to the upright vacuum cleaner described above) may be manually operated by a user but may also include a robotic portion. The robotic portion may include at least sensors and a processor that generates a spatial representation of the environment (including a flattened version of the spatial representation) and enacts actions that may assist the user in operating the upright vacuum cleaner based on sensor data. As discussed above, the processor learns when to actuate the motor as the user pushes and pulls the upright vacuum during operation. This type of assistance may be used with various different applications, particularly those including the pushing, pulling, lifting etc. of heavier loads. For example, a user pushing and/or pulling a cart in a storage facility or warehouse. Other examples include a user pushing and/or pulling a trolley, a dolly, a pallet truck, a forklift, a jack, a hand truck, a hand trolley, a wheel barrow, etc. In another example, a walker used for a baby or an elderly person may include a robotic portion. The robotic portion may include at least sensors and a processor that generates a spatial representation of the environment (including a flattened version of the spatial representation) and enacts actions that may assist the user in avoiding dangers during operations. For instance, the processor may adjust motor settings of a motor of the wheels only in cases where the user is close to encountering a potential obstruction. In some embodiments, objects, virtual barriers, obstructions, etc. may be pre-configured by, for example, a user using an application of a communication device paired with the robotic portion of a device. The application displays the spatial representation of the environment and the user may add objects, virtual barriers, obstructions, etc. to the spatial representation using the user interface of the application. In some embodiments, the processor of the robotic portion of the device may discover objects in real-time based on sensor data during operation. For example, the processor of the walker may detect an object containing liquid on the floor that may spill upon collision with the walker or a cellphone on the floor that may be crushed upon a wheel of the walker rolling over it or a sharp object that may injure a foot of the user. The processor may actuate an adjustment to the motor settings of the wheels (e.g., reducing power) to help the user avoid the collision. In embodiments, the processor continuously self-trains in identifying, detecting, classifying, and reacting to objects. This is additional to the pre-training via deep learning and other ML-based algorithms.

In some embodiments, the processor of the device actuates the wheels to drive along a particular path. For instance, a mother of a baby using the walker may call for the baby. The processor may detect this based on sensor data and in response may actuate the wheels of the walker to gradually direct the baby towards the mother. The processor may actuate an adjustment to the caster wheels such that the path of the wheels of the walker is slightly adjusted. FIG. 458 illustrates an example of a baby 45800 using a walker 45801 including a caster wheel 45802 that rotates in direction 45803. Arrows 45804 indicates an original orientation of the caster wheel 45802 while arrow 45805 indicates a new orientation of the caster wheel 45802. The processor may actuate the motor to apply a little motion and motor rotation to gradually and gracefully adjust a path of the wheels of the walker. FIG. 459 illustrates an example of a walker 45900 and a person 45901 using the walker 45900 with wheels 45902, handles 45903, and cameras 45904. In embodiments, the walker 45900 includes various sensors such as optical encoders, TOF sensors, depth sensors, LIDAR, LADAR, sonar, etc. The robotic portion of the walker 45900 may help in pushing and pulling a weight of the walker 45900 as well as supporting a weight of the person 45901 by slowly applying power to a motor of the wheels 45902. The processor may also identify, detect, classify, and react to objects, as described above. The processor may actuate an adjustment of motor settings to assist the person 45901 in avoiding any dangers while using the walker 45900. In some cases, the handles 45903 may include a reactive component (e.g., button, pressure sensor, etc.) 45905 that causes manual acceleration of the walker 45900 upon activation. Upon activation of the reactive component 45905, the wheels 45902 may slowly move in a forward direction to assist the person 45901 in walking. In some instances, the wheels 45902 may move one step size forward. In some embodiments, the processor may be pre-trained on the size of one step size based on sensor data previously collected by sensors of other walkers used. In some embodiments, the processor of the walker 45900 may learn the step size of the user 45901 based on sensor data collected during use of the walker 45900 and optimize the step size for the user 45901.

In some embodiments, the robot may include an integrated bumper as described in U.S. Non-Provisional patent application Ser. Nos. 15/924,174, 16/212,463, 16/212,468, and 17/072,252, each of which is hereby incorporated by reference. In some embodiments, a bumper of a commercial cleaning robot acts similar to a kill switch. However, its large in size, encompasses a large portion of a front of the robot, and makes operation of the robot safer. In embodiments, the robot stops before or at the time that the entire bumper is fully compressed. FIG. 460 illustrates an example of a bumper 46000 of a robot 46001. At a first time point the bumper 46000 makes contact with an object. At a second time point the bumper is actuated after travelling a distance towards the robot. At this point the bumper 46000 activates a tactile and/or infrared based sensor. At a third time point the processor detects that the tactile and/or infrared based sensor is activated. At a fourth time point the processor instructs wheel motors of the robot to stop. At a fifth time point the robot stops moving, the time this takes depends on the momentum of the robot, friction between the robot wheels and driving surface, etc. The total time from when the bumper is touched to the robot stopping movement is the summation of the first time point to the fifth time point. In embodiments, the maximum distance the robot travels after the bumper makes contact with the object is smaller than the distance L between the bumper at a normal position and a compressed position. In some embodiments, a break system is added for extra safety. In embodiments, the break mechanism applies a force in reverse to the motor to prevent the motor from rotating due to momentum.

In some embodiments, the processor of the robot detects a confinement device based on its indentation pattern, such as described in U.S. Non-Provisional patent application Ser. Nos. 15/674,310 and 17/071,424, each of which is hereby incorporated by reference. A line laser may be projected onto objects and an image sensor may capture images of the laser line. The indentation pattern may comprise the profile of the laser line in the captured images. The processor may detect the confinement device upon observing a particular line laser profile associated with the confinement device. The processor may create a virtual boundary at a location of the confinement device. This is advantageous to prior art, wherein active beacons that require battery power are used in setting virtual boundaries. In some embodiments, the confinement device may be placed at perimeters and/or places where features are scarce such that the processor may easily recognize the confinement device. In some embodiments, multiple confinement devices with different indentation patterns may be used concurrently. In some embodiments, a similar concept may be used to provide the robot with different instructions or information. For example, objects with different indentation patterns may be associated with different instructions or information. Upon the processor observing an object with a particular indentation pattern, the robot may execute an instruction associated with the object (e.g., slow down or turn right) or obtain information associated with the object (e.g., central point). Associating instructions and/or information with active beacons is not possible as they look alike. In some embodiments, a virtual wall in the environment of the robot may be generated using devices such as those described in U.S. Non-Provisional patent application Ser. Nos. 14/673,656, 15/676,902, 14/850,219, 15/177,259, 16/749,011, 16/719,254, and 15/792,169, each of which is hereby incorporated by reference.

In some embodiments, a user may set various information points by selecting particular objects and associating them with different information points to provide the processor of the robot with additional clues during operation. For example, the processor of the robot may require additional information when operating in an area that is featureless or where features are scarce. In some embodiments, the user uses an application paired with the robot to set various information points. In some embodiments, the robot performs several training sessions by performing its function as normal while observing the additional information points. In some embodiments, the processor proposes a path plan to the user via an application executed on a communication device on which the path plan is visually displayed to the user. In some embodiments, the user uses the application to accept the path plan, modify the path plan, or instruct the robot to perform more training sessions. In some embodiments, the robot may be allowed to operate in the real world after approval of the path plan.

In some embodiments, the robot may have different levels of user access. FIG. 461 illustrates different levels of user access to the robot and robot groups. Robot users may be local or global. Local users may be categorized as administrators, guests, or regular users. Robots may be grouped based on their users and/or may be grouped in other local and global manners as well. In embodiments, a user may be added to a group to gain access to a robot. Access to a robot may also be shared and/or given by consent of a user. This may be synonymous to allowing technical support to access a personal computer. Or in another example, a user may give permission to a nurse to administer a dose of medicine to them. In embodiments, there may be a time set for the permission, wherein it expires after some time. There may also be different permissions and access levels assigned to different users and groups.

In some embodiments, the pivot range of the robot may be limited. For example, FIG. 462 illustrates an example of a robot driver 46200 attached to a device 46201. The robot pivot range may be limited to a desired angle range to maintain more control over the whole assembly movement. In some embodiments, consumable parts of the robot are autonomously sent to the user for replacement based on any of robot runtime, total area covered by the robot, a previous replacement date or purchase date of the particular consumable part. In some embodiments, cables and wires of the robot are internally routed. In some embodiments, a battery pack of the robot comprises battery strain relief at either end of the wires that connect the battery pack to the robot. FIG. 463 illustrates a battery 46300, a connector 46301 that connects to the robot, and wires 46302 connecting the battery 46300 to the connector 46301. The ends of the wires 46302 include battery strain relief.

In some embodiments, a user may interact with the robot using different gestures and interaction types. Examples are shown in FIGS. 464A and 464B. In FIG. 464A a user gently kicks 46400 or taps 46401 the robot 46402 twice (or another number of time) to skip a current room and move onto a next room. ends current scheduled cleaning round. In FIG. 464B a user gently kicks 46400 or taps 46401 the robot 46402 twice (or another number of time) to end the cleaning session.

In some embodiments, the robot may include a BLDC motor with Halbach array. FIG. 465A illustrates an example of an assembled BLDC motor. FIG. 465B illustrates an exploded view of the BLDC motor. FIG. 465C illustrates an exploded view of the stator. FIGS. 465D and 465E illustrate the stator core including three sets of copper wires with alternating current. FIGS. 465F and 465G illustrate the rotor including its magnets. In some embodiments, the BLDC motor may be positioned within a wheel of the robot. FIG. 465H illustrates the function of the BLDC motor of a wheel.

In some embodiments, a user interface of the robot may include a backlit logo. An example is shown in FIG. 466A. An exploded view of the user interface including the backlit logo is shown in FIG. 466B, including the various components of the user interface.

In some embodiments, the robot charges at a charging station such as those described in U.S. Non-Provisional application Ser. Nos. 15/377,674, 16/883,327, 15/706,523, 16/241,436, 17/219,429, and 15/917,096, each of which is hereby incorporated by reference.

Some embodiments use data from IR sensors for guiding the robot onto charging pads of the charging station and obstacle detection. Some embodiments may reduce a number of IR receivers as the data may be used for the two functions. However, sensor positioning may become more important as docking algorithms may require greater accuracy than obstacle detection algorithms. Some embodiments may use a basic logical switch, comprising: configuring the software to check for obstacles only while cleaning; enabling the robot side LEDs, wherein light reflected from the LEDs and off of the obstacles are used by the processor to gauge a coarse distance; configuring the software to check for charging station signals only while docking; completely disabling the aforementioned LEDs, wherein the light for the IR receivers is received exclusively from the charging station; and disabling entirely in other modes for power savings.

Some embodiments may use time-domain multiplexing of a logical switch. This is the same concept as the above-described logical switch, except this concept switches between detection mechanisms with some ratio depending on the operational mode of the robot (e.g., while cleaning, check for obstacles 80% of the time and the charging station 20% of the time; while locating the charging stations, check for check for the charging station 80% of the time and obstacles 20% of the time; when very close to the charging station, check for the charging station 100% of the time (i.e., don't check for obstacles at all)). In some embodiments, superposition of the charging station IR and robot emitted IR interfere with the distance measurements, therefore in some embodiments, the distance sensing mechanism is off while the robot is close to the charging station. Some embodiments may use frequency modulation (or other modulation like phase-shift keying), allowing obstacle detection in parallel with charging station IR detection. Some embodiments may use basic frequency modulation to encode two IR signals and monitor for both in parallel. Frequency modulation method may include emitting signals by the charging station using frequency 1 and emitting signals by the distance sensing LEDs using frequency 2, wherein both are operated in parallel; receiving both signals by the IR sensor and converting them into a digital waveform to be processed by the MCU of the robot; processing the waveform into two streams, frequency1 demodulated to stream 1 and frequency 2 demodulated to stream 2. In embodiments, the relevant streams are processed by different software detectors. Stream1 may be provided to a detector 1A that iterates over a sliding window to match code words emitted by the charging station. Stream 1 may also optionally go to a detector 1B that purely measures the magnitude of the carrier frequency. The greater the magnitude at this frequency, the closer the robot is to the charging station. This may be valuable, as it may be used to easily, but less reliably, detect if the charging station is nearby while cleaning or finding the charging station and more reliably confirm when the robot can enter a "final approach" phase of docking, which may not handle obstacles well. Since "final approach" may not handle obstacles well, it's important that it's only used when very close to the charging station. Some embodiments may implement a naive implementation of this detector using a Discrete Fourier Transform to calculate the magnitude; however, this may be wasteful for one frequency. A more efficient implementation of this detector may use a Goertzel filter to measure the magnitude at just one frequency.

If interference becomes an issue in some embodiments, then the detectors may be adjusted to compare the ratios of several frequencies to verify that there is (A) significant magnitude of the carrier frequency itself, and (B) significantly more magnitude of the carrier frequency compared to other interferers, such as frequency 2. Stream 2 may go to a detector 2, which is similar to the detector 1B above in that it measures magnitude of the carrier frequency. The magnitude of this frequency is proportional to the distance of the obstacle from the robot. In embodiments, the output from the above detectors may be used as inputs to the docking algorithms and short-range obstacle detection algorithms.

In some embodiments, the processor of the robot may control operation and settings of various components of the robot based on environment sensor data. For example, the processor of the robot may increase or decrease a speed of a brush or wheel motor based on current surroundings of the robot. For instance, the processor may increase a brush speed in areas in which dirt is detected or may decrease an impeller speed in places where humans are observed to reduce noise pollution. In some embodiments, the processor of the robot implements the methods and techniques for autonomous adjustment of components described in U.S. Non-Provisional patent application Ser. Nos. 16/163,530, 16/239,410, and 17/004,918, each of which is hereby incorporated by reference. In some embodiments, the processor of the robot infers a work schedule of the robot based on historical sensor data using at least some of the methods described in U.S. Non-Provisional patent application Ser. No. 16/051,328, which is hereby incorporated by reference.

In some embodiments, the robot may be built into the environment, such as described in U.S. Non-Provisional patent application Ser. Nos. 15/071,069 and 17/179,002, each of which is hereby incorporated by reference.

In some embodiments, an avatar may be used to represent the visual identity of the robot. In some embodiments, the user may assign, design, or modify from template a visual identity of the robot. In some embodiments, the avatar may reflect the mood of the robot. For example, the avatar may smile when the robot is happy. In some embodiments, the robot may display the avatar or a face of the avatar on an LCD or other type of screen. In some embodiments, the screen may be curved (e.g., concave or convex). In some embodiments, the robot may identify with a name. For example, the user may call the robot a particular name and the robot may respond to the particular name. In some embodiments, the robot can have a generic name (e.g., Bob) or the user may choose or modify the name of the robot.

In some embodiments, when the robot hears its name, the voice input into the microphone array may be transmitted to the CPU. In some embodiments, the processor may estimate the distance of the user based on various information and may localize the robot against the user or the user against the robot and intelligently adjust the gains of the microphones. In some embodiments, the processor may use machine learning techniques to de-noise the voice input such that it may reach a quality desired for speech-to-text conversion. In some embodiments, the robot may constantly listen and monitor for audio input triggers that may instruct or initiate the robot to perform one or more actions. For example, the robot may turn towards the direction from which a voice input originated for a better user-friendly interaction, as humans generally face each other when interacting. In some embodiments, there may be multiple devices including a microphone within a same environment. In some embodiments, the processor may continuously monitor microphones (local or remote) for audio inputs that may have originated from the vicinity of the robot. For example, a house may include one or more robots with different functionalities, a home assistant such as an Alexa or Google home, a computer, a telepresence device such as the Facebook portal which may all be configured to include sensitivity to audio input corresponding with the name of the robot, in addition to their own respective names. This may be useful as the robot may be summoned from different rooms and from areas different than the current vicinity of the robot. Other devices may detect the name of the robot and transmit information to the processor of the robot including the direction and location from which the audio input originated or was detected or an instruction. For example, a home assistant, such as an Alexa, may receive an audio input of "Bob come here" for a user in close proximity. The home assistant may perceive the information and transmit the information to the processor of Bob (the robot) and since the processor of Bob knows where the home assistant is located, Bob may navigate to the home assistant as it may be the closest "here" that the processor is aware of. From there, other localization techniques may be used or more information may be provided. For instance, the home assistant may also provide the direction from which the audio input originated.

In some embodiments, the processor of the robot may monitor audio inputs, environmental conditions, or communications signals, and a particular observation may trigger the robot to initiate stationary services, movement services, local services, or remotely hosted services. In some embodiments, audio input triggers may include single words or phrases. In some embodiments, the processor may search an audio input against a predefined set of trigger words or phrases stored locally on the robot to determine if there is a match. In some embodiments, the search may be optimized to evaluate more probable options. In some embodiments, stationary services may include a service the robot may provide while remaining stationary. For example, the user may ask the robot to turn the lights off and the robot may perform the instruction without moving. This may also be considered a local service as it does not require the processor to send or obtain information to or from the cloud or internet. An example of a stationary and remote service may include the user asking the robot to translate a word to a particular language as the robot may execute the instruction while remaining stationary. The service may be considered remote as it requires the processor to connect with the internet and obtain the answer from Google translate. In some embodiments, movement services may include services that require the robot to move. For example, the user may ask the robot to bring them a coke and the robot may drive to the kitchen to obtain the coke and deliver it to a location of the user. This may also be considered a local service as it does not require the processor to send or obtain information to or from the cloud or internet.

In some embodiments, the processor of the robot may intelligently determine when the robot is being spoken to. This may include the processor recognizing when the robot is being spoken to without having to use a particular trigger, such as a name. For example, having to speak the name Amanda before asking the robot to turn off the light in the kitchen may be bothersome. It may be easier and more efficient for a user to say "lights off" while pointing to the kitchen. Sensors of the robot may collect data that the processor may use to understand the pointing gesture of the user and the command "lights off". The processor may respond to the instruction if the processor has determined that the kitchen is free of other occupants based on local or remote sensor data. In some embodiments, the processor may recognize audio input as being directed towards the robot based on phrase construction. For instance, a human is not likely to ask another human to turn the lights off by saying "lights off", but would rather say something like "could you please turn the lights off?" In another example, a human is not likely to ask another human to order sugar by saying "order sugar", but would rather say something like "could you please buy some more sugar?" Based on the phrase construction the processor of the robot recognizes that the audio input is directed toward the robot. In some embodiments, the processor may recognize audio input as being directed towards the robot based on particular words, such as names. For example, an audio input detected by a sensor of the robot may include a name, such as John, at the beginning of the audio input. For instance, the audio input may be "John, could you please turn the light off?" By recognizing the name John, the processor may determine that the audio input is not directed towards the robot. In some embodiments, the processor may recognize audio input as being directed towards the robot based on the content of the audio input, such as the type of action requested, and the capabilities of the robot. For example, an audio input detected by a sensor of the robot may include an instruction to turn the television on. However, given that the robot is not configured to turn on the television, the processor may conclude that the audio input is not directed towards the robot as the robot is incapable of turning on the television and will therefore not respond. In some embodiments, the processor of the robot may be certain audio inputs are directed towards the robot when there is only a single person living within a house. Even if a visitor is within the house, the processor of the robot may recognize that the visitor does not live at the house and that it is unlikely that they are being asked to do a chore. Such tactics described above may be used by the processor to eliminate the need for a user to add the name of the robot at the beginning of every interaction with the robot.

In some embodiments, different users may have different authority levels that limit the commands they may provide to the robot. In some embodiments, the processor of the robot may determine loyalty index or bond corresponding to different users to determine the order of command and when one command may override another based on the loyalty index or bond. Such methods are further described in U.S. patent application Ser. Nos. 15/986,670, 16/568,367, 14/820,505, 16/937,085, and 16/221,425, the entire contents of which are hereby incorporated by reference.

In some embodiments, an audio signal may be a waveform received through a microphone. In some embodiments, the microphone may convert the audio signal into digital form. In some embodiments, a set of key words may be stored in digital form. In some embodiments, the waveform information may include information that may be stored or conveyed. For example, the waveform information may be used to determine which person is being addressed in the audio input. The processor of the robot may use such information to ensure the robot only responds to the correct people for the correct reasons. For instance, the robot may execute a command to order sugar when the command is provided by any member of a family living within a household but may ignore the command when provided by anyone else.

In some embodiments, a voice authentication system may be used for voice recognition. In some embodiments, voice recognition may be performed after recognitions of a keyword. In some embodiments, the voice authentication system may be remote, such as on the cloud, wherein the audio signal may travel via wireless, wired network, or internet to a remote host. In some embodiments, the voice authentication system may compare the audio signal with a previously recorded voice pattern, voice print, or voice model. In alternative embodiments, a signature may be extracted from the audio signal and the signature may be sent to the voice authentication system and the voice authentication system may compare the signature against a signature previously extracted from a recorded voice sample. Some signatures may be stored locally for high speed while others may be offloaded. In some embodiments, low resolution signatures may first be compared, and if the comparison fails, then high resolution signatures may be compared, and if the comparison fails again, then the actual voices may be compared. In some cases, it may be necessary that the comparison is executed in more than one remote host. For example, one host with insufficient information may recursively ask another remote host to execute the comparison. In some embodiments, the voice authentication system may associate a user identification (ID) with a voice pattern when the audio signal or signature matches a stored voice pattern, voice print, voice model, or signature. In embodiments, wherein the voice authentication system is executed remotely, the user ID may be sent to the robot or to another host (e.g., to order a product). The host may be any kind of server set up on a Local Area Network (LAN), a Wide Area Network (WAN), the internet, or cloud. For example, the host may be a File Transfer Protocol (FTP) server communicating on Internet Protocol (IP) port 21, a web server communicating on IP port 80, or any server communicating on any IP port. In some embodiments, the information may be transferred through Transmission Control Protocol (TCP) for connection oriented communication or User Datagram Protocol (UDP) for best effort based communication. In some embodiments, the voice authentication system may execute locally on the robot or may be included in another computing device located within the vicinity. In some embodiments, the robot may include sufficient processing power for executing the voice authentication system or may include an additional MCU/CPU (e.g., dedicated MCU/CPU) to perform the authentication. In some embodiments, session between the robot and a computing device may be established. In some embodiments, a protocol, such as Signal Initiation Protocol (SIP) or Real-time Transport Protocol (RTP), may govern the session. In some embodiments, there may be a request to send a recorded voice message to another computing device. For example, a user may say "John, don't forget to buy the lemon" and the processor of the robot may detect the audio input and automatically send the information to a computing device (e.g., mobile device) of John.

In some embodiments, a speech-to-text system may be used to transform a voice to text. In some embodiments, the keyword search and voice authentication may be executed after the speech-to-text conversion. In some embodiments, speech-to-text may be performed locally or remotely. In some embodiments, a remotely hosted speech-to-text system may include a server on a LAN, WAN, the cloud, the internet, an application, etc. In some embodiments, the remote host may send the generated text corresponding to the recorded speech back to the robot. In some embodiments, the generated text may be converted back to the recorded speech. For example, a user and the robot may interact during a single session using a combination of both text and speech. In some embodiments, the generated text may be further processed using natural language processing to select and initiate one or more local or remote robot services. In some embodiments, the natural language processing may invoke the service needed by the user by examining a set of availabilities in a lookup table stored locally or remotely. In some embodiments, a subset of availabilities may be stored locally (e.g., if they are simpler or more used or if they are basic and can be combined to have a more complex meaning) while more sophisticated requests or unlikely commands may need to be looked up in the lookup table stored on the cloud. In some embodiments, the item identified in the lookup table may be stored locally for future use (e.g., similar to websites cached on a computer or Domain Name System (DNS) lookups cached in a geographic region). In some embodiments, a timeout based on time or on storage space may be used and when storage is filled up a re-write may occur. In some embodiments, a concept similar to cookies may be used to enhance the performance. For instance, in cases wherein the local lookup table may not understand a user command, the command may be transmitted via wireless or wired network to its uplink and a remotely hosted lookup table. The remotely hosted lookup table may be used to convert the generated text to a suitable set of commands such that the appropriate service requested may be performed. In some embodiments, a local/remote hybrid text conversion may provide the best results.

In some embodiments, the robot may be a medical care robot. In some embodiments, the medical care robot may include one or more receptacles for dispensing items, such as needles, syringes, medication, testing swabs, tubing, saline bags, blood vials, etc. In some embodiments, the medical care robot may include one or more slots for disposing items, such as used needles and syringes. In some embodiments, the medical care robot may include one or more reservoirs for storing intravenous (IV) fluid, saline fluid, etc. In some embodiments, the medical care robot may include one or more slots for accepting items that require further processing, such as blood vials, testing swabs, urine samples, etc. In some embodiments, the medical care robot may administer medical care to a patient, such as medication administration, drawing blood samples, providing IV fluid or saline, etc. In some embodiments, the medical care robot may execute testing on a sample (e.g., blood sample, urine sample, or swab) on the spot or at a later time. In some embodiments, the medical care robot may include a printer for issuing a slip that includes information related to the medical care provided, such as patient information, the services provided to the patient, testing results, future follow-up appointment information, etc. In some embodiments, the medical care robot may include a payment terminal which a patient may use to pay for the medical care services they were provided. In some embodiments, the patient may pay for their services using an application of a communication device (e.g., mobile phone, tablet, laptop, etc.). In some embodiments, the medical care robot may include an interface (e.g., a touch screen) that may be used to input information, such as patient information, requested items, items provided to the medical care robot and following instructions for the items provided to the medical robot, etc. In some embodiments, the medical care robot may include media capabilities for telecommunication with hospital staff, such as nurses and doctors, or other persons (e.g., technical support staff). In some embodiments, the medical care robot may be remotely controlled using an application of a communication device. In some embodiments, patients may request medical care services or an appointment using an application of a communication device. In some embodiments, the medical care robot may provide services at a location specified by the patient, or in other embodiments, the patient may travel to a location of the medical care robot to receive medical care. In some embodiments, the medical care robot may provide instructions to the user for self-performing certain medical tests.

In some embodiments, the medical care robot may include disinfectant capabilities. In some embodiments, the medical care robot may disinfect an area occupied by a patient before and after medical care is given to the patient. For instance, the robot may disinfect surfaces in the are using, for example, UV light, disinfectant sprays and a scrubbing pad, steam cleaning, etc. In embodiments, UVC light, short wavelength UV light with a wavelength range of 200 nm to 280 nm, disinfects and kills microorganisms by destroying nucleic acids (which form DNA) and disrupting their DNA, consequently preventing vital cellular functions. The shorter wavelengths of UV light are strongly absorbed by nucleic acids. The absorbed energy may cause defects, such as pyrimidine dimers (e.g., molecular lesions formed from thymine bases in DNA), that can prevent replication or expression of necessary proteins, ultimately resulting in the death of the microorganism. In some cases, the medical care robot may include a mechanism for converting water into hydrogen peroxide disinfectant. In some embodiments, the process of water electrolysis may be used to generate the hydrogen peroxide. In some embodiments, the process of converting water to hydrogen peroxide may include water oxidation over an electrocatalyst in an electrolyte, resulting in hydrogen peroxide dissolved in the electrolyte. The hydrogen peroxide dissolved in electrolyte may be directly applied to the surface or may be further processed before applying it to the surface. In some embodiments, thin chemical films may be used to generate hydrogen from water splitting. For example, the methods (or a variation thereof) of generating hydrogen from water splitting using nanostructured ZnO may be used, as described by A. Wolcott, W. Smith, T. Kuykendall, Y. Zhao and J. Zhang "Photoelectrochemical Study of Nanostructured ZnO Thin Films for Hydrogen Generation from Water Splitting," in Advanced Functional Materials, vol. 19, no. 12, pp. 1849-1856, June 2009, the entire contents of which are hereby incorporated by reference. In embodiments, the medical care robot may dispense various different types of disinfectants separately or combined, such as detergents, soaps, water, alcohol based disinfectants, etc. In embodiments, the disinfectants may be dispensed as liquid, steam, aerosol, etc. In some embodiments, the dispensing speed may be adjusted autonomously or by an application of a communication device wirelessly paired with the medical care robot. In some embodiments, the medical care robot may use a motor to pump disinfectant liquid out of a reservoir of the robot storing the disinfectant. In embodiments, the reservoir may be filled autonomously at a service station (e.g., docking station) or manually by a user. In some embodiments, the medical care robot may drive at a reduced speed while disinfecting surfaces within the environment. For example, the robot may drive at half the normal driving speed while using UVC light to disinfect any of walls, floor, ceiling, and objects such as hospital beds, chairs, the surfaces of the robot itself, etc. In some embodiments, UV sterilizers may be positioned on any of a bottom, top, front, back, or side of the robot. In some embodiments, the medical care robot may include one or more receptacles configured with UV sterilizers. Smaller objects, such as surgical tools, syringes, needles, etc., may be positioned within the receptacles for sterilization. In some embodiments, the medical care robot may provide an indication to a user when sterilization is complete (e.g., visual indicator, audible indicator, etc.).

FIG. 467A illustrates an example of a medical care robot including a casing 46700, a sensor window 46701 behind which sensors for mapping and navigation are positioned (e.g., TOF sensors, TSSP sensors, imaging sensors, etc.), sensor windows 46702 behind which proximity sensors are positioned, side sensors windows 46703 behind which cameras are positioned, a front camera 46704, a user interface 46705 (e.g., LCD touch screen), an item slot 46706 (e.g., for receiving swabs, blood vials, urine samples, etc.), item dispensers 46707 (e.g., for dispensing hand sanitizer, swabs, syringes, needles, tubing, IV fluid, saline, medication, etc.), a printer 46708 for printing slips including information related to a patient and services provided, a rear door 46709 for accessing the inside of the robot, and spray nozzles 46710 for dispensing disinfectant onto surfaces. FIG. 467B illustrates the internal components of the medical care robot including a disinfecting tube 46711 that may disinfect items received from item slot 46706, a sample receiver 46702 that may receive items from disinfecting tube 46711, which in some cases, may react with a reagent housed within sample receiver 46712, a testing base 46713 that may receive items for on-the-spot or future testing (e.g., swabs, blood vials, urine samples, etc.) from sample receiver 46712, a testing mechanism 46714 that may include mechanism required to facilitate the process of testing an item, a battery 46715, drive wheels 46716, caster wheel 46717, and printed circuit board (PCB) 46718 including processor and memory. Hand sanitizer 46719 and clean swab 46720 are shown in item dispensers 46707. FIGS. 467C and 467D illustrate front and side views of the medical care robot. In FIG. 467D, a rear sensor window 46721 is shown behind which sensors used for mapping and navigation are housed. FIGS. 467E-467H illustrate the medical care robot with added UV lights 46722 for disinfecting surfaces. FIG. 467I illustrates the medical care robot with another configuration of UV lights 46723 for disinfecting surfaces. The UV lights 46723 are longer in height and may therefore disinfect a larger area. In some cases, the medical care robot may drive slowly in a direction parallel with the wall to allow sufficient time for the UV light 46722 to disinfect the surfaces of the walls. In other cases, the UV light 46722 may be used to disinfect other surfaces, such as chairs, hospital beds, and other object surfaces. In some embodiments, the medical care robot may drive slowly in a particular pattern to cover the driving surface of a room such that the UV lights 46723 may disinfect the driving surface. FIGS. 468A-468J illustrate an example of a testing process that may be executed by the medical care robot. In FIG. 468A, the medical care robot dispenses a disposable hand sanitizing towel 46800 from dispenser 46801 for the user to sanitize their hands. In FIG. 468B, the medical care robot dispenses an unused swab stored in a tube 46802 from dispenser 46803. The patient or another person may remove the swab from the tube and take a sample by following the instructions provided by the robot (e.g., verbally and/or visually using an LCD screen and speaker). In some cases, a patient may perform the test on themselves, while in other cases, another person may perform the test on the patient. In FIG. 468C, the swab 46804 is being used to take a sample from the mouth of the patient 46805. After the test is complete, the swab 46804 is returned to the tube 46803. In FIG. 468D, a receptacle 46806 opens to accept the swab 46804 in the tube 46802 after the test is complete. In FIG. 468E, the tube 46804 is disinfected by disinfecting tube 46807, and in FIG. 468F, the end of the swab 46804 is released into sample receiver 46808. The end of swab 46804 reacts with a reagent 46809 within the sample receiver 46808 for a predetermined amount of time, after which the swab may be discarded into a container positioned within the casing of the robot. In FIG. 468G, the reagent from sample receiver 46808 is transferred to testing base 46810 for analysis. The results may then be displayed to the patient via a display screen of the robot, an application of a communication device, or a printed slip. In some cases, after each test, spray nozzles 46811 may extend from within the casing of the medical care robot and spray disinfectant 46812 to disinfect the surface of the robot, as illustrated in FIG. 468H. In some cases, the robot may also disinfect the surrounding environment, as illustrated in FIG. 468I. In FIG. 468J, a door 46813 positioned on a back side of the robot is opened such that items and mechanisms within the robot casing may be accessed. In some cases, a user may replenish items (e.g., testing kits, swabs, blood vials, medication, etc.) by opening the door 46813.

In some embodiments, the medical care robot may be used to verify the health of persons entering a particular building or area (e.g., subway, office building, hospital, airport, etc.). In some embodiments, the medical care robot may print a slip disclosing the result of the test. For example, FIG. 469A illustrates the medical care robot printing a slip 46900 indicating the test results are negative. FIG. 469B illustrates the slip 46900 with barcode 46901. If the test results are negative, the barcode may be used to scan for entry into a particular area. In some cases, the barcode may only be active for a predetermined amount of time. In some cases, as illustrated in FIG. 469C, the slip 46900 may be received electronically from the robot using an application of a communication device 46902. FIG. 469D illustrates gates 46903 that may be opened to gain entry to a particular area upon scanning barcode 46901 using scanner 46904. FIGS. 470A-470F illustrate examples of visualization displayed on a user interface 47000 of the medical care robot during testing. FIGS. 470A-470C illustrate step-by-step instructions displayed via the user interface 47000 for performing the test. FIGS. 470D and 470E illustrate statuses of the medical care robot after the swab has been deposited into the robot after testing. In FIG. 470D the medical care robot is transferring the swab sample to the testing mechanism housed within the medical care robot. A progress bar 47001 is displayed to the user. In FIG. 470E the medical care robot is analyzing the swab sample, again a progress bar 47002 is displayed to the user and an estimated time remaining. In FIG. 470F, after the analysis of the swab sample, test results are displayed to the user via the user interface 47000. In this example, the test completed was a COVID-19 test.

Various different types of robots may use the methods and techniques described herein such as robots used in food sectors, retail sectors, financial sectors, security trading, banking, business intelligence, marketing, medical care, environment security, mining, energy sectors, etc. For example, a robot may autonomously deliver items purchased by a user, such as food, groceries, clothing, electronics, sports equipment, etc., to the curbside of a store, a particular parking spot, a collection point, or a location specified by the user. In some cases, the user may use an application of a communication device to order and pay for an item and request pick-up (e.g., curbside) or delivery of the item (e.g., to a home of the user). In some cases, the user may choose the time and day of pick-up or delivery using the application. In the case of groceries, the robot may be a smart shopping cart and the shopping cart may autonomously navigate to a vehicle of the user for loading into their vehicle. Or, an autonomous robot may connect to a shopping cart through a connector, such that the robot may drive the shopping cart to a vehicle of a customer or a storage location. In some cases, the robot may follow the customer around the store such that the customer does not need to push the shopping cart while shopping. In some embodiments, the processor of the smart cart may identify the vehicle using imaging technology based on known features of the vehicle or the processor may locate the user using GPS technology (e.g., based on a location of a cell phone of the user). FIG. 471A illustrates an example of a shopping cart including a coupler arm receiver 47100, caster wheels 47101, and alignment component 47102 including a particular indentation pattern. The indentation pattern of the alignment component 47102 may be used by the processor of a robot to align and couple with the shopping cart. A light source of the robot may emit a laser line and a camera of the robot may capture images of the laser line projected onto objects. The processor of the robot may recognize alignment component 47102 upon identifying a laser line in a captured image that corresponds with the indentation pattern of alignment component 47102. The robot may then align with shopping cart and couple to the coupler arm receiver 47100 of the shopping cart. FIGS. 471B and 471C illustrate side and front views of the shopping cart. FIG. 471D illustrates the robot 47103 including a coupling arm 47104, sensor window 47105 behind which sensors for mapping and navigation are housed, LIDAR 47106, drive wheels 47107 and caster wheel 47108. The indentation pattern 47109 of alignment component 47102 observed in a captured image of a line laser projected onto the alignment component 47102 is also shown. FIGS. 471E-471G illustrates the process of connecting coupling arm 47104 of the robot 47103 to the coupling arm receiver 47100 of the shopping cart. At a first step, the coupling arm 47104 is inserted into the coupling arm receiver 47100. A link 47110 of the coupling arm 47104 is in a first unlocked position within recess 47111 of the coupling arm receiver 47100. At a second step, the coupling arm 47104 is rotated 90 degrees clockwise such that link 47110 is in a second unlocked position within recess 47111. At a third step, the robot 47103 drives in a forward direction to move link 47110 into a third locked position within recess 47111. To decouple the coupling arm 47104 from the coupling arm receiver 47100 of the shopping cart, the steps are performed in reverse order. FIG. 471H illustrates the robot 47103 pulling and driving the shopping cart (e.g., to a vehicle of a customer for curbside pickup of groceries). FIG. 471I illustrates the robot 47103 retrieving or returning the shopping cart from a storage location of multiple shopping carts. FIGS. 472A and 472B illustrate an alternative example, wherein the shopping cart itself is a robot, i.e., a smart cart, including cameras 47200, sensors windows 47201 behind which proximity sensors are housed, LIDAR 47202, drive wheels 47203, caster wheels 47204, and compartment 47205 within which the electronic system of the shopping cart is housed (e.g., processor, memory, etc.).

In some embodiments, the robot is a UV sterilization robot including a UV light. In some embodiments, the robot uses the UV light in areas requiring disinfection (e.g., kitchen or washroom). In some embodiments, the robot drives at a substantially slow speed to improve the effectiveness of the UV light by exposing surfaces and objects to the UV light for a long time. In some embodiments, the robot pauses for a period of time to expose objects to the UV light for a prolonged period before moving. For example, in a tiled floor, where the UV is applied downward, the robot may pause for 30 minutes or 60 minutes on a certain time to move on to the next tile. In some embodiments, the speed of the robot when using the UV is adjustable depending on the application. For example, the robot may clean a particular surface area (e.g., hospital floor tile or house kitchen tile or another surface area) for a particular amount of time (e.g., 60 minutes or 30 minutes or another time) to eliminate a particular percentage of bacteria (e.g., 100% or 50% or another percentage). In some embodiments, the amount of time spent cleaning a particular surface area depends on any of: the percentage of elimination of bacteria desired, the type of bacteria, the half-life of bacteria for the UV light used (e.g., UVC light) and its strength, and the application. In embodiments, special care is taken to avoid any human exposure to UV light during projection of the UV light towards walls and objects. In some embodiments, the robot immediately stops shining the UV light upon detection of a human or pet or other being that may be affected by the UV light.

In some embodiments, the robotic device is a smartbin. In some embodiments, the smartbin navigates from a storage location (e.g., backyard) to a curb (e.g., curb in front of a house) for refuse collection. In some embodiments, a user physically pushes the smart bin from the storage location to the refuse collection location and the processor of the smartbin learns the path. As the smartbin is pushed along the path a FOV of a camera and other sensors of the smartbin change and observations of the environment are collected. In some embodiments, the processor learns the path from the storage location to the refuse collection location based on sensor data collected while navigating along the path. In some embodiments, the user pushes the smartbin back to the storage location from the refuse collection location and the processor learns the path based on observations collected by the camera and other sensors. In some embodiments, the robot executes the path from the storage location to the refuse collection location in reverse to return back to the storage location after refuse collection. FIG. 473A illustrates a house 47300, a smartbin 47301 positioned in a storage location in the backyard, a FOV 47302 of a camera of the robot at a first time point, a curb 47303 in front of the house 47300 and the street 47304. FIG. 473B illustrates a position of the smartbin 47301 and FOV 47302 of the camera at a second time point after a user has begun to push the smartbin 47301 to a refuse collection location 47305. FIG. 473C illustrates the FOV 47302 of the camera of the smartbin 47301 at various time point as the smartbin is pushed by the user to the refuse collection location 47305. The processor of the smartbin 47301 learns the path based on sensor observation collected while being pushed along the path. In some embodiments, the user walks the path while taking a video using a communication device. Using an application of the communication device paired with the robot, the user may provide the video and command the smartbin to replicate the same movement along the path using the video data provided. In some embodiments, the user may navigate the smartbin along the path using control commands on the application of a communication device (e.g., like a remote controller), remote, or other communication device. In some embodiments, such methods are used in other applications to teach the robotic device a path between different locations.

In some embodiments, during learning, the user pushes the smartbin along the path from the storage location to the refuse collection location more than once. FIG. 474A illustrates an example of data gathered by an image sensor after three runs from the storage location to the refuse collection location. The data gathered at a particular time point (e.g., a second time point) in the first run may not coincide with the data gathered at the same particular time point (e.g., the second time point) in the second run since the user pushing the smartbin may be moving faster or slower in time space in each run. This is illustrated in FIG. 474A, wherein the data gathered at different time points are shown for each run. FIG. 474B alternatively illustrates images captured over time during two runs. In the second run, the smartbin was being moved a lot slower, therefore many images with large overlap were captured. In the first run, only three images with little overlap were captured as the smartbin was being moved quickly from the storage location to the refuse collection location. In embodiments, the time and space must be in a same coordinate system. In embodiments, the time and space are warped. In some embodiments, the processor smoothens using a deep network. In some embodiments, the processor determines to which discrete time event each image belongs as stamps from the real time does not correlate with state event times, as shown in FIG. 474C.

In some embodiments, the robot is a delivery robot that delivers food and drink to persons within an environment. For example, the robot may deliver coffee, sandwiches, water, and other food and drink to employees in an office space or gym. In some cases, the robot may deliver water at regular intervals to ensure persons within the environment are drinking enough water throughout the day. In some cases, users may use an application to schedule delivery of food and/or drink at particular times which may be recurring (e.g., delivery of a cup of water every 1.5 hours Monday to Friday) or non-recurring (e.g., delivery of a sandwich at noon on Wednesday). In some embodiments, the user may pay for the food and/or drink item using the application. In some embodiments, the robot may pick up an empty reusable cup of a person, refill the cup with water, and deliver the cup back to the user. In some embodiments, the robot may have a built in coffee machine and/or water machine and the user may refill their drink from the machine built into the robot. A person may request the robot arrive at their location at particular times which may be recurring or non-recurring such that they may refill their drink. In some embodiments, the robot may include a fridge or vending machine with edible items for purchase (e.g., chocolate bar, sandwich, bottle drinks, etc.). A user may purchase items using the application and the robot may navigate to the user and the item may be dispensed to the user. In some cases, the user must scan a barcode on the application using a scanner of the robot or must enter a unique code on a user interface of the robot to access the item. FIG. 475 illustrates an example of a robot 47500 transporting food and drinks 47501 for delivery to a work station of employees 47502 after being summoned by the employees 47502 using an application paired with the robot 47500.

In some embodiments, the robot is a surgical robot. In some embodiments, SLAM as described herein may be used for performing remote surgery. A surgeon observing a video stream provides the surgeon with a two-dimensional view of a three-dimensional body of a patient. However, this may not be adequate as the surgical procedure may require the depth be accurately perceived by the surgeon. For example, in the case of removing a tumor, the surgeon may need to observe the depth of the tumor and any interactions of all faces of the tumor with other surrounding tissues to remove the entire tumor. In some embodiments, the surgeon may use a surgical device including SLAM technology. The surgical device may include two or more cameras and/or structured light. The sensors of the surgical device may be used to observe the patient and a processor of the surgical device may determine critical dimensions and distances based on the sensor data collected. In some embodiments, the processor may superimpose the dimensions and distances over a real-time video feed of the patient such that the dimensions and distances appropriately align to provide the surgeon with real-time dimensions and distances throughout the operation. The video feed may be displayed on a screen of the surgical device or that cooperates with the surgical device. In some embodiments, the surgeon may use an input device to provisionally draw a surgical plan (e.g., surgical cuts) on the real-time video feed of the patient and the processor may simulate the surgical plan using animation such that the surgeon may view the animation on the screen. In some embodiments, the processor of the surgical device may propose enhancements to the surgical plan. For instance, the processor may suggest an enhancement to a contour cut on the patient. In some embodiments, the surgeon may accept, revise, or redraw another surgical plan. In some embodiments, the processor of the surgical device is provided with a type of surgery and the processor devises a surgical plan. In some embodiments, the surgical device may enact the surgical plan devised by the surgeon or the processor after obtaining approval of the surgical plan by the surgeon or other person of authority. In some embodiments, the surgical device minimizes motion of surgical tools during operation and the processor may optimize path length of any surgical cuts by minimizing the size of cuts. This may be advantageous to human surgeons as their hands may move during operation and optimization of surgical cuts may be challenging to determine.

In another example, the robot may be a shelf stock monitoring robot. FIGS. 476A and 476B illustrate an example of a shelf stock monitoring robot 47600. The robot 47600 may determine what items are lacking on the shelf or a stock percentage of different items (e.g., 60% stock of laundry detergent). In some embodiments, stock data may be provided to store manager or to an application such that employees are aware of items that need restocking. The data may indicate the stock percentage of a particular item and the isle in which the item is stocked. In some embodiments, missing volume may be compared with size of products and used to determine how much product there is stocked and how much is missing. It may be beneficial to run the robot initially in a training phase comprising training cycles with fully empty shelves, training cycles with fully stocked shelves with supplies, and training cycles with partly stocked shelves.

Other types of robots that may implement the methods and techniques described herein may include a robot that performs moisture profiling of a surface, wall, or ceiling with a moisture sensor; paints walls and ceilings; levels concrete on the ground; performs mold profiling of walls, floors, etc.; performs air quality profiling of different areas of a house or city as the robot moves within those areas; collects census of a city or county; is a teller robot, DMV robot, a health card or driver license or passport issuing and renewing robot, mail delivery robot; performs spectrum profiling using a spectrum profiling sensor; performs temperature profiling using a temperature profiling sensor; etc.

In some embodiments, the robot may comprise a crib robot. For instance, FIG. 477 illustrates a first room 47700 of parents and a second room 47701 of a baby. Using acoustic sensors, the crib 47702 may detect the baby is crying and may autonomously drive to first room 47700 of the parents such that the mom 47703 (or dad) may sooth the baby 47704, after which the baby 47704 may be placed back in the crib 47702. The crib 47702 may then autonomously navigate back to second room 47701 of the baby 47704. In some embodiments, a camera sensor may detect the baby is uneasy based on constant movement or other types of sensors may be used to detect unrest of the baby. In some cases, the parents may use an application to instruct the crib to navigate to their room.

In some embodiments, the robot may be a speech translating robot that is bilingual, trilingual, etc. For example, FIG. 478 illustrates an example of a flowchart that may be implemented and executed by a processor of the robot to autonomously detect a language and change language of the robot to the detected language. Instead of having a large dictionary of one language, the robot may include a subset of each language, such as 10 or 20 languages. Once the language is determined, the proper dictionary is searched.

In another example, the robot may be a tennis playing robot. FIGS. 479A-479D illustrate and describe an example of a tennis playing robot that may implement the methods and techniques described herein. FIGS. 480A-480I illustrate and describe an example of a robotic baby walker and a paired communication device executing an application that may implement the methods and techniques described herein. FIGS. 481A-481H illustrate and describe an example of a delivery robot including a smart pivoting belt system for moving packages on and off of the delivery robot.

In some embodiments, the robot may be an autonomous hospital bed comprising equipment such as IV hook ups or monitoring systems. The autonomous bed may move with the patient while simultaneously using the equipment of the hospital bed. FIG. 482A illustrates an autonomous hospital bed 48200 with IV hookup 48201 and monitoring system 48202. FIG. 482B illustrates an autonomous hospital bed 48200. IV hookup 48201 and monitoring system 48202 are on a separate robot 48203. When the patient is on the bed 48200, the bed and the robot 48203 communicate and move together to treat the patient. In addition to the autonomous hospital bed, other hospital equipment and devices may benefit from SLAM capabilities. For example, imaging devices such as portable CT scanners, MRI, and X-ray scanners may use SLAM to navigate to different parts of the hospital, such as operation rooms on different floors when needed. Such devices may be designed with an optimal footprint such they may fit within a hospital elevator. FIGS. 483A-483C illustrate an example of an autonomous CT scanner machine 48300 comprising a scanning section 48301, sensors 48302 for alignment with the bed, LIDAR 48303, front sensor array 48304, adjustable bed base 48305, mecanum drive wheels 48306, rear sensor array 48307, detachable user interface 48308, storage 48309 for other equipment such as wires and plugs for scanning sessions, control panel 48310 and side sensor arrays 48311. SLAM capabilities may help these devices move completely autonomously or may help their operators move them with much more ease. Since these medical SLAM devices are capable of sensing their surroundings and avoiding obstacles, they also may accelerate or decelerate their wheel rotation speeds to help with movement and avoiding obstacles when being pushed by the operator. This may be particularly useful for heavy equipment. FIG. 484 illustrates the robot 48400 pushed by an operator 48401. The robot 48400 may accelerate or decelerate its wheel rotation speeds to help with movement and avoiding obstacles. Such medical machines described herein and other devices may collaborate using Collaborative Artificial Intelligence Technology (CAIT). For example, CT scan information may generate a 3D model of the internal organs which may later be displayed and superimposed on a real-time image of the corresponding body under surgery. In some embodiments, the autonomous hospital bed may include components and implement method and techniques of the autonomous hospital bed described in U.S. Non-Provisional patent application Ser. Nos. 16/399,368 and 17/237,905, each of which is hereby incorporated by reference.

In embodiments, mecanum wheels may be used for larger medical devices such that they may move in a sideways or diagonal direction in narrower places within the hospital. For example, when on the move, a scanning component of a CT scanner may be in a rotated position to form a smaller footprint. When the CT scanner is positioned at its final destination and is ready to be used, the scanning component may be rotated and aligned with a hospital bed. The scanning component may move along chassis rails of the CT scanner robot to scan a body positioned on the hospital. Although the wheels may be locked during the scanning session, slight movement of the robot is not an issue as the bed and the scanner are always in a same position relative to each other. In some cases, there may be a detachable pad that may be used by an operator to control the machine. The use of the pad is necessary such that the operator may keep their distance during the scanning session to avoid being exposed to radiation. FIGS. 485A-485D illustrate a CT scanner robot 48500 navigating to and performing a scanning session. In FIG. 485A, the robot 48500 is in a transit mode, wherein a scanning component 48501 is rotated 90 degrees from its operational position. In FIG. 485B, the robot 48500 is ready for the scanning session and the scanning component 48501 is rotated 90 degrees to its operational position. The bed base height may be adjusted for scanning. In FIG. 485C the operator 48502 removes a UI pad 48503 used control the CT scanner robot 48500 from a distance. In FIG. 485D the scanning component 48501 move along chassis rails 48504 to scan the patient 48505. Similar setups may be applicable for other devices, such as an MRI machine and X-ray machine. FIG. 486 illustrates an example of an MRI robot 48600. FIG. 487 illustrates an example of an X-ray robot 48700. In embodiments, different medical equipment may be removable from a chassis of the robot and exchanged with other medical equipment. For example, a CT scanner may be detached from a robot chassis and an MRI machine may be attached to the chassis. The robot system may be configured to operate both types of medical equipment. Other medical robots may include blood pressure sensing device, heart rate monitor, heart pulse analyzer, blood oxygen sensor, retina scanner, breath analyzer, swab analysis, etc.

In some embodiments, the robot may be a curbside delivery robot designed to ease contactless delivery and pick up. Customers may shop online and select curbside delivery at checkout. FIG. 488 illustrates a checkout page of an online shopping application 48800 with a curbside pickup option 48801. On the store side, the store employee receives the order and places the ordered goods inside a compartment of a store delivery robot. The robot may lock a door of the compartment. FIG. 489 illustrate the ordered goods 48900 place within a compartment of a delivery robot 48901. A door 48902 of the compartment may be locked. Once the customer arrives at the store, the application 48800 on their phone may alert a system and the robot may navigate outdoors to find the customer (e.g., based on their phone location or a location specified in a map displayed by the application) and delivery their goods 48900. FIG. 490A illustrates a location of the robot 49000 in the application 48800 on the device 49001 of the user. FIG. 490B illustrates the robot 48900 approaching the customer 49901 by locating their phone via the application. FIG. 491 illustrates the robot 48900 arriving at a location of the customer 49901. The system may send a QR code 49100 to the application. The user may place their phone above the scanner area 49101 of the robot to unlock the door 48902. FIG. 492 illustrates the door 48902 opening automatically upon being unlocked for the user to pick up their ordered goods 48900. The robot 48900 may then return to the store to be sanitized (if needed) and respond to a next order. In some embodiments, the robot may be an autonomous delivery robot, as described in U.S. Non-Provisional application Ser. Nos. 16/127,038, 16/179,855, and 16/850,269, each of which is hereby incorporated by reference. In embodiments, the robot may implement the methods and techniques used by such various robotic devices.

In some embodiments, the robot may be a sport playing robot capable of acting as a proxy when two players or teams are playing against each other remotely. For example, tennis playing robots may be used as a proxy between two players remotely playing against one another. The players may wear VR headsets to facilitate the remote game. This VR headset may transmit the position and movement of a first player to a first tennis robot acting as a proxy in the other court in which the opponent is playing and may receive and display to the first player what the first tennis robot in the court of the opponent observes. The same may be done for the second player and second tennis robot acting as proxy. FIG. 493 illustrates the relation between each player 49300 and their proxy robot 49301. The movement and position of players 49300 are sent to their proxy robot 49301 and their proxy robots 49301 execute the movements as if they were the respective player. At the same time, a camera feed of each proxy robot 49301 is sent to the VR headset 49302 of the respective player 49300 (with or without processing). FIG. 494 illustrates a player 49400 wearing a VR headset 49401 and the headset viewport 49402 displaying the opponent playing from another court. In addition to the received camera feed, some processing may occur at different levels (e.g., the robot SLAM level, robot processing level, cloud level, or the headset level). The result of this processing may enhance the displayed images and/or some overlaid statistics or data. For example, ball trajectory, movement predictions, opponent physical statistics, score board, time, temperature, weather conditions for both courts, etc. may be displayed as overlays on top of the image displayed within the VR headset. FIG. 495A illustrates the VR headset viewport 49500. Additional information may be displayed on top of the displayed image, such as the opponent's information 49501, scores 49502, game statistics 49503, and ball trajectory prediction 49504. As the play shifts more towards a specialized game, some special rules and behaviors may be added to the game to make it more interesting. For example, the ball may have limited and special trajectories which may not follow the physics rules. FIG. 495B illustrates the VR headset viewport 49500 and a special trajectory 49505 for the ball which does not obey the rules of physics. In some cases, players may select to play with the rules of physics from another planet (e.g., higher or lower gravity). In some cases, players may select to have virtual barriers and obstacles in the game. FIG. 495C illustrates the VR headset viewport 49500 and virtual floating obstacles 49506 which affect the ball trajectory 49507. In some embodiments, the robot may be a tennis robot, as described in U.S. Non-Provisional application Ser. Nos. 16/247,630 and 17/142,879, each of which is hereby incorporated by reference. In embodiments, the robot may implement the methods and techniques used by such robotic devices.

In some embodiments, the robot may be a passenger pod robot in a gondola system. This is an expansion on the passenger pod concept described in U.S. Non-Provisional patent application Ser. Nos. 16/230,805, 16/411,771, and 16/578,549, each of which is hereby incorporated by reference. Pods in the passenger pod system may be transferred over water (or other hard to commute areas) via a gondola system. This may become especially useful to help with the commute over high traffic areas like bridges or larger cities with dense populations. In this system, passenger pods 49600 may arrive at the gondola station 49601 located near the bridge 49602. Pods 49600 may be transferred to gondola hooks 49601 and become gondola cabins, as illustrated in FIGS. 496 and 497. Meanwhile chassis 49603 move back to the parking or carry other pods depending on the fleet control decision. When the pods 49600 arrive at their destination, they are detached from the cable and are driven to an arrival pods parking station 49604 and unloaded from chassis 49603 onto a stationary pod holder 49605, as illustrated in FIG. 498. At a later time, a chassis 49606 may come and pick up pods 49600 for a new transport of passengers, shown in FIG. 498.

In one example, the robot may be a flying passenger pod robot. This is another expansion on the passenger pod concept, described in U.S. Non-Provisional patent application Ser. Nos. 16/230,805, 16/411,771, and 16/578,549, each of which is hereby incorporated by reference. In this example, passenger pod owners may summon attachments for their ride, including wings attachments. In this case, a chassis 49900 specialized for carrying the wing attachment may be used. This chassis 49900 carries a robotic arm 49901 instead of a cabin and the wing attachment may be held on top of the robotic arm 49901, as illustrated in FIGS. 499A and 499B. In FIGS. 500A and 500B, a wings attachment 50000 is attached to the robotic arm 49901. When the robot 49900 is not in a flying state, the arm 49901 and wing attachment 50000 may be in a vertical position to reduce the space occupied and maintain a better center of mass, as shown in FIG. 500A. Once the robot 49900 is closer to a passenger pod 50100, the arm 49901 may change to a horizontal position to install the wings attachment 50000 to the pod 50100 and detach from the arm 49901, as shown in FIG. 501. Once the wings 50000 are attached to the pod 50100, they may expand to turn the pod 50100 into a flying vehicle. FIG. 501 illustrates the process of expansion of the wings, including (1) wherein wings are in a closed position, (2) and (3) wherein the wings and the tail are positioned behind pods, (4) wherein the wings move from the back to the sides by rotating around their respective axes to be positioned in a correct orientation, (5) wherein the tail wings open to help the pod elevate from the ground, and (5) wherein propeller cages rotate to be aligned to face forward for takeoff. At the point of take off the robot chassis 49900 accelerates and propellers start turning, as illustrated in FIG. 503A. Once the pod 50100 reaches the required speed, it disengages from the chassis 49900 and takes off into the air, as illustrated in FIG. 503B. During flight, as in FIG. 503C, the wings and propeller may be controlled by a computer to take the pod to its destination. FIG. 504 illustrated the pod 50100 in flight mode from top, side and front views. In landing mode, propeller cages rotate to align the ground and the pod 50100 is brought down to land on another chassis 50500 or a landing station in a controlled way, as illustrated in FIG. 505. The type of flying pod system may be useful for short distance travel. For the longer distances, pods may be carried by a plane. In this case, the interior of a plane 50600 may be modified to board the pods 50601 directly, as shown in FIG. 506. Once in the air, passengers may exit from their pods 50601 to seats 50602 and return to their pods 50601 as desired.

In another example, the robot may be an autonomous wheel barrow. FIG. 507A illustrates an example of semi-autonomous wheelbarrow including two drive wheels with BLDC motors 50700, LIDAR 50701, handles 50702 for an operator to push the robot and empty it, front sensor array 50703, side sensor arrays 50704, rear sensors and range finder 50705, and caster wheel 50708 (in some embodiments for better balance and steering). FIGS. 507B and 507C illustrates the connection between the drive wheels with BLDC motor 50700 and a driver board and main PCB of the wheelbarrow robot. FIG. 508A and FIG. 508B illustrate a variation of the wheelbarrow robot, wherein a LIDAR is not included. The wheelbarrow includes similar components as shown in FIG. 507A as well as PCB 50800, processor 50801, and battery 50802. FIG. 509A illustrates another variation of the wheelbarrow and its method of operation. When a user 50900 pushes the wheelbarrow robot 50901, the robot senses the direction 50902 of the push and accelerates the wheels to make pushing the robot lighter and therefore easier to move for the user 50900. This variation includes two drive wheels 50903, one caster wheel 50904 and is smaller in size. FIG. 509B illustrates yet another variation of the wheelbarrow, but with a method of operation. This variation has same components as wheelbarrow 50901. FIG. 509C illustrates another variation of the wheelbarrow, but with a same method of operation. This variation has four drive wheels 50903, no caster wheel and is larger in size. FIG. 509D illustrates a variation of the wheelbarrow including two drive wheels 50903, one caster wheel 50904 and is larger in size, the method operation being the same. FIG. 509E illustrates a variation of the wheelbarrow including track belts 50905 instead of drive wheels, no caster wheel and is larger in size, the method of operation being the same. FIG. 509F illustrates a variation of the wheelbarrow including track belts 50905 instead of drive wheels, one caster wheel and is larger in size, the method of operation being the same. FIGS. 510A and 510B illustrate a method of operating a wheelbarrow robot 51000 by a user 51001. In FIG. 510A, with an initial push from the user, the processor of the wheelbarrow robot 51000 recognizes the direction 51002 of movement and wheels 51003 turn to accelerate and help with the movement of the wheelbarrow robot 51000, such that it is lighter to push. FIG. 510B illustrates a resisting mode of the wheelbarrow robot 51000. Upon detecting an obstacle 51004, wheels 51003 turn in an opposite direction to movement direction 51002 to cause the robot to move in a backwards direction 51005 and avoid a collision with the obstacle 51004.

In some embodiments, the robot may be an autonomous versatile robotic chassis that may be customized with different components, hardware, and software to perform various functions, which may be obtained from a same or a different manufacturer of the versatile robotic chassis. The base structure of each versatile robotic chassis may include a particular set of components, hardware, and software that all the robot to autonomously navigate within the environment. In embodiments, the robot may be a customizable and versatile robotic chassis such as those described in U.S. Non-Provisional application Ser. No. 16/230,805, 16/411,771, 16/578,549, 16/427,317, and 16/389,797, each of which is hereby incorporated by reference. The robot may implement the methods and techniques of these customizable and versatile robotic chassis. In such disclosures, the versatile robotic chassis is described in some embodiments as a flat platform with wheels may be customized with different components, hardware, and software to perform various functions. The versatile robotic chassis may be scaled such that it may be used for low load and high load applications. For example, the versatile robotic chassis may be customized to function as robotic towing robot or may be customized to operate within a warehouse for organizing and stocking items. In embodiments, different equipment or component may be attached and detached from the robotic chassis such that it may be used for multiple functions. The versatile robotic chassis may be powered by battery, hydrogen, gas, or a combination of these.

In some embodiments, the robot may be a steam cleaning robot, as described in U.S. Non-Provisional application Ser. Nos. 15/432,722 and 16/238,314, each of which is hereby incorporated by reference. In some embodiments, the robot may be a robotic cooking device, as described in U.S. Non-Provisional application Ser. No. 16/275,115, which is hereby incorporated by reference. In some embodiments, the robot may be a robotic towing device, as described in U.S. Non-Provisional application Ser. No. 16/244,833, which is hereby incorporated by reference. In some embodiments, the robot may be a robotic shopping cart, as described in U.S. Non-Provisional application Ser. No. 16/171,890, which is hereby incorporated by reference. In some embodiments, the robot may be an autonomous refuse container, as described in U.S. Non-Provisional application Ser. No. 16/129,757, which is hereby incorporated by reference. In some embodiments, the robot may be a modular cleaning robot, as described in U.S. Non-Provisional Ser. Nos. 14/997,801 and 16/726,471, each of which is hereby incorporated by reference. In some embodiments, the robot may be a signal boosting robot, as described in U.S. Non-Provisional application Ser. No. 16/243,524, which is hereby incorporated by reference. In some embodiments, the robot may be a mobile fire extinguisher, as described in U.S. Non-Provisional application Ser. No. 16/534,898, which is hereby incorporated by reference. In some embodiments, the robot may be a drone robot, as described in U.S. Non-Provisional application Ser. Nos. 15/963,710 and 15/930,808, each of which is hereby incorporated by reference. In embodiments, the robot may implement the methods and techniques used by such various robotic device types.

In some embodiments, the robot may be a cleaning robot comprising a detachable washable dustbin as described in U.S. Non-Provisional patent application Ser. Nos. 14/885,064 and 16/186,499, a mop extension as described in U.S. Non-Provisional patent application Ser. Nos. 14/970,791, 16/375,968, and 15/673,176, and a motorized mop as described in U.S. Non-Provisional patent application Ser. Nos. 16/058,026 and 17/160,859, each of which is hereby incorporated by reference. In some embodiments, the dustbin of the robot may empty from a bottom of the dustbin, as described in U.S. Non-Provisional patent application Ser. No. 16/353,006, which is hereby incorporated by reference.

Some embodiments may implement animation techniques. In a cut out 2D animation technique (also known as forward kinematics (FK)), depending on the complexity of the required animation, a character's limbs may be drawn as separate objects and linked together to form a hierarchy. Then, each limb may be animated using simple transitions such as position and rotation. For example, FIG. 511 illustrates a cutout method, wherein a character's limbs 51100 are drawn as separate objects 51101 and linked together at joints 51102. In this method, movement of a particular object in the higher level of the hierarchy affects movement of objects in lower levels of the hierarchy that are linked to that particular object. For example, moving the arm 51200 of the character may cause the forearm 51201 and hand 51202 lower in hierarchy to move as well, as illustrated in FIG. 512. However, moving the hand 51202 alone does not affect the forearm 51201 or the arm 51200 as they are higher in the hierarchy. Another method that may be used is inverse kinematics (IK), wherein movement of a particular object in the lower level of hierarchy causes objects in higher levels of hierarchy connected to the particular object to move as well. Movement of objects in higher levels of hierarchy may be determined by constraints and may be solved by IK solvers. This method is more useful for more complex animations. For example, if the goal is to move the hand of a character to a certain position, it is easier to move the hand and have a computer solve the position and orientation of the forearm and the arm. For instance, FIG. 513 demonstrates IK animation, wherein moving a limb, i.e., hand 51300, from the lower level of hierarchy affects movement of the upper limbs, i.e., forearm 51301 and upper arm 51302.

By nature, most human (and animal) limbs move (or rotate) in an arc shape, either in one, two, or three different axes with limitation. These arc shape movements between limbs are combined together to achieve linear movements subconsciously. IK animation resembles this subconscious combination. IK and FK animations may be combined together as well. In the cut out animation method, the transform of each object at a certain time may be defined by a point (x,y) and orientation (r). There may also be a scale factor, however, it is not relevant to this topic. Since objects are in the hierarchy and their movements are influenced by their parent's movements, a local transform and a global (absolute) transform may be defined for each object. For example, an arm may rotate 60 degrees clockwise while the forearm rotates 30 degrees counterclockwise and the hand rotates 10 degrees clockwise. Here, the local transform for the hand rotation is 10 degrees while its global transform is 40 degrees. Also, although the position of the hand is not changed locally, its position in the world is changed because of the rotation of the arm and the forearm. As such, the hand's local transform for position is (0,0) while its global (world and absolute) transform is (x,y), which is determined by the length of the arm and forearm, location of the character in the world and rotation of each and every object on the higher hierarchy levels. Similar to the 2D cut out method, there may be linkage and hierarchical structure in 3D as well. All the principles of 2D animation and IK and FK may be applied in 3D as well. In 3D, both local and global transforms for position and rotation have three components (x,y,z) and ($r_x$, $r_y$, $r_z$). In extracting features for image processing the inverse version of this process may become useful. For example, by identifying each limb and the trajectory of its movement joints and hierarchy of the object of interest may be determined. Further, the object type (e.g., adult human, child, different types of animals, etc.) and their next movement based on trajectories may be predicted. In some embodiments, the process of 2D animation may be used in a neural network setup to display sign language translated from audio received as input by an acoustic sensor of the robot in real time or from a movie stream audio file, text file, or text file derived from audio. The robot may display an animation or the robot can execute the signs to represent the translated signed language. In some embodiments, this process may be used by an application that reads texts or listens to audio (e.g., from a movie) and translates them to be visually displayed sign language (e.g., similar to closed captions).

In some embodiments, the processor of the robot may be configured to understand and/or display sign language. In some embodiments, the processor of the robot may be configured to understand speech and written text and may speak and produce text in one or more languages. FIG. 514A illustrates a relation between audio, text driven from the audio and sign language. For example, an audio file may be converted to text and vice versa. Text driven from audio (or text generated by another means) and audio may be converted by sign language using a neural network algorithm to decipher the signs and a screen to display the signs to a user. FIG. 514B illustrates the process and use cases of converting audio to text and sign language using neural network 51400. For example, the sign language output may be signed by a robot 51401 or displayed on a screen of an electronic device 51402. The signed language may also be displayed on a corner of a screen 51403 such that those using sign language may watch any movie on devices 51404 and understand what is being said. Additionally, a robot 51405 may translate the output of the network.

In some embodiments, the spatial representation of the environment may be regenerated. For example, regeneration of the environment may be used for augmented spatial reality (AR) or virtual spatial reality (VR) applications, wherein a layer of the spatial representation may be superimposed on a FOV of a user. For example, a user may wear a wearable headset which may display a virtual representation of the environment to the user. In some instances, the user may want to view the environment with or without particular objects. For example, for a virtual home, a user may want to view a room with or without various furniture and decoration. The combination of SLAM and an indoor map of a home of a customer may be used in a furniture and appliance store to virtually show the customer advertised items, such as furniture and appliances, within their home. This may be expanded to various other applications. In another example, a path plan may be superimposed on a windshield of an autonomous car driven by a user. The path plan may be shown to the user in real-time prior to its execution such that the user may adjust the path plan. In some embodiments, a virtual spatial reality may be used for games. For example, a virtual or augmented spatial reality of a room moves at a walking speed of a user experiencing the virtual spatial reality using a wearable headset. In some embodiments, the walking speed of the user may be determined using a pedometer worn by the user. In some embodiments, a virtual spatial reality may be created and later implemented in a game wherein the virtual spatial reality moves based on a displacement of a user measured using a SLAM device worn by the user. In some instances, a SLAM device may be more accurate than a pedometer as pedometer errors are adjusted with scans. In some cases, the SLAM device is included in the wearable headset. In some current virtual reality games a user may need to use an additional component, such as a chair synchronized with the game (e.g., moving to imitate the feeling of riding a roller coaster), to have a more realistic experience. In the virtual spatial reality described herein, a user may control where they go within the virtual spatial reality (e.g., left, right, up, down, remain still). In some embodiments, the movement of the user measured using a SLAM device worn by the user may determine the response of a virtual spatial reality video seen by the user. For example, if a user runs, a video of the virtual spatial reality may play faster. If the user turns right, the video of the virtual spatial reality shows the areas to the right of the user. Using a virtual reality wearable headset, the user may observe their surroundings within the virtual space, which changes based on the speed and direction of movement of the user. This is possible as the system continuously localizes a virtual avatar of the user within the virtual map according to their speed and direction of movement. This concept may be useful for video games, architectural visualization, or the exploration of any virtual space.

In some embodiments, the processor may combine AR with SLAM techniques. In some embodiments, a SLAM enabled device (e.g., robot, smart watch, cell phone, smart glasses, etc.) may collect environmental sensor data and generate maps of the environment. In some embodiments, the environmental sensor data as well as the maps may be overlaid on top of an augmented reality representation of the environment, such as a video feed captured by a video sensor of the SLAM enabled device or another device all together. In some embodiments, the SLAM enabled device may be wearable (e.g., by a human, pet, robot, etc.) and may map the environment as the device is moved within the environment. In some embodiments, the SLAM enabled device may simultaneously transmit the map as its being built and useful environmental information as its being collect for overlay on the video feed of a camera. In some cases, the camera may be a camera of a different device or of the SLAM enabled device itself. For example, this capability may be useful in situations such as natural disaster aftermaths (e.g., earthquakes or hurricanes) where first responders may be provided environmental information such as area maps, temperature maps, oxygen level maps, etc. on their phone or headset camera. Examples of other use cases may include situations handled by police or fire fighting forces. For instance, an autonomous robot may be used to enter a dangerous environment to collect environmental data such as area maps, temperature maps, obstacle maps, etc. that may be overlaid with a video feed of a camera of the robot or a camera of another device. In some cases, the environmental data overlaid on the video feed may be transmitted to a communication device (e.g., of a police or fire fighter for analysis of the situation). Another example of a use case includes the mining industry as SLAM enabled devices are not required to rely on light to observe the environment. For example, a SLAM enabled device may generate a map using sensors such as LIDAR and sonar sensors that are functional in low lighting and may transmit the sensor data for overlay on a video feed of camera of a miner or construction worker. In some embodiments, a SLAM enabled device, such as a robot, may observe an environment and may simultaneously transmit a live video feed of its camera to an application of a communication device of a user. In some embodiments, the user may annotate directly on the video to guide the robot using the application. In some embodiments, the user may share the information with other users using the application. Since the SLAM enabled device uses SLAM to map the environment, in some embodiments, the processor of the SLAM enabled device may determine the location of newly added information within the map and display it in the correct location on the video feed. In some cases, the advantage of combined SLAM and AR is the combined information obtained from the video feed of the camera and the environmental sensor data and maps. For example, in AR, information may appear as an overlay of a video feed by tracking objects within the camera frame. However, as soon as the objects move beyond the camera frame, the tracking points of the objects and hence information on their location are lost. With combined SLAM and AR, location of objects observed by the camera may be saved within the map generated using SLAM techniques. This may be helpful in situations where areas may be off-limits, such as in construction sites. For example, a user may insert an off-limit area in a live video feed using an application displaying the live video feed. The off-limit area may then be saved to a map of the environment such that its position is known. In another example, a civil engineer may remotely insert notes associated with different areas of the environment as they are shown on the live video feed. These notes may be associated with the different areas on a corresponding map and may be accessed at a later time. In one example, a remote technician may draw circles to point out different components of a machine on a video feed from an onsite camera through an application and the onsite user may view the circles as overlays in 3D space. In some embodiments, based on SLAM data and/or map and other data sets, a processor may overlay various equipment and facilities related to the environment based on points of interest (e.g., electrical layout of a room or building, plumbing layout of a room or building, framing of a room or building, air flow circulation or temperature in a room or building, etc.

In some embodiments, VR wearable headsets may be connected, such that multiple users may interact with one another within a common VR experience. For example, FIG.

515A illustrates two users 51500, each wearing a VR wearable headset 51501. The VR wearable headsets 51501 may be wirelessly connected such that the two users 51500 may interact in a common virtual space (e.g., Greece, Ireland, an amusement park, theater, etc.) through their avatars 51502. In some cases, the users may be located in separate locations (e.g., at their own homes) but may still interact with one another in a common virtual space. FIG. 515B illustrates an example of avatars 51503 hanging out in a virtual theater. Since the space is virtual, it may be customized based on the desires of the users. For instance, FIGS. 515C-515E illustrate a classic seating area for a theater, a seating area within nature, and a mountainous backdrop, respectively, that may be chosen to customize the virtual theater space. In embodiments, robots, cameras, wearable technologies, and motion sensors may determine changes in location and expression of the user. This may be used in mimicking the real actions of the user by an avatar in virtual space. FIG. 515F illustrates a robot that may be used for VR and telecommunication including a camera 51504 for communication purposes, a display 51505, a speaker 51506, a camera 51507 for mapping and navigation purposes, sensor window 51508 behind which proximity sensors are housed, and drive wheels 51509. FIG. 515G illustrates two users 51510 and 51511 located in separate locations and communicating with one another through video chat by using the telecommunication functions of the robot (e.g., camera, speaker, display screen, wireless communications, etc.). In some cases, both users 51510 and 51511 may be streaming a same media through a smart television connected with the robot. FIG. 515H illustrates the user 51511 leaving the room and the robot following the user 51511 such that they may continue to communicate with user 51510 through video chat. The camera 51504 readjusts to follow the face of the user. The robot may also pause the smart television 51512 of each user when the user 51511 leaves the room such that they may continue where they left off when user 51511 returns to the room. In embodiments, smart and connected homes may be capable of learning and sensing interruption during movie watching sessions. Devices such as smart speakers and home assistants may learn and sense interruptions in sound. Devices such as cell phones may notify the robot to pause the media when someone calls the user. Also, relocation of the cell phone (e.g., from one room to another) may be used as an indication the user has left the room. FIG. 515I illustrates a virtual reconstruction 51513 of the user 51511 through VR base 51514 based on sensor data captured by at least the camera 51504 of the robot. The user 51510 may then enjoy the presence of user 51511 without them having to physically be there. The VR base 51514 may be positioned anywhere, as illustrated in FIG. 515J wherein the VR base 51514 is positioned on the couch. In some cases, the VR base may be robotic. FIG. 515K illustrates a robotic VR base 51515 that may follow user 51510 around the house such that they may continue to interact with the virtual reconstruction 51513 of the user 51511. The robotic VR base 51515 may use SLAM to navigate around the environment. FIG. 515L illustrates a smart screen (e.g., a smart television) including a display 51516 and a camera 51517 that may be used for telecommunications. For instance, the smart screen is used to simultaneously video chat with various persons 51518 (four in this case), watch a video 51519, and text 51520. The video 51519 may be simultaneously watched by the various persons 51518 through their own respective device. In embodiments, multiple devices (e.g., laptop, tablet, cell phone, television, smart watch, smart speakers, home assistant, etc.) may be connected and synched such that any media (e.g., music, movies, videos, etc.) captured, streamed, or downloaded on any one device may be accessed through the multiple connected devices. This is illustrated in FIGS. 515M-515O, wherein multiple devices 51521 are synched and connected such that any media (e.g., music, movies, videos, etc.) captured or downloaded on any one device may be accessed through the multiple connected devices 51521. These devices may have the same or different owners and may be located in the same or different locations (e.g., different households). In some cases, the devices are connected through a streaming or social media services such that streaming of a particular media may be accessed through each connected device.

Some embodiments combine augmented reality and SLAM methods and techniques. For example, a user may use a SLAM enable device to view an augmented reality of a data center. FIG. 516 illustrates components of VR and AR. FIGS. 517A-517G illustrate and describe an example of a SLAM enable device used to view an augmented reality of a data center and details of components within the data center. In some embodiments, the processor may use SLAM in augmented reality. In some embodiments, the processor superimposes a three-dimensional or two-dimensional spatial reconstruction of the environment on a FOV of a human observer and/or a video stream. For proper overlay, the processor positions the angular and linear position of the observer and camera FOV with respect to the frame of reference of the environment. In some embodiments, the processor iteratively tunes the angular and linear positions by minimizing the squared error of re-projection of points over a sequence of states. Each of the projection equations transforms a four-dimensional homogenous coordinate by a combination of one or more of a translation, a rotation, a perspective division, etc. In some embodiments, a set of parameters organized in a DNN/CNN may control a chain of transforms of point cloud projections (three-dimensional or two-dimensional) on a two-dimensional image at a specific frame. In some embodiments, the flow of information and partial derivatives may be computed in a backpropagation pass. For the chain set of transformations, each parameter is described as a partial derivative with respect to its parameters.

In embodiments, a simulation may model a specific scenario created based on assumptions and observe the scenario. From the observations, the simulation may predict what may occur in a real-life situation that is similar to the scenario created. For instance, airplane safety is simulated to determine what may happen in real-life situations (e.g., wing damage).

Although lines with their mathematical definition don't exist in the real world, they may be seen as relations between surfaces. For example, a surface break, two contrasting surfaces (contrast in color, texture, tone, etc.), a pinch on a surface (positive or negative), a groove on a surface, mat all can produce lines. FIG. 518 illustrates examples of lines on different surfaces in a real-world setting. Lines may be used to direct the viewer's eyes to or from certain points, usually known as focal points in aesthetics. For example, converging lines may direct the eye to their converging point. FIG. 519 illustrates examples of leading lines directing the eye to the focal point. A group of lines in a specific direction emphasize on that direction and may cause that direction to appear longer subconsciously. For example, a group of vertical lines may help a product be perceived as taller. FIG. 520 illustrates a group of horizontal lines in a rectangle 16800 that make a size of the rectangle 16800 appear to be wider than rectangle 16801 without lines, despite their same size. Line thickness (weight) may help with grabbing attention. However, as the lines get thicker they may be perceived as separate surfaces themselves. Depending on the shape, color, and lighting in the product, thicker lines may appear closer or farther to the viewer's eye FIG. 521 illustrates this effect in a light and a dark rectangle 52100 and 52101, respectively, wherein thicker lines appear closer to a viewer's eye despite being a same distance.

Lines may be straight or in a curved shape. The most important curve shapes are known as S and C shaped curves. S shaped curves direct the eye in a certain direction while maintaining the balance on a perpendicular direction. The reason these two types of curves stand out from the other is because they may be defined by only two control points. FIG. 522 illustrates an example of C and S curves. The arrows around the S curve illustrates how it directs the eye along the curve. Since products are three dimensional, curves may be used to direct the eye from one surface plane of the product to another one in a smooth way. FIG. 523 illustrates an example of curve 52300 that directs the eye from one surface plane to another. Curves may be defined as a set of 1D points in a 2D or 3D space, but in practice are usually defined by a few points while the rest of the set between them is interpolated. If only points positions are defined, the process of interpolation may result in a smooth curve. This curve may be manipulated by defining the derivative of each point, known as curve handles when creating the curve. FIG. 524 illustrates a linear interpolation between a set of points resulting in a polyline (a), a smooth interpolation between the points in a same set resulting in a smooth curve (b), and the same set of points wherein the derivatives from each point are changed resulting in a different curve known as Bezier curve (c). Another method of defining a curve includes defining the derivatives of end points resulting in a chain of polylines, the curve being be tangent to this polyline. FIG. 525 illustrates how a same set of points 52500 may result in different types of curves (a) and (b).

Shapes, such as lines, may be defined as relations between surfaces. In fact, a surface may be a shape itself, or a shape may be created by lines on a surface or as a negative space (e.g., a hole) on a surface. FIG. 526 illustrates a shape as a positive space 52600, defined by a boundary line, and a negative space 52601. Shapes may be categorized as geometric or organic. Geometric shapes, such as squares, rectangles, triangles, circles and ovals, may be defined by mathematical formulas while organic shapes may be found in nature. Basic geometric shapes may be used to convey different meanings. A square and rectangle may represent stability. They use the most area of a given space, making them more practical. Squares and rectangles may be associated with meanings such as honesty, solidity, stability, balance and rationality. However, because of their straight horizontal and vertical lines, they may not be attention grabbing and may even be considered boring. Squares and rectangles may serve as a container or frame for other shapes. A triangle may be used to convey different meanings based on its properties, such as the length of each side and its position (e.g., placed on the base, or on the vertices). A triangle has a directional energy and may be used to direct the eye to a certain direction (leading lines). A triangle may be associated with meanings such as action, tension, aggression, strength and conflict. In general, a triangle has more masculine properties. A circle and oval may be used to convey feelings such as harmony, unity and protection. They don't point in any direction which brings attention to these shapes. Other meanings associated with a circle and oval are perfection, integrity, completeness, and gratefulness. These shapes don't have any straight lines and their basis are curves. The same meanings of these basic shapes may be extended to basic volumes such as a box, s cube, s pyramid, s cone, and s sphere.

In embodiments, shapes may be blended together, both with geometric and organic shapes. FIG. 527 illustrates examples 52700 of blending a triangle 52701 and a circle 52702. From polygonal shapes, hexagons are particularly interesting. Hexagons may be used in patterns. With a hexagonal pattern, a maximum area (volume in 3D) in each cell is obtained while maintaining a minimum perimeter (surface area in 3D). This makes for an efficient pattern, which is the reason this pattern is found in nature (e.g., rock formation, bee hive, insect eyes, etc.). It is also visually pleasing since the lines are distributed in 120 degrees, maintaining a visual balance. Hexagons may be combined with triangular patterns as each hexagon consists of six equal triangles. FIG. 528 illustrates a combination of a hexagonal and triangular pattern. Abstract shapes may be a combination of geometric shapes combined to convey a more complex meaning. For example, stick figures, arrows, traffic signs and many shapes used in logos and icons may be categorized as abstract shapes.

Edges may be significant in product design. Edges are lines between two surfaces. In product design, sharp edges may be avoided for safety and to reduce manufacturing problems. In addition to these reasons, there are some visual benefits to rounding edges. For example, using rounded edges may help a volume appear smaller. FIG. 529 illustrates two cubes 52900 and 52901. Both have the same height, width and depth but because of rounded edges in the cube 52901, the cube 52901 appears smaller in perspective. FIG. 530 illustrates that, in addition to rounded edges, a setback may be defined on corners of cube 52901, shown in 53000, for the volume to appear rounder. This set back may help with a smoother surface transition as well. A type of rounding may affect the surface transition. In general, surface transitions may be categorized into three different types, corner (positional), tangent (circular/oval rounds), and conic rounds. The difference between tangent and conic rounds is in the rate of curvature change in the surface. In tangent rounds, the curvature changes suddenly while in conic round the change is gradual. This gradual change of curvature helps with better aesthetics and forms better highlights on the edges. FIG. 531 illustrates three types of transition, corner, tangent, and conic transitions. For a corner (positional) transition there is no curvature on the edge and no highlight is formed. This is a relatively unrealistic scenario as in the real world there will always be a round transition between two surfaces, however, it may not be large enough to generate a visible highlight. Although a tangent (circular/oval) transition generates a highlight and smoother transition, the change in the curvature is sudden causing an unpleasant tonal shift at the beginning and end of the round (highlighted with dotted lines). A conic round transition addresses this issue by gradually increasing the curvature from the sides to the middle. To achieve a similar feeling size wise, usually a bigger radius of conic round is needed as compared to a tangent round. Curvatures changes are shown using curvature combs.

Highlights and shadows are important because we perceive the volume based on them. In embodiments, humans conclude different characteristics based on how a surface reflects the light (highlight). Characteristics such as glossiness, roughness, metallicness are determined based on how the surface reflects the light. Glossiness and roughness are opposite characteristics. These surface characteristics may be achieved by machining, painting, within the mold, or by other types of surface treatments. FIG. 532 illustrates a sphere plastic surface with variable amount of glossiness. FIG. 533 illustrates a sphere metallic surface with variable amount of glossiness. The difference between plastic and metallic surfaces are in the dominance of objects color. In plastic surfaces, object color is dominant while in metallic surfaces, the color reflected from the environment is dominant. Note that these are characteristics of a surface and shouldn't be mistaken by the actual material of the surface. The appearance of a surface may be changed by painting it. For example, a plastic (material) surface may appear metallic using a metallic paint. Metallic paint is a special kind of paint consisting of a minimum of two separate layers. One is the base layer which includes paint pigments and metal flakes and the second is a clear coat to protect the paint and control the overall glossiness. FIG. 534 illustrates an example of metallic paint structure. Changing any of the parameters within the paint may change the surfaces characteristics. For example, the clear coat layer roughness may be changed to affect overall glossiness or increasing the amount of metal flakes within the base layer to make the surface appear shinier or randomness of the flakes to make the base layer rougher. FIG. 535 illustrates (a) changes in clear coat roughness, (b) changes in the amount of metal flakes, and (c) changes in the roughness of metal flakes. Despite the surface getting darker it is still reflective because of the clear coat.

In embodiments, symmetrical forms may be pleasant to the eye as they are easier to read. There are three types of symmetry: reflection, rotation and transition. These should not be mistaken by line versus point symmetry. Line symmetry may be categorized under reflection type while point symmetry is an example of rotational symmetry. Rotation and transition symmetries may be used to make patterns. FIG. 536 illustrates samples of reflective symmetry. Note that there may be more than one reflection axis and the reflection axis does not have to be a straight line, such as line 53600, although calculating the reflected side manually would be very difficult. FIG. 537 illustrates examples of rotational symmetry. Rotational symmetry produces circular patterns. FIG. 538 illustrates examples of transitional symmetry which produces linear patterns. As mentioned before, symmetry and patterns are important in design as they are easier to read by the viewer's eye. Since the brain can interpret a main element and a relation between elements, it can define a shape as a whole based on these two factors. This may be used to generate attention or focal points. Once the symmetry or the pattern is formed in the brain, anything slightly off may be more noticeable. For instance, anything off symmetry or off pattern may generate a contrast between elements and become noticeable. This may be used to place features such as user interface or buttons or anything important on the product to grab the viewer's attention. FIG. 539 illustrates the off symmetry property. A first image 53900 is approximately symmetric. In the second image 53901, by adding a feature on a top side, the top side becomes attention grabbing and therefore creates a sense of direction on the product. In the third image 53902, by adding a vertical, the main surface is broken into two uneven sections, and by adding a feature on the right side, the viewer's attention is directed towards that feature. In the fourth image 53903, the top down symmetry is broken by adding converging diagonal lines that turn into vertical lines as they move upwards. This will emphasize the sense of direction towards the upper portion of the image. At the same time, the added features on the right side brake the side to side symmetry and grab the user's attention. The above example is one type of generating contrast. In general, wherever there is contrast there is an opportunity to grab attention or direct the eye. There are several types of contrast. Contrast in shape, size, shade (tone), texture, color and proximity are the most common types of contrast. FIG. 540 illustrates examples of contrast in size, shape, shade, and color.

In embodiments, patterns may help with visual aesthetics of a part or product. They are helpful in showing surface flow and breaking large surfaces and making them more interesting. In addition to their visual properties, patterns may have functional benefits as well. For example, a pattern may be used to increase or decrease the friction on a surface, making it more suitable for grip. In other examples, a pattern may be used for openings of an exhaust or vent, a pattern may act as a heat sink as it may increase the surface area, etc. Some common parts functions are directly related to the patterns on their surfaces or sub-parts, such as fans, tire treads, gears, etc. Patterns may help with structural properties of a part as well. For example, a hollow pattern may help with using less material while maintaining the parts mechanical properties. There are various ways to create patterns on a surface, such as printing, embossing, engraving (in or after the mold), and punching. FIG. 541 illustrates a same pattern applied to a surface in four different ways, (1) embossed, (2) engraved, (3) punched, and (4) printed. A pattern may be made of two or more different materials or even illuminated. FIG. 542 illustrates the previous patterns shown in FIG. 541 illuminated on a different material.

In some embodiments, visual weight may be considered. Visual weight may be defined as a visual force that appears due to contrast among the visual elements that compound it. A balance between visual weights of elements in a design may be maintained or may be intentionally made different using various types of contrast. Sometimes a part of a product may be required to be a certain shape and visual weight due to its functional or manufacturing limitations. Changing the shapes and visual weights of other parts may maintain the balance if needed. FIG. 543 illustrates some examples of balancing visual weights. In the case of circle 54300, the darker circle 54301 has more weight to it due to the contrast with its surroundings than lighter circles 54302. This weight is counterbalanced with smaller, lighter circles on the bottom right. The same is true for the rectangular image 54303. Weight of the bigger rectangle (may be a UI display) 54304 is counterbalanced with several smaller rectangles (buttons) 54305 on the left.

Some embodiments may consider colors of a product. Colors are reflected lights from surfaces perceived by the eye. As the light reaches a surface, some wavelengths are absorbed while others are reflected and if the reflected wavelength is within the visible color spectrum the human eye can see them. The reflection from a surface may be due to the pigments on the surface or may be structural (such as blue colors of blue feathered birds or butterflies). Sometimes the microstructure of a surface scatters most of the wavelengths in the visible light spectrum, except the color a human eye can see which is the light reflected from the surface. The color generated based on a surface's structural properties may have special characteristics. For example, thermochromic paints which change color as temperature rises or holographic paints which reflect the light differently depending on the viewing angle change colors because of the paint's microstructure.

FIG. 544 illustrates a light spectrum. The human eye is sensitive to electromagnetic wavelengths between 400 nm (violet) and 700 nm (red). This range known as visible light spectrum is between ultra violet (UV) and infrared (IR) wavelengths. This range defines the colors a human eye can see, starting including, violet, blue, cyan, green, yellow, orange, and red. However, there are colors not present within this spectrum that a human eye can see, namely, brown and magenta. This happens because of the structure of the human eye. Human eyes usually have three types of photoreceptor cones in their retina which are sensitive to short (red), medium (green) and long (blue) ranges of wavelength (within the visible light spectrum). When these cones are triggered, they send signals to the brain for the corresponding colors and these signals are mixed to define the color. For example, when short and medium cones are triggered together, they send signals to the brain and based on the signal intensity the brain defines some color between the two (e.g., orange or yellow) that is placed somewhere between the short and medium wavelengths in the visible light spectrum. When short and long cones but not medium cones are triggered at the same time, the brain generates a color that is a combination of blue and red and opposite to green, resulting in magenta which is not on the spectrum. FIG. 545 illustrates color properties such as hue, saturation, and lightness.

A color's hue is defined by its position on the spectrum. The hue of the color changes as the wavelength of the color changes. Colors that are visible but not found on the visible light spectrum are placed at the beginning or at the end of the gradient representing hue variation. Another representation of hue is a color wheel, which may be preferred as it doesn't have a beginning or an end. Color saturation may be described as its pureness. When a surface only reflects a certain wavelength in high intensity then a most saturated color is obtained. As the saturation lowers, the color gets closer to being pure, and eventually turns into grey. The shade of grey depends on the lightness of the color. When a color mixes with black or white its lightness changes. Lightness and value of the color are the same concept. Another way to describe the color variations of the same hue is by defining tint, tone, and shade. Tinting occurs when a color mixed with white results in a lighter version of the same hue. Toning occurs when a color mixed with grey results in a less saturated version of the same hue. Shading occurs when a color mixed with black results in a darker version of the same hue. FIG. 546 illustrates tint, tone, and shade of white, grey, and black, respectively.

Color combinations may be defined in two ways. Since colors seen are reflected lights from a surface, colors may be combined by adding the wavelengths based of the emitted reflected lights together, known as an additive method. Colors may also be combined by pigment based on the light absorption by each group of pigments, known as a subtractive method. In the additive method, three colors associated with short, medium, and long (i.e., red, green, blue) wavelengths are primary colors and combining them together results in white. In the subtractive method, colors opposite to the primary colors, namely, cyan, magenta and yellow, when combined generate a black color. However, pigments with 100% absorption is very difficult. FIG. 547 illustrates examples of additive and subtractive color mixing.

In embodiments, there may be several color scheme types that are pleasing to the eye. They may be defined using a color wheel as opposite colors and changes of hue are positioned well for this matter. FIG. 548 illustrates an example of a color wheel. Monochromatic is a color combination of a same hue with different lightness and saturation. It is useful for generating harmonious feelings (e.g., different shades of blue). Analogous to a color wheel is a color palette consisting of colors near to each other (e.g., different shades of red, orange and yellow). Complementary is a color palette using colors opposite to each other (e.g., different shades of blue and orange). Triadic is a color palette consisting of three colors evenly spaced on the color wheel (e.g., green, orange and purple). Split complementary is a color palette consisting of three colors wherein two colors are neighbors of a color complementary to the third color (e.g., red, lime green and cyan). Tetradic or rectangle is a color palette consisting of four colors. All four colors are neighbors of the two complementary colors. Square is a color palette consisting of four colors evenly spaced on the color wheel (e.g., red, blue, green, and orange/yellow). Double complementary is a color palette consisting of four colors forming two separate complementary schemes. Tetradic and square are forms of double complementary schemes. FIG. 549 illustrates various color palettes described above.

Some hues by default have more energy compared to others. Warmer colors such as red, orange and yellow may be dominant when placed near cool colors such as blue, purple and violet of the same hue. Therefore, to maintain the visual balance, these colors shouldn't be used together with a same proportion. For example, cooler colors may be used as filler, background, or base colors while warmer colors may be used as accents, main subjects and points of interest. This is illustrated in FIG. 550, wherein the background is a cool color and the subject is a warm color.

In embodiments, different colors may be associated with various meanings. A part of this association is psychological and is based on how humans react to colors. Another part is cultural and meanings of colors may be different from one culture to another. Even factors, such as geography and availability of certain colors in certain regions may affect the way people from those regions react to colors. For example, more muted colors may be observed in Scandinavian countries as compared to more vibrant and saturated colors in African countries. However, there are universally accepted meanings for each color. Of course, color properties such as different shades and saturations may have an important role on emphasizing each of these meanings. Some main colors and common meanings associated with them may include: red, positively associated with love, life, excitement, energy, youth, strength and negatively associated with anger, evilness, hazard, danger, defiance; orange, positively associated with warmth, health, happiness, energy, enthusiasm, confidence and negatively associated with frustration, warning, over emotional; yellow, positively associated with warmth, imagination, creativity, wealth, friendliness, knowledge, growth and negatively associated with deceit, depression, hazard, cowardice; green, positively associated with growth, peace, health, liveliness, harmony, nature, eco, environmental, balance and negatively associated with jealousy, disgust, greed, corruption, envy, sickness; blue, positively associated with confidence, wellness, trust, passion, responsibility, strength, professional, calmness, peace, intelligence, efficiency and negatively associated with coldness, obscenity, depression, boredom; purple, positively associated with Sensitive, passionate, innovative, wisdom, grace, luxury, care and negatively associated with arrogance, gaudiness, profanity, inferiority; magenta and pink, positively associated with femininity, sympathy, health, love and negatively associated with weakness, inhibition; brown, positively associated with calm, reliable, nature, tradition, richness and negatively associated with dirt, dull, poverty, heaviness, simplicity; black, positively associated with serious, sophistication, elegance, sharpness, authority, power, modem, wealth, glamour and negatively associated with fear, mourning, oppression, heavy, darkness; grey, positively associated with elegance, neutrality, respect, wisdom and negatively associated with decay, pollution, dampness, blandness; and white, positively associated with purity, light, hope, simplicity and negatively associated with coldness, emptiness, unfriendliness, detached.

In physical product design, colors may be affected by other elements such as surface finish (e.g., how a surface reacts to light) and lighting situation (e.g., light intensity, color, direction, etc.). For example, a plastic surface finish may be less sensitive towards lighting situations as compared to a metallic finish in terms of color change. This makes choosing and designing the right color more important. The chosen color may be tested on a 3D object (physical or digital) in different and more common lighting situations to ensure its aesthetics are pleasing in various environments. This may be a reason different types of products are designed in different colors. For example, many home appliances are designed in more neutral colors so they may blend in with a larger range of environments. Colors such as black, grey and white or desaturated colors along with reflective surfaces may blend in with the colors of the environment. In contrast, more saturated colors and less reflective surface finishes on products are designed to stand out from their environment. This is the same for color schemes as well. Schemes such as monochromatic or analogous are used for products that need to blend in with the environment while schemes such as complementary or triad are more suitable for products that need to stand out from their environment.

Some embodiments implement QSLAM, an improvement of traditional SLAM methods. In a real-time system, to achieve concurrency, encapsulated software components are required to share hardware resources. Encapsulation allows reuse of software such that some components may be used for various usages. In embodiments, a group of the software components may run on a single physical device or in a distributed fashion spanning multiple physical devices. Each of the components may run independently, may be self-contained and may interact with other components to receive and send data through ports and interfaces of the components joined via connectors.

In a distributed system, the distance between processors and processes is not necessarily physically far. For instance, a CPU on a PCB and an MCU positioned centimeters from the PCB is considered to have some physical distance. In embodiments, a software component must be close to the hardware on which it is processed. The smaller the distance between software components and corresponding hardware, the faster the processing. Therefore, if data needs to be sent to a processor that is on a same PCB, there is still some sacrifice to the real-time property of the system.

When a resource, service, component, or object is shared between multiple reader/writers, a mutual exclusion type algorithm may be used to perform synchronization. In embodiments, multi-threading may be used to split large tasks into smaller tasks. For example, an incoming service request may be treated as a new thread with a limited or unlimited number of total threads available.

Some embodiments may use dynamic binding, wherein a connection is built in a distributed system through a name table/service, making physical location irrelevant.

In some embodiments, time-critical tasks are treated with highest priority while non-time-critical tasks may have less priority and/or may run in the background. In some embodiments, computationally intensive tasks may be executed in the background and preempted as higher priority tasks arrive. In some embodiments, some computational intensive tasks may run after the run time. For example, while a robot obtains input data during a first run, a graph of constraints is obtained using information from encoders, IMUs, cameras, etc. In some embodiments, during run time of a first run, data from encoders, IMUs, etc. may be integrated and the relating equations solved by the processor. In some embodiments, vision data, being more computationally intensive, may be integrated after the first run when the robot is charging or not working. In a second run, the robot may have a more complete map and the processor may localize the robot and verify and/or improve the map in future runs. As more runs occur, more data may be integrated with previously collected data to improve map density.

In embodiments, methods such as temporal task clustering or sequential task clustering may be used. In embodiments, a state dependent system may go through a sequential state machine associated with control tasks. In embodiments, a control clustering system may allow arriving tasks to activate another task based on a demand driven model. In some embodiments, a state machine may be encapsulated in a class and an instance of the class (i.e., a state machine object is instantiated, initialized and executed).

Some embodiments may use a transition table. A transition table may include rows indexed by events and columns indexed by state (or vice versa). Each cell in the table may represent an event that could occur in a state and dictates which action or state is to be executed next by the robot. When encapsulated in a class, the details of what happens, which may be any other class, are hidden from the user of the state machine. In some embodiments, each incoming event invokes an operation. When an event occurs, the processor may identify the current state of the machine in the table and may determine the next state. Once the transition to the next state occurs, a series of defined actions may then take place.

In a real-time system, the intervals of receiving data from sensors must be well managed. For example, an IMU produces data output at a much faster rate than a camera. FIG. 551 illustrates a specific time slot with two participating processors operating on different clocks. Processor 1 receives camera and IMU data, the IMU generating output at a faster rate than the camera (output being represented by each arrow) over time. Processor 2 is on a different clock. Various scenarios of obtaining output data from the IMU and camera are illustrated and the corresponding graph formation in an algorithm, wherein a gap in receiving output and sudden arrival still provide adequate graph formation and output received too late or too soon is unusable. In some embodiments, this may be dealt with by combining a series of IMU readings, taking the average of those readings, and sending them to the processor at a corrected interval, as illustrated in FIG. 552. However, the problem with this approach is the loss of synchronization at a next processing step. In some embodiments, non-real-time actuation may cause the encoder readings to have jitters and lose synchronization. Even if synchronization is pushed to the next processing step, propagation of error still occurs at a later time. For instance, the first 800 readings of 1000 readings received in a second may be obsolete by the time the 1000 readings are processed.

In embodiments, processing occurs on the same controller or MCU that sensing and actuating occur on, eliminating the physical distance between the point of data collection and data processing. Some embodiments implement a method for reducing the computational intensity of SLAM by use of a microcontroller or MCU for information processing at the source instead of a CPU that must be distanced from corresponding sensors and actuators.

In a real-time system, concurrent components are referred to as active when they have their own way of controlling processing through an object, process, thread, task or method and as passive when another active or passive object triggers their operation. In embodiments, new states may be created by allowing a child class to inherit from a parent state machine. In embodiments, all states, events, transitions, etc. are inherited from the parent and may develop more well-defined states concurrent with the state machine. For example, a map class may be broken down to allow more granular operations on the map, (e.g., using different resolutions or different stitch criteria). In another example, localization may be broken down into a spectrum spanning from global to local. This is also true for entity objects. In some embodiments, composition and decomposition techniques may impact the efficiency of the system and may be used advantageously.

In some embodiments, a real-time navigation system may be implemented on an MCU, CPU, ASIC, FPGA, or CPLD with analog and discrete digital sensors. In some embodiments, primitives such as threads and mutexes may be used to create multi-threading and protected access may be given data that is shared among them. In embodiments, a navigational real-time system may have hard, soft or firm requirements.

As a robot moves in the work environment, it may use some auxiliary devices to help with its localization. For example, in a lawn mowing robot, there may not be enough boundaries in the environment to detect the boundary. FIG. 553 illustrates an example of a robot 55300 with a camera 55301 using markers 55302, each distinguishable by their unique indentations, to localize by the processor of the robot. Passive markers may take the form of blocks with specific indentations, scanned images, or the like. Electronic transmitters or receivers may also be used as markers. In some embodiments, electronic markers may be equipped with solar panels. In some embodiments, markers may have rechargeable batteries to charge during the day such that they are available during the night or during cloudy days. The way in which the camera of the robot observes each of the markers, such is if one or two markers are observed and how the markers appear in relation to one another in one image and subsequent images, provides additional information.

In embodiments, markers may not be inside the work area. Markers may be positioned outside the work area and their observation by the robot may trigger instructions to the robot to stay within a desired boundary. In some embodiments, markers may provide location information only and not boundary information, wherein the robot receives boundary information from its own program, an external application, or another source. In some embodiments, upon localizing against a marker, the instruction associated with the observance of the marker may be improved by an AI or ML system or by a user.

In some embodiments, multiple markers may be used in a work area. In some embodiments, triangulation and trilateration may be used to further discover location and spatial information about the work area. In embodiments, markers may send or receive radio or infrared signals, ultrasound information, or UWB signals to each other, the robot, or a control unit. The markers may process their location with respect to one another or a control unit and communicate pre-processed information to the robot comprising the spatial information collected from one or more markers. In some embodiments, this information may be transferred between the markers, robot, and other devices through RF at various bandwidth frequencies. The smaller the data packets are relative to the amount of information they carry, the faster decisions may be made.

The processor of the robot may also send information to markers or participate in triangulation or trilateration as one node. The processor of the robot may continuously send information relating to the robot to markers in one pass for use in a later pass, future runs, or future passing robots.

In some embodiments, each marker may identify itself by adding an identification label to the message to distinguish itself from other markers. In some embodiments, markers may use different frequencies to enable a receiver to distinguish between markers. In some embodiments, markers may send keep alive messages to one another to keep a communication channel open. Communication may be via local RF, Wi-Fi router, LAN, WAN, or cloud.

Different markers may have different capabilities than others. Different types of markers, as described above, may be used together in a same system. For example, some markers may be identified based on unique indentations; QR codes; unique indentations and QR codes; and unique RF frequencies, indentations and QR codes. In some embodiments, passive indentations on a block marker may be replaced with transmitters or receivers. In some embodiments, the indentations may be enhanced with electronic transmitters and receivers.

In some embodiments, a while loop may implemented wherein the main loop never returns. FIG. 554 illustrates an example of a super loop 55400 and a graph 55401 representing the variation in delay in the super loop 55400. In some embodiments, ISRs may be implemented such that a minimal amount of work is performed. However, as is illustrated in FIG. 554, in a super loop, a function such as function 2 may cause other functions to wait. In other embodiments, each task may be allowed a private stack to run on to prevent interference and each task may be assigned a priority. In some embodiments, preemptive scheduling may be implemented. In some embodiments, a task-based programming system may be used, wherein each task has a dedicated while loop. For example, FIG. 555 illustrates three functions, each having its own while loop. The scheduler parallelizes the execution of each function by fairly providing a slice of time to each function by managing context switching.

In some embodiments, a smaller function may be completed faster than a large function because it requires fewer time slices. In the preferred embodiment, a scheduler may preempt, such that the most important task is running at all times except for interrupts.

In some embodiments, tasks may be deleted after they are completed, freeing up stack and making resources available again. In some embodiments, at least one late initialization in a startup routine may be ran inside a task. In some embodiments, completed tasks may be deleted by another task. In some embodiments, when a task is defined, dynamic memory allocation is implemented using leap to perform the task. In some embodiments, at least some memory may be allocated statically to a task. In some embodiments, a MPU may be used to prevent a task to write outside its allocated memory.

In some embodiments, a task in a running state may make a call that transitions the running task to a blocked state. In some embodiments, a task in a running state may be switched by a scheduler when its time slot is used up or it is preempted by another higher priority task. When a task is waiting to be switched by a scheduler to a running state, it is in a ready state. A blocked state may end when a timer expires or an event is triggered that causes the state to transition from a blocked state to a ready state. In some embodiments, a task may be suspended, wherein the task does not use processing resources until it is explicitly called.

In some embodiments, ISRs and DMA may replace a polling loop task that has its own while loop continuously running. In some embodiments, a tickless idle task is configured to allow power savings. FIG. 556 illustrates an example of a system of a robot.

In some embodiments, layers of abstractions may be used, such that each upper layer may use services that are provided by an immediate lower layer. The lower layer abstracts the layer below it from the upper layer. The reverse is also true, wherein each upper layer abstracts away its complexity and details to the lower layer below it. In some embodiments, each layer may only interact with a layer immediately below or above it. In some embodiments, layers may interact with layers that are not immediately below or above them. FIG. 557 illustrates two separate scenarios 55700 and 55701. In scenario 55700, the lower layers 55702 hide their own operations and those of the layers below them and only provide an interface to the middle layer, the middle layer only required to understand the interface. In scenario 55701, skipping of layers is possible.

In embodiments, there are different ways to achieve layers of abstraction. The goal is to create well-defined interfaces, operations, procedures and functions that may be used by other layers without having to know the details, how they are implemented, and/or hot to interpret or process data or develop the functions. In doing so, an abstraction penalty may be incurred. In embodiments using real-time navigational stack with SLAM, a state machine or hierarchical state machine may provide centralized control of the system. Each input and output component may interact with others or with outside systems through the centralized state machine system and each event may cause a transition from one state to another while localization, mapping, path planning, actuation, and PID run concurrently. Events that occur drive transition from one state of the state machine to another state of the state machine, thereby controlling the entire operations and behavior of the robot and allowing the robot to react with the environment in real-time.

In some embodiments, an application may also run concurrently in the same state machine. In other embodiments, an application may be performed on another processing unit. For example, for a cleaning robot, an application may run the brush motors and fan motors. In the case of a telepresence robot, an application may serve as an audio/video call transmitter. In the preferred embodiment, room detection also runs in the same state machine on the same microcontroller, along with SLAM, control, sensing, actuation, battery management and other operations of the robot.

In some cases, it may be suitable to run the application along with the navigational stack inside the same state machine. For example, robot prototypes shown in FIG. 558, all have cleaning functions controlled in the same state machine as the navigational stack. In some of the example robots shown in FIG. 558, all processes run on a single MCU that includes UI, Wi-Fi, etc. The same is for other robots shown in FIG. 558, however, the UI, such as the UI in FIG. 559, is offloaded to a separate MCU to allow more comprehensive and detailed user interaction as well as capacitive touch sensing and finger slide sensing.

In all three examples above, the same single MCU controls the navigational stack, sensing and actuation, and PID control, as well as an application that controls the brush, water pump, UV light, side brush, fan motor and other devices of the robot.

In some embodiments, an application is offloaded to a different subsystem. In embodiments, additional MCUs, CPUs, GPUs, NPUs, etc. may be used to accommodate the operation of an application. For example, a system of a surveillance and security robot may offload identification of people the robot encounters to upstream subsystems that may be implemented on other processing devices. If the application requires identification of a person from a selected list of candidates, their identification may be executed with minimal overhead more easily than a scenario wherein the user must be identified from an infinite number of possible persons. For example, the system of the robot may only need to identify a person from a group of persons that live in a particular household. A broader list of persons from which the system needs to identify the person may include guests that the robot has observed to visit the residence before. In one embodiments, the list may be developed from a person's connections on social media platforms. However, the list would be broader than the list developed from physical visitors observed to visit the residence. In one embodiments, the system may begin the search to identify the person by searching through persons living at the residence and then progress to broader lists in a hierarchy manner. In some embodiments, the system generates an index of the hierarchy when the robot is not performing any other activities or when the robot is offline. For example, a system of a security robot may have a list indexed of common visitors of a train station. An example of a fast operation for the system of the robot includes identifying whether a person is a common visitor of the train station, and if so, finding a history of past visits and other desired information associated with the person.

In some embodiments, the control system may be distributed to more than one physical processor that collectively form a single conceptual state machine. Multiple physical processing devices or processor cores may collectively be regarded as a single logical unit that transitions from one state to another, wherein no single processing unit has individual control over the system. The distribution may be on the same physical board or on several different boards organized on a single robot. In some embodiments, the distribution of the control system may span multiple physical locations. In embodiments wherein the control system is distributed, each individual system (which itself may have one or more subsystems) may have partial or full autonomy. For example, in a collaborative system of cleaning, described in U.S. patent application Ser. No. 16/185,000, the entirety of which is incorporated by reference herein, each robot has autonomy in their own navigation but contributes to a larger system with a common goal (e.g., covering the entire floor surface of a shopping mall or airport).

In some embodiments, control of a system may occur as a hierarchy. For instance, a central control system (e.g., automated, manual, or hybrid) may control overall functions of a system of robots, but each individual robot system may have at least some autonomy within a criteria defined by the central control system. For example, in collaborative cleaning of a commercial area (e.g., an airport or shopping mall) may be divided into zones, wherein different robots are assigned to clean and maintain each zone. The system of each individual robot may determine when to carry out certain operations like emptying their bin, charging their batteries, and the order in which to clean the area assigned to them. In embodiments, hierarchical control is not limited to physically separate devices. In one device, an MCU may gather all sensor information, perform preprocessing, and present the pre-processed data to another MCU that uses the obtained data to run a navigation system. For example, a robot includes one MCU for collecting information from cameras, performing visual odometry, and sending pre-processed information to another MCU that uses at least some of the information to execute a navigation subsystem. The visual odometry or other sensor data may be pre-processed by an MCU of a different make and model, or by a CPU, GPU, NPU, etc.

In some embodiments, the relation between components forms a service-client relationship. In one example, a cloud service may store and save all previous mapping information and localizations of a robot as history. This history may be provided as a service to clients (e.g., similar to history stored by a web browser), wherein a person may search for data from a specific work session of the robot. In some embodiments, the history may be sent to an application that sorts, organizes and/or analyzes the data. In some embodiments, a data mining client may collect data from the histories of multiple robots (e.g., 100, 1000, 300000, or all robots) over periods of time to deduce large-scale patterns or reasoning. For example, traffic data associated with a particular location historic number of robot accidents, historic battery use, etc. may be aggregated and used to improve performance of robots. In embodiments, such services do not need to be on a physical server and may be geographically spread out. There may be multiple services that are available to multiple clients. In some embodiments, clients may, in part, provide services to other clients and vice versa. In some embodiments, a service provider to one client may itself be a client of one or more services.

An advantage of a real-time navigational stack is its use in high-reliability system applications. Such systems require redundancy and hot takeover of a primary core or processor by another core or processor when the primary processor encounters a problem. In embodiments, multiple processors or cores are in lock-step with each other such that the primary processor may be taken offline upon experiencing a fault while a redundant processor takes over the operations without any interruption. In some embodiments, the processor taken offline is tested, and if recovered, is restored to an online state. This hot failsafe system allows a navigation system to continue with no interruptions. In less critical systems, a warm failsafe or a cold failsafe system may suffice. The above process may be implemented with multiple cores or multiple MCUs. In some implementations, a pair of CPUs may be used.

Influential factors in a high-reliability system include latency, jitter (i.e., variations of delay), reliability requirements, error definition and detection mechanisms, acceptable time for handling errors, throughput requirements, proportion of control data versus application data, types of applications, number of interacting components, and physical distance between components. When all of these factors are considered, a real-time system may provide better parallel operation and processing and a tighter coupling.

Some embodiments may use a multicore (i.e., a single chip containing multiple processors) and/or a multiprocessor (i.e., multiple physical chips on a PCBA). In embodiments, communication hardware methods between processors include, but are not limited to, CAN, I2C, SPI, and LIN. Alternatively, Ethernet, Modbus and UBS may be used. Some embodiments may use a master/slave configuration, wherein the slave executes its task and sends the output to the master and the master makes use of the output data obtained. In embodiments, communication software may take the form of synchronized object access, wherein concurrent tasks communicate and access shared data. In cases where access to a software class needs to be available to more than one task or operation, the class is responsible for synchronizing access to what it encapsulates. This may be accomplished through mutual exclusion. In embodiments, a task may acquire operation on a semaphore and release the operation on the semaphore when it is complete.

In some embodiments, information hiding and synchronization may be combined such that data objects that encapsulate data and have operations are executed in a mutually exclusive manner. In some embodiments, a monitor lock may be used such that only one task is active. In embodiments where data is communicated across the cloud, protocols categorized as MOM or restful model are used. AMQP, MQTT, and STOMP are some examples of MOM implementations.

In embodiments, producers and consumers of messages may have a publish/subscribe type relationship and/or have a broker. In object broker or object request broker models, the broker is a middleman between a client and a service. In embodiments, services may register with a broker or clients may aggregate at the broker to reach services. When a broker is used, clients do not have to worry about the physical/virtual location of the services or how the services are implemented as there is transparency for location, platform, etc. COBRA and Java messaging are some examples of messaging services.

Restful model provides control to the server when a client initiates access to resources through a synchronous request response method of communication, such that the state of resources is controlled by the server and HTTP methods (e.g., GET, PUT, POST, or DELETE) interact through URI without the need for a broker.

Some embodiments may use MQTT providing a pairing topology where a consumer is paired with a producer. MQTT is capable of carrying any type of data with any format. As such, MQTT may carry, for example, a robot map, a video stream, commands to a robot from an application, and updates from a robot to an application, and any voice or gesture commands.

In embodiments, the one transmitting a message is a publisher and the one receiving the message is a subscriber. For example, FIG. 560 illustrates the process of a system of a robot publishing a map and a path of the robot.

In the middle, a broker provides additional advantages such as subject, content, and type filtering, allowing the broker to intercept and decide whether to answer or block messages based on topic, content, type, etc. This decouples the publisher from the consumer and abstracts away information such as IP/MAC address from both sides. In embodiments, filtering for topic comprises pruning messages when there is no subscriber tuned for a specific topic (i.e., channel) of communication. In some contexts, a topic may be a communication channel that a subscriber tunes into to obtain information from a publisher. In embodiments, payloads may be encrypted text or JSON objects. In some embodiments, shared subscription may be implemented using the feature subscription group provided by MQTT.

In embodiments, messaging systems may have synchronous or asynchronous nature. In embodiments, messages may be unidirectional or bidirectional. In some embodiments, the broker may have a handle. In some embodiments, after the broker connects the client to a service, the broker does not participate in message transfer. In some embodiments, the service first needs to register with a broker, providing details such as service nature, location, etc. In some embodiments, the client attempts to discover services by sending a message to the broker and the broker responds with a list of previously registered services. In some embodiments, multicast is desirable, wherein a group is the recipient of a service or message.

In embodiments, variations may include group recipients or may allow for the subscriber to leave or join groups such that the subscriber may not receive or receives messages. In embodiments, messages may have priorities or importance levels. Depending on protocol, a session may start with a hello message, connect message, keep alive message, and/or init message, each message serving the purpose of initiating a communication. This may be replied with an ack message if the protocol provides a connection-oriented service.

In some embodiments, protocols such as STOMP, CoAP, AMQP or HTTP may be used. In some embodiments, messages may be sent as JSON objects. In some embodiments, RPC communication method may be used.

In some embodiments, an authorization, authentication and accounting method may be used to keep track of users and services, access, and usage. Keystone is an example of an identity manager, but according to needs, a proprietary version may provide advantages. In some embodiments, a LDAP may be used to manage resources and access.

In embodiments, latency is increased as physical distance is increased. Latency of sensors of the robot must be comparable with other similar sensors. For example, Wi-Fi signals may have a latency of 1.5 ms. In embodiments, processing occurs where the data is located as opposed to transferring the data to a location where processing occurs.

In a real-time system, the runtime behavior of the robot is instant and on-the-fly decisions, outputs, and such are executed. For example, with QSLAM, a new room is instantaneously distinguished upon the room being observed by the system of the robot. In comparison, some prior art distinguishes a new room only after the completion of the work session of the robot. In operating instantaneously and on-the-fly, the problem of partial observability is solved as well.

At a global level, obstacles are observed by a LIDAR of the robot as positioned at distances closer to the robot than the rest of the environment. In some embodiments, a depth camera or vision sensor may be used in addition to or instead of the LIDAR. Alternative or additional options may also include RGBD cameras, TOF sensors, etc. In some embodiments, as a complementary obstacle management solution, IR sensors ultrasound sensors, TSSP sensors, TSOP sensors, and the like may be used. Sharp distance sensors and ST Micro flight sensors are also complementary sensors that may be integrated into the obstacle management system of the robot.

Some embodiments may use speed cop, a software component that manages the speed, acceleration, and deceleration of the robot in various situations. In older behavioral systems, the robot executes a reactive preset movement when an IR receiver of a local obstacle sensor receives the reflection of a signal that was emitted by an IR transmitter of the sensor, without learning or storing any information, including the sensed obstacle.

However, in the new system described herein, object detection is more complex. As opposed to using 1 or 0 to distinguish the presence of an obstacle, a statistical and probabilistic approach is used. The system compares and examines sensed data against the global map and determines if there have been unexpected encounters in this area before (e.g., based on data from a global sensor, LIDAR, camera, structured light, etc.). In embodiments, areas in which unexpected encounters occurred are marked within the map such that in future runs the areas are approached with more caution. In embodiments, the system of the robot examines and determines if an obstacle encounter is a single encounter or a series of encounters. For example, a single encounter may be determined for an encounter with a standalone skinny pole, such as pole 56100 of desk 56101 in FIG. 561, and a series of encounters may be determined for an encounter with a chair with four or five skinny legs in close proximity of each other, such as the legs of chairs 56102 and 56103. In embodiments, the system of the robot determines whether the obstacle may move a little if bumped by the robot (e.g., a chair with caster wheels) and if the movement of the obstacle results in one or more other obstacles moving, such as a fixed table 56200 next to a wheeled chair 56201 illustrated in FIG. 562. In embodiments, the system of the robot determines if a trap-like area exists, such as the area 56300 under chair 56301 illustrated in FIG. 563. The robot may avoid such trap-like areas in future runs. In some embodiments, the system of the robot may inflate obstacles that have previously or are predicted to cause the robot to become stuck. In embodiments, the system may increase or decrease an inflation rate of the obstacle in following runs.

Figure 564A:
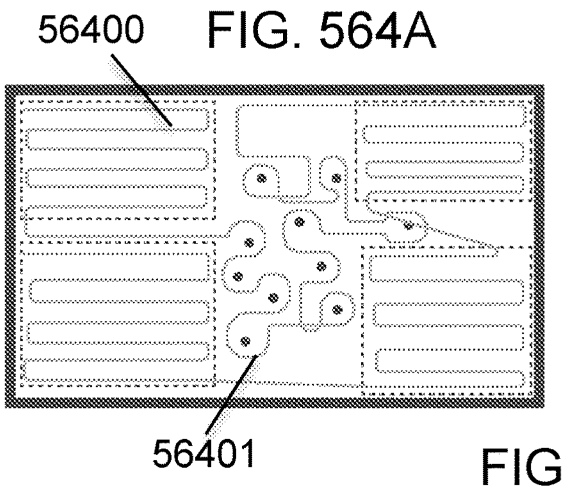
Figure 564B:
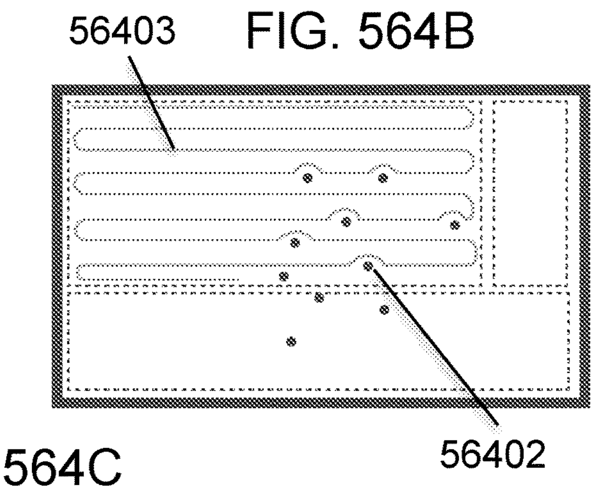
Figure 564C:
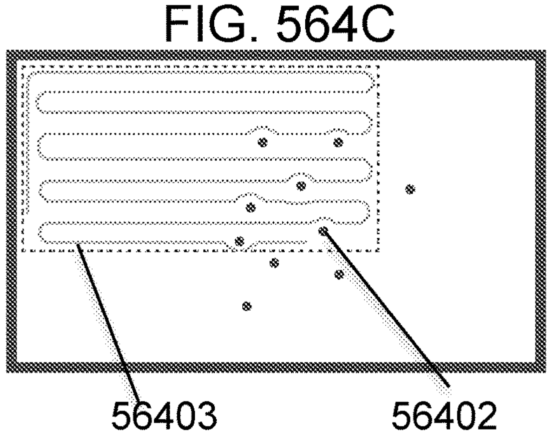
Figure 565:
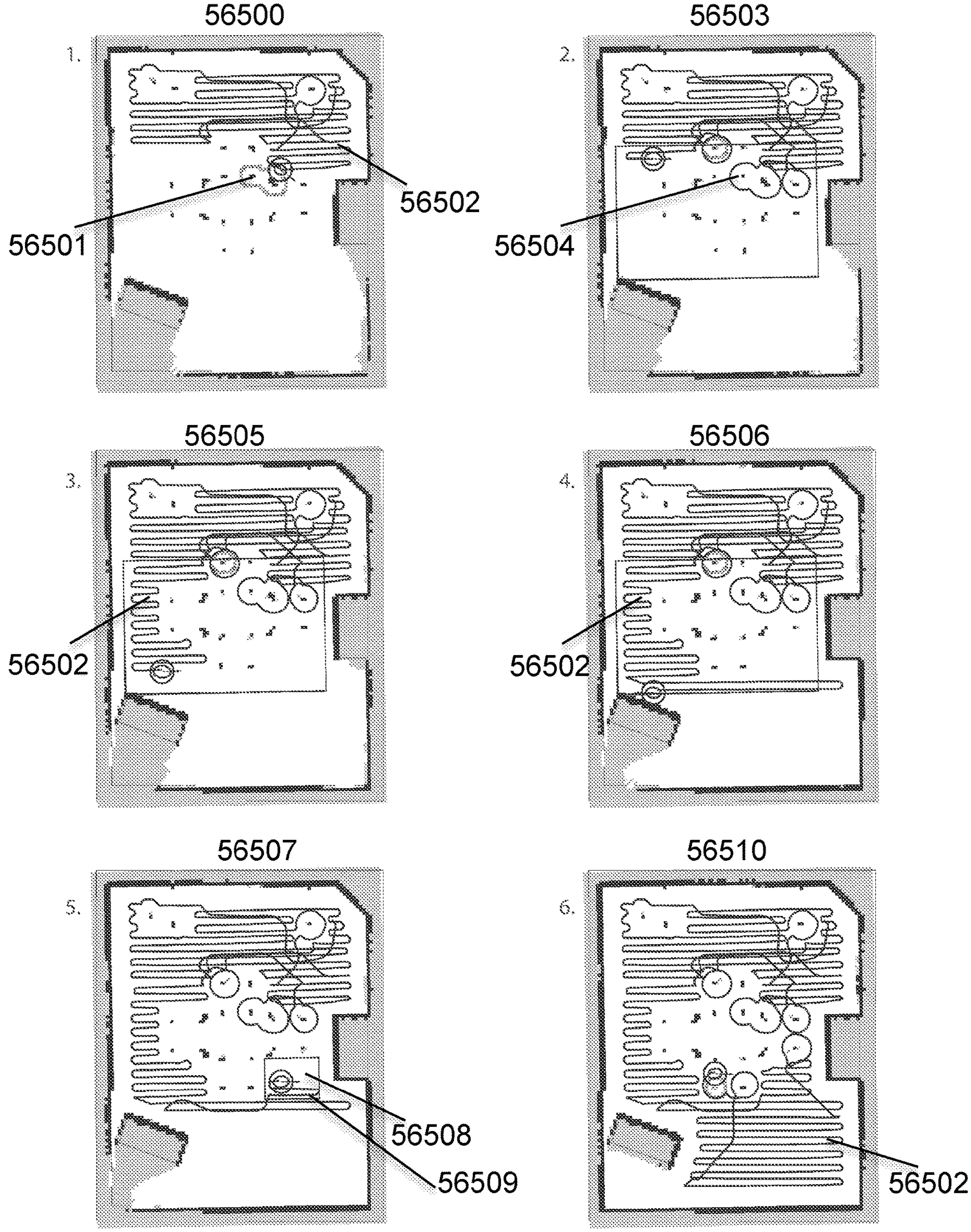
Figure 566:
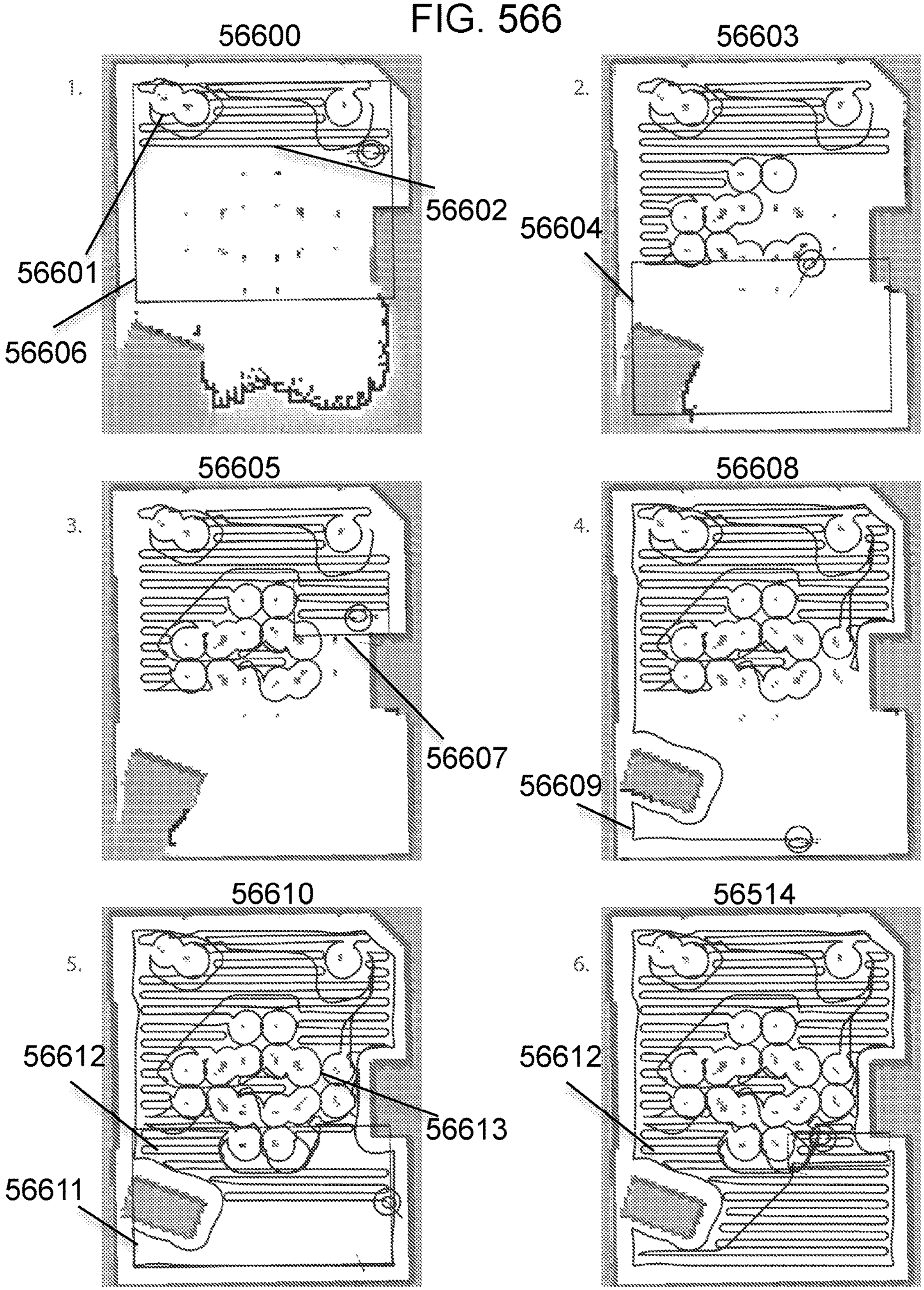

In some embodiments, the boustrophedon coverage is independent of obstacle coverage. This is shown in FIG. 564A, wherein boustrophedon coverage 56400 is independent of obstacle coverage 56401. In some embodiments, the boustrophedon coverage and obstacle coverage occur concurrently. This is shown in FIGS. 564B and 564C, wherein obstacle 56402 are covered during boustrophedon coverage 56403. For example, FIG. 565 illustrates an embodiment of coverage by a robot. In instance 56500, obstacle coverage of obstacles 56501 is independent of boustrophedon coverage 56502. In the instance 56503, boustrophedon coverage starts with coverage of some previously independently covered obstacles 56504. In the instance 56505, boustrophedon coverage 56502 continues, wherein interior obstacles 56501 are avoided and their coverage postponed. In the instance 56506, the boustrophedon coverage 56502 is complete. In the instance 56507, boustrophedon coverage of a sub-area 56508 skipped in the previous pass is resumed as a separate boustrophedon coverage task 56509. In the instance 56510, some obstacle coverage (i.e., obstacle wall following coverage) postponed during the boustrophedon task is resumed as a separate task. FIG. 566 illustrates another example of coverage by a robot. In the instance 56600, obstacle coverage 56601 is included in boustrophedon coverage 56602. In the instance 56603, the system of the robot considers a new boustrophedon box 56604 within which boustrophedon coverage is planned and executed. In the instance 56605, the system of the robot continues obstacle coverage in the first boustrophedon box 56606 and then generates another smaller boustrophedon box 56607 for the remaining area within the first boustrophedon box 56606. In the instance 56608, the robot executes wall follow coverage 56609 before defining another boustrophedon box. In the instance 56610, another boustrophedon box 56611 is created within which boustrophedon coverage 56612 and obstacle coverage 56613 are planned and executed. In the instance 56614, the boustrophedon coverage 56612 is complete.

In some embodiments, the robot may encounter stains on the floor during a working session. In some embodiments, different stains (e.g., material composition of stain, size of stain, etc.) on the floor may require varying levels of cleaning intensity to remove the stain from, for example, a hardwood floor. In some embodiments, the robot may encounter debris on floors. In some embodiments, debris may be different for each encounter (e.g., type of debris, amount of debris, etc.). In some embodiments, these encounters may be divided into categories (e.g., by amount of debris accumulation encountered or by size of stain encountered or by type of debris or stain encountered). In some embodiments, each category may occur at different frequencies in different locations within the environment. For example, the robot may encounter a large amount of debris accumulation at a high frequency in a particular area of the environment. In some embodiments, the processor of the robot may record such frequencies for different areas of the environment during various work sessions and determine patterns related to stains and debris accumulation based on the different encounters. For example, the processor may identify particular areas as being likely to have hard to clean stains and may actuate the robot to perform a deep clean in such areas. In some embodiments, the processor may adjust cleaning strategies based om the derived patterns. FIG. 567 illustrates spots and stains 56700 on hard floor 56701, varying levels of difficulty 56702 for removing an encountered stain, and a frequency 56703 of encountering a particular difficulty for removing a stain. FIG. 567 also illustrates examples of varying levels of debris accumulation 56704 and corresponding frequencies 56705 of encountering different levels of debris accumulations. Such frequencies recorded are compiled 56706 over various work sessions.

In some embodiments, similar techniques are applied for obstacle encounters. For instance, the processor may record the frequency of encountering an obstacle in a particular area, the frequency of encountering obstacles the robot is likely to become stuck on or have difficulty navigating around in particular areas, etc. In some embodiments, the processor determines patterns of encounters with obstacles for one particular area or an entire environment. In some embodiments, the processor determines patterns of encounters with obstacles based on encounters with obstacles within the environment recorded during a single work session, multiple work sessions, or all work sessions. FIG. 568 illustrates U-shape chair legs 56800 that the robot may become stuck on and different choices 56801 for which frequencies related to obstacle encounters may be recorded. FIG. 568 also illustrates examples of varying levels of difficulty for maneuvering around encountered obstacles 56802 and possible frequencies 56803 of such encounters. Such frequencies recorded are compiled 56804 over various work sessions.

In some embodiments, the processor executes a decision-making loop comprising of observation and actuation in response to the observation. Examples of actuations include decreasing speed, decreasing the distance between parallel lines in the robot path to increase overlap coverage by the robot, repeating treatment or cleaning of an area or entire environment, scheduling a next cleaning earlier, creating a detour to provide extra attention to an area, or a combination of some or all of these actuations. FIG. 569 illustrates a decision-making loop 56900 and examples of actuations 56901. Given an area is observed include higher levels of debris accumulation, the processor may actuate the robot to drive slower or may decrease the distance between parallel lines of a boustrophedon path of the robot.

In some embodiments, observations captured by sensors of the robot may be visualized by a user using an application of a communication device. For instance, a stain observed by sensors of the robot at a particular location may be displayed in a map of the environment at the particular location it was observed. In some embodiments, stains observed in previous work sessions are displayed in a lighter shade and stain observed during a current work session are displayed in a darker shade. This allows a user to visualize areas in which stains are often observed and currently observed. FIG. 570 illustrates an observation and visualization loop 57000 and an application 57001 of a communication device 57002 displaying a stain 57003 in a map 57004 observed at different times. The current observed stain is displayed in a darker shade 57005 while those previously observed are displayed in a lighter shade 57006.

In some embodiments, the user may choose an actuation based on the visualization displayed to the user, such as observed locations of stains or high debris accumulation. Examples of actuations include increasing cleaning frequency, reducing the speed of the robot, decrease a distance between parallel lines in the robot path or increasing coverage overlap, adding extra coverage for an area, autonomous AI actuation, etc. FIG. 571 illustrates a visualization and user-chosen actuation loop 57100, a button 57101 that may be displayed below the visualization of a stain 57102 in a map 57103 and used by a user to select one or more actuations 57104.

In some embodiments, the processor of a robot, such as a commercial cleaner, may determine an optimal service station for the robot. In some embodiments, the processor comprises listing all self service station locations, contacting service stations to determine duration of time required before availability, identifying a suitable service station, docking at the selected service station, performing self-service with assistance from the service station, and resuming operation. In some embodiments, the processor of identifying the suitable service station comprises determining services provided by different service stations, determining availability of service stations, determining whether service is required immediately or at a later time, and determining if the robot has enough battery to navigate to the service station while performing work. These processes are illustrated in FIG. 572.

In some embodiments, there may be multiple service stations and robots within a facility. Each station may provide different combinations of services and different capacities and may or may not be occupied. For example, FIG. 573 illustrates five service stations 57300, each with different availability, services, and capacity (e.g., human assisted or self service).

In some embodiments, air flow and/or suction may be measured using one or more sensors to determine if there is a block in an air passage of the robot based on the sensor data.

In some embodiments, the robot may have a flat side on a rear side or a front side or both sides of its body. In some embodiments, the front side of the robot body is flat and the rear side of the body is rounded. In some embodiments, the front side of the robot body is rounded and the rear side of the body is flat. The robot body may also be rectangular or square, wherein both rear and front sides of the body are flat. FIGS. 574A-574D illustrate a robot of various shapes

57400, 57401, 57402, and 57403, respectively. In FIG. 574E, the angles on the flat edge surface of the robot body may be 90 degrees or close to 90 degrees. In FIG. 574E, the rounded corners of the robot body may be 90 degrees, less than 90 degrees or more than 90 degrees.

Figure 574A:
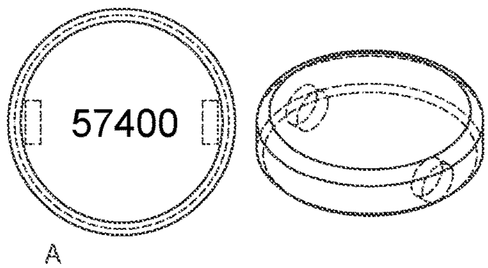
Figure 574B:
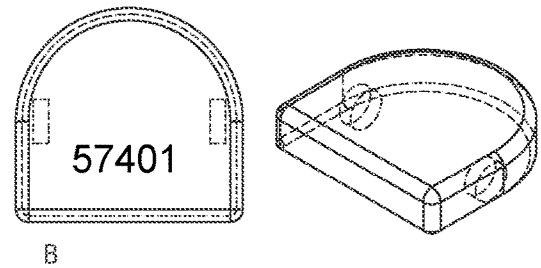
Figure 574C:
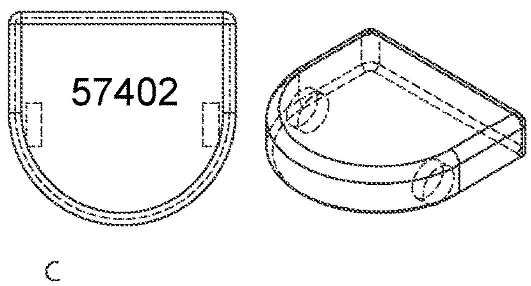
Figure 574D:
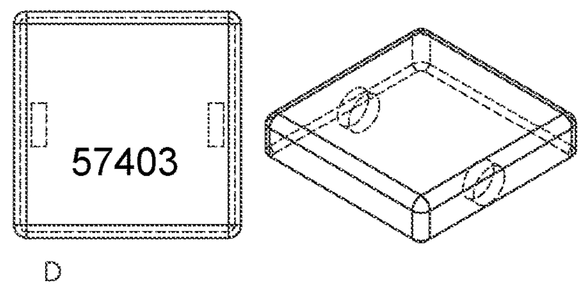
Figure 574E:
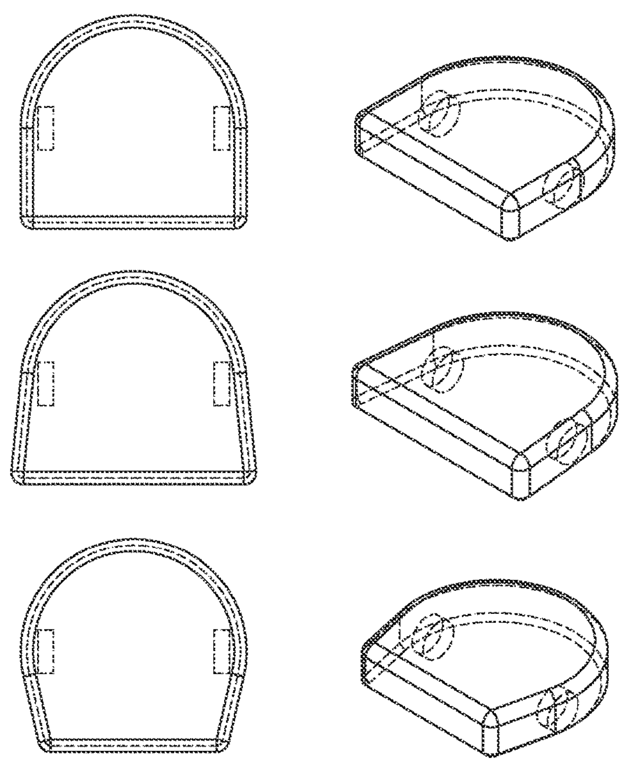

In comparison to the robot in FIG. 574A, the robots in FIGS. 574B-574D require more room to turn because of the shape of the robot body. FIG. 575 illustrates safe turning space 57500 for robot 57400, robot 57401, and robot 57403. The outermost circle 57500 demonstrates the space needed for each robot to turn 360 degrees. The needed space for turning is dependent on a length of the robot, width of a flat edge of the robot body (such as in robots 57401 and 57403) and the intersection location between wheels axis and the robot center axis (i.e., the location of the wheels in relation to the length of the robot). FIG. 576A illustrates the effect of changing each of these variables on the needed safe space 57600 for turning. Circle 57600 for robot 57601 depicts the space required for the robot 57601 to safely turn. For robot 57602, a width of the flat edge is increased resulting in an expansion of circle 57600. For robot 57603, a length of the robot 57603 is increased resulting in an expansion of circle 57600. For robot 57604, the wheels 57605 are located closer to the flat edge of the body resulting in a contraction of the circle 57600. If the wheels are closer to the flat edge of the body a smaller space is needed for the robot to turn. However, there is a limit where shifting the wheels becomes ineffective. In embodiments, the optimal placement of the wheels is at a position where the distance of the midpoint of the wheel axis to the front of the robot is equal to the distance of the midpoint of the wheel axis to each corner of the robot body. FIG. 576B illustrates an optimal needed safe space 57600 for a robot 57606, wherein distances A, B and C are equal to each other.

Figure 577:
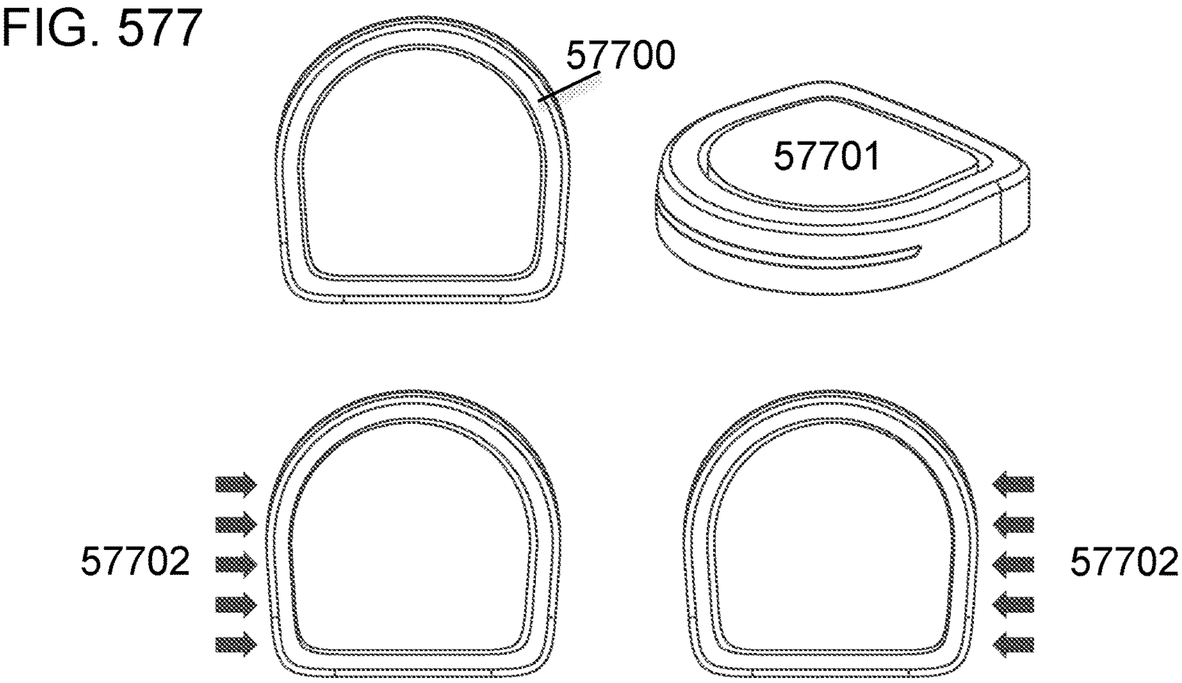
Figure 578:
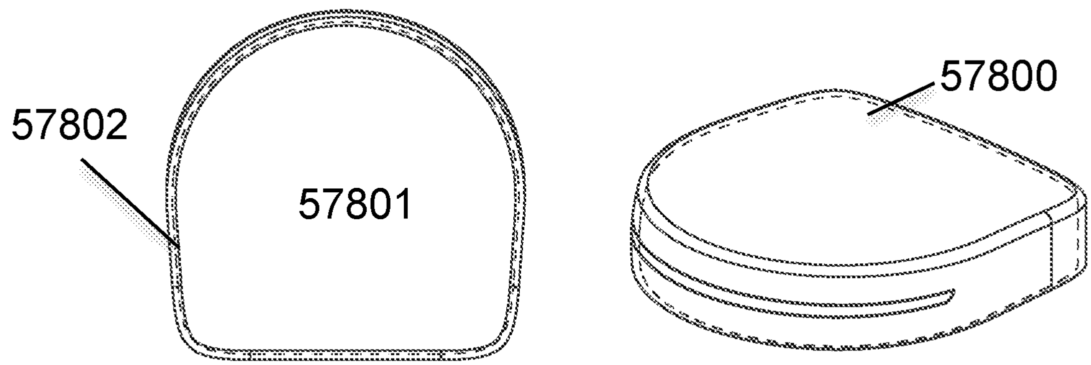
Figure 579:
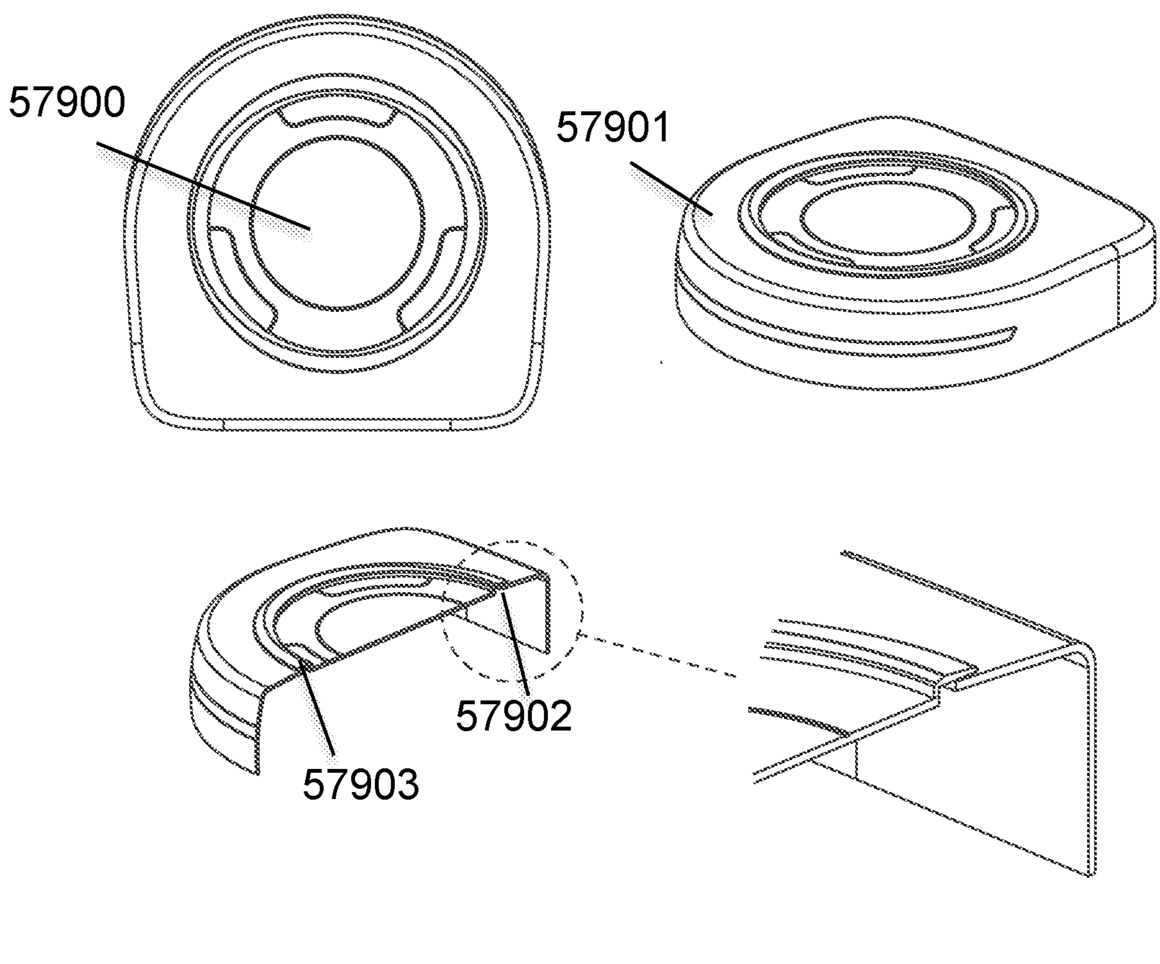

Depending on the use case, the bumper of robots, such as robots 57401 and 57402 in FIGS. 574B and 574C, may cover the perimeter of the robot body. Depending on the use case, side movement of the bumper may be necessary, wherein the bumper may be triggered from the side of the robot. In some embodiments, this may be implemented by using tension springs on both sides. FIG. 577 illustrates a bumper 57700 surrounding the perimeter of a robot 57701. It also illustrates the side movement 57702 of the bumper 57700. Regardless of the shape of the robot, the bumper may be integrated and cover the entire body of the robot. FIG. 578 illustrates a bumper 57800 covering the entire body of the robot 57801, including a top surface of the robot. The dotted lines 57802 illustrate the body of the robot beneath the integrated bumper. In some embodiments, there may be other elements such as a user interface on top of the bumper. In this case the moving edge of the bumper may be hidden under such elements. FIG. 579 illustrates a user interface component 57900 placed on top of the bumper 57901. In the cross-sectional view, the bumper 57901 is shown to move underneath the user interface frame 57900. There is a gap 57902 between the bumper 57901 and the user interface (covered by the user interface frame 57903) that allows the bumper 57901 to move when it is triggered.

Figure 580A:
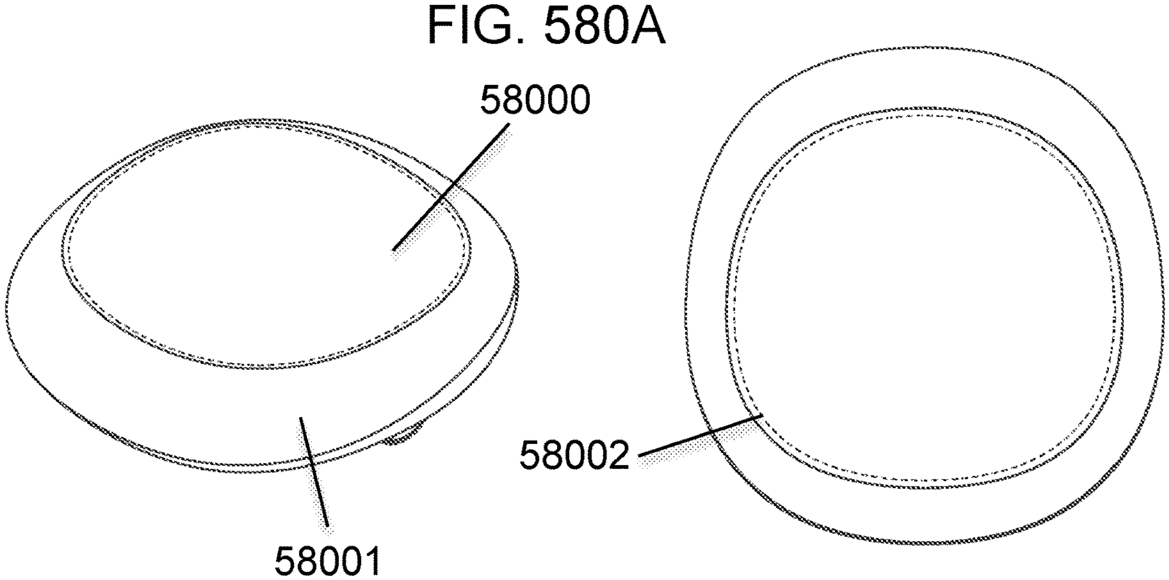
Figure 580B:
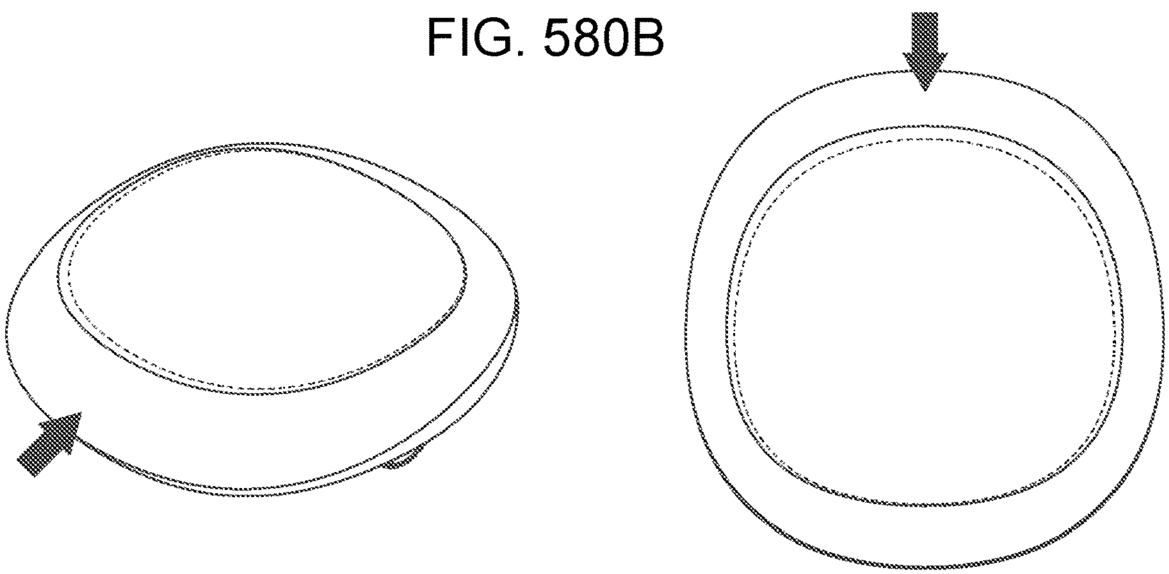
Figure 580C:
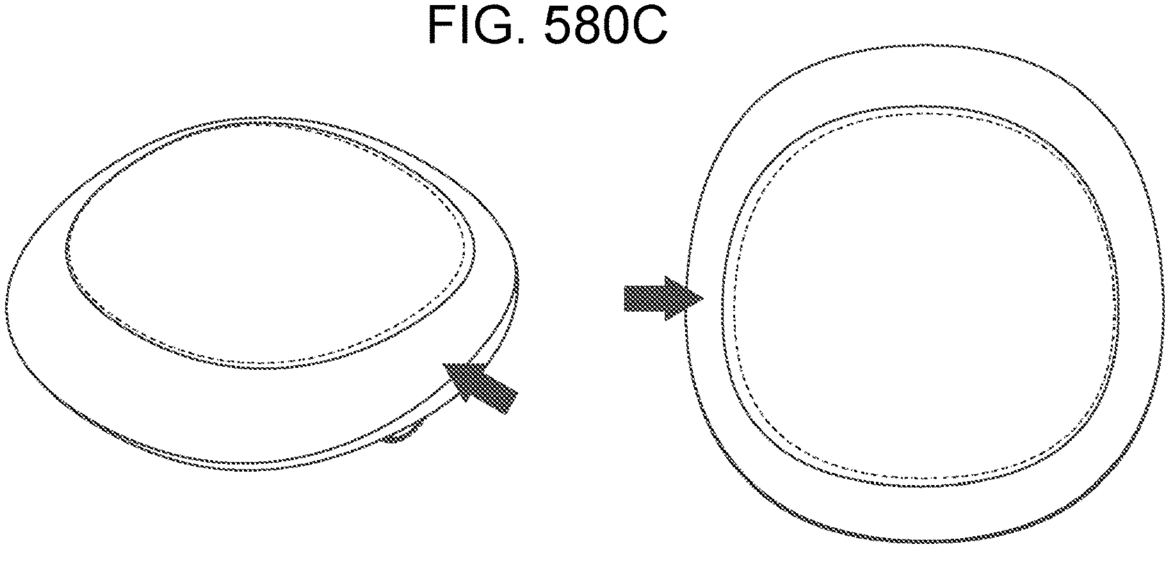

FIGS. 580A-580C illustrate another example of a robot with a body comprising rounded front and rear sides including a user interface 58000 and bumper 58001. The bumper 58001 covers the entire perimeter of the robot and the edge 58002 (dotted line) of the bumper 58001 is hidden under the user interface 58000. FIG. 580A illustrates the position of the bumper in a neutral station, FIG. 580B illustrates the position of the bumper when actuated from the front and FIG. 580C illustrates the position of the bumper when actuated from the side.

In some embodiments, a robot body shape that is a fusion between a square and a circle may be referred to as a squircle shaped robot. The squircle shape may be defined by the equation $(x-a)^4+(y-b)^4=r^4$, wherein a and b are the x and y coordinates of the center and r is the minor radius of the squircle. In some embodiments, the robot body shape may comprise a semi-squircle wherein only one half of the body shape is a squircle. The other half may be a semi-circle or a semi-square or a semi-rectangle. In embodiments, the body shape of the robot may be any combination or fusion of different shapes. For example, in FIG. 580, the robot body is a combination of a semi-circle and a semi-square.

In a first work session, a previously generated map may not be available to the processor of the robot. In such cases, the processor determines decisions in real-time based on information that has been gathered up to a current point at which a decision is to be made dynamically to select between three different tasks, coverage, wall-following, and exploration. In embodiments, the decision is determined adaptively and based on a current position of the robot resulting from execution of a previous task and given observability is partial. For example, FIG. 581 illustrates an example of a work session of a robot. The robot started on charging station 58100. Since a processor of the robot had no access to a map of the environment, its initial priority was exploration. Therefore, the robot explored to a center of room 58101 during which the processor completed its map of room 58101. Then the robot covered room 58101 by executing a boustrophedon path 58102 within boustrophedon boxes 58103 and 58104. The robot completed coverage of a perimeter of the room 58101 before beginning coverage of room 58105. In the final parts of wall-following room 58101, the robot followed along a perimeter of island 58106 that is within room 58101, leading the robot to room 58105. To gain more knowledge on room 58105, the robot navigated to a more central location of room 58105 and once the processor deemed to have reasonable knowledge of a map of the room 58105, the robot began coverage by executing a boustrophedon path within boustrophedon box 58107. During coverage within boustrophedon box 58107, the processor noticed that some areas 58108 were missed between room 58105 and room 58101 and actuated the robot to cover the uncovered areas within narrow boustrophedon boxes before moving on to new areas. Since the robot was already close to island 58106, the robot covered the perimeter of island 58106 within room 58105 from right to left and continued on to cover perimeter points between boustrophedon box 58107 and the wall to the left. Had the processor of the robot chosen a new boustrophedon box 58109 earlier, then the robot would have to come back to wall follow the wall to a left side of boustrophedon box 58107. This would not be optimal and is likely the reason the processor performed coverage as described. After completing wall-following along the wall on the left side of boustrophedon box 58107, the processor of the robot determined whether to cover boustrophedon box 58109 (since room 58105 was already mapped, the robot did not need to explore) or continue with wall-following the wall further before starting coverage of boustrophedon box 58109. Continuing wall-following first saved the robot from having to come back to wall-follow the wall to the left side of boustrophedon box 58109. The next likely task of the robot (not shown) would be to cover boustrophedon box 58109.

In some embodiments, the processor of the robot determines a main coverage angle by determining an angle and length for all walls, binning the walls based on their angles ranging from zero to pi/2, choosing the angle of the bin having the longest accumulation of wall lengths, and rotating the map by the shortest angle that matches the chosen angle. After rotation, the main coverage angle may be set to zero. A minor perturbation of the robot start pose may cause a 90 degree flip.

The methods and techniques described herein may be implemented as a process, as a method, in an apparatus, in a system, in a device, in a computer readable medium (e.g., a computer readable medium storing computer readable instructions or computer program code that may be executed by a processor to effectuate robotic operations), or in a computer program product including a computer usable medium with computer readable program code embedded therein.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A method for operating a battery operated wheeled device actuated with electric motors, comprising: capturing, by a primary sensor coupled to the wheeled device, primary sensor data indicative of a plurality of radial distances from the primary sensor to objects within a maximum range of the primary sensor as the robot performs work within an environment; transforming, by a processor of the wheeled device, the plurality of radial distances from a perspective of the primary sensor to a perspective of the wheeled device based on a physical position of the primary sensor relative to a body of the wheeled device; generating, by the processor, a partial map of visible areas of the environment in real-time at a first position of the wheeled device based on the primary sensor data and at least some secondary sensor data, wherein: the partial map is a bird's eye view of the environment; and the processor iteratively completes a full map of the environment based on new sensor data captured by sensors as the wheeled device performs work within the environment and new areas become visible to the sensors; and executing, by the wheeled device, a movement path to a second position.
2. The method of embodiment 1, wherein: new sensor data captured at each new position of the wheeled device partly overlaps with sensor data previously captured at a previous position of the wheeled device; at least a portion of the new sensor data comprises distances to objects within the environment previously invisible to the sensors from the previous position of the wheeled device; and the new sensor data is integrated into a previous iteration of the partial map to generate a next iteration of the partial map defining more areas of the environment than the previous iteration of the partial map.
3. The method of embodiments 1-2, further comprising: aligning, by the processor, newly captured sensor data with an iteration of the partial map based on the secondary sensor data, wherein: the secondary sensor data comprises at least one of: IMU sensor data, gyroscope data, optical tracking sensor data, and wheel encoder data; and the secondary sensor data is indicative of movement of the wheeled device.
4. The method of embodiments 1-3, further comprising: determining, by the processor, a difference between a planned path of the wheeled device and an actual trajectory of the wheeled device at each time step; and correcting, by the processor, a location of the wheeled device based on the difference.
5. The method of embodiments 1-4, further comprising: aligning and integrating, by the processor, newly captured primary sensor data captured from consecutive positions of the wheeled device with previously captured primary sensor data captured from previous positions of the wheeled device at overlapping points between the newly captured primary sensor data and the previously captured primary sensor data; and generating, by the processor, new iterations of the partial map as the wheeled device traverses into new and undiscovered areas of the environment, wherein each new iteration of the partial map defines more areas of the environment than a previous iteration of the partial map based on at least the integration of the newly captured primary sensor data into each new iteration of the partial map.
6. The method of embodiments 1-5, further comprising: identifying, by the processor, a room in the partial map or the full map based on at least one of the primary sensor data and the secondary sensor data.
7. The method of embodiments 1-6, further comprising: determining, by the processor, all areas of the environment are discovered and included in the full map when at least all newly captured primary sensor data overlaps with previously captured primary sensor data; localizing, by the processor, the wheeled device within the partial map or the full map in real-time while simultaneously generating the partial map or the full map based on at least one of the primary sensor data and the secondary sensor data; planning, by the processor, a path of the wheeled device based on at least one of the primary sensor data and the secondary sensor data; actuating, by the processor, the wheeled device to drive along a trajectory that follows along the path by providing pulses to one or more electric motors of wheels of the wheeled device.

8. The method of embodiments 1-7, wherein the wheeled device comprises a single microcontroller simultaneously executing at least a simultaneous localization and mapping task, a path planning task, an obstacle avoidance task, a coverage tracker task, a control task, and a cleaning operation task by time-sharing computational resources of the single microcontroller.
9. The method of embodiment 8, wherein a scheduler assigns a time slice of the single microcontroller to each of the simultaneous localization and mapping task, the path planning task, the obstacle avoidance task, the coverage tracker task, the control task, and the cleaning operation task according to an importance value assigned to each task.
10. The method of embodiment 9, wherein: the scheduler preempts lower priority tasks with higher priority tasks; the scheduler preempts all tasks by an interrupt service request when invoked; and the scheduler runs a routine associated with the interrupt service request.
11. The method of embodiment 8, wherein: tasks communicate elements within a large data structure in queues by referencing their location in memory using a pointer; and data is configured to flow from one electronic address to another by direct memory access.
12. The method of embodiments 1-11, further comprising: executing, by the processor, a coverage tracker, wherein: the coverage tracker deems an operational session comprising a coverage task complete; and the coverage tracker transitions the wheeled device to a state that actuates the wheeled device to find a charging station when the operational session is deemed complete.
13. The method of embodiments 1-12, further comprising: storing, in at least one of a memory accessible to the processor during a subsequent operational session and the cloud, the partial map or the full map; pairing, by a wireless card coupled with a single microcontroller of the wheeled device, an application of a smart phone device with the processor of the wheeled device via the internet or a local network; transmitting, by the processor, iterations of the partial map to the application of the smart phone device; and displaying, by the application, the iterations of the partial map on a screen of the smart phone device.
14. The method of embodiments 1-13, further comprising: localizing or relocalizing, by the processor, the wheeled device in an existing map using a previously generated map of the environment, wherein: the previously generated map was generated by at least one of the wheeled device during at least one previous operating session, a specialized mapping robot, a scout robot comprising a robot that temporarily separates from the wheeled device or another robotic device, a cell phone, a stationary camera within an environment, an auxiliary device, a combination of automatic and manual methods, a human operator moving the wheeled device or another robotic device to generate the previously generated map, and a blue print.
15. The method of embodiments 1-14, further comprising: initializing, by the processor, an operation of the wheeled device at a start of an operational session by attempting to relocalize the wheeled device in a previously stored partial map or full map; and creating, by the processor, a new map upon failing to relocalize the wheeled device; and while performing work, relocalizing, by the processor, the wheeled device within the previously stored partial map or full map if the processor recognizes the previously stored partial map or full map at any point in the operational session.
16. The method of embodiments 1-15, further comprising: executing, by the processor, a simultaneous localization and mapping task that is bound by one of a hard time constraint, a firm time constraint, or a soft time constraint of real-time computing.
17. The method of embodiments 1-16, further comprising: executing, by a single microcontroller of the wheeled device, a finite state machine that causes the wheeled device to transition from one state to another state based on events and a current state of the wheeled device.
18. The method of embodiments 1-17, further comprising: executing, by the processor, a simultaneous localization and mapping task in concurrence with a coverage tracking task to avoid, minimize, or control an amount of overlap in coverage by the wheeled device.
19. The method of embodiments 1-18, wherein sensor data captured by sensors of the wheeled device are obtained and processed on a single microcontroller of the wheeled device executing simultaneous localization and mapping tasks.
20. The method of embodiments 1-19, wherein actuation and control of any of a main brush motor, a side brush motor, a fan motor, and a wheel motor are processed on a single microcontroller of the wheeled device executing simultaneous localization and mapping tasks.
21. The method of embodiments 1-20, further comprising: moving, by an actuator of the wheeled device, the wheeled device along a planned path or a portion of the planned path; determining, by the processor, a distance travelled by the wheeled device using odometry data; and stopping, by the actuator of the wheeled device, the wheeled device from moving after traveling a distance equal to a length of the planned path or the portion of the planned path or an updated planned path.
22. The method of embodiments 1-21, wherein: the wheeled device cleans a first room prior to cleaning a next room; and rooms in the partial map or the full map are partially bounded by a gap.
23. The method of embodiments 1-22, further comprising: identifying, by the processor, rooms in the partial map or the full map based on sensor data indicative of locations of boundaries, rooms, hallways, and doorways; and proposing, by the processor, a default segmentation of the partial map or full map into subareas based on at least one of identified rooms, doorways, floor surface types, and hallways, wherein identified rooms or subareas in the partial map or the full map are each distinguished by a different color.
24. The method of embodiments 1-23, wherein any of components, peripherals, and sensors of the wheeled device are shut down or put in a standby mode when the wheeled device is charging, in a standby mode or the clock rate of a microcontroller of the wheeled device is reduced.
25. The method of embodiments 1-24, further comprising: pairing, by a wireless card coupled with a single microcontroller of the wheeled device, an application of a smart phone device with the processor of the wheeled device via the internet or a local network, wherein: a graphical user interface the application comprises any of a toggle icon to transition between two states of the wheeled device, a linear or round slider to set a value between a minimum and a maximum range, multiple choice check boxes to choose multiple setting options, radio buttons to allow a single selection from a set of possible choices, a color theme, an animation theme, an accessibility theme, a power usage theme, a usage mode option, and an invisible mode option wherein the wheeled device performs work when people are not home.

26. The method of embodiments 1-25, further comprising: obtaining, by the processor, data from a temperature sensor positioned on any of a battery, a motor, or another component of the wheeled device to monitor their respective temperatures.

27. The method of embodiments 1-26, further comprising: determining, by the processor, rotational velocity, change of position, or acceleration of the cleaning battery operated wheeled device based on AC/DC measurements in an open or closed loop setup.

28. The method of embodiments 1-27, wherein some data processing of the partial map or the full map is off-loaded to the cloud.

29. The method of embodiments 1-28, wherein: the processor uses a network of connected computational nodes organized in at least three logical layers and processing units to enhance any of perception of the environment, internal and external sensing, localization, mapping, path planning, and actuation of the wheeled device; and at least one of the computational nodes are activated by a Rectified Linear Unit through a backpropagation learning process and the at least three layers comprise at least one convolution layer.

30. A battery operated wheeled device, comprising: a chassis; a set of wheels; a plurality of sensors; a plurality of sensors; a processor; and a tangible, non-transitory, machine readable medium storing instructions that when executed by the processor effectuates operations comprising: capturing, by a primary sensor coupled to the wheeled device, primary sensor data indicative of a plurality of radial distances from the primary sensor to objects within a maximum range of the primary sensor as the robot performs work within an environment; transforming, by the processor of the wheeled device, the plurality of radial distances from a perspective of the primary sensor to a perspective of the wheeled device based on a physical position of the primary sensor relative to a body of the wheeled device; generating, by the processor, a partial map of visible areas of the environment in real-time at a first position of the wheeled device based on the primary sensor data and at least some secondary sensor data, wherein: the partial map is a bird's eye view of the environment; and the processor iteratively completes a full map of the environment based on new sensor data captured by sensors as the wheeled device performs work within the environment and new areas become visible to the sensors; and executing, by the wheeled device, a movement path to a second position.

The invention claimed is:

1. A battery operated wheeled device, comprising:

a chassis;

a set of wheels;

a plurality of sensors;

a microcontroller; and a tangible, non-transitory, machine readable medium storing instructions that when executed by the microcontroller effectuates operations comprising:

capturing, by a primary sensor coupled to the wheeled device, primary sensor data indicative of a plurality of radial distances from the primary sensor to walls and objects, wherein:

the primary sensor comprises a 360-degrees spinning LIDAR; and the spinning LIDAR is disposed above a top surface of the wheeled device;

the spinning LIDAR is encased in a housing comprising pillars, wherein the casing moves with respect to the top surface of the wheeled device, wherein movement of the casing activates a tactile or IR sensor; and the radial distances are measured in a plane parallel to a floor surface on which the wheeled device drives at a height of the primary sensor relative to the floor surface;

autonomously generating, by the microcontroller, a partial map of visible areas of the environment in real-time at a first position of the wheeled device based on at least some of the primary sensor data, wherein:

the partial map is a bird's eye view of the environment;

the microcontroller drives the wheeled device to all areas required to iteratively completes a full map of the environment based on new sensor data captured by sensors; and driving the wheeled device to all the areas comprises moving the wheeled device to different positions such that new areas become visible to the sensors;

wherein the wheeled device is paired with an application of a communication device.

2. The wheeled device of claim 1, wherein the operations further comprise:

storing, in at least one of a memory accessible to the microcontroller during a subsequent operational session and the cloud, the partial map or the full map;

pairing, by a wireless card coupled with the single microcontroller of the wheeled device, an application of a smart phone device with the microcontroller of the wheeled device via the internet or a local network, wherein pairing the application with the microcontroller comprises a one-time exchange of information; and transmitting, by the microcontroller, iterations of the partial map to the application of the smart phone device configured to display the iterations of the partial map on a screen of the smart phone device.

3. The wheeled device of claim 1, wherein the microcontroller operates below 1 GHz.

4. The wheeled device of claim 1, wherein the wheeled device further comprises a camera for capturing video of the environment as the wheeled device drives within the environment.

5. The wheeled device of claim 4, wherein the application is configured to display the video captured of the environment as the wheeled device drives within the environment.

6. The wheeled device of claim 5, wherein:

the application is further configured to receive at least one input designating at least one instruction to drive or rotate the wheeled device in a particular direction or an instruction to drive the wheeled device to capture videos from a particular desired location within the environment;

the operations further comprise:

actuating, by the microcontroller, the wheeled device to drive or rotate according to the at least one instruction to drive or rotate the wheeled device in the particular direction; and actuating, by the microcontroller, the wheeled device to drive to the particular location according to the instruction to drive the wheeled device to the particular location displaying videos from the particular desired location.

7. The wheeled device of claim 6, wherein:

the wheeled device further comprises a speaker; and the application is further configured to receive audio input; and the wheeled device is configured to output the audio input via the speaker, wherein the audio input is a verbal command.

8. The wheeled device of claim 1, wherein:

the wheeled device further comprises a camera positioned such that a field of view of the camera captures a blind spot of the primary sensor; and the camera captures the environment as the wheeled device drives within the environment.

9. The wheeled device of claim 8, wherein:

the wheeled device further comprises a first laser emitting illuminator positioned to a left of the camera and a second laser emitting illuminator positioned to a right of the camera; and at a certain distance in front of the wheeled device a laser line emitted from the first laser emitting illuminator and a laser line emitted from the second laser emitting illuminator intersect.

10. The wheeled device of claim 9, wherein an image captured by the camera comprises bright pixels caused by incidence of the laser lines off an object.

11. The wheeled device of claim 10, wherein the operations further comprise:

determining, by the microcontroller, determine a distance of the object from the camera based on the bright pixels.

12. The wheeled device of claim 8, images captured by the camera are fed into a network of logical computational nodes running on a microcontroller.

13. The wheeled device of claim 8, wherein a subset of pixels of a subset of images captured by the camera are identified and classified as localized with respect to the partial or full map.

14. The wheeled device of claim 1, wherein the operations further comprise:

determining, by the microcontroller, a division of the full map of the environment into rooms.

15. The wheeled device of claim 14, wherein:

the application is configured to display the full map of the environment; and each room is displayed in a different color.

16. The wheeled device of claim 1, wherein the operations further comprise:

labelling, by the microcontroller, a room within the full map of the environment based on at least some data captured by the plurality of sensors.

17. The wheeled device of claim 16, wherein the application is configured to receive at least one input designating a new label for a room previously labelled by the microcontroller.

18. The wheeled device of claim 1, wherein:

the wheeled device further comprises:

a camera;

a first light source positioned to a left of the camera and a second light source positioned to a right of the camera;

each light source emits a light plane, each light plane being at an angle in relation to a floor surface on which the wheeled device drives;

at a certain distance in front of the wheeled device the light plane emitted from the first light source and the light plane emitted from the second light source intersect.

19. The wheeled device of claim 18, wherein an image captured by the camera comprises lines of bright pixels caused by incidence of the light planes off an object.

20. The wheeled device of claim 1, wherein the operations further comprise:

generating, by the microcontroller, a movement path of the wheeled device; and actuating, by the microcontroller, the wheeled device to drive along the movement path, wherein actuating the wheeled device to drive along the movement path comprises a repetitive iteration of:

actuating, by the microcontroller, the wheeled device to traverse a first linear segment;

actuating, by the microcontroller, the wheeled device to rotate 180 degrees in a first rotation comprising traversing a first distance in a direction perpendicular to the first linear segment after starting the first rotation and before finishing the first rotation;

actuating, by the microcontroller, the wheeled device to traverse a second linear segment parallel to the first linear segment; and actuating, by the microcontroller, the wheeled to rotate 180 degrees in a second rotation comprising traversing a second distance in a direction perpendicular to the second linear segment after starting the second rotation and before finishing the second rotation.

21. The wheeled device of claim 1, wherein the application previously paired with one time exchange of information is configured to:

display the full map; a wheeled device status; a historical report of prior work sessions; a quantity of area covered; a duration of a work session; a schedule; and a suction power; and receive at least one input designating a no-go zone; a room label; and a modification to the full map.

22. The wheeled device of claim 21, wherein the application is further configured to:

display icons of furniture and appliances within the full map; a path of the wheeled device; and floor types within the full map; and receive at least one input designating an instruction to add an object within the full map;

and an order of coverage of rooms by the wheeled device.

23. The wheeled device of claim 1, wherein the wheeled device is paired with a home assistant configured to receive a verbal instruction for the wheeled device to clean an area in close proximity to a particularly labelled object and a room of the environment.

24. The wheeled device of claim 1, wherein:

the wheeled device further comprises a microphone; and the operations further comprise:

detecting, by the microcontroller, a direction from which a verbal command is received from a user based on at least acoustic data captured by the microphone.

25. The wheeled device of claim 1, wherein the operations further comprise:

determining, by the microcontroller, a floor type of a floor on which the wheeled device is driving based on sensor data captured with at least one sensor of the plurality of sensors; and actuating, by the microcontroller, an adjustment to a vacuum suction power of the wheeled device based on the floor type of the floor.

26. The wheeled device of claim 1, wherein the operations further comprise:

determining, by the microcontroller, a floor type of a floor on which the wheeled device is driving based on sensor data captured with at least one sensor of the plurality of sensors; and actuating, by the microcontroller, a vacuum or a mop of the wheeled device to activate or deactivate based on the floor type of the floor.

27. The wheeled device of claim 1, wherein:

the wheeled device comprises a bin for collecting debris;

the bin of the wheeled device comprises a first mechanism for emptying the bin of the wheeled device manually and at least a portion of a second mechanism for emptying the bin of the wheeled device automatically to a second bin via an air path from the first bin to the second bin;

the second mechanism comprises at least a motor;

a charging station of the wheeled device houses the second bin;

the wheeled device charges its battery after emptying the bin of the wheeled device or concurrently while emptying the bin of the wheeled device; and the first mechanism is used to separate the bin from all electrical components of the wheeled device to wash the bin of the wheeled device.

28. The wheeled device of claim 27, wherein:

the wheeled device further comprises:

a fluid reservoir for storing cleaning fluid for mopping;

a pump for delivering the cleaning fluid from the fluid reservoir to a floor; and a cloth for receiving the cleaning fluid, wherein the cloth is oriented toward the floor;

the charging station further comprises a first fluid container for storing cleaning fluid; and the charging station is configured to refill the fluid reservoir of the wheeled device with the cleaning fluid stored in the fluid container of the charging station.

29. The wheeled device of claim 28, wherein:

the charging station further comprises a second fluid container for storing waste fluid; and the charging station is further configured to collect and store the waste fluid in the second liquid container.

30. The wheeled device of claim 28, wherein a predetermined quantity of the cleaning fluid is delivered at predetermined intervals.

31. The wheeled device of claim 27, wherein the application is configured to receive at least one input designating a condition specifying when the wheeled device is to empty the bin of the wheeled device.

32. The wheeled device of claim 1, wherein the operations further comprise:

capturing, by a camera disposed on the wheeled device, images of the environment as the wheeled device performs work;

identifying, by the microcontroller, an object type of an object captured in an image based on a comparison between features of the object and features of different object types stored in an object library, wherein possible object types comprise at least a sock, pet waste, and a cable; and actuating, by the microcontroller, the wheeled device to perform an action based on the object type of the object.

33. The wheeled device of claim 32, wherein the operations further comprise:

determining, by the microcontroller, a size of the object.

34. The wheeled device of claim 32, wherein the action comprises:

generating, by the microcontroller, a no go zone in an area in which the object is positioned.

35. The wheeled device of claim 32, wherein:

the action comprises suggesting a no-go zone in an area in which the object is positioned to a user; and the application is configured to receive an input confirming or rejecting the suggested no-go zone.

36. The wheeled device of claim 32, wherein the action comprises:

actuating, by the microcontroller, the wheeled device to avoid the object.

37. The wheeled device of claim 32, wherein:

the application is configured to display an icon representing the object type in a location on the full map that corresponds with a location at which the object was encountered or observed by the wheeled device.

38. The wheeled device of claim 1, wherein the operations further comprise:

determining, by the microcontroller, a floor level within the environment on which the wheeled device is positioned based on a comparison between newly captured primary data and previously captured primary data.

39. The wheeled device of claim 1, wherein the wheeled device is configured to perform steam cleaning.

40. The wheeled device of claim 1, wherein the wheeled device is configured to perform UV sterilization.

41. The wheeled device of claim 1, wherein the application is configured to:

display areas covered by the wheeled device during a work session; and a notification; and receive at least one input designating a quantity of liquid to dispense.

42. A method for operating a battery operated wheeled device, comprising:

capturing, by a primary sensor coupled to the wheeled device, primary sensor data indicative of a plurality of radial distances from the primary sensor to walls and objects, wherein:

the primary sensor comprises a 360-degrees spinning LIDAR;

the spinning LIDAR is disposed above a top surface of the wheeled device;

the spinning LIDAR is encased in a housing comprising pillars, wherein the casing moves with respect to the top surface of the wheeled device, wherein movement of the casing activates a tactile or IR sensor; and the radial distances are measured in a plane parallel to a floor surface on which the wheeled device drives at a height of the primary sensor relative to the floor surface;

autonomously generating, by a microcontroller, a partial map of visible areas of the environment in real-time at a first position of the wheeled device based on at least some of the primary sensor data, wherein:

the partial map is a bird's eye view of the environment;

the microcontroller drives the wheeled device to all areas required to iteratively completes a full map of the environment based on new sensor data captured by sensors; and driving the wheeled device to all the areas comprises moving as the wheeled device to different positions such that new areas become visible to the sensors;

wherein the wheeled device is paired with an application of a communication device.

43. The method of claim 42, further comprise:

simultaneously executing, by a single microcontroller, a plurality of tasks, comprising:

collecting IMU, LIDAR, camera, encoder, floor sensor, and obstacle readings and processing the readings;

executing, localization, relocalization, mapping and map manipulation, room detection, coverage tracking, detection of covered areas, and path planning trajectory tracking; and controlling LED, buttons, and a speaker to play sound signals or a recorded voice.

44. The method of claim 43, wherein the microcontroller controls any of: a Wi-Fi module or a camera, and obtains image feeds of the camera.

45. The method of claim 43, further comprising:

capturing, with an image sensor, images of an environment as the wheeled device moves within the environment;

identifying, with the microcontroller, at least one object in the captured images of the environment; and classifying, with the microcontroller, the type, size, texture and nature of objects.

46. The method of claim 45, wherein the microcontroller of the wheeled device is trained in object classification using user feedback.

47. The method of claim 46, wherein the user feedback, with the application of the communication device, is configured to:

review object classification;

confirm the classification as correct; or reclassify an object misclassified.

48. The method of claim 47, wherein the microcontroller is trained in object classification using reinforcement training methods.

49. The method of claim 42, wherein moving objects are tracked, by the microcontroller, within the environment of the wheeled device while the wheeled device itself is moving.

50. The method of claim 49, wherein moving objects is any of: a human, a pet, or another wheeled device.

51. The method of claim 49, wherein labeling, with the microcontroller, separates a moving object with a certain range of motion from other environmental objects.

52. The method of claim 51, wherein the range of motions and the possible direction of movement of moving objects are predicted, by the microcontroller, based on sensor data.

53. The method of claim 49, wherein the microcontroller, with the sensors, autonomously generates a spatial representation of the environment and effectuates actions in avoiding dangers or obstacles during operations.

54. The method of claim 42, wherein the wheeled device is configured to autonomously deliver items.

55. The method of claim 54, wherein the at least one characteristic of the delivery item comprises any of: fragility, bulkiness, weight, size, dimension, shape, and stability.

56. The method of claim 54, wherein the application of the communication device configured to:

receive at least one input designating the request for delivery of the at least one item and a schedule for the delivery of the at least one item; and display a status of the wheeled device.

57. The method of claim 54, wherein the at least one item being delivered comprises at least one as food, groceries, clothing, electronics, or sports equipment.

58. The method of claim 54, wherein possible statuses of the wheeled device comprise: leaving a storage location, item picked up, item transported, item delivered, enroute to the second location, parked at a specific location or the storage location, task incomplete, task complete, enroute to the storage location, stuck, stalled, collision with an obstruction, and wheeled device damaged.

59. A tangible, non-transitory, machine readable medium storing instructions that when executed by a microcontroller of a wheeled device effectuates operations comprising:

capturing, by a primary sensor coupled to the wheeled device, primary sensor data indicative of a plurality of radial distances from the primary sensor to walls and objects, wherein:

the primary sensor comprises a 360-degrees spinning LIDAR;

the spinning LIDAR is disposed above a top surface of the wheeled device;

the spinning LIDAR is encased in a housing comprising pillars, wherein the casing moves with respect to the top surface of the wheeled device wherein movement of the casing activates a tactile or IR sensor; and the radial distances are measured in a plane parallel to a floor surface on which the wheeled device drives at a height of the primary sensor relative to the floor surface;

autonomously generating, by a microcontroller, a partial map of visible areas of the environment in real-time at a first position of the wheeled device based on at least some of the primary sensor data, wherein:

the partial map is a bird's eye view of the environment;

the microcontroller drives the wheeled device to all areas required to iteratively completes a full map of the environment based on new sensor data captured by sensors; and driving the wheeled device to all the areas comprises moving as the wheeled device to different positions such that new areas become visible to the sensors;

wherein the wheeled device is paired with an application of a communication device.

60. The medium of claim 59, further comprise:

simultaneously executing, by a single microcontroller, a plurality of tasks, comprising:

collecting IMU, LIDAR, camera, encoder, floor sensor, and obstacle readings and processing the readings;

executing, localization, relocalization, mapping and map manipulation, room detection, coverage tracking, detection of covered areas, and path planning trajectory tracking; and controlling LED, buttons, and a speaker to play sound signals or a recorded voice.

61. The medium of claim 60, wherein the microcontroller controls any of: a Wi-Fi module or a camera, and obtains image feeds of the camera.

62. The medium of claim 60, further comprising:

capturing, with an image sensor, images of an environment as the wheeled device moves within the environment;

identifying, with the microcontroller, at least one object in the captured images of the environment; and classifying, with the microcontroller, the type, size, texture and nature of objects.

63. The medium of claim 62, wherein the microcontroller of the wheeled device is trained in object classification using user feedback.

64. The medium of claim 63, wherein the user feedback, with the application of the communication device, is configured to:

review object classification;

confirm the classification as correct; or reclassify an object misclassified.

65. The medium of claim 64, wherein the microcontroller is trained in object classification using reinforcement training methods.

66. The medium of claim 59, wherein moving objects are tracked, by the microcontroller, within the environment of the wheeled device while the wheeled device itself is moving.

67. The medium of claim 66, wherein moving objects is any of: a human, a pet, or another wheeled device.

68. The medium of claim 66, wherein labeling, with the microcontroller, separates a moving object with a certain range of motion from other environmental objects.

69. The medium of claim 68 wherein the range of motions and the possible direction of movement of moving objects are predicted, by the microcontroller, based on sensor data.

70. The medium of claim 66, wherein the microcontroller, with the sensors, autonomously generates a spatial representation of the environment and effectuates actions in avoiding dangers or obstacles during operations.

71. The medium of claim 59, wherein the wheeled device is configured to autonomously deliver items.

72. The medium of claim 71, wherein the at least one characteristic of the delivery item comprises any of: fragility, bulkiness, weight, size, dimension, shape, and stability.

73. The medium of claim 71, wherein the application of the communication device configured to:

receive at least one input designating the request for delivery of the at least one item and a schedule for the delivery of the at least one item; and display a status of the wheeled device.

74. The medium of claim 71, wherein the at least one item being delivered comprises at least one as food, groceries, clothing, electronics, or sports equipment.

75. The medium of claim 71, wherein possible statuses of the wheeled device comprise: leaving a storage location, item picked up, item transported, item delivered, enroute to the second location, parked at a specific location or the storage location, task incomplete, task complete, enroute to the storage location, stuck, stalled, collision with an obstruction, and wheeled device damaged.

* * * * *